US011222325B2

(12) United States Patent
Van Os et al.

(10) Patent No.: US 11,222,325 B2
(45) Date of Patent: Jan. 11, 2022

(54) USER INTERFACES FOR PEER-TO-PEER TRANSFERS

(71) Applicant: Apple Inc., Cupertino, CA (US)

(72) Inventors: Marcel Van Os, San Francisco, CA (US); Peter D. Anton, San Francisco, CA (US); Allison Dryer, San Francisco, CA (US); Cas Lemmens, San Francisco, CA (US); Glen W. Steele, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/037,085

(22) Filed: Sep. 29, 2020

(65) Prior Publication Data

US 2021/0027269 A1 Jan. 28, 2021

Related U.S. Application Data

(63) Continuation of application No. 15/981,817, filed on May 16, 2018, now Pat. No. 10,796,294.

(Continued)

(51) Int. Cl.

*G06Q 20/22* (2012.01)
*G06Q 20/10* (2012.01)

(Continued)

(52) U.S. Cl.

CPC ........... *G06Q 20/223* (2013.01); *G06F 3/167* (2013.01); *G06Q 20/102* (2013.01);

(Continued)

(58) Field of Classification Search

CPC .. G06Q 20/223; G06Q 20/102; G06Q 20/322; G06F 3/167; H04L 67/1078

See application file for complete search history.

(56) References Cited

U.S. PATENT DOCUMENTS 3,586,261 A 6/1971 Paine et al.
4,516,207 A 5/1985 Moriyama et al.

(Continued)

FOREIGN PATENT DOCUMENTS

AU 2005256796 A1 * 1/2006 ............... F16K 7/06
AU 2017101425 A4 11/2017

(Continued)

OTHER PUBLICATIONS

Office Action received for Australian Patent Application No. 2020202953, dated Mar. 29, 2021, 4 pages.

(Continued)

*Primary Examiner* — Scott C Anderson

(74) *Attorney, Agent, or Firm* — Dentons US LLP

(57) ABSTRACT

The present disclosure generally relates to user interfaces for managing peer-to-peer transfers. In some examples, a device provides user interfaces for initiating and managing transfers. In some examples, a device provides user interfaces corresponding to completed transfers. In some examples, a device provides user interfaces for providing visually distinguishable message object appearances based on message designation. In some examples, a device provides user interfaces for activating accounts for accepting and sending transfers. In some examples, a device provides user interfaces for exchanging accounts for use in a transfer. In some examples, a device provides user interfaces for splitting transfers between two or more accounts. In some examples, a device provides user interfaces for generating and displaying a transfers history list. In some examples, a device provides user interfaces for voice-activation of transfers. In some examples, a device provides visual or haptic feedback corresponding to a transfer operation.

45 Claims, 468 Drawing Sheets

Related U.S. Application Data

(60) Provisional application No. 62/672,003, filed on May 15, 2018, provisional application No. 62/566,225, filed on Sep. 29, 2017, provisional application No. 62/514,945, filed on Jun. 4, 2017, provisional application No. 62/507,161, filed on May 16, 2017.

(51) Int. Cl.
*G06F 3/16* (2006.01)
*H04L 29/08* (2006.01)
*G06Q 20/32* (2012.01)

(52) U.S. Cl.
CPC ....... *G06Q 20/322* (2013.01); *H04L 67/1078* (2013.01); *H04L 67/06* (2013.01); *H04L 67/104* (2013.01)

(56) References Cited

U.S. PATENT DOCUMENTS 5,802,208 A 9/1998 Podilchuk et al.
6,076,928 A 6/2000 Fateh et al.
6,212,548 B1 4/2001 Desimone et al.
6,256,129 B1 7/2001 Kim et al.
6,612,928 B1 9/2003 Bradford et al.
6,822,769 B1 11/2004 Drinkwater et al.
6,957,339 B2 10/2005 Shinzaki et al.
6,993,489 B1 1/2006 Miglautsch
7,496,527 B2 2/2009 Silverstein et al.
7,529,563 B1 5/2009 Pitroda
7,630,937 B1 12/2009 Mo et al.
7,664,638 B2 2/2010 Cooper et al.
7,783,564 B2 8/2010 Mullen et al.
7,784,684 B2 8/2010 Labrou et al.
7,818,399 B1 10/2010 Ross, Jr. et al.
8,180,705 B2 5/2012 Kowalchyk et al.
8,827,153 B1 9/2014 Rhoades et al.
8,924,259 B2 12/2014 Neighman et al.
8,959,360 B1 2/2015 Barra
9,117,242 B1* 8/2015 Ellis ...................... G06Q 40/00
9,123,272 B1 9/2015 Baldwin et al.
9,189,778 B1 11/2015 Sh. Al-Rashidi
9,305,310 B2 4/2016 Radhakrishnan et al.
9,509,686 B2 11/2016 Anantha et al.
9,767,329 B2 9/2017 Forster
9,779,585 B2 10/2017 Dupuis et al.
9,825,934 B1 11/2017 Alexander
9,842,330 B1 12/2017 Van Os et al.
9,923,930 B2 3/2018 Zhang et al.
10,032,100 B2 7/2018 Mullen et al.
10,095,276 B2 10/2018 Faith et al.
10,223,631 B2 3/2019 Mullen et al.
10,223,743 B2 3/2019 Walker et al.
10,255,545 B2 4/2019 Mullen et al.
10,296,889 B2 5/2019 Lin et al.
10,319,203 B1 6/2019 Testanero et al.
10,783,576 B1 9/2020 Van Os et al.
2003/0110097 A1 6/2003 Lei et al.
2003/0169881 A1 9/2003 Niedermeyer
2004/0006479 A1 1/2004 Tanaka
2004/0061913 A1 4/2004 Takiguchi et al.
2004/0143547 A1 7/2004 Mersky et al.
2004/0225609 A1 11/2004 Greene
2005/0043996 A1 2/2005 Silver et al.
2005/0131816 A1 6/2005 Britto et al.
2005/0193054 A1 9/2005 Wilson et al.
2005/0210394 A1 9/2005 Crandall et al.
2005/0219223 A1 10/2005 Kotzin et al.
2005/0244059 A1 11/2005 Turski
2005/0261968 A1 11/2005 Randall et al.
2006/0053079 A1 3/2006 Edmonson et al.
2006/0149546 A1* 7/2006 Runge ..................... G10L 13/00
704/246
2006/0229984 A1 10/2006 Miyuki et al.
2006/0235795 A1 10/2006 Johnson et al.
2006/0235796 A1 10/2006 Johnson et al.
2007/0125838 A1 6/2007 Law et al.
2007/0203836 A1 8/2007 Dodin
2007/0254712 A1 11/2007 Chitti
2007/0255662 A1 11/2007 Tumminaro
2008/0004964 A1 1/2008 Messa et al.
2008/0010215 A1 1/2008 Rackley Lii et al.
2008/0011825 A1 1/2008 Giordano et al.
2008/0041936 A1 2/2008 Vawter
2008/0052091 A1 2/2008 Vawter et al.
2008/0059323 A1 3/2008 Chang et al.
2008/0147561 A1 6/2008 Euchner et al.
2008/0167988 A1 7/2008 Sun et al.
2008/0208681 A1 8/2008 Hammad et al.
2008/0208742 A1 8/2008 Arthur et al.
2008/0208743 A1 8/2008 Arthur et al.
2008/0231429 A1* 9/2008 Leonard ................ G16H 10/60
340/146.2
2009/0005011 A1 1/2009 Christie et al.
2009/0006217 A1 1/2009 Smith
2009/0037286 A1 2/2009 Foster et al.
2009/0048959 A1 2/2009 Omura et al.
2009/0050687 A1 2/2009 Kon et al.
2009/0089193 A1 4/2009 Paintin et al.
2009/0094134 A1 4/2009 Toomer et al.
2009/0099961 A1 4/2009 Ogilvy et al.
2009/0106160 A1 4/2009 Skowronek
2009/0119678 A1 5/2009 Shih et al.
2009/0182634 A1 7/2009 Park et al.
2009/0192911 A1 7/2009 Graf
2009/0192937 A1 7/2009 Griffin et al.
2009/0227296 A1 9/2009 Kim
2010/0001980 A1 1/2010 Kim et al.
2010/0008535 A1 1/2010 Abulafia et al.
2010/0023449 A1 1/2010 Skowronek et al.
2010/0049619 A1 2/2010 Beck
2010/0051689 A1 3/2010 Diamond et al.
2010/0057624 A1 3/2010 Hurt et al.
2010/0064259 A1 3/2010 Alexanderovitc et al.
2010/0078471 A1 4/2010 Lin et al.
2010/0078472 A1 4/2010 Lin et al.
2010/0082481 A1 4/2010 Lin et al.
2010/0174647 A1 7/2010 Kowalchyk et al.
2010/0217808 A1 8/2010 Benninger
2011/0166992 A1 7/2011 Dessert et al.
2011/0179126 A1* 7/2011 Wetherell ................ H04L 51/36
709/206
2011/0282697 A1 11/2011 Fitzgerald et al.
2012/0036433 A1 2/2012 Zimmer et al.
2012/0078788 A1 3/2012 Gandhi
2012/0095918 A1 4/2012 Jurss
2012/0110456 A1 5/2012 Larco et al.
2012/0136781 A1 5/2012 Fridman et al.
2012/0150750 A1 6/2012 Law et al.
2012/0197740 A1 8/2012 Grigg et al.
2012/0197743 A1 8/2012 Grigg et al.
2012/0203605 A1 8/2012 Morgan et al.
2012/0209748 A1 8/2012 Small
2012/0245941 A1 9/2012 Cheyer
2012/0245986 A1 9/2012 Regan et al.
2012/0290472 A1 11/2012 Mullen et al.
2012/0330830 A1 12/2012 Mason et al.
2013/0006848 A1 1/2013 Kuttuva
2013/0019204 A1 1/2013 Kotler et al.
2013/0024364 A1 1/2013 Shrivastava et al.
2013/0024371 A1 1/2013 Hariramani et al.
2013/0091443 A1 4/2013 Park et al.
2013/0144706 A1 6/2013 Qawami et al.
2013/0151360 A1 6/2013 Scipioni et al.
2013/0151636 A1 6/2013 Majeti et al.
2013/0159178 A1 6/2013 Colon et al.
2013/0200146 A1 8/2013 Moghadam et al.
2013/0218721 A1 8/2013 Borhan et al.
2013/0246954 A1 9/2013 Gray et al.
2013/0275300 A1 10/2013 Killian et al.
2013/0332826 A1 12/2013 Karunamuni et al.
2014/0019352 A1 1/2014 Shrivastava
2014/0020068 A1 1/2014 Desai et al.

(56) References Cited

U.S. PATENT DOCUMENTS

2014/0043547 A1* 2/2014 Marhefka .............. G06F 3/038 349/12
2014/0052794 A1 2/2014 Tucker et al.
2014/0067654 A1 3/2014 Hanson et al.
2014/0095225 A1 4/2014 Williams et al.
2014/0122331 A1 5/2014 Vaish et al.
2014/0138435 A1 5/2014 Khalid
2014/0181747 A1 6/2014 Son
2014/0207659 A1 7/2014 Erez et al.
2014/0207679 A1 7/2014 Cho
2014/0207680 A1 7/2014 Rephlo
2014/0215361 A1 7/2014 Hwang et al.
2014/0236840 A1 8/2014 Islam
2014/0244495 A1 8/2014 Davis et al.
2014/0279474 A1 9/2014 Evans et al.
2014/0279530 A1 9/2014 Douglas et al.
2014/0279543 A1 9/2014 Ruhrig
2014/0359456 A1* 12/2014 Thiele ..................... H04W 4/18 715/735
2014/0372920 A1 12/2014 Choi et al.
2014/0379341 A1 12/2014 Seo et al.
2015/0003595 A1* 1/2015 Yaghi .................. H04M 3/5175 379/85
2015/0005039 A1 1/2015 Liu et al.
2015/0044964 A1 2/2015 Khan et al.
2015/0046989 A1 2/2015 Oberheide et al.
2015/0098309 A1 4/2015 Adams et al.
2015/0115028 A1 4/2015 Montealegre
2015/0127550 A1 5/2015 Khan
2015/0178878 A1 6/2015 Huang
2015/0213560 A1 7/2015 Aabye et al.
2015/0227922 A1 8/2015 Filler
2015/0264111 A1 9/2015 Aleksandrov
2015/0278814 A1 10/2015 Jaffe
2015/0302493 A1 10/2015 Batstone et al.
2015/0302510 A1 10/2015 Godsey et al.
2015/0340025 A1 11/2015 Shima
2015/0348001 A1 12/2015 Van Os et al.
2015/0348002 A1 12/2015 Van Os et al.
2015/0358207 A1 12/2015 Baldock et al.
2016/0005028 A1 1/2016 Mayblum et al.
2016/0011768 A1 1/2016 Yim et al.
2016/0055487 A1 2/2016 Votaw et al.
2016/0080525 A1 3/2016 Ward
2016/0086166 A1 3/2016 Pomeroy et al.
2016/0104159 A1 4/2016 Butterfield et al.
2016/0104228 A1 4/2016 Sundaresan
2016/0117670 A1 4/2016 Davis
2016/0156574 A1 6/2016 Hum et al.
2016/0171481 A1 6/2016 Mcelmurry et al.
2016/0180316 A1 6/2016 Wang et al.
2016/0180325 A1 6/2016 Davis et al.
2016/0180578 A1 6/2016 Vegesna
2016/0189717 A1 6/2016 Kannan et al.
2016/0203483 A1 7/2016 Bridgewater et al.
2016/0210623 A1 7/2016 Voege
2016/0225371 A1* 8/2016 Agrawal .............. G06F 3/0488
2016/0232516 A1 8/2016 Dayan et al.
2016/0260031 A1* 9/2016 Pace ................. G06Q 20/1235
2016/0267447 A1 9/2016 Davis et al.
2016/0275475 A1 9/2016 Lin et al.
2016/0277342 A1 9/2016 Shi
2016/0352667 A1 12/2016 Pickett et al.
2016/0358167 A1 12/2016 Van Os et al.
2016/0364715 A1 12/2016 Cho et al.
2016/0378186 A1 12/2016 Kim
2017/0004484 A1 1/2017 Seol et al.
2017/0017958 A1 1/2017 Scott et al.
2017/0046111 A1 2/2017 Chu et al.
2017/0061405 A1 3/2017 Bryant
2017/0091745 A1 3/2017 Castinado et al.
2017/0123498 A1 5/2017 Dillon et al.
2017/0180813 A1* 6/2017 Kang .............. H04N 21/44222
2017/0193501 A1 7/2017 Cole et al.
2017/0228704 A1 8/2017 Zhou et al.
2017/0235936 A1 8/2017 De Los Rios et al.
2017/0237692 A1 8/2017 Sheth et al.
2017/0339347 A1 11/2017 Cho et al.
2017/0344526 A1 11/2017 Smith et al.
2017/0357443 A1* 12/2017 Paek .................... G06F 3/0482
2017/0357972 A1 12/2017 Van Os et al.
2018/0053157 A1 2/2018 Roffey
2018/0053169 A1 2/2018 James
2018/0068313 A1 3/2018 Van Os et al.
2018/0082282 A1 3/2018 Van Os et al.
2018/0082285 A1 3/2018 Prabhakar et al.
2018/0107372 A1 4/2018 Van Damme et al.
2018/0109482 A1 4/2018 Deluca et al.
2018/0157395 A1 6/2018 Mhun et al.
2018/0218359 A1 8/2018 Kim et al.
2018/0240086 A1 8/2018 Sobotka
2018/0300101 A1 10/2018 Liu et al.
2018/0335928 A1 11/2018 Van Os et al.
2018/0336543 A1 11/2018 Van Os et al.
2019/0095883 A1 3/2019 Robinson et al.
2019/0149539 A1 5/2019 Scruby
2019/0266587 A1 8/2019 Lin et al.
2019/0370781 A1 12/2019 Van Os et al.
2019/0370805 A1 12/2019 Van Os et al.
2020/0143353 A1 5/2020 Van Os et al.
2020/0184472 A1 6/2020 Van Os et al.
2020/0302517 A1 9/2020 Van Os et al.
2020/0302519 A1 9/2020 Van Os et al.
2021/0004897 A1 1/2021 Van Os et al.
2021/0125173 A1 4/2021 Van Os et al.
2021/0201288 A1 7/2021 Van Os et al.
2021/0272092 A1 9/2021 Van Os et al.

FOREIGN PATENT DOCUMENTS

CN 102541438 A 7/2012
CN 105320864 A 2/2016
CN 105787718 A 7/2016
CN 105844468 A 8/2016
EP 2980741 A1 2/2016
EP 3062271 A1 8/2016
EP 3096275 A1 11/2016
EP 3047622 B1 8/2017
EP 3349400 A1 7/2018
EP 3605423 A1 2/2020
GB 2528948 A 2/2016
JP 2003-67210 A 3/2003
JP 2004-37998 A 2/2004
JP 2007-226794 A 9/2007
JP 2011-503711 A 1/2011
JP 2013-157959 A 8/2013
JP 2013-229656 A 11/2013
JP 2014-517366 A 7/2014
JP 2014-520296 A 8/2014
JP 2015-534664 A 12/2015
JP 2016-53766 A 4/2016
JP 2016-71655 A 5/2016
JP 2017-41098 A 2/2017
JP 2018-506103 A 3/2018
JP 2018-524679 A 8/2018
KR 2002-0052156 A 7/2002
KR 10-2004-0027236 A 4/2004
KR 10-0475654 B1 3/2005
KR 10-2007-0013048 A 1/2007
KR 10-2014-0131093 A 11/2014
KR 10-2014-0139982 A 12/2014
KR 10-2016-0054573 A 5/2016
KR 10-2016-0076201 A 6/2016
KR 10-2016-0099397 A 8/2016
KR 10-2016-0105279 A 9/2016
KR 10-2017-0011784 A 2/2017
KR 10-2018-0051556 A 5/2018
WO 2010/077960 A2 7/2010
WO 2011/037134 A1 3/2011
WO 2012/129231 A1 9/2012
WO 2013/023224 A2 2/2013
WO 2014/033939 A1 3/2014
WO WO-2014172757 A1 * 10/2014 ......... G06Q 30/0268
WO 2015/057320 A1 4/2015

(56) References Cited

FOREIGN PATENT DOCUMENTS

| | | |
|---|---|---|
| WO | 2015/187608 A1 | 12/2015 |
| WO | 2016/032534 A1 | 3/2016 |
| WO | 2016/126775 A1 | 8/2016 |
| WO | 2016/129938 A1 | 8/2016 |
| WO | 2017/030642 A1 | 2/2017 |
| WO | 2017/041641 A1 | 3/2017 |
| WO | 2017/072589 A2 | 5/2017 |
| WO | 2017/078792 A1 | 5/2017 |

OTHER PUBLICATIONS

Non-Final Office Action received for U.S. Appl. No. 16/581,614, dated Feb. 4, 2021, 18 pages.
Notice of Allowance received for Korean Patent Application No. 10-2020-7025711, dated Jan. 19, 2021, 6 pages (2 pages of English Translation and 4 pages of Official Copy).
Office Action received for Australian Patent Application No. 2017324176, dated Jan. 14, 2021, 6 pages.
Use NFC with Screen Off or in Lock Screen on Galaxy Nexus, Available online at https://www.xda-developers.com/use-nfc-with-screen-off-or-in-lock-screen-on-galaxy-nexus/, Jun. 14, 2012, 4 pages.
Decision to Grant received for Danish Patent Application No. PA201770502, dated Feb. 25, 2021, 2 pages.
European Search Report received for European Patent Application No. 20204436.8, dated Mar. 9, 2021, 5 pages.
Final Office Action received for U.S. Appl. No. 15/884,195, dated Feb. 22, 2021, 26 pages.
Hartl et al., "Efficient Verification of Holograms Using Mobile Augmented Reality", IEEE Transactions on Visualization and Computer Graphics, vol. 22, No. 7, Online available at: https://arbook.icg.tugraz.at/schmalstieg/Schmalstieg_302.pdf, 2015, 9 pages.
Non-Final Office Action received for U.S. Appl. No. 16/549,862, dated Mar. 8, 2021, 23 pages.
Notice of Allowance received for U.S. Appl. No. 15/823,269, dated Feb. 22, 2021, 7 pages.
Notice of Allowance received for U.S. Appl. No. 15/823,269, dated Mar. 10, 2021, 6 pages.
Notice of Allowance received for U.S. Appl. No. 16/152,139, dated Feb. 23, 2021, 9 pages.
Notice of Allowance received for U.S. Appl. No. 16/736,704, dated Feb. 23, 2021, 11 pages.
Office Action received for Australian Patent Application No. 2017324176, dated Feb. 25, 2021, 6 pages.
Applicant-Initiated Interview Summary received for U.S. Appl. No. 16/413,402, dated Mar. 29, 2021, 4 pages.
Notice of Allowance received for U.S. Appl. No. 15/823,269, dated Mar. 31, 2021, 9 pages.
Office Action received for European Patent Application No. 17810682.9, dated Mar. 26, 2021, 8 pages.
Office Action received for European Patent Application No. 20204436.8, dated Mar. 22, 2021, 10 pages.
Advisory Action received for U.S. Appl. No. 16/581,614, dated Sep. 11, 2020, 8 pages.
Applicant Initiated Interview Summary received for U.S. Appl. No. 15/823,269, dated Sep. 17, 2020, 3 pages.
Applicant Initiated Interview Summary received for U.S. Appl. No. 16/581,614, dated Apr. 30, 2020, 4 pages.
Applicant Initiated Interview Summary received for U.S. Appl. No. 16/581,614, dated Aug. 26, 2020, 3 pages.
Applicant Initiated Interview Summary received for U.S. Appl. No. 16/736,704, dated Aug. 27, 2020, 5 pages.
Applicant-Initiated Interview Summary received for U.S. Appl. No. 15/274,910, dated Jul. 9, 2020, 3 pages.
Applicant-Initiated Interview Summary received for U.S. Appl. No. 16/152,139, dated Aug. 10, 2020, 3 pages.
Applicant-Initiated Interview Summary received for U.S. Appl. No. 16/428,875, dated Oct. 20, 2020, 6 pages.
Applicant-Initiated Interview Summary received for U.S. Appl. No. 16/581,569, dated May 1, 2020, 3 pages.
Certificate of Examination received for Australian Patent Application No. 2020100388, dated Sep. 28, 2020, 2 pages.
Extended European Search Report received for European Patent Application No. 17835789.3, dated Jun. 23, 2020, 12 pages.
Final Office Action received for U.S. Appl. No. 15/274,910, dated Oct. 16, 2020, 34 pages.
Final Office Action received for U.S. Appl. No. 15/884,195, dated Sep. 29, 2020, 20 pages.
Final Office Action received for U.S. Appl. No. 16/581,614, dated Jul. 10, 2020, 21 pages.
Final Office Action received for U.S. Appl. No. 16/736,704, dated Oct. 13, 2020, 62 pages.
Intention to Grant received for Danish Patent Application No. PA201770502, dated Oct. 6, 2020, 2 pages.
International Search Report and Written Opinion received for PCT Patent Application No. PCT/US2020/020414, dated Jul. 27, 2020, 27 pages.
Invitation to Pay Additional Fees received for PCT Patent Application No. PCT/US2020/020414, dated Jun. 4, 2020, 24 pages.
Non-Final Office Action received for U.S. Appl. No. 15/823,269, dated Jun. 23, 2020, 14 pages.
Non-Final Office Action received for U.S. Appl. No. 16/152,139, dated May 20, 2020, 9 pages.
Non-Final Office Action received for U.S. Appl. No. 16/428,875, dated Jul. 28, 2020, 30 pages.
Non-Final Office Action received for U.S. Appl. No. 16/581,569, dated Feb. 13, 2020, 32 pages.
Non-Final Office Action received for U.S. Appl. No. 16/581,614, dated Jan. 29, 2020, 13 pages.
Notice of Allowance received for Japanese Patent Application No. 2018-158482, dated Sep. 7, 2020, 4 pages (1 page of English Translation and 3 pages of Official Copy).
Notice of Allowance received for U.S. Appl. No. 16/581,569, dated May 27, 2020, 43 pages.
Office Action received for Australian Patent Application No. 2017324176, dated Aug. 17, 2020, 5 pages.
Office Action received for Australian Patent Application No. 2020100388, dated May 7, 2020, 5 pages.
Office Action received for Japanese Patent Application No. 2019-572834, dated Jul. 17, 2020, 13 pages (7 pages of English Translation and 6 pages of Official Copy).
Office Action received for Korean Patent Application No. 10-2020-7025711, dated Sep. 11, 2020, 12 pages (5 pages of English Translation and 7 pages of Official Copy).
Pfaffenberger, Bryan, "Webster's New World Computer Dictionary", 10th Edition, Wiley Publishing, Inc., 2003, 3 pages.
Teather, Robert J, Et Al., "Assessing the Effects of Orientation and Device on (Constrained) 3D Movement Techniques", IEEE Symposium on 3D User Interfaces. Reno, Nevada, USA., Mar. 8-9, 2008, 8 pages.
Tewari, et al., "Multiparty Micropayments for Ad Hoc Networks", IEEE, 2003, pp. 2033-2040.
Advisory Action received for U.S. Appl. No. 12/286,410, dated Jun. 25, 2012, 2 pages.
Advisory Action received for U.S. Appl. No. 15/274,910, dated Aug. 12, 2019, 3 pages.
Applicant Initiated Interview Summary received for U.S. Appl. No. 15/351,230, dated Nov. 22, 2019, 5 pages.
Applicant Initiated Interview Summary received for U.S. Appl. No. 15/884,195, dated Apr. 28, 2020, 5 pages.
Applicant Initiated Interview Summary received for U.S. Appl. No. 15/981,817, dated Apr. 22, 2020, 5 pages.
Balaban, Dan, "The Brave New World Of Contactless Mobile Credit", Nov. 2005, Iss. 11 p. 20, 6 pages.
Bernier, Patrick, "FeliCa", Wikipedia, Jan. 1, 2007, 3 pages.
Bernier, Patrickl, "File:Sony PaSoRi RC-S320.jpeg", Online Available at <http://en.wikipedia.org/wiki/File:Sony_PaSoRi_RCS320.jpeg>, Jan. 1, 2007, 4 pages.
Certificate of Examination received for Australian Patent Application No. 2019100592, dated Feb. 6, 2020, 2 pages.
Decision to Grant received for Danish Patent Application No. PA201770503, dated Feb. 14, 2020, 2 pages.

(56) References Cited

OTHER PUBLICATIONS

Extended European Search Report (includes Supplementary European Search Report and Search Opinion) received for European Patent Application No. 09818165.4, dated Jun. 22, 2012, 5 pages.
Extended European Search Report received for European Patent Application No. 17810682.9, dated Mar. 26, 2019, 7 pages.
Final Office Action received for U.S. Appl. No. 12/286,410, dated Apr. 9, 2012, 15 pages.
Final Office Action received for U.S. Appl. No. 12/286,410, dated Jun. 12, 2014, 16 pages.
Final Office Action received for U.S. Appl. No. 12/286,488, dated Aug. 23, 2018, 30 pages.
Final Office Action received for U.S. Appl. No. 12/286,488, dated Jun. 6, 2011, 28 pages.
Final Office Action received for U.S. Appl. No. 12/286,488, dated Mar. 10, 2015, 16 pages.
Final Office Action received for U.S. Appl. No. 12/286,494, dated Dec. 27, 2013, 21 pages.
Final Office Action received for U.S. Appl. No. 12/286,494, dated Feb. 3, 2016, 19 pages.
Final Office Action received for U.S. Appl. No. 12/286,494, dated Mar. 9, 2012, 20 pages.
Final Office Action received for U.S. Appl. No. 15/274,910, dated May 31, 2019, 31 pages.
Final Office Action received for U.S. Appl. No. 15/351,230, dated Nov. 4, 2019, 6 pages.
Handheld, MacMillian Publishers, Online Available at <http://www.macmillandictionary.com/dictionary/american/handheld>, retrieved on May 27, 2011, 1 page.
Intention to Grant received for Danish Patent Application No. PA201770503, dated Nov. 11, 2019, 2 pages.
International Preliminary Report on Patentability received for PCT Patent Application No. PCT/US2009/053441, dated Apr. 14, 2011, 6 pages.
International Preliminary Report on Patentability received for PCT Patent Application No. PCT/US2017/031748, dated Dec. 20, 2018, 10 pages.
International Preliminary Report on Patentability received for PCT Patent Application No. PCT/US2017/49500, dated Mar. 21, 2019, 14 pages.
International Preliminary Report on Patentability received for PCT Patent Application No. PCT/US2018/033054, dated Nov. 28, 2019, 21 pages.
International Search Report and Written Opinion received for PCT Patent Application No. PCT/US2018/033054, dated Oct. 30, 2018, 32 pages.
International Search Report and Written Opinion received for PCT Patent Application No. PCT/US2009/053441, dated May 25, 2010, 7 pages.
International Search Report and Written Opinion received for PCT Patent Application No. PCT/US2017/031748, dated Aug. 29, 2017, 14 pages.
International Search Report and Written Opinion received for PCT Patent Application No. PCT/US2017/49500, dated Jan. 18, 2018, 18 pages.
International Search Report and Written Opinion received for PCT Patent Application No. PCT/US2019/024702, dated Sep. 13, 2019, 17 pages.
International Search Report and Written Opinion received for PCT Patent Application No. PCT/US2019/035064, dated Aug. 9, 2019, 12 pages.
Invitation to Pay Additional Fee received for PCT Patent Application No. PCT/US2017/031748, dated Jun. 21, 2017, 2 pages.
Invitation to Pay Additional Fee received for PCT Patent Application No. PCT/US2017/49500, dated Nov. 14, 2017, 3 pages.
Invitation to Pay Additional Fees received for PCT Patent Application No. PCT/US2018/033054, dated Sep. 4, 2018, 25 pages.
Invitation to Pay Additional Fees received for PCT Patent Application No. PCT/US2019/024702, dated Jul. 22, 2019, 11 pages.
Invitation to Pay Search Fees received for European Patent Application No. 18730556.0, dated Mar. 2, 2020, 3 pages.
Nomad Studio, "Hajimete-no-smartphone-no-komatta-no-sakutto-kaiketsu (Easy solution to troubles at your first smartphone)", Kazukuni Saito of Shuwa System Co. Ltd. 1st Ed, Jul. 1, 2016, 20 pages.
Non-Final Office Action received for U.S. Appl. No. 15/274,910, dated Oct. 18, 2018, 26 pages.
Non-Final Office Action received for U.S. Appl. No. 12/286,410, dated Dec. 11, 2012, 17 pages.
Non-Final Office Action received for U.S. Appl. No. 12/286,410, dated May 15, 2013, 15 pages.
Non-Final Office Action received for U.S. Appl. No. 12/286,410, dated Oct. 11, 2013, 17 pages.
Non-Final Office Action received for U.S. Appl. No. 12/286,410, dated Oct. 27, 2011, 12 pages.
Non-Final Office Action received for U.S. Appl. No. 12/286,488, dated Apr. 25, 2014, 29 pages.
Non-Final Office Action received for U.S. Appl. No. 12/286,488, dated Feb. 9, 2018, 21 pages.
Non-Final Office Action received for U.S. Appl. No. 12/286,488, dated Jan. 26, 2011, 20 pages.
Non-Final Office Action received for U.S. Appl. No. 12/286,488, dated Nov. 12, 2014, 9 pages.
Non-Final Office Action received for U.S. Appl. No. 12/286,494, dated Aug. 20, 2015, 16 pages.
Non-Final Office Action received for U.S. Appl. No. 12/286,494, dated Jan. 9, 2015, 13 pages.
Non-Final Office Action received for U.S. Appl. No. 12/286,494, dated Jul. 29, 2013, 21 pages.
Non-Final Office Action received for U.S. Appl. No. 12/286,494, dated Jun. 3, 2014, 13 pages.
Non-Final Office Action received for U.S. Appl. No. 12/286,494, dated Sep. 13, 2011, 17 pages.
Non-Final Office Action received for U.S. Appl. No. 15/145,633, dated Jun. 14, 2018, 19 pages.
Non-Final Office Action received for U.S. Appl. No. 15/274,086, dated Jan. 11, 2017, 21 pages.
Non-Final Office Action received for U.S. Appl. No. 15/274,910, dated Apr. 6, 2020, 33 pages.
Non-Final Office Action received for U.S. Appl. No. 15/351,230, dated Apr. 18, 2019, 16 pages.
Non-Final Office Action received for U.S. Appl. No. 15/884,195, dated Feb. 27, 2020, 18 pages.
Non-Final Office Action received for U.S. Appl. No. 15/981,817, dated Jan. 2, 2020, 31 pages.
Non-Final Office Action received for U.S. Appl. No. 16/736,704, dated May 1, 2020, 41 pages.
Notice from the European Patent Office dated Oct. 1, 2007 Concerning Business Methods, Official Journal EPO, available online at <http://archive.epo.org/epo/pubs/oj007/11_07/11_5927.pdf>, Nov. 2007, pp. 592-593.
Notice of Acceptance received for Australian Patent Application No. 2018269512, dated Jan. 28, 2020, 3 pages.
Notice of Allowance received for Japanese Patent Application No. 2018-504997, dated Aug. 3, 2018, 4 pages.
Notice of Allowance received for Korean Patent Application No. 10-2019-7033768, dated Jun. 3, 2020, 6 pages.
Notice of Allowance received for U.S. Appl. No. 12/286,488, dated Jun. 12, 2019, 17 pages.
Notice of Allowance received for U.S. Appl. No. 15/145,633, dated Jan. 8, 2019, 14 pages.
Notice of Allowance received for U.S. Appl. No. 15/274,086, dated Jun. 7, 2017, 8 pages.
Notice of Allowance received for U.S. Appl. No. 15/274,086, dated Oct. 19, 2017, 9 pages.
Notice of Allowance received for U.S. Appl. No. 15/351,230, dated Dec. 11, 2019, 11 pages.
Notice of Allowance received for U.S. Appl. No. 15/981,817, dated May 28, 2020, 16 pages.
Office Action received for Australian Patent Application No. 2017100558, dated Feb. 27, 2018, 3 pages.

(56) References Cited

OTHER PUBLICATIONS

Office Action received for Australian Patent Application No. 2017100558, dated Sep. 1, 2017, 5 pages.
Office Action received for Australian Patent Application No. 2017324176, dated Apr. 21, 2020, 3 pages.
Office Action received for Australian Patent Application No. 2017324176, dated Feb. 27, 2020, 3 pages.
Office Action received for Australian Patent Application No. 2019100592, dated Aug. 21, 2019, 4 pages.
Office Action received for Australian Patent Application No. 2019100592, dated Nov. 25, 2019, 3 pages.
Office Action received for Chinese Patent Application No. 201780002648.4, dated Dec. 5, 2018, 13 pages.
Office Action received for Chinese Patent Application No. 201780002648.4, dated Jun. 12, 2019, 11 pages.
Office Action received for Chinese Patent Application No. 201780002648.4, dated Nov. 26, 2019, 10 pages.
Office Action received for Danish Patent Application No. PA201770502, dated Dec. 14, 2018, 7 pages.
Office Action received for Danish Patent Application No. PA201770502, dated Jan. 20, 2020, 2 pages.
Office Action received for Danish Patent Application No. PA201770502, dated May 7, 2020, 5 pages.
Office Action received for Danish Patent Application No. PA201770502, dated Sep. 9, 2019, 2 pages.
Office Action received for Danish Patent Application No. PA201770503, dated Dec. 19, 2018, 6 pages.
Office Action received for Danish Patent Application No. PA201770503, dated Nov. 24, 2017, 10 pages.
Office Action received for Danish Patent Application No. PA201770503, dated Sep. 20, 2019, 5 pages.
Office Action received for Danish Patent Application No. PA201770505, dated Jan. 17, 2020, 7 pages.
Office Action received for Danish Patent Application No. PA201770505, dated Jul. 27, 2018, 4 pages.
Office Action received for Danish Patent Application No. PA201770505, dated May 20, 2019, 7 pages.
Office Action received for Danish Patent Application No. PA201770505, dated Sep. 19, 2017, 10 pages.
Office Action received for European Patent Application No. 09818165.4, dated Aug. 3, 2016, 7 pages.
Office Action received for European Patent Application No. 18730556.0, dated Jun. 23, 2020, 11 pages.
Office Action received for Japanese Patent Application No. 2018-158482, dated Jan. 10, 2020, 9 pages.
Office Action received for Korean Patent Application No. 10-2019-7033768, dated Mar. 13, 2020, 6 pages.
"Quicken 2003 for MAC User Guide", 2002, 47 pages.
Search Report and Opinion received for Danish Patent Application No. PA201770502, dated Nov. 10, 2017, 10 pages.
Office Action received for Chinese Patent Application No. 202010174749.3, dated Nov. 6, 2020, 9 pages (3 pages of English Translation and 6 pages of Official Copy).
Office Action received for Korean Patent Application No. 10-2019-7006639, dated Dec. 21, 2020, 20 pages (10 pages of English Translation and 10 pages of Official Copy).
Final Office Action received for U.S. Appl. No. 16/152,139, dated Nov. 20, 2020, 9 pages.
Notice of Allowance received for U.S. Appl. No. 16/428,875, dated Dec. 2, 2020, 11 pages.
Applicant Initiated Interview Summary received for U.S. Appl. No. 16/581,614, dated May 18, 2021, 2 pages.
Final Office Action received for U.S. Appl. No. 16/413,402, dated May 18, 2021, 17 pages.
Non-Final Office Action received for U.S. Appl. No. 15/884,195, dated May 18, 2021, 26 pages.
Office Action received for Korean Patent Application No. 10-2021-7011434, dated Apr. 28, 2021, 6 pages (2 pages of English Translation and 4 pages of Official Copy).
Applicant-Initiated Interview Summary received for U.S. Appl. No. 16/152,139, dated Jan. 13, 2021, 3 pages.
Non-Final Office Action received for U.S. Appl. No. 16/413,402, dated Jan. 21, 2021, 14 pages.
Office Action received for European Patent Application No. 17835789.3, dated Jan. 20, 2021, 14 pages.
Office Action received for Japanese Patent Application No. 2019-572834, dated Dec. 4, 2020, 7 pages (3 pages of English Translation and 4 pages of Official Copy).
Applicant Initiated Interview Summary received for U.S. Appl. No. 15/884,195, dated Dec. 17, 2020, 3 pages.
Applicant-Initiated Interview Summary received for U.S. Appl. No. 16/736,704, dated Dec. 11, 2020, 4 pages.
International Preliminary Report on Patentability received for PCT Patent Application No. PCT/US2019/024702, dated Dec. 17, 2020, 12 pages.
International Preliminary Report on Patentability received for PCT Patent Application No. PCT/US2019/035064, dated Dec. 17, 2020, 9 pages.
Notice of Allowance received for U.S. Appl. No. 15/823,269, dated Dec. 10, 2020, 10 pages.
Office Action received for European Patent Application No. 18730556.0, dated Dec. 16, 2020, 7 pages.
Applicant-Initiated Interview Summary received for U.S. Appl. No. 16/549,862, dated May 21, 2021, 2 pages.
Notice of Allowance received for U.S. Appl. No. 15/823,269, dated Jun. 3, 2021, 6 pages.
Notice of Allowance received for U.S. Appl. No. 16/152,139, dated May 26, 2021, 7 pages.
Final Office Action received for U.S. Appl. No. 16/581,614, dated Aug. 27, 2021, 18 pages.
Notice of Allowance received for U.S. Appl. No. 16/549,862, dated Aug. 26, 2021, 2 pages.
Office Action received for Danish Patent Application No. PA201770505, dated Aug. 18, 2021, 2 pages.
Office Action received for Chinese Patent Application No. 202010174749.3, dated Jun. 2, 2021, 19 pages (10 pages of English Translation and 9 pages of Official Copy).
Office Action received for Australian Patent Application No. 2019281961, dated Jun. 16, 2021, 2 pages.
Office Action received for Chinese Patent Application No. 202011206499.3, dated May 21, 2021, 20 pages (10 pages of English Translation and 10 pages of Official Copy).
Office Action received for Japanese Patent Application No. 2019-572834, dated Jun. 7, 2021, 5 pages (2 pages of English Translation and 3 pages of Official Copy).
Office Action received for Korean Patent Application No. 10-2019-7006639, dated Jun. 15, 2021, 8 pages (4 pages of English Translation and 4 pages of Official Copy).
Applicant Initiated Interview Summary received for U.S. Appl. No. 15/884,195, dated Aug. 17, 2021, 4 pages.
Non-Final Office Action received for U.S. Appl. No. 16/789,132, dated Aug. 5, 2021, 25 pages.
Notice of Allowance received for Korean Patent Application No. 10-2021-7011434, dated Jul. 29, 2021, 5 pages (2 pages of English Translation and 3 pages of Official Copy).
Notice of Allowance received for U.S. Appl. No. 16/549,862, dated Aug. 13, 2021, 7 pages.
Notice of Acceptance received for Australian Patent Application No. 2020202953, dated Oct. 1, 2021, 3 pages.
Notice of Allowance received for Chinese Patent Application No. 202010174749.3, dated Oct. 28, 2021, 4 pages (3 pages of English Translation and 1 page of Official Copy).
Notice of Allowance received for Japanese Patent Application No. 2019-572834, dated Nov. 1, 2021, 5 pages (1 page of English Translation and 4 pages of Official Copy).
Office Action received for Chinese Patent Application No. 202011206499.3, dated Sep. 28, 2021, 7 pages (4 pages of English Translation and 3 pages of Official Copy).

* cited by examiner

Figure 9B:
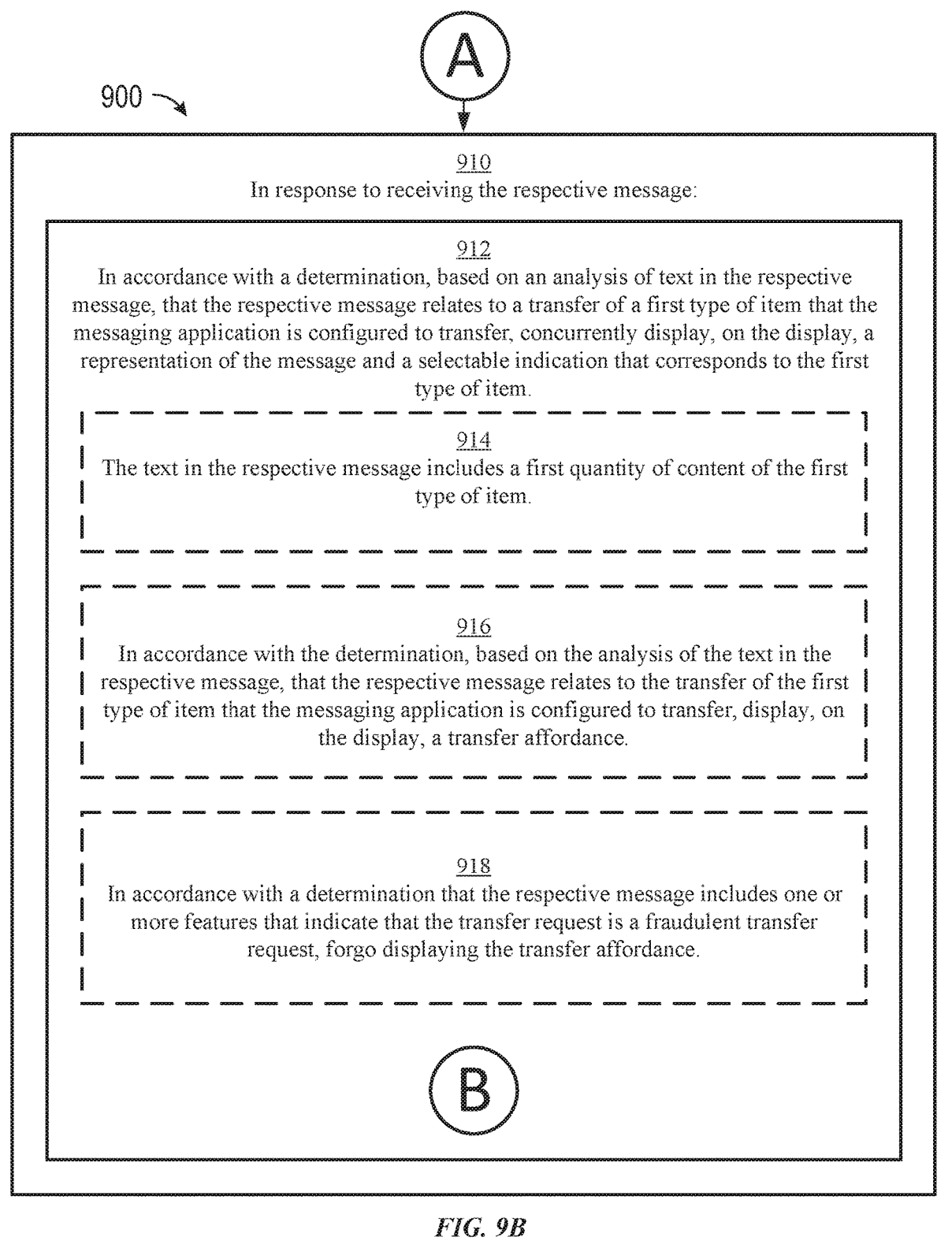

A

900

910
In response to receiving the respective message:

912
In accordance with a determination, based on an analysis of text in the respective message, that the respective message relates to a transfer of a first type of item that the messaging application is configured to transfer, concurrently display, on the display, a representation of the message and a selectable indication that corresponds to the first type of item.

914
The text in the respective message includes a first quantity of content of the first type of item.

916
In accordance with the determination, based on the analysis of the text in the respective message, that the respective message relates to the transfer of the first type of item that the messaging application is configured to transfer, display, on the display, a transfer affordance.

918
In accordance with a determination that the respective message includes one or more features that indicate that the transfer request is a fraudulent transfer request, forgo displaying the transfer affordance.

Figure 9H:
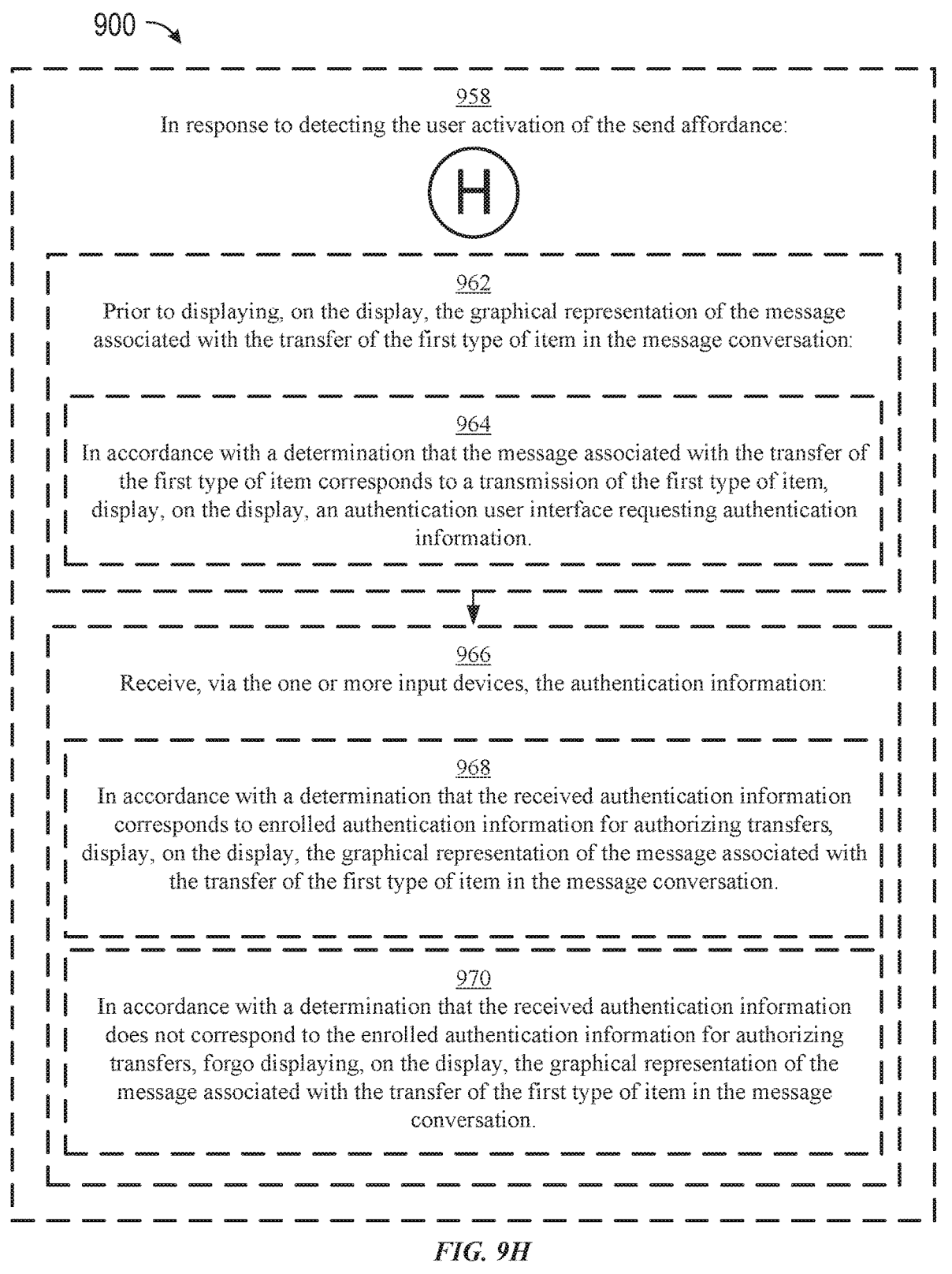

958
In response to detecting the user activation of the send affordance:

H

962
Prior to displaying, on the display, the graphical representation of the message associated with the transfer of the first type of item in the message conversation:

964
In accordance with a determination that the message associated with the transfer of the first type of item corresponds to a transmission of the first type of item, display, on the display, an authentication user interface requesting authentication information.

966
Receive, via the one or more input devices, the authentication information:

968
In accordance with a determination that the received authentication information corresponds to enrolled authentication information for authorizing transfers, display, on the display, the graphical representation of the message associated with the transfer of the first type of item in the message conversation.

970
In accordance with a determination that the received authentication information does not correspond to the enrolled authentication information for authorizing transfers, forgo displaying, on the display, the graphical representation of the message associated with the transfer of the first type of item in the message conversation.

Figure 12C:
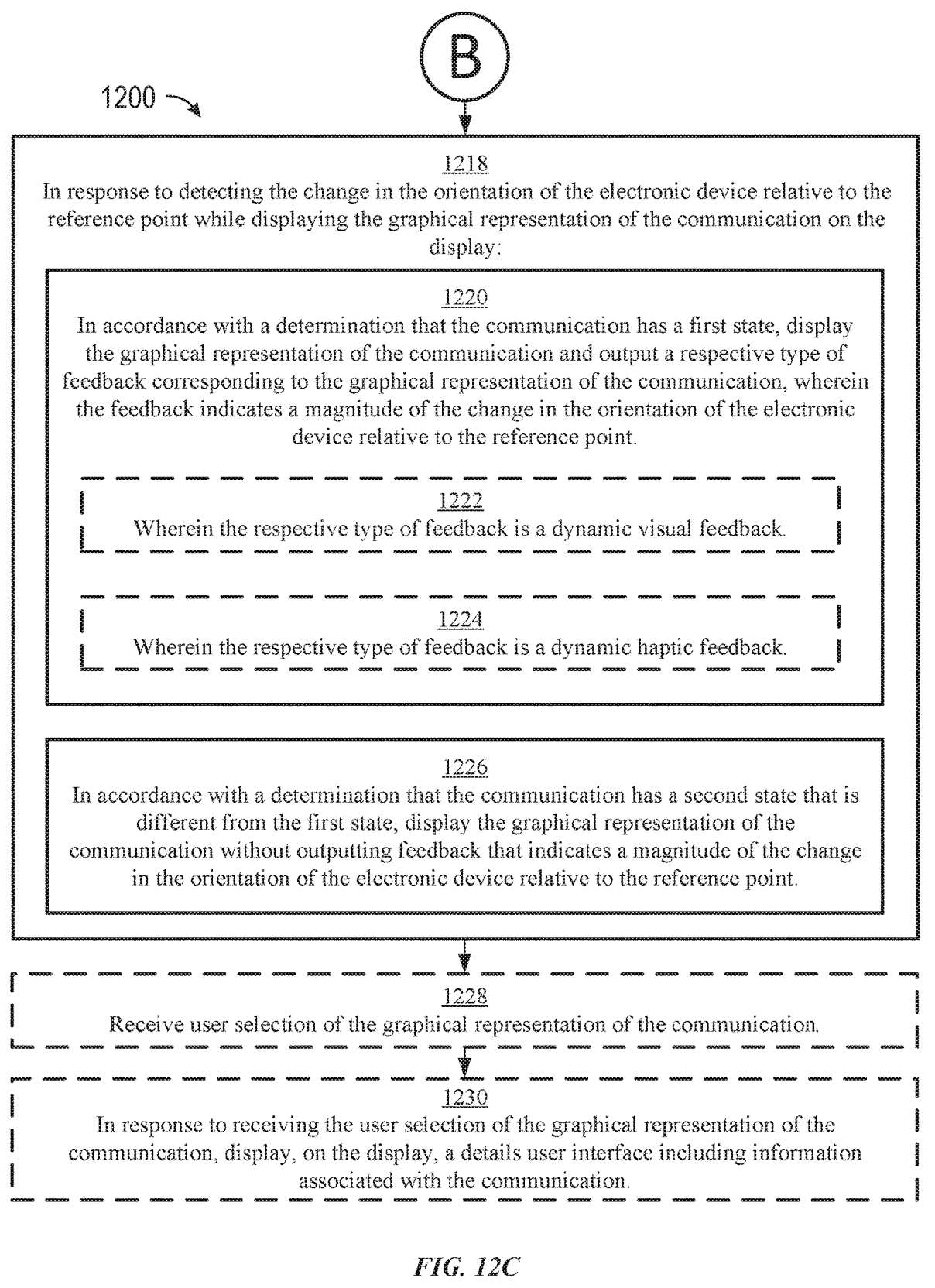

1218
In response to detecting the change in the orientation of the electronic device relative to the reference point while displaying the graphical representation of the communication on the display:

1220
In accordance with a determination that the communication has a first state, display the graphical representation of the communication and output a respective type of feedback corresponding to the graphical representation of the communication, wherein the feedback indicates a magnitude of the change in the orientation of the electronic device relative to the reference point.

1222
Wherein the respective type of feedback is a dynamic visual feedback.

1224
Wherein the respective type of feedback is a dynamic haptic feedback.

1226
In accordance with a determination that the communication has a second state that is different from the first state, display the graphical representation of the communication without outputting feedback that indicates a magnitude of the change in the orientation of the electronic device relative to the reference point.

1228
Receive user selection of the graphical representation of the communication.

1230
In response to receiving the user selection of the graphical representation of the communication, display, on the display, a details user interface including information associated with the communication.

Figure 15K:
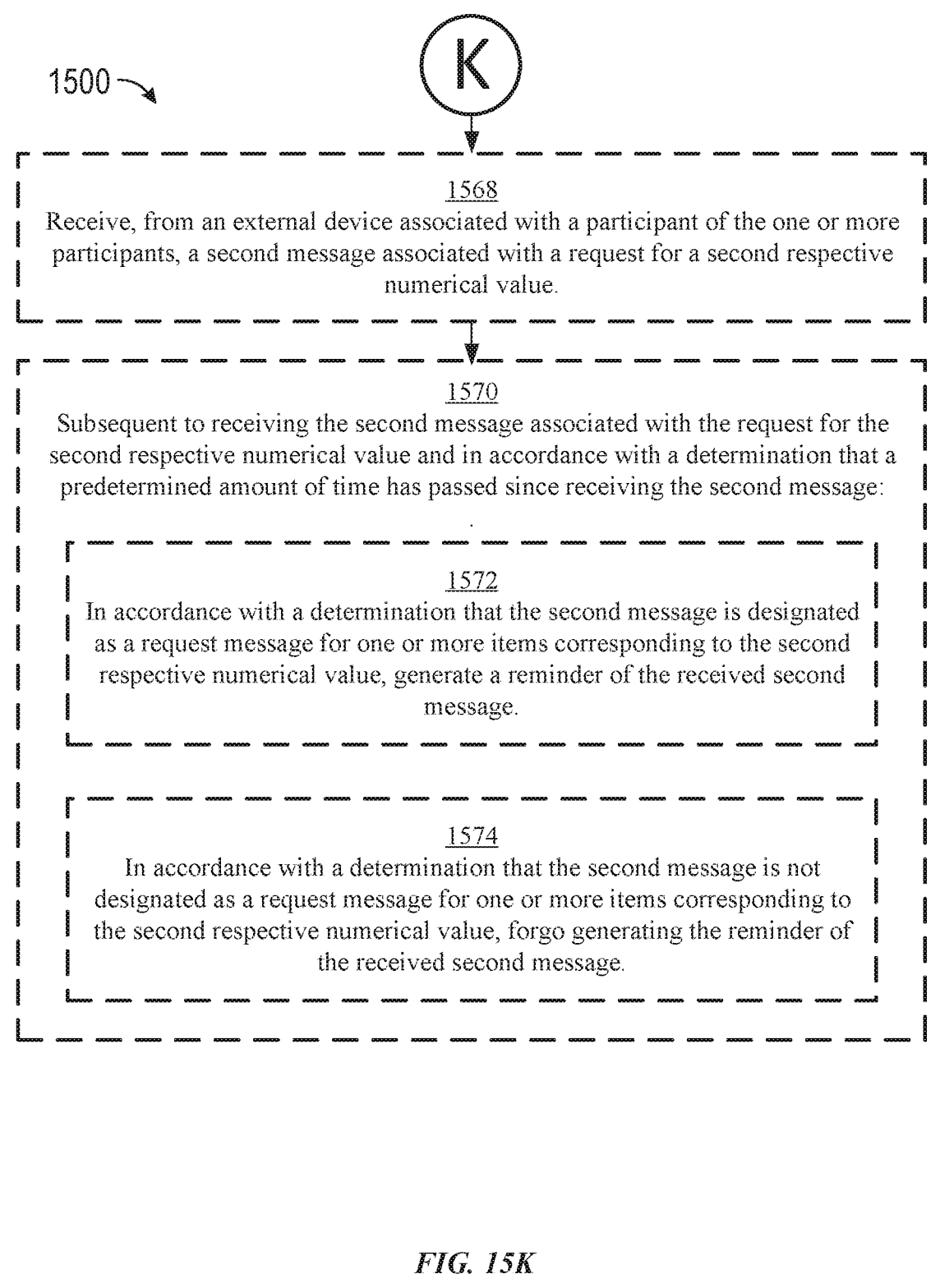

1568
Receive, from an external device associated with a participant of the one or more participants, a second message associated with a request for a second respective numerical value.

1570
Subsequent to receiving the second message associated with the request for the second respective numerical value and in accordance with a determination that a predetermined amount of time has passed since receiving the second message:

1572
In accordance with a determination that the second message is designated as a request message for one or more items corresponding to the second respective numerical value, generate a reminder of the received second message.

1574
In accordance with a determination that the second message is not designated as a request message for one or more items corresponding to the second respective numerical value, forgo generating the reminder of the received second message.

Figure 18B:
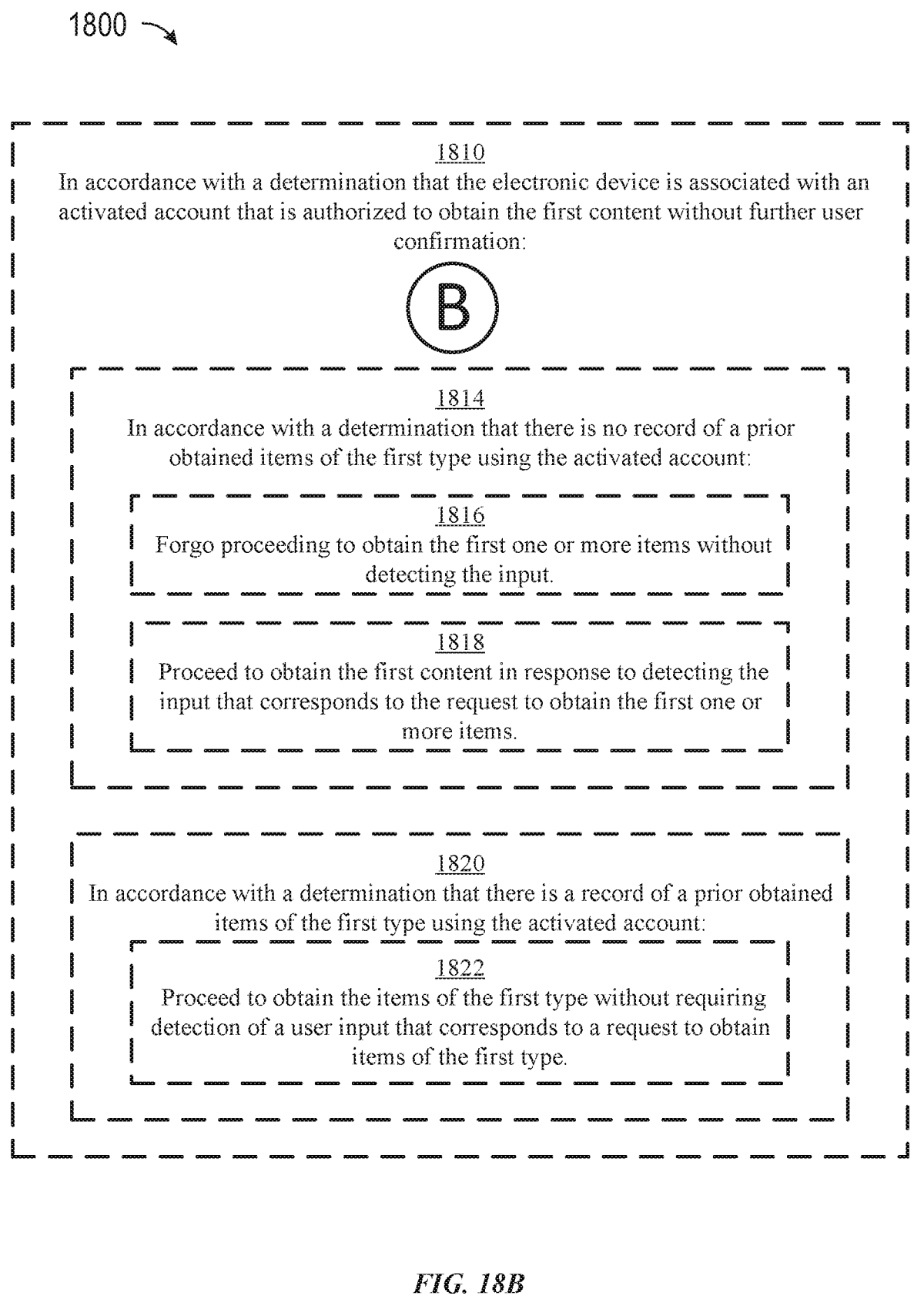

1810
In accordance with a determination that the electronic device is associated with an activated account that is authorized to obtain the first content without further user confirmation:

(B)

1814
In accordance with a determination that there is no record of a prior obtained items of the first type using the activated account:

1816
Forgo proceeding to obtain the first one or more items without detecting the input.

1818
Proceed to obtain the first content in response to detecting the input that corresponds to the request to obtain the first one or more items.

1820
In accordance with a determination that there is a record of a prior obtained items of the first type using the activated account:

1822
Proceed to obtain the items of the first type without requiring detection of a user input that corresponds to a request to obtain items of the first type.

Figure 18C:
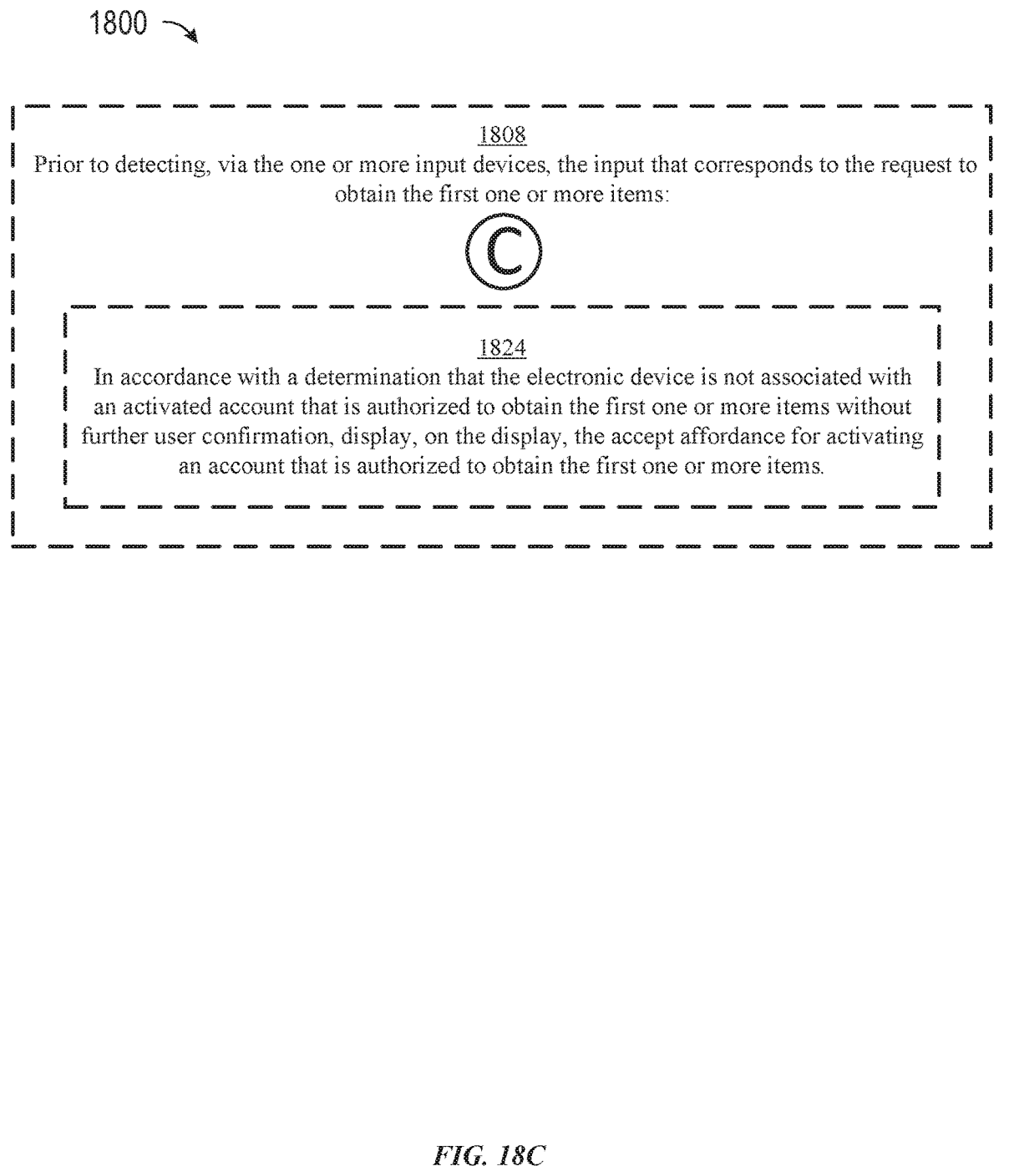

1808
Prior to detecting, via the one or more input devices, the input that corresponds to the request to obtain the first one or more items:

C

1824
In accordance with a determination that the electronic device is not associated with an activated account that is authorized to obtain the first one or more items without further user confirmation, display, on the display, the accept affordance for activating an account that is authorized to obtain the first one or more items.

Figure 18F:
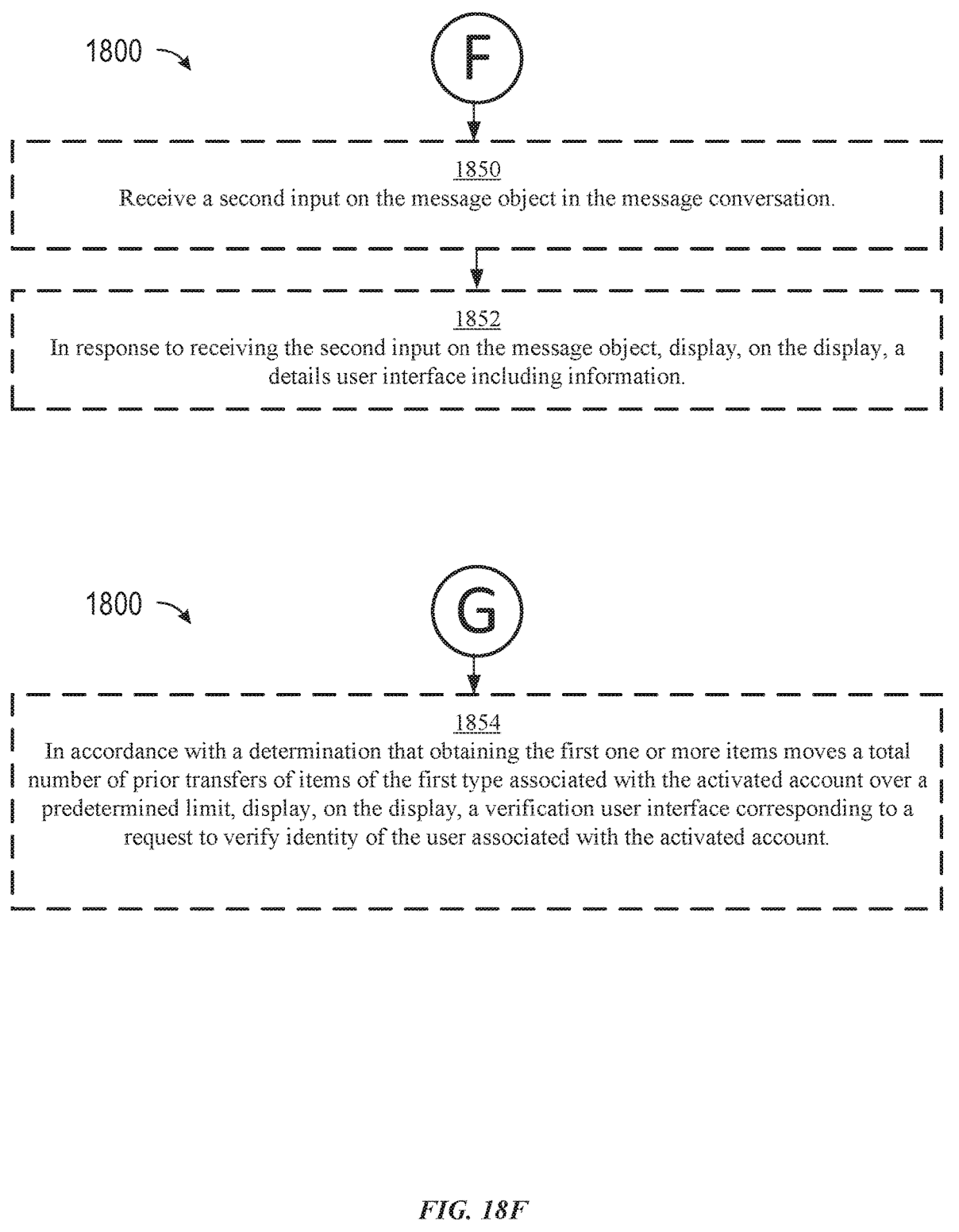

1850
Receive a second input on the message object in the message conversation.

1852
In response to receiving the second input on the message object, display, on the display, a details user interface including information.

1800

G

1854
In accordance with a determination that obtaining the first one or more items moves a total number of prior transfers of items of the first type associated with the activated account over a predetermined limit, display, on the display, a verification user interface corresponding to a request to verify identity of the user associated with the activated account.

Figure 21C:
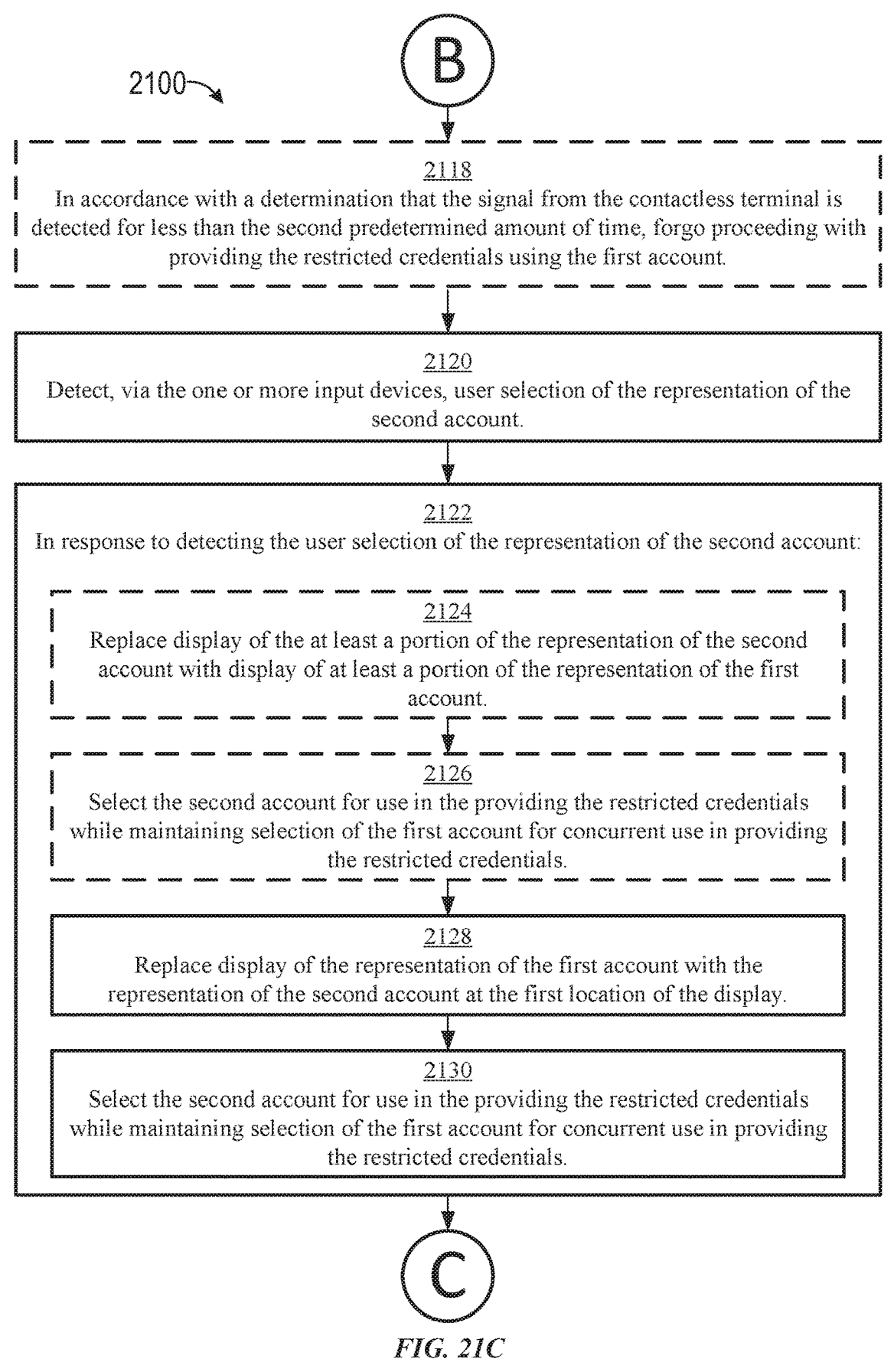

2118
In accordance with a determination that the signal from the contactless terminal is detected for less than the second predetermined amount of time, forgo proceeding with providing the restricted credentials using the first account.

2120
Detect, via the one or more input devices, user selection of the representation of the second account.

2122
In response to detecting the user selection of the representation of the second account:

2124
Replace display of the at least a portion of the representation of the second account with display of at least a portion of the representation of the first account.

2126
Select the second account for use in the providing the restricted credentials while maintaining selection of the first account for concurrent use in providing the restricted credentials.

2128
Replace display of the representation of the first account with the representation of the second account at the first location of the display.

2130
Select the second account for use in the providing the restricted credentials while maintaining selection of the first account for concurrent use in providing the restricted credentials.

Figure 24C:
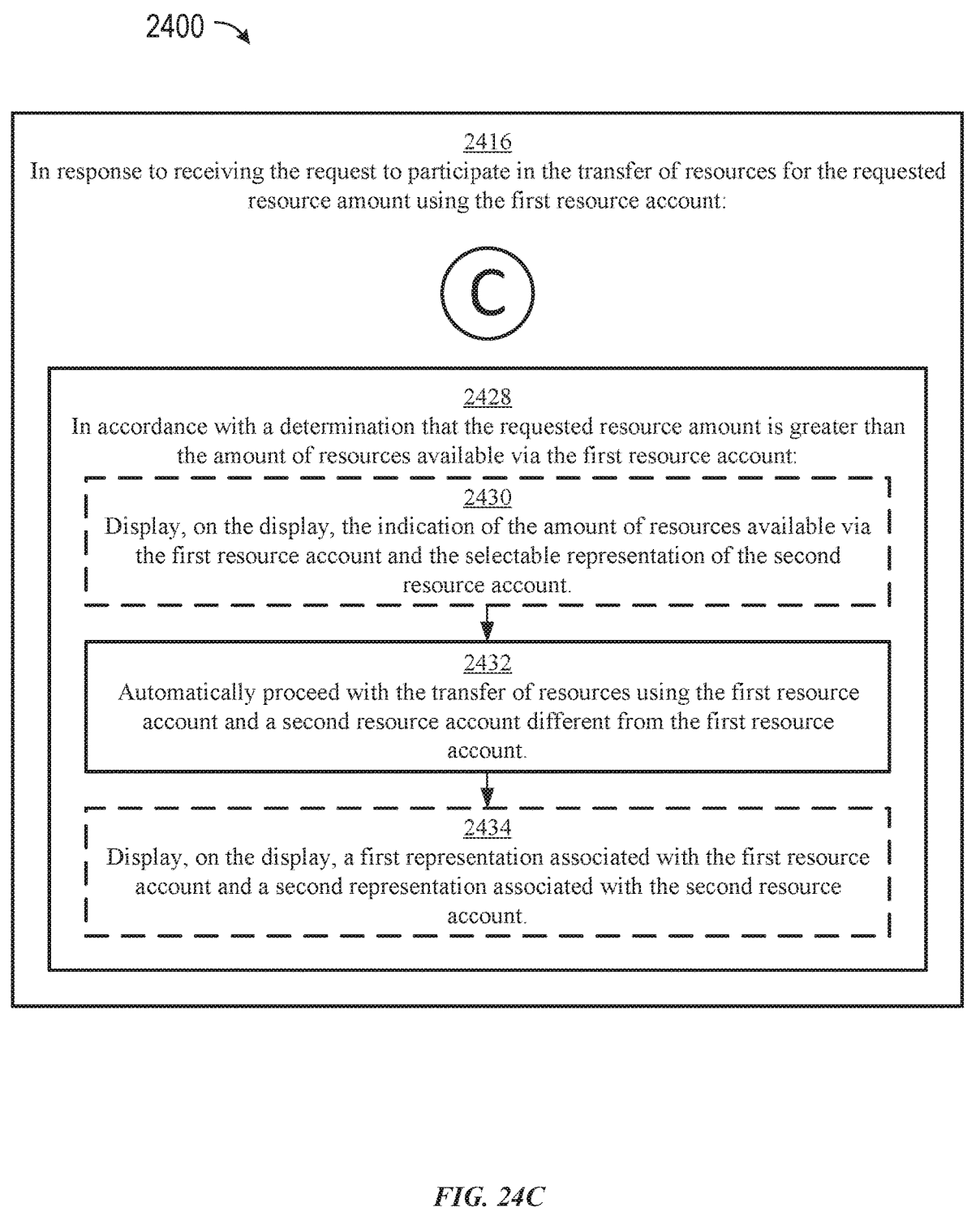

2416
In response to receiving the request to participate in the transfer of resources for the requested resource amount using the first resource account:

C

2428
In accordance with a determination that the requested resource amount is greater than the amount of resources available via the first resource account:

2430
Display, on the display, the indication of the amount of resources available via the first resource account and the selectable representation of the second resource account.

2432
Automatically proceed with the transfer of resources using the first resource account and a second resource account different from the first resource account.

2434
Display, on the display, a first representation associated with the first resource account and a second representation associated with the second resource account.

Figure 27E:
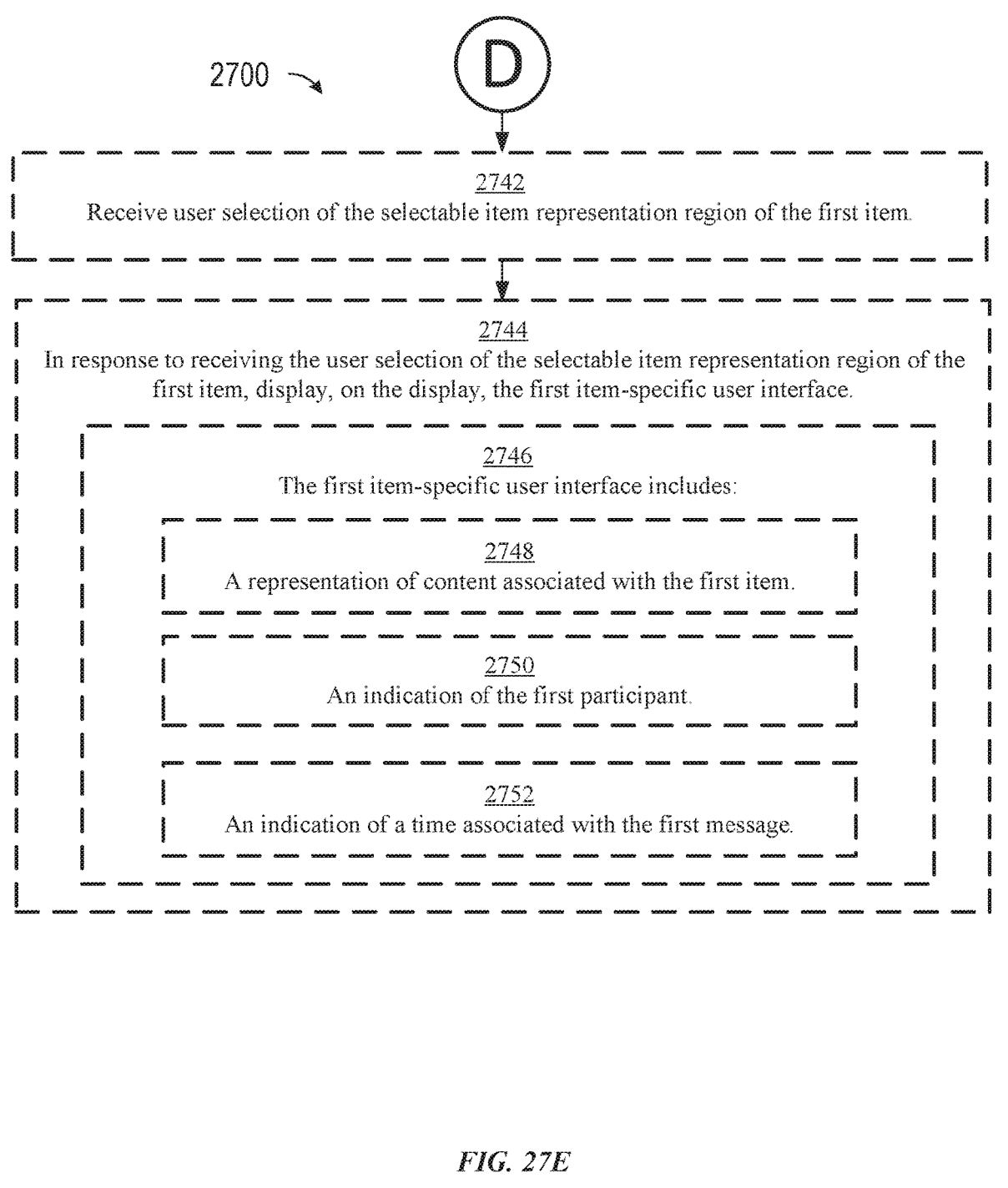

2742
Receive user selection of the selectable item representation region of the first item.

2744
In response to receiving the user selection of the selectable item representation region of the first item, display, on the display, the first item-specific user interface.

2746
The first item-specific user interface includes:

2748
A representation of content associated with the first item.

2750
An indication of the first participant.

2752
An indication of a time associated with the first message.

*FIG. 28A*
2801
SEND THE
5 PHOTOS FROM
LAST NIGHT TO JOHN
2800

Figure 34A:
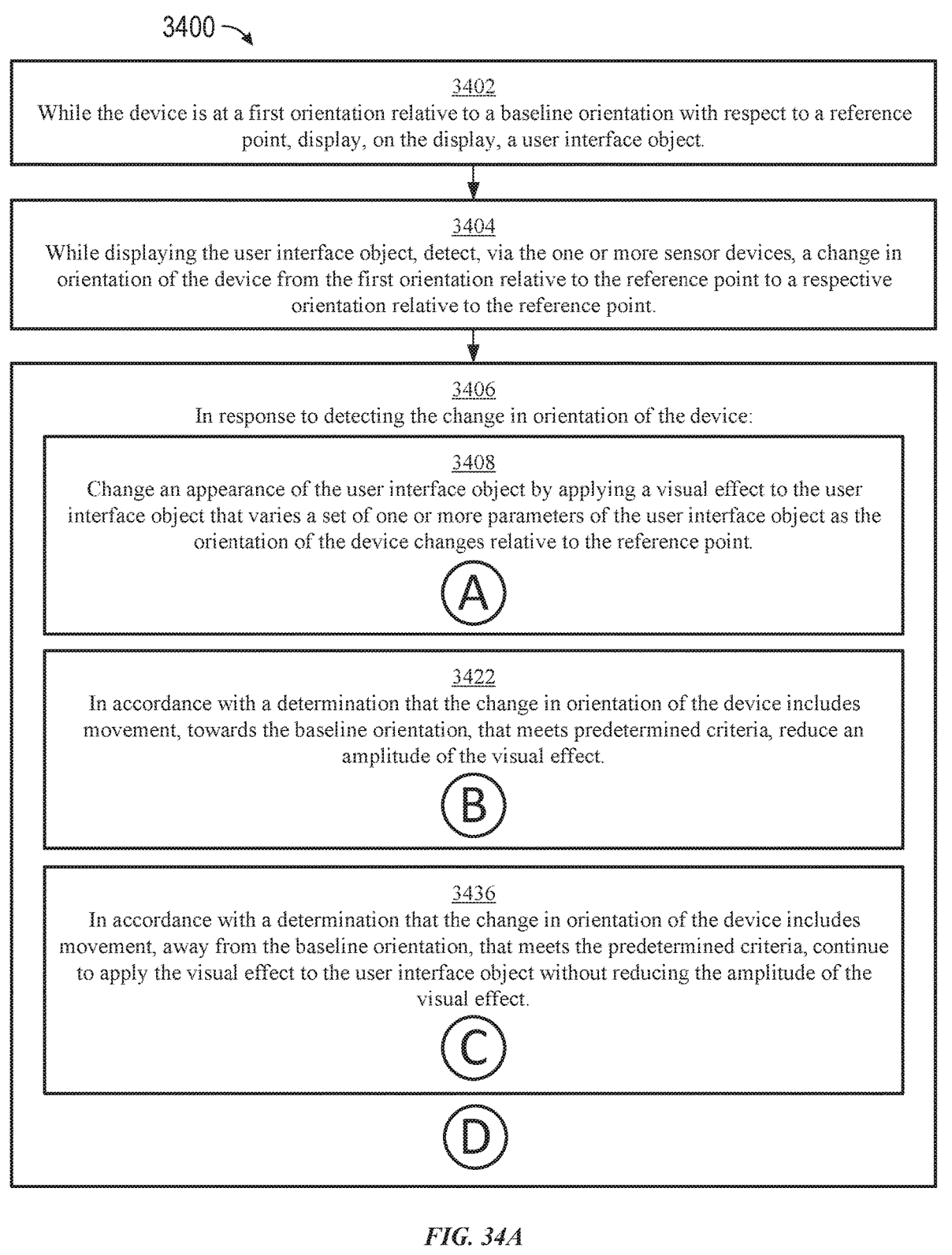

3402
While the device is at a first orientation relative to a baseline orientation with respect to a reference point, display, on the display, a user interface object.

3404
While displaying the user interface object, detect, via the one or more sensor devices, a change in orientation of the device from the first orientation relative to the reference point to a respective orientation relative to the reference point.

3406
In response to detecting the change in orientation of the device:

3408
Change an appearance of the user interface object by applying a visual effect to the user interface object that varies a set of one or more parameters of the user interface object as the orientation of the device changes relative to the reference point.

(A)

3422
In accordance with a determination that the change in orientation of the device includes movement, towards the baseline orientation, that meets predetermined criteria, reduce an amplitude of the visual effect.

(B)

3436
In accordance with a determination that the change in orientation of the device includes movement, away from the baseline orientation, that meets the predetermined criteria, continue to apply the visual effect to the user interface object without reducing the amplitude of the visual effect.

Figure 34B:
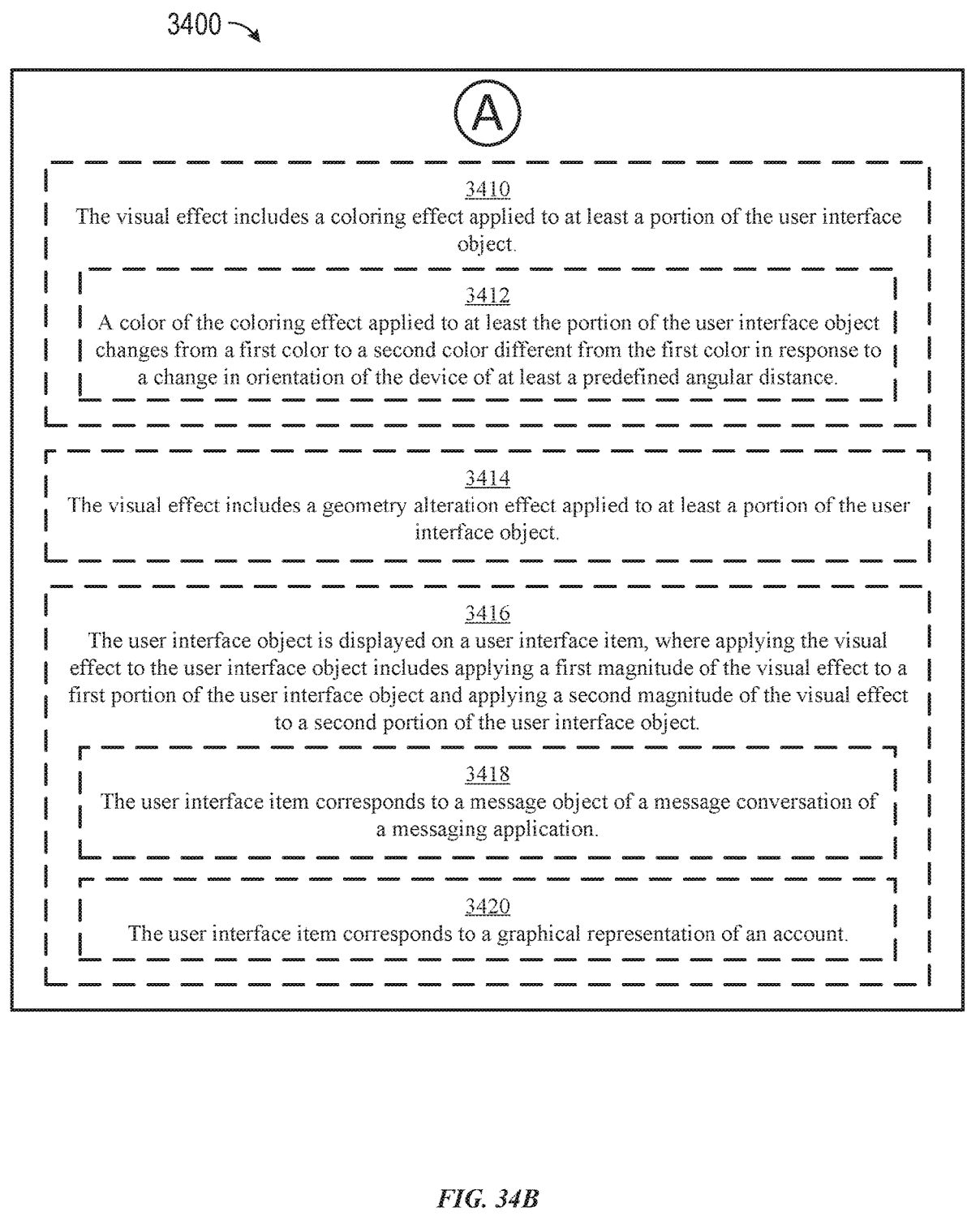

3410
The visual effect includes a coloring effect applied to at least a portion of the user interface object.

3412
A color of the coloring effect applied to at least the portion of the user interface object changes from a first color to a second color different from the first color in response to a change in orientation of the device of at least a predefined angular distance.

3414
The visual effect includes a geometry alteration effect applied to at least a portion of the user interface object.

3416
The user interface object is displayed on a user interface item, where applying the visual effect to the user interface object includes applying a first magnitude of the visual effect to a first portion of the user interface object and applying a second magnitude of the visual effect to a second portion of the user interface object.

3418
The user interface item corresponds to a message object of a message conversation of a messaging application.

3420
The user interface item corresponds to a graphical representation of an account.

Figure 34C:
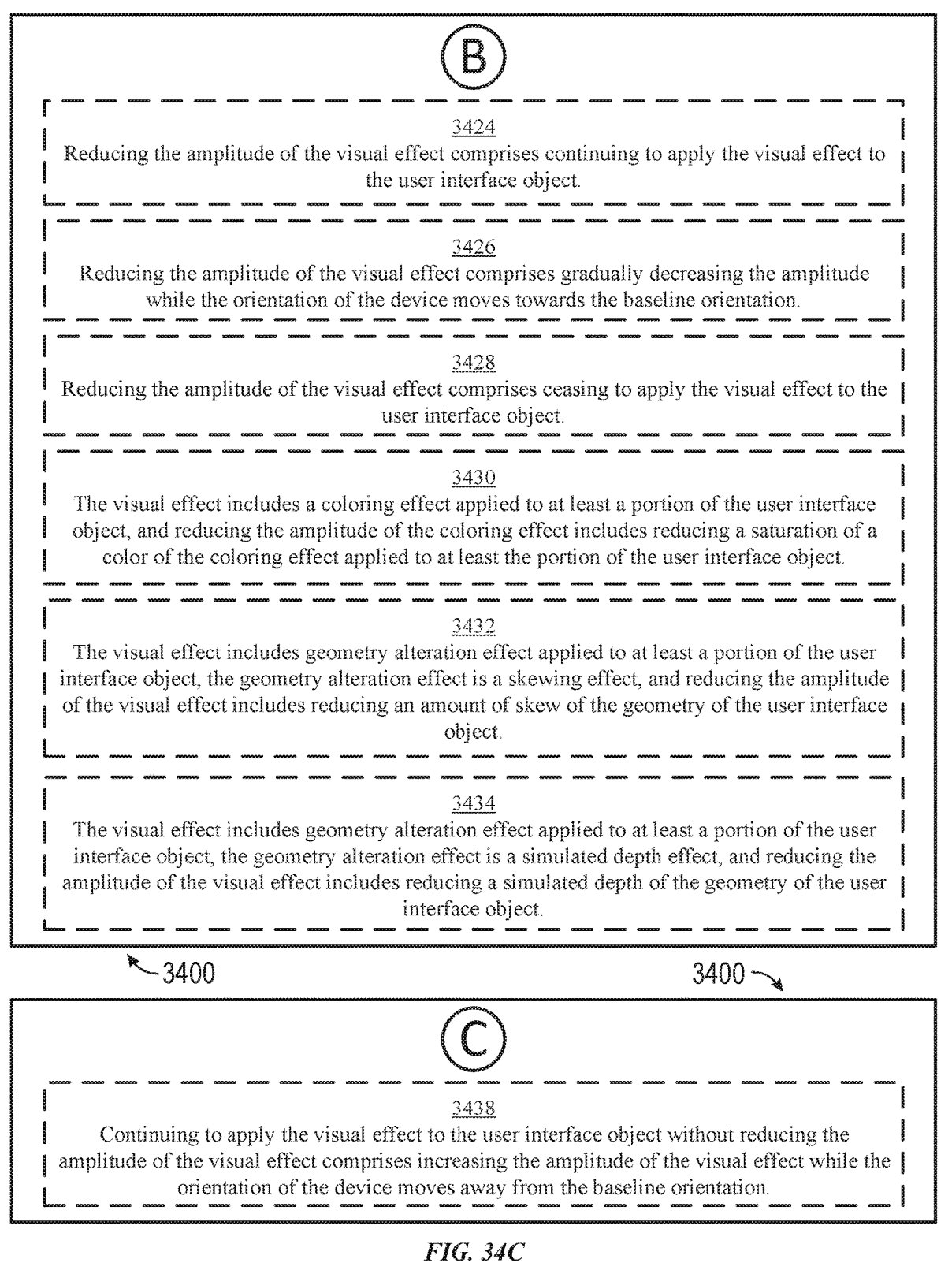

3424
Reducing the amplitude of the visual effect comprises continuing to apply the visual effect to the user interface object.

3426
Reducing the amplitude of the visual effect comprises gradually decreasing the amplitude while the orientation of the device moves towards the baseline orientation.

3428
Reducing the amplitude of the visual effect comprises ceasing to apply the visual effect to the user interface object.

3430
The visual effect includes a coloring effect applied to at least a portion of the user interface object, and reducing the amplitude of the coloring effect includes reducing a saturation of a color of the coloring effect applied to at least the portion of the user interface object.

3432
The visual effect includes geometry alteration effect applied to at least a portion of the user interface object, the geometry alteration effect is a skewing effect, and reducing the amplitude of the visual effect includes reducing an amount of skew of the geometry of the user interface object.

3434
The visual effect includes geometry alteration effect applied to at least a portion of the user interface object, the geometry alteration effect is a simulated depth effect, and reducing the amplitude of the visual effect includes reducing a simulated depth of the geometry of the user interface object.

3400

3400

(C)

3438
Continuing to apply the visual effect to the user interface object without reducing the amplitude of the visual effect comprises increasing the amplitude of the visual effect while the orientation of the device moves away from the baseline orientation.

*FIG. 36E*
3600A
KATE'S DEVICE
10:09
JA
JOHN
3602
HI! I HAD FUN AT YOUR BIRTHDAY PARTY YESTERDAY!
THANKS AGAIN FOR COMING TO CELEBRATE!
MESSAGE
PAY
3624
3622
- $50 +
REQUEST
SEND
PAY

*FIG. 36F*
3600A
KATE'S DEVICE
10:09
JA
JOHN
HI! I HAD FUN AT YOUR BIRTHDAY PARTY YESTERDAY!
THANKS AGAIN FOR COMING TO CELEBRATE
MESSAGE
PAY
- $50 +
3630
REQUEST
SEND
3620
PAY
3605

FIG. 36G
3600A
KATE'S DEVICE
10:09
JA
JOHN
HI! I HAD FUN AT YOUR BIRTHDAY PARTY YESTERDAY!
THANKS AGAIN FOR COMING TO CELEBRATE!
I MESSAGE
PAY
- $50 +
3631
REQUEST
SEND
PAY
3630

*FIG. 36U*
3600A
KATE'S DEVICE
10:09
JA
JOHN
HI! I HAD FUN AT YOUR BIRTHDAY PARTY YESTERDAY!
THANKS AGAIN FOR COMING TO CELEBRATE!
A
MESSAGE
PAY
- $50 +
3620
3633
REQUEST
SEND
PAY
3630

Figure 37A:
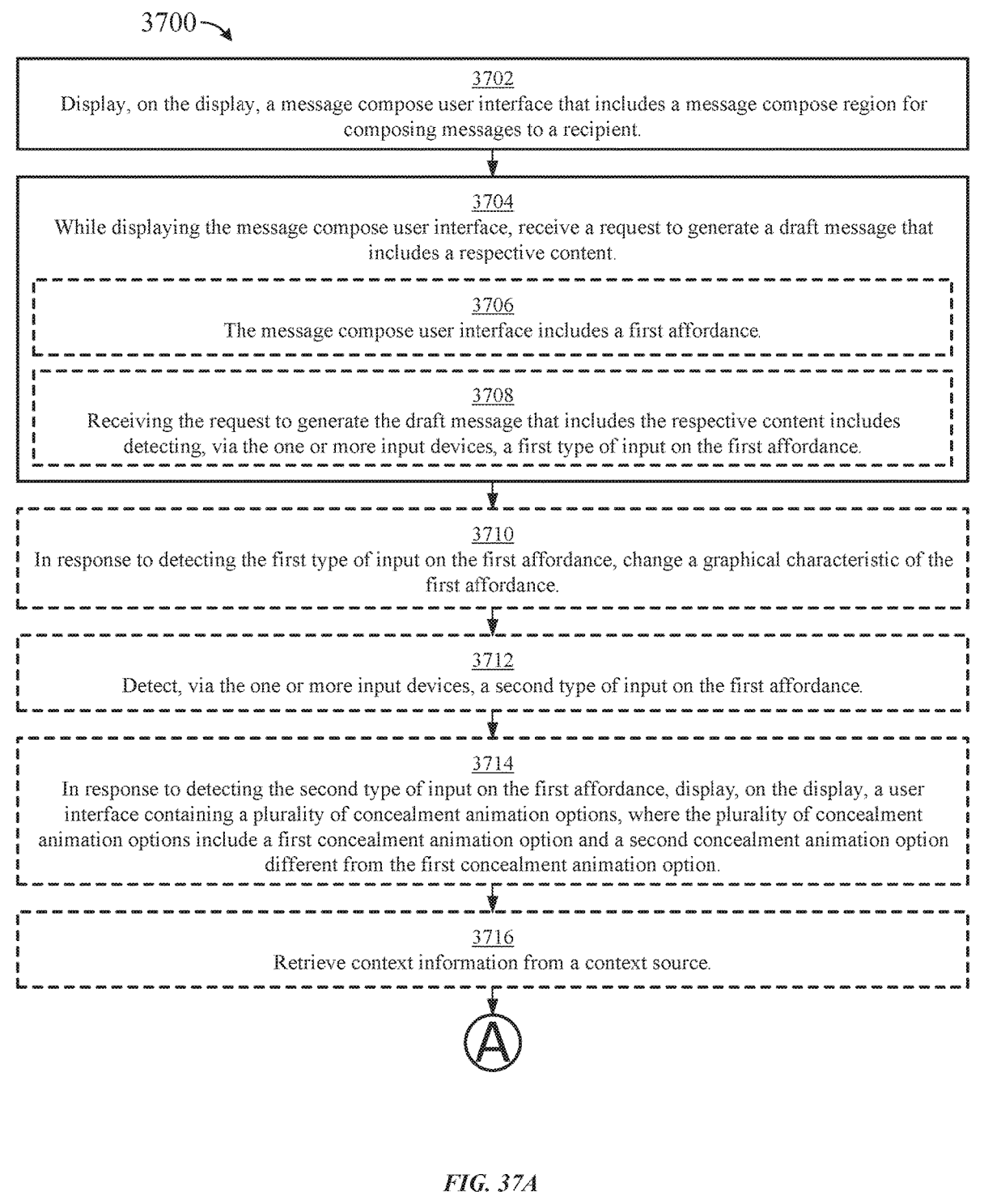

3702
Display, on the display, a message compose user interface that includes a message compose region for composing messages to a recipient.

3704
While displaying the message compose user interface, receive a request to generate a draft message that includes a respective content.

3706
The message compose user interface includes a first affordance.

3708
Receiving the request to generate the draft message that includes the respective content includes detecting, via the one or more input devices, a first type of input on the first affordance.

3710
In response to detecting the first type of input on the first affordance, change a graphical characteristic of the first affordance.

3712
Detect, via the one or more input devices, a second type of input on the first affordance.

3714
In response to detecting the second type of input on the first affordance, display, on the display, a user interface containing a plurality of concealment animation options, where the plurality of concealment animation options include a first concealment animation option and a second concealment animation option different from the first concealment animation option.

3716
Retrieve context information from a context source.

Figure 37C:
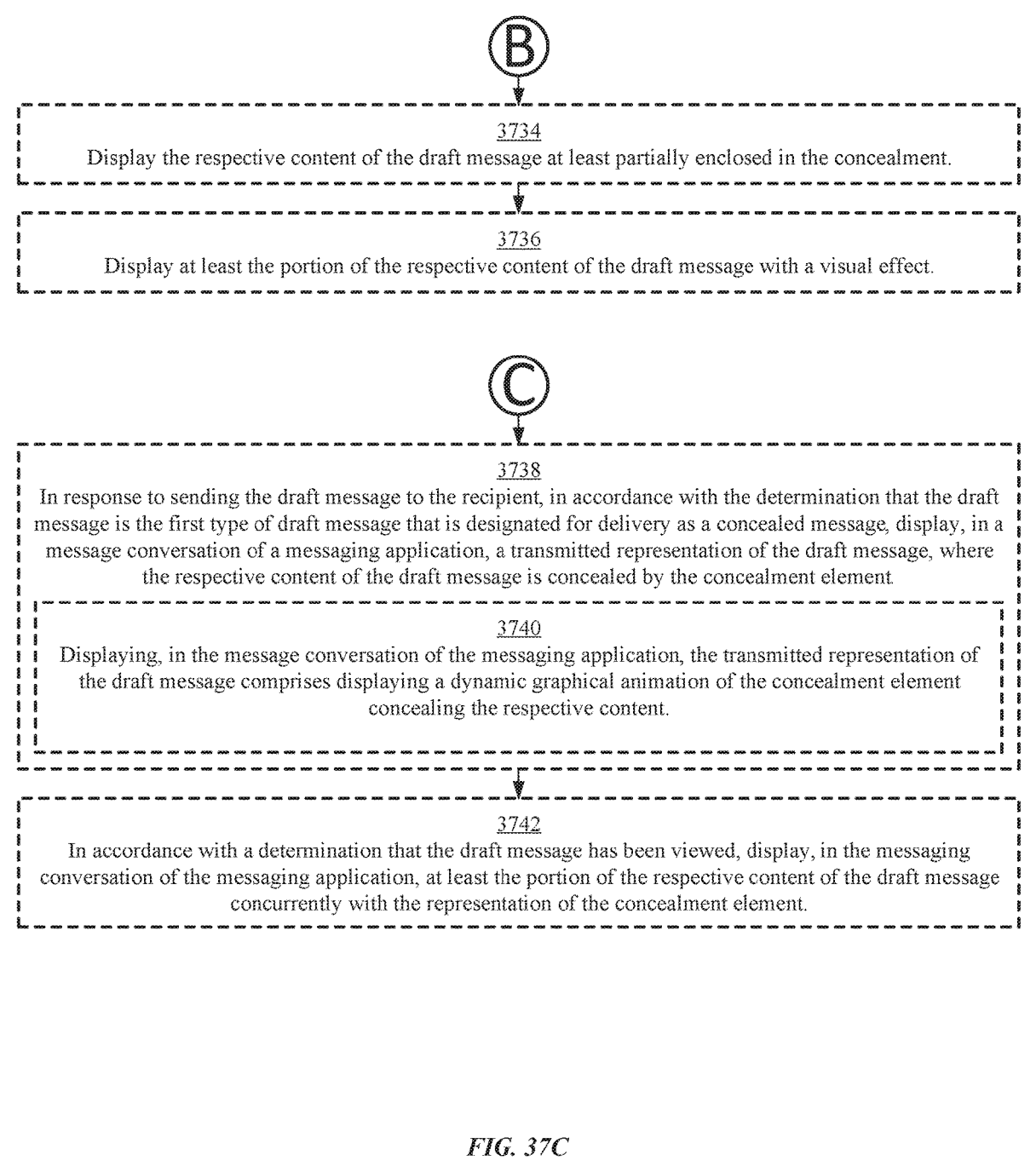

3734
Display the respective content of the draft message at least partially enclosed in the concealment.

3736
Display at least the portion of the respective content of the draft message with a visual effect.

C

3738
In response to sending the draft message to the recipient, in accordance with the determination that the draft message is the first type of draft message that is designated for delivery as a concealed message, display, in a message conversation of a messaging application, a transmitted representation of the draft message, where the respective content of the draft message is concealed by the concealment element.

3740
Displaying, in the message conversation of the messaging application, the transmitted representation of the draft message comprises displaying a dynamic graphical animation of the concealment element concealing the respective content.

3742
In accordance with a determination that the draft message has been viewed, display, in the messaging conversation of the messaging application, at least the portion of the respective content of the draft message concurrently with the representation of the concealment element.

Figure 40A:
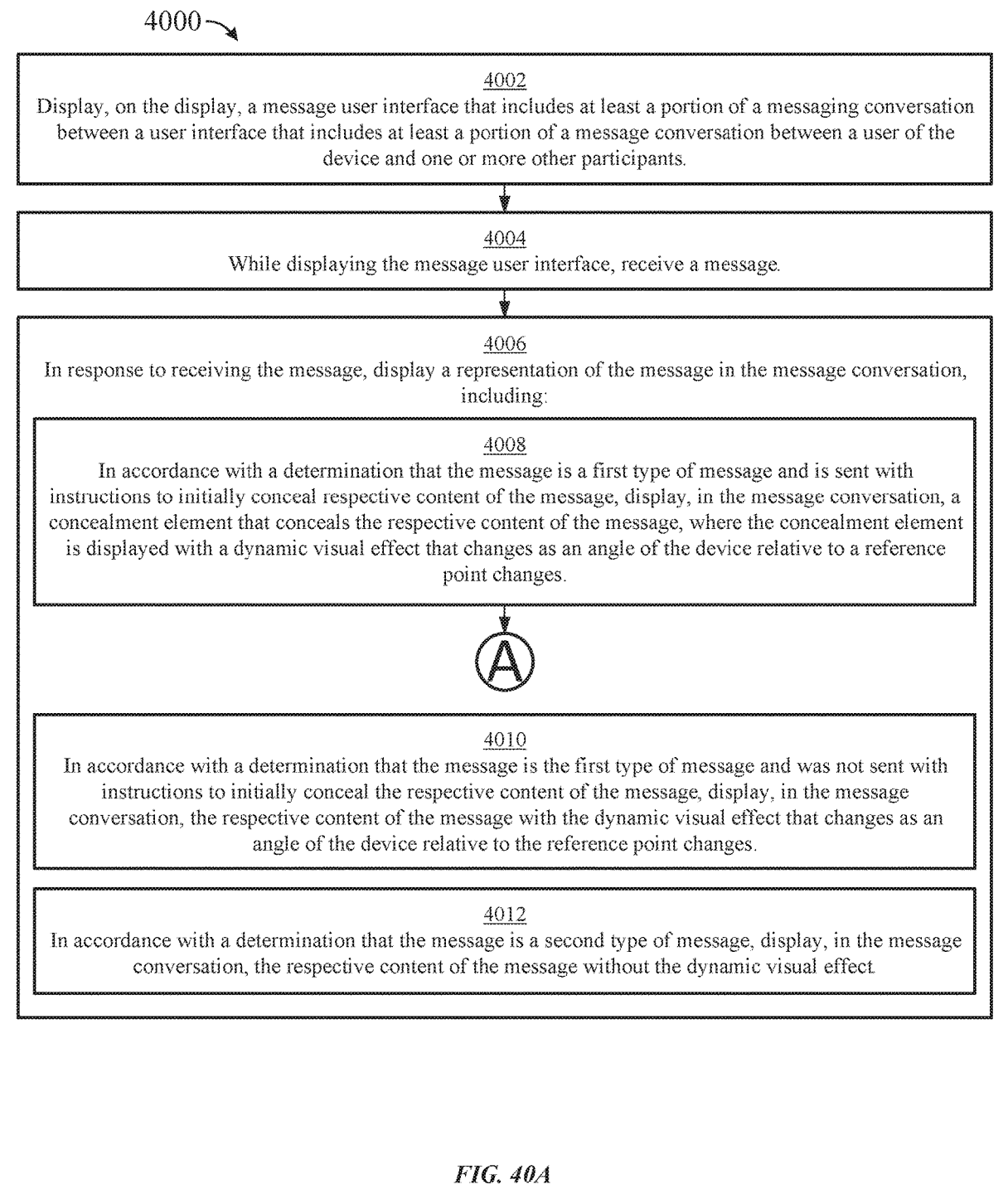

4002
Display, on the display, a message user interface that includes at least a portion of a messaging conversation between a user interface that includes at least a portion of a message conversation between a user of the device and one or more other participants.

4004
While displaying the message user interface, receive a message.

4006
In response to receiving the message, display a representation of the message in the message conversation, including:

4008
In accordance with a determination that the message is a first type of message and is sent with instructions to initially conceal respective content of the message, display, in the message conversation, a concealment element that conceals the respective content of the message, where the concealment element is displayed with a dynamic visual effect that changes as an angle of the device relative to a reference point changes.

A

4010
In accordance with a determination that the message is the first type of message and was not sent with instructions to initially conceal the respective content of the message, display, in the message conversation, the respective content of the message with the dynamic visual effect that changes as an angle of the device relative to the reference point changes.

4012
In accordance with a determination that the message is a second type of message, display, in the message conversation, the respective content of the message without the dynamic visual effect

Figure 40B:
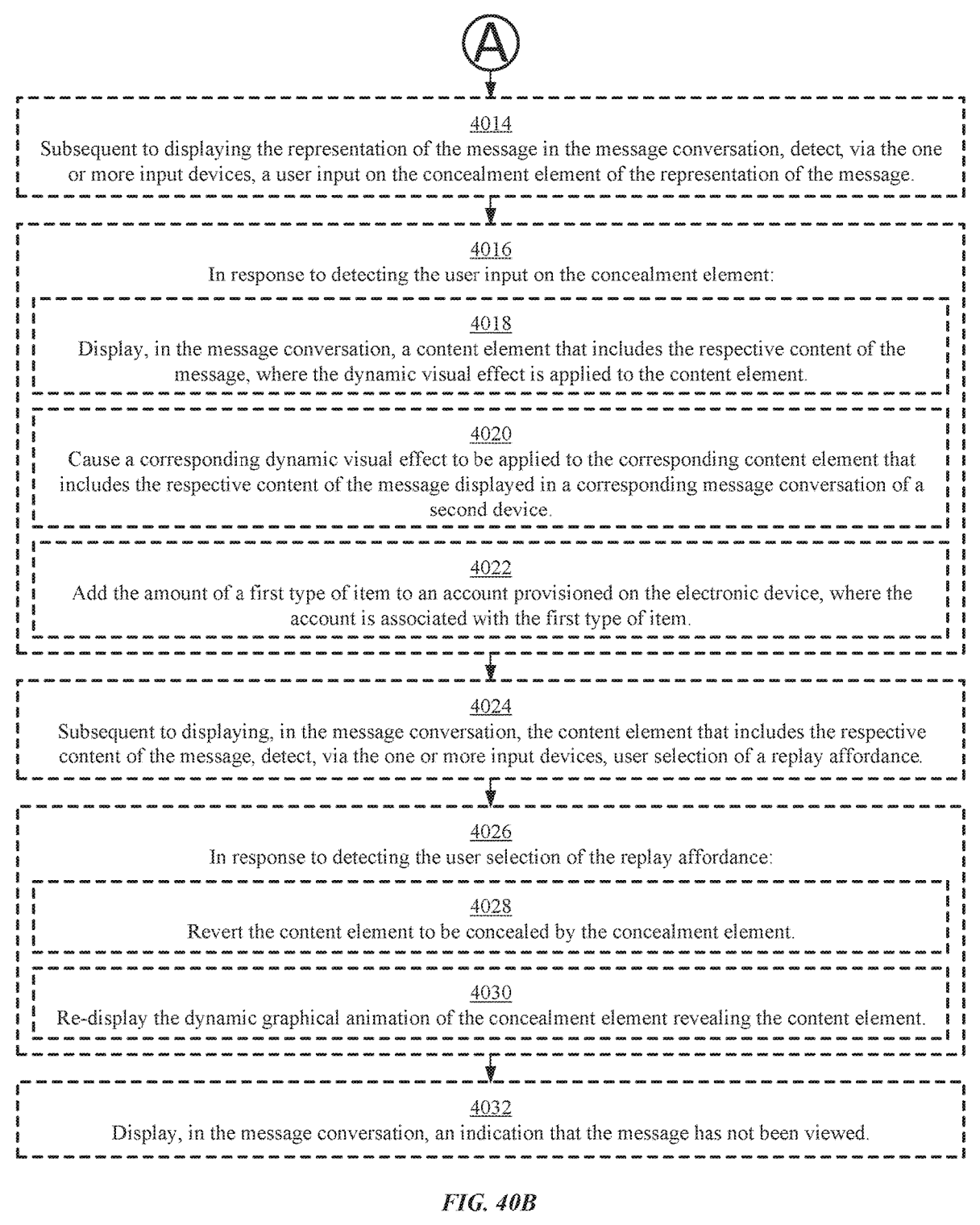

4014
Subsequent to displaying the representation of the message in the message conversation, detect, via the one or more input devices, a user input on the concealment element of the representation of the message.

4016
In response to detecting the user input on the concealment element:

4018
Display, in the message conversation, a content element that includes the respective content of the message, where the dynamic visual effect is applied to the content element.

4020
Cause a corresponding dynamic visual effect to be applied to the corresponding content element that includes the respective content of the message displayed in a corresponding message conversation of a second device.

4022
Add the amount of a first type of item to an account provisioned on the electronic device, where the account is associated with the first type of item.

4024
Subsequent to displaying, in the message conversation, the content element that includes the respective content of the message, detect, via the one or more input devices, user selection of a replay affordance.

4026
In response to detecting the user selection of the replay affordance:

4028
Revert the content element to be concealed by the concealment element.

4030
Re-display the dynamic graphical animation of the concealment element revealing the content element.

4032
Display, in the message conversation, an indication that the message has not been viewed.

Figure 46C:
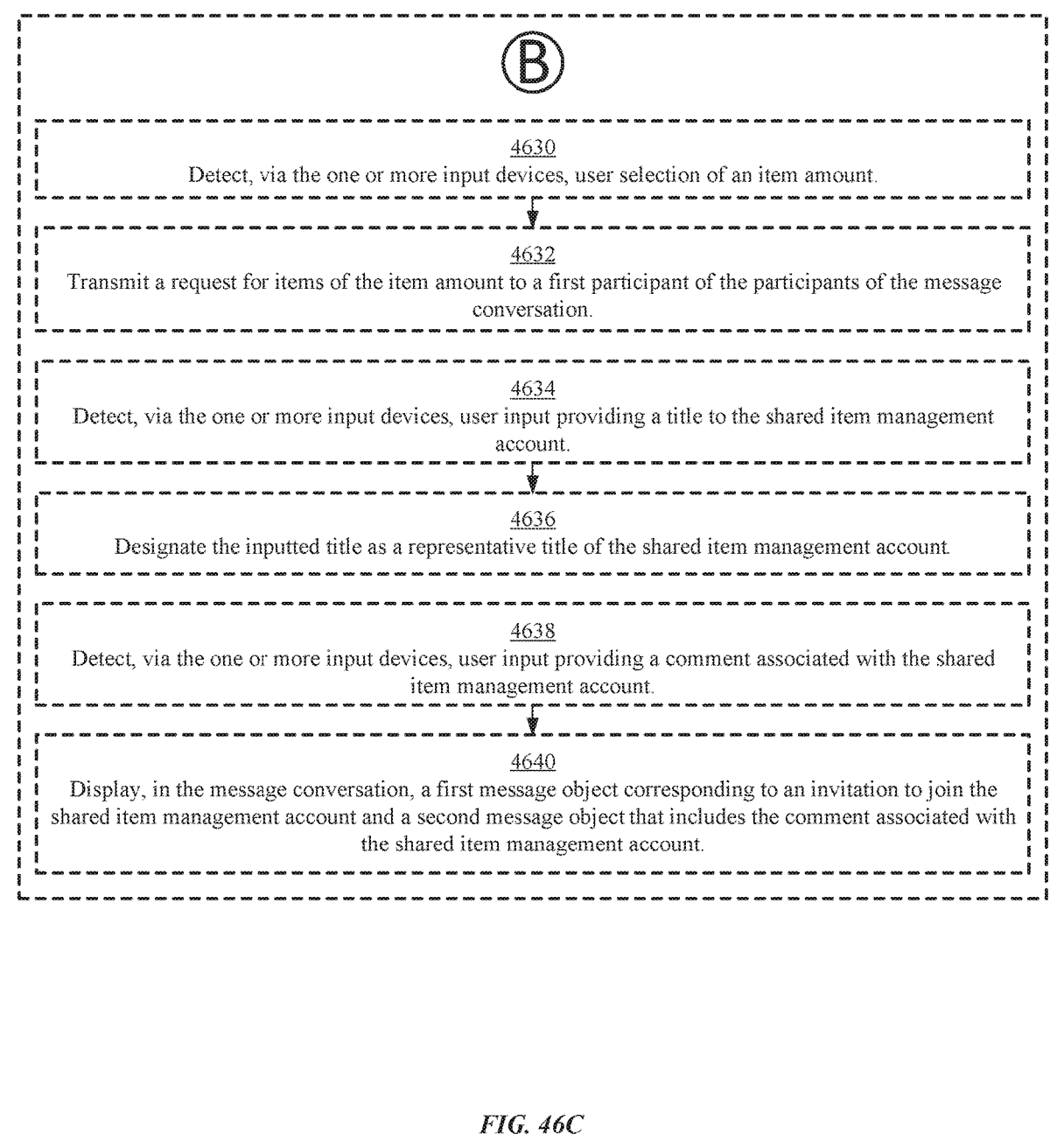

4630
Detect, via the one or more input devices, user selection of an item amount.

4632
Transmit a request for items of the item amount to a first participant of the participants of the message conversation.

4634
Detect, via the one or more input devices, user input providing a title to the shared item management account.

4636
Designate the inputted title as a representative title of the shared item management account.

4638
Detect, via the one or more input devices, user input providing a comment associated with the shared item management account.

4640
Display, in the message conversation, a first message object corresponding to an invitation to join the shared item management account and a second message object that includes the comment associated with the shared item management account.

Figure 49A:
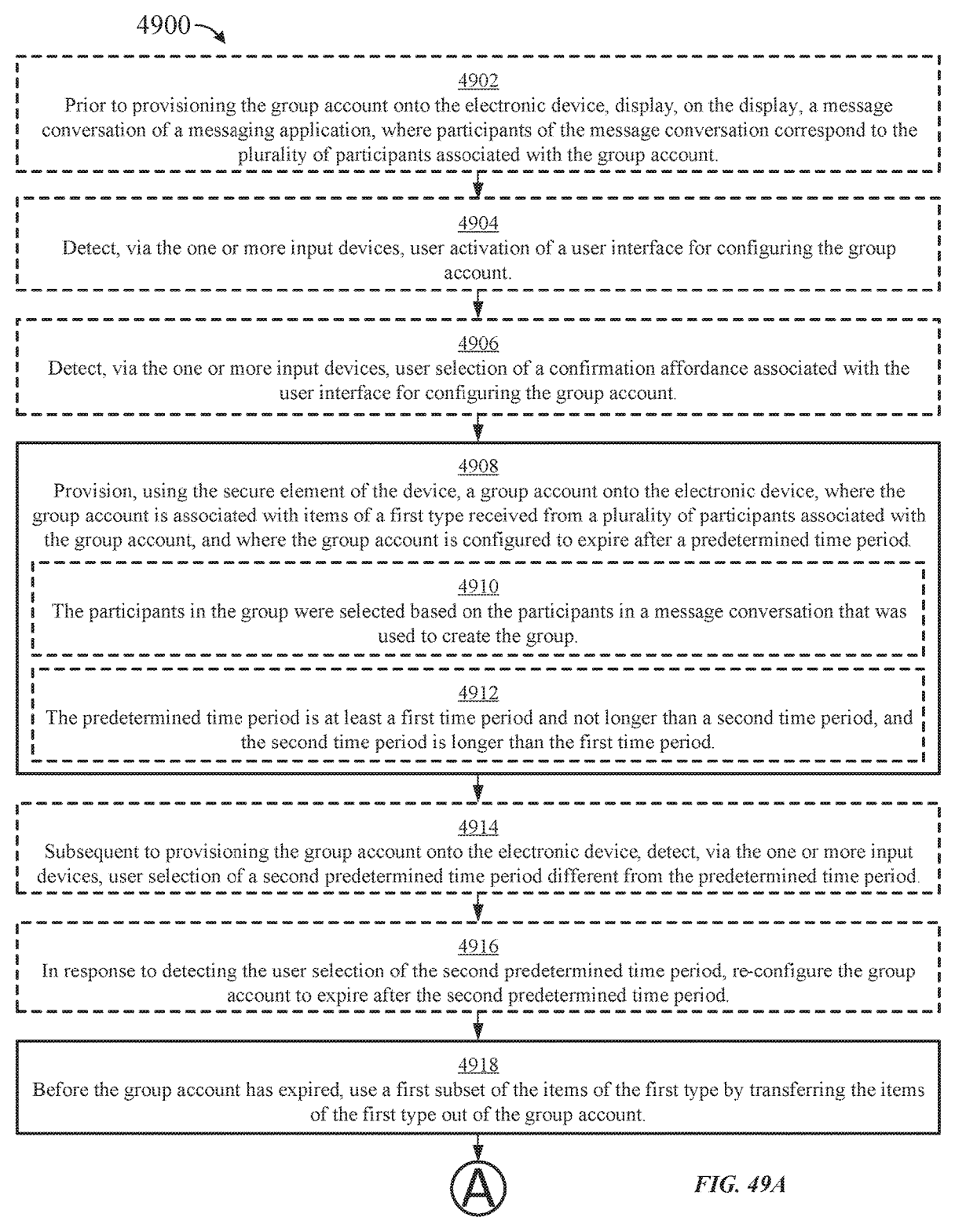

4902
Prior to provisioning the group account onto the electronic device, display, on the display, a message conversation of a messaging application, where participants of the message conversation correspond to the plurality of participants associated with the group account.

4904
Detect, via the one or more input devices, user activation of a user interface for configuring the group account.

4906
Detect, via the one or more input devices, user selection of a confirmation affordance associated with the user interface for configuring the group account.

4908
Provision, using the secure element of the device, a group account onto the electronic device, where the group account is associated with items of a first type received from a plurality of participants associated with the group account, and where the group account is configured to expire after a predetermined time period.

4910
The participants in the group were selected based on the participants in a message conversation that was used to create the group.

4912
The predetermined time period is at least a first time period and not longer than a second time period, and the second time period is longer than the first time period.

4914
Subsequent to provisioning the group account onto the electronic device, detect, via the one or more input devices, user selection of a second predetermined time period different from the predetermined time period.

4916
In response to detecting the user selection of the second predetermined time period, re-configure the group account to expire after the second predetermined time period.

4918
Before the group account has expired, use a first subset of the items of the first type by transferring the items of the first type out of the group account.

Figure 49D:
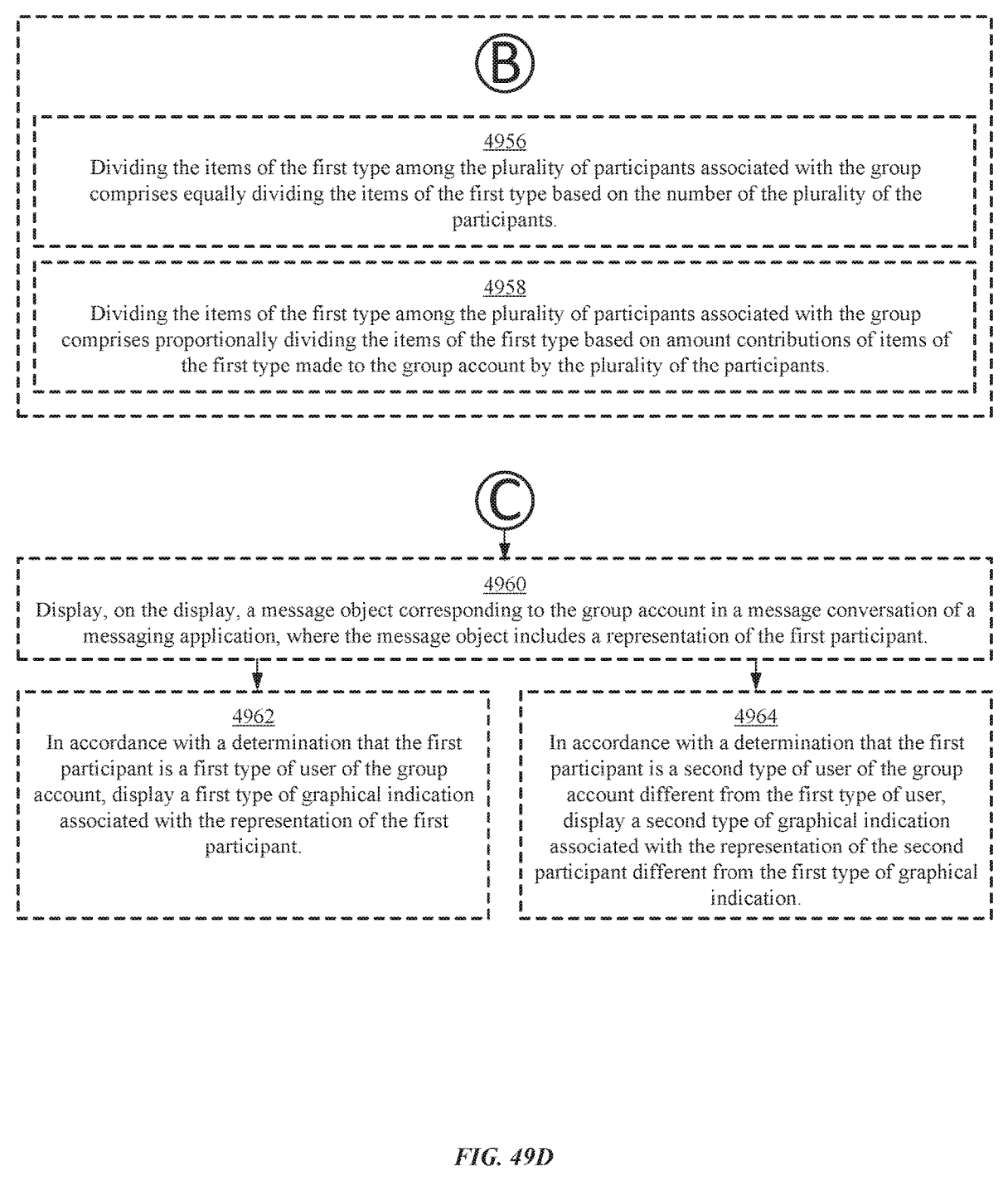

4956
Dividing the items of the first type among the plurality of participants associated with the group comprises equally dividing the items of the first type based on the number of the plurality of the participants.

4958
Dividing the items of the first type among the plurality of participants associated with the group comprises proportionally dividing the items of the first type based on amount contributions of items of the first type made to the group account by the plurality of the participants.

(C)

4960
Display, on the display, a message object corresponding to the group account in a message conversation of a messaging application, where the message object includes a representation of the first participant.

4962
In accordance with a determination that the first participant is a first type of user of the group account, display a first type of graphical indication associated with the representation of the first participant.

4964
In accordance with a determination that the first participant is a second type of user of the group account different from the first type of user, display a second type of graphical indication associated with the representation of the second participant different from the first type of graphical indication.

Figure 51A:
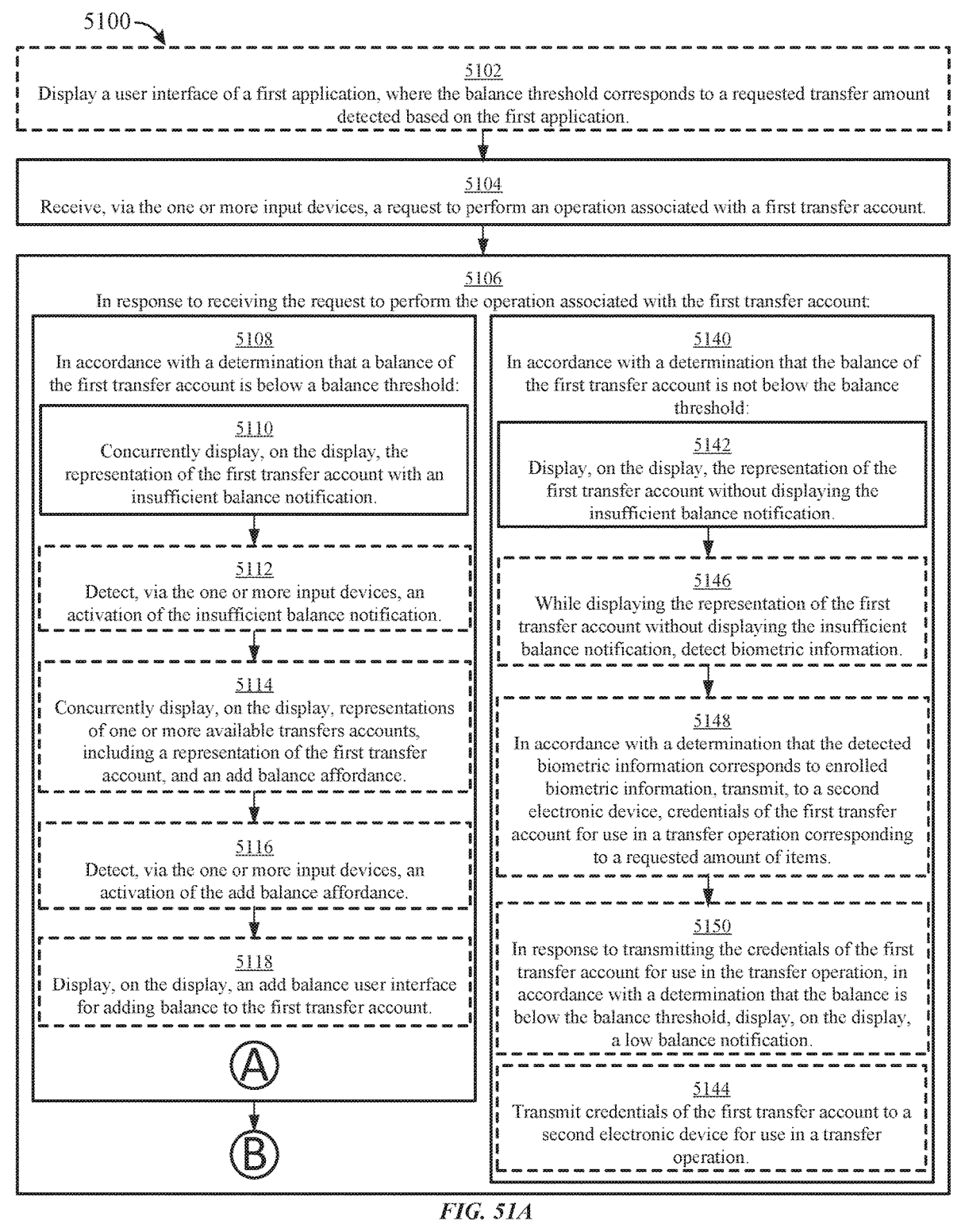

5102
Display a user interface of a first application, where the balance threshold corresponds to a requested transfer amount detected based on the first application.

5104
Receive, via the one or more input devices, a request to perform an operation associated with a first transfer account.

5106
In response to receiving the request to perform the operation associated with the first transfer account:

5108
In accordance with a determination that a balance of the first transfer account is below a balance threshold:

5110
Concurrently display, on the display, the representation of the first transfer account with an insufficient balance notification.

5112
Detect, via the one or more input devices, an activation of the insufficient balance notification.

5114
Concurrently display, on the display, representations of one or more available transfers accounts, including a representation of the first transfer account, and an add balance affordance.

5116
Detect, via the one or more input devices, an activation of the add balance affordance.

5118
Display, on the display, an add balance user interface for adding balance to the first transfer account.

A

B

5140
In accordance with a determination that the balance of the first transfer account is not below the balance threshold:

5142
Display, on the display, the representation of the first transfer account without displaying the insufficient balance notification.

5146
While displaying the representation of the first transfer account without displaying the insufficient balance notification, detect biometric information.

5148
In accordance with a determination that the detected biometric information corresponds to enrolled biometric information, transmit, to a second electronic device, credentials of the first transfer account for use in a transfer operation corresponding to a requested amount of items.

5150
In response to transmitting the credentials of the first transfer account for use in the transfer operation, in accordance with a determination that the balance is below the balance threshold, display, on the display, a low balance notification.

5144
Transmit credentials of the first transfer account to a second electronic device for use in a transfer operation.

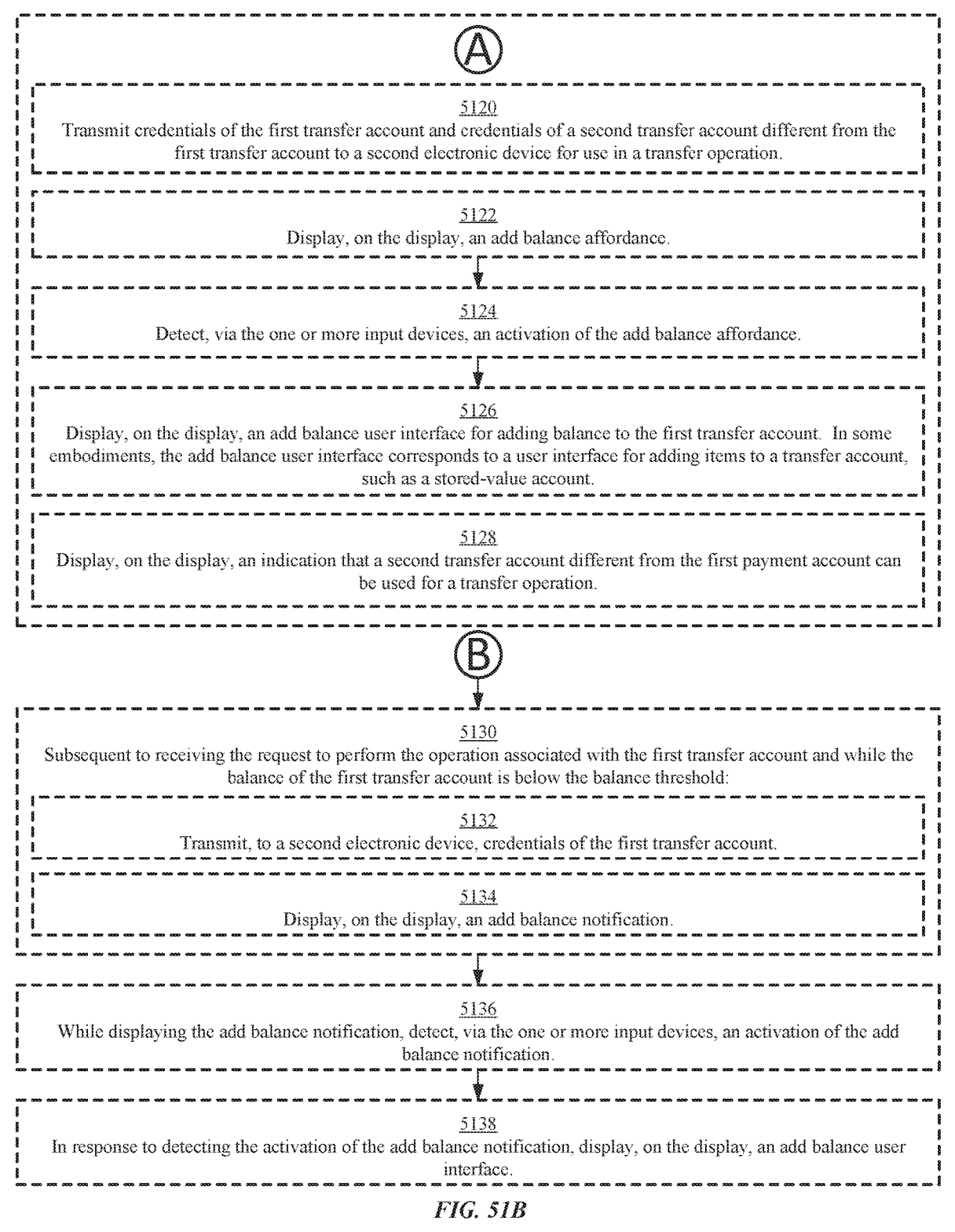

5120
Transmit credentials of the first transfer account and credentials of a second transfer account different from the first transfer account to a second electronic device for use in a transfer operation.

5122
Display, on the display, an add balance affordance.

↓

5124
Detect, via the one or more input devices, an activation of the add balance affordance.

↓

5126
Display, on the display, an add balance user interface for adding balance to the first transfer account. In some embodiments, the add balance user interface corresponds to a user interface for adding items to a transfer account, such as a stored-value account.

5128
Display, on the display, an indication that a second transfer account different from the first payment account can be used for a transfer operation.

(B)

↓

5130
Subsequent to receiving the request to perform the operation associated with the first transfer account and while the balance of the first transfer account is below the balance threshold:

5132
Transmit, to a second electronic device, credentials of the first transfer account.

5134
Display, on the display, an add balance notification.

↓

5136
While displaying the add balance notification, detect, via the one or more input devices, an activation of the add balance notification.

↓

5138
In response to detecting the activation of the add balance notification, display, on the display, an add balance user interface.

*FIG. 51B*

USER INTERFACES FOR PEER-TO-PEER TRANSFERS

CROSS-REFERENCES TO RELATED APPLICATIONS

This application is a continuation of U.S. application Ser. No. 15/981,817, entitled "USER INTERFACES FOR PEER-TO-PEER TRANSFERS," filed May 16, 2018, which claims priority to U.S. Provisional Application Ser. No. 62/507,161, entitled "USER INTERFACES FOR PEER-TO-PEER TRANSFERS," filed May 16, 2017; U.S. Provisional Application Ser. No. 62/514,945, entitled "USER INTERFACES FOR PEER-TO-PEER TRANSFERS," filed Jun. 4, 2017; U.S. Provisional Application Ser. No. 62/566,225, entitled "USER INTERFACES FOR PEER-TO-PEER TRANSFERS," filed Sep. 29, 2017; U.S. Provisional Application Ser. No. 62/672,003, entitled "USER INTERFACES FOR PEER-TO-PEER TRANSFERS," filed May 15, 2018. The contents of each of these applications are hereby incorporated by reference in their entireties.

FIELD

The present disclosure relates generally to computer user interfaces, and more specifically to interfaces and techniques for managing peer-to-peer transfers.

BACKGROUND

Peer-to-peer transfers, such as transfers of resources and files, using electronic devices are a convenient and efficient method of exchanging the resources and files. Peer-to-peer transfers enable a user to, using an electronic device, quickly and easily send an outgoing transfer and quickly and easily accept an incoming transfer.

BRIEF SUMMARY

Some techniques for managing peer-to-peer transfers using electronic devices, however, are generally cumbersome and inefficient. For example, some existing techniques require the use of certain applications that may not be commonly used by a user of a device, which may unnecessarily cause the user to open a seldom-used application. For another example, some existing techniques have limited options for making and receiving transfers. For another example, some existing techniques use a complex and time-consuming user interface, which may include multiple key presses or keystrokes. As such, existing techniques require more time than necessary, wasting user time and device energy. This latter consideration is particularly important in battery-operated devices.

Accordingly, the present technique provides electronic devices with faster, more efficient methods and interfaces for managing peer-to-peer transfers. Such methods and interfaces optionally complement or replace other methods for managing peer-to-peer transfers. Such methods and interfaces reduce the cognitive burden on a user and produce a more efficient human-machine interface. For battery-operated computing devices, such methods and interfaces conserve power and increase the time between battery charges. Such methods and interfaces also reduce the number of unnecessary, extraneous, or repetitive input required at computing devices, such as smartphones and smartwatches.

In accordance with some embodiments, a method performed at an electronic device with a display, one or more input devices, and a wireless communication radio is described. The method comprises: receiving, via the wireless communication radio, one or more messages; displaying, on the display, a user interface for a messaging application that includes at least one of the one or more messages in a message conversation between a plurality of conversation participants; while concurrently displaying, on the display, at least one of the one or more messages in the message conversation, receiving, from one of the participants, a respective message; in response to receiving the respective message, in accordance with a determination, based on an analysis of text in the respective message, that the respective message relates to a transfer of a first type of item that the messaging application is configured to transfer, concurrently displaying, on the display, a representation of the message and a selectable indication that corresponds to the first type of item; while the representation of the message and the selectable indication that corresponds to the first type of item are concurrently displayed on the display, detecting, via the one or more input devices, user activation of the selectable indication; and in response to detecting the user activation of the selectable indication, displaying, on the display, a transfer user interface for initiating transfer of the first type of item between participants in the message conversation.

In accordance with some embodiments, a non-transitory computer-readable storage medium is described. The non-transitory computer-readable storage medium storing one or more programs configured to be executed by one or more processors of an electronic device with a display, one or more input devices, and a wireless communication radio, the one or more programs including instructions for: receiving, via the wireless communication radio, one or more messages; displaying, on the display, a user interface for a messaging application that includes at least one of the one or more messages in a message conversation between a plurality of conversation participants; while concurrently displaying, on the display, at least one of the one or more messages in the message conversation, receiving, from one of the participants, a respective message; in response to receiving the respective message, in accordance with a determination, based on an analysis of text in the respective message, that the respective message relates to a transfer of a first type of item that the messaging application is configured to transfer, concurrently displaying, on the display, a representation of the message and a selectable indication that corresponds to the first type of item; while the representation of the message and the selectable indication that corresponds to the first type of item are concurrently displayed on the display, detecting, via the one or more input devices, user activation of the selectable indication; and in response to detecting the user activation of the selectable indication, displaying, on the display, a transfer user interface for initiating transfer of the first type of item between participants in the message conversation.

In accordance with some embodiments, a transitory computer-readable storage medium is described. The transitory computer-readable storage medium storing one or more programs configured to be executed by one or more processors of an electronic device with a display, one or more input devices, and a wireless communication radio, the one or more programs including instructions for: receiving, via the wireless communication radio, one or more messages; displaying, on the display, a user interface for a messaging application that includes at least one of the one or more messages in a message conversation between a plurality of conversation participants; while concurrently displaying, on the display, at least one of the one or more messages in the message conversation, receiving, from one of the participants, a respective message; in response to receiving the respective message, in accordance with a determination, based on an analysis of text in the respective message, that the respective message relates to a transfer of a first type of item that the messaging application is configured to transfer, concurrently displaying, on the display, a representation of the message and a selectable indication that corresponds to the first type of item; while the representation of the message and the selectable indication that corresponds to the first type of item are concurrently displayed on the display, detecting, via the one or more input devices, user activation of the selectable indication; and in response to detecting the user activation of the selectable indication, displaying, on the display, a transfer user interface for initiating transfer of the first type of item between participants in the message conversation.

In accordance with some embodiments, an electronic device is described. The electronic device comprises: a display; one or more input devices; a wireless communication radio; one or more processors; and memory storing one or more programs configured to be executed by the one or more processors, the one or more programs including instructions for: receiving, via the wireless communication radio, one or more messages; displaying, on the display, a user interface for a messaging application that includes at least one of the one or more messages in a message conversation between a plurality of conversation participants; while concurrently displaying, on the display, at least one of the one or more messages in the message conversation, receiving, from one of the participants, a respective message; in response to receiving the respective message, in accordance with a determination, based on an analysis of text in the respective message, that the respective message relates to a transfer of a first type of item that the messaging application is configured to transfer, concurrently displaying, on the display, a representation of the message and a selectable indication that corresponds to the first type of item; while the representation of the message and the selectable indication that corresponds to the first type of item are concurrently displayed on the display, detecting, via the one or more input devices, user activation of the selectable indication; and in response to detecting the user activation of the selectable indication, displaying, on the display, a transfer user interface for initiating transfer of the first type of item between participants in the message conversation.

In accordance with some embodiments, an electronic device is described. The electronic device comprises: a display; one or more input devices; a wireless communication radio; means for receiving, via the wireless communication radio, one or more messages; means for displaying, on the display, a user interface for a messaging application that includes at least one of the one or more messages in a message conversation between a plurality of conversation participants; means, while concurrently displaying, on the display, at least one of the one or more messages in the message conversation, for receiving, from one of the participants, a respective message; means, in response to receiving the respective message, in accordance with a determination, based on an analysis of text in the respective message, that the respective message relates to a transfer of a first type of item that the messaging application is configured to transfer, for concurrently displaying, on the display, a representation of the message and a selectable indication that corresponds to the first type of item; means, while the representation of the message and the selectable indication that corresponds to the first type of item are concurrently displayed on the display, for detecting, via the one or more input devices, user activation of the selectable indication; and means, in response to detecting the user activation of the selectable indication, for displaying, on the display, a transfer user interface for initiating transfer of the first type of item between participants in the message conversation.

In accordance with some embodiments, a method performed at an electronic device with a display and one or more sensor devices is described. The method comprises: displaying, on the display, a graphical representation of a communication; while displaying the graphical representation of the communication on the display, detecting, via the one or more sensor devices, a change in orientation of the electronic device relative to a reference point; and in response to detecting the change in the orientation of the electronic device relative to the reference point while displaying the graphical representation of the communication on the display: in accordance with a determination that the communication has a first state, displaying the graphical representation of the communication and outputting a respective type of feedback corresponding to the graphical representation of the communication, wherein the feedback indicates a magnitude of the change in the orientation of the electronic device relative to the reference point; and in accordance with a determination that the communication has a second state that is different from the first state, displaying the graphical representation of the communication without outputting feedback that indicates a magnitude of the change in the orientation of the electronic device relative to the reference point.

In accordance with some embodiments, a non-transitory computer-readable storage medium is described. The non-transitory computer-readable storage medium storing one or more programs configured to be executed by one or more processors of an electronic device with a display and one or more sensor devices, the one or more programs including instructions for: displaying, on the display, a graphical representation of a communication; while displaying the graphical representation of the communication on the display, detecting, via the one or more sensor devices, a change in orientation of the electronic device relative to a reference point; and in response to detecting the change in the orientation of the electronic device relative to the reference point while displaying the graphical representation of the communication on the display: in accordance with a determination that the communication has a first state, displaying the graphical representation of the communication and outputting a respective type of feedback corresponding to the graphical representation of the communication, wherein the feedback indicates a magnitude of the change in the orientation of the electronic device relative to the reference point; and in accordance with a determination that the communication has a second state that is different from the first state, displaying the graphical representation of the communication without outputting feedback that indicates a magnitude of the change in the orientation of the electronic device relative to the reference point.

In accordance with some embodiments, a transitory computer-readable storage medium is described. The transitory computer-readable storage medium storing one or more programs configured to be executed by one or more processors of an electronic device with a display and one or more sensor devices, the one or more programs including instructions for: displaying, on the display, a graphical representation of a communication; while displaying the graphical representation of the communication on the display, detecting, via the one or more sensor devices, a change in orientation of the electronic device relative to a reference point; and in response to detecting the change in the orientation of the electronic device relative to the reference point while displaying the graphical representation of the communication on the display: in accordance with a determination that the communication has a first state, displaying the graphical representation of the communication and outputting a respective type of feedback corresponding to the graphical representation of the communication, wherein the feedback indicates a magnitude of the change in the orientation of the electronic device relative to the reference point; and in accordance with a determination that the communication has a second state that is different from the first state, displaying the graphical representation of the communication without outputting feedback that indicates a magnitude of the change in the orientation of the electronic device relative to the reference point.

In accordance with some embodiments, an electronic device is described. The electronic device comprises: a display; one or more sensor devices; one or more processors; and memory storing one or more programs configured to be executed by the one or more processors, the one or more programs including instructions for: displaying, on the display, a graphical representation of a communication; while displaying the graphical representation of the communication on the display, detecting, via the one or more sensor devices, a change in orientation of the electronic device relative to a reference point; and in response to detecting the change in the orientation of the electronic device relative to the reference point while displaying the graphical representation of the communication on the display: in accordance with a determination that the communication has a first state, displaying the graphical representation of the communication and outputting a respective type of feedback corresponding to the graphical representation of the communication, wherein the feedback indicates a magnitude of the change in the orientation of the electronic device relative to the reference point; and in accordance with a determination that the communication has a second state that is different from the first state, displaying the graphical representation of the communication without outputting feedback that indicates a magnitude of the change in the orientation of the electronic device relative to the reference point.

In accordance with some embodiments, an electronic device is described. The electronic device comprises: a display; one or more sensor devices; means for displaying, on the display, a graphical representation of a communication; means, while displaying the graphical representation of the communication on the display, for detecting, via the one or more sensor devices, a change in orientation of the electronic device relative to a reference point; and means, in response to detecting the change in the orientation of the electronic device relative to the reference point while displaying the graphical representation of the communication on the display, for: in accordance with a determination that the communication has a first state, displaying the graphical representation of the communication and outputting a respective type of feedback corresponding to the graphical representation of the communication, wherein the feedback indicates a magnitude of the change in the orientation of the electronic device relative to the reference point; and in accordance with a determination that the communication has a second state that is different from the first state, displaying the graphical representation of the communication without outputting feedback that indicates a magnitude of the change in the orientation of the electronic device relative to the reference point.

In accordance with some embodiments, a method performed at an electronic device with a display and one or more input devices is described. The method comprises: displaying, on the display, a numerical value selection user interface; while displaying the numerical value selection user interface, receiving, via the one or more input devices, an input that corresponds to selection of a respective numerical value from a plurality of numerical values in the numerical value selection interface; in response to receiving the input that corresponds to the selection of the respective numerical value, displaying, on the display, a representation of the respective numerical value in the numerical value selection user interface; while displaying the representation of the respective numerical value in the numerical value selection user interface, receiving, via the one or more input devices, an input that corresponds to a request to send a message, via a messaging application, that corresponds to the respective numerical value; and in response to receiving the input that corresponds to the request to send the message, via the messaging application, that corresponds to the respective numerical value, sending the message that corresponds to the respective numerical value to one or more participants, and: in accordance with a determination that the message is designated as a transmission message for the respective numerical value, displaying, on the display, a first message object in a message transcript of the messaging application, wherein the first message object includes a graphical representation of the respective numerical value in a respective font that is associated with requests generated using the numerical value selection user interface; and in accordance with a determination that the message is designated as a request message for the respective numerical value, displaying, on the display, a second message object in the message transcript of the messaging application different from the first message object, wherein, in the second message object: the respective numerical value is displayed in the message object in a font that is smaller than the respective font; and a predetermined request indicator associated with requests generated using the numerical value selection user interface is displayed in the respective font.

In accordance with some embodiments, a non-transitory computer-readable storage medium is described. The non-transitory computer-readable storage medium storing one or more programs configured to be executed by one or more processors of an electronic device with a display and one or more input devices, the one or more programs including instructions for: displaying, on the display, a numerical value selection user interface; while displaying the numerical value selection user interface, receiving, via the one or more input devices, an input that corresponds to selection of a respective numerical value from a plurality of numerical values in the numerical value selection interface; in response to receiving the input that corresponds to the selection of the respective numerical value, displaying, on the display, a representation of the respective numerical value in the numerical value selection user interface; while displaying the representation of the respective numerical value in the numerical value selection user interface, receiving, via the one or more input devices, an input that corresponds to a request to send a message, via a messaging application, that corresponds to the respective numerical value; and in response to receiving the input that corresponds to the request to send the message, via the messaging application, that corresponds to the respective numerical value, sending the message that corresponds to the respective numerical value to one or more participants, and: in accordance with a determination that the message is designated as a transmission message for the respective numerical value, displaying, on the display, a first message object in a message transcript of the messaging application, wherein the first message object includes a graphical representation of the respective numerical value in a respective font that is associated with requests generated using the numerical value selection user interface; and in accordance with a determination that the message is designated as a request message for the respective numerical value, displaying, on the display, a second message object in the message transcript of the messaging application different from the first message object, wherein, in the second message object: the respective numerical value is displayed in the message object in a font that is smaller than the respective font; and a predetermined request indicator associated with requests generated using the numerical value selection user interface is displayed in the respective font.

In accordance with some embodiments, a transitory computer-readable storage medium is described. The transitory computer-readable storage medium storing one or more programs configured to be executed by one or more processors of an electronic device with a display and one or more input devices, the one or more programs including instructions for: displaying, on the display, a numerical value selection user interface; while displaying the numerical value selection user interface, receiving, via the one or more input devices, an input that corresponds to selection of a respective numerical value from a plurality of numerical values in the numerical value selection interface; in response to receiving the input that corresponds to the selection of the respective numerical value, displaying, on the display, a representation of the respective numerical value in the numerical value selection user interface; while displaying the representation of the respective numerical value in the numerical value selection user interface, receiving, via the one or more input devices, an input that corresponds to a request to send a message, via a messaging application, that corresponds to the respective numerical value; and in response to receiving the input that corresponds to the request to send the message, via the messaging application, that corresponds to the respective numerical value, sending the message that corresponds to the respective numerical value to one or more participants, and: in accordance with a determination that the message is designated as a transmission message for the respective numerical value, displaying, on the display, a first message object in a message transcript of the messaging application, wherein the first message object includes a graphical representation of the respective numerical value in a respective font that is associated with requests generated using the numerical value selection user interface; and in accordance with a determination that the message is designated as a request message for the respective numerical value, displaying, on the display, a second message object in the message transcript of the messaging application different from the first message object, wherein, in the second message object: the respective numerical value is displayed in the message object in a font that is smaller than the respective font; and a predetermined request indicator associated with requests generated using the numerical value selection user interface is displayed in the respective font.

In accordance with some embodiments, an electronic device is described. The electronic device comprises: a display; one or more input devices; one or more processors; and memory storing one or more programs configured to be executed by the one or more processors, the one or more programs including instructions for: displaying, on the display, a numerical value selection user interface; while displaying the numerical value selection user interface, receiving, via the one or more input devices, an input that corresponds to selection of a respective numerical value from a plurality of numerical values in the numerical value selection interface; in response to receiving the input that corresponds to the selection of the respective numerical value, displaying, on the display, a representation of the respective numerical value in the numerical value selection user interface; while displaying the representation of the respective numerical value in the numerical value selection user interface, receiving, via the one or more input devices, an input that corresponds to a request to send a message, via a messaging application, that corresponds to the respective numerical value; and in response to receiving the input that corresponds to the request to send the message, via the messaging application, that corresponds to the respective numerical value, sending the message that corresponds to the respective numerical value to one or more participants, and: in accordance with a determination that the message is designated as a transmission message for the respective numerical value, displaying, on the display, a first message object in a message transcript of the messaging application, wherein the first message object includes a graphical representation of the respective numerical value in a respective font that is associated with requests generated using the numerical value selection user interface; and in accordance with a determination that the message is designated as a request message for the respective numerical value, displaying, on the display, a second message object in the message transcript of the messaging application different from the first message object, wherein, in the second message object: the respective numerical value is displayed in the message object in a font that is smaller than the respective font; and a predetermined request indicator associated with requests generated using the numerical value selection user interface is displayed in the respective font.

In accordance with some embodiments, an electronic device is described. The electronic device comprises: a display; one or more input devices; means for displaying, on the display, a numerical value selection user interface; means, while displaying the numerical value selection user interface, for receiving, via the one or more input devices, an input that corresponds to selection of a respective numerical value from a plurality of numerical values in the numerical value selection interface; means, in response to receiving the input that corresponds to the selection of the respective numerical value, for displaying, on the display, a representation of the respective numerical value in the numerical value selection user interface; means, while displaying the representation of the respective numerical value in the numerical value selection user interface, for receiving, via the one or more input devices, an input that corresponds to a request to send a message, via a messaging application, that corresponds to the respective numerical value; and means, in response to receiving the input that corresponds to the request to send the message, via the messaging application, that corresponds to the respective numerical value, for sending the message that corresponds to the respective numerical value to one or more participants, and: means, in accordance with a determination that the message is designated as a transmission message for the respective numerical value, for displaying, on the display, a first message object in a message transcript of the messaging application, wherein the first message object includes a graphical representation of the respective numerical value in a respective font that is associated with requests generated using the numerical value selection user interface; and means, in accordance with a determination that the message is designated as a request message for the respective numerical value, for displaying, on the display, a second message object in the message transcript of the messaging application different from the first message object, wherein, in the second message object: the respective numerical value is displayed in the message object in a font that is smaller than the respective font; and a predetermined request indicator associated with requests generated using the numerical value selection user interface is displayed in the respective font.

In accordance with some embodiments, a method performed at an electronic device with a display and one or more input devices is described. The method comprises: displaying, on the display, a message object in a message conversation, wherein the message object includes an indication of a first one or more items sent from a participant in the conversation to a user of the electronic device; while displaying at least a portion of the message conversation, detecting, via the one or more input devices, an input that corresponds to a request to obtain the first one or more items; and in response to detecting the input that corresponds to the request to obtain the first one or more items: in accordance with a determination that the electronic device is associated with an activated account that is authorized to obtain the first one or more items, proceeding to obtain the first one or more items; and in accordance with a determination that the electronic device is not associated with an activated account that is authorized to obtain the first content, displaying, on the display, a second affordance for activating an account that is authorized to obtain the first one or more items.

In accordance with some embodiments, a non-transitory computer-readable storage medium is described. The non-transitory computer-readable storage medium storing one or more programs configured to be executed by one or more processors of an electronic device with a display and one or more input devices, the one or more programs including instructions for: displaying, on the display, a message object in a message conversation, wherein the message object includes an indication of a first one or more items sent from a participant in the conversation to a user of the electronic device; while displaying at least a portion of the message conversation, detecting, via the one or more input devices, an input that corresponds to a request to obtain the first one or more items; and in response to detecting the input that corresponds to the request to obtain the first one or more items: in accordance with a determination that the electronic device is associated with an activated account that is authorized to obtain the first one or more items, proceeding to obtain the first one or more items; and in accordance with a determination that the electronic device is not associated with an activated account that is authorized to obtain the first content, displaying, on the display, a second affordance for activating an account that is authorized to obtain the first one or more items.

In accordance with some embodiments, a transitory computer-readable storage medium is described. The transitory computer-readable storage medium storing one or more programs configured to be executed by one or more processors of an electronic device with a display and one or more input devices, the one or more programs including instructions for: displaying, on the display, a message object in a message conversation, wherein the message object includes an indication of a first one or more items sent from a participant in the conversation to a user of the electronic device; while displaying at least a portion of the message conversation, detecting, via the one or more input devices, an input that corresponds to a request to obtain the first one or more items; and in response to detecting the input that corresponds to the request to obtain the first one or more items: in accordance with a determination that the electronic device is associated with an activated account that is authorized to obtain the first one or more items, proceeding to obtain the first one or more items; and in accordance with a determination that the electronic device is not associated with an activated account that is authorized to obtain the first content, displaying, on the display, a second affordance for activating an account that is authorized to obtain the first one or more items.

In accordance with some embodiments, an electronic device is described. The electronic device comprises: a display; one or more input devices; one or more processors; and memory storing one or more programs configured to be executed by the one or more processors, the one or more programs including instructions for: displaying, on the display, a message object in a message conversation, wherein the message object includes an indication of a first one or more items sent from a participant in the conversation to a user of the electronic device; while displaying at least a portion of the message conversation, detecting, via the one or more input devices, an input that corresponds to a request to obtain the first one or more items; and in response to detecting the input that corresponds to the request to obtain the first one or more items: in accordance with a determination that the electronic device is associated with an activated account that is authorized to obtain the first one or more items, proceeding to obtain the first one or more items; and in accordance with a determination that the electronic device is not associated with an activated account that is authorized to obtain the first content, displaying, on the display, a second affordance for activating an account that is authorized to obtain the first one or more items.

In accordance with some embodiments, an electronic device is described. The electronic device comprises: a display; one or more input devices; means for displaying, on the display, a message object in a message conversation, wherein the message object includes an indication of a first one or more items sent from a participant in the conversation to a user of the electronic device; means, while displaying at least a portion of the message conversation, for detecting, via the one or more input devices, an input that corresponds to a request to obtain the first one or more items; and means, in response to detecting the input that corresponds to the request to obtain the first one or more items, for: in accordance with a determination that the electronic device is associated with an activated account that is authorized to obtain the first one or more items, proceeding to obtain the first one or more items; and in accordance with a determination that the electronic device is not associated with an activated account that is authorized to obtain the first content, displaying, on the display, a second affordance for activating an account that is authorized to obtain the first one or more items.

In accordance with some embodiments, a method performed at an electronic device with a display, a wireless transmission device, and one or more input devices is described. The method comprises: receiving a request to provide restricted credentials associated with a user of the device via the wireless transmission device to an external device; in response to receiving the request to provide the restricted credentials, concurrently displaying, on the display: a representation of a first account associated with first restricted credentials at a first location of the display, wherein the first account is selected for use in providing the restricted credentials, and at least a portion of a representation of a second account associated with second restricted credentials at a second location of the display, wherein display of at least the portion of the representation of the second account includes display of a usage metric for the second account detecting, via the one or more input devices, user selection of the representation of the second account; and in response to detecting the user selection of the representation of the second account: replacing display of the representation of the first account with the representation of the second account at the first location of the display, and selecting the second account for use in providing the restricted credentials In accordance with some embodiments, a non-transitory computer-readable storage medium is described. The non-transitory computer-readable storage medium storing one or more programs configured to be executed by one or more processors of an electronic device with a display, a wireless transmission device, and one or more input devices, the one or more programs including instructions for: receiving a request to provide restricted credentials associated with a user of the device via the wireless transmission device to an external device; in response to receiving the request to provide the restricted credentials, concurrently displaying, on the display: a representation of a first account associated with first restricted credentials at a first location of the display, wherein the first account is selected for use in providing the restricted credentials, and at least a portion of a representation of a second account associated with second restricted credentials at a second location of the display, wherein display of at least the portion of the representation of the second account includes display of a usage metric for the second account; detecting, via the one or more input devices, user selection of the representation of the second account; and in response to detecting the user selection of the representation of the second account: replacing display of the representation of the first account with the representation of the second account at the first location of the display, and selecting the second account for use in providing the restricted credentials.

In accordance with some embodiments, a transitory computer-readable storage medium is described. The transitory computer-readable storage medium storing one or more programs configured to be executed by one or more processors of an electronic device with a display, a wireless transmission device, and one or more input devices, the one or more programs including instructions for: receiving a request to provide restricted credentials associated with a user of the device via the wireless transmission device to an external device; in response to receiving the request to provide the restricted credentials, concurrently displaying, on the display: a representation of a first account associated with first restricted credentials at a first location of the display, wherein the first account is selected for use in providing the restricted credentials, and at least a portion of a representation of a second account associated with second restricted credentials at a second location of the display, wherein display of at least the portion of the representation of the second account includes display of a usage metric for the second account; detecting, via the one or more input devices, user selection of the representation of the second account; and in response to detecting the user selection of the representation of the second account: replacing display of the representation of the first account with the representation of the second account at the first location of the display, and selecting the second account for use in providing the restricted credentials.

In accordance with some embodiments, an electronic device is described. The electronic device comprises: a display; a wireless transmission device; one or more input devices; one or more processors; and memory storing one or more programs configured to be executed by the one or more processors, the one or more programs including instructions for: receiving a request to provide restricted credentials associated with a user of the device via the wireless transmission device to an external device; in response to receiving the request to provide the restricted credentials, concurrently displaying, on the display: a representation of a first account associated with first restricted credentials at a first location of the display, wherein the first account is selected for use in providing the restricted credentials, and at least a portion of a representation of a second account associated with second restricted credentials at a second location of the display, wherein display of at least the portion of the representation of the second account includes display of a usage metric for the second account: detecting, via the one or more input devices, user selection of the representation of the second account; and in response to detecting the user selection of the representation of the second account: replacing display of the representation of the first account with the representation of the second account at the first location of the display, and selecting the second account for use in providing the restricted credentials.

In accordance with some embodiments, an electronic device is described. The electronic device comprises: a display; a wireless transmission device; one or more input devices; means for receiving a request to provide restricted credentials associated with a user of the device via the wireless transmission device to an external device; means, in response to receiving the request to provide the restricted credentials, for concurrently displaying, on the display: a representation of a first account associated with first restricted credentials at a first location of the display, wherein the first account is selected for use in providing the restricted credentials, and at least a portion of a representation of a second account associated with second restricted credentials at a second location of the display, wherein display of at least the portion of the representation of the second account includes display of a usage metric for the second account means for detecting, via the one or more input devices, user selection of the representation of the second account; and means, in response to detecting the user selection of the representation of the second account, for: replacing display of the representation of the first account with the representation of the second account at the first location of the display, and selecting the second account for use in providing the restricted credentials In accordance with some embodiments, a method performed at an electronic device with a display and one or more input devices is described. The method comprises: receiving a request to participate in a transfer of resources for a requested resource amount using a first resource account; and in response to receiving the request to participate in the transfer of resources for the requested resource amount using the first resource account: in accordance with a determination that the requested resource amount is equal to or less than an amount of resources available via the first resource account, automatically proceeding with the transfer of resources using only the first resource account, and in accordance with a determination that the requested resource amount is greater than the amount of resources available via the first resource account, automatically proceeding with the transfer of resources using the first resource account and a second resource account different from the first resource account.

In accordance with some embodiments, a non-transitory computer-readable storage medium is described. The non-transitory computer-readable storage medium storing one or more programs configured to be executed by one or more processors of an electronic device with a display and one or more input devices, the one or more programs including instructions for: receiving a request to participate in a transfer of resources for a requested resource amount using a first resource account; and in response to receiving the request to participate in the transfer of resources for the requested resource amount using the first resource account: in accordance with a determination that the requested resource amount is equal to or less than an amount of resources available via the first resource account, automatically proceeding with the transfer of resources using only the first resource account, and in accordance with a determination that the requested resource amount is greater than the amount of resources available via the first resource account, automatically proceeding with the transfer of resources using the first resource account and a second resource account different from the first resource account.

In accordance with some embodiments, a transitory computer-readable storage medium is described. The transitory computer-readable storage medium storing one or more programs configured to be executed by one or more processors of an electronic device with a display and one or more input devices, the one or more programs including instructions for: receiving a request to participate in a transfer of resources for a requested resource amount using a first resource account; and in response to receiving the request to participate in the transfer of resources for the requested resource amount using the first resource account: in accordance with a determination that the requested resource amount is equal to or less than an amount of resources available via the first resource account, automatically proceeding with the transfer of resources using only the first resource account, and in accordance with a determination that the requested resource amount is greater than the amount of resources available via the first resource account, automatically proceeding with the transfer of resources using the first resource account and a second resource account different from the first resource account.

In accordance with some embodiments, an electronic device is described. The electronic device comprises: a display; one or more input devices; one or more processors; and memory storing one or more programs configured to be executed by the one or more processors, the one or more programs including instructions for: receiving a request to participate in a transfer of resources for a requested resource amount using a first resource account; and in response to receiving the request to participate in the transfer of resources for the requested resource amount using the first resource account: in accordance with a determination that the requested resource amount is equal to or less than an amount of resources available via the first resource account, automatically proceeding with the transfer of resources using only the first resource account, and in accordance with a determination that the requested resource amount is greater than the amount of resources available via the first resource account, automatically proceeding with the transfer of resources using the first resource account and a second resource account different from the first resource account.

In accordance with some embodiments, an electronic device is described. The electronic device comprises: a display; one or more input devices; means for receiving a request to participate in a transfer of resources for a requested resource amount using a first resource account; and means, in response to receiving the request to participate in the transfer of resources for the requested resource amount using the first resource account, for: in accordance with a determination that the requested resource amount is equal to or less than an amount of resources available via the first resource account, automatically proceeding with the transfer of resources using only the first resource account, and in accordance with a determination that the requested resource amount is greater than the amount of resources available via the first resource account, automatically proceeding with the transfer of resources using the first resource account and a second resource account different from the first resource account.

In accordance with some embodiments, a method performed at an electronic device with a display is described. The method comprises: receiving one or more messages in a first conversation of electronic messages that includes messages from a user of the electronic device to a first participant and messages from the first participant to the user of the electronic device, the one or more messages in the first conversation including a first message that is associated with the transfer of a first additional item; receiving one or more messages in a second conversation of electronic messages that includes messages from the user of the electronic device to a second participant and messages from the second participant to the user of the electronic device, the one or more messages in the second conversation including a second message that is associated with the transfer of a second additional item; and concurrently displaying, on the display: a first item associated with the first participant, wherein the first item includes first information from the first message in the first conversation of electronic messages and a representation of the first additional item; and a second item associated with the second participant, wherein the second item includes second information from the second message in the second conversation of electronic messages and a representation of the second additional item.

In accordance with some embodiments, a non-transitory computer-readable storage medium is described. The non-transitory computer-readable storage medium storing one or more programs configured to be executed by one or more processors of an electronic device with a display, the one or more programs including instructions for: receiving one or more messages in a first conversation of electronic messages that includes messages from a user of the electronic device to a first participant and messages from the first participant to the user of the electronic device, the one or more messages in the first conversation including a first message that is associated with the transfer of a first additional item; receiving one or more messages in a second conversation of electronic messages that includes messages from the user of the electronic device to a second participant and messages from the second participant to the user of the electronic device, the one or more messages in the second conversation including a second message that is associated with the transfer of a second additional item; and concurrently displaying, on the display: a first item associated with the first participant, wherein the first item includes first information from the first message in the first conversation of electronic messages and a representation of the first additional item; and a second item associated with the second participant, wherein the second item includes second information from the second message in the second conversation of electronic messages and a representation of the second additional item.

In accordance with some embodiments, a transitory computer-readable storage medium is described. The transitory computer-readable storage medium storing one or more programs configured to be executed by one or more processors of an electronic device with a display, the one or more programs including instructions for: receiving one or more messages in a first conversation of electronic messages that includes messages from a user of the electronic device to a first participant and messages from the first participant to the user of the electronic device, the one or more messages in the first conversation including a first message that is associated with the transfer of a first additional item; receiving one or more messages in a second conversation of electronic messages that includes messages from the user of the electronic device to a second participant and messages from the second participant to the user of the electronic device, the one or more messages in the second conversation including a second message that is associated with the transfer of a second additional item; and concurrently displaying, on the display: a first item associated with the first participant, wherein the first item includes first information from the first message in the first conversation of electronic messages and a representation of the first additional item; and a second item associated with the second participant, wherein the second item includes second information from the second message in the second conversation of electronic messages and a representation of the second additional item.

In accordance with some embodiments, an electronic device is described. The electronic device comprises: a display; one or more processors; and memory storing one or more programs configured to be executed by the one or more processors, the one or more programs including instructions for: receiving one or more messages in a first conversation of electronic messages that includes messages from a user of the electronic device to a first participant and messages from the first participant to the user of the electronic device, the one or more messages in the first conversation including a first message that is associated with the transfer of a first additional item; receiving one or more messages in a second conversation of electronic messages that includes messages from the user of the electronic device to a second participant and messages from the second participant to the user of the electronic device, the one or more messages in the second conversation including a second message that is associated with the transfer of a second additional item; and concurrently displaying, on the display: a first item associated with the first participant, wherein the first item includes first information from the first message in the first conversation of electronic messages and a representation of the first additional item; and a second item associated with the second participant, wherein the second item includes second information from the second message in the second conversation of electronic messages and a representation of the second additional item.

In accordance with some embodiments, an electronic device is described. The electronic device comprises: a display; means for receiving one or more messages in a first conversation of electronic messages that includes messages from a user of the electronic device to a first participant and messages from the first participant to the user of the electronic device, the one or more messages in the first conversation including a first message that is associated with the transfer of a first additional item; means for receiving one or more messages in a second conversation of electronic messages that includes messages from the user of the electronic device to a second participant and messages from the second participant to the user of the electronic device, the one or more messages in the second conversation including a second message that is associated with the transfer of a second additional item; and means for concurrently displaying, on the display: a first item associated with the first participant, wherein the first item includes first information from the first message in the first conversation of electronic messages and a representation of the first additional item; and a second item associated with the second participant, wherein the second item includes second information from the second message in the second conversation of electronic messages and a representation of the second additional item.

In accordance with some embodiments, a method performed at an electronic device with one or more output devices including a display and one or more input devices is described. The method comprises: receiving, via the one or more input devices, an utterance from a user that corresponds to a request to perform an operation; in response to receiving the utterance, preparing to perform the operation: in accordance with a determination that the operation requires authorization, preparing to perform the operation includes presenting, via the one or more output devices of the device: a representation of the operation; and instructions for providing authorization to the device, via the one or more input devices of the device, to perform the operation; after preparing to perform the operation, receiving a confirmation input associated with performing the operation; and in response to receiving the confirmation input: in accordance with a determination that the operation requires authorization and the operation has not been authorized, forgoing performing the operation in response to the confirmation input; in accordance with a determination that the operation requires authorization and the operation has been authorized, performing the operation in response to the confirmation input; and in accordance with a determination that the operation does not require authorization, performing the operation in response to the confirmation input.

In accordance with some embodiments, a non-transitory computer-readable storage medium is described. The non-transitory computer-readable storage medium storing one or more programs configured to be executed by one or more processors of an electronic device with one or more output devices including a display and one or more input devices, the one or more programs including instructions for: receiving, via the one or more input devices, an utterance from a user that corresponds to a request to perform an operation; in response to receiving the utterance, preparing to perform the operation: in accordance with a determination that the operation requires authorization, preparing to perform the operation includes presenting, via the one or more output devices of the device: a representation of the operation; and instructions for providing authorization to the device, via the one or more input devices of the device, to perform the operation; after preparing to perform the operation, receiving a confirmation input associated with performing the operation; and in response to receiving the confirmation input: in accordance with a determination that the operation requires authorization and the operation has not been authorized, forgoing performing the operation in response to the confirmation input; in accordance with a determination that the operation requires authorization and the operation has been authorized, performing the operation in response to the confirmation input; and in accordance with a determination that the operation does not require authorization, performing the operation in response to the confirmation input.

In accordance with some embodiments, a transitory computer-readable storage medium is described. The transitory computer-readable storage medium storing one or more programs configured to be executed by one or more processors of an electronic device with one or more output devices including a display and one or more input devices, the one or more programs including instructions for: receiving, via the one or more input devices, an utterance from a user that corresponds to a request to perform an operation; in response to receiving the utterance, preparing to perform the operation: in accordance with a determination that the operation requires authorization, preparing to perform the operation includes presenting, via the one or more output devices of the device: a representation of the operation; and instructions for providing authorization to the device, via the one or more input devices of the device, to perform the operation; after preparing to perform the operation, receiving a confirmation input associated with performing the operation; and in response to receiving the confirmation input: in accordance with a determination that the operation requires authorization and the operation has not been authorized, forgoing performing the operation in response to the confirmation input; in accordance with a determination that the operation requires authorization and the operation has been authorized, performing the operation in response to the confirmation input; and in accordance with a determination that the operation does not require authorization, performing the operation in response to the confirmation input.

In accordance with some embodiments, an electronic device is described. The electronic device comprises: one or more output devices including a display; one or more input devices; one or more processors; and memory storing one or more programs configured to be executed by the one or more processors, the one or more programs including instructions for: receiving, via the one or more input devices, an utterance from a user that corresponds to a request to perform an operation; in response to receiving the utterance, preparing to perform the operation: in accordance with a determination that the operation requires authorization, preparing to perform the operation includes presenting, via the one or more output devices of the device: a representation of the operation; and instructions for providing authorization to the device, via the one or more input devices of the device, to perform the operation; after preparing to perform the operation, receiving a confirmation input associated with performing the operation; and in response to receiving the confirmation input: in accordance with a determination that the operation requires authorization and the operation has not been authorized, forgoing performing the operation in response to the confirmation input; in accordance with a determination that the operation requires authorization and the operation has been authorized, performing the operation in response to the confirmation input; and in accordance with a determination that the operation does not require authorization, performing the operation in response to the confirmation input.

In accordance with some embodiments, an electronic device is described. The electronic device comprises: one or more output devices, including a display; one or more input devices; means for receiving, via the one or more input devices, an utterance from a user that corresponds to a request to perform an operation; means, responsive to receiving the utterance, preparing to perform the operation, for: in accordance with a determination that the operation requires authorization, preparing to perform the operation includes presenting, via the one or more output devices of the device: a representation of the operation; and instructions for providing authorization to the device, via the one or more input devices of the device, to perform the operation; means, after preparing to perform the operation, for receiving a confirmation input associated with performing the operation; and means, responsive to receiving the confirmation input, for: in accordance with a determination that the operation requires authorization and the operation has not been authorized, forgoing performing the operation in response to the confirmation input; in accordance with a determination that the operation requires authorization and the operation has been authorized, performing the operation in response to the confirmation input; and in accordance with a determination that the operation does not require authorization, performing the operation in response to the confirmation input.

In accordance with some embodiments, a method performed at an electronic device with a display and one or more sensor devices is described. The method comprises: while the device is at a first orientation relative to a baseline orientation with respect to a reference point, displaying, on the display, a user interface object; while displaying the user interface object, detecting, via the one or more sensor devices, a change in orientation of the device from the first orientation relative to the reference point to a respective orientation relative to the reference point; in response to detecting the change in orientation of the device: changing an appearance of the user interface object by applying a visual effect to the user interface object that varies a set of one or more parameters of the user interface object as the orientation of the device changes relative to the reference point; in accordance with a determination that the change in orientation of the device includes movement, towards the baseline orientation, that meets predetermined criteria, reducing an amplitude of the visual effect; and in accordance with a determination that the change in orientation of the device includes movement, away from the baseline orientation, that meets the predetermined criteria, continuing to apply the visual effect to the user interface object without reducing the amplitude of the visual effect.

In accordance with some embodiments, a non-transitory computer-readable storage medium is described. The non-transitory computer-readable storage medium storing one or more programs configured to be executed by one or more processors of an electronic device with a display and one or more sensor devices, the one or more programs including instructions for: while the device is at a first orientation relative to a baseline orientation with respect to a reference point, displaying, on the display, a user interface object; while displaying the user interface object, detecting, via the one or more sensor devices, a change in orientation of the device from the first orientation relative to the reference point to a respective orientation relative to the reference point; in response to detecting the change in orientation of the device: changing an appearance of the user interface object by applying a visual effect to the user interface object that varies a set of one or more parameters of the user interface object as the orientation of the device changes relative to the reference point; in accordance with a determination that the change in orientation of the device includes movement, towards the baseline orientation, that meets predetermined criteria, reducing an amplitude of the visual effect; and in accordance with a determination that the change in orientation of the device includes movement, away from the baseline orientation, that meets the predetermined criteria, continuing to apply the visual effect to the user interface object without reducing the amplitude of the visual effect.

In accordance with some embodiments, a transitory computer-readable storage medium is described. The transitory computer-readable storage medium storing one or more programs configured to be executed by one or more processors of an electronic device with a display and one or more sensor devices, the one or more programs including instructions for: while the device is at a first orientation relative to a baseline orientation with respect to a reference point, displaying, on the display, a user interface object; while displaying the user interface object, detecting, via the one or more sensor devices, a change in orientation of the device from the first orientation relative to the reference point to a respective orientation relative to the reference point; in response to detecting the change in orientation of the device: changing an appearance of the user interface object by applying a visual effect to the user interface object that varies a set of one or more parameters of the user interface object as the orientation of the device changes relative to the reference point; in accordance with a determination that the change in orientation of the device includes movement, towards the baseline orientation, that meets predetermined criteria, reducing an amplitude of the visual effect; and in accordance with a determination that the change in orientation of the device includes movement, away from the baseline orientation, that meets the predetermined criteria, continuing to apply the visual effect to the user interface object without reducing the amplitude of the visual effect.

In accordance with some embodiments, an electronic device is described. The electronic device comprises: a display; one or more sensor devices; one or more processors; and memory storing one or more programs configured to be executed by the one or more processors, the one or more programs including instructions for: while the device is at a first orientation relative to a baseline orientation with respect to a reference point, displaying, on the display, a user interface object; while displaying the user interface object, detecting, via the one or more sensor devices, a change in orientation of the device from the first orientation relative to the reference point to a respective orientation relative to the reference point; in response to detecting the change in orientation of the device: changing an appearance of the user interface object by applying a visual effect to the user interface object that varies a set of one or more parameters of the user interface object as the orientation of the device changes relative to the reference point; in accordance with a determination that the change in orientation of the device includes movement, towards the baseline orientation, that meets predetermined criteria, reducing an amplitude of the visual effect; and in accordance with a determination that the change in orientation of the device includes movement, away from the baseline orientation, that meets the predetermined criteria, continuing to apply the visual effect to the user interface object without reducing the amplitude of the visual effect.

In accordance with some embodiments, an electronic device is described. The electronic device comprises: a display; one or more sensor devices; means, while the device is at a first orientation relative to a baseline orientation with respect to a reference point, for displaying, on the display, a user interface object; means, while displaying the user interface object, for detecting, via the one or more sensor devices, a change in orientation of the device from the first orientation relative to the reference point to a respective orientation relative to the reference point; means, in response to detecting the change in orientation of the device, for: changing an appearance of the user interface object by applying a visual effect to the user interface object that varies a set of one or more parameters of the user interface object as the orientation of the device changes relative to the reference point; in accordance with a determination that the change in orientation of the device includes movement, towards the baseline orientation, that meets predetermined criteria, reducing an amplitude of the visual effect; and in accordance with a determination that the change in orientation of the device includes movement, away from the baseline orientation, that meets the predetermined criteria, continuing to apply the visual effect to the user interface object without reducing the amplitude of the visual effect.

In accordance with some embodiments, a method performed at an electronic device with a display and one or more input devices is described. The method comprises: displaying, on the display, a message compose user interface that includes a message compose region for composing messages to a recipient; while displaying the message compose user interface, receiving a request to generate a draft message that includes respective content; and in response to receiving the request to generate the draft message, displaying, in the message compose region, a representation of the draft message, wherein: in accordance with a determination that the draft message is a first type of draft message that is designated for delivery as a concealed message, displaying at least a portion of the respective content of the draft message concurrently with a representation of a concealment element; and in accordance with a determination that the draft message is a second type of draft message that is designated for delivery as an unconcealed message, displaying at least a portion of the respective content of the draft message without displaying a representation of a concealment element.

In accordance with some embodiments, a non-transitory computer-readable storage medium is described. The non-transitory computer-readable storage medium storing one or more programs configured to be executed by one or more processors of an electronic device with a display and one or more input devices, the one or more programs including instructions for: displaying, on the display, a message compose user interface that includes a message compose region for composing messages to a recipient; while displaying the message compose user interface, receiving a request to generate a draft message that includes respective content; and in response to receiving the request to generate the draft message, displaying, in the message compose region, a representation of the draft message, wherein: in accordance with a determination that the draft message is a first type of draft message that is designated for delivery as a concealed message, displaying at least a portion of the respective content of the draft message concurrently with a representation of a concealment element; and in accordance with a determination that the draft message is a second type of draft message that is designated for delivery as an unconcealed message, displaying at least a portion of the respective content of the draft message without displaying a representation of a concealment element.

In accordance with some embodiments, a transitory computer-readable storage medium is described. The non-transitory computer-readable storage medium storing one or more programs configured to be executed by one or more processors of an electronic device with a display and one or more input devices, the one or more programs including instructions for: displaying, on the display, a message compose user interface that includes a message compose region for composing messages to a recipient; while displaying the message compose user interface, receiving a request to generate a draft message that includes respective content;

and in response to receiving the request to generate the draft message, displaying, in the message compose region, a representation of the draft message, wherein: in accordance with a determination that the draft message is a first type of draft message that is designated for delivery as a concealed message, displaying at least a portion of the respective content of the draft message concurrently with a representation of a concealment element; and in accordance with a determination that the draft message is a second type of draft message that is designated for delivery as an unconcealed message, displaying at least a portion of the respective content of the draft message without displaying a representation of a concealment element.

In accordance with some embodiments, an electronic device is described. The electronic device comprises: a display; one or more input devices; one or more processors; and memory storing one or more programs configured to be executed by the one or more processors, the one or more programs including instructions for: displaying, on the display, a message compose user interface that includes a message compose region for composing messages to a recipient; while displaying the message compose user interface, receiving a request to generate a draft message that includes respective content; and in response to receiving the request to generate the draft message, displaying, in the message compose region, a representation of the draft message, wherein: in accordance with a determination that the draft message is a first type of draft message that is designated for delivery as a concealed message, displaying at least a portion of the respective content of the draft message concurrently with a representation of a concealment element; and in accordance with a determination that the draft message is a second type of draft message that is designated for delivery as an unconcealed message, displaying at least a portion of the respective content of the draft message without displaying a representation of a concealment element.

In accordance with some embodiments, an electronic device is described. The electronic device comprises: a display; one or more input devices; means for displaying, on the display, a message compose user interface that includes a message compose region for composing messages to a recipient; means, while displaying the message compose user interface, for receiving a request to generate a draft message that includes respective content; and means, in response to receiving the request to generate the draft message, for displaying, in the message compose region, a representation of the draft message, wherein: in accordance with a determination that the draft message is a first type of draft message that is designated for delivery as a concealed message, displaying at least a portion of the respective content of the draft message concurrently with a representation of a concealment element; and in accordance with a determination that the draft message is a second type of draft message that is designated for delivery as an unconcealed message, displaying at least a portion of the respective content of the draft message without displaying a representation of a concealment element.

In accordance with some embodiments, a method performed at an electronic device with a display, one or more input devices, and one or more sensors is described. The method comprises: displaying, on the display, a message user interface that includes at least a portion of a message conversation between a user of the device and one or more other participants; while displaying the message user interface, receiving a message; in response to receiving the message, displaying a representation of the message in the message conversation, including: in accordance with a determination that the message is a first type of message and is sent with instructions to initially conceal respective content of the message, displaying, in the message conversation, a concealment element that conceals the respective content of the message, wherein the concealment element is displayed with a dynamic visual effect that changes as an angle of the device relative to a reference point changes; in accordance with a determination that the message is the first type of message and was not sent with instructions to initially conceal the respective content of the message, displaying, in the message conversation, the respective content of the message with the dynamic visual effect that changes as an angle of the device relative to the reference point changes; and in accordance with a determination that the message is a second type of message, displaying, in the message conversation, the respective content of the message without the dynamic visual effect.

In accordance with some embodiments, a non-transitory computer-readable storage medium is described. The non-transitory computer-readable storage medium storing one or more programs configured to be executed by one or more processors of an electronic device with a display, one or more input devices, and one or more sensors, the one or more programs including instructions for: displaying, on the display, a message user interface that includes at least a portion of a message conversation between a user of the device and one or more other participants; while displaying the message user interface, receiving a message; in response to receiving the message, displaying a representation of the message in the message conversation, including: in accordance with a determination that the message is a first type of message and is sent with instructions to initially conceal respective content of the message, displaying, in the message conversation, a concealment element that conceals the respective content of the message, wherein the concealment element is displayed with a dynamic visual effect that changes as an angle of the device relative to a reference point changes; in accordance with a determination that the message is the first type of message and was not sent with instructions to initially conceal the respective content of the message, displaying, in the message conversation, the respective content of the message with the dynamic visual effect that changes as an angle of the device relative to the reference point changes; and in accordance with a determination that the message is a second type of message, displaying, in the message conversation, the respective content of the message without the dynamic visual effect.

In accordance with some embodiments, a transitory computer-readable storage medium is described. The non-transitory computer-readable storage medium storing one or more programs configured to be executed by one or more processors of an electronic device with a display, one or more input devices, and one or more sensors, the one or more programs including instructions for: displaying, on the display, a message user interface that includes at least a portion of a message conversation between a user of the device and one or more other participants; while displaying the message user interface, receiving a message; in response to receiving the message, displaying a representation of the message in the message conversation, including: in accordance with a determination that the message is a first type of message and is sent with instructions to initially conceal respective content of the message, displaying, in the message conversation, a concealment element that conceals the respective content of the message, wherein the concealment element is displayed with a dynamic visual effect that changes as an angle of the device relative to a reference point changes; in accordance with a determination that the message is the first type of message and was not sent with instructions to initially conceal the respective content of the message, displaying, in the message conversation, the respective content of the message with the dynamic visual effect that changes as an angle of the device relative to the reference point changes; and in accordance with a determination that the message is a second type of message, displaying, in the message conversation, the respective content of the message without the dynamic visual effect.

In accordance with some embodiments, an electronic device is described. The electronic device comprises: a display; one or more input devices; one or more sensors; one or more processors; and memory storing one or more programs configured to be executed by the one or more processors, the one or more programs including instructions for: displaying, on the display, a message user interface that includes at least a portion of a message conversation between a user of the device and one or more other participants; while displaying the message user interface, receiving a message; in response to receiving the message, displaying a representation of the message in the message conversation, including: in accordance with a determination that the message is a first type of message and is sent with instructions to initially conceal respective content of the message, displaying, in the message conversation, a concealment element that conceals the respective content of the message, wherein the concealment element is displayed with a dynamic visual effect that changes as an angle of the device relative to a reference point changes; in accordance with a determination that the message is the first type of message and was not sent with instructions to initially conceal the respective content of the message, displaying, in the message conversation, the respective content of the message with the dynamic visual effect that changes as an angle of the device relative to the reference point changes; and in accordance with a determination that the message is a second type of message, displaying, in the message conversation, the respective content of the message without the dynamic visual effect.

In accordance with some embodiments, an electronic device is described. The electronic device comprises: a display; one or more input devices; one or more sensors; means for displaying, on the display, a message user interface that includes at least a portion of a message conversation between a user of the device and one or more other participants; means, while displaying the message user interface, for receiving a message; means, in response to receiving the message, for displaying a representation of the message in the message conversation, including: means, in accordance with a determination that the message is a first type of message and is sent with instructions to initially conceal respective content of the message, for displaying, in the message conversation, a concealment element that conceals the respective content of the message, wherein the concealment element is displayed with a dynamic visual effect that changes as an angle of the device relative to a reference point changes; means, in accordance with a determination that the message is the first type of message and was not sent with instructions to initially conceal the respective content of the message, for displaying, in the message conversation, the respective content of the message with the dynamic visual effect that changes as an angle of the device relative to the reference point changes; and means, in accordance with a determination that the message is a second type of message, for displaying, in the message conversation, the respective content of the message without the dynamic visual effect.

In accordance with some embodiments, a method performed at an electronic device with a display, a secure element, and one or more wireless communication radios is described. The method comprises: provisioning, using the secure element of the device, a group account onto the electronic device; transmitting, using the one or more wireless communication radios, a request for an amount of a type of item to a plurality of participants of a message conversation; subsequent to provisioning the group account onto the electronic device using the secure element of the device: adding an amount of a type of item received from a first participant of the plurality of participants to the group account, and adding an amount of the type of item received from a second participant of the plurality of participants to the group account; receiving a request to transmit credentials of the group account; and in response to receiving the request to transmit credentials of the group account: receiving authentication information; in accordance with a determination that the authentication information received at the device corresponds to enrolled authentication information, transmitting, via the one or more wireless communication radios, credentials of the group account; and in accordance with a determination that the authentication information received at the device does not correspond to enrolled authentication information, forgoing transmitting the credentials of the group account.

In accordance with some embodiments, a non-transitory computer-readable storage medium is described. The non-transitory computer-readable storage medium storing one or more programs configured to be executed by one or more processors of an electronic device with a display, a secure element, and one or more wireless communication radios, the one or more programs including instructions for: provisioning, using the secure element of the device, a group account onto the electronic device; transmitting, using the one or more wireless communication radios, a request for an amount of a type of item to a plurality of participants of a message conversation; subsequent to provisioning the group account onto the electronic device using the secure element of the device: adding an amount of a type of item received from a first participant of the plurality of participants to the group account, and adding an amount of the type of item received from a second participant of the plurality of participants to the group account; receiving a request to transmit credentials of the group account; and in response to receiving the request to transmit credentials of the group account: receiving authentication information; in accordance with a determination that the authentication information received at the device corresponds to enrolled authentication information, transmitting, via the one or more wireless communication radios, credentials of the group account; and in accordance with a determination that the authentication information received at the device does not correspond to enrolled authentication information, forgoing transmitting the credentials of the group account.

In accordance with some embodiments, a transitory computer-readable storage medium is described. The non-transitory computer-readable storage medium storing one or more programs configured to be executed by one or more processors of an electronic device with a display, a secure element, and one or more wireless communication radios, the one or more programs including instructions for: provisioning, using the secure element of the device, a group account onto the electronic device; transmitting, using the one or more wireless communication radios, a request for an amount of a type of item to a plurality of participants of a message conversation; subsequent to provisioning the group account onto the electronic device using the secure element of the device: adding an amount of a type of item received from a first participant of the plurality of participants to the group account, and adding an amount of the type of item received from a second participant of the plurality of participants to the group account; receiving a request to transmit credentials of the group account; and in response to receiving the request to transmit credentials of the group account: receiving authentication information; in accordance with a determination that the authentication information received at the device corresponds to enrolled authentication information, transmitting, via the one or more wireless communication radios, credentials of the group account; and in accordance with a determination that the authentication information received at the device does not correspond to enrolled authentication information, forgoing transmitting the credentials of the group account.

In accordance with some embodiments, an electronic device is described. The electronic device comprises: a display; a secure element; one or more wireless communication radios; one or more processors; and memory storing one or more programs configured to be executed by the one or more processors, the one or more programs including instructions for: provisioning, using the secure element of the device, a group account onto the electronic device; transmitting, using the one or more wireless communication radios, a request for an amount of a type of item to a plurality of participants of a message conversation; subsequent to provisioning the group account onto the electronic device using the secure element of the device: adding an amount of a type of item received from a first participant of the plurality of participants to the group account, and adding an amount of the type of item received from a second participant of the plurality of participants to the group account; receiving a request to transmit credentials of the group account; and in response to receiving the request to transmit credentials of the group account: receiving authentication information; in accordance with a determination that the authentication information received at the device corresponds to enrolled authentication information, transmitting, via the one or more wireless communication radios, credentials of the group account; and in accordance with a determination that the authentication information received at the device does not correspond to enrolled authentication information, forgoing transmitting the credentials of the group account.

In accordance with some embodiments, an electronic device is described. The electronic device comprises: a display; a secure element; one or more wireless communication radios; means for provisioning, using the secure element of the device, a group account onto the electronic device; means for transmitting, using the one or more wireless communication radios, a request for an amount of a type of item to a plurality of participants of a message conversation; means, subsequent to provisioning the group account onto the electronic device using the secure element of the device, for: adding an amount of a type of item received from a first participant of the plurality of participants to the group account, and adding an amount of the type of item received from a second participant of the plurality of participants to the group account; means for receiving a request to transmit credentials of the group account; and means, in response to receiving the request to transmit credentials of the group account, for: receiving authentication information; in accordance with a determination that the authentication information received at the device corresponds to enrolled authentication information, transmitting, via the one or more wireless communication radios, credentials of the group account; and in accordance with a determination that the authentication information received at the device does not correspond to enrolled authentication information, forgoing transmitting the credentials of the group account.

In accordance with some embodiments, a method performed at an electronic device with a display and one or more input devices is described. The method comprises: displaying, on the display, at least a portion of a message conversation of a messaging application; while displaying at least the portion of the message conversation of the messaging application, displaying, on the display, a first affordance that is associated with management of items of a first type; detecting, via the one or more input devices, a user activation of the first affordance; and in response to detecting the user activation of the first affordance: in accordance with a determination that the message conversation is a group message conversation that includes more than two participants, displaying, on the display, a first user interface for setting up a shared item management account for managing items of the first type with participants in the message conversation; and in accordance with a determination that the message conversation is a one-on-one message conversation that includes two participants, displaying, on the display, a second user interface different from the first user interface for sending or requesting items of the first type from another participant in the message conversation without setting up the shared item management account for managing items of the first type.

In accordance with some embodiments, a non-transitory computer-readable storage medium is described. The non-transitory computer-readable storage medium storing one or more programs configured to be executed by one or more processors of an electronic device with a display and one or more input devices, the one or more programs including instructions for: displaying, on the display, at least a portion of a message conversation of a messaging application; while displaying at least the portion of the message conversation of the messaging application, displaying, on the display, a first affordance that is associated with management of items of a first type; detecting, via the one or more input devices, a user activation of the first affordance; and in response to detecting the user activation of the first affordance: in accordance with a determination that the message conversation is a group message conversation that includes more than two participants, displaying, on the display, a first user interface for setting up a shared item management account for managing items of the first type with participants in the message conversation; and in accordance with a determination that the message conversation is a one-on-one message conversation that includes two participants, displaying, on the display, a second user interface different from the first user interface for sending or requesting items of the first type from another participant in the message conversation without setting up the shared item management account for managing items of the first type.

In accordance with some embodiments, a transitory computer-readable storage medium is described. The non-transitory computer-readable storage medium storing one or more programs configured to be executed by one or more processors of an electronic device with a display and one or more input devices, the one or more programs including instructions for: displaying, on the display, at least a portion of a message conversation of a messaging application; while displaying at least the portion of the message conversation of the messaging application, displaying, on the display, a first affordance that is associated with management of items of a first type; detecting, via the one or more input devices, a user activation of the first affordance; and in response to detecting the user activation of the first affordance: in accordance with a determination that the message conversation is a group message conversation that includes more than two participants, displaying, on the display, a first user interface for setting up a shared item management account for managing items of the first type with participants in the message conversation; and in accordance with a determination that the message conversation is a one-on-one message conversation that includes two participants, displaying, on the display, a second user interface different from the first user interface for sending or requesting items of the first type from another participant in the message conversation without setting up the shared item management account for managing items of the first type.

In accordance with some embodiments, an electronic device is described. The electronic device comprises: a display; one or more input devices; one or more processors; and memory storing one or more programs configured to be executed by the one or more processors, the one or more programs including instructions for: displaying, on the display, at least a portion of a message conversation of a messaging application; while displaying at least the portion of the message conversation of the messaging application, displaying, on the display, a first affordance that is associated with management of items of a first type; detecting, via the one or more input devices, a user activation of the first affordance; and in response to detecting the user activation of the first affordance: in accordance with a determination that the message conversation is a group message conversation that includes more than two participants, displaying, on the display, a first user interface for setting up a shared item management account for managing items of the first type with participants in the message conversation; and in accordance with a determination that the message conversation is a one-on-one message conversation that includes two participants, displaying, on the display, a second user interface different from the first user interface for sending or requesting items of the first type from another participant in the message conversation without setting up the shared item management account for managing items of the first type.

In accordance with some embodiments, an electronic device is described. The electronic device comprises: a display; one or more input devices; means for displaying, on the display, at least a portion of a message conversation of a messaging application; means, while displaying at least the portion of the message conversation of the messaging application, for displaying, on the display, a first affordance that is associated with management of items of a first type; means for detecting, via the one or more input devices, a user activation of the first affordance; and means, in response to detecting the user activation of the first affordance, for: in accordance with a determination that the message conversation is a group message conversation that includes more than two participants, displaying, on the display, a first user interface for setting up a shared item management account for managing items of the first type with participants in the message conversation; and in accordance with a determination that the message conversation is a one-on-one message conversation that includes two participants, displaying, on the display, a second user interface different from the first user interface for sending or requesting items of the first type from another participant in the message conversation without setting up the shared item management account for managing items of the first type.

In accordance with some embodiments, a method performed at an electronic device with a display and a secure element is described. The method comprises: provisioning, using the secure element of the device, a group account onto the electronic device, wherein the group account is associated with items of a first type received from a plurality of participants associated with the group account, and wherein the group account is configured to expire after a predetermined time period; before the group account has expired, using a first subset of the items of the first type by transferring the items of the first type out of the group account; after using at least the first subset of the items of the first type, determining that the group account has expired; and in response to determining that the group account has expired: in accordance with a determination that the group account is associated with a first amount of the first type of item that is greater than zero, causing transfer of the items of the first type that are associated with the group account divided among the plurality of participants associated with the group account, including a first participant of the plurality of participants associated with the group account and a second participant of the plurality of participants associated with the group account; and in accordance with a determination that the group account is associated with a second amount of the first type of item that is greater than zero and is different from the first amount, causing transfer of the items of the first type that are associated with the group account divided among the plurality of participants associated with the group account, including the first participant of the plurality of participants associated with the group account and the second participant of the plurality of participants associated with the group account.

In accordance with some embodiments, a non-transitory computer-readable storage medium is described. The non-transitory computer-readable storage medium storing one or more programs configured to be executed by one or more processors of an electronic device with a display and a secure element, the one or more programs including instructions for: provisioning, using the secure element of the device, a group account onto the electronic device, wherein the group account is associated with items of a first type received from a plurality of participants associated with the group account, and wherein the group account is configured to expire after a predetermined time period; before the group account has expired, using a first subset of the items of the first type by transferring the items of the first type out of the group account; after using at least the first subset of the items of the first type, determining that the group account has expired; and in response to determining that the group account has expired: in accordance with a determination that the group account is associated with a first amount of the first type of item that is greater than zero, causing transfer of the items of the first type that are associated with the group account divided among the plurality of participants associated with the group account, including a first participant of the plurality of participants associated with the group account and a second participant of the plurality of participants associated with the group account; and in accordance with a determination that the group account is associated with a second amount of the first type of item that is greater than zero and is different from the first amount, causing transfer of the items of the first type that are associated with the group account divided among the plurality of participants associated with the group account, including the first participant of the plurality of participants associated with the group account and the second participant of the plurality of participants associated with the group account.

In accordance with some embodiments, a transitory computer-readable storage medium is described. The non-transitory computer-readable storage medium storing one or more programs configured to be executed by one or more processors of an electronic device with a display and a secure element, the one or more programs including instructions for: provisioning, using the secure element of the device, a group account onto the electronic device, wherein the group account is associated with items of a first type received from a plurality of participants associated with the group account, and wherein the group account is configured to expire after a predetermined time period; before the group account has expired, using a first subset of the items of the first type by transferring the items of the first type out of the group account; after using at least the first subset of the items of the first type, determining that the group account has expired; and in response to determining that the group account has expired: in accordance with a determination that the group account is associated with a first amount of the first type of item that is greater than zero, causing transfer of the items of the first type that are associated with the group account divided among the plurality of participants associated with the group account, including a first participant of the plurality of participants associated with the group account and a second participant of the plurality of participants associated with the group account; and in accordance with a determination that the group account is associated with a second amount of the first type of item that is greater than zero and is different from the first amount, causing transfer of the items of the first type that are associated with the group account divided among the plurality of participants associated with the group account, including the first participant of the plurality of participants associated with the group account and the second participant of the plurality of participants associated with the group account.

In accordance with some embodiments, an electronic device is described. The electronic device comprises: a display; a secure element; one or more processors; and memory storing one or more programs configured to be executed by the one or more processors, the one or more programs including instructions for: provisioning, using the secure element of the device, a group account onto the electronic device, wherein the group account is associated with items of a first type received from a plurality of participants associated with the group account, and wherein the group account is configured to expire after a predetermined time period; before the group account has expired, using a first subset of the items of the first type by transferring the items of the first type out of the group account; after using at least the first subset of the items of the first type, determining that the group account has expired; and in response to determining that the group account has expired: in accordance with a determination that the group account is associated with a first amount of the first type of item that is greater than zero, causing transfer of the items of the first type that are associated with the group account divided among the plurality of participants associated with the group account, including a first participant of the plurality of participants associated with the group account and a second participant of the plurality of participants associated with the group account; and in accordance with a determination that the group account is associated with a second amount of the first type of item that is greater than zero and is different from the first amount, causing transfer of the items of the first type that are associated with the group account divided among the plurality of participants associated with the group account, including the first participant of the plurality of participants associated with the group account and the second participant of the plurality of participants associated with the group account.

In accordance with some embodiments, an electronic device is described. The electronic device comprises: a display; a secure element; means for provisioning, using the secure element of the device, a group account onto the electronic device, wherein the group account is associated with items of a first type received from a plurality of participants associated with the group account, and wherein the group account is configured to expire after a predetermined time period; means, before the group account has expired, for using a first subset of the items of the first type by transferring the items of the first type out of the group account; means, after using at least the first subset of the items of the first type, for determining that the group account has expired; and means, in response to determining that the group account has expired, for: in accordance with a determination that the group account is associated with a first amount of the first type of item that is greater than zero, causing transfer of the items of the first type that are associated with the group account divided among the plurality of participants associated with the group account, including a first participant of the plurality of participants associated with the group account and a second participant of the plurality of participants associated with the group account; and in accordance with a determination that the group account is associated with a second amount of the first type of item that is greater than zero and is different from the first amount, causing transfer of the items of the first type that are associated with the group account divided among the plurality of participants associated with the group account, including the first participant of the plurality of participants associated with the group account and the second participant of the plurality of participants associated with the group account.

In accordance with some embodiments, a method performed at an electronic device with a display and one or more input devices is described. The method comprises: receiving, via the one or more input devices, a request to perform an operation associated with a first transfer account; and in response to receiving the request to perform the operation associated with the first transfer account: in accordance with a determination that a balance of the first transfer account is below a balance threshold, concurrently displaying, on the display, the representation of the first transfer account with an insufficient balance notification; and in accordance with a determination that the balance of the first transfer account is not below the balance threshold, displaying, on the display, the representation of the first transfer account without displaying the insufficient balance notification.

In accordance with some embodiments, a non-transitory computer-readable storage medium is described. The non-transitory computer-readable storage medium stores one or more programs configured to be executed by one or more processors of an electronic device with a display and one or more input devices. The one or more programs include instructions for: receiving, via the one or more input devices, a request to perform an operation associated with a first transfer account; and in response to receiving the request to perform the operation associated with the first transfer account: in accordance with a determination that a balance of the first transfer account is below a balance threshold, concurrently displaying, on the display, the representation of the first transfer account with an insufficient balance notification; and in accordance with a determination that the balance of the first transfer account is not below the balance threshold, displaying, on the display, the representation of the first transfer account without displaying the insufficient balance notification.

In accordance with some embodiments, a transitory computer-readable storage medium is described. The transitory computer-readable storage medium stores one or more programs configured to be executed by one or more processors of an electronic device with a display and one or more input devices. The one or more programs include instructions for: receiving, via the one or more input devices, a request to perform an operation associated with a first transfer account; and in response to receiving the request to perform the operation associated with the first transfer account: in accordance with a determination that a balance of the first transfer account is below a balance threshold, concurrently displaying, on the display, the representation of the first transfer account with an insufficient balance notification; and in accordance with a determination that the balance of the first transfer account is not below the balance threshold, displaying, on the display, the representation of the first transfer account without displaying the insufficient balance notification.

In accordance with some embodiments, an electronic device is described. The electronic device comprises: a display, one or more input devices, one or more processors, and memory storing one or more programs configured to be executed by the one or more processors. The one or more programs include instructions for: receiving, via the one or more input devices, a request to perform an operation associated with a first transfer account; and in response to receiving the request to perform the operation associated with the first transfer account: in accordance with a determination that a balance of the first transfer account is below a balance threshold, concurrently displaying, on the display, the representation of the first transfer account with an insufficient balance notification; and in accordance with a determination that the balance of the first transfer account is not below the balance threshold, displaying, on the display, the representation of the first transfer account without displaying the insufficient balance notification.

In accordance with some embodiments, an electronic device is described. The electronic device comprises: a display, one or more input devices, means for receiving, via the one or more input devices, a request to perform an operation associated with a first transfer account; and means, in response to receiving the request to perform the operation associated with the first transfer account, for: in accordance with a determination that a balance of the first transfer account is below a balance threshold, concurrently displaying, on the display, the representation of the first transfer account with an insufficient balance notification; and in accordance with a determination that the balance of the first transfer account is not below the balance threshold, displaying, on the display, the representation of the first transfer account without displaying the insufficient balance notification.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing peer-to-peer transfers, thereby increasing the effectiveness, efficiency, and user satisfaction with such devices. Such methods and interfaces may complement or replace other methods for managing peer-to-peer transfers.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 9A-9I are a flow diagram illustrating methods of initiating and managing transfers, in accordance with some embodiments.

FIGS. 12A-12C are a flow diagram illustrating methods of providing feedback to message objects corresponding to completed transfers, in accordance with some embodiments.

FIGS. 15A-15K are a flow diagram illustrating methods of providing visually distinguishable message object appearances based on message designation, in accordance with some embodiments.

FIGS. 18A-18F are a flow diagram illustrating methods of activating accounts for accepting and sending transfers, in accordance with some embodiments.

FIGS. 21A-21D are a flow diagram illustrating methods of exchanging an account for use in a transfer, in accordance with some embodiments.

FIGS. 24A-24C are a flow diagram illustrating methods of splitting transfers between two or more accounts, in accordance with some embodiments.

FIGS. 27A-27E are a flow diagram illustrating methods of generating and displaying a transfers history list, in accordance with some embodiments.

FIGS. 34A-34D are a flow diagram illustrating a method for providing feedback corresponding to an operation associated with a transfer, in accordance with some embodiments.

FIGS. 37A-37C are a flow diagram illustrating a method for sending a gift transfer, in accordance with some embodiments.

FIGS. 40A-40B are a flow diagram illustrating a method for managing a gift transfer, in accordance with some embodiments.

FIGS. 41A-44D illustrate example user interfaces for creating and managing a group account, in accordance with some embodiments.

FIGS. 44A-44E illustrate example user interfaces for creating a group account versus a non-group account, in accordance with some embodiments.

FIGS. 46A-46C are a flow diagram illustrating a method for creating a group account versus a non-group account, in accordance with some embodiments.

FIGS. 49A-49D are a flow diagram illustrating a method for managing a time period of a group account, in accordance with some embodiments.

FIGS. 51A-51B are a flow diagram illustrating a method for managing balance notifications, in accordance with some embodiments.

DESCRIPTION OF EMBODIMENTS

The following description sets forth example methods, parameters, and the like. It should be recognized, however, that such description is not intended as a limitation on the scope of the present disclosure but is instead provided as a description of example embodiments.

There is a need for electronic devices that provide efficient methods and interfaces for managing peer-to-peer transfers. For example, there is a need for electronic devices that provide a convenient and efficient method for sending and receiving transfers using commonly used messaging applications. For another example, there is a need for electronic devices that provide easier management for peer-to-peer transfers in a secure manner. For another example, there is a need for electronic devices that provide a quick and intuitive technique for viewing and managing transfer history. For another example, there is a need for electronic devices that can accept transfers without user input or wither minimal user input. Such techniques can reduce the cognitive burden on a user who accesses and utilizes peer-to-peer transfers, thereby enhancing productivity. Further, such techniques can reduce processor and battery power otherwise wasted on redundant user inputs.

Figure 11A:
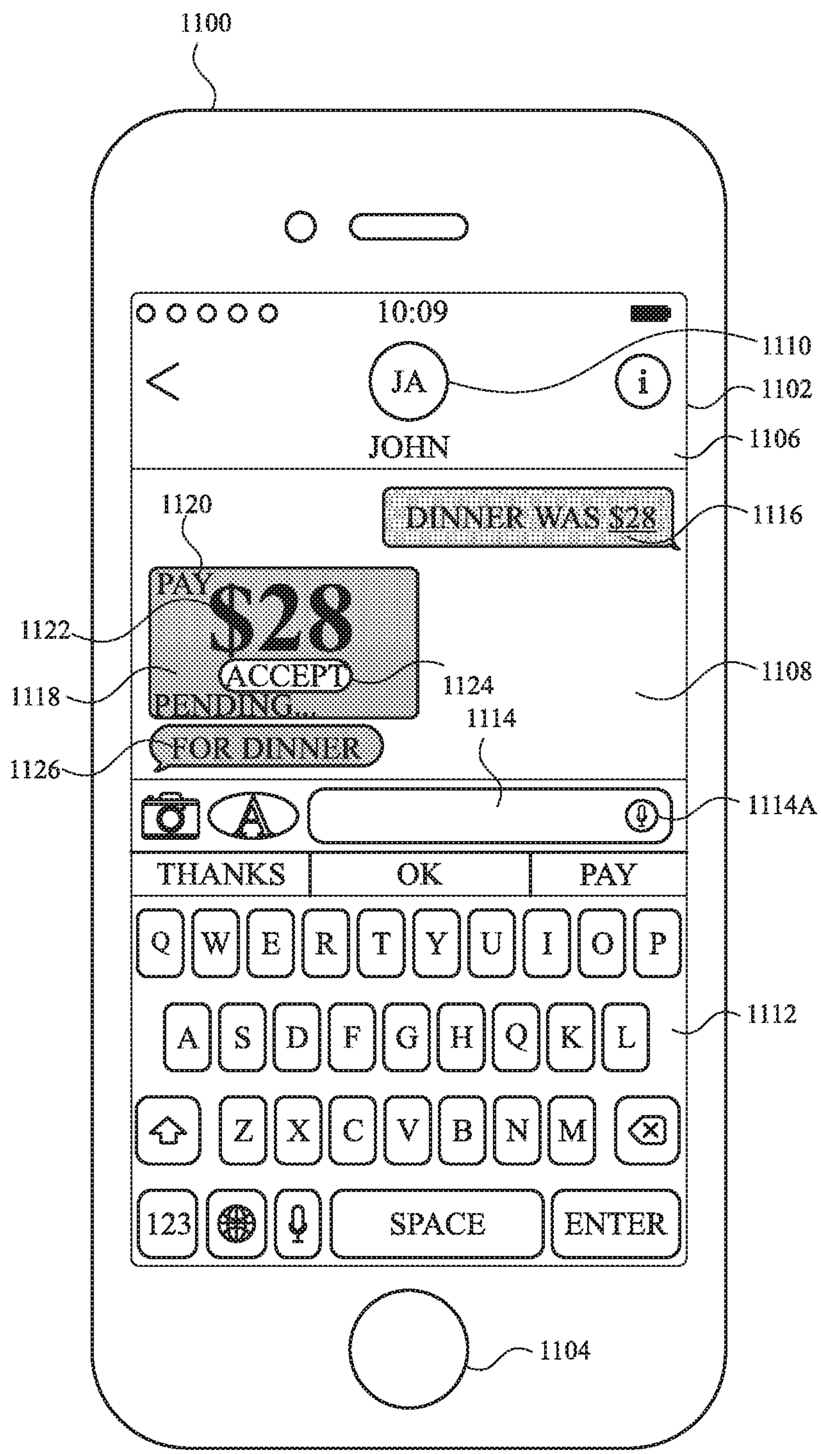
FIGS. 11A-11V illustrate example user interfaces for providing feedback to message objects corresponding to completed transfers, in accordance with some embodiments.
Figure 11V:
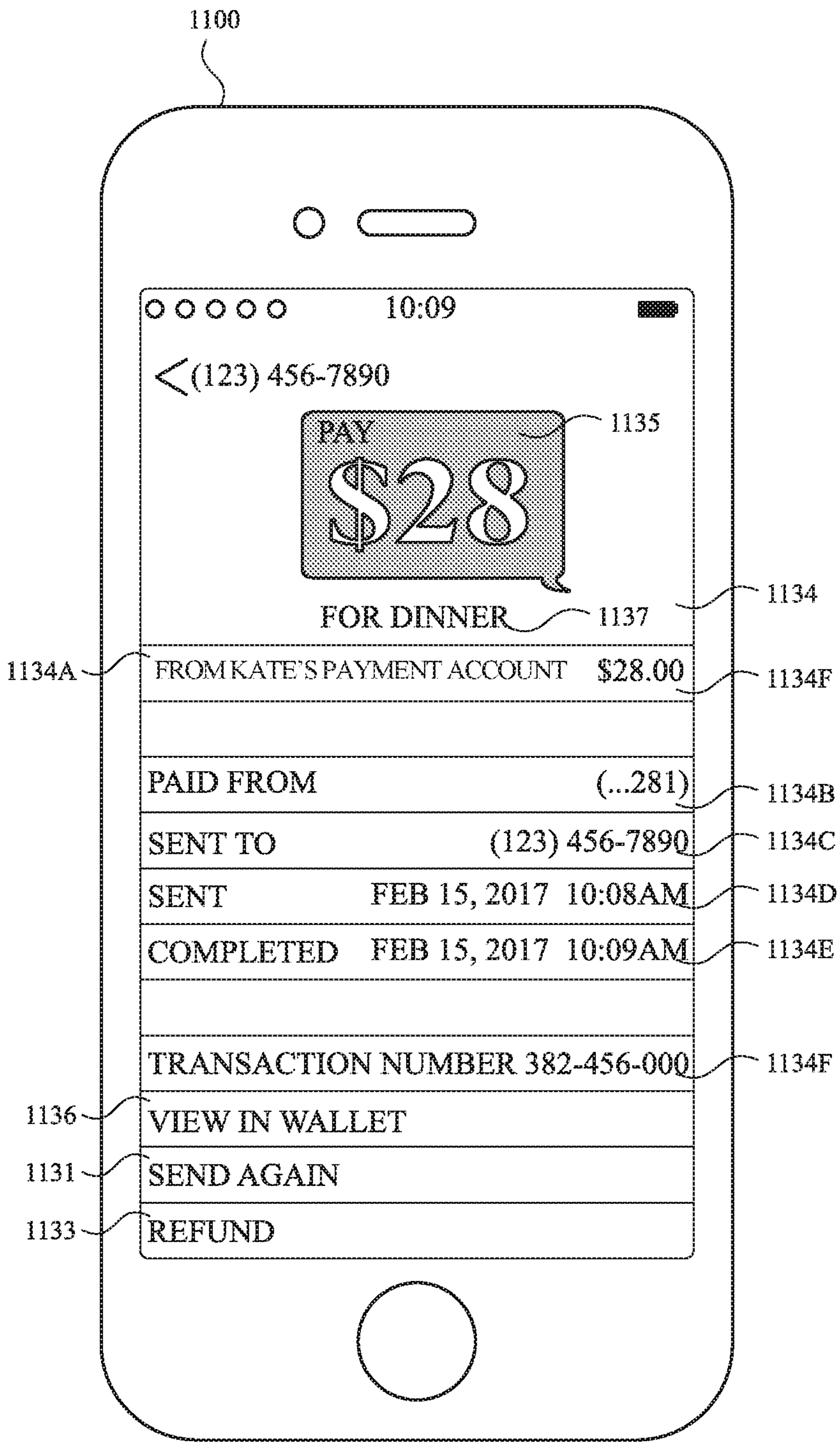
Figure 12A:
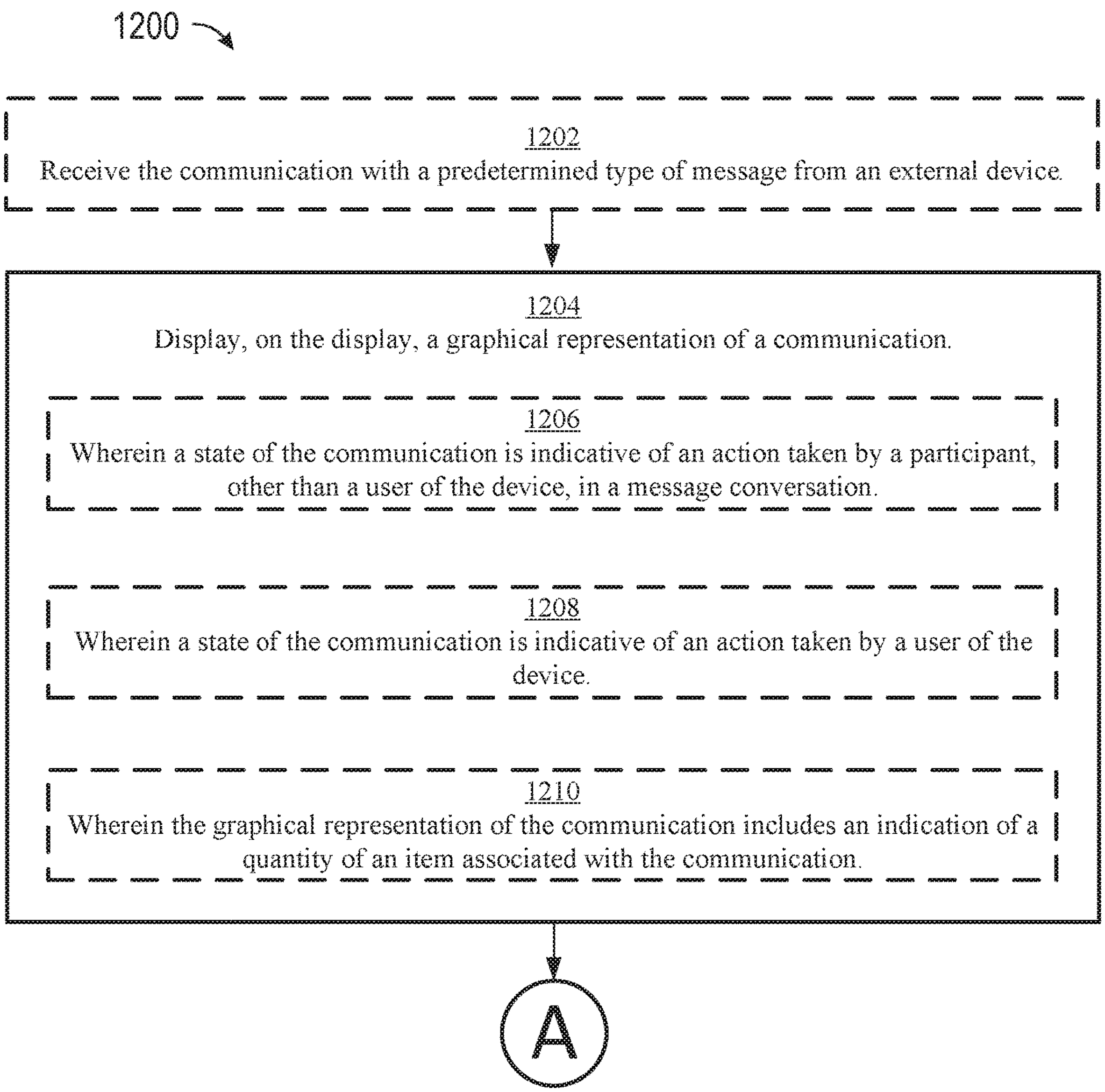
Figure 12B:
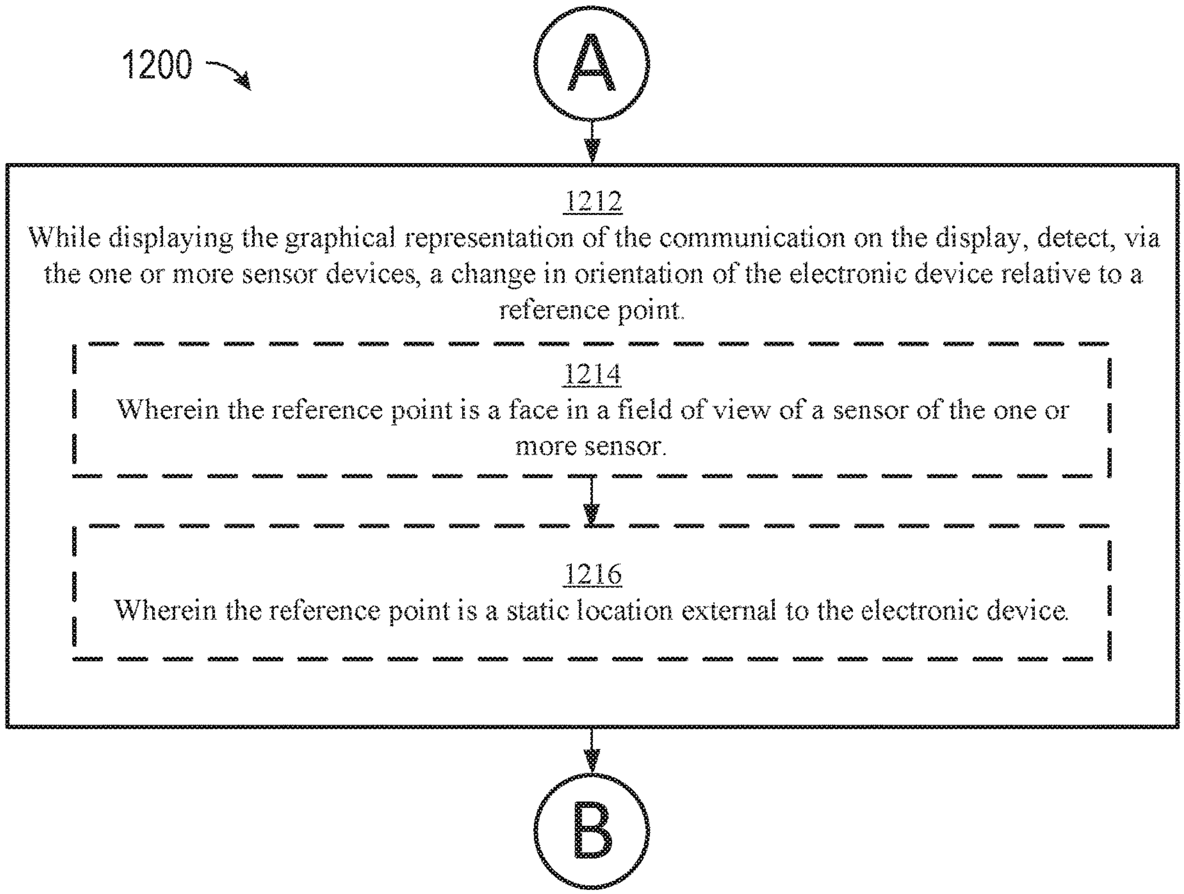
Figure 23A:
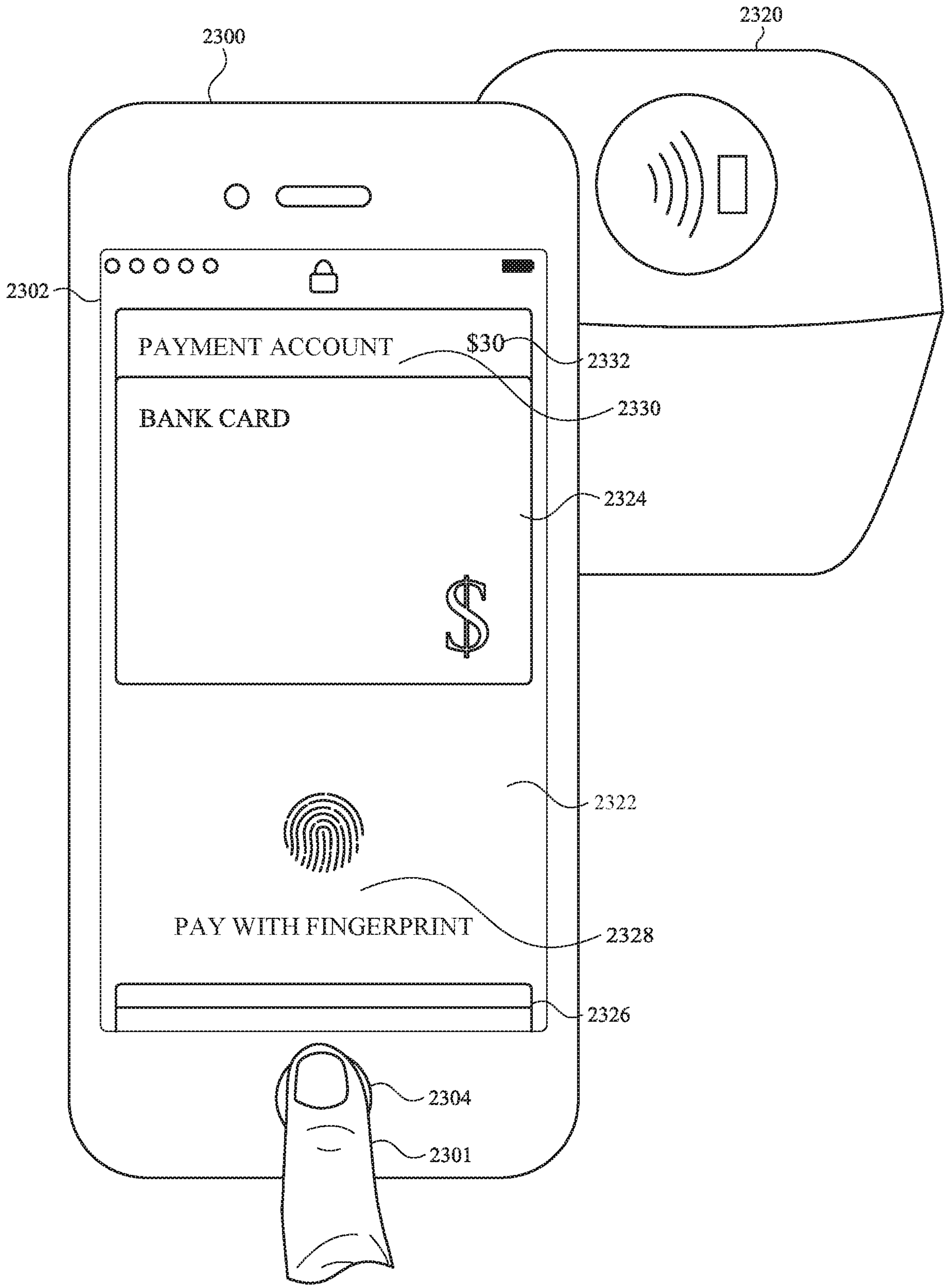
FIGS. 23A-23O illustrate example user interfaces for splitting transfers between two or more accounts, in accordance with some embodiments.
Figure 23O:
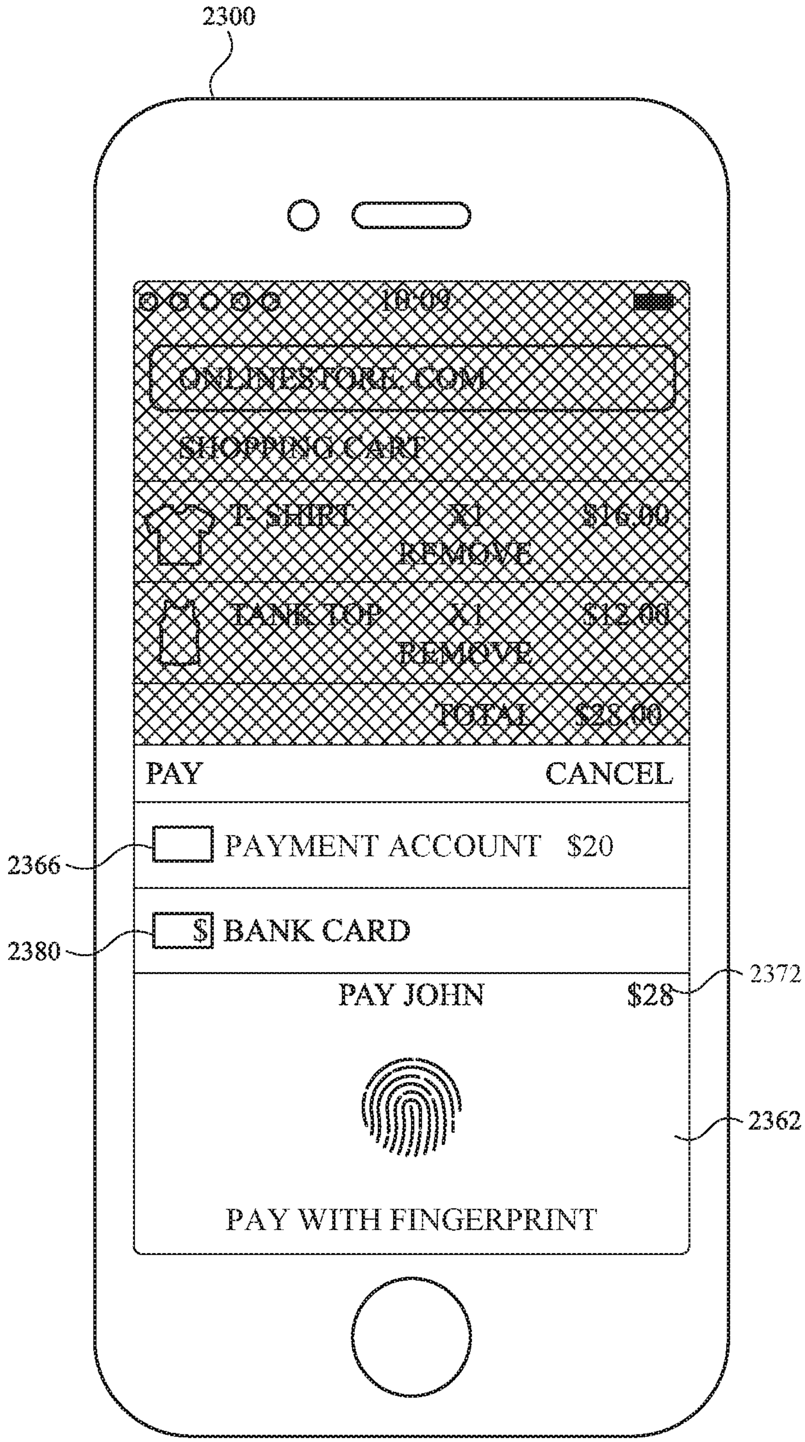
Figure 24A:
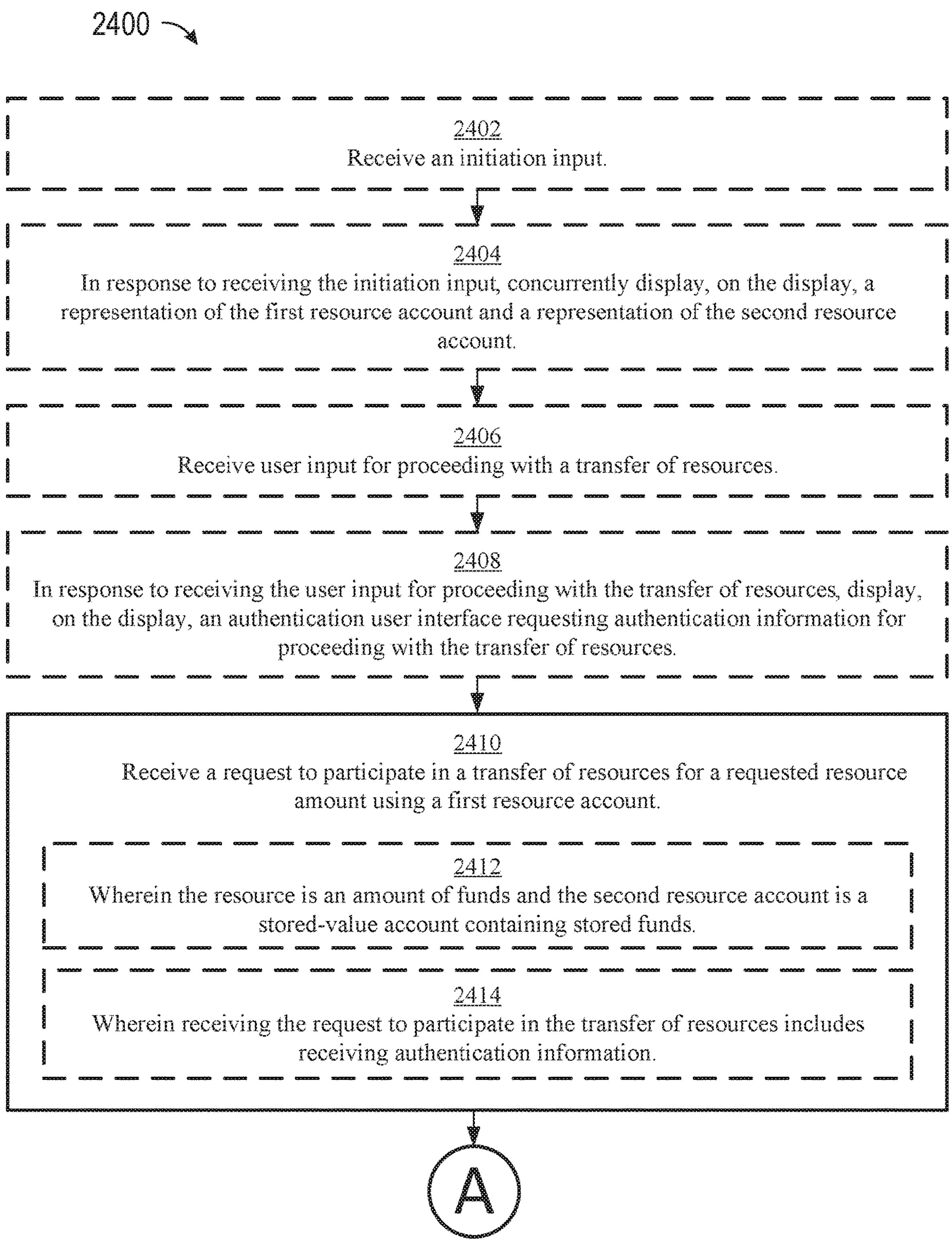
Figure 24B:
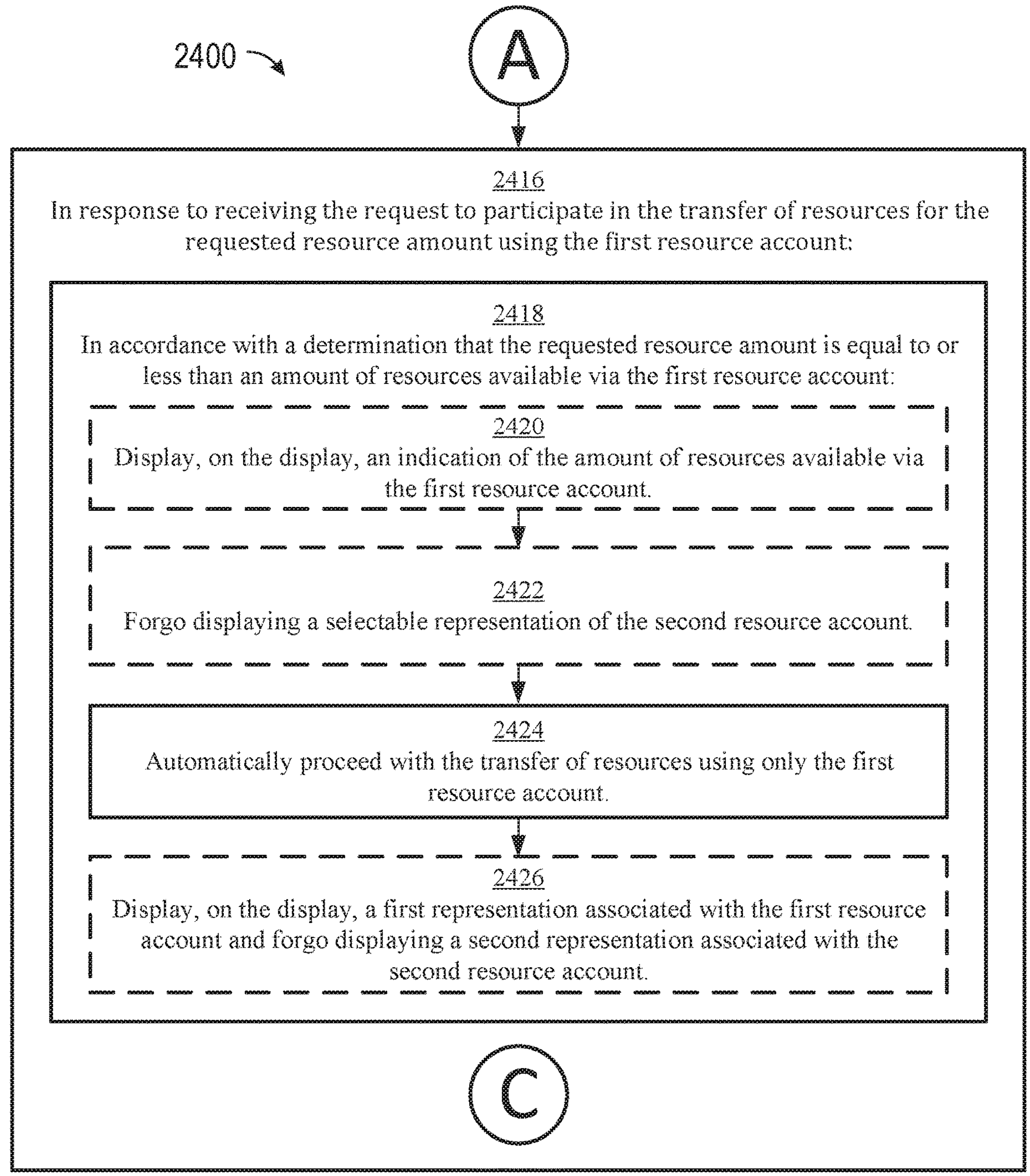
Figure 25A:
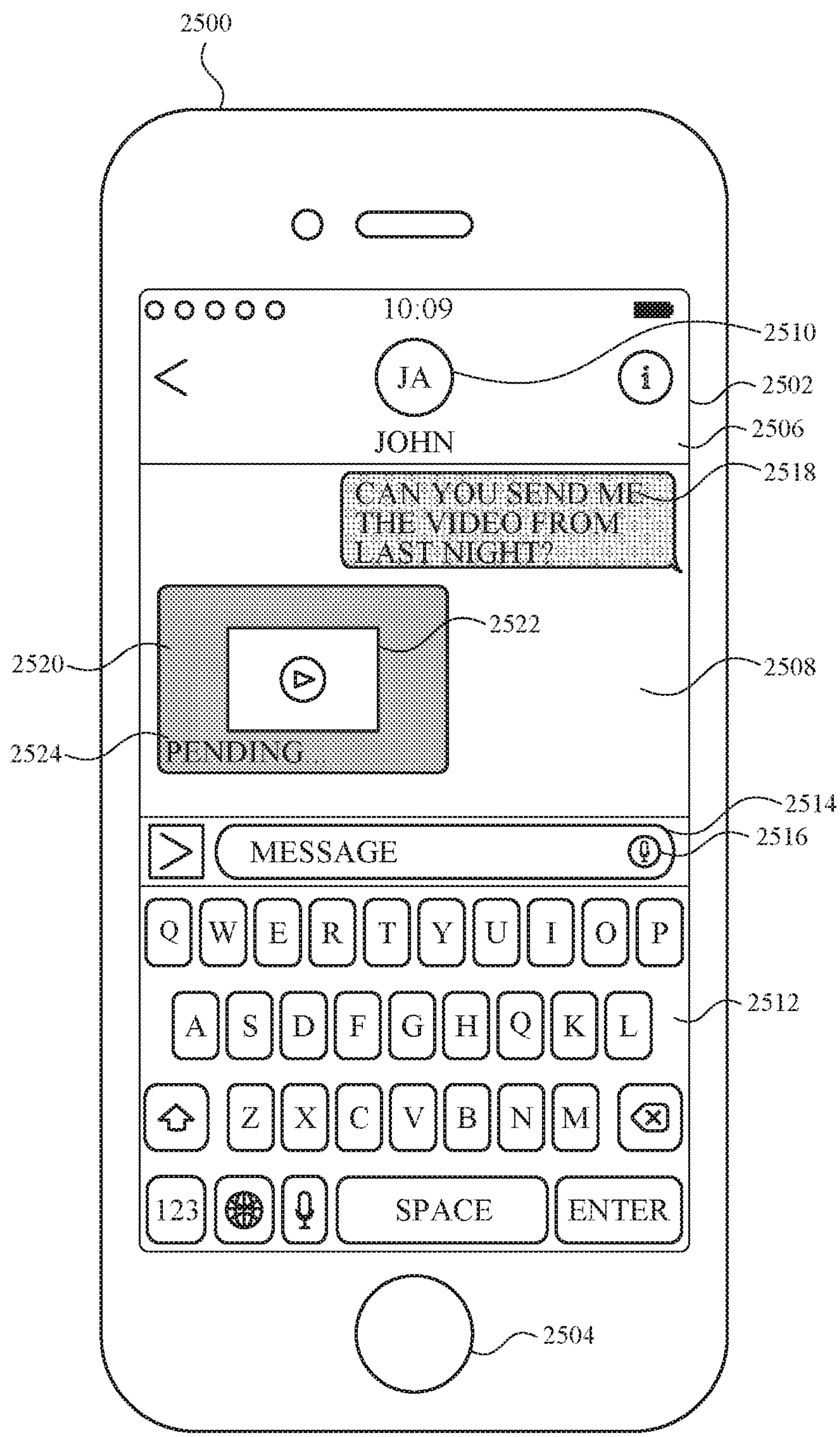
FIGS. 25A-25C illustrate example user interfaces for generating and displaying an attachment transfers history list, in accordance with some embodiments.
Figure 25B:
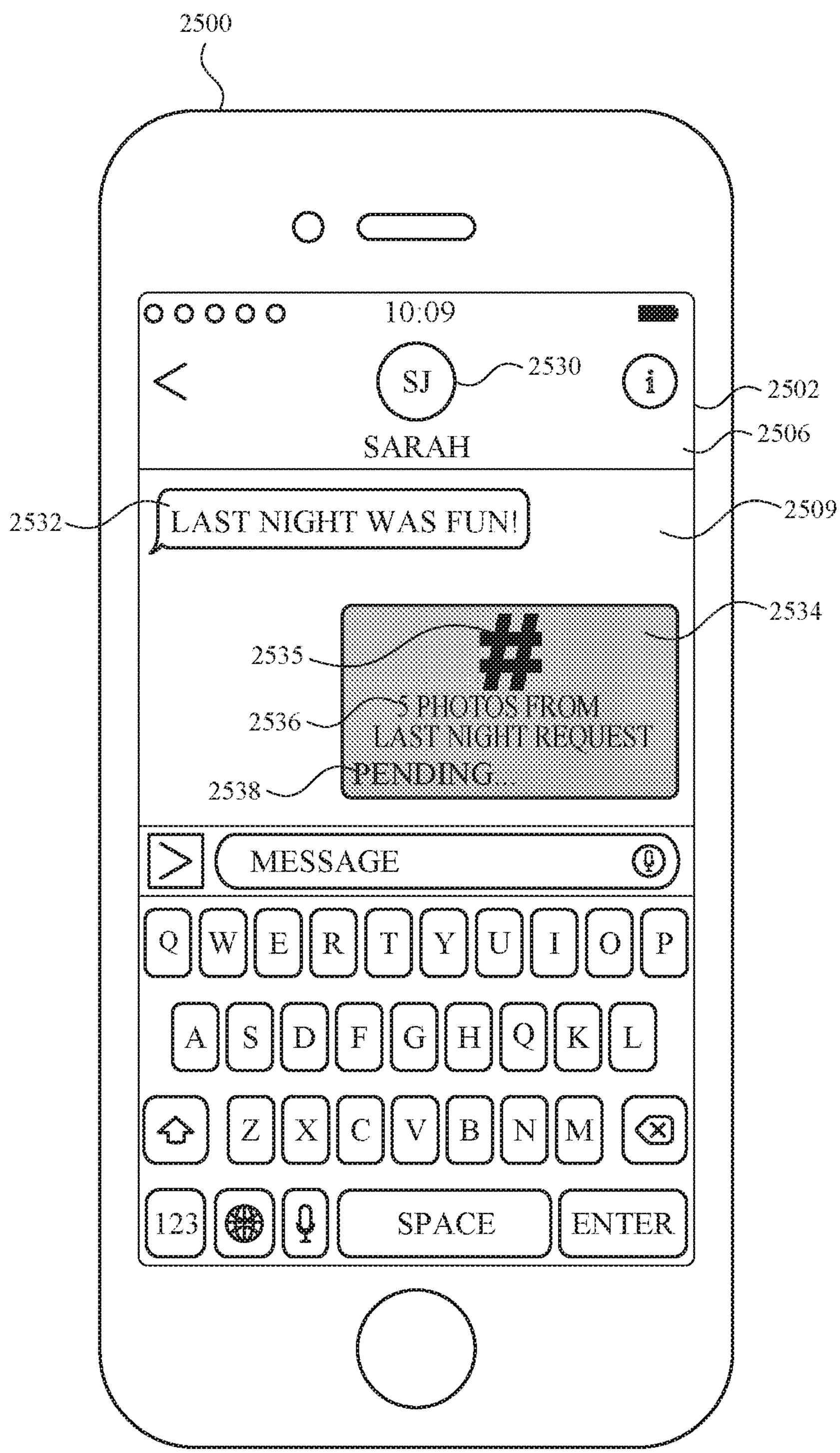
Figure 25C:
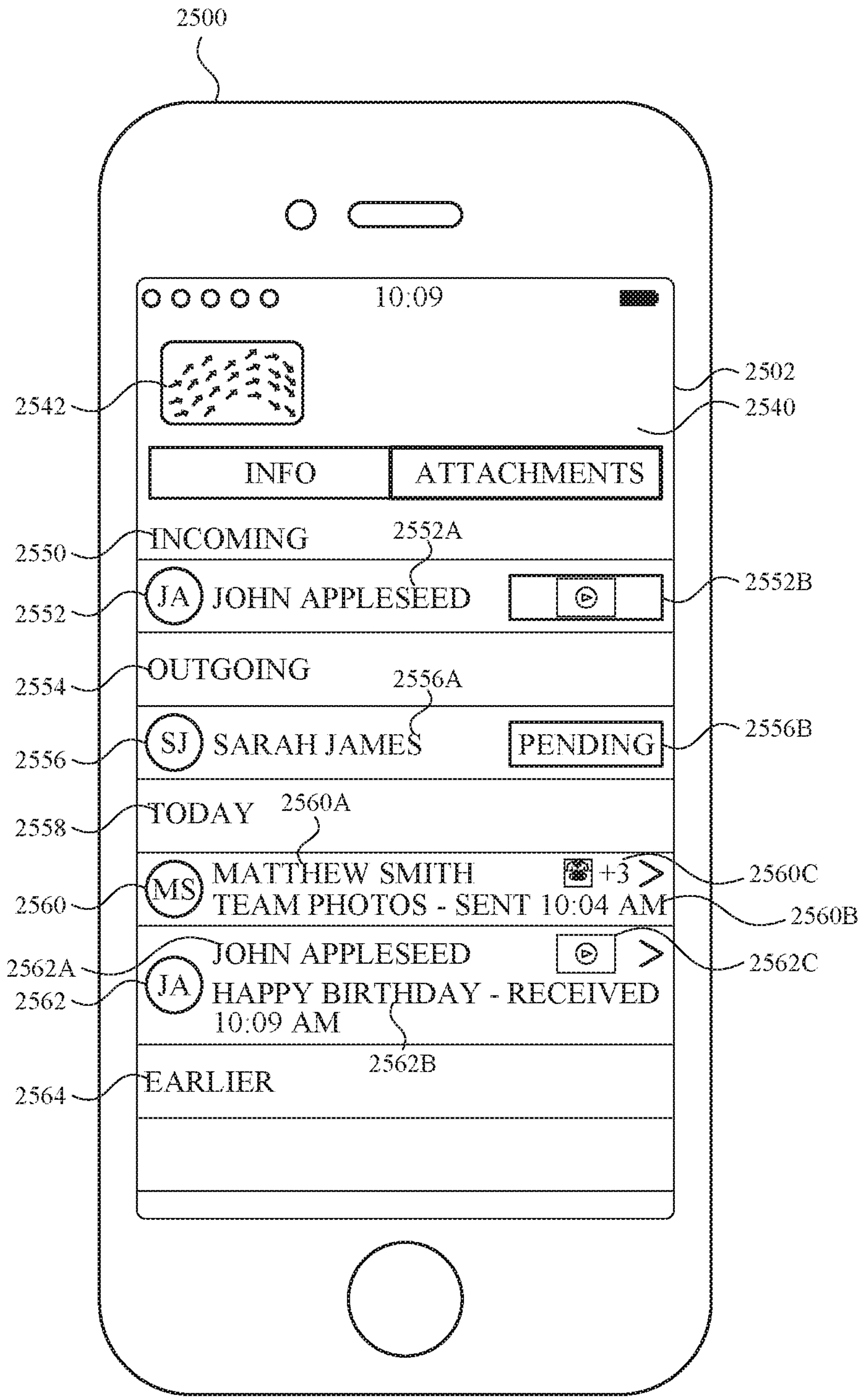
Figure 26A:
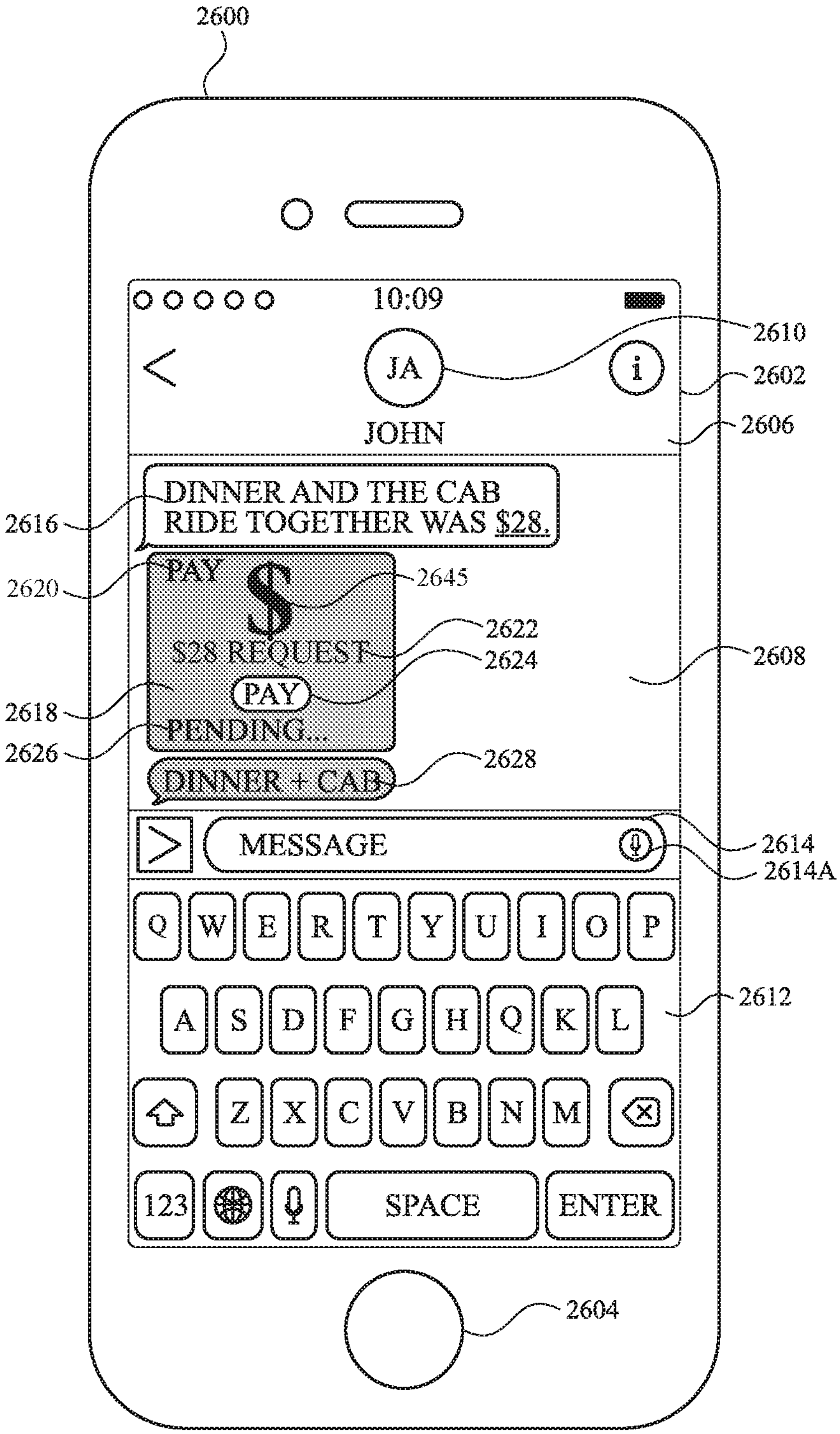
FIGS. 26A-26T illustrate example user interfaces for generating and displaying a transfers history list, in accordance with some embodiments.
Figure 36A:
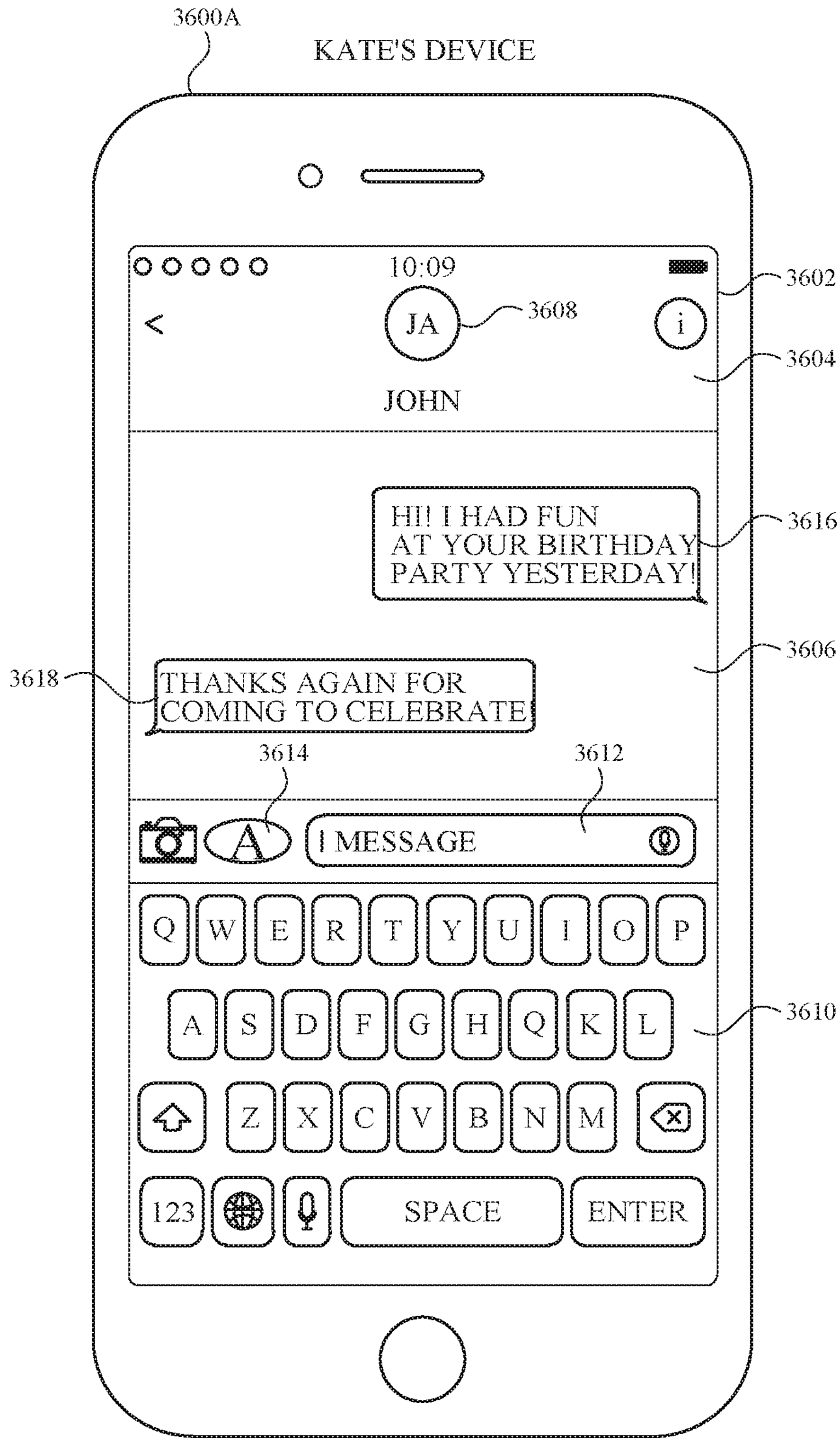
FIGS. 36A-36Z illustrate example user interfaces for sending a gift transfer, in accordance with some embodiments.
Figure 36Z:
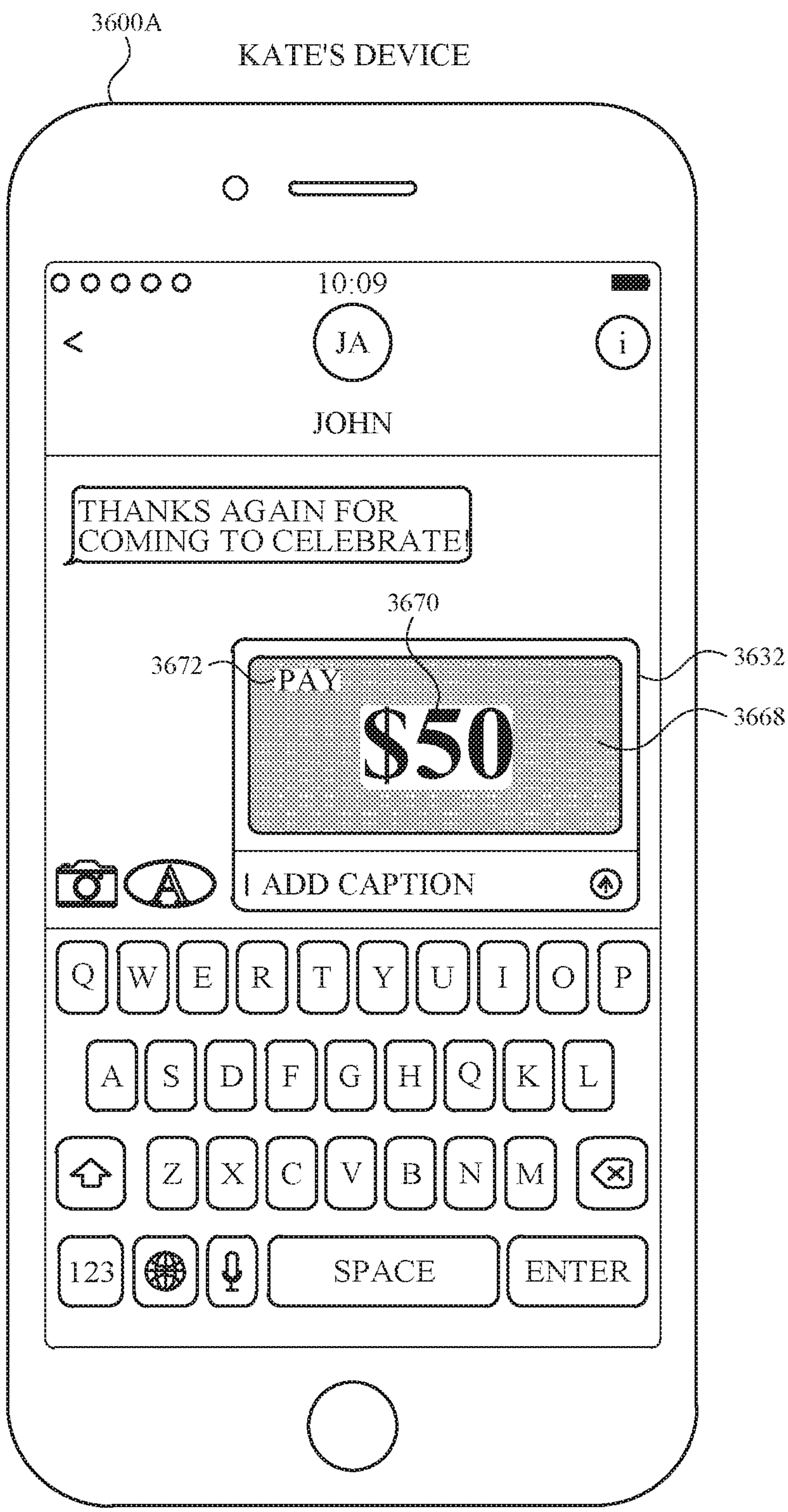
Figure 37B:
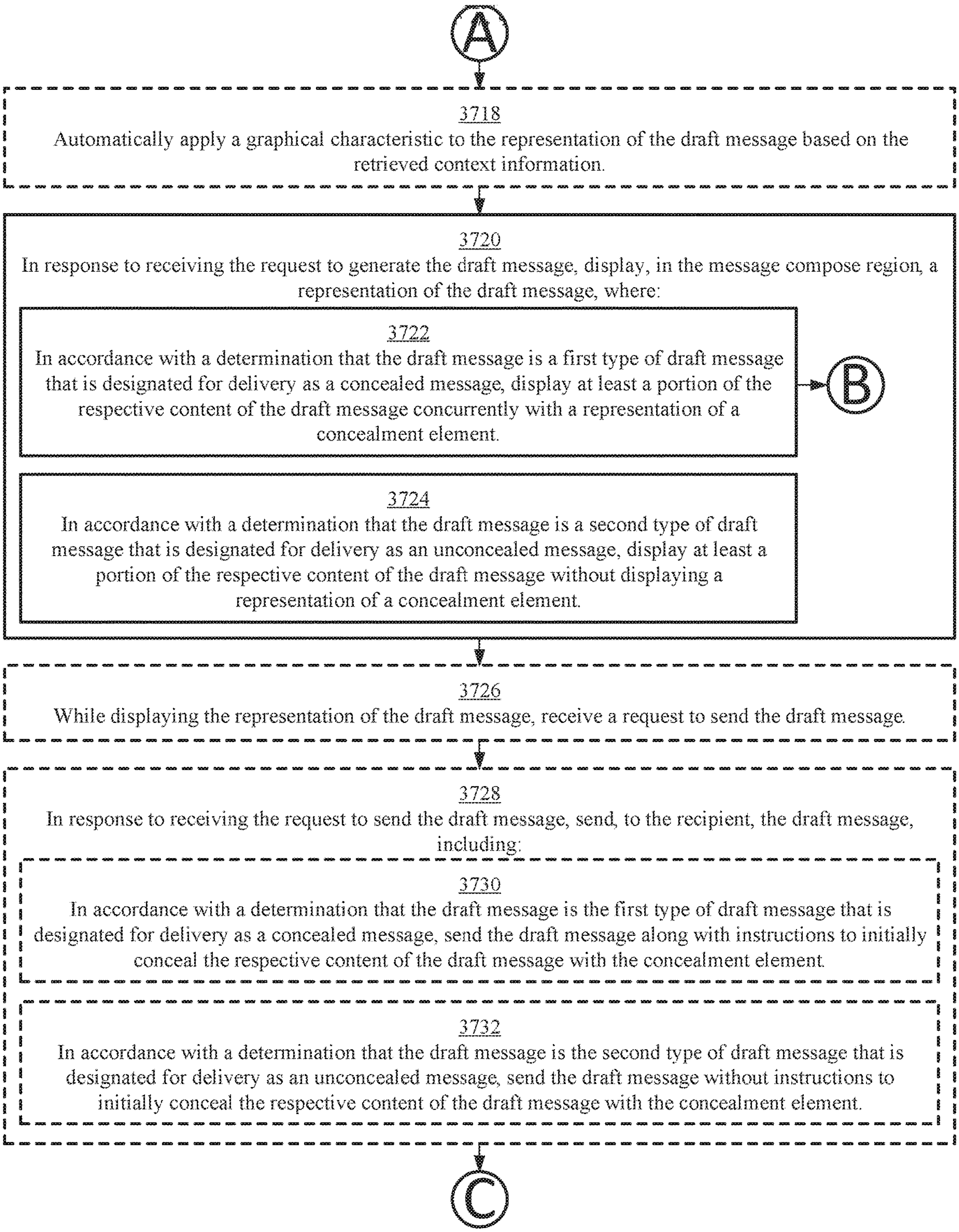
Figure 45A:
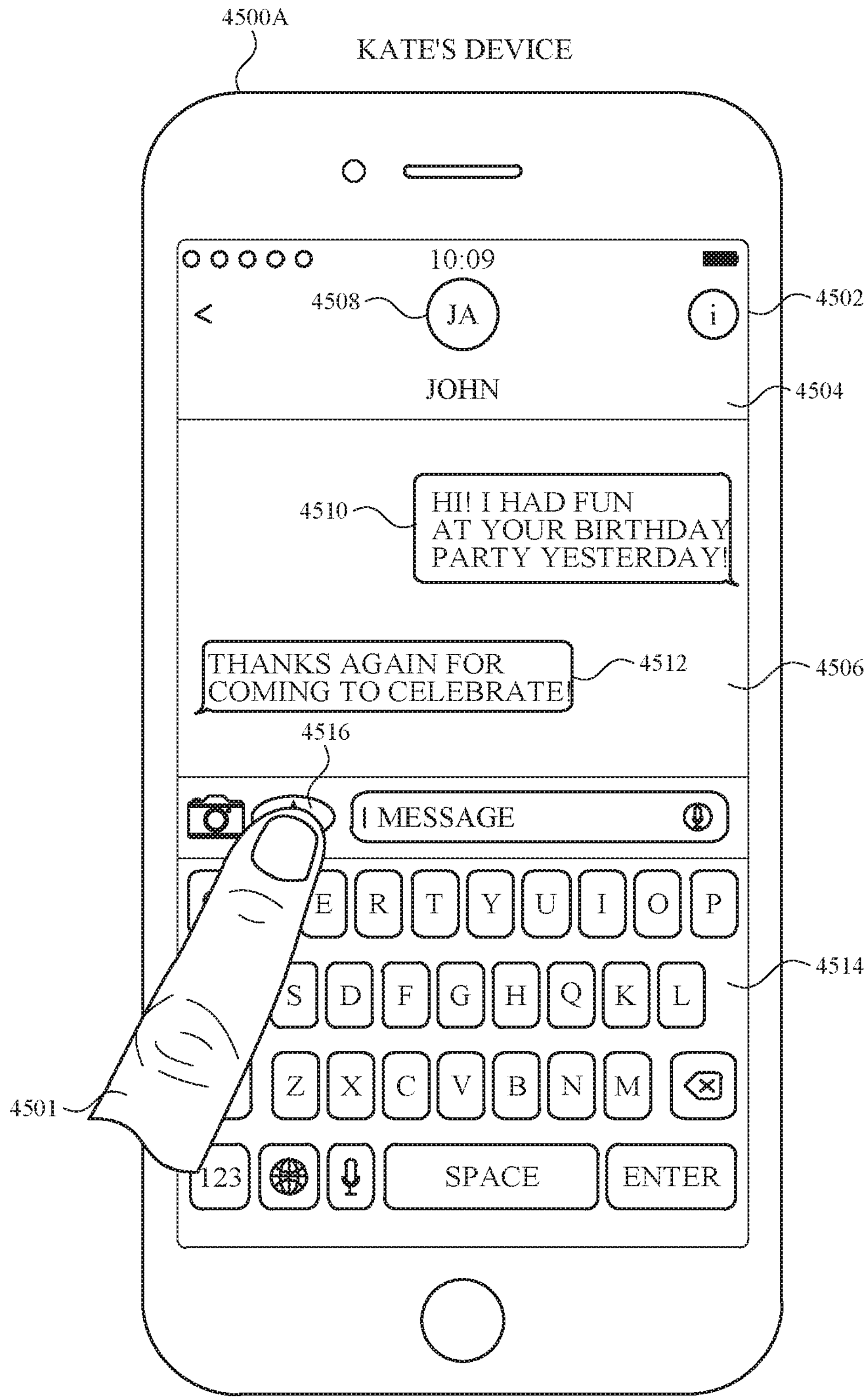
FIGS. 45A-45U illustrate example user interfaces for creating a group account versus a non-group account, in accordance with some embodiments.
Figure 45U:
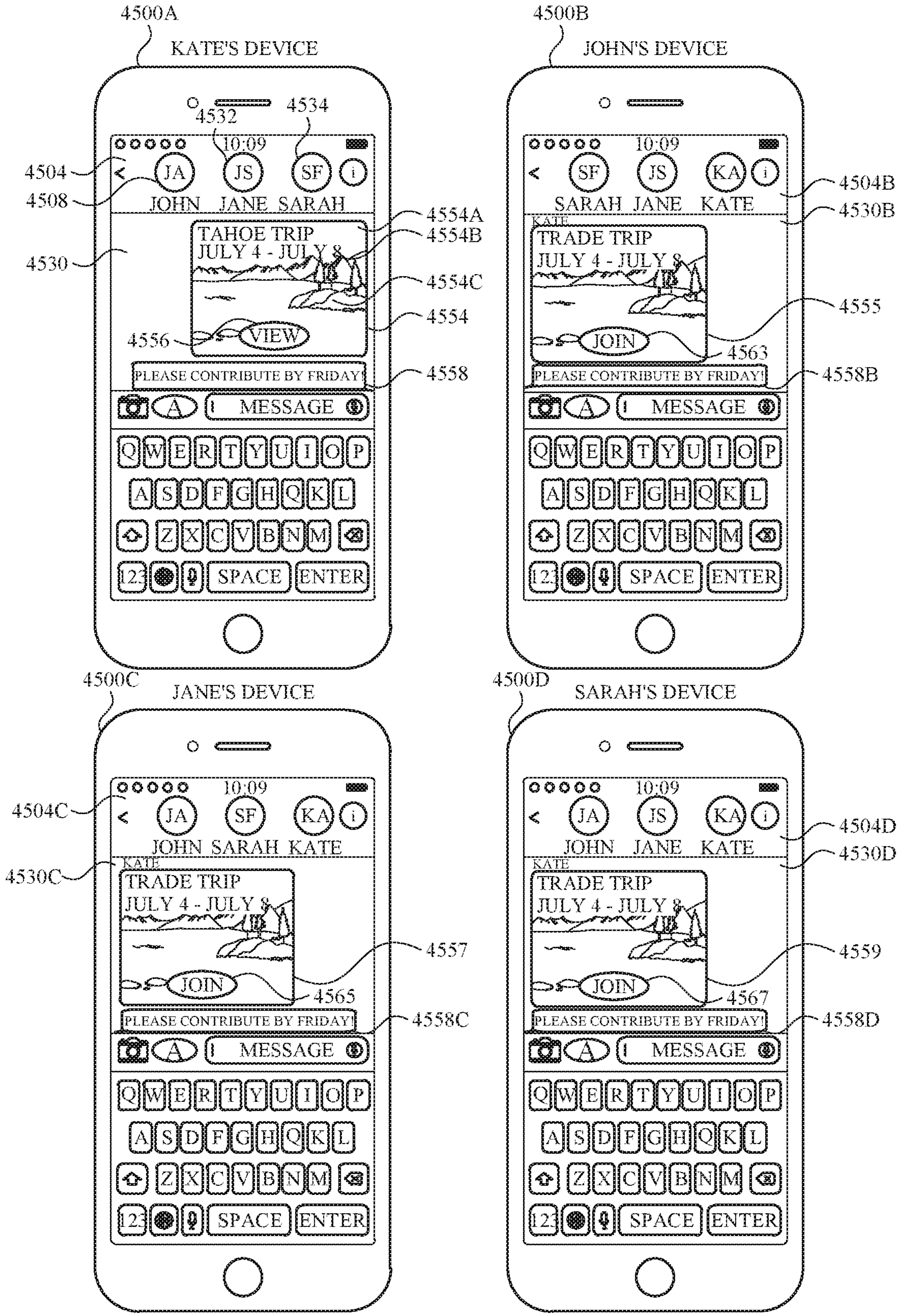
Figure 46A:
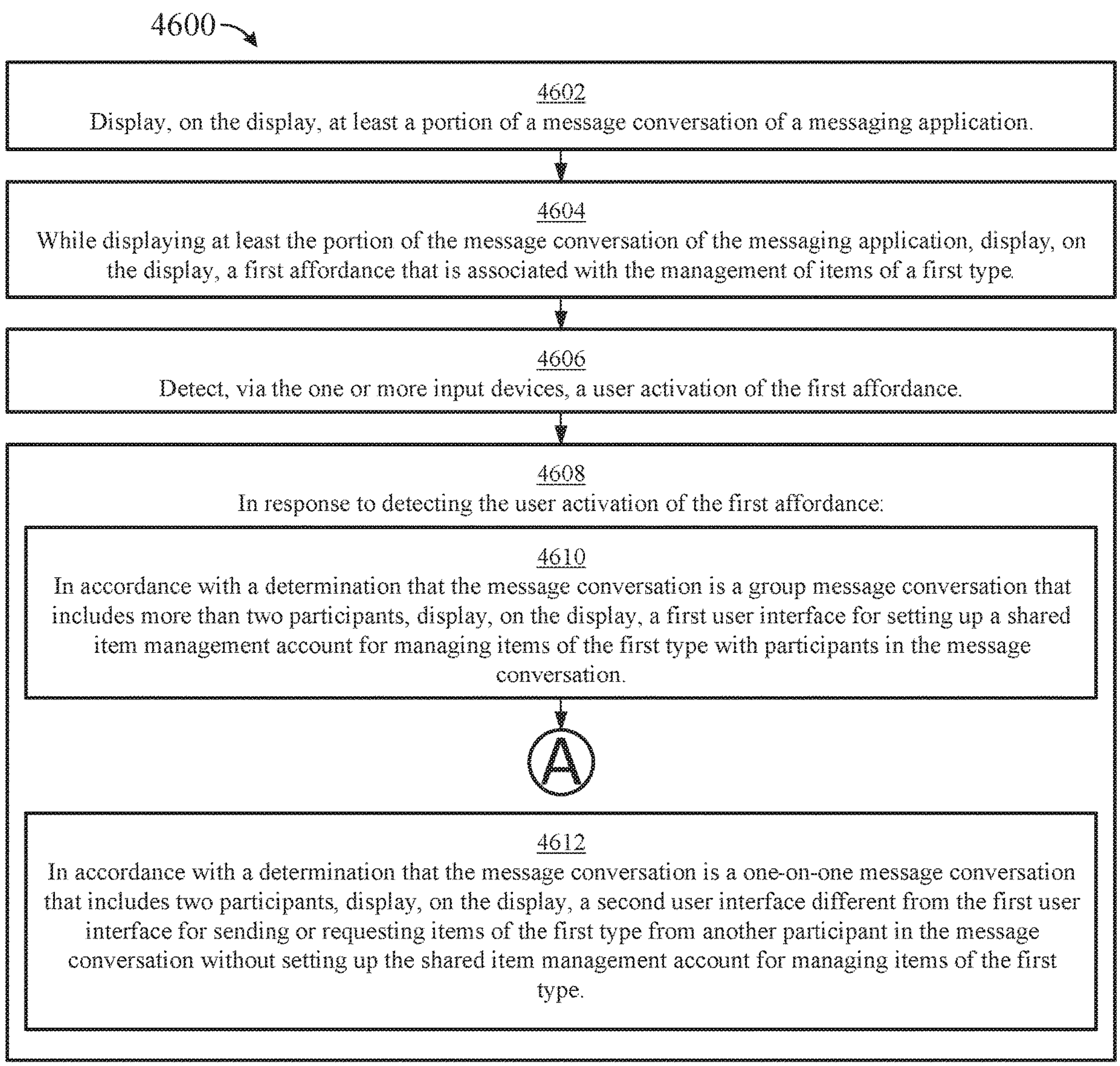
Figure 46B:
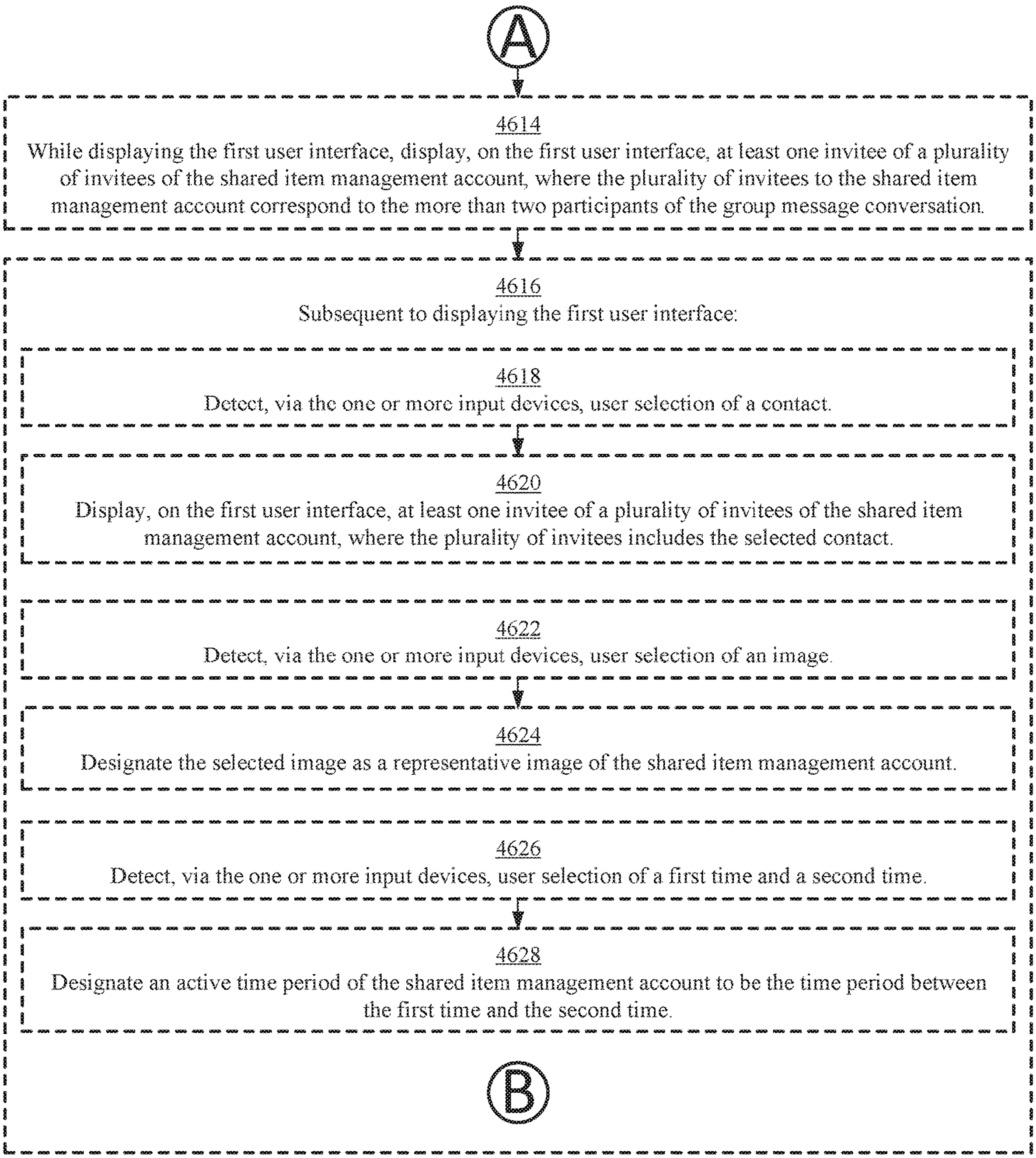
Figure 50A:
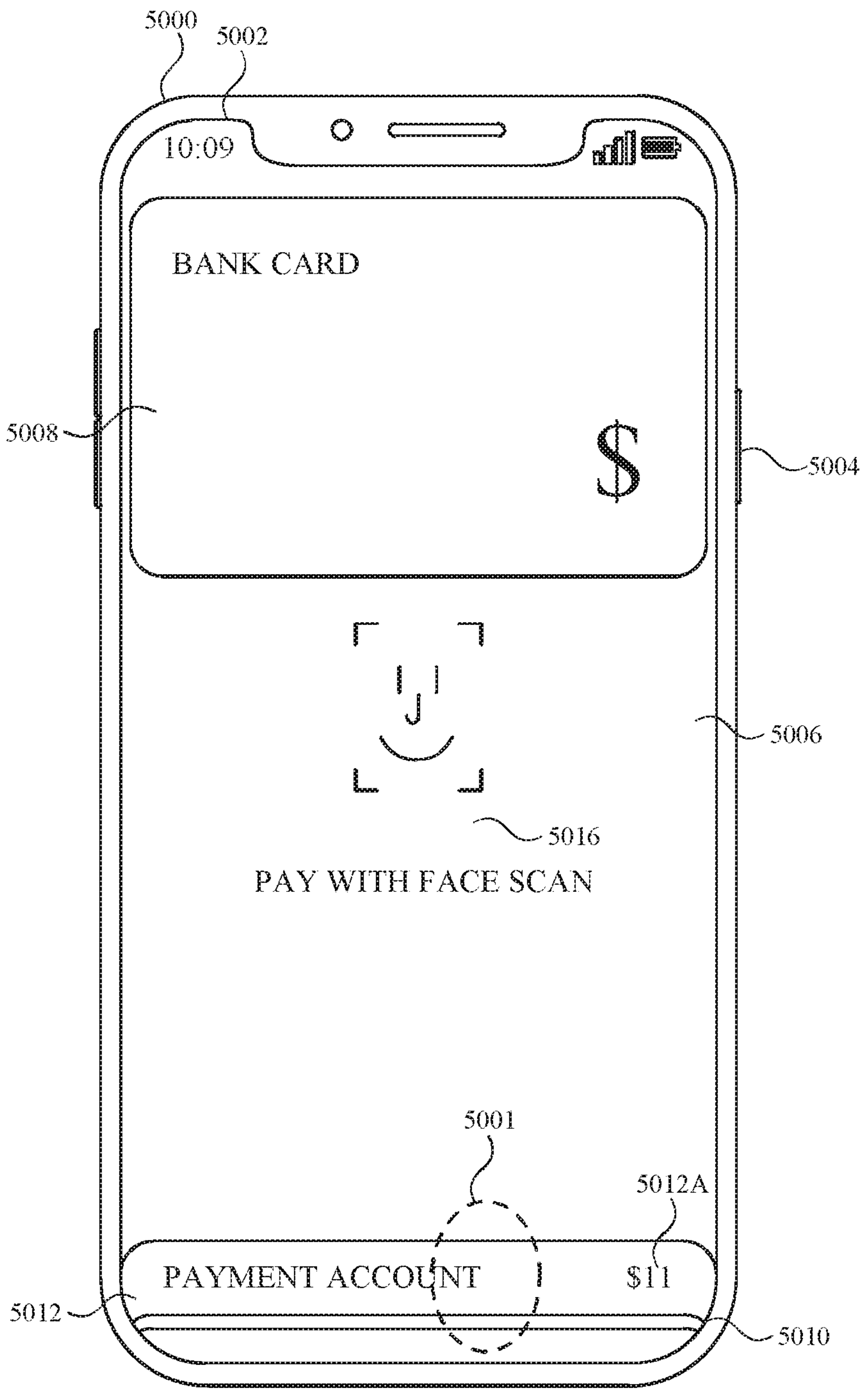
FIGS. 50A-50AG illustrate examples user interfaces for managing balance notifications, in accordance with some embodiments.

Below, FIGS. 1A-1C, 2, 3, 4A-4H, 5A-5H provide a description of example devices for performing the techniques for managing peer-to-peer transfers. FIG. 6 illustrates example devices connected via one or more communication channels, in accordance with some embodiments. FIGS. 7A-7E illustrate example user interfaces for initiating and managing transfers file transfers, in accordance with some embodiments. FIGS. 8A-8AH illustrate example user interfaces for initiating and managing transfers, in accordance with some embodiments. FIGS. 9A-9I are a flow diagram illustrating methods of initiating and managing transfers, in accordance with some embodiments. The user interfaces in FIGS. 7A-7E and FIGS. 8A-8AH are used to illustrate the processes described below, including the processes in FIGS. 9A-9I. FIGS. 10A-10D illustrate example user interfaces for providing feedback to message objects corresponding to completed file transfers, in accordance with some embodiments. FIGS. 11A-11V illustrate example user interfaces for providing feedback to message objects corresponding to completed transfers, in accordance with some embodiments. FIGS. 12A-12C are a flow diagram illustrating methods of providing feedback to message objects corresponding to completed transfers, in accordance with some embodiments. The user interfaces in FIGS. 10A-10D and FIGS. 11A-11V are used to illustrate the processes described below, including the processes in FIGS. 12A-12C. FIGS. 13A-13D illustrate example user interfaces for providing visually distinguishable message object appearances based on message designation, in accordance with some embodiments. FIGS. 14A-14M illustrate example user interfaces for providing visually distinguishable message object appearances based on message designation, in accordance with some embodiments. FIGS. 15A-15K are a flow diagram illustrating methods of providing visually distinguishable message object appearances based on message designation, in accordance with some embodiments. The user interfaces in FIGS. 13A-13D and FIGS. 14A-14M are used to illustrate the processes described below, including the processes in FIGS. 15A-15K. FIGS. 16A-16F illustrate example user interfaces for activating accounts for accepting and sending encrypted message transfers, in accordance with some embodiments. FIGS. 17A-17L illustrate example user interfaces for activating accounts for accepting and sending transfers, in accordance with some embodiments. FIGS. 18A-18F are a flow diagram illustrating methods of activating accounts for accepting and sending transfers, in accordance with some embodiments. The user interfaces in FIGS. 16A-16F and FIGS. 17A-17L are used to illustrate the processes described below, including the processes in FIGS. 18A-18F. FIGS. 19A-19D illustrate example user interfaces for exchanging a user identification with a different user identification, in accordance with some embodiments. FIGS. 20A-20J illustrate example user interfaces for exchanging an account for use in a transfer, in accordance with some embodiments. FIGS. 21A-21D are a flow diagram illustrating methods of exchanging an account for use in a transfer, in accordance with some embodiments. The user interfaces in FIGS. 19A-19D and FIGS. 20A-20J are used to illustrate the processes described below, including the processes in FIGS. 21A-21D. FIGS. 22A-22F illustrate example user interfaces for splitting resource transfers between two or more resource accounts, in accordance with some embodiments. FIGS. 23A-23O illustrate example user interfaces for splitting transfers between two or more accounts, in accordance with some embodiments. FIGS. 24A-24C are a flow diagram illustrating methods of splitting transfers between two or more accounts, in accordance with some embodiments. The user interfaces in FIGS. 22A-22F and FIGS. 23A-23O are used to illustrate the processes described below, including the processes in FIGS. 24A-24C. FIGS. 25A-25C illustrate example user interfaces for generating and displaying an attachment transfers history list, in accordance with some embodiments. FIGS. 26A-26T illustrate example user interfaces for generating and displaying a transfers history list, in accordance with some embodiments. FIGS. 27A-27E are a flow diagram illustrating methods of generating and displaying a transfers history list, in accordance with some embodiments. The user interfaces in FIGS. 25A-25C and FIGS. 26A-26T are used to illustrate the processes described below, including the processes in FIGS. 27A-27E. FIGS. 28A-28F illustrate example user interfaces for voice-activation of file transfers, in accordance with some embodiments. FIGS. 29A-29S illustrate example user interfaces for voice-activation of transfers, in accordance with some embodiments. FIGS. 30A-30D are a flow diagram illustrating methods of voice-activation of transfers, in accordance with some embodiments. The user interfaces in FIGS. 28A-28F and FIGS. 29A-29S are used to illustrate the processes described below, including the processes in FIGS. 30A-30D. FIGS. 31A-31M illustrate example user interfaces for user verification, in accordance with some embodiments. FIGS. 32A-32D illustrate example user interfaces for automatic account on-boarding, in accordance with some embodiments. FIGS. 33A-33O illustrate example user interfaces for providing feedback corresponding to an operation associated with a transfer, in accordance with some embodiments. FIGS. 34A-34D are a flow diagram illustrating a method for providing feedback corresponding to an operation associated with a transfer, in accordance with some embodiments. The user interfaces in FIGS. 33A-33O are used to illustrate the processes described below, including the processes in FIGS. 34A-34D. FIGS. 35A-35J illustrate example user interfaces for sending a gift transfer, in accordance with some embodiments. FIGS. 36A-36Z illustrate example user interfaces for sending a gift transfer, in accordance with some embodiments. FIGS. 37A-37C are a flow diagram illustrating a method for sending a gift transfer, in accordance with some embodiments. The user interfaces in FIGS. 35A-35J and FIGS. 36A-36Z are used to illustrate the processes described below, including the processes in FIGS. 37A-37C. FIGS. 38A-38F illustrate example user interfaces for managing a gift transfer, in accordance with some embodiments. FIGS. 39A-39L illustrate example user interfaces for managing a gift transfer, in accordance with some embodiments. FIGS. 40A-40B are a flow diagram illustrating a method for managing a gift transfer, in accordance with some embodiments. The user interfaces in FIGS. 38A-38F and FIGS. 39A-39L are used to illustrate the processes described below, including the processes in FIGS. 40A-40B. FIGS. 41A-44D illustrate example user interfaces for creating and managing a group account, in accordance with some embodiments. FIGS. 42A-42O illustrate example user interfaces for creating and managing a group account, in accordance with some embodiments. FIGS. 43A-43C are a flow diagram illustrating a method for creating and managing a group account, in accordance with some embodiments. The user interfaces in FIGS. 41A-41D and FIGS. 42A-42O are used to illustrate the processes described below, including the processes in FIGS. 43A-43C. FIGS. 44A-44E illustrate example user interfaces for creating a group account versus a non-group account, in accordance with some embodiments. FIGS. 45A-45U illustrate example user interfaces for creating a group account versus a non-group account, in accordance with some embodiments. FIGS. 46A-46C are a flow diagram illustrating a method for creating a group account versus a non-group account, in accordance with some embodiments. The user interfaces in FIGS. 44A-44E and FIGS. 45A-45U are used to illustrate the processes described below, including the processes in FIGS. 46A-46C. FIGS. 47A-47H illustrate example user interfaces for managing a valid time period of a group account, in accordance with some embodiments. FIGS. 48A-48Y illustrate example user interfaces for managing a valid time period of a group account, in accordance with some embodiments. FIGS. 49A-49D are a flow diagram illustrating a method for managing a time period of a group account, in accordance with some embodiments. The user interfaces in FIGS. 47A-47H and FIGS. 48A-48Y are used to illustrate the processes described below, including the processes in FIGS. 49A-49D. FIGS. 50A-50AG illustrate examples user interfaces for managing balance notifications, in accordance with some embodiments. FIGS. 51A-51B are a flow diagram illustrating a method for managing balance notifications, in accordance with some embodiments. The user interfaces in FIGS. 50A-50AG are used to illustrate the processes described below, including the processes in FIGS. 51A-51B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
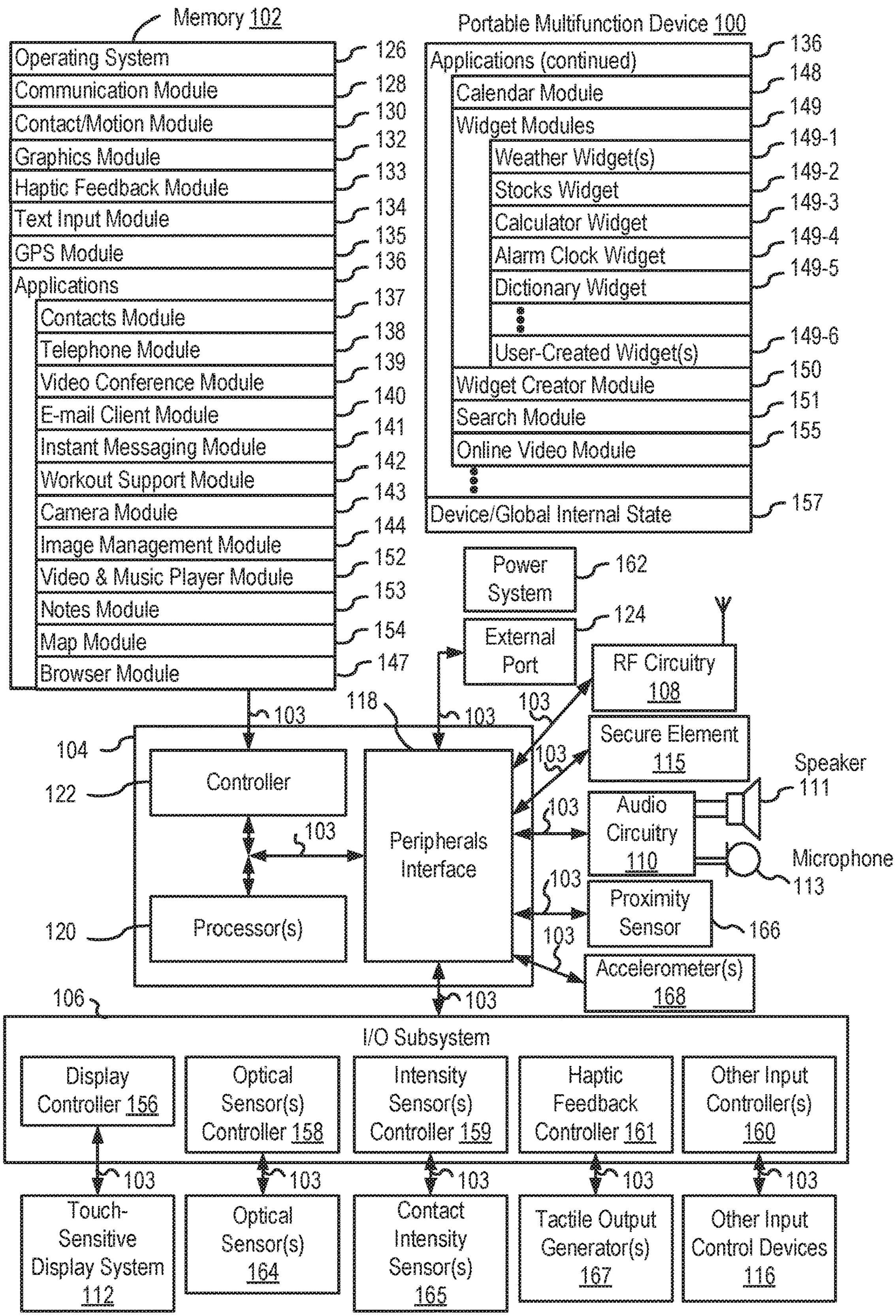
FIG. 1A is a block diagram illustrating a portable multifunction device with a touch-sensitive display, in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, secure element 115, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4A:
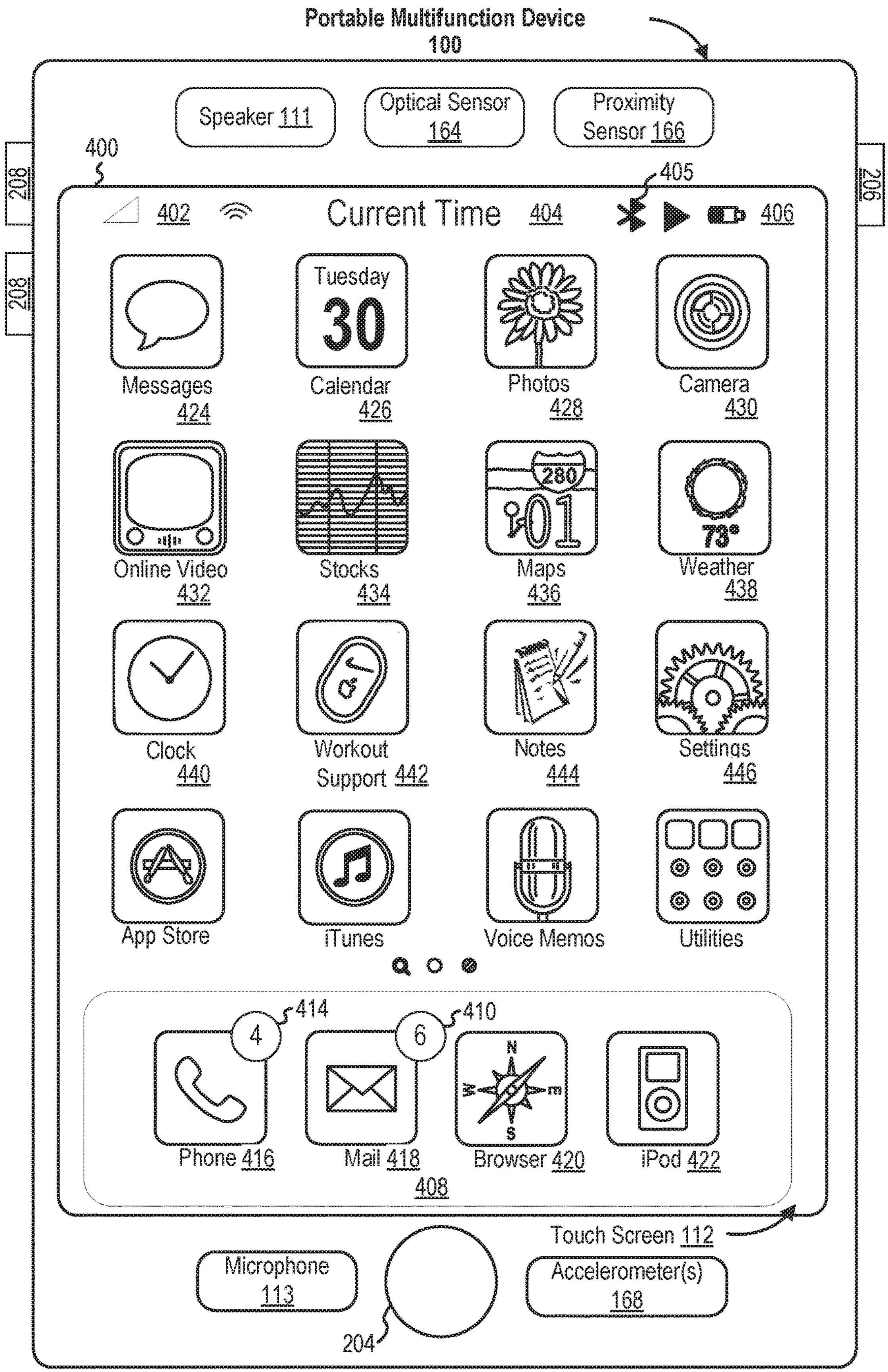
FIG. 4A illustrates an example user interface for a menu of applications on a portable multifunction device, in accordance with some embodiments.
Figure 4B:
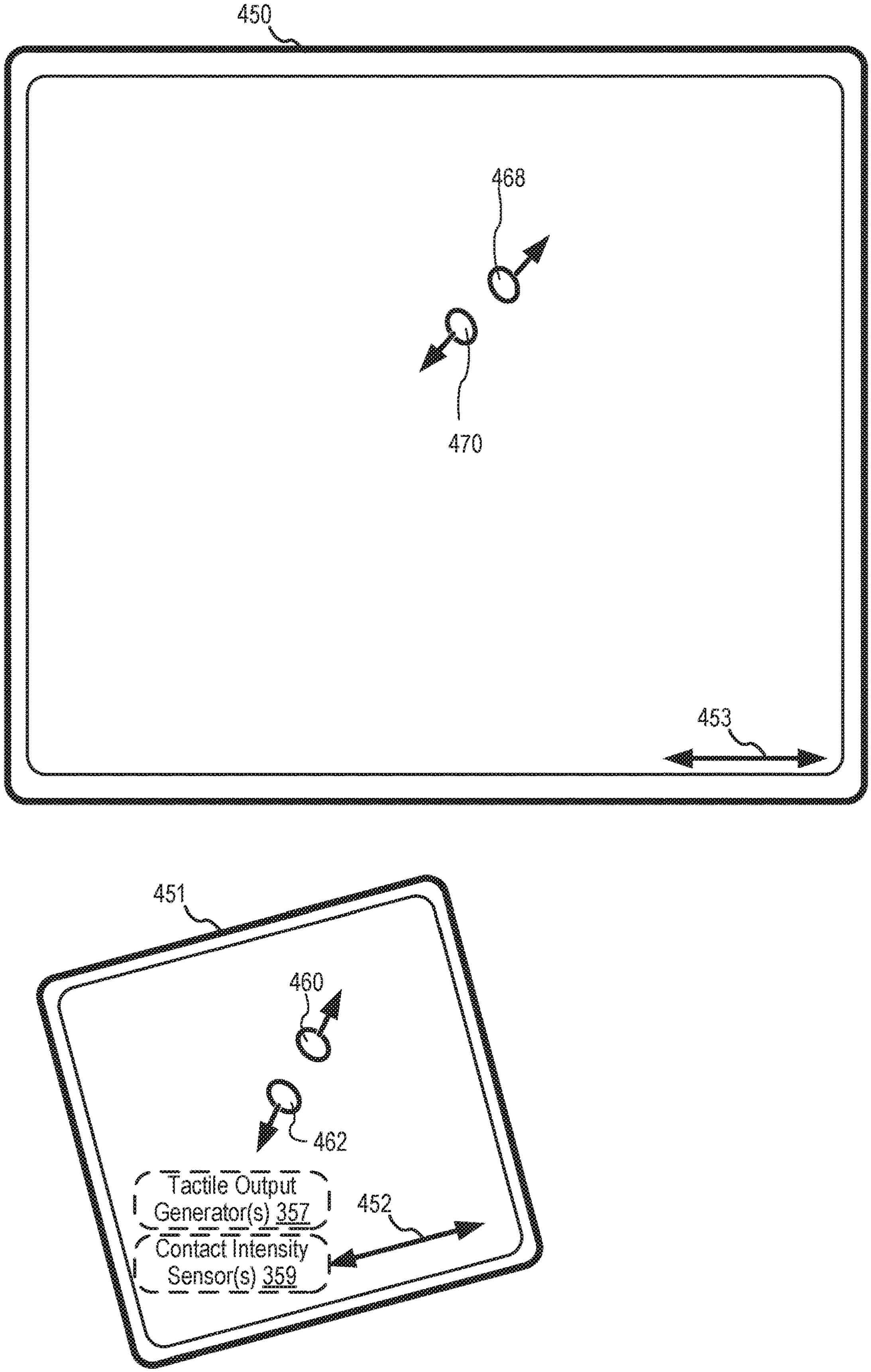
FIG. 4B illustrates an example user interface for a multifunction device with a touch-sensitive surface that is separate from the display, in accordance with some embodiments.
Figure 4C:
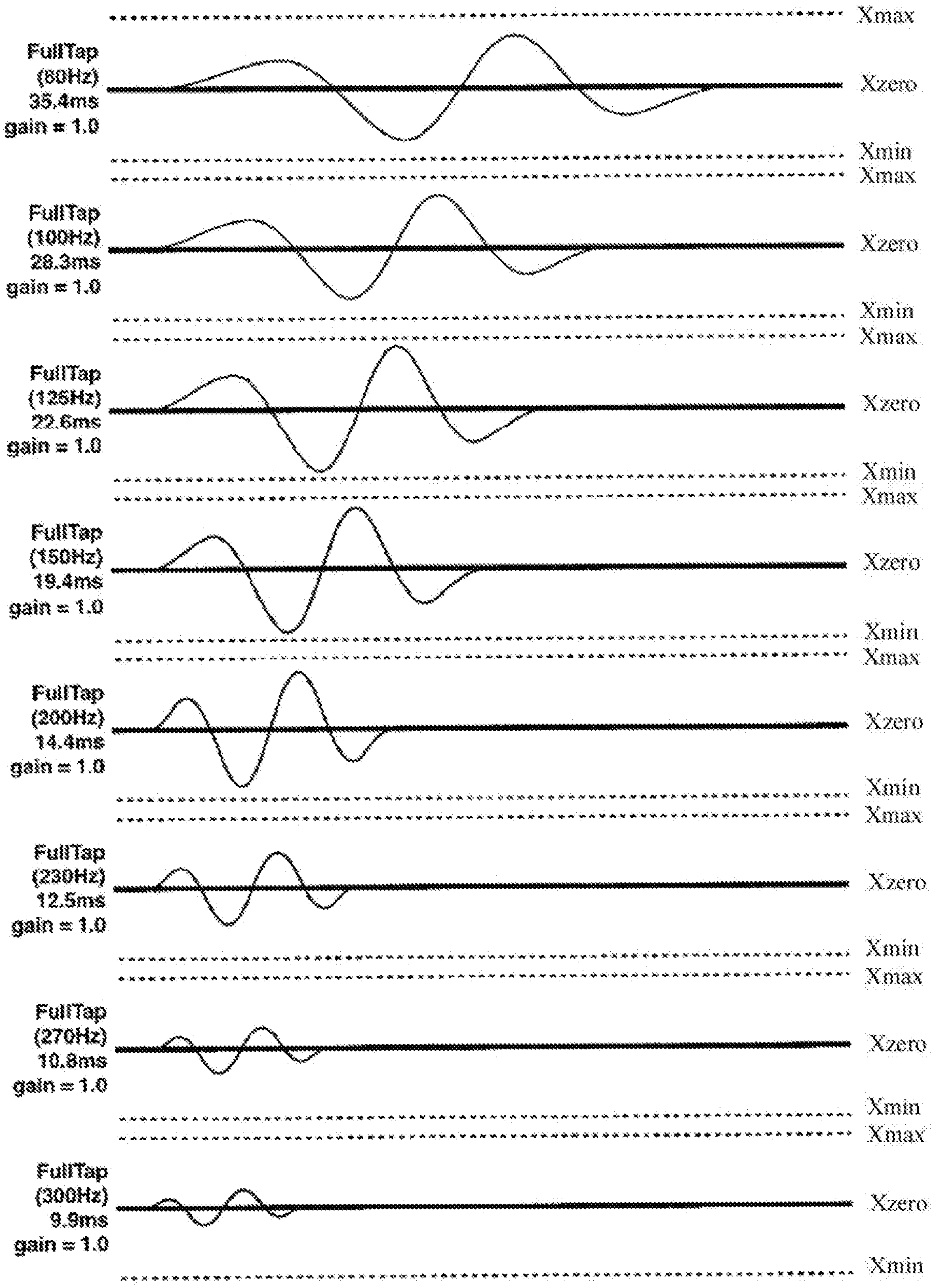
FIGS. 4C-4H illustrate example tactile output patterns that have a particular waveform, in accordance with some embodiments.
Figure 4D:
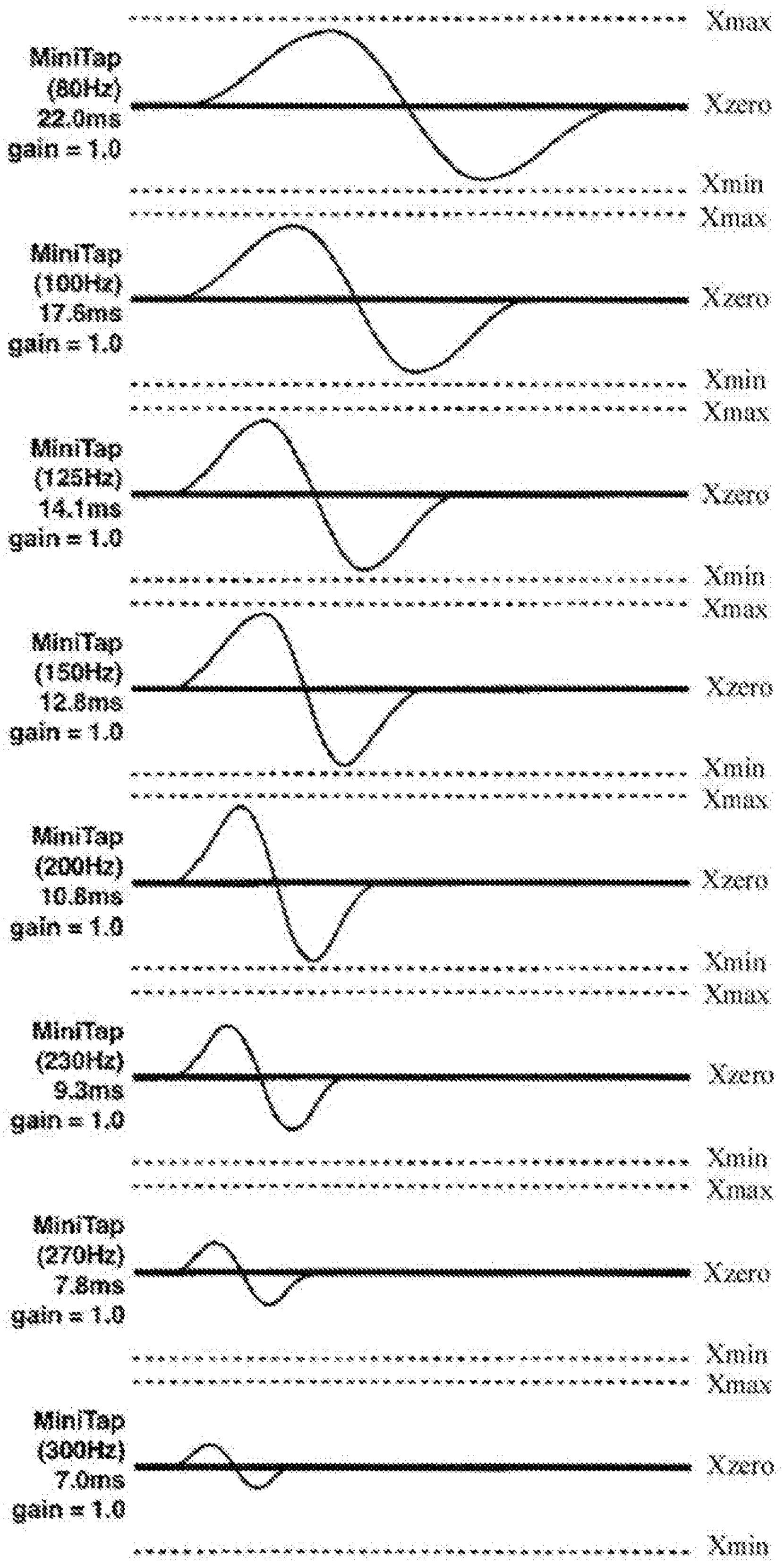
Figure 4E:
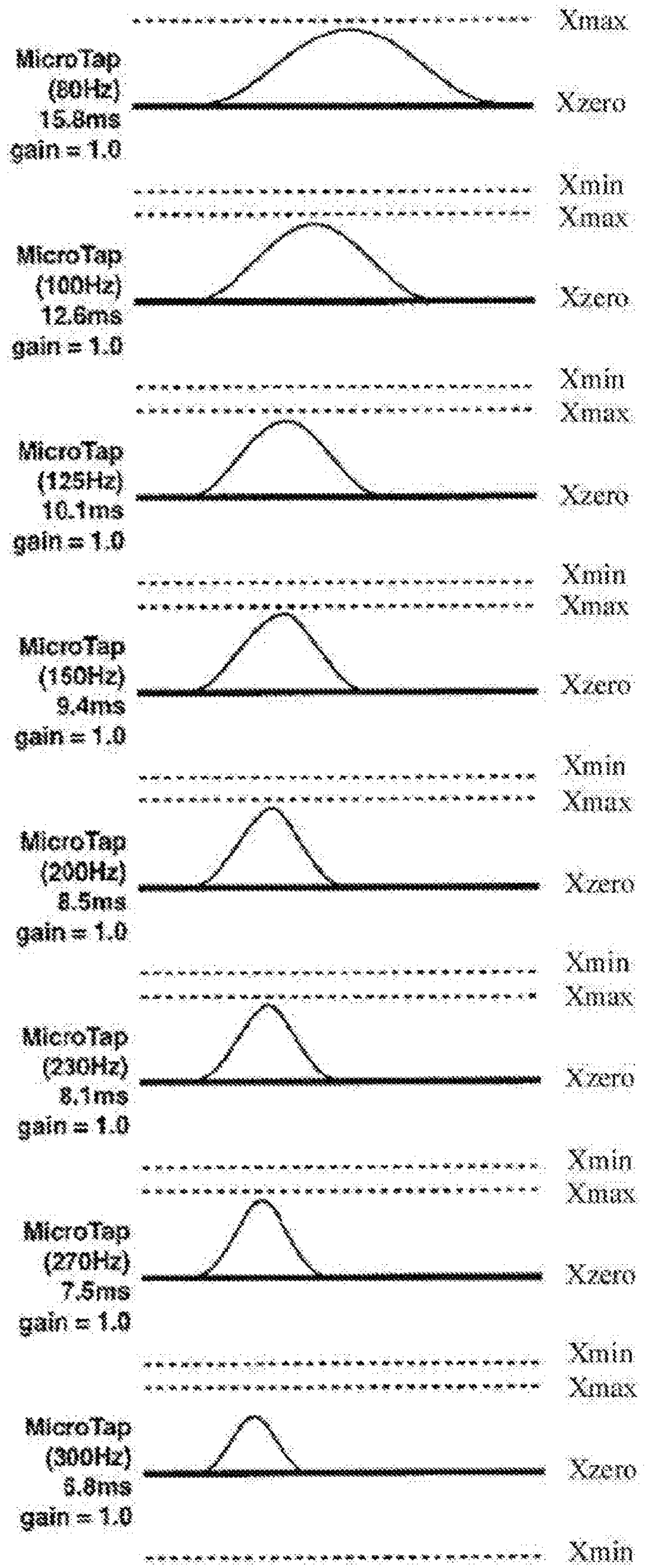
Figure 4F:
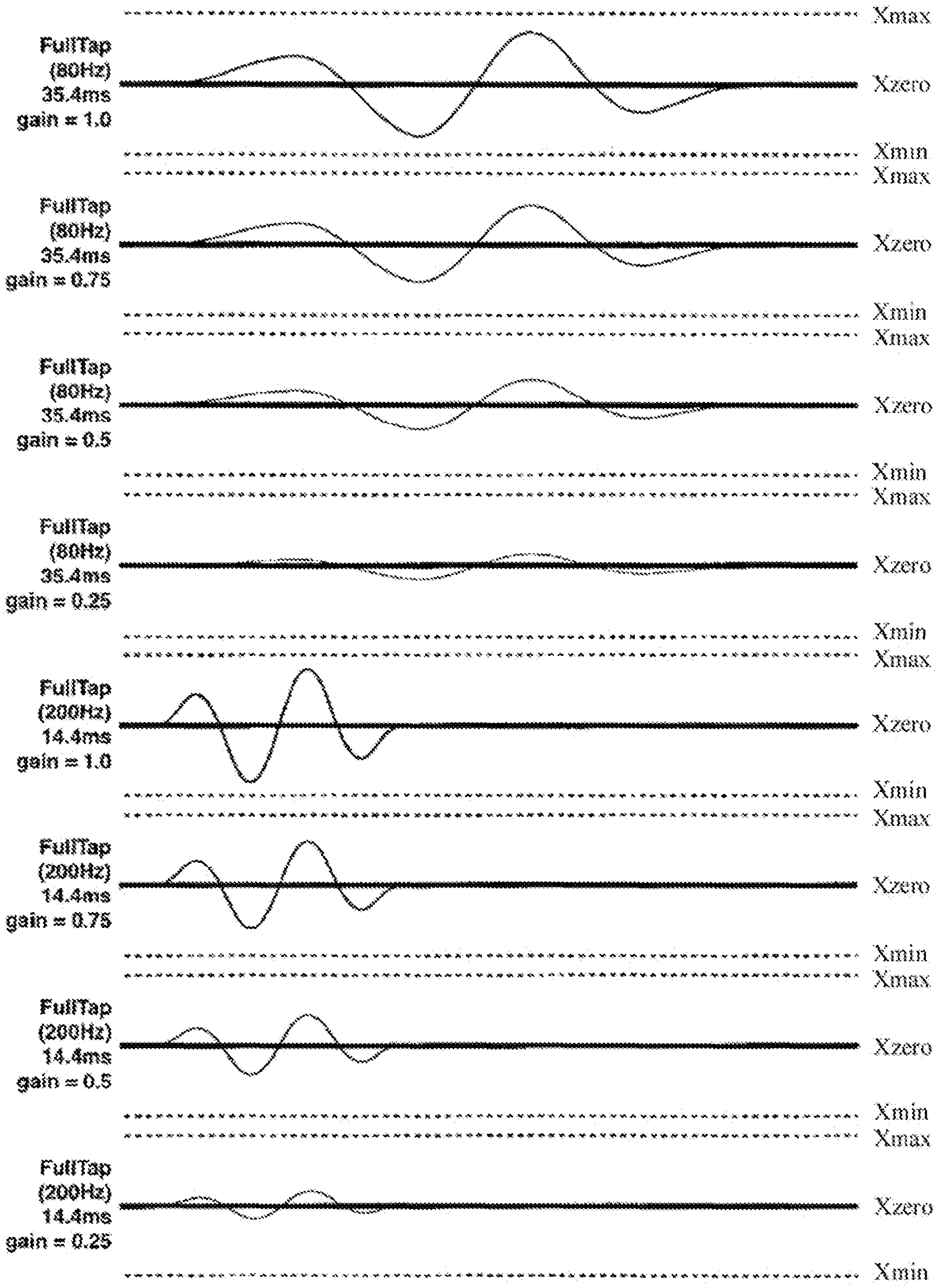
Figure 4G:
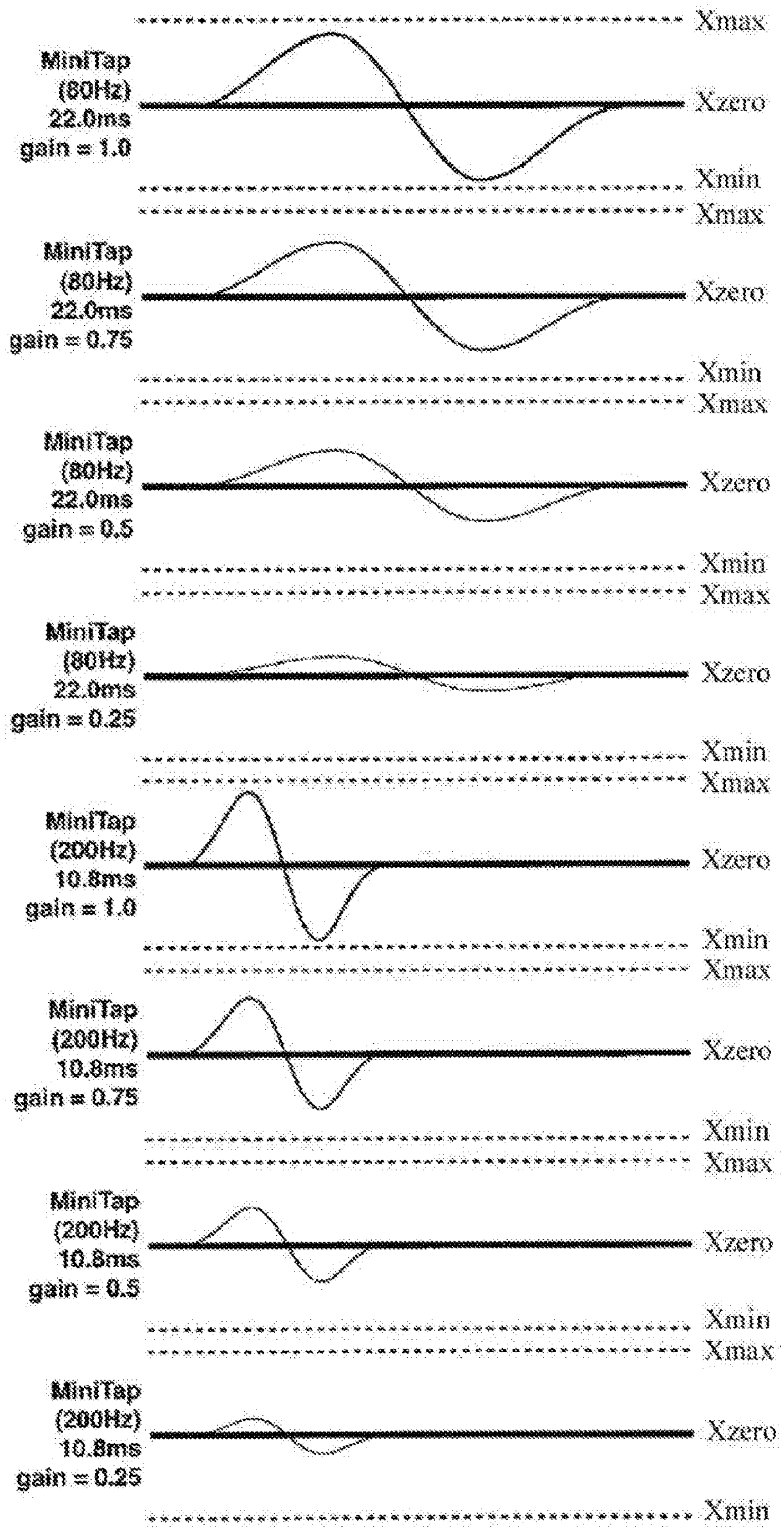
Figure 4H:
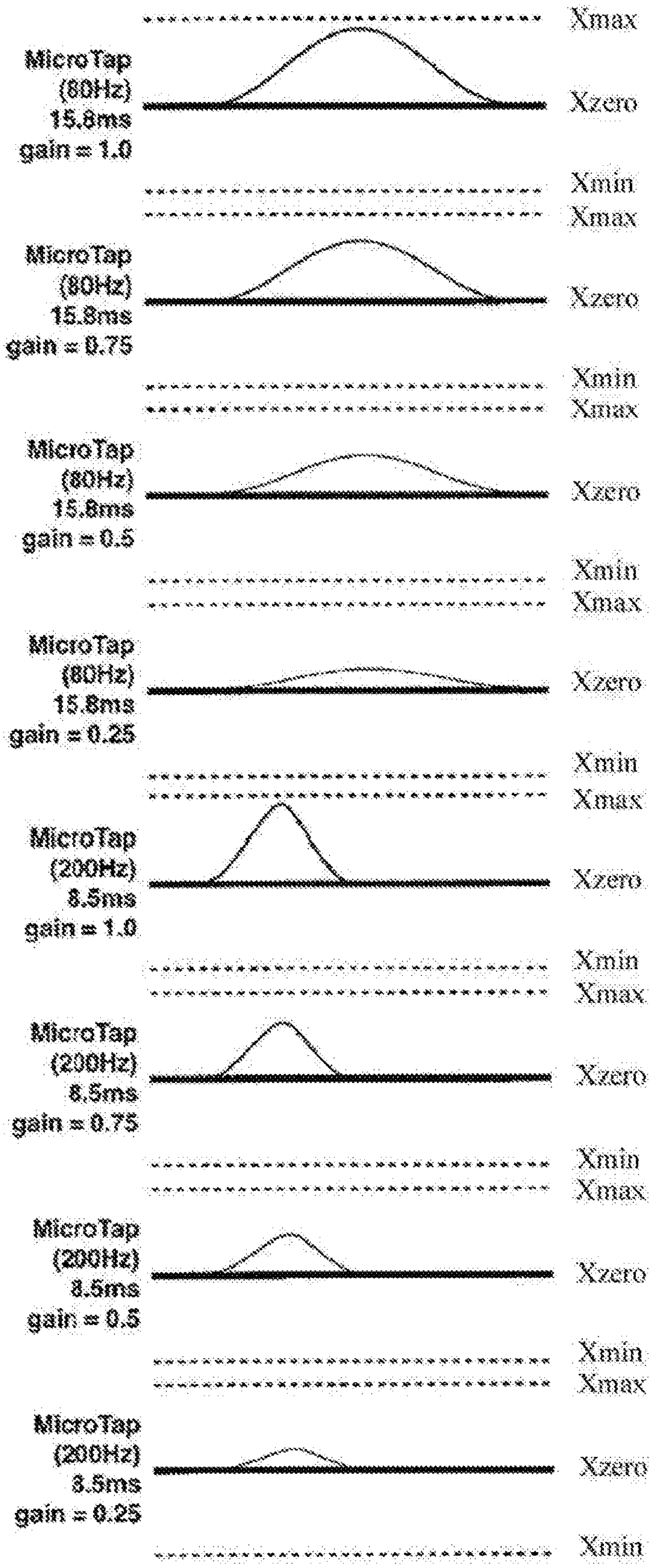

FIGS. 4C-4E provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 4F-4H, which are each shown with variants having a gain of 1.0, 0.75, 0.5, and 0.25. As shown in FIGS. 4F-4H, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 4C-4H show tactile output patterns that have a particular waveform. The waveform of a tactile output pattern represents the pattern of physical displacements relative to a neutral position (e.g., $x_{zero}$) versus time that an moveable mass goes through to generate a tactile output with that tactile output pattern. For example, a first set of tactile output patterns shown in FIG. 4C (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 4D (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 4E (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 4C-4H include $x_{min}$ and $x_{max}$ values which represent the maximum and minimum extent of movement of the moveable mass. For larger electronic devices with larger moveable masses, there may be larger or smaller minimum and maximum extents of movement of the mass. The examples shown in FIGS. 4C-4H describe movement of a mass in 1 dimension, however similar principles would also apply to movement of a moveable mass in two or three dimensions.

As shown in FIGS. 4C-4E, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 4C-4H, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4C). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 4C-4E, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 4C-4E for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. Table 1 provides examples of particular haptic feedback behaviors, configurations, and examples of their use.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

Secure element (e.g., 115) is a hardware component (e.g., a secure microcontroller chip) configured to securely store data or an algorithm such that the securely stored data is not accessible by the device without proper authentication information from a user of the device. Keeping the securely stored data in a secure element that is separate from other storage on the device prevents access to the securely stored data even if other storage locations on the device are compromised (e.g., by malicious code or other attempts to compromise information stored on the device). In some examples, the secure element provides (or releases) payment information (e.g., an account number and/or a transaction-specific dynamic security code). In some examples, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Additional details regarding the secure element and related techniques are described in the following applications: U.S. Patent Application Ser. No. 61/912,727, entitled "PROVISIONING AND AUTHENTICATING CREDENTIALS ON AN ELECTRONIC DEVICE", filed Dec. 6, 2013; U.S. Patent Application Ser. No. 62/004,182, entitled "ONLINE PAYMENTS USING A SECURE ELEMENT OF AN ELECTRONIC DEVICE", filed May 28, 2014; U.S. Patent Application Ser. No. 61/899,737, entitled "USING BIOAUTHENTICATION IN NEAR-FIELD-COMMUNICATION TRANSACTIONS", filed Nov. 4, 2013; U.S. Patent Application Ser. No. 61/905,035, entitled "GENERATING TRANSACTION IDENTIFIERS", filed Nov. 15, 2013; U.S. Patent Application Ser. No. 62/004,837, entitled "METHODS FOR MANAGING PAYMENT APPLETS ON A SECURE ELEMENT TO CONDUCT MOBILE PAYMENT TRANSACTIONS", filed May 29, 2014; U.S. Patent Application Ser. No. 62/004,832, entitled "METHODS FOR USING A RANDOM AUTHORIZATION NUMBER TO PROVIDE ENHANCED SECURITY FOR A SECURE ELEMENT", filed May 29, 2014; and U.S. Patent Application Ser. No. 62/004,338, entitled "USER DEVICE SECURE PARTICIPATION IN TRANSACTIONS VIA LOCAL SECURE ELEMENT DETECTION OF MECHANICAL INPUT", filed May 29, 2014; which are hereby incorporated by reference in their entirety.

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an example embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an example embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser.

No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
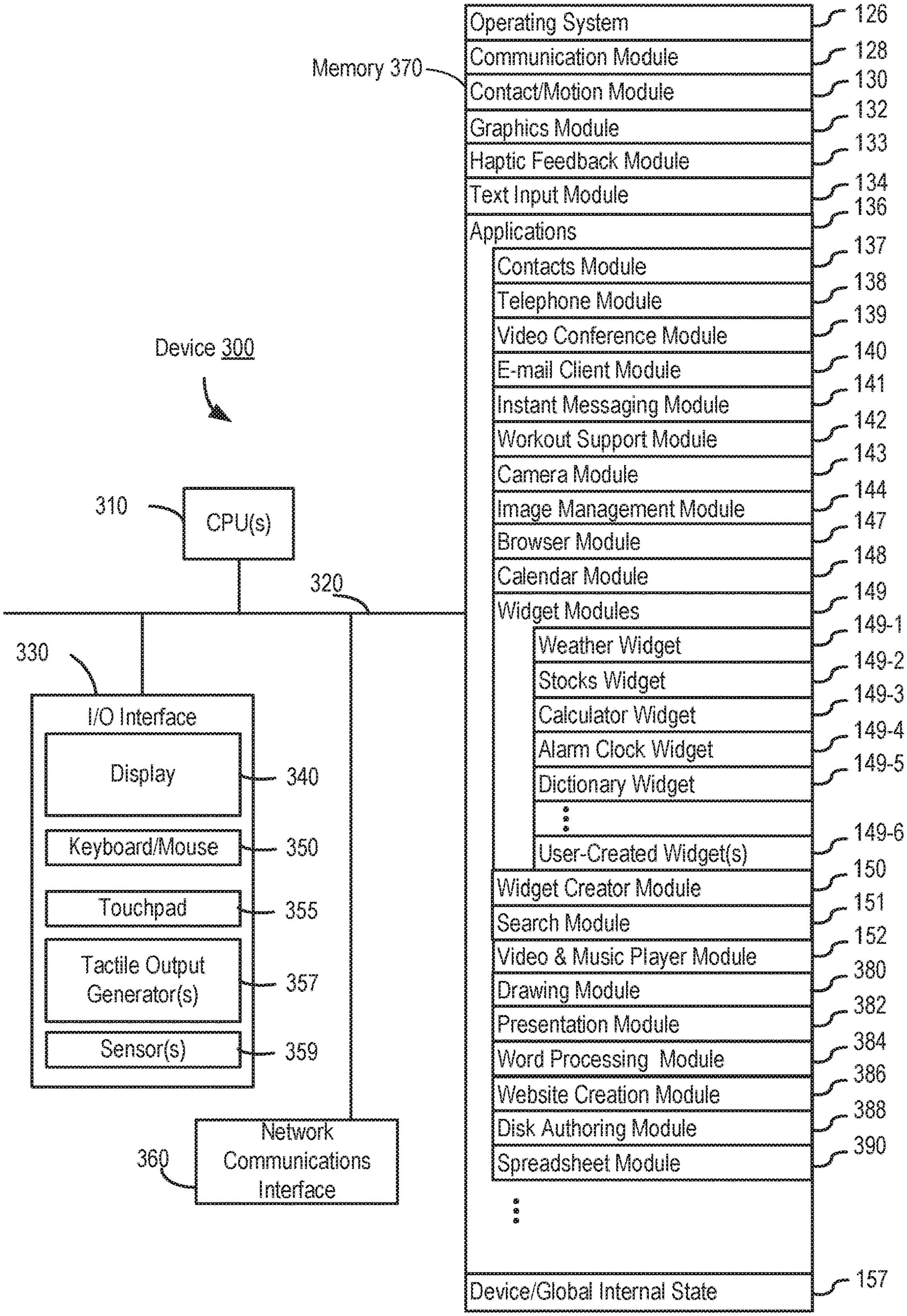
FIG. 3 is a block diagram of an example multifunction device with a display and a touch-sensitive surface, in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
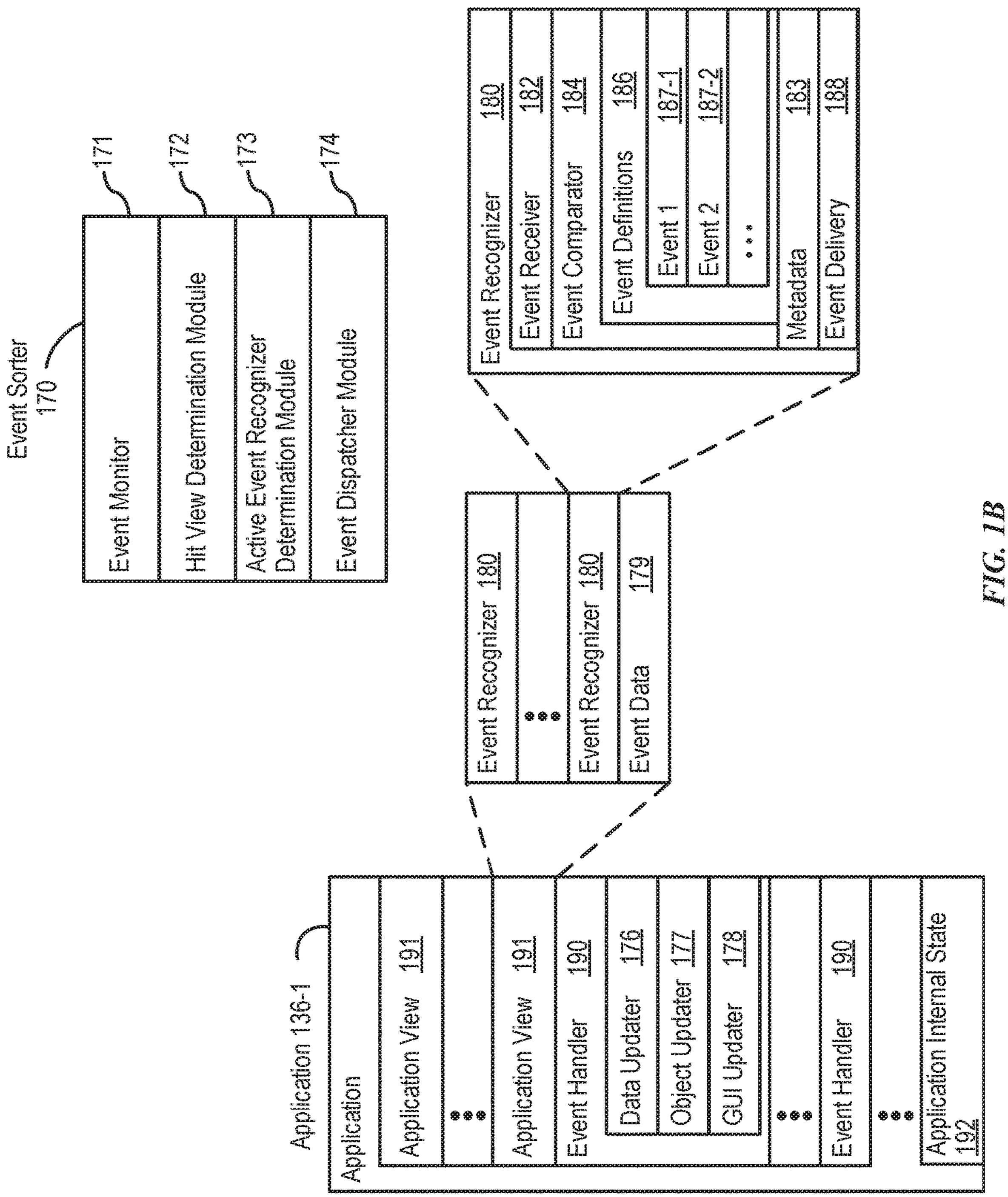
FIG. 1B is a block diagram illustrating example components for event handling, in accordance with some embodiments.

FIG. 1B is a block diagram illustrating example components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates anew user-interface objector updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

Figure 1C:
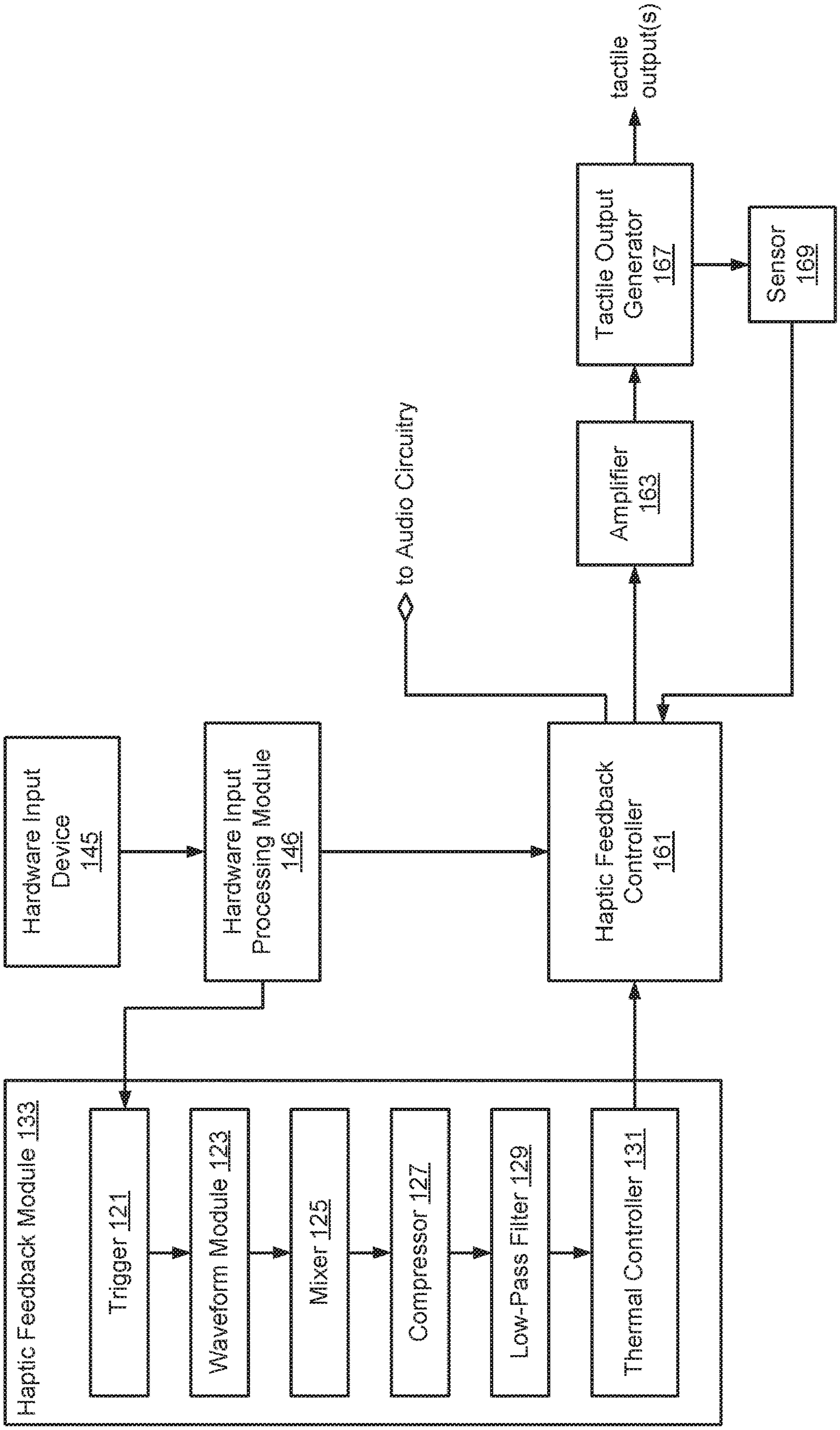
FIG. 1C is a block diagram illustrating example components for generating a tactile output, in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4C-4D).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
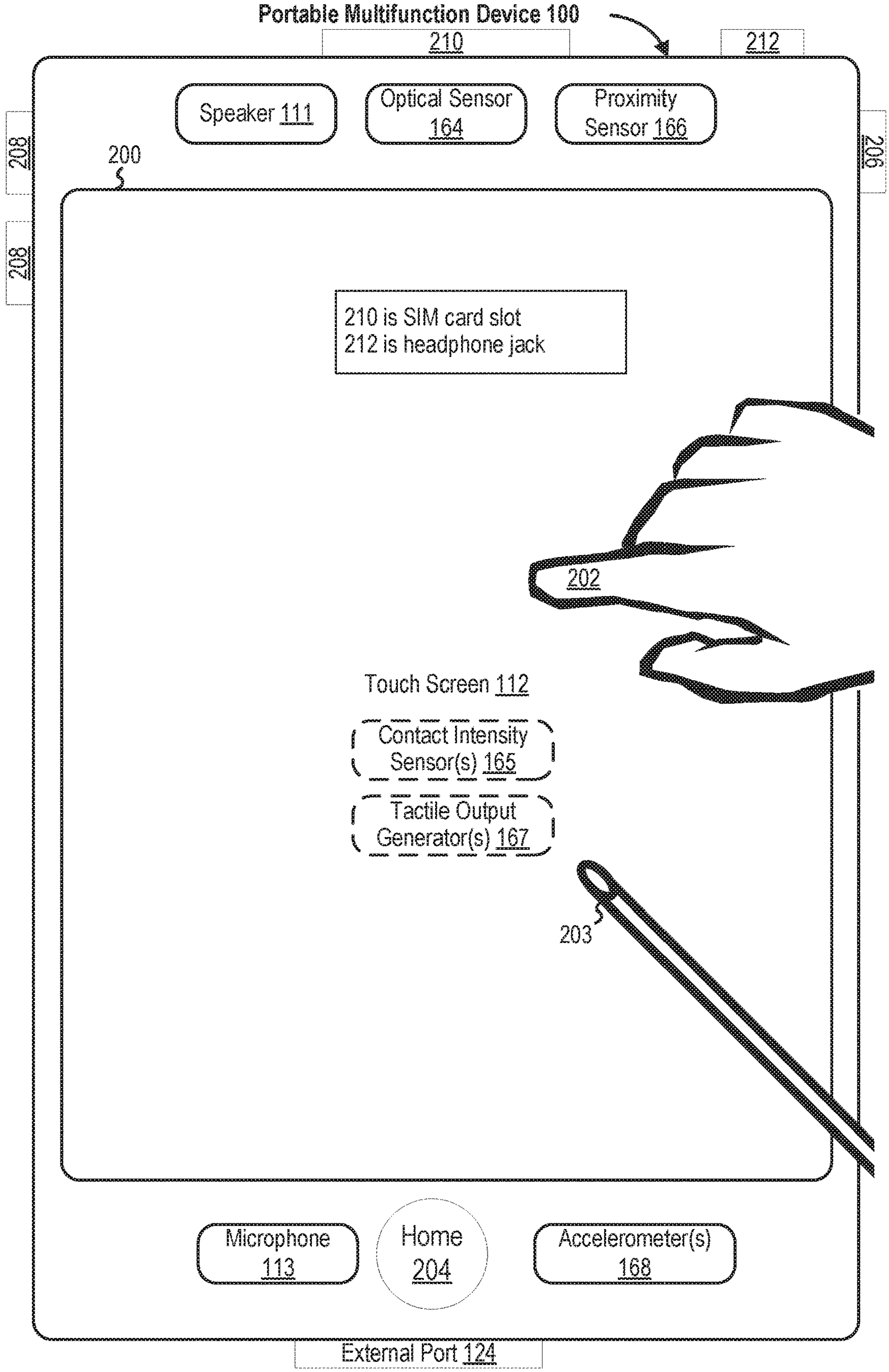
FIG. 2 illustrates a portable multifunction device having a touch screen, in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely examples. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
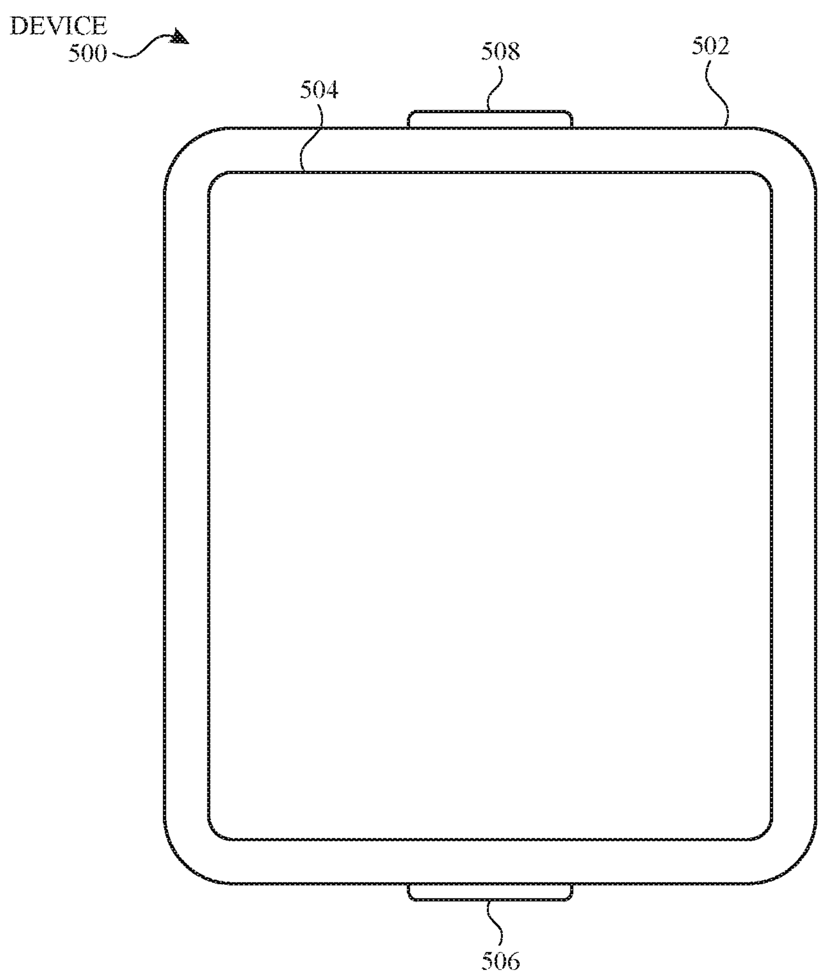
FIG. 5A illustrates a personal electronic device, in accordance with some embodiments.
Figure 6:
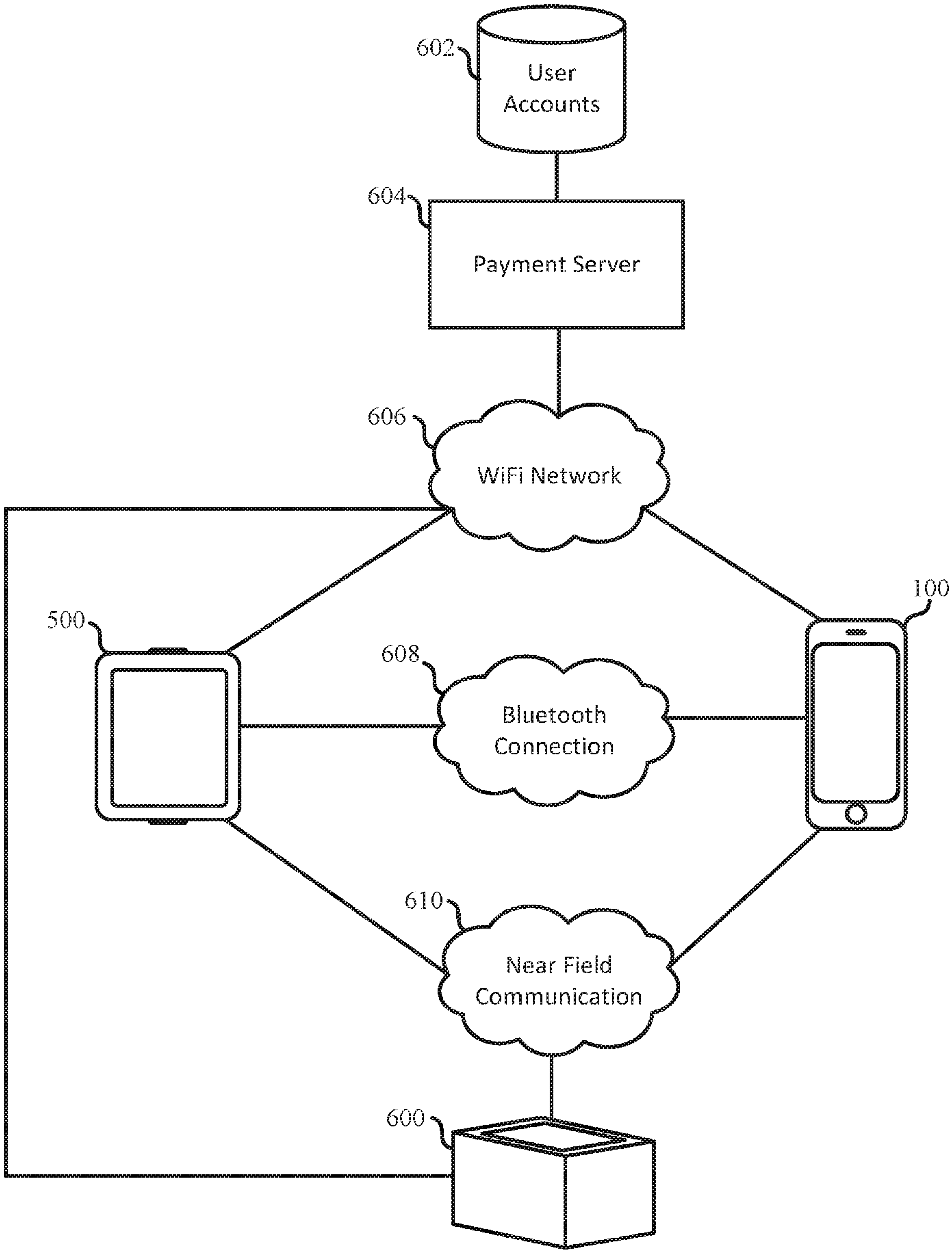
FIG. 6 illustrates example devices connected via one or more communication channels, in accordance with some embodiments.

FIG. 5A illustrates example personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Example techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
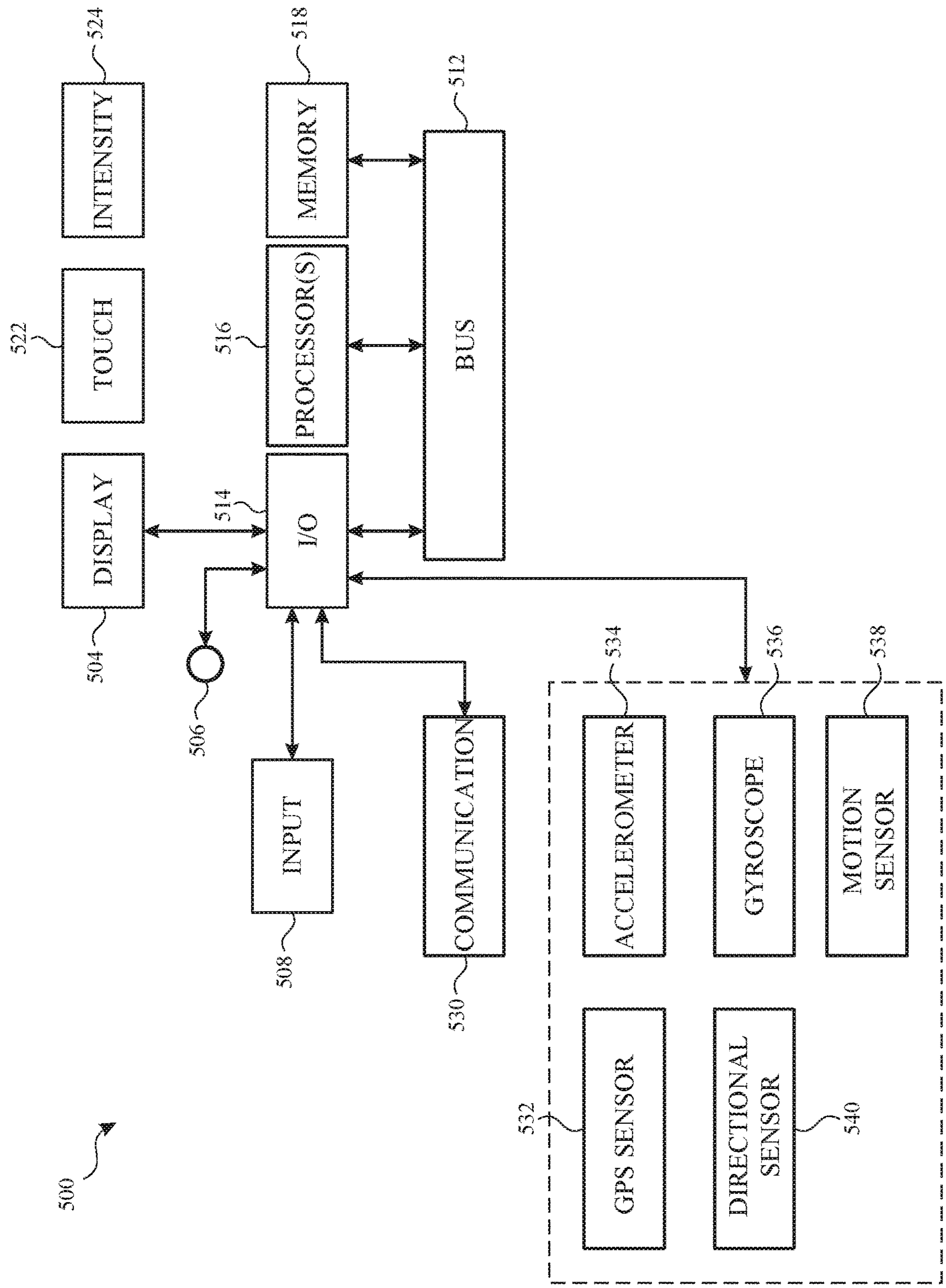
FIG. 5B is a block diagram illustrating a personal electronic device, in accordance with some embodiments.

FIG. 5B depicts example personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 900, 1200, 1500, 1800, 2100, 2400, 2700, and 3000 (FIGS. 9A-9I, 12A-12C, 15A-15K, 18A-18F, 21A-21D, 24A-24C, 27A-27E, and 30A-30D). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
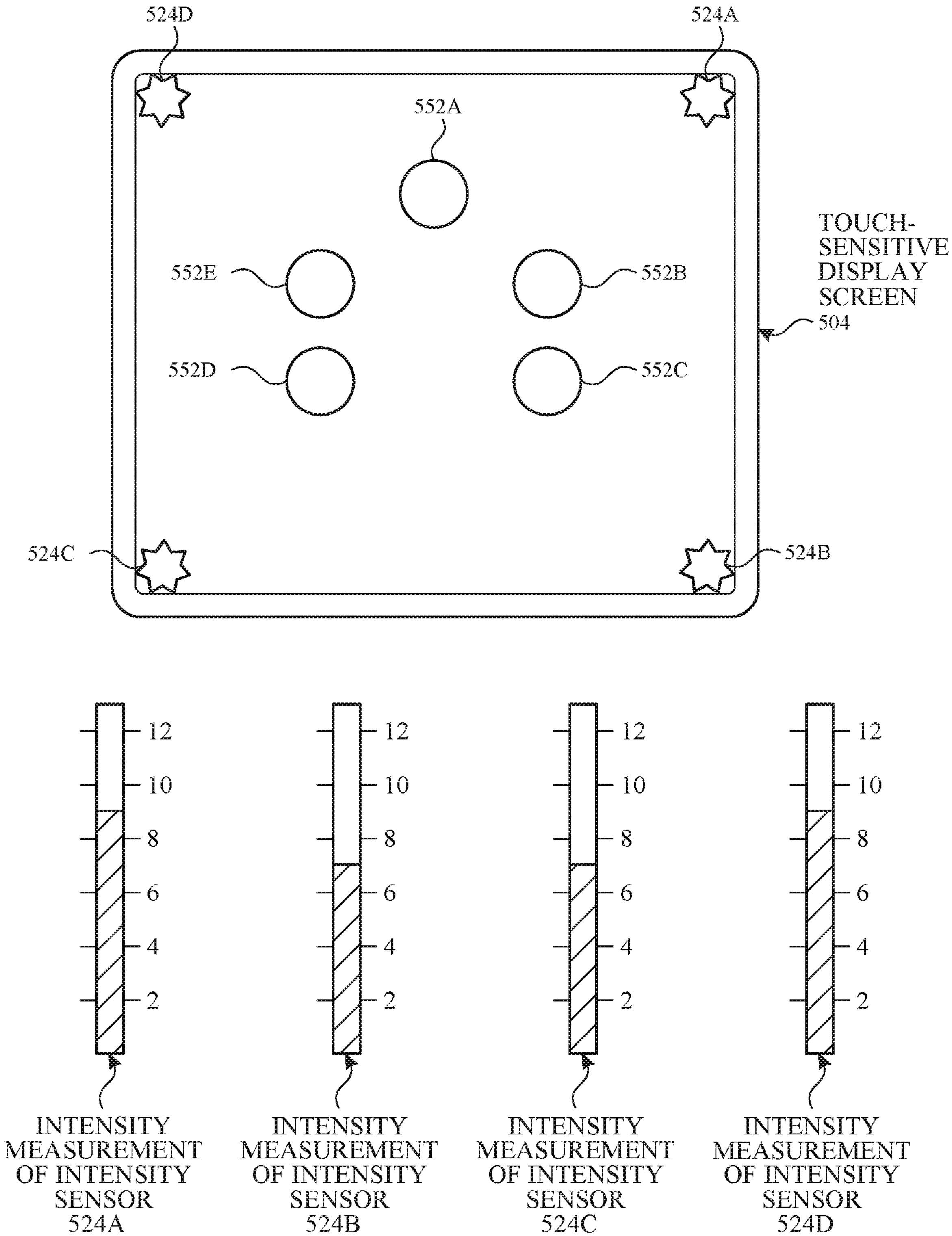
FIGS. 5C-5D illustrate example components of a personal electronic device having a touch-sensitive display and intensity sensors, in accordance with some embodiments.
Figure 5D:
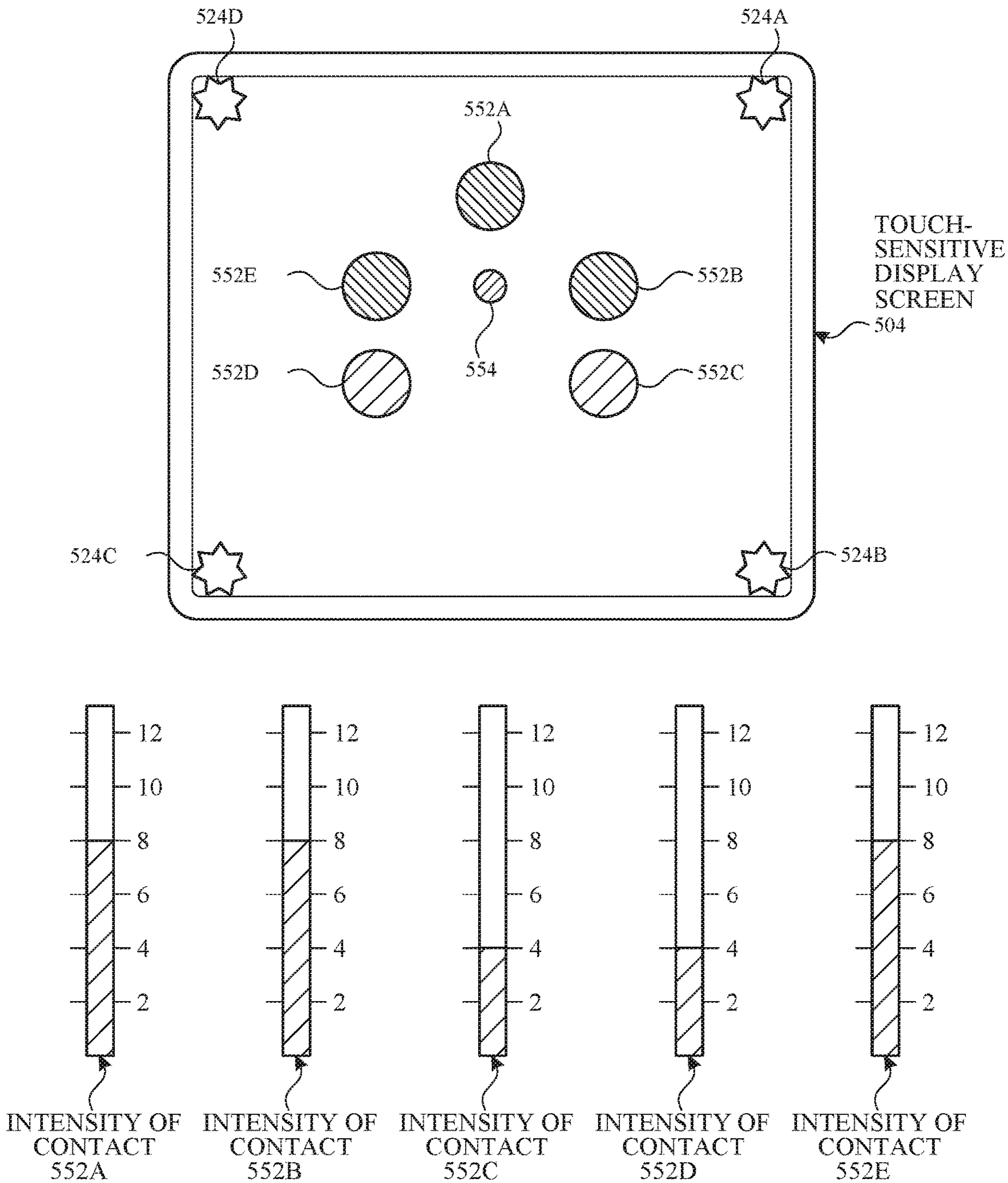

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
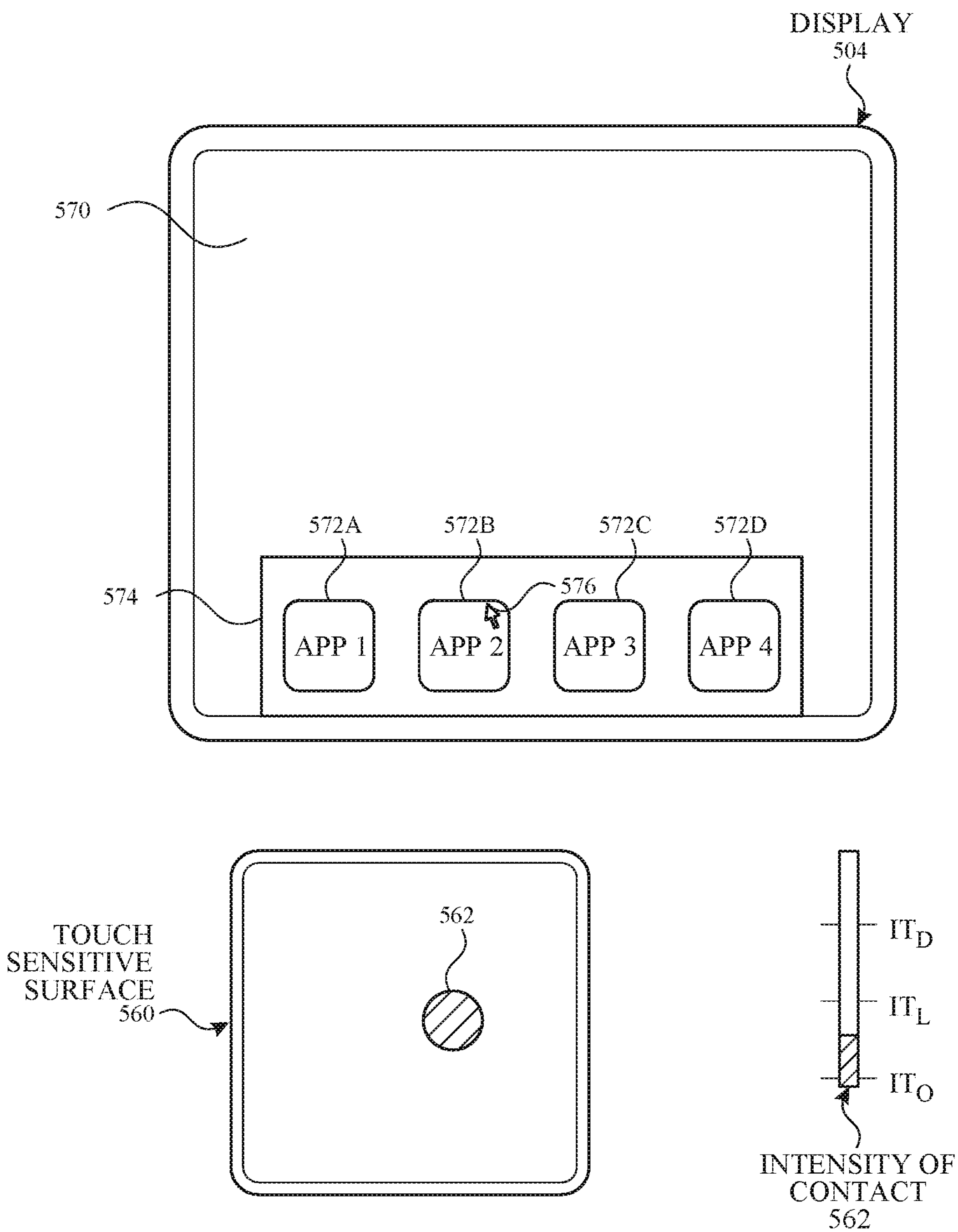
FIGS. 5E-5H illustrate example components and user interfaces of a personal electronic device, in accordance with some embodiments.
Figure 5F:
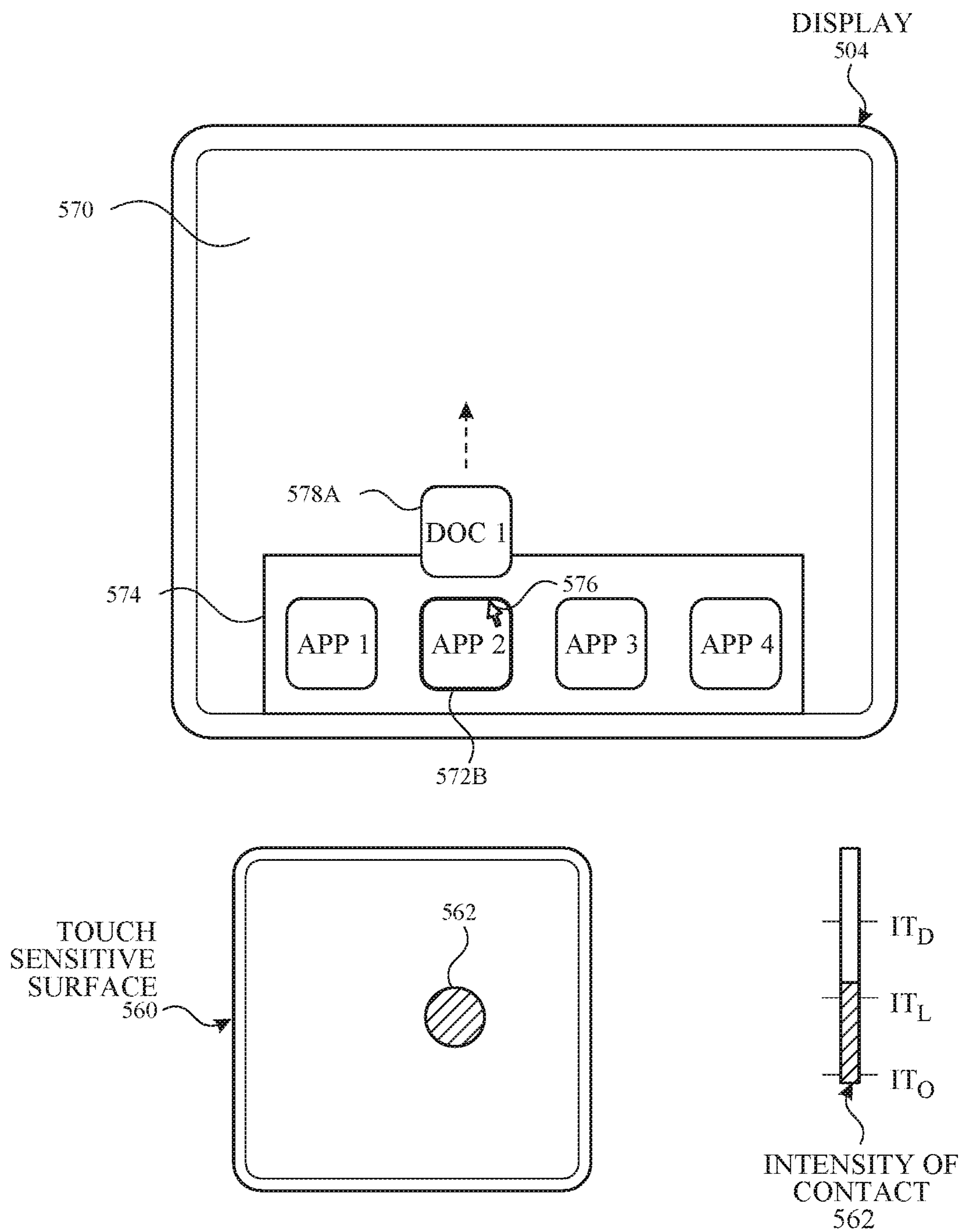
Figure 5G:
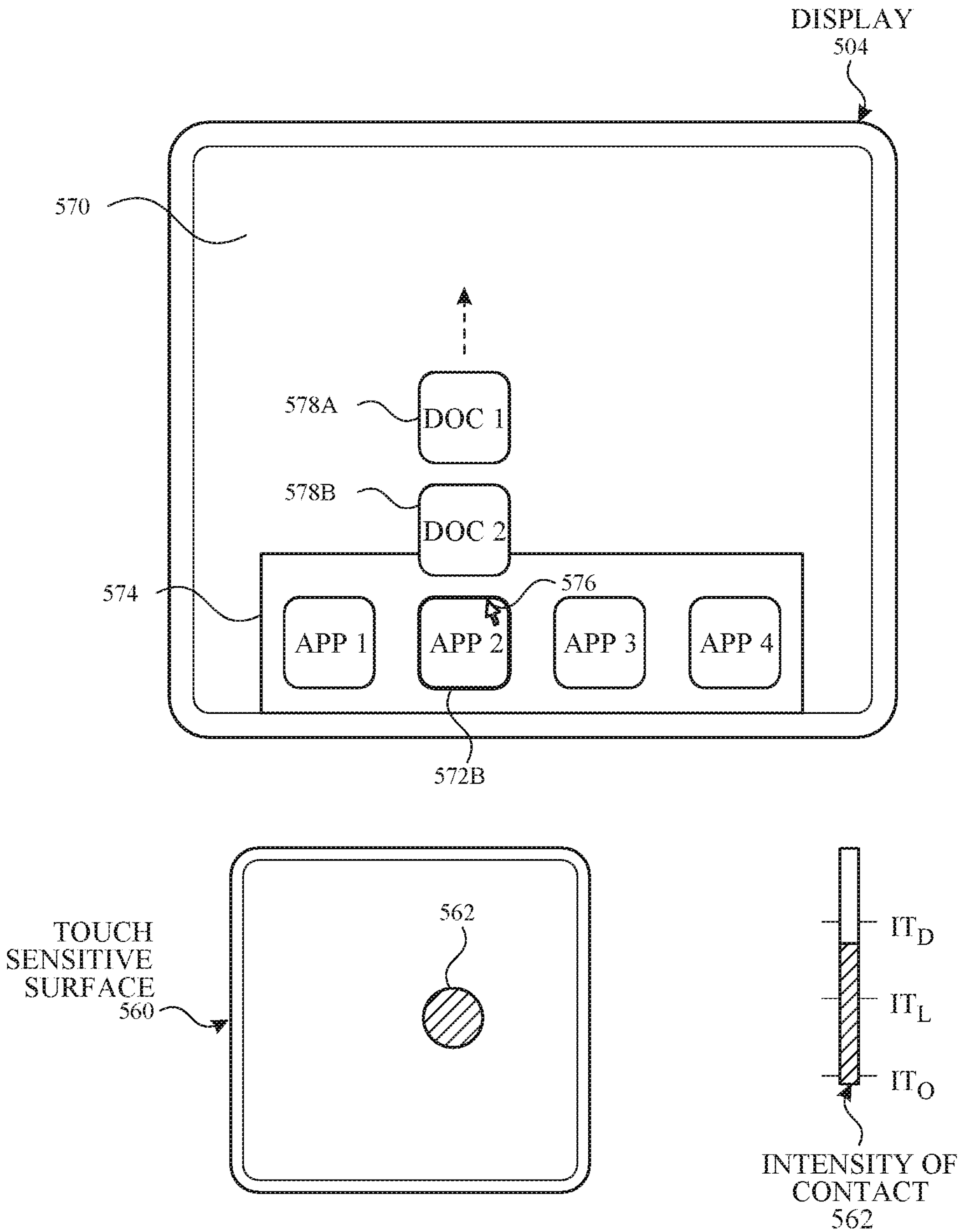
Figure 5H:
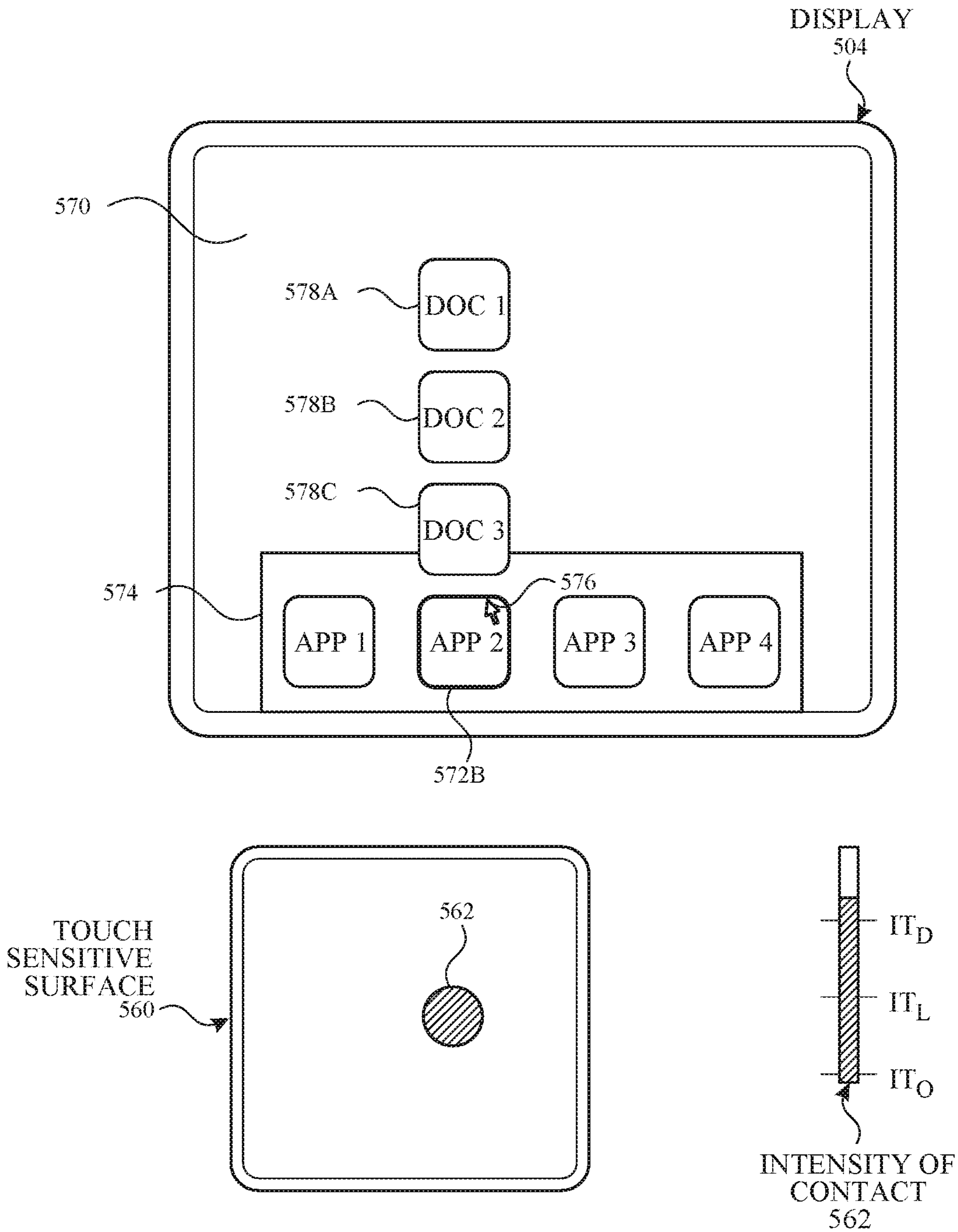

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIG. 6 illustrates example devices connected via one or more communication channels to participate in a transaction in accordance with some embodiments. One or more example electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some examples, payment account information includes include an image, such as a picture of a payment card (e.g., taken by the device and/or received at the device). In some examples, the electronic devices receive user input including at least some payment account information (e.g., receiving user-entered credit, debit, account, or gift card number and expiration date). In some examples, the electronic devices detect at least some payment account information from an image (e.g., of a payment card captured by a camera sensor of the device). In some examples, the electronic devices receive at least some payment account information from another device (e.g., another user device or a server). In some examples, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some examples, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 608 (e.g., which includes a traditional Bluetooth connection or a Bluetooth Low Energy connection) or using a WiFi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some examples, electronic device (e.g., 100, 300, 500) communicates with payment terminal 600 using an NFC channel 610. In some examples, payment terminal 600 communicates with an electronic device (e.g., 100, 300, 500) using a peer-to-peer NFC mode. Electronic device (e.g., 100, 300, 500) is optionally configured transmit a signal to payment terminal 600 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 600. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some examples, if a communication channel (e.g., an NFC communication channel) with another device (e.g., payment terminal 600) is established within a defined time period from detection of the input, the secure element releases payment information to be transmitted to the other device (e.g., payment terminal 600). In some examples, the secure element is a hardware component that controls release of secure information. In some examples, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some examples, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some examples, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some examples, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some examples, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS (point of sale) payment terminal 600 with an indication as to whether a proposed purchase is authorized or denied. In some examples, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state may respond to a limited set of user inputs, including input that corresponds to an attempt to transition the device to the unlocked state or input that corresponds to powering the device off.

In some examples, a secure element (e.g., 115) is a hardware component (e.g., a secure microcontroller chip) configured to securely store data or an algorithm such that the securely stored data is not accessible by the device without proper authentication information from a user of the device. Keeping the securely stored data in a secure element that is separate from other storage on the device prevents access to the securely stored data even if other storage locations on the device are compromised (e.g., by malicious code or other attempts to compromise information stored on the device). In some examples, the secure element provides (or releases) payment information (e.g., an account number and/or a transaction-specific dynamic security code). In some examples, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Attention is now directed towards embodiments of user interfaces ("UI") and associated processes that are implemented on an electronic device, such as portable multifunction device 100, device 300, or device 500.

FIGS. 7A-7E illustrate example user interfaces for managing peer-to-peer transfers, in accordance with some embodiments. As described in greater detail below, the non-limiting example embodiment of the user interfaces illustrated in FIGS. 7A-7E relate to the non-limited example embodiment of the user interfaces illustrated in FIGS. 8A-8AH, which in turn are used to illustrate the processes described below, including the processes in FIGS. 9A-9I.

Figure 7A:
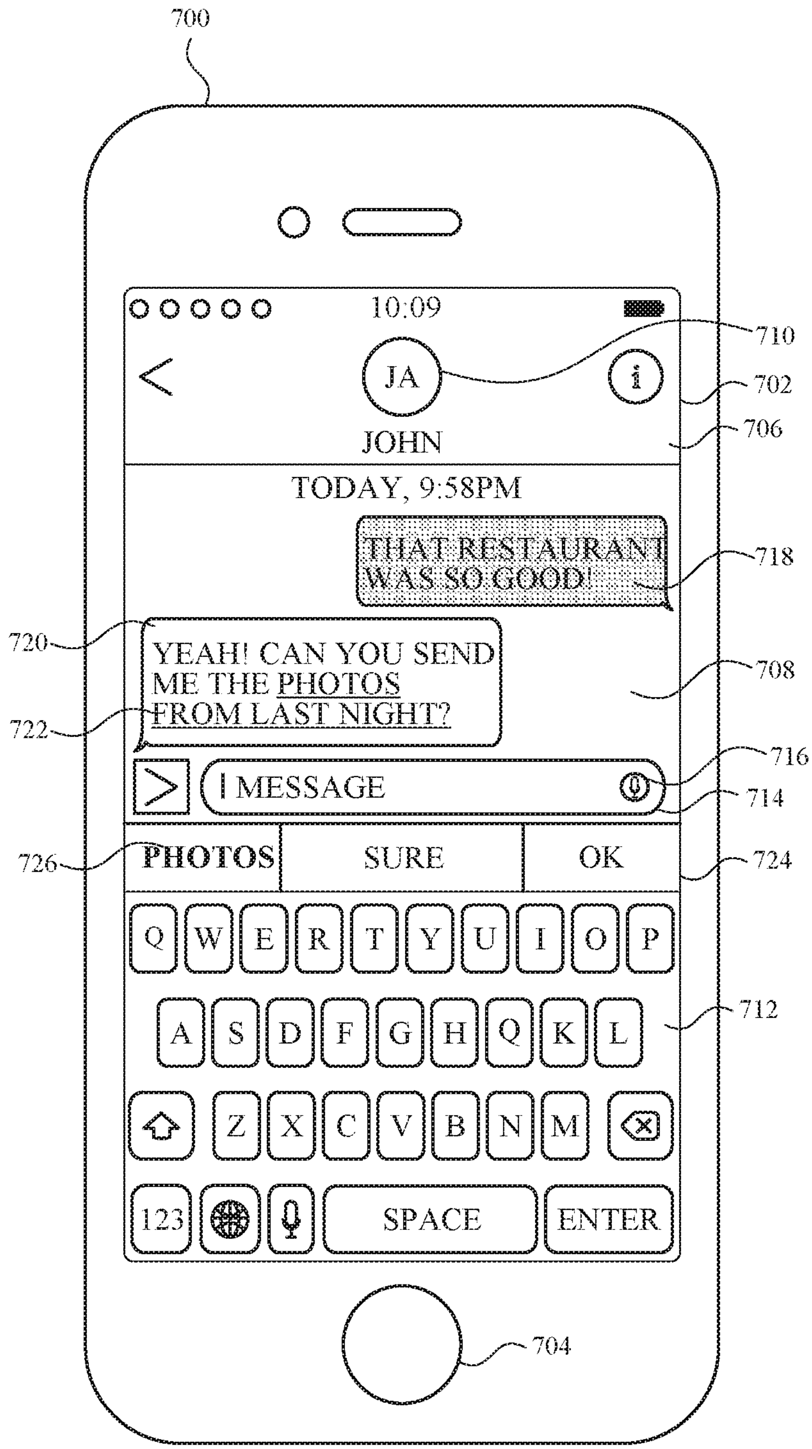
FIGS. 7A-7E illustrate example user interfaces for initiating and managing file transfers, in accordance with some embodiments.

FIG. 7A illustrates an electronic device 700 (e.g., portable multifunction device 100, device 300, or device 500). In the non-limiting example embodiment illustrated in FIGS. 7A-7E, electronic device 700 is a smartphone. In other embodiments, electronic device 700 can be a different type of electronic device, such as a wearable device (e.g., a smartwatch). Electronic device 700 has a display 702, one or more input devices (e.g., touchscreen of display 702, a mechanical button 704, a mic), and a wireless communication radio.

In FIG. 7A, electronic device 700 displays, on display 702, a message conversation 708 of a messaging application 706 between a user of the device (e.g., "Kate Appleseed") and a message participant 710 (e.g., "John Appleseed"). In some embodiments, message participant 710 is a contact stored on the device. In some embodiments, message participant 710 is a contact of a contact list associated with the user account logged onto the device. In some embodiments, message participant 710 is a contact included in a trusted contacts list associated with the user account logged onto the device.

In some embodiments, electronic device 700 also displays, on display 702, a virtual keyboard 712 (e.g., an alphanumeric keyboard for typing a message) and a compose bar 714 displaying the text of a message as a message is typed using virtual keyboard 712. In some embodiments, a mechanical keyboard can be used in addition to or alternatively to virtual keyboard 712 to type a message. In some embodiments, compose bar 714 can expand (e.g., expand upwards) to accommodate a longer message or message object (e.g., an image, an emoticon, a special type of message object, such as a payment object). In some embodiments, compose bar 714 includes a mic button 716 which, when activated, enables the user to record a message using voice input.

As shown in FIG. 7A, message conversation 708 includes two visible message objects 718 and 720. Message object 718 corresponds to a message sent by the user of the device to message participant 710. In message object 718, the user states to message participant 710: "That restaurant was so good!" Message object 720 corresponds to a message sent by message participant 710 to the user (as a response to the message corresponding to message object 718). In message object 720, message participant 710 responds to the user: "Yeah! Can you send me the photos from last night?"

In some embodiments, electronic device 700 performs an analysis of the contents (e.g., the text) of the message corresponding to message object 720 (stating, as a response to the message corresponding to message object 718 stating "That restaurant was so good!", "Yeah! Can you send me the photos from last night?"). In some embodiments, the analysis of the contents (e.g., the text) of the message is performed by electronic device 700 using a language processing component or a language analysis component of the device. In some embodiments, the analysis is performed at an external device (e.g., a server), and electronic device 700 receives a result of the analysis from the external device.

Based on the analysis of the contents (e.g., the text) of message object 720 (and, optionally, one or more other previous or subsequent message objects of message conversation 708, such as message object 718 and 720), in accordance with a determination (e.g., made at electronic device 700 or received from an external device, such as a server) that the contents (e.g., the text) of the message corresponding to message object 720 relates to a transfer of an electronic file (e.g., a photo, a video, a document, an audio file) that messaging application 706 is configured to transfer, electronic device 700 displays a selectable indication that corresponds to a transfer of one or more files (e.g., photos, video files, audio files, documents) or to an intent to proceed with a transfer of one or more files (e.g., photos, video files, audio files, documents), as discussed below. For example, in FIG. 7A, a determination is made, based on the text of message object 720 (stating "Yeah! Can you send me the photos from last night?") that message participant 710 is requesting a transfer of photos taken from a specific time period (e.g., last night).

In some embodiments, as shown in FIG. 7A, electronic device 700 provides a marking 722 (e.g., underlining, bolding, highlighting) of a phrase (e.g., "photos from last night") within message object 720 that is determined (based on the analysis discussed above) by the device or by an external device (e.g., a server) communicating with the device to correspond to the request for the transfer of one or more files (e.g., photos from last night). Additionally, in response to the determination that a phrase within the message corresponds to a request for a transfer of one or more files, electronic device 700 displays (e.g., over a portion of virtual keyboard 712, between virtual keyboard 712 and compose bar 714) a suggestions bar 724 that includes a transfer button 726 for proceeding with a transfer of the requested one or more files corresponding to the message of message object 720. For example, in FIG. 7A, transfer button 726 shows "PHOTOS" to indicate that the button relates to the transfer of the requested photos, and that the transfer can be made using an operating-system (first-party) controlled transfer application (and not by a third-party application). In some embodiments, suggestions bar 724 also includes suggested responses (e.g., "Sure," "OK") for responding to the message of message object 720 (without proceeding with a transfer of a file).

Figure 7B:
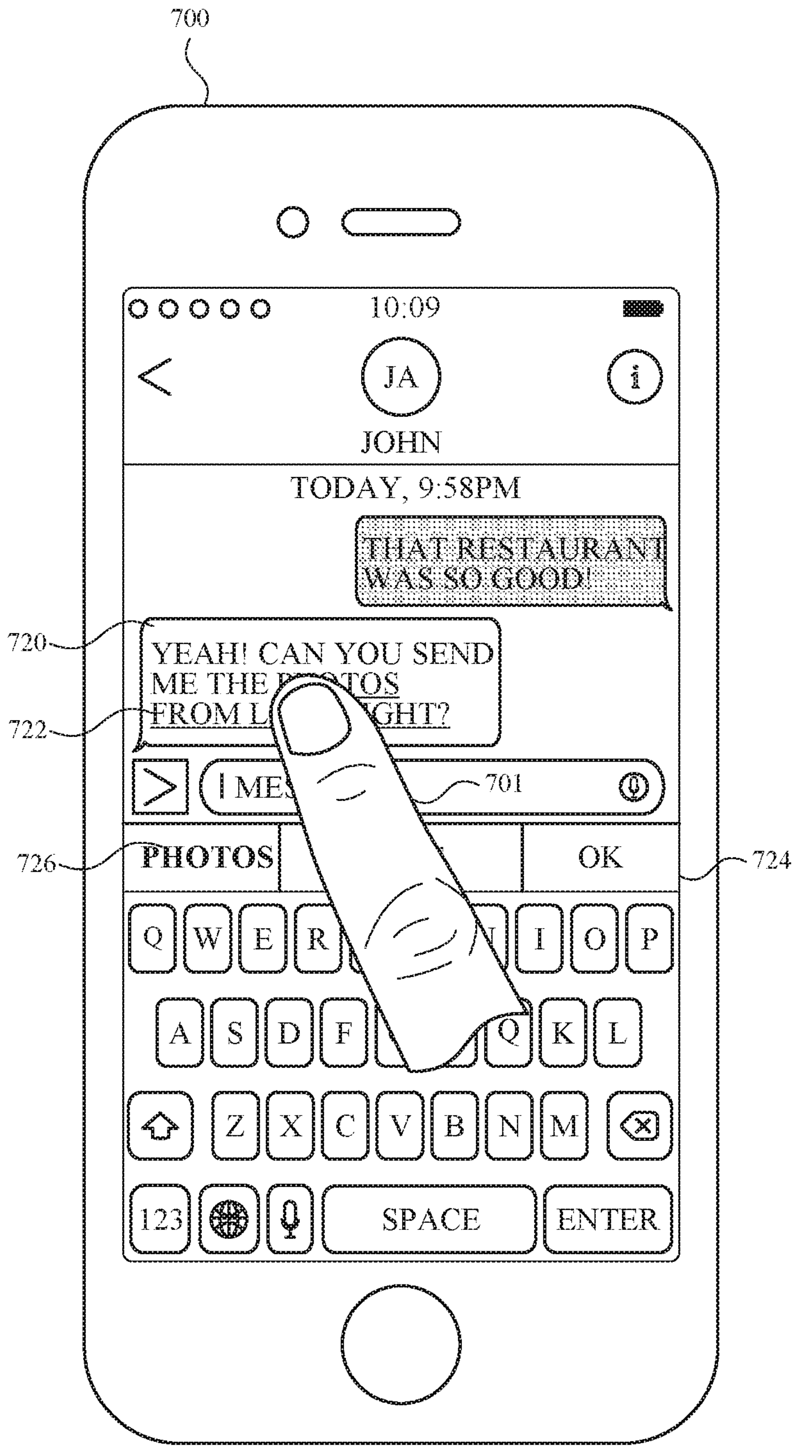
Figure 8A:
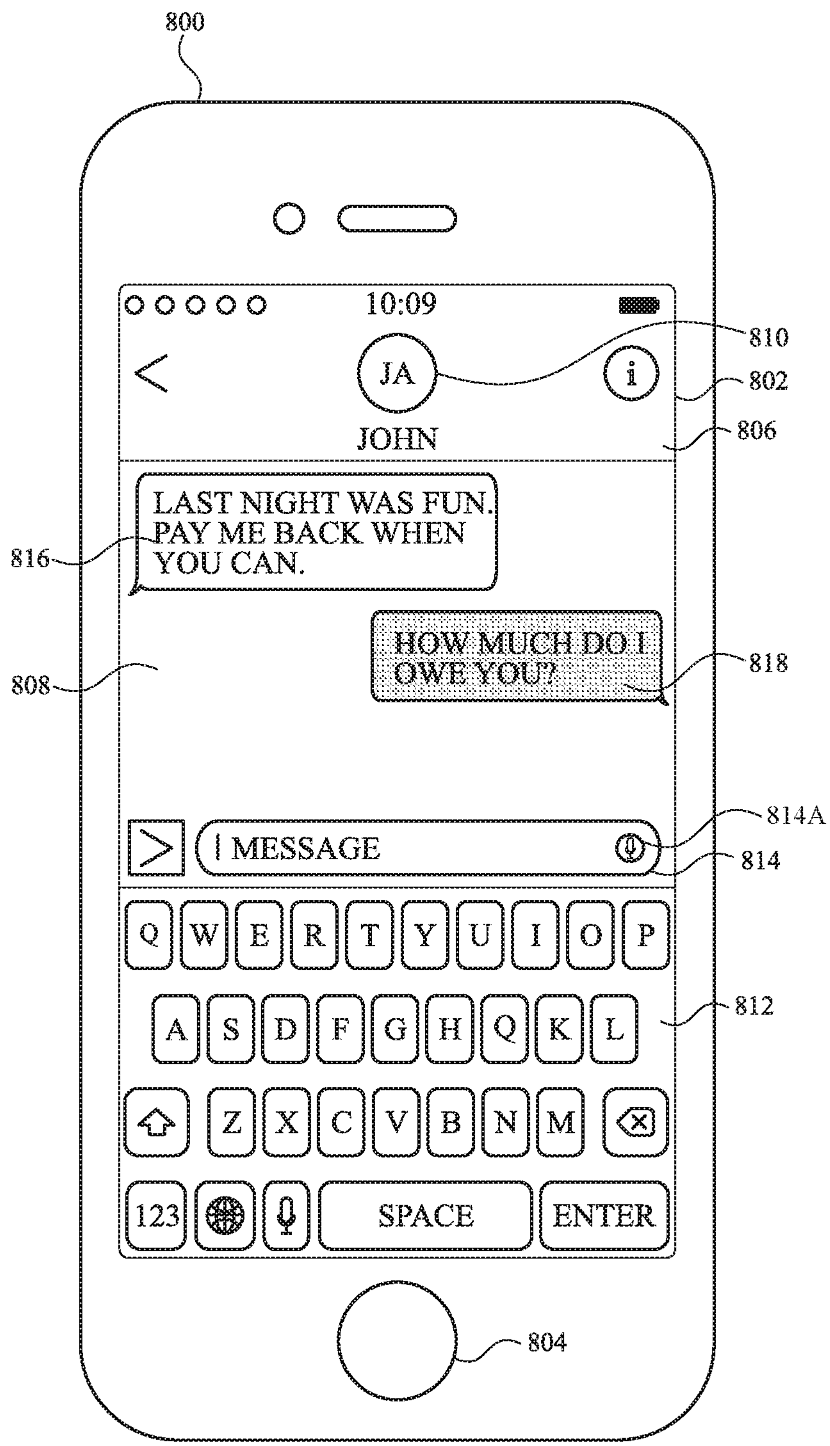
FIGS. 8A-8AH illustrate example user interfaces for initiating and managing transfers, in accordance with some embodiments.

In FIG. 7B, while displaying message conversation 708, electronic device 700 detects (e.g., via the touchscreen) user activation of marking 722 of the phrase corresponding to the request for transfer of one or more files (e.g., photos from last night) included in message object 720. For example, as shown in FIG. 7B, the user activation is a tap gesture 701 of marking 722 of the phrase (e.g., the underlined "photos from last night") included in message object 720. Alternatively, in some embodiments, the user activation can be user selection (e.g., a tap gesture) of transfer button 726 (e.g., showing "PHOTOS") within suggestions bar 724.

Figure 7C:
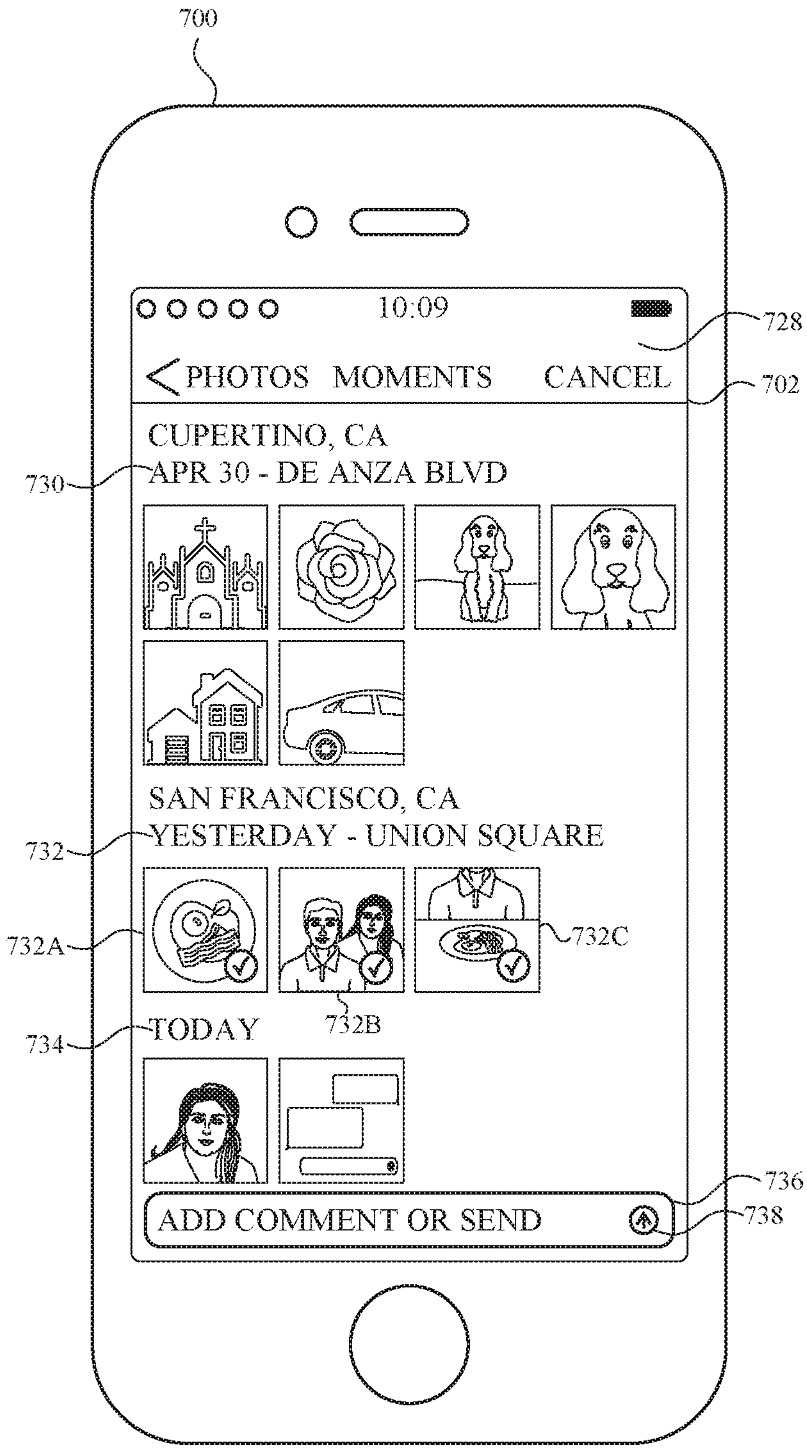

In FIG. 7C, in response to detecting tap gesture 701 on marking 722 corresponding to message participant 710's request for "photos from last night," electronic device 700 displays, on display 702, a photo gallery user interface 728. In some embodiments, as shown in FIG. 7C, photo gallery user interface 728 replaces display of messaging application 706 and virtual keyboard 712. In some embodiments, photo gallery user interface 728 slides into the display from an edge of the display (e.g., slides up from the bottom edge of the display) to replace display of virtual keyboard 712 (and, optionally, messaging application 706).

In some embodiments, as shown in FIG. 7C, photo gallery user interface 728 includes a plurality of selectable preview images corresponding to photos stored on electronic device 700 (or accessible by the device via a remote server). In some embodiments, as shown in FIG. 7C, the plurality of selectable preview images are organized based on time (e.g., a date during which a photo was taken) and/or based on location (e.g., of where a photo was taken). For example, the plurality of selectable preview images 730A-730F shown under header 730 correspond to photos taken on April 30 at Cupertino, Calif., the plurality of selectable preview images 732A-732C shown under header 732 corresponds to photos taken yesterday at San Francisco, Calif., and the plurality of selectable preview images 734A-734B shown under header 734 correspond to photos taken today.

Further, because photo gallery user interface 728 was launched via user activation of marking 722 corresponding to the detected request for a transfer of "photos from last night" from message participant 710, selectable preview images that are consistent with the detected request are pre-selected (to be transferred) when photo gallery user interface 728 is displayed. In photo gallery user interface 728, plurality of selectable preview images 732A-732C correspond to photos taken last night (e.g., as indicated by header 732). Thus, as shown in FIG. 7C, each of selectable preview images 732A-732C are pre-selected (e.g., as indicated by graphical checkmarks on the preview images) to be transferred to message participant 710 via messaging application 706.

In some embodiments, as also shown in FIG. 7C, photo gallery user interface 728 includes a compose bar 736 (e.g., corresponding to compose bar 714) for including a comment to accompany the transfer (e.g., of selected photos), and a send button 738 for initiating the transfer (e.g., of the selected photos).

Figure 7D:
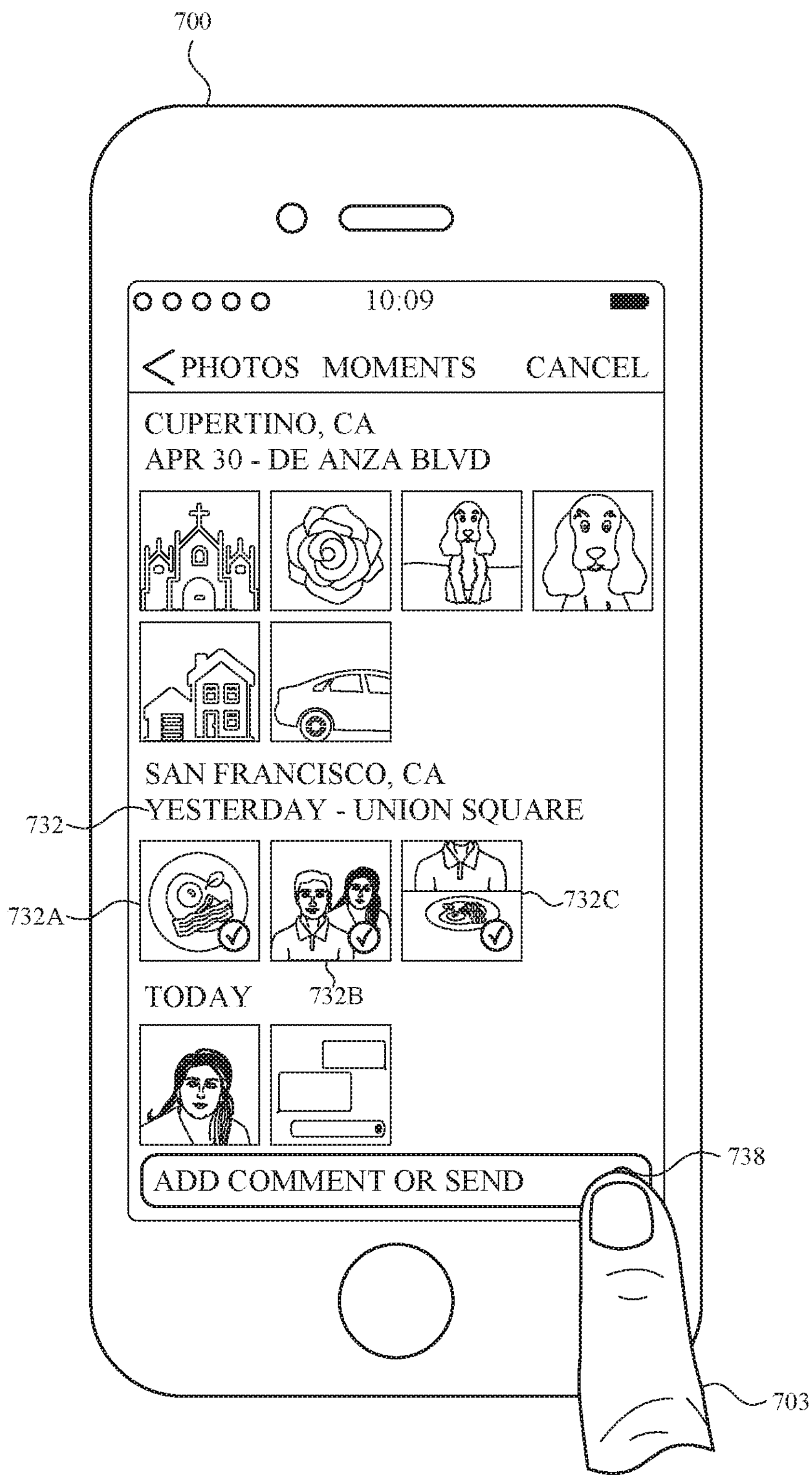

In FIG. 7D, while displaying photo gallery user interface 728 with selectable preview images 732A-732C (corresponding to photos from last night) pre-selected to be transferred (to message participant 710), electronic device 700 detects user activation of send button 738 for initiating the transfer of the photos corresponding to selectable preview images 732A-732C. For example, as shown in FIG. 7D, the user activation is a tap gesture 703 on send button 738.

Figure 7E:
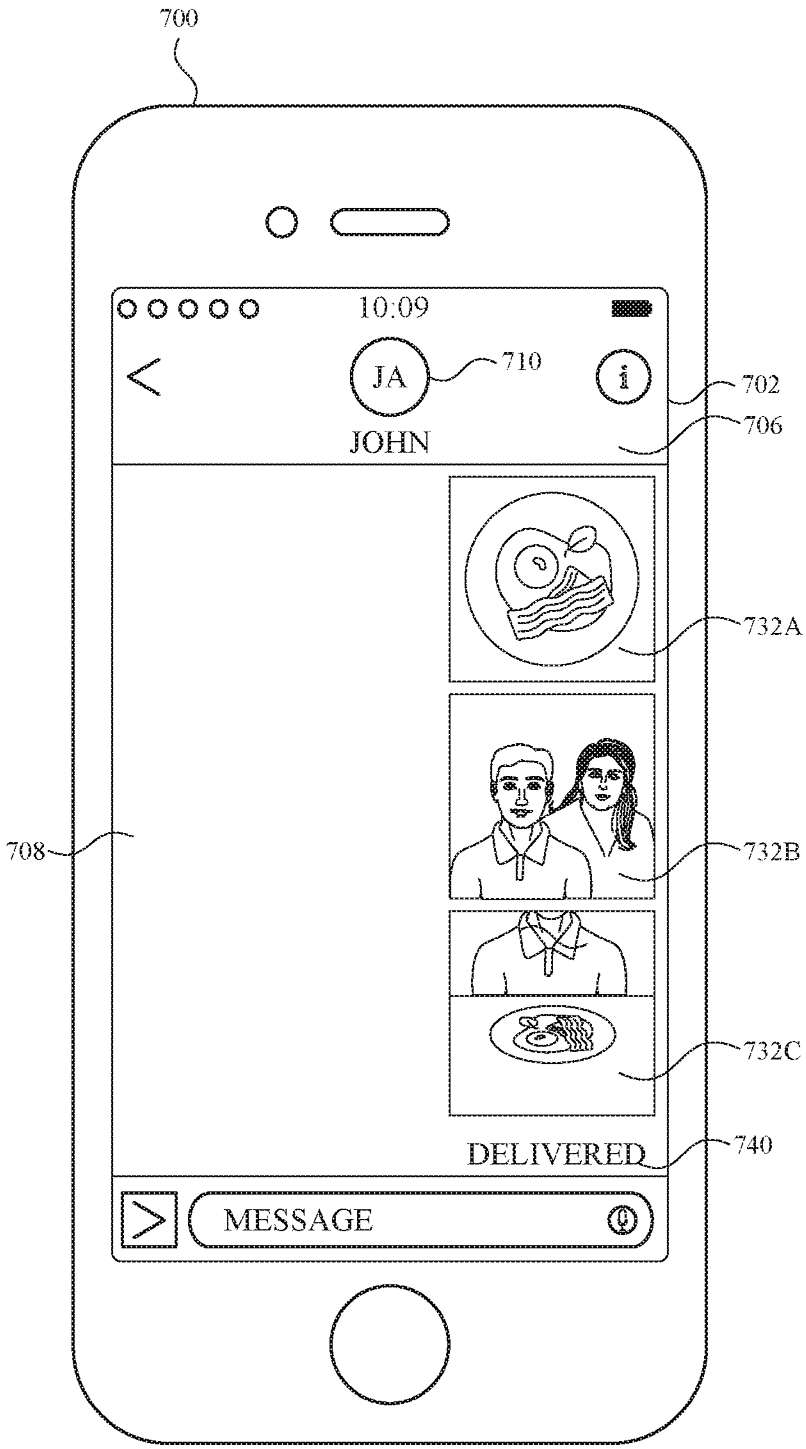

In FIG. 7E, in response to detecting tap gesture 703, electronic device transmits, using messaging application 706 and via a wireless communication radio, the photos corresponding to the selected selectable preview images 732A-732C to message participant 710 and again displays (e.g., replaces display of photo gallery user interface 728 with), on display 702, message conversation 708 of messaging application 706. As shown in FIG. 7E, message conversation 708 shows photo message objects 733A-733C (corresponding to the photos corresponding to selectable preview images 732A-732C) having been sent to message participant 710 via messaging application 706. In some embodiments, message conversation 708 further displays an indication 740 (e.g., stating "Delivered") informing the user that the photos have been sent to the intended recipient (e.g., message participant 710).

As mentioned above, the non-limiting example embodiment of the user interfaces illustrated in FIGS. 7A-7E described above relate to the non-limited example embodiment of the user interfaces illustrated in FIGS. 8A-8AH described below. Therefore, it is to be understood that the processes described above with respect to the example user interfaces illustrated in FIGS. 7A-7E and the processes described below with respect to the example user interfaces illustrated in FIGS. 8A-8AH are largely analogous processes that similarly involve initiating and managing transfers using an electronic device (e.g., 100, 300, 500, 700, or 800).

FIGS. 8A-8AH illustrate example user interfaces for managing peer-to-peer transfers, in accordance with some embodiments. The user interfaces in these figures are used to illustrate the processes described below, including the processes in FIGS. 9A-9I.

FIG. 8A illustrates an electronic device 800 (e.g., portable multifunction device 100, device 300, or device 500). In the non-limiting example embodiment illustrated in FIGS. 8A-8AH, electronic device 800 is a smartphone. In other embodiments, electronic device 800 can be a different type of electronic device, such as a wearable device (e.g., a smartwatch). Electronic device 800 has a display 802, one or more input devices (e.g., touchscreen of display 802, a mechanical button 804, a mic), and a wireless communication radio.

In FIG. 8A, electronic device 800 displays, on display 802, a message conversation 808 of a messaging application 806 between a user of the device (e.g., "Kate Appleseed") and a message participant 810 (e.g., "John Appleseed"). In some embodiments, message participant 810 is a contact stored on the device. In some embodiments, message participant 810 is a contact of a contact list associated with the user account logged onto the device. In some embodiments, message participant 810 is a contact included in a trusted contacts list associated with the user account logged onto the device.

In some embodiments, electronic device 800 also displays, on display 802, a virtual keyboard 812 (e.g., an alphanumeric keyboard for typing a message) and a compose bar 814 displaying the text of a message as a message is typed using virtual keyboard 812. In some embodiments, a mechanical keyboard can be used in addition to or alternatively to virtual keyboard 812 to type a message. In some embodiments, compose bar 814 can expand (e.g., expand upwards) to accommodate a longer message or message object (e.g., an image, an emoticon, a special type of message object, such as a payment object). In some embodiments, compose bar 814 includes a mic button 814A which, when activated, enables the user to record a message using voice input.

As shown in FIG. 8A, message conversation 808 includes two visible message objects 816 and 818. Message object 816 corresponds to a message sent by message participant 810 to the user and message object 818 corresponds to a message sent by the user to message participant 810. In message object 816, message participant 810 states to the user: "Last night was fun. Pay me back when you can." In message object 818, the user asks message participant 810: "How much do I owe you?"

Figure 8B:
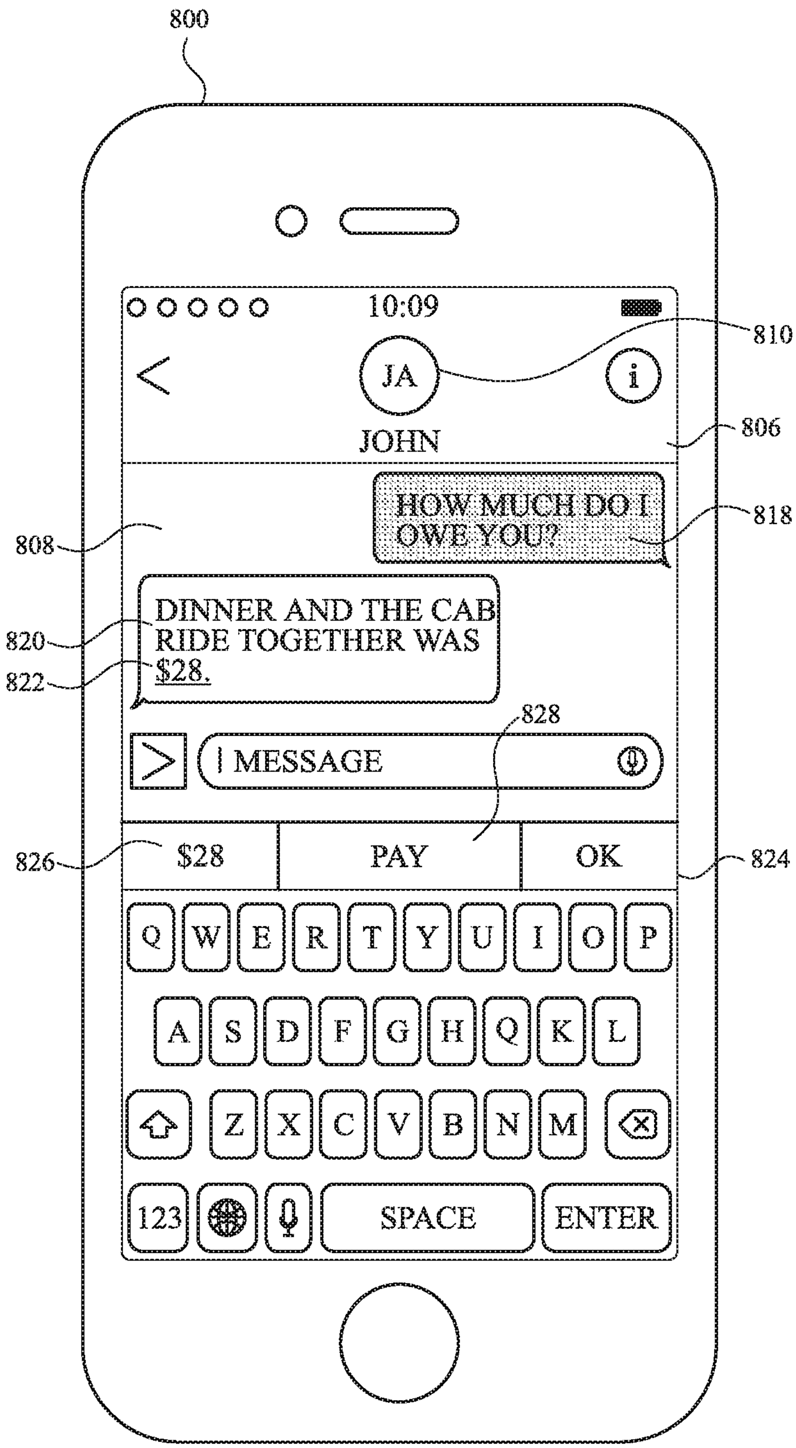

FIG. 8B shows, in message conversation 808 of messaging application 806, message object 818 corresponding to a new received message from message participant 810 to the user responding to the user's question of "How much do I owe you?" Specifically, in message object 818, message participant 810 responds: "Dinner and the cab ride together was $28." In response to receiving the new message corresponding to message object 820, an analysis of the contents (e.g., the text) of message object 820 is performed. In some embodiments, the analysis is performed by electronic device 800 using a language processing component or a language analysis component of the device. In some embodiments, the analysis is performed at an external device (e.g., a server), and electronic device 800 receives a result of the analysis from the external device.

Based on the analysis of the contents (e.g., the text) of message object 820 (and, optionally, one or more other previous or subsequent message objects of message conversation 808, such as message object 816 and 818), in accordance with a determination (e.g., made at electronic device 800 or received from an external device, such as a server) that the contents (e.g., the text) of the message corresponding to message object 820 relates to a transfer of a payment (e.g., a request for a payment, agreement to send a payment) that messaging application 806 is configured to transfer, electronic device 800 displays a selectable indication that corresponds to a payment amount or to an intent to proceed with a payment transfer, as discussed below.

In some embodiments, the determination that the contents of a message relates to a payment (or, alternatively, relates to a request for a payment) is made based at least in part on an indication of an amount (e.g., "$28") of the payment included in the message (or one or more previous or subsequent messages). In some embodiments, the determination that the contents of a message relates to a payment (or, alternatively, relates to a request for a payment) is made based at least in part on an indication of an amount (e.g., "$28") of the payment included in the message and/or one or more text triggers in the message (and, optionally, one or more previous or subsequent messages) (e.g., "I owe you," "Pay me," "Here is the payment"). In some embodiments, the determination that the contents of a message relates to a payment (or, alternatively, relates to a request for a payment) is made based at least in part on an indication of an amount (e.g., "$28") of the payment included in the message and a more detailed analysis of the text of the message (and, optionally, one or more previous or subsequent messages) using language processing and interpretation techniques to decipher an intent of the message (and, optionally, one or more previous or subsequent messages).

For example, in FIG. 8B, in response to the user's question of "How much do I owe you?" shown in message object 818, message participant 810 responds, as shown in message object 820, "Dinner and the cab ride together was $28." In response, an analysis (e.g., by an external device, such as a server, or by electronic device 800) of the contents (e.g., "Dinner and the cab ride together was $28") of the message is performed and a determination is made (e.g., by an external device, such as a server, or by electronic device 800) that the message corresponds to a request for a payment in the amount of $28 by message participant 810 from the user.

As shown in FIG. 8B, electronic device 800 provides a marking 822 (e.g., underlining, bolding, highlighting) of the payment amount shown in message object 820. Additionally, in response to the determination that the message relates to a payment, electronic device 800 displays (e.g., over a portion of virtual keyboard 812, between virtual keyboard 812 and compose bar 814) a suggestions bar 824 that includes a pay amount button 826 that includes a selectable indication (e.g., "$28") of the payment amount. In FIG. 8B, in addition to pay amount button 826, suggestions bar 824 includes a pay button 828 (e.g., showing "PAY") that does not include an indication of the payment amount but includes an indication that the button is for proceeding with a payment (or, alternatively, proceeding with a payment request). In some embodiments, one or more of the in-message selectable indications is omitted. In some embodiments, pay button 828 indicates (e.g., by showing "PAY") to the user that a payment can be made, with respect to the potential payment detected from the message (or one or more previous or subsequent messages), using an operating-system controlled payment transfer application (and not by a third-party application).

Figure 8C:
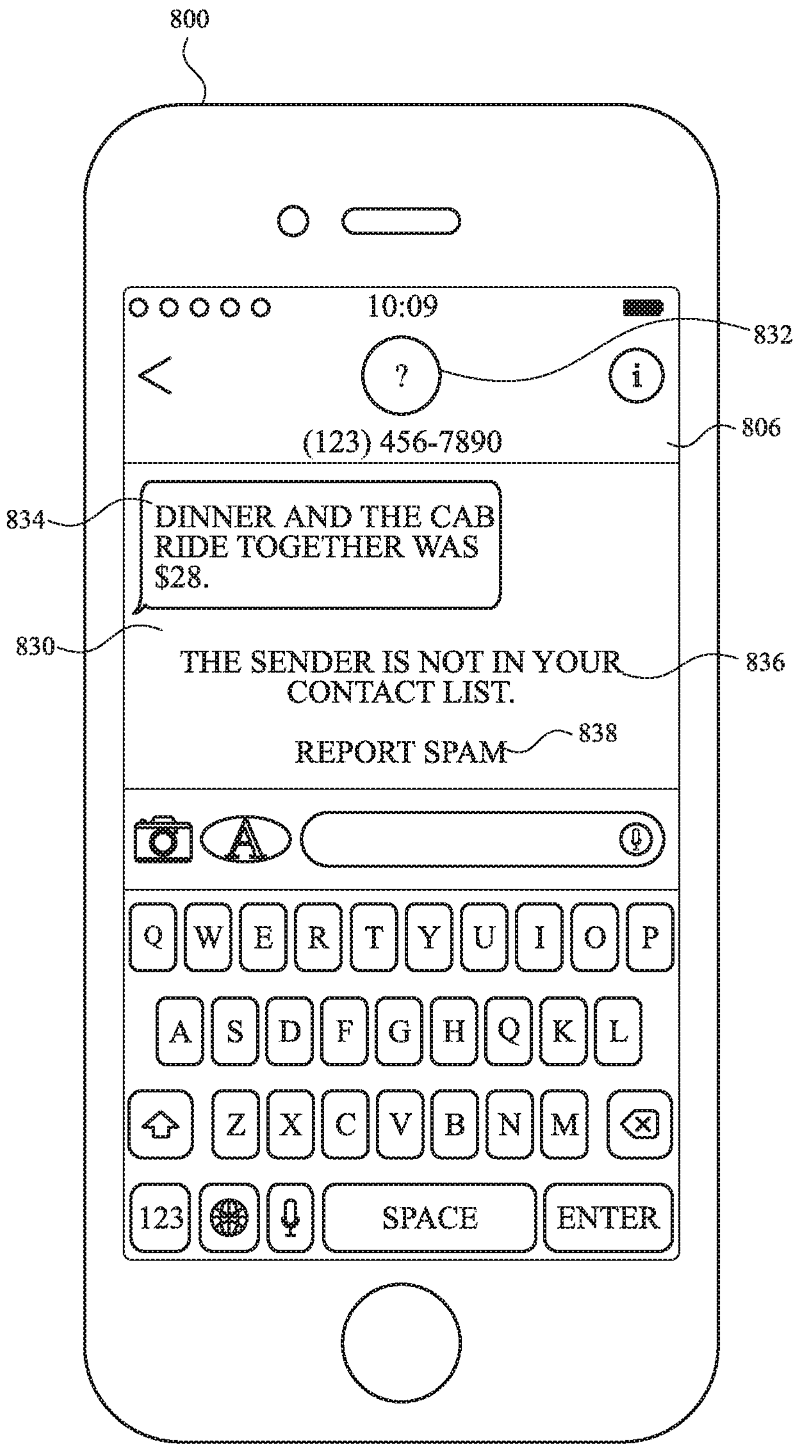

FIG. 8C illustrates a different message conversation 830 of messaging application 806. In FIG. 8C, message conversation 830 is between the user of electronic device 800 and an unknown participant 832. In some embodiments, unknown participant 832 is a participant that does not correspond to a contact stored on the device. In some embodiments, unknown participant 832 is a participant that is not included in a contact of a contact list associated with the user account logged onto the device. In some embodiments, unknown participant 832 is a participant not included in a trusted contacts list associated with the user account logged onto the device. In some embodiments, unknown participant 832 is a participant included in a non-trusted contacts list (e.g., a spam list) associated with the user account logged onto the device. In some embodiments, unknown participant 832 is a participant included in a non-trusted user list (e.g., a spam list) maintained by an external device, such as a server.

As shown in FIG. 8C, electronic device 800 displays in message conversation 830 a message object 834 corresponding to a message received from unknown participant 832. For example, the message corresponding to message object 834 received from unknown participant 832 has the same content (e.g., states the same thing as) the message corresponding to message object 820 received from message participant 810 (e.g., "Dinner and the cab ride together was $28.). However, because the message corresponding to message object 834 is from an unknown participant, the device, even if a determination (e.g., by an external device, such as a server, or by electronic device 800) is made that the message corresponds to a request for a payment in the amount of $28, forgoes displaying a selectable indication (e.g., marking 822 of the payment $28, pay amount button 826, pay button 828) that corresponds to a payment amount (of $28) or to an intent to proceed with a payment transfer (of $28).

In some embodiments, in accordance with the determination that the message corresponding to the message object (e.g., message object 834) is from an unknown participant (e.g., unknown participant 832), electronic device 800 forgoes displaying a selectable indication (e.g., marking 822 of the payment $28, pay amount button 826, pay button 828 (showing "PAY")). In some embodiments, instead of displaying the selectable indication (e.g., marking 822 of the payment $28, pay amount button 826, pay button 828), the device displays (e.g., within message conversation 830), a spam notification 836 (e.g., a textual notification, a graphical notification, a prompt) that the message is from an unknown participant. For example, as shown in FIG. 8C, the device displays within message conversation 830 spam notification 836 (a notification message) stating "this sender is not in your contacts list." In some embodiments, the device further displays (e.g., below spam notification 836), a selectable indication 838 (e.g., a selectable text, a button) for reporting (e.g., transmitting information about) the unknown participant to an external device (e.g., a server). For example, as shown in FIG. 8C, the device displays below spam notification 836 selectable notification 838 (selectable text) stating "Report Spam."

Figure 8D:
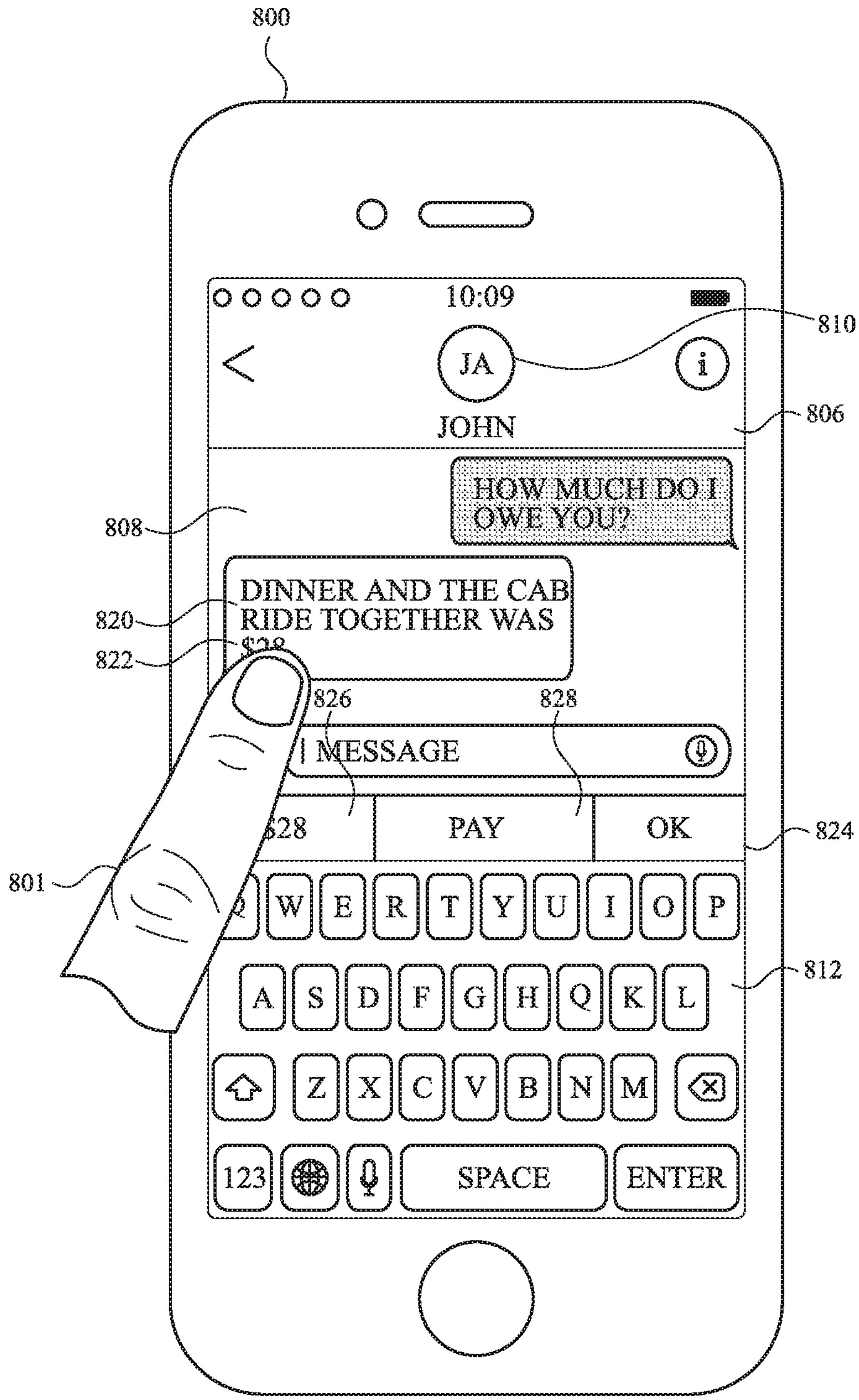

In FIG. 8D, electronic device 800 again displays message conversation 808 of messaging application 806 with message participant 810 (e.g., as first shown in FIG. 8B). In some embodiments, while displaying message conversation 808, electronic device 800 detects (e.g., via the touchscreen) user activation of marking 822 of the payment amount (e.g., the underlined "$28") included in message object 820. For example, as shown in FIG. 8D, the user activation is a tap gesture 801 of marking 822 of the payment amount (e.g., the underlined "$28") included in message object 820. Alternatively, in some embodiments, the user activation can be user selection (e.g., a tap gesture) of payment amount button 826 (with the payment amount (e.g., "$28") shown) within suggestions bar 824. Alternatively, in some embodiments, the user activation can be user selection (e.g., a tap gesture) of payment button 828 (with an indication (e.g., "PAY") that the button is for proceeding with a payment) within suggestions bar 824.

Figure 8E:
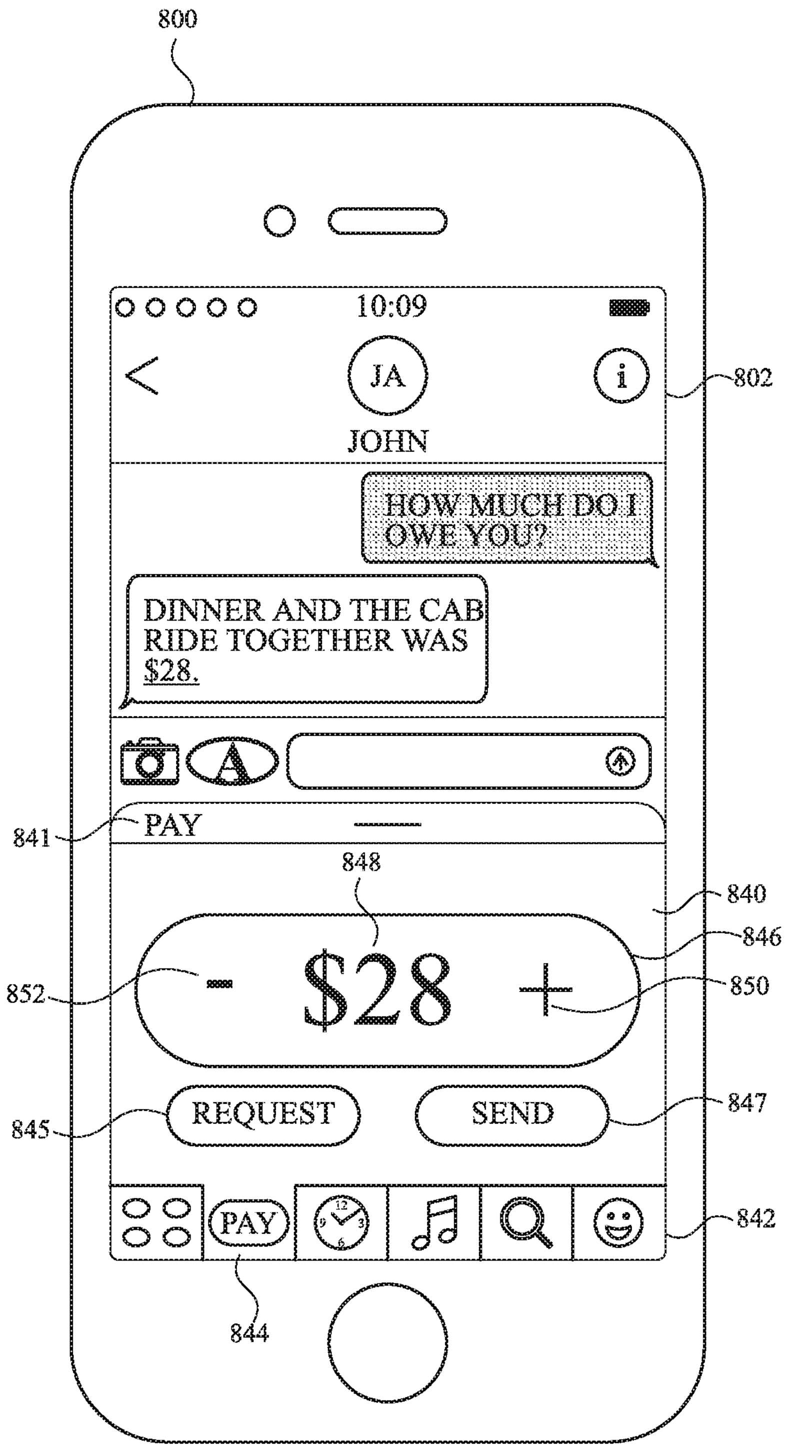

In FIG. 8E, in response to detecting tap gesture 801, electronic device 800 displays, on display 802, a payment transfer user interface 840. In some embodiments, payment transfer user interface 840 replaces display of virtual keyboard 812. In some embodiments, payment transfer user interface 840 slides into the display from an edge of the display (e.g., slides up from the bottom edge of the display) to replace display of virtual keyboard 812.

In some embodiments, payment transfer user interface 840 includes an interface switching menu bar 842 that includes a plurality of shortcut icons for switching between different user interfaces (e.g., switching between payment transfer user interface 840 and a user interface for playing music) associated with different application features (e.g., manage peer-to-peer transfers, play music, set alarm clock) accessible from within messaging application 806 while maintain display of message conversation 808. In some embodiments, the plurality of shortcut icons of interface switching menu bar 842 correspond to different applications, thus enabling the user to quickly switch between user interfaces of different applications. In some embodiments, interface switching menu bar 842 includes a payment transfer shortcut icon 844 corresponding to payment transfer user interface 840. Thus, because payment transfer user interface 840 is the currently-displayed user interface, the device in FIG. 8E shows payment transfer shortcut icon 844 currently being selected within interface switching menu bar 842. In some embodiments, payment transfer user interface 840 also includes an indication 841 (e.g., stating "PAY") informing the user that the payment message object corresponds to a payment made via an operating-system controlled payment transfer application (and not by a third-party application).

As also shown in FIG. 8E, payment transfer user interface 840 includes a request button 845 for initiating a request for a payment from a different user (e.g., message participant 810) via messaging application 806 and send button 847 for initiating a sending of a payment to a different user (e.g., message participant 810) via messaging application 806.

As also shown in FIG. 8E, payment transfer user interface 840 includes a value change region 846 that includes an indication 848 of the transfer amount (e.g., "$28"). As shown in FIG. 8E, when payment transfer user interface 840 is displayed in response to user activation (e.g., tap gesture 801) of marking 822 of the payment amount (or of payment amount button 826 with the payment amount shown), the device displays payment transfer user interface 840 with the payment amount (e.g., "$28") pre-populated in indication 848, as shown in FIG. 8E. In some embodiments, the pre-populated payment amount in indication 848 includes a currency symbol (e.g., "$" of USD). In some embodiments, the pre-populated payment amount in indication 848 does not include a currency symbol.

Payment transfer user interface 840 also includes, within value change region 846, a value increase button 850 (e.g., indicated as a "+") for increasing the displayed payment amount (e.g., "$28") within indication 848 and a value decrease button 852 (e.g., indicated as a "−") for decreasing the displayed payment amount (e.g., "$28") within indication 848. In some embodiments, in response to detecting user activation (e.g., a user input) of value increase button 850, the displayed payment amount within indication 848 is increased.

Figure 8F:
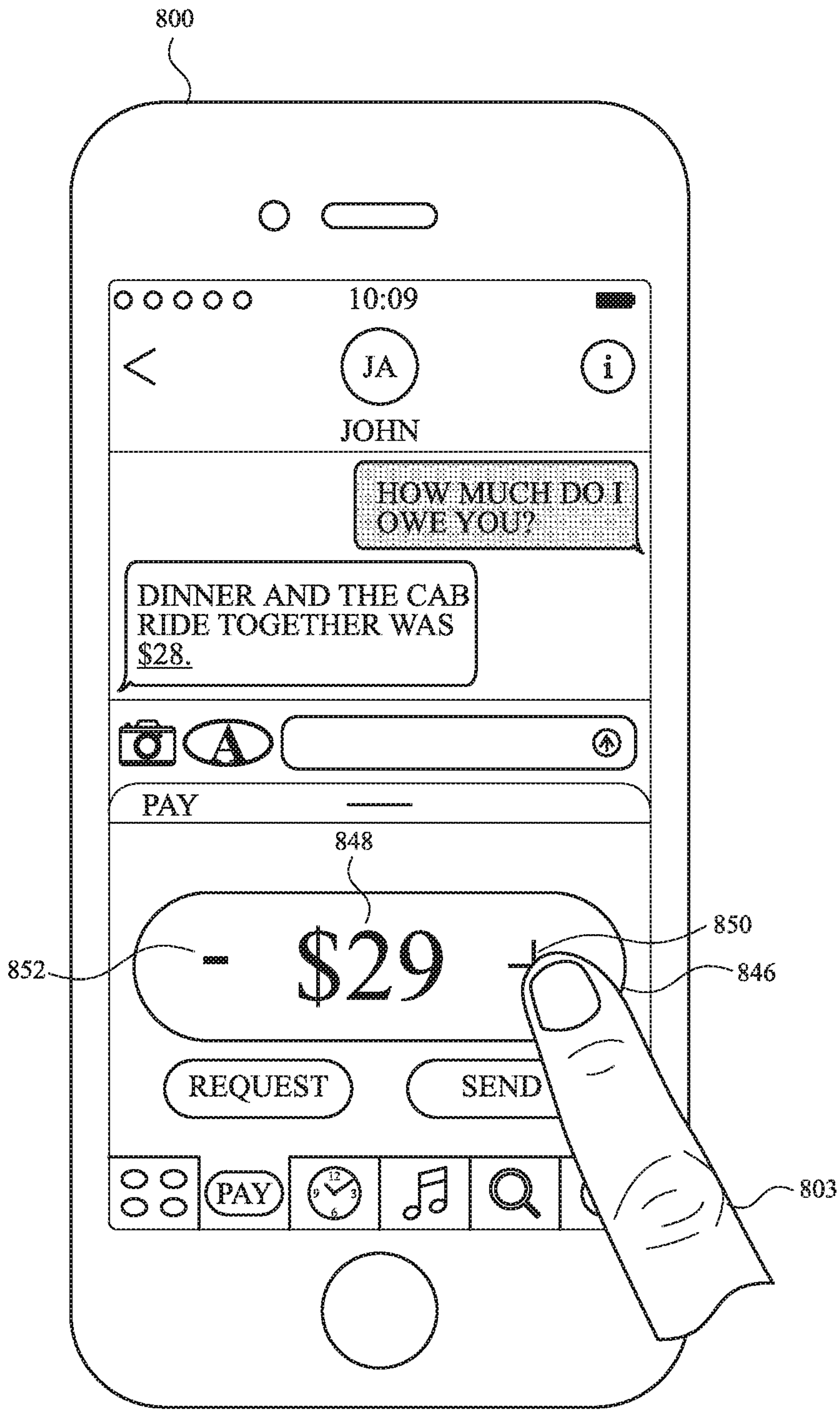

For example, as shown in FIG. 8F, in response to detecting tap gesture 803 on value increase button 850, the displayed payment amount within indication 848 is increased from "$28" to "$29." In some embodiments, if the user activation is a tap gesture on value increase button 850 (e.g., tap gesture 803), one tap gesture causes a one unit increase (e.g., an increase by one dollar, an increase by one cent) in the payment amount displayed in indication 848. In some embodiments, if the user activation is as continued press (e.g., a press for at least a predetermined time period) on value increase button 850, the payment amount displayed in indication 848 continually increases by a unit increment at a constant rate. In some embodiments, if the user activation is a continued press (e.g., a press for at least a predetermined time period) on value increase button 850, the payment amount displayed in indication 848 continually increases by a unit increment at an accelerating rate corresponding to the length of the continued press on value increase button 852. In some embodiments, if the user activation is a continued input having a first contact intensity, the payment amount displayed in indication 848 continually increases by a unit increment at a first constant rate, and if the user activation is a continued input having a second contact intensity that is greater than the first contact intensity, the payment amount displayed in indication 848 continually increases by a unit increment at a second constant rate that is faster than the first constant rate. The same features described above can apply, in the opposite direction (e.g., decreasing the payment amount displayed in indication 848 instead of increasing), with respect to value decrease button 852.

Figure 8G:
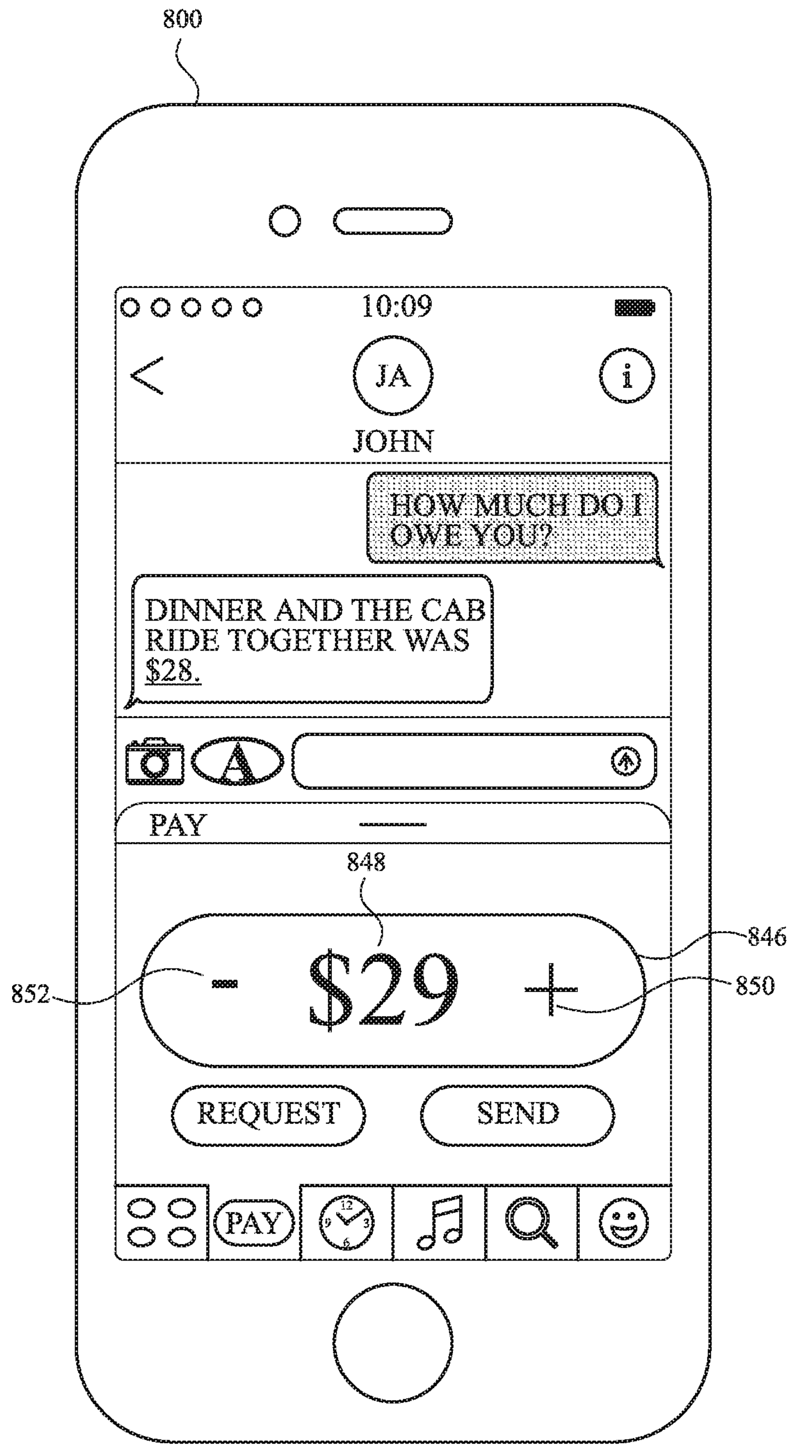
Figure 8H:
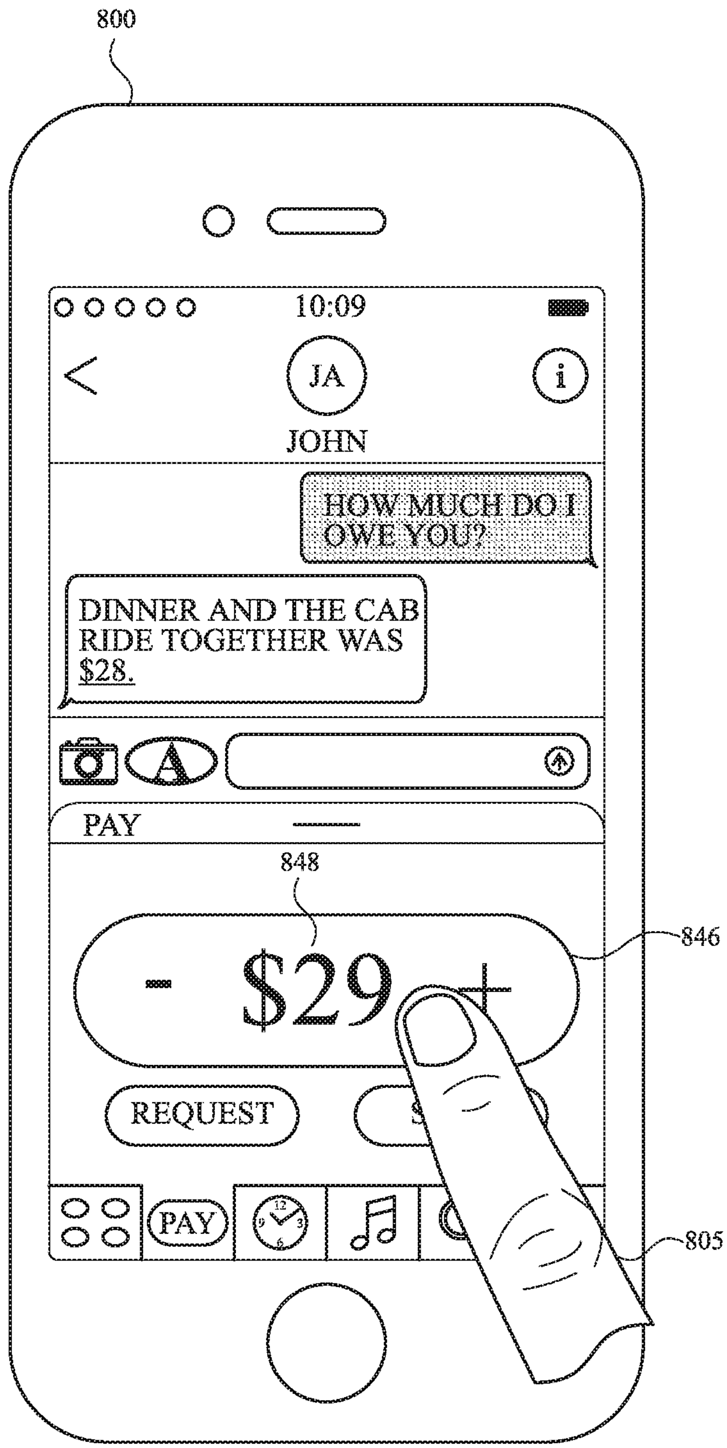
Figure 8I:
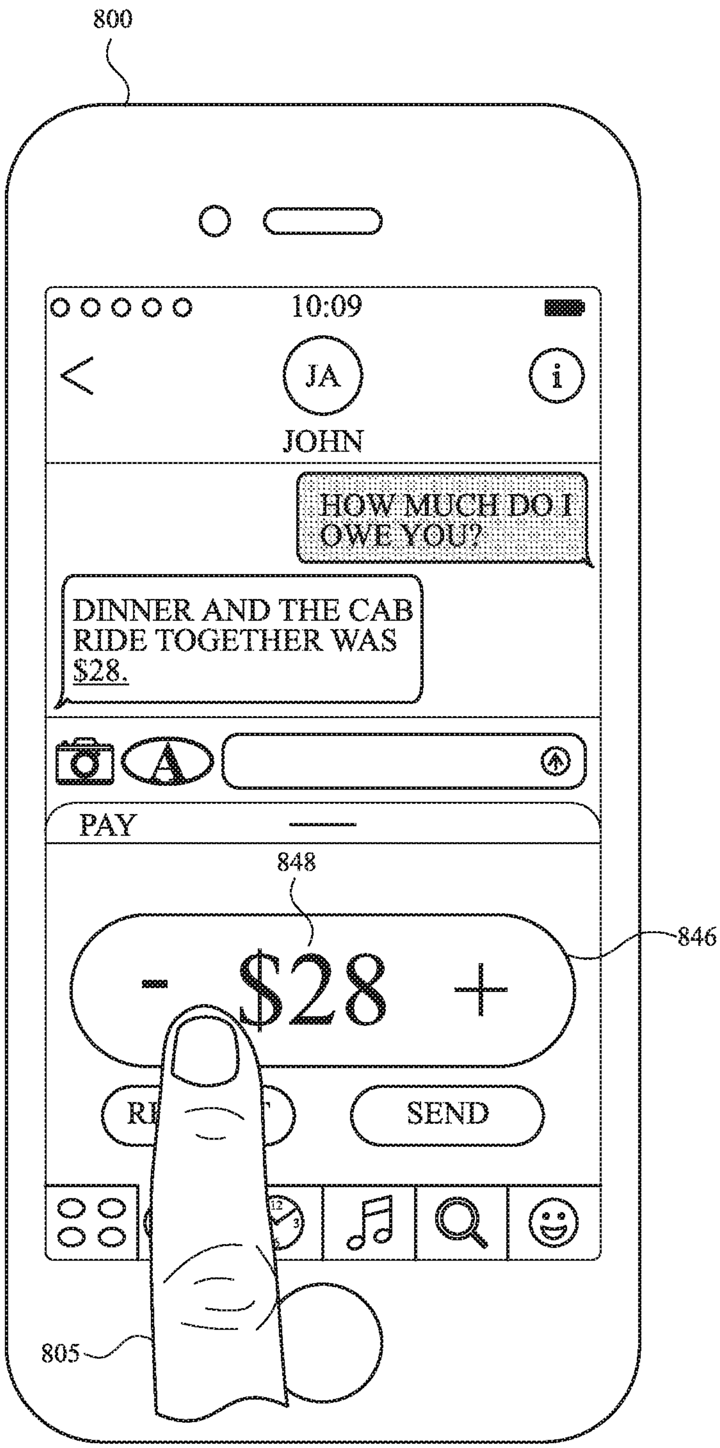

FIG. 8G shows, as a result of tap gesture 803 on value increase button 850 of value change region 846, indication 848 displaying a payment amount (e.g., "$29") that is greater than the previously displayed payment amount (e.g., "$28"). In FIGS. 8H-8I, while displaying indication 848 displaying the payment amount (e.g., "$29") that is greater than the previously displayed payment amount (e.g., "$28"), electronic device 800 detects another user input on value change region 846 that decreases the payment amount displayed in indication 848 (e.g., from "$29" to "$28").

For example, as shown in the transition from FIG. 8H to FIG. 8I, the user input is a sliding gesture 805 from the right-to-left direction within value change region 846. As shown in FIG. 8I, in response to detecting sliding gesture 805, the payment amount displayed in indication 848 is decreased (e.g., from "$29" to "$28). In some embodiments, in accordance with a determination that the length of the sliding gesture is within a predetermined length limit, the payment amount is decreased by one unit (e.g., by one dollar, by one cent). In some embodiments, in accordance with a determination that the length of the sliding gesture is at least a predetermined length limit, the payment amount is decreased by multiple units (e.g., by five dollars, by fifty cents). In some embodiments, in accordance with a determination that the sliding gesture is increasing in speed as it is being detected within value change region 846, the rate of change (e.g., the rate of decrease) of the payment accelerates proportionally with the increasing speed of the sliding gesture. In some embodiments, the sliding gesture that decreases the payment amount displayed in indication 848 can be a top-to-bottom sliding gesture. The same features described above can apply, in the opposite direction (e.g., increasing the payment amount displayed in indication 848 instead of decreasing), with respect to a sliding gesture in a left-to-right direction (or a bottom-to-top direction).

Figure 8J:
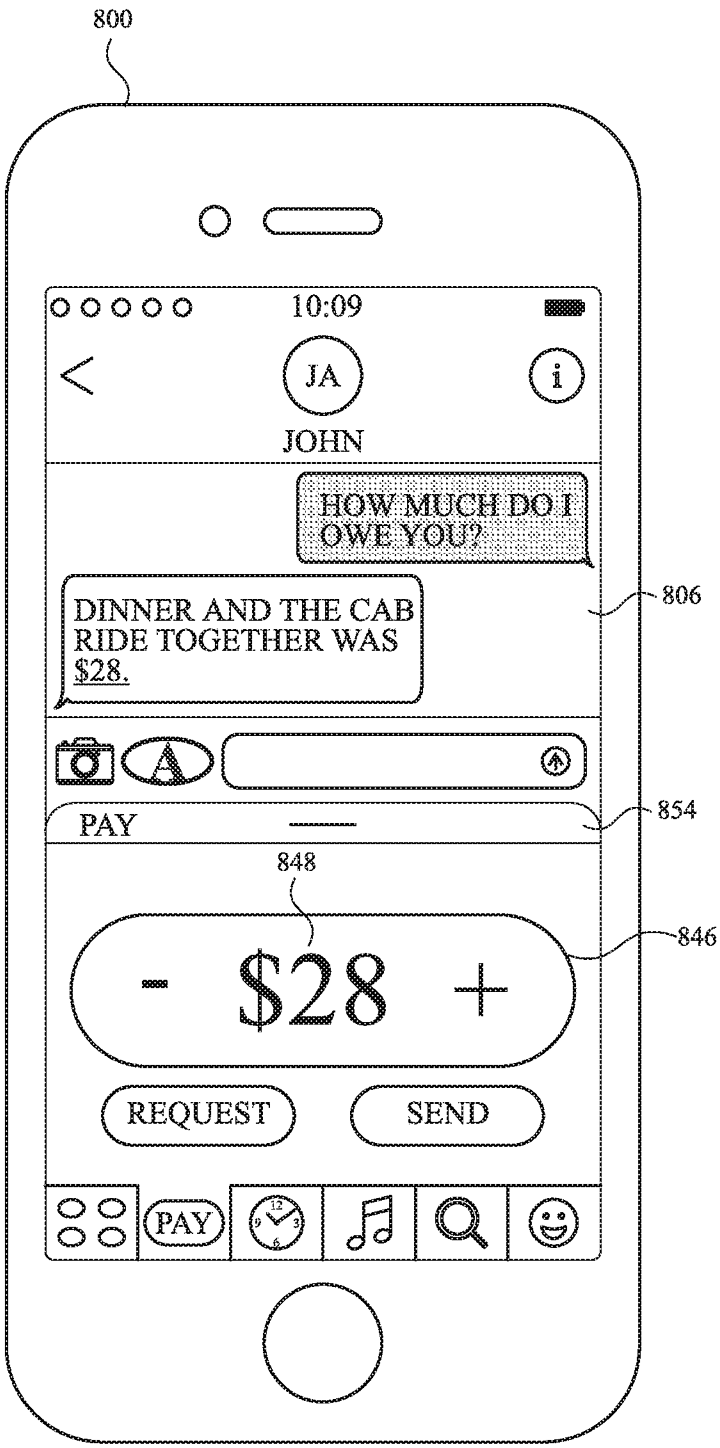
Figure 8K:
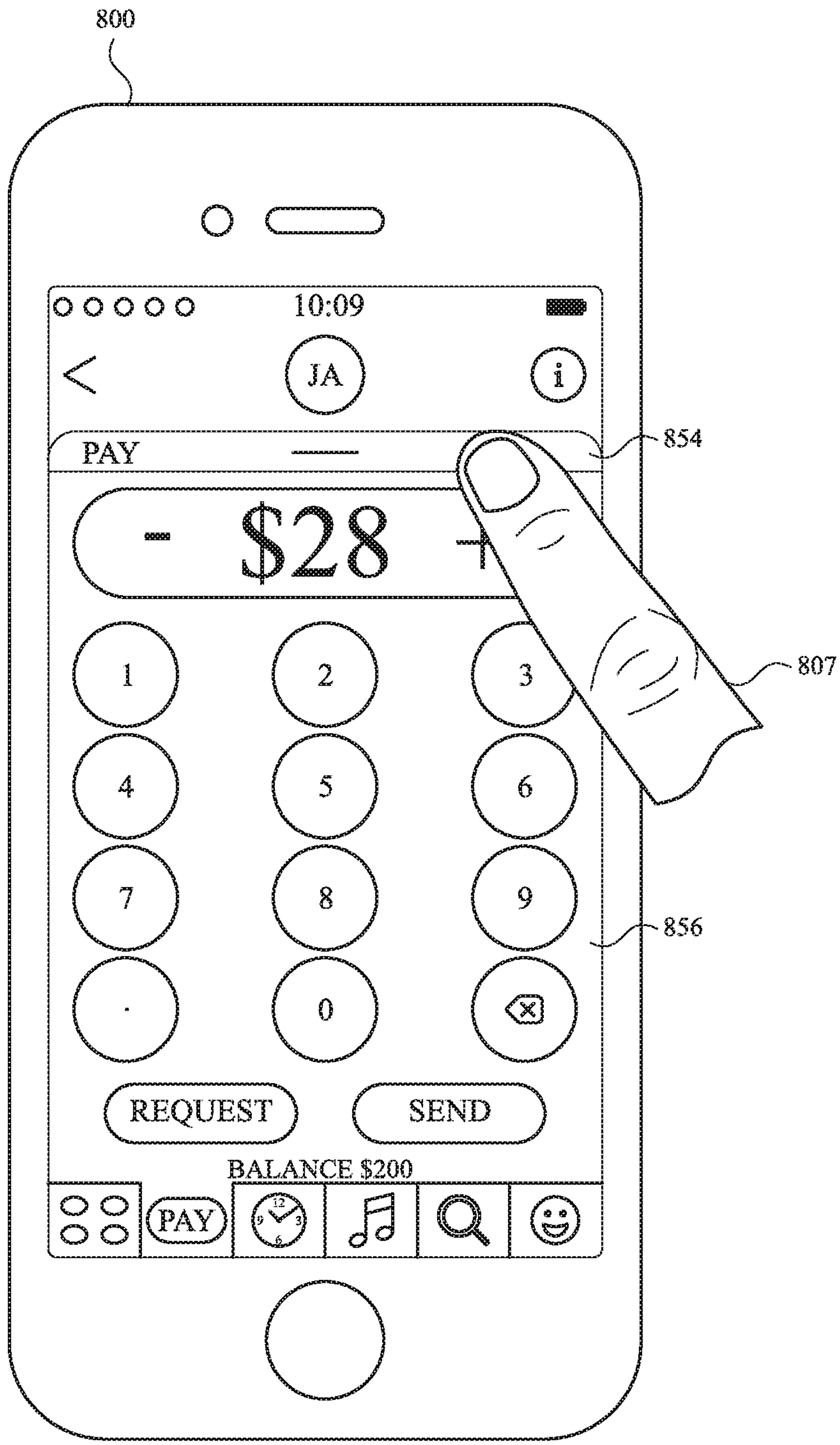

FIG. 8J shows, as a result of sliding gesture 805 within value change region 846 of payment transfer user interface 840, indication 848 displaying a payment amount (e.g., "$28") that is smaller than the previously displayed payment amount (e.g., "$29"). In some embodiments, payment transfer user interface 840 includes a expand region 854 for expanding the interface to a second (e.g., larger, full-screen) mode. In some embodiments, in response to a user input on expand region 854 (e.g., a tap gesture on the expand region, a sliding-up gesture on the expand region), electronic device 800 displays (e.g., replaces display of payment transfer user interface 840 and at least a portion of messaging application 806 with) expanded payment transfer user interface 856. For example, as shown in FIG. 8K, the user input expanding payment transfer user interface 840 to expanded payment transfer user interface 856 is a sliding-up gesture 807, on expand region 854, towards the top edge of display 806. In some embodiments, expanded payment transfer user interface 856 covers at least a portion of (or all of) the displayed messaging application 806. In some embodiments, payment transfer user interface 840 includes a expand button (e.g., instead of or in addition to expand region 854) which, when selected, causes display of expanded payment transfer user interface 856.

Figure 8L:
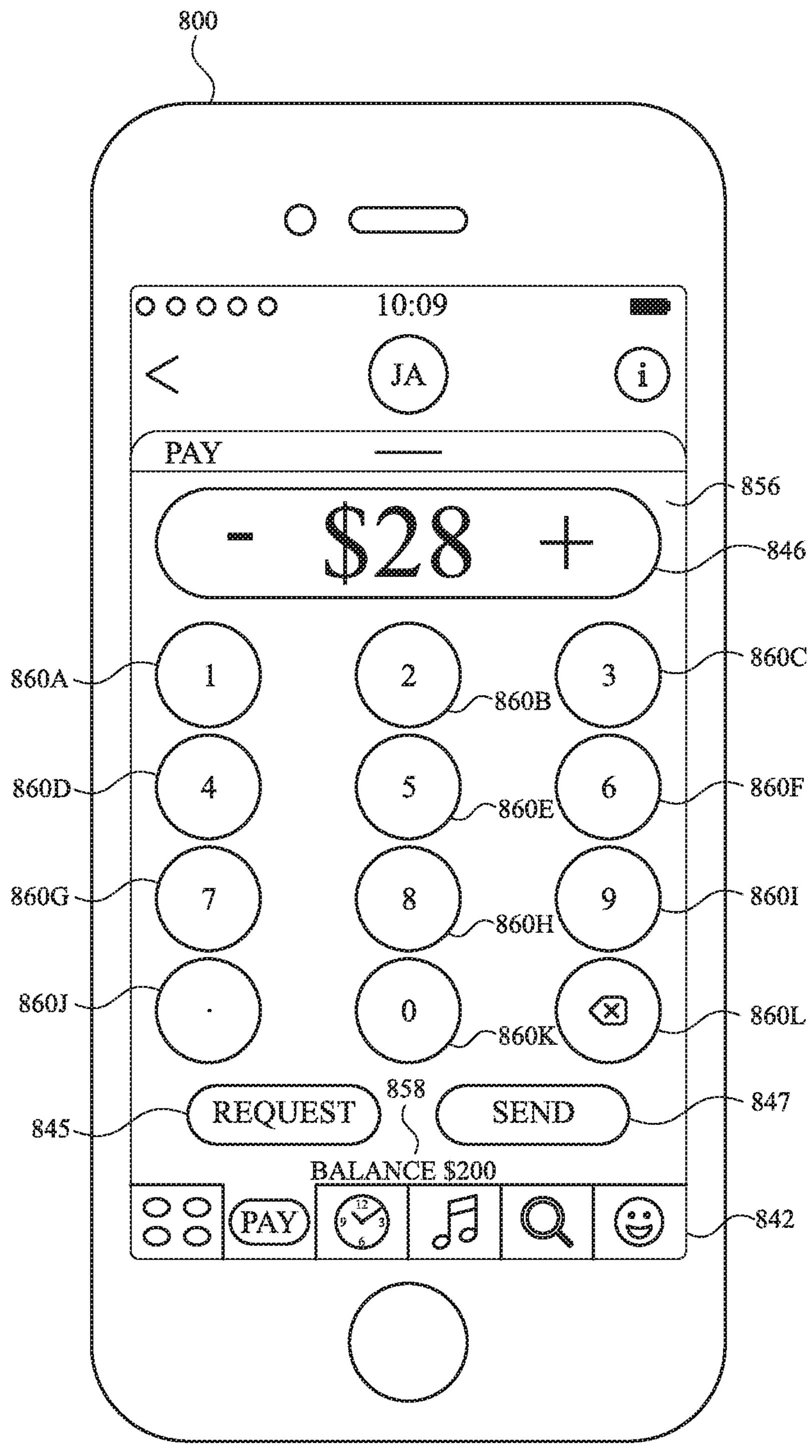

FIG. 8L shows an embodiment of expanded payment transfer user interface 856 after it has been expanded from payment transfer user interface 840 by sliding-up gesture 807. As shown in FIG. 8L, in some embodiments, expanded payment transfer user interface 856 maintains display of value change region 846 from payment transfer user interface 840. In some embodiments, expanded payment transfer user interface 856 also maintains display of request button 845 and send button 847 from payment transfer user interface 840. In some embodiments, expanded payment transfer user interface 856 also maintains display of interface switching menu bar 842. In some embodiments, expanded payment transfer user interface 856 includes an indication 858 of a balance associated with a payment account (e.g., a default payment account, a stored-value account, a debit account, a checking account) provisioned on the device.

As also shown in FIG. 8L, expanded payment transfer user interface 856 also includes a plurality of selection buttons 860A-860L. Selection buttons 860A-860L correspond to buttons of a numerical keypad (e.g., including digit buttons 0-9, a symbol button, and a back/clear button). Selection buttons 860A-L allow the user to change the payment amount displayed in indication 848 as if the user is typing on a numerical keypad. In some embodiments, expanded payment transfer user interface 856 includes a return button (e.g., instead of or in addition to expand region 854) that, when selected, causes a return to payment transfer user interface 840.

Figure 8M:
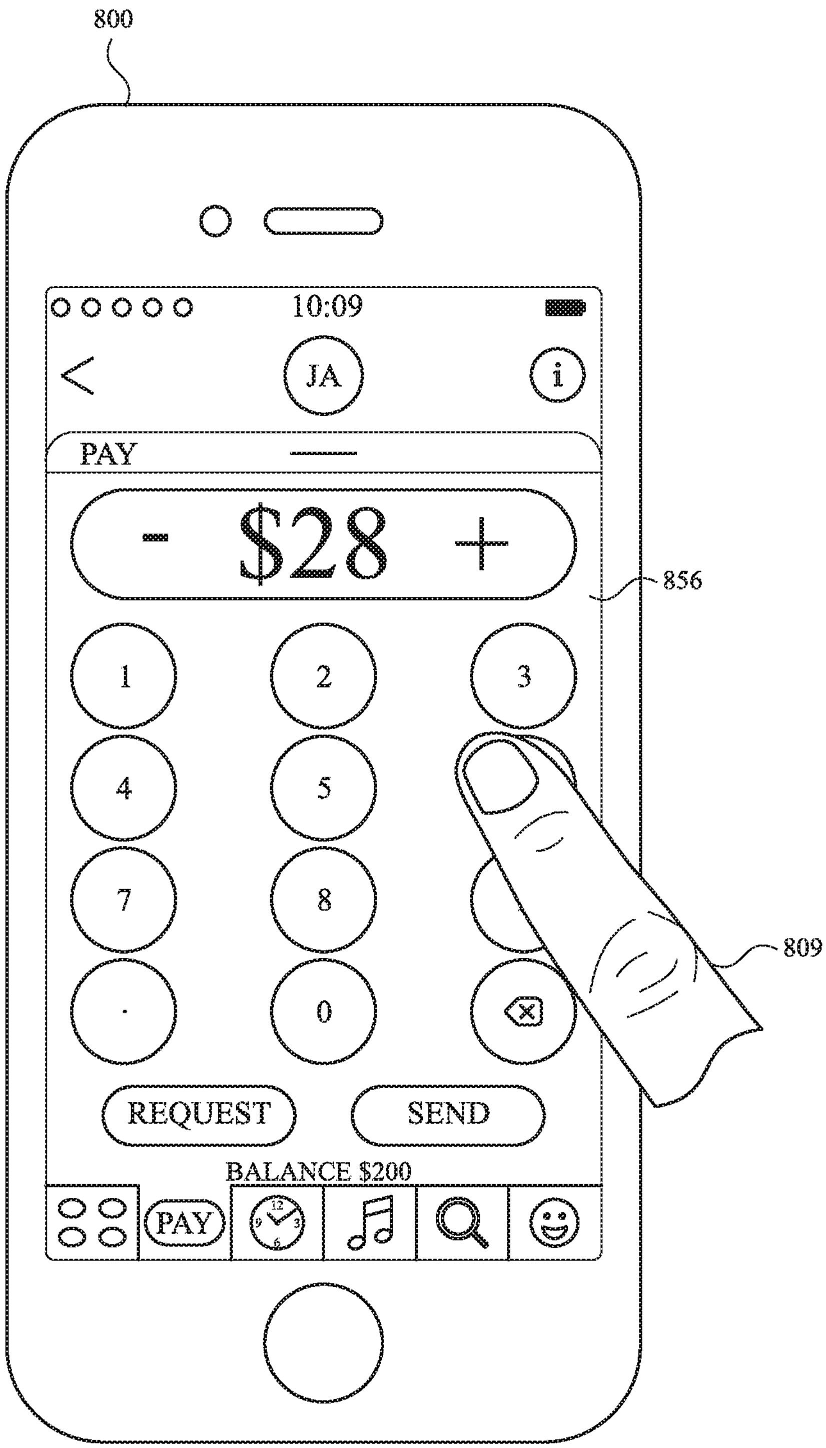
Figure 8N:
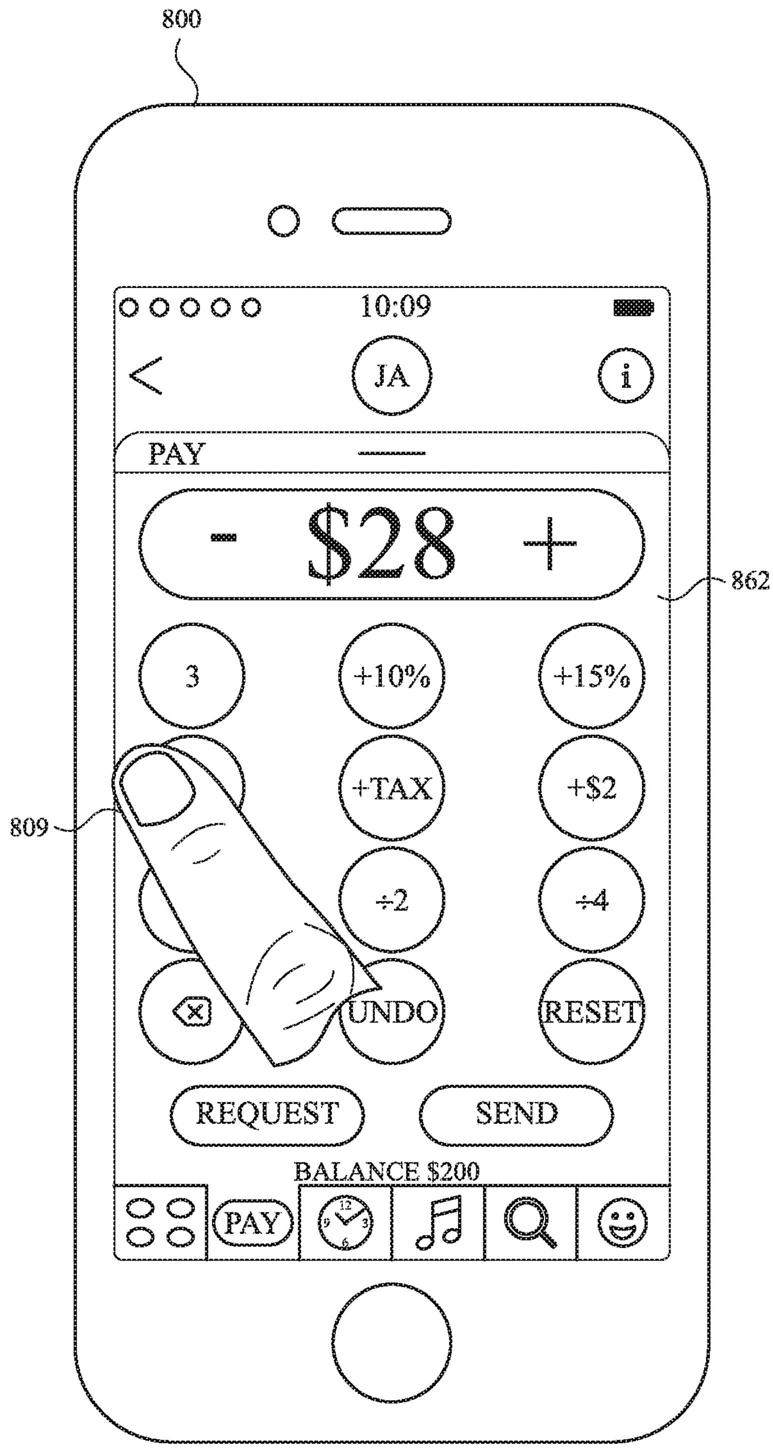
Figure 8O:
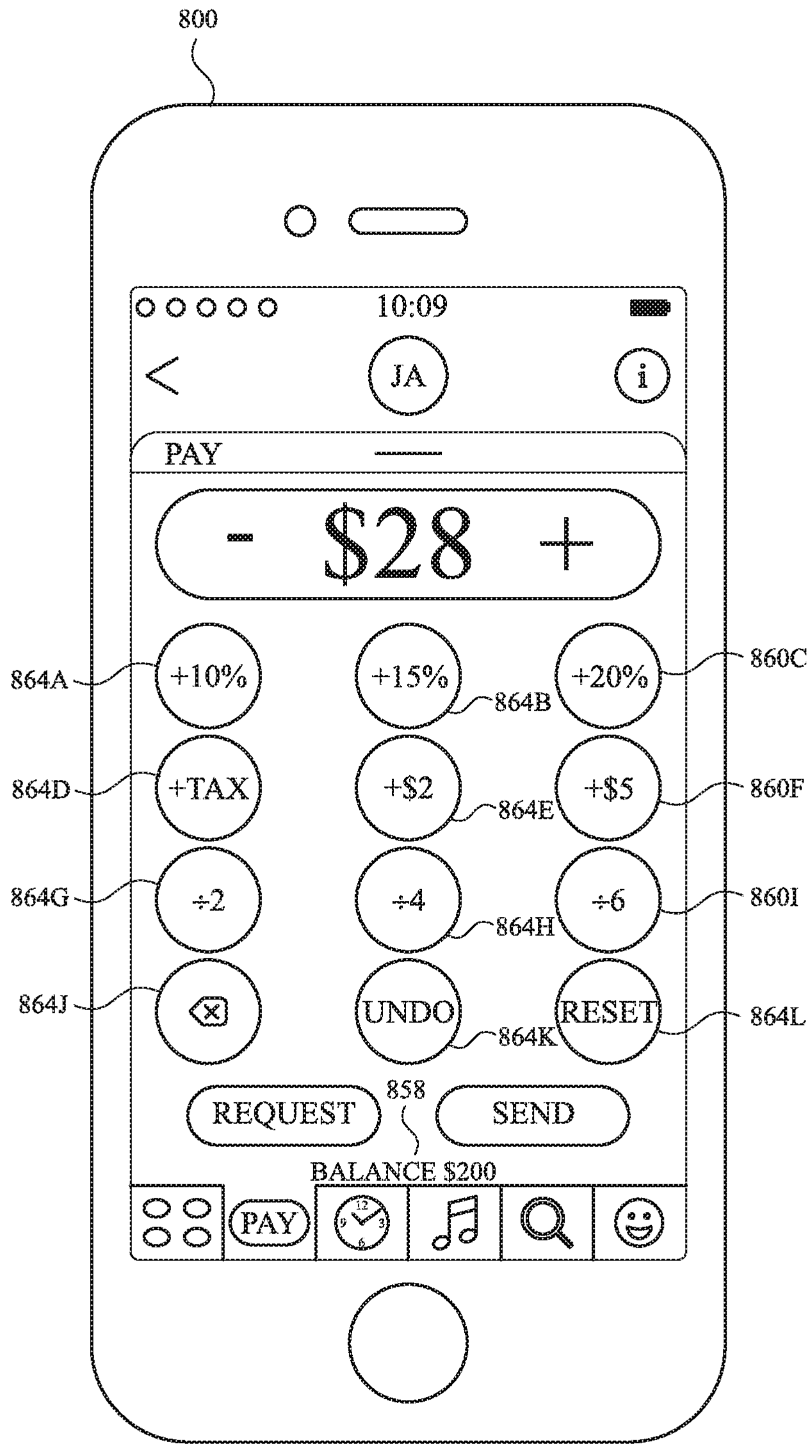

FIGS. 8M-8O show a transition from expanded payment transfer user interface 856 to a suggestions mode expanded payment transfer user interface 862. In some embodiments, the transition involves a user input on expanded payment transfer user interface 856 to switch to suggestions mode expanded payment transfer user interface 862. For example, as shown in FIGS. 8M-8N, the user input is a sliding gesture 809 from a right-to-left direction on expanded payment transfer user interface 856. In response to detecting sliding gesture 809, electronic device 800 gradually replaces display of expanded payment transfer user interface 856 with suggestions mode expanded payment transfer user interface 862 (e.g., expanded payment transfer user interface 856 slides off of the display at one edge of the display and suggestions mode expanded payment transfer user interface 862 slides onto the display at an opposite edge of the display). In some embodiments, the sliding gesture is in a left-to-right direction on expanded payment transfer user interface 856. In some embodiments, expanded payment transfer user interface 856 includes a switch button that, when selected, causes display of suggestions mode expanded payment transfer user interface 856. In some embodiments, suggestions mode expanded payment transfer user interface 856 also includes a corresponding switch button that, when selected, causes display of suggestions mode expanded payment transfer user interface 862.

As shown in FIG. 8O, in some embodiments, suggestions mode expanded payment transfer user interface 862 maintains display of value change region 846. As depicted, suggestions mode expanded payment transfer user interface 862 also maintains display of interface switching menu bar 842. As shown, suggestions mode expanded payment transfer user interface 862 also maintains display of request button 845 and send button 847. In FIG. 8O, suggestions mode expanded payment transfer user interface 862 includes indication 858 of the balance associated with a payment account (e.g., a default payment account, a stored-value account, a debit account, a checking account) provisioned on the device. In some embodiments, payment transfer user interface 840 includes a expand button (e.g., instead of or in addition to expand region 854) that, when selected, causes display of suggestions mode expanded payment transfer user interface 862 (instead of expanded payment transfer user interface 856). In some embodiments, suggestions mode expanded payment transfer user interface 862 includes a return button (e.g., instead of or in addition to expand region 854) that, when selected, causes a return to payment transfer user interface 840.

Suggestions mode expanded payment transfer user interface 862 includes a plurality of selection buttons 864A-L. In some embodiments, selection buttons 864A-864L include a suggested (or recommended) payment amounts (or suggested/recommended additional payment amount) that can relate to, for example, a suggested tip amount button (e.g., 10%, 15%, 18%, 20%, $2, $5, etc.), a suggested tax amount button (which can vary depending on a detected location (e.g., a US state, such as California) of the device), a dividing factor button (e.g., divide by two, divide by four) for splitting the payment account across two or more individuals, an "undo" button, and a "reset" button. In some examples, the buttons include representations of amounts corresponding to the various options (e.g., if the payment is $100, the buttons include $110 for a 10% tip, $120 for a 20% tip, $102 for a $2 tip, $50 for a two way split, or $25 for a four way split). For example, in FIG. 8O, user selection of selection button 864C causes the payment amount displayed in indication 848 to be adjusted by +20% (e.g., to add a 20% tip). For another example, in FIG. 8O, user selection of selection button 864D causes the payment amount displayed in indication 848 to be adjusted by, for example, 8% (e.g., to account for a sales tax). As mentioned above, the suggested tax amount can be automatically adjusted by the device based on location information. For another example, in FIG. 8O, user selection of selection button 864G causes the payment amount displayed in indication 848 to be adjusted by a divisional factor of 2 (e.g., from "$28" to "$14").

Figure 8P:
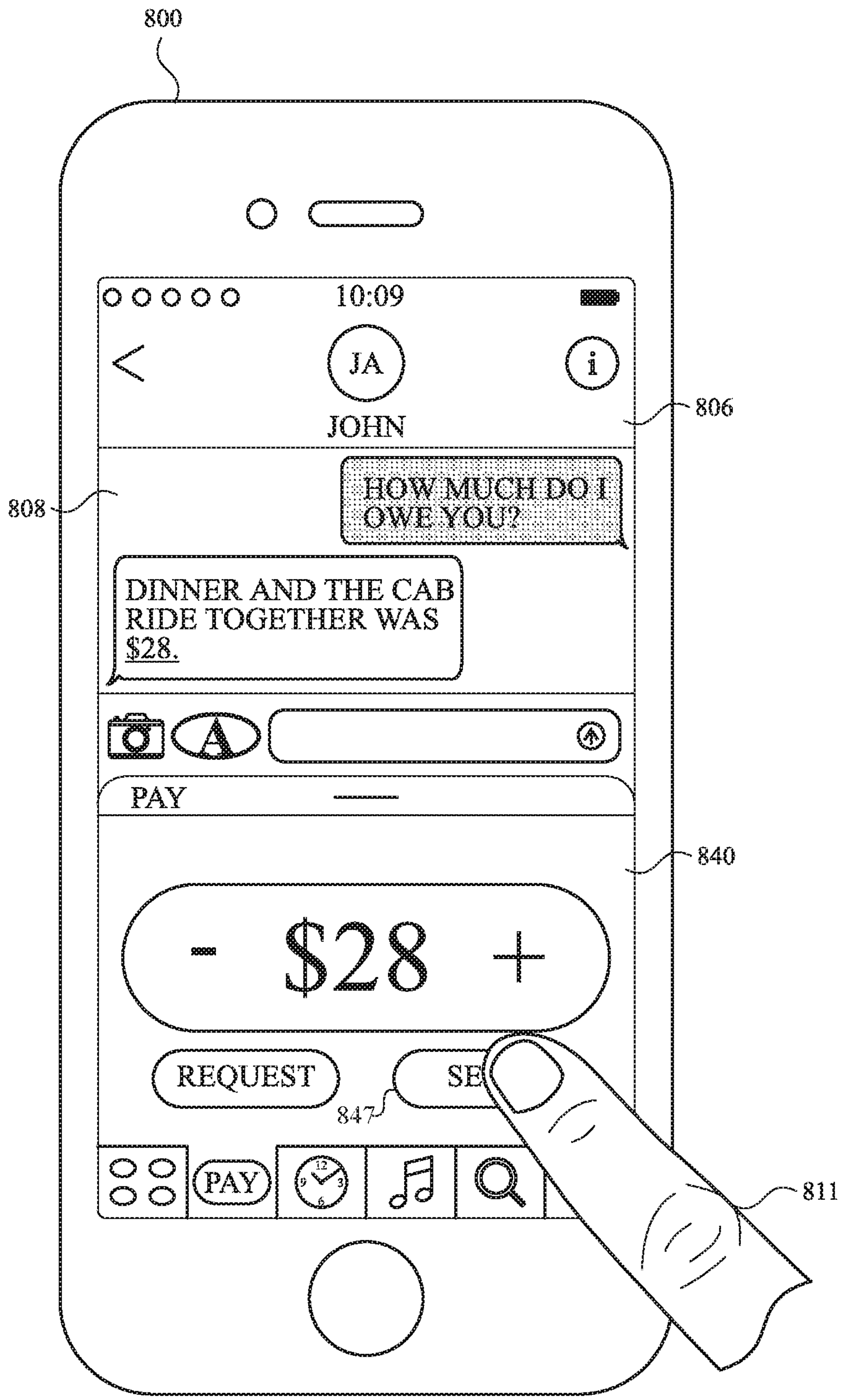

FIG. 8P shows electronic device 800 again displaying message conversation 808 of messaging application 806 and payment transfer user interface 840 (e.g., as first shown in FIGS. 8E and 8J). While displaying payment transfer user interface 840, the device detects user activation of send button 847 (e.g., to send a payment). For example, as shown in FIG. 8P, the user activation is a tap gesture 811 on send button 847.

Figure 8Q:
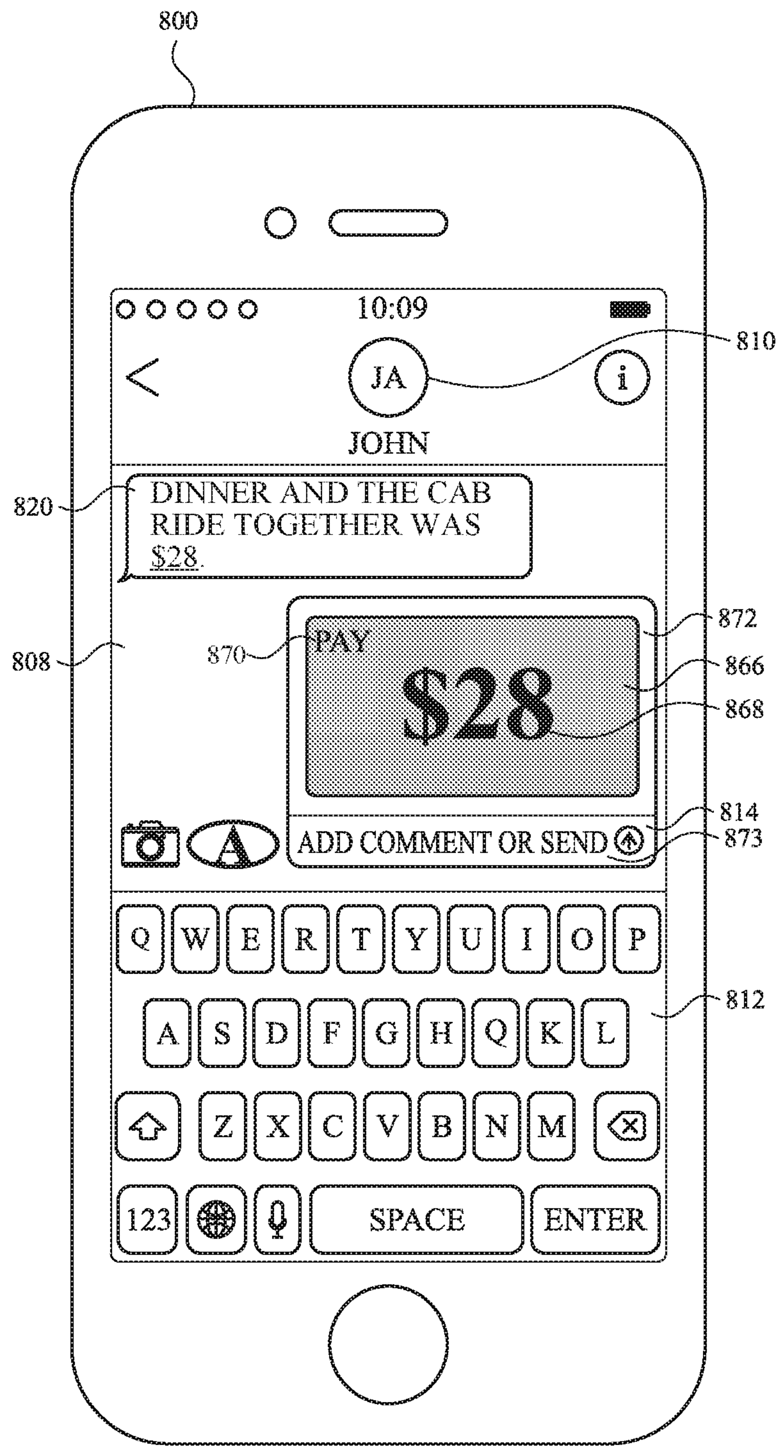

In FIG. 8Q, in response to detecting tap gesture 811 on send button 847, the device displays (e.g., replaces display of payment transfer user interface 840 with) virtual keyboard 812. Further, in response to detecting tap gesture 811 on send button 847, the device displays, in message conversation 808, a payment message object 866 that includes an amount indication 868 of the payment amount. In some embodiments, payment message object 866 also includes a mode indication 870 (e.g., stating "PAY") that the payment message object corresponds to a payment made via an operating-system controlled payment transfer application (and not by a third-party application). In some embodiments, payment transfer user interface 840 is replaced by virtual keyboard 812.

Alternatively, while not shown in FIGS. 8P-8Q, while displaying message conversation 808 of messaging application 806 and payment transfer user interface 840 (e.g., as first shown in FIGS. 8E and 8J), the device can also detect user activation (e.g., a tap gesture) of request button 845. Then, payment message object 866, includes in indication 868, the requested payment amount and an additional textual indication (e.g., "$28 Requested") informing the user that the payment message object corresponds to a request for payment (instead of a payment).

In some embodiments, as shown in FIG. 8Q, payment message object 866 is displayed inside an expanded compose bar 872 (e.g., an expanded region of the compose region that is adjacent to/above compose bar 814). The payment message object being located within expanded compose bar 872 indicates to the user that the payment corresponding to the payment message object has not yet been sent (to message participant 810) but is being created.

In some embodiments, indication 868 of the payment amount (or, alternatively, of the payment request amount) within payment message object 866 is prominently displayed (e.g., in a thick font, in a large font) at the center of the message object. In some examples, indication 870 indicating that the message object corresponds to an outgoing payment (or, alternatively, that the message object corresponds to a request for a payment) is less-prominently displayed (e.g., in a thinner font, a smaller font) at a corner of the message object.

In some embodiments, payment message object 866 is displayed with a visual characteristic (e.g., a different background color, a different background shade, a different background pattern) that distinguishes it from a non-payment message object (e.g., message object 818 and message object 820). For example, payment message object 866 is displayed with a dark color/shade (e.g., black) background color, whereas a non-payment message object (e.g., message object 818 and message object 820) is displayed with a lighter background color/shade (e.g., gray, white, blue).

In some embodiments, as also shown in FIG. 8Q, when a payment message object (e.g., payment message object 866) is being displayed in an expanded compose bar (and has not yet been sent), electronic device 800 displays, within compose bar 814, an indication 873 (e.g., "Add Comment or Send") that a comment (e.g., a note, a message) can be added to (or sent together with) payment message object 866. The device also displays, within compose bar 814, a final send button 874 for sending the payment corresponding to the payment message object (or, alternatively, for sending the payment request corresponds to the payment message object) to the intended participant within the message conversation (e.g., message participant 810 of message conversation 808).

Figure 8R:
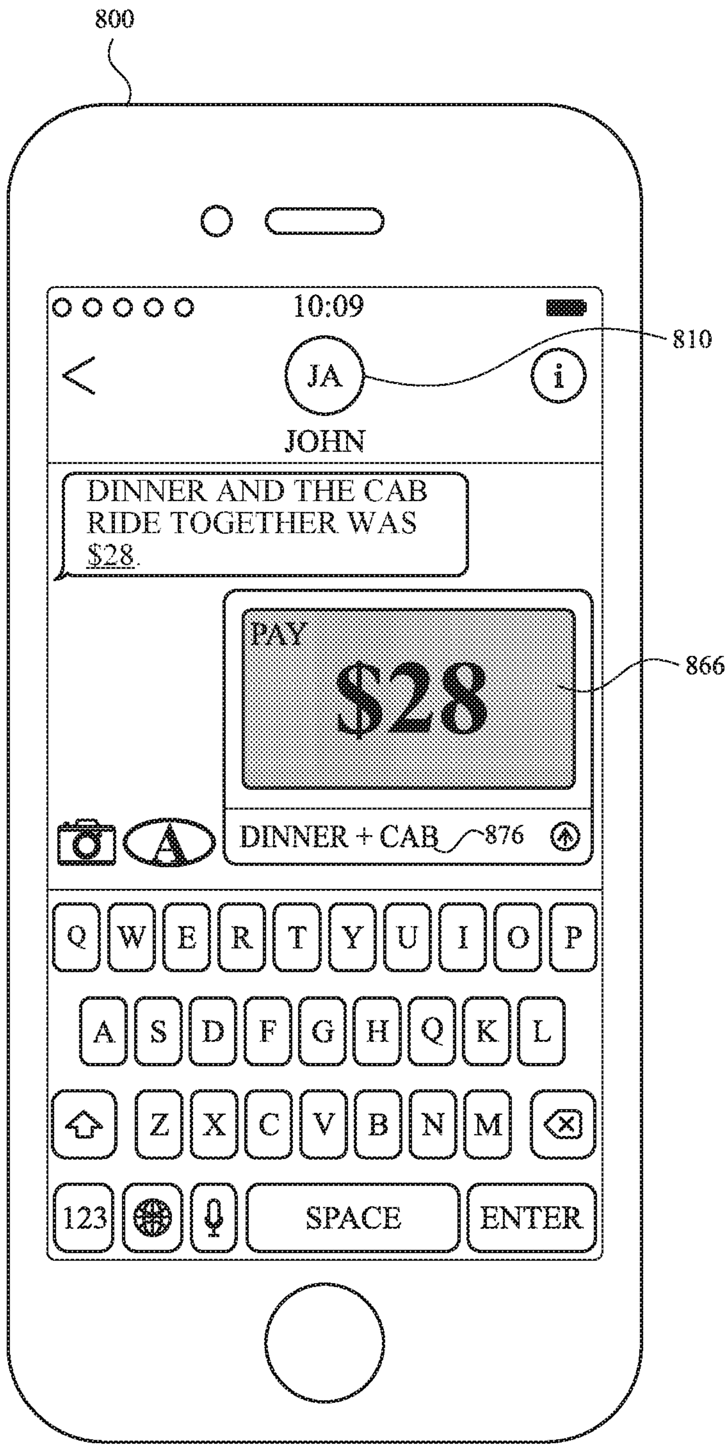

In some embodiments, in response to detecting (e.g., via a tap gesture) user input on compose bar 814 (e.g., a region of compose bar 814 that does not include final send button 874, a region of compose bar 814 with indication 873 stating "Add Comment or Send"), electronic device 800 displays (e.g., replaces display of indication 873 with) a cursor indicating that a comment is ready to be inputted (e.g., typed) into compose bar 814 (e.g., using virtual keyboard 812). For example, FIG. 8R shows a comment 876 (e.g., "Dinner+Cab") added by the user to send together with payment message object 866 to message participant 810.

Figure 8S:
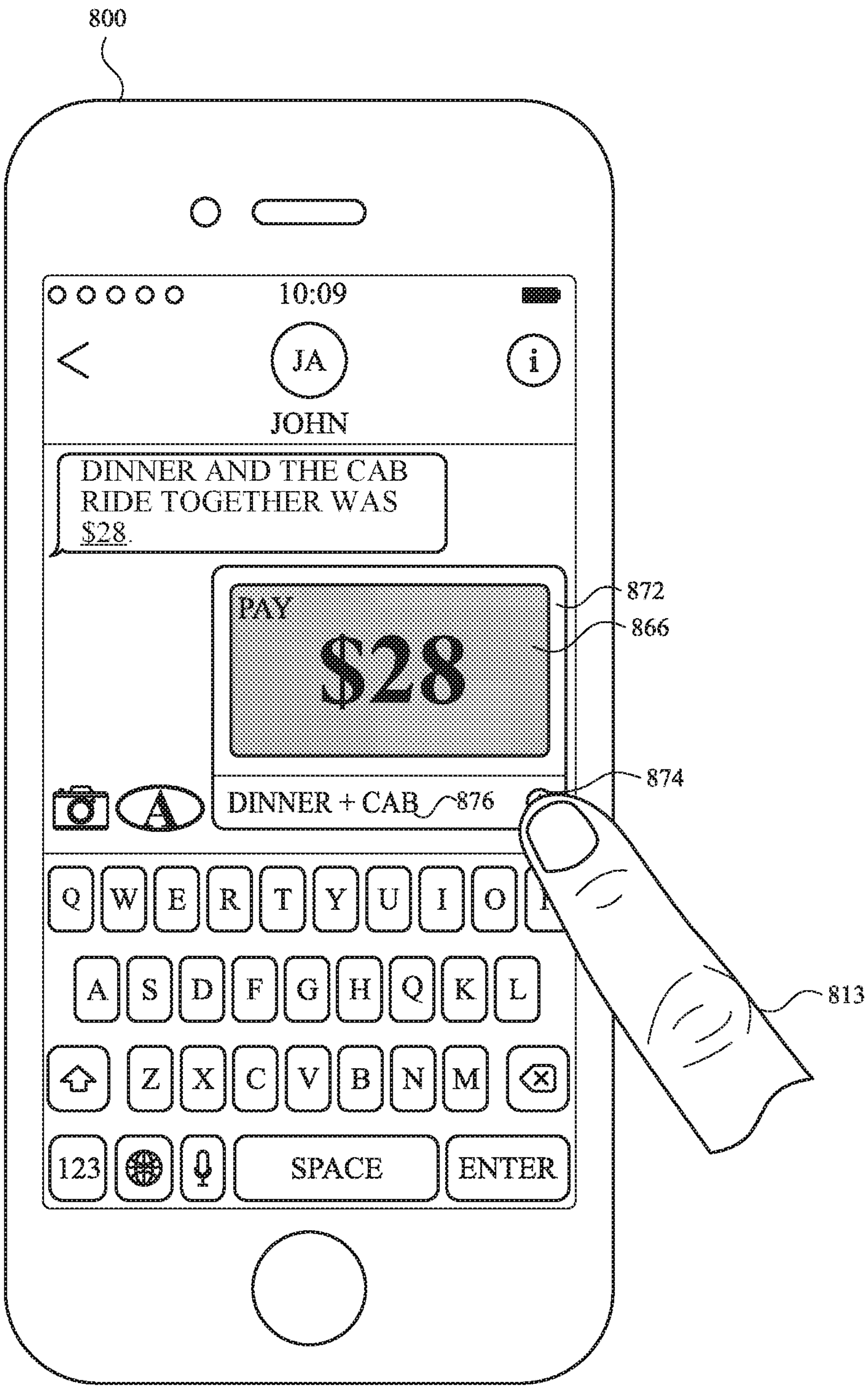
Figure 8T:
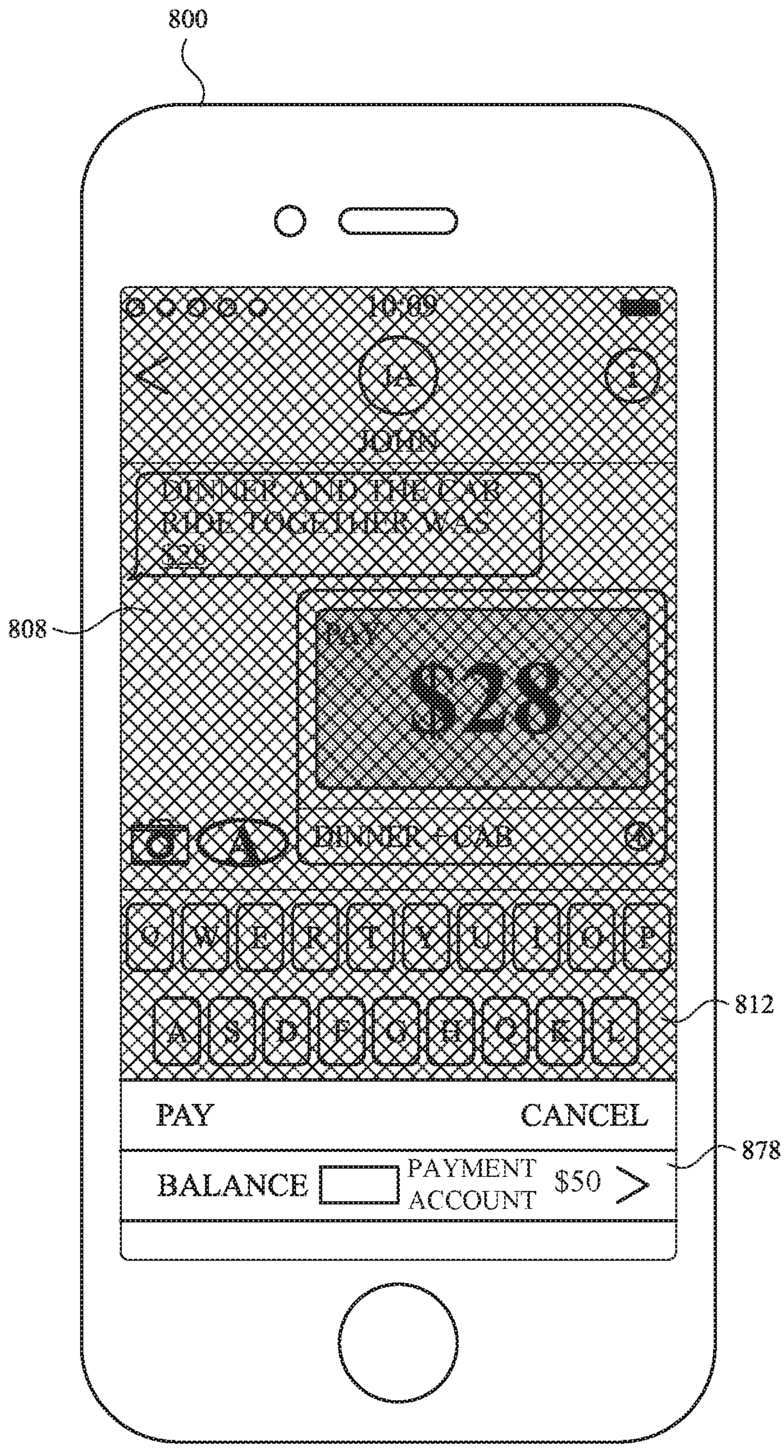
Figure 8U:
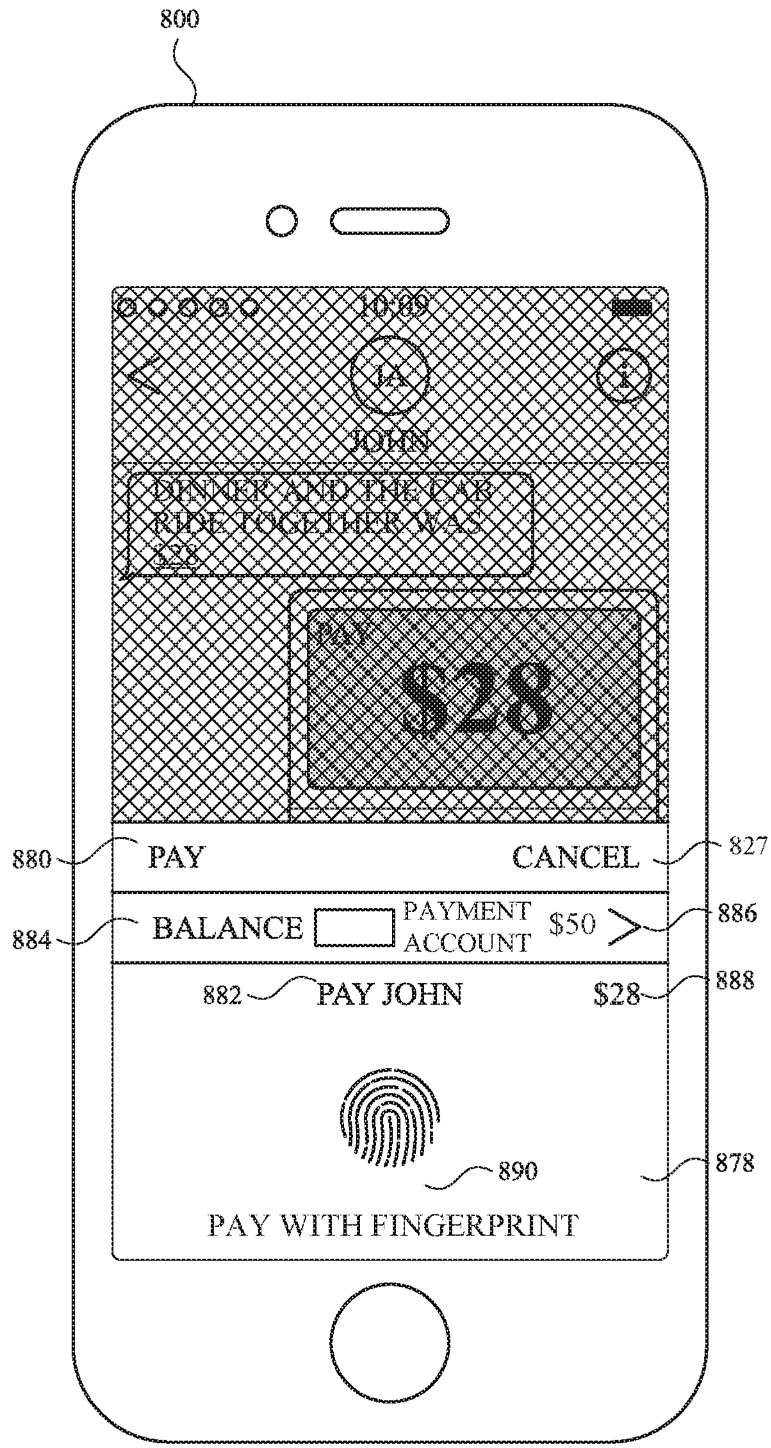

In FIG. 8S, while displaying payment message object 866 within expanded compose bar 872 and comment 876 added to the payment, electronic device 800 detects user activation of final send button 874. For example, the user activation is a tap gesture 813 on final send button 874. In FIGS. 8T-8U, in response to detecting tap gesture 813, electronic device 800 displays a payment confirmation user interface 878. In some embodiments, as shown in the transition from FIG. 8T to FIG. 8U, payment confirmation user interface 878 appears from the bottom edge of display 802 and slides up onto the display to eventually replace display of virtual keyboard 812 (or display of payment transfer user interface 840, whichever is currently displayed). In some embodiments, while payment confirmation user interface 878 is sliding up onto the display, the remaining portion of the display that is not covered by payment confirmation user interface is shaded (e.g., displayed with a darker shade, grayed-out), thus drawing the user's attention to payment confirmation user interface 878 (instead of other portions of the display, such as message conversation 808).

In some embodiments, if payment message object 866 instead relates to a payment request by the user to message participant 810 (as opposed to an outgoing payment from the user to message participant 810), user activation of final send button 874 does not cause display of payment confirmation user interface 878. Instead, if payment message object 866 relates to a payment request, in response to the user activation of final send button 874, electronic device 800 displays, within message conversation 808, payment message object 866 (thereby indicating that the payment request associated with the payment message object has been sent).

In some embodiments, (while a payment message object is displayed in expanded compose field 872) electronic device 800 displays a pay button within compose bar 814 for sending the payment (or payment request) corresponding to the payment message object. Thus, in some embodiments, the user can, subsequent to entering a note (e.g., a comment, a message) to accompany the payment (or payment request), select the pay button to send the payment and the entered note. In some embodiments, the pay button is shown within compose bar 814 while virtual keyboard 812 is displayed. In some embodiments, the pay button is shown within compose bar 814 while payment transfer user interface 840 is displayed.

As shown in FIG. 8U, payment confirmation user interface 878 includes a mode indication 880 (e.g., stating "PAY") that the payment message object being created by payment confirmation user interface 878 corresponds to a payment made via an operating-system controlled payment transfer application (and not by a third-party application). In some embodiments, payment confirmation user interface 878 also includes a cancel button 827 for cancelling the payment (e.g., to message participant 810). In some embodiments, as also shown in FIG. 8U, payment confirmation user interface 878 includes an indication 884 (e.g., a graphical indication, a textual indication) of a payment account and a balance of the payment account to be used for the payment (or, alternatively, to receive a payment for a payment request). For example, indication 884 can include a mini-thumbnail image of a physical card associated with the payment account. For another example, if the payment account is a stored-value account, indication 884 can include the balance (e.g., "$50") stored on the account. In some embodiments, payment confirmation user interface 878 includes an additional accounts button 886 for viewing other payment accounts provisioned on the device that can be used to make the payment corresponding to payment message object 866. In some embodiments, as also shown in FIG. 8U, payment confirmation user interface 878 includes an indication 882 of the intended recipient of the payment (e.g., "Pay John") and an indication 888 of the payment amount (e.g., to serve as another reminder to the user of the amount to be paid).

In some embodiments, as also shown in FIG. 8U, payment confirmation user interface 878 includes an authentication request 890 (e.g., a graphical request, a textual request) requesting that the user provide authentication information to proceed with making the payment to message participant 810. In some embodiments, the requested authentication is biometric authentication, such as facial recognition authentication, fingerprint authentication, voice recognition authentication, iris scan authentication, or retina scan authentication. For example, in FIG. 8U, the requested authentication information (e.g., as shown in authentication request 890), is fingerprint information (e.g., "Pay with Fingerprint").

Figure 8V:
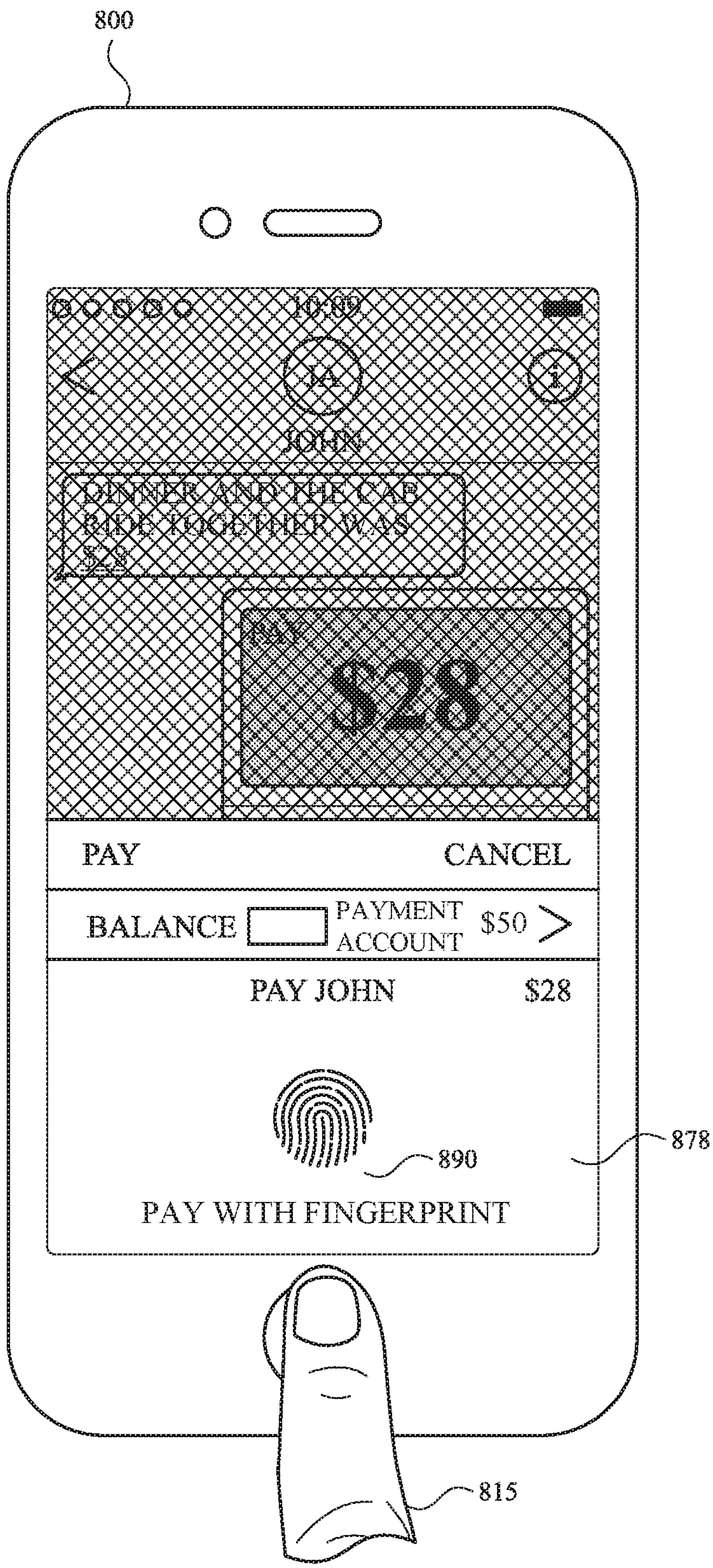
Figure 8W:
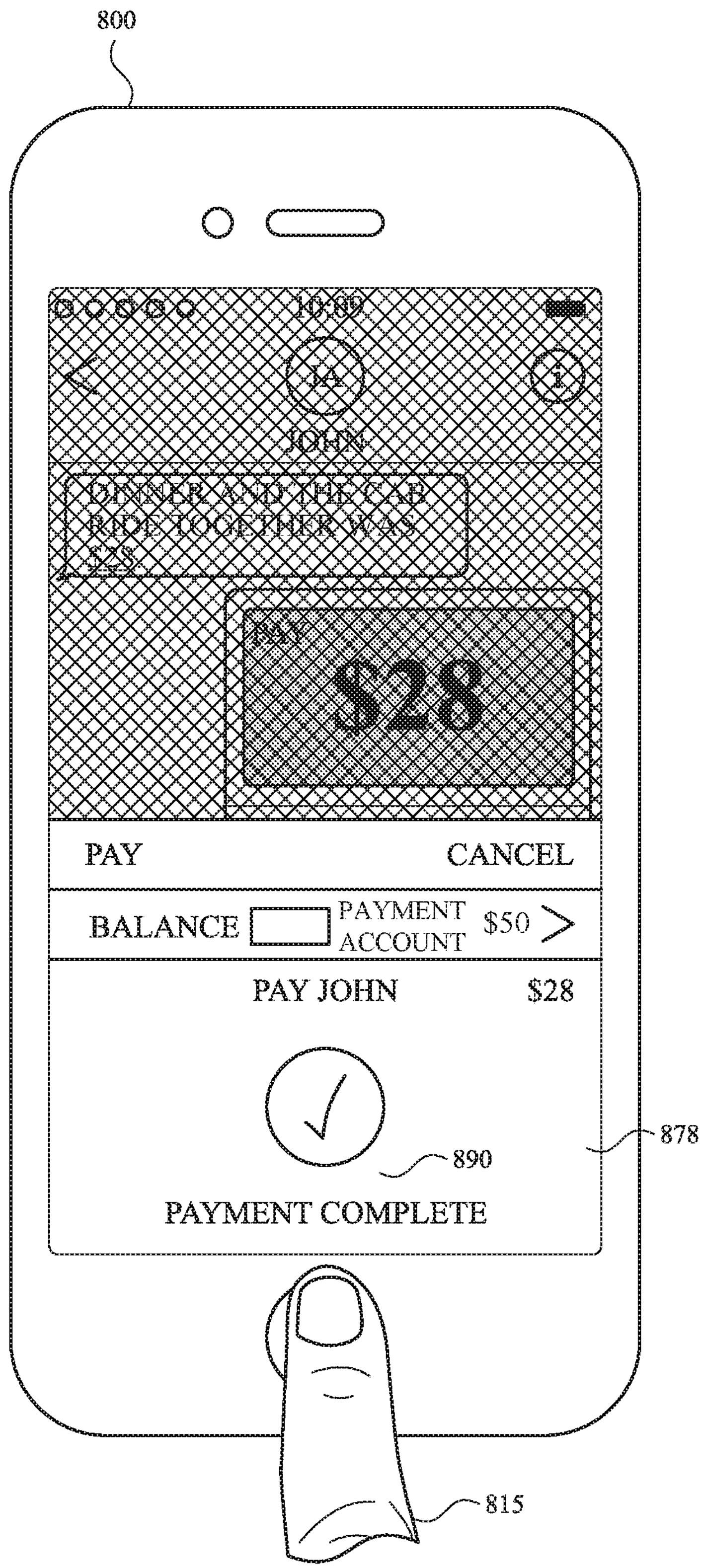

In FIG. 8V, while displaying payment confirmation user interface 878, electronic device 800 receives, from the user, the requested fingerprint information 815 (e.g., via mechanical button 804). While (or subsequent to) receiving, from the user, fingerprint information 815, a determination is made (e.g., by the device or by an external device, such as a server) whether fingerprint information 815 is consistent with an enrolled authentication information (e.g., an enrolled fingerprint information) of the user. As shown in FIG. 8W, in accordance with a determination that fingerprint information 815 is consistent with enrolled fingerprint information of the user, the device updates authentication request 890 (previously showing a request for a certain type of authentication information) to indicate that the authentication was successful (e.g., by displaying a checkmark, by displaying "Authorization Successful" or "Payment Complete").

In some embodiments, in accordance with a determination that fingerprint information 815 is not consistent with enrolled fingerprint information of the user (i.e., authentication was not successful), the device displays an indication that the authentication was unsuccessful and a request to re-provide the requested authentication information. In some embodiments, in accordance with a determination that fingerprint information 815 is (e.g., for a second time) not consistent with enrolled fingerprint information of the user, the device displays a verification user interface (e.g., as described below with reference to FIGS. 31A-31M) for providing a different type of authentication information or for verifying that the user is the user that is associated with the user account logged onto the device.

Figure 8X:
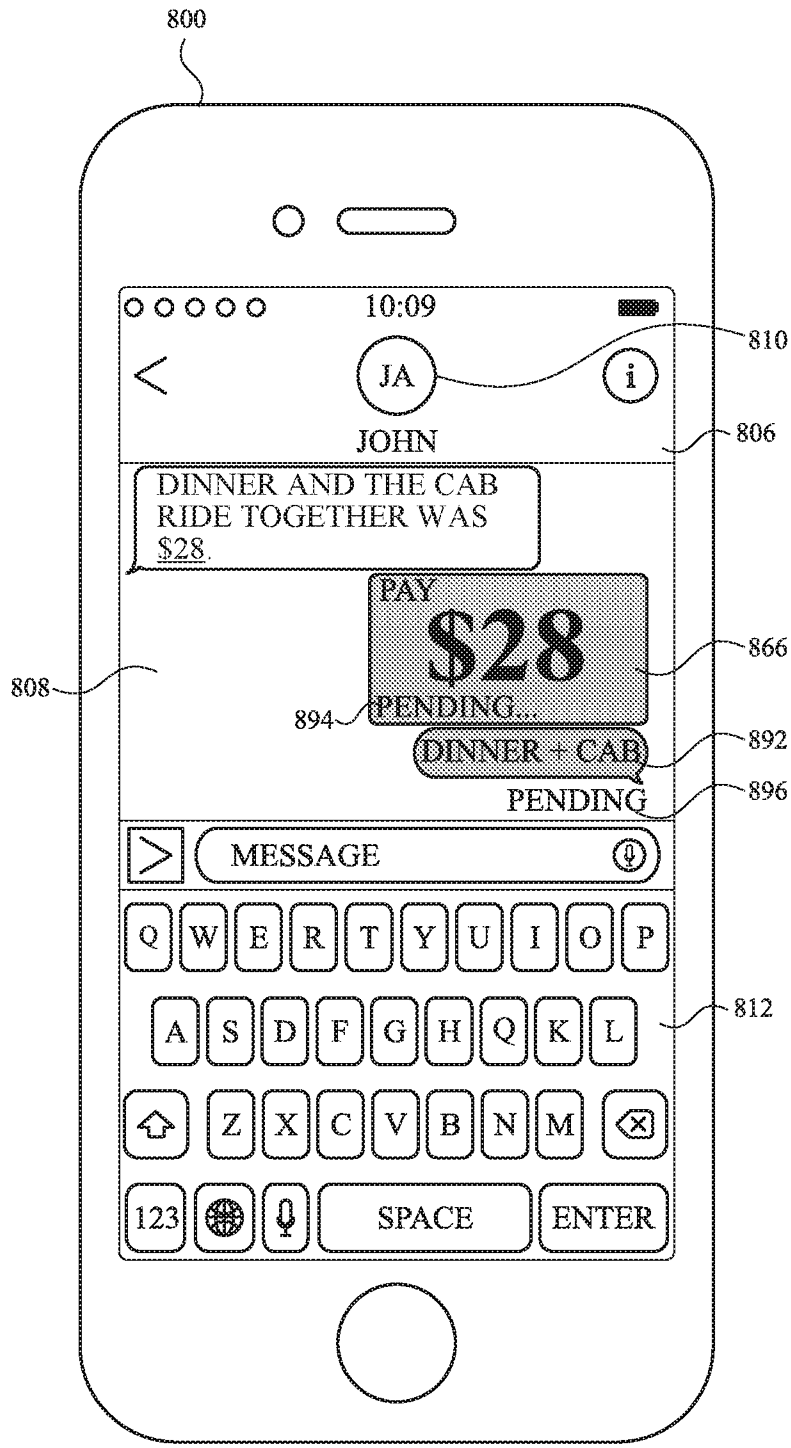

As shown in FIG. 8X, in response to the successful user authentication from FIG. 8W, electronic device 800 removes display of payment confirmation user interface 878 (and again displays virtual keyboard 812 in place of the removed payment confirmation user interface 878). Further, as also shown in FIG. 8X, the device displays payment message object 866 within message conversation 808 of messaging application 806, thereby indicating that the payment has been sent to message participant 810. In addition, the device also displays, adjacent to (or beneath or within) payment message object 866, a sent note message object 892 corresponding to added comment 876 previously entered by the user.

In some embodiments, payment message object 866, once sent, includes a first status indicator 894 informing the user of a status of the payment corresponding to the sent payment message object (e.g., "pending," "paid," "accepted," "expired,"). For example, in FIG. 8X, first status indicator 894 shows "pending," thus indicating to the user that the payment associated with sent payment message object 866 has not yet been accepted by message participant 810. In some embodiments, once a payment message object is sent, the device displays (in addition to or instead of first status indicator 894), a second status indicator 896 informing the user of a status of the payment corresponding to the sent payment message object (e.g., "pending," "paid," "accepted," "expired,"). For example, as shown in FIG. 8X, second status indicator 896 (e.g., "pending") shows the same status as shown by first status indicator 894 (e.g., "pending").

Figure 8Y:
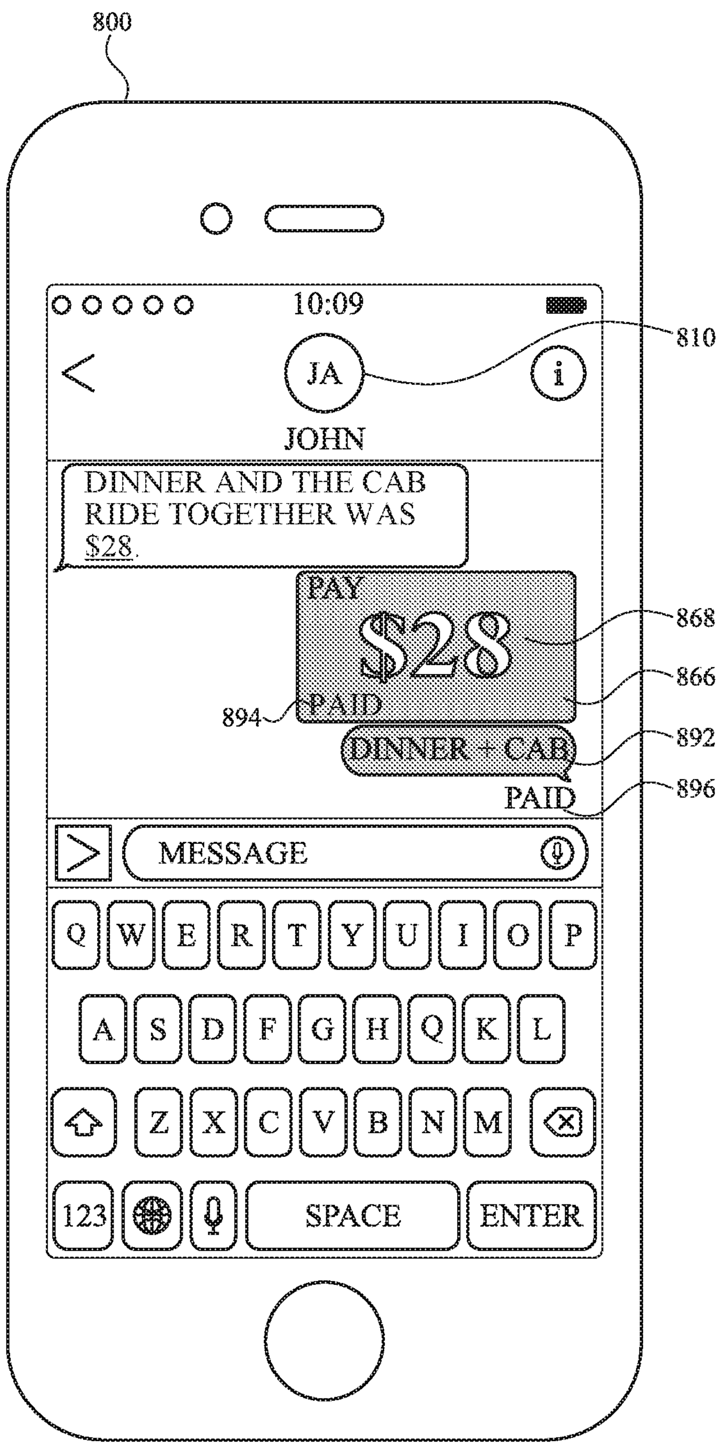

FIG. 8Y shows the payment (or, alternatively, the payment request) corresponding to payment message object 866 having been accepted by message participant 810. In response to the determination that the payment (or, alternatively, the payment request) corresponding to payment message object 866 has been accepted by message participant 810, electronic device 800 updates first status indicator 894 (e.g., from "pending" to "paid") to inform the user that the payment has been accepted by message participant 810 (or, alternatively, to inform the user that the payment request has been accepted, and thus a payment by message participant 810 in the requested payment amount has been made by message participant 810 to the user). In some embodiments, the device updates second status indicator 896 (e.g., from "pending" to "paid") to inform the user that the payment has been accepted by message participant 810 (or, alternatively, to inform the user that the payment request has been accepted, and thus a payment by message participant 810 in the requested payment amount has been made by message participant 810 to the user).

As also shown in FIG. 8Y, in response to the payment (or, alternatively, the payment request) corresponding to payment message object 866 having been accepted by message participant 810, the device changes (e.g., applies a special graphical effect to, applies a special animation to, applies a special pattern to) display of indication 868 of the payment amount within payment message object 866. In some embodiments, indication 868 of the payment amount is changed to a more prominent font (e.g., a larger font, a thicker font). In some embodiments, indication 868 of the payment amount is changed to show a special holographic effect (e.g., as described in more detail with reference to FIGS. 11A-11V). In addition to first status indicator 894 and second status indicator 896, the change to indication 868 of the payment amount within accepted payment message object 866 confirms to the user that the payment has been accepted by message participant 810 (or, alternatively, that the payment request has been accepted/acknowledged by message participant 810).

Figure 8Z:
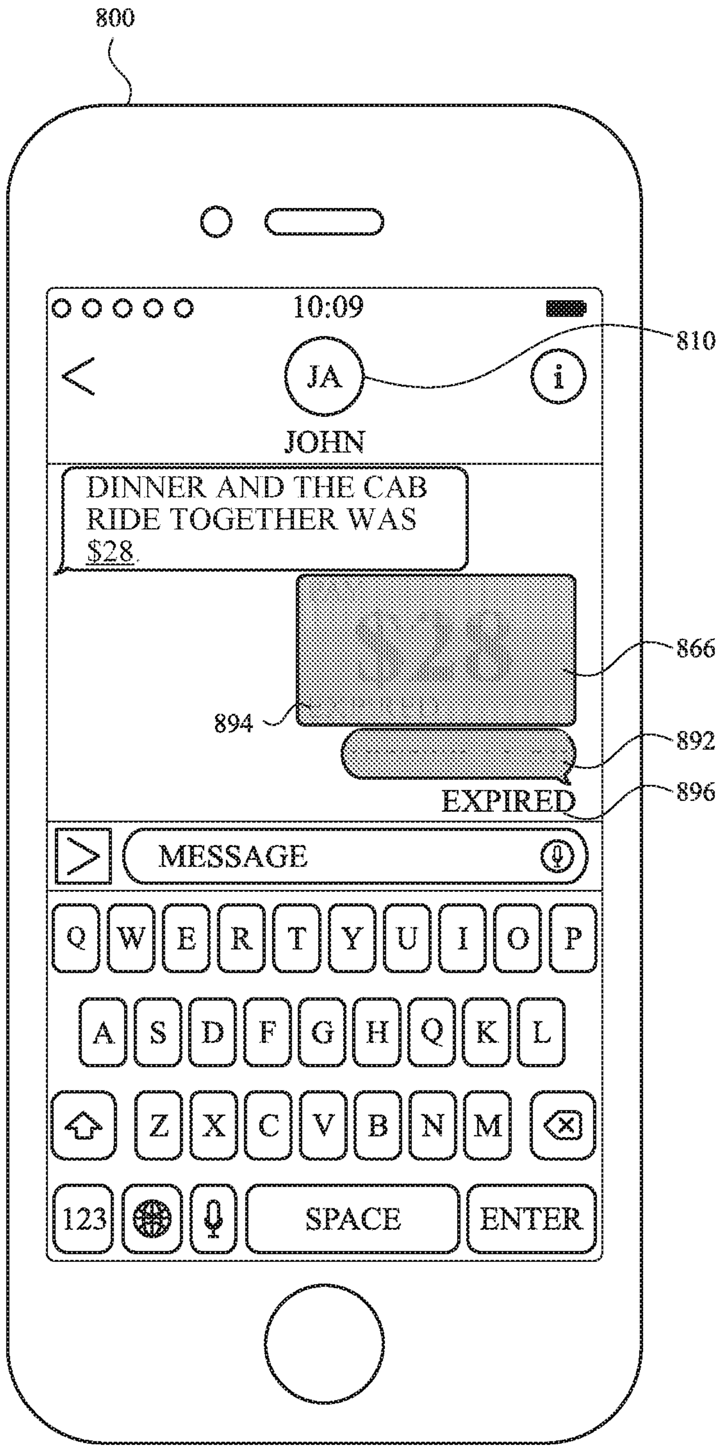
Figure 8A:
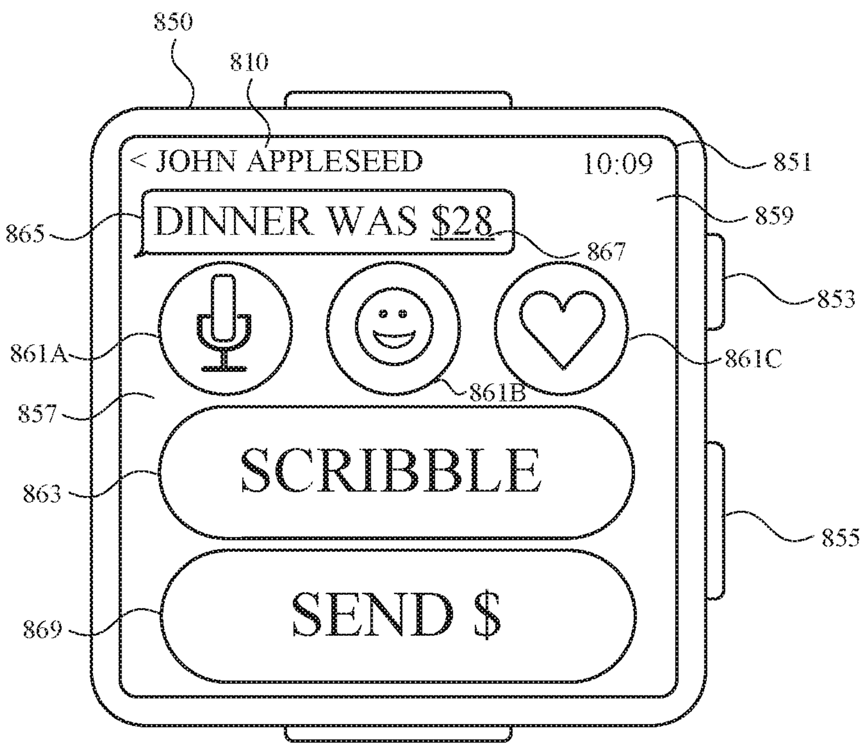
Figure 8A:
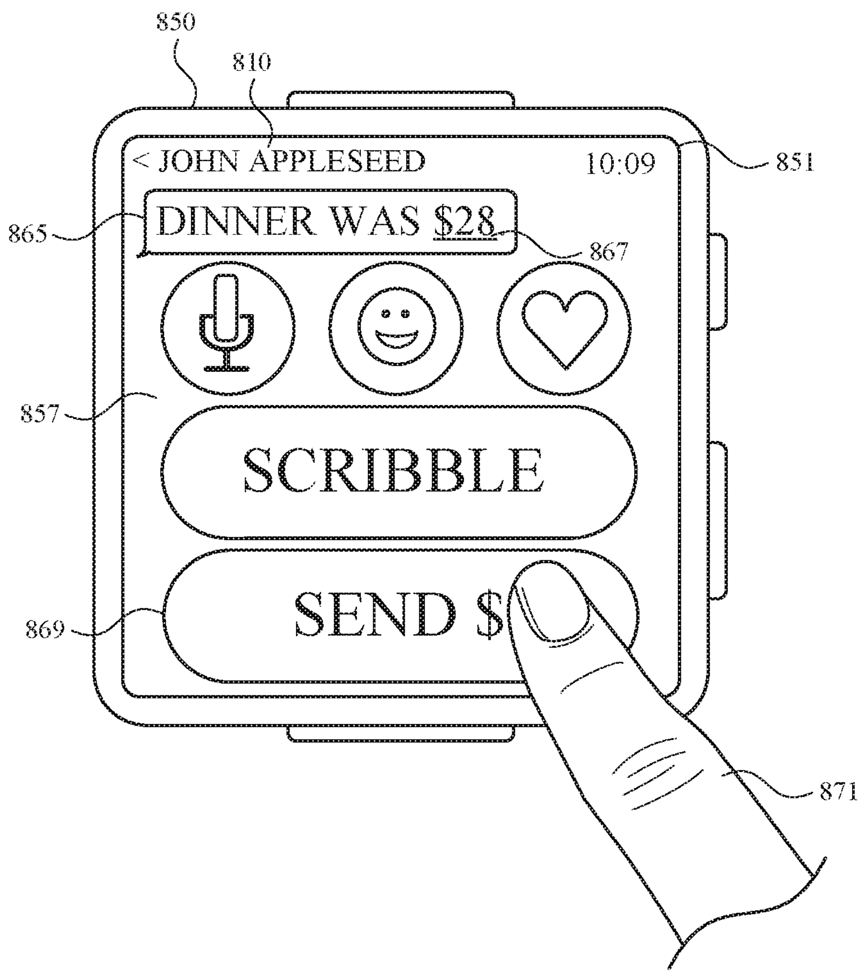
Figure 8A:
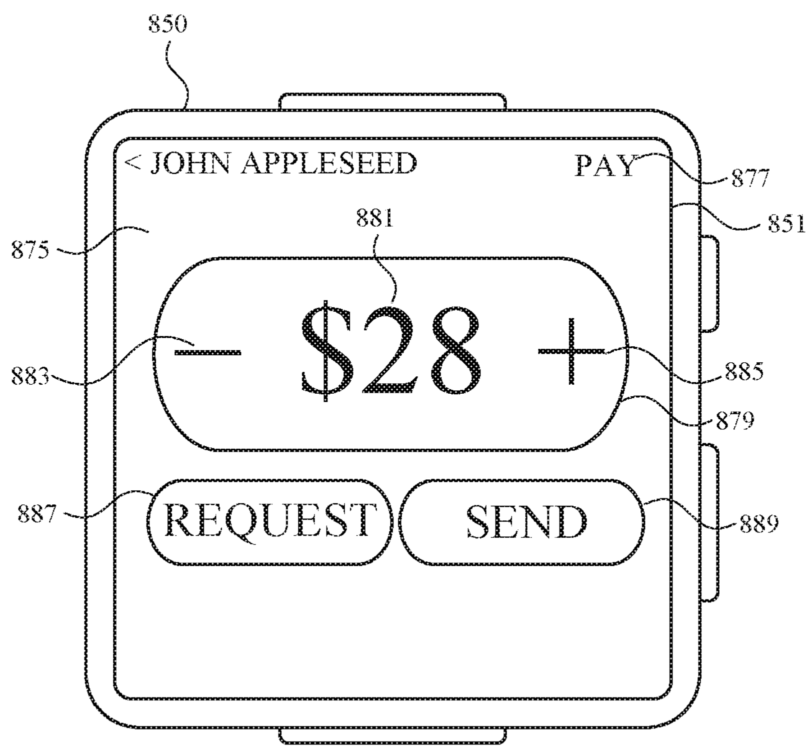
Figure 8A:
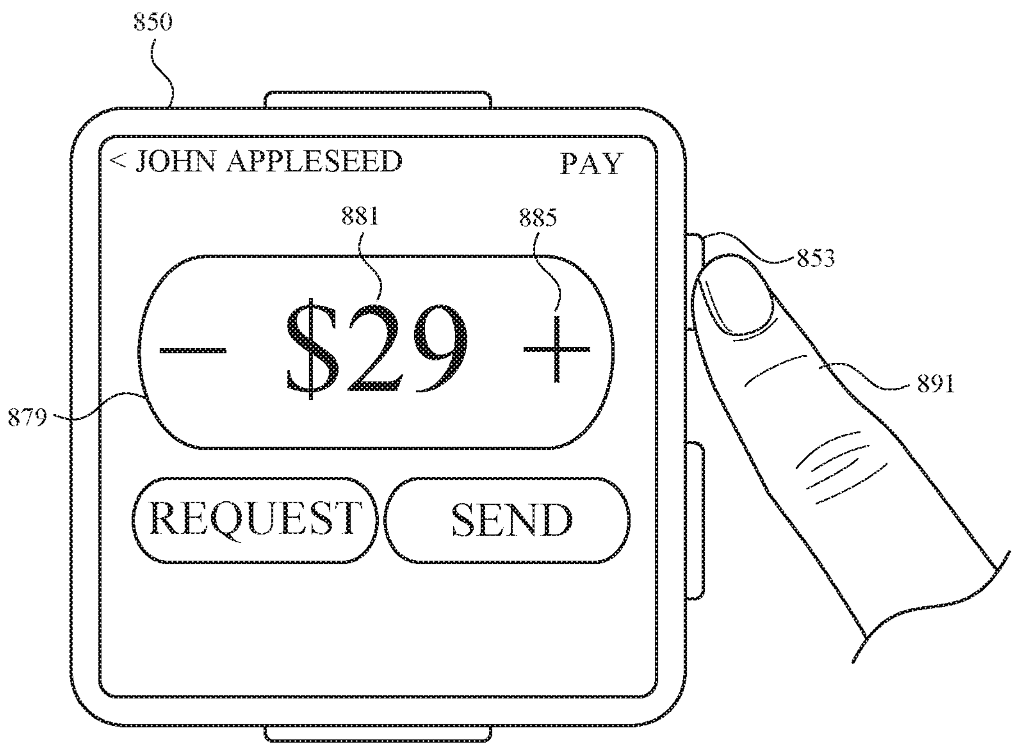
Figure 8A:
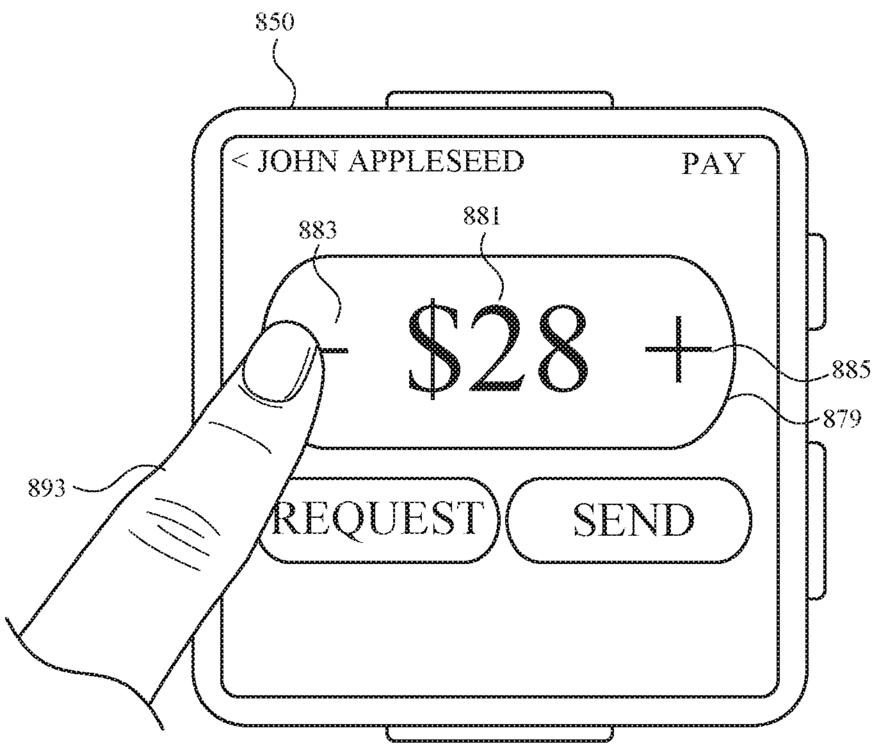
Figure 8A:
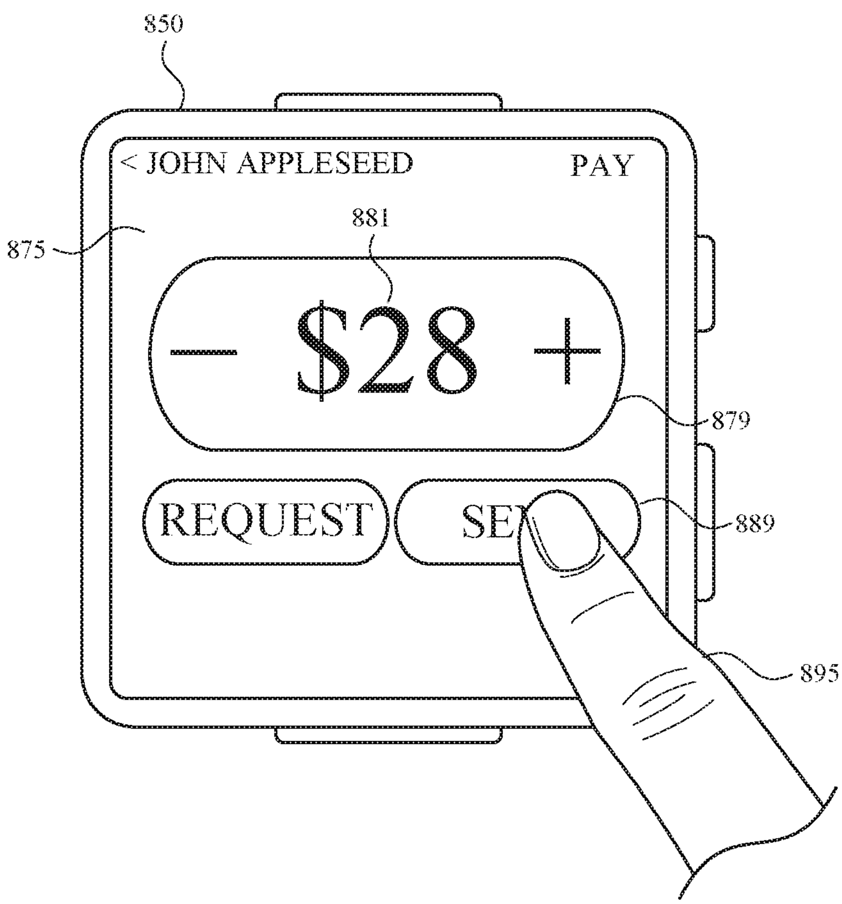
Figure 8A:
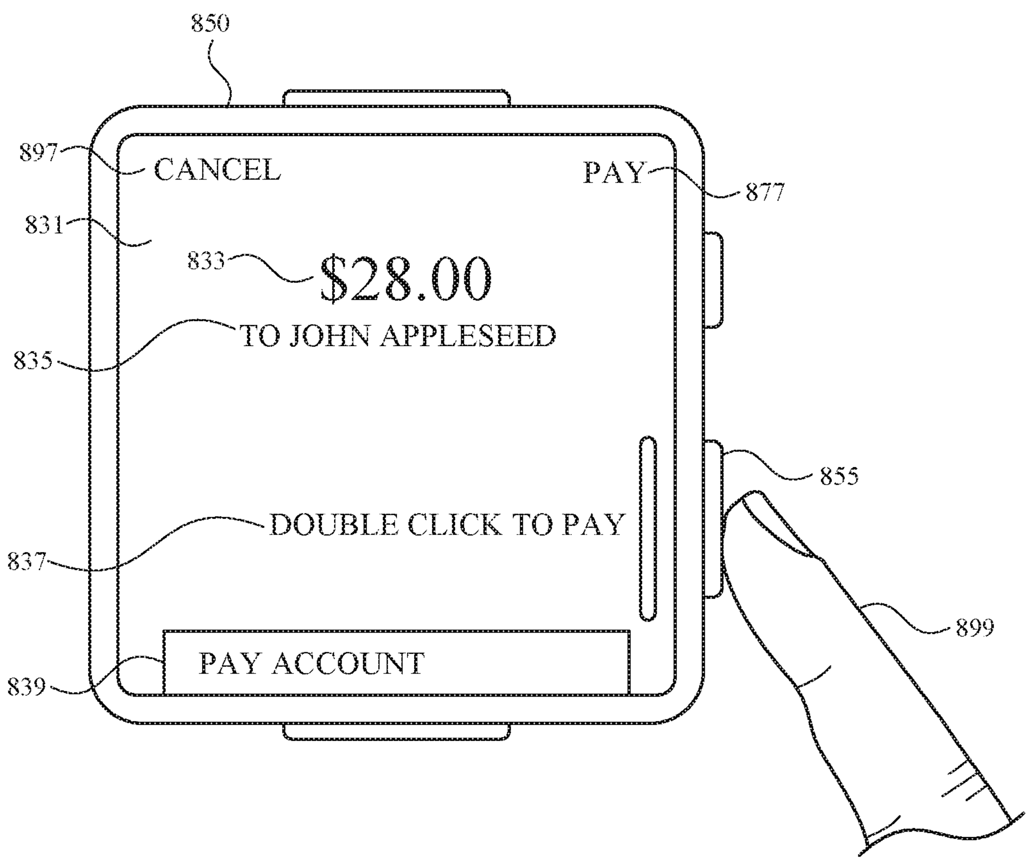
Figure 8A:
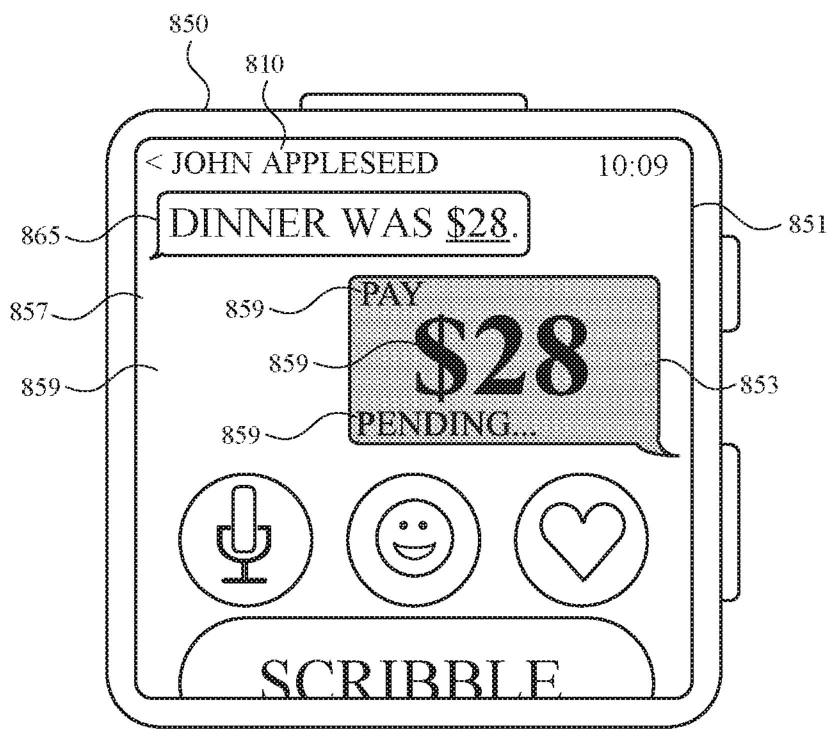
Figure 9A:
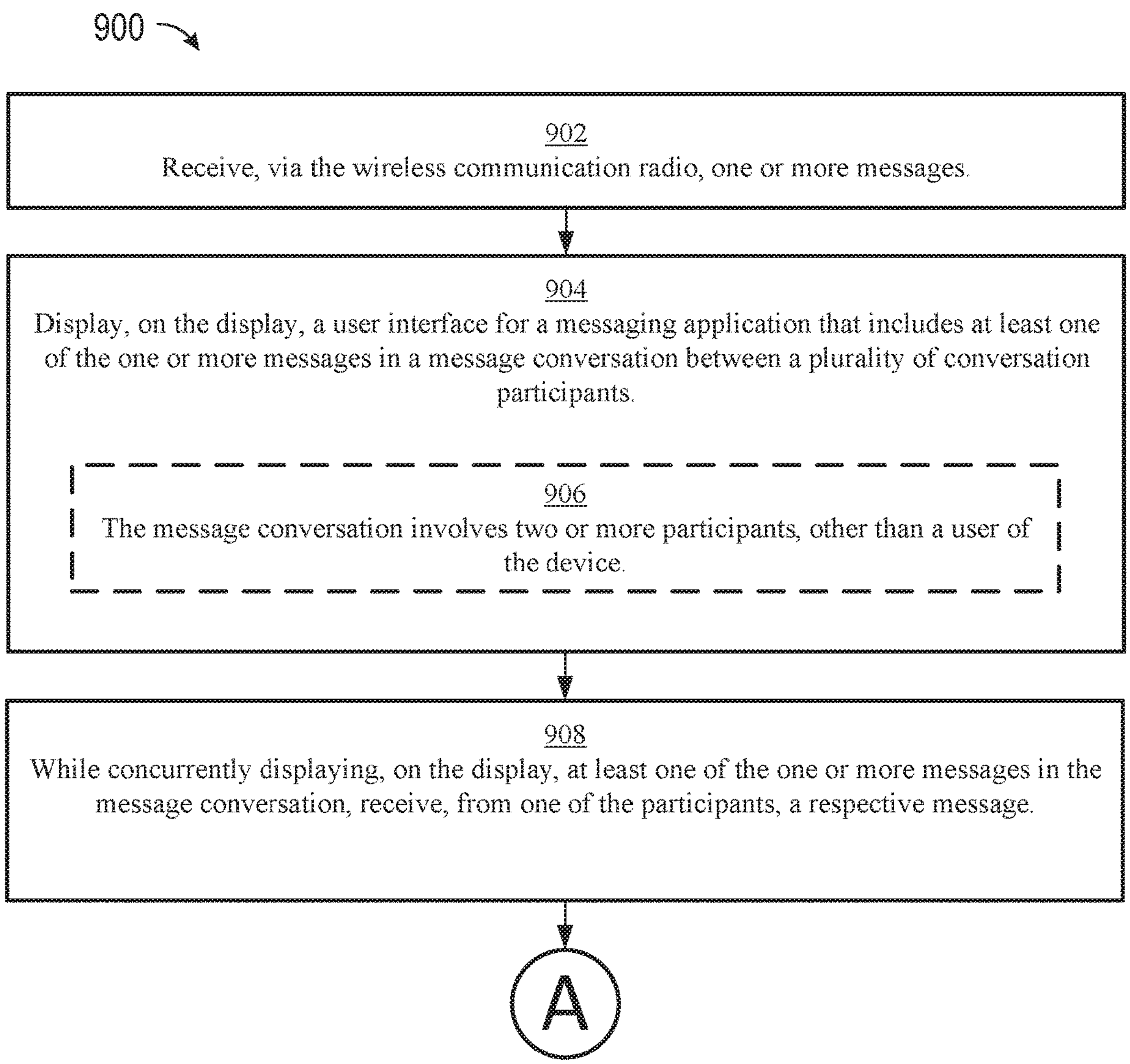
Figure 9C:
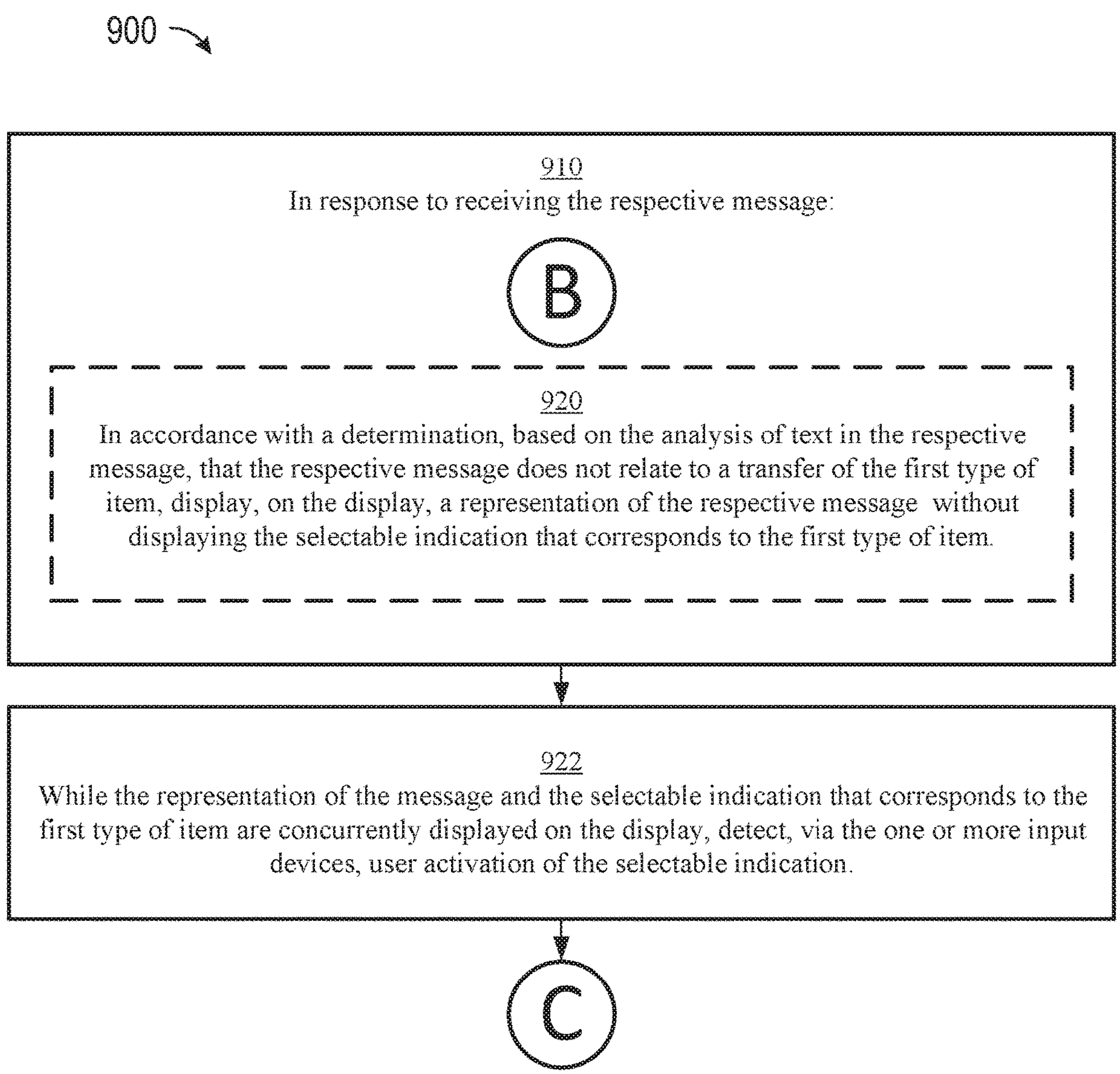
Figure 9D:
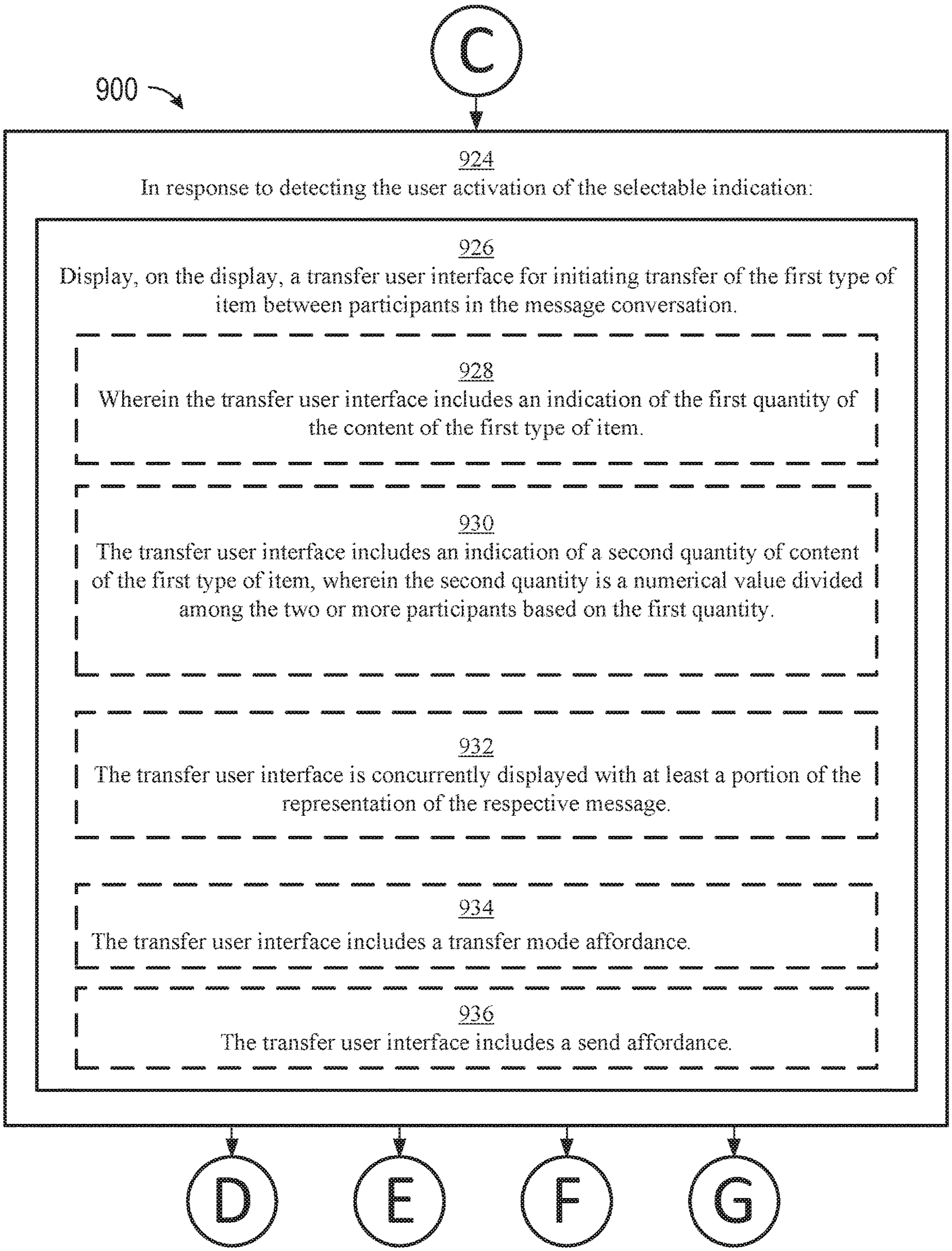
Figure 9E:
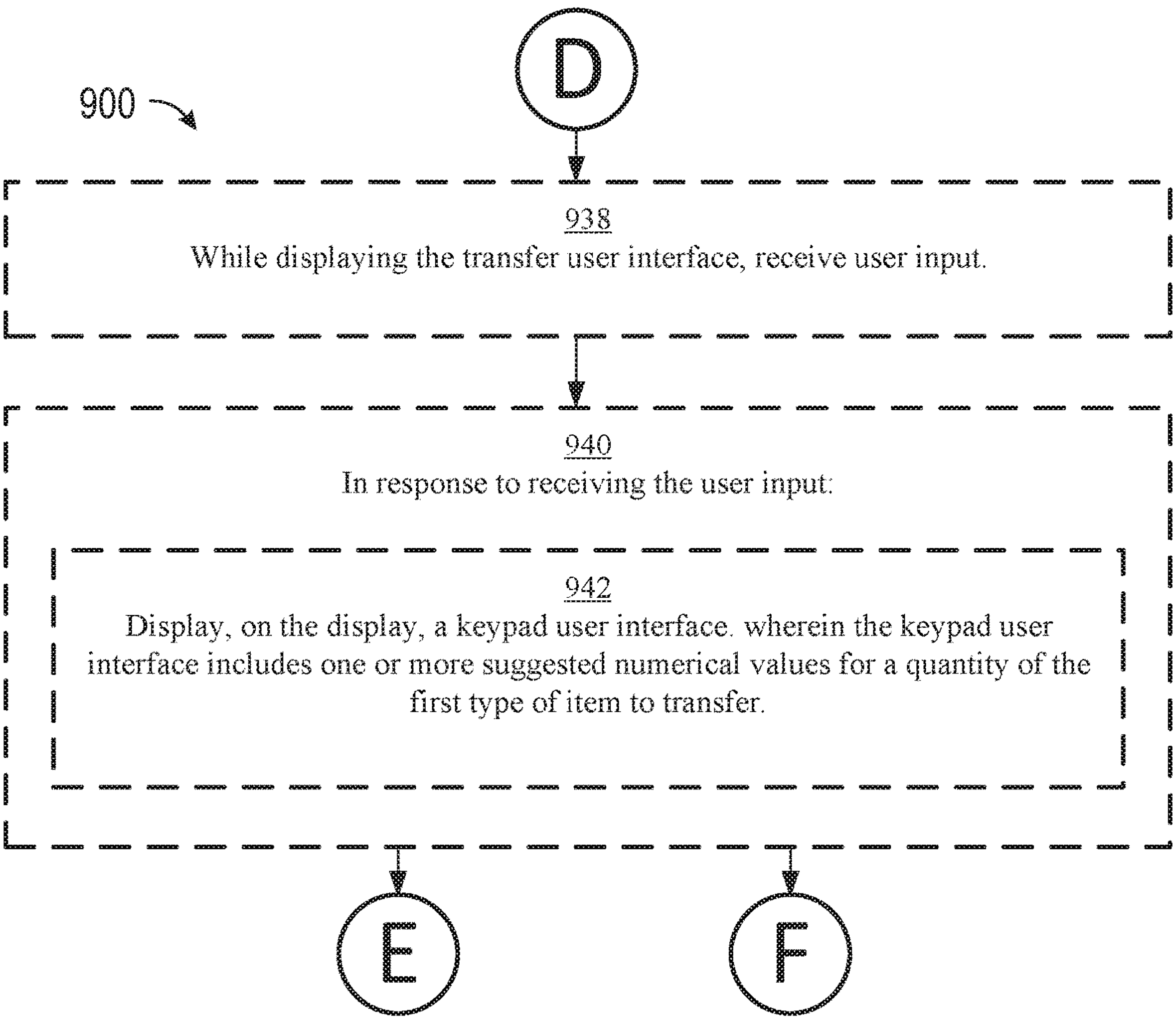
Figure 9F:
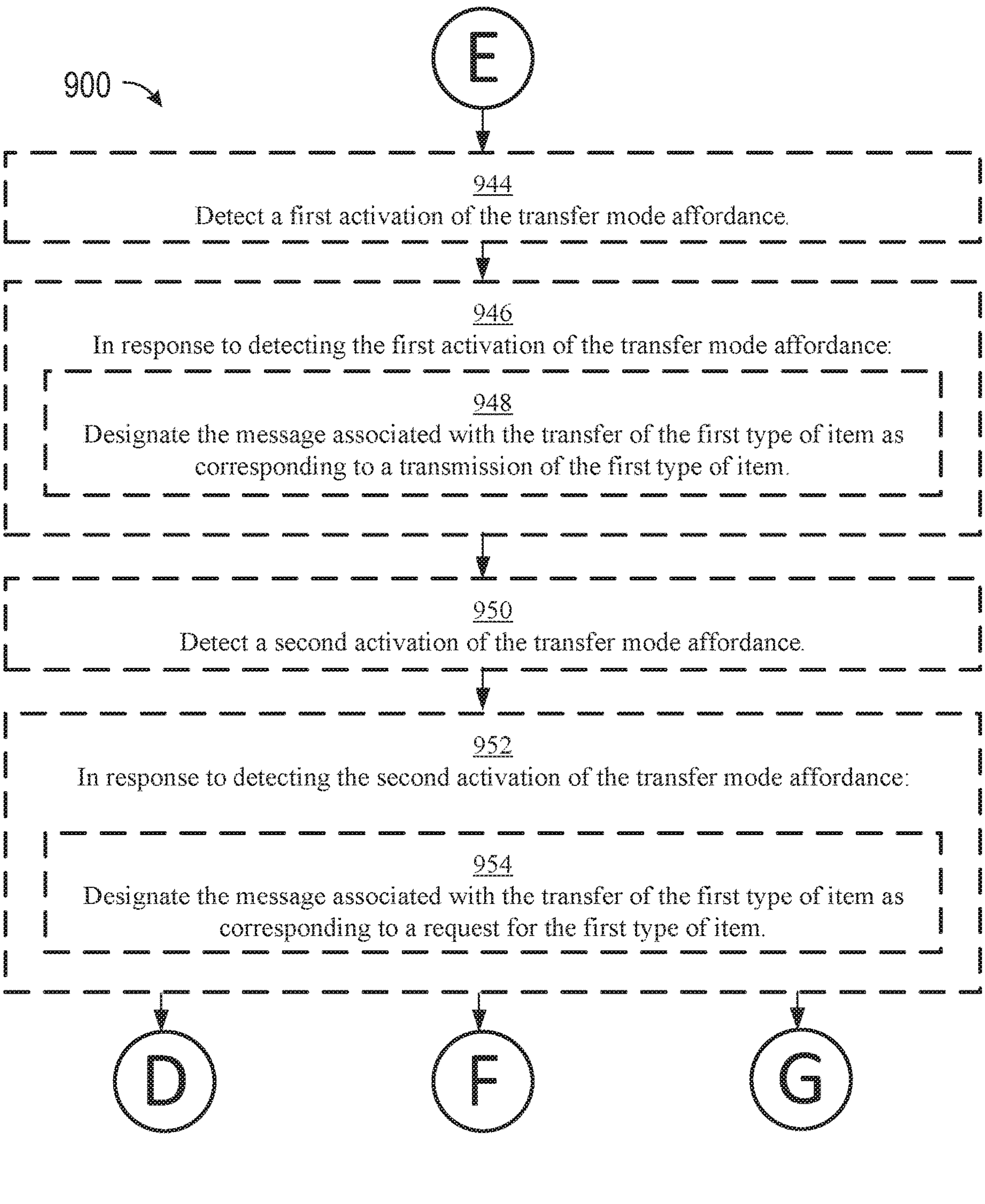
Figure 9G:
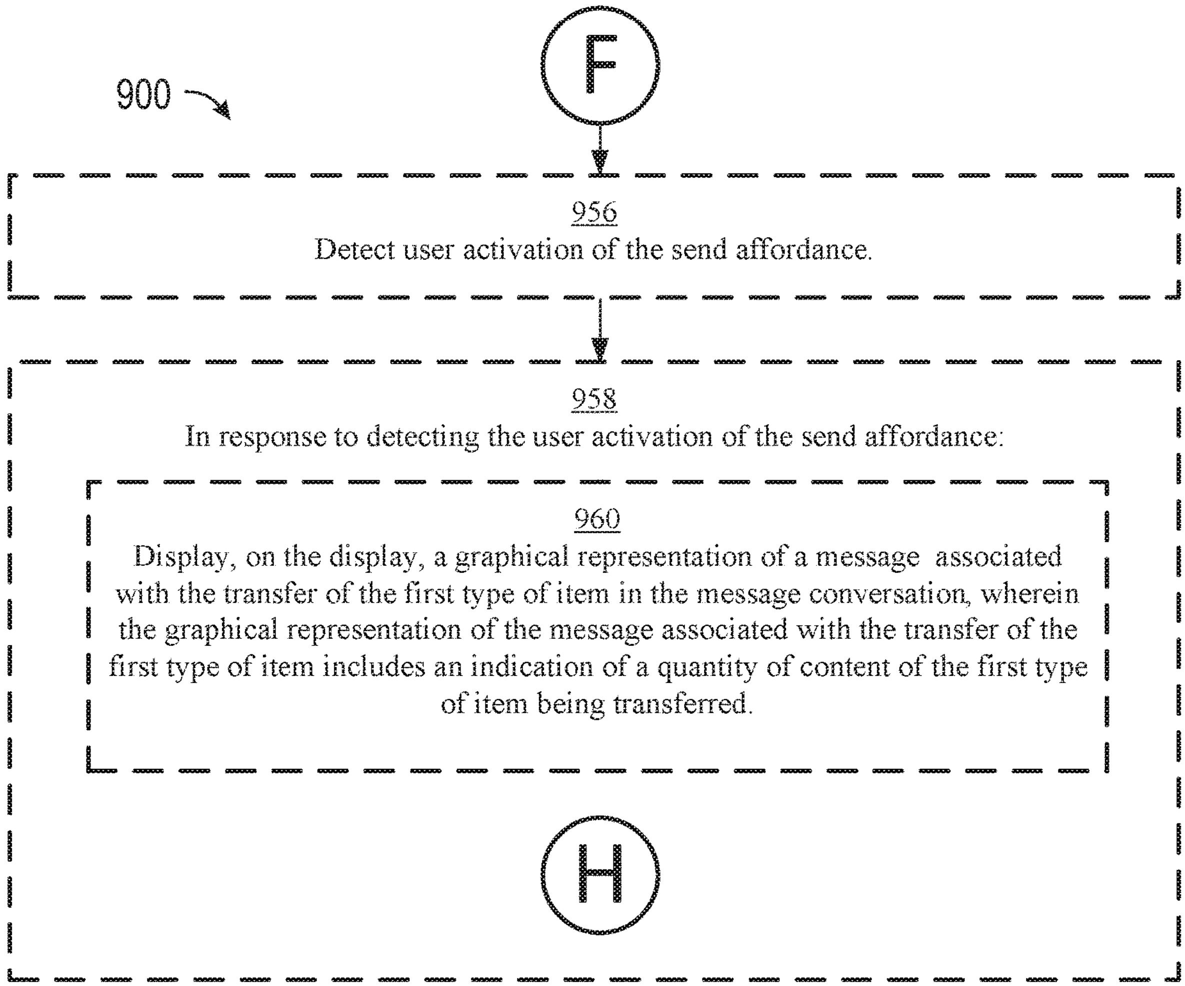
Figure 9I:
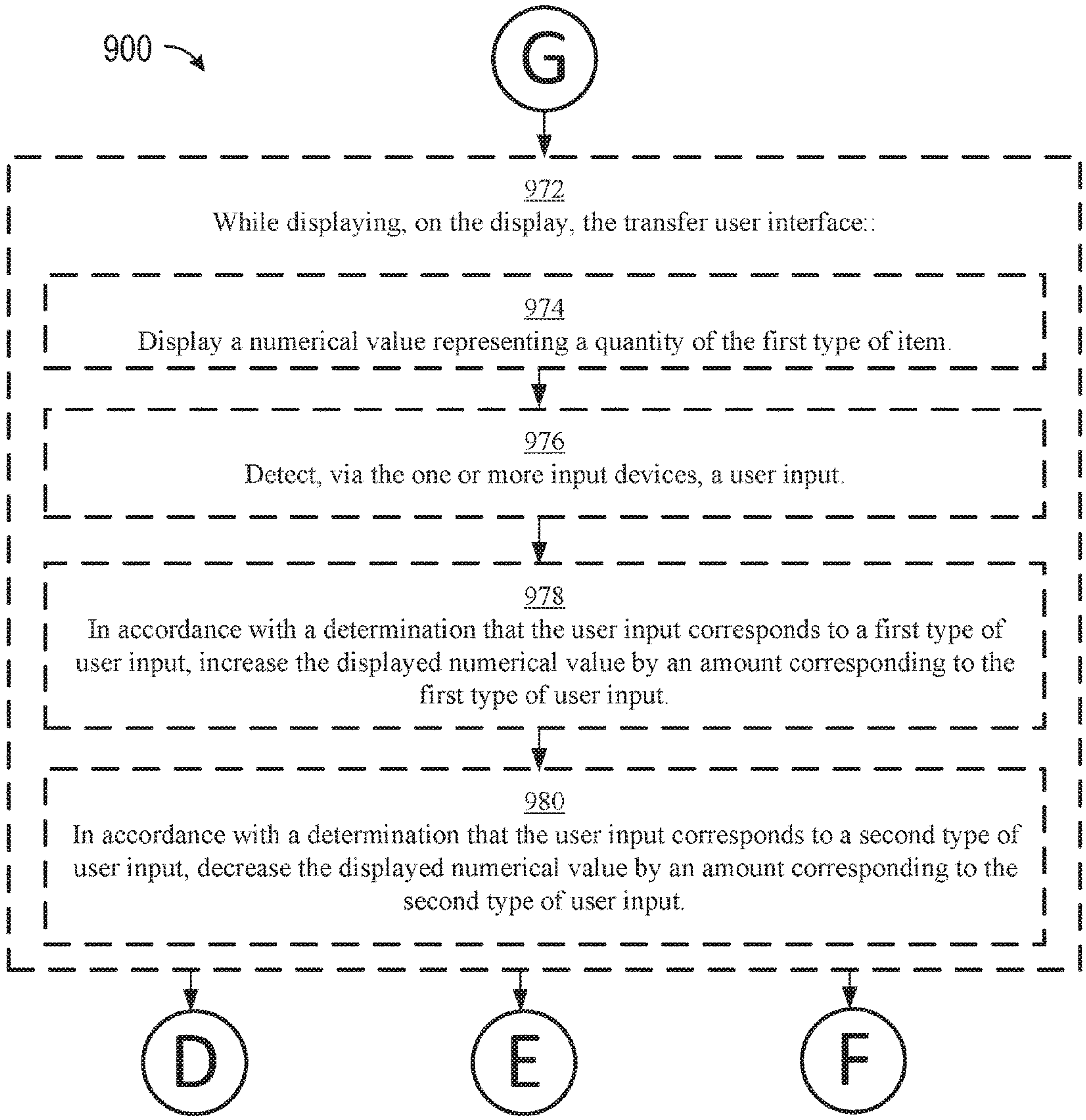

FIG. 8Z shows, in contrast to FIG. 8Y, the payment (or, alternatively, the payment request) corresponding to payment message object 866 having not been accepted by message participant 810 within a predetermined time period (e.g., 24 hours, 3 days, 1 week, etc.). In response to the determination that the payment (or, alternatively, the payment request) corresponding to payment message object 866 has not been accepted by message participant 810 within the predetermined time period, electronic device 800 updates first status indicator 894 (e.g., from "pending" to "expired") to inform the user that the payment has not been accepted by message participant 810 within the predetermined time period (or, alternatively, to inform the user that the payment request has not been accepted within the predetermined time period, and thus a payment by message participant 810 in the requested payment amount has not been made by message participant 810 to the user). In some embodiments, the device updates second status indicator 896 (e.g., from "pending" to "expired") to inform the user that the payment has not been accepted by message participant 810 within the predetermined time period (or, alternatively, to inform the user that the payment request has not been accepted within the predetermined time period, and thus a payment by message participant 810 in the requested payment amount has not been made by message participant 810 to the user).

In some embodiments, as also shown in FIG. 8Z, in response to the determination that the payment (or, alternatively, the payment request) corresponding to payment message object 866 has not been accepted by message participant 810 within the predetermined time period, electronic device 800 changes display (e.g., blurs out, lightens the displayed text) of payment message object 866 (and sent note message object 892 associated with the payment message object) corresponding to the expired payment to indicate that the payment (or, alternatively, the payment request) has expired.

FIGS. 8AA-8AH illustrate example user interfaces for managing peer-to-peer transfers similar to the example user interfaces for managing peer-to-peer transfers described above with reference to FIGS. 8A-8Z. In particular, while the non-limiting example user interfaces of FIGS. 8A-8Z was illustrated and described with respect to electronic device 800, a smartphone, the non-limiting example user interfaces of FIGS. 8AA-8AH are illustrated and described with respect to an electronic device 850, a wearable device (e.g., a smartwatch). Similar to electronic device 800, electronic device 850 has a display 851, one or more input devices (e.g., touchscreen of display 851, a rotatable input button 853, a mechanical button 855, and a mic), and a wireless communication radio.

In FIG. 8AA, electronic device 850 displays, on display 851, a message conversation 859 of a messaging application 857 between the user (e.g., "Kate Appleseed") and message participant 810 (e.g., "John Appleseed") (e.g., similar to message conversation 808 of messaging application 806 described above with reference to FIGS. 8A-8Z). In some embodiments, messaging application 857 includes display of one or more message input buttons 861A-861C for inputting a message (e.g., using different input methods, using different input objects) to be sent via the messaging application. For example, in FIG. 8AA, the message input buttons include a mic input button 861A for inputting a message via voice input (e.g., a spoken user input), an emoticon input button 861B for selecting an emoticon to be transmitted as (or with) a message, and a dynamic input button 861C for creating a dynamic (e.g., moving, non-static) message. In some embodiments, messaging application 857 also includes display of a scribble input button 863 for allowing a user to enter text of a message using hand-scribbled input.

As shown in FIG. 8AA, message conversation 808 includes a message object 865 sent by message participant 810 to the user. In the message corresponding to message object 865, message participant 810 informs the user: "Dinner was $28." In response to receiving the new message corresponding to message object 865, an analysis of the contents (e.g., the text) of message object 865 is performed (e.g., similar to the analysis performed with respect to message object 820 in FIG. 8B above). Based on the analysis of the contents (e.g., the text) of message object 865 (and, optionally, one or more other previous or subsequent message objects of message conversation 859), in accordance with a determination (e.g., made at electronic device 850 or received from an external device, such as a server) that the contents (e.g., the text) of the message corresponding to message object 865 relate to a transfer of a payment (e.g., a request for a payment, agreement to send a payment) that messaging application 857 is configured to transfer, electronic device 850 displays one or more selectable indications that corresponds to a payment amount or to an intent to proceed with a payment transfer, as discussed below (e.g., similar to the selectable indications that are displayed with respect to message object 820, as described above in FIG. 8B).

In some embodiments, as shown in FIG. 8AA, the selectable indication is a marking 867 (e.g., similar to marking 822 of message object 820) of the payment amount shown in message object 865. In some embodiments, as shown in FIG. 8AA, in addition to (or alternatively to) marking 867 on message object 820, electronic device 850 displays a pay button 869 (e.g., similar to pay button 828 associated with message object 820). In some embodiments, pay button 869 is displayed below scribble button 863 within messaging application 857.

In FIG. 8AB, while displaying message conversation 859 with marking 867 and pay button 869 displayed, electronic device 850 detects user activation of pay button 869 (or, alternatively, of marking 867 of message object 865) to proceed with transferring the requested payment amount (e.g., "$28") to message participant 810. For example, as shown in FIG. 8AB, the user activation is a tap gesture 871 on the pay button (or, alternatively, on the marking of the message object). In FIG. 8AC, in response to detecting tap gesture 871 on pay button 869 (or, alternatively, on marking 867 of message object 865), electronic device 850 displays, on display 851, a payment transfer user interface 875 (e.g., similar to payment transfer user interface 840 illustrated, for example, in FIG. 8E).

As with payment transfer user interface 840, payment transfer user interface 875 includes a value change region 879 (e.g., corresponding to value change region 846 of payment transfer user interface 840). As with value change region 846 of payment transfer user interface 840, value change region 879 of payment transfer user interface 875 includes an indication 881 of the transfer amount (e.g., "$28"). As shown in FIG. 8AC, in some embodiments, payment transfer user interface 875 is displayed with the payment amount (e.g., "$28") pre-populated in indication 881 (e.g., as described above in FIG. 8E with respect to indication 848 of payment transfer user interface 840).

In some embodiments, payment transfer user interface 875 also includes an indication 877 (e.g., stating "PAY," similar to indication 841 of payment transfer user interface 840) informing the user that the payment message object corresponds to a payment made via an operating-system controlled payment transfer application (and not by a third-party application). In some embodiments, payment transfer user interface 875 includes a request button 877 (e.g., corresponding to request button 845) and a send button 889 (e.g., corresponding to send button 8847).

As also shown in FIG. 8AC, payment transfer user interface 875 also includes, within value change region 881 (e.g., similar to value change region 846 of payment transfer user interface 840), a value increase button 885 (e.g., indicated as a "+," corresponding to increase button 850 of value change region 846) for increasing and a value decrease button 883 (e.g., indicated as a "−," corresponding to decrease button 852 of value change region 846) for decreasing the displayed payment amount within indication 881. In some embodiments, in response to detecting user activation of value increase button 885, the displayed payment amount within indication 881 is increased, and in response to detecting user activation of value decrease button 883, the displayed payment amount within indication 881 is decreased.

In some embodiments, in addition to (or alternatively to) changing the payment amount displayed in indication 881 using value increase button 885 and value decrease button 883, the payment amount can be increased or decreased based on rotation of rotatable input button 853. In some embodiments, the value of the displayed payment amount in indication 881 of value change region 879 is increased in response to a clockwise rotation of rotatable input button 853 and the value of the displayed payment amount in indication 881 in value change region 879 is decreased in response to a counter-clockwise rotation of rotatable input button 853. For example, in FIG. 8AD, electronic device 850 receives a user rotation input 891 on rotatable input button 853, where user rotation input 891 is a rotation of the input button in the clockwise direction. As shown in FIG. 8AD, in response to receiving user rotation input 891, the displayed payment amount in indication 881 is increased (e.g., from "$28" to "$29"). In some embodiments, the same result can be achieved by user activation of value increase button 885.

In FIG. 8AE, electronic device 850 detects a user input on value decrease button 883 of value change region 879. For example, as shown in FIG. 8AE, the user input is a tap gesture 893 on value decrease button 883. As shown in FIG. 8AE, in response to detecting tap gesture 893, the displayed payment amount in indication 881 is decreased (e.g., from "$29" to "$28"). In some embodiments, the same result can be achieved via user rotation of the rotatable input button in a counter-clockwise direction.

In FIG. 8AF, while displaying payment transfer user interface 875 with the payment amount (e.g., "$28") corresponding to the amount requested by message participant 810 (in message object 865) displayed in indication 881 of value change region 879, electronic device 850 detects user activation of send button 889. For example, as shown in FIG. 8AF, the user activation is a tap gesture 895 on the send button.

As shown in FIG. 8AG, in response to detecting tap gesture 895 on send button 889, electronic device 850 displays (e.g., replaces display of payment transfer user interface 875 with) a payment confirmation user interface 831 (e.g., similar to payment confirmation user interface 878 described above with reference to, for example, FIG. 8U). As with payment confirmation user interface 878, payment confirmation user interface 831 includes a mode indication 877 (e.g., stating "PAY," corresponding to mode indication 880 of payment confirmation user interface 878), a cancel button 897 (e.g., corresponding to cancel button 827 of payment confirmation user interface 878), an indication 839 (e.g., corresponding to indication 884 of payment confirmation user interface 787) of a payment account, an indication 835 (e.g., corresponding to indication 882 of payment confirmation user interface 787) of the intended recipient of the payment (e.g., "To John Appleseed"), and an indication 833 (e.g., corresponding to indication 888 of payment confirmation user interface 878) of the payment amount (e.g., to serve as another reminder to the user of the amount to be paid). In some embodiments, payment confirmation user interface 31 includes a confirmation request 837 (e.g., similar to authentication request 890 of payment confirmation user interface 787, a graphical request, a textual request) requesting that the user provide confirmation to proceed with making the payment (e.g., of $28) to message participant 810. For example, in FIG. 8AG, confirmation request 837 states "Double Click to Pay."

As shown in FIG. 8AG, while displaying confirmation user interface 831, electronic device 850 receives a user input corresponding to the confirmation requested via confirmation request 837 to proceed with completing the payment transfer. For example, as shown in FIG. 8AG, the user input is a double-click (or a double-push) input 899 on mechanical button 855.

In FIG. 8AH, in response to receiving double-click input 899 on mechanical button 855, electronic device 850 again displays (e.g., replaces display of payment confirmation user interface 831 with), on display 851, message conversation 859 of messaging application 857 with message participant 810. As shown in FIG. AH, (below message object 865) message conversation 859 now includes a payment message object 853 (e.g., similar to payment message object 866 described above with reference to, for example, FIG. 8Q) corresponding to the payment (of $28) transmitted to message participant 810 (in response to the message participant's request contained in the message corresponding to message object 865).

In some embodiments, as with payment message object 866, payment message object 853 includes an amount indication 859 (e.g., corresponding to amount indication 868 of payment message object 866) of the payment amount. In some embodiments, also as with payment message object 866, payment message object 853 includes a mode indication 859 (e.g., stating "PAY," corresponding to mode indication 870 of payment message object 866). In some embodiments, also as with payment message object 866, payment message object 853 includes a status indicator 859 (e.g., stating "PENDING," corresponding to status indicator 894 of text message object 866) indicating a status of the payment associated with the payment message object sent to message participant 810.

FIGS. 9A-9I are a flow diagram illustrating a method for managing peer-to-peer transfers using an electronic device in accordance with some embodiments. Method 900 is performed at a device (e.g., 100, 300, 500, 700, 800, 850) with display, one or more input devices (e.g., a touchscreen, a mic, a camera, a biometric sensor), and a wireless communication radio (e.g., a Bluetooth connection, WiFi connection, a mobile broadband connection such as a 4G LTE connection). Some operations in method 900 are, optionally, combined, the orders of some operations are, optionally, changed, and some operations are, optionally, omitted.

As described below, method 900 provides an intuitive way for managing peer-to-peer transfers. The method reduces the cognitive burden on a user for managing peer-to-peer transfers, thereby creating a more efficient human-machine interface. For battery-operated computing devices, enabling a user to manage peer-to-peer transfers faster and more efficiently conserves power and increases the time between battery charges.

The electronic device (e.g., 700, 800, 850) receives (902), via the wireless communication radio, one or more messages (e.g., a text message, an email message, an instant message) (e.g., from a remote user).

The electronic device (e.g., 700, 800, 850) displays (904) (e.g., in response to/subsequent to receiving the one or more messages), on the display (e.g., 702, 802, 851), a user interface for a messaging application (e.g., 706, 806, 857) that includes at least one of the one or more messages (e.g., 718, 720, 816, 818, 820, 865) in a message conversation (e.g., 708, 808, 859, an instant message conversation, a text message thread, an email thread) between a plurality of conversation participants (e.g., 710, 810, a user of the device and one or more other participants). Displaying the user interface for the messaging application (e.g., 706, 806, 857) and, in particular, the messages (e.g., 718, 720, 816, 818, 820, 865) in the conversation provides the user with contextual feedback regarding the sender/receiver of messages in the conversation and reduces the need for the user to investigate the sender/receiver for further messages displayed in the conversation. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. In some examples, the message conversation (e.g., 708, 808, 859) (906) involves two or more participants, other than a user of the device.

While concurrently displaying, on the display (e.g., 702, 802, 851), at least one of the one or more messages (e.g., 718, 720, 816, 818, 820, 865) in the message conversation (e.g., 708, 808, 859), the electronic device (e.g., 700, 800, 850) receives (908), from one of the participants (e.g., 710, 810), a respective message (e.g., 720, 820, 865) (from the user or one of the other participants).

In response (910) to receiving the respective message, in accordance with a determination, based on an analysis of text in the respective message (and, optionally one or more prior messages in the message conversation), that the respective message relates to a transfer of a first type of item (e.g., a sticker, a photo, or a payment object) that the messaging application is configured to transfer, the electronic device (e.g., 700, 800, 850) concurrently displays (912), on the display (e.g., 702, 802, 851), a representation of the message and a selectable indication (e.g., 722, 822, 867, underlining a portion of the text that relates to the first type of item and updating the portion of the text to be a selectable affordance, or displaying in a virtual keyboard a representation of the first type of item) that corresponds to the first type of item. Concurrently displaying the representation of the message (e.g., 720, 820, 865) and the selectable indication (e.g., 722, 822, 867) in response to receiving a message that is determined to relate to a transfer of a type of item (e.g., a photo, a payment) provides the user with feedback to indicate that the selectable indication corresponds to the received message and that activating the selectable indication will cause an operation to be performed that relates to the message. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the text in the respective message (e.g., 720, 820, 865) includes (914) a first quantity (e.g., a number of stickers, a number of photos, a payment amount, a resource amount) of content of the first type of item. In some examples, the representation of the respective message includes the first quantity.

In some examples, in accordance with the determination, based on the analysis of the text in the respective message, that the respective message relates to the transfer of the first type of item that the messaging application is configured to transfer, the electronic device (e.g., 700, 800, 850) displays (916) (e.g., at a suggestions region of a virtual keyboard (e.g., 712, 812) that includes one or more suggested quantities (e.g., 724, 824) of content of the first type of item), on the display (e.g., 702, 802), a transfer affordance (e.g., 726, 826, 828, 869) (e.g., an affordance for opening a sticker/photo gallery user interface, a payment affordance for opening a payment user interface, a resource-transfer affordance for opening a resource-transfer affordance). In some examples, the electronic device (e.g., 700, 800, 850) detects user activation of the transfer affordance (e.g., 726, 826, 828, 869), and in response to detecting the user activation of the transfer affordance (e.g., 726, 826, 828, 869), the electronic device (e.g., 700, 800, 850) displays, on the display (e.g., 702, 802, 851), the transfer user interface (e.g., 728, 840, 875) (e.g., a sticker/photo gallery for selecting stickers/photos to transfer, a numerical value selection user interface for selecting an amount of funds or an amount of resources) for initiating transfer of the first type of item to a participant in the message conversation (and ceasing to the display the virtual keyboard). Displaying the transfer affordance (e.g., 726, 826, 828, 869) when the respective message relates to a transfer of an item and displaying the transfer user interface (e.g., 728, 840, 875) when the transfer affordance (e.g., 726, 826, 828, 869) is activated avoids the need for the device to receive multiple user inputs to initiate the transfer user interface. Reducing the number of inputs needed to perform an operation enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, in accordance with a determination that the respective message includes (or corresponds to) one or more features that indicate that the transfer request is a fraudulent transfer request (e.g., a transfer request from an unknown user/account, a transfer request from an unverified source, a transfer request from a flagged user/account), the electronic device (e.g., 700, 800, 850) forgoes displaying the transfer affordance (e.g., 726, 826, 828, 869). In some examples, the electronic device further provides a prompt/notification (e.g., 726, 836, 838) indicating that the respective message is suspected to be a spam/junk message. In some examples, messages from participants not in a list of contacts (e.g., address book app) of the electronic device are flagged as relating to a fraudulent transfer request. In some examples, messages from participants in a list of contacts (e.g., a list of known spammers) of the electronic device are flagged as relating to a fraudulent transfer request. Not displaying the transfer affordance when the respective message relates to a fraudulent transfer request reduces the likelihood that the user will participant in the transfer without further investigating the transfer because the user must take additional steps to participate in the transfer, thereby enhancing the security of the technique and reducing the number of fraudulent transfers. Reducing the number of fraudulent transfers enhances the operability of the device and makes the user-device interface more secure (e.g., by reducing fraud when operating/interacting with the device).

In some examples, further in response to receiving the respective message, in accordance with a determination, based on the analysis of text in the respective message (and, optionally one or more prior messages in the message conversation), that the respective message does not relate to a transfer of the first type of item (e.g., a sticker, a photo, or a payment object), the electronic device (e.g., 700, 800, 850) displays (920), on the display (e.g., 702, 802, 851), a representation of the respective message (e.g., 720, 820, 865) (e.g., a regular text message, a regular chat bubble, a regular email message) without displaying the selectable indication (e.g., 722, 822, 867) that corresponds to the first type of item.

While the representation of the message and the selectable indication that corresponds to the first type of item are concurrently displayed on the display, the electronic device (e.g., 700, 800, 850) detects (922), via the one or more input devices, user activation (e.g., 801, 871, a touch gesture, such as a tap) of the selectable indication.

In response (924) to detecting the user activation (e.g., 801, 871) of the selectable indication, the electronic device (e.g., 700, 800, 850) displays (926), on the display (702, 802, 851), a transfer user interface (e.g., 728, 840, 875) for initiating transfer of the first type of item between participants (e.g., 810, the user) in the message conversation (e.g., a sticker sharing interface, a photo sharing interface, a payment interface, or a resource-numerical value selection user interface for receiving user adjustment of the amount of resources, such as points, credits, or funds, to be sent or requested). Displaying an indication (e.g., 722, 822, 867) that is selectable when the respective message relates to a transfer of an item and displaying the transfer user interface (e.g., 728, 840, 875) when the indication (e.g., 722, 822, 867) is selected (e.g., activated) avoids the need for the device to receive multiple user inputs to initiate the transfer user interface. Reducing the number of inputs needed to perform an operation enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the text in the respective message includes (928) a first quantity (e.g., a number of stickers, a number of photos, a payment amount, a resource amount) of content of the first type of item. In some examples, the transfer user interface (e.g., 728, 840, 875) includes an indication of the first quantity (e.g., 848, 881) of the content of the first type of item. In some examples, a quantity (e.g., a numerical value, a numerical value adjacent to a currency symbol/character) being contained in the text is used during analysis of the text in the respective message to determine that the respective message relates to a transfer of the first type of item (e.g., a sticker, a photo, or a payment object) that the messaging application is configured to transfer. Automatically displaying the quantity of the item from the message in the transfer user interface as a starting point allows the user to make adjustments (e.g., incrementing, decrementing) to the quantity derived from the message, rather than adjusting an unrelated value (e.g., value of 0), and helps to reduce the number of inputs needed to reach a desired adjusted value. Reducing the number of inputs needed to perform an operation enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the transfer user interface (e.g., 728, 840, 875) includes (930) an indication of a second quantity of content of the first type of item, wherein the second quantity is a numerical value divided (e.g., proportionally) among the two or more participants based on the first quantity. For example, if the text in the respective message includes a first quantity of the content (e.g., a payment amount) of $20, and the number of other participants in the message conversation is 5 participants, the second quantity of the content is $20/5=$4. Automatically displaying a value based on the quantity of the item from the message in the transfer user interface as a starting point allows the user to make adjustments (e.g., incrementing, decrementing) to the value, rather than adjusting an unrelated value (e.g., 0), and reduces the number of inputs needed to reach a desired adjusted value. Reducing the number of inputs needed to perform an operation enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the transfer user interface (e.g., 728, 840, 875) is concurrently displayed (932) with at least a portion of (e.g., some or all of) the representation of the respective message (e.g., 720, 820, 865) (and, optionally, with the selectable indication (e.g., 722, 822, 867) of the first resource amount). In some examples, the transfer user interface (e.g., 728, 840, 875) is displayed in a bottom-half portion of the display, and the messaging application (or the conversation of the messaging application) containing the representation of the respective message (e.g., 720, 820, 865) is displayed in a top-half portion of the display.

In some examples, the transfer user interface (e.g., 728, 840, 875) includes (934) a transfer mode affordance (e.g., a toggle for switching between a "transfer out" mode and a "requesting transfer" mode).

In some examples, the transfer user interface (e.g., 728, 840, 875) includes (936) a send affordance (e.g., 738, 847, 889) (e.g., an affordance for sending a message associated with selected stickers, an affordance for sending a message associated with selected photos, an affordance for sending a message associated with a selected amount of funds, an affordance for sending a message with a selected amount of resources).

In some examples, while displaying the transfer user interface (e.g., 728, 840, 875), the electronic device (e.g., 700, 800, 850) receives (938) user input (e.g., a swipe in an upwards direction from an area of the transfer user interface towards and out of the top edge of the transfer user interface). In response (940) to receiving the user input, the electronic device (e.g., 700, 800, 850) displays (942), on the display (e.g., 702, 802, 851), a keypad user interface (e.g., 856, 862) (e.g., containing a numbers pad), wherein the keypad user interface (e.g., 856, 862) includes one or more suggested numerical values for a quantity of the first type of item to transfer. In some examples, the keypad user interface (e.g., 856, 862) replaces display of the transfer user interface (e.g., 728, 840, 875). In some examples, the suggested numerical values are based on location (e.g., local sales tax). In some examples, the suggested numerical values are based on a number of participants in the message conversation. In some examples, the suggested numerical values are based on context (e.g., an indication that a payment will be split or multiple items need to be paid for). In some examples, the suggested numerical values include a suggestion with a tip included. In some examples, the one or more suggested numerical values are displayed as part of the keypad user interface (e.g., 856, 862) in response to receiving the respective message and in accordance with the determination, based on analysis of text in the respective message (and, optionally one or more prior messages in the message conversation), that the respective message relates to transfer of the first type of item (e.g., a sticker, a photo, or a payment object) that the messaging application is configured to transfer.

In some examples, the electronic device (e.g., 700, 800, 850) detects (944) a first activation (e.g., touchscreen tap on) of the transfer mode affordance. In response (946) to detecting the first activation of the transfer mode affordance, the electronic device designates (948) the message associated with the transfer of the first type of item as corresponding to a transmission (e.g., sending out) of the first type of item. The electronic device detects (950) a second activation of the transfer mode affordance. In response (952) to detecting the second activation of the transfer mode affordance, the electronic device designates (954) the message associated with the transfer of the first type of item as corresponding to a request for the first type of item.

In some examples, the electronic device detects (956) user activation of the send affordance (e.g., 738, 847, 889). In response (958) to detecting the user activation of the send affordance (e.g., 738, 847, 889), the electronic device (e.g., 700, 800, 850) displays (960), on the display (e.g., 702, 802, 851), a graphical representation of a message (e.g., 866, 853) (e.g., a message associated with selected stickers, a message associated with selected photos, a message associated with a selected amount of funds, a message with a selected amount of resources) associated with the transfer of the first type of item (e.g., stickers, photos, funds, resources) in the message conversation, wherein the graphical representation of the message (e.g., 866, 853) associated with the transfer of the first type of item includes an indication of a quantity of content (e.g., 868, 859) (e.g., a number of stickers, a number of photos, an amount of funds, an amount of resources) of the first type of item being transferred. Displaying a message that includes an indication of the quantity of the item transferred provides the user with visual feedback of the operation being performed and enables the user to subsequently review the message conversation to understand the amount of the item transferred and to whom it was transferred. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, in response (958) to detecting the user activation of the send affordance (e.g., 738, 847, 889) and prior to displaying, on the display (e.g., 702, 802), the graphical representation of the message (e.g., 866, 853) associated with the transfer of the first type of item in the message conversation, in accordance with a determination that the message associated with the transfer of the first type of item corresponds to a transmission of the first type of item, the electronic device (e.g., 700, 800, 850) displays (964), on the display (e.g., 702, 802, 851), an authentication user interface (e.g., 878, 831) requesting authentication information (e.g., biometric information, such as a fingerprint, facial features, iris/retina features, or input information such as a passcode or pattern). The electronic device (e.g., 700, 800, 850) receives (966), via the one or more input devices (e.g., 704, 804, 855), the authentication information. In accordance with a determination that the received authentication information corresponds to enrolled authentication information (stored on the device) for authorizing transfers, the electronic device displays (968), on the display, the graphical representation of the message (e.g., 866, 853) associated with the transfer of the first type of item in the message conversation (e.g., 708, 808, 859). In accordance with a determination that the received authentication information does not correspond to the enrolled authentication information for authorizing transfers, the electronic device forgoes displaying (970), on the display (e.g., 702, 802, 851), the graphical representation of the message (e.g., 866, 853) associated with the transfer of the first type of item in the message conversation (e.g., 708, 808, 859).

In some examples, while displaying (972), on the display (e.g., 702, 802, 851), the transfer user interface (e.g., 728, 840, 875), blocks 974-980 are performed. The electronic device (e.g., 700, 800, 850) displays (974) a numerical value (e.g., 848, 881) representing a quantity of the first type of item (e.g., "0" or a non-zero value determined based on the text analysis of the text in the respective message). The electronic device (e.g., 700, 800, 850) detects (976), via the one or more input devices, a user input (e.g., 803, 805). In accordance with a determination that the user input corresponds to a first type of user input, the electronic device increases (978) the displayed numerical value (e.g., 848, 881) by an amount corresponding to the first type of user input. In some examples, the first type of user input corresponds to a selection of a first affordance, such as a "+" affordance (e.g., 850, 885). In some examples, the first type of user input corresponds to a horizontal/vertical scrub in a first direction. In accordance with a determination that the user input corresponds to a second type of user input, the electronic device decreases (980) the displayed numerical value (e.g., 848, 881) by an amount corresponding to the second type of user input. In some examples, the second type of user input corresponds to a selection of a second affordance, such as a "−" affordance (e.g., 852, 883). In some examples, the second type of user input corresponds to a vertical/horizontal scrub in a second direction.

In some examples, the user input is a continuous input (e.g., a "touch and hold" input, a prolonged input) on an affordance for at least a predetermined time. In accordance with the determination that the user input corresponds to the first type of user input (e.g., an input on a first affordance, such as a "+" affordance), the electronic device (e.g., 700, 800, 850) increases the displayed numerical value (e.g., 848, 881) by an increasingly faster rate based on the duration (and/or characteristics intensity) of the user input. In accordance with the determination that the user input corresponds to the second type of user input (e.g., an input on a second affordance, such as a "−" affordance), the electronic device decreases the displayed numerical value (e.g., 848, 881) by an increasingly faster rate based on the duration (and/or characteristics intensity) of the user input. Thus, in some examples, the displayed numerical value (e.g., 848, 881) changes (increases or decreases) at a progressively faster rate as the user input is held for an increasingly longer duration of time. Increasing or decreasing the numerical value by an increasingly faster rate based on the duration (or intensity) of the user input provides the user with feedback about the duration (or level of intensity) that is being detected by the device based on the user's input and provides visual feedback to the user indicating that holding longer (or pressing harder will) cause the device to increase the rate of the change. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the user input (e.g., 803, 805) is a continuous input on an affordance (e.g., a "touch and hold" input, a prolonged input) having a first characteristic intensity at a first time and a second characteristic intensity (e.g., stronger than the first contact intensity) at a second time (e.g., a time later than the first time). Thus, in some examples, the user input is a contact that becomes stronger/firmer as time passes. In accordance with the determination that the user input corresponds to the first type of user input (e.g., an input on a first affordance, such as a "+" affordance (e.g., 850, 885)), increasing the displayed numerical value (e.g., 848, 881) by a first rate at the first time and by a second rate (e.g., a rate faster than the first rate) at the second time. In accordance with the determination that the user input corresponds to the second type of user input (e.g., an input on a second affordance, such as a "−" affordance (e.g., 852, 883)), decreasing the displayed numerical value (e.g., 848, 881) by the first rate at the first time and by the second rate at the second time. Thus, in some examples, the displayed numerical value changes (increases or decreases) at a progressively faster rate as a user's touch/contact input becomes increasing firmer/stronger. Increasing or decreasing the numerical value by an increasingly faster rate based on the intensity of the user input provides the user with feedback about the level of intensity that is being detected by the device based on the user's input and provides visual feedback to the user indicating that pressing harder will cause the device to increase the rate of the change. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the electronic device (e.g., 700, 800, 850) provides feedback (e.g., haptic feedback in the form of one or more tactile outputs, audio feedback) while changing (increasing or decreasing) the displayed numerical value (e.g., by the amount corresponding to the first type of user input or to the second type of user input).

In some examples, in accordance with a determination that the user input corresponds to a third type of user input (e.g., an upwards swipe on the transfer user interface), the electronic device (e.g., 700, 800, 850) replaces display of the transfer user interface (e.g., 728, 840, 875) with a numerical keypad user interface (e.g., 856, 862) (e.g., a user interface that includes an icon for each digit), wherein the numerical keypad user interface (e.g., 856, 862) includes a plurality of suggested values (for the quantity of the first type of item to transfer).

In some examples, an amount of at least one of the plurality of suggested values is determined based on stored historical use data (e.g., the most frequently used values, the most recently used value) associated with a user of the electronic device (e.g., 700, 800, 850).

In some examples, further in response to receiving the respective message, in accordance with a determination, based on the analysis of text in the respective message (and, optionally one or more prior messages in the message conversation), that the respective message does not relate to a transfer of the first type of item (e.g., a sticker, a photo, or a payment object), the electronic device displays, on the display, a representation of the respective message (e.g., a regular text message, a regular chat bubble, a regular email message) without displaying the selectable indication (e.g., 722, 822, 867) that corresponds to the first type of item.

In some examples, the selectable indication (e.g., 722, 822, 867) is a portion of the text (e.g., a name or quantity of a sticker(s), a name or quantity of a photo(s), an amount of funds, an amount of resources) in (the representation of) the respective message that relates to the first type of item that is visually distinguished (e.g., by underlining the portion of the text or displaying the portion of the text in a different color) from other text in the respective message.

In some examples, displaying, on the display (e.g., 702, 802, 851), the transfer user interface (e.g., 728, 840, 875) comprises replacing display of a virtual keyboard (e.g., 712, 812, a regular virtual keyboard of the operating system of the device) having a plurality of alphanumeric keys with the transfer user interface (e.g., 728, 840, 875).

In some examples, in accordance with a determination that a message prepared to be sent corresponds to the first type of item, the send affordance (e.g. 874) is displayed with a first visual characteristic (e.g., a color, a shade, a graphical pattern, a shape). In some examples, in accordance with a determination that the message prepared to be sent corresponds to a second type of item (e.g., a textual message) different from the first type of item, the send affordance (e.g., 874) is displayed with a second visual characteristic (e.g., a different color, a different shade, a different graphical pattern, a different shape) different from the first visual characteristic. In some examples, when a message has been prepared to be sent that includes a payment or a request for payment, the send affordance (e.g., 874) is a first color, when the message to be sent does not include a payment or a request for payment, the send affordance (e.g., 874) is a second color that is different from the first color. Visually differentiating between drafts of messages that do and drafts of messages that do not correspond to transfer of items helps the user avoid unintentionally sending messages that include transfer of items. This is particularly helpful because non-transfer messages involve limited consequences and users may send such messages with little review, while messages that correspond to transfers involve relatively higher consequences. The differentiated visual feedback prompts the user to review such messages more carefully. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the graphical representation of the message (e.g., 866, 853) associated with transfer of the first type of item is displayed with a third visual characteristic (e.g., a color, a shade, a graphical pattern, a shape) in the message conversation (e.g., 708, 808, 859), and a representation of a message (e.g., 718, 720, 816, 818, 820, 865) in the message conversation not associated with transfer of the first type of item is displayed with a fourth visual characteristic (e.g., a different color, a different shade, a different graphical pattern, a different shape) that is different from the third visual characteristic. Visually differentiating between messages that do and do not correspond to transfer of items helps the user quickly identify messages that include transfers of items. This is particularly helpful because non-transfer messages involve limited consequences and users may glance over such messages with little review, while messages that correspond to transfers involve relatively higher consequences. The differentiated visual feedback prompts the user to review such messages more carefully (and potentially take action). Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, in accordance with a determination that the respective message corresponds to a transmission, from a first participant in the message conversation, of a first quantity of content of the first type of item, the electronic device (e.g., 700, 800, 850) automatically (e.g., without checking for authentication, without requesting authentication information, without requiring user input) transfers the first quantity of content of the first type of item to the first participant (e.g., 710, 810). In some examples, in accordance with the determination that the respective message corresponds to a transmission, from the first participant in the message conversation, the electronic device displays (e.g., without checking for authentication, without requesting authentication information), on the display, a graphical representation of a message associated with transferring the first quantity of content of the first type of item to the first participant (e.g., 710, 810). Automatically accepting transfers of content when the message is a transfer of items to the user of the device allows quicker processing of the transfer and avoids the need for additional user inputs to accept the transfer. Performing an operation when a set of conditions has been met without requiring further user input enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, while displaying, on the display (e.g., 702, 802, 851), the transfer user interface (e.g., 728, 840, 875), the electronic device (e.g., 700, 800, 850) displays an affordance for changing an account (e.g., a payment account, such as a debit card account or a credit card account, a points account, a resources account) for use in the transfer of the first type of item. The electronic device detects, via the one or more input devices, user activation of the affordance for changing the account. In response to detecting the user activation of the affordance for changing the account, the electronic device displays, on the display, an account user interface including a representation of a current account and a representation of a second account, wherein the current account is currently selected for use in the transfer. The electronic device detects, via the one or more input devices, user selection of the representation of the second account. In response to detecting the user selection of the representation of the second account, the electronic device selects the second account for use in the transfer (e.g., without using the first account).

In some examples, in response to (or subsequent to) transferring the first type of item to participants in the message conversation, the electronic device (e.g., 700, 800, 850) provides (e.g., in addition to the outputted feedback described in method 1200 with reference to FIGS. 12A-12C) a dynamic graphical animation (e.g., moving cash, falling cash) within the representation of the message (or, alternatively, within the entire displayed message conversation or within the entire display). In some examples, in response to (or subsequent to) receiving the first type of item from participants in the message conversation, the electronic device (e.g., 700, 800, 850) provides (e.g., in addition to the outputted feedback described in method 1200 with reference to FIGS. 12A-12C) a dynamic graphical animation (e.g., moving cash/currency symbols, falling cash/currency symbols) within the representation of the message (or, alternatively, within the entire displayed message conversation or within the entire display).

In some examples, subsequent to initiating the transfer of the first type of item between the participants (e.g., 710, 810, the user) in the message conversation (e.g., 708, 808, 859), and in accordance with a determination that the transfer of the first type of item has been accepted by a participant, a dynamic visual, audio, and/or sensory feedback is applied to the representation of the message and/or the selectable indication that corresponds to the first type of item by the device (e.g., as described below in method 1200 with reference to FIGS. 12A-12C). In some examples, the dynamic feedback is a visual feedback where the font changes with the orientation of the device (e.g., as described below in method 1200 with reference to FIGS. 12A-12C). In some examples, the dynamic feedback is a visual feedback where the font changes with the movement of the user's face relative to the device (e.g., as described below in method 1200 with reference to FIGS. 12A-12C). In some examples, the dynamic feedback is a sensory feedback, such as a haptic feedback (e.g., as described below in method 1200 with reference to FIGS. 12A-12C).

Note that details of the processes described above with respect to method 900 (e.g., FIGS. 9A-9I) are also applicable in an analogous manner to the methods described below. For example, method 900 optionally includes one or more of the characteristics of the various methods described below with reference to methods 1200, 1500, 1800, 2100, 2400, 2700, 3000, and 3400. For example, the outputting of dynamic feedback described in method 1200 can be applied with respect to the graphical representation of a message (e.g., 866, 853). For another example, the different visual appearances of a message object based on whether the message object corresponds to a transmission message or a request message, as described in method 1500, can be applied with respect to the graphical representation of a message (e.g., 866, 853). For another example, a request for activating an account that is authorized to obtain one or items (e.g., a sticker, a photo, resources, a payment), as described in method 1800, can be applied with respect to the graphical representation of a message (e.g., 866, 853) when retrieving one or more items (e.g., a sticker, a photo, a payment) associated with the message. For another example, displaying representations of a first account and a second account, as described in method 2100, can also be displayed on the authentication user interface (e.g., 878, 831). For another example, automatically proceeding with a transfer, as described in method 2400, without any user input can be used to accept a transfer corresponding to the graphical representation of a message (e.g., 866, 853). For another example, the plurality of items including information from messages in a message conversation, as described in method 2700, can be displayed in response to user selection of the graphical representation of a message (e.g., 866, 853). For another example, an utterance can be used, as described in method 3000, to create the graphical representation of a message (e.g., 866, 853). For another example, a visual effect (e.g., a coloring effect, a geometric alteration effect) can be applied, as described in method 3400, to an element (e.g., 868, 853) of a graphical representation of a message (e.g., 866, 853) when a transfer (e.g., of a resource, of a file, of a payment) associated with the message is completed. For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 9A-9I are, optionally, implemented by components depicted in FIGS. 1A-1B. For example, receiving operation 902, displaying operation 904, receiving operation 908, displaying operation 912, detecting operation 922, and displaying operation 926 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 10A-10D illustrate example user interfaces for managing peer-to-peer transfers, in accordance with some embodiments. As described in greater detail below, the non-limiting example embodiment of the user interfaces illustrated in FIGS. 10A-10D relate to the non-limited example embodiment of the user interfaces illustrated in FIGS. 11A-11V, which in turn are used to illustrate the processes described below, including the processes in FIGS. 12A-12C.

Figure 10A:
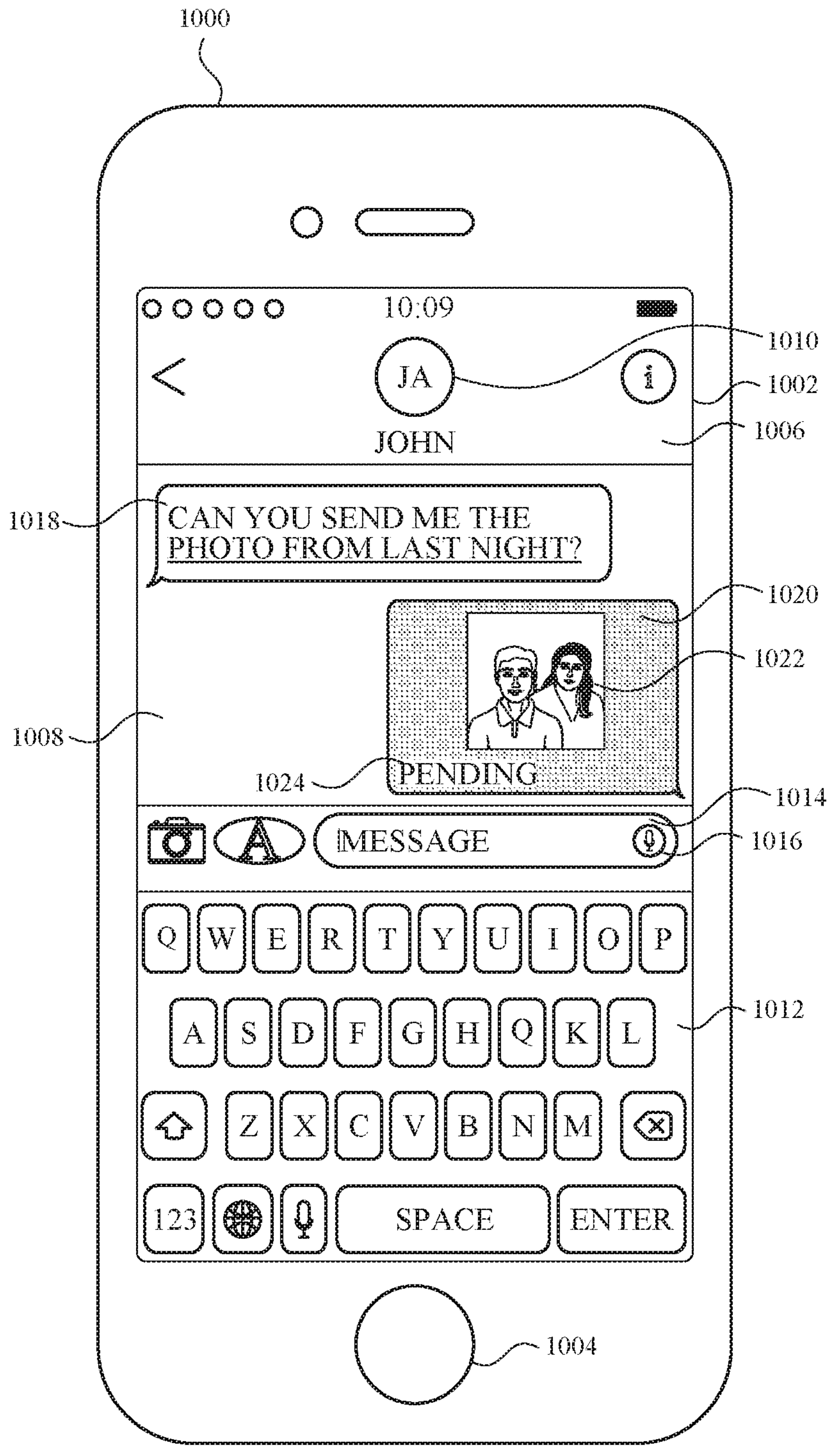
FIGS. 10A-10D illustrate example user interfaces for providing feedback to message objects corresponding to completed file transfers, in accordance with some embodiments.

FIG. 10A illustrates an electronic device 1000 (e.g., portable multifunction device 100, device 300, or device 500). In the non-limiting example embodiment illustrated in FIGS. 10A-10D, electronic device 1000 is a smartphone. In other embodiments, electronic device 1000 can be a different type of electronic device, such as a wearable device (e.g., a smartwatch). Electronic device 1000 has a display 1002 and one or more sensor devices (e.g., an accelerometer, one or more cameras). In some embodiments, optionally, electronic device 1000 also has one or more input devices (e.g., a touchscreen of display 1002, a mechanical button 1004, a mic).

In FIG. 10A, electronic device 1000 displays, on display 1002, a message conversation 1008 of a messaging application 1006 between a user of the device (e.g., "Kate Appleseed") and a message participant 1010 (e.g., "John Appleseed"). In some embodiments, message participant 1010 is a contact stored on the device. In some embodiments, message participant 1010 is a contact of a contact list associated with the user account logged onto the device. In some embodiments, message participant 1010 is a contact included in a trusted contacts list associated with the user account logged onto the device.

In some embodiments, electronic device 1000 also displays, on display 1002, a virtual keyboard 1012 (e.g., an alphanumeric keyboard for typing a message) and a compose bar 1014 displaying the text of a message as a message is typed using virtual keyboard 1012. In some embodiments, a mechanical keyboard can be used in addition to or alternatively to virtual keyboard 1012 to type a message. In some embodiments, compose bar 1014 can expand (e.g., expand upwards) to accommodate a longer message or message object (e.g., an image, an emoticon, a special type of message object, such as a payment object). In some embodiments, compose bar 1014 includes a mic button 1016 which, when activated, enables the user to record a message using voice input.

As shown in FIG. 10A, message conversation 1008 includes a message object 1018. Message object 1018 corresponds to a message sent by message participant 1010 to the user of electronic device 1000. In message object 1018, the message participant states to the user: "Can you send me the photo from last night?" In other words, message participant 1010 is requesting to the user that the user send to the message participant, via the messaging application, a photo stored on electronic device 1000 (or accessible by the device) taken last night.

As shown in FIG. 10A, message conversation 1008 also includes a pending transfer message object 1020. Pending transfer message object 1020 corresponds to a pending transfer of a photo (from last night) sent by the user to message participant 1010 in response to the message participant's request in message object 1018. In some embodiments, instead of a photo, the transfer can be a different type of file, such as a video file, an audio file, or a document. In some embodiments, the transfer can be of a plurality of files. In some embodiments, pending transfer message object 1020 includes a mini-file object 1022 (e.g., a (selectable) thumbnail, a (selectable) preview image, a link) corresponding to the photo (from last night) sent by the user to message participant 1010 via pending transfer message object 1020. In some embodiments, pending transfer message object 1020 also includes a status indicator 1024 (e.g., stating "PENDING") that informs the user of a status of the transfer associated with the message object. In some embodiments, a transfer is "pending" when an intended recipient of the message corresponding to the transfer, which in this example is message participant 1010, has not yet accepted (e.g., viewed, downloaded) the file (e.g., photo, video file, audio file, document) corresponding to the transfer message object. In some embodiments, the file (e.g., the photo corresponding to preview image 1022) corresponding to the transfer is selected using the process described above with respect to FIGS. 7A-7E.

Figure 10B:
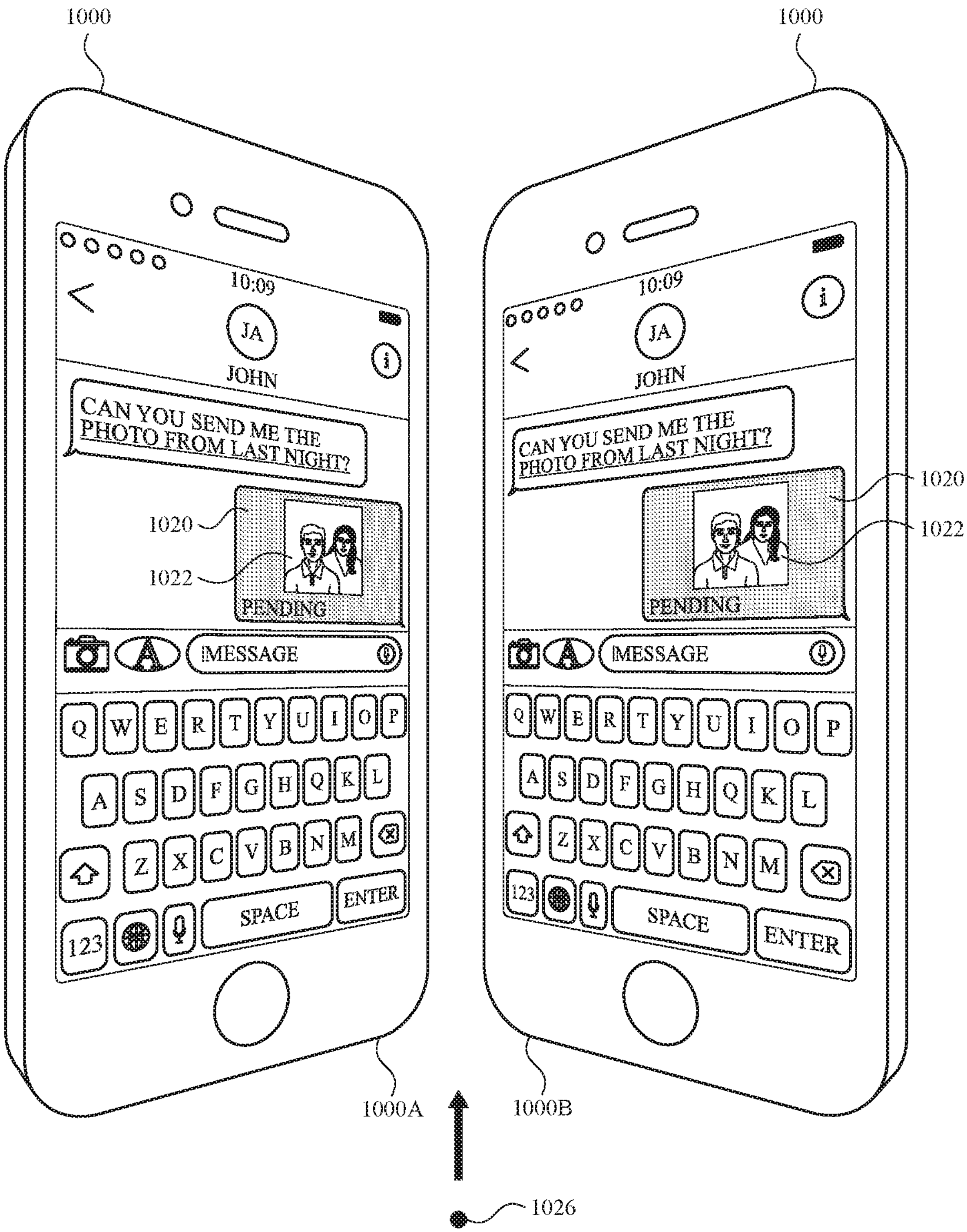

FIG. 10B shows electronic device 1000, while displaying the display (including pending transfer message object 1020 within message conversation 1008) shown in FIG. 10A, being viewed at two different angles (angle 1000A and angle 1000B) relative to a reference point 1026 that is a face of a viewer (e.g., the user) of the device in a field of view of a sensor (e.g., a camera) of the device. Alternatively, in some embodiments, the reference point is a static point external to the device, such as a location on the ground or floor. As shown in FIG. 10B, from the perspective of reference point 1026 of a viewer (e.g., the user) viewing display 1002 of the device at either angle 1000A or at angle 1000B, pending transfer message object 1020 appears the same at either angle. In other words, whether a viewer (e.g., the user) views display 1002 of the device at angle 1000A, or whether a viewer (e.g., the user) views display 1002 of the device at angle 1000B, or whether a viewer (e.g., the user) views display 1002 of the device from straight on (e.g., such that the display is not tilted at an angle relative to the face of the viewer, as shown in FIG. 10A), there is no change in how the pending transfer message object is perceived by the user, for there is no change in how the pending transfer message object is displayed on display 1002 by the device. Thus, in FIG. 10B (in contrast to FIG. OD, described below), the device does not provide any feedback (e.g., visual feedback, audio feedback) associated with pending transfer message object 1020 to a viewer (e.g., the user) of the device in response to a change in orientation (e.g., change in movement, change in viewing angle) of the device relative to a reference point (e.g., the viewer's face, a static point external to the device).

Figure 10C:
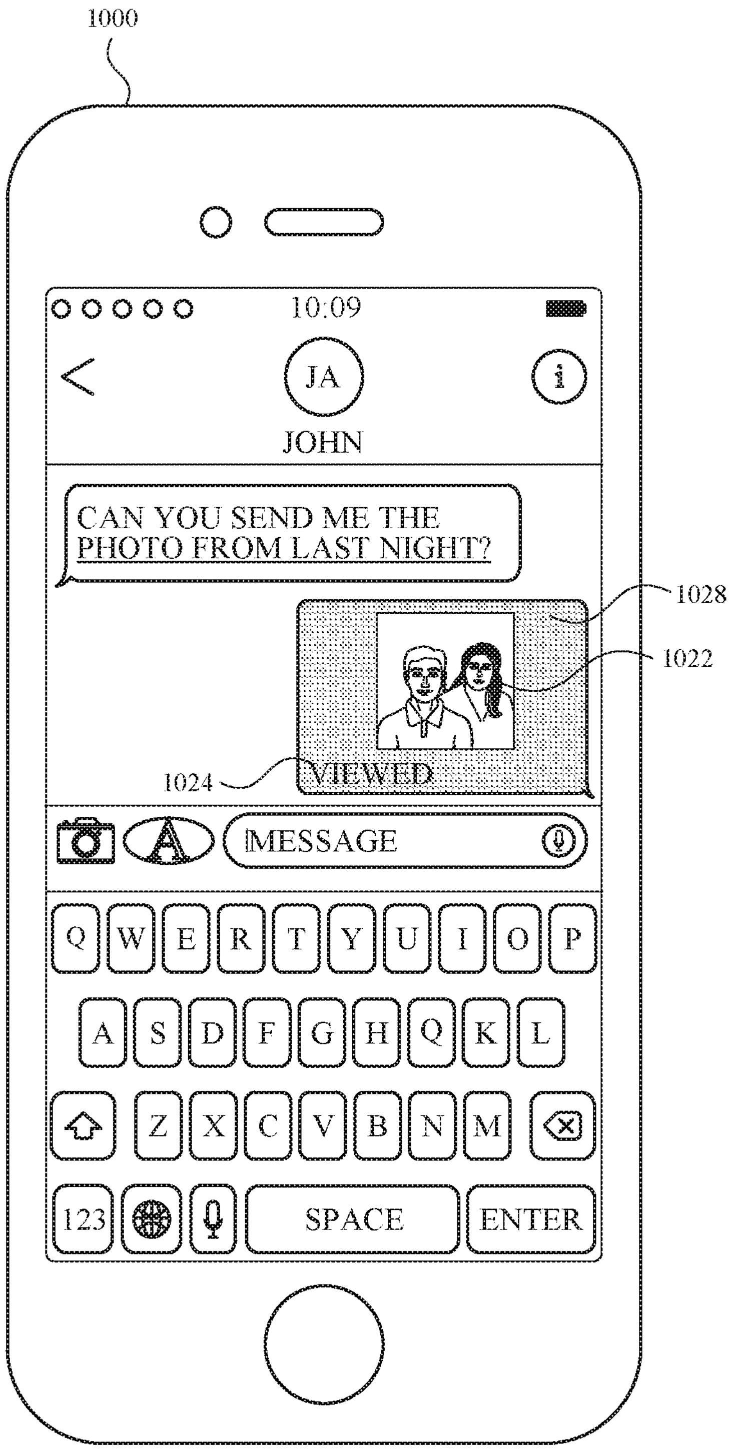

In FIG. 10C, the photo corresponding to mini-file object 1022 has been viewed (or downloaded) by message participant 1010. Thus, FIG. 10C shows, in place of pending transfer message object 1020, a completed transfer message object 1028. A transfer message object is a completed transfer message object (as opposed to a pending transfer message object) when a file (e.g., the photo corresponding to mini-file object 1022) associated with the transfer corresponding to the transfer message object has been viewed (or downloaded) by the intended recipient (e.g., message participant 1010) of the transfer. In some embodiments, status indicator 1024 is updated (e.g., to state "VIEWED" instead of "PENDING") to inform the user that the file (e.g., the photo corresponding to mini-file object 1022) corresponding to the transfer associated with the transfer message object has been viewed (or downloaded) by the intended recipient.

In some embodiments, electronic device 1000 generates a feedback (e.g., a visual effect, a sensory feedback, such as a haptic effect, an audio feedback) associated with a completed transfer message object, which indicates to the user that the transfer of the file corresponding to message object has been accepted (e.g., viewed, downloaded). For example, once the transfer of the file corresponding to the transfer message object has been completed, a visual effect is applied to mini-file object 1022 of completed transfer message object 1028. In some embodiments, the visual effect applied to the mini-file object is a bolding (or thickening) of a border of the mini-file object. In some embodiments, the visual effect applied to the mini-file object is a black outline (e.g., a shadow) applied to a border of the mini-file object. In some embodiments, the visual effect applied to the mini-file object is a change color of at least a portion of the mini-file object.

In some embodiments, electronic device 1000 generates feedback (e.g., a visual feedback, a haptic feedback, an audio feedback) that is associated with the completed transfer message object or associated with an element (e.g., mini-file object 1022) of the completed transfer message object. In some embodiments, the feedback is a dynamic visual feedback causing display of the completed transfer message object (e.g., completed transfer message object 1028) or an element (e.g., mini-file object 1022) of the transfer message object to change as changes in the orientation of the device relative to reference point 1026 are detected. In some embodiments, changes in orientation of the device are detected via the one or more sensors of the device (e.g., an accelerometer, a camera). For example, the device detects movement, and thus changes in its orientation, via an accelerometer. For another example, the device detects changes in its position relative to the face of a viewer (e.g., the user) via a camera. In some embodiments, the dynamic feedback (e.g., visual, haptic, and/or audio feedback) gradually changes as the orientation of the device and/or the position of the device relative to the face of the user changes (e.g., the amount and/or direction of the change in the dynamic feedback is determined by an amount and/or direction of the change in the orientation of the device and/or the position of the device relative to the face of the user).

For example, in FIG. 10D, the dynamic visual feedback is a 3D effect that provides the user with the visual effect that mini-file object 1022 of the completed transfer message object 1028 is three-dimensional (e.g., similar to the one or more types of visual feedback applied to amount object 3324 described below with reference to, for example, FIGS. 33D-33J). Thus, in FIG. 10D, based on reference point 1026, mini-file object 1022 of completed transfer message object 1028 looks visually different (e.g., the mini-file object that corresponds to a photo appears to be a dynamic cube, with the photo displayed on one side of the cube, instead of a two dimensional photo) from angle 1000A of the device and from angle 1000B of the device and, optionally, both the view of mini-file object 1022 of completed transfer message object 1028 from angle 1000A and angle 1000B look different from the appearance of the mini-file object of the completed transfer message object from straight on (e.g., such that the display is not tilted at an angle relative to the reference point, as shown in FIG. 10C). In some embodiments, the dynamic visual feedback is a changing color applied to at least a portion of the mini-file object or to at least a portion of the completed transfer message object. In some embodiments, the dynamic visual feedback is a changing background applied to the completed transfer message object. In some embodiments, the dynamic visual feedback is a moving of one or more elements, such as mini-file object 1022, of the completed transfer message object.

Figure 10D:
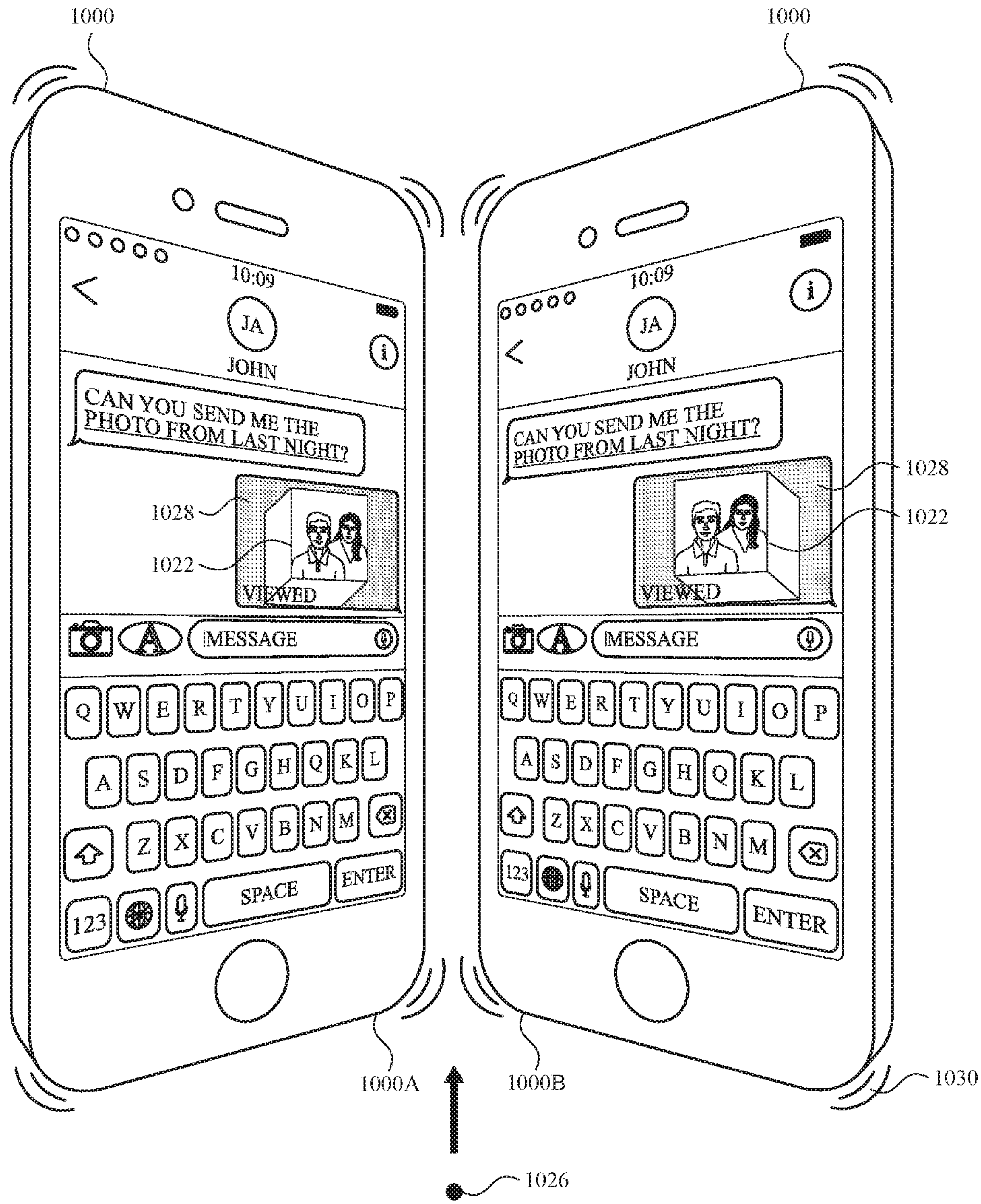

In some embodiments, as also shown in FIG. 10D, in addition to, or instead of, generating a dynamic visual feedback, the device generates a dynamic haptic feedback 1030 (e.g., similar to the generated tactile output 3336 described below with reference to, for example, FIGS. 33F-33H). In some embodiments, the dynamic haptic feedback is a dynamically strengthening and weakening tactile output caused by the device. In some embodiments, the dynamic haptic feedback is a tactile output with changing tactile output patterns caused by the device. In some embodiments, the strength or frequency of the tactile output changes as the device detects changes in the orientation of the device relative to the reference point (e.g., reference point 1026).

In some embodiments, the generated feedback (e.g., visual feedback, haptic feedback, audio feedback) is caused (e.g., only) by an operating system program of the device and non-operating system programs of the device are not enabled to cause the feedback.

As mentioned above, the non-limiting example embodiment of the user interfaces illustrated in FIGS. 10A-10D described above relate to the non-limited example embodiment of the user interfaces illustrated in FIGS. 11A-11V described below. Therefore, it is to be understood that the processes described above with respect to the example user interfaces illustrated in FIGS. 10A-10D and the processes described below with respect to the example user interfaces illustrated in FIGS. 11A-11V are largely analogous processes that similarly involve initiating and managing transfers using an electronic device (e.g., 100, 300, 500, 1000, or 1100).

FIGS. 11A-11V illustrate example user interfaces for peer-to-peer transfers, in accordance with some embodiments. The user interfaces in these figures are used to illustrate the processes described below, including the processes in FIGS. 12A-12C.

FIG. 11A illustrates an electronic device 1100 (e.g., portable multifunction device 100, device 300, or device 500). In the non-limiting example embodiment illustrated in FIGS. 11A-11V, electronic device 1100 is a smartphone. In other embodiments, electronic device 1100 can be a different type of electronic device, such as a wearable device (e.g., a smartwatch). Electronic device 1100 has a display 1102 and one or more sensor devices (e.g., an accelerometer, one or more cameras). In some embodiments, optionally, electronic device 1100 also has one or more input devices (e.g., a mechanical button 1104).

In FIG. 11A, electronic device 1100 displays, on display 1102, a message conversation 1108 of a messaging application 1106 between a user of the device (e.g., "Kate Appleseed") and a message participant 1110 (e.g., "John Appleseed"). In some embodiments, message participant 1110 is a contact stored on the device. In some embodiments, message participant 1110 is a contact of a contact list associated with the user account logged onto the device. In some embodiments, message participant 1110 is a contact included in a trusted contacts list associated with the user account logged onto the device.

In some embodiments, electronic device 1100 also displays, on display 1102, a virtual keyboard 1112 (e.g., an alphanumeric keyboard for typing a message) and a compose bar 1114 displaying the text of a message as a message is typed using virtual keyboard 1112. In some embodiments, a mechanical keyboard can be used in addition to or alternatively to virtual keyboard 1112 to type a message. In some embodiments, compose bar 1114 can expand (e.g., expand upwards) to accommodate a longer message or message object (e.g., an image, an emoticon, a special type of message object, such as a payment object). In some embodiments, compose bar 1114 includes a mic button 1114A which, when activated, enables the user to record a message using voice input.

As shown in FIG. 11A, message conversation 1108 includes a message object 1116 and a payment message object 1118. Message object 1116 corresponds to a message sent by the user of electronic device 1100 to message participant 1110. In message object 1116, the user states to message participant: "Dinner was $28." In other words, the user is informing message participant 1110 that the user is owed $28 by message participant 1110 (and thus requesting that $28 be paid by message participant 1110 to the user). Payment message object 1118 corresponds to a payment sent by message participant 1110 to the user for $28 (responding to the user's request for payment of $28). In addition, an accompanying note message object 1126 corresponding to an accompanying note (e.g., "for dinner") sent together with the message corresponding to payment message object 1118 is also displayed.

As shown, payment message object 1118 also includes a mode indication 1120 (e.g., stating "PAY") that the payment message object corresponds to a payment made by message participant 1110 to the user via an operating-system controlled payment transfer application (and not by a third-party application). Payment message object 1118 also includes an amount indication 1122 (e.g., "$28") of the amount of the payment sent by message participant 1110 to the user. Alternatively, if payment message object 1118 corresponded to a request for payment (instead of a sent payment) by message participant 1110 to the user, amount indication 1122 would indicate an amount of the requested payment and, optionally, further indication that the amount is being requested (e.g., "$28 requested").

Payment message object 1118 also includes an accept button 1124 for accepting the payment (or, alternatively, agreeing to send the payment made by a payment request) corresponding to received message object 1118 in the amount shown in amount indication 1122. In some embodiments, payment message object 1118 also includes an accompanying note message object 1126. In FIG. 11A, message participant 1110 informs the user, via note message object 1126, that the payment corresponding to payment object 1118 is "For dinner" (that was requested by the user via message object 1116).

Figure 11B:
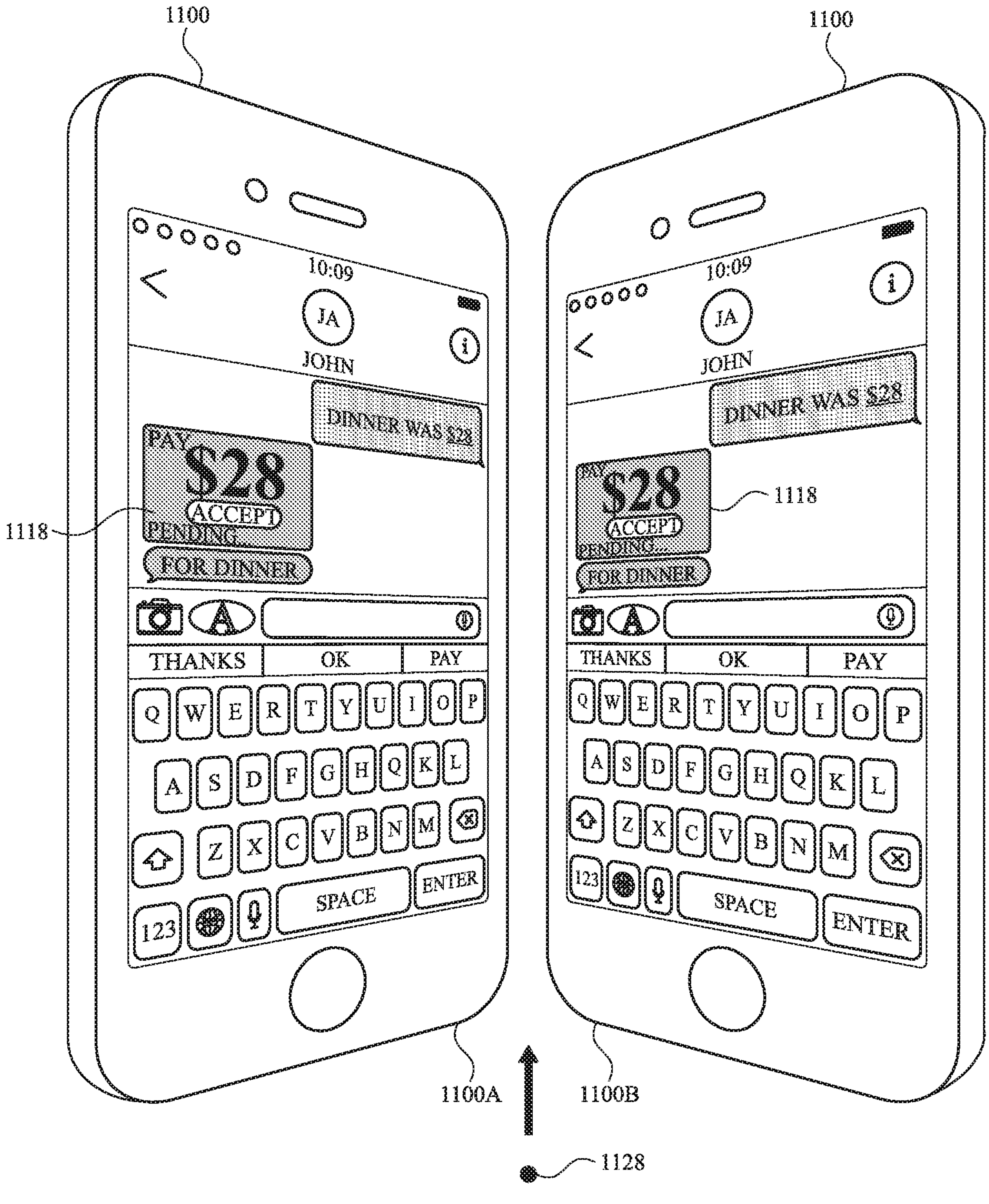

FIG. 11B shows electronic device 1100, while displaying the display (including payment message object 1118 within message conversation 1108) shown in FIG. 11A, being viewed at two different angles (angle 1100A and angle 1100B) relative to a reference point 1128 that is a face of a viewer (e.g., the user) of the device in a field of view of a sensor (e.g., a camera) of the device. Alternatively, in some embodiments, the reference point is a static point external to the device, such as a location on the ground or floor. As shown in FIG. 11B, from the perspective of reference point 1128 of a viewer (e.g., the user) viewing display 1102 of the device at either angle 1100A or at angle 1100B, payment message object 1118 appears the same at either angle. In other words, whether a viewer (e.g., the user) views display 1102 of the device at angle 1100A, or whether a viewer (e.g., the user) views display 1102 of the device at angle 1100B, or whether a viewer (e.g., the user) views display 1102 of the device from straight on (e.g., such that the display is not tilted at an angle relative to the face of the viewer, as shown in FIG. 11A) there is no change in how the payment message object is perceived by the user, for there is no change in how the payment message object is displayed on display 1102 by the device. Thus, in FIG. 11B (in contrast to FIG. 11E, described below), the device does not provide any feedback associated with payment message object 1118 to a viewer (e.g., the user) of the device in response to a change in orientation (e.g., change in movement, change in viewing angle) of the device relative to the viewer's (e.g., the user's) face.

Figure 11C:
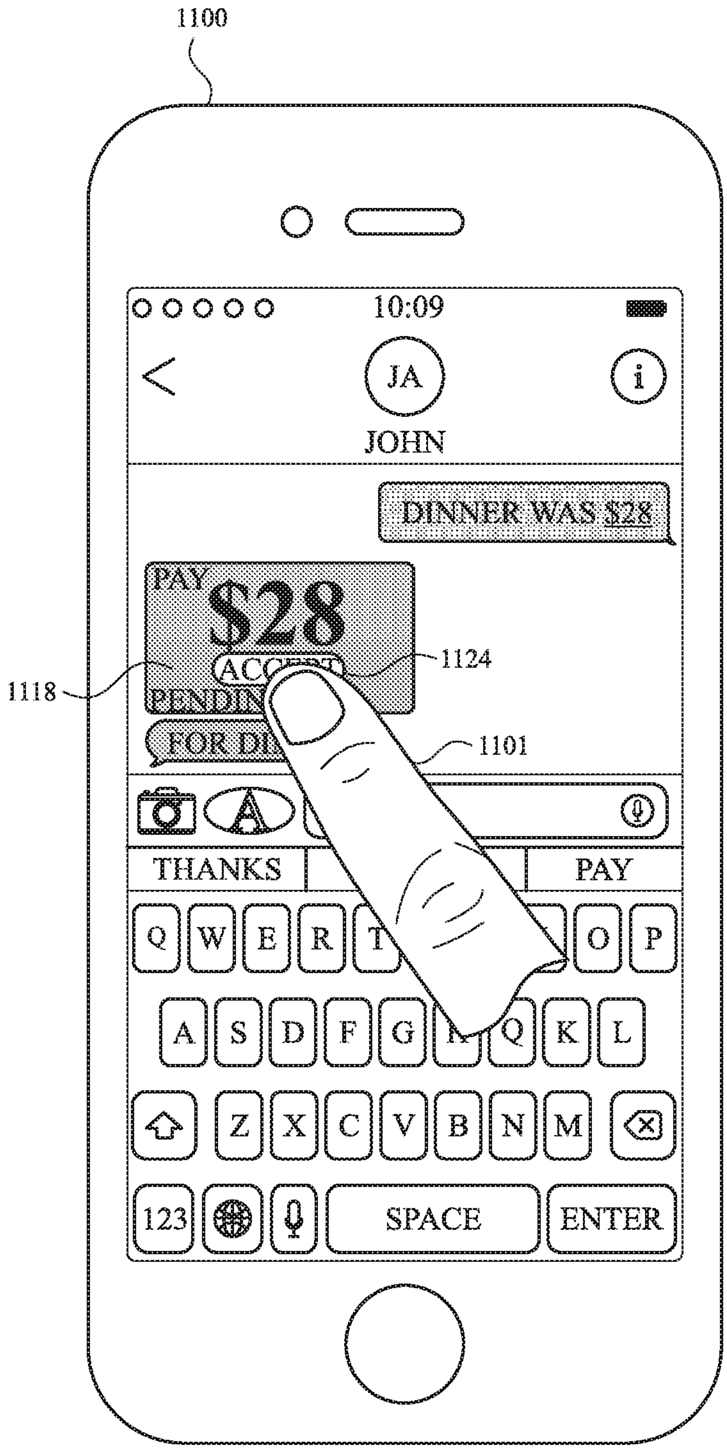

In FIG. 11C, while displaying payment message object 1118 within message conversation 1108, electronic device 1100 detects user input on accept button 1124 of the payment message object. For example, as shown in FIG. 11C, the user input is a tap gesture 1101 on accept button 1124 of payment message object 1118.

Figure 11D:
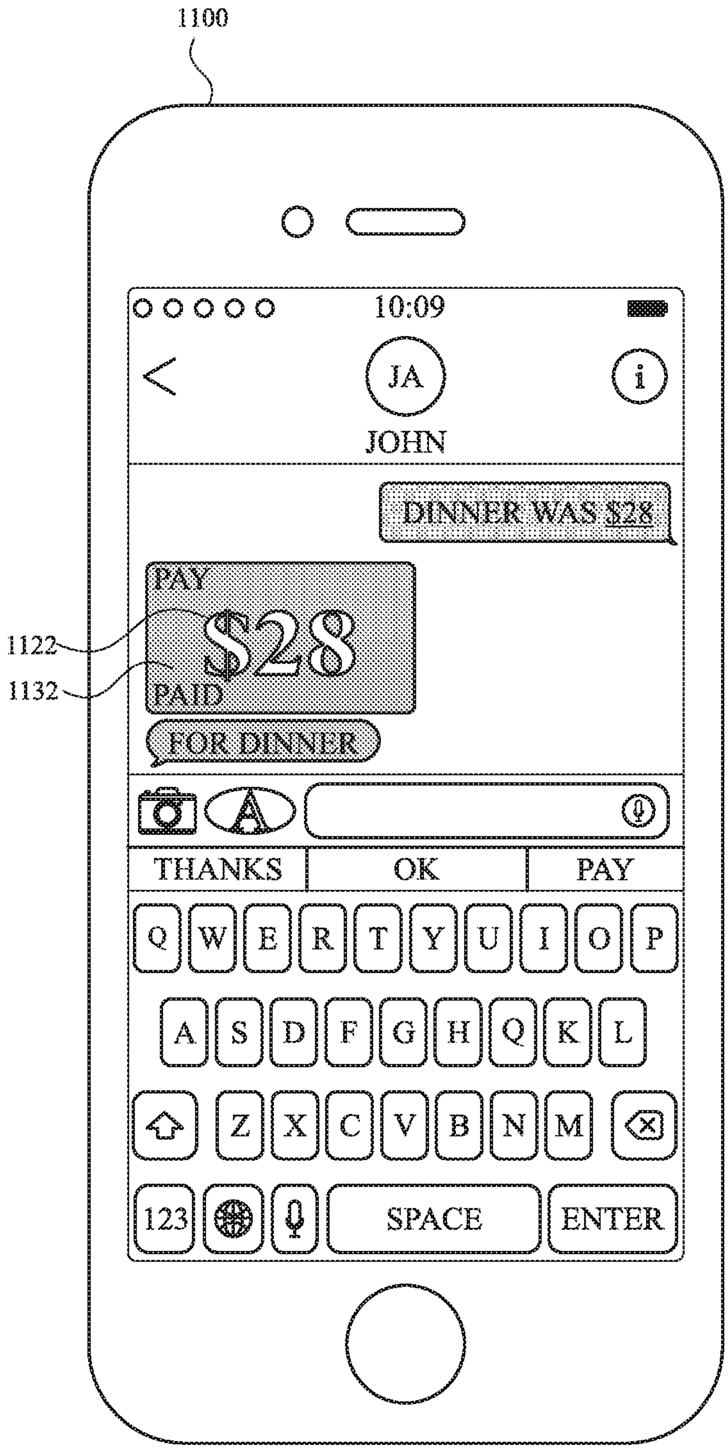

FIG. 11D shows, in place of (non-completed) payment message object 1118, a completed payment message object 1132. Specifically, as shown in FIG. 11D, in response to detecting tap gesture 1101 on payment message object 1118 (thereby accepting the payment from message participant 1110), accept button 1124 ceases to be displayed on the payment message object. As also shown in FIG. 11D, in response to detecting tap gesture 1101 on payment message object 1118 (thereby accepting the payment from message participant 1110), electronic device 1100 generates a feedback (e.g., a visual effect, a sensory feedback, such as a haptic effect, an audio feedback) indicating to the user that the payment corresponding to payment message object 1118 has been accepted and that payment message object 1118, now completed payment message object 1132, corresponds to a payment that has already been accepted.

For example, as shown in FIG. 11D, in response to detecting tap gesture 1101 on payment message object 1118, amount indication 1122 (e.g., "$28") of completed payment message object 1132 is visually changed. In some embodiments, the visual change to amount indication 1122 is a bolding (or thickening) of the font of the displayed amount (e.g., "$28"). In some embodiments, the visual change to amount indication 1122 includes a black outline (e.g., a shadow) applied to the font of the displayed amount (e.g., "$28"). In some embodiments, the visual change to amount indication 1122 is a change in color (e.g., from black to white) of the displayed amount (e.g., "$28").

In some embodiments, in response to detecting tap gesture 1101 on payment message object, electronic device 1100 generates feedback (e.g., a visual feedback, a haptic feedback, an audio feedback) associated with the payment message object. In some embodiments, the feedback is a dynamic visual feedback causing display of the payment message object (e.g., completed payment message object 1132) to change as changes in the orientation of the device relative to reference point 1128 are detected. In some embodiments, changes in orientation of the device are detected via the one or more sensors of the device (e.g., an accelerometer, a camera). For example, the device detects movement, and thus changes in its orientation, via an accelerometer. For another example, the device detects changes in its position relative to the face of a viewer (e.g., the user) via a camera. In some embodiments, the dynamic feedback (e.g., visual, haptic, and/or audio feedback) gradually changes as the orientation of the device and/or the position of the device relative to the face of the user changes (e.g., the amount and/or direction of the change in the dynamic feedback is determined by an amount and/or direction of the change in the orientation of the device and/or the position of the device relative to the face of the user).

For example, in FIG. 11E, the dynamic visual feedback is a 3D effect (e.g., the simulated depth effect 3325 described below with reference to FIGS. 33D-33J) that provides the user with the visual effect that amount indication 1122 of the payment message object is three-dimensional (e.g., similar to the one or more types of visual feedback applied to amount object 3324 described below with reference to, for example, FIGS. 33D-33J). Thus, in FIG. 11E, based on reference point 1128 of the user, amount indication 1122 of payment message object 1118 looks visually different (e.g., shadows behind the displayed numbers of amount indication 1122 appear different) from angle 1100A of the device and from angle 1100 of the device and, optionally, both the view of payment message object 1118 from angle 1100A and angle 1100B look different from the appearance of the payment message object 1118 from straight on (e.g., such that the display is not tilted at an angle relative to the face of the viewer, as shown in FIG. 11D). In some embodiments, the dynamic visual feedback is a changing color applied to the amount indication (or to the entire payment message object). In some embodiments, the dynamic visual feedback is a changing background applied to the payment message object. In some embodiments, the dynamic visual feedback is a moving of one or more elements, such as amount indication 1122 or mode indication 1120, of the payment message object.

Figure 11E:
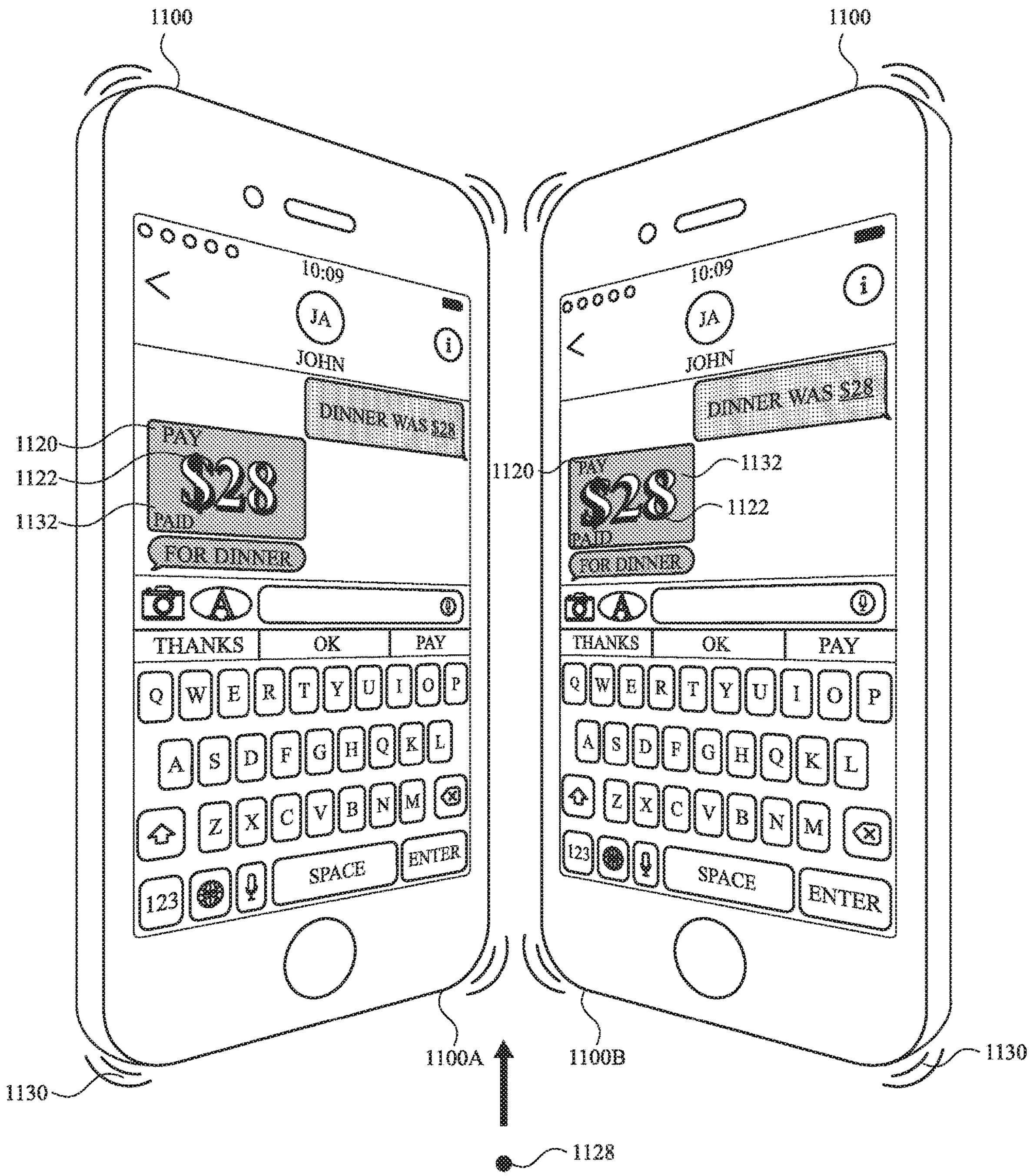

In some embodiments, as also shown in FIG. 11E, in addition to, or instead of, generating a dynamic visual feedback, the device generates a dynamic haptic feedback 1130 (e.g., similar to the generated tactile output 3336 described below with reference to, for example, FIGS. 33F and 33H). In some embodiments, the dynamic haptic feedback is a dynamically strengthening and weakening tactile output caused by the device. In some embodiments, the dynamic haptic feedback is a tactile output with changing tactile output patterns caused by the device. In some embodiments, the strength or frequency of the tactile output changes as the device detects changes in the orientation of the device relative to the reference point (e.g., reference point 1128).

In some embodiments, the generated feedback (e.g., visual feedback, haptic feedback, audio feedback) is caused (e.g., only) by an operating system program of the device and non-operating system programs of the device are not enabled to cause the feedback.

Figure 11F:
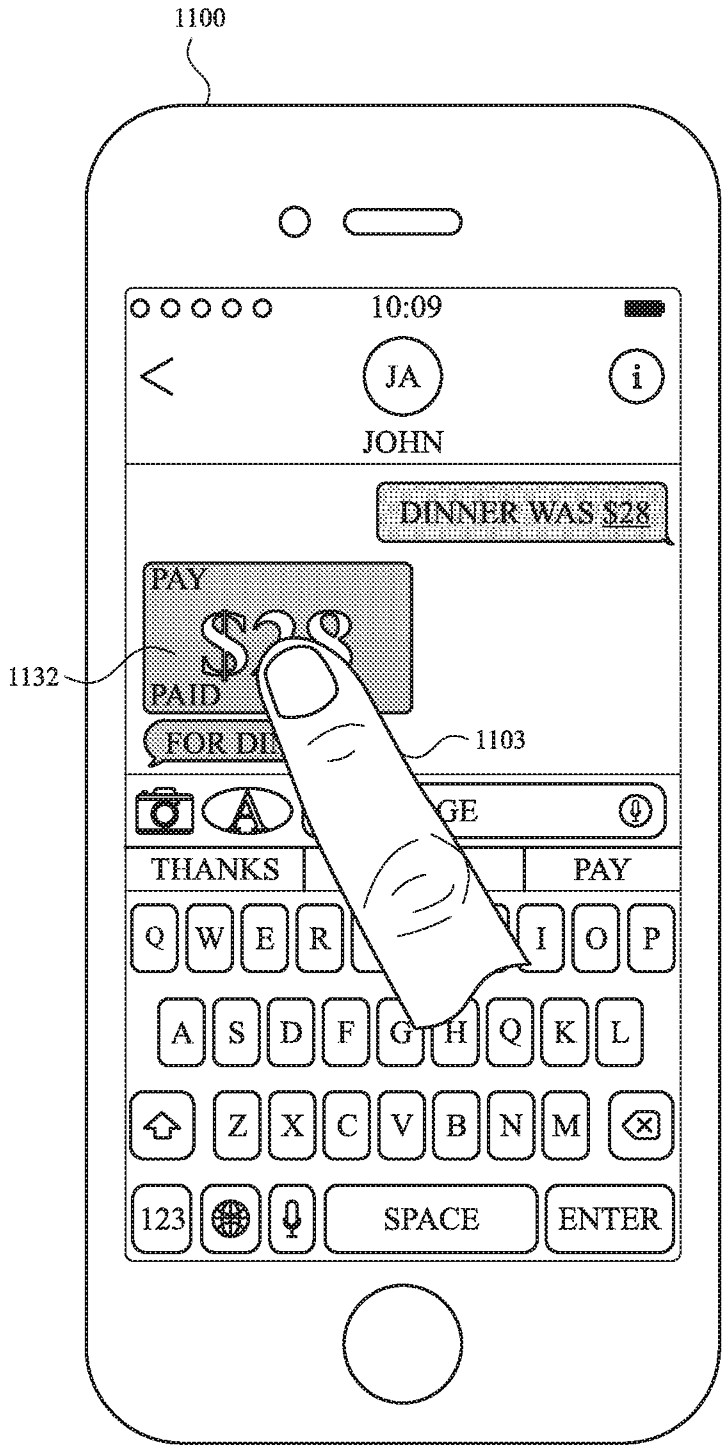

In FIG. 11F, while displaying completed payment message object 1132 within message conversation 1108, electronic device 1100 detects a user input on the completed payment message object. For example, as shown in FIG. 11F, the user input is a tap gesture 1103 on completed payment message object 1132.

Figure 11G:
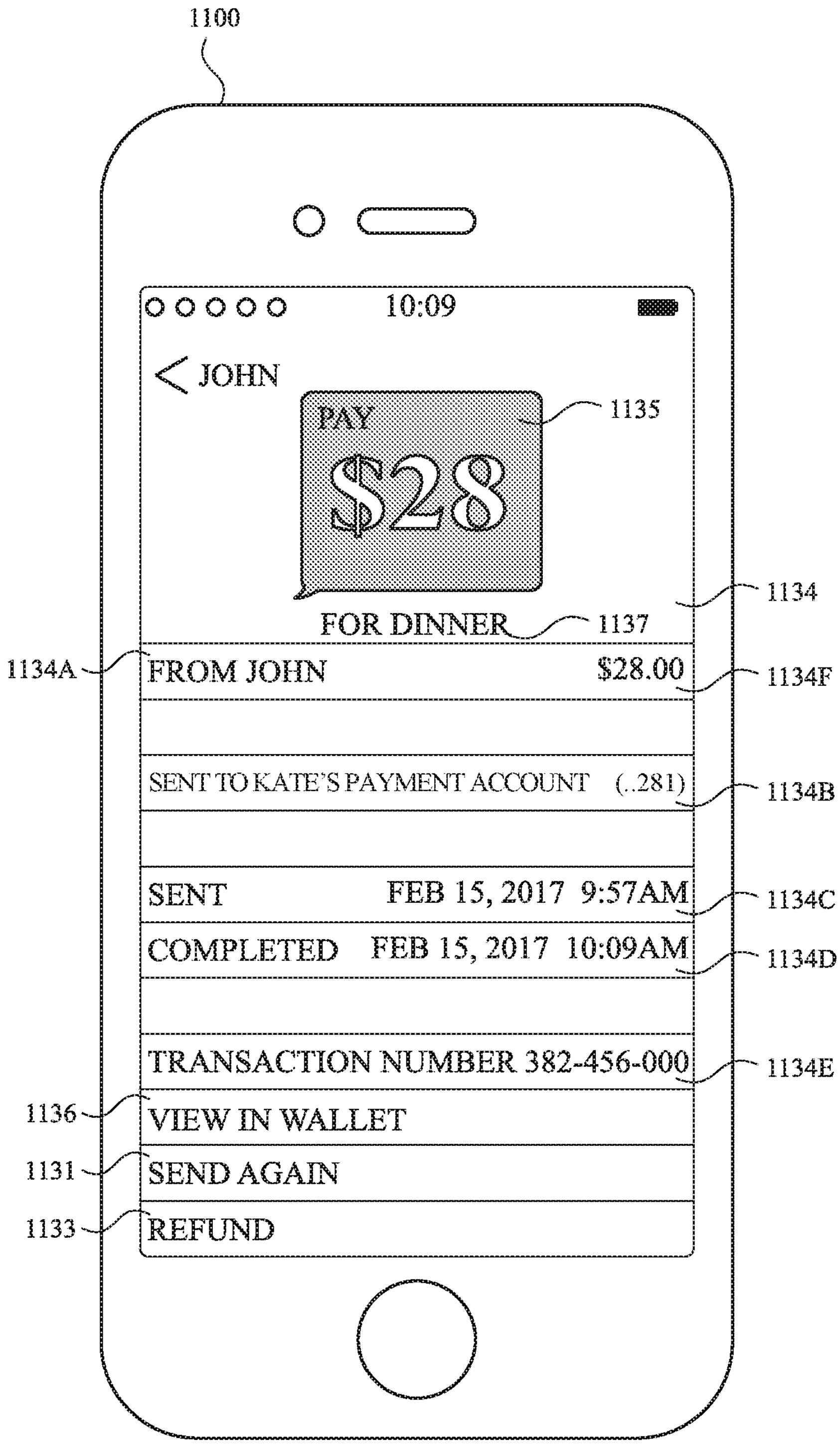

In FIG. 11G, in response to detecting tap gesture 1103, electronic device 1100 displays (e.g., replaces display of messaging application 1106 and virtual keyboard 1112 with) a transaction detail user interface 1134 that includes a graphical representation 1135 (e.g., a copy) of the completed payment message object (e.g., completed payment message object 1132), a textual indication 1137 of a note accompanying the payment (e.g., accompanying note message object 1126 stating "For dinner"), plurality of details relating to the selected (e.g., the payment corresponding to completed payment message object 1132) transaction. In some embodiments, transaction detail user interface 1134 includes an indication 1134A of the payment (or, alternatively, payment request) sender/recipient. In some embodiments, transaction detail user interface 1134 includes an indication 1134B of the payment account or the payment receipt account. In some embodiments, transaction detail user interface 1134 includes an indication 1134C of the date and time of the payment (or, alternately, of the payment request). In some embodiments, transaction detail user interface 1134 includes an indication 1134D of the date and time of competed transaction. In some embodiments, transaction detail user interface 1134 includes an indication 1134E of a transaction number. In some embodiments, transaction detail user interface 1134 includes an indication 1134F of the payment (or, alternatively, payment request) amount.

As shown, transaction detail user interface 1134 includes a wallet button 1136 (e.g., a "View in Wallet" selectable indication) for viewing the transaction details in an electronic wallet application of electronic device 1100. In some embodiments, transaction detail user interface 1134 includes a send again button 1131 (e.g., if the payment associated payment message object 1135 was a payment made by the user to a message participant) for creating a new payment message object corresponding to a payment in the same amount as the currently-viewed transaction intended for the same recipient as the currently-viewed transaction. Thus, send again button 1131 provides the user with a quick and easy option to perform another payment in the same amount (e.g., "$28") to the same recipient (e.g., message participant 1110) via the transaction detail user interface of the last transaction with that recipient. In some embodiments, transaction detail user interface 1134 includes a refund button 1133 (e.g., if the payment associated payment message object 1135 was a payment made by the user to a message participant) for requesting a refund of a sent payment. In some embodiments, refund button 1133 is only available (e.g., is only visible, is only selectable) if the payment associated with the payment message object has been accepted (e.g., is no longer pending because the intended recipient (e.g., message participant 1110) has accepted the payment).

Figure 11H:
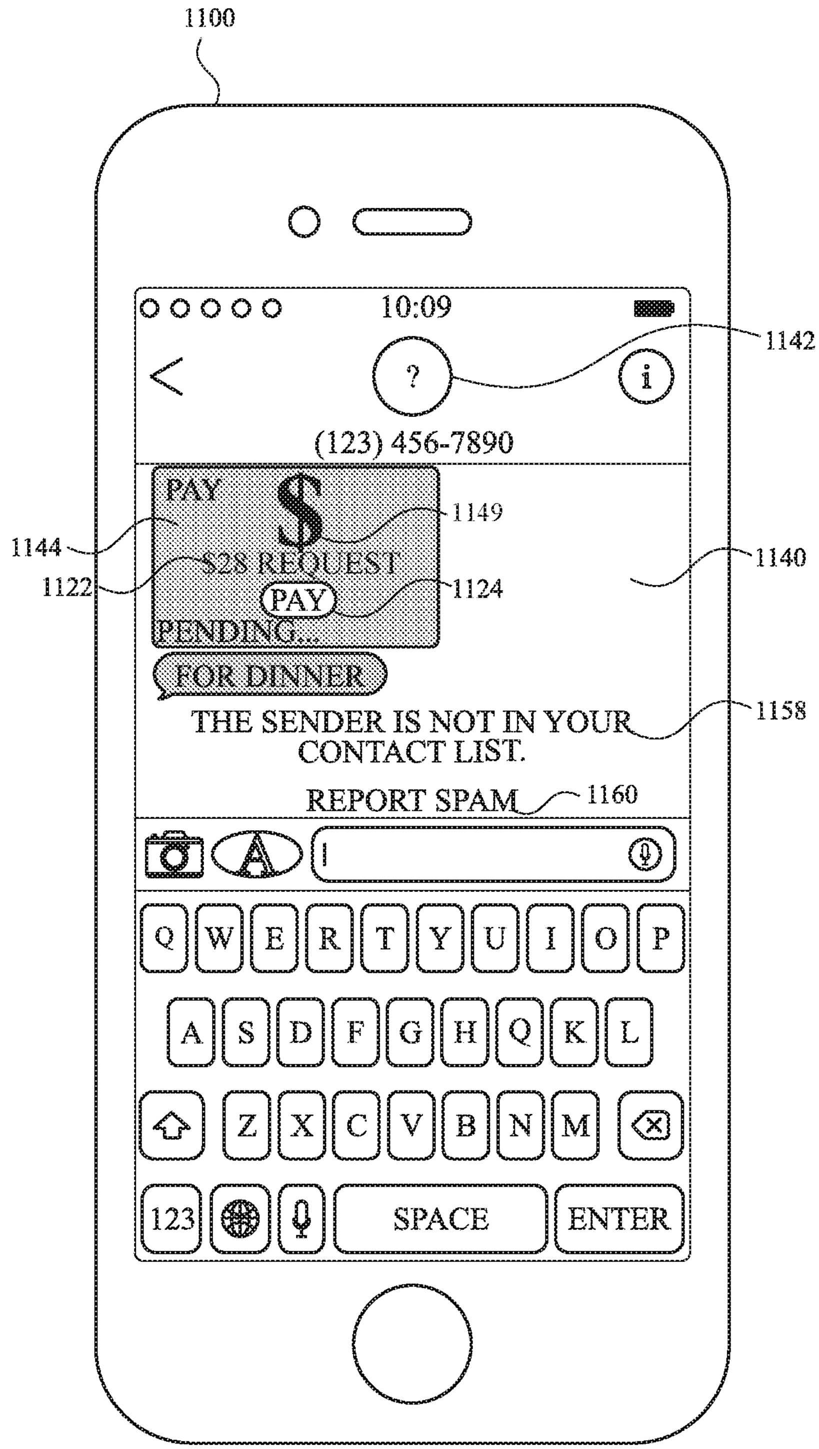

FIG. 11H illustrates a different message conversation 1140 of messaging application 806. In FIG. 11H, message conversation 1140 is between the user of electronic device 1100 and an unknown participant 1142. In some embodiments, unknown participant 1142 is a participant that does not correspond to a contact stored on the device. In some embodiments, unknown participant 1142 is a participant that is not included in a contact of a contact list associated with the user account logged onto the device. In some embodiments, unknown participant 1142 is a participant not included in a trusted contacts list associated with the user account logged onto the device. In some embodiments, unknown participant 1142 is a participant included in a non-trusted contacts list (e.g., a spam list) associated with the user account logged onto the device. In some embodiments, unknown participant 1142 is a participant included in a non-trusted user list (e.g., a spam list) maintained by an external device, such as a server. Note that FIG. 8C and the corresponding description provide additional examples relating to unknown participants.

As shown in FIG. 11H, electronic device 1100 displays in message conversation 1140 a payment message object 1144 (and an accompanying note message object 1146) corresponding to a payment request of $28 made by unknown participant 1142 to the user. In some embodiments, a payment message object (e.g., payment message object 1144) corresponding to a payment request includes in payment amount indication 1122 that also includes addition text (e.g., "$28 Request") that indicates to the user that the payment message object relates to a payment request, and not a payment. As with a payment message object relating to a payment (e.g., payment message object 1118), a payment message object relating to a payment request (e.g., payment message object 1144) also includes an accept button 1124 for accepting the payment request (e.g., agreeing to pay the requested amount in the payment request).

In some embodiments, as also shown in FIG. 11H, a payment message object corresponding to a payment request (e.g., payment message object 1144) (instead of a payment) includes a request indicator 1145 that indicates to the user that the payment message object corresponds to a payment request (e.g., a payment request made by the user of the device to a message participant or a payment request sent by a message participant to the user) and not to a payment. In some embodiments, as shown in FIG. 11H, request indicator 1145 is a currency symbol (e.g., the dollar symbol "$") displayed at a center region of the message object. In some embodiments, request indicator 1145 is a graphical symbol. In some embodiments, the visual characteristics (e.g., font type, boldness/thickness, color, shading, dynamic feedback, such as a 3D effect) of request indicator 1145 correspond with the visual characteristics (e.g., font type, boldness/thickness, color, shading) of an amount indication of a payment message object that corresponds to a (pending or completed) payment (e.g., amount indication 1122 of payment message objects 1118, 1132). In some embodiments, the visual characteristics (e.g., font type, boldness/thickness, color, shading, dynamic feedback, such as a 3D effect) of request indicator 1145 are different from (and thus does not correspond with) the visual characteristics (e.g., font type, boldness/thickness, color, shading, dynamic feedback, such as a 3D effect) of an amount indication of a payment message object that corresponds to a (pending or completed) payment request (e.g., amount indication 1122 of payment message object 1144).

In FIG. 11H, as described above, the payment request corresponding to payment message object 1144 is from an unknown participant (e.g., unknown participant 1142). In some embodiments, in accordance with a determination that the payment request corresponding to the payment message object is form an unknown participant, electronic device 1100 displays a spam notification 1158 (e.g., a textual notification, a graphical notification, a prompt) that the message is from an unknown participant. For example, as shown in FIG. 11H, the device displays within message conversation 1140 spam notification 1158 (a notification message) stating "this sender is not in your contacts list." In some embodiments, the device further displays (e.g., below spam notification 1158), a selectable reporting notification

1160 (e.g., a selectable text, a button) for reporting (e.g., transmitting information about) the unknown participant to an external device (e.g., a server). For example, as shown in FIG. 11H, the device displays, below spam notification 1158, selectable reporting notification 1160 (e.g., selectable text) stating “Report Spam.”

Figure 11I:
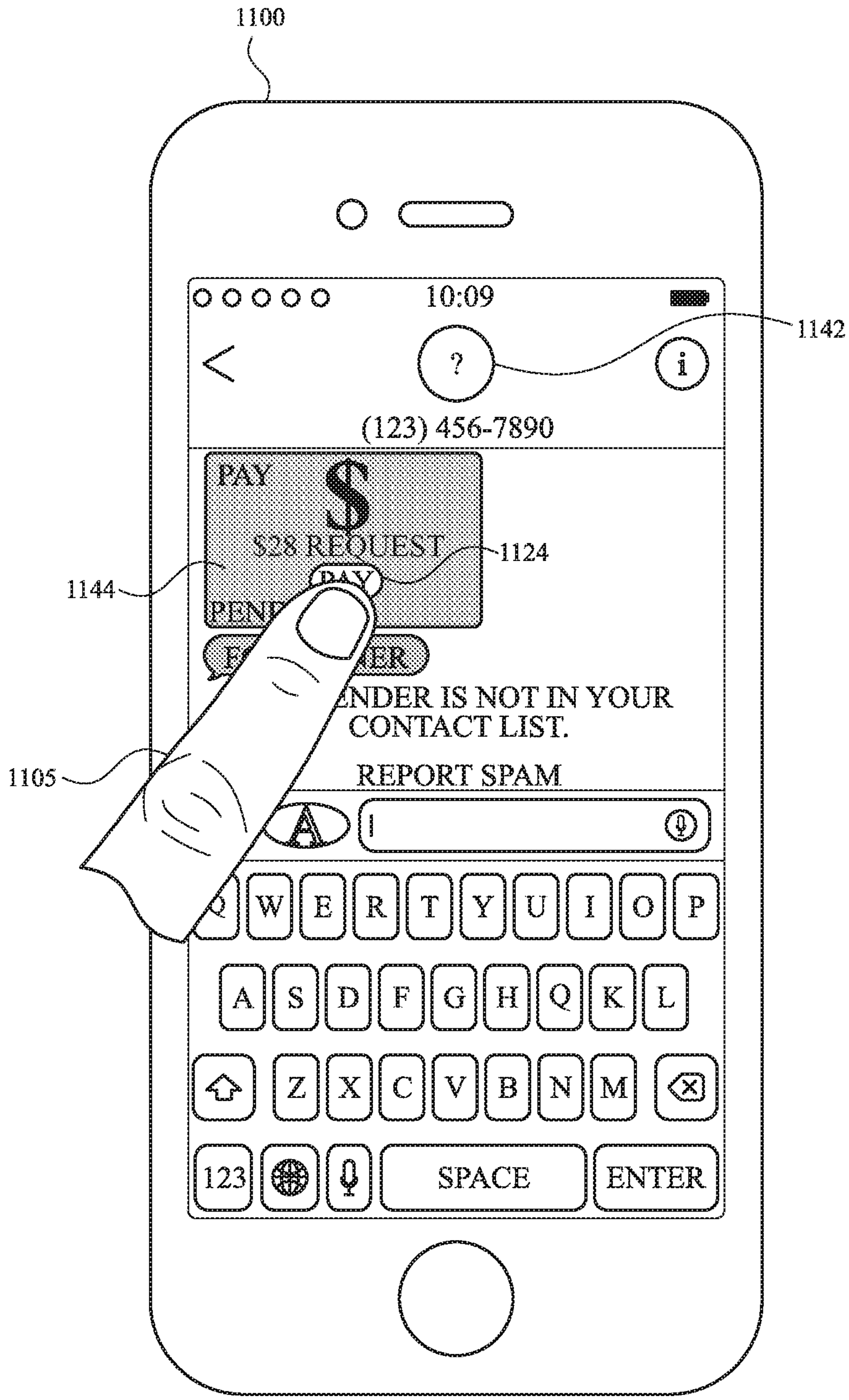

In FIG. 11I, while displaying spam notification 1158, electronic device 1100 detects (despite the displayed spam notification 1158) a user input on accept button 1124 of payment message object 1144 from unknown participant 1142. For example, as shown in FIG. 11I, the detected user input is a tap gesture 1105 on accept button 1124.

Figure 11J:
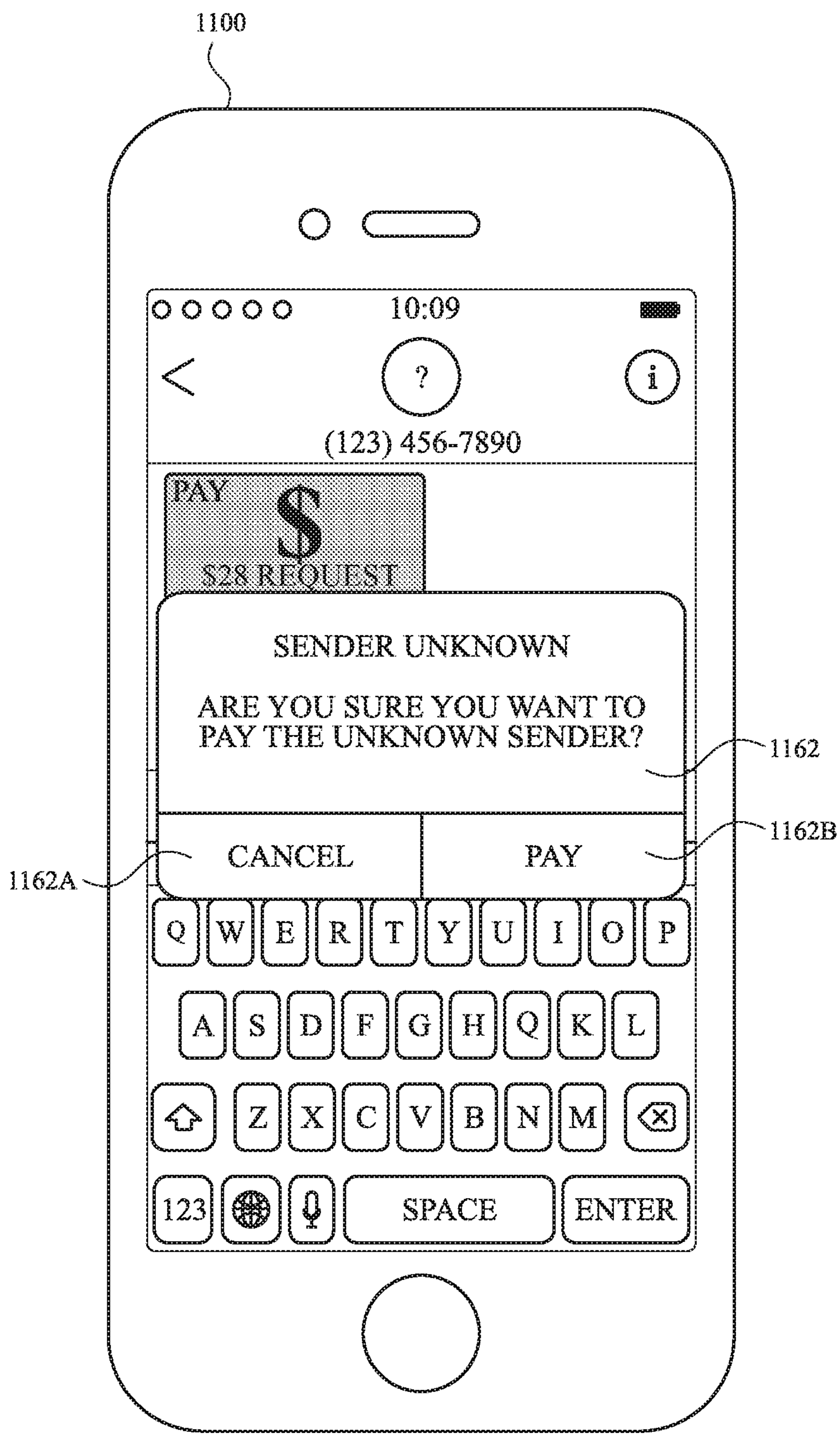

In some embodiments, as shown in FIG. 11J, in response to detecting (despite the displayed spam notification 1158) tap gesture 1105, electronic device 1100 displays, on display 1102, a pop-up warning 1162 further informing the user that the payment request corresponding to payment message object 1144 is from an unknown sender (e.g., unknown participant 1142). In some embodiments, pop-up warning 1162 includes a cancel button 1162A and a proceed button 1162B.

Figure 11K:
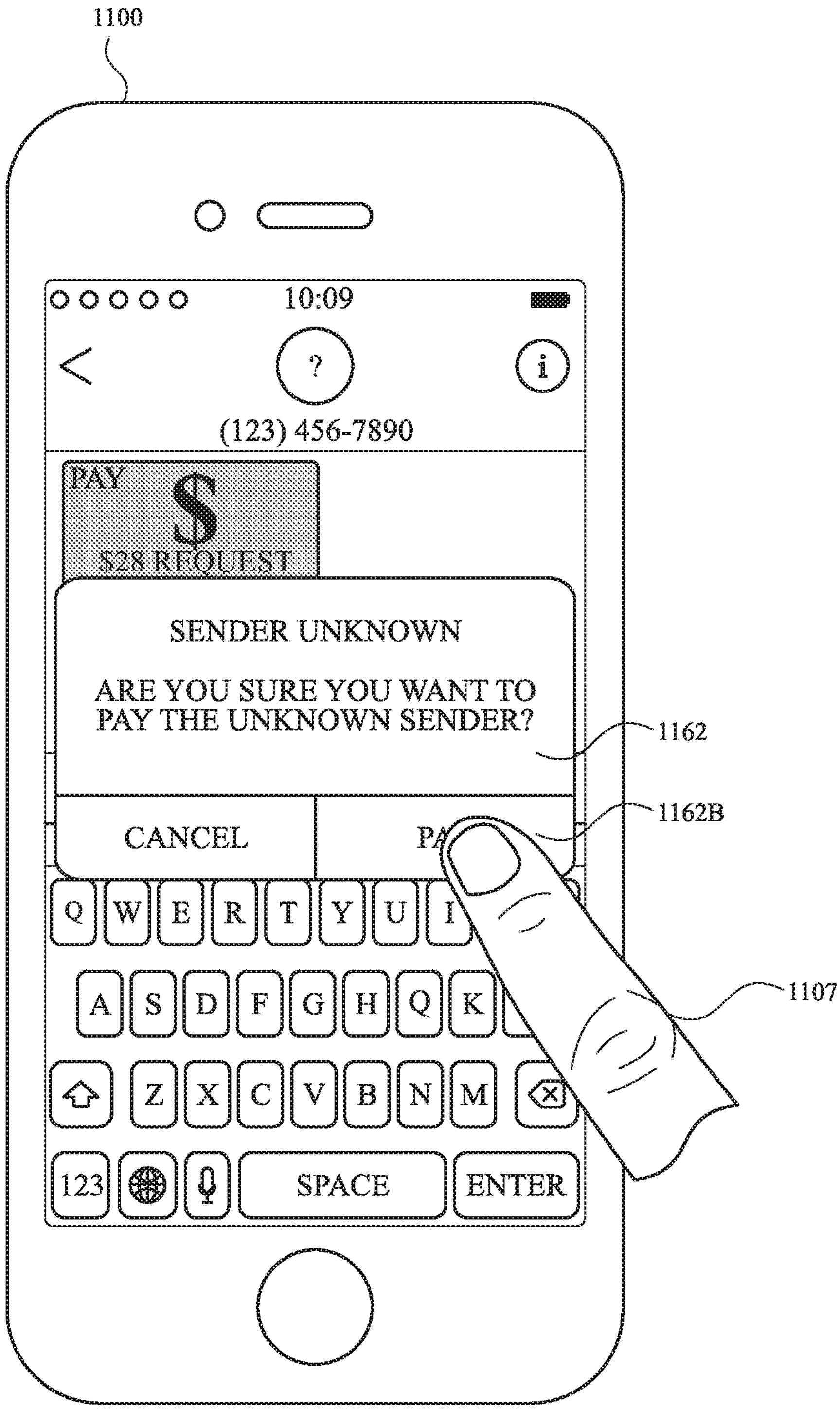

In FIG. 11K, while displaying pop-up warning 1162, electronic device 1100 detects (despite the pop-up warning again informing the user that the payment request is from an unknown sender) a user input on proceed button 1162B of pop-up warning 1162. For example, as shown in FIG. 11K, the detected user input is a tap gesture 1107 on proceed button 1162B of pop-up warning 1162.

Figure 11L:
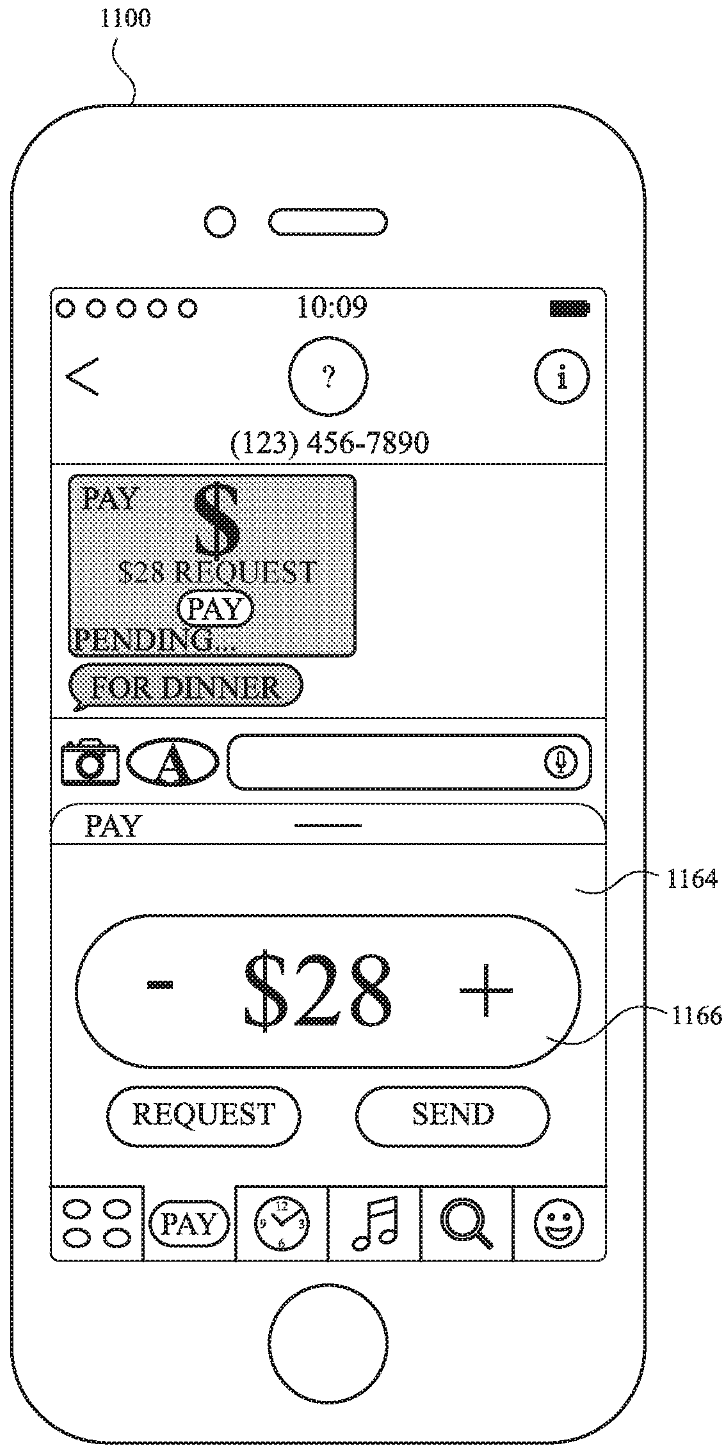

In FIG. 11L, in response to detecting tap gesture 1107 on proceed button 1162B of pop-up warning 1162, electronic device 1100 ceases displaying pop-up warning 1162. Further, in some embodiments, in response to detecting tap gesture 1107 on proceed button 1162B of pop-up warning 1162, the device displays (e.g., replaces display of virtual keyboard 1112 with) a payment transfer user interface 1164 corresponding to payment transfer user interface 840 described above with reference to FIGS. 8A-8AH. In some embodiments, as shown in FIG. 11L, based on the payment request corresponding to payment message object 1144 for the amount of $28, payment transfer user interface 1162 is displayed with the requested payment amount (of $28) pre-populated in value change region 1166.

Figure 11M:
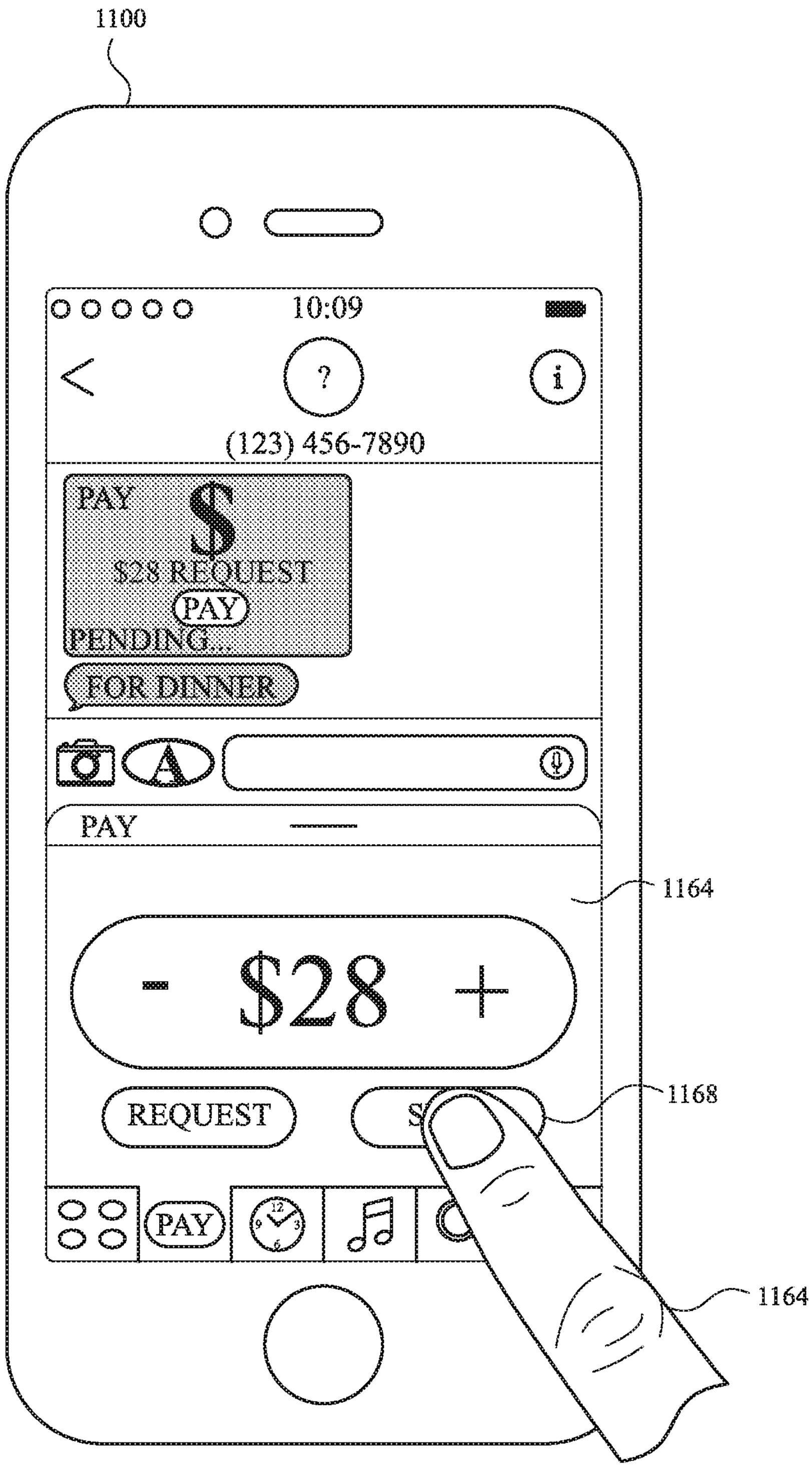

In FIG. 11M, while displaying payment transfer user interface 1164, electronic device 1100 detects user activation of send button 1168 (e.g., to send the requested payment). For example, as shown in FIG. 11M, the user activation is a tap gesture 1109 on send button 1168.

Figure 11N:
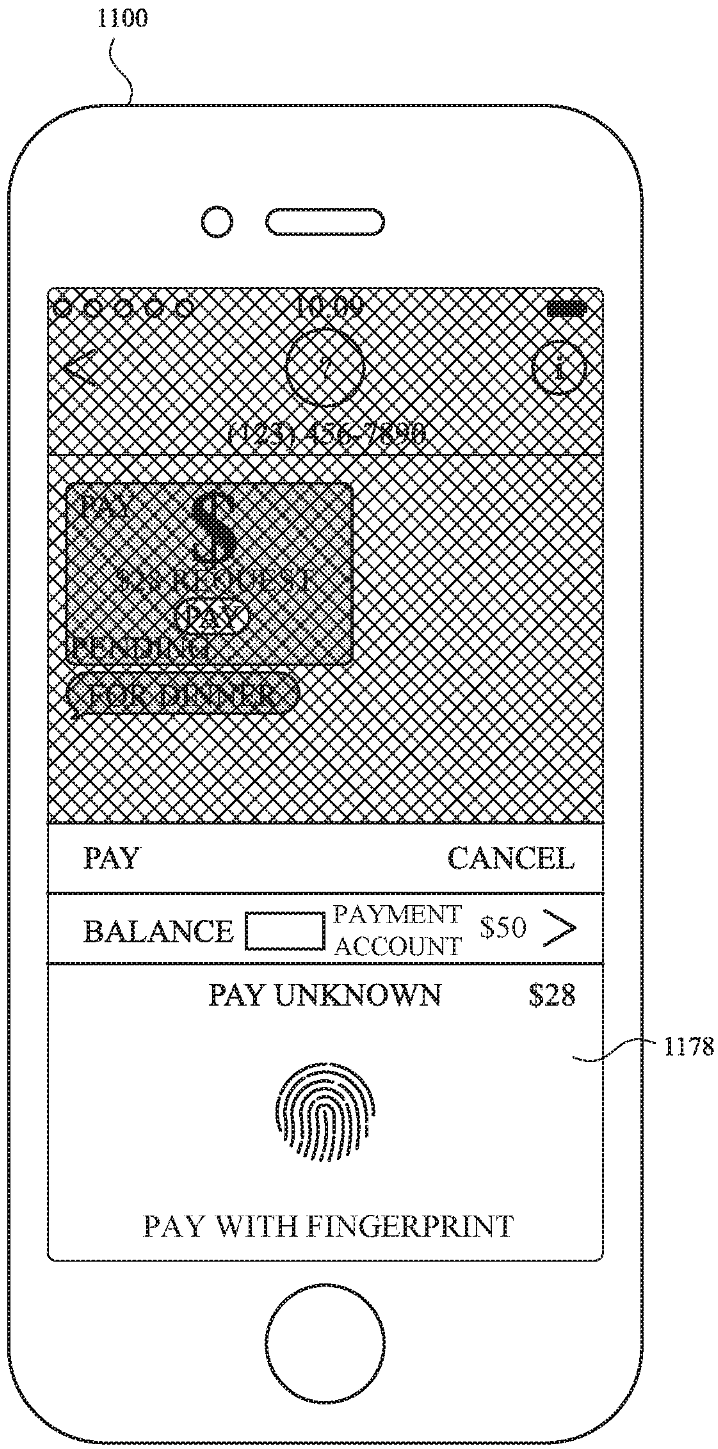

In FIG. 11N, in response to detecting tap gesture 1109 on send button 1168, electronic device 1100 displays (e.g., replaces display of payment transfer user interface 1164 with) payment confirmation user interface 1178 corresponding to payment confirmation user interface 878 described above with reference to FIGS. 8T-8W.

In some embodiments, as shown in FIG. 11N, payment confirmation user interface 1178 includes an authentication request 1180 (e.g., a graphical request, a textual request) requesting that the user provide authentication information to proceed with making the payment to requested by the payment request. In some embodiments, the requested authentication is biometric authentication, such as facial recognition authentication, fingerprint authentication, voice recognition authentication, iris scan authentication, or retina scan authentication. For example, in FIG. 11N, the requested authentication information (e.g., as shown in authentication request 1180), is fingerprint information (e.g., “Pay with Fingerprint”). In some embodiments, payment confirmation user interface 1178 also includes an indication 1176 that the current payment is intended for an unknown recipient (e.g., unknown participant 1142).

Figure 11O:
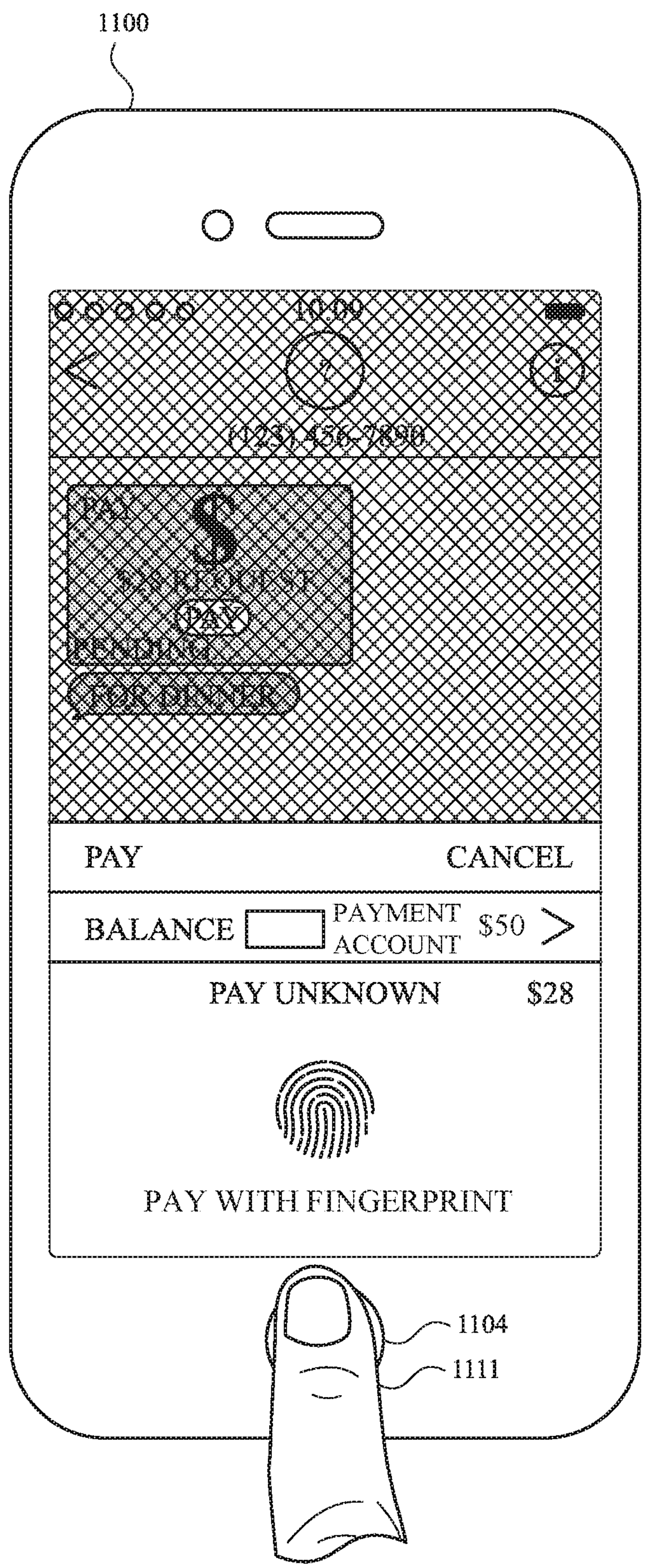
Figure 11P:
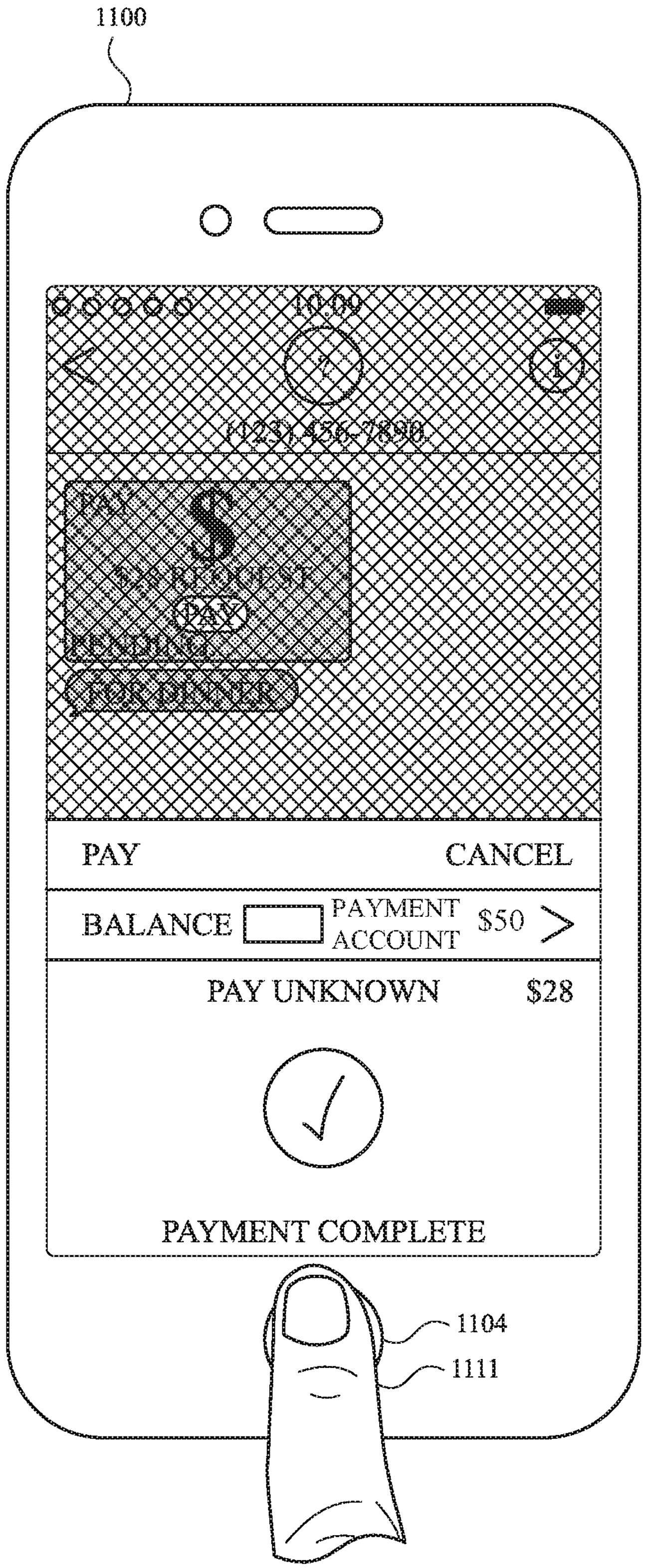

In FIG. 11O, while displaying payment confirmation user interface 1178, electronic device 1100 receives, from the user, the requested fingerprint information 1111 (e.g., via mechanical button 1104). While (or subsequent to) receiving, from the user, fingerprint information 1111, a determination is made (e.g., by the device or by an external device, such as a server) whether fingerprint information 1111 is consistent with an enrolled authentication information (e.g., an enrolled fingerprint information) of the user. As shown in FIG. 11P, in accordance with a determination that fingerprint information 1111 is consistent with enrolled fingerprint information of the user, the device updates authentication request 1180 (previously showing a request for a certain type of authentication information) to indicate that the authentication was successful (e.g., by displaying a checkmark, by displaying “Authorization Successful” or “Payment Complete”).

In some embodiments, in accordance with a determination that fingerprint information 1111 is not consistent with enrolled fingerprint information of the user (e.g., authentication was not successful), the device displays an indication that the authentication was unsuccessful and a request to re-provide the requested authentication information. In some embodiments, in accordance with a determination that fingerprint information 1111 is (e.g., for a second time) not consistent with enrolled fingerprint information of the user, the device displays a verification user interface (e.g., as described below with reference to FIGS. 31A-31M) for providing a different type of authentication information or for verifying that the user is the user that is associated with the user account logged onto the device.

Figure 11Q:
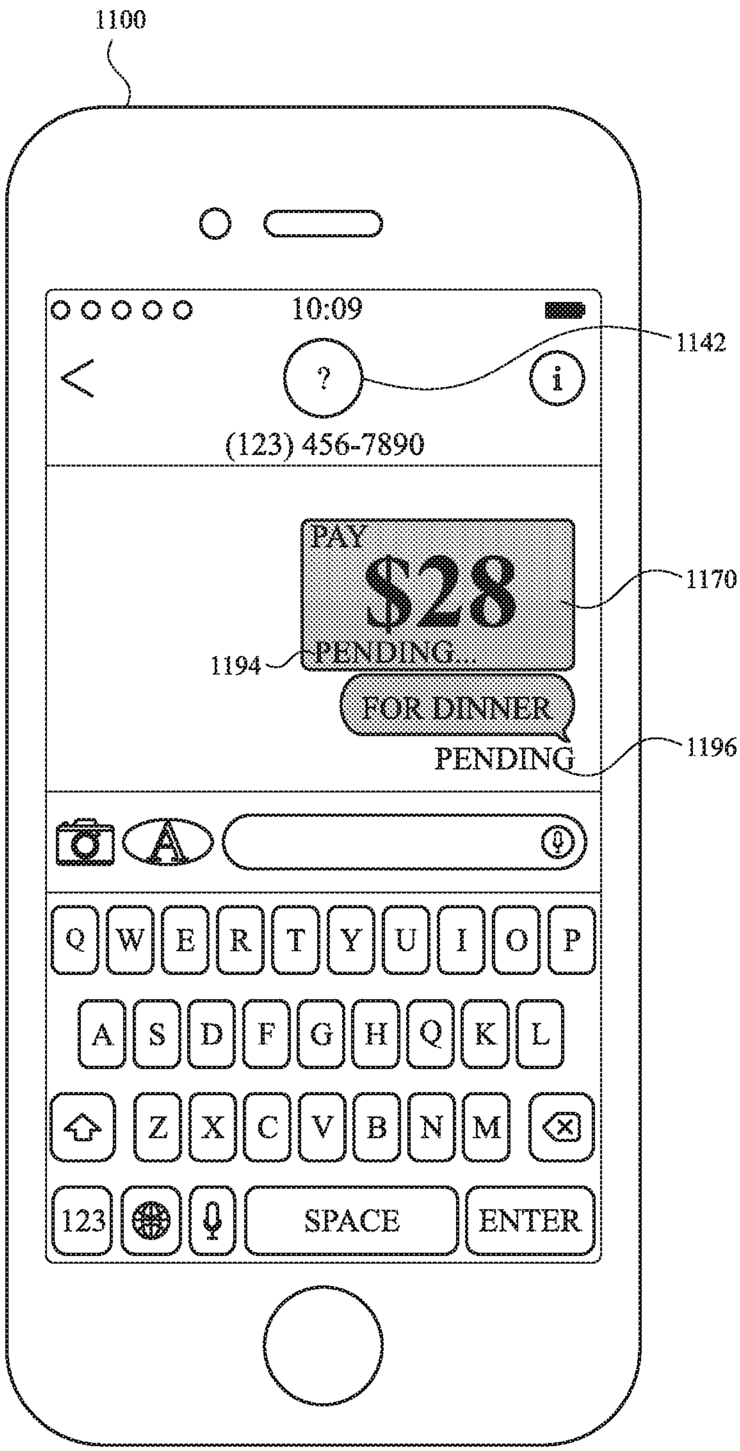

As shown in FIG. 11Q, in response to a successful user authentication, electronic device 1100 removes display of payment confirmation user interface 1178 (and again displays virtual keyboard 1112 in place of the removed payment confirmation user interface 1178). In some embodiments, as also shown in FIG. 11Q, the device displays a new payment message object 1170 corresponding to the payment made by the user to unknown participant 1142 in response to the payment request from the unknown participant. As also shown in FIG. 11Q, payment message object 1170 includes a first status indicator 1194 informing the user of a status of the payment corresponding to the sent payment message object (e.g., “pending,” “paid,” “accepted,” “expired”). For example, in FIG. 11Q, first status indicator 1194 shows “pending,” thus indicating to the user that the payment associated with sent payment message object 1170 has not yet been accepted by unknown participant 1142. In some embodiments, the device displays (in addition to or instead of first status indicator 1194), a second status indicator 1196 informing the user of a status of the payment corresponding to the sent payment message object (e.g., “pending,” “paid,” “accepted,” “expired”). For example, in FIG. 11X, second status indicator 1196 (e.g., “pending”) shows the same status as shown by first status indicator 1194 (e.g., “pending”).

In some embodiments, payment message object 1144 corresponding to the payment request sent by unknown participant 1142 to the user is maintained (within message conversation 1108 (e.g., above payment message object 1170), and not removed from the message conversation) when payment message object 1170 corresponding to the payment made by the user to unknown participant 1142 in response to the payment request from the unknown participant is created. In some embodiments, if payment message object 1144 is maintained (within message conversation 1108 (e.g., above payment message object 1170)), payment message object 1144 is (e.g., in response to a successful authentication from FIG. 11P) updated to indicate that the payment request has been accepted by the user (e.g., that the user has agreed to make the payment requested via payment message object 1144). For example, in some embodiments, accept button 1124 is removed from the message object and a status indicator (e.g., stating "PENDING") is updated (e.g., to state "ACCEPTED"). In some embodiments, once the payment corresponding to payment message object 1170 (which also corresponds to the payment requested by the unknown participant via payment message object 1144) has been accepted by unknown participant 1142 (and thus the payment corresponding to payment message object 1170 has been completed), a dynamic three-dimensional visual effect (e.g., as described with reference to completed payment message object 1172 in FIG. 11T) is applied to a request indicator 1149 (e.g., displayed as a currency symbol (e.g., "$") in the same font and/or style as an amount indicator (e.g., "$28") of payment message objects 1170 and 1172) of payment message object 1144 or to the entire payment message object. In some embodiments, payment message object 1144 is removed (from message conversation 1108) when payment message object 1170 corresponding to the payment made by the user to unknown participant 1142 in response to the payment request from the unknown participant is created.

Figure 11R:
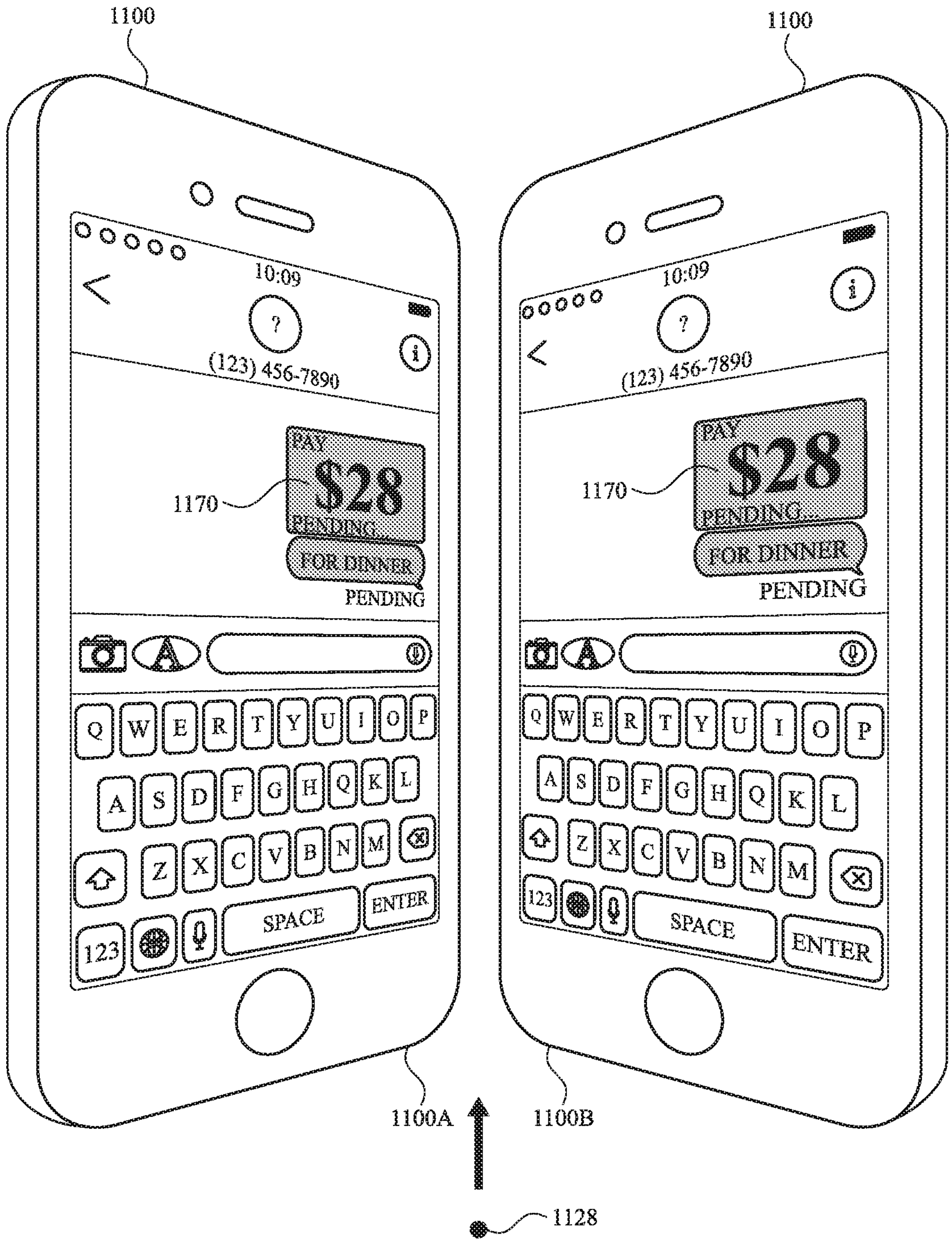

FIG. 11R shows (as also described with reference to payment message object 1118 in FIG. 11B) electronic device 1100, while displaying the display (including payment message object 1170 within message conversation 1140) shown in FIG. 11Q, being viewed at two different angles (angle 1100A and angle 1100B) relative to a reference point 1128 that is a face of a viewer (e.g., the user) of the device in a field of view of a sensor (e.g., a camera) of the device. Alternatively, in some embodiments, the reference point is a static point external to the device, such as a location on the ground or floor. As shown in FIG. 11R, from the perspective of reference point 1128 of a viewer (e.g., the user) viewing display 1102 of the device at either angle 1100A or at angle 1100B, payment message object 1170 (because it has not yet been accepted by the intended recipient (e.g., unknown participant 1142)) appears the same at either angle. In other words, whether a viewer (e.g., the user) views display 1102 of the device at angle 1100A, or whether a viewer (e.g., the user) views display 1102 of the device at angle 1100B, or whether a viewer (e.g., the user) views display 1102 of the device from straight on (e.g., such that the display is not tilted at an angle relative to the face of the viewer, as shown in FIG. 11Q), there is no change in how the payment message object is perceived by the user, for there is no change in how the payment message object is displayed on display 1102 by the device. Thus, in FIG. 11R, the device does not provide any feedback associated with payment message object 1170 to a viewer (e.g., the user) of the device.

Figure 11S:
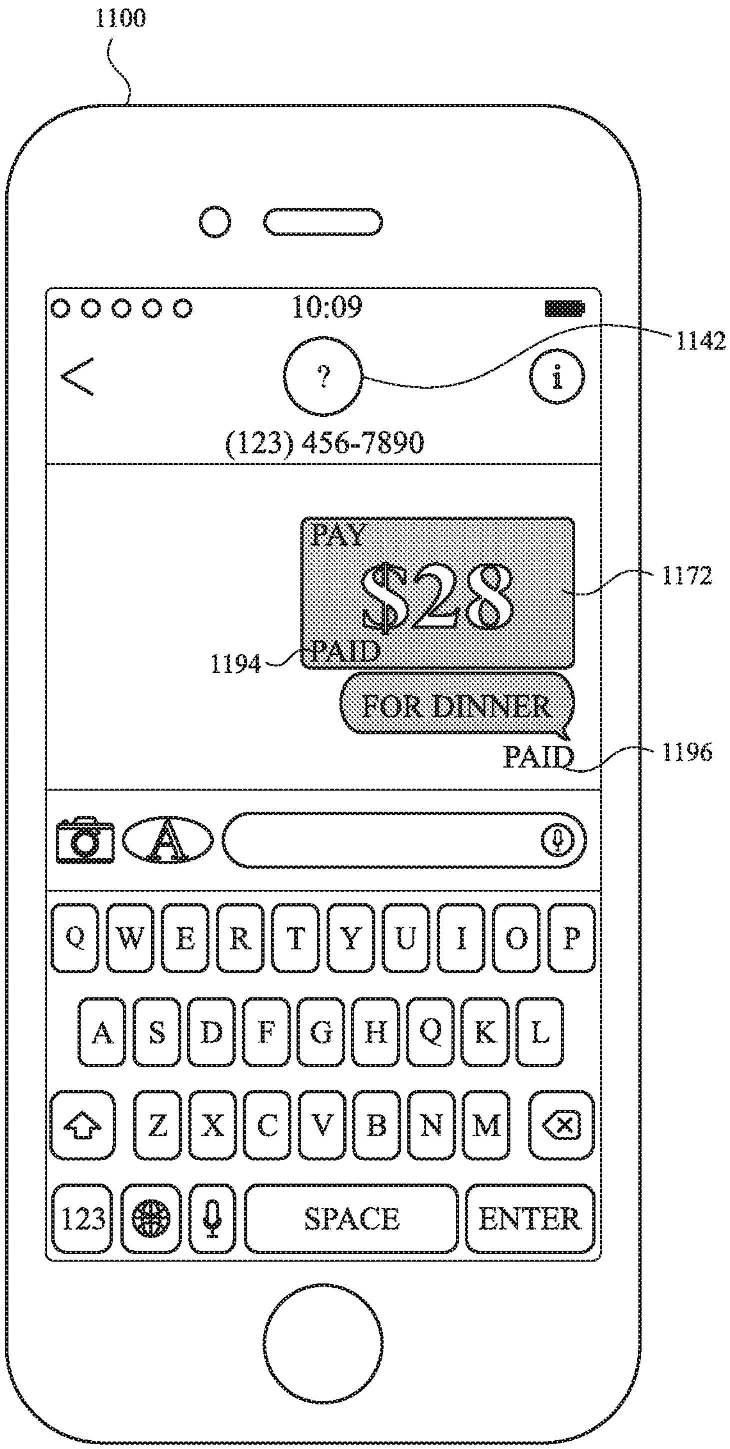

FIG. 11S shows the payment (or, alternatively, the payment request) corresponding to payment message object 1170 having been accepted by unknown participant 1142. Thus, the device updates display of payment message object 1170 to a completed message object 1172. Further, in response to the determination that the payment (or, alternatively, the payment request) corresponding to payment message object 1170 has been accepted by unknown participant 1142, electronic device 1100 updates first status indicator 1194 (e.g., from "pending" to "paid") to inform the user that the payment has been accepted by unknown participant 1142 (or, alternatively, to inform the user that the payment request has been accepted, and thus a payment by unknown participant 1142 in the requested payment amount has been made by the unknown participant to the user). In some embodiments, the device updates second status indicator 1196 (e.g., from "pending" to "paid") to inform the user that the payment has been accepted by unknown participant 1142 (or, alternatively, to inform the user that the payment request has been accepted, and thus a payment by unknown participant 1142 in the requested payment amount has been made by the unknown participant to the user).

Figure 11T:
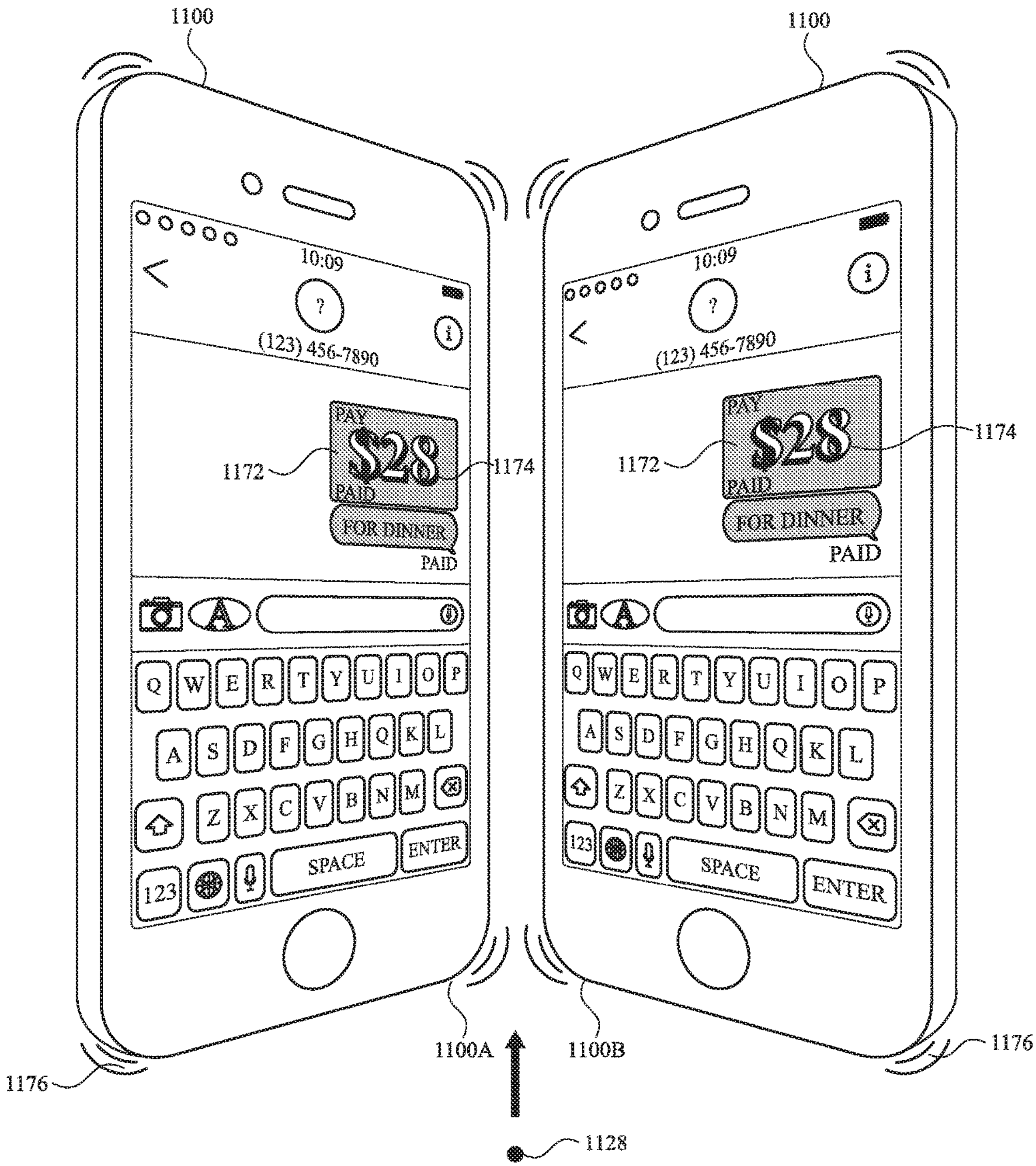

FIG. 11T shows (as also described with reference to completed payment message object 1132 in FIG. 11B), in place of (non-completed) payment message object 1170, a completed payment message object 1172. Specifically, as shown in FIG. 11T, electronic device 1100 generates a feedback (e.g., a visual effect, a haptic feedback, an audio feedback) indicating to the user that the payment corresponding to completed payment message object 1170 has been accepted and that payment message object 1170, now completed payment message object 1172, corresponds to a payment that has already been accepted.

For example, as shown in FIG. 11T, amount indication 1174 (e.g., "$28") of completed payment message object 1172 is visually changed. In some embodiments, the visual change to amount indication 1174 is a bolding (or thickening) of the font of the displayed amount (e.g., "$28"). In some embodiments, the visual change to amount indication 1174 includes a black outline (e.g., a shadow) applied to the font of the displayed amount (e.g., "$28"). In some embodiments, the visual change to amount indication 1174 is as change in color (e.g., from black to white) of the displayed amount (e.g., "$28").

In some embodiments, electronic device 1100 generates feedback (e.g., a visual feedback, a haptic feedback, an audio feedback) associated with completed payment message object 1172. In some embodiments, the feedback is a dynamic visual feedback causing display of the payment message object (e.g., completed payment message object 1172) to change as changes in the orientation of the device relative to reference point 1128 are detected. For example, in FIG. 11T, the dynamic visual feedback is a 3D effect (e.g., the simulated depth effect 3325 described below with reference to FIGS. 33D-33J) that provides the user with the visual effect that amount indication 1174 of the payment message object is three-dimensional. Thus, in FIG. 11T, based on reference point 1128 of the user, amount indication 1174 of completed payment message object 1172 looks visually different (e.g., shadows behind the displayed numbers of amount indication 1174 appear different) from angle 1100A of the device and from angle 1100B of the device and, optionally, both the view of completed payment message object 1172 from angle 1100A and angle 1100 look different from the appearance of the object from straight on (e.g., such that the display is not tilted at an angle relative to the face of the viewer, as shown in FIG. 11S). In some embodiments, the dynamic visual feedback is a changing color applied to the amount indication (or to the entire payment message object). In some embodiments, the dynamic visual feedback is a changing background applied to the payment message object. In some embodiments, the dynamic visual feedback is a moving of one or more elements, such as amount indication 1174, of the payment message object.

In some embodiments, as also shown in FIG. 11T, in addition to or instead of a dynamic visual feedback, the device generates a dynamic haptic feedback 1176. In some embodiments, the dynamic haptic feedback is a dynamically strengthening and weakening tactile output caused by the device. In some embodiments, the dynamic haptic feedback is a tactile output with changing tactile output patterns caused by the device. In some embodiments, the strength or frequency of the tactile output changes as the device detects changes in the orientation of the device relative to the reference point (e.g., reference point 1128).

In some embodiments, the generated feedback (e.g., visual feedback, sensory feedback, audio feedback) is caused (e.g., only) by an operating system program of the device and non-operating system programs of the device are not enabled to cause the feedback.

Figure 11U:
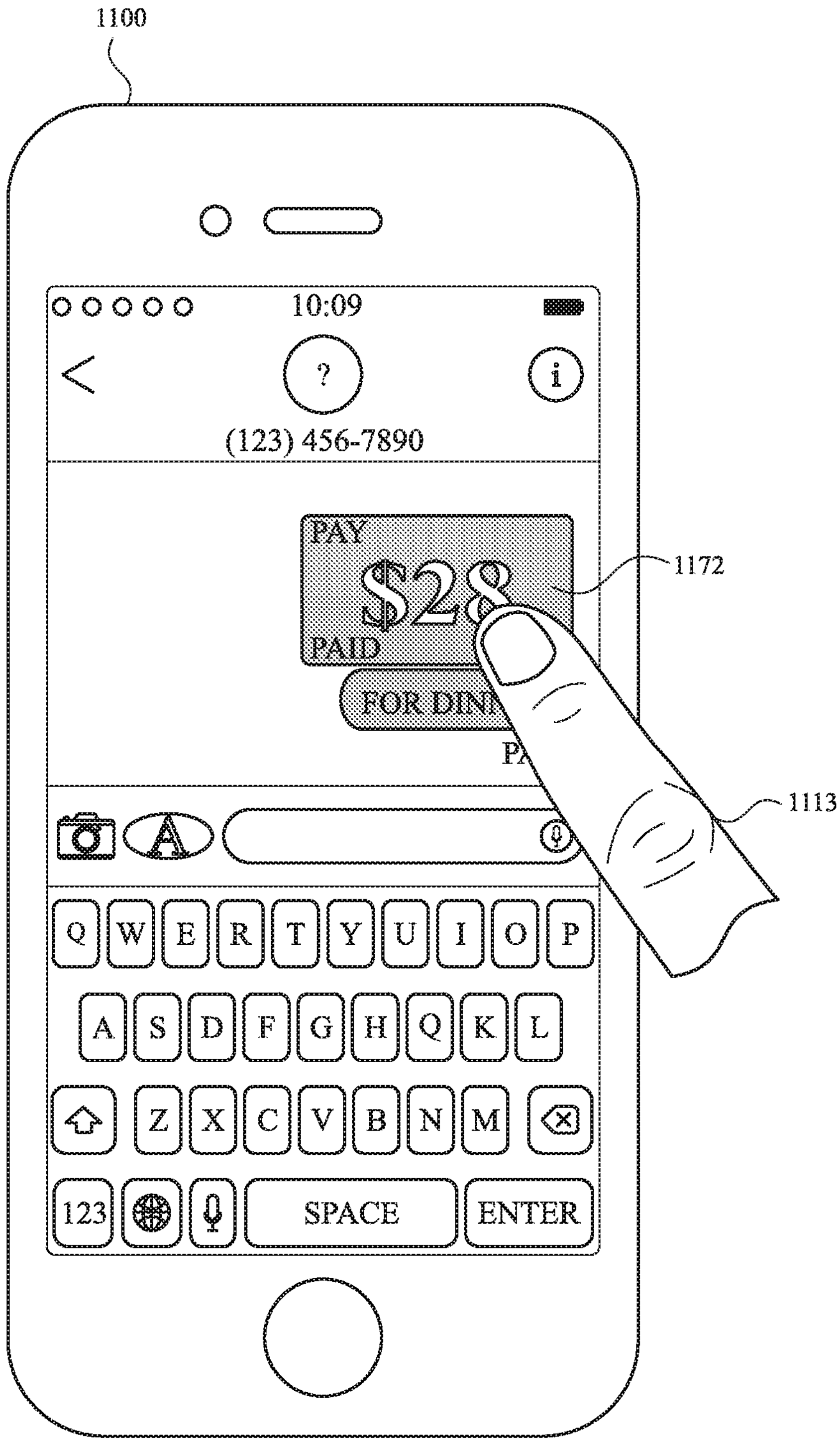

In FIG. 11U, while displaying completed payment message object 1172 within message conversation 1140, electronic device 1100 detects a user input on the completed payment message object. For example, as shown in FIG. 11U, the user input is a tap gesture 1113 on completed payment message object 1172.

In FIG. 11V, in response to detecting tap gesture 1113, electronic device 1100 displays (e.g., replaces display of messaging application 1106 and virtual keyboard 1112 with) transaction detail user interface 1134 (as first described above with reference to FIG. 11G) that includes a graphical representation 1135 (e.g., a copy) of the completed payment message object (e.g., completed payment message object 1172), a textual indication 1137 of a note accompanying the payment (e.g., accompanying message object 1146 stating "For dinner"), plurality of details relating to the selected (e.g., the payment corresponding to completed payment message object 1172) transaction. In some embodiments, transaction detail user interface 1134 includes an indication 1134A of the payment sender/recipient (e.g., the user (Kate Appleseed, "From Kate's Payment account"). In some embodiments, transaction detail user interface 1134 includes an indication 1134B of the payment account or the payment recipient account. In some embodiments, transaction detail user interface 1134 includes an indication 1134C of the intended recipient of the payment (or, alternatively, a payment request) (e.g., unknown participant 1142, message participant 1110). In some embodiments, transaction detail user interface 1134 includes an indication 1134D of the date and time of competed transaction. In some embodiments, transaction detail user interface 1134 includes an indication 1134E of the date and time of competed transaction. In some embodiments, transaction detail user interface 1134 includes an indication 1134F of a transaction number.

In some embodiments, transaction detail user interface 1134 includes a wallet button 1136 (e.g., a "View in Wallet" selectable indication) for viewing the transaction details in an electronic wallet application of electronic device 1100. In some embodiments, transaction detail user interface 1134 includes a send again button 1131 (e.g., if the payment associated payment message object 1135 was a payment made by the user to a message participant) for creating a new payment message object corresponding to a payment in the same amount as the currently-viewed transaction intended for the same recipient as the currently-viewed transaction. Thus, send again button 1131 provides the user with a quick and easy option to perform another payment in the same amount (e.g., "$28") to the same recipient (e.g., message participant 1110) via the transaction detail user interface of the last transaction with that recipient. In some embodiments, transaction detail user interface 1134 includes a refund button 1133 (e.g., if the payment associated payment message object 1135 was a payment made by the user to a message participant) for requesting a refund of a sent payment. In some embodiments, refund button 1133 is only available (e.g., is only visible, is only selectable) if the payment associated with the payment message object has been accepted (e.g., is no longer pending because the intended recipient (e.g., message participant 1110) has accepted the payment).

FIGS. 12A-12C are a flow diagram illustrating a method for managing peer-to-peer transfers using an electronic device in accordance with some embodiments. Method 1200 is performed at a device (e.g., 100, 300, 500, 1000, 1100) with a display and one or more sensor devices (e.g., an accelerometer, a camera). Some operations in method 1200 are, optionally, combined, the order of some operations are, optionally, changed, and some operations are, optionally, omitted.

As described below, method 1200 provides an intuitive way for managing peer-to-peer transfers. The method reduces the cognitive burden on a user for managing peer-to-peer transfers, thereby creating a more efficient human-machine interface. For battery-operated computing devices, enabling a user to manage peer-to-peer transfers faster and more efficiently conserves power and increases the time between battery charges.

In some examples, prior to displaying (1204), on the display (e.g., 1002, 1102), a graphical representation of the communication (e.g., 1020, 1118), the electronic device (e.g., 1000, 1100) receives (1202) a communication with a predetermined type of message from an external device. In some examples, the message corresponds to a resource transfer (e.g., computing resources, points, credits, funds, virtual resources) from a first account associated with the electronic device to a second account associated with an external device (e.g., a transfer of resources from an account of the electronic device's user to an account of the user of a different electronic device, such as a smartphone, a smartwatch, a laptop computer, a desktop computer)).

In some examples, the communication is associated with a completed transfer of a first type of item between a user of the device (e.g., 1000, 1100) and a participant (e.g., 1010, 1110) in a message conversation (e.g., 1008, 1108). In some examples, the transfer of the first type of item is a transfer of a sticker using a sticker sharing interface, a transfer of a photo using a photo sharing interface, a transfer of a payment using a payment interface, or a transfer of a resource using a resource-numerical value selection user interface for receiving user adjustment of the amount of resources, such as points, credits, or funds, to be sent or requested. In some examples, the communication corresponds to a request for transfer of the first type of item (e.g., funds) between the user of the device and a participant in the message conversation.

The electronic device (e.g., 1000, 1100) displays (1204), on the display (e.g., 1002, 1102), the graphical representation of the communication (e.g., 1020, 1118). In some examples, a state (1206) of the communication (e.g., the communication being in the first state or the second state) is indicative of an action taken by a participant (e.g., 1010, 1110), other than a user of the device, in a message conversation (e.g., a confirmation of payment by the participant on an external device). In some examples, the state of a communication indicates whether the receiver of the communication has read the message corresponding to the communication or accepted a payment corresponding to the communication.

In some examples, a state (1208) of the communication is indicative of an action taken by a user of the device (e.g., user has read a message corresponding to a communication, user has confirmed payment on the device). For example, the action taken by the user is accepting a payment associated with the communication or initiating accepting of a payment (e.g., by setting up a required payment account to accept the payment) associated with the communication (e.g., as described below in method 1800 with reference to FIGS. 18A-18F). In some examples, the state of a communication indicates whether a message corresponding to the communication has been sent or whether a payment has been made (e.g., accepted) for a payment request corresponding to the communication.

In some examples, the graphical representation of the communication (e.g., 1118) includes (1210) an indication (e.g., 1122) of a quantity of an item associated with the communication. In some examples, the quantity is the number of times a message has been viewed by a remote recipient. In some examples, the quantity is the amount of concurrency transferred, the amount of currency to be transferred, or the amount of currency requested to be transferred. In some examples, the quantity of the item associated with the communication is displayed with a special visual characteristic (e.g., a special font) that distinguishes the quantity from other item and/or elements on the display (e.g., as described below with reference to FIGS. 15A-15K).

While displaying the graphical representation of the communication (e.g., 1020, 1118) on the display (e.g., 1002, 1102), the electronic device (e.g., 1000, 1100) detects (1212), via the one or more sensor devices, a change in orientation of the electronic device relative to a reference point (e.g., 1026, 1128, a point in space, a point on the floor/ground, a point in a field of view of a camera). In some examples, the orientation of the electronic device relative to the reference point (e.g., 1026, 1128) changes when a user holding the electronic device is moving the electronic device relative to a point in space, on the floor, or on the ground while the user remains stationary. In some examples, the orientation of the electronic device relative to the reference point changes when the user (e.g., the user's head or eyes) is moving relative to the electronic device, which remains stationary relative to a point in space, on the floor, or on the ground.

In some examples, the reference point (e.g., 1026, 1128) is (1214) a face (e.g., face of the user of the device, a point on a face, such as an eye or nose) in a field of view of a sensor (e.g., a camera) of the one or more sensor.

In some examples, the reference point (e.g., 1026, 1128) is (1216) a static location (e.g., a fixed point on the ground/floor, a fixed point that is external to the device) external to the electronic device (e.g., 1000, 1100). In some examples, the device uses one or more sensors, such as accelerometers and/or a compass, to determine a change in orientation of the electronic device relative to the reference point, such as the earth.

In response (1218) to detecting the change in the orientation of the electronic device (e.g., 1000, 1100) relative to the reference point (e.g., 1026, 1128) while displaying the graphical representation of the communication on the display, blocks 1220-1226 are optionally performed.

In accordance with a determination that the communication has a first state (e.g., message read for an incoming message, payment accepted for an incoming payment, message sent for an outgoing message, payment approved for an outgoing payment, payment accepted for an outgoing payment), the electronic device (e.g., 1000, 1100) displays (1220) the graphical representation of the communication (e.g., 1020, 1118) and outputs a respective type of feedback (e.g., feedback on amount indication 1174 described in FIG. 11T, 1130, visual feedback, sensory feedback, audio feedback) corresponding to the graphical representation of the communication. The feedback indicates a magnitude of the change in the orientation of the electronic device relative to the reference point. In some examples, if the communication is a payment, the respective type of feedback is output as the device detects the change in the orientation if the payment has been accepted for an incoming payment or the payment has been approved for an outgoing payment. Outputting a particular feedback corresponding to the graphical representation of the communication as the device detects a change in orientation relative to a reference point provides the user with feedback about the state of the communication. Thus, for example, a user can determine the state of the communication by changing the device's orientation and checking whether the feedback is provided. Providing improved feedback to the user enhances the operability of the device and indicates the state of an element of the device, thus making the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the respective type of feedback is a dynamic visual feedback (e.g., feedback on amount indication 1174 described in FIG. 11T) (e.g., a changing visual effect, such as a changing color, a changing pattern, a changing background, a moving of one or more elements of the graphical representation of the communication (e.g., 1028, 1172)). In some examples, the visual feedback changes as the change in orientation of the electronic device relative to a reference point is detected. In some examples, the visual feedback is a 3D effect (e.g., the simulated depth effect 3325 described below with reference to FIGS. 33D-33J) that provides the user with the effect that an element of the graphical representation (such as the quantity) of the communication is three-dimensional. Outputting a dynamic visual feedback (such as a three-dimensional effect) that corresponds to the change in orientation allows the user to know that the feedback is legitimate (e.g., is tied to the change in orientation) and is not illegitimate (e.g., pre-made video that is not tied to the change in orientation) and enables the user to identify whether a visual feedback being provided is legitimate and therefore the associated communication is authentic. Providing improved visual feedback to the user enhances the operability of the device and makes the user-device interface more efficient which, additionally, reduces power usage and improves battery life of the device by enabling the user to use the device more quickly and efficiently.

In some examples, the respective type of feedback is a dynamic haptic feedback (e.g., 1030, 1130) (e.g., dynamically strengthening and weakening tactile outputs, a tactile output with changing tactile output patterns). For example, the strength or frequency of the tactile output changes as the device detects changes in orientation of the electronic device relative to the reference point is detected. Outputting a dynamic haptic feedback (e.g., 1030, 1130) (such as a haptic feedback that changes in strength or frequency) that corresponds to the change in orientation allows the user to know that the feedback is legitimate (e.g., is tied to the change in orientation) and is not illegitimate (e.g., pre-made haptic that is not tied to the change in orientation) and enables the user to identify whether a haptic feedback being provided is legitimate and therefore the associated communication is authentic. Providing improved haptic feedback to the user enhances the operability of the device and makes the user-device interface more efficient which, additionally, reduces power usage and improves battery life of the device by enabling the user to use the device more quickly and efficiently.

In some examples, the respective type of feedback (e.g., visual feedback, sensory feedback, audio feedback) is caused (e.g., only) by an operating system program of the electronic device and non-operating system programs of the electronic device are not enabled to cause the respective type of feedback. In some examples, only the operating system is enabled to initiate/cause the respective type of feedback. In some examples, the operating system only enables certain applications to initiate/cause the respective type of feedback (e.g., a particular frequency of tactile output or accelerometer controlled visual animation).

In some examples, the respective type of feedback is a graphical animation (e.g., a lighting effect) displayed over the graphical representation of the communication (e.g. 1028, 1172). In some examples, the graphical representation of the communication (e.g., 1170, 1172) includes a currency indicator (e.g., a "$" symbol, a "€" symbol).

In some examples, the respective type of feedback is a graphical animation (e.g., a shadow) displayed under the graphical representation (e.g., 1028, 1172). In some examples, the graphical representation of the communication (e.g., 1170, 1172) includes a currency indicator (e.g., a "$" symbol, a "€" symbol).

In some examples, the respective type of feedback is a graphical animation (e.g., shifting colors, shifting shapes) that creates an illusion that the graphical representation (e.g., 1028, 1172) (or portion thereof) is a three dimensional object that is being viewed from different angles as the angle (or orientation) of the device changes. In some examples, the graphical representation of the communication (e.g., 1170, 1172) includes a currency indicator (e.g., a "$" symbol, a "€" symbol).

In some examples, outputting the respective type of feedback comprises outputting a non-visual feedback (e.g., a haptic feedback that includes one or more tactile outputs and/or an audio feedback). In some examples, the haptic feedback uses frequencies of tactile outputs that are only available to first party apps (and thus cannot be simulated by any other app developer).

In accordance with a determination that the communication has a second state (e.g., message unread for an incoming message, payment unaccepted for an incoming payment, message unsent for an outgoing message, payment unapproved for an outgoing payment) that is different from the first state, the electronic device (e.g., 1000, 1100) displays (1226) the graphical representation of the communication (e.g., 1028, 1172) without outputting feedback (e.g., feedback on mini-file object 1022 or on amount indication 1174 described in FIG. 11T, 1130) that indicates a magnitude of the change in the orientation of the electronic device relative to the reference point. In some examples, at an external device of the sender of the communication, a corresponding feedback is outputted as the external device detects changes in orientation even when the communication has the second state. In some examples, the second state and the first state are mutually exclusive (e.g., if the communication has the first state it cannot have the second state, and if the communication has the second state it cannot have the first state). Forgoing outputting a particular feedback corresponding to the graphical representation as the device detects a change in orientation relative to a reference point provides the user with feedback about the state of the communication. Thus, for example, a user can determine the state of the communication by changing the devices orientation and checking whether the feedback is provided. When the feedback is not provided, the user knows that the communication is not in the first state. Providing improved feedback to the user enhances the operability of the device and indicates the state of an element of the device, thus making the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the communication is a message in a message conversation (e.g., 1108) between a plurality of conversation participants (e.g., 1010, 1110) and the communication is associated with a confirmation. Prior to displaying, on the display (e.g., 1002, 1102), the graphical representation of the communication (e.g., 1170, 1172), the electronic device (e.g., 1000, 1100) detects user activation of a confirmation affordance (e.g., to confirm a payment). In response to detecting user activation of the confirmation affordance, the electronic device displays, on the display, the graphical representation of the communication (e.g., 1170) in the message conversation, and outputs a second type of feedback (e.g., visual feedback, haptic feedback that includes one or more tactile outputs, audio feedback) corresponding to the graphical representation of the communication, wherein the feedback indicates that the communication has been confirmed. In some examples, the haptic feedback uses frequencies of tactile outputs that are only available to first party apps (and thus cannot be simulated by any other app developer). In some examples, the second type of feedback is a portion of the first type of feedback. In some examples, the second type of feedback is different from the first type of feedback. In some examples, the second type of feedback does not vary based on an angle of the device.

In some examples, the electronic device (e.g., 1000, 1100) receives (1228) user selection (e.g., a tap) of the graphical representation of the communication (e.g., 1028, 1172). In response to receiving the user selection of the graphical representation of the communication (e.g., 1028, 1172), the electronic device displays (1230), on the display (e.g., 1002, 1102), a detail user interface (e.g., 1134) including information (e.g., 1134A-E, an amount of a payment transaction, a quantity of a resource transfer, a date and time of a transaction/transfer, a note/comment relating to a transaction/transfer) associated with the communication.

In some examples, in response to receiving the communication (e.g., 1144 with the predetermined type of message: in accordance with a determination, based on an analysis (of the contents) of the communication, that the communication meets a first predefined condition (e.g., raises a predetermined flag (e.g., because the communication is suspected to be from an untrusted sender, because the communication is suspected to be spam/junk)), the electronic device (e.g., 1000, 1100) displays, on the display (e.g., 1002, 1102), a first indication (e.g., 1158, 1160, a notification, message, or prompt warning the user that the communication (e.g., 1144) is from an untrusted sender, a notification, message, or prompt indicating that the communication is suspected to be spam/junk, a notification, message, or prompt warning the user that the communication may not be safe to view/select/ open) that the communication meets the first predefined condition (e.g., raised/set the predetermined flag) and, optionally, the electronic device optionally forgoes outputting the respective type of feedback corresponding to the graphical representation of the communication (e.g., 1144). Automatically displaying an indication (e.g., 1158, 1160, an indication that the message is spam) when the predefined condition is met reduces the likelihood that the user will participant in a transfer corresponding to the message without further investigating the transfer, thereby enhancing the security of the technique and reducing the number of fraudulent transfers. Reducing the number of fraudulent transfers enhances the operability of the device and makes the user-device interface more secure (e.g., by reducing fraud when operating/interacting with the device). In accordance with a determination, based on the analysis (of the contents) of the communication (e.g., 1118), that the communication does not meet the first predefined condition (e.g., the communication does not raise/set the predetermined flag) (e.g., because the communication is from a trusted sender, because the communication is not suspected to be spam/junk), the electronic device forgoes displaying, on the display, the first indication (e.g., 1158, 1160, the indication that the message may be spam). In some examples, the first indication is that the message is potentially a spam message.

In some examples, the communication (e.g., 1144) meets the first predefined condition (e.g., raises the predetermined flag) when the external device does not correspond to one of a plurality of contacts (e.g., a contacts list, a trusted contacts list, a user-configured contacts list) associated with the electronic device (e.g., 1000, 1100) (e.g., the communication is from an unknown number).

In some examples, the communication (e.g., 1144) meets the first predefined condition (e.g., raises/sets the predetermined flag) when the external device corresponds to one of a plurality of contacts (e.g., a spam numbers list, a suspected fraudulent accounts list). In some examples, the plurality of contacts is a list of contacts identified as being untrustworthy.

In some examples, in accordance with the determination, based on the analysis (of the contents) of the communication (e.g., 1144), that the communication meets the first predetermined condition (e.g., raises/sets the predetermined flag) (e.g., because the communication is suspected to be from an untrusted sender, because the communication is suspected to be spam/junk), the electronic device (e.g., 1000, 1100) displays, on the display (e.g., 1002, 1102), a reporting affordance (e.g., 1160) (e.g., for reporting the spam/junk communication to a remote server). While displaying, on the display, the reporting affordance (e.g., 1160), the electronic device detects user activation of the reporting affordance (e.g., 1160). In response to detecting the user activation of the reporting affordance, the electronic device transmits, to an external device (e.g., an external server), information associated with the communication that raised (or set) the predetermined flag.

In some examples, subsequent to displaying, on the display, the first indication (e.g., 1158, 1160, a notification, message, or prompt warning the user that the communication is from an untrusted sender, a notification, message, or prompt indicating that the communication is suspected to be spam/junk, a notification, message, or prompt warning the user that the communication may not be safe to view/select/open) that the communication raised (or set) the predetermined flag, the electronic device (e.g., 1000, 1100) receives user activation of a send affordance (e.g., 1124) displayed on the graphical representation of the communication. In response to receiving the user activation of the send affordance (e.g., 1124) (and in accordance with the determination, based on an analysis (of the contents) of the communication, that the communication meets a first predefined condition): the electronic device displays a second indication (e.g., 1162, "Sender Unknown, Do You Still Wish To Proceed?") that the communication met the first predetermined condition (e.g., raised/set the predetermined flag), wherein the second indication is visually distinguishable from the first indication, (e.g., the second indication is more visibly prominent than the first indication), and displays, on the display, a cancel affordance (e.g., 1162A) for forgoing proceeding with (e.g., canceling completion of, forgoing display of a transfer user interface for initiating transfer of the first type of item) a transfer of the first type of item between a user of the device and a participant in a message conversation. In some examples, the transfer corresponds to the received communication. In some examples, a second send affordance (e.g., 1162B) is displayed concurrently with the cancel affordance. In response to detecting activation of the second send affordance (e.g., 1162B), the electronic device (e.g., 1000, 1100) displays a transfer user interface (e.g., 1164) for proceeding with the transfer of the first type of item between the user of the device and the participant in the message conversation. Displaying a second indication (e.g., 1162, an indication that the message is spam) when the user provides input to continue with the transfer reduces the likelihood that the user will participant in a transfer corresponding to the message without further investigating the transfer and/or message, thereby enhancing the security of the technique and reducing the number of fraudulent transfers. Reducing the number of fraudulent transfers enhances the operability of the device and makes the user-device interface more secure (e.g., by reducing fraud when operating/interacting with the device).

In some examples, the detail user interface (e.g., 1134) includes a cancellation affordance (e.g., 1141, an affordance for requesting a refund if the communication is related to a payment, an affordance for requesting return of a sent item/resource if the communication is related to an item/resource). The cancellation affordance is user-selectable when the communication is in the first state (e.g., 170). The electronic device (e.g., 1000, 1100) detects user activation of the cancellation affordance (e.g., 1141). In response to detecting the user activation of the cancellation affordance (e.g., 1141): in accordance with the determination that the communication has the first state, the electronic device transmits a second communication with the predetermined type of message to an external device associated with the communication requesting a return transfer of a first type of item that was transferred via the communication. In some examples, the cancellation affordance (e.g., 1141) is not user-selectable when the communication is in the second state. In some examples, the cancellation affordance (e.g., 1141) is not displayed when the communication is in the second state. In some examples, in accordance with the determination that the communication is in the second state (e.g., transitions to the second state from the first state) the electronic device causes the graphical representation of the communication to no longer be selectable, and provides (e.g., displays, on the display) an indication that the graphical representation of the communication is no longer selectable. In some examples, the cancellation affordance (e.g., 1141) is conditionally displayed depending on the state of the communication (e.g., in accordance with a determination that the communication has the first state, displaying the cancellation affordance in the detail user interface, and in accordance with a determination that the communication has the second state, forgoing display of the cancellation affordance in the detail user interface).

In some examples, the graphical representation of the communication (e.g., 1028, 1172) having the first state (e.g., message read for an incoming message, payment accepted for an incoming payment, message sent for an outgoing message, payment approved for an outgoing payment) includes a graphical indication (e.g., 1174) of a completed transfer of a first type of item (e.g., a sticker, a photo, or a payment object) between the electronic device (e.g., 1000, 1100) and an external device.

Note that details of the processes described above with respect to method 1200 (e.g., FIGS. 12A-12C) are also applicable in an analogous manner to the methods described herein. For example, method 1200 optionally includes one or more of the characteristics of the various methods described herein with reference to methods 900, 1500, 1800, 2100, 2400, 2700, 3000, and 3400. For example, concurrently displaying the representation of a message and a selectable indication that corresponds to a type of item (being transferred, such as a photo, sticker, resources, or a payment) as described in method 900 can be applied with respect to the graphical representation of a communication (e.g., 1118). For another example, the different visual appearances of a message object based on whether the message object corresponds to a transmission message or a request message, as described in method 1500, can be applied with respect to the graphical representation of a communication (e.g., 1118). For another example, a request for activating an account that is authorized to obtain one or items (e.g., a sticker, a photo, resources, a payment), as described in method 1800, can be applied with respect to the graphical representation of a communication (e.g., 1118) when retrieving one or more items (e.g., a sticker, a photo, resources, a payment) associated with the message. For another example, displaying representations of a first account and a second account, as described in method 2100, can also be displayed when authenticating/confirming an incoming transfer corresponding to the graphical representation of a communication (e.g., 1118). For another example, automatically proceeding with a transfer, as described in method 2400, instead of requiring user input, can also be used to accept the contents of a communication having the second state. For another example, the plurality of items including information from messages in a message conversation, as described in method 2700, can be displayed in response to user selection of the graphical representation of a communication (e.g., 1172). For another example, an utterance can be used, as described in method 3000, to create the graphical representation of a communication (e.g., 1118). For another example, a visual effect (e.g., a coloring effect, a geometric alteration effect) can be applied, as described in method 3400, to an element (e.g., 1122) of a graphical representation of a communication (e.g., 1118) when a transfer (e.g., of a resource, of a file, of a payment) associated with the communication is completed. For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 12A-12C are, optionally, implemented by components depicted in FIGS. 1A-1B. For example, displaying operation 1204, detecting operation 1212, displaying operation 1220, and displaying operation 1226 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 13A-13D illustrate example user interfaces for managing peer-to-peer transfers, in accordance with some embodiments. As described in greater detail below, the non-limiting example embodiment of the user interfaces illustrated in FIGS. 13A-13D relate to the non-limited example embodiment of the user interfaces illustrated in FIGS. 14A-14M, which are in turn used to illustrate the processes described below, including the processes in FIGS. 15A-15K.

Figure 13A:
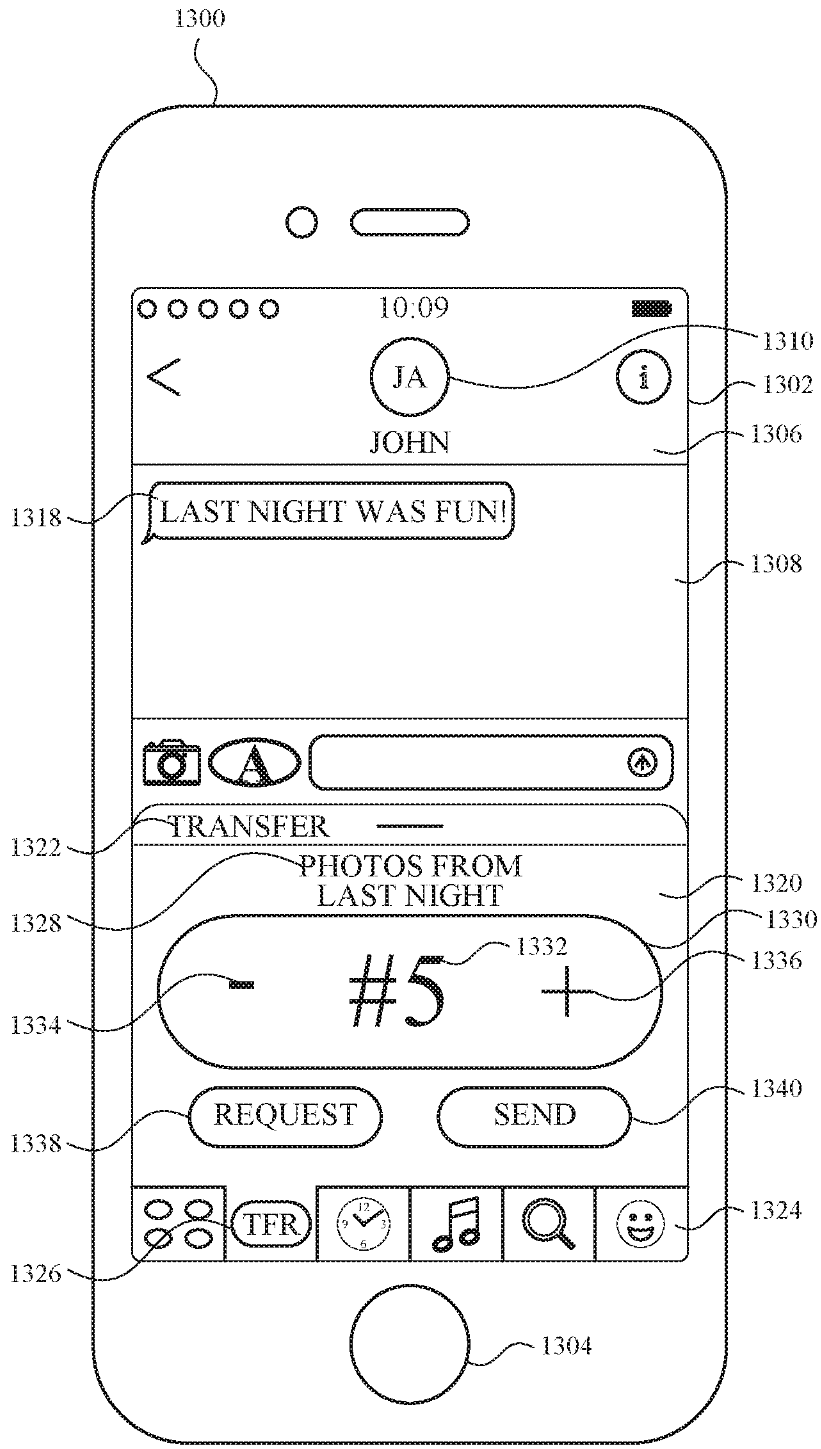
FIGS. 13A-13D illustrate example user interfaces for providing visually distinguishable message object appearances based on message designation, in accordance with some embodiments.

FIG. 13A illustrates an electronic device 1300 (e.g., portable multifunction device 100, device 300, or device 500). In the non-limiting example embodiment illustrated in FIGS. 13A-13D, electronic device 1300 is a smartphone. In other embodiments, electronic device 1300 can be a different type of electronic device, such as a wearable device (e.g., a smartwatch). Electronic device 1300 has a display 1302 and one or more input devices (e.g., touchscreen of display 1302, a mechanical button 1304, a mic).

In FIG. 13A, electronic device 1300 displays, on display 1302, a message conversation 1308 of a messaging application 1306 between a user of the device (e.g., "Kate Appleseed") and a message participant 1310 (e.g., "John Appleseed"). As shown in FIG. 13A, message conversation 1308 includes a message object 1318 corresponding to a message sent by message participant 1310 to the user. In message object 1318, message participant 1310 states: "Last night was fun."

FIG. 13A also shows electronic device 1300 displaying, on display 1302, a transfer user interface 1320 (e.g., for transferring a file, such as a photo, video file, audio file, or document, via messaging application 1306). In some embodiments, transfer user interface 1320 includes an indication 1322 (e.g., stating "TRANSFER") informing the user that the user interface corresponds to a (first-party, an operating-system controlled) application for transferring a file using messaging application 1306. In some embodiments, transfer user interface 1320 includes an interface switching menu bar 1324 that includes a plurality of shortcut icons for switching between different user interfaces (e.g., switching between transfer user interface 1320 and a user interface for playing music) associated with different application features (e.g., manage peer-to-peer transfers, play music, set alarm clock) accessible from within messaging application 1306 while maintain display of message conversation 1308. In some embodiments, the plurality of shortcut icons of interface switching menu bar 1324 correspond to different applications, thus enabling the user to quickly switch between user interfaces of different applications. In some embodiments, interface switching menu bar 1324 includes a transfer shortcut icon 1326 corresponding to transfer user interface 1320. Thus, because transfer user interface 1320 is the currently-displayed user interface, the device shows transfer shortcut icon 1326 currently being selected within interface switching menu bar 1324.

As also shown in FIG. 13A, transfer user interface 1320 includes a request button 1338 for initiating a request for a transfer of a file from a different user (e.g., message participant 1310) via messaging application 1306 and send button 1340 for initiating a transfer of a file to a different user (e.g., message participant 1310) via messaging application 1306.

As also shown in FIG. 13A, transfer user interface 1320 includes a value change region 1330 that includes an indication 1332 (e.g., stating "#5") of a number of files (e.g., a number of photos, a number of video files, a number of audio files, a number of documents) to be transferred or a specific file (e.g., a fifth photo, a fifth video file, a fifth audio file, a fifth document) to be transferred. In some embodiments, transfer user interface 1320 is pre-populated with a number of files (or a specific file) to be transferred based on an analysis of the content of the message corresponding to message object 1318 (e.g., similar to the pre-selection process described above with respect to FIGS. 7A-7E). In some embodiments, the pre-populated number in indication 1332 includes a symbol (e.g., "#") indicating that the numerical value in indication 1332 relates to a number of files. In some embodiments, transfer user interface 1320 includes an indication 1328 (e.g., stating "Photos from last night") informing the user of the type of files (e.g., photos) and the specific files from the type of files (e.g., photos from last night) that are selected to be transferred. In some embodiments, value change region 1330 also includes a value increase button 1336 (e.g., indicated as a "+") for increasing the displayed numerical value amount (e.g., "#5") within indication 1332 and a value decrease button 1334 (e.g., indicated as a "−") for decreasing the displayed numerical value (e.g., "#5") within indication 1332.

Figure 13B:
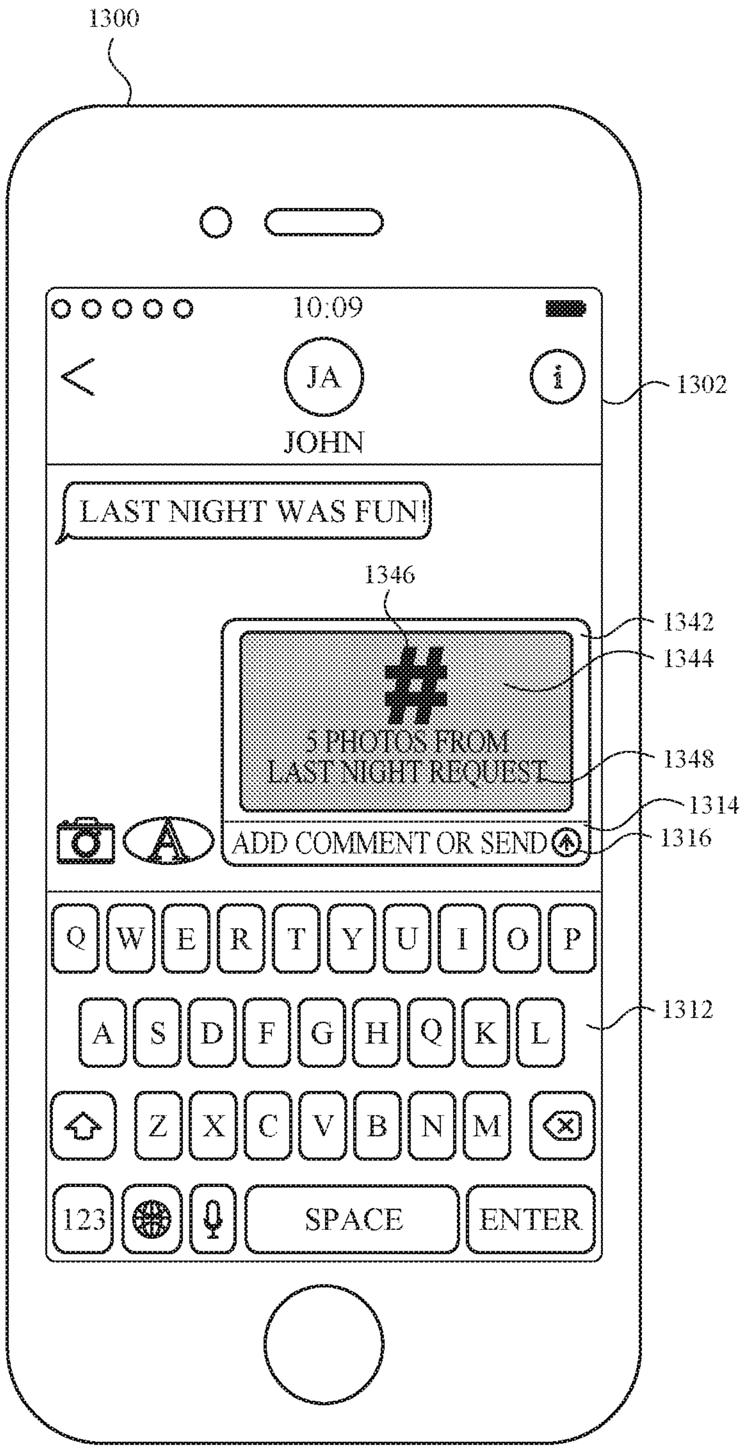

FIG. 13B shows electronic device 1300 displaying, on display 1302, in response to detecting user activation of request button 1338, a request message object 1344 corresponding to a request (e.g., made by the user to message participant 1310) for transfer of 5 photos (selected via transfer user interface 1320 in FIG. 13A) from last night. In some embodiments, in response to the user activation of request button 1338, the device displays (e.g., replaces display of transfer user interface 1320 with), on display 1302, a virtual keyboard 1312.

In some embodiments, as shown in FIG. 13B, request message object 1344 is displayed within an expanded compose region 1342, which is an extension of a compose region 1314, to indicate to the user that the message object has not yet been transmitted to the intended recipient (e.g., message participant 1310). In some embodiments, compose region 1314 includes a send button 1316 for transmitting the message object.

In some embodiments, request message object 1344 includes a request indicator 1346 (e.g., showing "#") that indicates to the user that the transfer associated with the message object is a request for files (e.g., a request for the 5 photos from last night), as opposed to an outgoing transfer of files. In some embodiments, request message object 1344 also includes a textual indication 1348 (e.g., stating "5 photos from last night request") of the specific files (e.g., type of files, number of files) that are being requested. In some embodiments, as also shown in FIG. 13B, request indicator 1346 is displayed in a different font (e.g., a thicker font, a bolder font, a special type of reserved for transfer requests) than textual indication 1348.

Figure 13C:
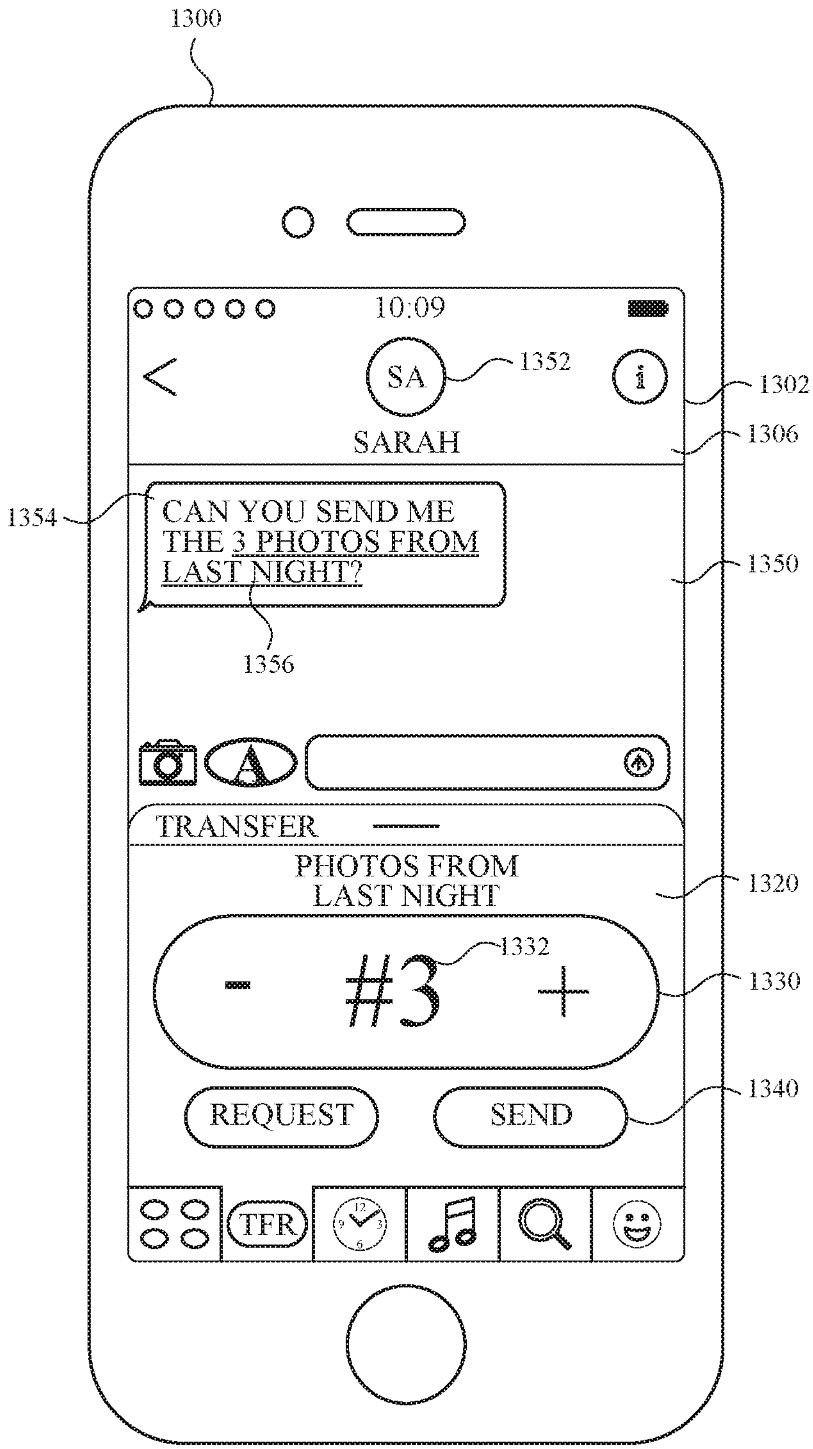

In FIG. 13C, electronic device 1300 displays, on display 1302, a message conversation 1350, different from message conversation 1308, of messaging application 1306 between a user of the device (e.g., "Kate Appleseed") and a message participant 1352 (e.g., "Sarah James"). As shown in FIG. 13C, message conversation 1350 includes a message object 1354 corresponding to a message sent by message participant 1352 to the user. In message object 1354, message participant 1352 states: "Can you send me the 3 photos from last night?"

FIG. 13C also shows electronic device 1300 displaying, on display 1302, transfer user interface 1320. In some embodiments, transfer user interface 1320 is displayed in response to detecting user selection of a marking 1356 of a phrase (e.g., stating "3 photos from last night") of the message corresponding to message object 1354. In some embodiments, marking 1356 is applied to message object 1354 based on an analysis (e.g., by the device, by a remote server communicating with the device) of the contents (e.g., the text) of the message corresponding to the message object and a determination that a phrase of the text relates to a request for transfer of one or more files (e.g., photos, video files, audio files, documents).

As shown in FIG. 13C, value change region 1330 of transfer user interface 1320 includes indication 1332 (e.g., stating "#3") showing a numerical value that corresponds to a number of files (e.g., a number of photos, a number of video files, a number of audio files, a number of documents) that are being requested to be transferred or a specific file (e.g., a third photo, a third video file, a third audio file, a third document) that are being requested to be transferred by message participant 1352. In some embodiments, transfer user interface 1320 is pre-populated with the number of files (or the specific file) that is being requested to be transferred based on the analysis of the content of the message corresponding to message object 131354 (e.g., similar to the pre-selection process described above with respect to FIGS. 7A-7E).

Figure 13D:
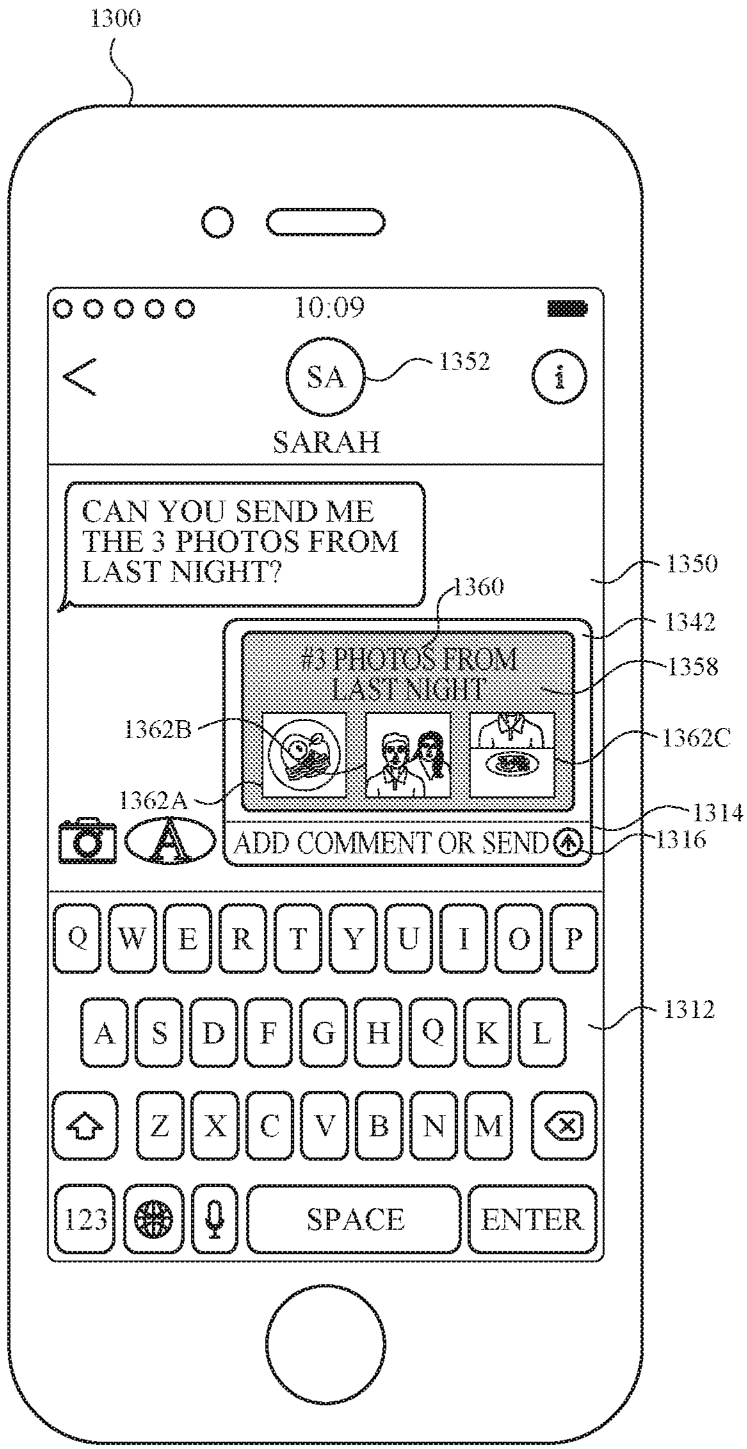

FIG. 13D shows electronic device 1300 displaying, on display 1302, in response to detecting user activation of send button 1340, a send message object 1360 corresponding to an outgoing transfer (e.g., to message participant 1352) 3 photos (selected via transfer user interface 1320 in FIG. 13C) from last night. In some embodiments, in response to the user activation of send button 1340, the device displays (e.g., replaces display of transfer user interface 1320 with), on display 1302, a virtual keyboard 1312.

In some embodiments, as shown in FIG. 13D, send message object 1358 is displayed within expanded compose region 1342 to indicate to the user that the message object has not yet been transmitted to the intended recipient (e.g., message participant 1352). In some embodiments, compose region 1314 includes a send button 1316 for transmitting the message object.

In some embodiments, send message object 1358 includes a textual indication 1360 (e.g., stating "#3 photos from last night") of the specific files (e.g., type of files, number of files) that are being transferred. In some embodiments, send message object 1358 includes a plurality of (selectable)

mini-file objects 1362A-1362C corresponding to the photos that are being transferred via the transfer associated with send message object 1358.

As mentioned above, the non-limiting example embodiment of the user interfaces illustrated in FIGS. 13A-13D described above relate to the non-limited example embodiment of the user interfaces illustrated in FIGS. 14A-14M described below. Therefore, it is to be understood that the processes described above with respect to the example user interfaces illustrated in FIGS. 13A-13D and the processes described below with respect to the example user interfaces illustrated in FIGS. 14A-14M are largely analogous processes that similarly involve initiating and managing transfers using an electronic device (e.g., 100, 300, 500, 1300, or 1400).

FIGS. 14A-14M illustrate example user interfaces for peer-to-peer transfers, in accordance with some embodiments. The user interfaces in these figures are used to illustrate the processes described below, including the processes in FIGS. 15A-15K.

Figure 14A:
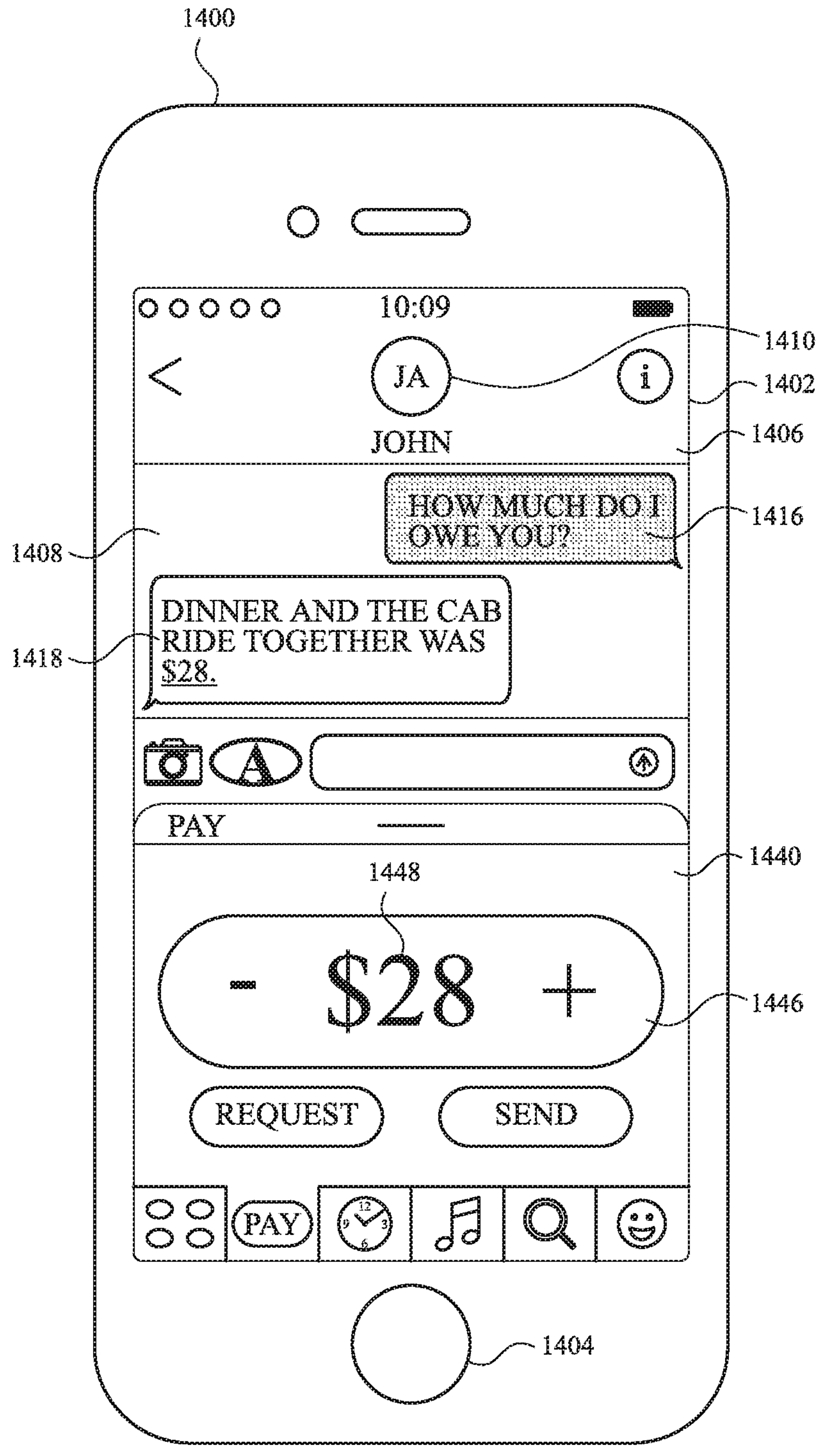
FIGS. 14A-14M illustrate example user interfaces for providing visually distinguishable message object appearances based on message designation, in accordance with some embodiments.

FIG. 14A illustrates an electronic device 1400 (e.g., portable multifunction device 100, device 300, or device 500). In the non-limiting example embodiment illustrated in FIGS. 14A-14M, electronic device 1400 is a smartphone. In other embodiments, electronic device 1400 can be a different type of electronic device, such as a wearable device (e.g., a smartwatch). Electronic device 1400 has a display 1402 and one or more input devices (e.g., touchscreen of display 1402, a mechanical button 1404, a mic).

In FIG. 14A, electronic device 1400 displays, on display 1402, a message conversation 1408 of a messaging application 1406 corresponding to message conversation 808 of messaging application 806 described above, for example, with reference to FIGS. 8A-8B. As in FIGS. 8A-8B, message conversation 1408 of messaging application 1406 is between a user of the device (e.g., "Kate Appleseed") and a message participant 1410 (e.g., "John Appleseed").

As shown in FIG. 14A, message conversation 1408 includes two visible message objects 1416 and 1418. Message object 1416 corresponds to message object 818 of FIGS. 8A-8B (e.g., a message sent by the user to message participant 1410). Message object 1418 corresponds to message object 820 of FIGS. 8A-8B (e.g., a message sent by message participant 1410 to the user). In message object 1416, the user asks message participant 1410: "How much do I owe you?" In message object 1418, message participant 1410 responds: "Dinner and the cab ride together was $28."

FIG. 14A also shows a payment transfer user interface 1440 that corresponds to payment transfer user interface 840 described above, for example, with reference to FIGS. 8E-8P. As with payment transfer user interface 840, payment transfer user interface 1440 displays, in an amount indication 1448 of a value change region 1446, the amount (e.g., "$28") of the payment requested by message participant 1410 in the message corresponding to message object 1418 pre-populated. For example, as described above with respect to payment transfer user interface 840, electronic device 1400 pre-populates the payment amount in payment transfer user interface based an analysis of the contents (e.g., the text) of message object 1418. In some embodiments, the analysis is performed by electronic device 1400 using a language processing component or a language analysis component of the device. In some embodiments, the analysis is performed at an external device (e.g., a server), and the device receives a result of the analysis from the external device.

Figure 14B:
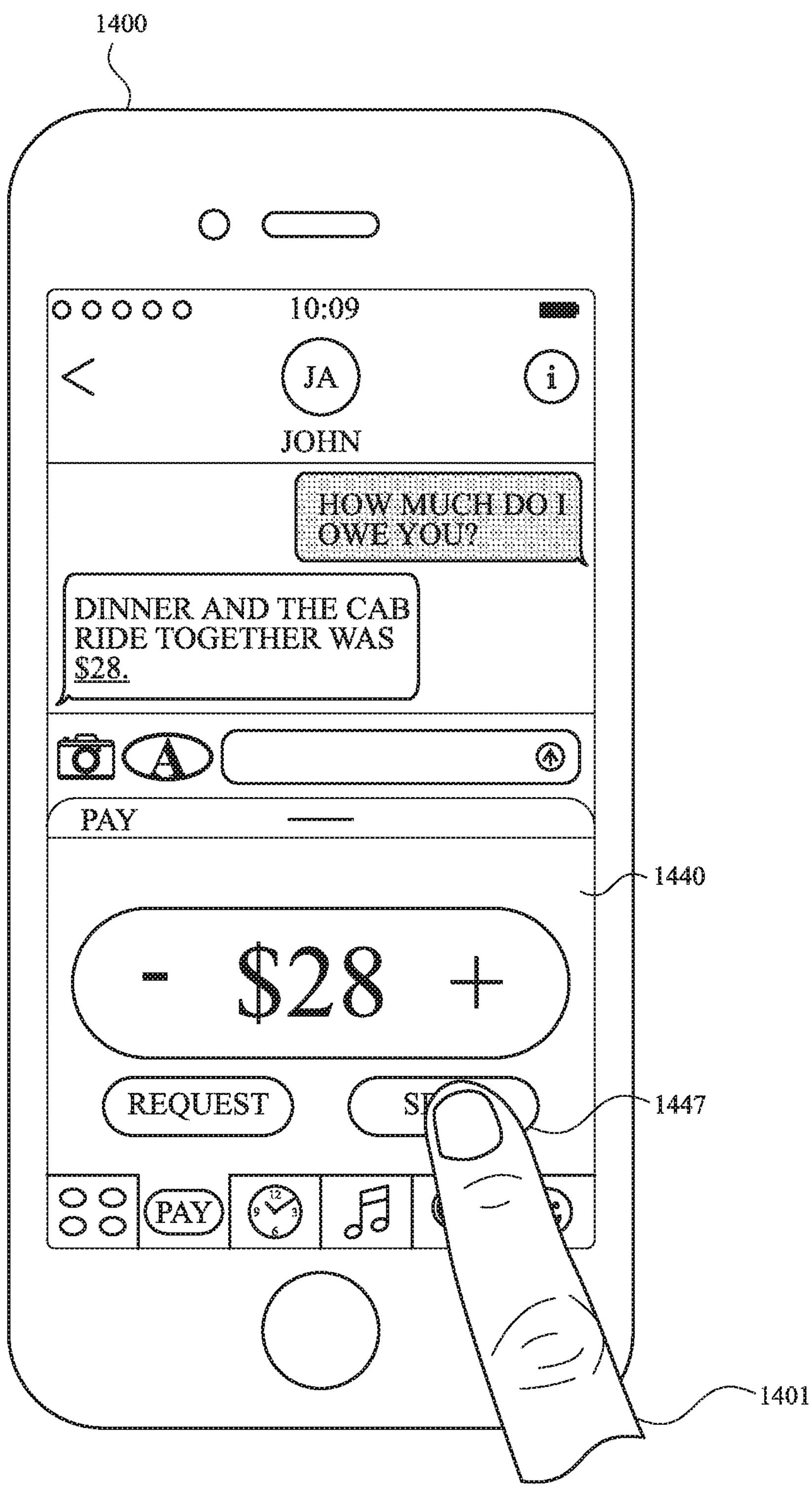

In FIG. 14B, while displaying payment user interface 1440, electronic device 1400 detects a user input on send button 1447 of payment transfer user interface 1440, which corresponds to send button 847 of payment transfer user interface 840 described above, for example, with reference to FIGS. 8E-8P. For example, as shown in FIG. 14B, the user input is a tap gestures 1401 on send button 1447.

Figure 14C:
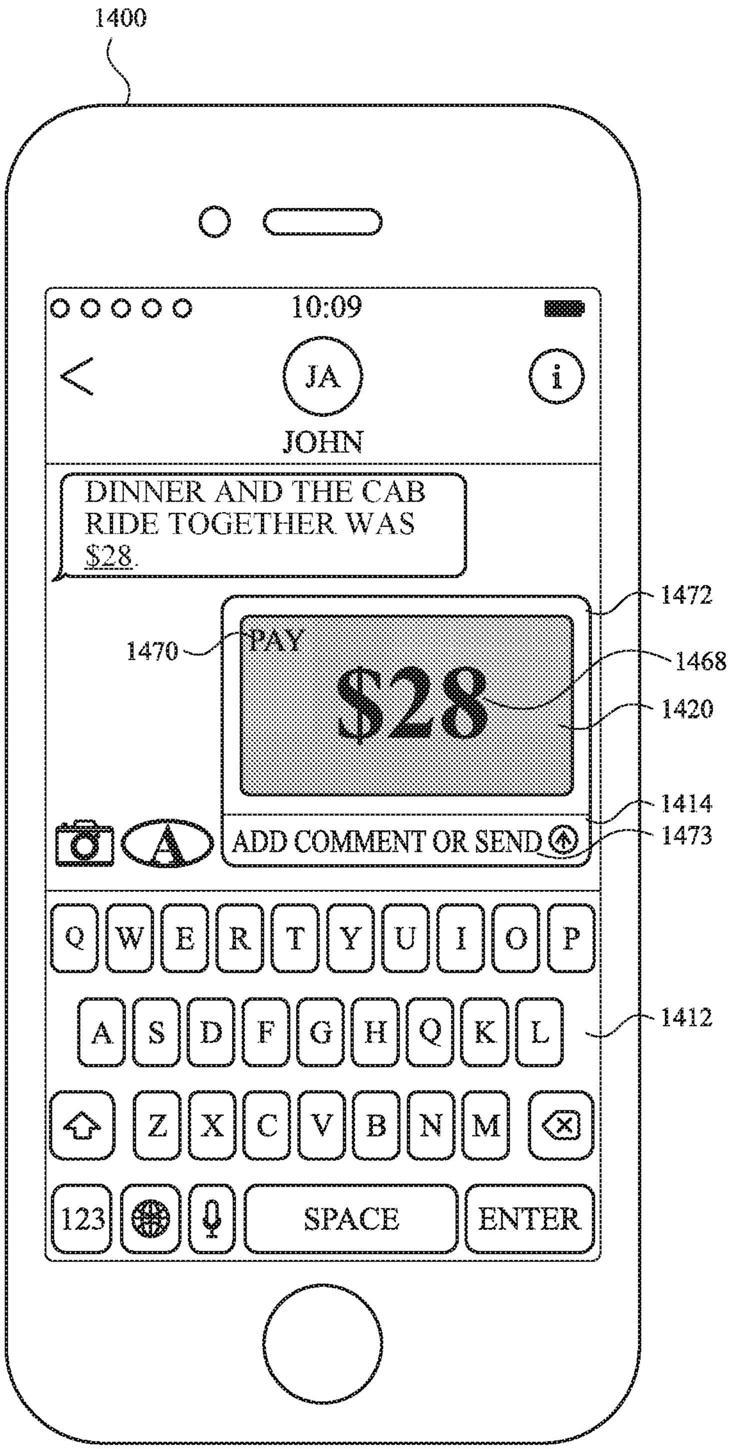

In FIG. 14C, in response to detecting tap gesture 1401 on send button 1447, electronic device 1400 displays an expanded compose bar 1472 (e.g., an expanded region of the compose region that is adjacent to/above a compose bar 1414), corresponding to expanded compose bar 872 described, for example, with reference to FIGS. 8Q-8W, with a payment message object 1420, corresponding to payment message object 866 described, for example, with reference to FIGS. 8Q-8W, located inside expanded compose bar 1472. Payment message object 1420 corresponds to a payment (e.g., an outgoing payment from the user to message participant 1410).

As mentioned above, the payment message object being located within expanded compose bar 1472 indicates to the user that the payment corresponding to payment message object 1420 has not yet been sent (to message participant 1410) but is being created. As also described above with reference to FIGS. 8Q-8W, payment message object 1420 includes an amount indication 1468 (e.g., "$28"), corresponding to amount indication 868 of payment message object 866, of the amount of the payment to be sent by message participant 1410 to the user and a mode indication 1470 (e.g., stating "PAY"), corresponding to mode indication 870, indicating that the payment message object corresponds to a payment made via an operating-system controlled payment transfer application (and not by a third-party application).

Figure 14D:
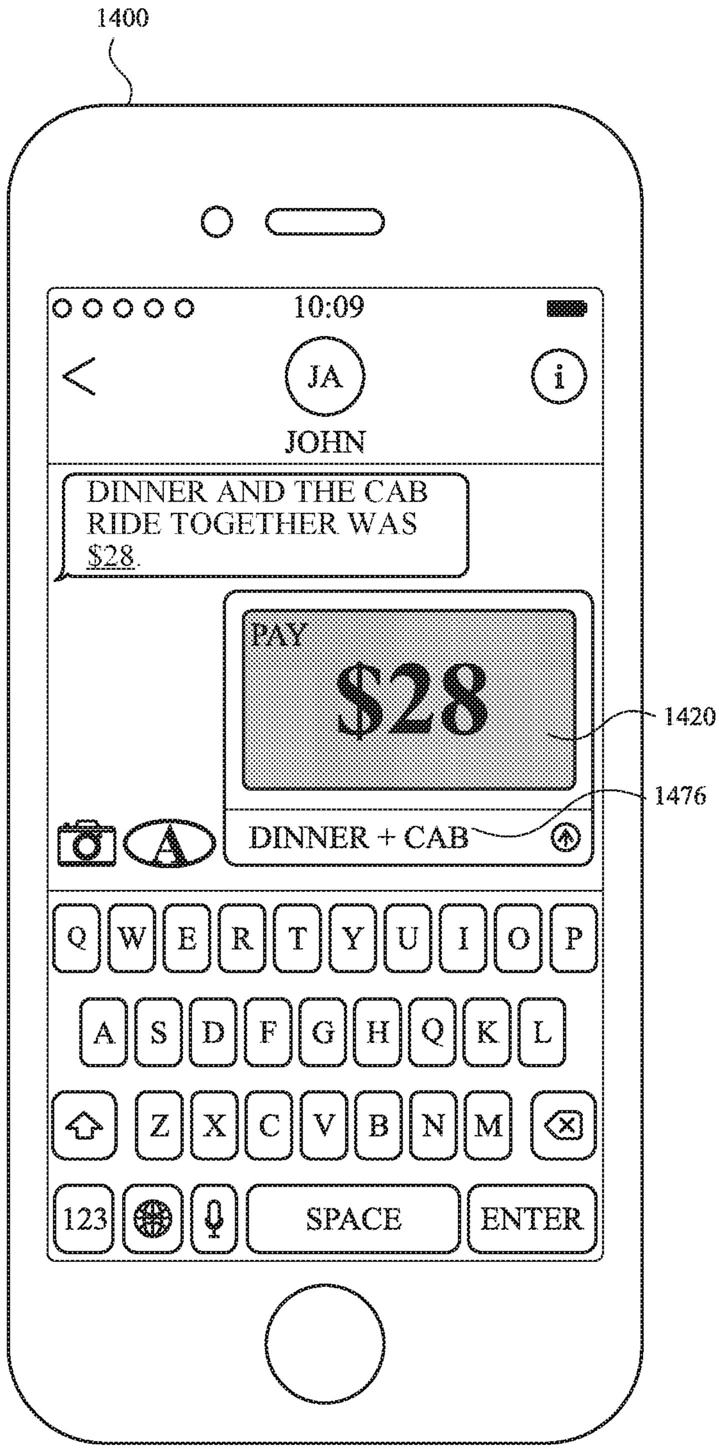

As also shown in FIG. 14C, electronic device displays compose bar 1414, corresponding to compose bar 814, for entering (e.g., via typing on virtual keyboard 1412) a note (e.g., a comment or message) accompanying a sent payment message object. In some embodiments, in response to detecting (e.g., via a tap gesture) user input on compose bar 1414 (which, in some examples, includes an indication 1473 stating "Add Comment or Send" informing the user that a note can be added), electronic device 1400 displays (e.g., replaces display of indication 1473 with) a cursor indicating that a note (e.g., comment or message) is ready to be inputted (e.g., typed) into compose bar 1414 (e.g., using virtual keyboard 1412). For example, FIG. 14D shows a note 1476 (e.g., "Dinner+Cab") added by the user to accompany payment message object 1420.

Figure 14E:
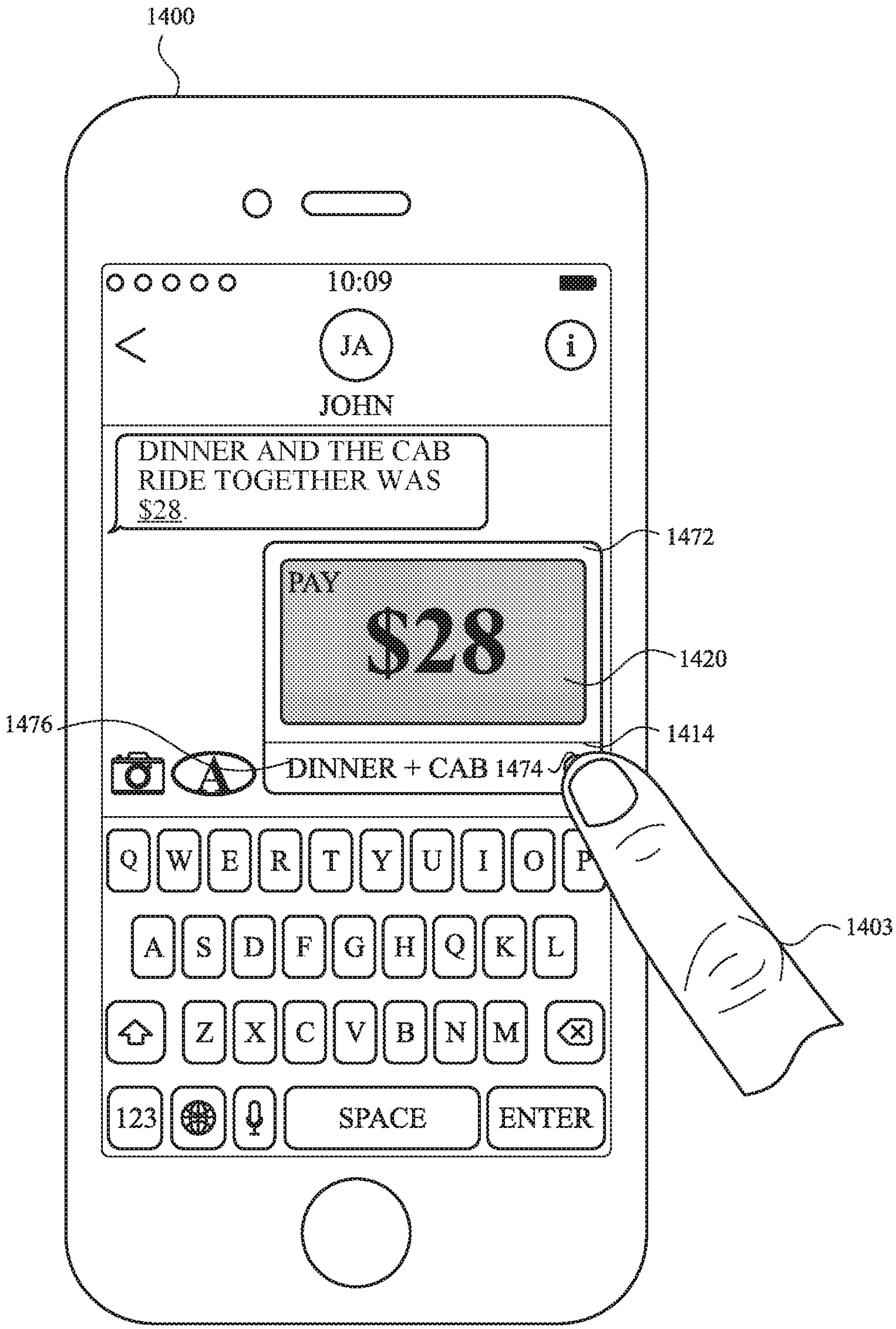

In FIG. 14E, while displaying payment message object 1420 within expanded compose bar 1472 and note 1476 within compose bar 1414 added to the payment, electronic device 1400 detects user activation of a final send button 1474 (corresponding to final send button 874). For example, the user activation is a tap gesture 1403 on final send button 1474.

Figure 14F:
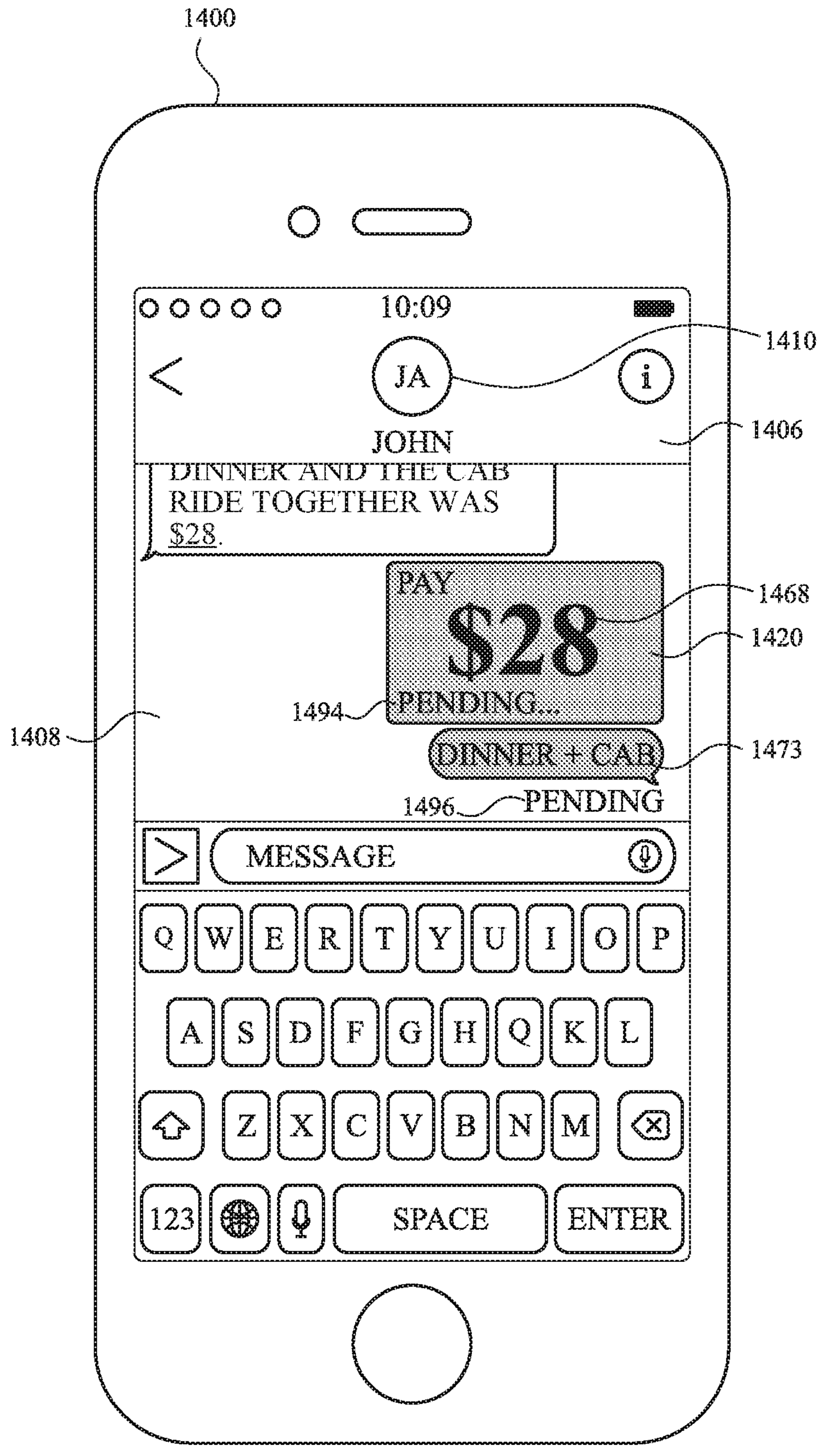

In FIG. 14F, upon successful user authentication (e.g., via the authentication process described in FIGS. 8T-8U using a payment confirmation user interface, such as payment confirmation user interface 878), electronic device 1400 displays virtual keyboard 1412 (e.g., in place of a removed payment confirmation user interface). Further, the device displays payment message object 1420 within message conversation 1408 of messaging application 1406, thereby indicating to the user that the payment corresponding to payment message object 1420 has been sent to message participant 1410. In addition, the device also displays, adjacent to (or below or within) payment message object 1420, a note message object 1473 corresponding to note 1472 added by the user to accompany the payment.

Further, in some embodiments, sent payment message object 1420 includes a first status indicator 1494 (corresponding to status indicator 894) informing the user of a status of the payment corresponding to the sent payment message object (e.g., "pending," "paid," "accepted," "expired"). For example, in FIG. 14F, first status indicator 1494 shows "pending," thus indicating to the user that the payment associated with sent payment message object 866 has not yet been accepted by message participant 1410. In some embodiments, the device also displays (in addition to or instead of first status indicator 1494) a second status indicator 1496 (corresponding to status indicator 896) informing the user of a status of the payment corresponding to the sent payment message object (e.g., "pending," "paid," "accepted," "expired"). For example, as shown in FIG. 14F, second status indicator 1496 (e.g., "pending") shows the same status as shown by first status indicator 1494 (e.g., "pending").

Further, in some embodiments, because payment message object 1420 corresponds to a payment by the user (instead of a payment request), amount indication 1468 of payment message object 1420 displays the numerical value of the payment amount (e.g., "$28") in a payment font that is predetermined (or controlled, set, configured) by the operating system (of the device) to be associated with payments generated using the payment transfer user interface. In some embodiments, the payment font is type of font that is larger (in size) than a font used for regular text message object (e.g., message object 1418 in the messaging application).

Figure 14G:
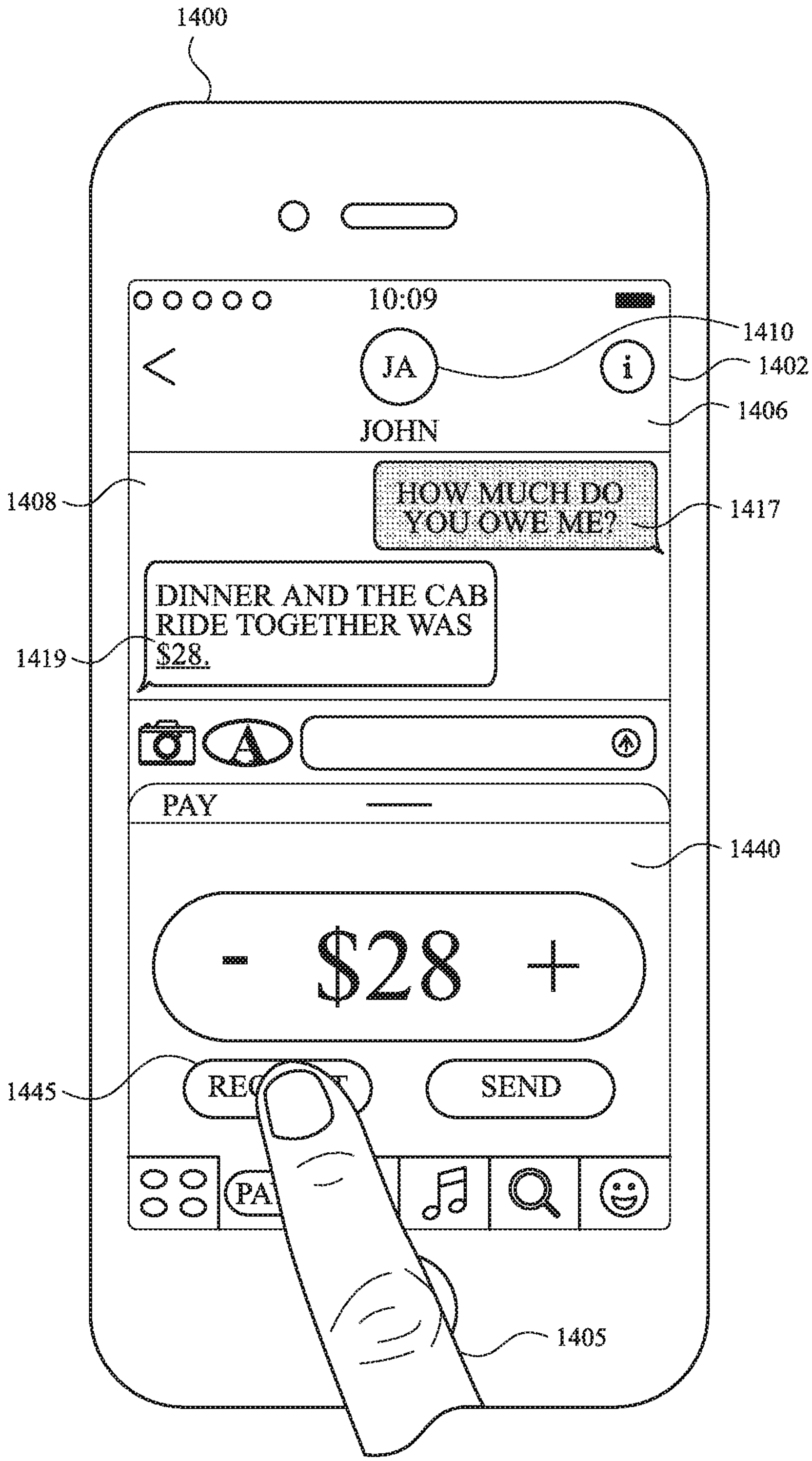

FIG. 14G shows electronic device 1400 displaying, on display 1402, message conversation 1408 of messaging application 1406 showing message object 1417 (e.g., corresponding to a message sent by the user to message participant 1410 asking "How much do you owe me?") and message object 1419 (e.g., corresponding to a message sent by message participant 1410 to the user responding "Dinner and the cab ride together was $28.") and payment transfer user interface 1440 with the payment amount (e.g., "$28") pre-populated, as described above with reference to FIG. 14A.

In FIG. 14G, while displaying payment transfer user interface 1440 with the payment amount (e.g., "$28") pre-populated, electronic device 1400 detects a user activation of request button 1445 (corresponding to request button 845) of payment transfer user interface 1440. For example, as shown in FIG. 14G, the user activation is a tap gesture 1405 on request button 1445.

Figure 14H:
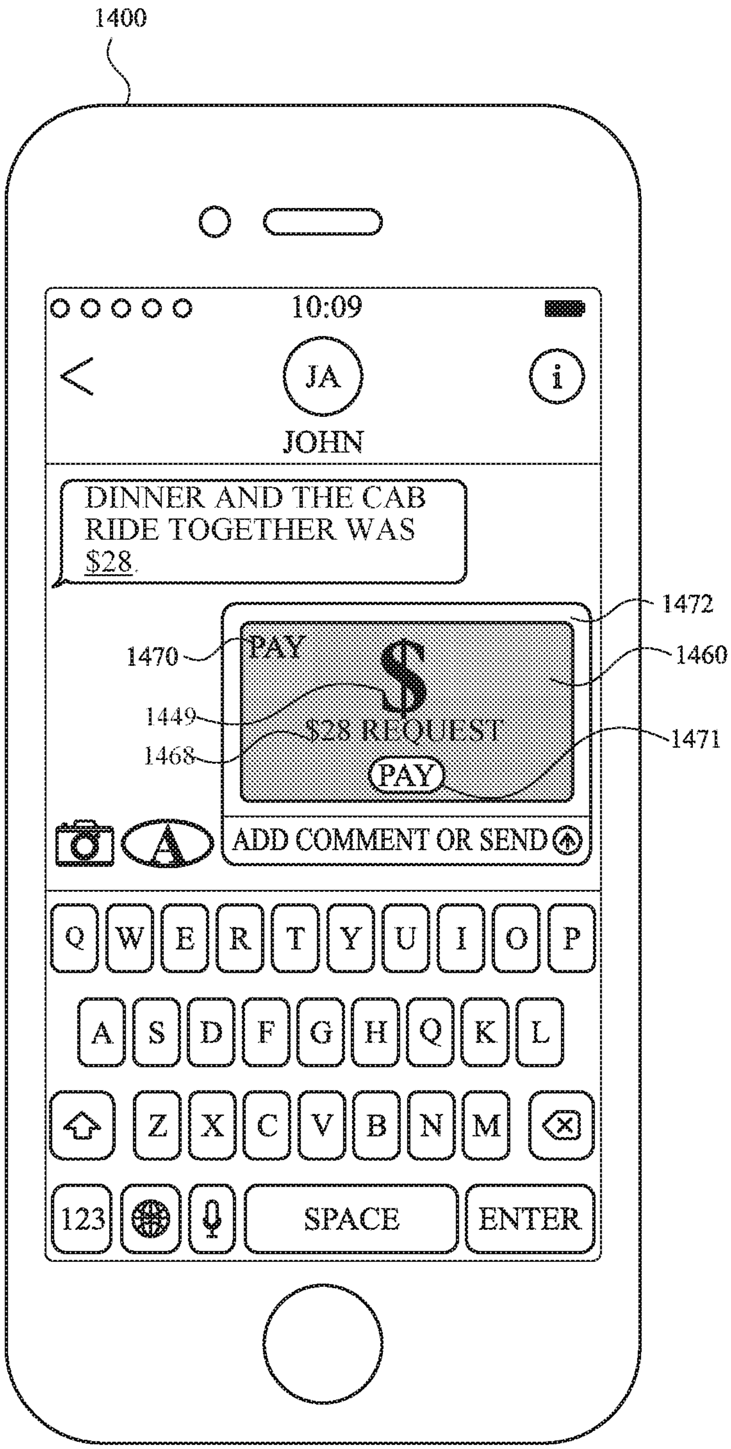

In FIG. 14H, in response to detecting tap gesture 1405 on request button 1445, electronic device 1400 displays a pending payment message object 1460 within expanded compose bar 1472. Unlike payment message object 1420 (which corresponds to a payment by the user), payment message object 1460 corresponds to a request for payment (a payment request), by the user (e.g., to message participant 1410). In some embodiments, a payment message object that corresponds to a payment request (e.g., payment message object 1460) (instead of a payment) includes additional information in payment amount indication 1468 (e.g., additional text) (e.g., "$28 Request") informing the user that the payment message object corresponds to a payment request (as opposed to a payment). In some embodiments, a payment message object that corresponds to a payment request (instead of a payment) (e.g., payment message object 1460) also includes a mode indication 1470 (e.g., stating "PAY") indicating that the payment message object corresponds to a payment made via an operating-system controlled payment transfer application (and not by a third-party application). In some embodiments, payment message object 1460 that corresponds to a payment request also includes an accept button 1471.

Further, in some embodiments, as also shown in FIG. 14H, a payment message object corresponding to a payment request (e.g., payment message object 1460) (instead of a payment) includes a request indicator 1449 that indicates to the user that the payment message object corresponds to a payment request (e.g., a payment request made by the user of the device to a message participant or a payment request sent by a message participant to the user) and not to a payment. In some embodiments, as shown in FIG. 14H, request indicator 1449 is a currency symbol (e.g., the dollar symbol "$") displayed at a center region of the message object. In some embodiments, request indicator 1449 is a graphical symbol. In some embodiments, the visual characteristics (e.g., font type, boldness/thickness, color, shading, dynamic feedback, such as a 3D effect) of request indicator 1449 correspond with the visual characteristics (e.g., font type, boldness/thickness, color, shading, dynamic feedback, such as a 3D effect) of an amount indication of a payment message object that corresponds to a (pending or completed) payment (e.g., amount indication 1468 of payment message objects 1420, 1491). In some embodiments, the visual characteristics (e.g., font type, boldness/thickness, color, shading, dynamic feedback, such as a 3D effect) of request indicator 1449 are different from (and thus does not correspond with) the visual characteristics (e.g., font type, boldness/thickness, color, shading) of an amount indication of a payment message object that corresponds to a (pending or completed) payment request (e.g., amount indication 1468 of payment message objects 1460, 1490).

Figure 14I:
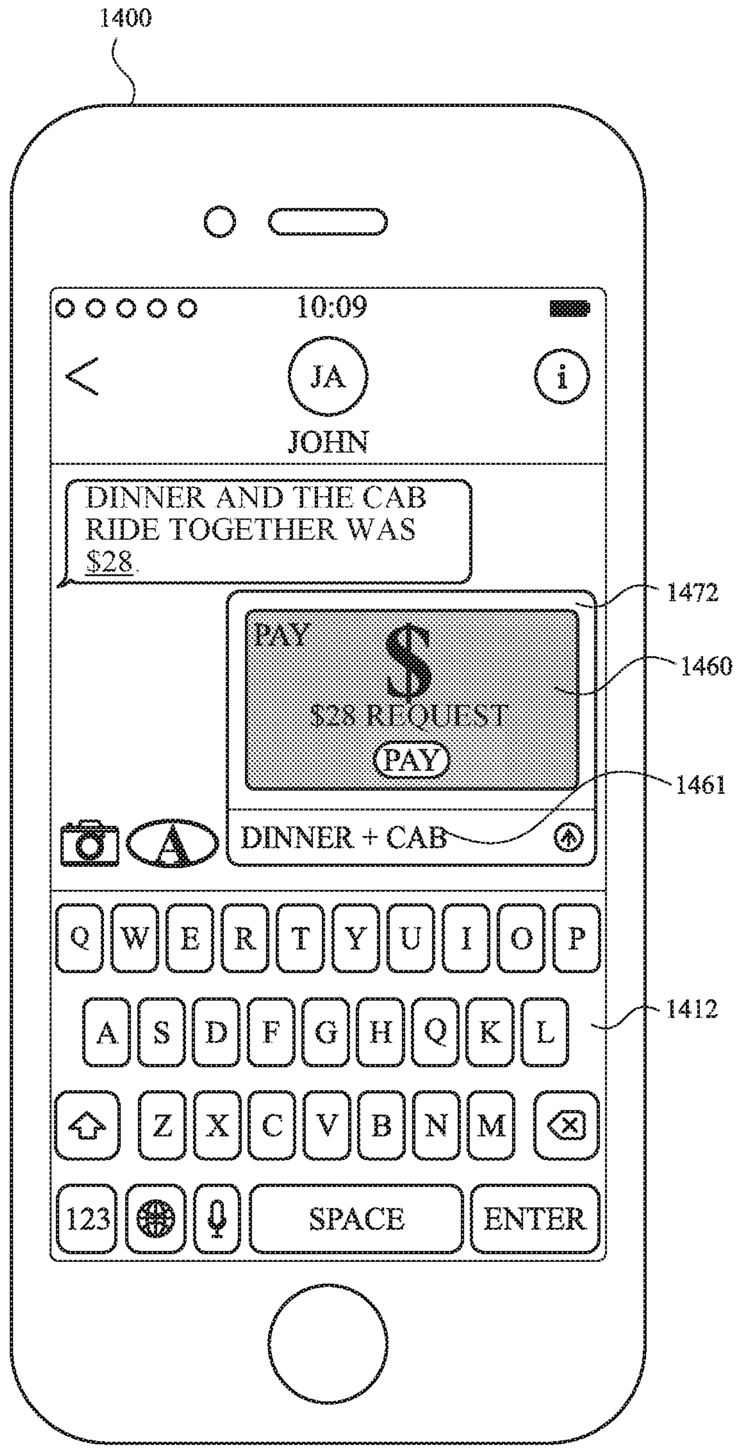

In FIG. 14I, while displaying payment message object 1460 (corresponding to a payment request) within expanded compose bar 1472, the device receives user input of a note 1461 (e.g., using virtual keyboard 1412) to accompany the payment request. For example, in FIG. 14, note 1461 to accompany the payment request of payment message object 1460 states "Dinner+Cab."

Figure 14J:
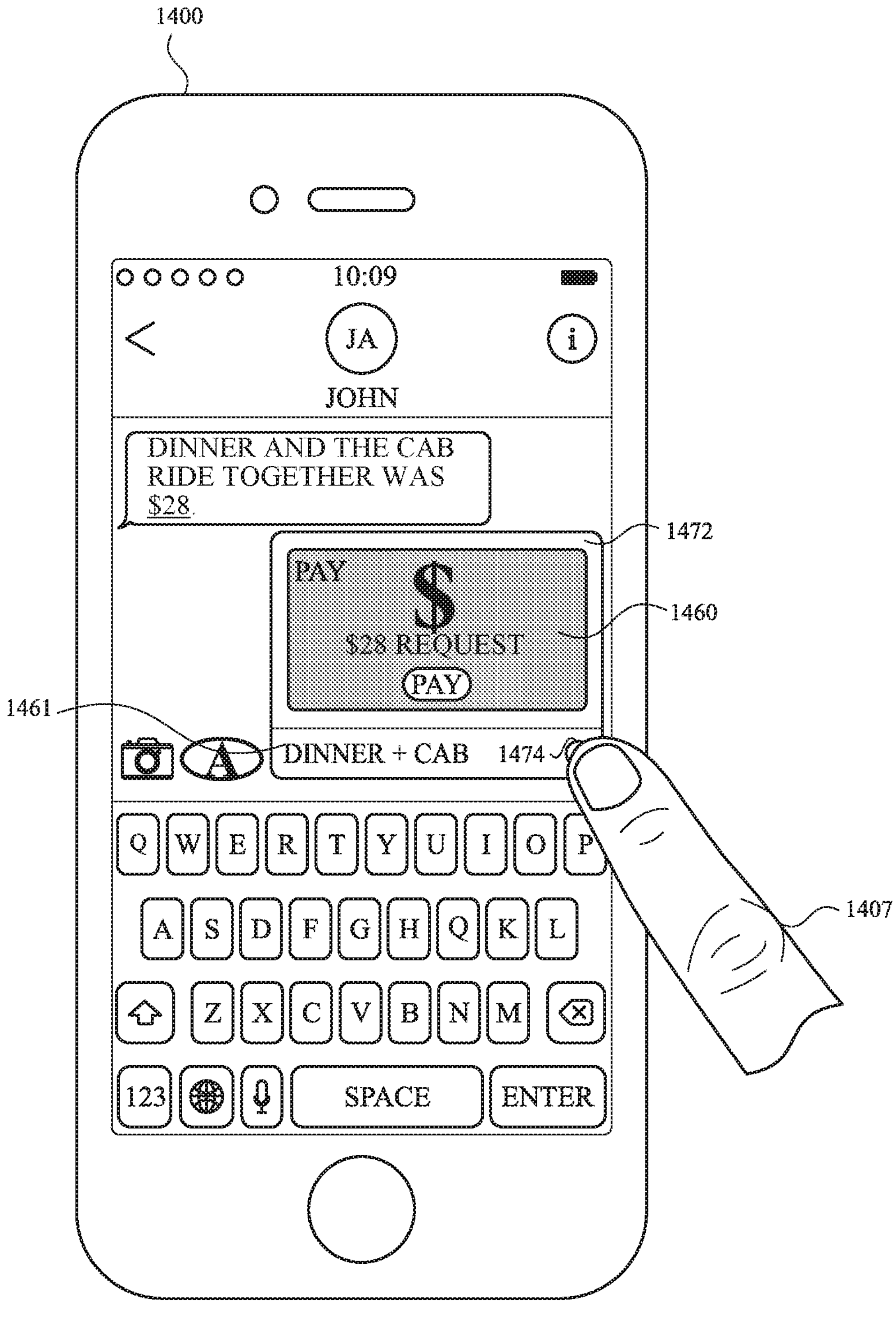

In FIG. 14J, while displaying payment request displaying payment message object 1460 (corresponding to a payment request) within expanded compose bar 1472 and note 1461 (e.g., "Dinner+Cab") in compose bar 1414, electronic device 1400 detects a user activation of final send button 1474. For example, as shown in FIG. 14J, the user activation is tap gesture 1407 on final send button 1474.

Figure 14K:
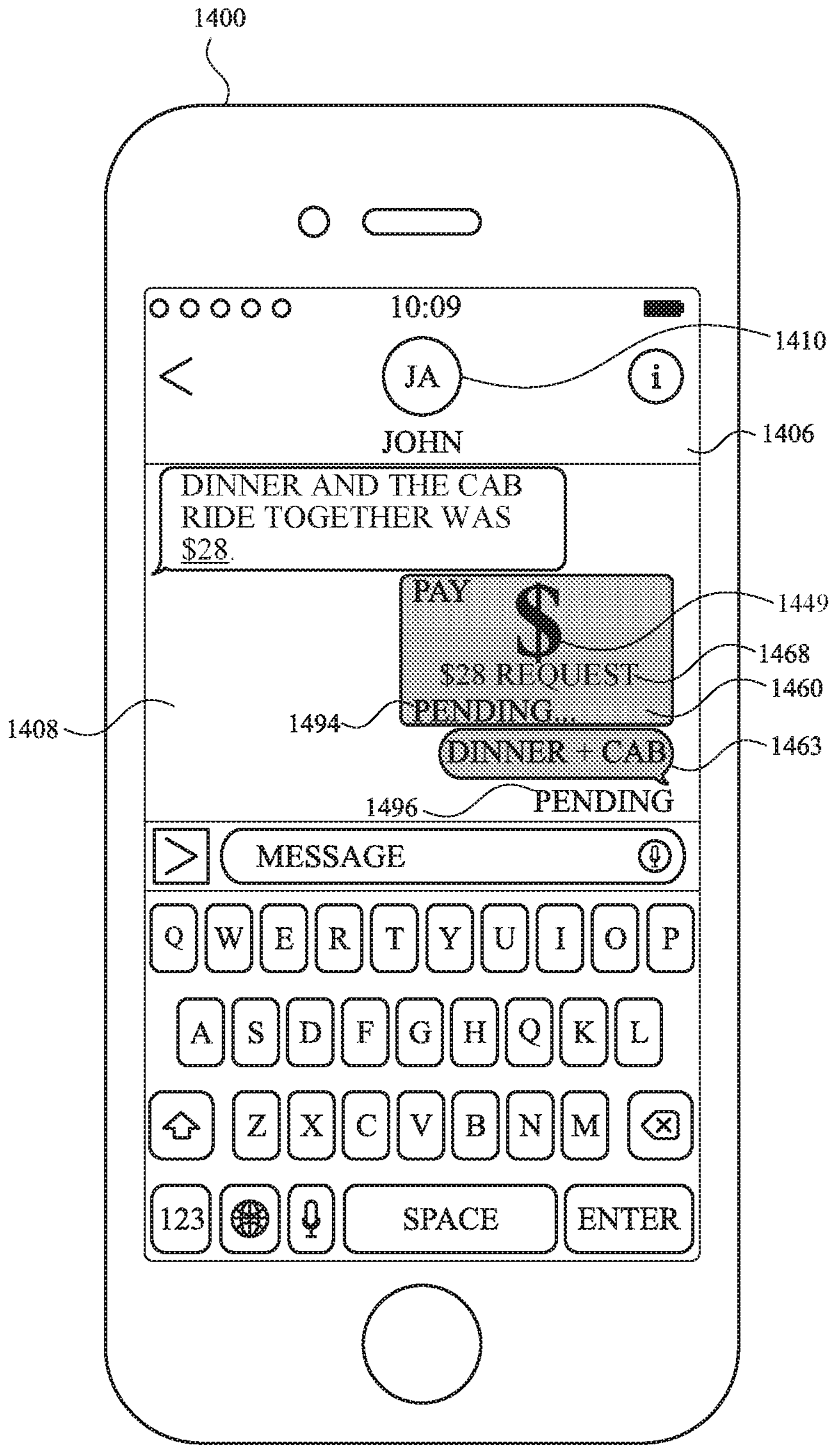

In FIG. 14K, in response to detecting tap gesture 1407 on final send button 1474, electronic device 1400 displays payment message object 1460 (corresponding to a payment request) within message conversation 1408 of messaging application 1406, thereby indicating to the user that the payment corresponding to payment message object 1420 has been sent to message participant 1410. The device also displays, adjacent to (or below or within) payment message object 1420, note message object 1463 corresponding to note 1461 added by the user to accompany the payment.

Further, in some embodiments, sent payment message object 1460 (corresponding to a payment request) includes first status indicator 1494 informing the user of a status of the payment request corresponding to the sent payment message object (e.g., "pending," "paid," "accepted," "expired"). For example, in FIG. 14F, first status indicator 1494 shows "pending," thus indicating to the user that the payment request associated with sent payment message object 1460 has not yet been accepted (i.e., the payment has not yet been made) by message participant 1410. In some embodiments, second status indicator 1496 (corresponding to status indicator 896) is displayed (in addition to or instead of first status indicator 1494) informing the user of a status of the payment request corresponding to the sent payment message object (e.g., "pending," "paid," "accepted," "expired"). For example, as shown in FIG. 14K, second status indicator 1496 (e.g., "pending") shows the same status as shown by first status indicator 1494 (e.g., "pending").

Figure 14L:
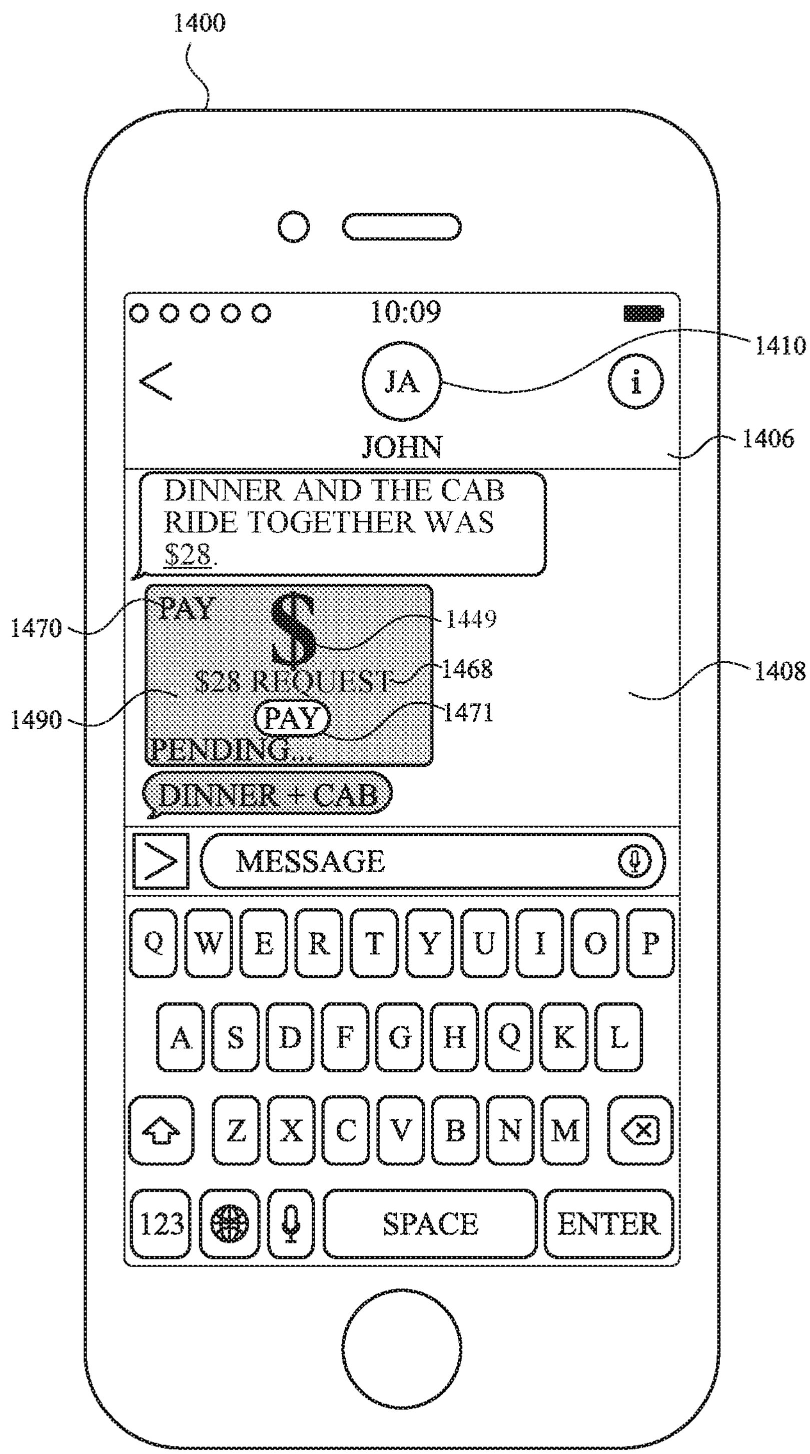

FIG. 14L shows a payment message object 1490 within conversation 1408 with message participant 1410 (e.g., "John Appleseed") sent by message participant 1410 to the user. In some embodiments, payment message object 1490 includes elements that are analogous to elements of payment message object 1460 corresponding to a payment request that is sent by the user to the message participant. For example, as with payment message object 1460, payment message object 1490 includes amount indication 1468 includes additional information (e.g., additional text) (e.g., "$28 Request") informing the user that the payment message object corresponds to a payment request (as opposed to a payment). For another example, as with payment message object 1460, payment message object 1490 includes mode indication 1470 (e.g., stating "PAY") indicating that the payment message object corresponds to a payment made via an operating-system controlled payment transfer application (and not by a third-party application). For another example, as with payment message object 1460, payment message object 1490 includes an accept button 1471 (e.g., stating "PAY") for accepting the payment request (i.e., to make the payment requested by the payment request).

In some embodiments, as with payment message object 1460 shown in FIG. 14H, payment message object 1490, because it corresponds to a payment request (instead of a payment) includes a request indicator 1449 that indicates to the user that the payment message object corresponds to a payment request and not to a payment. In some embodiments, as shown in FIG. 14L, request indicator 1449 is a currency symbol (e.g., the dollar symbol "$") displayed at a center region of the message object. In some embodiments, request indicator 1449 is a graphical symbol. In some embodiments, the visual characteristics (e.g., font type, boldness/thickness, color, shading, dynamic feedback, such as a 3D effect) of request indicator 1449 correspond with the visual characteristics (e.g., font type, boldness/thickness, color, shading, dynamic feedback, such as a 3D effect) of an amount indication of a payment message object that corresponds to a (pending or completed) payment (e.g., amount indication 1468 of payment message objects 1420, 1491). In some embodiments, the visual characteristics (e.g., font type, boldness/thickness, color, shading, dynamic feedback, such as a 3D effect) of request indicator 1449 are different from (and thus does not correspond with) the visual characteristics (e.g., font type, boldness/thickness, color, shading) of an amount indication of a payment message object that corresponds to a (pending or completed) payment request (e.g., amount indication 1468 of payment message objects 1460, 1490).

In some embodiments, in response to detecting user activation (e.g., a tap gesture) of accept button 1471 in payment message object 1490, a payment confirmation user interface corresponding to payment confirmation user interface 878 described above with reference to FIGS. 8T-8W is displayed. Then, upon successful user authentication via the payment confirmation user interface, the payment requested by message participant 1410 via payment message object 1490 can be paid. In some embodiments, upon successful user authentication via the payment confirmation user interface, the device creates a new payment message object corresponding to the authenticated payment sent by the user to message participant 1410 (e.g., payment message object 1420 described above with reference to FIGS. 14C-14F).

Figure 14M:
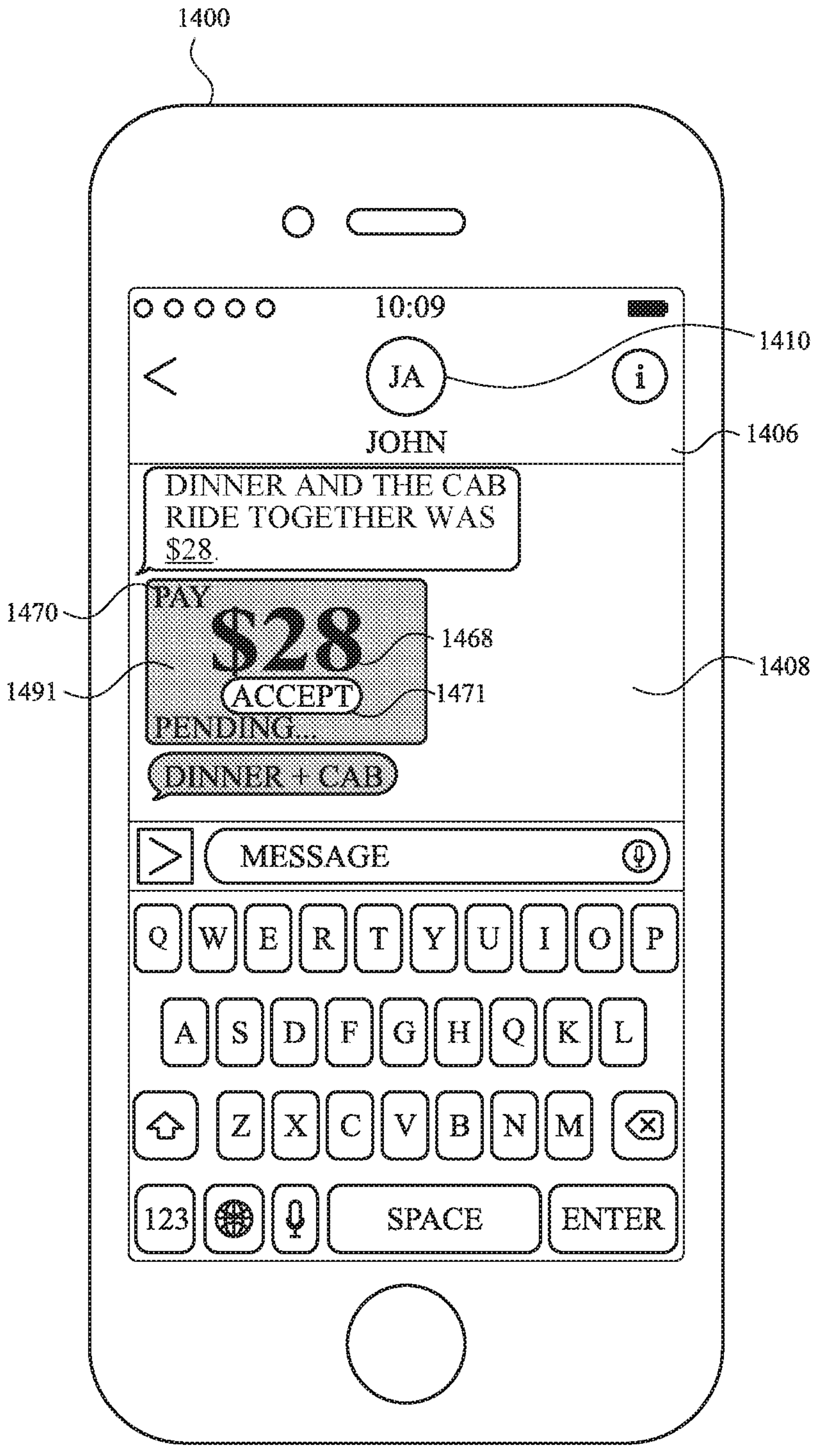
Figure 15A:
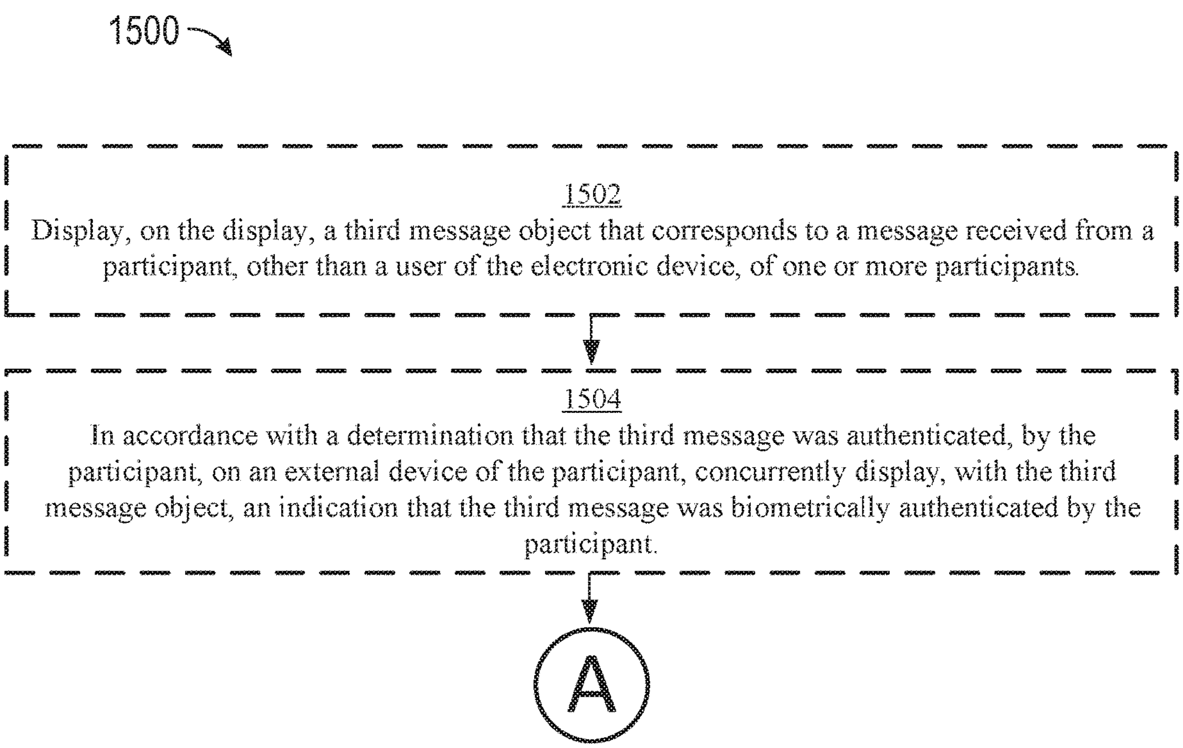
Figure 15B:
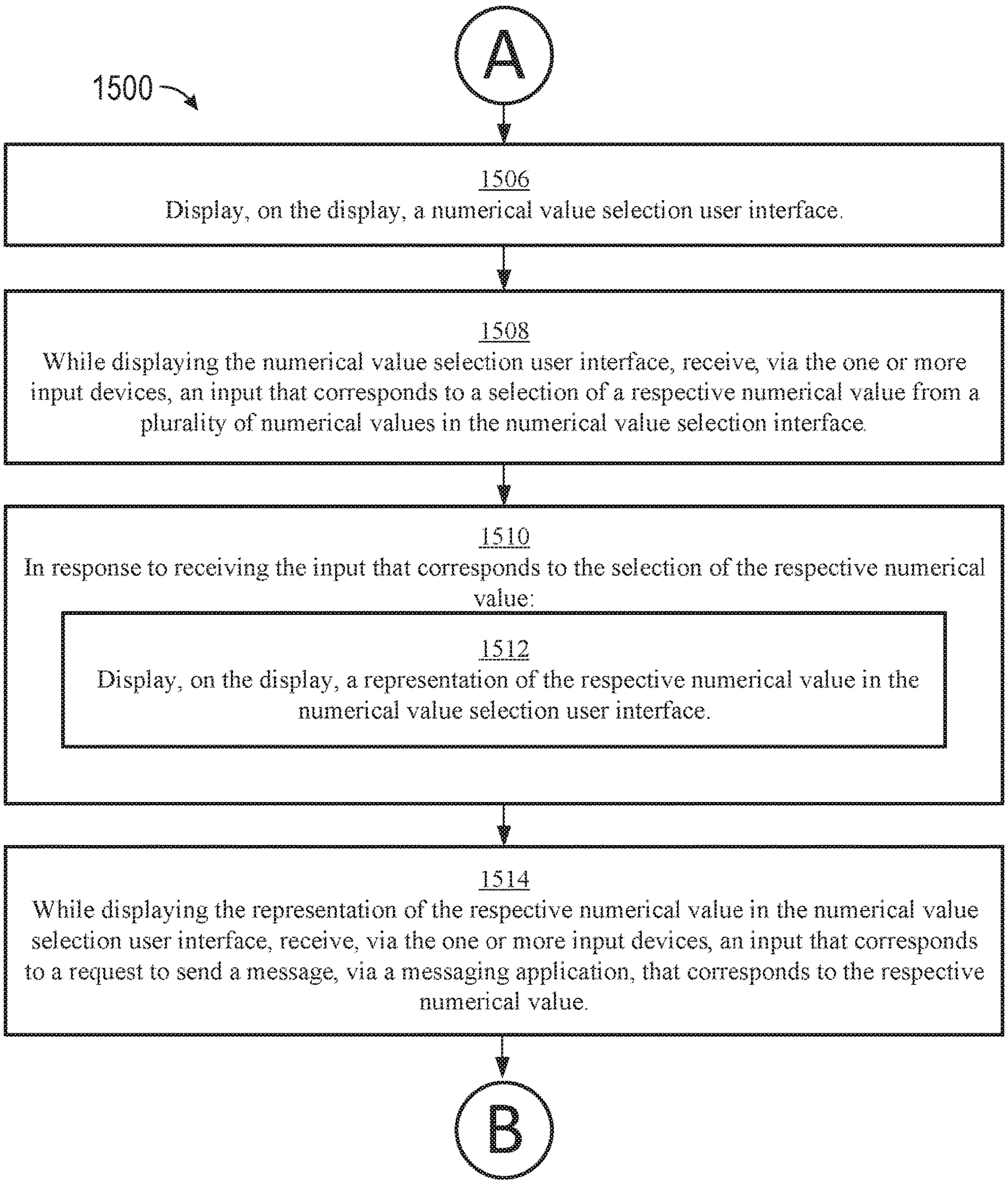
Figure 15C:
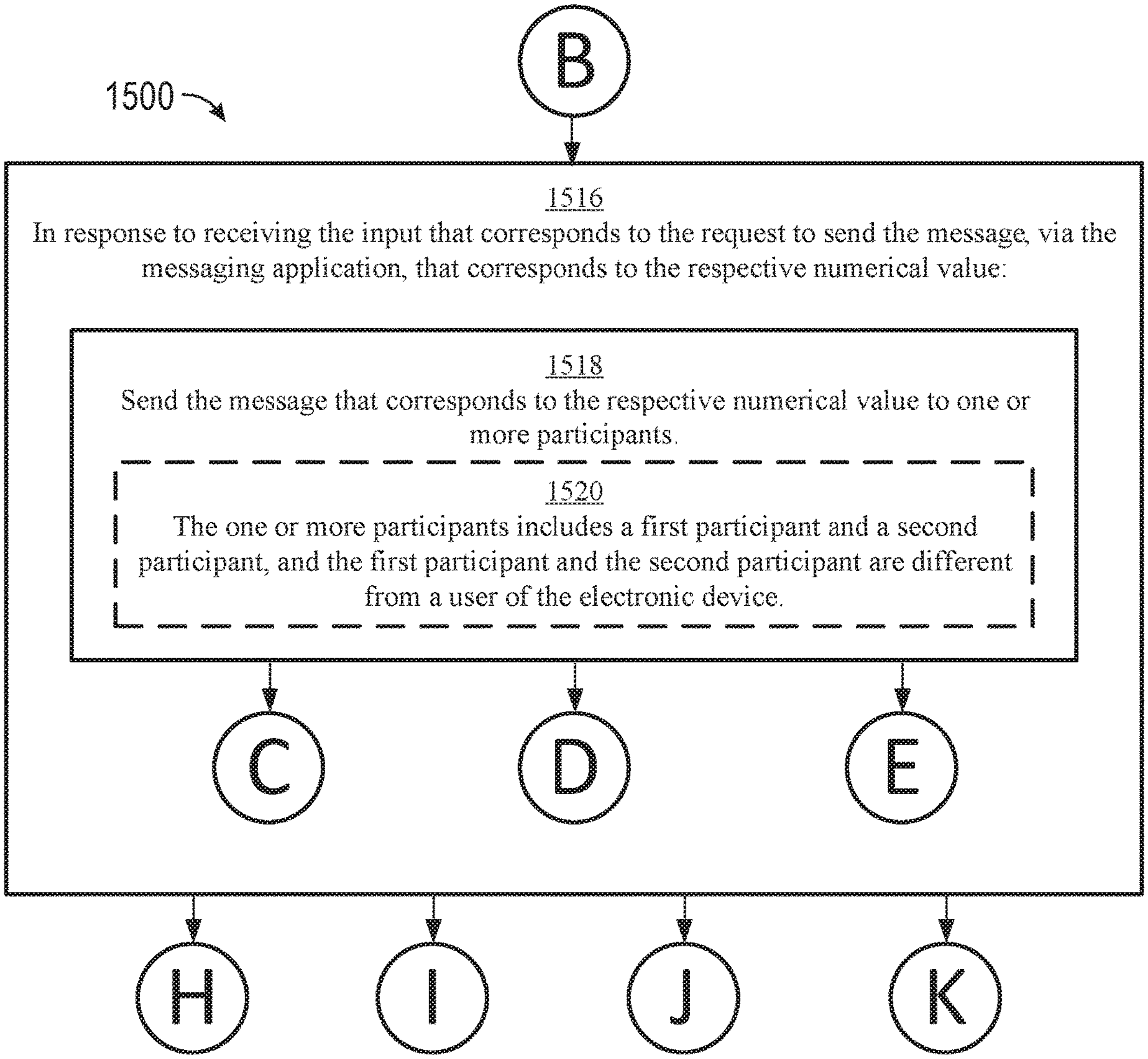
Figure 15D:
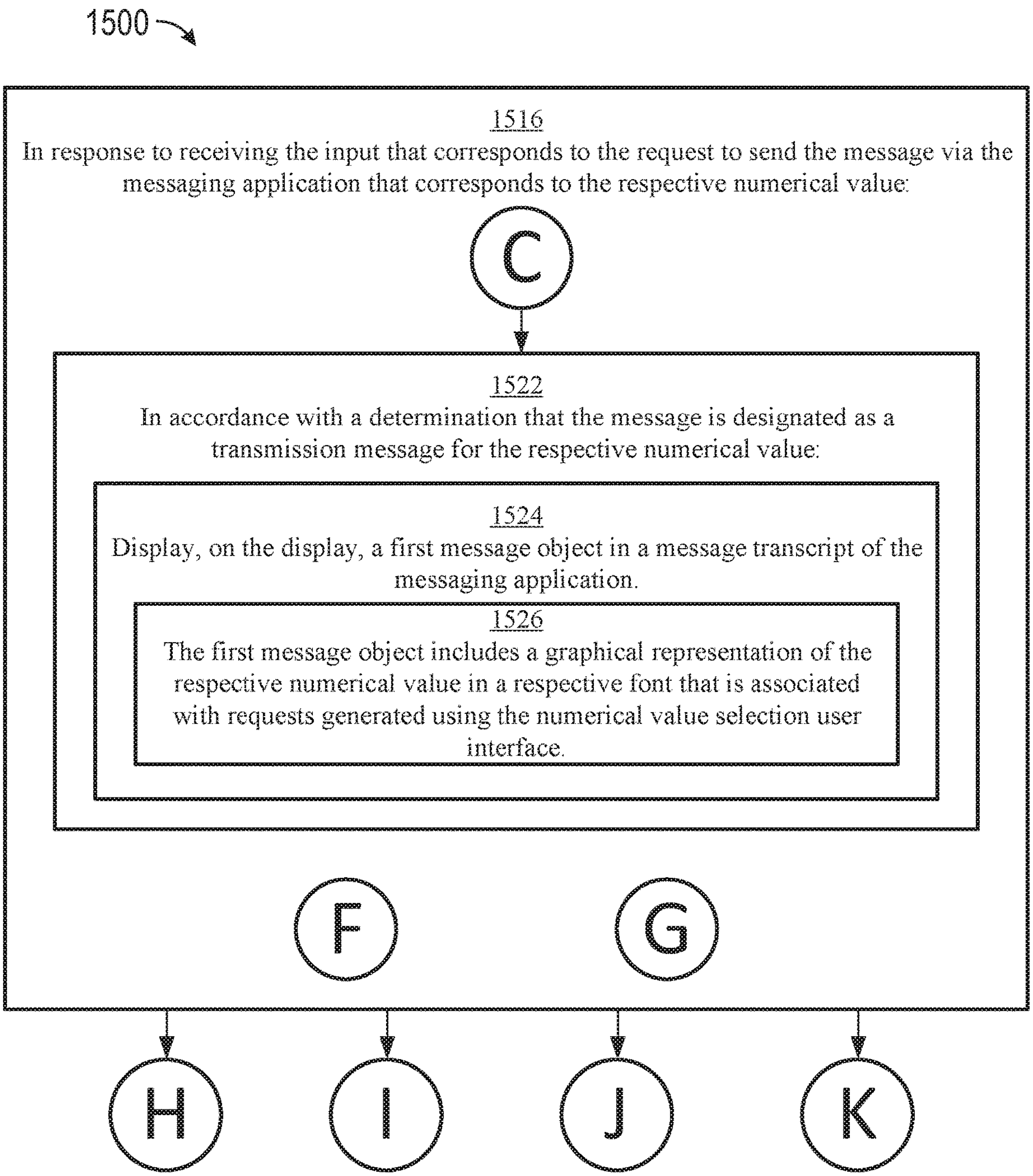
Figure 15E:
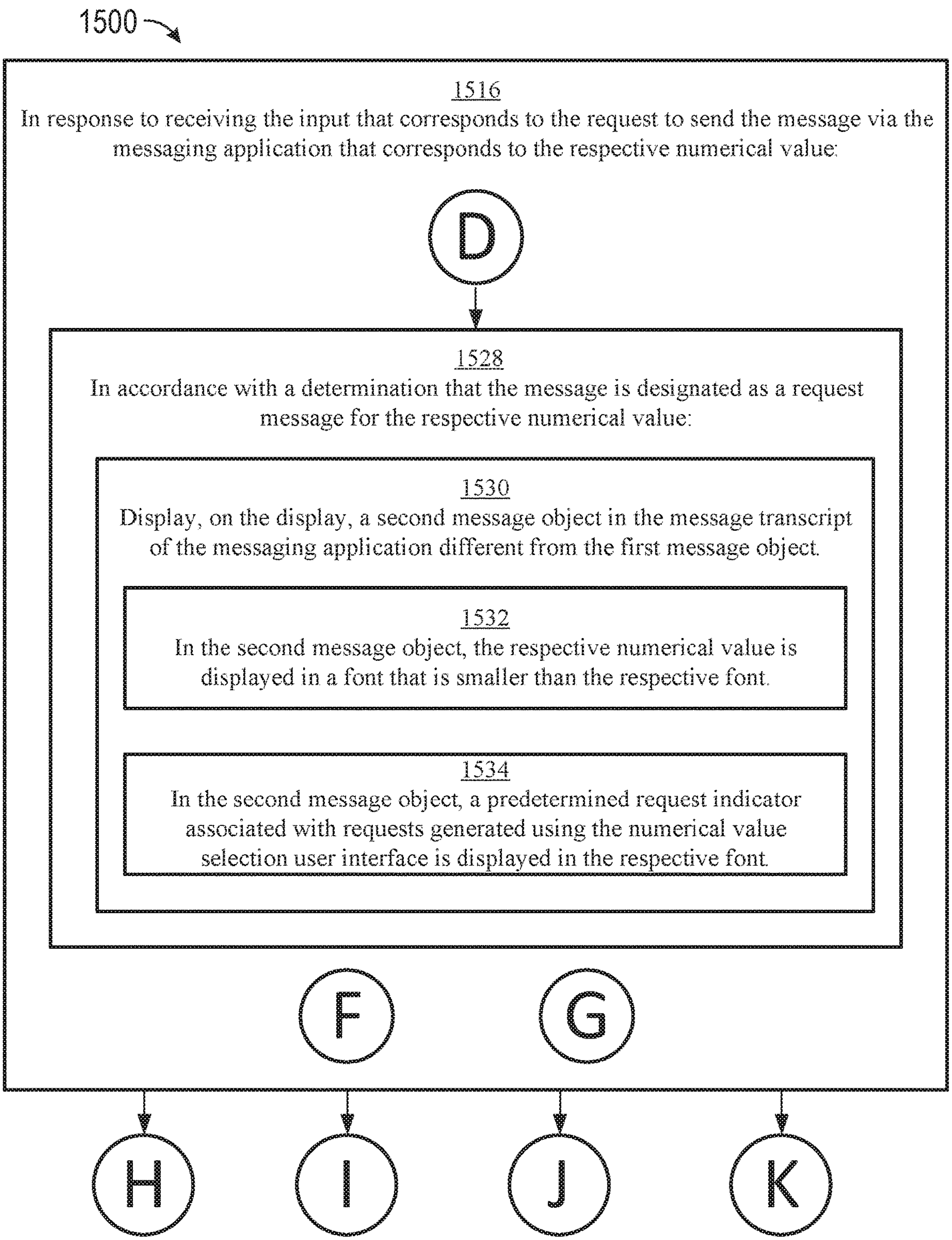
Figure 15F:
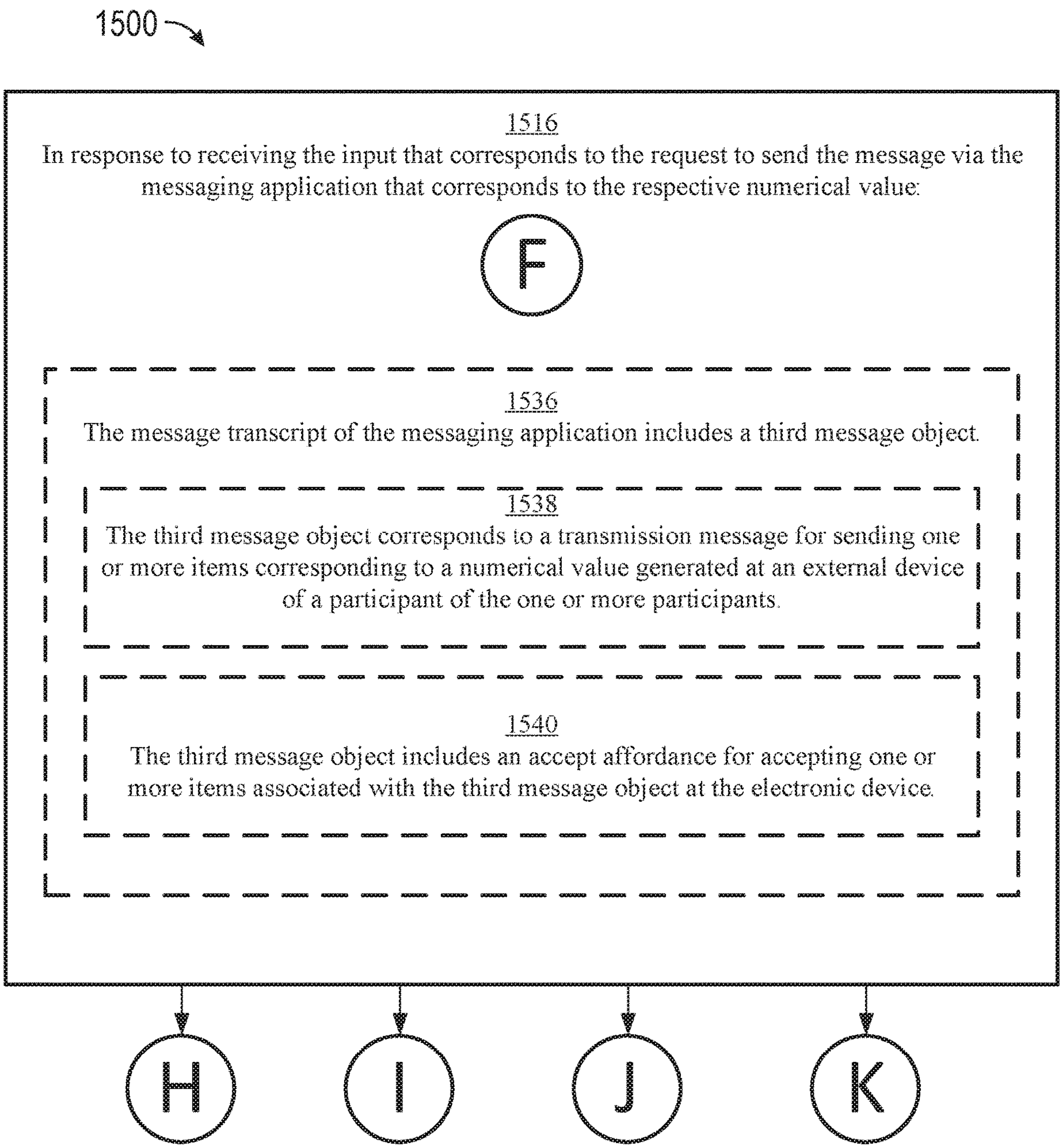
Figure 15G:
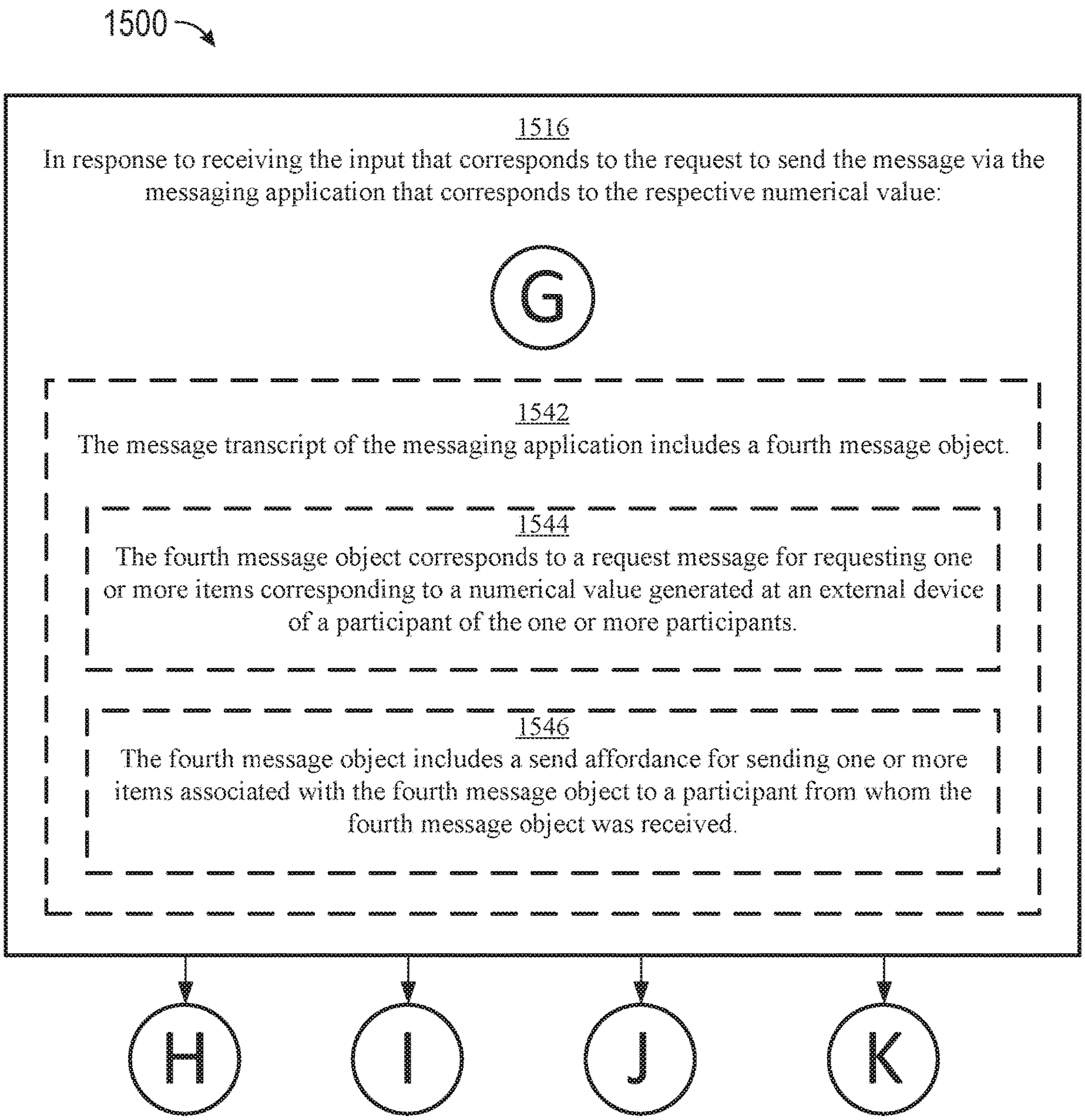
Figure 15H:
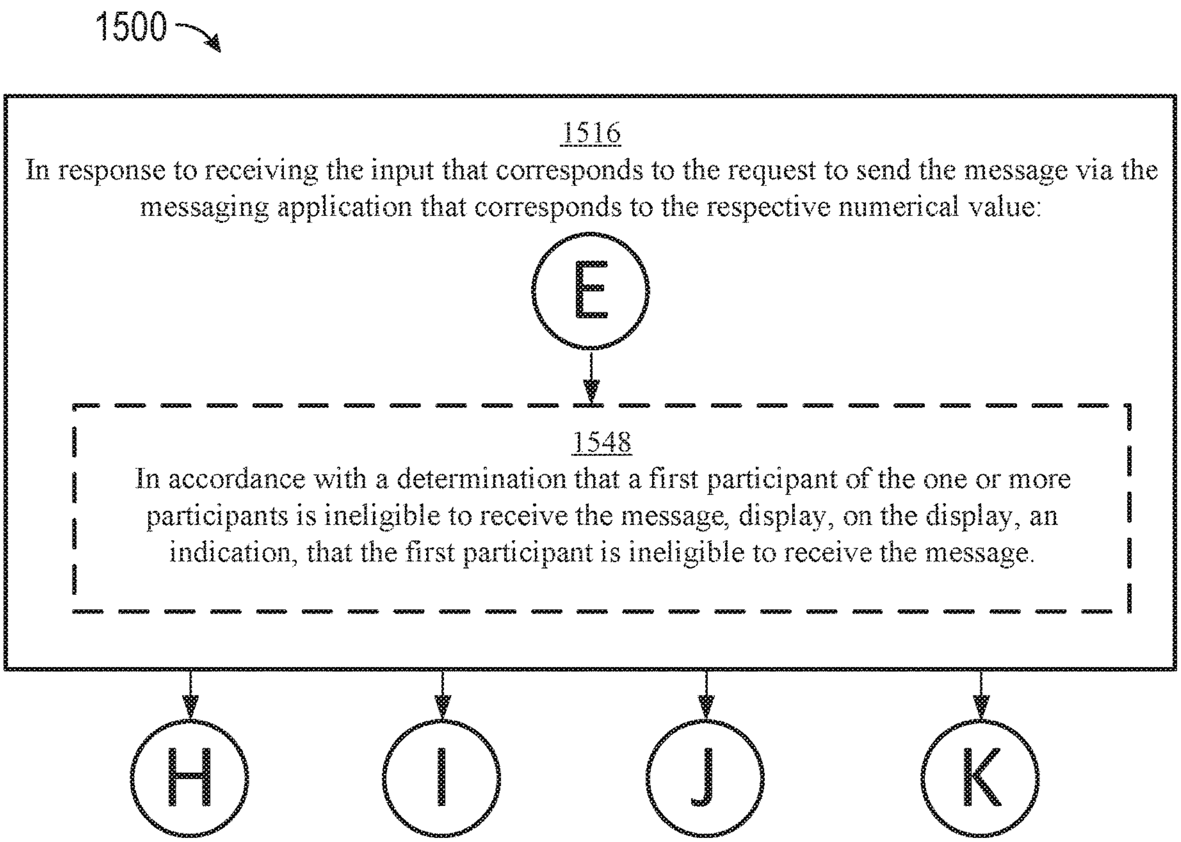
Figure 15I:
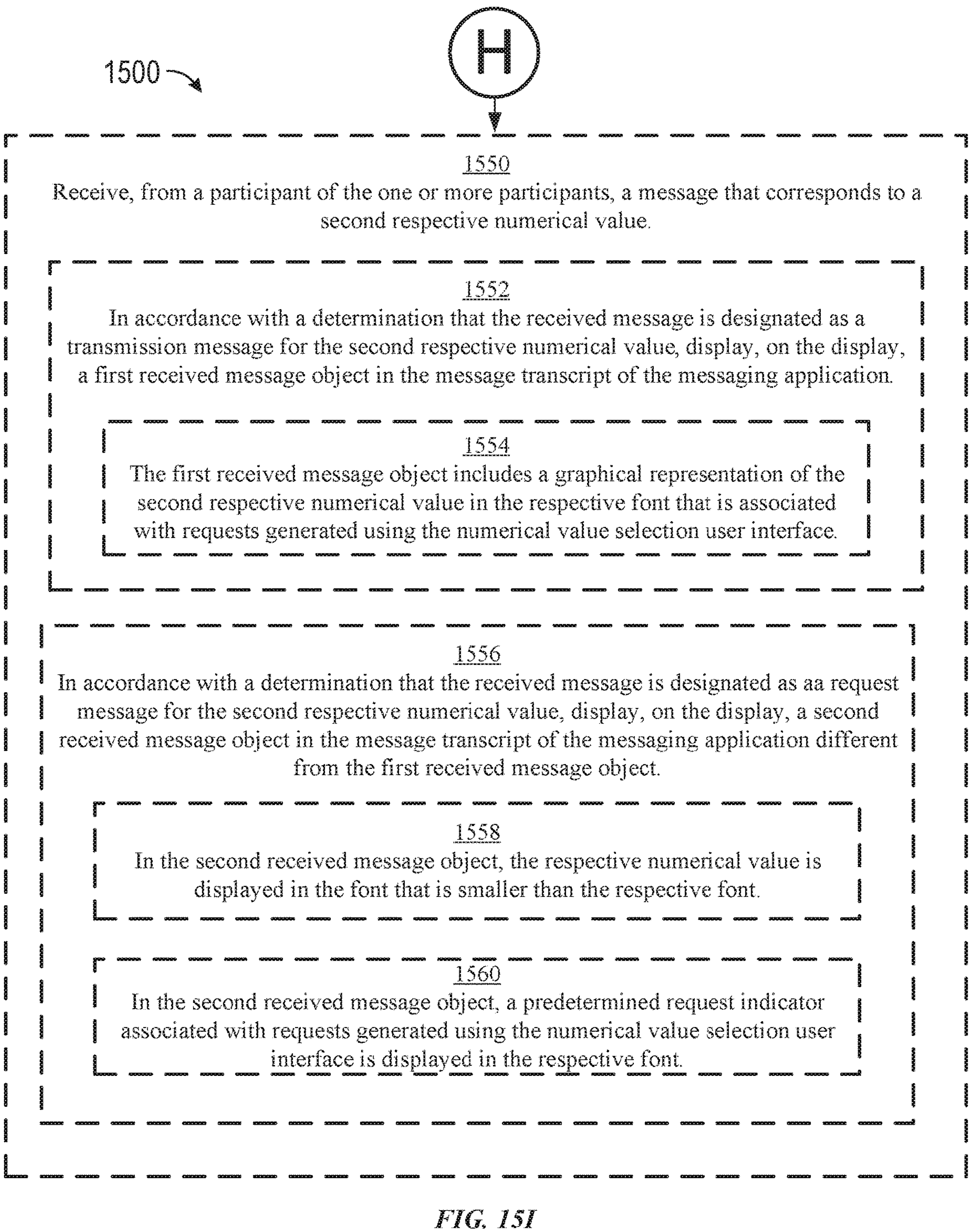
Figure 15J:
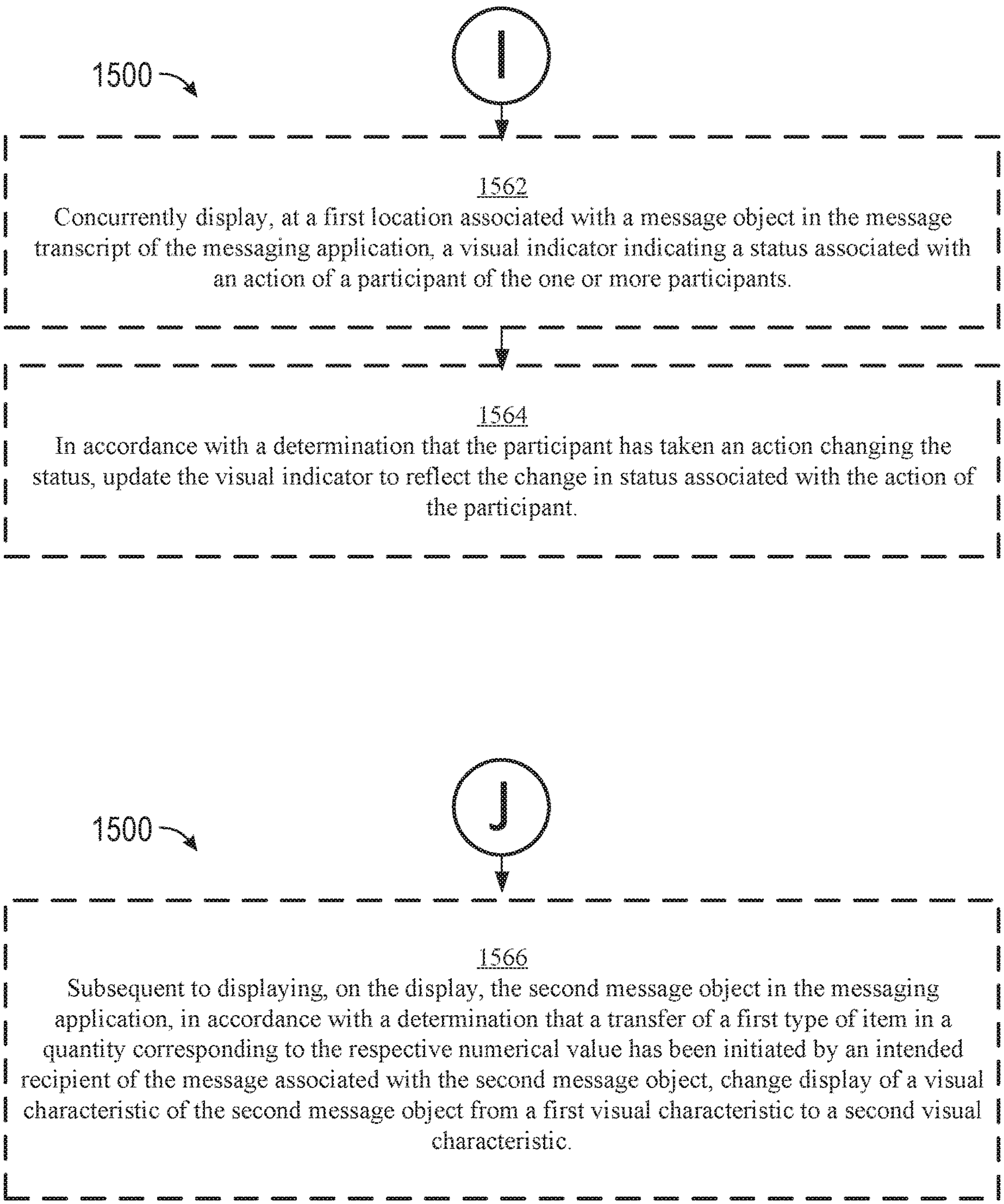

FIG. 14M shows a payment message object 1491 within conversation 1408 with message participant 1410 (e.g., "John Appleseed") sent by message participant 1410 to the user. In some embodiments, payment message object 1491 includes elements that are analogous to elements of payment message object 1420 corresponding to a payment sent by the user to the message participant. For example, as with payment message object 1420, payment message object 1491 includes amount indication 1468 that shows the payment amount (e.g., "$28") displayed in the payment font. For another example, as with payment message object 1420, payment message object 1491 includes mode indication 1470 (e.g., stating "PAY") indicating that the payment message object corresponds to a payment made via an operating-system controlled payment transfer application (and not by a third-party application). For another example, as with payment message object 1420, payment message object 1491 includes an accept button 1471 (e.g., stating "PAY") for accepting the payment (i.e., to receive the payment sent by message participant 1410).

In some embodiments, in response to detecting user activation (e.g., a tap gesture) of accept button 1471 in payment message object 1491 (thereby accepting the payment from message participant 1410), accept button 1471 ceases to be displayed on the payment message object. Further, in some embodiments, as described above with reference to payment message object 1118 in FIGS. 11D-11E, electronic device 1400 generates a feedback (e.g., a visual effect, a sensory feedback, such as a haptic effect, an audio feedback) indicating to the user that the payment corresponding to payment message object 1491 has been accepted. As noted, the different types of example feedback that can be generated by the device as described above with reference to payment message object 1118 in FIGS. 11D-11E.

In some embodiments, a payment message object associated with a payment (e.g., payment message object 1420) sent by the user (to a message participant, such as message participant 1410), a payment request (e.g., payment message object 1460) made by the user (to a message participant, such as message participant 1410), a payment request (e.g., payment message object 1490) made by a message participant (e.g., message participant 1410) to the user, and a payment (e.g., payment message object 1491) sent by a message participant (e.g., message participant 1410) to the user are displayed, on a display (e.g., display 1402) with the same visual characteristic, such as the same (background) color, the same shade, the same graphical pattern, and/or the same shape. In some embodiments, this consistency of visual characteristics is true across the two communicating devices (e.g., on the user's device and on the message participant's device).

In some embodiments, while payment related objects are displayed in a similar manner on two communicating devices, non-payment related objects are displayed in a different manner, as between the devices. For example, while a payment message object associated with a payment (e.g., payment message object 1420) sent by the user (to a message participant, such as message participant 1410), a payment request (e.g., payment message object 1460) made by the user (to a message participant, such as message participant 1410), a payment request (e.g., payment message object 1490) made by a message participant (e.g., message participant 1410) to the user, and a payment (e.g., payment message object 1491) sent by a message participant (e.g., message participant 1410) to the user are displayed, on a display (e.g., display 1402) with the same visual characteristic (e.g., a first (background) color, shade, graphical pattern, and/or shape) on both communicating devices (e.g., on both the user's device and the message participant's device), a non-payment message object (e.g., message object 1416 and message object 1418) are displayed with a different visual characteristic on the two communicating devices. For example, on the user's device (e.g., electronic device 1400), while all payment message objects are displayed with the first visual characteristic, message object 1416 (corresponding to a message sent by the user to message participant 1410) is displayed with a second visual characteristic (e.g., a second (background) color, shade, graphical pattern, and/or shape that is different from the first (background) color, shade, graphical pattern, and/or shape), message object 1418 (corresponding to a message sent by message participant 1410 to the user) is displayed with a third visual characteristic (e.g., a third (background) color, shade, graphical pattern, and/or shape that is different from both the first (background) color, shade, graphical pattern, and/or shape and the second (background) color, shade, graphical pattern, and/or shape). By contrast, on the message participant's (e.g., message participant 1410's) device, while all payment message objects are displayed with the first visual characteristic, a message object corresponding to message object 1416 on the user's device is displayed with the third (instead of the second) visual characteristic and the message object corresponding to message object 1418 on the user's device is displayed with the second (instead of the third) visual characteristic.

FIGS. 15A-15K are a flow diagram illustrating a method for managing peer-to-peer transfers using an electronic device in accordance with some embodiments. Method 1500 is performed at a device (e.g., 100, 300, 500, 1300, 1400) with display and one or more input devices (e.g., a touch-sensitive surface, a mic). Some operations in method 1500 are, optionally, combined, the orders of some operations are, optionally, changed, and some operations are, optionally, omitted.

As described below, method 1500 provides an intuitive way for managing peer-to-peer transfers. The method reduces the cognitive burden on a user for managing peer-to-peer transfers, thereby creating a more efficient human-machine interface. For battery-operated computing devices, enabling a user to manage peer-to-peer transfers faster and more efficiently conserves power and increases the time between battery charges.

In some examples, prior to displaying, on the display (e.g., 1302, 1402), a numerical value selection user interface (e.g., 1320, 1440), the electronic device (e.g., 1300, 1400) displays (1502), on the display (e.g., 1302, 1402), a third message object (e.g., 1418) that corresponds to a message (e.g., a message requesting the respective numerical value) received from a participant (e.g., 1310, 1410), other than a user of the electronic device, of the one or more participants. In some examples, in accordance with a determination that the third message was authenticated (e.g., via fingerprint authentication, via facial recognition authentication, via iris/retina scan authentication, or via passcode), by the participant, on an external device of the participant, the electronic device concurrently displays (1504), with the third message object (e.g., 1418), an indication (e.g., an message, notification, or note/comment stating that the received message is a verified message) that the third message was biometrically authenticated (e.g., verified) by the participant (e.g., a request for payment that was made with authentication by the sender is displayed differently at the recipient than a request for payment that was made without authentication to indicate to the recipient when the request for payment is an authorized request).

In some examples, prior to displaying, on the display (e.g., 1302, 1402), a numerical value selection user interface (e.g., 1320, 1440), the electronic device (e.g., 1300, 1400) displays, based on an analysis of the contents of the third message object (e.g., 1418) (or one or more additional message objects in the message transcript), a selectable indication (e.g., corresponding to a payment amount included in the contents of the message object). In some examples, in response to detecting user selection of the selectable indication, the electronic device displays (launches) the numerical value selection user interface (e.g., 1320, 1440) with the numerical value corresponding to the requested amount (e.g., of funds) indicated in the contents of the third message object (e.g., 1418) pre-populated within the numerical value selection user interface (e.g., as described in method 900 with reference to FIGS. 9A-9I). In some examples, in response to detecting the user selection of the selectable indication, the electronic device displays (launches) the numerical value selection user interface (e.g., 1320, 1440) without the numerical value corresponding to the requested amount (e.g., of funds) indicated in the contents of the third message object (e.g., 1418) pre-populated within the numerical value selection user interface.

The electronic device (e.g., 1300, 1400) displays (1506), on the display (e.g., 1302, 1402), a numerical value selection user interface (e.g., 1320, 1440). While displaying the numerical value selection user interface (e.g., 1320, 1440), the electronic device (e.g., 1300, 1400) receives (1508), via the one or more input devices, an input (e.g., a user input on a touch sensitive surface of the device) that corresponds to selection of a respective numerical value from a plurality of numerical values in the numerical value selection interface.

In response (1510) to receiving the input that corresponds to the selection of the respective numerical value, the electronic device (e.g., 1300, 1400) displays (1512), on the display (e.g., 1302, 1402), a representation of the respective numerical value (e.g., 1448) in the numerical value selection user interface (e.g., 1320, 1440).

While displaying the representation of the respective numerical value (e.g., 1448) in the numerical value selection user interface (e.g., 1320, 1440), the electronic device (e.g., 1300, 1400) receives (1514), via the one or more input devices, an input that corresponds to a request to send a message, via a messaging application (e.g., 1306, 1406), that corresponds to the respective numerical value.

In response (1516) to receiving the input (e.g., 1401) that corresponds to the request to send the message, via the messaging application (e.g., 1306, 1406), that corresponds to the respective numerical value, the electronic device (e.g., 1300, 1400) sends (1518) the message that corresponds to the respective numerical value to one or more participants (e.g., 1310, 1410).

In some examples, the one or more participants (e.g., 1310, 1410) includes (1520) a first participant and a second participant, and the first participant and the second participant are different from a user of the electronic device (e.g., 1300, 1400).

In accordance with (1522) a determination that the message is designated as a transmission message for the respective numerical value (e.g., a sending out of computing resources, a sending out of points, a sending out of credits, a sending out of funds, a sending out of virtual resources), the electronic device (e.g., 1300, 1400) displays (1524), on the display, a first message object (e.g., 1344, 1420, a text message, a chat bubble, an open email) in a message transcript (e.g., 1308, 1408) of the messaging application (between a user of the electronic device and a remote user). The first message object (e.g., 1344, 1420) includes a graphical representation of the respective numerical value (e.g., 1346, 1468) in a respective font that is associated with requests generated using the numerical value selection user interface (e.g., a special type of font controlled by the operating system). In some examples, the respective font is a font that is larger than a font used for text in other message objects in the message transcript. Displaying, in a message transcript (e.g., 1308, 1408), a message that includes a graphical representation of a value in a particular font provides the user with feedback about how the message was generated, that the message relates to a transmission (e.g., a transmission of funds, rather than a request for funds), and the value that corresponds to the transmission. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In accordance with (1528) a determination that the message is designated as a request message for the respective numerical value (e.g., a request for computing resources, a request for points, a request for credits, a request for funds, a request for virtual resources), the electronic device (e.g., 1300, 1400) displays (1530), on the display (e.g., 1302, 1402), a second message object (e.g., 1358, 1460) in the message transcript (e.g., 1308, 1408) of the messaging application (e.g., 1306, 1406) different from the first message object (e.g., 1344, 1420, a text message, a chat bubble, an open email).

In the second message object (e.g., 1358, 1460), the respective numerical value is displayed (1532) in a font that is smaller (e.g., smaller in height) than the respective font. In the second message object (e.g., 1360, 1460), a predetermined request indicator (e.g., a symbol, such as currency symbol, a "$," or a textual indicator, such as "Request for Resources") associated with requests generated using the numerical value selection user interface is displayed (1534) in the respective font. Displaying, in the message transcript (e.g., 1308, 1408), a message that includes a predetermined request indicator in a particular font without displaying the numerical value in the same font provides the user with feedback about how the message was generated, that the message relates to a request (e.g., a request for funds, rather than a transmission of funds), and the value that corresponds to the request. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the message transcript (e.g., 1308, 1408) of the messaging application (e.g., 1306, 1406) includes (1536) a third message object (e.g., 1491, received from a participant (e.g., 1310, 1410) other than the user). In some examples, the third message object (e.g., 1491) corresponds (1538) to a transmission message (e.g., a payment message sending funds in the sent numerical value amount to the user) for sending one or more items corresponding to a numerical value generated at an external device of a participant (e.g., 1310, 1410) of the one or more participants. In some examples, the third message object includes (1540) an accept affordance (e.g., 1471) for accepting one or more items associated with the third message object at the electronic device (e.g., one or more files or a payment from the participant from whom the third message object was received).

In some examples, the message transcript (e.g., 1308, 1408) of the messaging application (e.g., 1306, 1406) includes (1542) a fourth message object (e.g., 1490, received from a participant (e.g., 1310, 1410) other than the user). In some examples, the fourth message object (e.g., 1490) corresponds (1544) to a request message (e.g., a payment request message requesting funds in the requested numerical value amount) for requesting one or more items corresponding to a numerical value generated at an external device of a participant of the one or more participants. In some examples, the fourth message object (e.g., 1490) includes (1546) a send affordance (e.g., 1471) for sending one or more items associated with the fourth message object to a participant from whom the fourth message object (e.g., 1490) was received (e.g., one or more files or a payment from a user of the device to the participant from whom the fourth message object was received).

In response (1516) to receiving the input that corresponds to the request to send the message, via the messaging application (e.g., 1306, 1406), that corresponds to the respective numerical value, in accordance with a determination that a first participant (e.g., 1310, 1410) of the one or more participants is ineligible to receive the message (e.g., the first participant's device does not support transfers of resources), the electronic device (e.g., 1300, 1400) displays (1548), on the display (e.g., 1402), an indication (e.g., pop-up notification, an error message in the message application, a note/comment accompanying the message in the messaging application), that the first participant is ineligible to receive the message. In some examples, where the intended recipient (or an intended recipient of the plurality) is ineligible (e.g., not enabled) to participate in transfers/requests for resources, a send affordance (e.g., used to send a drafted message) is greyed out or otherwise prevented from being activated. Displaying an indication that the remote user is ineligible to receive the message provides the user with feedback about the capabilities of the remote user's device and provides the user with visual feedback that the message will not be sent. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the electronic device receives (1550), from a participant (e.g., 1310, 1410) of the one or more participants, a message that corresponds to a second respective numerical value. In some examples, in accordance with a determination that the received message is designated as a transmission message for the second respective numerical value (e.g., a sending out of computing resources, a sending out of points, a sending out of credits, a sending out of funds, a sending out of virtual resources), the electronic device displays (1552), on the display, a first received message object (e.g., 1491, a text message bubble, a chat bubble, an open email that is received from a different participant) in the message transcript (e.g., 1308, 1408) of the messaging application (between a user of the electronic device and a remote user). In some examples, the first received message object (e.g., 1491) includes (1554) a graphical representation of the second respective numerical value (e.g., 1468) in the respective font that is associated with requests generated using the numerical value selection user interface (e.g., a special type of font controlled by the operating system). In some examples, the respective font is a font that is larger than a font used for text in other message objects in the message transcript. Displaying, in a message transcript, a message that includes a graphical representation of a value in a particular font provides the user with feedback about how the message was generated, that the message relates to a transmission (e.g., a transmission of funds, rather than a request for funds), and the value of the transmission. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, in accordance with a determination that the received message is designated as a request message for the second respective numerical value (e.g., a request for computing resources, a request for points, a request for credits, a request for funds, a request for virtual resources), the electronic device (e.g., 1300, 1400) displays (1556), on the display (e.g., 1302, 1402), a second received message object (e.g., 1490) in the message transcript (e.g., 1308, 1408) of the messaging application different from the first received message object (e.g., 1491, a text message, a chat bubble, an open email). In some examples, in the second received message object (e.g., 1490), the respective numerical value (e.g., 1468) is displayed (1558) in the font that is smaller (e.g., smaller in height) than the respective font. In some examples, a predetermined request indicator (e.g., a symbol, such as a currency symbol or a "$," or a textual indicator, such as "Request for Resources") associated with requests generated using the numerical value selection user interface is displayed (1560) in the respective font. Displaying, in the message transcript, a message that includes a predetermined request indicator in a particular font without displaying the numerical value in the same font provides the user with feedback about how the message was generated, that the message relates to a request (e.g., a request for funds, rather than a transmission of funds), and the value of the request. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the electronic device (e.g., 1300, 1400) concurrently displays (1562) (e.g., with the first message object, with the second message object), at a first location (e.g., within the first message object, adjacent to the first message object) associated with a message object (e.g., the first message object or the second message object) in the message transcript (e.g., 1308, 1408) of the messaging application (e.g., 1306, 1406), a visual indicator (e.g., 1494, 1496, text, such as "accepted," "pending," "viewed," or a graphical indicator) indicating a status associated with an action of a participant (e.g., 1310, 1410) of the one or more participants. In some examples, in accordance with a determination that the participant (e.g., 1310, 1410) has taken an action (e.g., accepted a transfer, accepted a payment, viewed a transfer, viewed a payment, decline to accept a transfer, declined to accept a payment) changing the status, the electronic device updates (1564) the visual indicator (e.g., 1494, 1496) to reflect the change in status associated with the action of the participant.

In some examples, the first location at least partially overlaps with the displayed message object (e.g., 1344, 1358, 1420, 1460, 1490, 1491). In some examples, the first location does not overlap with the displayed message object. In some examples, content of the visual indicator is controlled by an operating system of the electronic device (e.g., the visual indicator is displayed in a background of a transcript on which representations of message are displayed, and is visually distinguished from the representations of messages in the transcript).

In some examples, subsequent to displaying (1530), on the display (e.g., 1302, 1402), the second message object (e.g., 1358, 1460) in the messaging application, in accordance with a determination that a transfer of a first type of item in a quantity corresponding to the respective numerical value has been initiated (or accepted) by an intended recipient of the message associated with the second message object, the electronic device (e.g., 1300, 1400) changes (1566) display of a visual characteristic of the second message object (e.g., 1358, 1460) from a first visual characteristic to a second visual characteristic.

In some examples, the electronic device (e.g., 1300, 1400) receives (1568), from an external device associated with a participant of the one or more participants, a second message (e.g., a resource request message, a payment request message, a regular text message containing only text) associated with a request for a second respective numerical value (e.g., a request message that includes an embedded request for computing resources, points, credits, funds, or virtual resources, or a regular text message that includes a mention of a request for computing resources, points, credits, funds, or virtual resources). Subsequent to (1570) receiving the second message associated with the request for the second respective numerical value and in accordance with a determination that a predetermined amount of time (e.g., a pre-set time limit, such as 1 hour) has passed since receiving the second message, and in accordance with a determination that the second message is designated (e.g., is sent using a corresponding numerical value selection user interface by the participant on the external device) as a request message for one or more items corresponding to the second respective numerical value, the electronic device generates (1572) a reminder (e.g., displayed on a lock screen of the electronic device, displays as a numerical indicator on an icon for starting the messaging application) of the received second message. Subsequent to (1570) receiving the second message associated with the request for the second respective numerical value and in accordance with a determination that the second message is not designated as a request message (e.g., is not sent using the corresponding numerical value selection user interface on the external device, but is a regular text message containing text relating to a request for the second respective numerical value) for one or more items corresponding to the second respective numerical value, the electronic device forgoes (1574) generating the reminder of the received second message.

In some examples, the first message object (e.g., 1344, 1420), the second message object (e.g., 1460), the first received message object (e.g., 1491), and the second received message object (e.g., 1490) are displayed with a first visual characteristic (e.g., a color, a shade, a graphical pattern, a shape). Thus, in some examples, the first message object, the second message object, the first received message object, and the second received message object are all displayed with the same visual characteristic, such as the same color, the same background color, the same shade, the same graphical pattern, and/or the same shape.

In some examples, a third message object (e.g., 1416) that corresponds to a message of the messaging application (e.g., 1306, 1406) that was sent by the electronic device (e.g., 1300, 1400) and does not correspond to the respective numerical value (and/or does not correspond to a message generated using a numerical value selection user interface) is displayed with a second visual characteristic (e.g., a color, a shade, a graphical pattern, a shape) and a third received message object (e.g., 1418) that corresponds to a messaging application that was received from the one or more participants and does not correspond to the second respective numerical value (and/or does not correspond to a message generated using a numerical value selection user interface) is displayed with a third visual characteristic (e.g., a color, a shade, a graphical pattern, a shape) that is different from the second visual characteristic. Differentiating messages based on whether they were sent by the device or received by the device provides the user with visual feedback about the sender and recipient of the message. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the first message object (e.g., 1344, 1420) and the second message object (e.g., 1460) are displayed with a first visual characteristic (e.g., a color, a shade, a graphical pattern, a shape). In some examples, messages that do not correspond to transfers or requests for resources/funds have a different background color from messages that do correspond to transfers or requests for resources/funds.

In some examples, a third message object (e.g., 1416) that corresponds to a message of the messaging application (e.g., 1306, 1406) that does not correspond to the respective numerical value (and/or does not correspond to a message generated using a numerical value selection user interface) is displayed with a second visual characteristic (e.g., a color, a shade, a graphical pattern, a shape) that is different from the first visual characteristic. Visually differentiating between messages that do and do not correspond to transfer of items helps the user quickly identify messages that include transfers of items. This is particularly helpful because non-transfer messages involve limited consequences and users may glance over such messages with little review, while messages that correspond to transfers involve relatively higher consequences. The differentiated visual feedback prompts the user to review such messages more carefully (and potentially take action). Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the one or more participants include a first participant (e.g., 1310, 1410) and a second participant, and the first participant and the second participant are different from a user of the electronic device (e.g., 1300, 1400). In some examples, the electronic device receives an indication (e.g., based on user input, based on text of one or more messages between the participants) that an intended recipient of the message is the first participant and not the second participant. Subsequent to receiving the indication that the intended recipient of the message is the first participant and not the second participant, and in accordance with the determination that the message is designated as a transmission message for the respective numerical value (e.g., a sending out of computing resources, a sending out of points, a sending out of credits, a sending out of funds, a sending out of virtual resources), the electronic device (e.g., 1300, 1400) displays, on the display (e.g., 1302, 1402), the first message object (e.g., 1416) in a second message transcript (e.g., a chat screen between only the user of the electronic device and the first participant, and not involving the second participant) different from the message transcript of the messaging application. The second message transcript is not associated with the second participant (e.g., is only associated with the first participant and the user of the electronic device). Thus, in some examples, if the original messaging conversation was a group conversation, and the user intends to send the message to only one participant of the group conversation, a new conversation is created between only the user and the intended recipient of the message. Subsequent to receiving the indication that the intended recipient of the message is the first participant and not the second participant, and in accordance with the determination that the message is designated as a request message for the respective numerical value (e.g., a sending out of computing resources, a sending out of points, a sending out of credits, a sending out of funds, a sending out of virtual resources), the electronic device displays, on the display, the second message object in the second message transcript of the messaging application.

In some examples, prior to sending the message to the one or more participants, the electronic device (e.g., 1300, 1400) receives, via the input mechanism (e.g., 1412), a user comment (e.g., text relating to the message to be sent to the one or more participants). In some examples, prior to receiving the user comment, the electronic device receives an input (e.g., a tap) on a comment indicator (e.g., a comment region or comment bar for entering text, a comment affordance for bringing up a keyboard). In some examples, the numerical value selection user interface (e.g., 1320, 1440) includes a comment region or comment bar for entering comments. In some examples, the numerical value selection user interface (e.g., 1320, 1440) includes a comment affordance for bringing up a keyboard that enables the user to enter comments. In some examples, in response to receiving the input on the comment indicator, the device displays an input mechanism (e.g., a virtual keyboard for typing text, a digital assistant to entering text via spoken user input) for entering a comment. In some examples, subsequent to receiving user comment, and in accordance with the determination that the message is designated as a transmission message for one or more items corresponding to the respective numerical value (e.g., a sending out of computing resources, a sending out of points, a sending out of credits, a sending out of funds, a sending out of virtual resources), the electronic device concurrently displays, adjacent to (e.g., below) the first message object (e.g., 1344, 1420), a message object (e.g., 1463) including the user comment (e.g., 1461). In some examples, subsequent to receiving user comment, and in accordance with the determination that the message is designated as a request message for one or more items corresponding to the respective numerical value (e.g., a requesting of computing resources, a requesting of points, a requesting of credits, a requesting of funds, a requesting of virtual resources), the electronic device concurrently displays, adjacent to (e.g., below) the second message object (e.g., 1460), the message object including the user comment.

Note that details of the processes described above with respect to method 1500 (e.g., FIGS. 15A-15K) are also applicable in an analogous manner to the methods described herein. For example, method 1500 optionally includes one or more of the characteristics of the various methods described herein with reference to methods 900, 1200, 1800, 2100, 2400, 2700, 3000, and 3400. For example, concurrently displaying the representation of a message and a selectable indication that corresponds to a type of item (being transferred, such as a photo, sticker, resources, or a payment), as described in method 900, can be applied with respect to the first message object (e.g., 1420), the second message object (e.g., 1460), the first received message object (e.g., 1491), or the second received message object (e.g., 1490). For another example, the outputting of dynamic feedback described in method 1200 can be applied with respect to the first message object (e.g., 1420), the second message object (e.g., 1460), the first received message object (e.g., 1491), or the second received message object (e.g., 1490). For another example, a request for activating an account that is authorized to obtain one or items (e.g., a sticker, a photo, resources, a payment), as described in method 1800, can be applied with respect to the first message object (e.g., 1420), the second message object (e.g., 1460), the first received message object (e.g., 1491), or the second received message object (e.g., 1490) when retrieving one or more items (e.g., a sticker, a photo, resources, a payment) associated with the message. For another example, displaying representations of a first account and a second account, as described in method 2100, can also be displayed when authenticating/confirming an incoming transfer corresponding to the second received message object (e.g., 1491). For another example, automatically proceeding with a transfer, as described in method 2400, instead of requiring user input, can also be used to accept the contents of an incoming transfer corresponding to second received message object (e.g., 1491). For another example, the plurality of items including information from messages in a message conversation, as described in method 2700, can be displayed in response to user selection of the first message object (e.g., 1420), the second message object (e.g., 1460), the first received message object (e.g., 1491), or the second received message object (e.g., 1490). For another example, an utterance can be used, as described in method 3000, to create the first message object (e.g., 1420) or the second message object (e.g., 1460). For another example, a visual effect (e.g., a coloring effect, a geometric alteration effect) can be applied, as described in method 3400, to an element (e.g., 1468) a message object (e.g., 1420) or an element (e.g., 1468) of a received message object (e.g., 1490) when a transfer (e.g., of a resource, of a file, of a payment) associated with the message objects are completed. For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 15A-15K are, optionally, implemented by components depicted in FIGS. 1A-1B. For example, displaying operation 1506, receiving operation 1508, displaying operation 1512, receiving operation 1514, sending operation 1518, displaying operation 1524, displaying operation 1530, are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 16A-16F illustrate example user interfaces for managing peer-to-peer transfers, in accordance with some embodiments. As described in greater detail below, the non-limiting example embodiment of the user interfaces illustrated in FIGS. 16A-16F relate to the non-limited example embodiment of the user interfaces illustrated in FIGS. 17A-17L, which in turn are used to illustrate the processes described below, including the processes in FIGS. 18A-18F.

Figure 16A:
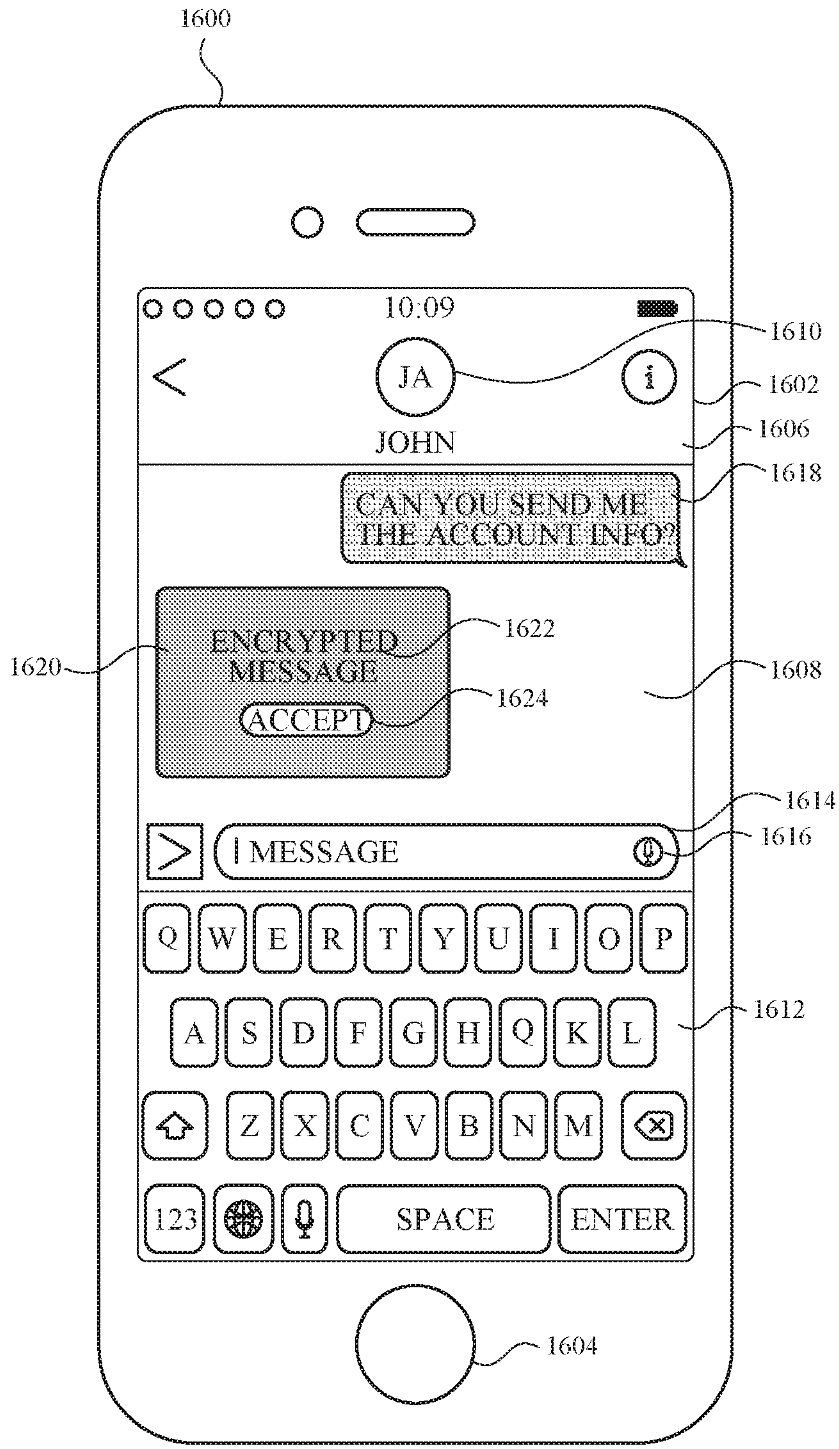
FIGS. 16A-16F illustrate example user interfaces for activating accounts for accepting and sending encrypted message transfers, in accordance with some embodiments.

FIG. 16A illustrates an electronic device 1600 (e.g., portable multifunction device 100, device 300, or device 500). In the non-limiting example embodiment illustrated in FIGS. 16A-16F, electronic device 1600 is a smartphone. In other embodiments, electronic device 1600 can be a different type of electronic device, such as a wearable device (e.g., a smartwatch). Electronic device 1600 has a display 1602 and one or more input devices (e.g., touchscreen of display 1602, a mechanical button 1604, a mic).

FIG. 16A shows electronic device 1600 displaying, on display 1602, a message conversation 1608 of a messaging application 1606 between a user of electronic device 1600 (e.g., "Kate Appleseed") and a message participant 1610 (e.g., "John Appleseed"). In some embodiments, the device also displays (e.g., beneath or covering a portion of messaging application 1608) a virtual keyboard 1612 (e.g., an alphanumeric keyboard for typing a message) and a compose bar 1614 displaying the text of a message as a message is typed using virtual keyboard 1612. In some embodiments, a mechanical keyboard can be used in addition to or alternatively to virtual keyboard 1612 to type a message. In some embodiments, compose bar 1614 can expand (e.g., expand upwards) to accommodate a longer message or message object (e.g., an image, an emoticon, a special type of message object, such as a payment object). In some embodiments, compose bar 1614 includes a mic button 1616 which, when activated, enables the user to enter a message using voice input.

As shown in FIG. 16A, message conversation 1608 includes a message object 1618 that corresponds to a message sent by the user to message participant 1610. In the message corresponding to message object 1618, the user requests to message participant 1610: "Can you send me the account info?" As also shown in FIG. 16A, message conversation 1608 also includes an encrypted message object 1620 sent by message participant 1610 to the user in response to the user's request to send "the account info." In some embodiments, encrypted message object 1620 corresponds to a transfer of an encrypted message (e.g., as indicated by indication 1622) and includes an accept button 1624 for accepting (and thereby decrypting) the contents of the encrypted message associated with the encrypted message object. In some embodiments, an activated decrypting account is required in order to decrypt and encrypted message, such as the encrypted message corresponding to encrypted message object 1620.

Figure 16B:
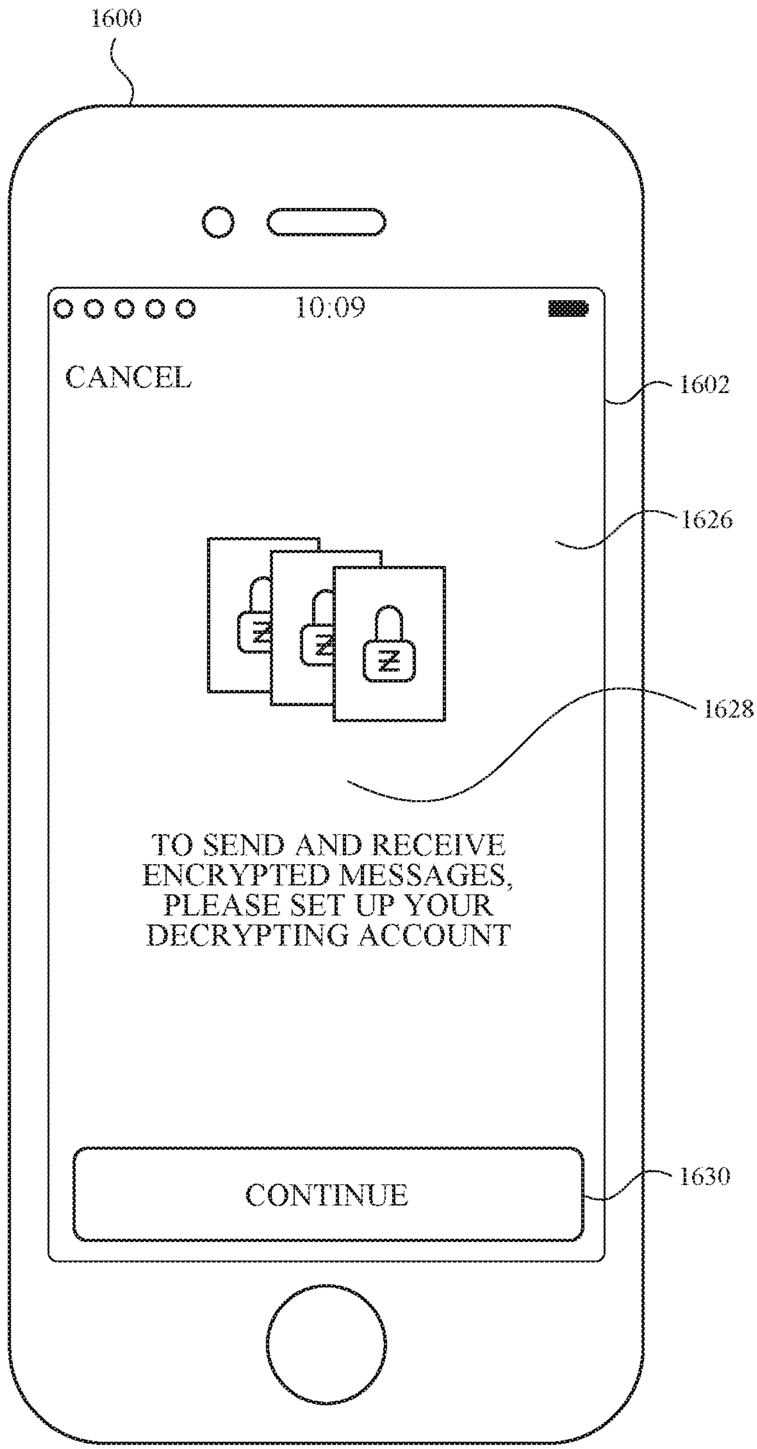

FIG. 16B shows electronic device 1600 displaying, on display 1602, in response to detecting user activation of accept button 1624, and in accordance with a determination (e.g., made by electronic device 1600 based on accounts stored or logged into the device or made by an external device, such as a server, storing information about accounts associated with the user of the device) that a decrypting account associated with the user, which is required to view and send encrypted (e.g., via messaging application 1606), is not yet activated (e.g., not yet set up, not yet configured), the device displays (e.g., replaces display of message conversation 1608 of messaging application 1606 with) an initial setup notification user interface 1626.

In some embodiments, initial setup notification user interface 1626 includes an (graphical and/or textual) indication 1628 informing the user that a decrypting account associated with the user account (logged into the device and belonging to the user of the device) must be activated (e.g., set up, configured). For example, in FIG. 16B, indication 1628 includes text stating: "To send and receive encrypted messages, please set up your decrypting account." Initial setup notification user interface 1626 also includes a proceed button 1630 for proceeding with activating the decrypting account.

Figure 16C:
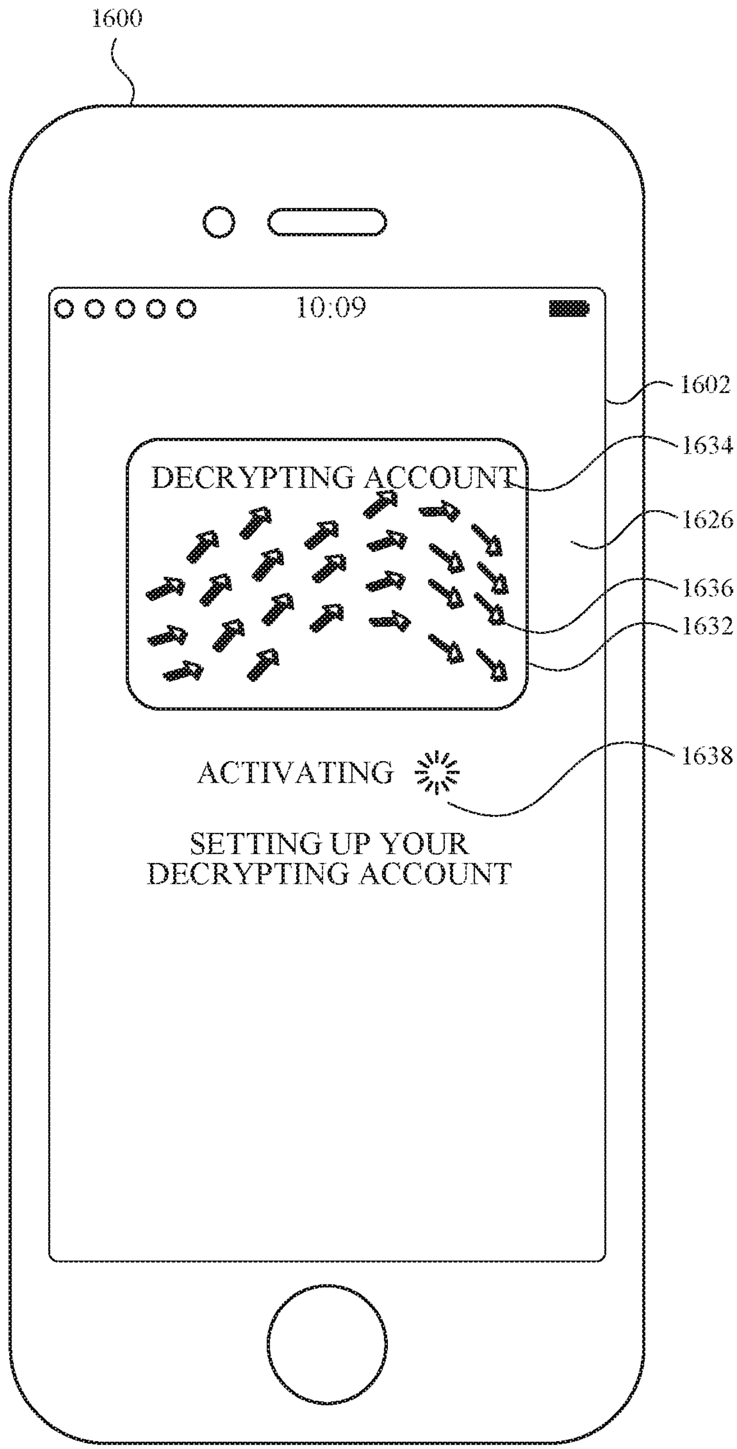
Figure 16D:
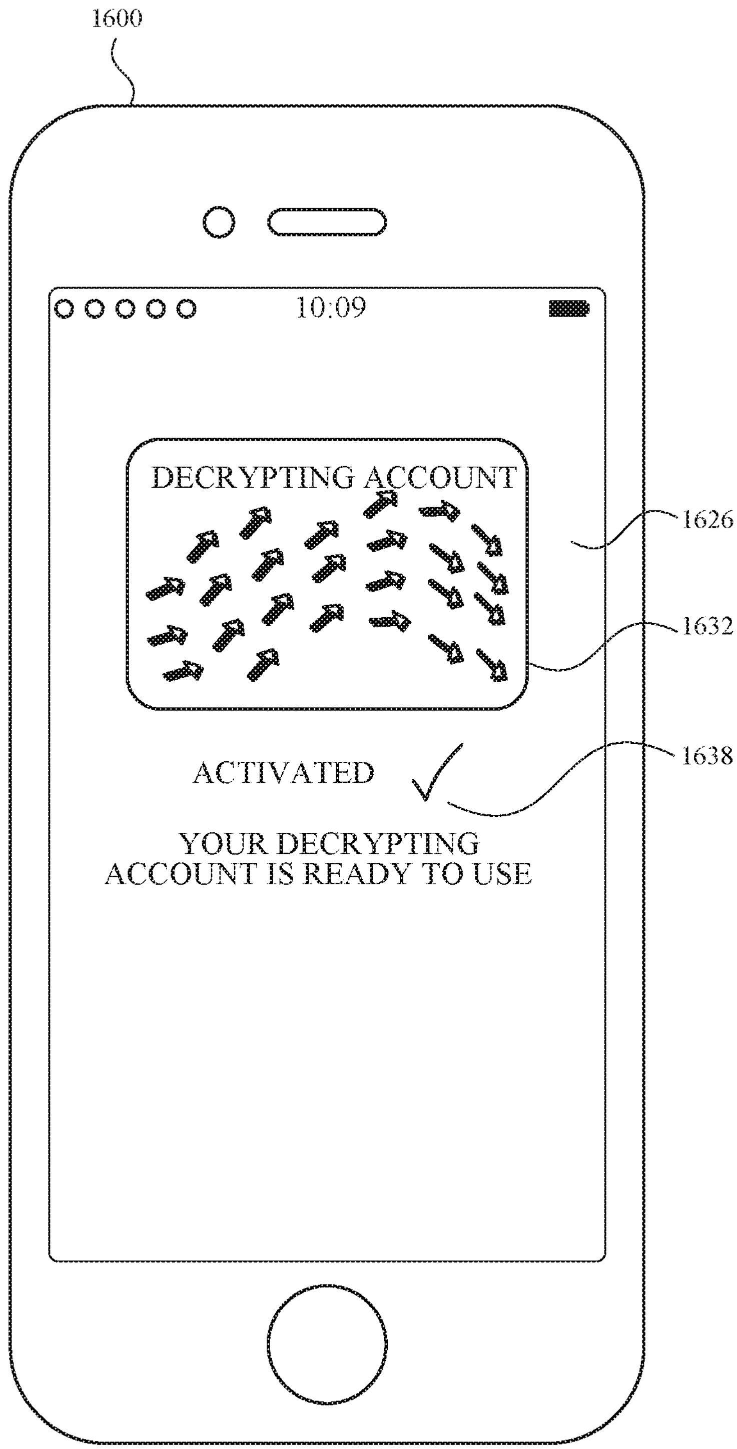
Figure 16E:
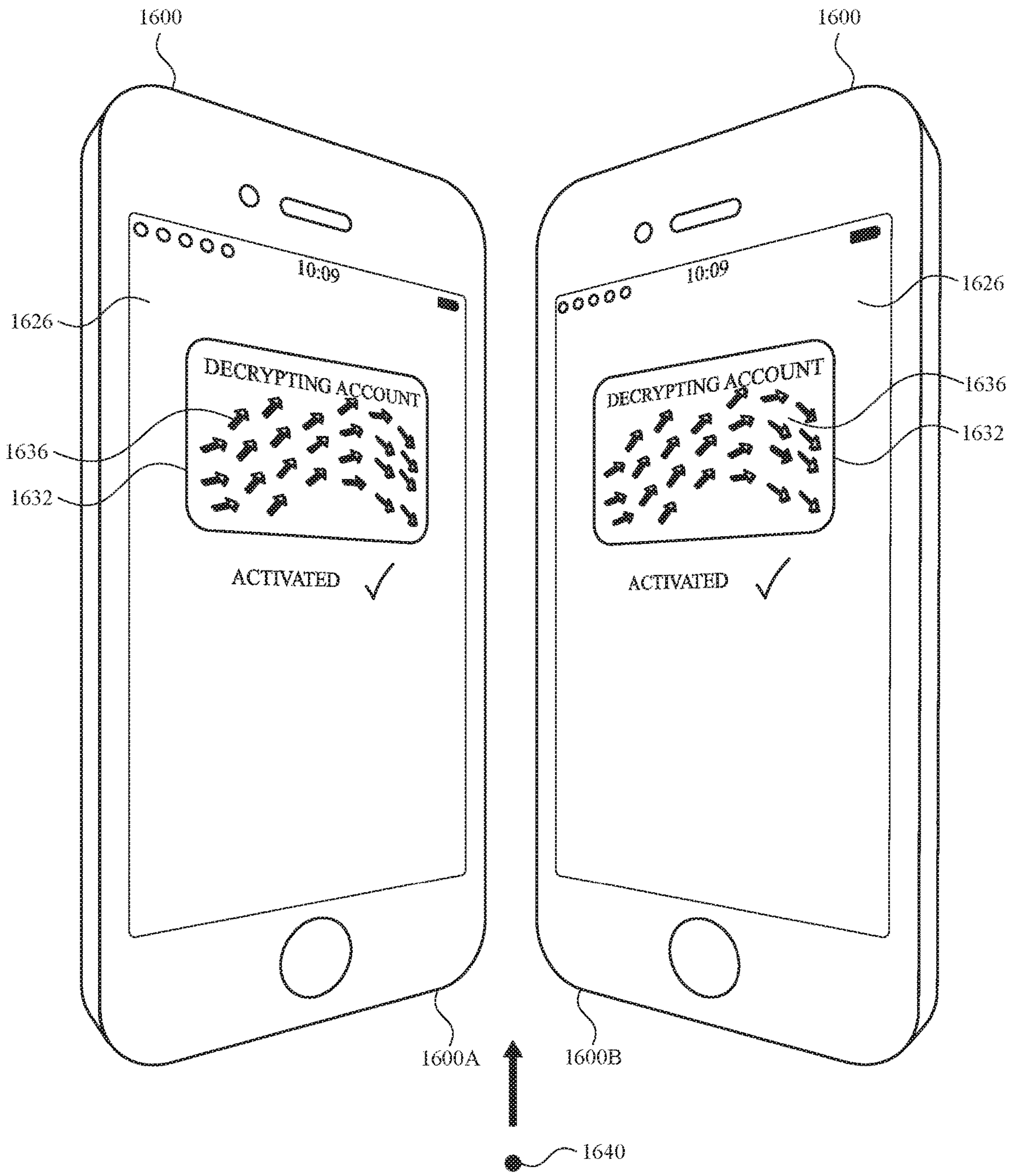
Figure 16F:
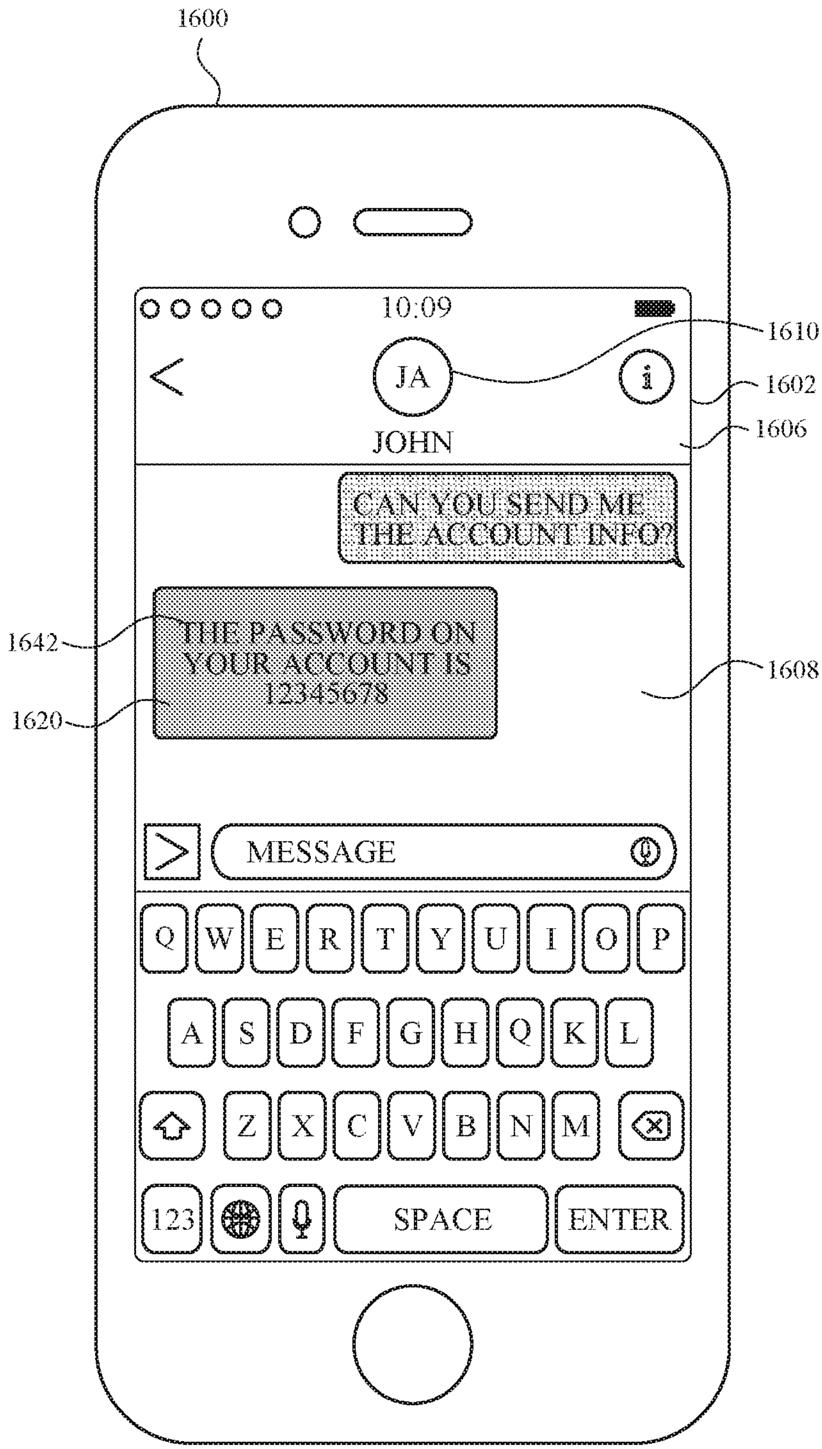

In some embodiments, in accordance with a determination (e.g., made by electronic device 1600 based on accounts stored or logged into the device or made by an external device, such as a server, storing information about accounts associated with the user of the device) that a required decrypting account associated with the user is already activated (e.g., is already set up, is already configured), the device proceeds with decrypting the encrypted message corresponding to encrypted message object 1620 and displays the contents of the message (e.g., as shown in FIG. 16F).

In FIG. 16C, in response to detecting user selection of proceed button 1630, electronic device 1600 displays, on display 1602, an account activation user interface 1626. As shown in FIG. 16C, account activation user interface 1626 includes a graphical representation 1632 (e.g., an image representing a card associated with the payment account) of the decrypting account and a progress indication 1638 (e.g., stating "Activating," "Setting up your decrypting account") informing the user that activation of the decrypting account is in progress. In some embodiments, as shown in FIG. 16C, graphical representation 1632 of the decrypting account includes a textual indication 1634 that the representations corresponds to a decrypting account and a plurality of patterns 1636 (e.g., user interface objects, shapes) that can be dynamic (e.g., moving, changes colors, changes location, changes a depth effect). In some embodiments, when the decrypting account is not yet activated (as is the case in FIG. 16C), a dynamic feedback (e.g., visual, sensory, audio) is not generated by electronic device 1600. The dynamic feedback is instead generated once the decrypting has been activated, as shown in FIG. 16D.

FIG. 16D shows the account activation process being completed. Thus, in FIG. 16D, progress indication 1638 of account activation user interface 1626 informs the user that activation of the decrypting account has been successfully completed (e.g., by stating "Activated, "Your decrypting account is ready to use").

In some embodiments, as shown in FIG. 16E, electronic device 1600 generates a dynamic feedback on graphical representation 1632 of the decrypting account (e.g., a plurality of moving patterns 1636, a 3D animation of moving patterns/elements) akin to the dynamic visual feedback applied to a completed transfer message object (e.g., similar to the visual feedback applied to amount object 3324 described below with reference to, for example, FIGS. 33D-33J). In some embodiments, the feedback is a dynamic visual feedback causing display of graphical representation 1632 (or of patterns 1636) to change as changes in the orientation of the device relative to a reference point 1640 are detected, where reference point 1640 is a face of a viewer (e.g., the user) of the device in a field of view of a sensor (e.g., a camera) of the device (alternatively, in some embodiments, the reference point is a static point external to the device, such as a location on the ground or floor). For example, in FIG. 16E, the dynamic visual feedback is a 3D effect that provides the user with the visual effect that graphical representation 1632 (or patterns 1636) is three-dimensional. Thus, in FIG. 16E, based on reference point 1640 of the user, graphical representation 1632 (or patterns 1636) looks visually different (e.g., shadows behind plurality of patterns 1632 change) from angle 1600A of the device and from angle 1600B of the device and, optionally, both the view of graphical representation 1632 from angle 1600A and angle 1600B look different from the appearance of the representation from straight on (e.g., such that the display is not tilted at an angle relative to the face of the viewer, as shown in FIG. 16D). In some embodiments, the dynamic visual feedback is a changing color applied to the graphical representation (or to the plurality of patterns of the graphical representation).

In some embodiments, in addition to or instead of a dynamic visual feedback, the device generates a dynamic haptic feedback (e.g., similar to the generated tactile output 3336 described below with reference to, for example, FIGS. 33F and 33H). In some embodiments, the dynamic haptic feedback is a dynamically strengthening and weakening tactile output caused by the device. In some embodiments, the dynamic haptic feedback is a tactile output with changing tactile output patterns caused by the device. In some embodiments, the strength or frequency of the tactile output changes as the device detects changes in the orientation of the device relative to the reference point (e.g., reference point 1640).

In some embodiments, the generated feedback (e.g., visual feedback, sensory feedback, audio feedback) is caused (e.g., only) by an operating system program of the device and non-operating system programs of the device are not enabled to cause the feedback.

FIG. 16F shows electronic device 1600 displaying, on display 1602, message conversation 1608 (with message participant 1610) of messaging application 1606 after the user has successfully activated the decrypting account. Because the decrypting account is now active, encrypted message object 1620 now shows the contents of the message (e.g., stating "The password on your account is 12345678") associated with the encrypted message object.

As mentioned above, the non-limiting example embodiment of the user interfaces illustrated in FIGS. 16A-16F described above relate to the non-limited example embodiment of the user interfaces illustrated in FIGS. 17A-17L described below. Therefore, it is to be understood that the processes described above with respect to the example user interfaces illustrated in FIGS. 16A-16F and the processes described below with respect to the example user interfaces illustrated in FIGS. 17A-17L are largely analogous processes that similarly involve initiating and managing transfers using an electronic device (e.g., 100, 300, 500, 1600, or 1700).

FIGS. 17A-17L illustrate example user interfaces for peer-to-peer transfers, in accordance with some embodiments. The user interfaces in these figures are used to illustrate the processes described below, including the processes in FIGS. 18A-18F.

Figure 17A:
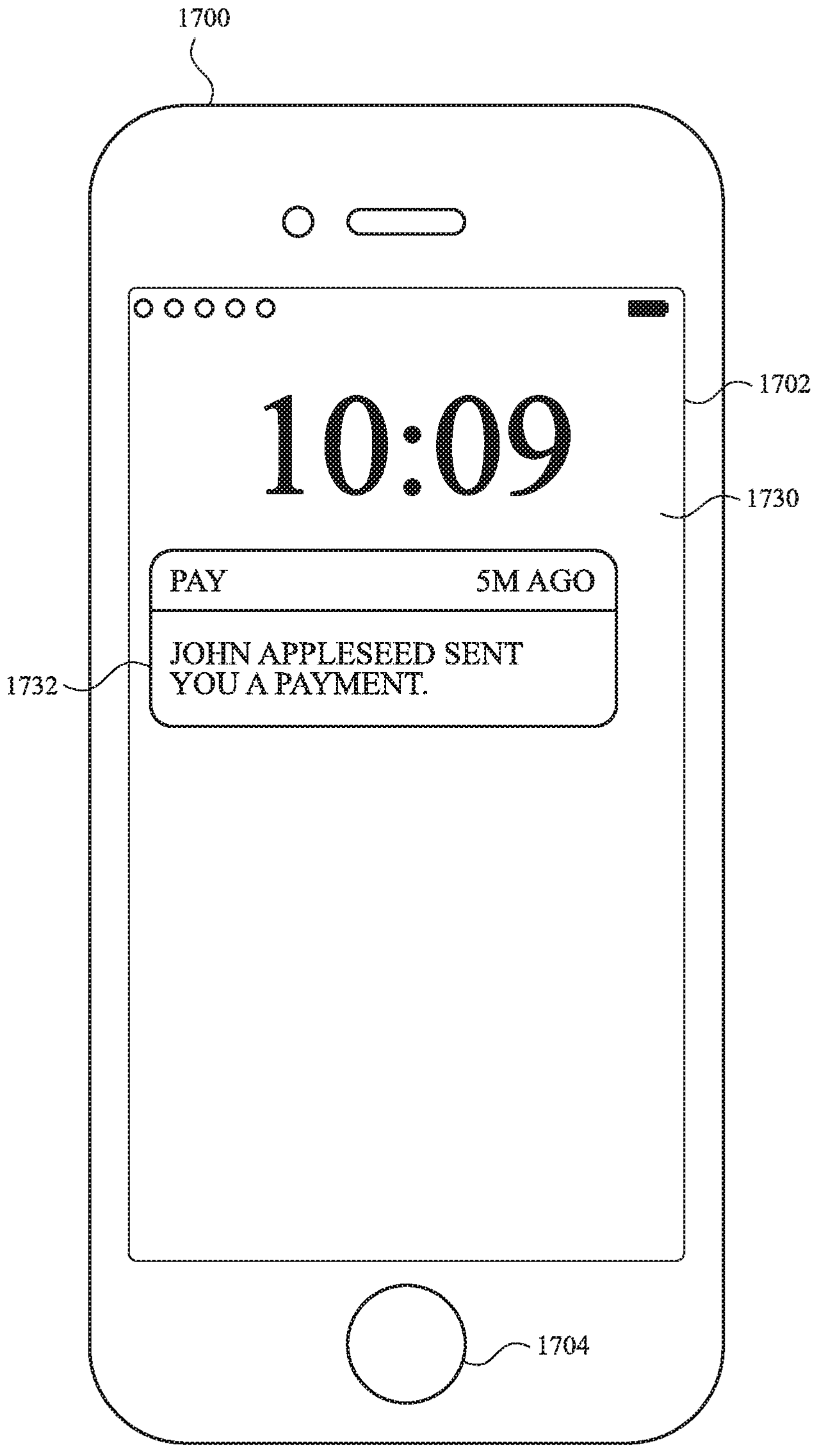
FIGS. 17A-17L illustrate example user interfaces for activating accounts for accepting and sending transfers, in accordance with some embodiments.

FIG. 17A illustrates an electronic device 1700 (e.g., portable multifunction device 100, device 300, or device 500). In the non-limiting example embodiment illustrated in FIGS. 17A-17L, electronic device 1700 is a smartphone. In other embodiments, electronic device 1700 can be a different type of electronic device, such as a wearable device (e.g., a smartwatch). Electronic device 1700 has a display 1702 and one or more input devices (e.g., touchscreen of display 1702, a mechanical button 1704, a mic).

In FIG. 17A, electronic device 1700 displays, on display 1702, a user interface locked screen 1730 showing a notification 1732 corresponding to a payment received from a message participant 1710 (e.g., "John Appleseed"). For example, as show in FIG. 17A, notification 1732 reads "John Appleseed sent you a payment." In some embodiments (e.g., if the received payment is a gift), an amount of the received payment is not shown on notification 1732. In some embodiments (e.g., if the received payment is not a gift), an amount of the received payment is shown on notification 1732.

In some embodiments, notification 1732 is shown on a different user interface other than user interface locked screen 1730. For example, notification 1732 can be shown on a homescreen of the device (e.g., as a pop-up banner). For another example, notification 1732 can be shown on a notification user interface (e.g., a notification panel) of the device. For another example, notification 1732 can be shown as a pop-up notification over an application user interface of a currently-running application on the device.

Figure 17B:
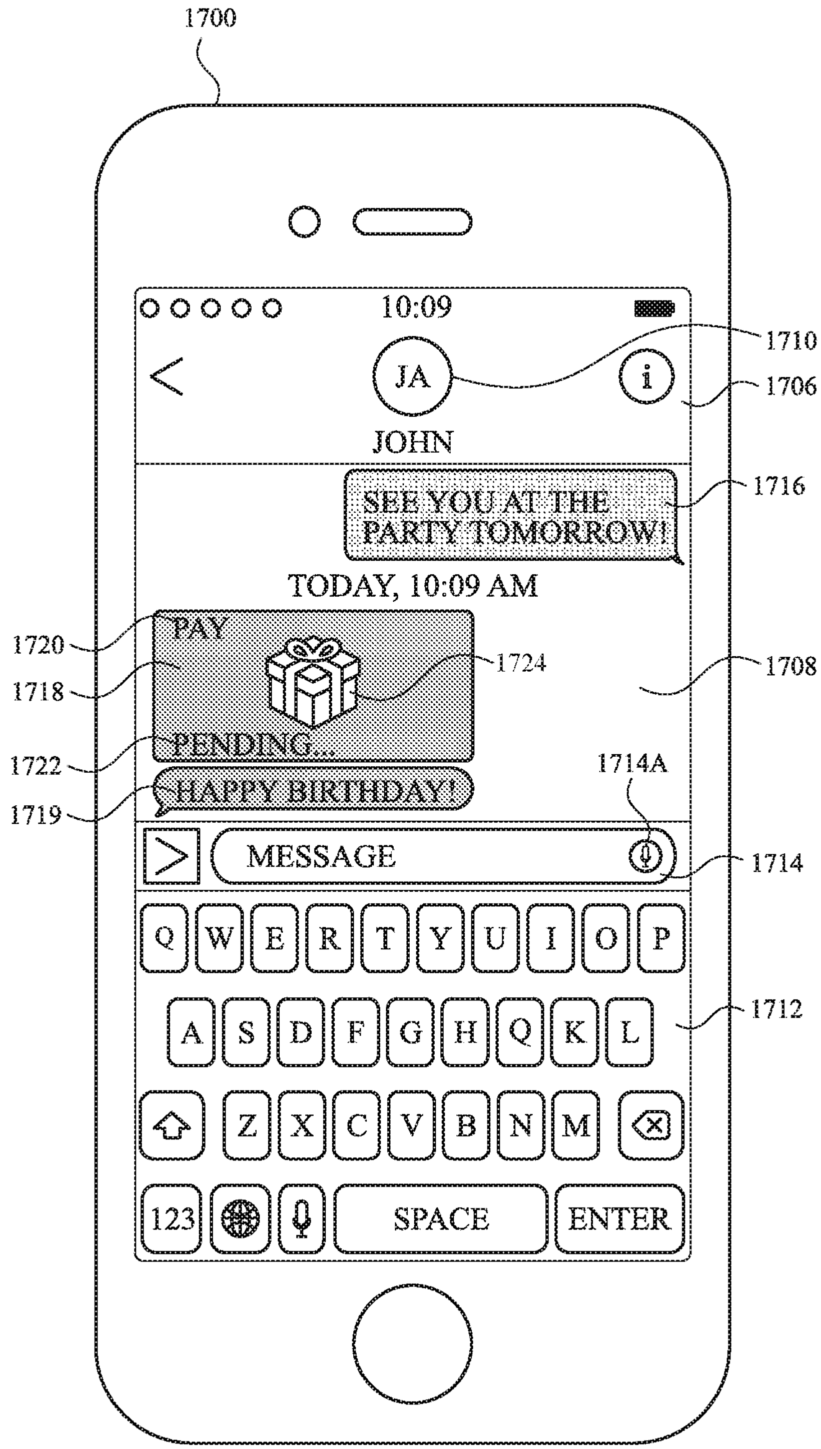

FIG. 17B shows a message conversation 1708 of a messaging application 1706 between a user of electronic device 1700 (e.g., "Kate Appleseed") and message participant 1710 (e.g., "John Appleseed"), the sender of the payment corresponding to notification 1732. In some embodiments, as shown in FIG. 17B, the device 1700 also displays (e.g., beneath or covering a portion of messaging application 1708) a virtual keyboard 1712 (e.g., an alphanumeric keyboard for typing a message) and a compose bar 1714 displaying the text of a message as a message is typed using virtual keyboard 1712. In some embodiments, a mechanical keyboard can be used in addition to or alternatively to virtual keyboard 1712 to type a message. In some embodiments, compose bar 1714 can expand (e.g., expand upwards) to accommodate a longer message or message object (e.g., an image, an emoticon, a special type of message object, such as a payment object). In some embodiments, compose bar 1714 includes a mic button 1714A which, when activated, enables the user to enter a message using voice input.

As shown in FIG. 17B, message conversation 1708 includes a message object 1716 that corresponds to a message sent by the user to message participant 1710. In the message corresponding to message object 1716, the user states to message participant 1710: "See you at the party tomorrow!"

As also shown in FIG. 17B, message conversation 1708 includes a gift payment message object 1718 that corresponds to the received payment (e.g., a gift payment) notified by notification 1732. In some embodiments, gift payment message object 1718 includes a mode indication 1720 (e.g., corresponding to mode indication 1120 described, for example, in FIG. 11A) (e.g., stating "PAY") that the payment message object corresponds to a payment made via an operating-system controlled payment transfer application (and not by a third-party application). In some embodiments, gift payment message object 1718 includes a status indicator 1722 (e.g., corresponding to first status indicator 894) informing the user of a status of the payment corresponding to the payment message object (e.g., "pending," "paid," "accepted," "expired," etc.). For example, in FIG. 17A, status indicator 1722 shows "pending," thus indicating to the user that the payment associated with gift payment message object 1718 has not yet been accepted by the user.

In some embodiments, gift payment message object 1718 includes a graphical indication 1724 (e.g., instead of an indication of the payment, thus hiding the payment amount). In some embodiments, graphical indication 1724 is a graphical animation (e.g., a gift box, an envelope, a birthday cake) that informs the user that the payment corresponding to gift payment message object 1718 is as gift. In some embodiments, graphical indication 1724 is a dynamic graphical animation (e.g., an opening gift box, an opening envelope, a birthday cake with lighted candles) that informs the user that the payment corresponding to gift payment message object 1718 is a gift.

In FIG. 17B, gift payment message object 1718 includes an accompanying note message object 1719 corresponding to a note (e.g., a comment or message) sent by the sender of the gift payment (e.g., message participant 1710). For example, in FIG. 17B, the message corresponding to note message object 1719 accompanying gift payment message object 1718 states "Happy Birthday!," thus providing further indication (e.g., in addition to graphical indication 1724) that the gift payment is intended as a gift for the user's birthday.

In some embodiments, prior to sending of a gift payment (e.g., the payment corresponding to gift payment message object 1718), a payment (e.g., the payment corresponding to gift payment message object 1718) is marked as a gift payment (instead of a regular payment) at the sender's device (e.g., message participant 1710's device) in response to detecting user selection of a send gift payment option (e.g., on payment transfer user interface 840 described, for example, in FIG. 8E). In some embodiments, in addition to the send gift payment option, the device provides (e.g., on a payment transfer user interface, such as payment transfer user interface 840, or on a gift options user interface accessible from the payment transfer user interface) a plurality of (dynamic) graphical animations (e.g., a gift box, an envelope, a birthday cake) that can be used for graphical indication 1724 to be applied to the gift payment message object (e.g., gift payment message object 1718) corresponding to the gift payment.

Figure 17C:
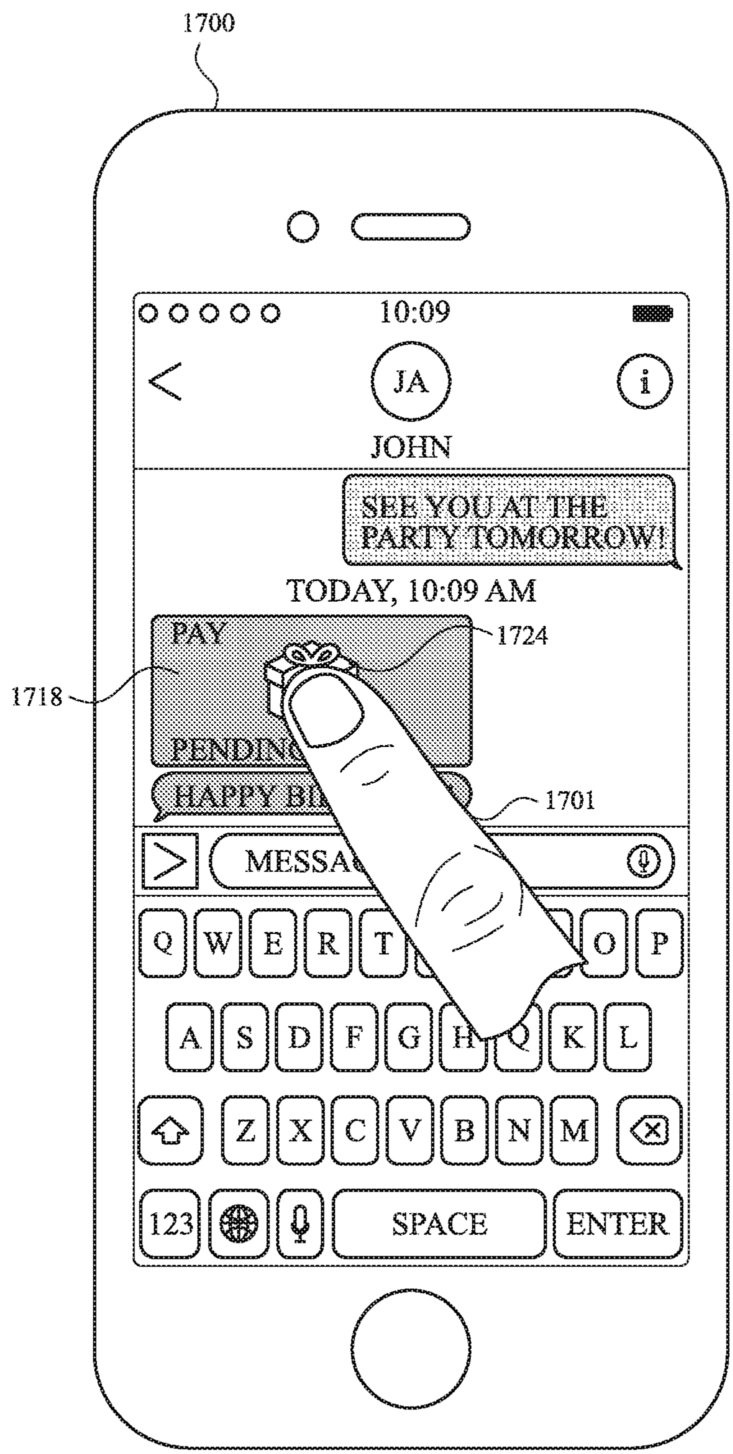

In FIG. 17C, while displaying gift payment message object 1718 within message conversation 1708, electronic device 1700 detects a user input on (graphical indication 1724 of) gift payment message object 1718. For example, as shown in FIG. 17C, the user input is a tap gesture 1701 on graphical indication 1724. In some embodiments, the user input (e.g., tap gesture 1718) is detected at any region within gift payment message object 1718.

Figure 17D:
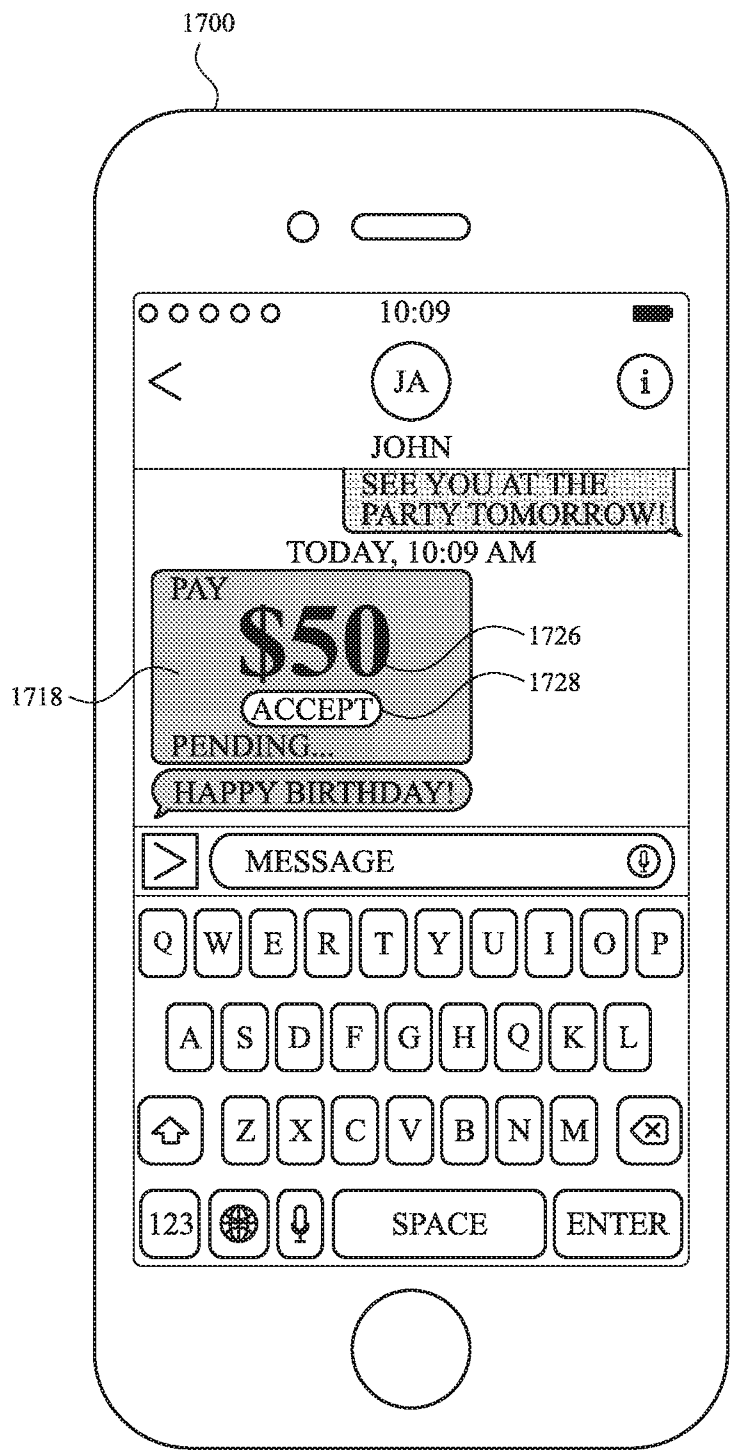

In FIG. 17D, in response to detecting tap gesture 1701, electronic device 1700 replaces display of graphical indication 1724 hiding the gift (payment) amount with an amount indication 1726 (e.g., corresponding to amount indication 1122 described, for example, in FIG. 11A), thereby revealing the amount of the gift payment, and an accept button 1728 (e.g., corresponding to accept button 1124 described, for example, in FIG. 11A) for accepting the payment sent by message participant 1710 to the user as a gift. The revealing of amount indication 1726 (showing the gift amount) from graphical indication 1724 (hiding the gift amount) in this fashion provides a "surprise" effect to the recipient (e.g., the user) receiving the payment as a gift.

Figure 17E:
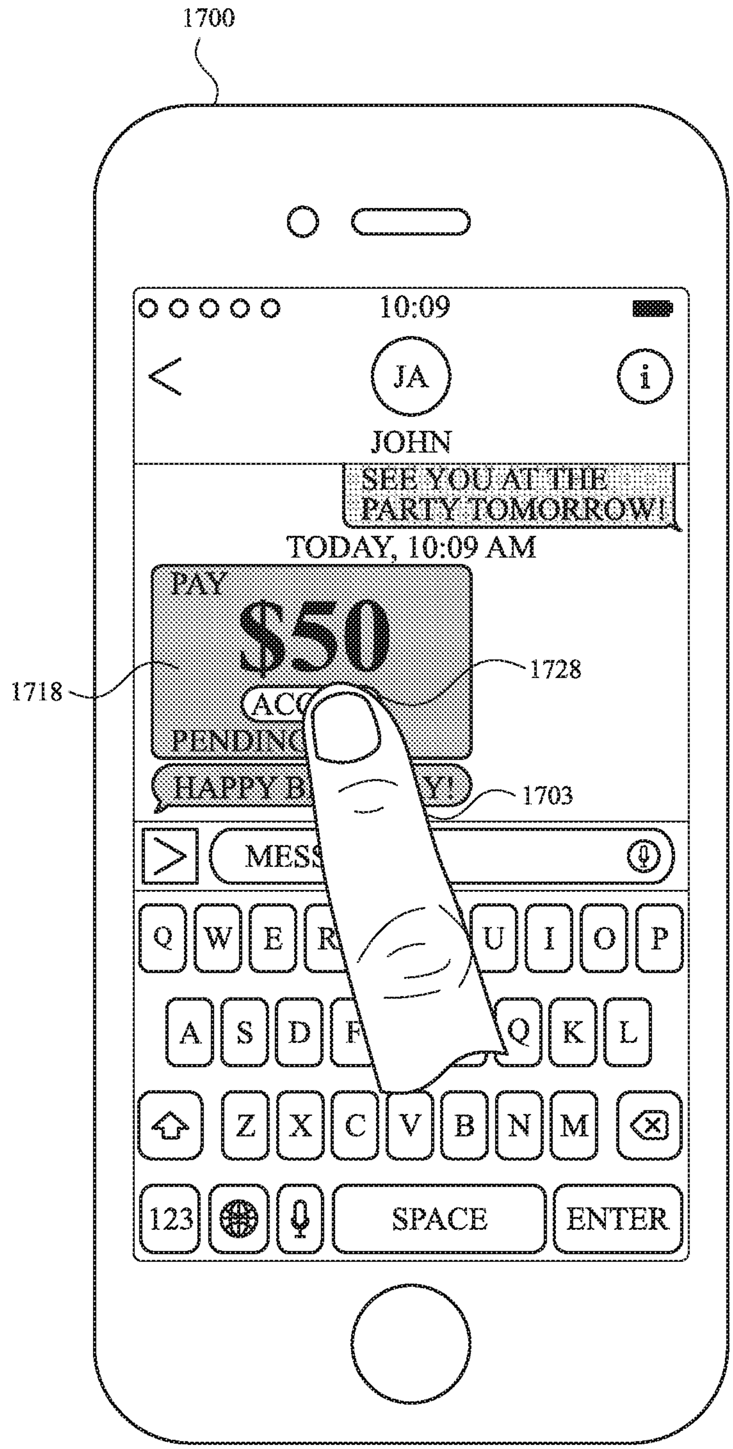

In FIG. 17E, while displaying amount indication 1726 and accept button 1728 within gift payment message object 1718, electronic device 1700 detects a user activation of accept button 1728. For example, as shown in FIG. 17E, the user activation is a tap gesture 1703 on accept button 1728 of gift payment message object 1718.

Figure 17F:
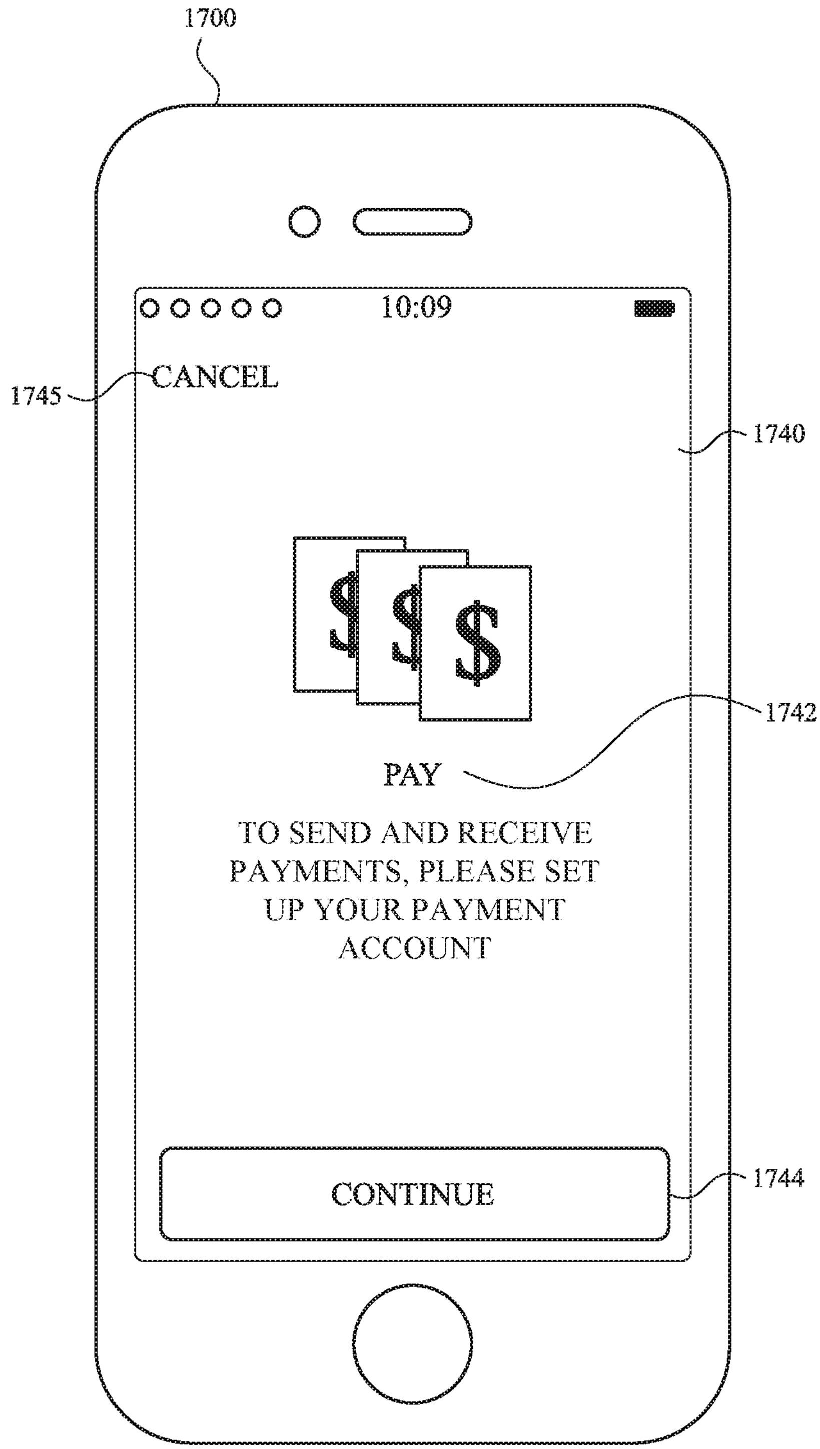

In some embodiments, as shown in FIG. 17F, in response to detecting tap gesture 1703, in accordance with a determination (e.g., made by electronic device 1700 based on accounts stored or logged into the device or made by an external device, such as a server, storing information about accounts associated with the user of the device) that a payment account associated with the user, which is required to receive and send payments (e.g., via an operating-system controlled transfer application), is not yet activated (e.g., not yet set up, not yet configured), the device displays (e.g., replaces display of message conversation 1708 of messaging application 1706 with) an initial setup notification user interface 1740.

In some embodiments, initial setup notification user interface 1740 includes an (graphical and/or textual) indication 1742 informing the user that a payment account associated with the user account (logged into the device and belonging to the user of the device) must be activated (e.g., set up, configured). For example, in FIG. 17F, indication 1742 includes a graphical indication of a payment account and states: "To send and receive payments, please set up your Payment account." Initial setup notification user interface 1740 also includes a proceed button 1744 for proceeding with activating the payment account. In some embodiments, initial setup notification user interface 1740 also includes a cancel button 1745 for forgoing proceeding with activating the payment account.

In some embodiments, in accordance with a determination (e.g., made by electronic device 1700 based on accounts stored or logged into the device or made by an external device, such as a server, storing information about accounts associated with the user of the device) that a required payment account associated with the user is already activated (e.g., is already set up, is already configured), the device proceeds with accepting the gift payment sent by message participant 1710 via, for example, the steps described above with reference to FIGS. 11A-11G, causing the received gift payment (e.g., in the amount of $50) to be added to the payment account associated with the user.

In some embodiments, if the payment account is already activated, the payment corresponding to a payment message object (e.g., gift payment message object 1718) is automatically accepted without any user input (e.g., without tap gesture 1703). In some embodiments, electronic device 1700 proceeds to automatically accept (without any user input, such as tap gesture 1703, on the payment message object corresponding to the received payment) the received payment is an automatic accept option is enabled on the device. In some embodiments, even if the automatic accept option is enabled on the device, the device forgoes automatically accepting a payment if the sender of the payment (e.g., message participant 1710) is not on a contacts list or a trusted contacts list associated with the user account logged onto the device. In some embodiments, even if the payment account is already activated and an automatic accept option is enabled, if electronic device 1700 determines that there is no record of any prior transactions involving the payment account (e.g., if the device determines that the user has already not yet received a first payment), the device forgoes automatically accepting the payment in that first instance and instead requires user input (e.g., tap gesture 1703) to accept the payment.

Figure 17G:
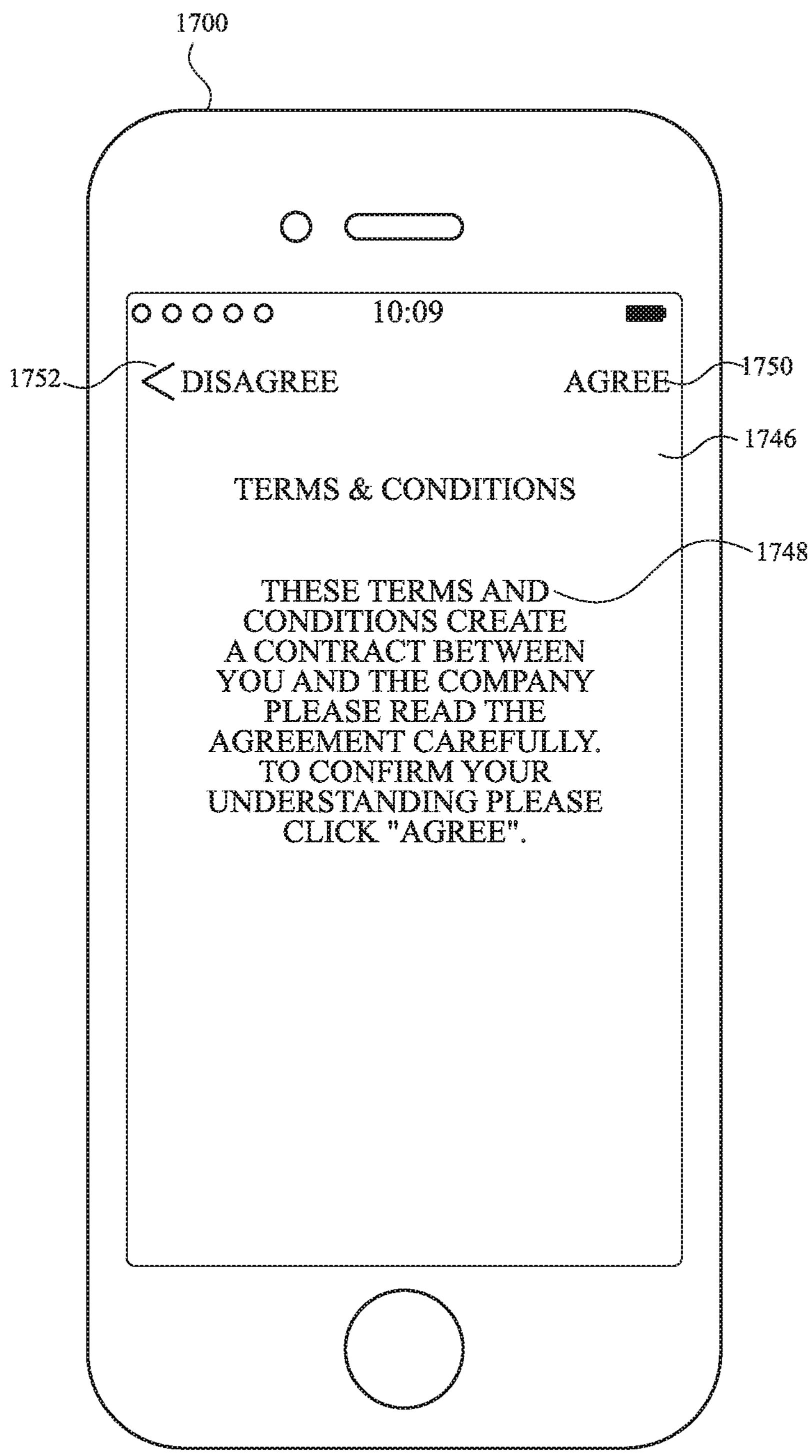

FIG. 17G shows a "Terms and Conditions" page 1746 that is displayed in response to detecting user selection (e.g., a tap gesture) of proceed button 1744 on initial setup notification user interface 1740. As shown in FIG. 17G, "Terms and Conditions" page 1746 includes a textual description 1748 of the (legal) terms and conditions associated with activating a payment account, and requests user confirmation of the user's understanding of the terms and conditions and agreement with the terms and conditions. "Terms and Conditions' page 1746 includes a agree button 1750 for proceeding with the account activation (and thereby indicating agreement with the terms and conditions) and a disagree button 1752 for forgoing proceeding with the account activation (and thereby indication non-agreement with the terms and conditions).

Figure 17H:
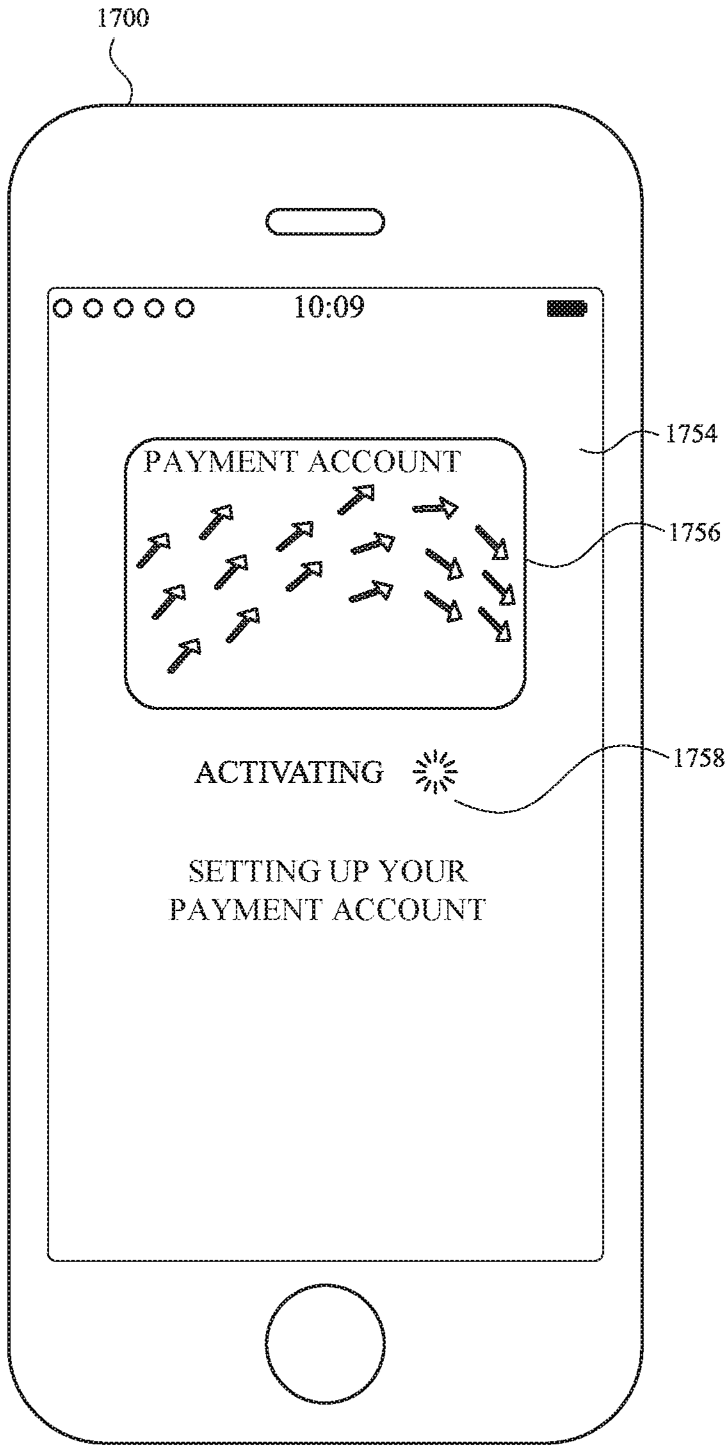

In FIG. 17H, in response to detecting user selection of accept button 1750 on "Terms and Conditions" page 1746, electronic device 1700 displays an account activation user interface 1754. As shown in FIG. 17H, account activation user interface 1754 includes a graphical representation 1756 (e.g., an image representing a card associated with the payment account) of the payment account and a progress indication 1758 (e.g., stating "Activating," "Setting up your Payment account") informing the user that activation of the payment account is in progress.

Figure 17I:
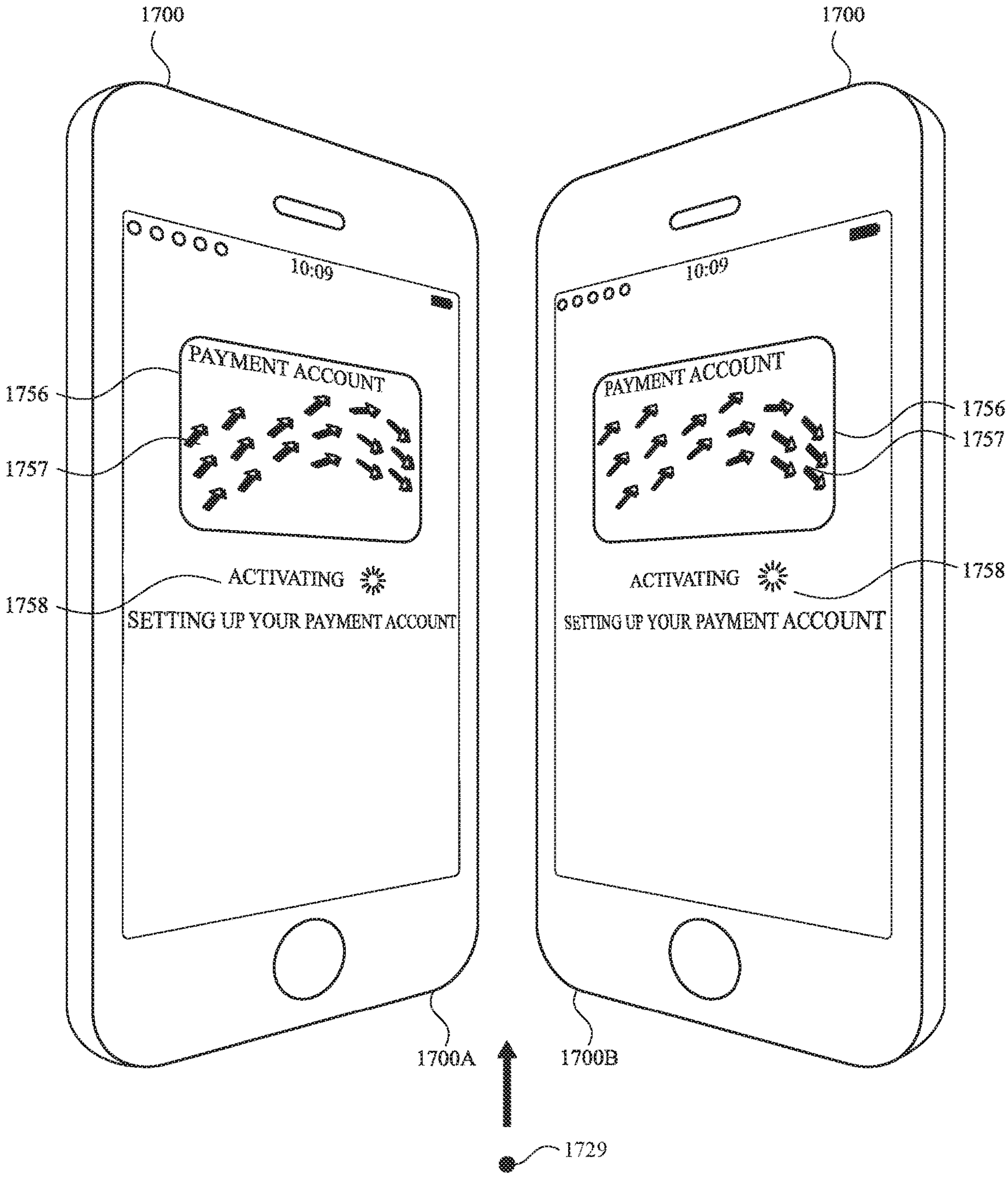

In some embodiments, as shown in FIG. 17I, electronic device 1700 generates a dynamic feedback animation on graphical representation 1756 of the payment account (e.g., a plurality of moving patterns 1757, a 3D animation of moving patterns/elements) akin to the dynamic visual feedback applied to a completed payment message object (e.g., the dynamic visual feedback applied to completed payment message object 1132 described, for example, in FIG. 11E). In some embodiments, the feedback is a dynamic visual feedback causing display of the graphical representation 1756 to change as changes in the orientation of the device relative to a reference point 1729 are detected, where reference point 1729 is a face of a viewer (e.g., the user) of the device in a field of view of a sensor (e.g., a camera) of the device (alternatively, in some embodiments, the reference point is a static point external to the device, such as a location on the ground or floor). For example, in FIG. 17I, the dynamic visual feedback is a 3D effect that provides the user with the visual effect that graphical representation 1756 is three-dimensional. Thus, in FIG. 17I, based on reference point 1729 of the user, graphical representation 1756 looks visually different (e.g., shadows behind plurality of moving patterns 1757 change) from angle 1700A of the device and from angle 1700B of the device and, optionally, both the view of graphical representation 1756 from angle 1700A and angle 1700B look different from the appearance of the representation from straight on (e.g., such that the display is not tilted at an angle relative to the face of the viewer, as shown in FIG. 17H). In some embodiments, the dynamic visual feedback is a changing color applied to the graphical representation.

In some embodiments, in addition to or instead of a dynamic visual feedback, the device generates a dynamic haptic feedback. In some embodiments, the dynamic haptic feedback is a dynamically strengthening and weakening tactile output caused by the device. In some embodiments, the dynamic haptic feedback is a tactile output with changing tactile output patterns caused by the device. In some embodiments, the strength or frequency of the tactile output changes as the device detects changes in the orientation of the device relative to the reference point (e.g., reference point 1729).

In some embodiments, the generated feedback (e.g., visual feedback, sensory feedback, audio feedback) is caused (e.g., only) by an operating system program of the device and non-operating system programs of the device are not enabled to cause the feedback.

Figure 17J:
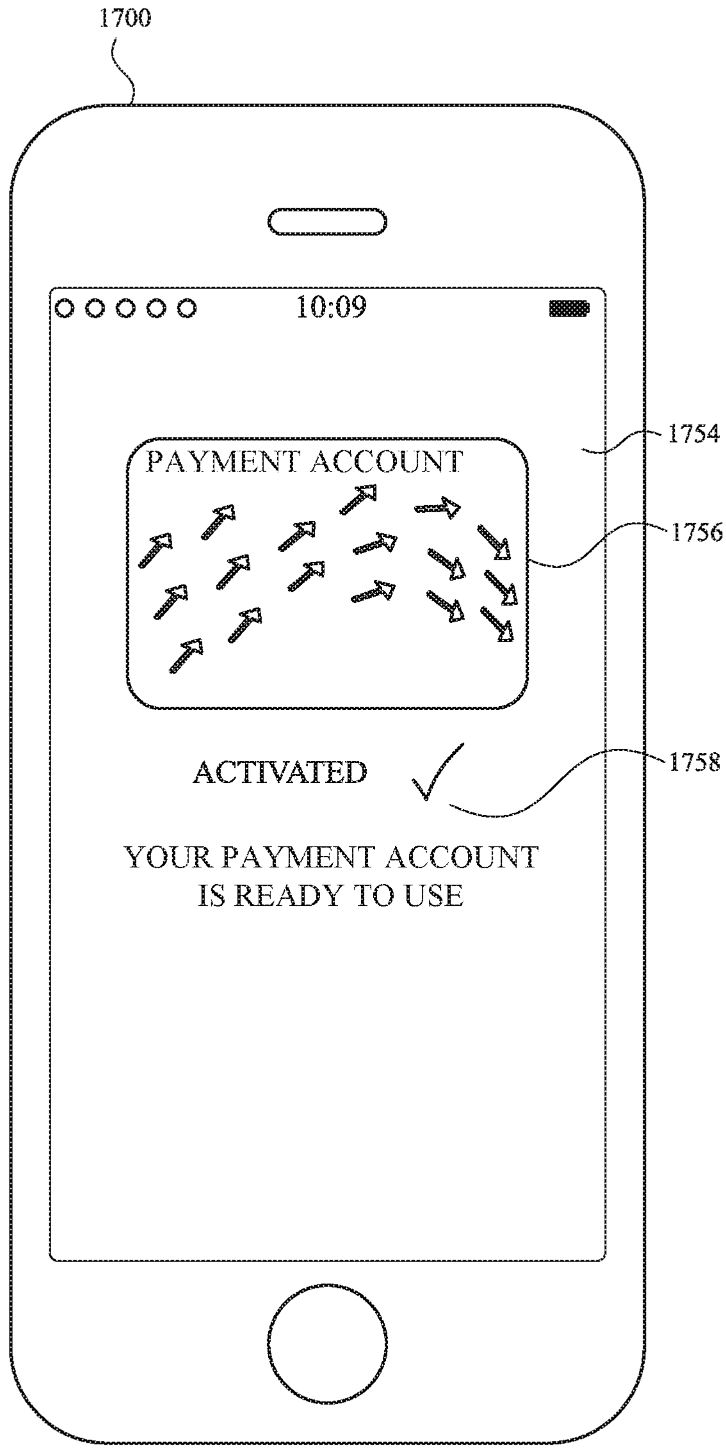
Figure 17K:
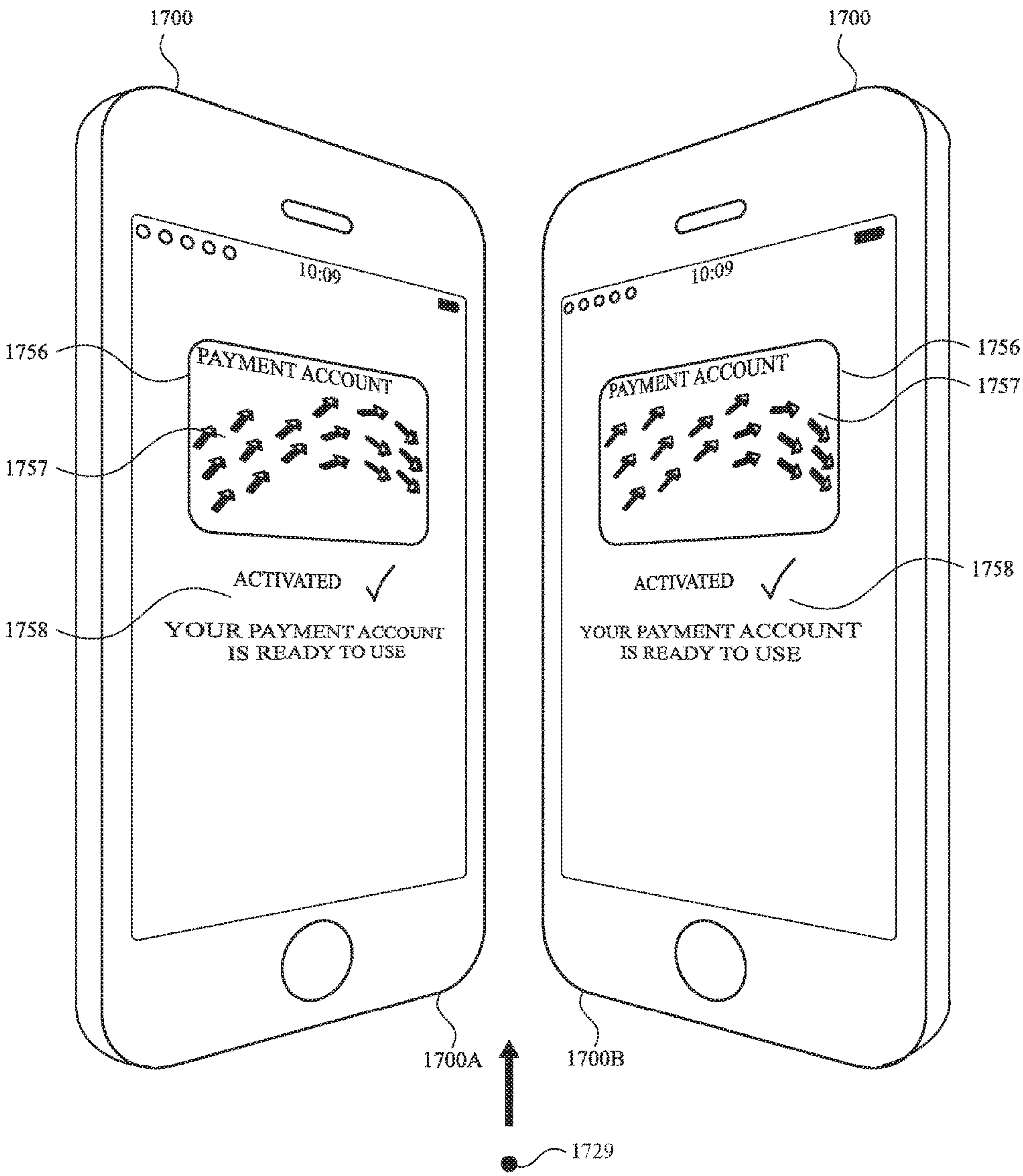

FIG. 17J shows the account activation process being completed. Thus, in FIG. 17J, progress indication 1758 of account activation user interface 1754 informs the user that activation of the payment account has been successfully completed (e.g., by stating "Activated, "Your Payment account is ready to use"). FIG. 17K shows account activation user interface 1754 from FIG. 17J, with activation being completed. In some embodiments, as shown in FIG. 17K, the dynamic visual feedback applied to graphical representation 1756 of the payment account, shown and described with reference to FIG. 17I, is maintained after activation of the payment account.

Following activation of a payment account, FIG. 17L again shows the payment corresponding to gift payment message object 1718 within message conversation 1708 of messaging application 1706 having been accepted. In particular, because the payment has been accepted (and the gift payment of $50 has been credited to the activated payment account), a dynamic visual effect is applied to amount indication 1726 of gift payment message object 1718 (or to the entire payment message object), where the dynamic visual effect is akin to the visual effect applied to completed payment message object 1132 described above with reference to FIGS. 11D-11E.

Figure 17L:
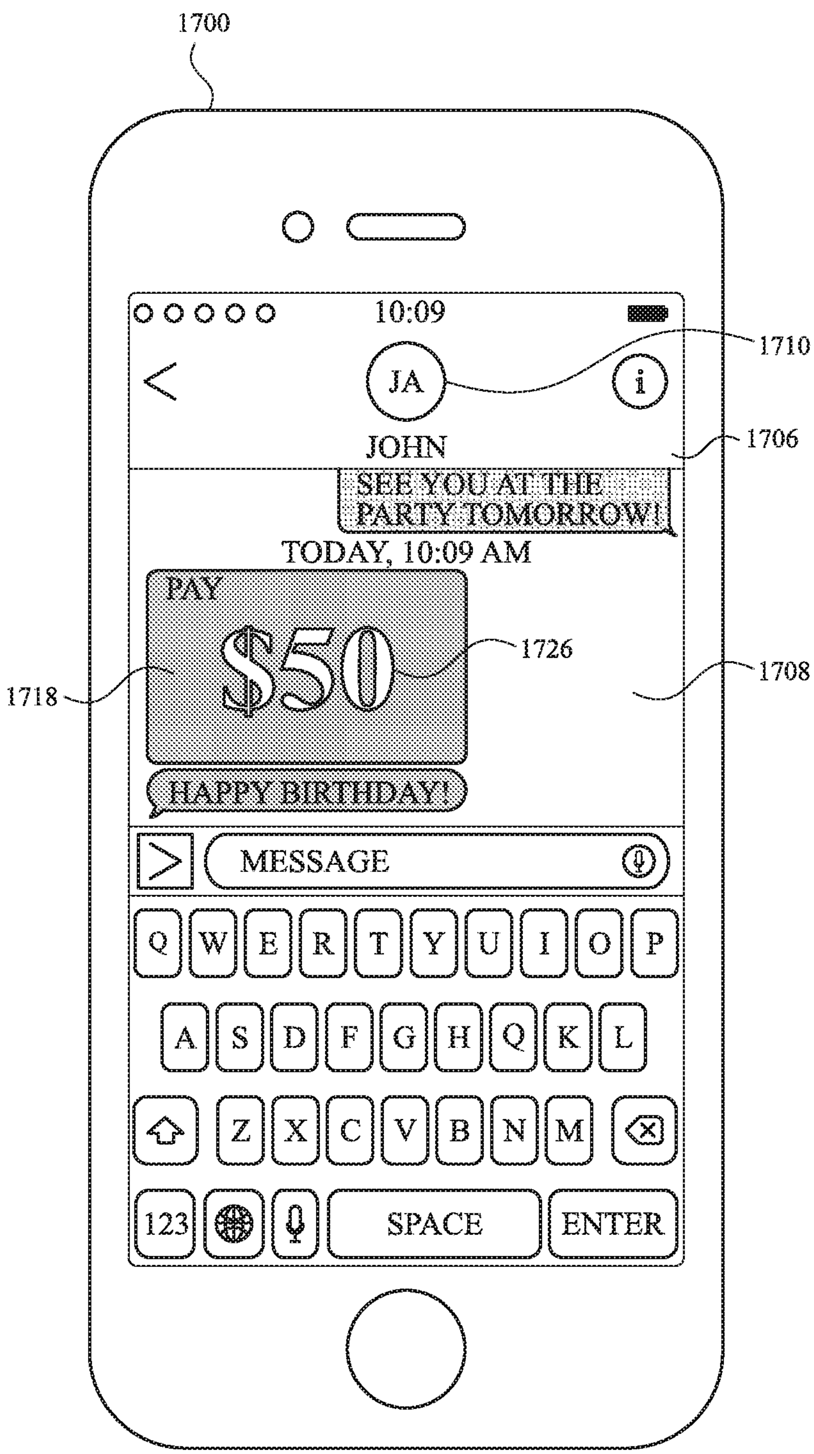
Figure 18A:
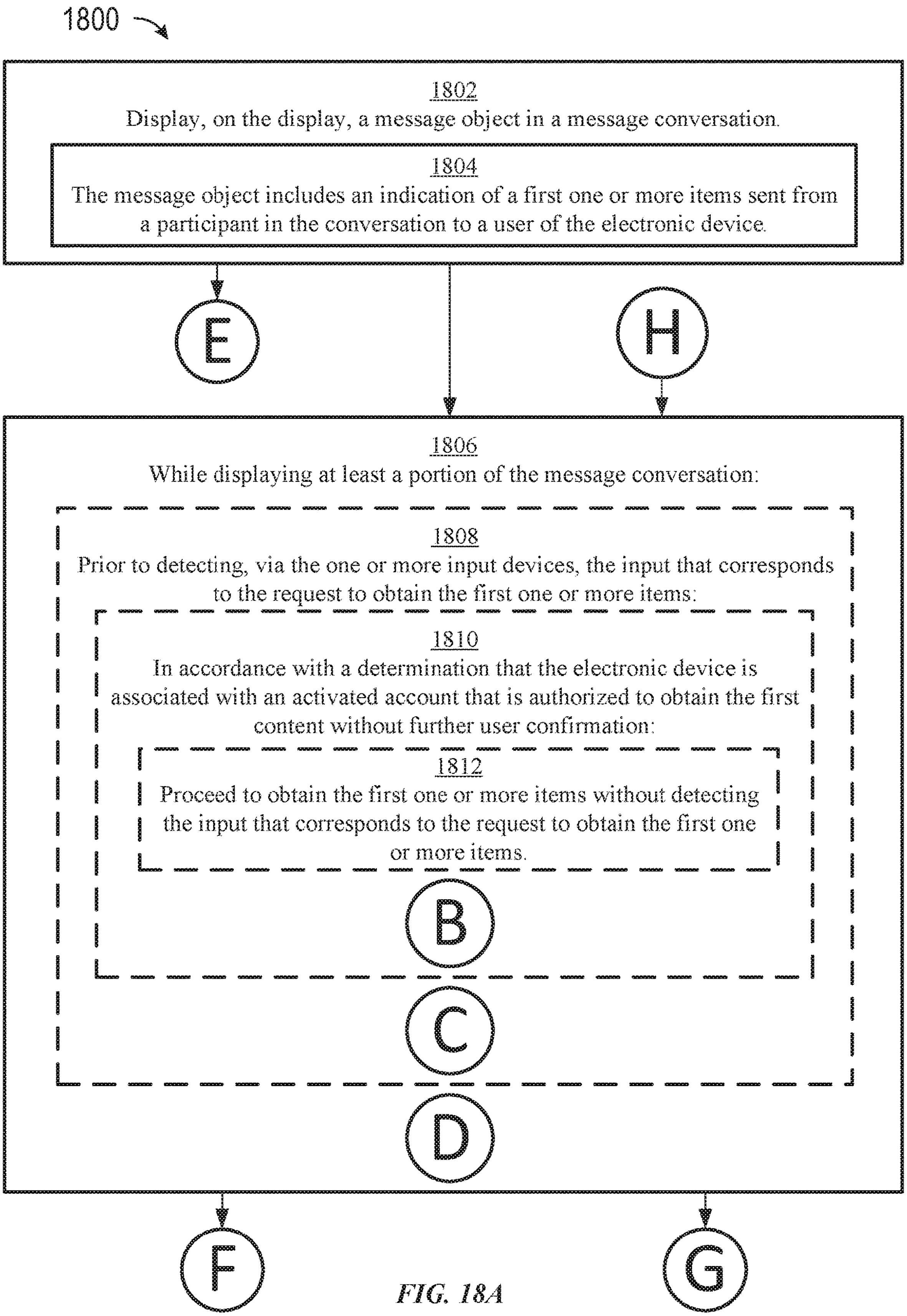
Figure 18D:
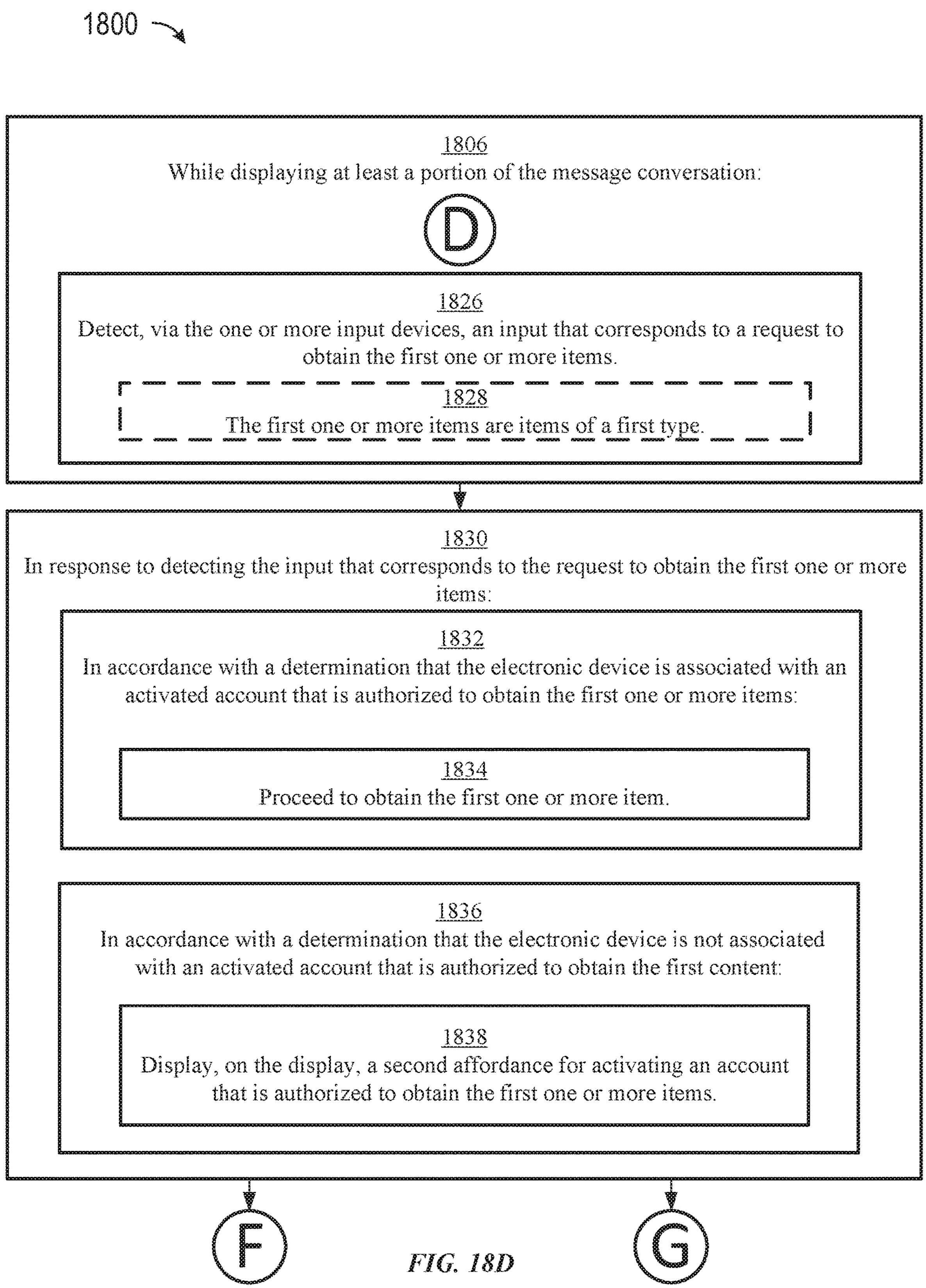
Figure 18E:
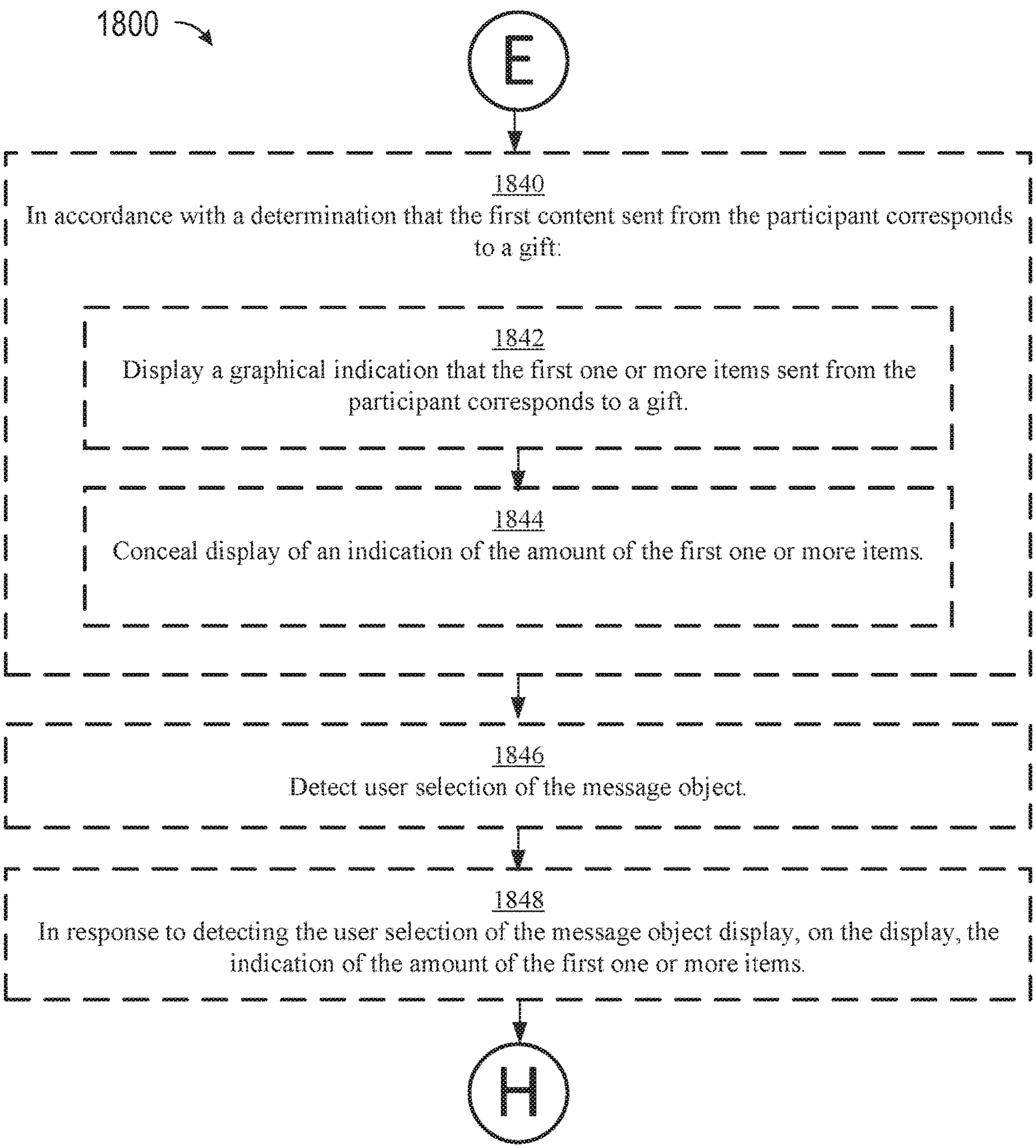

In some embodiments, in response to detecting user selection of completed gift payment message object 1718 shown in FIG. 17L, electronic device 1700 displays (e.g., replaces display of messaging application 1706 with) a transaction detail user interface, corresponding to transaction detail user interface 1134 described above in FIGS. 11G and 11V, that includes a list of details (e.g., an copy of the payment message object, a copy of an accompanying note, payment sender/recipient information, transaction date and time information, information of one or more accounts used in the transaction etc.). In some embodiments, the transaction detail user interface further includes a wallet button (e.g., a "View in Wallet" selectable indication) for viewing the transaction details in an electronic wallet application of the device. In some embodiments, the transaction detail user interface further includes a return button to return the received payment to the sender (e.g., message participant 1710) of the payment.

FIGS. 18A-18F are a flow diagram illustrating a method for managing peer-to-peer transfers using an electronic device in accordance with some embodiments. Method 1800 is performed at a device (e.g., 100, 300, 500, 1600, 1700) with a display and one or more input devices (e.g., a touchscreen, a mic, a camera, a biometric sensor). Some operations in method 1800 are, optionally, combined, the orders of some operations are, optionally, changed, and some operations are, optionally, omitted.

As described below, method 1800 provides an intuitive way for managing peer-to-peer transfers. The method reduces the cognitive burden on a user for managing peer-to-peer transfers, thereby creating a more efficient human-machine interface. For battery-operated computing devices, enabling a user to manage peer-to-peer transfers faster and more efficiently conserves power and increases the time between battery charges.

The electronic device (e.g., 1600, 1700) displays (1802), on the display (e.g., 1602, 1702), a message object (e.g., 1718, a text message, a chat bubble, an open email) in a message conversation (e.g., 1608, 1708) (between a user of the electronic device and a remote user (e.g., 1610, 1710), in a messaging application). The message object (e.g., 1620, 1718) includes (1804) an indication (e.g., 1622, 1724, 1726) of a first one or more items sent from a participant in the conversation to a user of the electronic device (e.g., a specially encrypted message or a payment object that corresponds to a payment from the participant to the user of the device). In some examples, the indication (e.g., 1622, 1726) indicates the first amount of a resource, which can be deposited into an account of the user. Displaying messages in the conversation provides the user with contextual feedback regarding the sender/receiver of messages in the conversation and reduces the need for the user to investigate the sender/receiver for further messages displayed in the conversation. Displaying a message that includes an indication of the items (or quantity of items) provides the user with visual feedback regarding what has been received. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, while (1806) displaying at least the portion of the message conversation (e.g., 1608, 1708) and prior to (1808) detecting, via the one or more input devices, the input that corresponds to the request to obtain the first one or more items (e.g., an input on an accept affordance for playing the specially encrypted message or accepting the payment), and in accordance with (1810) a determination that the electronic device is associated with an activated account that is authorized to obtain the first content without further user confirmation (e.g., in accordance with a determination that the user has already set up a message decryption account configured the account to automatically decrypt messages or a peer-to-peer payment account configured to automatically accept payments), the electronic device (e.g., 1600, 1700) proceeds (1812) to obtain the first one or more items without detecting the input that corresponds to the request to obtain the first one or more items (and without requiring any additional user inputs). Thus, in some examples, the electronic device proceeds to automatically obtain the first content without any user input. In some examples, the electronic device proceeds to automatically obtain the first content without any user input from any participant. In some examples, the electronic device proceeds to automatically obtain the first content without any user input from a participant that is on a contacts list of the user's device. Automatically obtaining the items without detecting further user input when the device is associated with an activated, authorized account enables the user to more quickly obtain the items. Performing an operation when a set of conditions has been met without requiring further user input enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the first one or more items are items of a first type (e.g., encrypted messages or payments). While (1806) displaying at least the portion of the message conversation (e.g., 1608, 1708) and in accordance with (1810) the determination that that the electronic device (e.g., 1600, 1700) is associated with the activated account that is authorized to obtain the items of the first type without further user confirmation, and in accordance with (1814) a determination that there is no record of a prior obtained items of the first type using the activated account (e.g., in accordance with a determination that the user has already set up a message decryption account but has not yet received an encrypted message, in accordance with a determination that the user has already set up a peer-to-peer payment account but has not yet received a payment), the electronic device: forgoes proceeding (1816) to obtain the first one or more items without detecting the input (e.g., input is required the first time, even if the user has configured the device to automatically decrypt messages/accept payments) and proceeds (1818) to obtain the first content in response to detecting the input that corresponds to the request to obtain the first one or more items.

In some examples, the first one or more items are items of a first type (e.g., encrypted messages or payments). While (1806) displaying at least the portion of the message conversation (e.g., 1608, 1708) and in accordance with (1810) the determination that that the electronic device (e.g., 1600, 1700) is associated with the activated account that is authorized to obtain the items of the first type without further user confirmation, in accordance with (1820) a determination that there is a record of a prior obtained items of the first type using the activated account (e.g., in accordance with a determination that the user has already set up a message decryption account and has already received at least one encrypted message, in accordance with a determination that the user has already set up a peer-to-peer payment account and has already received at least one payment), the electronic device proceeds (1822) to obtain the items of the first type without requiring detection of a user input that corresponds to a request to obtain items of the first type.

In some examples, while (1806) displaying at least the portion of the message conversation (e.g., 1608, 1708) and prior to (1808) detecting, via the one or more input devices, the input that corresponds to the request to obtain the first one or more items (e.g., an input on an accept affordance for playing the specially encrypted message or accepting the payment), and in accordance with a determination that the electronic device is not associated with an activated account that is authorized to obtain the first one or more items without further user confirmation, the electronic device (e.g., 1600, 1700) displays (1824), on the display (e.g., 1602, 1702), the accept affordance (e.g., an activation affordance requesting or prompting the user to set up a resource account) for activating an account that is authorized to obtain the first one or more items. Displaying the acceptance affordance when the device is not associated with an activated, authorized account provides the user with feedback regarding the state of the device and enables the user to easily activate an authorized account. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

While displaying (1806) at least a portion of the message conversation (e.g., 1608, 1708), the electronic device (e.g., 1600, 1700) detects (1826), via the one or more input devices, an input that corresponds to a request to obtain the first one or more items. In some examples, the electronic device detects activation of an accept affordance for playing/viewing the specially encrypted message or accepting the payment. In some examples, the first one or more items are items of a first type (e.g., encrypted messages or payments).

In response (1830) to detecting the input that corresponds to the request to obtain the first one or more items, in accordance with (1832) a determination that the electronic device (e.g., 1600, 1700) is associated with an activated account (of the user) that is authorized to obtain the first one or more items (e.g., in accordance with a determination that the user has already set up a message decryption account or a peer-to-peer payment account), the electronic device proceeds (1834) to obtain the first one or more items.

In response (1830) to detecting the input that corresponds to the request to obtain the first one or more items, in accordance with (1836) a determination that the electronic device (e.g., 1600, 1700) is not associated with an activated account that is authorized to obtain the first content, the electronic device displays (1838), on the display (e.g., 1602, 1702), a second affordance (e.g., 1630, 1744, 1750, an activation affordance requesting or prompting the user to set up a resource account) for activating an account that is authorized to obtain the first one or more items. In some examples, the second affordance (e.g., 1630, 1744, 1750) is displayed as part of a user interface (e.g., 1626, 1740, 1746) that covers at least a portion of the message user interface (e.g., 1706, 1708, the message transcript). In some examples, the electronic device already has one or more activated accounts; however, the accounts are not authorized to obtain the first content. For example, the accounts are not the right type of accounts or are not enabled to obtain the first content. Automatically displaying an affordance for activating an account when the device determines that an appropriate account is not already activated provides the user with contextual feedback regarding the status of the device and reduces the need for the user to navigate the user interface of the device to activate the account. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, in accordance with (1840) a determination that the first content sent from the participant (e.g., 1610, 1710) corresponds to a gift (e.g., an encrypted message, a payment intended to be a surprise to the recipient), the electronic device (e.g., 1600, 1700) displays (1842) a graphical indication (e.g., 1622, 1724, an indication that the message is encrypted, a graphical indication of a wrapped gift box, a graphical indication of a closed envelope) that the first one or more items sent from the participant corresponds to a gift. In some examples, the message object (e.g., 1620, 1718) is displayed at least partially as a graphical representation of a wrapped gift box (e.g., 1724). In some examples, the message object (e.g., 1724) is displayed at least partially as a graphical representation of a closed envelope. In some examples, the graphical indication (e.g., 1620, 1724, an indication that the message is encrypted, a graphical indication of a wrapped gift box, a graphical indication of a closed envelope) applied to the graphical representation of the communication is selected based on a special input on a corresponding pending graphical representation of the communication on an external device (e.g., the device where the communication originated from). For example, the special input is a deep press input having a contact intensity greater than a predetermined threshold intensity (e.g., a deep press intensity threshold). In some examples, in response to detecting a deep press the corresponding pending graphical representation of the communication on the device (before it is transmitted from the external device to the electronic device), the external device displays a list of one or more graphical indications (a wrapped gift box, a closed envelope) that can be selected and applied to the communication.

In some examples, in accordance with (1840) a determination that the first content sent from the participant corresponds to a gift (e.g., an encrypted message, a payment intended to be a surprise to the recipient), the electronic device (e.g., 1600, 1700) conceals (1844) (e.g., forgoes) display of an indication of the amount (e.g., 1726) of the first one or more items. Displaying a graphical indication (e.g., 1724) that the item corresponds to a gift without displaying an indication of the amount (e.g., 1726) of the gift provides the user with feedback regarding the state of the content (e.g., that it is a gift) and, optionally, enables the user to reject the gift without seeing the amount. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the electronic device (e.g., 1600, 1700) detects (1846) user selection of the message object (e.g., 1620, 1718). In response to detecting the user selection of the message object (e.g., 1718), the electronic device (e.g., 1600, 1700) (optionally decrypting the message and) displays (1848), on the display, the indication of the amount (e.g., 1726) of the first one or more items. Displaying the indication of the amount (e.g., 1726) of the gift provides the user with feedback regarding the state of the content (e.g., the quantity of the gift). Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the electronic device (e.g., 1600, 1700) receives (1850) a second input on the message object (e.g., 1620, 1718, a text message, a chat bubble, an open email) in the message conversation (between a user of the electronic device and a remote user). In response to receiving the second input on the message object (e.g., 1620, 1718), the electronic device displays (1852), on the display (e.g., 1602, 1702), a detail user interface including information (e.g., encryption/decryption information, the amount of content, the amount of payment, information related to the participant, a time and date, a note/comment relating to the obtaining of the first content) associated with the message object.

In some examples, the first one or more items are items of a first type (e.g., encrypted messages or payments). In some examples, in accordance with a determination that obtaining the first one or more items moves a total number of prior transfers of items of the first type (e.g., obtaining/receiving of encrypted messages or payments, transmission/sending out of encrypted messages or payments) associated with the activated account over a predetermined limit, the electronic device (e.g., 1600, 1700) displays (1854), on the display (e.g., 1602, 1702), a verification user interface (e.g., as described below with reference to FIGS. 31A-31M) corresponding to a request to verify identity of the user associated with the activated account. In some examples, when the user attempts to accept (or send) funds that would cause the total amount of funds accepted (or sent) over a certain period (or total) to exceed a threshold amount, a verification user interface is displayed to enable the user to verify the user's identity, such as by taking a picture of an identification (e.g., government issued identification).

In some examples, the electronic device (e.g., 1600, 1700) includes an application that is configured to manage (e.g., handle) the first one or more items. In some examples, the application is configured to decrypt encrypted messages. In some examples, the application is configured to encrypt messages. In some examples, the application is configured to manage a payment account to receive/send payments. In some examples, although the application is available on the device that can handle the first content, an activated account is also required to obtain the first content.

In some examples, prior to displaying, on the display (e.g., 1602, 1702), the message object (e.g., 1620, 1718) in the message conversation (e.g., 1608, 1708) (e.g., prior to the user viewing the decrypted message, prior to the user viewing the payment), and in accordance with a determination that the first one or more items sent from the participant (e.g., 1610, 1710) corresponds to a gift (e.g., an encrypted message, a payment intended to be a surprise to the recipient), the electronic device displays, on the display (e.g., 1602, 1702), a notification (e.g., 1732) (e.g., a pop-up notification, a notification banner) of the first content received from the participant that does not include display of an indication of the amount of the first one or more items. In some examples, prior to displaying, on the display, the message object (e.g., 1718) in the message conversation (e.g., 1608, 1708) (e.g., prior to the user viewing the decrypted message, prior to the user viewing the payment), in accordance with a determination that the first one or more items sent from the participant does not correspond to a gift, the electronic device displays, on the display (e.g., 1602, 1702), a notification of the first one or more items received from the participant that includes display of the indication of the amount of the first one or more items. In some examples, the notification (e.g., 1732) is displayed on a home screen of the device. In some examples, the notification (e.g., 1732) is displayed on a lock screen (e.g., 1730) of the device. In some examples, the notification (e.g., 1732) is displayed over a user interface of an application running on the device. Displaying a notification (e.g., 1732) without displaying an indication of the amount when the notification relates to a gift provides the user with feedback regarding the state of the content (e.g., that it is a gift) and, optionally, enables the user to reject the gift without seeing the amount. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the message object (e.g., 1620, 1718) includes an accept affordance (e.g., 1624, 1728, an accept affordance for playing the specially encrypted message or accepting the payment), and the input that corresponds to the request to obtain the first one or more items comprises an input on the accept affordance.

In some examples, the first one or more items are items of a first type (e.g., encrypted messages or payments), and the total amount (e.g., number or aggregate quantity) of prior transfers of items of the first type associated with the activated account includes only prior transfers of items of the first type associated with an obtaining (or receiving) of items of the first type (e.g., receiving a payment, a funding of the activated account by the user of the account) (e.g., by an account associated with a user of the electronic device), and does not include prior transfers of items of the first type associated with a transmission (or sending out) of items of the first type (e.g., from an account associated with a user of the electronic device to another user such as a user of an external device).

Note that details of the processes described above with respect to method 1800 (e.g., FIGS. 18A-18F) are also applicable in an analogous manner to the methods described herein. For example, method 1800 optionally includes one or more of the characteristics of the various methods described herein with reference to methods 900, 1200, 1500, 2100, 2400, 2700, 3000, and 3400. For example, concurrently displaying the representation of a message and a selectable indication that corresponds to a type of item (being transferred, such as a photo, sticker, resources, or a payment), as described in method 900, can be applied with respect to the message object (e.g., 1718). For another example, the outputting of dynamic feedback described in method 1200 can be applied with respect to the message object (e.g., 1718). For another example, the different visual appearances of a message object based on whether the message object corresponds to a transmission message or a request message, as described in method 1500, can be applied with respect to the message object (e.g., 1718). For another example, displaying representations of a first account and a second account, as described in method 2100, can also be displayed when authenticating/confirming an outgoing transfer of a gift analogous to the gift message object (e.g., 1718). For another example, automatically proceeding with a transfer, as described in method 2400, instead of requiring user input, can also be used to accept the contents of an incoming transfer corresponding to a (gift) payment object (e.g., 1718). For another example, the plurality of items including information from messages in a message conversation, as described in method 2700, can be displayed in response to user selection of the (gift) message object (e.g., 1718). For another example, an utterance can be used, as described in method 3000, to accept a gift corresponding to the (gift) message object (e.g., 1718) or to create an outgoing (gift) message object analogous to the message object (e.g., 1718). For another example, a visual effect (e.g., a coloring effect, a geometric alteration effect) can be applied, as described in method 3400, to an element of a message object (e.g., 1726) when a transfer (e.g., of a resource, of a file, of a payment) associated with the message object is completed. For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 18A-18F are, optionally, implemented by components depicted in FIGS. 1A-1B. For example, displaying operation 1802, detecting operation 1826, proceeding operation 1834, and displaying operation 1838 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 19A-19D illustrate example user interfaces for managing peer-to-peer transfers, in accordance with some embodiments. As described in greater detail below, the non-limiting example embodiment of the user interfaces illustrated in FIGS. 19A-19D relate to the non-limited example embodiment of the user interfaces illustrated in FIGS. 20A-20J, which in turn are used to illustrate the processes described below, including the processes in FIGS. 21A-21D.

Figure 19A:
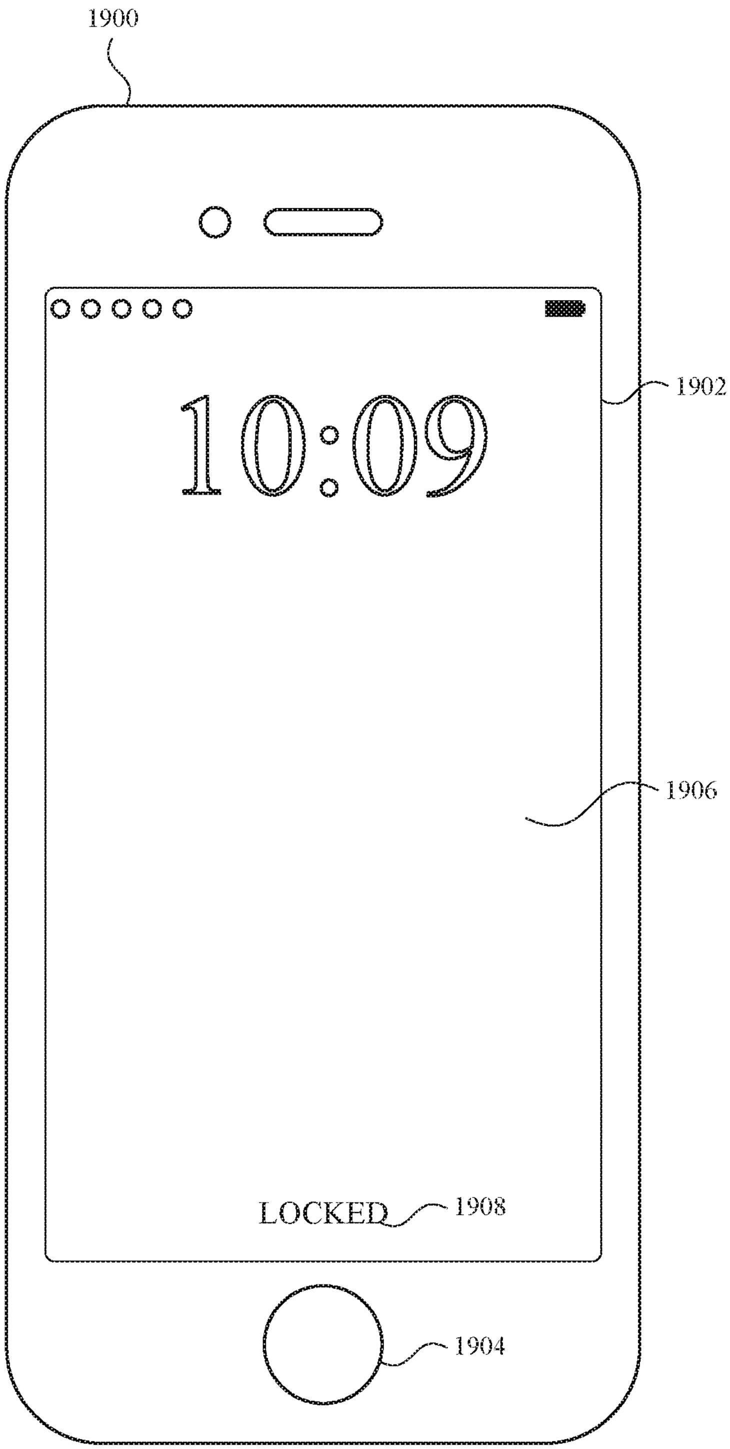
FIGS. 19A-19D illustrate example user interfaces for exchanging a user identification with a different user identification, in accordance with some embodiments.

In FIG. 19A, electronic device 1900 displays, on display 1902, a user interface locked screen 1906. In some embodiments, a user interface locked screen is displayed when the device is in a user interface locked state (e.g., a state where one or more functions of the operating system is prohibited from use by a user (e.g., "Kate Appleseed") of the device). In some embodiments, user interface locked screen 1906 includes an indication 1908 (e.g., stating "Locked") that the device is in the user interface locked state.

In some embodiments, while electronic device 1900 remains in the user interface locked state, the device receives, via the wireless transmission device, a signal from an external device. In some embodiments, the external device is a near field communication (NFC) terminal. In some embodiments, the external device is a user device (e.g., a smartphone, a smartwatch) different from electronic device 1900. In some embodiments, the signal from the external device corresponds to a request for identification credentials (associated with the user of the device) for providing identification information from electronic device 1900 to the external device.

Figure 19B:
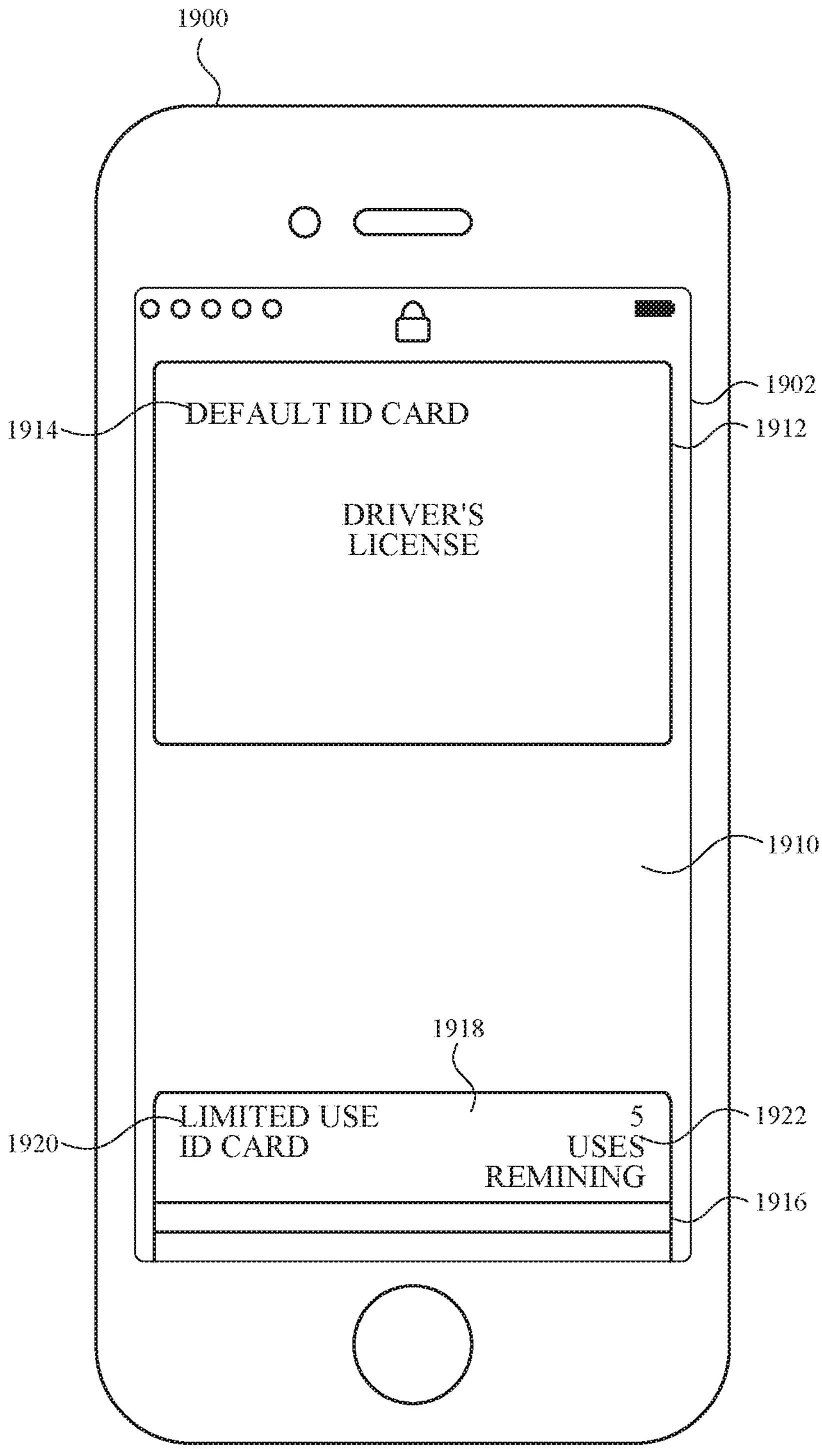

In FIG. 19B, in response to receiving the request for identification credentials, electronic device 1900 displays, on display 1902, an identifications user interface 1910. In some embodiments, as shown in FIG. 19B, identifications user interface 1910 includes, at a first location (e.g., a top-half portion of the interface), a graphical representation 1912 of a default identification (e.g., a general identification card, such as a driver's license) stored on the device. In some embodiments, the identification (or two or more identification) that is located at the first location of identifications user interface 1910 is the identification that is currently selected for use to provide identification information.

In some embodiments, as also shown in FIG. 19B, identifications user interface 1910 includes, at a second location (e.g., a bottom portion of the interface), graphical representations 1916 of one or more identifications stored on the device other than the identification corresponding to graphical representation 1912. In some embodiments, the one or more identifications stored on the device include a limited use identification card (e.g., an identification card that has a limited number of available uses for providing identification information).

In some embodiments, as shown in FIG. 19B, while maintaining display of graphical representation 1912 of the default identification (e.g., a driver's license), electronic device 1900 displays a larger portion of a graphical representation 1918 corresponding to the limited use identification card within graphical representations 1916 of the identifications. In some embodiments, graphical representation 1918 slides up (e.g., after a predefined amount of time from when identifications user interface 1910 is first displayed) from graphical representations 1916 to display the larger portion. As also shown in FIG. 19B, graphical representation 1918 of the limited use identification card includes a limit indication 1922 (e.g., stating "5 uses remaining" corresponding to the available number of uses remaining on the limited use identification card. Limit indication 1922 provides the user with a reminder of the remaining number of uses that the limited use identification card (corresponding to graphical representation 1918) can be used for to provide identification information. Graphical representation 1918 of the limited use identification card also includes an indication (e.g., stating "Limited use ID card") that the representation corresponds to an identification that is a limited use identification.

Figure 19C:
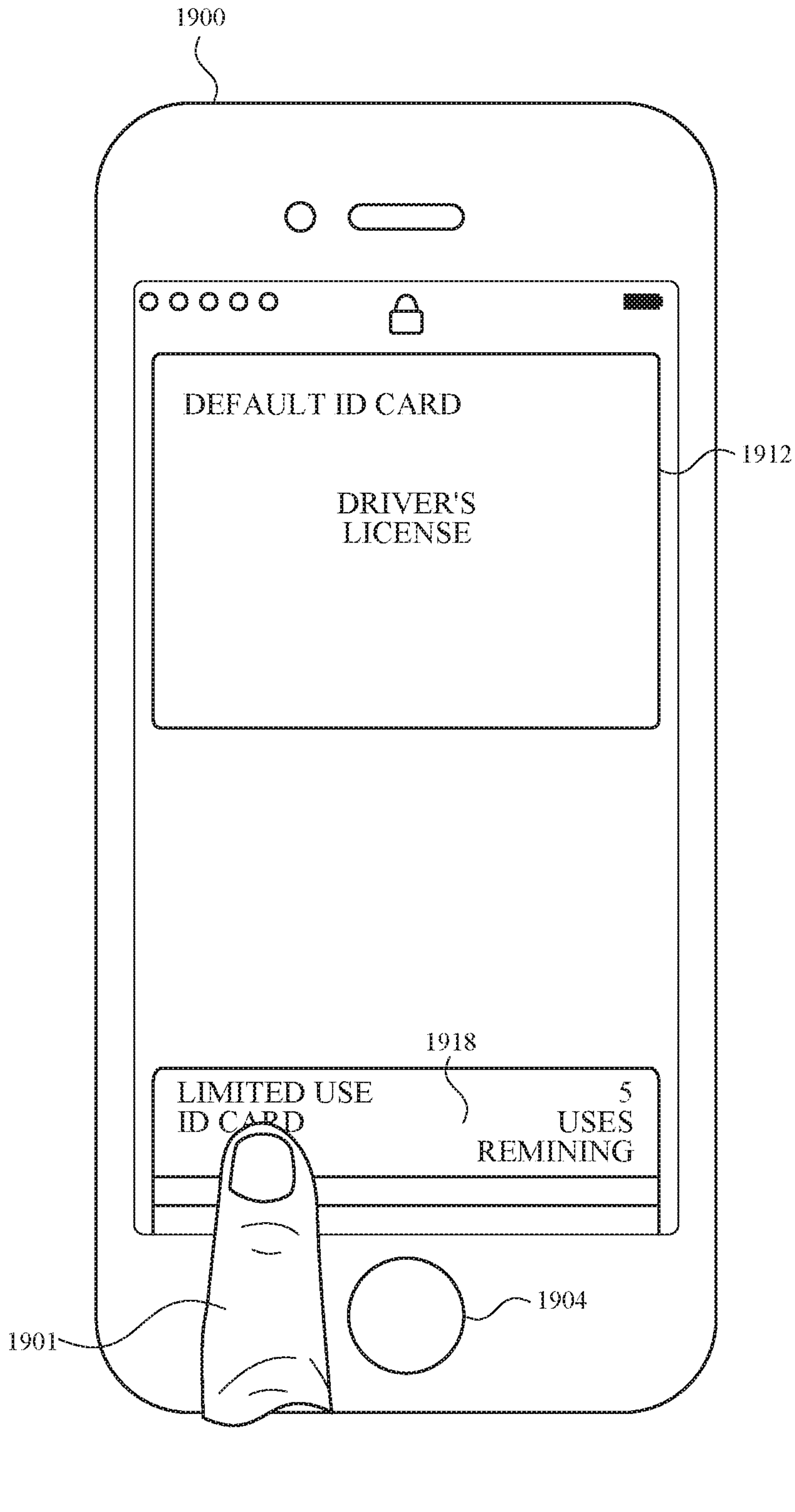

In FIG. 19C, while displaying the larger portion of graphical representation 1918 of the limited use identification account, electronic device 1900 detects a user input on graphical representation 1918. For example, as shown in FIG. 19C, the user input is a tap gesture 1901 on graphical representation 1918.

Figure 19D:
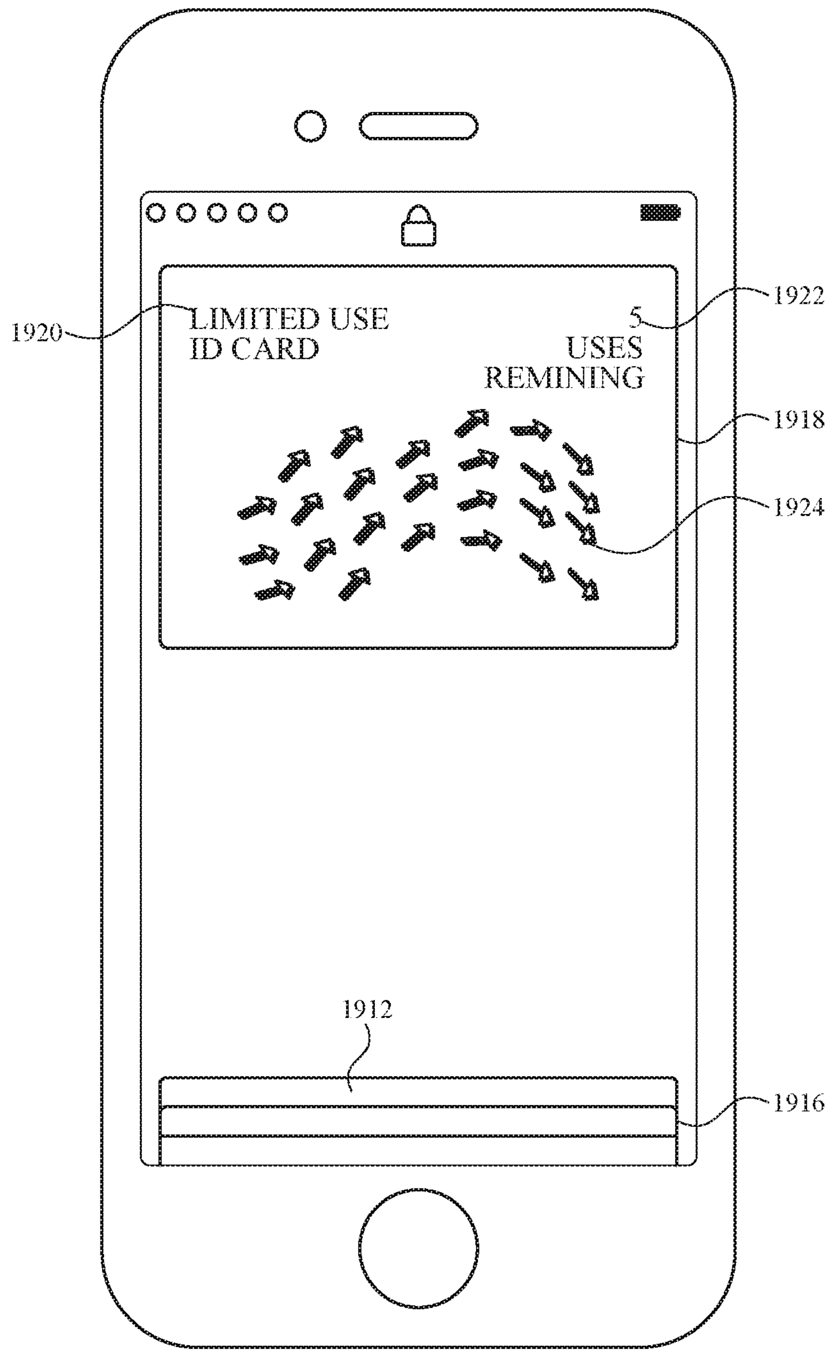

As shown in FIG. 19D, in response to detecting tap gesture 1901, electronic device 1900 replaces display of graphical representation 1912 of the general use identification card with graphical representation 1918 of the limited use identification card at the first location of the identifications user interface (and graphical representation 1912 of the default identification becomes part of graphical representations 1916 of the one or more other identifications). In some embodiments, as shown in FIG. 19D, graphical representation 1918 slides up from its location within graphical representations 1916 as it is replacing graphical representation 1912 at the first location. In some embodiments, graphical representation 1912 slides down from the first location towards graphical representations 1916.

In some embodiments, as shown in FIG. 19D, similar to graphical representation 1632 of a decrypting account described above with reference to FIGS. 16A-16F, graphical representation 1918 of the limited use identification card includes a plurality of moving patterns 1924 which can provide dynamic feedback (e.g., a 3D animation of the moving patterns). Further, as also shown in FIG. 19D, graphical representation 1918 maintains display of indication 1920 that the identification corresponds to a limited use identification and limit indication 1922 while displayed at the first location of the identification user interface. Once having fully replaced display of graphical representation 1912 of the default identification at the first location, the limited use identification corresponding to graphical representation 1918 is ready for use in providing requested identification information.

As mentioned above, the non-limiting example embodiment of the user interfaces illustrated in FIGS. 19A-19D described above relate to the non-limited example embodiment of the user interfaces illustrated in FIGS. 20A-20J described below. Therefore, it is to be understood that the processes described above with respect to the example user interfaces illustrated in FIGS. 19A-19D and the processes described below with respect to the example user interfaces for exchanging an account illustrated in FIGS. 20A-20J are largely analogous processes that similarly involve managing transfers using an electronic device (e.g., 100, 300, 500, 1900, or 2000).

FIGS. 20A-20J illustrate example user interfaces for exchanging an account for use in a transfer, in accordance with some embodiments. The user interfaces in these figures are used to illustrate the processes described below, including the processes in FIGS. 21A-21D.

Figure 20A:
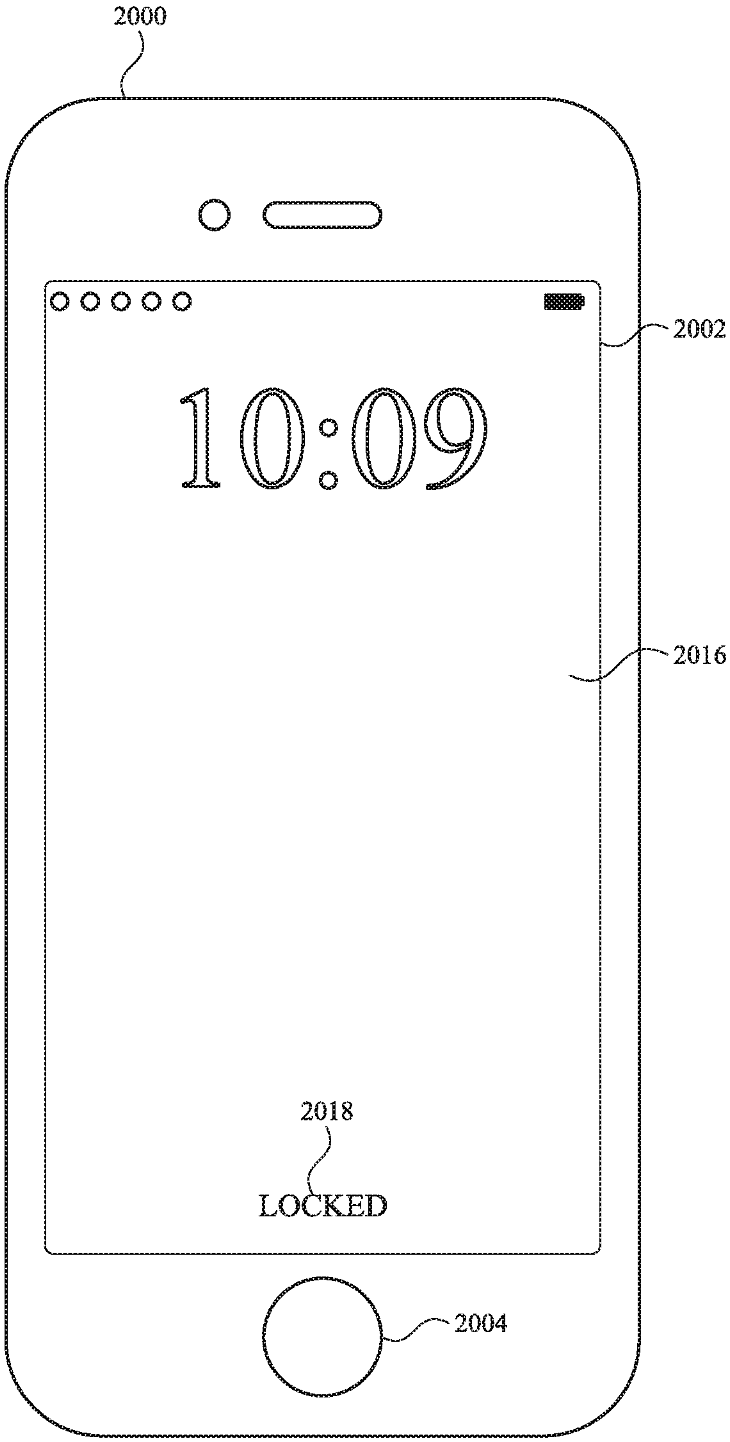
FIGS. 20A-20J illustrate example user interfaces for exchanging an account for use in a transfer, in accordance with some embodiments.

FIG. 20A illustrates an electronic device 2000 (e.g., portable multifunction device 100, device 300, or device 500). In the non-limiting example embodiment illustrated in FIGS. 20A-20J, electronic device 2000 is a smartphone. In other embodiments, electronic device 2000 can be a different type of electronic device, such as a wearable device (e.g., a smartwatch). Electronic device 2000 has a display 2002, a wireless transmission device, and one or more input devices (e.g., touchscreen of display 2002, a mechanical button 2004, a mic).

In FIG. 20A, electronic device 2000 displays, on display 2002, a user interface locked screen 2016. In some embodiments, a user interface locked screen is displayed when the device is in a user interface locked state (e.g., a state where one or more functions of the operating system is prohibited from use by a user (e.g., "Kate Appleseed") of the device). In some embodiments, user interface locked screen 2016 includes an indication 2018 that the device is in the user interface locked state.

Figure 20B:
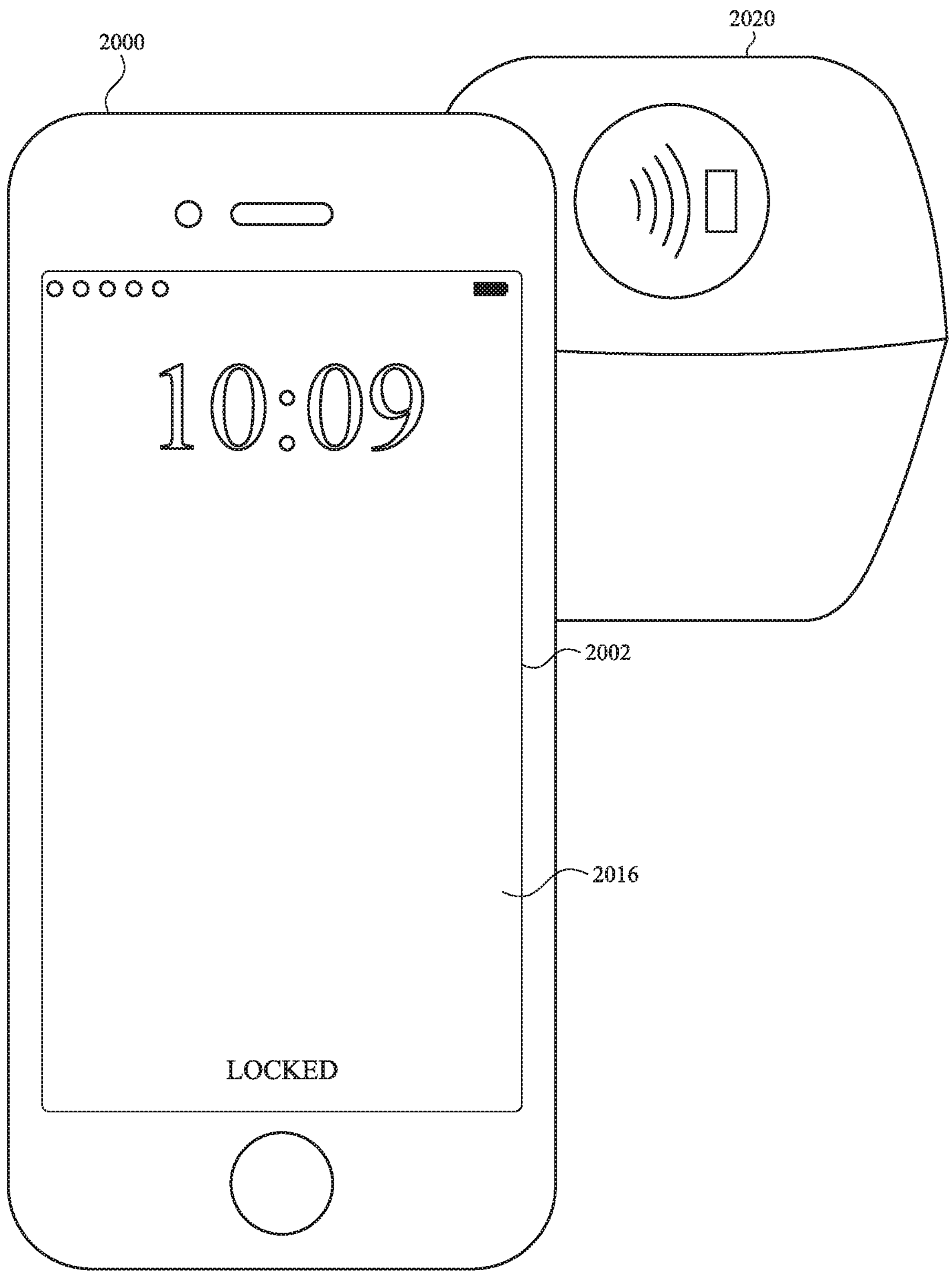

In FIG. 20B, while electronic device 2000 remains in the user interface locked state, the device receives, via the wireless transmission device, a signal from an external device 2020. In some embodiments, external device 2020 is a near field communication (NFC) terminal (e.g., for making payment transactions). In some embodiments, external device 2020 is a point-of-sale (POS) terminal (e.g., for making payment transactions). In some embodiments, external device 2020 is a user device (e.g., a smartphone, a smartwatch) different from the electronic device 2000.

In FIG. 20B, the signal from external device 2020 (e.g., a NFC terminal, a POS terminal) corresponds to a request for payment credentials (associated with the user of the device) for making a payment to be transmitted from electronic device 2000 to external device 2020. In some embodiments, as shown in FIG. 20B, the device displays, on display 2002, user interface locked screen 2016 when the signal from external device 2020 is received. In some embodiments, the display 2002 of the device is off when the signal from external device 2020 is received.

Figure 20C:
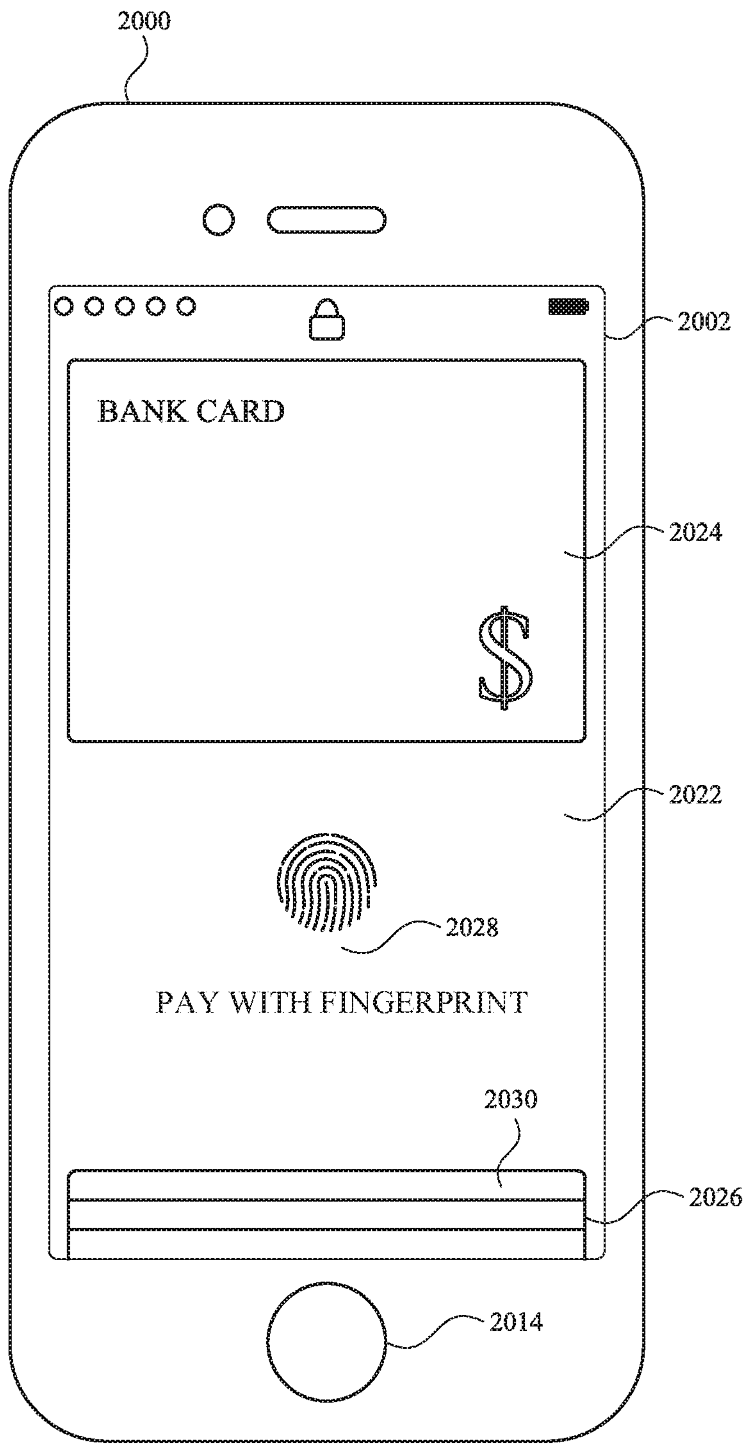

In FIG. 20C, in response to receiving the request for payment credentials from external device 2020, electronic device 2000 displays, on display 2002, a wallet user interface 2022. In some embodiments, as shown in FIG. 20C, wallet user interface 2022 includes, at a first location (e.g., a top-half portion of the interface), a graphical representation 2024 of a default account (e.g., a payment account corresponding to a stored-value account, a payment account corresponding to a debit account, a payment account corresponding to a checking account) provisioned on the device 2000. In some embodiments, the account (or two or more accounts) that is located at the first location of wallet user interface 2002 is the account that is currently selected for use in a payment transaction.

In some embodiments, as also shown in FIG. 20C, wallet user interface 2022 includes, at a second location (e.g., a bottom portion of the interface), graphical representations 2026 of one or more accounts provisioned on the device other than the account corresponding to graphical representation 2024. For example, the one or more accounts provisioned on the device can include an operating system-controlled payment account, a debit card account, a checking account, a credit account, and a (loyalty) points card account. In some embodiments, as shown in FIG. 20C, each graphical representation of an account within graphical representations 2026 are only partially visible on wallet user interface 2022. In some embodiments, graphical representations 2026 include a (partial) graphical representation 2030 corresponding to an operating system-controlled payment account (e.g., an account corresponding to the payment account associated with graphical representation 1756 described above with reference to, for example, FIGS. 17H-17K). In some embodiments, the payment account is a unique operating system-controlled and managed account.

In some embodiments, subsequent to receiving the request for payment credentials from external device 2020 (and displaying wallet user interface 2022), electronic device 2000 is moved (e.g., by the user) away from the external device such that the signal from the external device is no longer detected. In some embodiments, subsequent to receiving the request for payment credentials from external device 2020 (and displaying wallet user interface 2022), the device is maintained (e.g., by the user) near external device 2020 such that the signal from the external device continues to be detected.

In some embodiments, as shown in FIG. 20C, wallet user interface also displays an indication 2028 (e.g., graphical and/or textual) informing the user of an authentication method for authorizing a transaction using an account provisioned on electronic device 2000. For example, in FIG. 20C, indication 2028 (e.g., depicting a graphical representation of a fingerprint and stating "Pay with Fingerprint") informs the user that fingerprint authentication can be used to authorize a transaction.

Figure 20D:
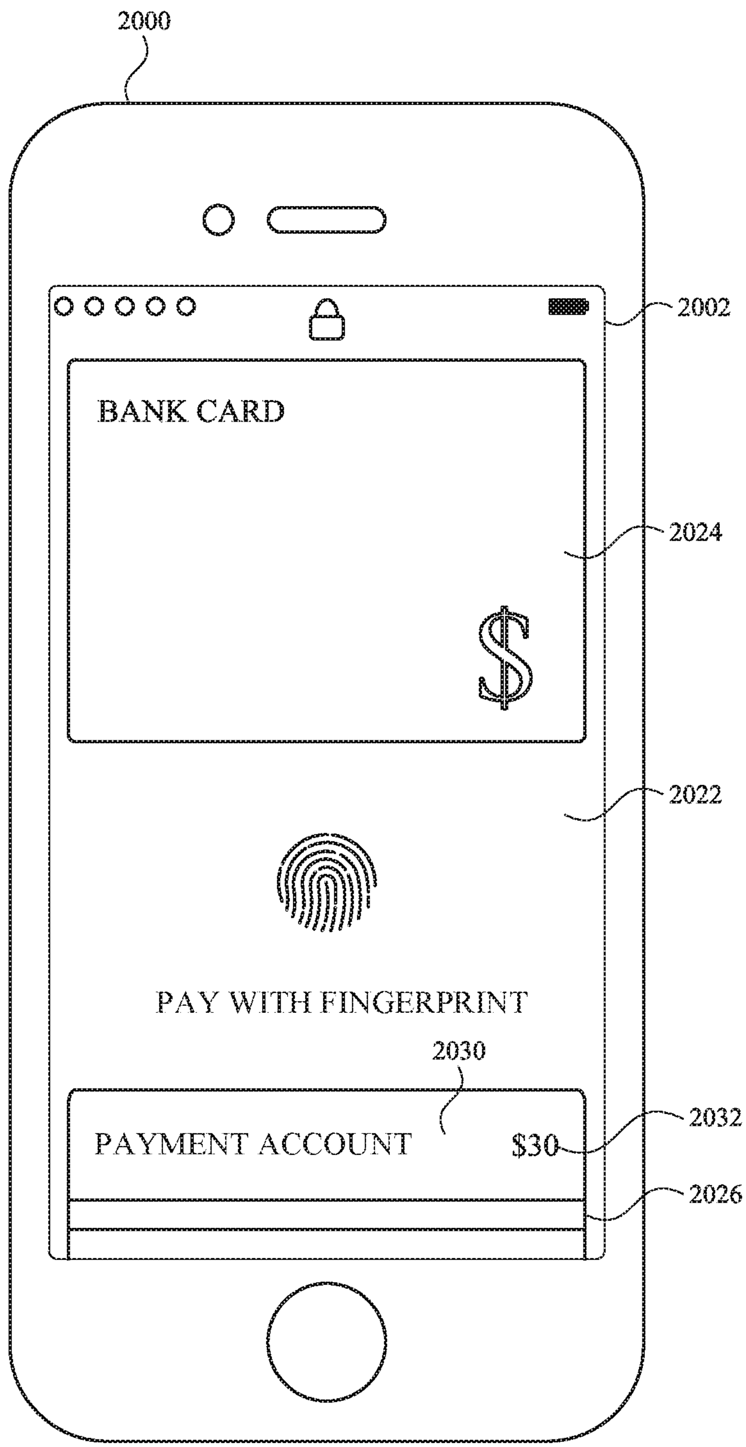

FIG. 20D shows wallet user interface 2022, while maintaining display of graphical representation 2024 of the default account, displaying a larger portion of graphical representation 2030 corresponding to the payment account. In some embodiments, the larger portion of graphical representation 2030 corresponding to the payment account is displayed after a predetermined time (e.g., 0.3 second, 0.5 seconds, 1 second) has passed since first receiving the signal from external device 2020. In some embodiments, the larger portion of graphical representation 2030 corresponding to the payment account is displayed when wallet user interface 2022 is first displayed in response to receiving the signal from external device 2020.

In some embodiments, graphical representation 2030 slides up from graphical representations 2026 to display the larger portion (as shown in FIG. 20D). As also shown in FIG. 20D, graphical representation 2030 includes a balance indication 2032 corresponding to the available balance of the payment account (corresponding to graphical representation 2030). Balance indication 2032 provides the user with a reminder of the available balance of the payment account (corresponding to graphical representation 2030) when the larger portion of graphical representation 2030 is displayed.

Figure 20E:
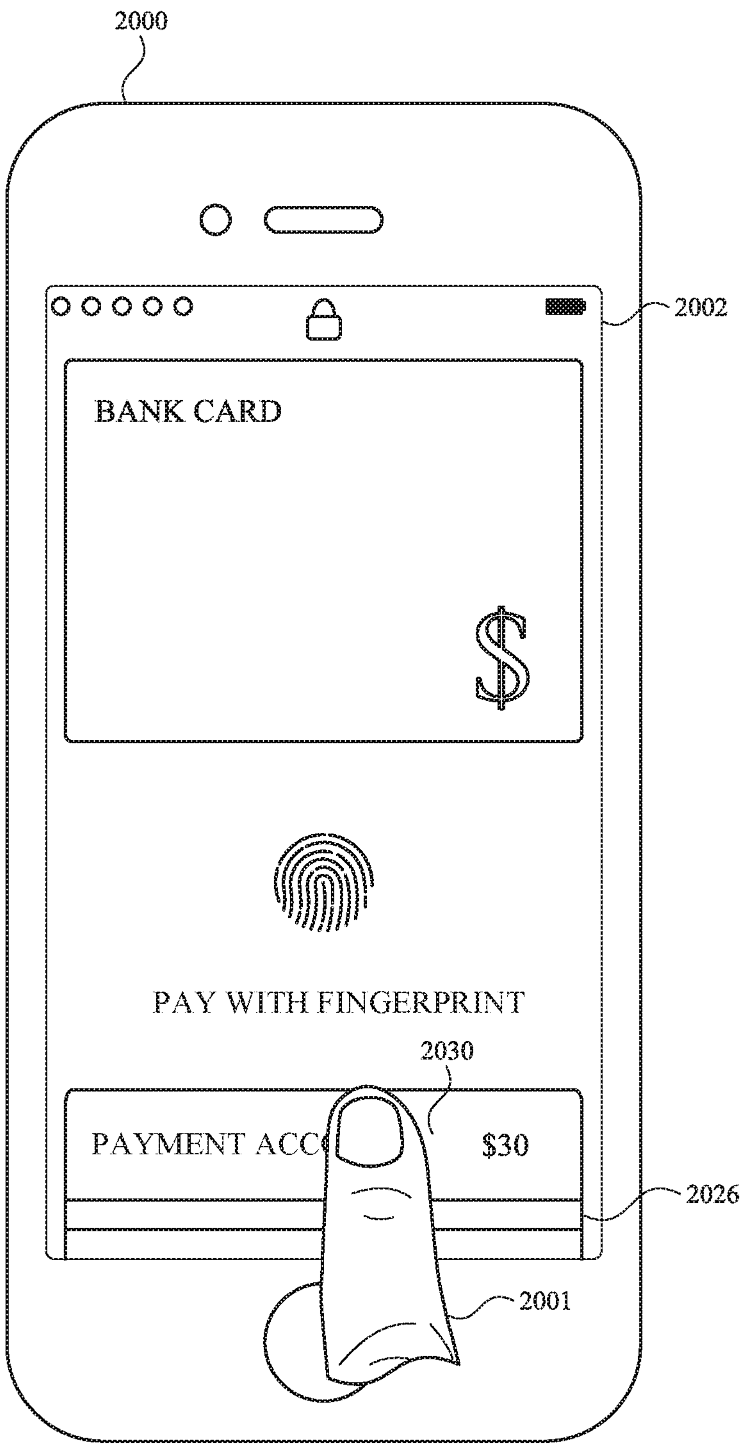

In FIG. 20E, while displaying the larger portion of graphical representation 2030 of the payment account, electronic device 2000 detects a user input on graphical representation 2030. For example, as shown in FIG. 20E, the user input is a tap gesture 2001 on graphical representation 2030.

Figure 20F:
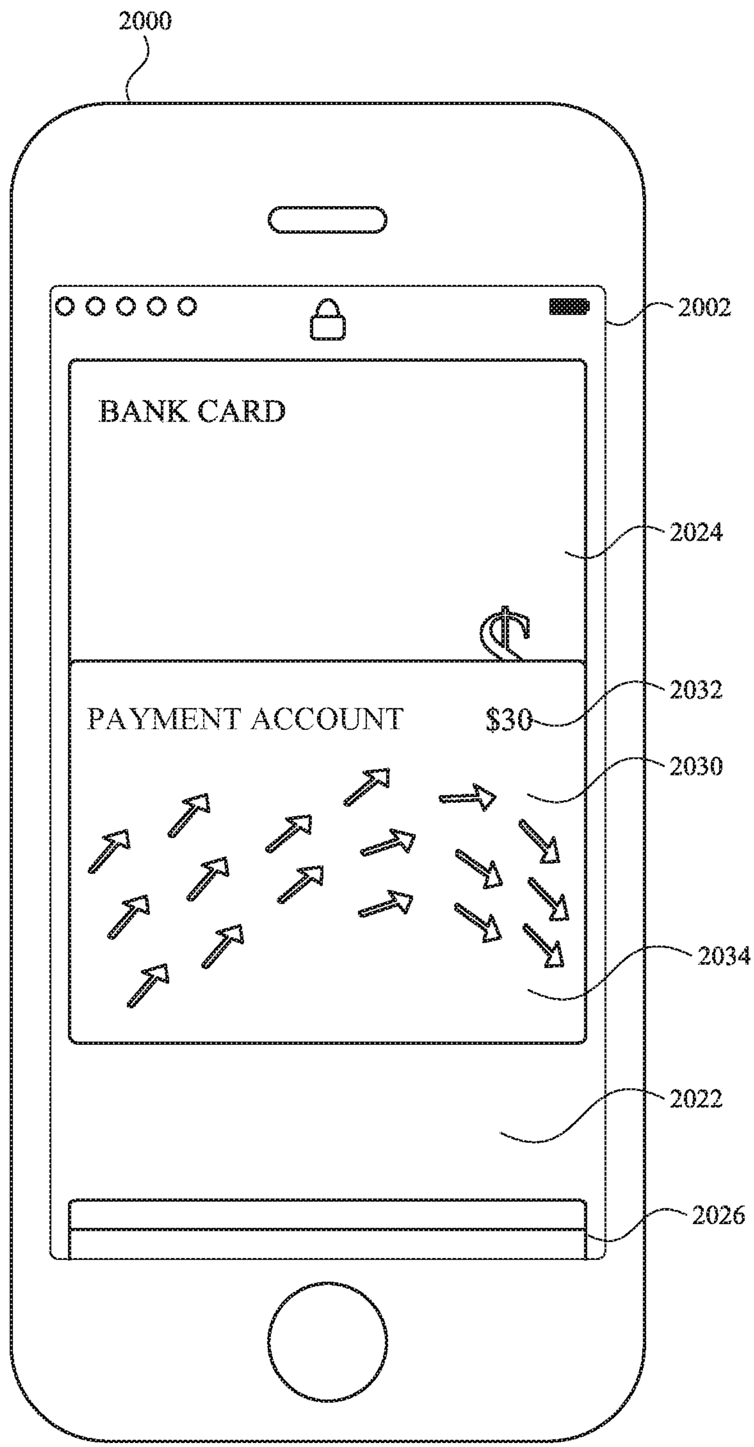
Figure 20G:
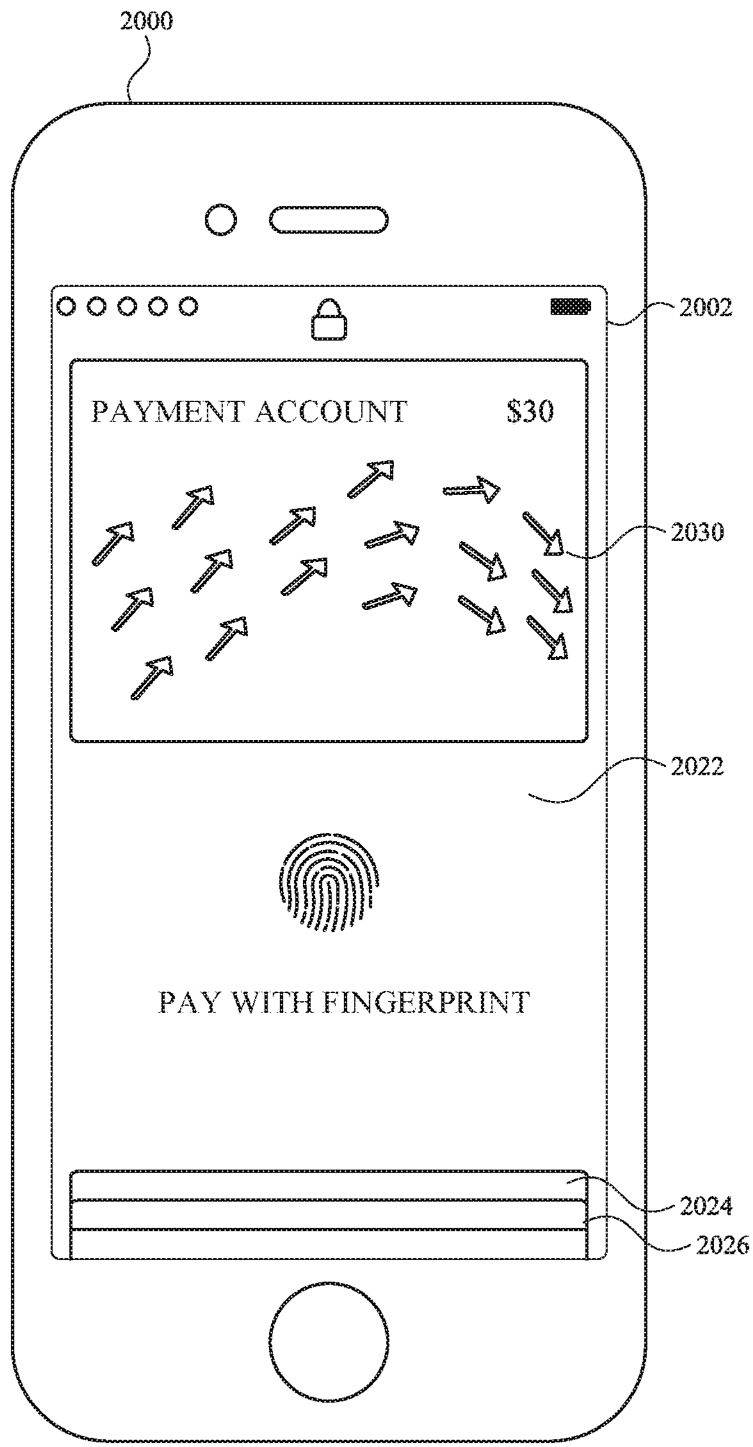

As shown in FIGS. 20F-20G, in response to detecting tap gesture 2001, electronic device 2000 replaces display of graphical representation 2024 corresponding to the default account with graphical representation 2030 of the payment account at the first location of wallet user interface 2022 (and graphical representation 2024 of the default account becomes part of graphical representations 2026 of the one or more accounts. In some embodiments, as shown in FIG. 20F, graphical representation 2030 slides up from its location within graphical representations 2026 (e.g., as shown in FIG. 20D) as it is replacing graphical representation 2024 at the first location. In some embodiments, graphical representation 2024 slides down from the first location towards graphical representations 2026. As shown in FIG. 20F, the device maintains display of balance indication 2032 on graphical representation 2030 as it slides up on the display.

As mentioned above, in some embodiments, the payment account associated with graphical representation 2030 corresponds to the payment account associated with graphical representation 1756 described above with reference to FIGS. 17H-17K. As with graphical representation 1756, graphical representation 2030 includes a plurality of moving patterns 2034 corresponding to plurality of patterns 1757 of graphical representation 1756. Thus, electronic device 2000 generates a dynamic feedback animation on graphical representation 2030 of the payment account (e.g., a 3D animation of the moving patterns) akin to the dynamic visual feedback applied to a completed payment message object as described, for example, in FIG. 11E.

FIG. 20G shows, in response to detecting tap gesture 2001, graphical representation 2030 of the payment account having fully replaced display of graphical representation 2024 of the default account at the first location of wallet user interface 2022 and graphical representation 2024 having replaced graphical representation 2030 within graphical representations 2026 of the one or more other accounts.

Figure 20H:
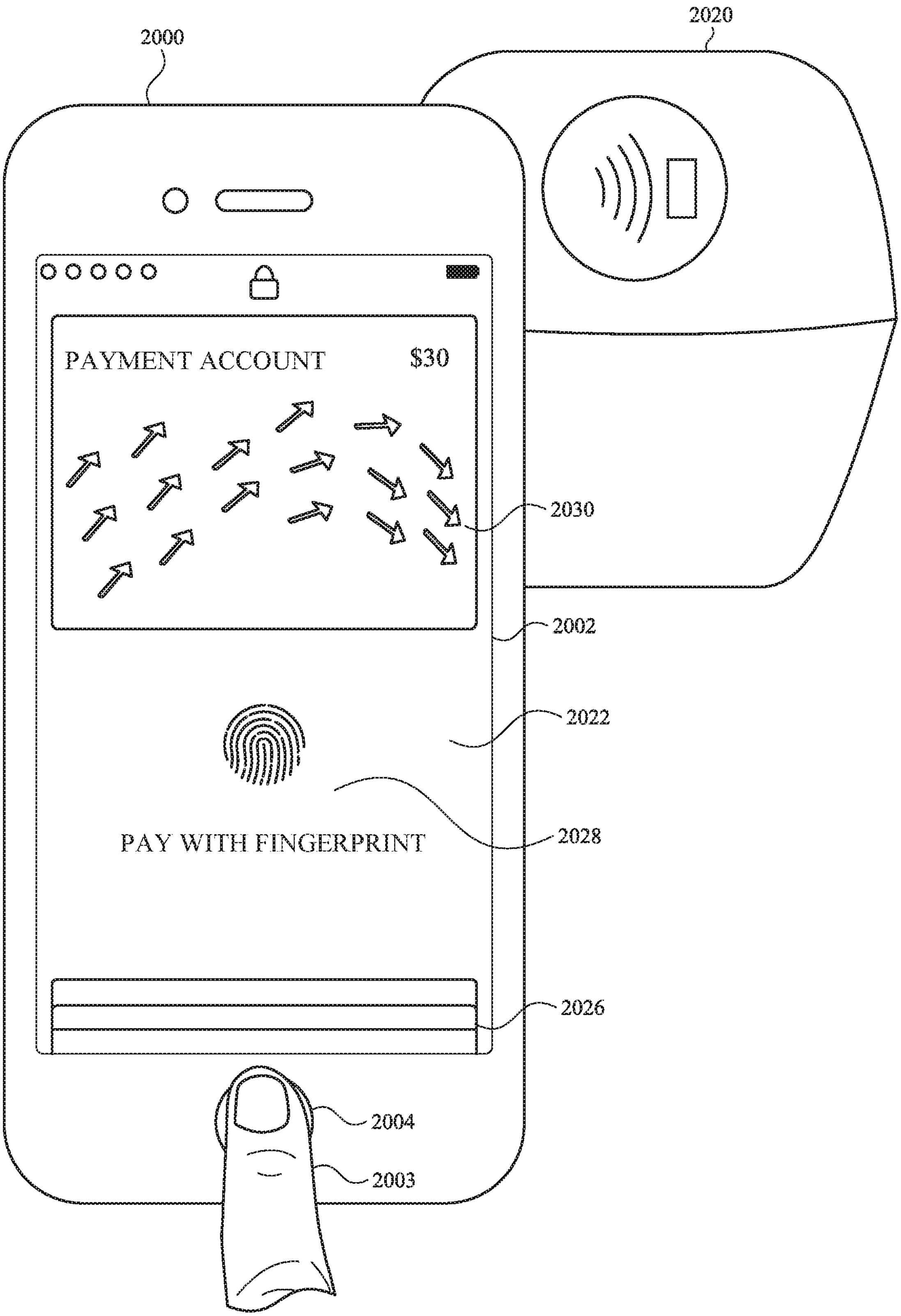

FIG. 20H shows electronic device 2000 (again) in communication, via the wireless transmission radio, with external device 2020. In some embodiments, if the device had been moved (e.g., in FIG. 20C) away from external device 2020, the device in FIG. 20H again receives the signal (e.g., corresponding to a request for payment credentials) from the external device (e.g., by being placed closed to the external device 2020). In some embodiments, if the device had been maintained near external device 2020, the device in FIG. 20H continues to receive the signal (e.g., corresponding to a request for payment credentials) from the external device.

In FIG. 20H, while displaying wallet user interface 2022 with graphical representation 2030 of the payment account located at the first location of the interface (and thus the payment account is currently selected for use in a payment transaction), electronic device 2000 receives a user input 2003 corresponding to the authentication request indicated in indication 2028. For example, as shown in FIG. 20H, indication 2028 (e.g., stating "Pay with Fingerprint") requests fingerprint authentication, and thus the user input is a fingerprint scan input 2003 on a fingerprint sensor (e.g., a mechanical button 2004) of the device.

Figure 20I:
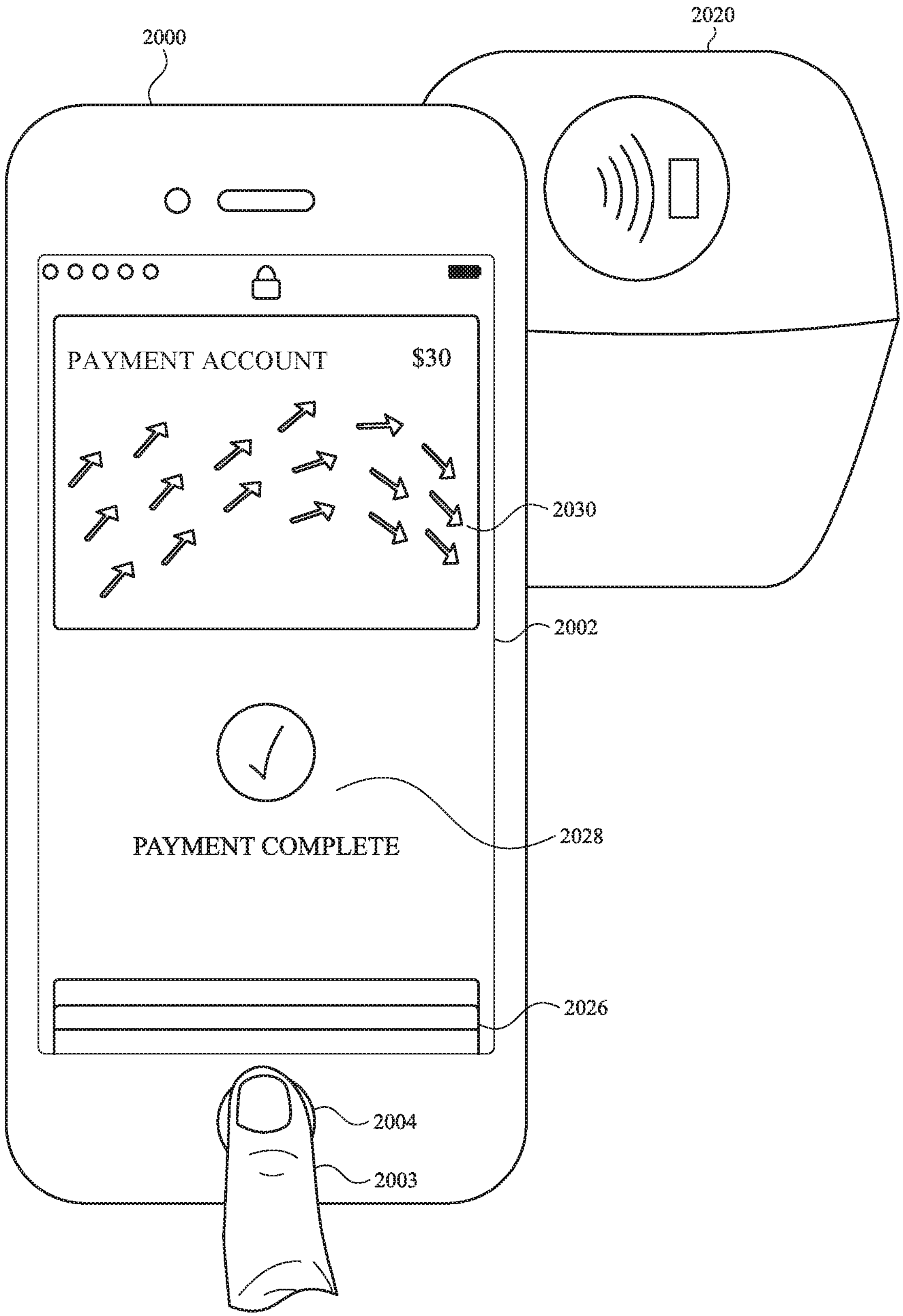

FIG. 20I shows, via indication 2028 (e.g., stating "Payment Complete"), that the fingerprint authentication was successful, and thus the payment transaction has been completed using the payment account associated with graphical representation 2030. In some embodiments, authentication (e.g., fingerprint authentication) is successful if the received authentication information (e.g., fingerprint scan input 2003) is consistent with enrolled authentication information (e.g., enrolled fingerprint authentication information) stored on the device (or accessible, via an external server, by the device). In some embodiments, if the authentication is not successful (e.g., because the fingerprint information obtained from fingerprint scan input 2003 is not consistent with an enrolled fingerprint authentication information), electronic device 2000 requests that the user try inputting the requested authentication information again or cancels the payment transaction with external device 2020.

In FIG. 20I, because the payment account (corresponding to graphical representation 2030) was the account currently-selected for use in a payment transaction, the successful payment transaction (e.g., indicated by indication 2028) was performed with funds from the payment account (which, as indicated by balance indication 2032, had funds in the amount of $30) instead of funds from, for example, the default account associated with graphical representation 2024 that, prior to tap gesture 2001, had been the currently-selected account for use in a payment transaction. In some examples, electronic device 2000 updates balance indication 2032 within graphical representation 2030 of the payment account to reflect the amount of funds (e.g., "$10.00") that was withdrawn (or taken out of) the payment account to fund the successful transaction and displays the updated balance indication 2032 concurrently with successful payment indication 2028.

Figure 20J:
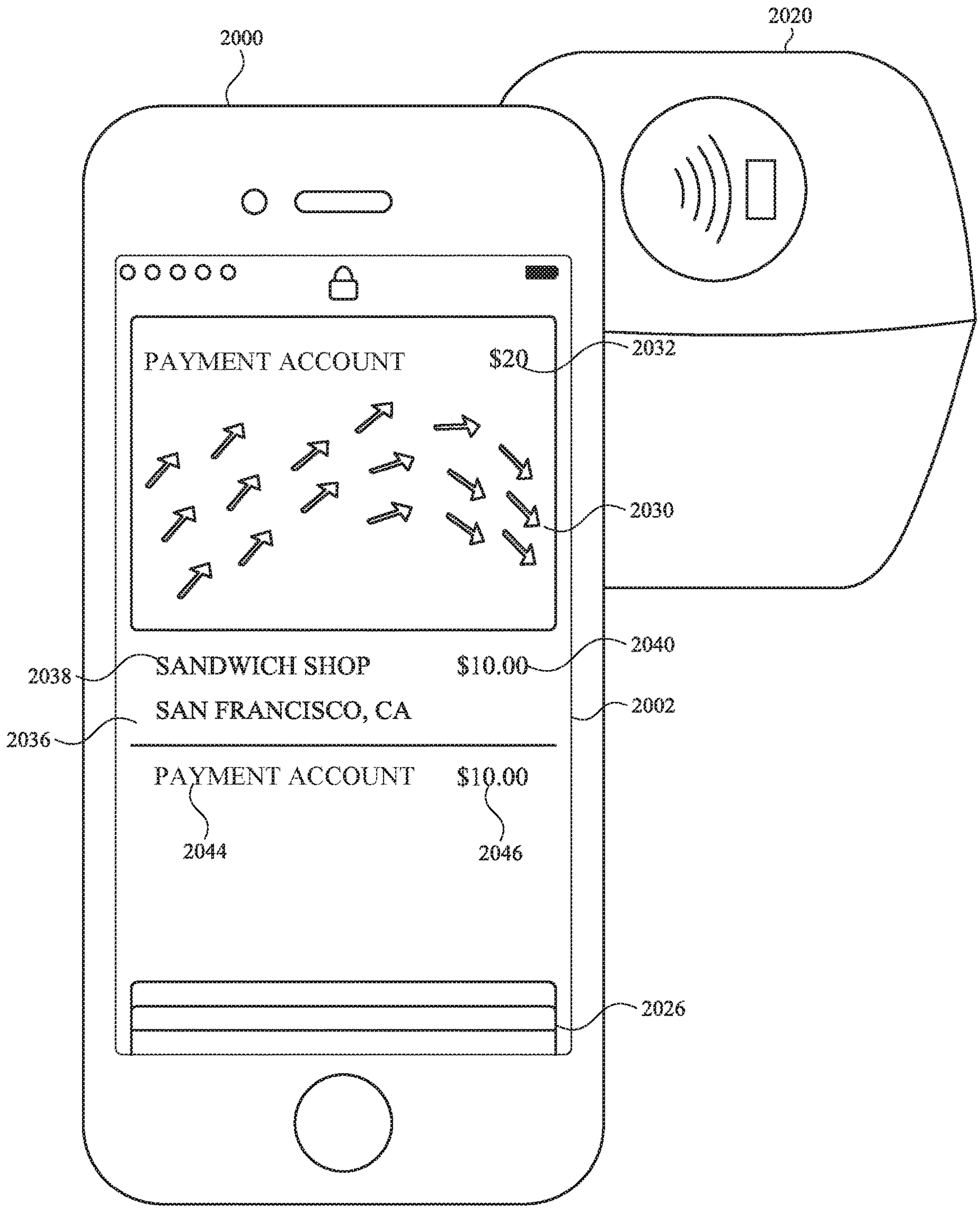
Figure 21A:
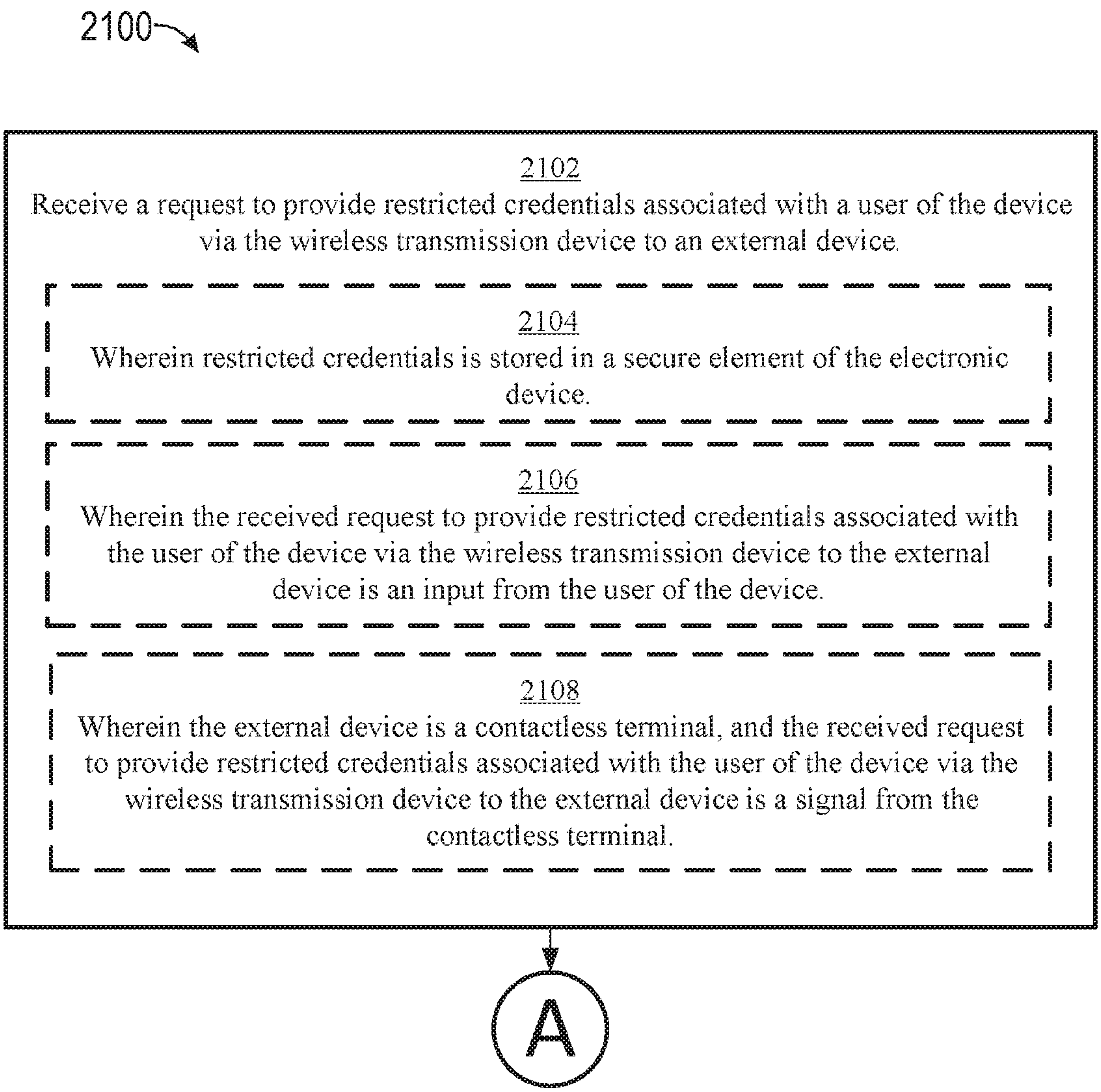
Figure 21B:
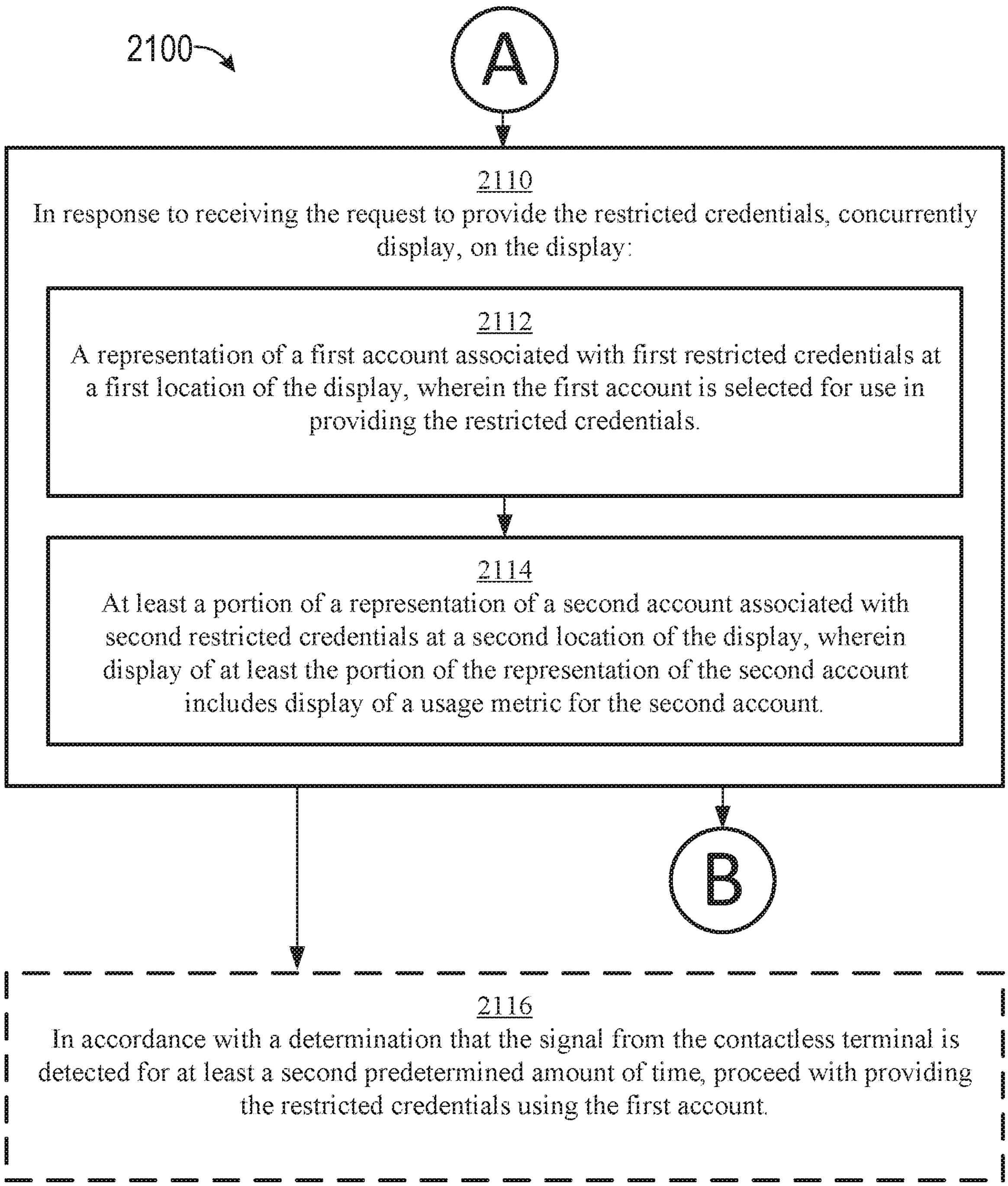
Figure 21D:
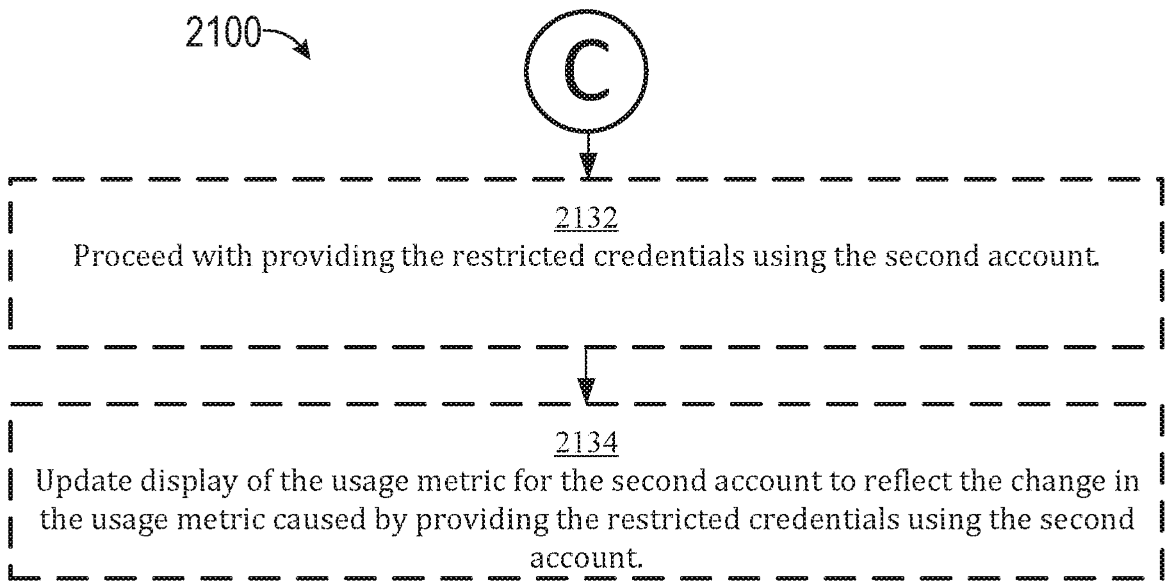

FIG. 20J shows wallet user interface 2022 displaying transaction summary information 2036 following the successful payment transaction (using the payment account). In some embodiments, transaction summary information includes an indication 2038 of the other party (e.g., a business, a restaurant, a different non-business individual) and/or location (e.g., an address, a city) of the transaction. For example, in FIG. 20J, the current transaction was with Sandwich Shop in San Francisco, Calif. In some embodiments, transaction summary information includes an indication 2040 of the transaction amount (e.g., "$10.00"). In some embodiments, transaction summary information includes an indication 2044 of the account (e.g., the payment account) that was used in the transaction, and an indication 2046 of the amount of funds (e.g., "$10.00") that was taken out of the account corresponding to indication 2044 to fund the transaction.

As also shown in FIG. 20J, subsequent to the successful transaction (in the amount of $10.00), electronic device 2000 updates balance indication 2032 within graphical representation 2030 of the payment account to reflect the amount of funds (e.g., "$10.00") that was withdrawn (or taken out of) the payment account to fund the successful transaction. For example, in FIG. 20J, because balance indication 2032 showed $30 prior to the successful transaction, and the amount of the transaction was $10.00 (as indicated by indication 2046), the device updates balance indication 2032 to show a post-transaction amount of $20.

FIGS. 21A-21D are a flow diagram illustrating a method for exchanging an account for use in a transfer using an electronic device in accordance with some embodiments. Method 2100 is performed at a device (e.g., 100, 300, 500, 1900, 2000) with a display, a wireless transmission device, and one or more input devices (e.g., a touchscreen, a mic, a camera, a biometric sensor). Some operations in method 2100 are, optionally, combined, the orders of some operations are, optionally, changed, and some operations are, optionally, omitted.

As described below, method 2100 provides an intuitive way for managing peer-to-peer transactions. The method reduces the cognitive burden on a user for managing peer-to-peer transactions, thereby creating a more efficient human-machine interface. For battery-operated computing devices, enabling a user to manage peer-to-peer transactions faster and more efficiently conserves power and increases the time between battery charges.

The electronic device (e.g., 1900, 2000) receives (2102) (e.g., via the wireless transmission device) a request (e.g., a user input on the electronic device, a signal from an external device) to provide restricted credentials (e.g., identification credentials, or payment credentials) associated with a user of the device via the wireless transmission device to an external device (e.g., 2020, a point-of-sale (POS) terminal, a smartphone or smartwatch different from the electronic device). In some examples, the request is to transmit the credentials via the wireless transmission device. In some examples, providing the restricted credentials to the external device includes transmitting, via the wireless transmission device, the credentials to the external device (e.g., 2020).

In some examples, the electronic device (e.g., 1900, 2000) includes a secure element (e.g., 115) and the restricted credentials (e.g., for the first account and the second account) are stored (2104) in the secure element of the electronic device. In some examples, the restricted credentials are (or include) payment information. In some examples, the secure element provides (or releases) payment information (e.g., an account number and/or a transaction-specific dynamic security code). In some examples, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

In some examples, the received request to provide restricted credentials associated with the user of the device via the wireless transmission device to the external device (e.g., 2020) is an input (e.g., a tap input 2303, a voice input, an input on a button (e.g., 1904, 2304, 2356) of the device) from the user of the device. In some examples, the input from the user is a double press of a button (e.g., 1904, 2304, a home button) of the device. In some examples, the input from the user is a double press of a power button of the device.

In some examples, the external device (e.g., 2020) is a contactless terminal (e.g., a transaction terminal, a POS terminal 2020, a NFC payment terminal). In some examples, the received request to provide restricted credentials associated with the user of the device via the wireless transmission device to the external device (e.g., 2020) is a signal from the contactless terminal (e.g., 2020). In some examples, the electronic device (e.g., 1900, 2000) is placed within range of the contactless terminal (e.g., a contactless payment terminal, 2020) and receives (e.g., via NFC) a request for payment.

In response (2110) to receiving the request to provide the restricted credentials, the electronic device (e.g., 1900, 2000) concurrently displays, on the display a representation of a first account (2112) (e.g., 2024) associated with first restricted credentials (e.g., a default user identification account, a default resource account, a default points account, a debit card account, a credit card account) at a first location (e.g., a prominently-visible portion of the display, such as a region at or near the center of the display) of the display, wherein the first account is selected for use in providing the restricted credentials, and at least a portion (e.g., a top portion, a top portion without a bottom portion, a first portion with a second portion) of a representation of a second account (2114) (e.g., 1918, 2030) associated with second restricted credentials (e.g., an alternative identifier) at a second location (e.g., a corner or edge of the display, such as the bottom edge of the display) of the display. The display of at least the portion of the representation of the second account includes display of a usage metric (e.g., 1922, 2032, usage limit, available resources) for the second account (e.g., an amount of time that the alternate identifier is available for use, a number of uses that the alternative identifier is available for use, a quantity of currency available for use in the payment account) stored in the account or associated with the account). In some examples, the representation of the second resource account (e.g., 1918, 2030) is only partially displayed on the bottom of the display such that the indication of the available resources (e.g., 1922, 2032) is visible in a top-right corner or a top-left corner of the displayed account representation. Concurrently displaying representations of multiple accounts at different locations with a usage metric (e.g., 1922, 2032) on the display provides the user with (location-based) visual feedback about the state of the accounts, such as whether they are selected for use or available for use. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, in accordance with a determination that the signal from the contactless terminal (e.g., 2020) is detected for at least a second predetermined amount of time (and alternatively, or in addition, in accordance with a determination that the device has not been removed from within range of the contactless terminal for the second predetermined period of time), the electronic device (e.g., 1900, 2000) proceeds (2116) (e.g., automatically) with providing the restricted credentials using the first account.

In some examples, in accordance with a determination that the signal from the contactless terminal (e.g., 2020) is detected for less than the second predetermined amount of time (and alternatively, or in addition, in accordance with a determination that the device has been removed from within range of the contactless terminal before at least the second predetermined period of time), the electronic device (e.g., 1900, 2000) forgoes proceeding (2118) with providing (e.g., to the contactless terminal, via wireless communication) the restricted credentials using the first account. Thus, the electronic device provides the user an opportunity to switch from the using the first account to using the second account for providing the restricted credentials, such as in a payment transaction with the contactless terminal (e.g., 2020). Forgoing automatically proceeding with the first account when the device is placed into range (e.g., within RF range) of the contactless terminal for less than the second predetermined period of time enables the user view the status of the account as the device is placed into range of the contactless terminal and provides the user with the control and time to withdraw the device from range of the contactless terminal to change the selected account, thereby helping to avoid use of undesired or unintended accounts. Providing additional control enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

The electronic device (e.g., 1900, 2000) detects, via the one or more input devices, user selection (e.g., a touch gesture, such as a tap 2001, on a portion of the displayed second resource account by a user, a voice selection through a digital assistant) of the representation of the second account (e.g., 1918, 2030). In response (2122) to detecting the user selection of the representation of the second account (e.g., 1918, 2030), the electronic device optionally proceeds to one or more of blocks 2124-2130.

In some examples, the electronic device (e.g., 1900, 2000) replaces (2124) display of the at least a portion of the representation of the second account (e.g., 1918, 2030) with display of at least a portion of the representation of the first account (e.g., 1912, 2024), and the electronic device selects (2126) the second account for use in providing the restricted credentials while maintaining selection of the first account for concurrent use in providing the restricted credentials (e.g., both the first account and the second account are partially used in providing the restricted credentials, both the first account and the second account are partially used in a payment transaction). In some examples, when the second account is selected for use in providing the restricted credentials, the second account will, in some circumstances, not have sufficient funds for the payment and, accordingly, provides payment using both the first account and the second account. In some examples, as described below with reference to the first resource account and the second resource account in method 2400 of FIGS. 24A-24C, the electronic device provides all available funds of the second account and provides funds from the first account for the outstanding portion of the payment.

In response (2122) to detecting the user selection of the representation of the second account (e.g., 1918, 2030), the electronic device (e.g., 1900, 2000) replaces (2128) display of the representation of the first account (e.g., 1912, 2024) with the representation of the second account (e.g., 1918, 2030) at the first location of the display. Changing the locations on the display of the various accounts provides the user with (location-based) visual feedback about the updated states of the accounts, such as whether they are selected for use or available for use, and provides the user with visual feedback that the input they provided has changed the account selected for use. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In response (2122) to detecting the user selection of the representation of the second account (e.g., 1918, 2030), the electronic device (e.g., 1900, 2000) selects the second account for use in providing the restricted credentials (e.g., preparing to use the alternative identification by making the alternative identification credentials available via the wireless transmission device, or by preparing to use the payment account by making the payment account available via the wireless transmission device). In some examples, the electronic device also deselects the first account for use in providing the restricted credentials when the electronic device selects the second account for the use. In some examples, the electronic device also does not deselect the first account for use in providing the restricted credentials when the electronic device selects the second account for the use.

In some examples, subsequent to selecting the second account for use in providing the restricted credentials, the electronic device (e.g., 1900, 2000) proceeds (2132) with providing (e.g., by transmitting, using wireless transmission device) the restricted credentials using the second account. In some examples, the electronic device updates (2134) display of the usage metric (e.g., 1922, 2032, usage limit, available resources) for the second account to reflect the change in the usage metric caused by providing the restricted credentials using the second account (e.g., the amount of time that the alternate identifier is available for use is decreased, the number of uses that the alternative identifier is available for use is decreased, the quantity of currency available for use in the payment account stored in the account or associated with the account is decreased). Updating the displayed usage metric (e.g., 192, 2032) to reflect the usage of the restricted credentials provides the user with real-time (or near-real time) visual feedback about the state of the second account resulting from use of the second account, such as the amount of resources remaining in the accounts). Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the restricted credentials (e.g., for the first account and the second account) are uniquely associated (e.g., via a user-specific identifier) with a user of the electronic device.

In some examples, the electronic device (e.g., 1900, 2000) forgoes transmitting (e.g., rejects requests, such as user requests, to transmit) the restricted credentials to an external device (e.g., 2020) unless user authentication (e.g., biometric authentication, such as fingerprint, facial recognition, iris, or retina authentication) has been successfully provided by a user of the electronic device. In some examples, user authentication is successfully received when the electronic device receives biometric information and determines that the biometric information corresponds to biometric information enabled to authorize transmitting the restricted credentials.

In some examples, the at least a portion of the representation of the second account (e.g., 2030) is displayed after a predetermined amount of time (e.g., 2 seconds) has passed from displaying the representation of the first account (e.g., 1912, 2024). Thus, in some examples, initially the representation of the first account (e.g., 1912, 2024) is displayed without the representation of the second account (e.g., 1918, 2030) being displayed. The representation of the second account (e.g., 1918, 2030) is displayed after the predetermined amount of time has passed since displaying the representation of the first account (e.g., 1912, 2024). In some examples, after the predetermined period of time has passed, representations (or portions thereof) of both the first account (e.g., 1912, 2024) and the second account (e.g., 1918, 2030) are displayed on the display at the same time. Displaying the selected account first, followed by displaying the unselected account after a short time delay provides the user with (time-based) visual feedback about the states of the accounts, such as whether they are selected for use or available for use. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, replacing display of the representation of the first account (e.g., 2024) with the representation of the second account (e.g., 1918, 2030) at the first location of the display includes: displaying the entirety of the representation of the second account (e.g., 1912, 2024) at the first location (e.g., a prominently-visible portion of the display, such as a region at or near the center of the display) of the display (e.g., because the second account, instead of the first account, is set as the selected account), and displaying at least a portion (e.g., less than all of the representation of the first account (e.g., 1912, 2024), a first portion but not a second portion) of the representation of the first account (e.g., 1912, 2024) at the second location (e.g., a corner or edge of the display, such as the bottom edge of the display) of the display. In some examples, a user of the device can change the default account to be the second account instead of the first account. Displaying the entire representation of the second account (the selected account) and a portion of the first account (e.g., less than the entire representation of the unselected account) provides the user with (size-based) visual feedback about the states of the accounts, such as whether they are selected for use or available for use. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. In some examples, the entirety of a representation of an account is larger in size (when displayed, on the display) than a portion of the representation of an account that is not the entirety of the representation of the account.

In some examples, the electronic device (e.g., 1900, 2000) concurrently displays, on the display, at least a portion (e.g., a top portion) of a representation of a third account (e.g., one of 1916, one of 2026, the third account is enabled to provide corresponding restricted credentials from the secure element) at a location adjacent to the second location of the display (e.g., adjacent to the representation of the second account (e.g., 2030 of FIG. 20D), above the representation of the second account, behind the representation of the second account, such as items arranged in a stack) while maintaining display of the at least a portion of the representation of the second account at the second location. In some examples, the electronic device detects, via the one or more input devices, user selection (e.g., a touch gesture, such as a tap, on a portion of the displayed second resource account by a user, a voice selection through a digital assistant) of the representation of the third account (e.g., one of 1916, one of 2026). In response to detecting the user selection of the representation of the third account: the electronic device replaces display of the representation of the first account (e.g., 1912, 2024) with the representation of the third account (e.g., one of 1916, one of 2026) at the first location of the display, and the electronic device maintains display of the at least a portion of the representation of the second account (e.g., 1918, 2030, at the second location of the display). Thus, in some examples, display of the representation of the second account at the second location of the display is always maintained no matter (independent of) which account (other than the second account) is selected and displayed at the first location of the display. Changing the location on the display of the various accounts provides the user with (location-based) visual feedback about the updated states of the accounts, such as whether they are selected for use or available for use, and provides the user with visual feedback that the input they provided has changed the account selected for use. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the usage metric (e.g., 1922, 2032, usage limit, available resources) for the second account is displayed after a third predetermined amount of time (e.g., 1 second) has passed from displaying the at least a portion of the representation of the second account. Thus, in some examples, the displayed usage metric (e.g., 1922, 2032) is displayed after a delay from when the representation of the second account (e.g., 1918, 2030) is first displayed. In some examples, the at least a portion of the representation of the second account (e.g., 2030) is displayed without displaying the usage metric (e.g., 1922, 2032). After the third predetermined period of time has passed, the usage metric (e.g., 1922, 2032) is displayed such that the representation of the second account (e.g., 1918, 2030) is displayed concurrently with the usage metric (e.g., 2032).

In some examples, the usage metric (e.g., 1922, 2032, usage limit, available resources) for the second account ceases to be displayed after a fourth predetermined amount of time (e.g., 3 seconds) has passed from first displaying the usage metric (e.g., 1922, 2032). Thus, in some examples, the displayed usage metric auto-hides from the display if a user does not select the second account after a certain amount of time.

In some examples, selected accounts are displayed at the first location (e.g., a location towards a center of the display, indicating that the account is selected) and non-selected accounts are displayed at the second location (e.g., at a location towards an edge of the display, indicating that the account is not selected) (e.g., a region of representations of non-selected accounts or non-selected payment cards arranged as a stack). Thus, in some examples, if a representation of an account is displayed at the first location of the display, the user of the device is made aware that the account is currently selected for use in providing the restricted credentials or for use in a payment transaction, whereas if a representation of an account is displayed at the second location of the display, the user is made aware that the account is currently not selected for use in providing the restricted credentials or for use in a payment transaction. Displaying representations of accounts at different locations on the display provides the user with (location-based) visual feedback about the state of the corresponding accounts, such as whether they are selected for use or available for use. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, a plurality of representations of non-selected accounts are displayed in a stack configuration (e.g., a three-dimensional stack, graphical representations 1916, 2026 of other accounts shown in, for example, FIG. 20C) at the second location (e.g., the representation of accounts piled on top of one another, the representation of payment cards piled on top of one another with at least a portion of each visible).

In some examples, in response to detecting the user selection of the representation of the second account, the electronic device (e.g., 1900, 2000) replaces display of the at least a portion of the representation of the second account (e.g., 2030) with display of at least a portion of the representation of the first account (e.g., 1912, 2024). Changing the location on the display of the various accounts provides the user with (location-based) visual feedback about the updated states of the accounts, such as whether they are selected for use or available for use, and provides the user with visual feedback that the provided input has changed the account selected for use. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the representation of the second account (e.g., 1918, 2030) includes a distinguishing visual characteristic (e.g., a graphical animation, a graphical pattern, a dynamic animation, a dynamic pattern) and representations of other accounts (e.g., 1912, 1916, 2024, 2026) that are not the second account, including the representation of the first account (e.g., 2024), do not include the distinguishing visual characteristic. In some examples, the representation of the second account (e.g., 1918, 2030) includes a visual effect that changes commensurate with changes in the orientation of the device (e.g., as described above with reference to in FIGS. 17I and 17K), such as a three-dimensional visual effect (e.g., with drop shadows) that provides an appearance of the card having engravings. For example, the three-dimensional visual effect involves causing display of the representation of the second account (e.g., 2030) to change as changes in the orientation of the device relative to a reference point are detected. In some examples, the reference point is a face of a viewer (e.g., the user) of the device in a field of view of a sensor (e.g., a camera) of the device. Alternatively, in some examples, the reference point is a static point external to the device, such as a location on the ground or floor). Based on the reference point (e.g., of the face of the user), the representation of the second account (e.g., 1918, 2030) looks visually different (e.g., shadows behind plurality of moving patterns 1924, 2034 change) from one slanted angle view of the device as compared to a different slanted angle view of the device and, optionally, the representation from either angle looks different from a straight on view of the device (e.g., such that the display is not tilted at an angle relative to the face of the user, as shown in FIG. 20H).

Note that details of the processes described above with respect to method 2100 (e.g., FIGS. 21A-21D) are also applicable in an analogous manner to the methods described herein. For example, method 2100 optionally includes one or more of the characteristics of the various methods described herein with reference to methods 900, 1200, 1500, 1800, 2400, 2700, 3000, and 3400. For example, displaying a transfer user interface for initiating transfer of a first type of item (e.g., a photo, stickers, resources, payments) between participants as described in method 900 can apply in response to detecting user selection on representation of the second account (e.g., 2030). For another example, the outputting of feedback, as described in method 1200, can be applied to the representation of the second account (e.g., 2030). For another example, the different visual appearances of a message object based on whether the message object corresponds to a transmission message or a request message, as described in method 1500, can be applied with respect to the representation of the second account (e.g., 2030). For another example, a request for activating an account that is authorized to obtain one or items (e.g., a sticker, a photo, resources, a payment), as described in method 1800, can be applied when setting up the second account. For another example, automatically proceeding with a transfer, as described in method 2400, instead of requiring user input, can also be used when proceeding with a transfer using the second account. For another example, the plurality of items including information from messages in a message conversation, as described in method 2700, can include information from transfers using the first account and the second account. For another example, an utterance can be used, as described in method 3000, to initiate a transfer (e.g., initiate a payment) using the first account or the second account. For another example, a visual effect (e.g., a coloring effect, a geometric alteration effect) can be applied, as described in method 3400, to one or more elements (e.g., 2034) of a representation of an account (e.g., 2030) when the account is ready to be used in a transfer (e.g., of a resource, of a file, of a payment) and/or when a transfer (e.g., of a resource, of a file, of a payment) using the account is completed. For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 21A-21D are, optionally, implemented by components depicted in FIGS. 1A-1B. For example, receiving operation 2102, displaying operation 2110, detecting operation 2120, replacing operation 2128, and selecting operation 2130 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 22A-22F illustrate example user interfaces for managing peer-to-peer transfers, in accordance with some embodiments. As described in greater detail below, the non-limiting example embodiment of the user interfaces illustrated in FIGS. 22A-22F relate to the non-limited example embodiment of the user interfaces illustrated in FIGS. 23A-23O, which in turn are used to illustrate the processes described below, including the processes in FIGS. 24A-24C.

Figure 22A:
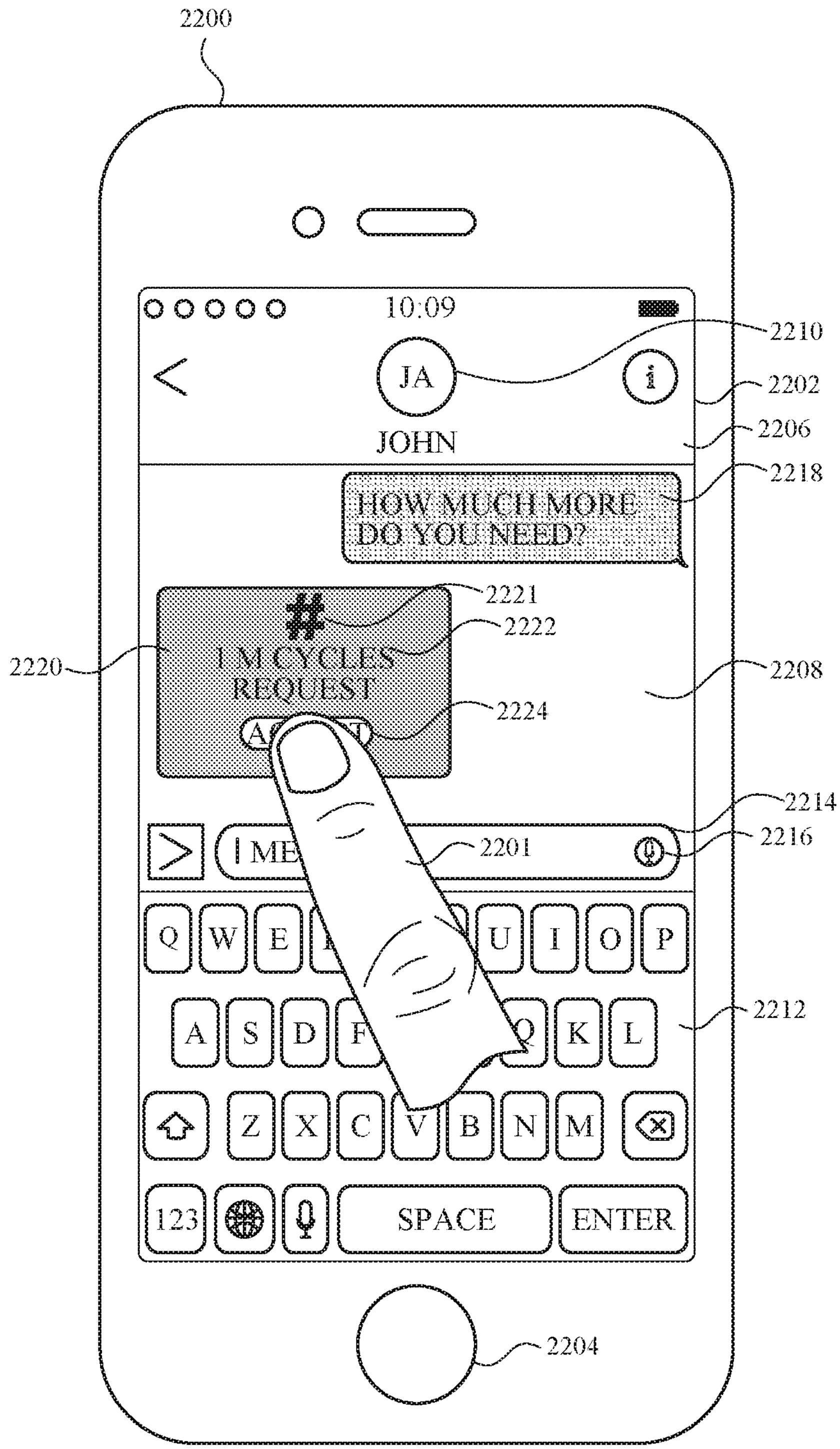
FIGS. 22A-22F illustrate example user interfaces for splitting resource transfers between two or more resource accounts, in accordance with some embodiments.

FIG. 22A illustrates an electronic device 2200 (e.g., portable multifunction device 100, device 300, or device 500). In the non-limiting example embodiment illustrated in FIGS. 22A-22F, electronic device 2200 is a smartphone. In other embodiments, electronic device 2200 can be a different type of electronic device, such as a wearable device (e.g., a smartwatch). Electronic device 2200 has a display 2202 and one or more input devices (e.g., touchscreen of display 2202, a mechanical button 2204, a mic).

In FIG. 22A, electronic device 2200 displays, on display 2202, a message conversation 2208 of a messaging application 2206 between the user (e.g., "Kate Appleseed") of the device and a message participant 2210 (e.g., "John Appleseed"). The user and the message participant are engaged in a conversation concerning the transfer of central processing unit ("CPU") cycles. In some embodiments, message participant 2210 is a contact stored on the device. In some embodiments, message participant 2210 is a contact of a contact list associated with the user account logged onto the device. In some embodiments, message participant 2210 is a contact included in a trusted contacts list associated with the user account logged onto the device.

In some embodiments, electronic device 2200 also displays, on display 2202, a virtual keyboard 2212 (e.g., an alphanumeric keyboard for typing a message) and a compose bar 2214 for displaying the text of a message as the message is typed using virtual keyboard 2212. In some embodiments, a mechanical keyboard can be used in addition to or alternatively to virtual keyboard 2212 to type a message. In some embodiments, compose bar 2214 can expand (e.g., expand upwards) to accommodate a longer message or message object (e.g., an image, an emoticon, a special type of message object, such as a payment object). In some embodiments, compose bar 2214 includes a mic button 2216 which, when activated, enables the user to enter a message using voice input.

FIG. 22A also shows a message object 2218 corresponding to a message sent by the user to message participant 2210. In the message corresponding to message object 2218, the user asks message participant 2210 about an amount of CPU cycles that are needed by the message participant: "How much more do you need?" FIG. 22A also shows a cycle transfer message object 2220 corresponding to a request for a specific number (e.g., 1 million) CPU cycles sent by message participant 2210 to the user.

In some embodiments, as shown in FIG. 22A, cycle transfer message object 2220 includes a request indicator 2221 (e.g., a symbol "#") indicating that the transfer message object corresponds to a request for CPU cycles (as opposed to a transmission of CPU cycles. In some embodiments, as also shown in FIG. 22A, cycle transfer message object 2220 includes a textual indication 2222 (e.g., stating "1 M cycles request" of the number of cycles that are being requested. In some embodiments request indicator 2221 is displayed in a different font (e.g., a thicker font, a bolder font, a special type of font reserved for transfer request messages) than textual indication 2222. In some embodiments, as also shown in FIG. 22A, cycle transfer message object 2220 includes an accept button 2224 for accepting the request for cycles (and thus agreeing to transmit the requested number of cycles to the message participant).

In FIG. 22A, while displaying cycle transfer message object 2220 (corresponding to a request for 1 million CPU cycles) within message conversation 2208 with message participant 2210, electronic device 2200 detects a user input on accept button 2224 of the cycle transfer message object. For example, as shown in FIG. 22A, the user input is a tap gesture 2201 on accept button 2224.

Figure 22B:
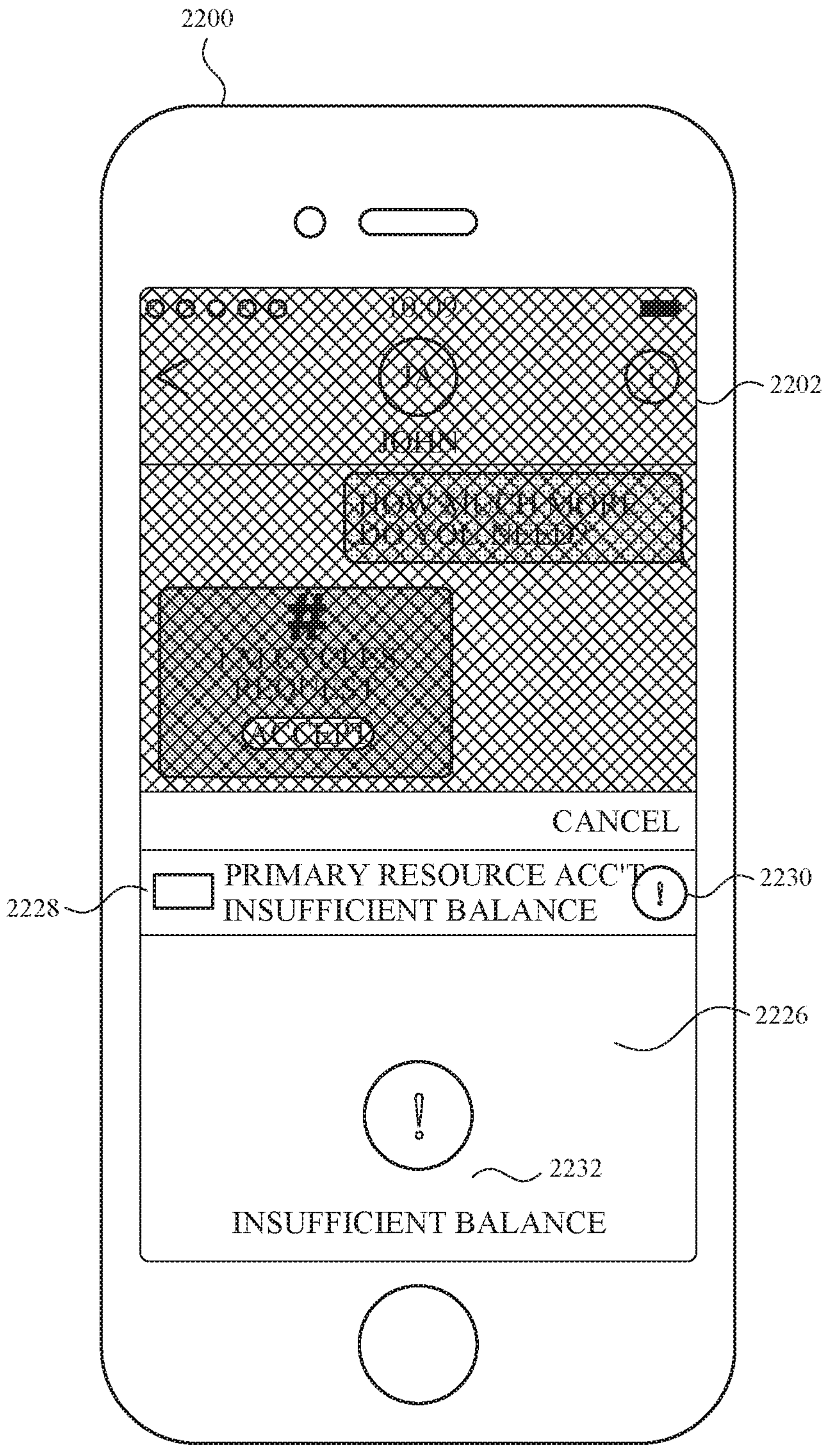

In FIG. 22B, in response to detecting tap gesture 2201, electronic device 2200 displays, on display 2202, a transfer confirmation user interface 2226. In some embodiments, transfer confirmation user interface 2226 includes an indication 2228 (e.g., a graphical indication, a textual indication) of a primary (e.g., priority) resource account (e.g., storing priority CPU cycles). In FIG. 22B, the primary resource account does not have sufficient balance of CPU cycles to cover the requested amount of 1 million CPU cycles. Thus, in some embodiments, indication 2228 includes a textual indication (e.g., stating "Insufficient Balance") informing the user that the resource account has an insufficient balance of CPU cycles, and an accounts selection button 2230 for selecting one or more other additional accounts to use in the transfer of CPU cycles. In some embodiments, transfer confirmation user interface 2226 also includes a status indication 2232 (e.g., a graphical and/or textual indication) informing the user that the currently-selected resource account (e.g., the primary resource account associate with indication 2228) has an insufficient number of CPU cycles remaining to cover the request number of resources for by the transfer request.

Figure 22C:
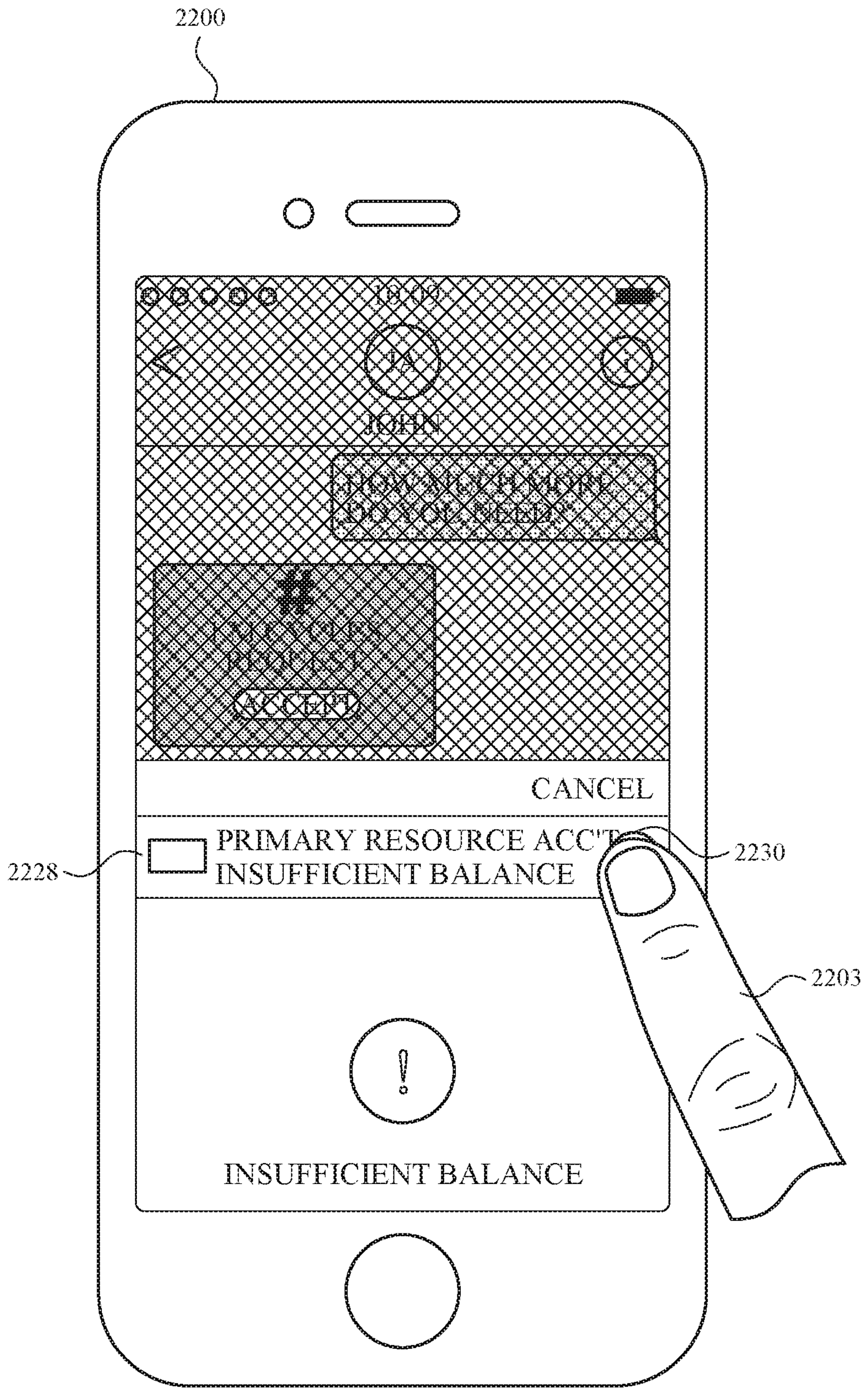

In FIG. 22C, while displaying transfer confirmation user interface 2226, electronic device 2200 detects a user input on accounts selection button 2230 of indication 2228. For example, as shown in FIG. 22C, the user input is a tap gesture 2203 on accounts selection button 2230.

Figure 22D:
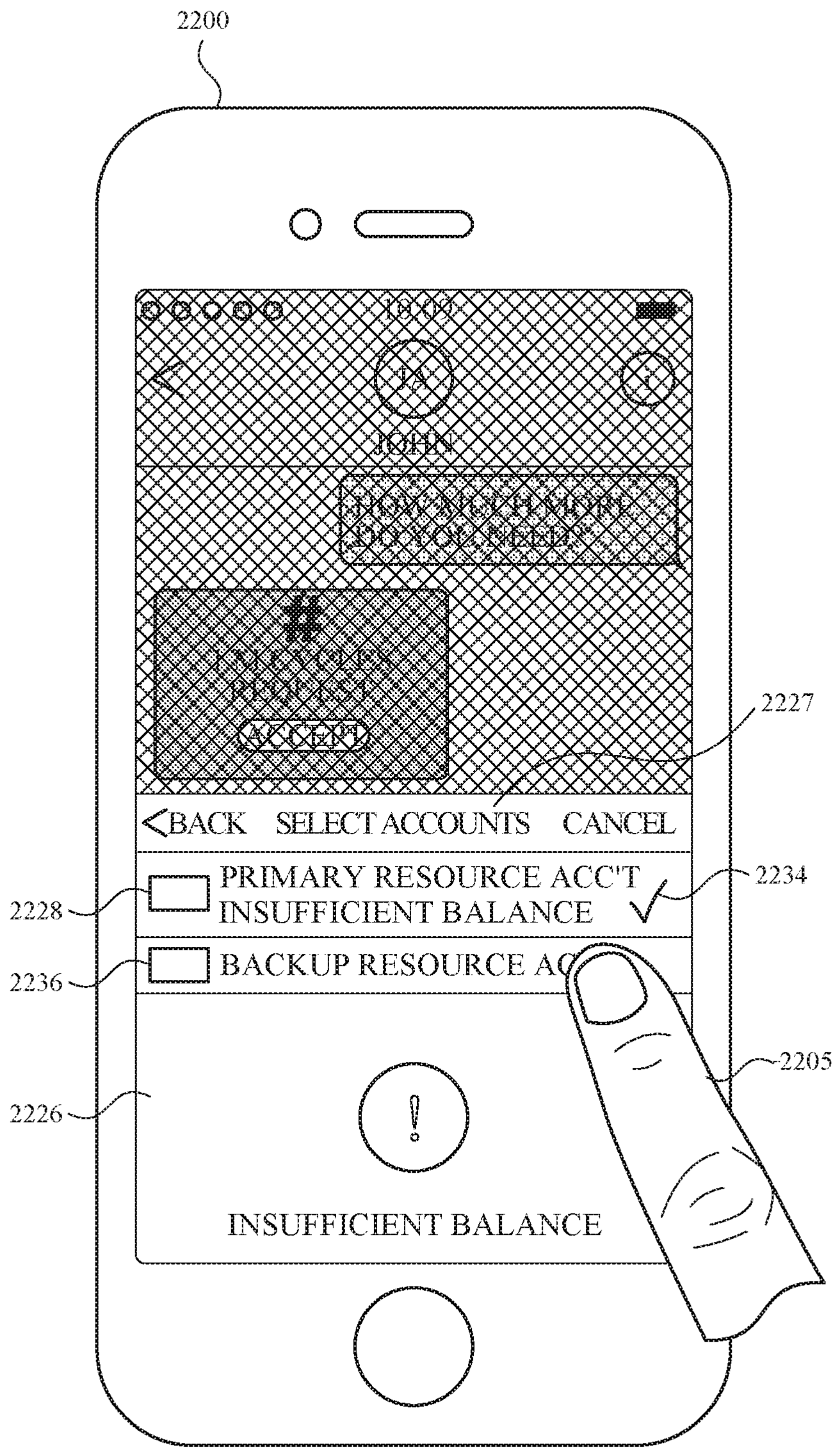

In FIG. 22D, in response to detecting tap gesture 2203, electronic device 2200 displays indications of one or more accounts 2228 and 2236 stored on or provisioned on the device. Indication 2228 corresponds to the primary resource account. Because the primary resource account is currently selected for use in responding to the request for CPU cycles, indication 2228 of the primary resource account includes a selection mark 2234 informing the user that the account is currently selected for use in the CPU cycles transfer. Indication 2236 corresponds to a backup (e.g., non-priority) resource account, which has sufficient CPU cycles to (either alone or together with the primary resource account) cover the received CPU cycles request. Because the backup resource account is not currently selected for use in the CPU cycles transfer, it does not include selection mark.

Figure 22E:
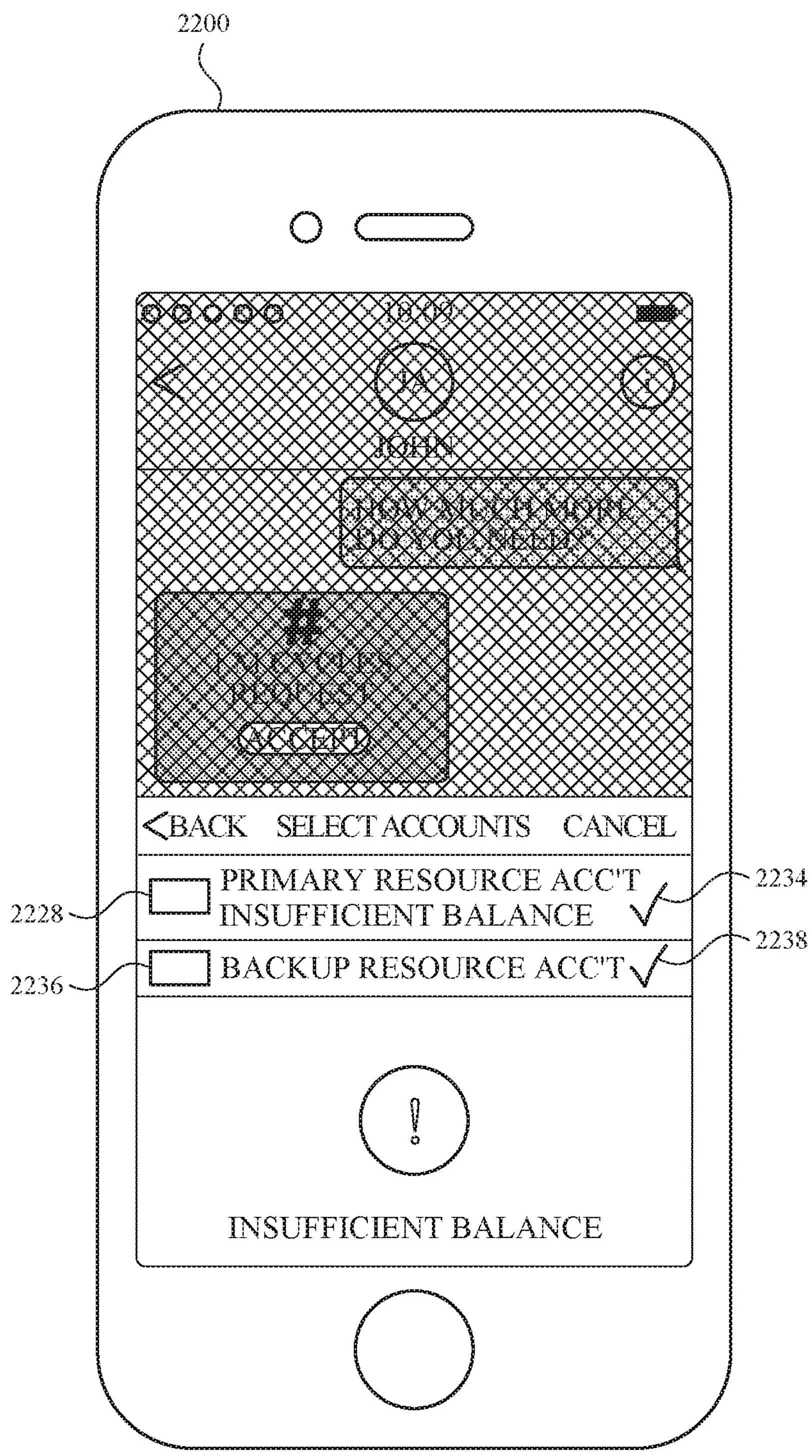

As shown in FIG. 22D, while both indication 2228 of the primary resource account and indication 2236 of the backup resource account, electronic device 2200 detects user selection of indication 2236 corresponding to the backup resource account. For example, as shown in FIG. 22D, the user selection is a tap gesture 2205 on indication 2236. In FIG. 22E, in response to detecting tap gesture 2205, the device updates display of indication 2236 to include a selection mark 2238. Thus, in FIG. 22E, following the detection of tap gesture 2205, both the primary resource account and the backup account are selected for use in the CPU cycles transfer.

Figure 22F:
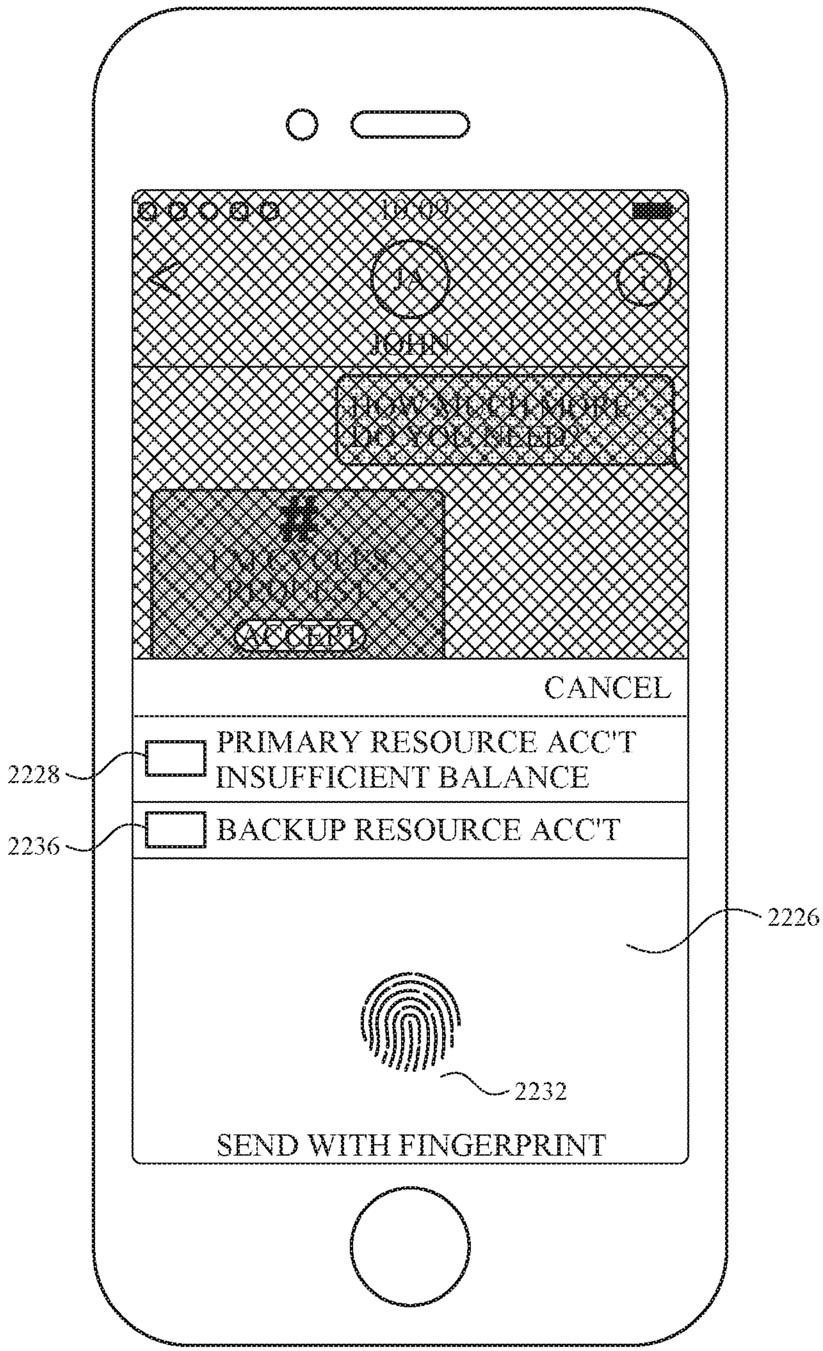

In FIG. 22F, electronic device 2200 requests, as indicated by status indication 2232 (e.g., stating "Send with fingerprint") authentication information (e.g., biometric authentication, such as fingerprint authentication, facial recognition, voice recognition, iris/retina recognition, or passcode authentication) to proceed with transferring the requested CPU cycles to message participant using both the primary resource account and the backup resource account. Once authentication information that is consistent with enrolled authentication information (for proceeding with CPU cycle transfers) are provided by the user, the device transmits, via messaging application 2206, the requested (1 million) CPU cycles to message participant 2210 by withdrawing available CPU cycles from (first) the primary resource account and (second) the backup resource account.

As mentioned above, the non-limiting example embodiment of the user interfaces illustrated in FIGS. 22A-22F described above relate to the non-limited example embodiment of the user interfaces illustrated in FIGS. 23A-23O described below. Therefore, it is to be understood that the processes described above with respect to the example user interfaces illustrated in FIGS. 22A-22F and the processes described below with respect to the example user interfaces illustrated in FIGS. 23A-23O are largely analogous processes that similarly involve initiating and managing transfers using an electronic device (e.g., 100, 300, 500, 2200, or 2300).

FIGS. 23A-23O illustrate example user interfaces for splitting transfers between two or more accounts, in accordance with some embodiments. The user interfaces in these figures are used to illustrate the processes described below, including the processes in FIGS. 24A-24C.

FIG. 23A illustrates an electronic device 2300 (e.g., portable multifunction device 100, device 300, or device 500). In the non-limiting example embodiment illustrated in FIGS. 23A-23O, electronic device 2300 is a smartphone. In other embodiments, electronic device 2300 can be a different type of electronic device, such as a wearable device (e.g., a smartwatch). Electronic device 2300 has a display 2302 and one or more input devices (e.g., touchscreen of display 2302, a mechanical button 2304, a mic).

In FIG. 23A, electronic device 2300 displays, on display 2302, a wallet user interface 2322 corresponding to wallet user interface 2022 described above with reference to FIGS. 20A-20J. In some embodiments, as shown in FIG. 23A, the device 2300 displays wallet user interface 2322 in response to receiving a signal from an external device 2320 (e.g., a different device, such as a smartphone or a smartwatch, a near field communication (NFC) terminal, a point-of-sale (POS) terminal) requesting user credentials (e.g., payment credentials). In some embodiments, the device displays wallet user interface 2322 in response to detecting user activation (e.g., a double press) of the interface via mechanical button 2304. In some embodiments, the device displays wallet user interface 2322 in response to receiving, via a mic, a voice command.

As with wallet user interface 2022, wallet user interface 2322 includes a graphical representation 2330 (e.g., corresponding to graphical representation 2030) corresponding to a payment account (e.g., a unique operating system-controlled and managed account) at a first location (e.g., a top-half portion) of the display, and a balance indication 2332 (e.g., "$30") within graphical representation 2330 informing a user (e.g., "Kate Appleseed") of the device of the amount of funds available from the payment account. As shown in FIG. 23A, the payment account associated with graphical representation 2330 has a current balance of (as indicated by balance indication 2332) $30.

As with wallet user interface 2022, wallet user interface 2322 includes graphical representations 2326 (e.g., corresponding to graphical representations 2026) corresponding to one or more accounts stored on or provisioned on the device at a second location (e.g., at the bottom edge) of the display. As with wallet user interface 2022, wallet user interface 2322 includes an indication (e.g., graphical and/or textual, corresponding to indication 2028) informing the user of an authentication method for authorizing a transaction using an account provisioned on the device. For example, in FIG. 23A, indication 2328 (e.g., depicting a graphical representation of a fingerprint and stating "Pay with Fingerprint") informs the user that fingerprint authentication can be used to authorize a transaction on the device.

Further, in FIG. 23A, electronic device 2300 displays a graphical representation 2324 (e.g., corresponding to graphical representation 2024) corresponding to a default account at the first location of the interface, together with graphical representation 2330. In FIG. 23A, graphical representation 2324 (corresponding to the default account) covers a portion of graphical representation 2330 (corresponding to the payment account) at the first location of the interface. In some embodiments, graphical representation 2330 (corresponding to the payment account) covers a portion of graphical representation 2324 (corresponding to the default account) at the first location of the interface.

In FIG. 23A, electronic device 2300 received, from external device 2320, a request for payment credentials to authorize payment in an amount (e.g., $50) that is greater than the currently available balance of the payment account ($30). Thus, in some embodiments, in accordance with the determination (based on the request signal from external device 2320) that the payment account alone has insufficient funds to fully pay for the current transaction, the device automatically displays a graphical representation 2324 (e.g., corresponding to graphical representation 2024) corresponding to a default account together with graphical representation 2330 at the first location of the interface (thereby indicating that both the payment account and the default will be used for the current transaction. In some embodiments, the device automatically displays the representation of the default account (as opposed to a different account stored or provisioned on the device) because the default account is designated as the "default" account. In some embodiments, the device displays graphical representation 2324 of the default account at the first location in response to receiving user selection of the default account as the second account to be used for the current transaction (e.g., after the device first prompts the user that the payment account has insufficient funds to fully pay for the current transaction or after the user realizes, based on balance indication 2332, that the payment account has insufficient funds).

In some embodiments, as shown in FIG. 23A, graphical representation 2324 (corresponding to the default account) covers a portion of graphical representation 2330 (corresponding to the payment account) at the first location of the interface. In some embodiments, graphical representation 2330 (corresponding to the payment account) covers a portion of graphical representation 2324 (corresponding to the default account) at the first location of the interface.

Figure 23B:
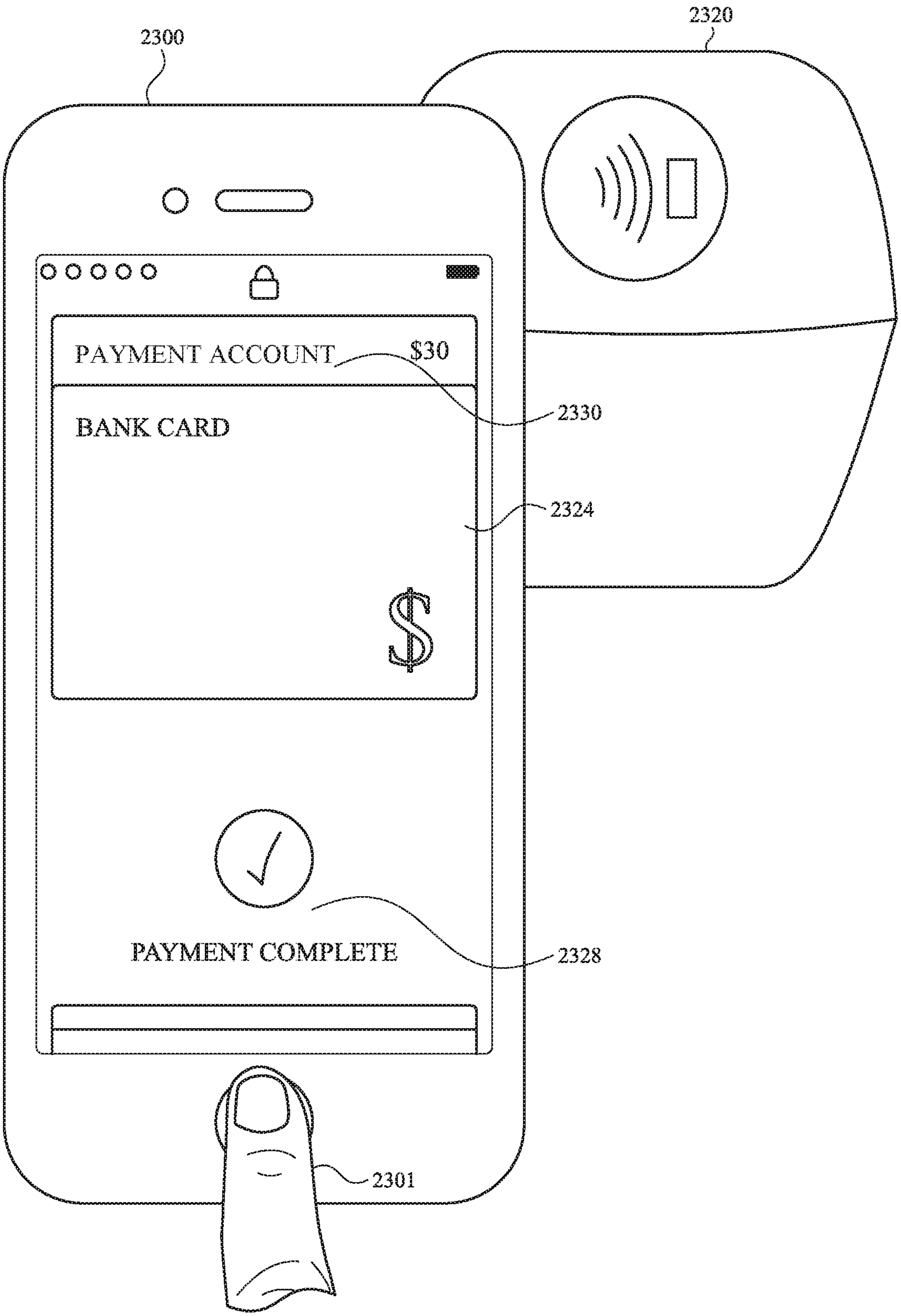

As shown in FIG. 23A, while displaying both graphical representation 2330 (of the payment account) and graphical representation 2324 (of the default account) at the first location of wallet user interface 2322, electronic device receives a user input (e.g., fingerprint scan input 2301 on a fingerprint sensor of mechanical button 2304) to authorize a payment (e.g., of $50) for the current transaction. As shown in FIG. 23B, as indicated by indication 2328 (now stating "Payment complete"), the authentication (based on fingerprint scan input 2301) is successful (e.g., because the received fingerprint information is consistent with an enrolled fingerprint information for authorizing transactions). Because the graphical representations of both the payment account and the default account are displayed at the first location of wallet user interface 2322 when the current transaction (of $50) is successfully authorized by the user, both accounts are authorized to be used to pay for the transaction.

Figure 23C:
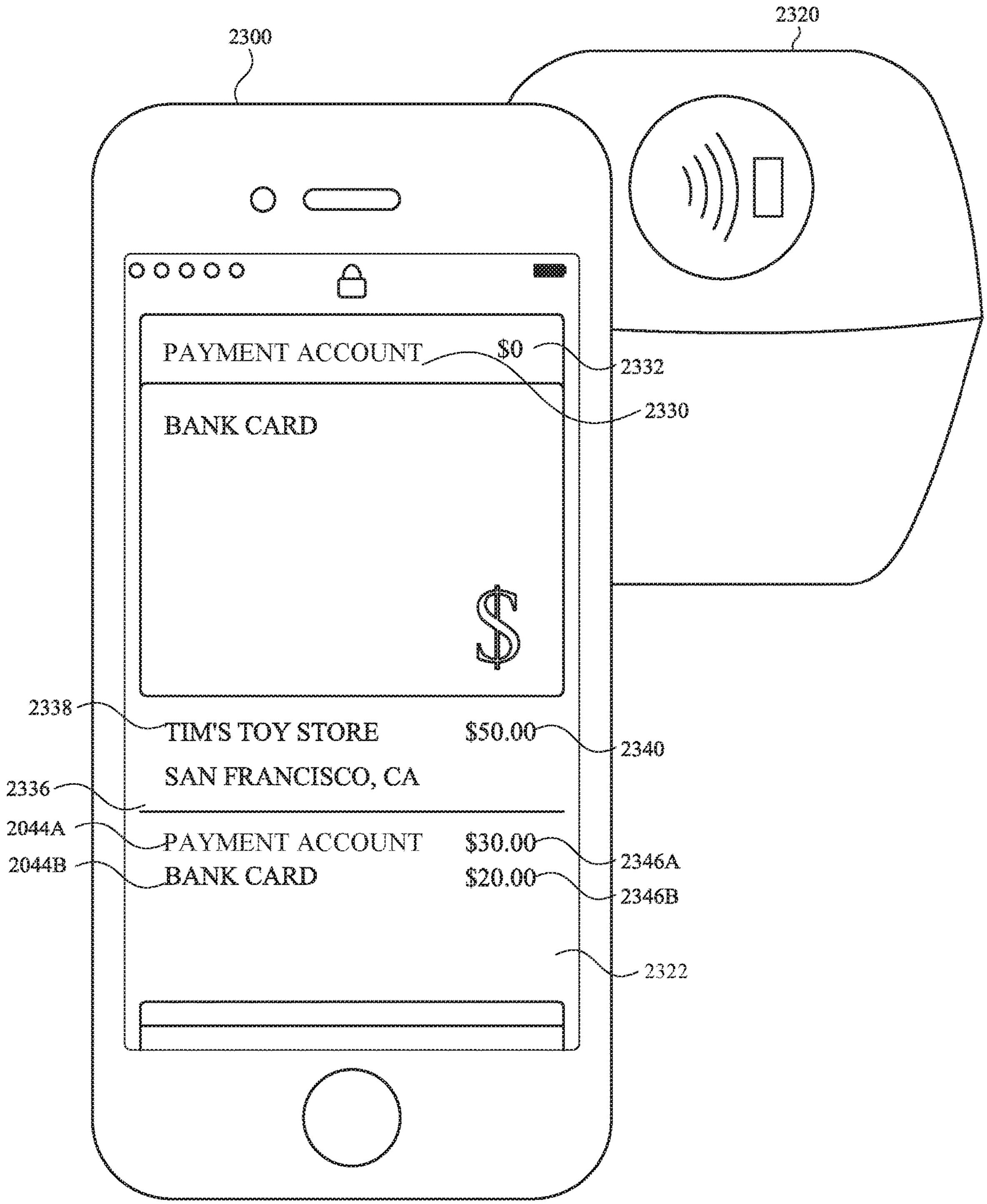

FIG. 23C shows wallet user interface 2322 displaying transaction summary information 2336 following the successful payment transaction (using both the payment account and the default account). In some embodiments, transaction summary information 2336 includes an indication 2338 of the other party (e.g., a business, a restaurant, a non-business individual) and/or location (e.g., an address, a city) of the transaction. For example, in FIG. 23C, the current transaction was with Tim's Toy Store in San Francisco, Calif. In some embodiments, transaction summary information includes an indication 2340 of the transaction amount (e.g., "$50.00"). In some embodiments, transaction summary information includes an indication 2344A of the first account (e.g., the payment account), of the two different accounts, that was used in the transaction and an indication 2344B, of the second account (e.g., the default account) of the two different accounts, that was used in the transaction. In some embodiments, transaction summary information includes a first indication 2346A of the amount of funds (e.g., "$30.00") that was taken out of the first account (e.g., the payment account) for use in the transaction and a second indication of the amount of funds (e.g., "$20.00") that was taken out of the second account (e.g., the default account) for use in the transaction.

As shown in FIG. 23C, subsequent to the successful transaction (in the amount of $10.00), electronic device 2000 updates balance indication 2332 within graphical representation 2330 of the payment account to reflect the amount of funds (e.g., "$30.00") that was withdrawn (or taken out of) the payment account to fund the successful transaction. For example, in FIG. 23C, because balance indication 2332 showed $30 prior to the successful transaction, and the amount of the transaction was $50.00 (which is more than the available funds of the payment account), the device updates balance indication 2332 to show a post-transaction amount of $0 (because all available funds, in the amount of $30, was used to cover the transaction. Thus, in some embodiments, if the transaction amount of the current transaction (e.g., "$50") is greater than the available funds in the payment account (e.g., "$30") all available funds from the payment account is automatically used in the transaction (thereby leaving the balance of the payment account at $0), and the insufficient balance left by the payment account (e.g., "$20") is automatically covered by other account selected for the transaction (e.g., the default account).

Figure 23D:
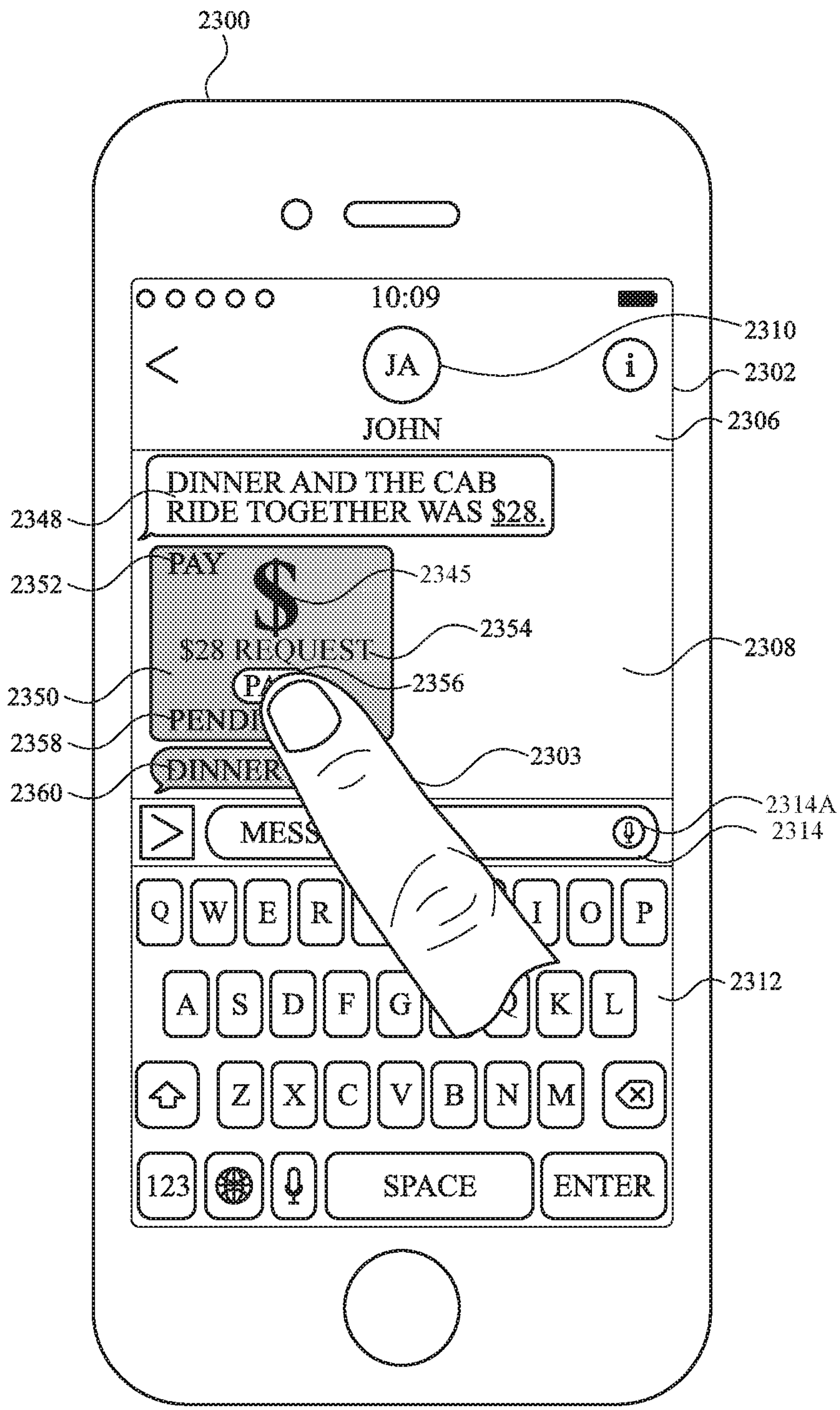

FIG. 23D shows electronic device 2300 displaying, on display 2302, a message conversation 2308 of a messaging application 2306 between the user (e.g., "Kate Appleseed") of the device and a message participant 2310 (e.g., "John Appleseed"). In some embodiments, message participant 2310 is a contact stored on the device. In some embodiments, message participant 2310 is a contact of a contact list associated with the user account logged onto the device. In some embodiments, message participant 2310 is a contact included in a trusted contacts list associated with the user account logged onto the device.

In some embodiments, electronic device 2300 also displays, on display 2302, a virtual keyboard 2312 (e.g., an alphanumeric keyboard for typing a message) and a compose bar 2314 for displaying the text of a message as the message is typed using virtual keyboard 2312. In some embodiments, a mechanical keyboard can be used in addition to or alternatively to virtual keyboard 2312 to type a message. In some embodiments, compose bar 2314 can expand (e.g., expand upwards) to accommodate a longer message or message object (e.g., an image, an emoticon, a special type of message object, such as a payment object). In some embodiments, compose bar 2314 includes a mic button 2314A which, when activated, enables the user to enter a message using voice input.

FIG. 23D also shows a message object 2348 corresponding to a message sent by message participant 2310 to the user. For example, in FIG. 23D, message object 2348 states "Dinner and the cab ride together was $28." FIG. 23D also shows a payment message object 2350 (e.g., corresponding to payment message object 1490 described above with reference to FIG. 14L) corresponding to a payment request sent by message participant 2310 to the user, requesting payment (e.g., for dinner and the cab ride stated in message object 2310) in the amount of $28.

In some embodiments, as shown in FIG. 23D, payment message object 2350 has a mode indication 2352 (e.g., stating "PAY") indicating to the user that the payment message object corresponds to a payment request made via an operating system-controlled payment transfer application (and not by a third-party application). As shown in FIG. 23D, payment message object 2350 also includes an amount indication 2354 informing the recipient (e.g., the user) of the amount of the requested payment (e.g., "$28") and a further indication (e.g., "$28 Request") that the payment message object corresponds to a request for payment. As shown in FIG. 23D, payment message object 2350 also includes an accept button 2356 for agreeing to make (or initiating the process for making) the payment (e.g., in the amount of $28) corresponding to the requested payment. In some embodiments, as shown in FIG. 23D, payment message object 2350 includes a status indicator 2358 informing the user of a status of the payment request corresponding to the payment message object (e.g., "pending," "paid," "accepted," "expired," etc.). For example, in FIG. 23D, status indicator 2358 shows "pending," thus indicating to the user that the payment request associated with payment message object 2350 has not yet been accepted by the user. In some embodiments, as shown in FIG. 23D, a note message object 2360 corresponding to a note (e.g., a comment, a message) related to the payment request accompanies the payment message object.

In FIG. 23D, while displaying payment message object 2350 (corresponding to a payment request) within message conversation 2308 with message participant 2310, electronic device 2300 detects a user input on accept button 2356 of the payment message object. For example, as shown in FIG. 23D, the user input is a tap gesture 2303 on accept button 2356.

Figure 23E:
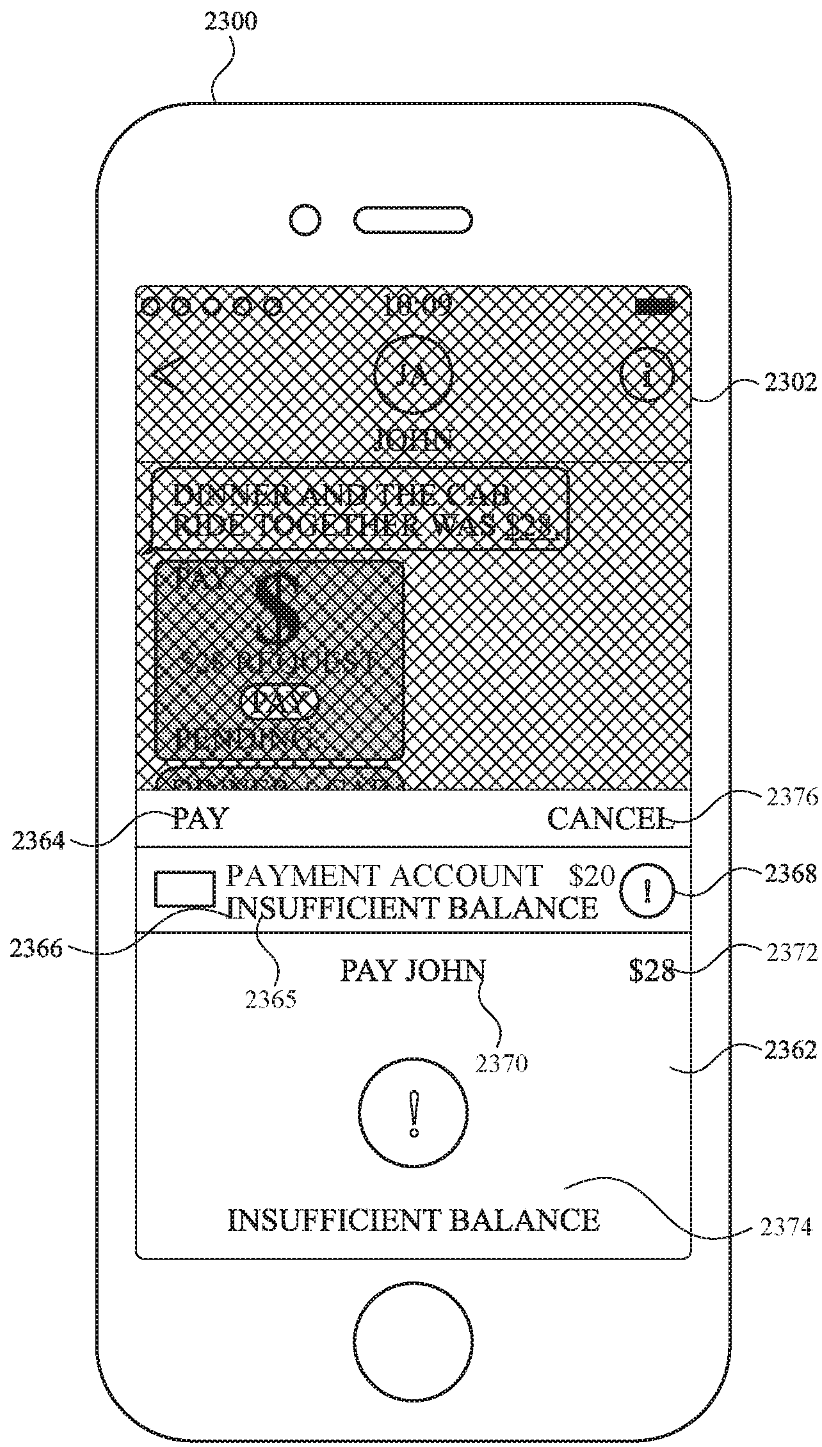

In FIG. 23E, in response to detecting tap gesture 2303, electronic device 2300 displays, on display 2302, a payment confirmation user interface 2362 corresponding to payment confirmation user interface 878 described with reference to FIGS. 8T-8W. As with payment confirmation user interface

878, payment confirmation user interface 2362 includes a mode indication (e.g., corresponding to mode indication 880, stating "PAY") indicating to the user that the current payment relates to a payment request (or payment) made via an operating system-controlled payment transfer application (and not by a third-party application). As with payment confirmation user interface 878, payment confirmation user interface 2362 also includes an indication 2366 (e.g., corresponding to indication 884) (e.g., a graphical indication, a textual indication) of a payment account and a balance of the payment account that is currently selected for the payment. Indication 2364 informs the user that the device is requesting authorization for a payment. For example, in FIG. 23E, indication 2366 includes a thumbnail image of a graphical representation of the payment account and a current balance (e.g., "$20") of the payment account. As with payment confirmation user interface 878, payment confirmation user interface 2362 also includes an indication 2370 (e.g., corresponding to indication 882) of the intended recipient of the payment (e.g., "Pay John") and an indication 2372 (e.g., corresponding to indication 888) of the payment amount (e.g., to serve as a reminder to the user of the amount to be paid). In some embodiments, payment confirmation user interface 2362 also includes a cancel button 2376 for canceling the payment (and closing the payment confirmation interface).

As shown by indication 2372 (e.g., "$28") showing the payment amount (e.g., the payment requested via payment message object 2350), the current balance (e.g., "$20") of the payment account, as shown by indication 2366, is insufficient to cover the entirety of the requested payment. Thus, in some embodiments, in accordance with a determination that the current balance (e.g., "20") is insufficient to cover the full amount of the current transaction, electronic device 2300 displays, within payment confirmation user interface 2362, an (graphical and/or textual) indication 2374 (e.g., stating "Insufficient Balance") that the account (e.g., the payment account) that is currently-selected for the transaction has insufficient funds to cover the amount of the current transaction. Further, in some embodiments, the device displays within indication 2366 a warning indication 2365 (e.g., stating "Insufficient Balance") and an accounts selection button 2368 for selecting one or more additional accounts to be used together with the currently-selected account (e.g., the payment account) in the transaction.

Figure 23F:
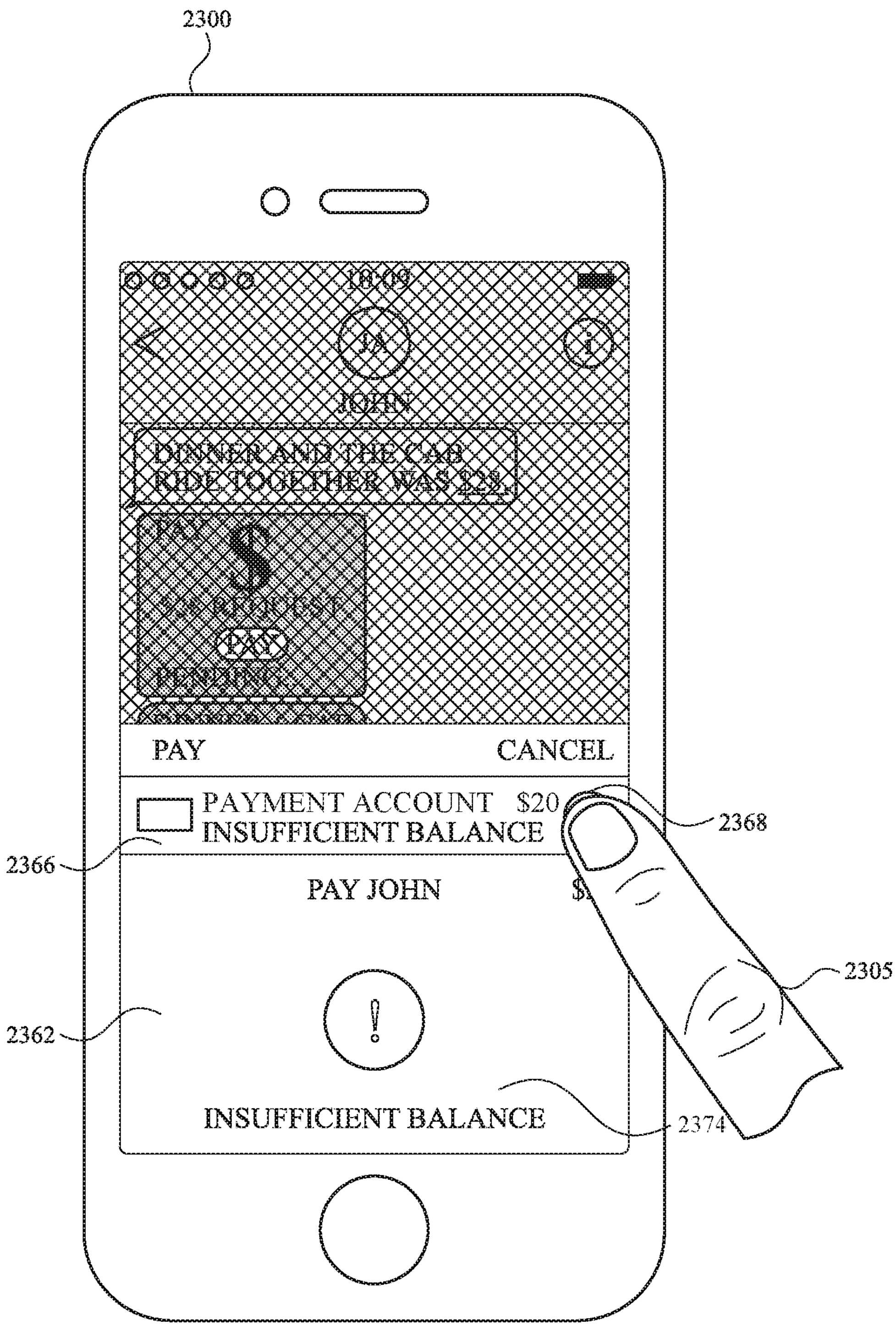

In FIG. 23F, while displaying payment confirmation user interface 2362, electronic device 2300 detects a user input on accounts selection button 2368 of indication 2366. For example, as shown in FIG. 23F, the user input is a tap gesture 2305 on accounts selection button 2368.

Figure 23G:
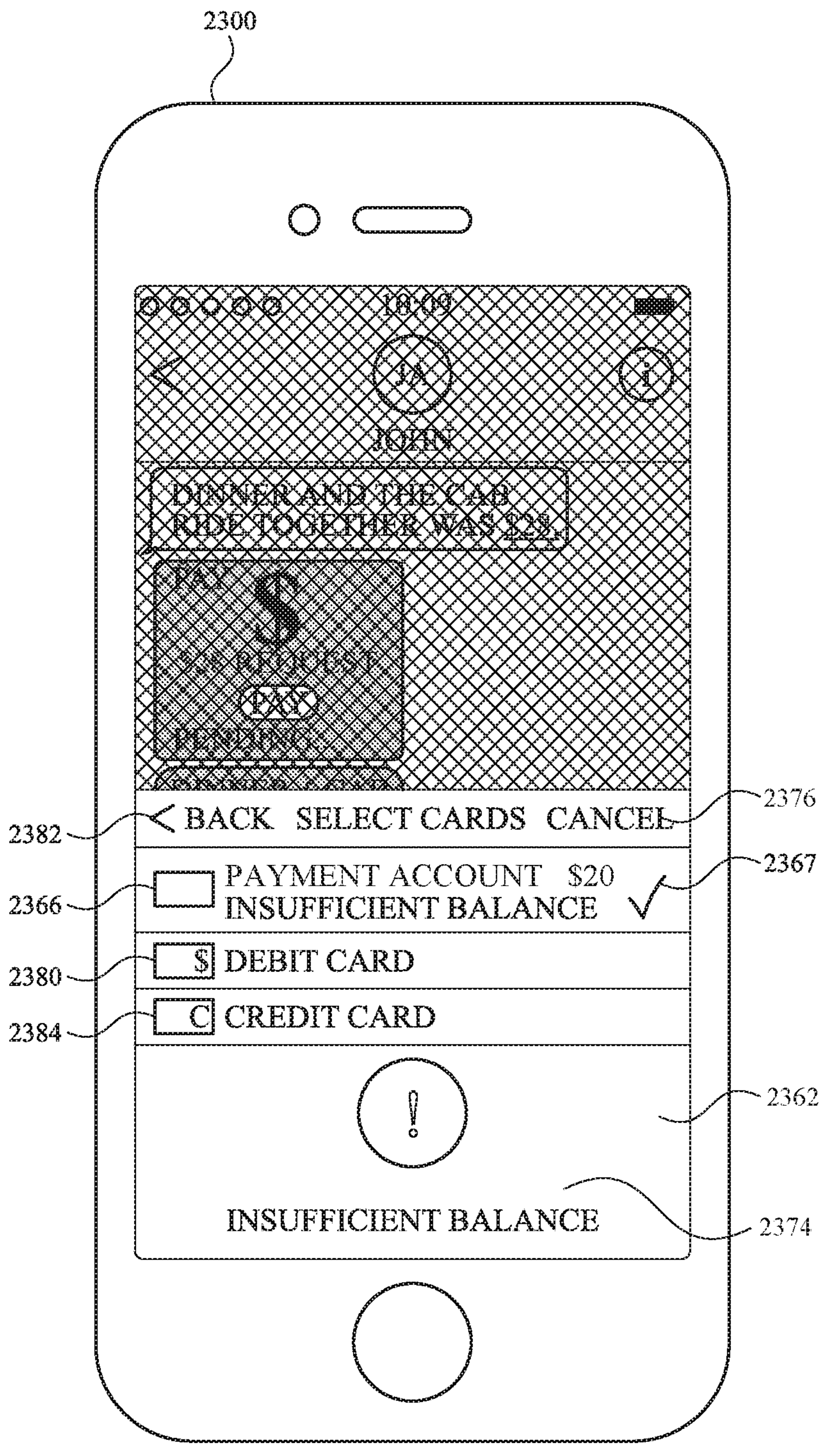

In FIG. 23G, in response to detecting tap gesture 2305, electronic device 2300 displays (e.g., replaces display of payment confirmation user interface 2632 with) an accounts selection user interface 2378. In some embodiments, accounts selection user interface 2378 includes a back button 2382 for returning to payment confirmation user interface 2362. In some embodiments, accounts selection user interface 2378 maintains display of cancel button 2376 (for canceling the accounts selection or for canceling the payment). In some embodiments, accounts selection user interface 2378 maintains display of indication 2374 informing the user of the insufficient balance of the payment account (and thus that one or more additional (or alternative) accounts need to be selected for use in the transaction).

In some embodiments, accounts selection user interface 2378 includes indications of one or more accounts stored on or provisioned on the device. For example, as shown in FIG. 23G, accounts selection user interface 2378 shows indication 2366 corresponding to the payment account. Because the payment account is currently selected for use in the transaction (e.g., as indicated by indication 2366 in FIG. 23F), indication 2366 of the payment account includes a selection mark 2367 informing the user that the payment account is currently selected for use in the transaction. Accounts selection user interface 2378 also shows an indication 2380 corresponding to a debit card account and an indication 2384 corresponding to a credit card account. Because neither the debit card account nor the credit card account is currently selected for use in the transaction, neither indication includes a selection mark.

Figure 23H:
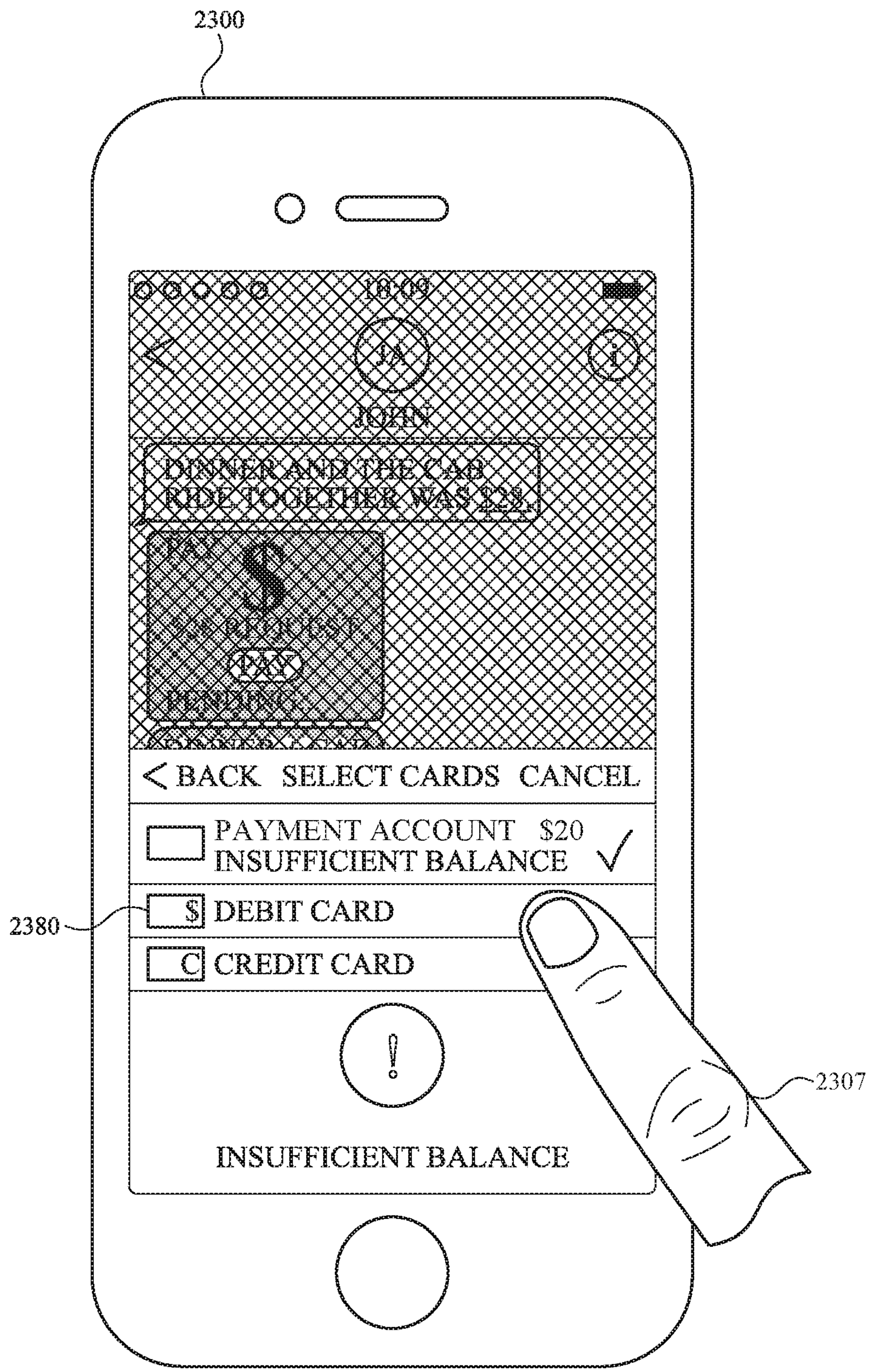
Figure 23I:
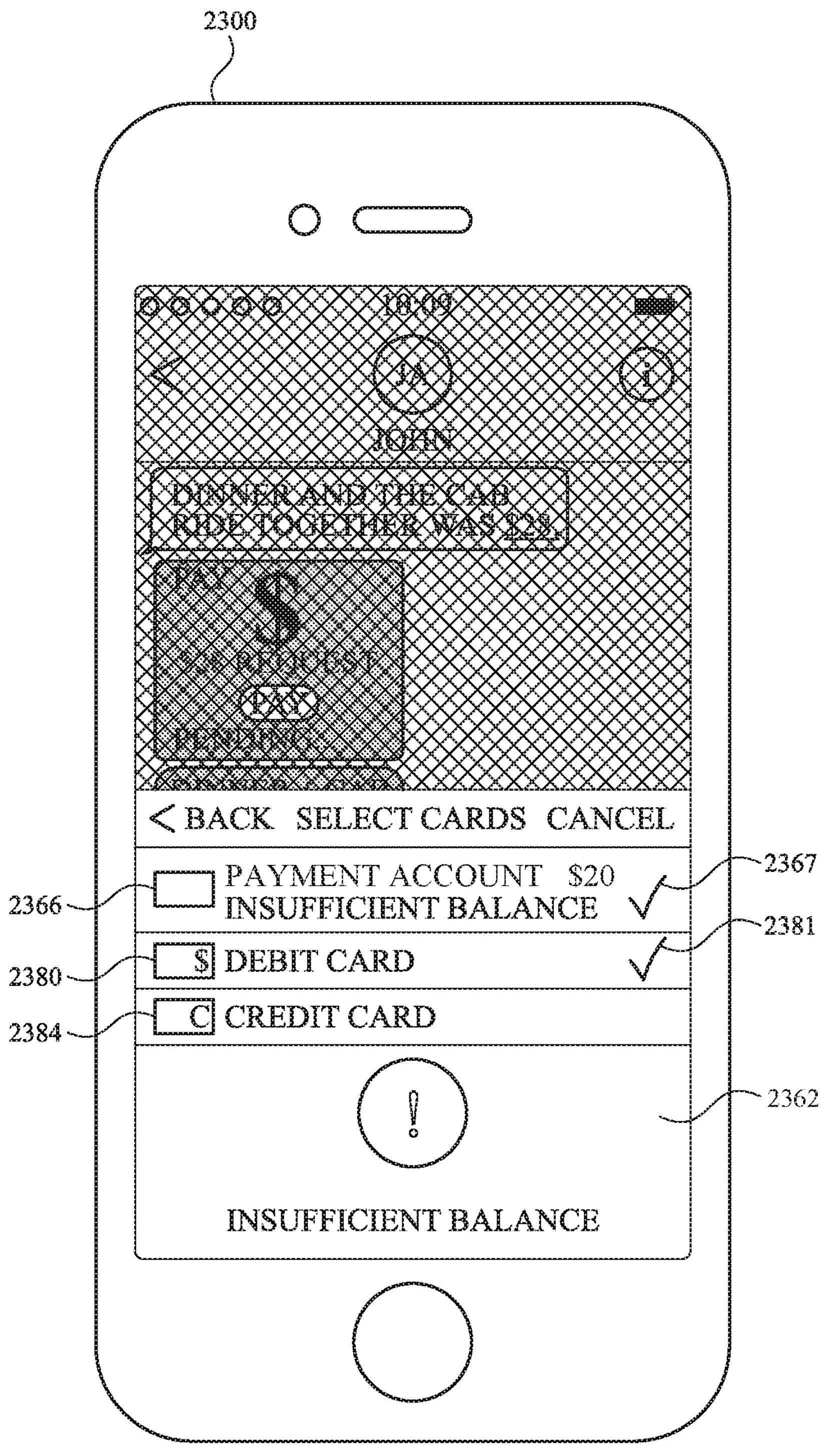

In FIG. 23H, while displaying accounts selection user interface 2378, electronic device 2300 detects user selection of indication 2380 corresponding to the debit card account. For example, as shown in FIG. 23H, the user selection is a tap gesture 2307 on indication 2380 corresponding to the debit card account. In FIG. 23I, in response to detecting tap gesture 2307, the device updates display of indication 2380 to include a selection mark 2381. Thus, in FIG. 23, following the detection of tap gesture 2307, accounts selection user interface 2378 shows (via selection marks 2367 and 2381) that both the payment account and the debit card account are selected for use in the transaction, but that the credit card is not selected for use in the transaction. In some embodiments, user selection of an indication that is already selected will cause the indication (and thus the corresponding account) to be unselected (and thus not be selected for use in the transaction).

Figure 23J:
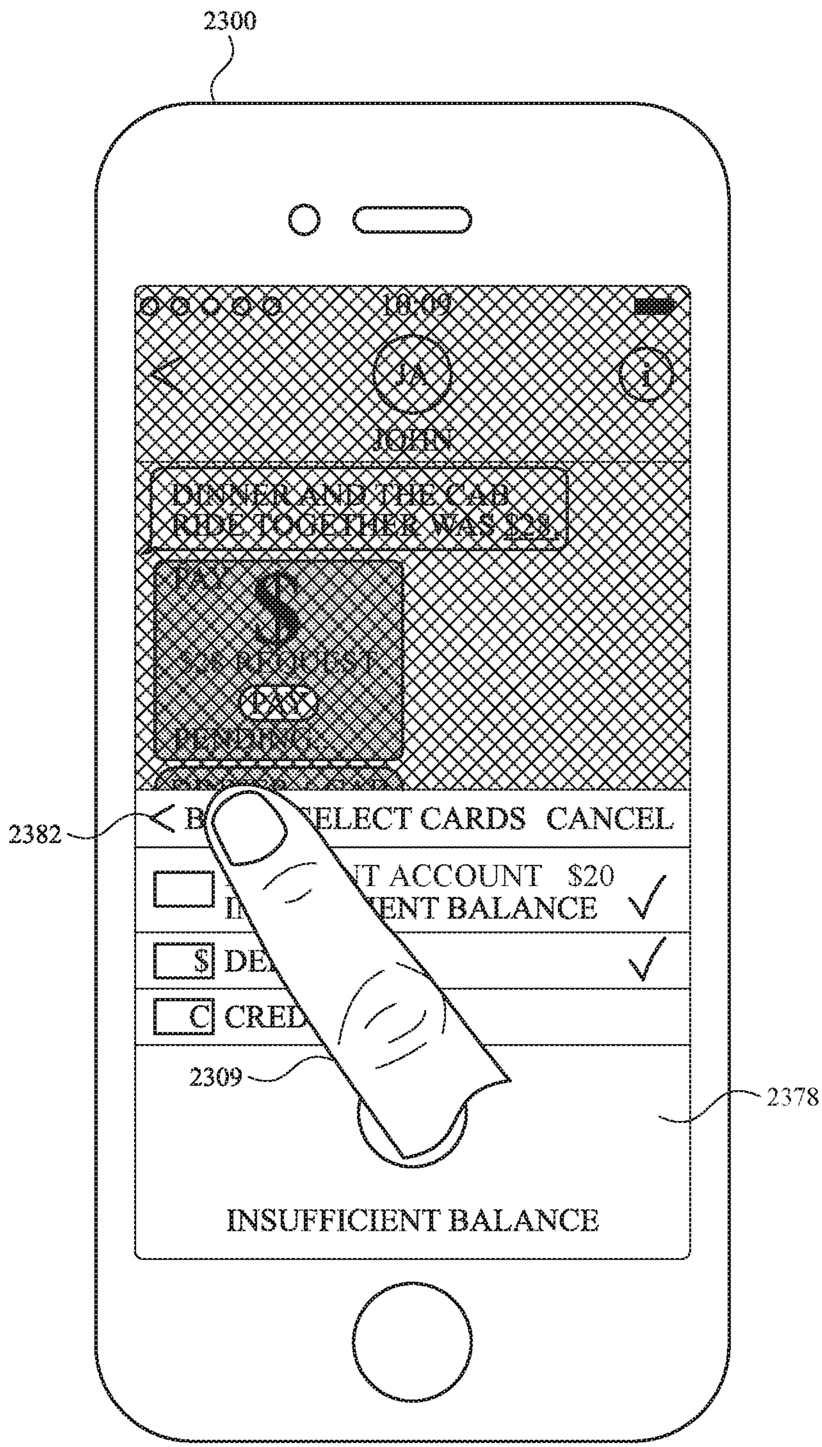

In FIG. 23J, while displaying accounts selection user interface 2378 with both the payment account and the debit card account selected, electronic device 2300 detects user selection of back button 2382 for returning to payment confirmation user interface 2362. For example, as shown in FIG. 23J, the user selection is a tap gesture 2309 on back button 2382.

Figure 23K:
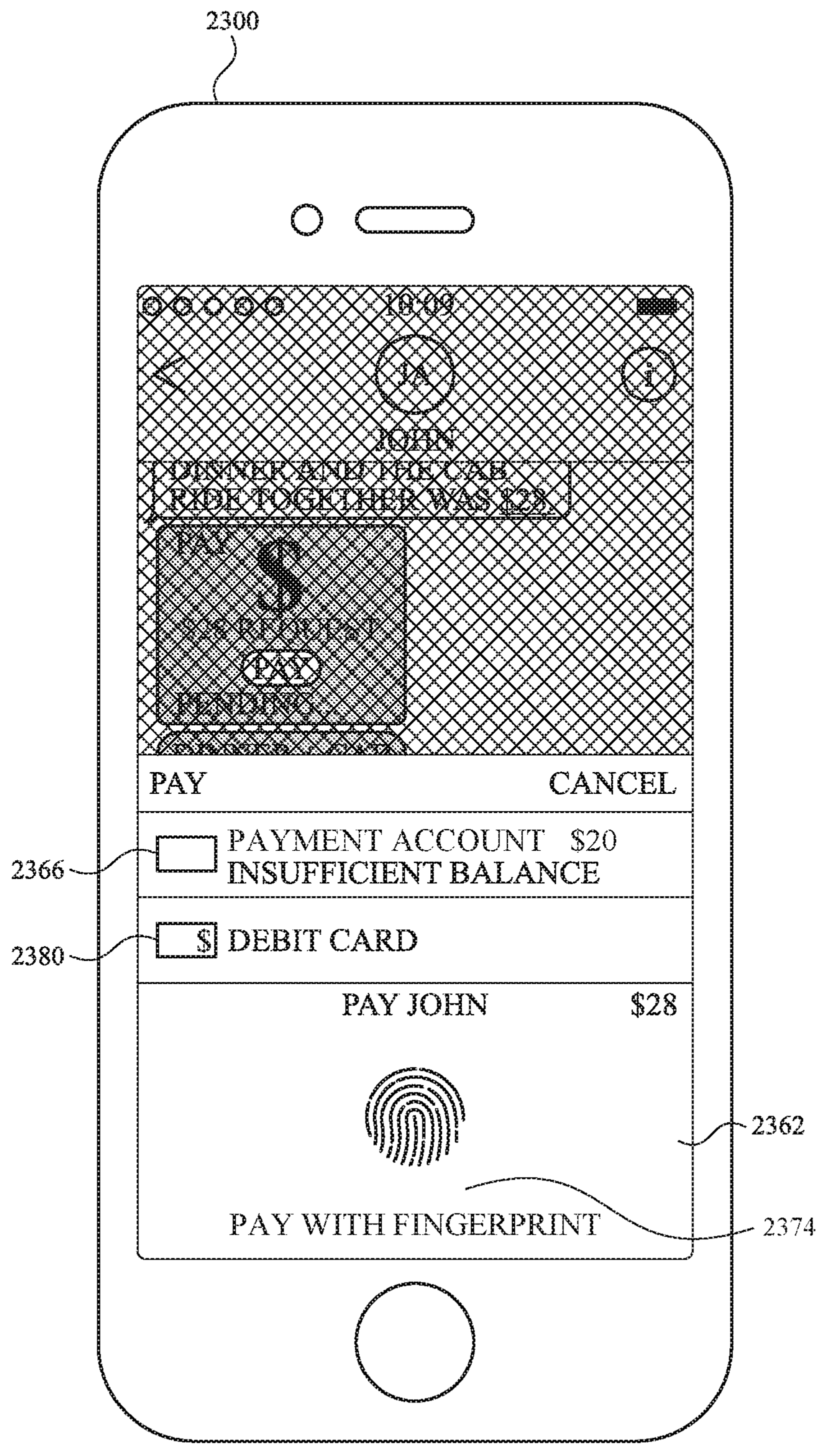

In FIG. 23K, in response to detecting tap gesture 2309, electronic device 2300 again displays (e.g., replaces display of accounts selection user interface 2378 with) payment confirmation user interface 2362. As shown in FIG. 23K, payment confirmation user interface 2362 now displays indication 2366 corresponding to the payment account and indication 2380 corresponding to the debit card account selected by tap gesture 2307. Thus, the user is informed that both the payment account and the debit card account will be (or are authorized to be) used for the transaction. Further, because the debit card account will also be used for the transaction, the transaction can proceed, even though the payment account still has insufficient funds (e.g., $20) to cover the amount of the transaction (e.g., $28) alone. As such, the device ceases to display warning indication 2365 and accounts selection button 2368. Further, the device changes display of indication 2374 to (instead of warning of an insufficient balance) request user authentication information to proceed with the transaction.

In some embodiments, instead of providing the manual accounts selection option using accounts selection user interface 2378 described above with reference to FIGS. 23F-23J, electronic device 2300 automatically selects, in accordance with a determination that the currently-selected account (e.g., the payment account) has insufficient funds, a default back account (e.g., debit card account) as a second account for use in a transaction when the currently-selected account (e.g., the payment account) has insufficient funds. Thus, in some embodiments, in accordance with a determination that the payment account has insufficient funds, instead of or in addition to displaying accounts selection button 2368 providing the user with the option to manually selection a second account for use in the transaction, the device automatically sets (and displays an indication of) the default backup account (e.g., the debit card account) to be used with the payment account in the transaction. In some embodiments, the default backup account is pre-configured by the user (e.g., the user pre-selects an account from a plurality of accounts stored on or provisioned on the device as the default backup account).

Figure 23L:
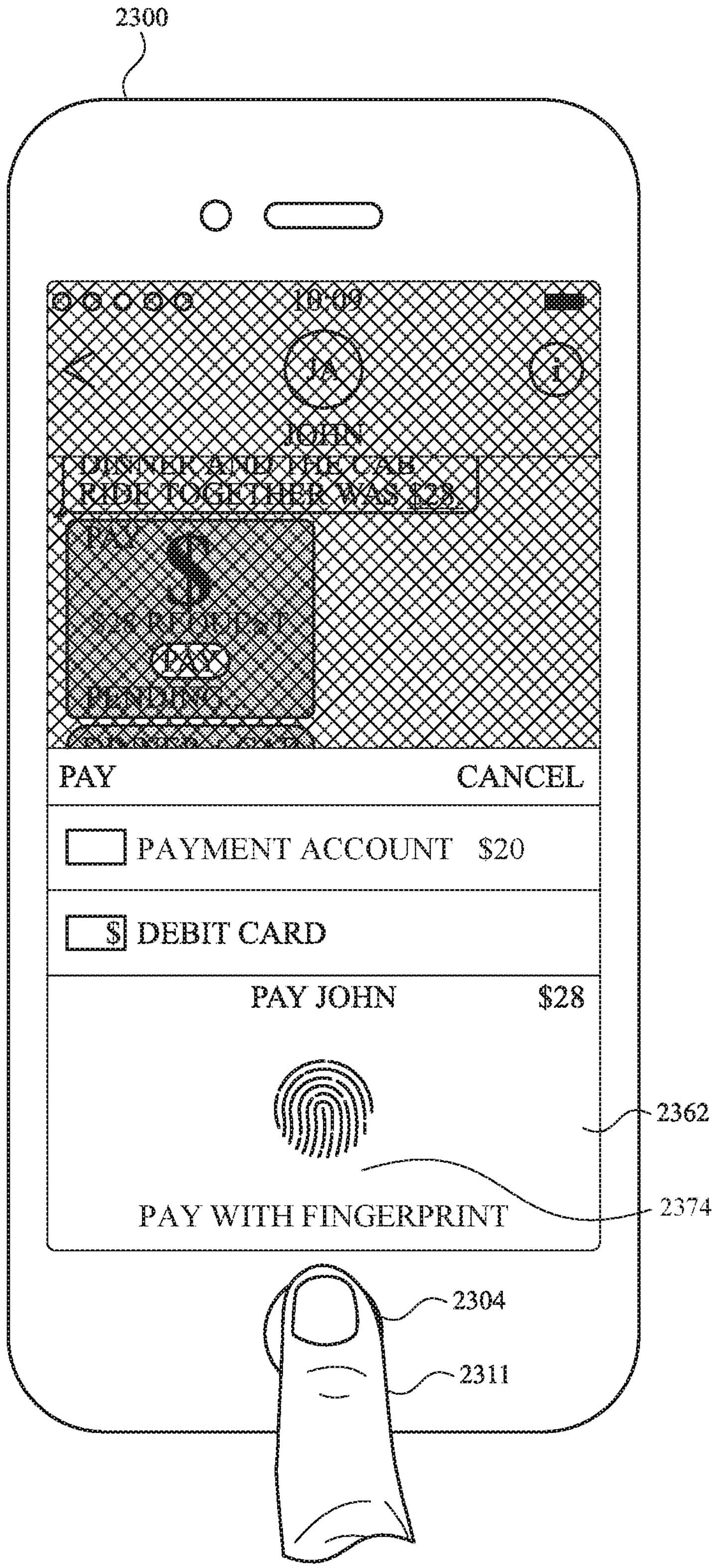

In FIG. 23L, electronic device 2300 receives a user input corresponding to the requested authentication information indicated by indication 2374 (e.g., requesting fingerprint information). For example, as shown in FIG. 23L, the user input is a fingerprint scan input 2311 on a fingerprint sensor (e.g., of mechanical button 2304) of the device.

Figure 23M:
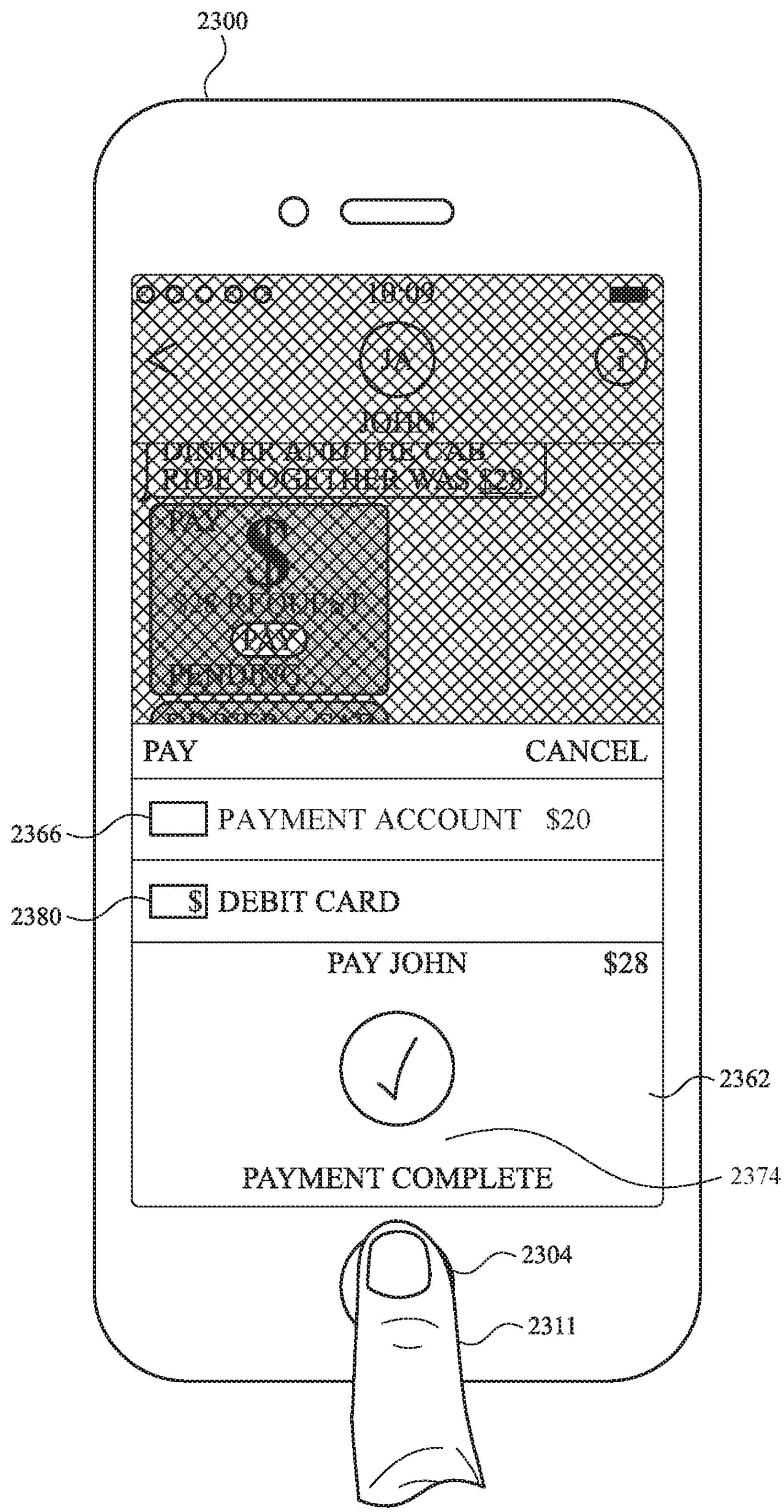

FIG. 23M shows, subsequent to a successful authentication (e.g., because the fingerprint information obtained from fingerprint scan input 2311 on mechanical button 2304 is consistent with enrolled fingerprint information stored on electronic device 2300 for authorizing transactions), the payment (e.g., in the amount of $28) being completed. Thus, in some embodiments, indication 2374 is updated to indicate that the payment is complete (e.g., by stating “Payment Complete” and/or replacing a fingerprint request graphical indication with a checkmark graphical indication).

In response to the successful transaction using both the payment account (corresponding to indication 2366) and the debit card account (corresponding to indication 2380), electronic device 2300 updates display of the balance of the payment account to (from $20) to $0. Because the payment account did not have sufficient funds to alone cover the amount of the payment (of $28), all available funds (of $20) from the payment account was used for the transaction, and the remaining balance (of $8) was paid from the debit card account.

Figure 23N:
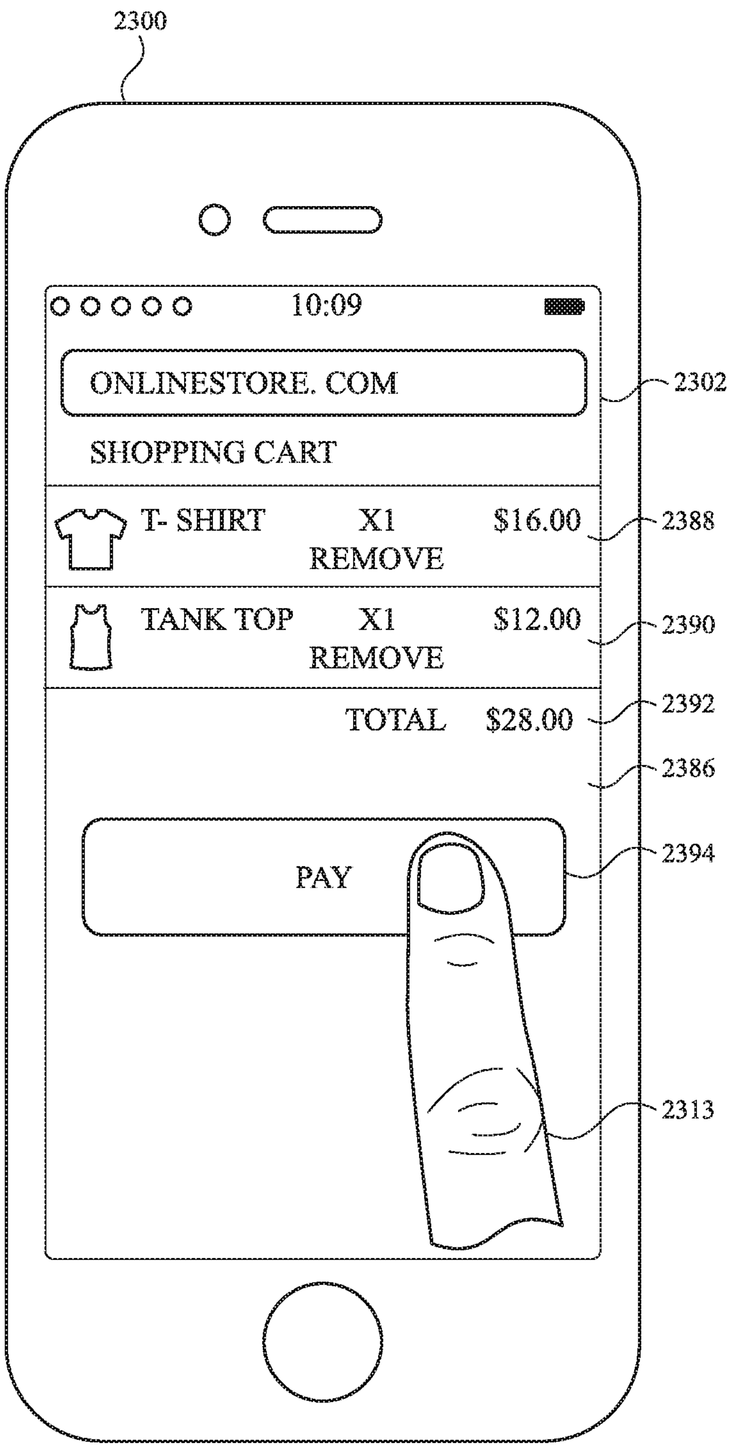

FIG. 23N shows electronic device 2300 displaying, on display 2302, a shopping cart screen 2386 of a third-party online store shown via a third-party application. For example, in FIG. 23N, shopping cart screen 2386 includes a first item 2388 (e.g., a t-shirt) with a price tag of $16.00 and a second item 2390 with a price tag of $12.00. Thus, shopping cart screen 2386 indicates a total cost 2392 of the checkout to be $28.00.

As shown in FIG. 23N, shopping cart screen 2386 also includes a pay button 2394 for proceeding with payment of the items in the shopping cart (e.g., for an amount of $28.00). In FIG. 23N, electronic device 2300 detects user selection (e.g., tap gesture 2313) of pay button 2394 to proceed with the payment.

In FIG. 23O, in response to user tap gesture 2313, electronic device 2300 displays payment confirmation user interface 2362 with both indication 2366 corresponding to the payment account and indication 2380 corresponding to the debit card account automatically (e.g., without user input) shown on the interface. Thus, while the payment account has insufficient funds (e.g., “$20”), the user can still easily proceed with the payment for first item 2388 and second item 2390 (for the amount of $28, as indicated by indication 2372) using both the payment account and the debit card account.

FIGS. 24A-24C are a flow diagram illustrating a method for splitting transfers between two or more accounts using an electronic device in accordance with some embodiments. Method 2400 is performed at a device (e.g., 100, 300, 500, 2200, 2300) with display and one or more input devices (e.g., a touchscreen, a mic, a camera, a biometric sensor). Some operations in method 2400 are, optionally, combined, the orders of some operations are, optionally, changed, and some operations are, optionally, omitted.

As described below, method 2400 provides an intuitive way for managing peer-to-peer transactions. The method reduces the cognitive burden on a user for managing peer-to-peer transactions, thereby creating a more efficient human-machine interface. For battery-operated computing devices, enabling a user to manage peer-to-peer transactions faster and more efficiently conserves power and increases the time between battery charges.

In some examples, prior to receiving the request (e.g., a user input on the electronic device, a signal from an external device) to participate in the transfer of resources (e.g., a transfer of computing resources, a transfer of points, a transfer of credits, a transfer of funds, a transfer of virtual resources) for the requested resource amount using the first resource account, the electronic device (e.g., 2200, 2300) receives (2402) an initiation input (e.g., a user input on the electronic device, a signal from an external device, such as a POS terminal).

In some examples, in response to receiving the initiation input (and, optionally, in accordance with the determination that the requested resource amount is greater than the amount of resources available via the first resource account (e.g., in accordance with a determination that the first resource account does not have sufficient resources to cover the requested resource amount of the resource transfer), and/or in accordance with the determination that the requested resource amount is equal to or less than the amount of resources available via the first resource account), the electronic device (e.g., 2200, 2300) concurrently displays (2404), on the display (e.g., 2202, 2302), a representation (e.g., a graphical representation, a textual representation) of the first resource account (e.g., an account stored in a secure element of the device) and a representation (e.g., a graphical representation, a textual representation) of the second resource account (e.g., a backup resource account, a debit account, a checking account).

In some examples, the electronic device (e.g., 2200, 2300) receives (2406) user input (e.g., 2303, a touch input, a voice input) for proceeding with the transfer of resources.

In some examples, in response to receiving the user input for proceeding with the transfer of resources, the electronic device (e.g., 2200, 2300) displays (2408), on the display (e.g., 2202, 2302), an authentication user interface (e.g., 2226, 2362) requesting authentication information for proceeding with the transfer of resources. Displaying a request for authentication provides the user with visual feedback about the state of the device (state in which authentication is required) and prompts the user to provide the authentication (e.g., through biometric authentication, such as via a fingerprint authentication or facial recognition). Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the representation of the first resource account (e.g., 2330) includes an indication of the amount of funds (e.g., 2332) available via the first resource account. In some examples, the representation of the first resource account (e.g., 2330) and representation of the second resource account (e.g., 2324) are displayed in a list. In some examples, the representation of the first resource account (e.g., 2330) is displayed prior to displaying the representation of the second resource account (e.g., 2324). In some examples, the representation of the first resource account (e.g., 2330) is displayed higher up in the list than the representation of the second resource account (e.g., 2324). In some examples, the representation of the second resource account (e.g., 2324) is displayed before the representation of the first resource account (e.g., 2330) in the list. In some examples, the list is a three-dimensional stack. In some examples, the representations of resource accounts partially overlap each other.

The electronic device (e.g., 2200, 2300) receives (2410) a request (e.g., 2303, a user input on the electronic device, a signal from an external device) to participate in a transfer of resources (e.g., a transfer of computing resources, a transfer of points, a transfer of credits, a transfer of funds, a transfer of virtual resources) for a requested resource amount using a first resource account.

In some examples, the resource is (2412) an amount of funds (e.g., dollars, euros) and the second resource account is a stored-value account (e.g., a debit card account, a checking account) containing stored funds (e.g., stored-value account that is available for use in sending/receiving payments via a messaging app as described in greater detail above with reference to methods 900, 1200, 1500, and 1800.

In some examples, receiving (2410) the request to participate in the transfer of resources includes receiving (2414) authentication information (e.g., biometric information, such as fingerprint information, facial recognition information, voice recognition information, iris/retina scan information, or authentication information that corresponds to a passcode or pattern). In some examples, the device (e.g., 2200, 2300) determines whether the authentication information is consistent with registered authentication information. In some examples, transferring resources includes transmitting credentials. In some examples, in accordance with a determination that the authentication information is consistent with the registered authentication information, a secure element of the electronic device provides (or releases) credentials (e.g., payment information). In some examples, in accordance with a determination that the authentication information is not consistent with the registered authentication information, the secure element forgoes providing (or releasing) credentials (e.g., payment information).

In response (2416) to (or subsequent to) receiving the request to participate in the transfer of resources for the requested resource amount using the first resource account, the electronic device (e.g., 2200, 2300) optionally performs blocks 2418 and 2428.

In accordance with (2418) a determination that the requested resource amount is equal to or less than an amount of resources available via the first resource account (e.g., in accordance with a determination that the first resource account has sufficient resources to cover the requested resource amount of the resource transfer), the electronic device (e.g., 2200, 2300) optionally performs one or more of blocks 2420-2426.

In some examples, the electronic device (e.g., 2200, 2300) displays (2420), on the display (e.g., 2202, 2302), an indication of the amount of resources available via the first resource account (e.g., 2228, 2332), and the electronic device forgoes (2422) displaying a selectable representation (e.g., a graphical representation, a textual representation) of the second resource account. Displaying an indication of available resources from the first resource account (e.g., 2332) without displaying the representation of the second resource account when sufficient resources are available on the first resource account provides the user with visual feedback confirming that the first resource account has sufficient resources (e.g., funds) to fulfill the request and that the second resource account will not be used. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

The electronic device (e.g., 2200, 2300) automatically (e.g., without additional user input) proceeds (2424) with the transfer of resources using only the first resource account (e.g., using the first resource account and without using the second resource account). In some examples, the first resource account is associated with an amount of transferrable resources. Automatically proceeding with the transfer of resources using the appropriate account(s) based the requested resource amount being (or not being) greater than the amount of resources available on a particular account enables the correct account of resources to be transferred without requiring further user input. Performing an operation without requiring further user inputs enhances the operability of the device and makes the user-device interface more efficient, which, additionally, reduces power usage and improves battery life of the device by enabling the user to use the device more quickly and efficiently.

In some examples, subsequent to (or, optionally, in response to) automatically proceeding with the transfer of resource using only the first resource account (and not the second resource account), the electronic device (e.g., 2200, 2300) displays (2426), on the display (e.g., 2202, 2302), a first representation (e.g., 2330, a graphical representation, a textual representation) associated with the first resource account and forgoes displaying a second representation (e.g., 2324) associated with the second resource account.

In accordance with (2428) a determination that the requested resource amount is greater than the amount of resources available via the first resource account (e.g., in accordance with a determination that the first resource account does not have sufficient resources to cover the requested resource amount of the resource transfer), the electronic device (e.g., 2200, 2300) optionally performs one or more of blocks 2430-2434.

In some examples, the electronic device (e.g., 2200, 2300) displays (2430) (e.g., concurrently), on the display (e.g., 2202, 2302), the indication of the amount of resources available via the first resource account (e.g., 2228, 2332) and the selectable representation (e.g., 2324, a graphical representation, a textual representation) of the second resource account (e.g., a backup resource account, a different type of resource account from the first resource account). Displaying an indication of available resources from the first resource account and displaying the representation of the second resource account when sufficient resources are not available on the first resource account provides the user with visual feedback that the first resource account has insufficient resources (e.g., funds) to fulfill the request and that the second resource account will be used. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

The electronic device (e.g., 2200, 2300) automatically (e.g., without user input, without user input after receiving the request to participate in a transfer of resources) proceeds (2432) with the transfer of resources using the first resource account and a second resource account (e.g., a backup resource account) different from the first resource account. In some examples, the second resource account is associated with an amount of transferrable resources. Automatically proceeding with the transfer of resources using the appropriate account(s) based the requested resource amount being (or not being) greater than the amount of resources available on a particular account enables the correct account of resources to be transferred without requiring further user input. Performing an operation without requiring further user inputs enhances the operability of the device and makes the user-device interface more efficient, which, additionally, reduces power usage and improves battery life of the device by enabling the user to use the device more quickly and efficiently.

In some examples, subsequent to (or, optionally, in response to) proceeding (2432) with the transfer of resources using the first resource account and the second resource, (e.g., in accordance with a determination that the first resource account does not have sufficient resources to cover the requested resource amount of the resource transfer), the electronic device (e.g., 2200, 2300) displays (2434) (e.g., concurrently), on the display (e.g., 2202, 2302), a first representation (e.g., a graphical representation, a textual representation) associated with the first resource account (e.g., 2228, 2330) and a second representation associated with the second resource account (e.g., 2236, 2324). In some examples, the device further concurrently displays an amount of the resource transferred using the first resource account and an amount of the resource transferred using the second resource account.

In some examples, prior to proceeding with the transfer of resources (e.g., using only the first resource account or using both the first resource account and the second resource account) (and, optionally, prior to receiving the request to participate in a transfer of resources), the electronic device (e.g., 2200, 2300) displays, on the display (e.g., 2202, 2302), an authentication user interface (e.g., 2226, 2362) requesting authentication information (e.g., biometric information, such as a fingerprint, facial features, iris/retina features, or input information such as a passcode or pattern). Displaying a request for authentication provides the user with visual feedback about the state of the device (state in which authentication is required) and prompts the user to provide the authentication (e.g., through biometric authentication, such as via a fingerprint authentication or facial recognition). Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently. In some examples, the electronic device receives, via the one or more input devices, the authentication information, wherein automatically proceeding with the transfer of resources (e.g., using the first resource account or both the first and second resource accounts) is in accordance with a determination that the received authentication information corresponds to enrolled authentication information (stored on the device) for authorizing transfers. In some examples, in accordance with a determination that the received authentication information does not correspond to the enrolled authentication information for authorizing transfers, the electronic device forgoes proceeding with the transfer of resources (and, optionally, indicating that authorization is required).

In some examples, the resource is an amount of funds (e.g., dollars, euros) and (e.g., a credit card account). In some examples, in response to receiving the request to participate in the transfer of resources for the requested resource amount using the first resource account, and in accordance with a determination that the second resource account is associated with a transaction fee, the electronic device (e.g., 2200, 2300) displays, on the display (e.g., 2202, 2302), an indication that a transaction fee (e.g., a transaction fee for using a credit card account, a percentage (e.g., 2%) of the amount of funds to be transmitted in the transfer) will be added to the transfer. In some examples, in response to receiving the request to participate in the transfer of resources for the requested resource amount using the first resource account, and in accordance with a determination that the second resource account is not associated with a transaction fee, the electronic device forgoes displaying, on the display, the indication that a transaction fee (e.g., a transaction fee for using a credit card account, a percentage (e.g., 2%) of the amount of funds to be transmitted in the transfer) will be added to the transfer.

In some examples, in accordance with proceeding with the transfer of resources using the second account (e.g., not using the first account, using both the first account and the second account), the electronic device (e.g., 2200, 2300) applies a first charge (e.g., a charge made to the second resource account, which is a credit account) in a first amount to the second resource account, wherein the first amount includes the transaction fee. In some examples, the transfer of funds only uses the second resource account and the total amount charged to the second resource account is the sum of the amount of funds transmitted and the transaction fee. In some examples, the transfer of funds uses the second resource account and one or more accounts (e.g., the first account), and the total amount charged to the second resource account is the sum of the amount of funds transmitted using the second resource account and the transaction fee. In some examples, the transaction fee is based on (e.g., a percent of) the amount transmitted using the second resource amount. In some examples, the transaction fee is a flat fee. In some examples, the transaction fee is a combined percentage and flat fee.

In some examples, receiving the request to participate in the transfer of resources includes receiving a sequence of one or more inputs from the user to transmit the resources to another participant (e.g., 2210, 2310) in a message conversation (e.g., 2208, 2308).

In some examples, receiving the request to participate in the transfer of resources includes receiving information from an external source with information about a transaction and receiving a sequence of one or more inputs from the user to transmit resources selected based on the information from the external source.

In some examples, receiving the request to participate in the transfer of resources includes receiving a sequence of one or more inputs from the user that authorizes transmission of restricted credentials to a nearby device via a short range wireless communication.

In some examples, proceeding with the transfer of resources using the first resource account and the second resource account is in accordance with a determination that a split account option (e.g., a user setting for enabling/disabling automatic transfer of resources using two or more different resource accounts) is enabled on the device. In some examples, the default state is that the split account option is enabled on the device. In some examples, in accordance with a determination that a split account option is not enabled on the device, the electronic device (e.g., 2200, 2300) displays, on the display (e.g., 2202, 2302), a notification (e.g., a pop-up notification, a prompt) that the requested resource amount is greater than the amount of resources available via the first resource account (e.g., that the first resource account does not have sufficient resources to cover the requested resource amount of the resource transfer). In some examples, when the split account option is not enabled on the device, the electronic device forgoes proceeding with the transfer of resources using the first resource account and the second resource account, and, optionally, proceeds with the transfer of resource using the second resource account (and not using the first resource account).

In some examples, prior to receiving the request to participate in the transfer of resources, the electronic device (e.g., 2200, 2300) receives one or more inputs selecting a different (e.g., third) resource account for use in the transfer. When the device receives the request to participate in the transfer, the device uses the selected (e.g., the different, third) resource account for use in the transfer rather than the first resource account. In some examples, the electronic device displays, on the display (e.g., 2202, 2302), a selectable representation (e.g., a graphical representation, a textual representation) of the second (or third) resource account (e.g., a backup resource account, a different type of resource account from the first resource account). In some examples, the electronic device receives user selection of the selectable representation of the second (or third) resource account. In response to receiving the user selection of the selectable representation of the second resource account, the electronic device selects the second (or third) resource account for use in the transfer (e.g., without using the first resource account in the transfer).

In some examples, prior to receiving the request to participate in the transfer of resources for the requested resource amount using the first resource account, the electronic device (e.g., 2200, 2300) displays, on the display (e.g., 2202, 2302), message conversation (e.g., 2208, 2308) of a messaging application (e.g., 2206, 2306) between a plurality of participants (e.g., the user of the device and a contact of the user, 2210, 2310). In some examples, the initiation input corresponds to user selection of a resource message object (e.g., a message bubble having an indication of the requested resource amount, an email message having an indication of the requested resource amount) received from a first participant of the message conversation. In some examples, the request to participate in the transfer of resources is received while displaying, on the display (e.g., 2202, 2302), the message conversation (e.g., 2208, 2308) of the messaging application (e.g., 2206, 2306) between a plurality of participants, and wherein the initiation input corresponds to user selection (e.g., tap input on a touch-screen display) of a resource message object (e.g., a message bubble having an indication of the requested resource amount, an email message having an indication of the requested resource amount). In response to detecting the initiation input (e.g., in response to detecting the user selection (e.g., activation) of the resource message object or in response to selection of a payment send affordance in a payment creation interface), the electronic device concurrently displays, on the display (e.g., 2202, 2302), a representation (e.g., 2366, a graphical representation, a textual representation) of the first resource account (e.g., an account stored in a secure element of the device) and a representation (e.g., 2380, a graphical representation, a textual representation) of the second resource account (e.g., a backup resource account, a debit account, a checking account). In some examples, the electronic device displays, on the display (e.g., 2202, 2302), a transfer user interface (e.g., a resource-numerical value selection user interface for receiving user adjustment of the amount of resources, such as points, resources, or funds), wherein the transfer user interface includes an indication (e.g., a list that includes a representation of the first resource account and a representation of the second resource account) that resources from the first resource account and the second resource account will be used for the transfer. In some examples, the representation of the first resource account is a graphical representation of the account, such as a thumbnail image of a card associated with the account. In some examples, the representation of the first resource account is a textual representation of the account, such as an identification number (e.g., identification number, card number) associated with the account. In some examples, the representation of the second resource account is a graphical representation of the account, such as a thumbnail image of a card associated with the account. In some examples, the representation of the second resource account is a textual representation of the account, such as an identification number (e.g., identification number, card number) associated with the account. In some examples, the message conversation is concurrently displayed with the representations of the resource accounts.

In some examples, concurrently displaying, on the display (e.g., 2202, 2302), the representation (e.g., 2330, 2366, a graphical representation, a textual representation) of the first resource account (e.g., an account stored in a secure element of the device) and the representation (e.g., 2324, 2380, a graphical representation, a textual representation) of the second resource account includes displaying a transaction detail region that also includes additional information about the transaction (e.g., a total price, shipping information, tax, etc.) and instructions for providing authorization information (e.g., a passcode or a biometric authorization such as a fingerprint or face) to authorize participation in the transaction.

Note that details of the processes described above with respect to method 2400 (e.g., FIGS. 24A-24C) are also applicable in an analogous manner to the methods described herein. For example, method 2400 optionally includes one or more of the characteristics of the various methods described herein with reference to methods 900, 1200, 1500, 1800, 2100, 2700, 3000, and 3400. For example, displaying a transfer user interface for initiating transfer of a first type of item (e.g., a photo, stickers, resources, payments) between participants as described in method 900 can apply when adjusting the transfer amount to send using both the first resource account and the second resource account. For another example, the outputting of feedback, as described in method 1200, can be applied to a transfer message object made using resources from both the first resource account and the second resource account via a messaging application (e.g., 2206, 2306). For another example, the different visual appearances of a message object based on whether the message object corresponds to a transmission message or a request message, as described in method 1500, can be applied to a transfer message object made using resources from both the first resource account and the second resource account via a messaging application (e.g., 2206, 2306). For another example, a request for activating an account that is authorized to obtain one or items (e.g., a sticker, a photo, resources, a payment), as described in method 1800, can be applied when setting up the first resource account. For another example, switching the account to be used in a resource transfer based on an indication that resources are insufficient in the currently-selected account, as described in method 2100, can be used when proceeding with a transfer using a single account that is not the first resource account when the first resource account has insufficient resources. For another example, the plurality of items including information from messages in a message conversation, as described in method 2700, can include information associated with the first resource account and from the second resource account. For another example, an utterance can be used, as described in method 3000, to initiate a transfer (e.g., initiate a payment) using both the first resource account and the second resource account. For another example, a visual effect (e.g., a coloring effect, a geometric alteration effect) can be applied, as described in method 3400, to one or more elements (e.g., one or more user interface objects on a surface of a graphical representation of an account, one or more patterns) of a graphical representation (e.g., 2330) of a payment account when the payment account is ready to be used in a transfer (e.g., of a resource, of a file, of a payment) and/or when a transfer (e.g., of a resource, of a file, of a payment) using with the payment account is completed. For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 24A-24C are, optionally, implemented by components depicted in FIGS. 1A-1B. For example, receiving operation 2410, proceeding operation 2424, and proceeding operation 2432 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 25A-25C illustrate example user interfaces for managing peer-to-peer transfers, in accordance with some embodiments. As described in greater detail below, the non-limiting example embodiment of the user interfaces illustrated in FIGS. 25A-25C relate to the non-limited example embodiment of the user interfaces illustrated in FIGS. 26A-26T.

FIG. 25A illustrates an electronic device 2500 (e.g., portable multifunction device 100, device 300, or device 500). In the non-limiting example embodiment illustrated in FIGS. 25A-25C, electronic device 2500 is a smartphone. In other embodiments, electronic device 2500 can be a different type of electronic device, such as a wearable device (e.g., a smartwatch). Electronic device 2500 has a display 2502 and, optionally, one or more input devices (e.g., a touchscreen of display 2502, a mechanical button 2505, a mic).

In FIG. 25A, electronic device 2500 displays, on display 2502, a message conversation 2508 of a messaging application 2506 between a user of the device (e.g., "Kate Appleseed") and a message participant 2510 (e.g., "John Appleseed"). In some embodiments, message participant 2510 is a contact stored on the device. In some embodiments, message participant 2510 is a contact of a contact list associated with the user account logged onto the device. In some embodiments, message participant 2510 is a contact included in a trusted contacts list associated with the user account logged onto the device.

In some embodiments, electronic device 2500 also displays, on display 2502, a virtual keyboard 2512 (e.g., an alphanumeric keyboard for typing a message) and a compose bar 2514 displaying the text of a message as a message is typed using virtual keyboard 2512. In some embodiments, a mechanical keyboard can be used in addition to or alternatively to virtual keyboard 2512 to type a message. In some embodiments, compose bar 2514 can expand (e.g., expand upwards) to accommodate a longer message or message object (e.g., an image, an emoticon, a special type of message object, such as a payment object). In some embodiments, compose bar 2514 includes a mic button 2516 which, when activated, enables the user to enter a message using voice input.

As shown in FIG. 25A, message conversation 2508 includes a message object 2518 corresponding to a message sent by the user to message participant 2510. In the message corresponding to message object 2518, the user asks message participant 2510: "Can you send me the video from last night?" As also shown in FIG. 25A, message conversation 2508 includes a transfer message object 2520 sent by message participant 2510 to the user. Transfer message object 2520 corresponds to a transmission of a file (e.g., a video file) that is requested by the user in the message corresponding to message object 2518.

In some embodiments, as shown in FIG. 25A, transfer message object 2520 includes an attachment object 2522 corresponding to a file (e.g., a video file) that is being transmitted via transfer message object 2520. For example, in FIG. 25A, the file is a video file, and thus attachment object 2522 corresponds to a video file. In some embodiments, as also shown in FIG. 25A, transfer message object 2520 also includes a status indicator 2524 (e.g., stating "PENDING") informing the user that the file (e.g., the video file corresponding to attachment object 2522) has not yet been accepted (e.g., viewed or downloaded) by the user.

In FIG. 25B, electronic device 2500 displays, on display 2502, a message conversation 2509 (different form message conversation 2508) of messaging application 2506 between the user of the device (e.g., "Kate Appleseed") and a message participant 2530 (e.g., "Sarah James"). In some embodiments, message participant 2530 is a contact stored on the device. In some embodiments, message participant 2530 is a contact of a contact list associated with the user account logged onto the device. In some embodiments, message participant 2530 is a contact included in a trusted contacts list associated with the user account logged onto the device.

As shown in FIG. 25B, message conversation 2509 includes a message object 2532 corresponding to a message sent by message participant 2530 to the user. In the message corresponding to message object 2532, message participant 2530 states to the user: "Last night was fun!" As also shown in FIG. 25B, message conversation 2509 includes a transfer message object 2534 sent by the user to message participant 2530. Transfer message object 2534 corresponds to a request for transfer of photos (e.g., 5 photos) from the time period (e.g., last night) mentioned by message participant 2530 in the message corresponding to message object 2532).

In some embodiments, transfer message object 2534 includes a request indicator 2535 (e.g., a symbol "#") indicating to the user that the message object corresponds to a request for a transfer of files (e.g., photos). In some embodiments, transfer message object 2534 also includes a textual indication 2536 (e.g., stating "5 photos from last night request") indicating a number (e.g., "5") of the files (e.g., photos) being requested to be transferred and a description (e.g., "from last night") of the specific type of files that are being requested to be transferred. In some embodiments, transfer message object 2534 also includes a status indicator 2538 (e.g., stating "PENDING") informing the user that the request for transfer has not yet been accepted by message participant 2530.

In FIG. 25C, electronic device 2500 displays, on display 2502, an attachments detail user interface 2540 that includes details associated sent, received, and/or requested attachments using messaging application 2506 with various contacts. In some embodiments, attachments detail user interface 2540 includes a graphical representation 2542 of a user account logged onto the device and associated with the sent, received, and/or requested attachments using messaging application 2506.

In some embodiments, attachments detail user interface 2540 includes a plurality of attachment detail items, each corresponding to an attachment (e.g., a photo, a video file, an audio file, a document) sent to, received from, or requested to/requested by a contact associated with the user account logged onto electronic device 2500. In some embodiments, attachments detail user interface 2540 includes one or more incoming items 2550 corresponding to incoming (i.e., received) attachments and/or incoming requests for transmission of an attachment. For example, in FIG. 25C, incoming items 2550 include a first incoming item 2552 of a video file corresponding to the video file associated with transfer message object 2520 received from message participant 2510 (e.g., "John Appleseed"), as shown in FIG. 25A. In some embodiments, first incoming item 2552 includes an indication 2552A (e.g., stating "John Appleseed") of the contact associated with the item and a selectable indication 2552B of the attachment (e.g., the video file corresponding to attachment object 2522) which, when selected, causes the device to display a details screen that includes details about the attachment corresponding to the video file corresponding to attachment object 2522.

In some embodiments, attachments detail user interface 2540 includes one or more outgoing items 2554 corresponding to outgoing (i.e., transmitted) attachments and/or outgoing requests for transmission of an attachment. For example, in FIG. 25C, outgoing items 2554 include a first outgoing item 2556 of a pending request for photos corresponding to the request for "5 photos from last night" associated with transfer message object 2534 sent to message participant 2530 (e.g., "Sarah James"), as shown in FIG. 25B. In some embodiments, first outgoing item 2556 includes an indication 2556A (e.g., stating "Sarah James") of the contact associated with the item and a selectable indication 2556B of the request for attachments (e.g., the "5 photos from last night") which, when selected, causes the device to display a details screen that includes details about the pending request for the photos corresponding to the transfer message object 2534.

In some embodiments, attachments detail user interface 2540 includes one or more today items 2558 corresponding to incoming and/or outgoing attachments and/or requests for transmission of an attachment from the current day. For example, in FIG. 25C, today items 2558 include a first today item 2560 corresponding to an attachment of 4 photos (e.g., as indicated by note indication 2560B stating "Team Photos" and selectable indication 2560C) sent to a different message participant (e.g., "Matthew Smith," as indicated by indication 2560A) and a second today item 2562 corresponding to an attachment of a birthday video (e.g., as indicated by note indication 2562B stating "Happy Birthday" and selectable indication 2562C) sent to message participant 2510 (e.g., as indicated by indication 2562B), where the video file corresponding to second today item 2562 is different from the video file corresponding to first incoming item 2552 (which in turn corresponds to transfer message object 2520).

As mentioned above, the non-limiting example embodiment of the user interfaces illustrated in FIGS. 25A-25C described above relate to the non-limited example embodiment of the user interfaces illustrated in FIGS. 26A-26T described below. Therefore, it is to be understood that the processes described above with respect to the example user interfaces illustrated in FIGS. 25A-25C and the processes described below with respect to the example user interfaces illustrated in FIGS. 26A-26T are largely analogous processes that similarly involve initiating and managing transfers using an electronic device (e.g., 100, 300, 500, 2500, or 2600).

FIGS. 26A-26T illustrate example user interfaces for generating and displaying a transfers history list, in accordance with some embodiments. The user interfaces in these figures are used to illustrate the processes described below, including the processes in FIGS. 27A-27E.

FIG. 26A illustrates an electronic device 2600 (e.g., portable multifunction device 100, device 300, or device 500). In the non-limiting example embodiment illustrated in FIGS. 26A-26T, electronic device 2600 is a smartphone. In other embodiments, electronic device 2600 can be a different type of electronic device, such as a wearable device (e.g., a smartwatch). Electronic device 2600 has a display 2602.

In FIG. 26A, electronic device 2600 displays, on display 2602, a message conversation 2608 of a messaging application 2606 between a user of the device (e.g., "Kate Appleseed") and a message participant 2610 (e.g., "John Appleseed"). In some embodiments, message participant 2610 is a contact stored on the device. In some embodiments, message participant 2610 is a contact of a contact list associated with the user account logged onto the device. In some embodiments, message participant 2610 is a contact included in a trusted contacts list associated with the user account logged onto the device.

In some embodiments, electronic device 2600 also displays, on display 2602, a virtual keyboard 2612 (e.g., an alphanumeric keyboard for typing a message) and a compose bar 2614 displaying the text of a message as a message is typed using virtual keyboard 2612. In some embodiments, a mechanical keyboard can be used in addition to or alternatively to virtual keyboard 2612 to type a message. In some embodiments, compose bar 2614 can expand (e.g., expand upwards) to accommodate a longer message or message object (e.g., an image, an emoticon, a special type of message object, such as a payment object). In some embodiments, compose bar 2614 includes a mic button 2614A which, when activated, enables the user to enter a message using voice input.

As shown in FIG. 26A, message conversation 2608 includes a message object 2616 corresponding to a message sent by message participant 2610 to the user. In message object 2616, message participant 2610 states to the user: "Dinner and the cab ride together was $28." As also shown in FIG. 26A, message conversation 2608 includes a follow-up payment message object 2618 sent by message participant 2610 to the user. Payment message object 2618 (e.g., corresponding to a payment message object associated with a payment request received by the user, as described above with reference to, for example, payment message object 1490 in FIG. 14L) corresponds to a payment request (e.g., of $28 for the dinner and the cab ride indicated in the message corresponding to message object 2616). In some embodiments, as shown in FIG. 26A, payment message object 2618 (associated with a payment request received by the user) includes a mode indication 2620 (e.g., stating "PAY") indicating to the user that the payment message object corresponds to a payment request (or payment) made via an operating system-controlled payment transfer application (and not by a third-party application). As shown in FIG. 26A, payment message object 2618 also includes an amount indication 2622 informing the recipient (e.g., the user) of the amount of the requested payment (e.g., "$28") and a further indication (e.g., "$28 Request") that the payment message object corresponds to a request for payment. In some embodiments, as shown in FIG. 26A, payment message object 2618 also includes an accept button 2624 for accepting the payment request (e.g., for agreeing to make the requested payment and proceed with making the requested payment). In some embodiments, as shown in FIG. 26A, payment message object 2618 also includes a status indicator 2626 informing the user of a status of the payment request corresponding to the payment message object (e.g., "pending," "paid," "accepted," "expired," etc.). For example, in FIG. 26A, status indicator 2626 shows "pending," thus indicating to the user that the payment request associated with payment message object 2618 has not yet been accepted by the user. In some embodiments, as shown in FIG. 26A, message conversation 2608 includes a note message object 2628 that accompanies the payment message object (e.g., stating "Dinner+Cab") corresponding to a note (e.g., a comment, a message) related to the payment request.

Figure 26B:
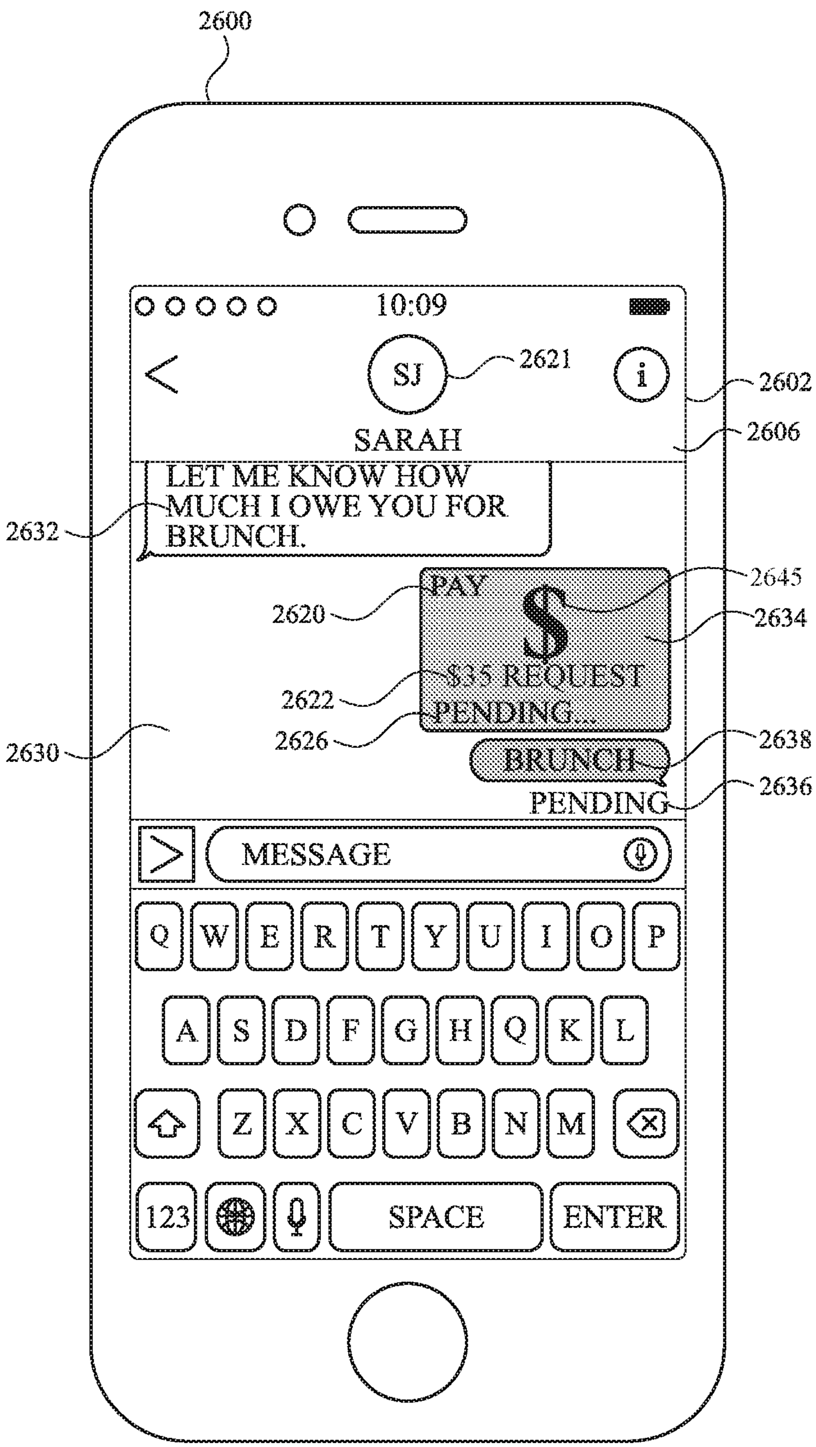

In FIG. 26B, electronic device 2600 displays, on display 2602, a message conversation 2630 (different form message conversation 2608) of messaging application 2606 between the user of the device (e.g., "Kate Appleseed") and a message participant 2621 (e.g., "Sarah James"). In some embodiments, message participant 2621 is a contact stored on the device. In some embodiments, message participant 2621 is a contact of a contact list associated with the user account logged onto the device. In some embodiments, message participant 2621 is a contact included in a trusted contacts list associated with the user account logged onto the device.

As shown in FIG. 26B, message conversation 2630 includes a message object 2632 corresponding to a message sent by message participant 2621 to the user. In message object 2632, message participant 2621 states to the user: "Let me know how much I owe you for brunch." As also shown in FIG. 26B, message conversation 2630 includes a payment message object 2634 sent by the user to message participant 2621. Payment message object 2634 (e.g., corresponding to a payment message object associated with a payment request made by the user, as described above with reference to, for example, payment message object 1460 in FIGS. 14G-14K) corresponds to a payment request (e.g., of $35 for the brunch indicated in the message corresponding to message object 2632). In some embodiments, as shown in FIG. 26B, payment message object 2634 (associated with a payment request made by the user) includes mode indication 2620 (e.g., stating "PAY") indicating to the user that the payment message object corresponds to a payment request (or payment) made via an operating system-controlled payment transfer application (and not by a third-party application). As shown in FIG. 26B, payment message object 2634 also includes amount indication 2622 informing the recipient (e.g., message participant 2621) of the amount of the requested payment (e.g., "$35") and a further indication (e.g., "$35 Request") that the payment message object corresponds to a request for payment. In some embodiments, as shown in FIG. 26B, payment message object 2634 also includes a first status indicator 2626 informing the user of a status of the payment request corresponding to the payment message object (e.g., "pending," "paid," "accepted," "expired," etc.). For example, in FIG. 26B, status indicator 2626 shows "pending," thus indicating to the user that the payment request associated with payment message object 2634 has not yet been accepted by message participant 2621. In some embodiments, as shown in FIG. 26B, payment message object 2634 also includes (in addition to or instead of first status indicator 2626), a second status indicator 2636 informing the user of the status of the payment corresponding to the sent payment message object (e.g., "pending," "paid," "accepted," "expired," etc.). For example, in FIG. 26B, second status indicator 2636 (e.g., "pending") shows the same status as shown by first status indicator 2626 (e.g., "pending"). In some embodiments, as shown in FIG. 26B, message conversation 2630 includes a note message object 2638 that accompanies the payment message object (e.g., stating "Brunch") corresponding to a note (e.g., a comment, a message) related to the payment request.

Figure 26C:
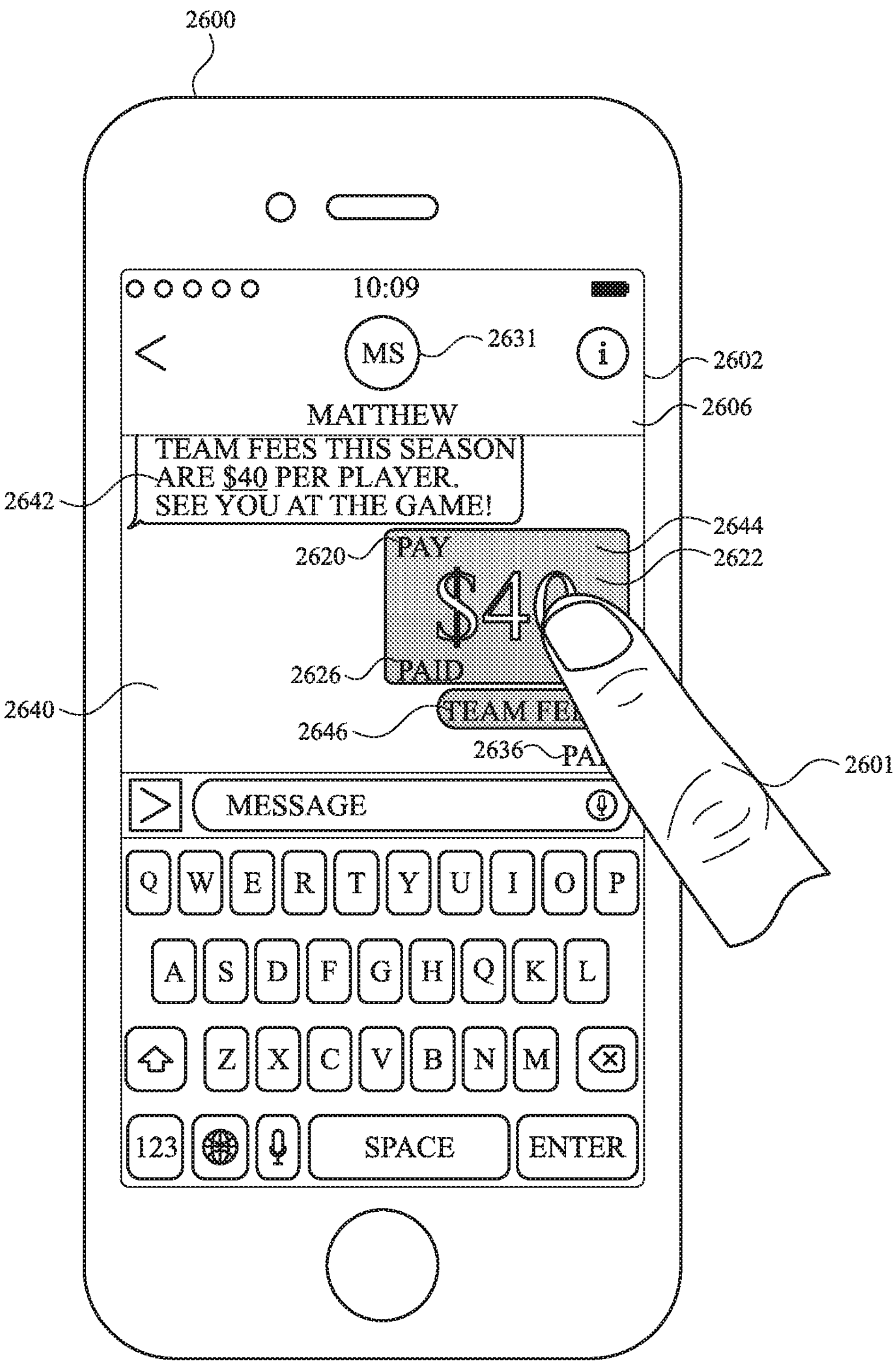

In FIG. 26C, electronic device 2600 displays, on display 2602, a message conversation 2640 (different from message conversations 2608 and 2630) of messaging application 2606 between the user of the device (e.g., "Kate Appleseed") and a message participant 2631 (e.g., "Matthew Smith"). In some embodiments, message participant 2631 is a contact stored on the device. In some embodiments, message participant 2631 is a contact of a contact list associated with the user account logged onto the device. In some embodiments, message participant 2631 is a contact included in a trusted contacts list associated with the user account logged onto the device.

As shown in FIG. 26C, message conversation 2640 includes a message object 2642 corresponding to a message sent by message participant 2642 to the user. In message object 2642, message participant 2642 states to the user: "Team fees this season are $40 per player. See you at the game!" As also shown in FIG. 26C, message conversation 2640 includes a payment message object 2644 sent by the user to message participant 2631. Payment message object 2644 (e.g., corresponding to a payment message object associated with a payment made by the user, as described above with reference to, for example, payment message object 1420 in FIGS. 14B-14F) corresponds to a payment (e.g., of $40 for the team fees indicated in the message corresponding to message object 2642). In some embodiments, as shown in FIG. 26C, payment message object 2644 (associated with a payment made by the user) includes mode indication 2620 (e.g., stating "PAY") indicating to the user that the payment message object corresponds to a payment request (or payment) made via an operating system-controlled payment transfer application (and not by a third-party application). As shown in FIG. 26C, payment message object 2644 also includes amount indication 2622 informing the recipient (e.g., message participant 2631) of the amount of the made payment (e.g., "$40"). In some embodiments, as shown in FIG. 26C, payment message object 2644 also includes a first status indicator 2626 informing the user of a status of the payment corresponding to the payment message object (e.g., "pending," "paid," "accepted," "expired," etc.). For example, in FIG. 26C, first status indicator 2626 shows "paid," thus indicating to the user that the payment request associated with payment message object 2644 has been accepted by message participant 2631. In some embodiments, as shown in FIG. 26C, payment message object 2644 also includes (in addition to or instead of first status indicator 2626), a second status indicator 2636 informing the user of the status of the payment corresponding to the payment message object (e.g., "pending," "paid," "accepted," "expired," etc.). For example, in FIG. 26C, second status indicator 2636 (e.g., "paid") shows the same status as shown by first status indicator 2626 (e.g., "paid"). In some embodiments, as shown in FIG. 26C, message conversation 2640 includes a note message object 2646 that accompanies the payment message object (e.g., stating "Team Fees") corresponding to a note (e.g., a comment, a message) related to the payment.

In FIG. 26C, while displaying message conversation 2640 with message participant 2631, electronic device 2600 detects user selection of payment message object 2644. For example, as shown in FIG. 26C, the user selection is a tap gesture 2601 on payment message object 2644.

Figure 26D:
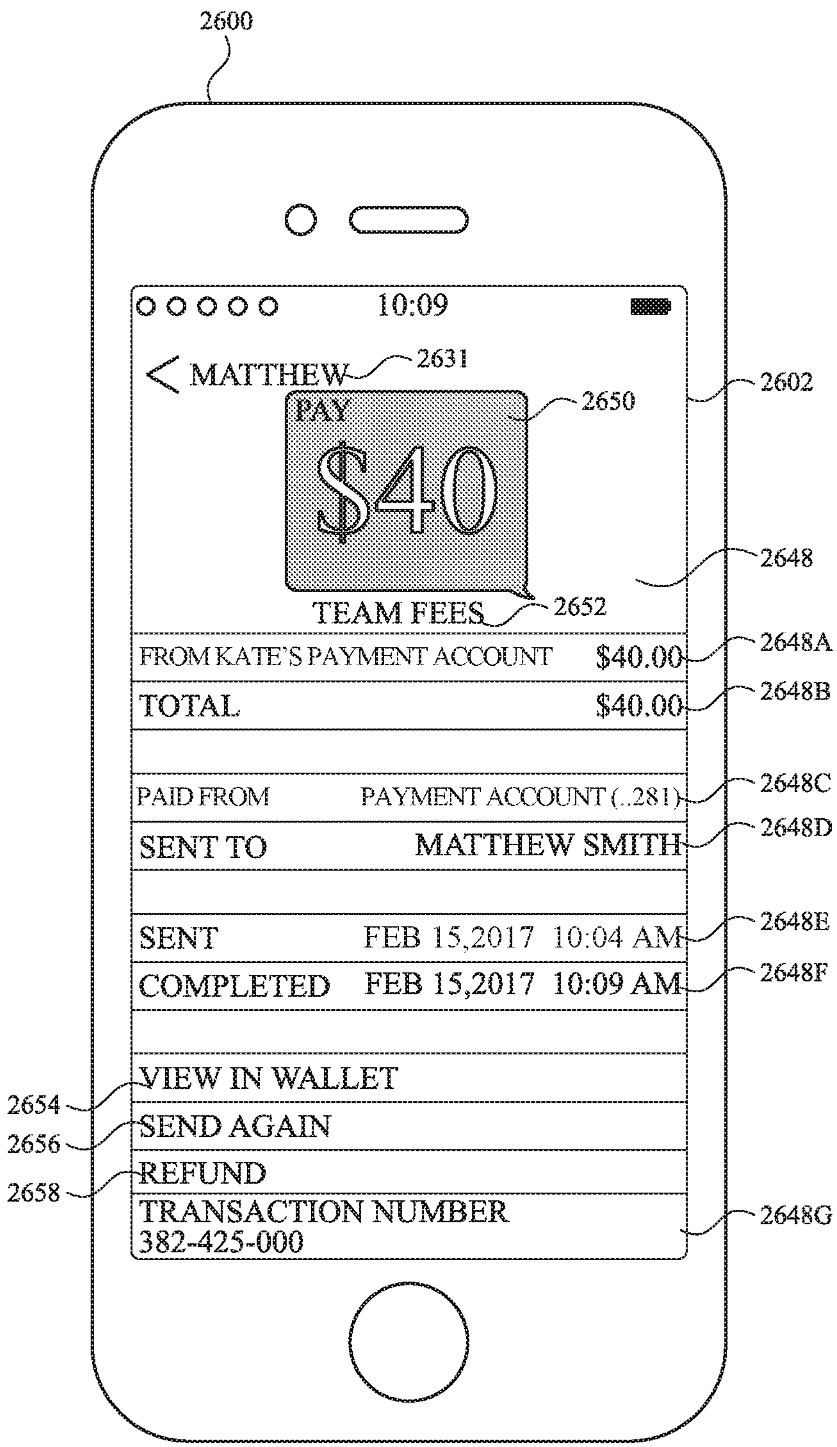

In FIG. 26D, in response to detecting tap gesture 2601 on payment message object 2644, electronic device 2600 displays, on display 2602, a transaction detail user interface 2648 that includes transactions details associated with the payment (or payment request) corresponding to the selected payment message object (e.g., payment message object 2644). In some embodiments, transaction detail user interface 2648 includes a payment message object image 2650 corresponding to the selected payment message object (e.g., payment message object 2644). In some embodiments, transaction detail user interface 2648 includes an indication 2652 of the note (e.g., stating "Team Fees") corresponding to note message object 2646. In some embodiments, transaction detail user interface 2648 includes a plurality of transaction details 2648A-G related to the payment made via payment message object 2644. For example, transaction detail user interface 2648 includes an indication 2648A of the payment account (e.g., "From Kate's Payment account") used in the transaction and the amount (e.g., "$40") that was withdrawn from the used account and an indication 2648B of the total amount (e.g., "$40") of the transaction. For another example, transaction detail user interface 2648 includes in indication 2648C of the account details (e.g., account number) of the used account (e.g., Kate's payment account). For another example, transaction detail user interface 2648 includes an indication 2648D of the recipient (e.g., message participant 2631, "Matthew Smith") of the payment. For another example, transaction detail user interface 2648 includes an indication 2648E of the date and time when the payment was sent (by the user) and an indication 2648F of the date and time when the payment was accepted (by the recipient, message participant 2631). For another example, transaction detail user interface 2648 includes an indication 2648G of the transaction number.

In some embodiments, as shown in FIG. 26D, transaction detail user interface 2648 includes a wallet button 2654 for viewing the transaction details in a wallet application (e.g., corresponding to wallet user interface 2022 described above with reference to FIGS. 20A-20J). In some embodiments, as shown in FIG. 26D, transaction detail user interface 2648 includes send again button 2656 for sending a new payment with corresponding payment details (e.g., the same amount, the same intended recipient, from the same payment account) of the currently-shown payment. In some embodiments, as shown in FIG. 26D, transaction detail user interface 2648 includes a refund button 2658 for requesting a return of the payment corresponding to the currently-shown transaction details page. In some embodiments, a refund can be requested for a completed transaction (where the recipient has accepted the payment) but not for a pending transaction. Thus, in some embodiments, if the payment corresponds to a pending transaction (and not to a completed transaction), a refund button (e.g., refund button 2658) is not shown on the transaction detail user interface. In some embodiments, transaction detail user interface 2648 includes a return button 2613 (e.g., stating the name of message participant 2631 associated with the current transaction) which, when selected, causes the device to return to message conversation 2640 (and cease to display the details transaction user interface).

Figure 26E:
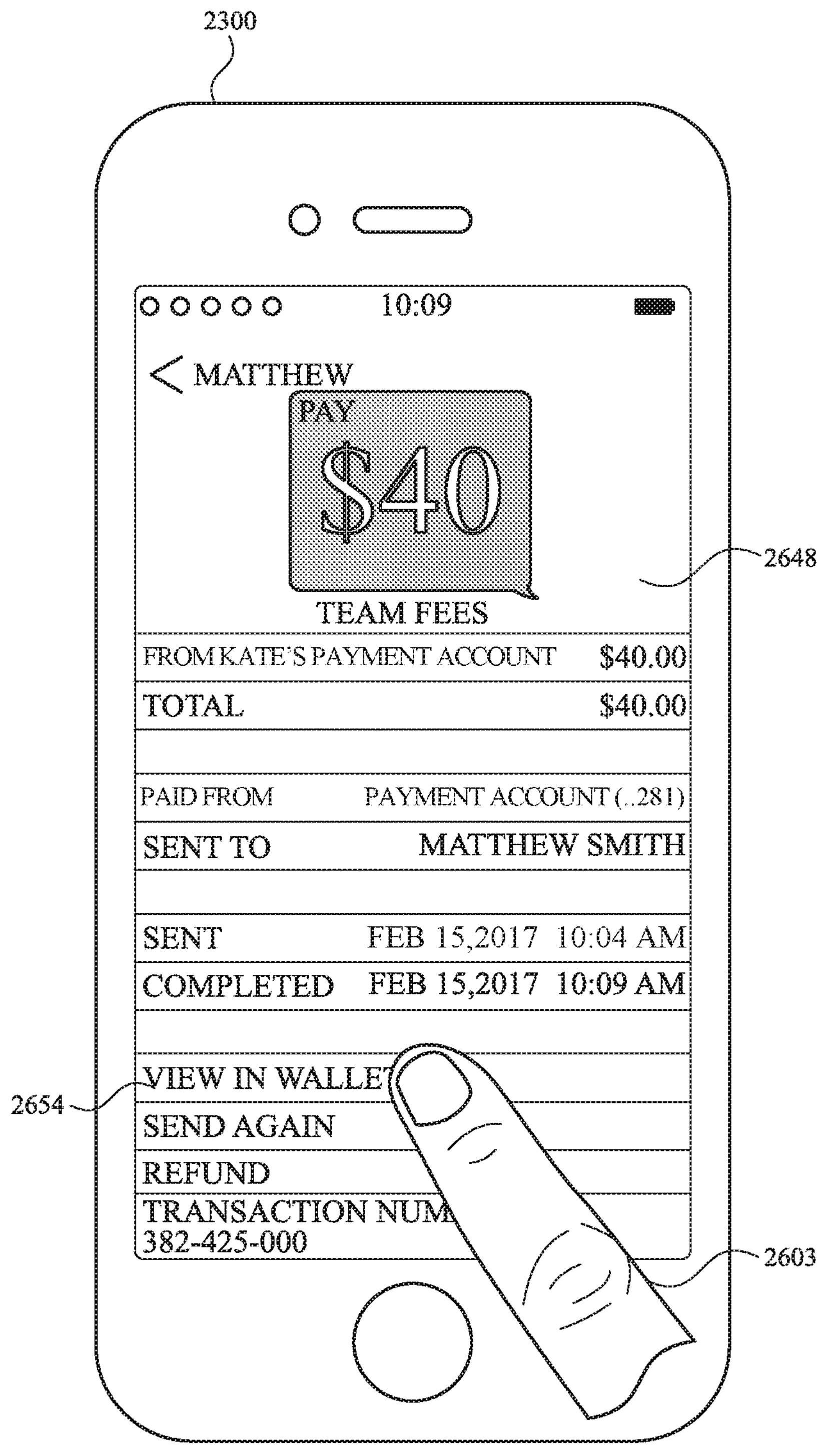

In FIG. 26E, while displaying transaction detail user interface 2648, electronic device 2600 detects user selection of wallet button 2654 to view account details of the account that was used in the current transaction (e.g., the payment account, as shown in, for example, 2648A and 2648C). For example, as shown in FIG. 26E, the user selection is a tap gesture 2603 on wallet button 2654.

Figure 26F:
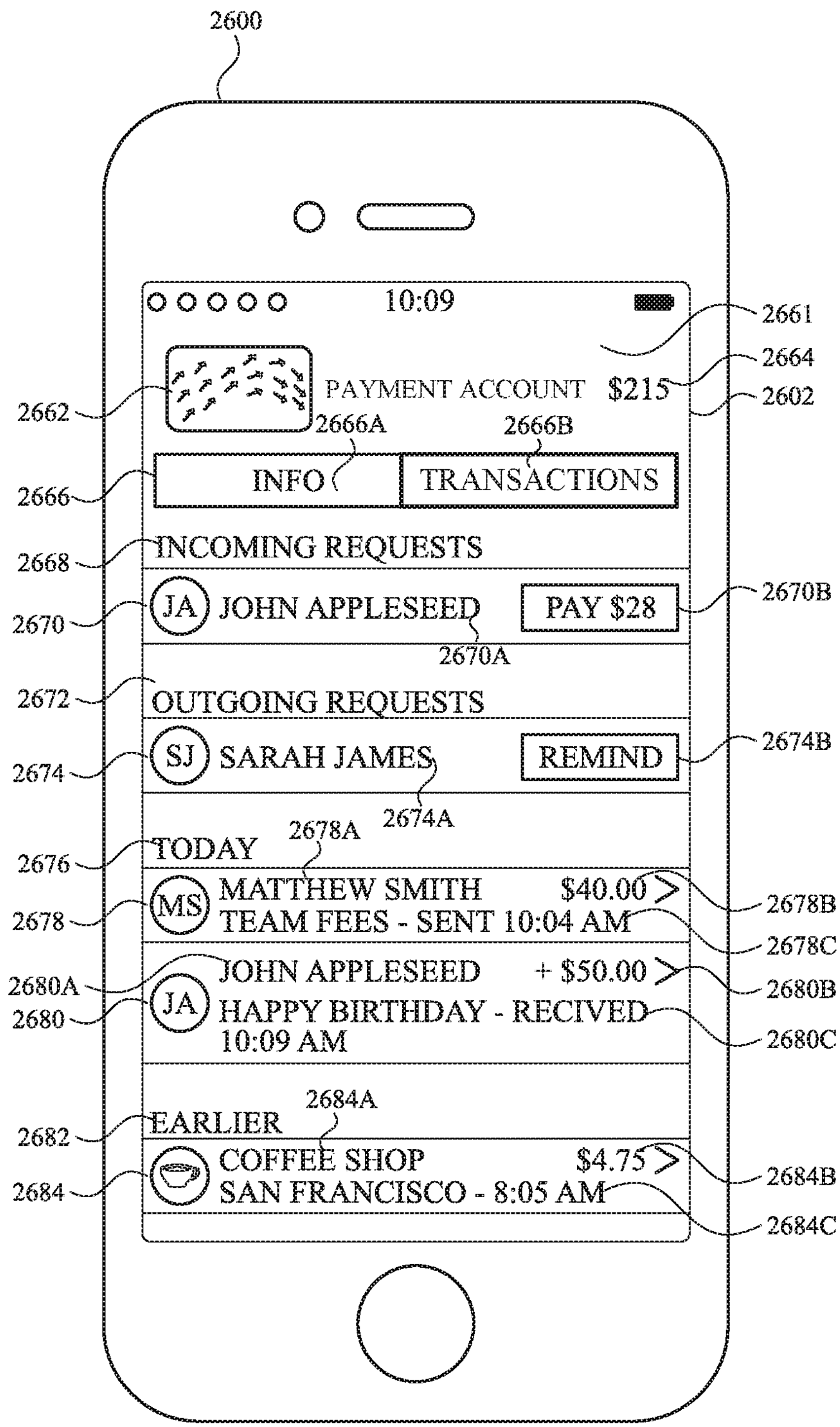

FIG. 26F shows, in response to detecting tap gesture 2603 on wallet button 2654 from transaction detail user interface 2648, electronic device 2600 displays, on display 2602, an transactions history user interface 2661 including a list of pending and past transactions associated with the currently-viewed account (e.g., the payment account). For example, in FIG. 26E, the account that was used for the payment corresponding to payment message object 2644 was the payment account. Therefore, in response to detecting user selection 2603 on wallet button 2654 from the transaction detail user interface associated with payment message object 2644, the electronic device displays, on the display 2602, transactions history user interface 2661 corresponding to the payment account is.

In some embodiments, as shown in FIG. 26F, transactions history user interface 2661 includes a graphical representation 2662 (e.g., a thumbnail image, a mini-image) corresponding to the currently-viewed account (e.g., the payment account). In some embodiments, transactions history user interface 2661 includes a balance indication 2664 (e.g., "$215") of the currently-available amount of funds in the payment account. In some embodiments, transactions history user interface 2661 includes a switch bar 2666 for switching between an account information view (e.g., corresponding to an account information user interface associated with the currently-viewed account (e.g., the payment account)) and an account history view (e.g., corresponding to the transactions history user interface). The account information view corresponds to an info tab 2666A and the account history view corresponds to a transactions tab 2666B. As shown in FIG. 26F, because the transactions history user interface is currently displayed (instead of an account information user interface), transactions tab 2666B is highlighted (e.g., marked with thicker borders) to indicate to the user that the currently-displayed view corresponds to the transactions history user interface.

As also shown in FIG. 26F, transactions history user interface 2661 includes one or more transaction items (e.g., a pending transaction item corresponding to a currently-pending transaction or a past transaction item corresponding to a competed transaction). In some embodiments, as shown in FIG. 26F, the one or more items are organized based on pending transactions (e.g., incoming pending requests 2668 and outgoing pending requests 2672), and completed transactions (e.g., today transactions 2676 corresponding to transactions completed today and earlier transactions 2682 corresponding to transactions completed earlier than today). In some embodiments, completed transactions are organized (in chronological order) by days up to a predetermined point (e.g., today, yesterday, Tuesday, Monday, then "earlier").

For example, in FIG. 26F, incoming requests 2668 includes an incoming payment request item 2670 from message participant 2610 (e.g., "John Appleseed") corresponding to the payment request associated with payment message object 2618 described above with reference to FIG. 26A. Incoming payment request item 2670 includes an indication 2670A (e.g., showing "John Appleseed") of the sender (e.g., message participant 2610) of the incoming payment request. In some embodiments, because incoming payment request item 2670 corresponds to a payment request that is pending, the item also includes a pay button 2670B for paying the requested payment. In some embodiments, incoming payment request item 2670 is selectable. In response to receiving user selection of incoming payment request item 2670, the device displays a participant history user interface associated with the payments and/or payment requests corresponding to the message participant associated with the selected item.

Further, in FIG. 26F, outgoing requests 2672 includes an outgoing payment request item 2674 from the user to message participant 2621 (e.g., "Sarah James") corresponding to the payment request associated with payment message object 2634 described above with reference to FIG. 26B. Outgoing payment request item 2674 includes an indication 2674A (e.g., showing "Sarah James") of the recipient (e.g., message participant 2621) of the outgoing payment request. In some embodiments, because outgoing payment request item 2674 corresponds to a payment request that the recipient (e.g., message participant 2621) has not yet accepted, and thus is still pending, the item also includes a reminder button 2674B for sending a reminder to the recipient (e.g., message participant 2621) to make the requested payment. In some embodiments, outgoing payment request item 2674 is selectable. In response to receiving user selection of incoming payment request item 2674, the device displays a participant history user interface associated with the payments and/or payment requests corresponding to the message participant associated with the selected item.

Further in FIG. 26F, today transactions 2676 (of transactions completed during the current day) includes a completed outgoing payment item 2678 associated with a payment from the user to message participant 2631 (e.g., "Matthew Smith") corresponding to the payment associated with payment message object 2644 described above with reference to FIG. 26C and a completed incoming payment item 2680 (e.g., from message participant 2610, "John Appleseed"). Completed outgoing payment item 2678 includes an indication 2678A (e.g., showing "Matthew Smith") of the recipient (e.g., message participant 2631) of the completed outgoing payment and an indication 2678B of an amount (e.g., "$40") of the made payment. In some embodiments, indication 2678B shows the amount (e.g., "$40") without a positive (e.g., "+") or negative (e.g., "−") indicator to inform the user that the item corresponds to an outgoing payment (e.g., a payment made by the user to a recipient). Completed outgoing payment item 2678 also includes an indication 2678C of other details associated with the completed transactions, such as a note (e.g., stating "Team Fees," corresponding to the note of note message object 2646) associated with the transaction and a time and/or date of when the payment was sent. Completed incoming payment item 2680 includes an indication 2680A of the sender (e.g., message participant 2610, "John Appleseed") of the incoming payment and an indication 2680B of an amount (e.g., "$50") of the received payment. In some embodiments, indication 2680B shows the amount (e.g., "$50") with a positive (e.g., "+") indicator to inform the user that the item corresponds to a received payment (e.g., a payment received by the user from a sender). Completed incoming payment item 2680 also includes an indication 2680C of other details associated with the completed transactions, such as a note (e.g., stating "Happy Birthday") associated with the transaction and a time and/or date of when the payment was received. Further, in some embodiments, items within today transactions 2676 (e.g., completed outgoing payment item 2678 and completed incoming payment item 2680) are selectable. In response to receiving user selection of a transaction item from among the today transactions 2676, the device displays a participant history user interface associated with the payments and/or payment requests corresponding to the message participant associated with the selected item.

Further in FIG. 26F, earlier transactions 2682 (or transactions completed during a day earlier than the current day) includes a completed outgoing payment item 2684 associated with a payment made by the user to a commercial entity (e.g., a coffee shop), as indicated by indication 2684A. In some embodiments, transactions with commercial entities can be made as with non-commercial entities, such as message participants 2610, 2621, and 2631. As with other items, completed outgoing payment item 2684 includes indication 2684A of the name of the recipient (or commercial entity) (e.g., "Coffee Shop"), an indication 2684B of the payment made to the commercial entity (e.g., "$4.75"), and an indication 2684C of the time and/or date of the commercial transaction.

Figure 26G:
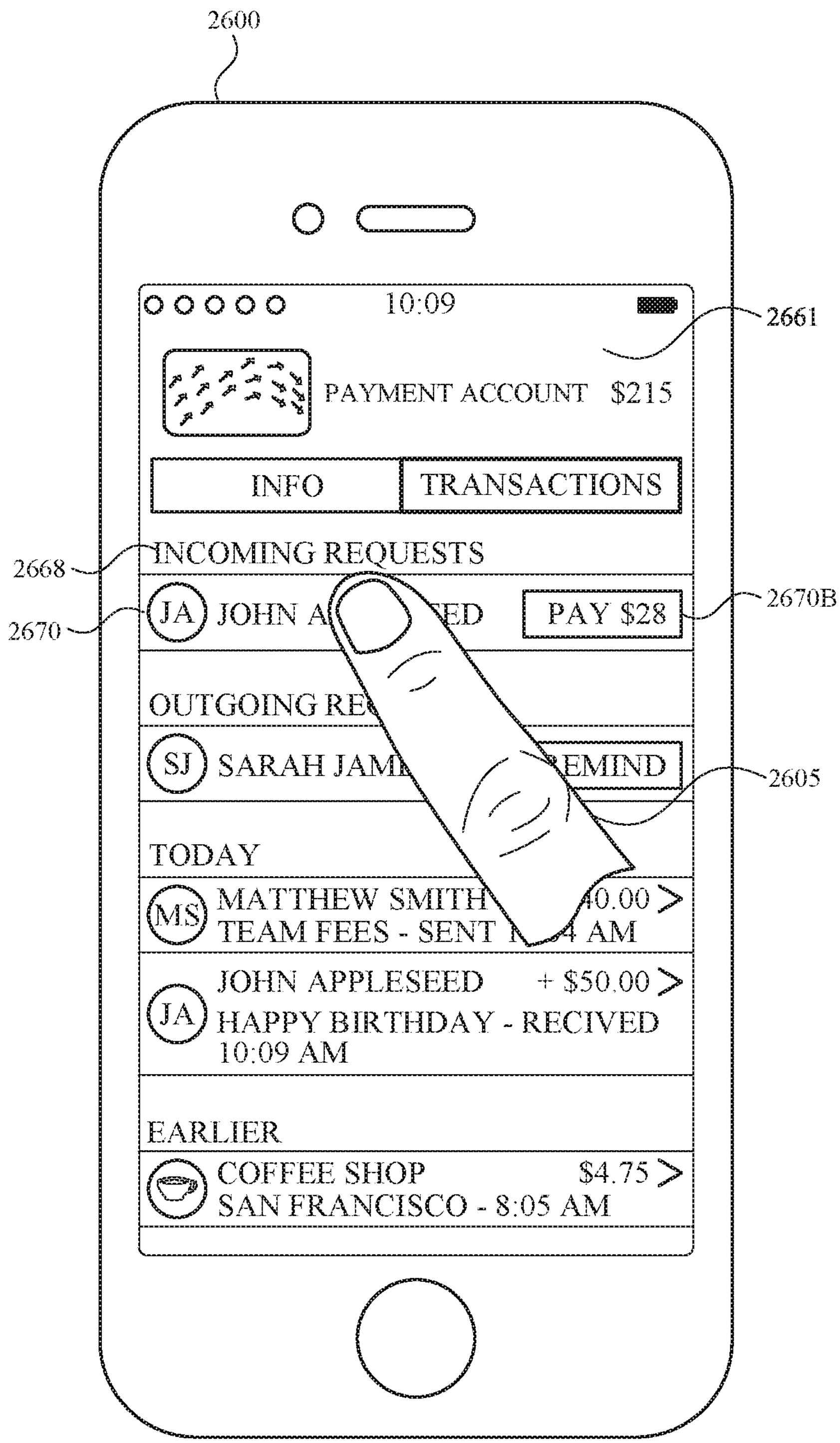

In FIG. 26G, while displaying transactions history user interface 2661, electronic device 2600 detects user selection of incoming payment request item 2670 (e.g., at a region other than the region corresponding to pay button 2670B) of incoming request items 2668. For example, as shown in FIG. 26G, the user selection is a tap gesture 2605 on incoming payment request item 2670 (e.g., at a region other than the region corresponding to pay button 2670B).

Figure 26H:
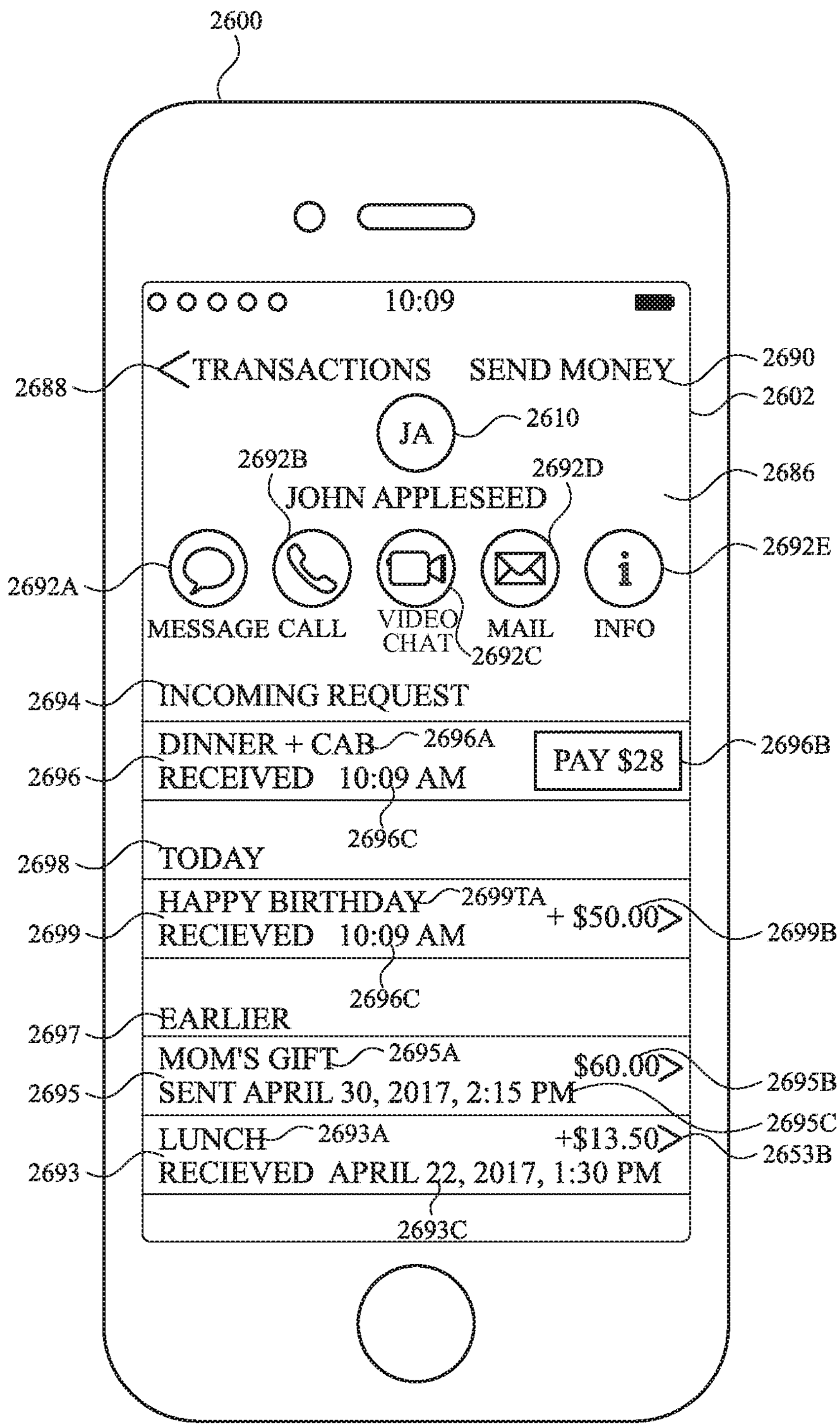

In FIG. 26H, in response to detecting tap gesture 2605, electronic device 2600 displays, on display 2602, a participant history user interface 2686 that includes one or more items specific to the participant associated with the item selected by tap gesture 2605. For example, in FIG. 26H, because tap gesture 2605 corresponded to a selection of incoming payment request item 2670, which corresponds with message participant 2610, participant history user interface 2686 corresponds to message participant 2610.

As shown in FIG. 26H, participant history user interface 2686 includes an indication 2610 (e.g., "John Appleseed") of the message participant (e.g., message participant 2610) associated with the currently-viewed participant history user interface. In some embodiments, as also shown in FIG. 26H, participant history user interface 2686 includes menu icons 2692A-E associated with different types of operations that can be performed concerning the currently-viewed message participant (e.g., message participant 2610). For example, menu icon 2692A is a messaging icon which allows the user to initiate a messaging conversation (e.g., via messaging application 2606) with message participant 2610, menu icon 2692B is a calling icon which allows the user to initiate a phone call (e.g., via a phone application) with message participant 2610, menu icon 2692C is a video call icon which allows the user to initiate a video call with message participant 2610, menu icon 2692D is a mail icon which allows the user to initiate an electronic mail (e.g., email) communication with message participant 2610, and menu icon 2692E is an information icon which allows the user to view information/details (e.g., name, contact information, address information, associated group) of message participant 2610.

As also shown in FIG. 26H, similar to transactions history user interface 2661, participant history user interface 2686 (e.g., specific to message participant 2610) includes one or more items (corresponding to transactions performed with message participant 2610) corresponding to pending transactions (e.g., pending payments or payment requests) and completed (e.g., paid payments or payment requests) transactions. Thus, in some embodiments, the one or more items are organized based on pending transactions (e.g., incoming pending requests 2694), and completed transactions (e.g., today transactions 2698 corresponding to transactions completed today and earlier transactions 2697 corresponding to transactions completed earlier than today).

For example, in FIG. 26H, incoming pending requests 2694 includes a payment request item 2696 corresponding to payment request item 2670 described above with reference to FIG. 26F. Payment request item 2696 includes an indication 2696A (e.g., stating "Dinner+Cab") of a note associated with the payment request item (e.g., to serve as a reminder to the user of the reason for the payment request), a pay button 2696B (e.g., corresponding to pay button 2670B) indicating the amount (e.g., "$28") of the payment request and which, when selected (as with pay button 2670B), proceed with payment of the payment request (e.g., via messaging application 2606), and an indication 2696C of a date and/or time of when the payment request was received.

Further, in FIG. 26H, today transactions 2698 includes a completed incoming payment item 2699 corresponding to a payment received by the user from message participant 2610 during the current day. Completed incoming payment item 2699 includes an indication 2699A (e.g., stating "Happy Birthday") of a note associated with the incoming payment (e.g., to serve as a reminder to the user of the reason for the payment), an amount indication 2699B (e.g., stating "+$50") showing the received payment amount, and an indication 2699C of the date and/or of when the payment was received. In some embodiments, because completed incoming payment item 2699 corresponds to a received payment (as opposed to a made payment), amount indication 2699B includes a positive symbol (e.g., "+") to indicate that the payment corresponds to an incoming payment.

Further, in FIG. 26H, earlier transactions 2697 includes a completed outgoing payment item 2695 corresponding to a payment made by the user to message participant 2610 and a completed incoming payment item 2693 corresponding to a payment received by the user from message participant 2610. Completed outgoing payment item 2695 includes an indication 2695A (e.g., stating "Mom' Gift") of a note associated with the payment (e.g., to serve as a reminder to the user of the reason for making the payment), an amount indication 2695B (e.g., "$60.00") of the payment amount, and an indication 2695C of the time and/or date of when the payment was made. Completed incoming payment item 2693 includes an indication 2693A (e.g., stating "Lunch") of a note associated with the payment (e.g., to serve as a reminder to the user of the reason for the received payment), an amount indication 2693B (e.g., "+13.50") of the received payment amount, and an indication 2693C of the time and/or date of when the payment was received.

In some embodiments, as also shown in FIG. 26H, participant history user interface 2686 includes aback button 2688 for returning to transactions history user interface 2661. In some embodiments, as also shown in FIG. 26H, participant history user interface also includes a pay button 2690 for initiating (e.g., via messaging application 2606) a new payment or a new payment request with messaging participant 2610.

Figure 26I:
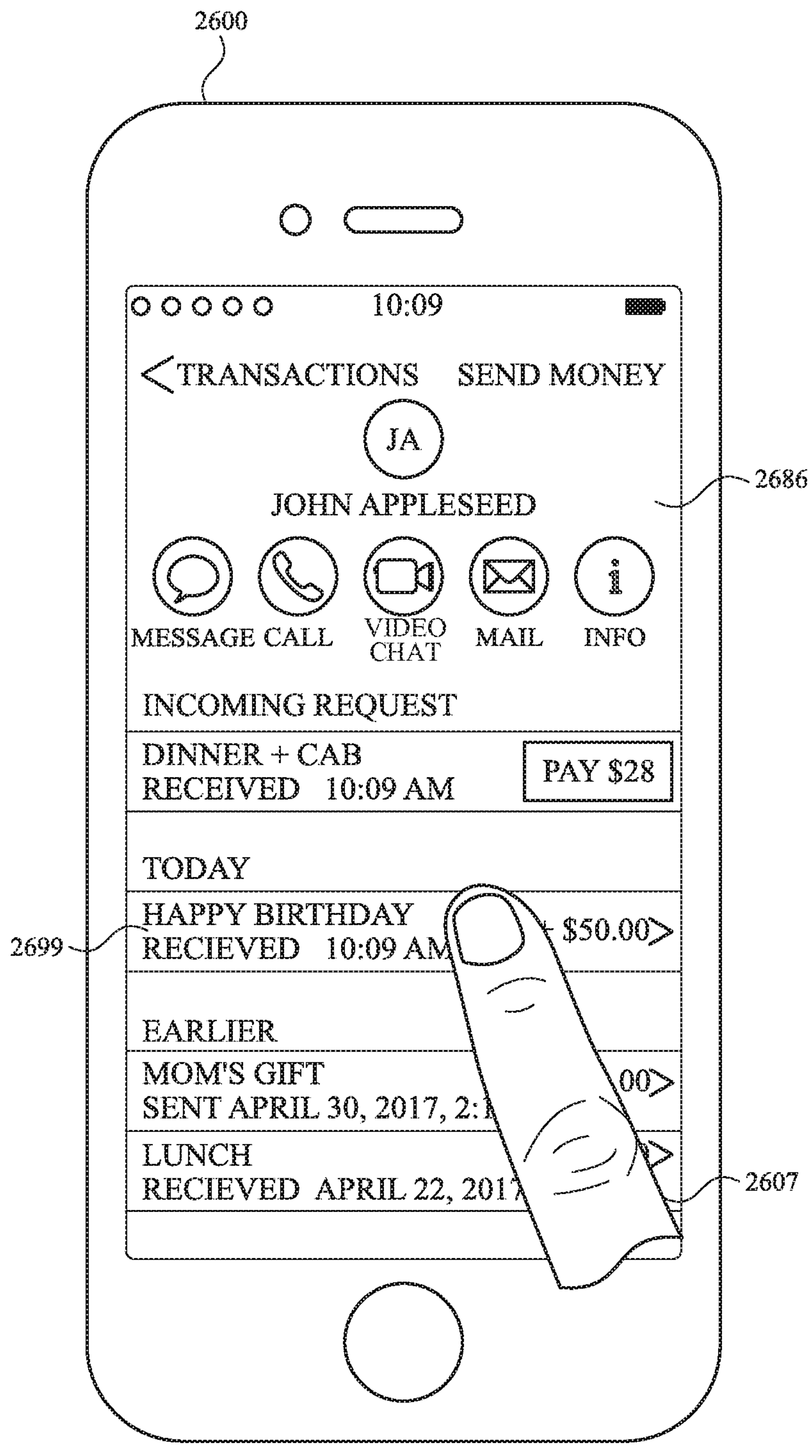

In FIG. 26I, while displaying participant history user interface 2686 corresponding to message participant 2610, electronic device 2600 detects user selection of completed incoming payment item 2699. For example, as shown in FIG. 26I, the user selection is a tap gesture 2607 on completed incoming payment item 2699.

Figure 26J:
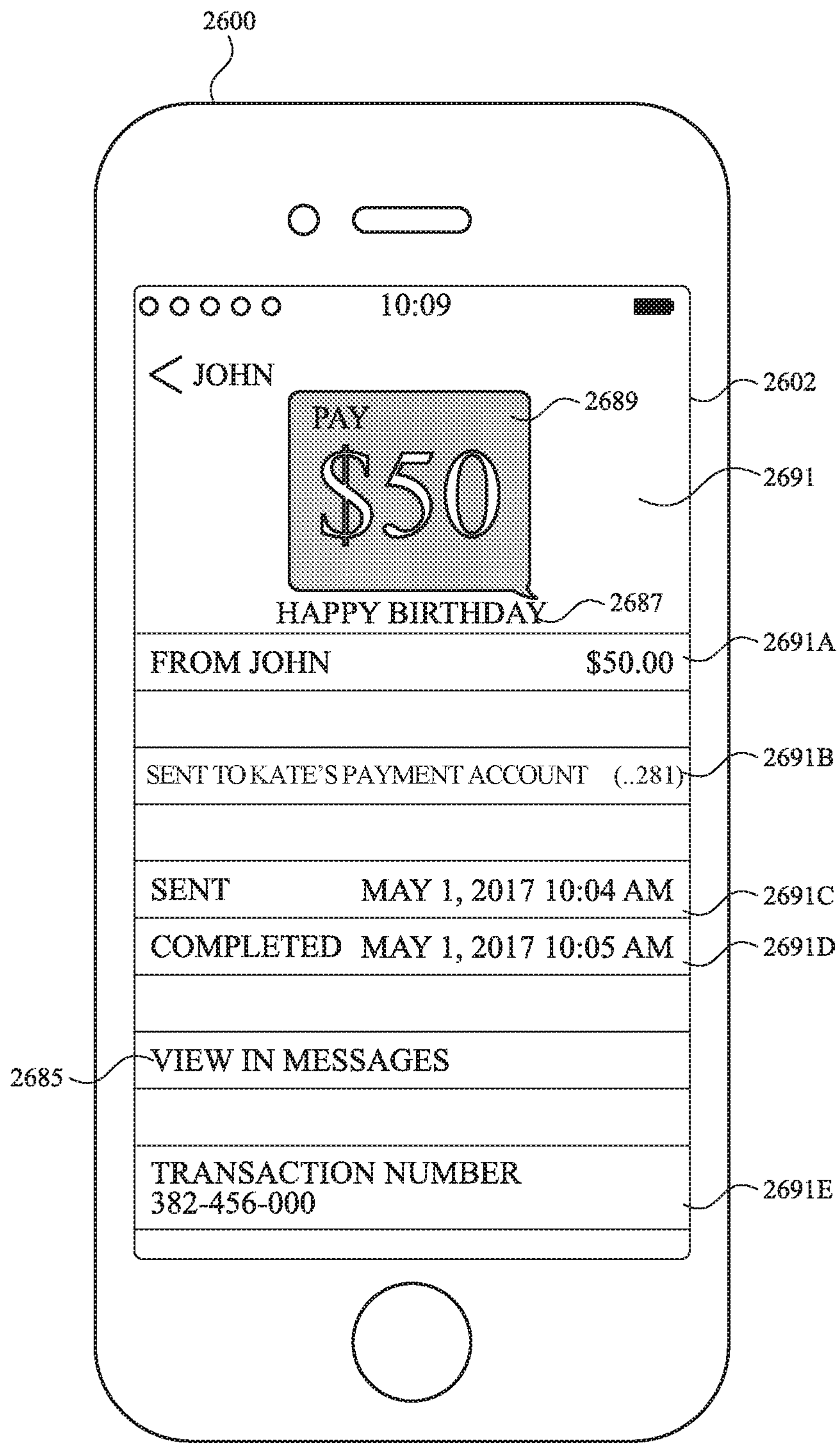

In FIG. 26J, in response to detecting tap gesture 2607 on completed incoming payment item 2699, electronic device 2600 displays, on display 2602, a transaction detail user interface 2691 (e.g., similar to transaction detail user interface 2648 described above with reference to FIG. 26D) that includes transactions details associated with completed incoming payment item 2699. In some embodiments, transaction detail user interface 2691 includes a payment message object image 2689 corresponding to the payment message object associated with completed incoming payment item 2699. In some embodiments, transaction detail user interface 2691 includes an indication 2687 of the note (e.g., stating "Happy Birthday") associated with the payment message object associated with the completed incoming payment item 2699. In some embodiments, transaction detail user interface 2691 includes a plurality of transaction details 2691A-E related to the incoming payment. For example, transaction detail user interface 2691 includes an indication 2691A of the sender (e.g., stating "John," message participant 2610) of the payment and the payment amount (e.g., "$50"). For another example, transaction detail user interface 2691 includes in indication 2691B of the account details (e.g., account number) of the account where the payment was deposited (e.g., the user, Kate's, payment account). For another example, transaction detail user interface 2691 includes an indication 2691C of the date and time when the payment was sent (by message participant 2610) and an indication 2648D of the date and time when the payment was accepted (by the user). For another example, transaction detail user interface 2691 includes an indication 2691E of the transaction number. In some embodiments, as shown in FIG. 26J, transaction detail user interface 2691 includes a view in message button 2654 for viewing the payment message object corresponding to the current payment in a message conversation (e.g., message conversation 2608 with message participant 2610) of messaging application 2606.

Figure 26K:
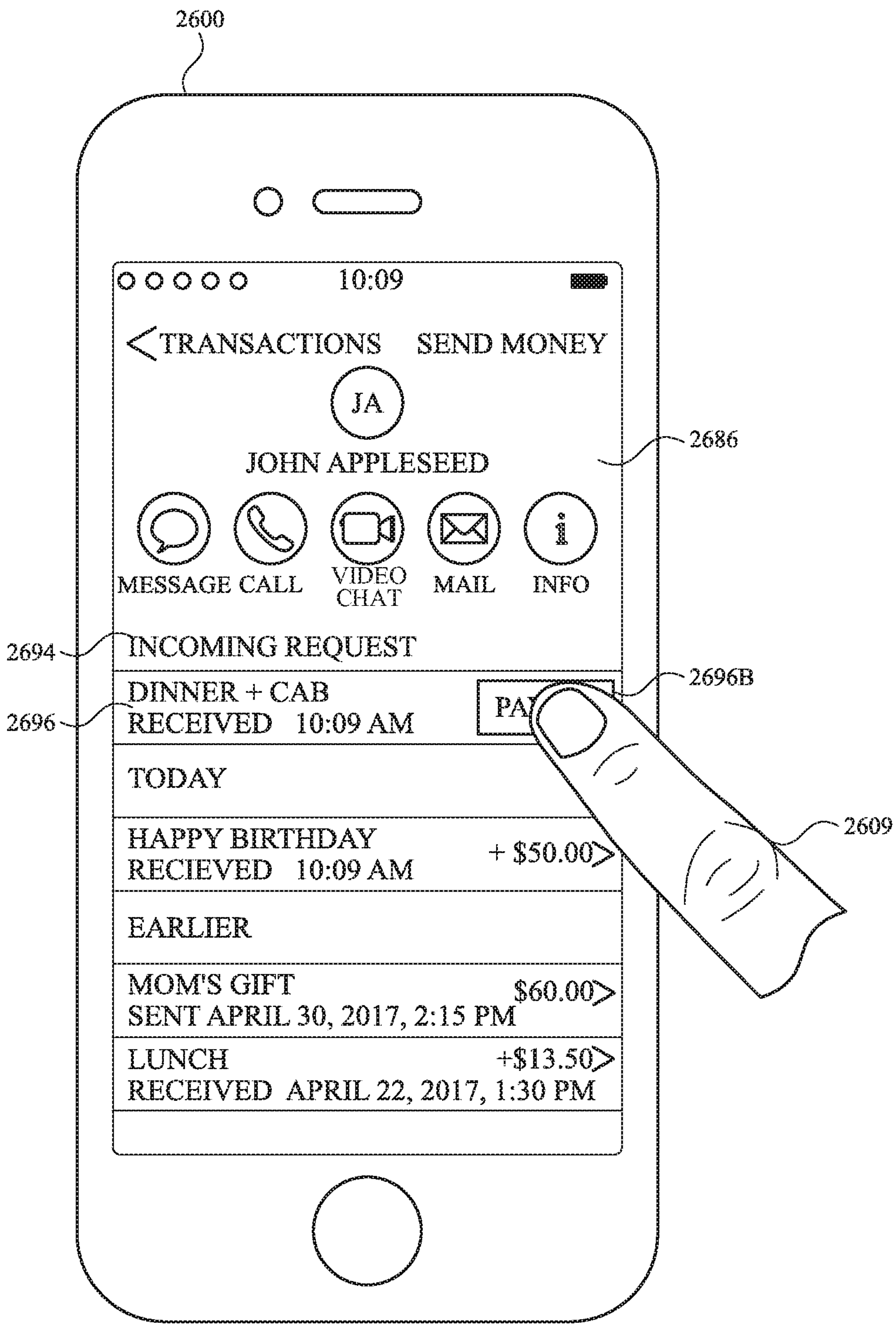

In FIG. 26K, while displaying participant history user interface 2686, electronic device 2600 detects user activation of pay button 2696B (corresponding to pay button 2670B) for proceeding with making the payment corresponding to the payment request associated with payment request item 2696 (corresponding to payment request item 2670). For example, as shown in FIG. 26K, the user activation is a tap gesture 2609 on pay button 2696B (or, can also be a tap gesture on corresponding pay button 2670B on transactions history user interface 2661).

Figure 26L:
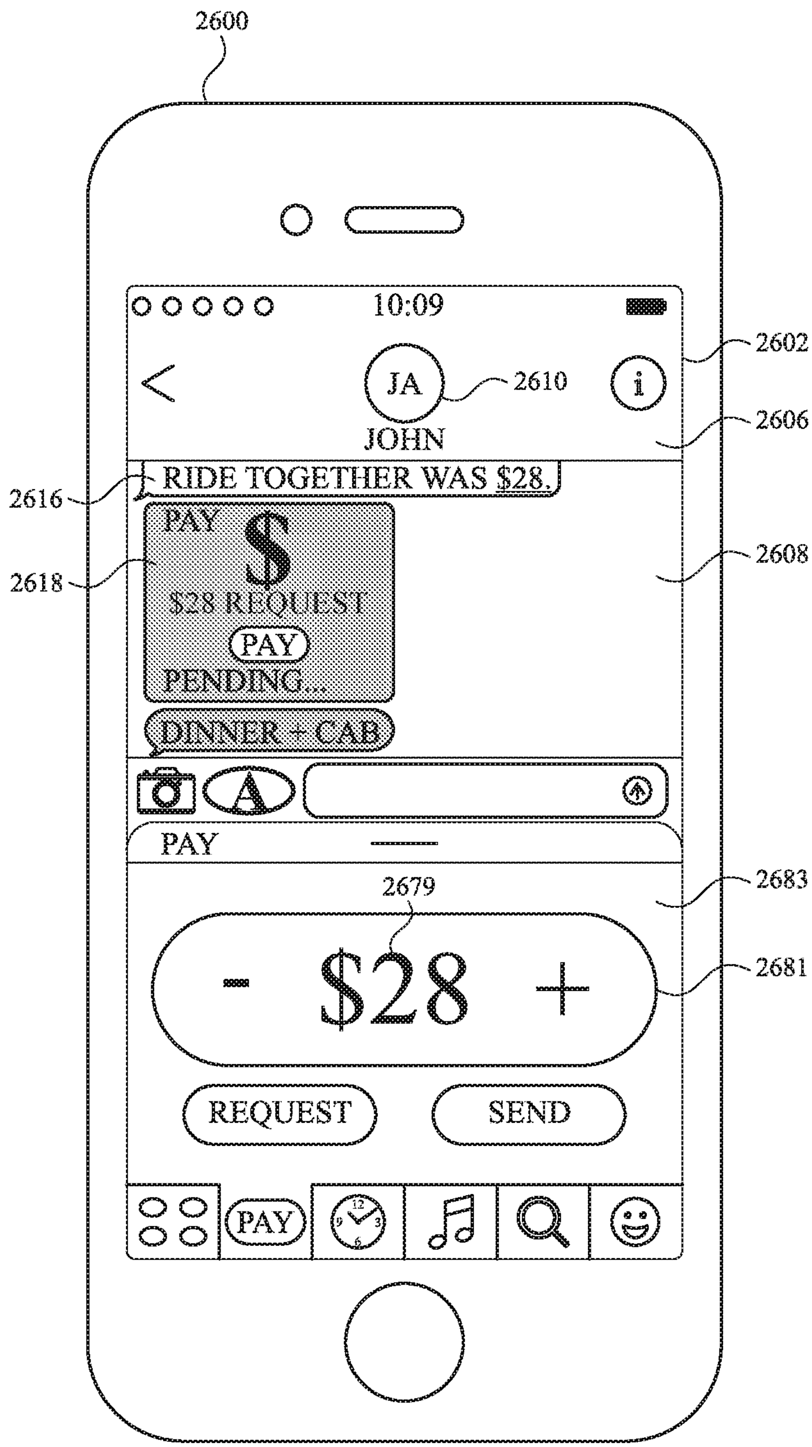

In FIG. 26L, in response to detecting tap gesture 2609 on pay button 2696B, electronic device 2600 again displays, on display 2602, message conversation 2608 (with message participant 2610) of messaging application 2606, as first described above with reference to FIG. 26A. As described above, message conversation 2608 includes a message object 2616 sent by message participant 2610 to the user and a payment message object 2618 corresponding to the payment request that corresponds to the payment request associated with payment request item 2696 (as displayed in participant history user interface 2686) and payment request item 2670 (as displayed in transactions history user interface 2661).

As also shown in FIG. 26L, in response to detecting tap gesture 2609 on pay button 2696B (or pay button 2670B), electronic device 2600 displays, on display 2602, a payment transfer user interface 2683 (e.g., corresponding to payment transfer user interface 840 described above with reference to FIGS. 8E-8P). As with payment transfer user interface 840, payment transfer user interface 2683 includes a value change region 2681 (e.g., corresponding to value change region 846) and an indication 2679 of the transfer amount (e.g., "$28") within value change region 2681.

Figure 26M:
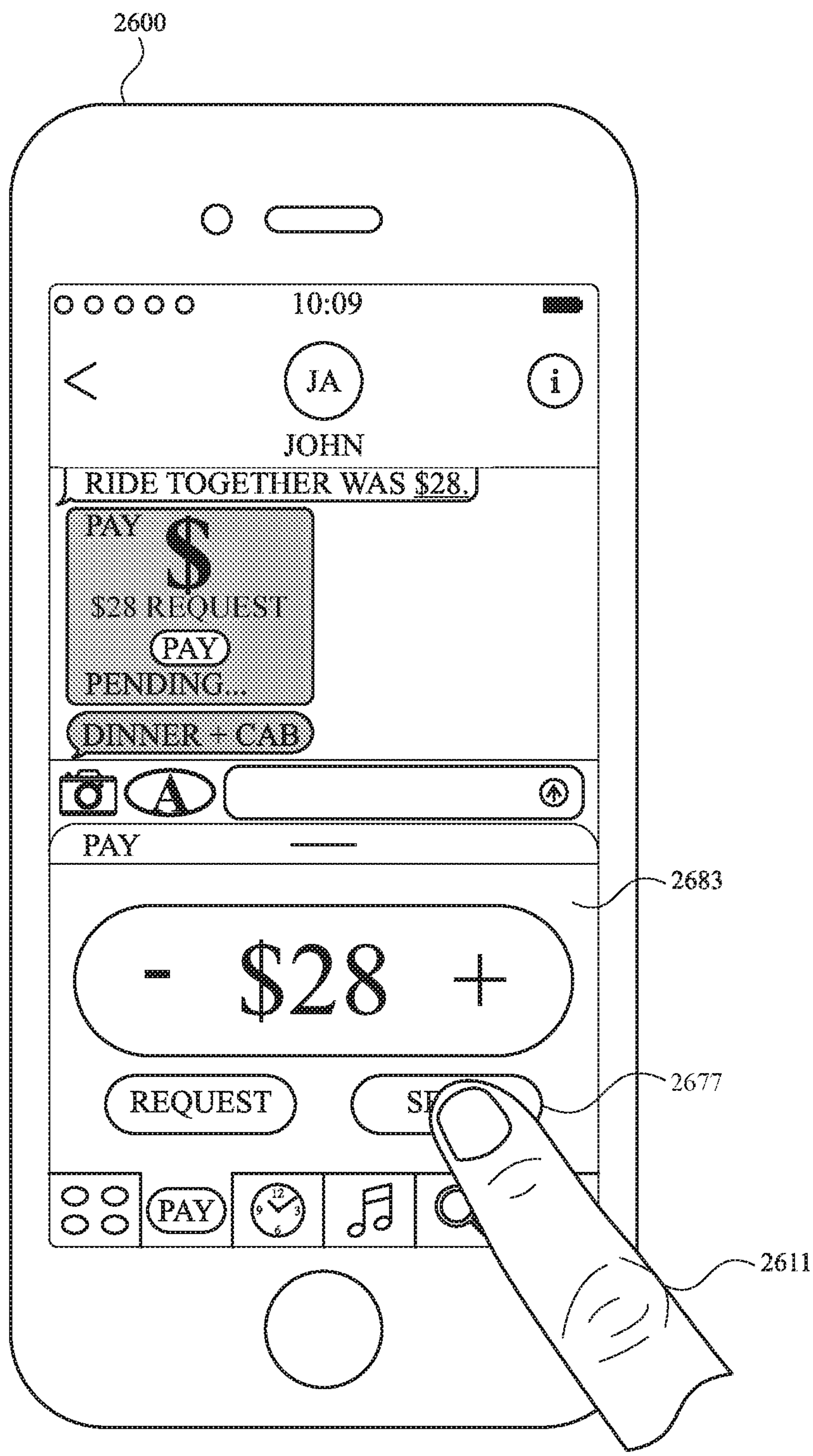

In FIG. 26M, while displaying payment transfer user interface 2683, electronic device 2600 detects user activation of a send button 2677 (e.g., corresponding to send button 847 of payment transfer user interface 840) for sending a payment in the indicated amount (e.g., of $28). For example, as shown in FIG. 26M, the user activation is a tap gesture 2611 on send button 2677.

Figure 26N:
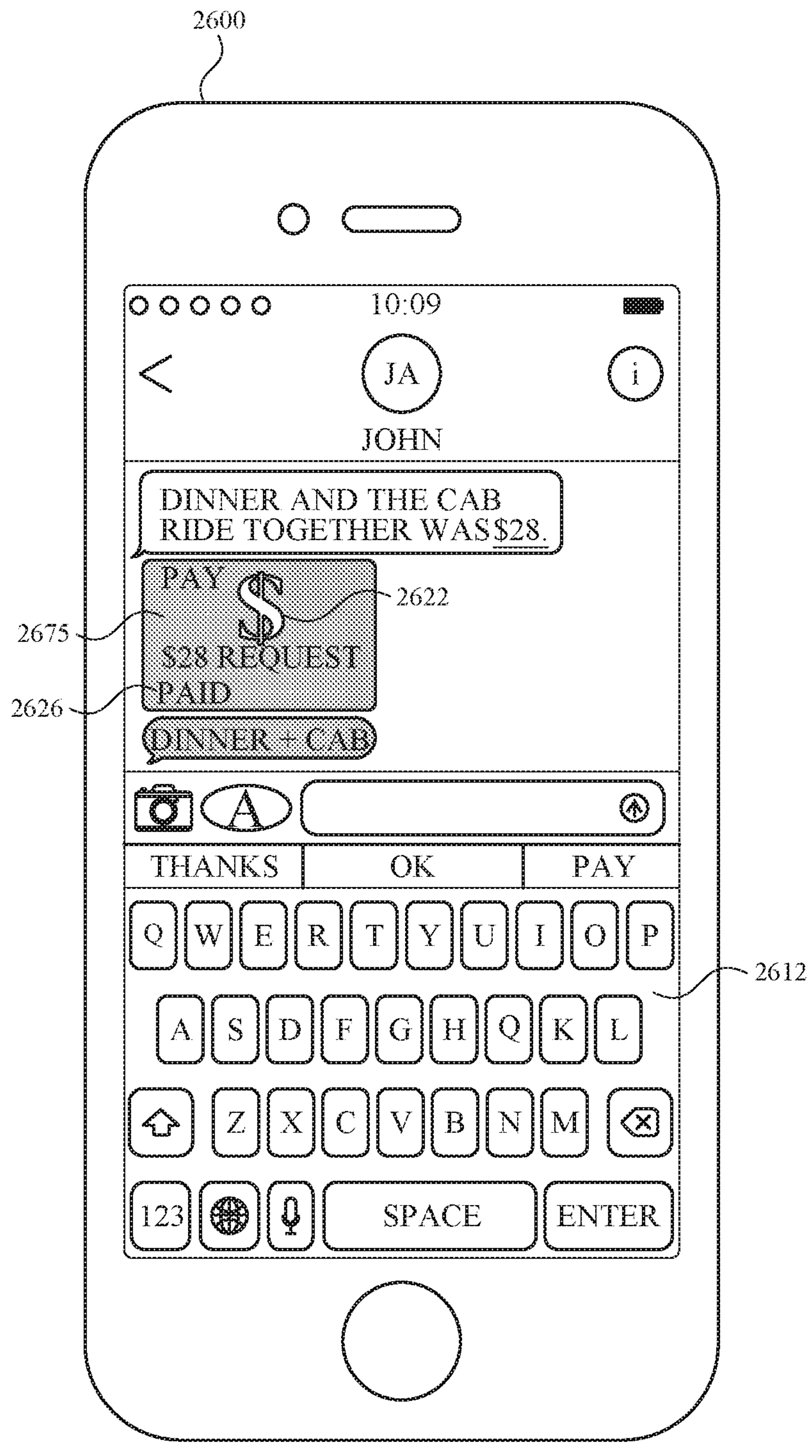

In FIG. 26N, in response to detecting tap gesture 2611 on send button 2677 (and thus sending the payment requested by the payment requested associated with payment message object 2618), electronic device 2600 updates the appearance of payment message object 2618 to indicate that the requested payment has been made. Specifically, as shown in FIG. 26N, amount indication 2622 of payment message object 2618 is visually changed. In some embodiments, the visual change to amount indication 2622 is a bolding (or thickening) of the font of the displayed amount (e.g., "$28"). In some embodiments, the visual change to amount indication 2622 includes a black outline (e.g., a shadow) applied to the font of the displayed amount (e.g., "$28"). In some embodiments, the visual change to amount indication 2622 is a change in color (e.g., from black to white) of the displayed amount (e.g., "$28"). In some embodiments, in response to detecting a change in orientation of the device, electronic device 2600 generates feedback (e.g., a visual feedback, a haptic feedback, audio feedback) associated with the payment message object. In some embodiments, the feedback is a dynamic visual feedback causing display of the payment message object (e.g., payment message object 2618) to change as changes in the orientation of the device relative to a reference point are detected, as described above, for example, with reference to payment message object 1118 in FIG. 11E. In some embodiments, the device also displays (e.g., replaces display of payment transfer user interface 2683 with) virtual keyboard 2612.

Figure 26O:
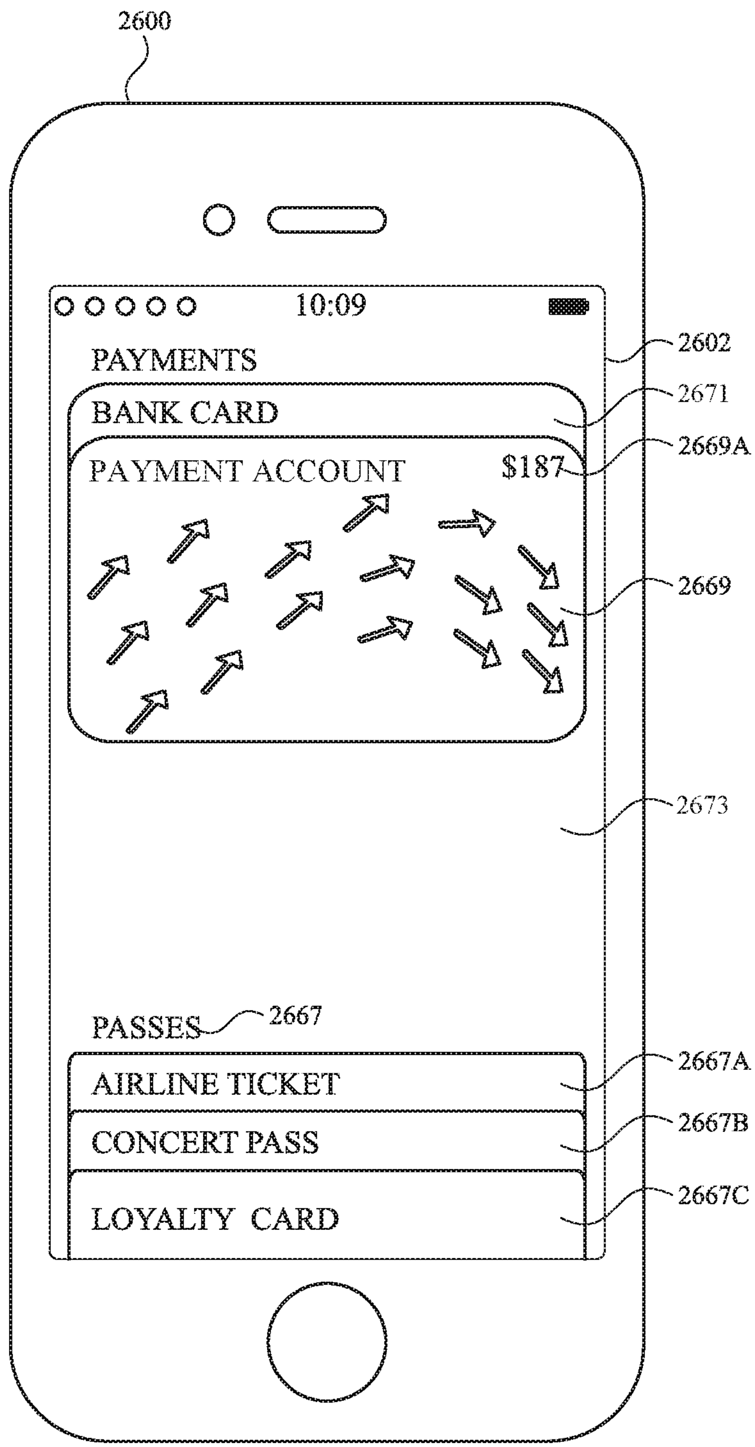

FIG. 26O shows a wallet user interface 2673 (e.g., similar to wallet user interface 2022 described above with reference to FIGS. 20C-20J). As shown in FIG. 26O, wallet user interface 2673 shows a graphical representation 2669 of the payment account and a graphical representation 2671 of a debit card account (e.g., which is a default backup account). Graphical representation 2669 of the payment account (e.g., Kate's payment account, a unique operating system-controlled and managed account) includes a balance indication 2669A (e.g., "$187") indicating the available funds of the payment account, where graphical representations 2669 and 2671 are displayed at the first location (e.g., the top-half portion) of the interface, thereby indicating that the two accounts (e.g., the payment account and the debit card account) are currently selected for use in a transaction. In some embodiments, as also shown in FIG. 26O, wallet user interface 2673 includes (partial) graphical representations 2667 of a plurality of other accounts (e.g., of an airline ticket 2667A, of a concert pass 2667B, of a loyalty card 2667C) displayed at the second location (e.g., a bottom-edge region) of the interface, thereby indicating that these accounts are currently not selected for use in a transaction.

Figure 26P:
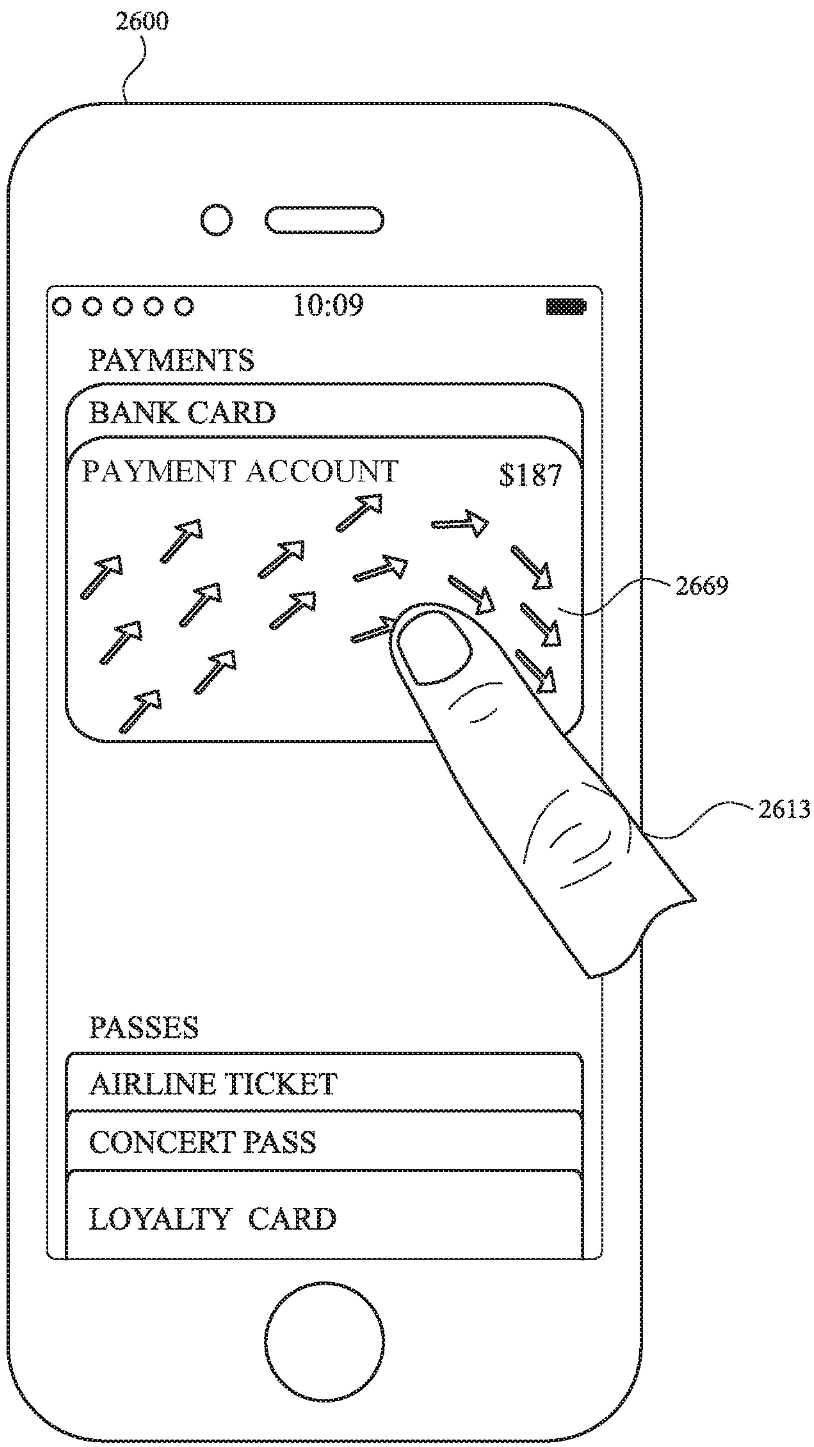

In FIG. 26P, while displaying wallet user interface 2673, electronic device 2600 detects a user input on graphical representation 2669 of the payment account. For example, as shown in FIG. 26P, the user input is a tap gesture 2613 on graphical representation 2669 corresponding to the payment account.

Figure 26Q:
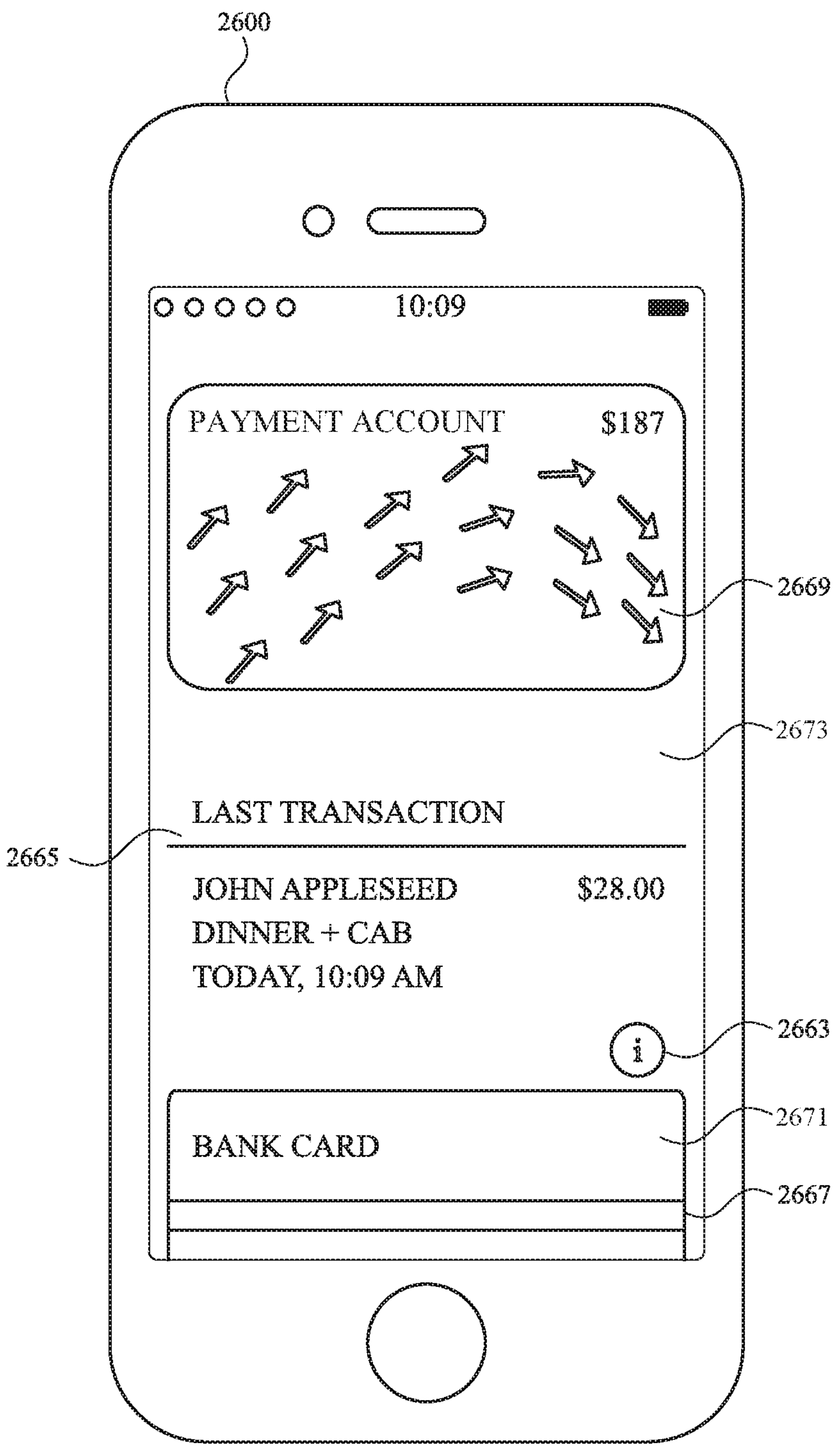

In FIG. 26Q, in response to detecting tap gesture 2613, electronic device 2600 displays within wallet user interface 2673 a selected account-specific page (e.g., the payment account-specific page) that includes summary information 2665 of the most recent transaction (e.g., the outgoing payment associated with payment message object 2618) that was made using the selected account (e.g., the payment account). For example, as shown in FIG. 26Q, summary information 2665 includes the recipient of the payment (e.g., message participant 2610, "John Appleseed"), a note (e.g., stating "Dinner+Cab") associated with the payment (e.g., to serve as a reminder to the user of the reason for the payment), a date and/or time of the payment, and an amount (e.g., "$28.00") of the payment. Further, as also shown in FIG. 26Q, in response to detecting tap gesture 2613 on graphical representation 2669 (of the payment account), the device (maintains) display of the graphical representation of the selected account (e.g., graphical representation 2669 of the payment account) at the first location of the wallet user interface.

In some embodiments, as also shown in FIG. 26Q, in response to detecting user selection (e.g., tap gesture 2613) of graphical representation of the payment account (and not the debit card account), electronic device moves display of graphical representation 2671 of the (non-selected) debit card account from the first location to the second location of the interface. For example, as shown in FIG. 26Q, graphical representation 2671 of the debit card account is moved such that it is one of graphical representations 2667 of the other accounts and is only partially visible on the display.

Figure 26R:
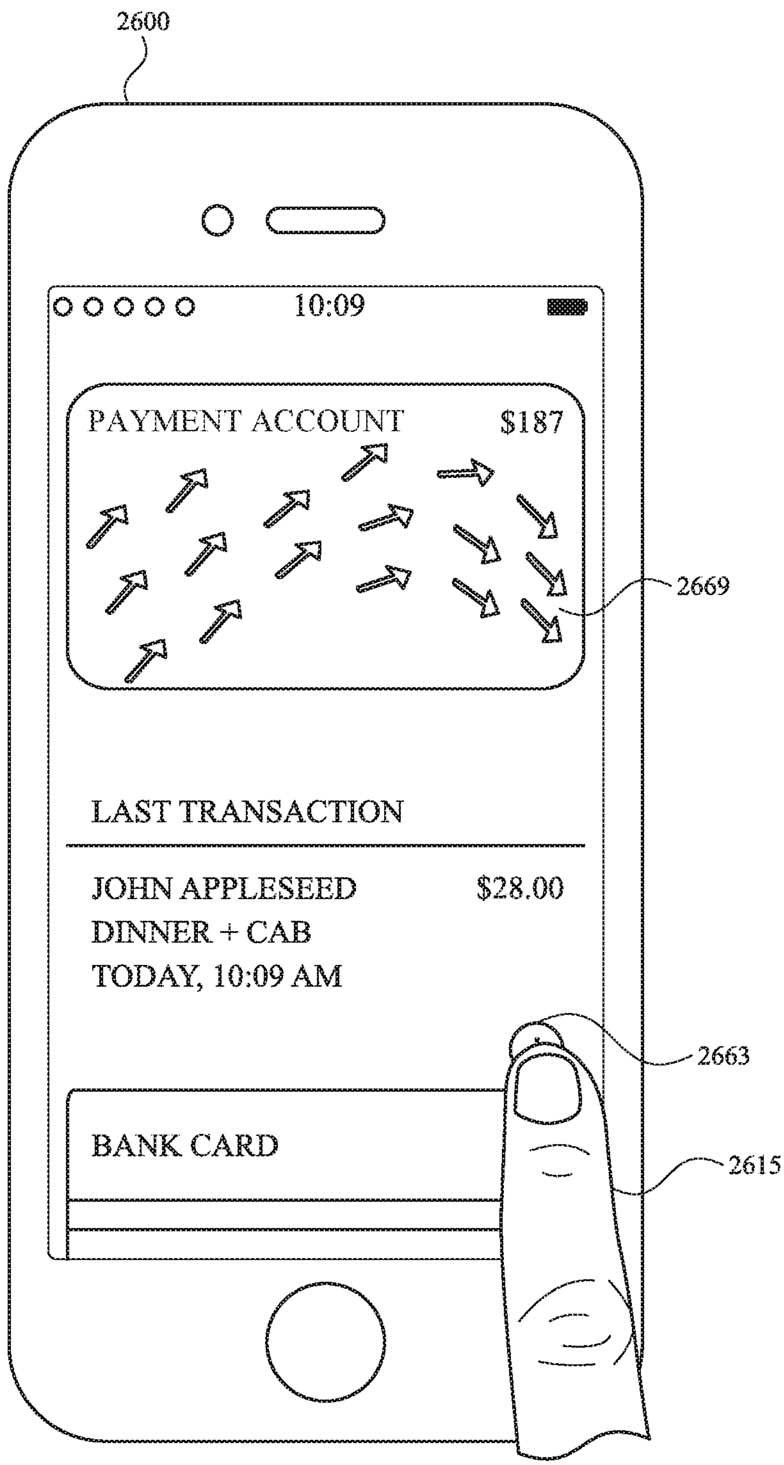

In some embodiments, as also shown in FIG. 26Q, the payment account-specific page of wallet user interface 2673 includes an account information button 2663 for viewing more details/information associated with the currently-selected account (e.g., the payment account). In FIG. 26R, while displaying the payment account-specific page of wallet user interface 2673 (e.g., as indicated by graphical representation 2669 of the payment account being displayed at the first location of the interface), electronic device 2600 detects user activation of account information button 2663 for viewing more details/information associated with the currently-selected payment account. For example, the user activation is a tap gesture 2615 on account information button 2663.

Figure 26S:
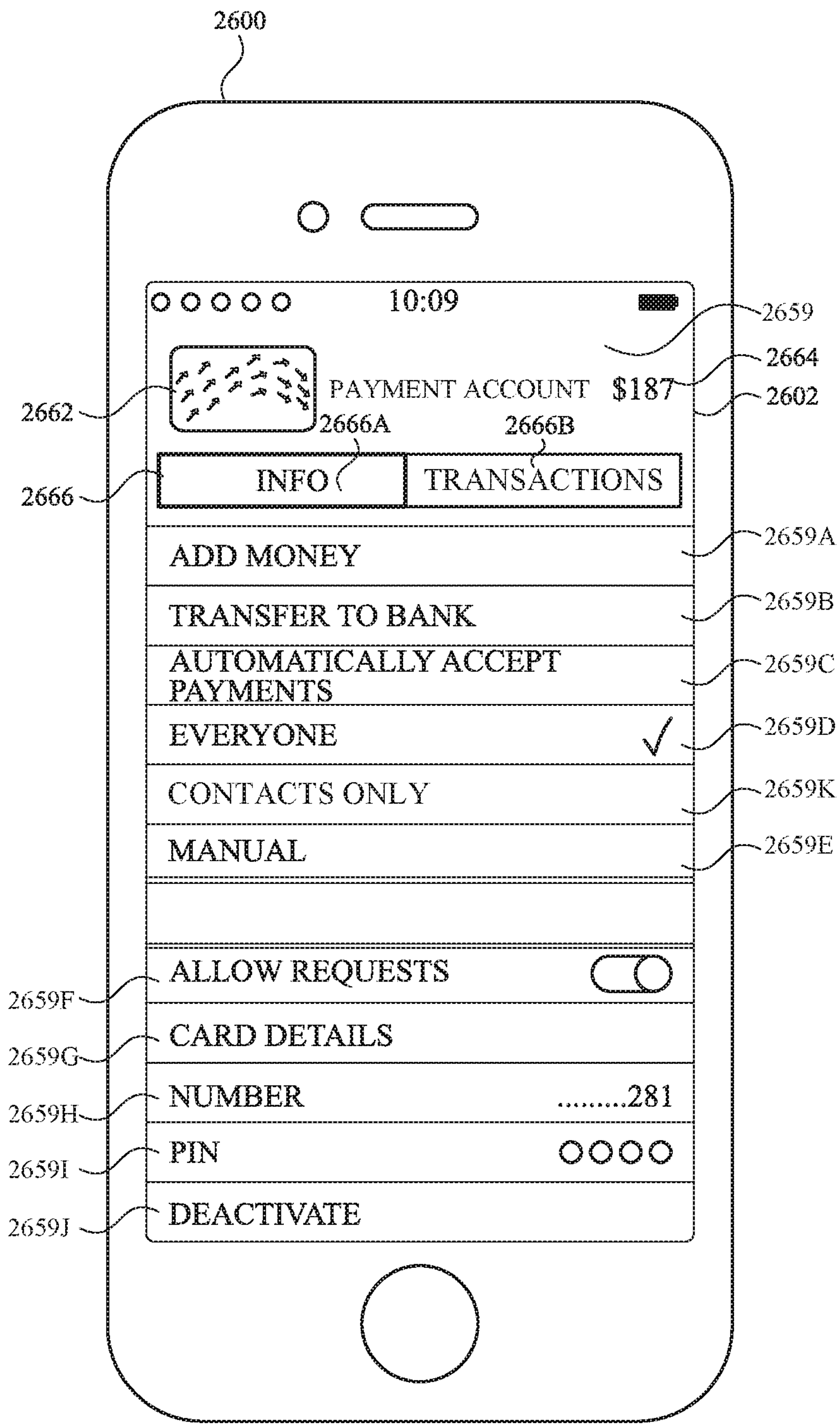
Figure 26T:
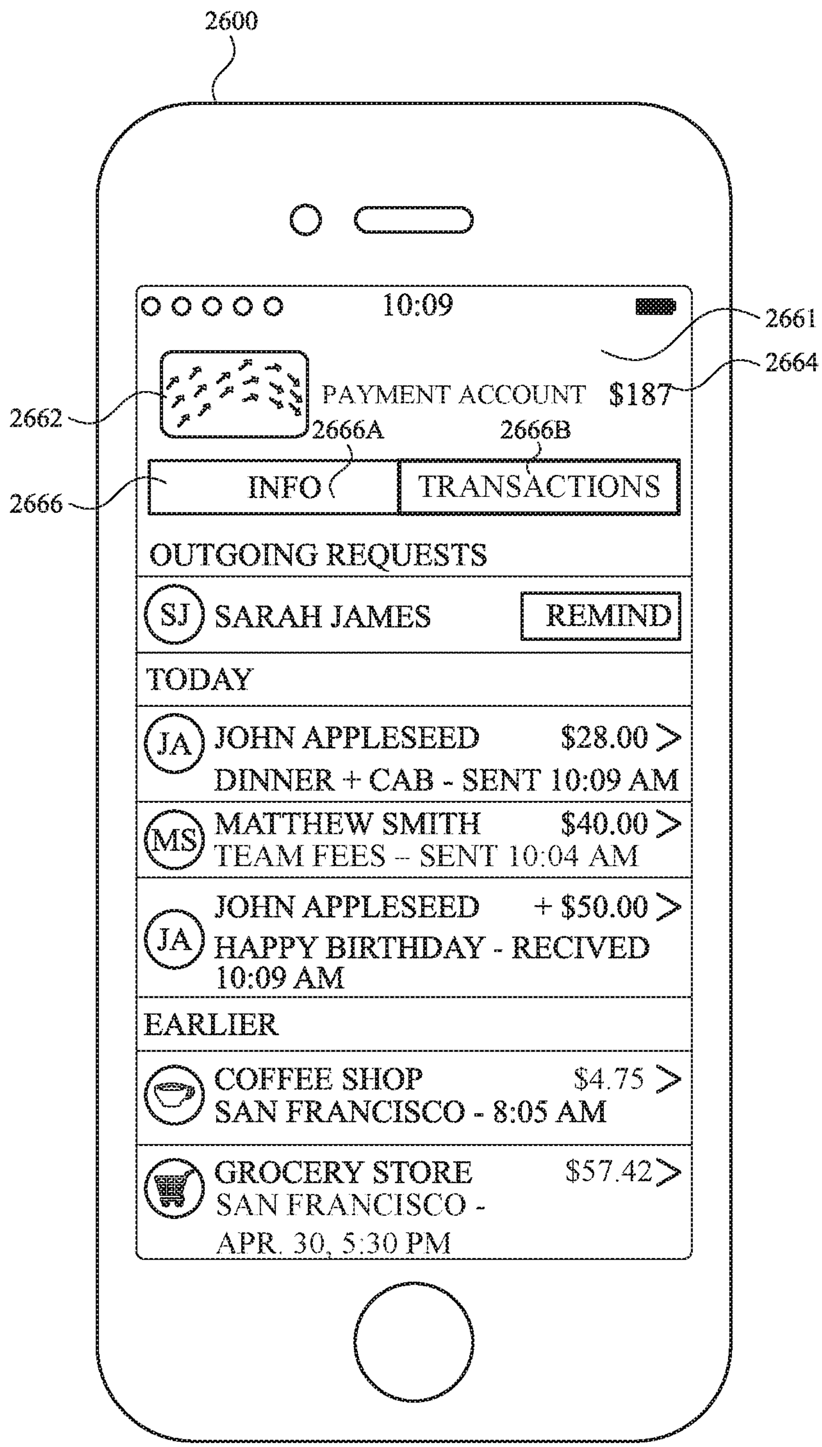
Figure 27A:
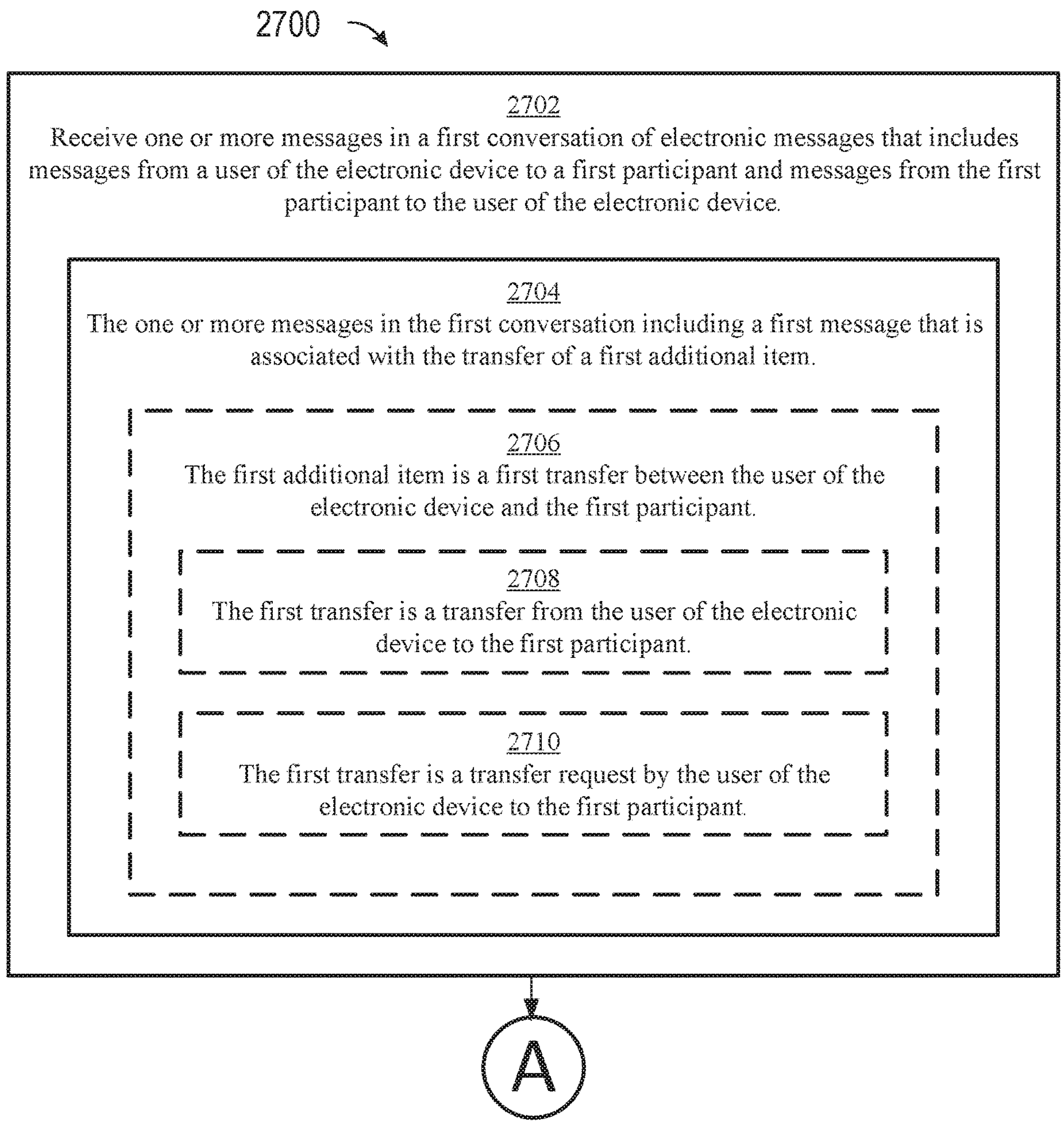
Figure 27B:
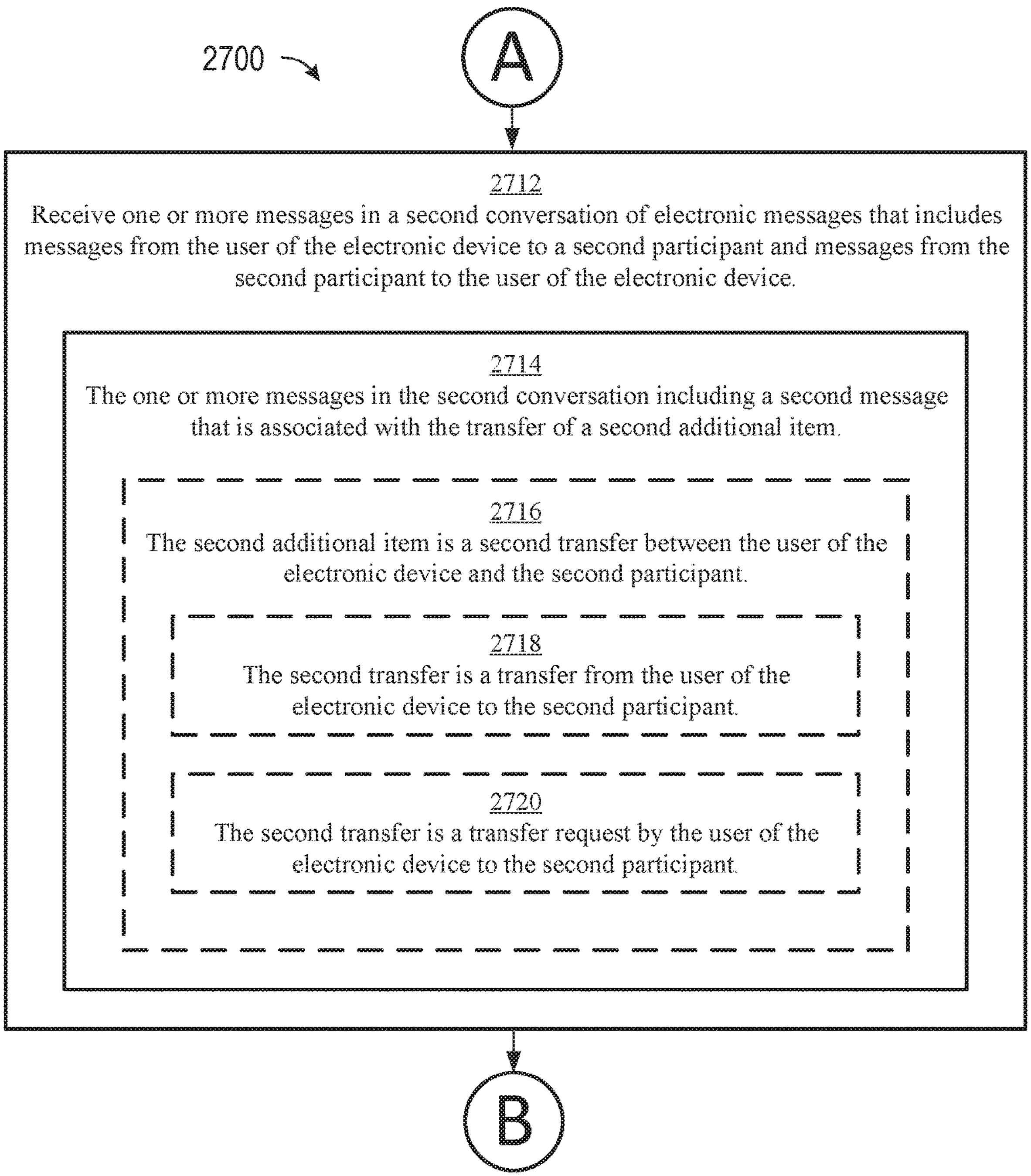
Figure 27C:
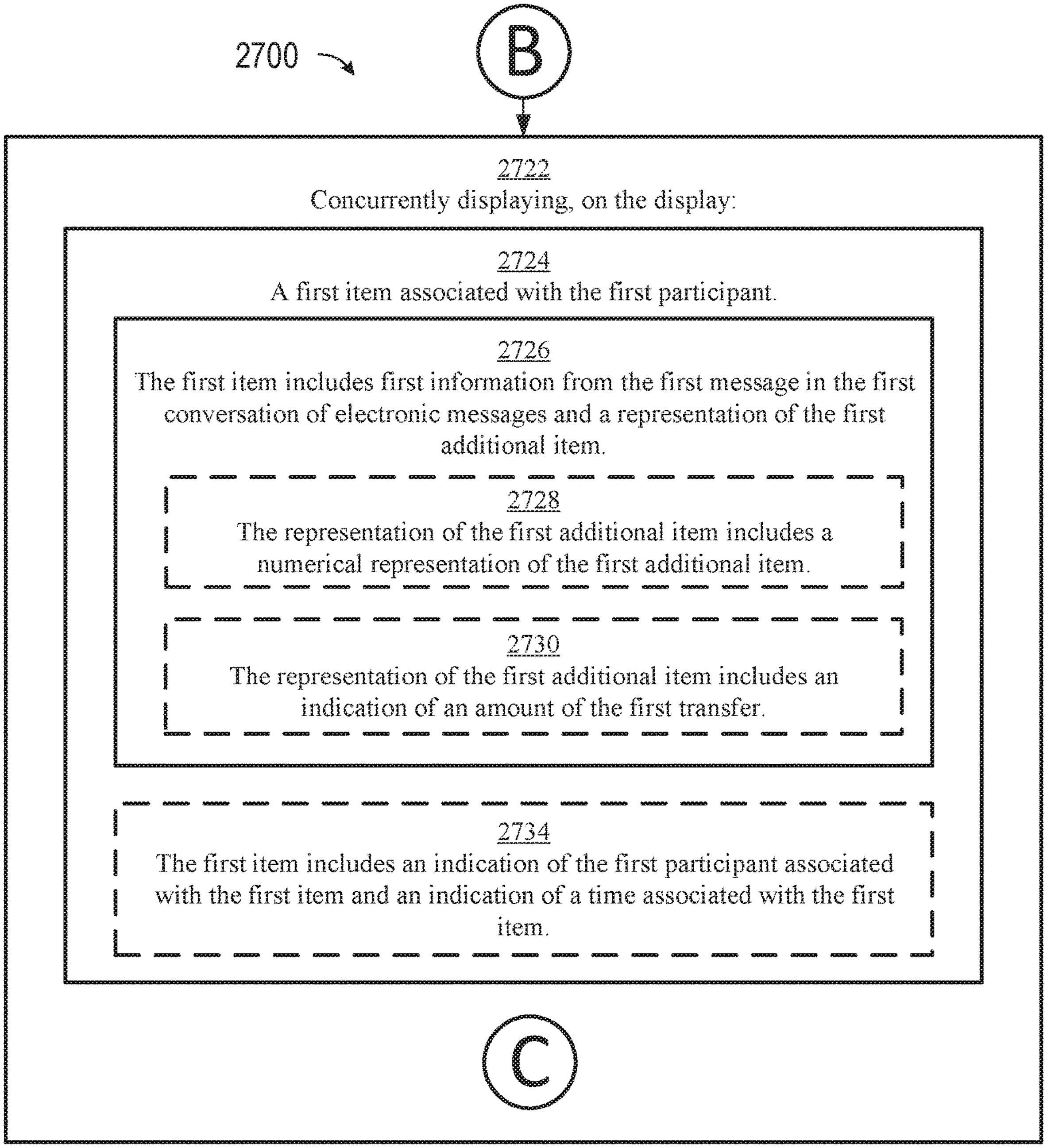
Figure 27D:
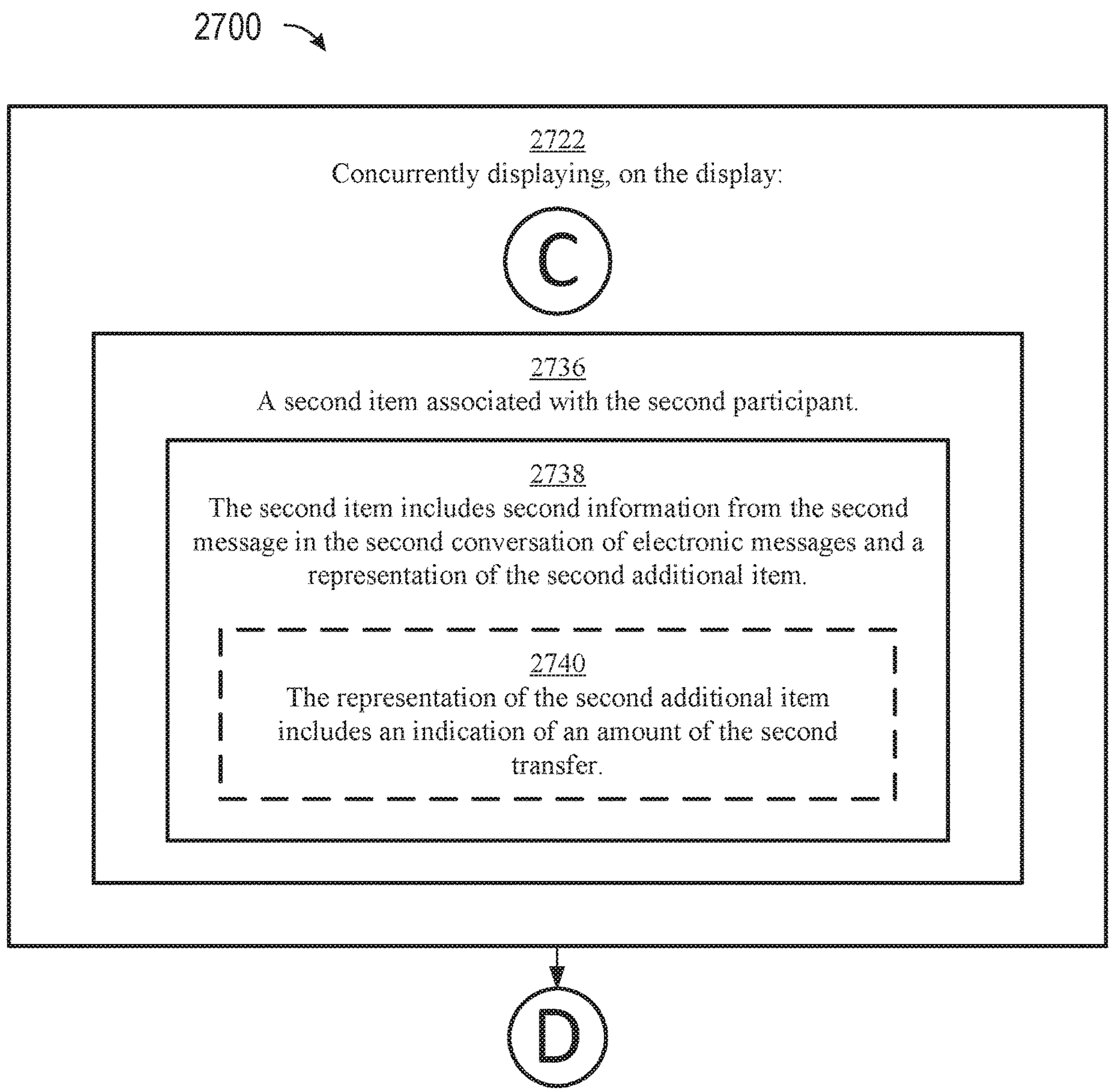

In FIG. 26S, in response to detecting tap gesture 2615 on account information button 2663, electronic device 2600 displays (e.g., replaces display of the payment account-specific page of wallet user interface 2673 with an account information user interface 2659 (of the payment account). In some embodiments, account information user interface 2659 corresponds to the account information view navigable from transactions history user interface 2661 by selecting info tab 2666A from switch bar 2666, as described above with reference to FIG. 26F. Similarly, account information user interface 2659 includes corresponding switch bar 2666 (having corresponding info tab 2666A and corresponding transactions tab 2666B). Because the account information user interface is currently displayed, info tab 2666A is highlighted (e.g., marked with thicker borders). Further, as also shown in FIG. 26S, account information user interface 2659 (of the payment account) includes a graphical representation 2662 (e.g., a thumbnail image, a mini-image) corresponding to the currently-viewed account (e.g., the payment account). In some embodiments, account information user interface 2659 includes a balance indication 2664 (e.g., "$187") of the currently-available amount of funds in the payment account. For example, the balance of the payment account as shown by balance indication 2664 in FIG. 26S is $28 less (e.g., $187 v. $215) than balance of the payment account as shown by balance indication 2664 in FIG. 26F as a result of the payment of $28 made to message participant 2610 via payment message object 2618.

In some embodiments, account information user interface 2659 includes an add funds selectable indication 2659A (e.g., showing "Add Money") for adding funds to the currently-viewed account (e.g., the payment account). In some embodiments, account information user interface 2659 also includes a transfer selectable indication 2659B (e.g., showing "Transfer to Bank") for transferring funds from the payment account to a different account (e.g., a bank account). In some embodiments, account information user interface 2659 also includes, within automatic payment acceptance list 2659C, an "everyone" option 2659D which, when selected, causes electronic device 2600 to automatically accept (e.g., without any user input from the user) an incoming payment (or, in some embodiments, to also automatically accept and agree to an incoming payment request) from any message participant. In some embodiments, account information user interface 2659 also includes, within automatic payment acceptance list 2659C, a "contacts only" option 2659K which, when selected, causes the device to automatically accept (e.g., without any user input from the user) an incoming payment (or, in some embodiments, to also automatically accept and agree to an incoming payment request) from a message participant that corresponds to a contact within a contacts list (e.g., the main contacts list, a favorites contacts list, a trusted contacts list) associated with the user account logged into the device. In some embodiments, account information user interface 2659 also includes, within automatic payment acceptance list 2659C, a manual option 2659E which, when selected, causes electronic device 2600 to automatically accept (e.g., without any user input from the user) an incoming payment (or, in some embodiments, to also automatically accept and agree to an incoming payment request) from a message participant (e.g., message participant 2610) that is a member of a manually created (by the user) list, such as a trusted message participant list. In some embodiments, account information user interface 2659 also includes, within automatic payment acceptance list 2659C, an off option which, when selected, causes electronic device 2600 to not automatically accept (e.g., unless the user provides user input accepting) an incoming payment (or, in some embodiments, to also automatically accept and agree to an incoming payment request) from any message participant.

In some embodiments, account information user interface 2659 also includes an allow requests option 2659F (which may, as shown in FIG. 26S, have a toggle button to switch between an "off" mode and an "on" mode) which, when in the "on" mode, allows the device to receive and provide payment requests from other message participants (e.g., message participant 2610, 2621, 2631) via messaging application 2606 and, when in the "off" mode, disallows the device from receiving and providing payment requests from other message participants (e.g., message participants 2610, 2621, 2631). In some embodiments, account information user interface 2659 also includes a card (or account) details region 2659G which includes account information specific to the currently-viewed account (e.g., the payment account). For example, as shown in FIG. 26S, card details region 2659H includes an indication 2659G of a card number (or an account number) associated with the currently-viewed account (e.g., the payment account), an indication 2659I of a (initial) pin number set for the account (and/or a change pin button for changing the pin number set for the account), and a selectable indication 2659J for deactivating (e.g., de-provisioning from the device) the currently-viewed account (e.g., the payment account). In some examples, the indication 2659G is at least a portion of the card number (or account number).

FIG. 26T shows transactions history user interface 2661, as described above with reference to FIG. 26F. As described above, in some embodiments, account information user interface 2659 corresponds to the account information view navigable from transactions history user interface 2661 by selecting info tab 2666A from switch bar 2666. Similarly, account information user interface 2659 includes corresponding switch bar 2666 (having corresponding info tab 2666A and corresponding transactions tab 2666B). In FIG. 26T, because the account information user interface is currently displayed (e.g., in response to detecting user selection of transactions tap 2666B while viewing account information user interface 2659), transactions tab 2666B is highlighted (e.g., marked with thicker borders).

FIGS. 27A-27E are a flow diagram illustrating a method 2700 for generating and displaying a transfers history list using an electronic device in accordance with some embodiments. Method 2700 is performed at a device (e.g., 100, 300, 500, 2500, 2600) with a display. Some operations in method 2700 are, optionally, combined, the orders of some operations are, optionally, changed, and some operations are, optionally, omitted.

As described below, method 2700 provides an intuitive way for managing peer-to-peer transactions. The method reduces the cognitive burden on a user for managing peer-to-peer transactions, thereby creating a more efficient human-machine interface. For battery-operated computing devices, enabling a user to manage peer-to-peer transactions faster and more efficiently conserves power and increases the time between battery charges.

The electronic device (e.g., 2500, 2600) receives (2702) one or more messages (e.g., one or more text messages, one or more emails) in a first conversation (e.g., 2608) of electronic messages (e.g., a text conversation thread, an email thread) that includes messages from a user of the electronic device to a first participant (e.g., 2510, 2610) and messages from the first participant (e.g., a first friend) to the user of the electronic device. The one or more messages in the first conversation (e.g., 2508, 2608) include (2704) a first message (e.g., from the first participant or the user) that is associated with the transfer of a first additional item (e.g., a photo, video, file, or payment).

In some examples, the first additional item is (2706) a first transfer between the user of the electronic device and the first participant (e.g., 2510, 2610). In some examples, the first transfer is a first media transfer. In some examples, the first transfer is a first payment transfer.

In some examples, the first transfer is (2708) a transfer from the user of the electronic device to the first participant (e.g., 2510, 2610). In some examples, the first transfer from the user of the device to the first participant is a media transfer from the user of the device to the first participant. In some examples, the first transfer from the user of the device to the first participant is a payment from the user of the device to the first participant.

In some examples, the first transfer is (2710) a transfer request by the user of the electronic device to the first participant (e.g., 2510, 2610).

The electronic device (e.g., 2500, 2600) receives (2712) one or more messages (e.g., one or more text messages, one or more emails) in a second conversation (e.g., 2509, 2630) of electronic messages (e.g., a text conversation thread, an email thread) that includes messages from the user of the electronic device to a second participant (e.g., 2530, 2621) and messages from the second participant (e.g., a second friend different from the first friend) to the user of the electronic device. The one or more messages in the second conversation include (2714) a second message (e.g., from the second participant or the user) that is associated with the transfer of a second additional item (e.g., a photo, video, file, or payment).

In some examples, the second additional item is (2716) a second transfer between the user of the electronic device and the second participant (e.g., 2530, 2621). In some examples, the second transfer is a second media transfer. In some examples, the second transfer is a second payment transfer.

In some examples, the second transfer is (2718) a transfer from the user of the electronic device to the second participant (e.g., one of 2510, 2530, 2610, 2621, 2631 that does not correspond to the first participant). In some examples, the second transfer from the user of the device to the second participant is a media transfer from the user of the device to the second participant. In some examples, the second transfer from the user of the device to the second participant is a payment from the user of the device to the second participant.

In some examples, the second transfer is (2720) a transfer request by the user of the electronic device to the second participant.

The electronic device (e.g., 2500, 2600) concurrently displays (2722), on the display (e.g., 2502, 2602), a first item (e.g., 2552, 2670) (2724) associate with the first participant and a second item (e.g., 2556, 2674) (2736) associated with the second participant. Concurrently displaying multiple items (e.g., the first item and the second item) that include information from messages of different conversations provides the user with visual feedback that the items are related to transfers while allowing the user to concurrently view the information from the different conversations. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the first item (e.g., 2552, 2670) includes an indication (e.g., 2670A, a photo, a name) of the associated contact (participant) and other information (e.g., transaction information, such as an amount of the transaction, a time of the transaction, a location of the transaction) related to a conversation with the associated contact. The first item includes (2726) first information (e.g., 2622) from the first message in the first conversation of electronic messages and a representation of the first additional item (e.g., 2552B, 2670B).

In some examples, the representation of the first additional item (e.g., 2552B, 2670B) includes (2728) a numerical representation (e.g., a size (bytes), an edit date, an amount of funds) of the first additional item. In some examples, the first additional item is a video file, and thus the representation of the first additional item includes a size (bytes) and/or edit date of the video file. In some examples, the second additional item is a photo, and thus the representation of the second additional item includes a size (bytes) and/or edit date of the photo.

In some examples, the representation of the first additional (e.g., 2552B, 2670B) item includes (2730) an indication (e.g., 3.1 MB, $20.17) of an amount of the first transfer. In some examples, the amount is an amount of resource. In some examples, the amount is an amount of storage used or size (e.g., in bytes). In some examples, the amount is an amount of funds/currency.

In some examples, the first item (alternatively, or in addition, the second item) (e.g., the first item and/or the second item) includes (2734) an indication (e.g., 2552A, 2670A) of the first participant (alternatively, the second participant) (e.g., the first participant or the second participant) associated with the first item and an indication of a time (e.g., the time the message associated with the item was sent/received) associated with the first item. Displaying indications of participants and time provides the user with visual feedback about what other people were involved in the transfer and when the transfer took place. Such information is particularly helpful when transfers using the same account are grouped together, providing the user with a summary of transfers for a particular account and the corresponding details of the transfers. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

The second item includes (2738) second information from the second message in the second conversation (e.g., 2509, 2630) of electronic messages and a representation of the second additional item (e.g., 2556B, 2674B). Concurrently displaying multiple items (e.g., the first item and the second item) that include information from messages of different conversations provides the user with visual feedback that the items are related to transfers while allowing the user to concurrently view the information from the different conversations. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the representation of the second additional item (e.g., 2556B, 2674B) includes (2740) an indication (e.g., 3.1 MB, $5.16) of an amount of the second transfer. In some examples, the amount is an amount of resource. In some examples, the amount is an amount of storage used or size (e.g., in bytes). In some examples, the amount is an amount of funds/currency.

In some examples, the first additional item is a video file and the second additional item is a photo.

In some examples, the electronic device (e.g., 2500, 2600) detects an input (e.g., on a touch-sensitive surface of the electronic device) at a location corresponding to the first item (e.g., 2552, 2670). In response to detecting the input at the location corresponding to the first item (e.g., 2552, 2670), and in accordance with a determination that the location corresponds to the representation of the first additional item, the electronic device displays an item-specific user interface (e.g., an item detail page including details associated with the first message). In response to detecting the input at the location corresponding to the first item, and in accordance with a determination that the location does not correspond to the representation of the first additional item, the electronic device displays a first participant-specific user interface (e.g., 2686, a contact detail page including several different items associated with the participant).

In some examples, the first item (e.g., 2552, 2670) (alternatively, or in addition, the second item) corresponds to a pending (e.g., not yet completed) payment transaction and the representation of the first additional item (e.g., 2552B, 2670B) (alternatively, the representation of the second additional item) includes an indication of an amount (of funds) of the pending payment transaction. The electronic device (e.g., 2500, 2600) receives user input on the representation of the first additional item (e.g., 2552B, 2670B) of the first item (alternatively, the second item). In response to receiving the user input, the electronic device displays, on the display (e.g., 2502, 2602), an authentication user interface requesting authentication information (e.g., biometric authentication information, such as a fingerprint for fingerprint authentication, facial features for facial recognition, voice input for voice recognition, iris/retina scan for iris/retina identification) for authorizing the transaction. Displaying a request for authentication provides the user with visual feedback about the state of the device (state in which authentication is required) and prompts the user to provide the authentication (e.g., through biometric authentication, such as via a fingerprint authentication or facial recognition). Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the first item (e.g., 2552, 2670) (alternatively, or in addition, the second item) corresponds to a payment sent to the user by the first participant (alternatively, the second participant) (e.g., the first participant or the second participant) associated with the first item. In some examples, the first item includes an affordance (e.g., 2624) for transferring an amount of the payment to an external account (e.g., a linked bank account of the user) associated with the user. In some examples, upon receiving user selection of the affordance, funds equivalent to the amount of the payment received from the participant is transferred to a default account of the user, such as a default stored-value account (e.g., a debit account).

In some examples, the first participant-specific user interface (e.g., 2686) includes contact information (e.g., a phone number, an email address, a webpage URL) associated with the first participant and a list of one or more first participant-specific items (e.g., 2696, 2698, 2695, 2693, previous items associated with the participant, wherein the previous items each include information form an associated message in a conversation of electronic messages), including the first item, associated with the first participant. Displaying information about the participant provides the user with additional context and visual feedback about the transfer and enables the user to easily contact the participant (e.g., by activating a phone number affordance in the participant-specific user interface) to discuss the transfer. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the first item-specific user interface includes (2746) a representation of content (2748) (e.g., a preview or mini-representation of the first additional item, such as a preview of a photo, video, or file or an indication of a payment amount) associated with the first item, an indication of the first participant (2750), and an indication of a time (2752) (e.g., the time the first message was sent/received) associated with the first message. Displaying information about an item provides the user with additional context relating to the item and provides the user with visual feedback about the item. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the representation of the first additional item includes a status indicator (e.g., "pending," "completed") associated with the first transfer and an affordance for viewing additional details (e.g., date and time of the transaction, participants in the transaction, location of the transaction) associated with the first transfer. In some examples, the electronic device (e.g., 2500, 2600) detects user activation of the affordance for viewing additional details associated with the first transfer. In response to detecting the user activation of the affordance, the electronic device displays, on the display (e.g., 2502, 2602), a detail user interface. The detail user interface includes (e.g., concurrently displayed): the first information from the first message in the first conversation of the electronic messages, an authorization affordance for authorizing the first transfer, and a cancel affordance for cancelling (e.g., refusing) the first transfer.

In some examples, the electronic device (e.g., 2500, 2600) detects user activation of the authorization affordance. In response to detecting the user activation of the authorization affordance, the electronic device displays an authentication user interface for requesting authentication information (e.g., biometric authentication, such as a fingerprint, facial recognition, iris scan, retina scan authentication). The electronic device receives the authentication information. In accordance with a determination that the received authentication information is consistent with (e.g., matches, corresponds to) enrolled authentication information (stored on the device) for authorizing transactions, the electronic device authorizes the first transfer and updates display of the first message (e.g., changing a color, changing a shade, changing a pattern, changing a status indicator) in the first conversation of electronic messages to indicate that the first transfer has been authorized. In accordance with a determination that the received authentication information is not consistent with the enrolled authentication information for authorizing transactions, the electronic device forgoes authorizing the first transfer and, optionally, does not update display of the first message (e.g., changing a color, changing a shade, changing a pattern, changing a status indicator) in the first conversation of electronic messages to indicate that the first transfer has been authorized.

In some examples, the electronic device (e.g., 2500, 2600) detects user activation of the cancel affordance. In response to detecting the user activation of the cancel affordance, the electronic device displays, on the display (e.g., 2502, 2602), the first conversation of electronic messages. The first conversation (e.g., 2508, 2608) includes an indication (e.g., a new message indicating) that the first transfer has been canceled. In some examples, the electronic device further updates display of the first message (e.g., 2520, 2618, changing a color, changing a shade, changing a pattern, changing a status indicator) to indicate that the first payment transfer has been canceled. In some examples, the electronic device updates display of the first message (e.g., 2520, 2618) to indicate that the first payment transfer has been canceled. Updating the display of a message to reflect a change in status (e.g., from pending to canceled) provides the user with visual feedback about the state of the message and that a request made by the user (e.g., to cancel a payment transfer) has been received (and implemented) by the device. Providing improved visual feedback to the user enhances the operability of the device and makes the user-device interface more efficient which, additionally, reduces power usage and improves battery life of the device by enabling the user to use the device more quickly and efficiently.

In some examples, the first item corresponds to a pending (e.g., not yet completed) payment transaction and the second item corresponds to a completed payment transaction.

In some examples, the first item-specific user interface includes an annotation of text in the first message in the first conversation of electronic messages.

In some examples, the first item-specific user interface includes an annotation of text from one or more messages that are adjacent to the first message (including or not including the first message) (e.g., a previous message received immediately before the first message, a subsequent message received immediately after the first message) in the first conversation of electronic messages. Displaying text from adjacent messages in the conversations provides the user with visual feedback regarding the context of the item, such as why the item was sent to the user or what event the item corresponds to. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device), which, additionally, reduces power usage and improves battery life of the device by enabling the user to use the device more quickly and efficiently.

In some examples, the first item (e.g., 2552, 2670) and the second item (e.g., 2556, 2674) correspond to transactions made using a first payment account (e.g., a default account, a debit account, a stored-value account). Prior to concurrently displaying, on the display, the first item (e.g., 2552, 2670) and the second item (e.g., 2556, 2674), the electronic device (e.g., 2500, 2600) displays, on the display (e.g., 2502, 2602), a representation (e.g., 2669, a graphical representation, such as a thumbnail image of the payment account or a preview image of the payment account) of the first payment account. The electronic device receives user selection of the representation of the first payment account (e.g., 2669). In response to receiving the user selection of the representation of the first payment account, the electronic device concurrently displays, on the display, a list of items (e.g., 2670, 2674, 2678, 2680, 2684) associated with the first payment account. The list of items (e.g., 2670, 2674, 2678, 2680, 2684) includes the first item (e.g., 2552, 2670) and the second item (e.g., 2556, 2674). Concurrently displaying a list of items (e.g., corresponding to messages of different conversations) provides the user with visual feedback about transfers that used the first payment account. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, in accordance with a determination that the first item (alternatively, the second item) is associated with a transfer of an amount of funds from the user to the first participant (alternatively, the second participant) associated with the first item, the electronic device forgoes adding a directional indicator (e.g., a "+" symbol or a "−" symbol) to a numerical representation of the amount of funds included in the first item. In some examples, in accordance with a determination that the first item (e.g., 2670) (alternatively, the second item) is associated with a transfer of the amount of funds to the user from the first participant (alternatively, the second participant) associated with the first item, the electronic device adds the directional indicator (e.g., a "+" symbol) to the numerical representation of the amount of funds included in the first item. Visually differentiating between transfers from and to the user by including or not including a particular indicator provides the user with visual feedback about the direction of flow of resources (e.g., funds) between the user and others. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, the first item (e.g., 2552, 2670) includes a graphical indication (e.g., a photo of the participant, a picture of the participant) of the first participant associated with the first item. In some examples, if the first participant is not an individual but a commercial entity (e.g., a company), the graphical indication is a logo associated with the commercial entity. In some examples, the second item includes a graphical indication (e.g., a photo of the participant, a picture of the participant) of the second participant associated with the second item.

In some examples, the representation of the first additional item (alternatively, the representation of the second additional item) includes a thumbnail image of the first additional item. In some examples, the first additional item is a video file, and thus the representation of the first additional item includes a thumbnail image (e.g., a preview image) of the video file. In some examples, the second additional item is a photo, and thus the representation of the second additional item includes a thumbnail image (e.g., a smaller image) of the photo.

In some examples, transactions between participants may be commercial transactions between the user of the electronic device and a merchant. In some examples, the user of the electronic device makes a payment to a merchant or requests a payment from the merchant. In some examples, the merchant makes a payment (e.g., refund of previous purchase) to the user of the electronic device or requests payment (e.g., for a good or service) from the user of the electronic device.

Note that details of the processes described above with respect to method 2700 (e.g., FIGS. 27A-27E) are also applicable in an analogous manner to the methods described herein. For example, method 2700 optionally includes one or more of the characteristics of the various methods described herein with reference to methods 900, 1200, 1500, 1800, 2100, 2400, 3000, and 3400. For example, a payment message object created to transfer the first type of item (e.g., a sticker, a photo, a payment object), as described in method 900, can be selected to view the item-specific user interface. For another example, the outputting of feedback, as described in method 1200, can be applied to a representation of a first item (e.g., 2689) shown in the first item-specific user interface (e.g., 2691). For another example, the message objects with different visual appearances based on whether the message object corresponds to a transmission message or a request message, as described in method 1500, can be selected to view the first item-specific user interface. For another example, a request for activating an account that is authorized to obtain one or items (e.g., a sticker, a photo, resources, a payment), as described in method 1800, can be applied when setting up the account associated with first item and the second item. For another example, switching the account to be used in a resource transfer based on an indication that resources are insufficient in the currently-selected account, as described in method 2100, can be used when proceeding with a transfer from first participant-specific user interface (e.g., 2686) suing the first item (e.g., 2696). For another example, automatically proceeding with a transfer, as described in method 2400, instead of requiring user input, can be used when proceeding with a transfer for the first item-specific user interface or the first participant-specific user interface. For another example, an utterance can be used, as described in method 3000, to initiate a transfer (e.g., initiate a payment) while viewing first participant-specific user interface (e.g., 2686) via the first item (e.g., 2696). For another example, a visual effect (e.g., a coloring effect, a geometric alteration effect) can be applied, as described in method 3400, to an element (e.g., 2622) of a message object (e.g., 2644) when a transfer (e.g., of a resource, of a file, of a payment) associated with a message corresponding to the message object is completed. For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 27A-27E are, optionally, implemented by components depicted in FIGS. 1A-1B. For example, receiving operation 2702 and displaying operation 2722, are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 28A-28F illustrate example user interfaces for managing peer-to-peer transfers, in accordance with some embodiments. As described in greater detail below, the non-limiting example embodiment of the user interfaces illustrated in FIGS. 28A-28F relate to the non-limited example embodiment of the user interfaces illustrated in FIGS. 29A-29S.

Figure 28A:
FIGS. 28A-28F illustrate example user interfaces for voice-activation of file transfers, in accordance with some embodiments.

FIG. 28A illustrates an electronic device 2800 (e.g., portable multifunction device 100, device 300, or device 500). In the non-limiting example embodiment illustrated in FIGS. 28A-28F, electronic device 2800 is a smartphone. In other embodiments, electronic device 2800 can be a different type of electronic device, such as a wearable device (e.g., a smartwatch).

In FIG. 28A, the user (e.g., "Kate Appleseed") of electronic device 2800 is providing (e.g., while a digital assistant user interface of a digital assistant is shown on a display of the device) a spoken user input containing a request. For example, as shown in FIG. 28A, the user provides spoken user input 2801 stating "Send the 5 photos from last night to John," thus requesting that the device send 5 photos from last night to intended recipient John Appleseed.

Figure 28B:
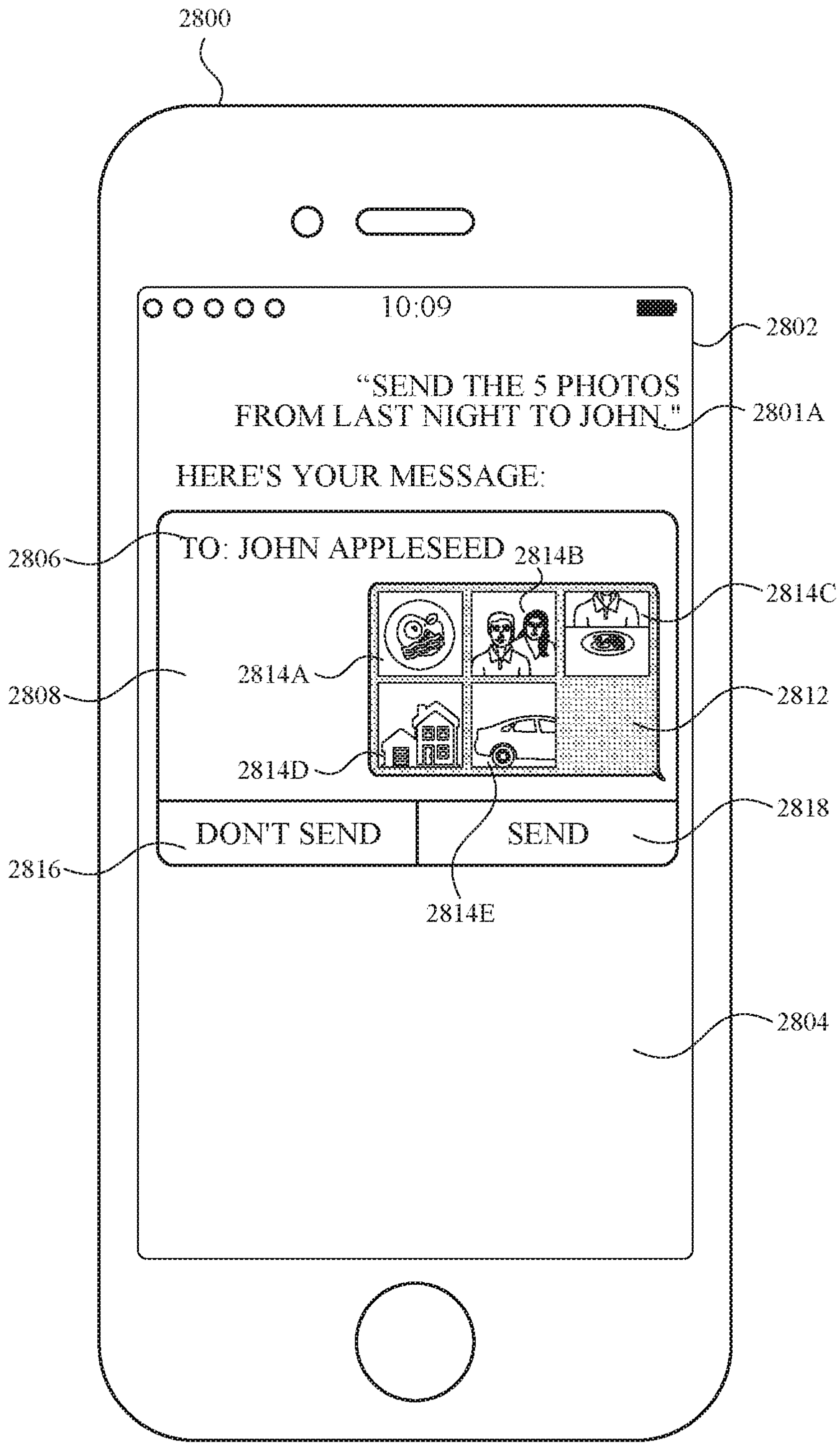
Figure 29A:
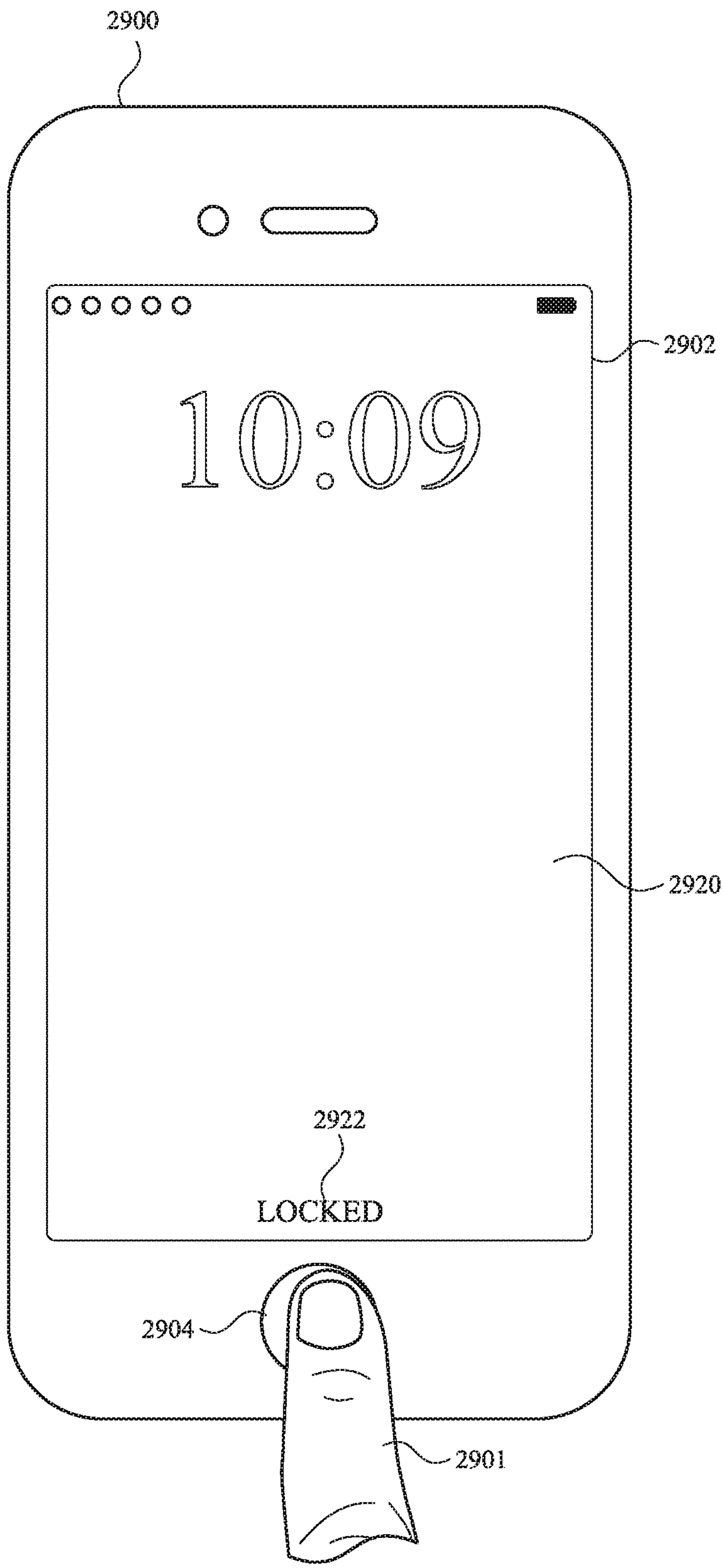
FIGS. 29A-29S illustrate example user interfaces for voice-activation of transfers, in accordance with some embodiments.

FIG. 28B shows electronic device 2800 displaying, on a display 2802 of the device, a digital assistant user interface 2804 of the digital assistant following the request received via spoken user input 2801. Specifically, in response to receiving spoken user input 2801 stating "Send the 5 photos from last night to John," the device performs speech recognition and natural language processing on the spoken user input and displays, on display 2802, a transcription 2801A corresponding to spoken user input 2801 (e.g., to provide confirmation that the user's intended input was received by the device). Further, from the performed speech recognition and natural language processing on the spoken user input, a determination is made (e.g., by the device or by an external device, such as a server, communicating with the device) of a user intent (e.g., an intent to send the 5 photos from last night to John Appleseed).

In accordance with a determination (e.g., made by the device or made by an external device, such as a server, communicating with the device) that the user's intent, based on spoken user input 2801, is to send one or more files (e.g., photos, video files, audio files, documents) to an intended recipient (e.g., to send John Appleseed the 5 photos from last night), electronic device 2800 displays within digital assistant user interface 2804 a message object box 2808 that includes a draft transfer message object 2812 corresponding to the requested transfer of photos determined from spoken user input 2801. As shown in FIG. 28B, draft transfer message object 2812 includes a plurality of mini-file objects 2814A-E corresponding to the 5 photos to be sent to John Appleseed. In some embodiments, message object box 2808 also includes an indication 2806 of the intended recipient (e.g., stating "John Appleseed") of the transfer. In some embodiments, message object box 2808 includes a send button 2818 (for proceeding with the transfer of the transfer message object associated with 5 selected photos as shown by message object box 2808) and a forgo sending button 2816 (for cancelling proceeding with the transfer of the transfer message object associated with 5 selected photos as shown by message object box 2808).

Figure 28C:
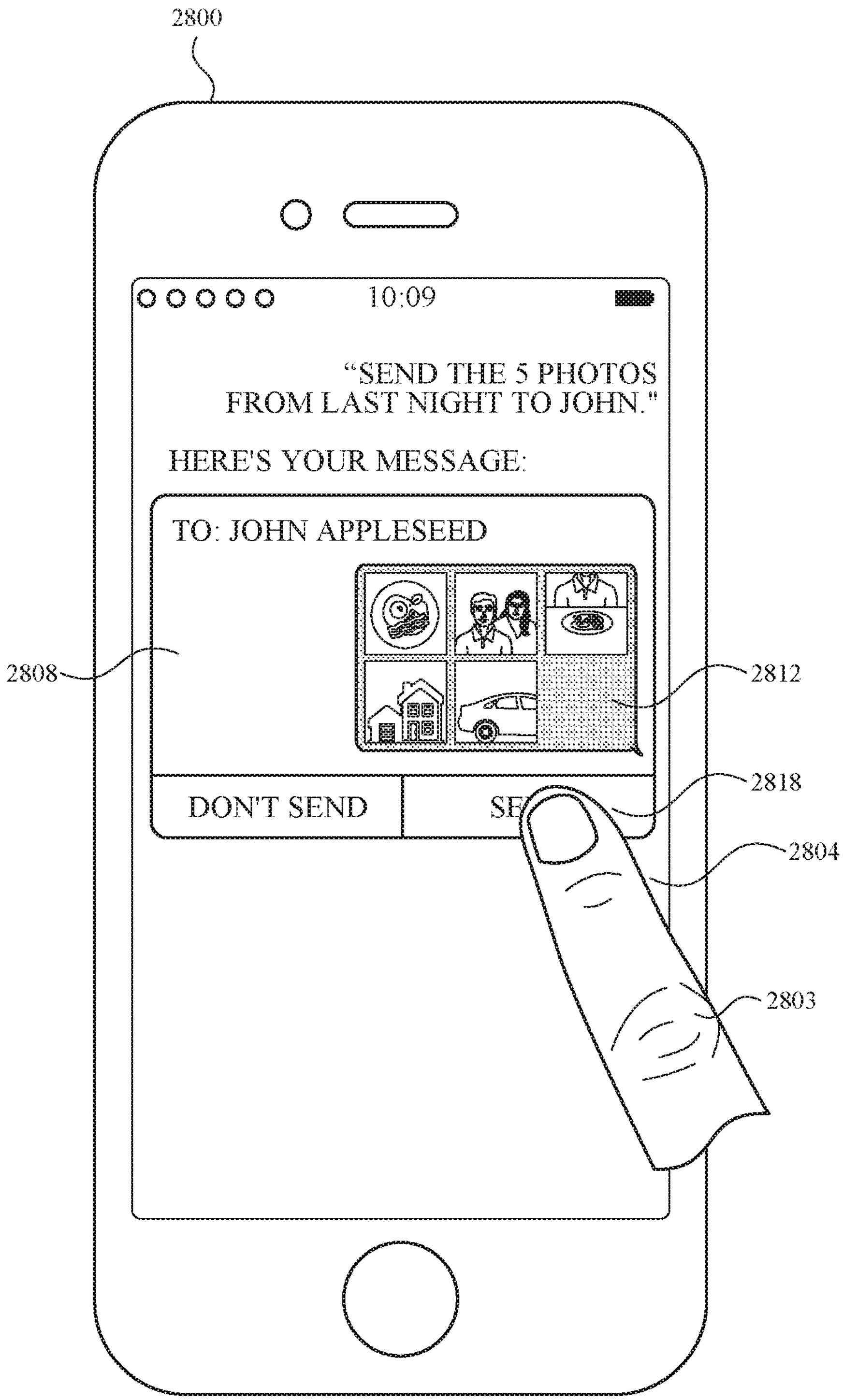

In FIG. 28C, while displaying message object box 2808 on digital assistant user interface 2804, electronic device 2800 detects user activation of send button 2818 for proceeding with the transfer of the selected 5 photos as indicated by draft transfer message object 2812 of the message object box. For example, as shown in FIG. 28C, the user activation is a tap gesture 2803 on send button 2818. In some embodiments, the user activation is made via a spoken user input (e.g., "Send the selected photos") to the digital assistant.

Figure 28D:
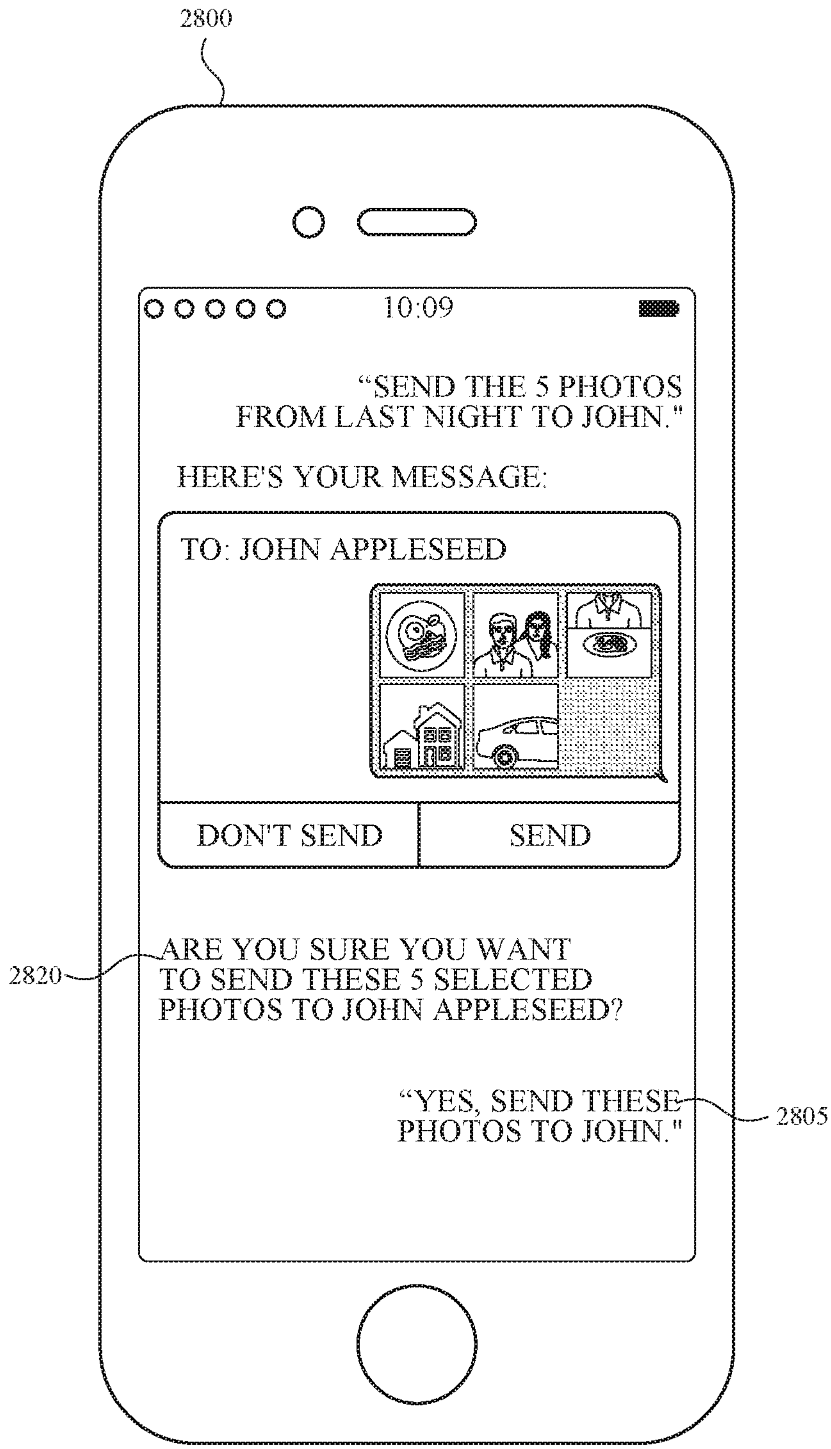

In some embodiments, as shown in FIG. 28D, in response to detecting user input 2803 on send button 2818 for proceeding with the transfer as shown in draft transfer message object 2812 of message object box 2808, electronic device 2800 displays on digital assistant user interface a confirmation request 2820 (e.g., stating "Are you sure you want to send these 5 selected photos to John Appleseed?"). As shown in FIG. 28D, the user provides the device with (e.g., via a voice input) the requested confirmation 2805 (e.g., stating "Yes, send these photos to John.").

Figure 28E:
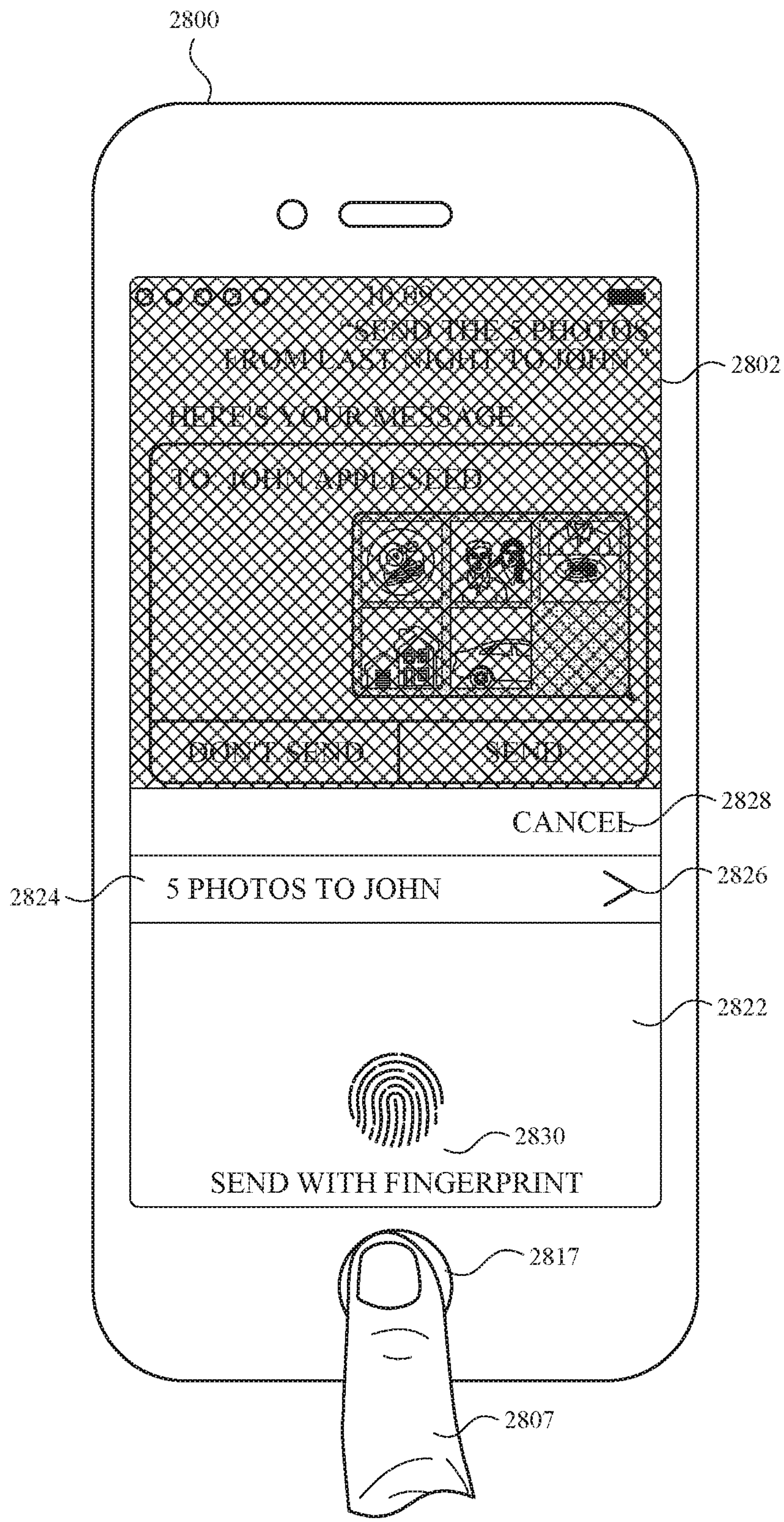

In some embodiments, as shown in FIG. 28E, in response to receiving requested confirmation 2805, electronic device 2800 displays (e.g., over at least a portion of digital assistant user interface 2804) a transfer confirmation user interface 2822. In some embodiments, transfer confirmation user interface 2822 includes an authentication request 2830 (e.g., a graphical request, a textual request) requesting that the user provide authentication information (e.g., "Send with Fingerprint") to proceed with transmitting the selected files (e.g., the 5 photos corresponding to mini-file objects 2814A-2814E) to the intended recipient (e.g., "John Appleseed"). In some embodiments, as also shown in FIG. 28E, transfer confirmation user interface 2822 includes an indication 2824 (e.g., "5 photos to John") of the items (e.g., files, photos, video files, audio files, documents) that will be transferred and the intended recipient of the transfer, a change button 2826 for changing the items to be sent and/or changing one or more intended recipients of the transfer, and a cancel button 2828 for cancelling the transfer.

In FIG. 28E, while displaying transfer confirmation user interface 2822, electronic device 2800 detects a user input that corresponds to the requested authentication information for proceeding with the transfer. For example, as shown in FIG. 28E, the user input is a fingerprint input 2807 on a fingerprint sensor of a mechanical button 2817 of the device.

Figure 28F:
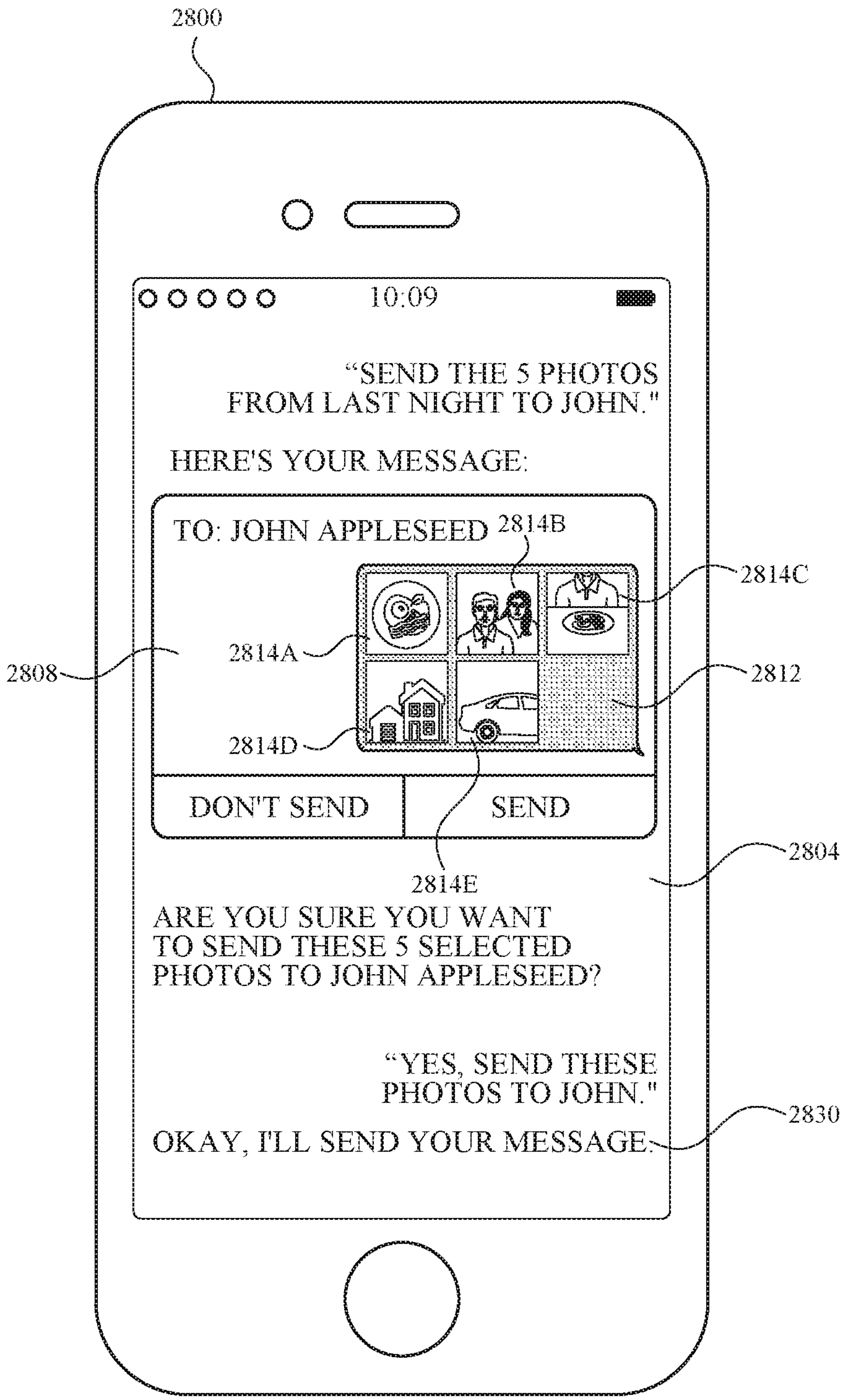

In FIG. 28F, in response to a determination that authentication was successful, the digital assistant provides, on digital assistant user interface 2804 (e.g., below message object box 2808), an affirmation 2830 (e.g., stating "Okay, I'll send your message") informing the user that a transfer message object corresponding to draft transfer message object 2812 will be sent (e.g., via a messaging application) to the intended recipient (e.g., "John Appleseed") with the associated files (e.g., the 5 photos corresponding to mini-file objects 2814A-E of draft transfer message object 2812).

As mentioned above, the non-limiting example embodiment of the user interfaces illustrated in FIGS. 28A-28F described above relate to the non-limited example embodiment of the user interfaces illustrated in FIGS. 29A-29S described below. Therefore, it is to be understood that the processes described above with respect to the example user interfaces illustrated in FIGS. 28A-28F and the processes described below with respect to the example user interfaces illustrated in FIGS. 29A-29S are largely analogous processes that similarly involve initiating and managing transfers using an electronic device (e.g., 100, 300, 500, 2800, or 2900).

FIGS. 29A-29S illustrate example user interfaces for voice-activation of transfers, in accordance with some embodiments. The user interfaces in these figures are used to illustrate the processes described below, including the processes in FIGS. 30A-30D.

FIG. 29A illustrates an electronic device 2900 (e.g., portable multifunction device 100, device 300, or device 500). In the non-limiting example embodiment illustrated in FIGS. 29A-29S, electronic device 2900 is a smartphone. In other embodiments, electronic device 2900 can be a different type of electronic device, such as a wearable device (e.g., a smartwatch). Electronic device 2900 has a display 2902 and one or more input devices (e.g., touchscreen of display 2902, a mechanical button 2904, a mic).

In FIG. 29A, electronic device 2900 displays, on display 2902, a user interface locked screen 2920. In some embodiments, a user interface locked screen is displayed when the device is in a user interface locked state (e.g., a state where one or more functions of the operating system is prohibited from use by a user (e.g., "Kate Appleseed") of the device). In some embodiments, user interface locked screen 2920 includes an indication 2922 that the device is in the user interface locked state.

In some embodiments, in FIG. 29A, while electronic device 2900 remains in the user interface locked state, the device receives a user input initiating a digital assistant of the device. For example, as shown in FIG. 29A, the user input is a press-and-hold gesture 2901 on a home button (e.g., mechanical button 2904) of the device. In some embodiments, the device receives the user input (e.g., press-and-hold gesture 2901, detecting a press of button 2904 for longer than a threshold duration) while the device is in a user interface unlocked state. In some embodiments, the user input is (instead of press-and-hold gesture 2901) a voice input (e.g., call for, via speech, the digital assistant), detected via a mic of the device, for initiating the digital assistant of the device.

The digital assistant of electronic device 2900 is a (voice-controlled) digital assistant that can respond to the user's spoken requests. In order to do so, the digital assistant requires speech recognition capability. In some examples, speech recognition is performed using speech-to-text (STT) processing, such as through an Automatic Speech Recognition (ASR) system. One or more ASR systems can process the speech input to produce a recognition result. Each ASR system includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., the electronic device) to produce the recognition result. Once the STT processing produces recognition results containing a text string (e.g., words, or sequence of words, or sequence of tokens), the recognition result is passed to a natural language processing module for intent deduction. In some examples, STT processing produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing ranks the candidate text representations and provides the n-best (e.g., n highest ranked) candidate text representation(s) to the natural language processing module for intent deduction, where n is a predetermined integer greater than zero. For example, in one example, only the highest ranked (n=1) candidate text representation is passed to the natural language processing module for intent deduction. In another example, the five highest ranked (n=5) candidate text representations are passed to the natural language processing module for intent deduction. More details on the speech-to-text processing are described in U.S. Utility application Ser. No. 13/236,942 for "Consolidating Speech Recognition Results," filed on Sep. 20, 2011, the entire disclosure of which is incorporated herein by reference.

The natural language processing module ("natural language processor") of a digital assistant takes the n-best candidate text representation(s) ("word sequence(s)" or "token sequence(s)") generated by STT processing, and attempts to associate each of the candidate text representations with one or more "actionable intents" recognized by the digital assistant. An "actionable intent" (or "user intent") represents a task that can be performed by the digital assistant. The associated task flow is a series of programmed actions and steps that the digital assistant takes in order to perform the task. The scope of a digital assistant's capabilities is dependent on the number and variety of task flows that have been implemented and stored in various task flow models, or in other words, on the number and variety of "actionable intents" that the digital assistant recognizes. The effectiveness of the digital assistant, however, also dependents on the assistant's ability to infer the correct "actionable intent(s)" from the user request expressed in natural language. Other details of inferring a user intent based on candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Figure 29B:
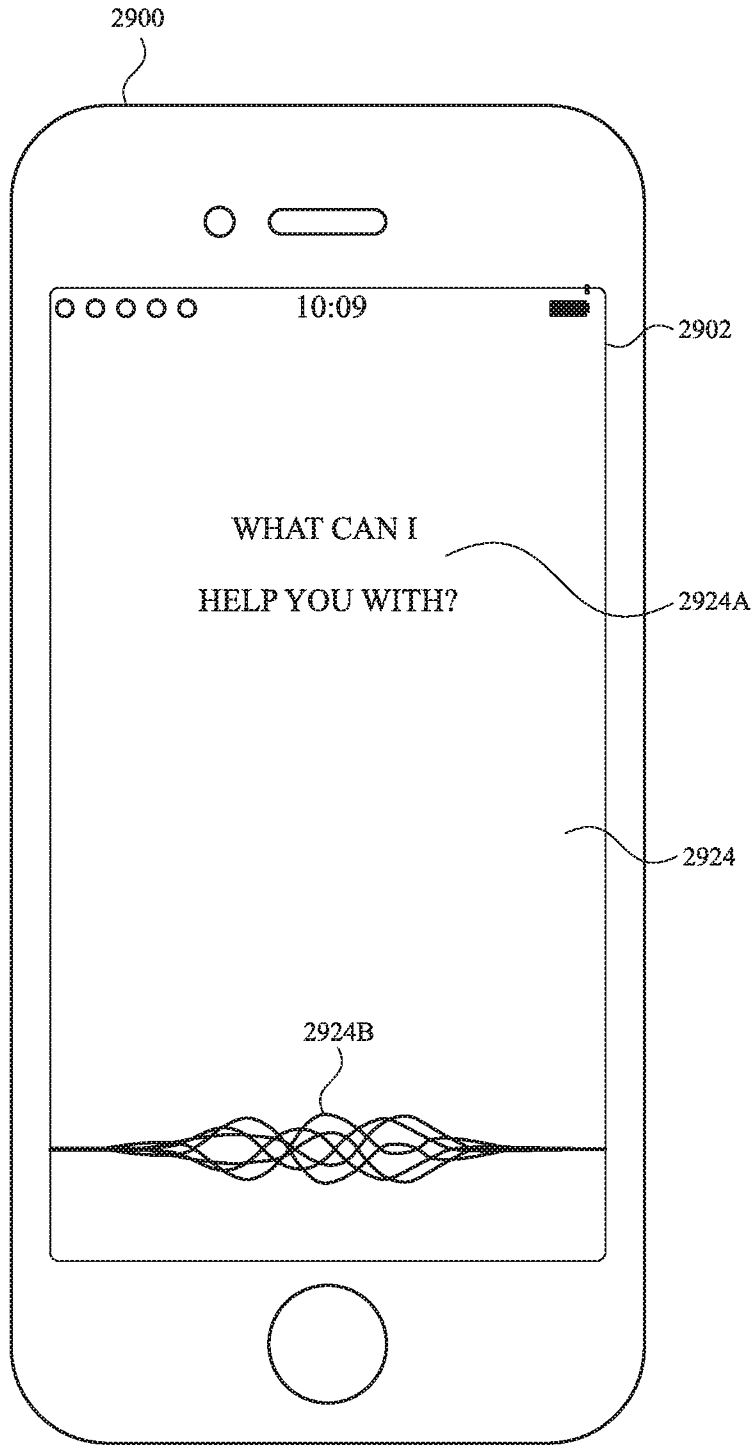

In FIG. 29B, in response to receiving press-and-hold gesture 2901 on mechanical button 2904 to activate the digital assistant of electronic device 2900, the device displays, on display 2902, a digital assistant user interface 2924 that includes an indication 2924A (e.g., stating "What Can I Help You With?") indicating to the user that the digital assistant is ready to assist the user, and a graphical indication 2924B showing whether the user's speech input is being (or is not being) detected by the device. For example, graphical indication 2924B dynamically changes shape as the device detects and while the device is detecting the user's spoken input.

Figure 29C:
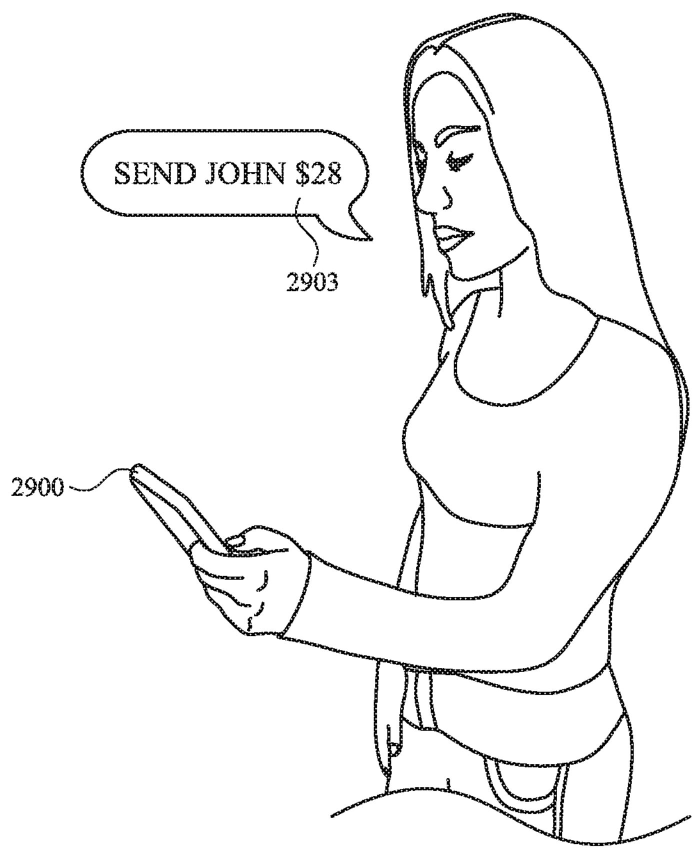

FIG. 29C shows the user (e.g., "Kate Appleseed") providing electronic device 2900 (e.g., while digital assistant user interface 2924 is shown on the display) with a spoken user input containing a request. For example, as shown in FIG. 29C, the user provides spoken user input 2903 stating "Send John $28," thus requesting that the device send to recipient John Appleseed a payment in the amount of $28.

Figure 29D:
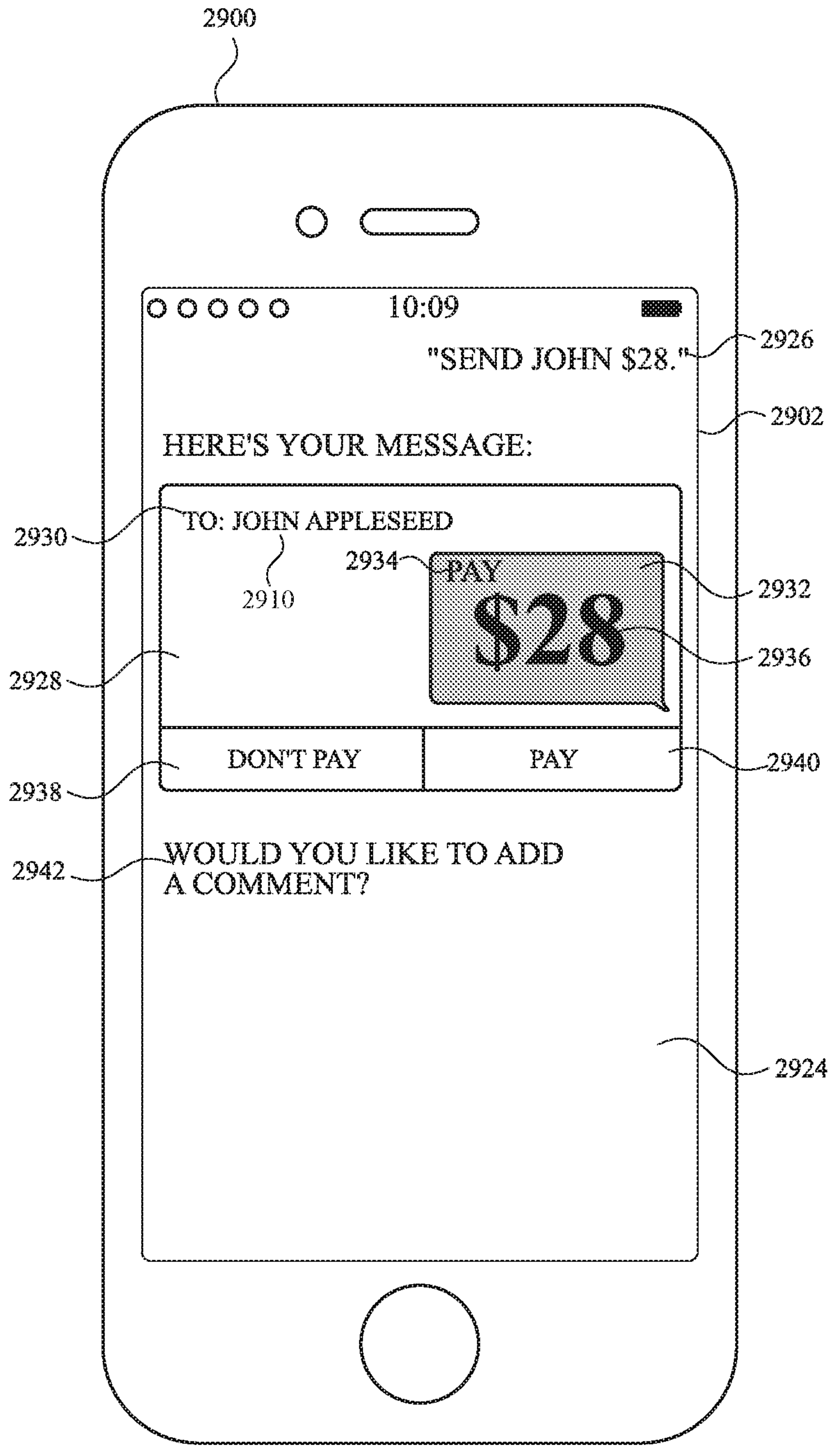

FIG. 29D shows digital assistant user interface 2924 following the request received via spoken user input 2903. Specifically, in response to receiving spoken user input 2903 stating "Send John $28," the electronic device 2900 performs speech recognition and natural language processing on the spoken user input and displays, on display 2902, a transcription 2926 of spoken user input 2903 (e.g., to provide confirmation that the user's intended input was received by the device). Further, from the performed speech recognition and natural language processing on the spoken user input, a determination is made (e.g., by the device or by an external device, such as a server, communicating with the device) of a user intent (e.g., an intent to send a payment of $28 to John).

In accordance with a determination (e.g., made by the device or made by an external device, such as a server, communicating with the device) that the user's intent, based on spoken user input 2903, is to send a payment to an intended recipient (e.g., to send John a payment in the amount of $28), electronic device 2900 displays within digital assistant user interface 2924 a message object box 2928 that includes a draft payment message object 2932 corresponding to the requested payment determined from spoken user input 2903. As also shown in FIG. 29D, draft message object 2932 includes a mode indication 2934 (e.g., stating "PAY") indicating to the user that the draft payment message object corresponds to a payment to be made via an operating system-controlled payment transfer application (and not by a third-party application). As also shown in FIG. 29D, draft message object 2932 includes an amount indication 2936 (e.g., "$28") indicating the amount of the intended payment.

In some embodiments, message object box 2928 includes an indication 2930 of the intended recipient (e.g., recipient 2910, "John Appleseed") of the payment. In some embodiments, message object box 2928 includes a pay button 2940 (for proceeding with the payment as shown by message object box 2928) and a forgo pay button 2938 (for cancelling proceeding with the payment as shown by message object box 2928). In some embodiments, digital assistant user interface also displays a request 2942 from the digital assistant asking whether the user intends to add a comment (e.g., a note, a message) to accompany the payment.

Figure 29E:
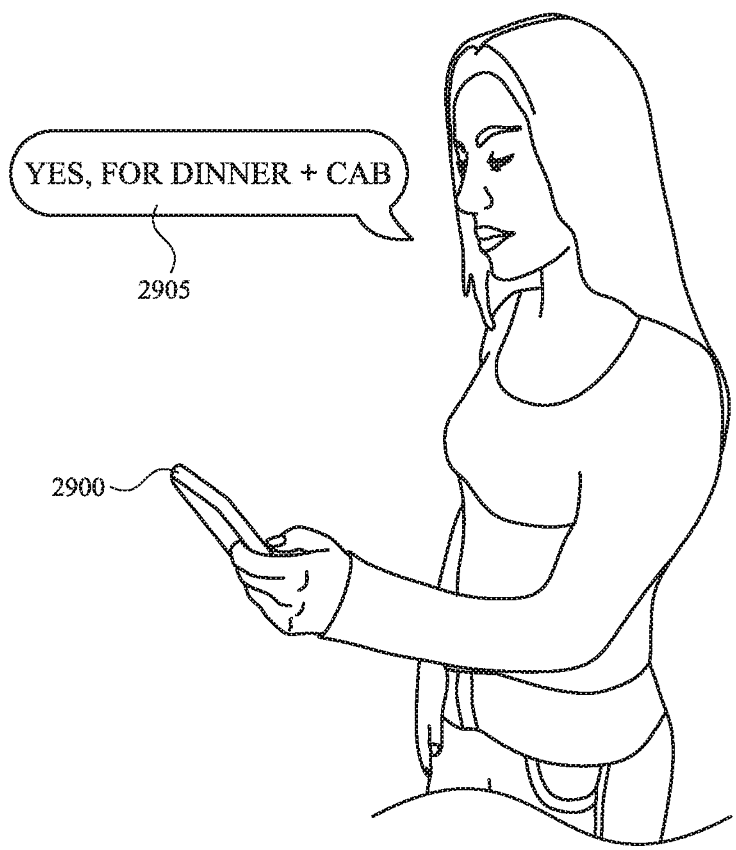

FIG. 29E shows, while electronic device 2900 displays digital assistant user interface 2924 with message object box 2928, the user (e.g., "Kate Appleseed") providing to the device a confirmation (e.g., "Yes") that the user does intend to add a comment, and further providing the comment (e.g., "For Dinner+Cab") to be added. For example, as shown in FIG. 29E, the user provides the confirmation and the comment via one continuous spoken user input 2905 (e.g., stating "Yes, For Dinner+Cab").

Figure 29F:
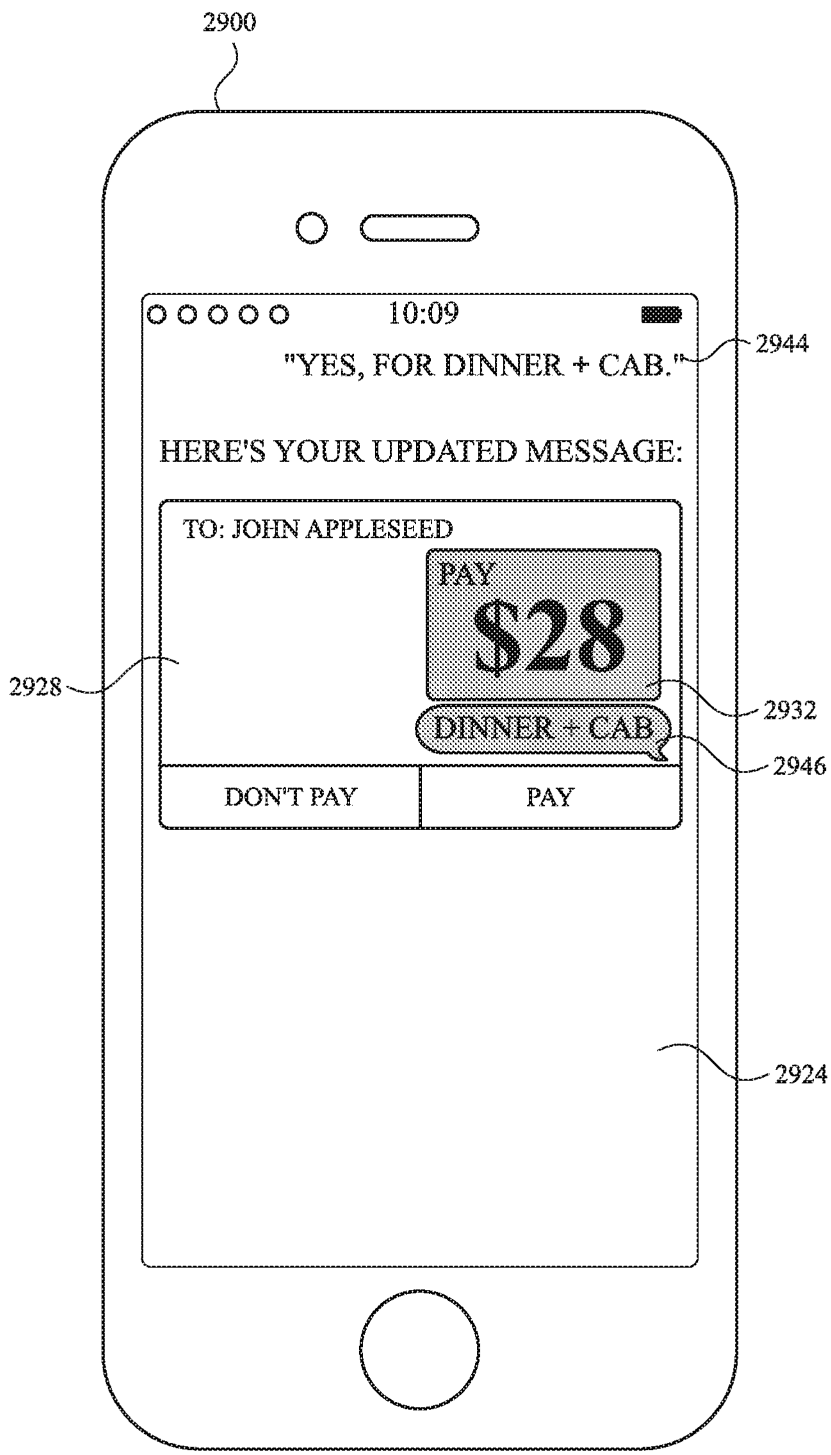

In FIG. 29F, in response to receiving spoken user input 2905 responding to request 2942 (to add a comment to accompany the payment), electronic device 2900 provides display of an updated message object box 2928 on digital assistant user interface 2924 to include (e.g., below the draft payment message object) a draft note message object 2946 (e.g., stating "Dinner+Cab") corresponding to the comment from spoken user input 2905. In some embodiments, digital assistant user interface 2924 provides, prior to displaying the updated message object box, a transcription 2944 (e.g., stating "Yes, For Dinner+Cab") of spoken user input 2905 received from the user.

Figure 29G:
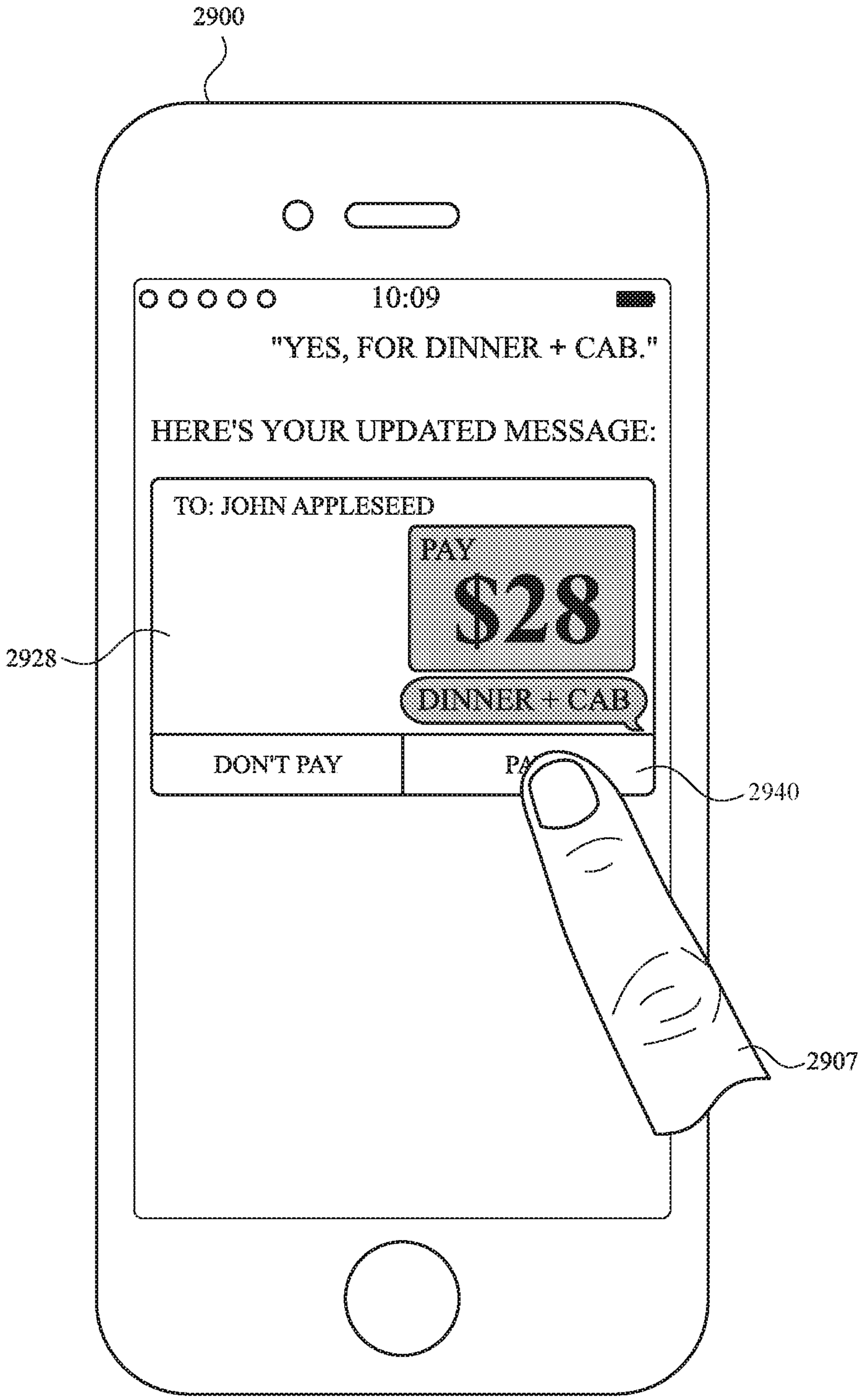

In FIG. 29G, while displaying message object box 2928, electronic device 2900 detects user activation of pay button 2940 for proceeding with the payment as indicated by the message object box. For example, as shown in FIG. 29G, the user activation is a tap gesture 2907 on pay button 2940. In some embodiments, the user activation is made via a spoken user input (e.g., "Proceed with the payment," "Make the payment as shown") to the digital assistant.

Figure 29H:
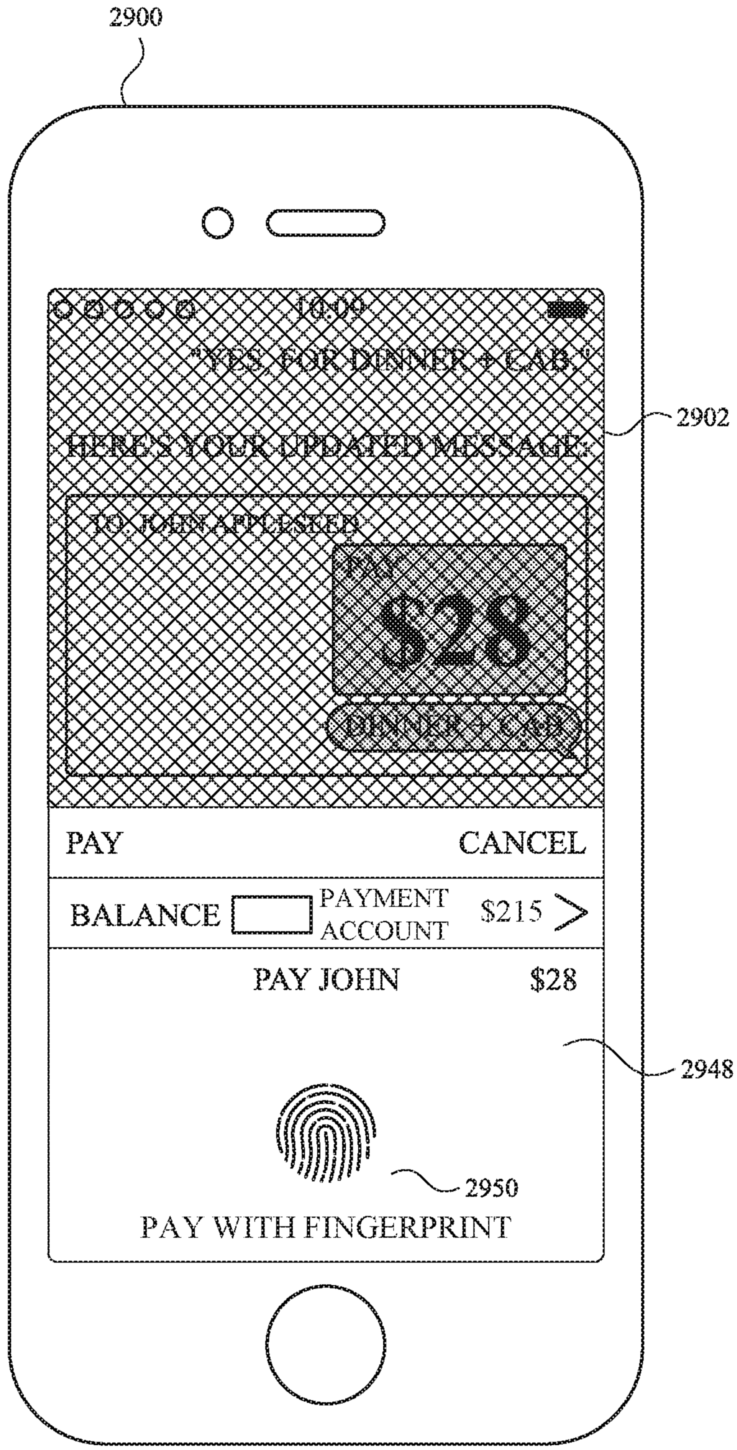

In FIG. 29H, in response to detecting user input 2907 on pay button 2940 for proceeding with the payment as shown in message object box 2928, electronic device 2900 displays, on display 2902, a payment confirmation user interface 2948 (e.g., corresponding to payment confirmation user interface 878 described above with reference to FIGS. 8T-8W). As with payment confirmation use interface 878, payment confirmation user interface 2948 includes an authentication request 2950 (e.g., a graphical request, a textual request) requesting that the user provide authentication information (e.g., "Pay with Fingerprint") to proceed with making the payment to recipient 2910 (e.g., "John Appleseed").

Figure 29I:
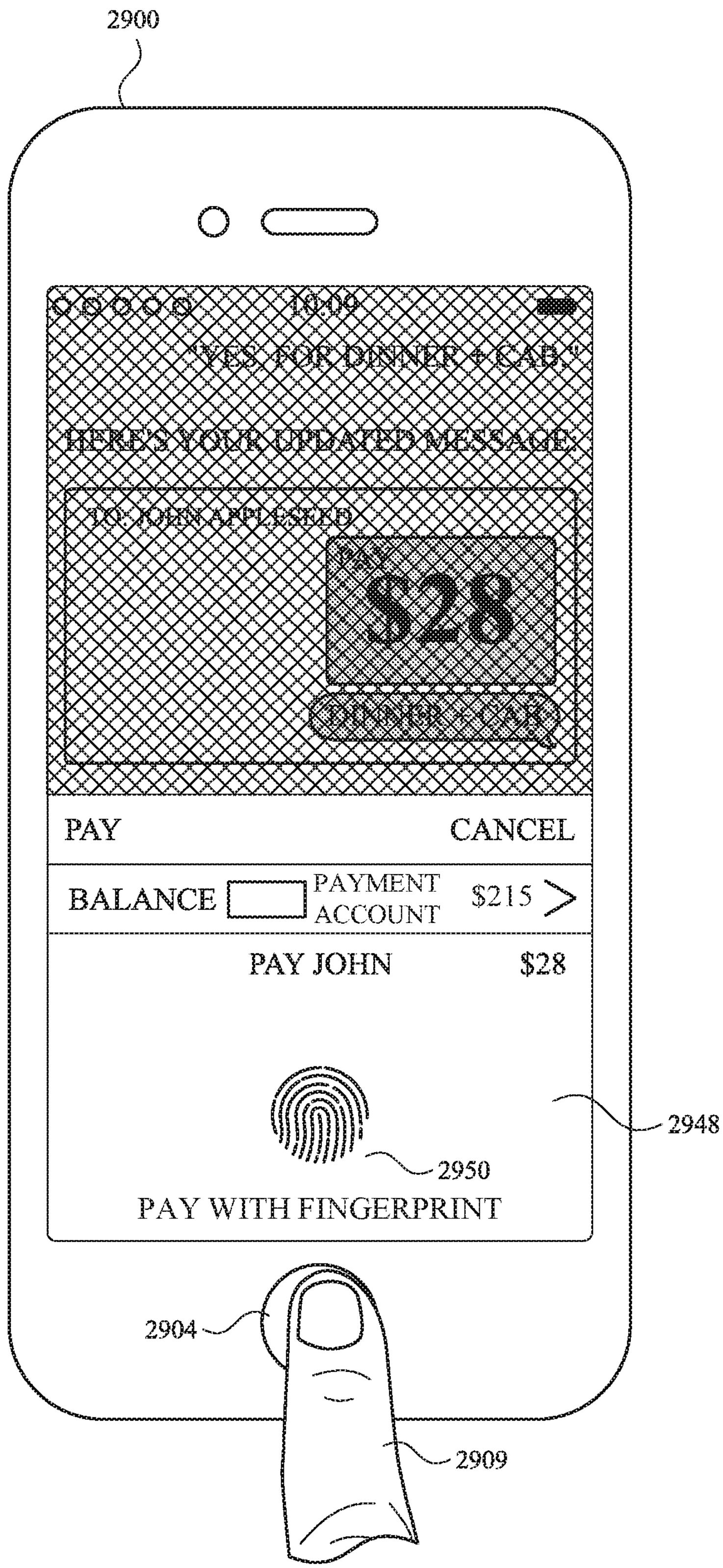

In FIG. 29I, while displaying payment confirmation user interface 2948 including authentication request 2950, electronic device 2900 detects a user input corresponding to the authentication request 2950. For example, as shown in FIG. 29, the requested authentication request is a fingerprint authentication request, and the user input is a fingerprint scan input 2909 on a fingerprint sensor (e.g., of mechanical button 2904) of the device.

Figure 29J:
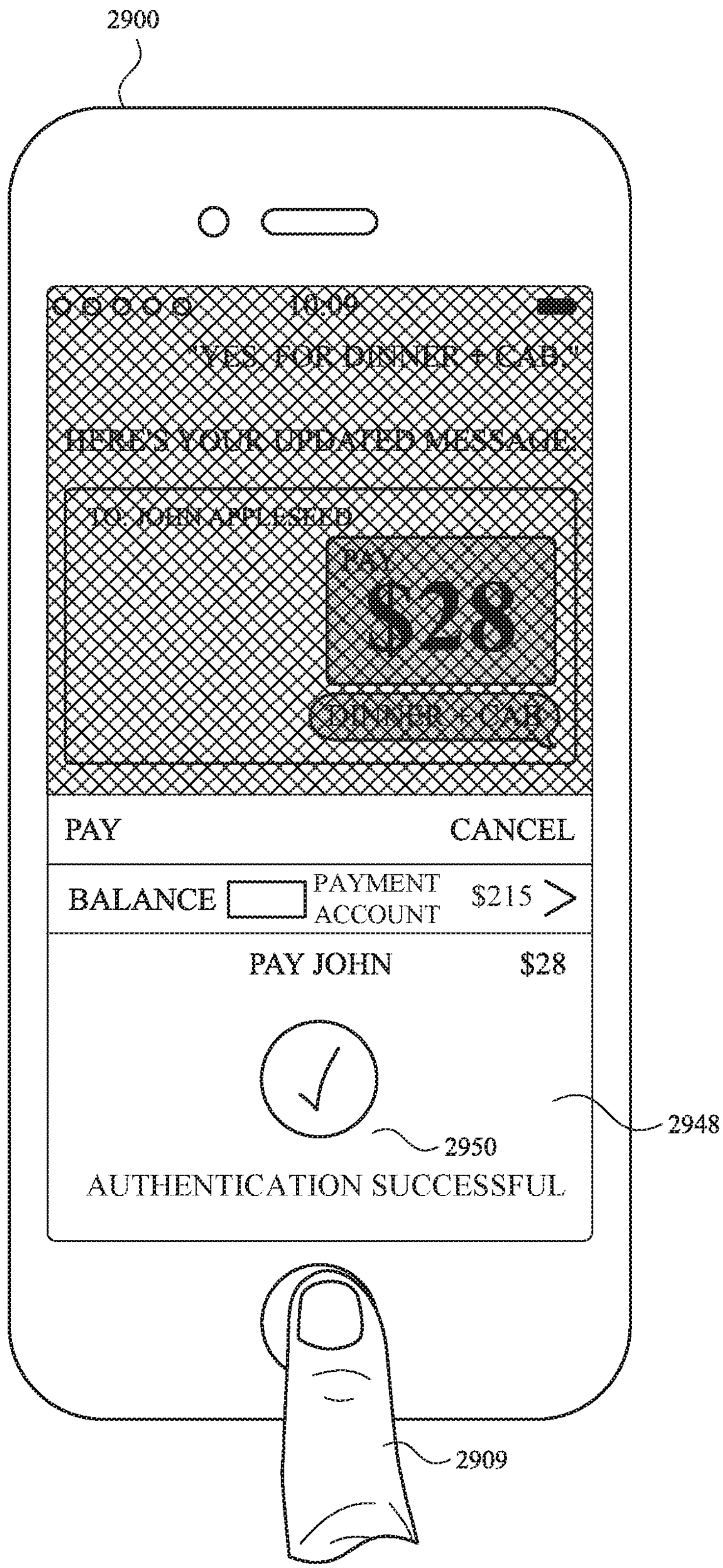

In FIG. 29J, while (or subsequent to) detecting fingerprint scan input 2909 on mechanical button 2904, a determination is made (e.g., by the device or by an external device communicating with the device) whether the fingerprint information received from fingerprint scan input 2909 is consistent with an enrolled fingerprint information for authorizing transactions. In accordance with a determination that the received fingerprint information is consistent with the enrolled fingerprint information, electronic device 2900 updates authentication request 2950 to indicate (e.g., stating "Authentication Successful") that the transaction was successfully completed. In some embodiments, in accordance with a determination that the received fingerprint information is not consistent with the enrolled fingerprint information, the device displays a prompt requesting a second attempt at authentication. In some embodiments, in accordance with a determination that the received fingerprint information is not consistent with the enrolled fingerprint information, the device terminates the pending payment and displays an indication (e.g., on digital assistant user interface 2924) that authentication was unsuccessful.

Figure 29K:
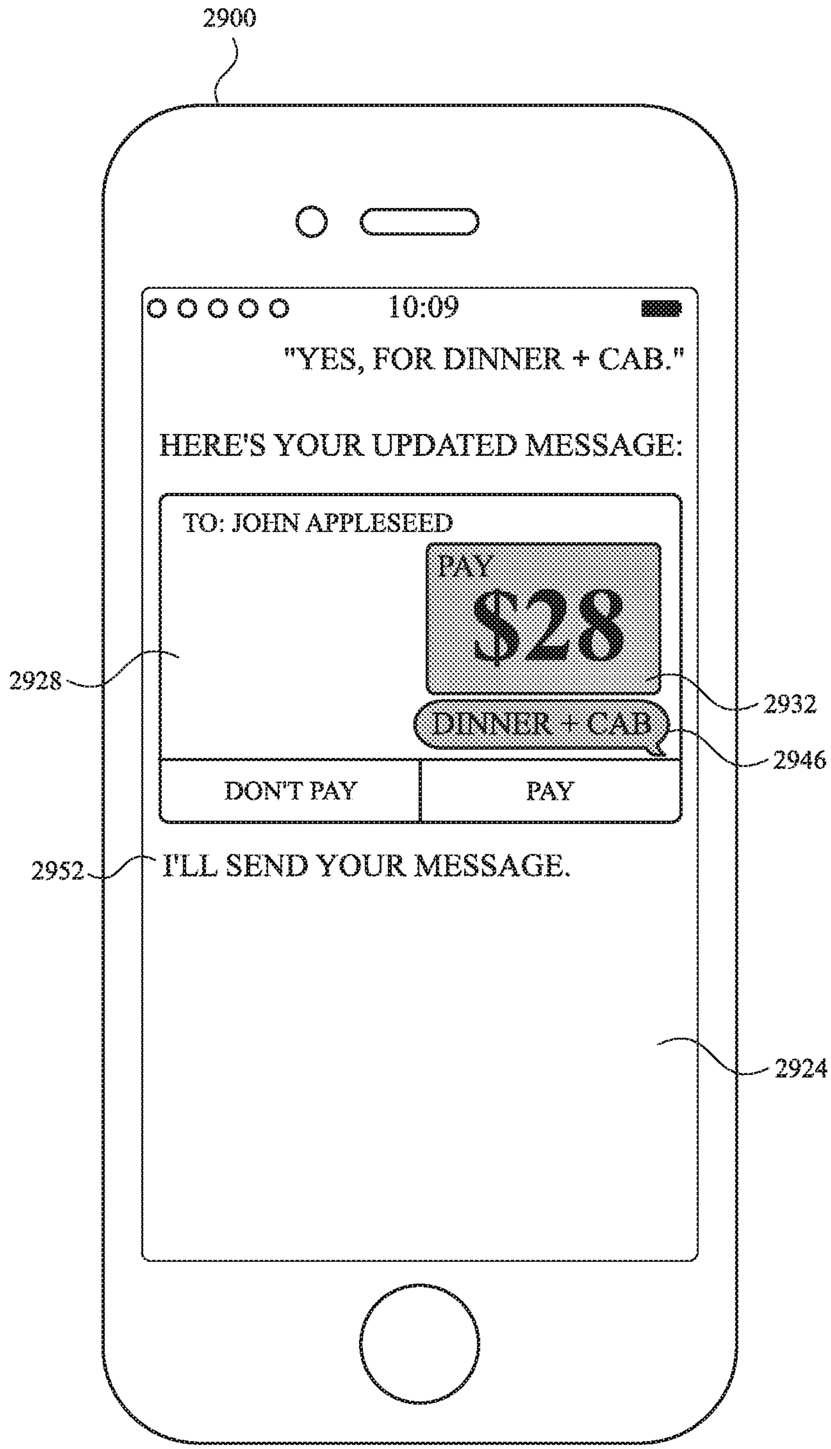

In FIG. 29K, in response to a determination that authentication was successful, the digital assistant provides, on digital assistant user interface 2924 (e.g., below message object box 2928), an affirmation 2952 (e.g., stating "I'll Send Your Message") informing the user that a payment message object corresponding to draft payment message object 2932 (along with a note message object corresponding to draft note message object 2946) will be sent (e.g., via a messaging application). In some embodiments, the payment message object (and thus the corresponding payment) is sent (via a messaging application to recipient 2910) even when the device is currently in the user interface locked state. In some embodiments, the payment message object (and thus the corresponding payment) is sent (via a messaging application to recipient 2910) when the device is changed from a user interface locked state to a user interface unlocked state.

Figure 29L:
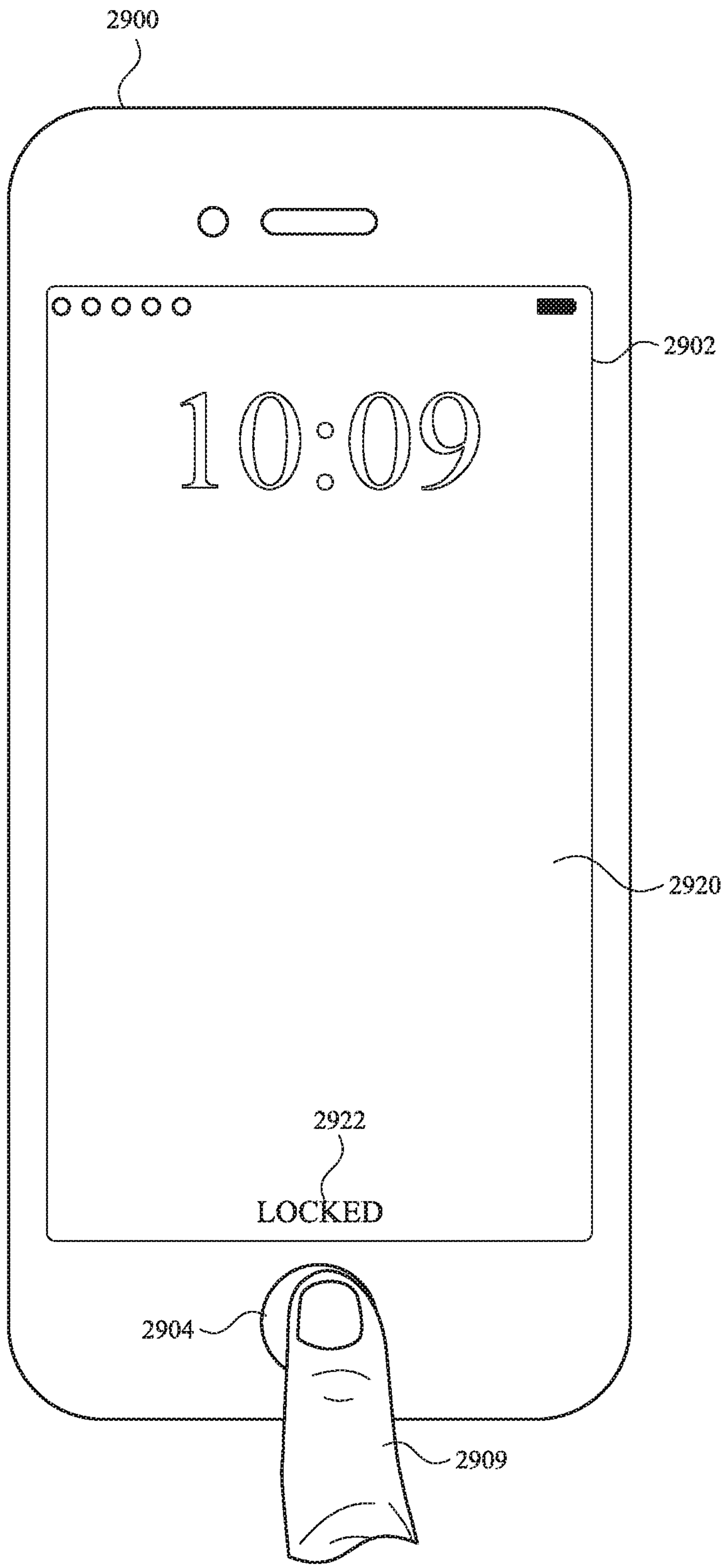

FIG. 29L shows electronic device 2900 again in the user interface locked state and displaying user interface locked screen 2920, as described in FIG. 29A. In FIG. 29L, while displaying user interface locked screen 2920, the device detects a user input that corresponds with successfully unlocking the device from the user interface locked state to the user interface unlocked state. For example, as shown in FIG. 29L, the user input is a fingerprint scan input 2911 on a fingerprint sensor (e.g., of mechanical button 2904) that matches with enrolled fingerprint information for unlocking the device.

Figure 29M:
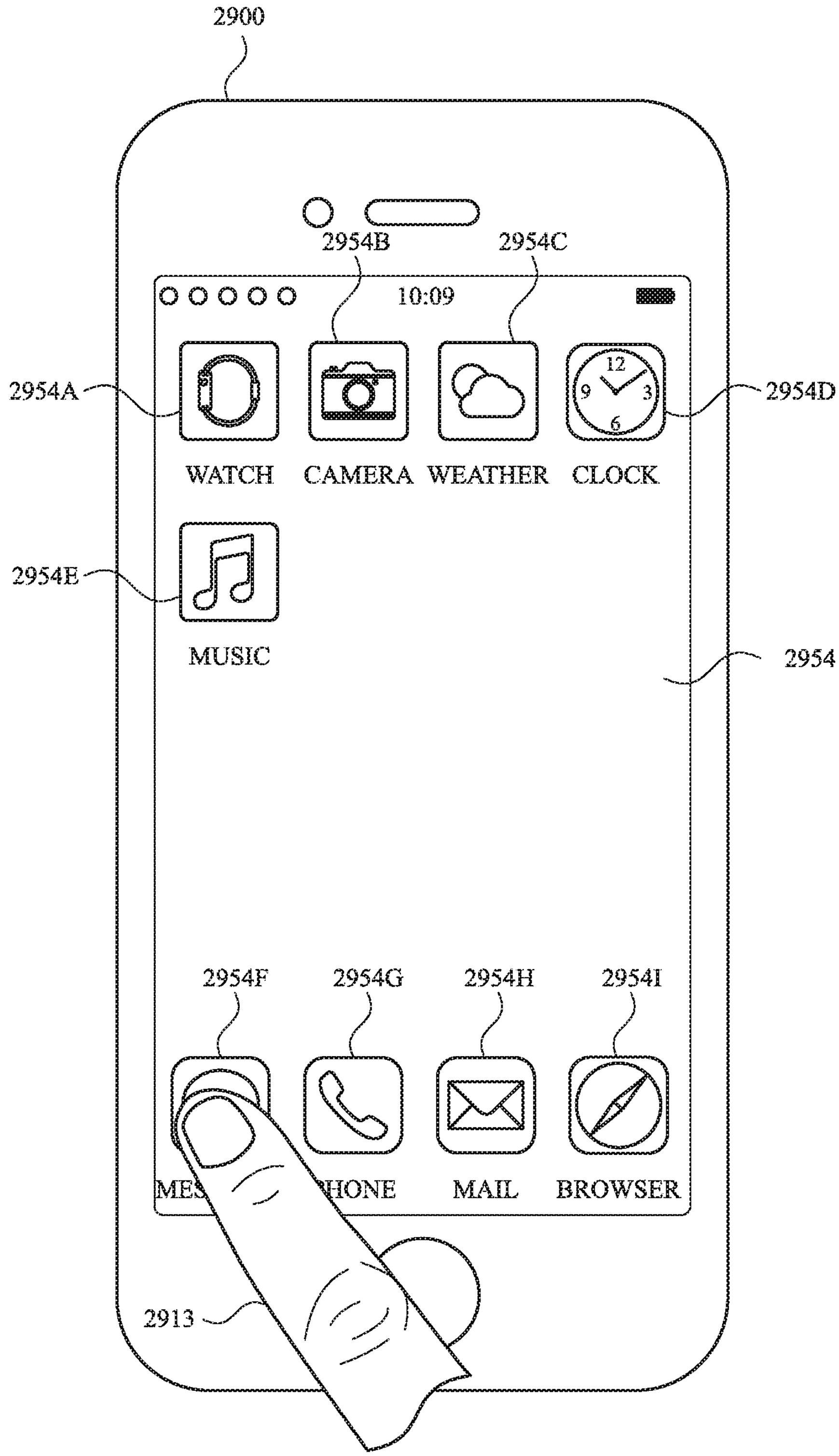

FIG. 29M shows (e.g., after receiving fingerprint scan input 2911 unlocking the device) a home user interface 2954 of electronic device 2900. As shown in FIG. 29M, home user interface 2954 includes a plurality of application icons 2954A-2954I corresponding to different applications (e.g., an application icon 2954A corresponding to a watch application, an application icon 2954B corresponding to a camera application, an application icon 2954C corresponding to a weather application, an application icon 2954D corresponding to an alarm clock application, an application icon 2954E corresponding to a music application, an application icon 2954F corresponding to a messaging application, an application icon 2954G corresponding to a phone application, an application icon 2954H corresponding to a mail application, and an application icon 2954I corresponding to a browser application).

In FIG. 29M, while displaying home user interface 2954, electronic device 2900 detects user selection of icon 2954F corresponding to a messaging application. For example, as shown in FIG. 29M, the user selection is a tap gesture 2913 on icon 2954F.

Figure 29N:
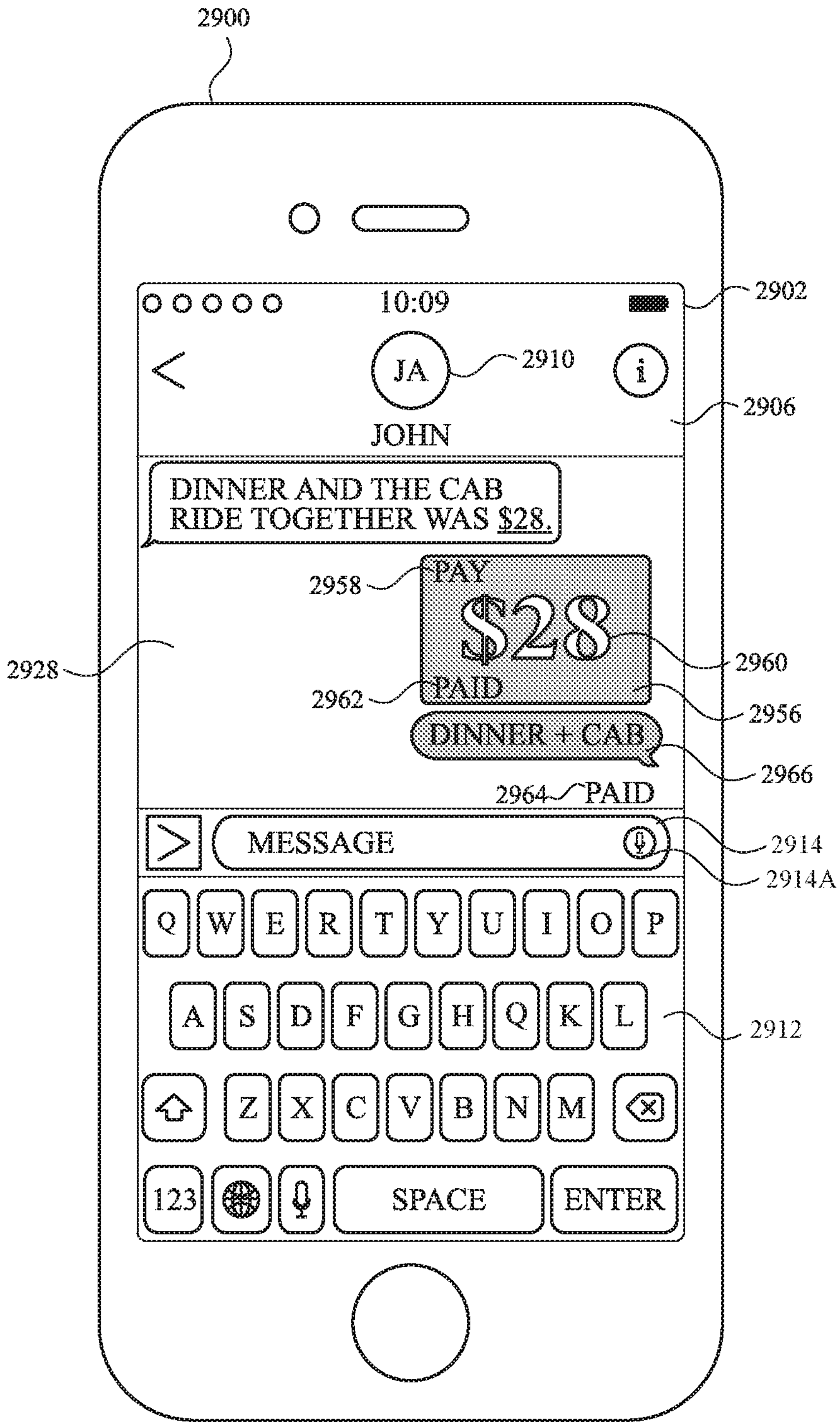

In FIG. 29N, in response to detecting tap gesture 2913 on icon 2954F corresponding to a messaging application, electronic device 2900 displays, on display 2902, a message conversation 2908 of the messaging application 2906 between the user of the device (e.g., "Kate Appleseed") and recipient 2910 (e.g., "John Appleseed"). In some embodiments, recipient 2910 is a contact stored on the device. In some embodiments, recipient 2910 is a contact of a contact list associated with the user account logged onto the device. In some embodiments, recipient 2910 is a contact included in a trusted contacts list associated with the user account logged onto the device.

In some embodiments, electronic device 2900 also displays, on display 2902, a virtual keyboard 2912 (e.g., an alphanumeric keyboard for typing a message) and compose bar 2914 for displaying the text of a message as a message is typed using a virtual keyboard 2912. In some embodiments, a mechanical keyboard can be used in addition to or alternatively to virtual keyboard 2912 to type a message. In some embodiments, compose bar 2914 can expand (e.g., expand upwards) to accommodate a longer message or message object (e.g., an image, an emoticon, a special type of message object, such as a payment object). In some embodiments, compose bar 2914 includes a mic button 2914A which, when activated, enables the user to record a message using voice input.

As shown in FIG. 29N, message conversation 2908 includes a payment message object 2956 created via the digital assistant and sent via messaging application 2906 to recipient 2910 (e.g., "John Appleseed"). Payment message object 2956 (e.g., similar to payment message object 1420 described above with reference to FIGS. 14C-14F) corresponds to draft payment message object 2932, which in turn corresponds to the requested payment determined from spoken user input 2903. In some embodiments, payment message object 2956 includes a mode indication 2958 (e.g., stating "PAY") indicating to the user that the payment message object corresponds to a payment (or payment request) made via an operating system-controlled payment transfer application (and not by a third-party application). Payment message object 2956 also includes an amount indication 2960 informing the user of the amount of the payment (e.g., "$28"). In some embodiments, payment message object 2956 also includes a first status indicator 2962 informing the user of a status of the payment corresponding to the payment message object (e.g., "pending," "paid," "accepted," "expired," etc.). For example, in FIG. 29N, first status indicator 2962 shows "paid," thus indicating to the user that the payment associated with payment message object 2956 has been accepted by the recipient (e.g., recipient 2910). In some embodiments, a second status indicator 2964 informing the user of the status of the payment corresponding to the sent payment message object (e.g., "pending," "paid," "accepted," "expired," etc.) is also displayed (e.g., outside of the payment message object). For example, in FIG. 29N, second status indicator 2964 (e.g., "paid") shows the same status as shown by first status indicator 2962 (e.g., "paid").

As indicated by status indicators 2962 and 2964, the payment corresponding to payment message object 2956 has been accepted by recipient 2910. Thus, in some embodiments, amount indication 2960 of the payment amount (e.g., "$28") is displayed with a bolder (or thicker) font than if the payment was pending. In some embodiments, amount indication 2960 includes a black outline (e.g., a shadow) applied to the font of the displayed amount (e.g., "$28"). In some embodiments, amount indication 2960 of the payment amount (e.g., "$28") is shown in a different color (e.g., white as opposed to black) than if the payment was pending. In some embodiments, in response to detecting a change in orientation of the device, electronic device 2900 generates feedback (e.g., a visual feedback, a haptic feedback, audio feedback) associated with the payment message object. In some embodiments, the feedback is a dynamic visual feedback causing display of the payment message object (e.g., payment message object 2956) to change as changes in the orientation of the device relative to a reference point are detected, as described above, for example, with reference to payment message object 1172 in FIG. 11T.

Figure 29O:
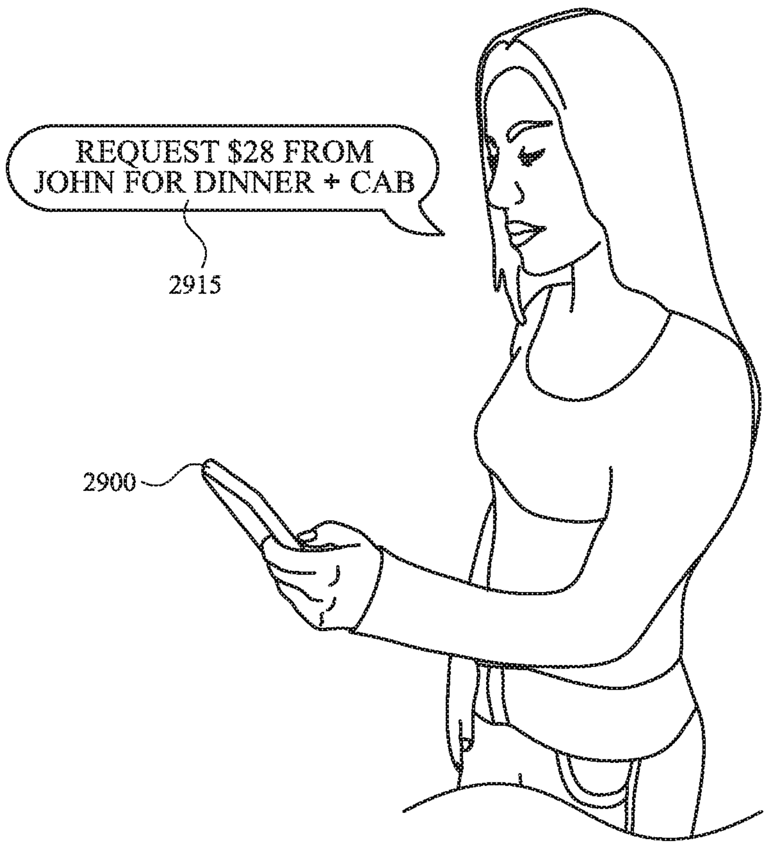

FIG. 29O shows (e.g., while the digital assistant is active, while electronic device 2900 is displaying digital assistant user interface 2924), the user (e.g., "Kate Appleseed") providing a spoken user input 2915 to the device requesting that a payment request be made to an intended recipient. For example, as shown in FIG. 29O, spoken user input 2915 states "Request $28 from John for diner+cab" (thus requesting that the digital assistant a payment request to be sent to recipient 2910 (John) in the amount of $28 for "dinner+cab").

Figure 29P:
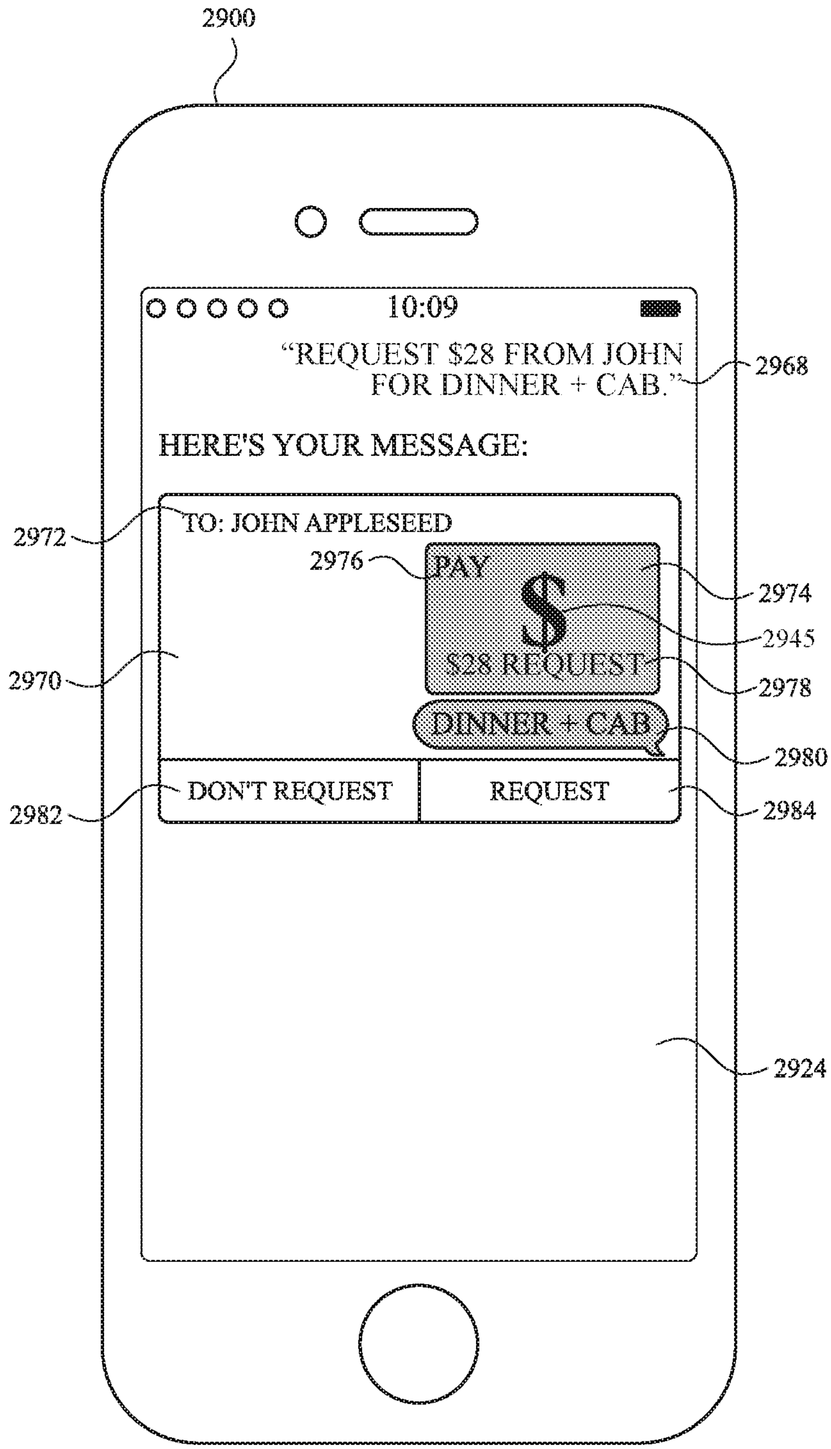

In FIG. 29P, in response to receiving spoken user input 2915 requesting that a payment request (of $28) be sent to recipient 2910 (John) for "dinner+cab," electronic device 2900 displays digital assistant user interface 2924 with a transcription 2968 (e.g., stating "Request $28 from John for dinner+cab") of the spoken user input 2915 and a message object box 2970 corresponding to the request for creating a payment request received from spoken user input 2915. As shown in FIG. 29P, corresponding to the request received from spoken user input 2915, message object box 2970 includes an indication 2972 of the intended recipient of the payment request (e.g., recipient 2910, "John Appleseed"), a draft payment message object 2974 for a payment request, and a draft note message object 2980 corresponding to the comment detected from spoken user input 2915. As with draft payment message object 2932, draft payment message object 2974 includes a mode indication 2976 (e.g., stating "PAY") indicating to the user that the payment message object corresponds to a payment request made via an operating system-controlled payment transfer application (and not by a third-party application). Draft payment message object 2974 also includes an amount indication 2978 informing the recipient of the payment request (e.g., recipient 2910) the amount of the requested payment (e.g., "$28") and a further indication (e.g., "$28 Request") that the payment message object corresponds to a request for payment.

Figure 29Q:
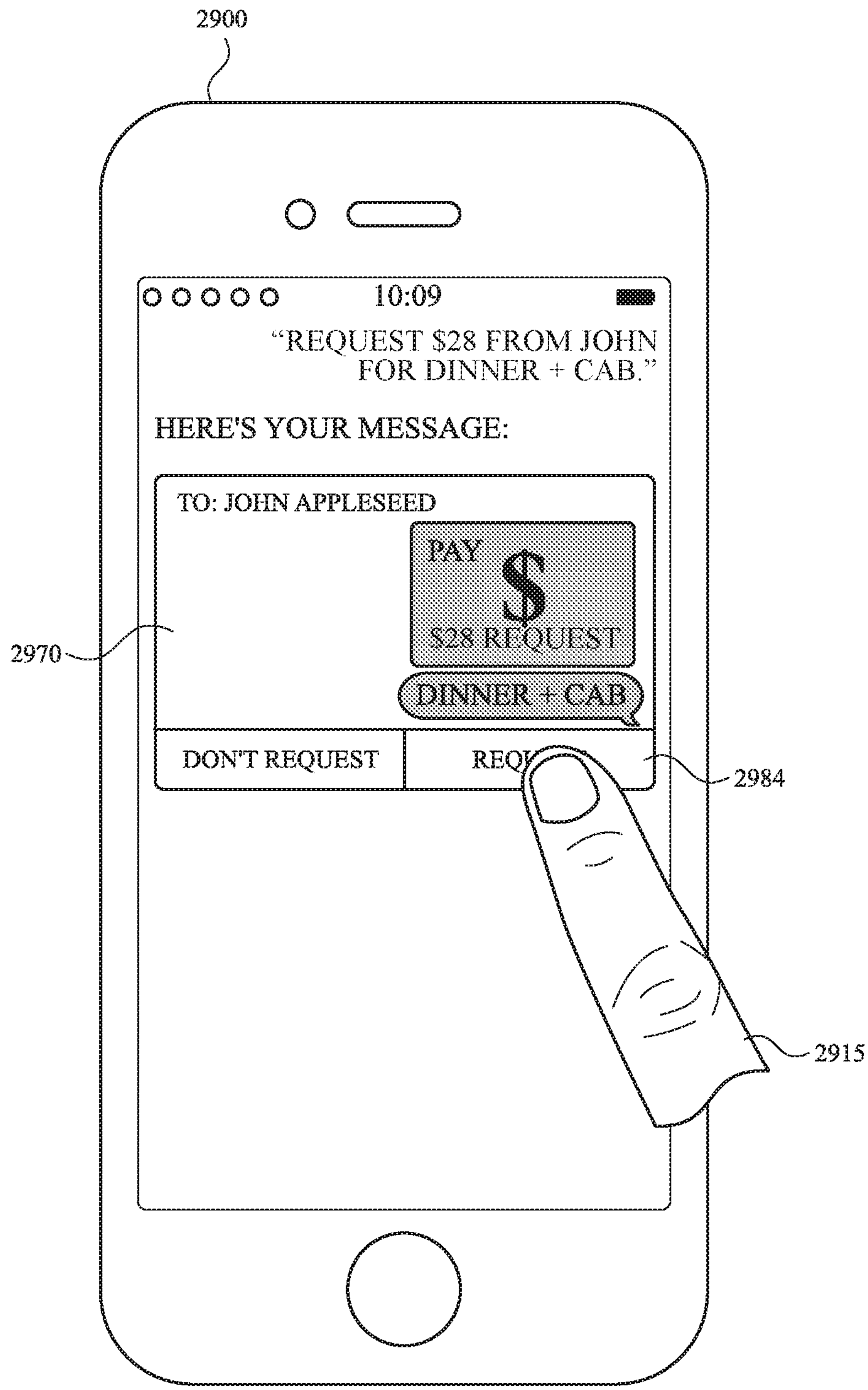

As also shown in FIG. 29P, message object box 2970 includes a request button 2984 (for proceeding with sending the payment request) and a forgo request button 2982 (for forgoing proceeding with sending the payment request). In FIG. 29Q, while displaying message object box 2970, electronic device 2900 detects user selection of request button 2984 for proceeding with sending the payment request. For example, as shown in FIG. 29Q, the user selection is a tap gesture 2917 on request button 2984. In some embodiments, the user selection is a spoken input indicating an intent to select request button 2984 (or an intent to proceed with sending the payment request).

Figure 29R:
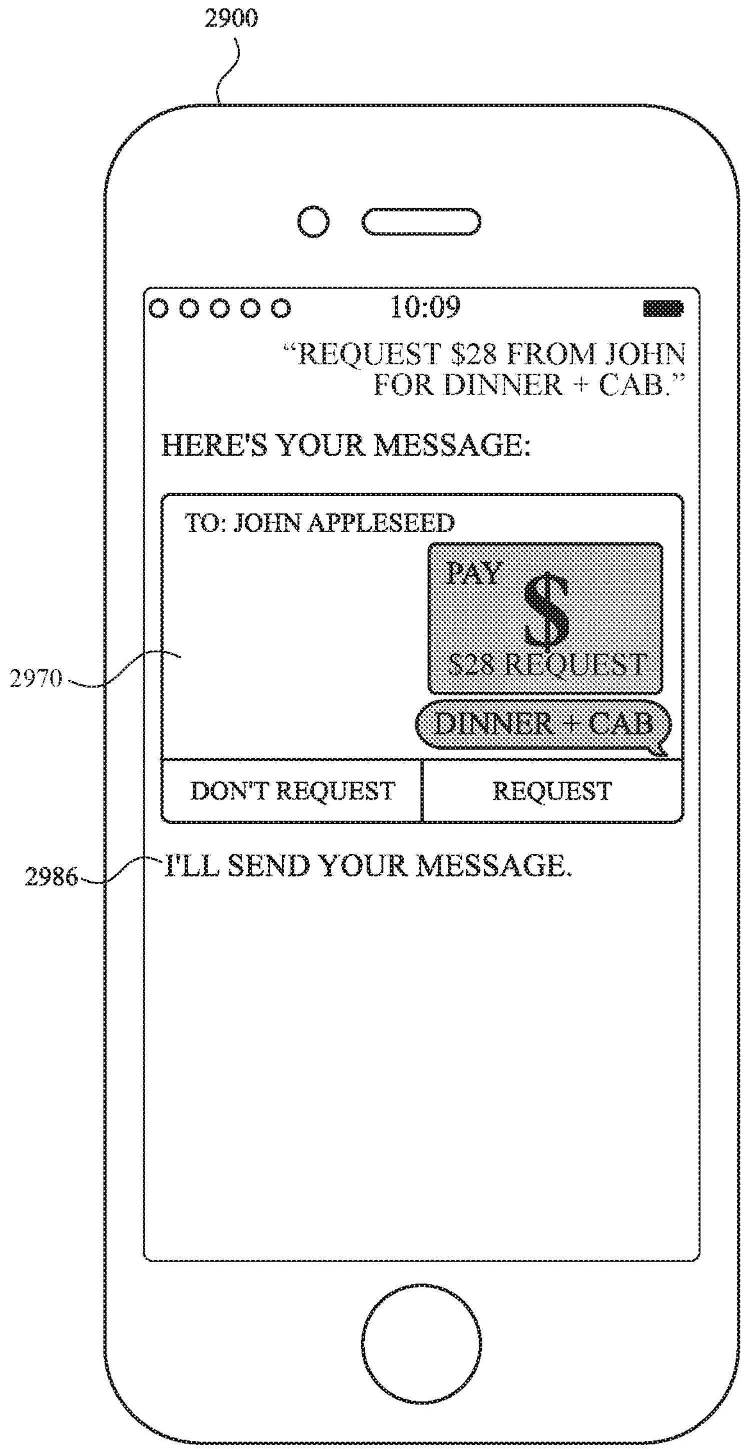
Figure 29S:
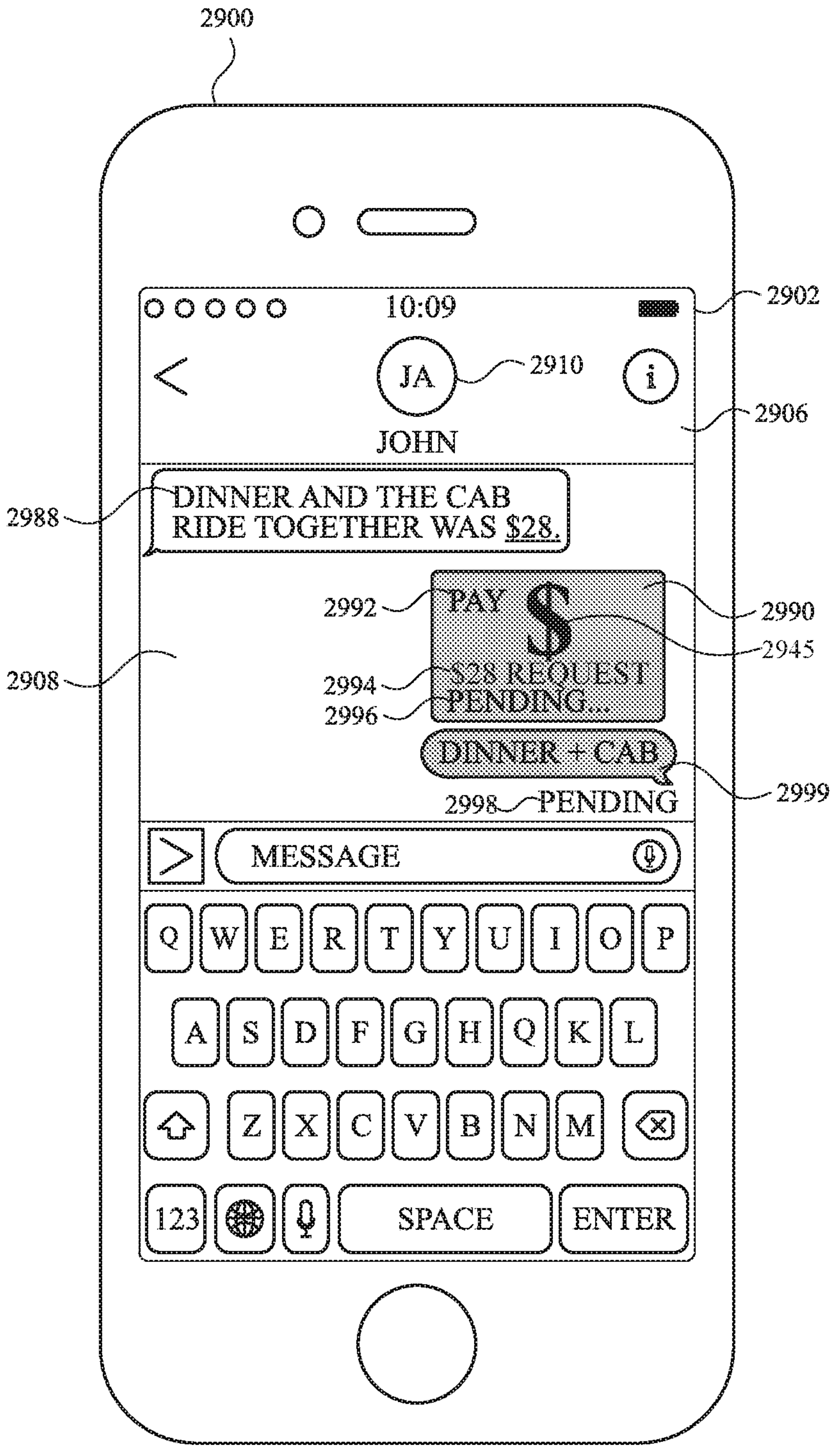
Figure 30A:
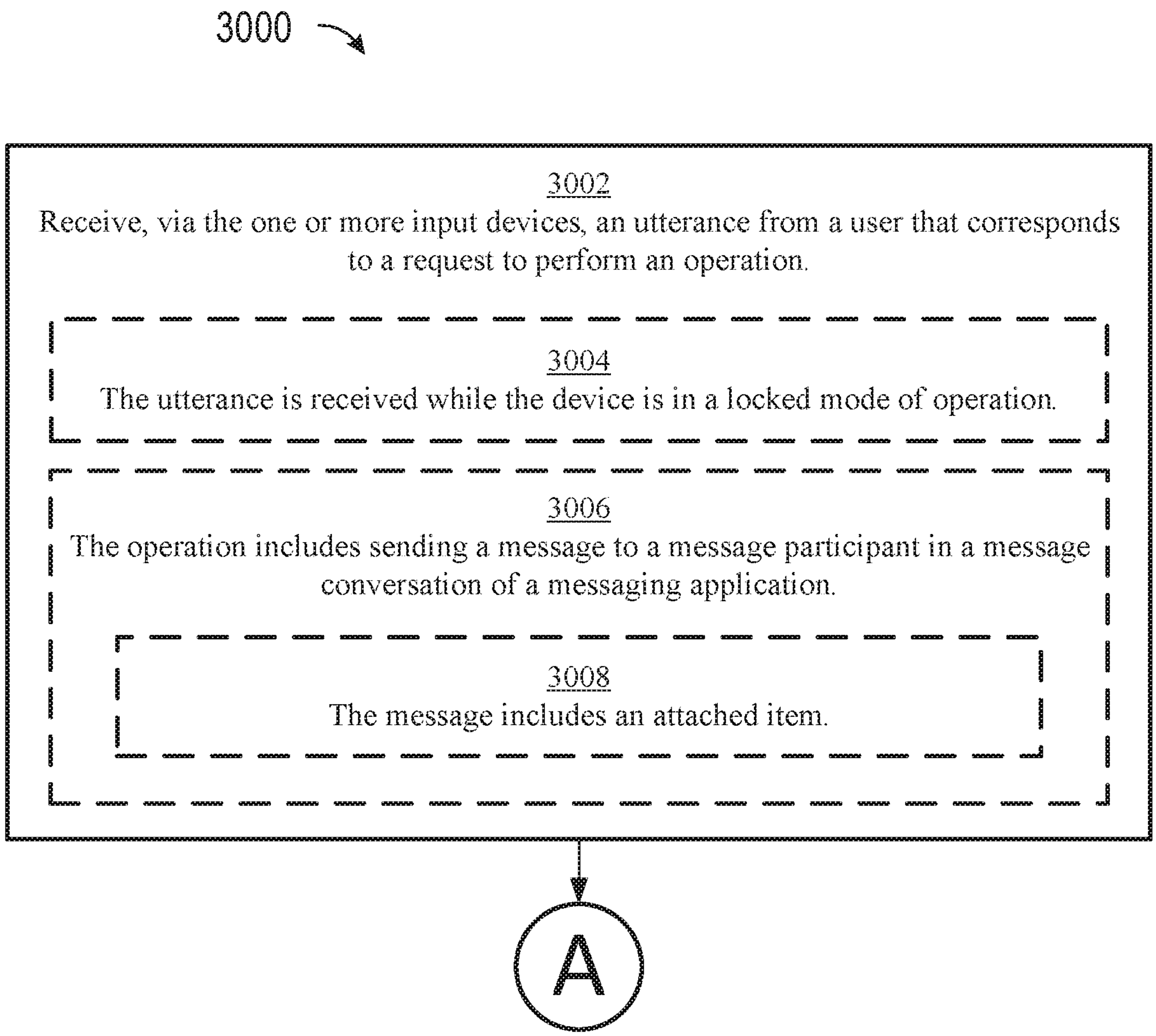
FIGS. 30A-30D are a flow diagram illustrating methods of voice-activation of transfers, in accordance with some embodiments.
Figure 30B:
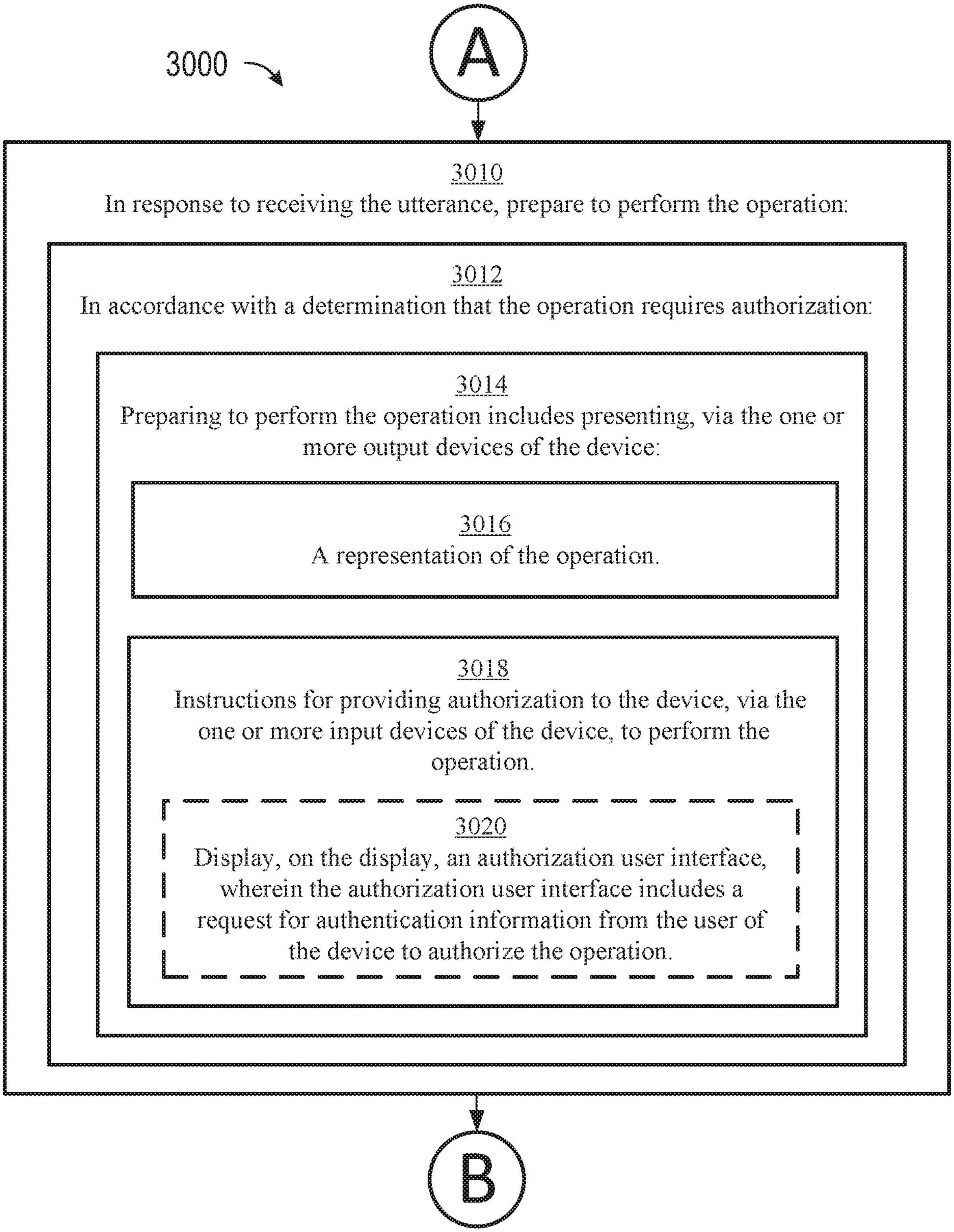
Figure 30C:
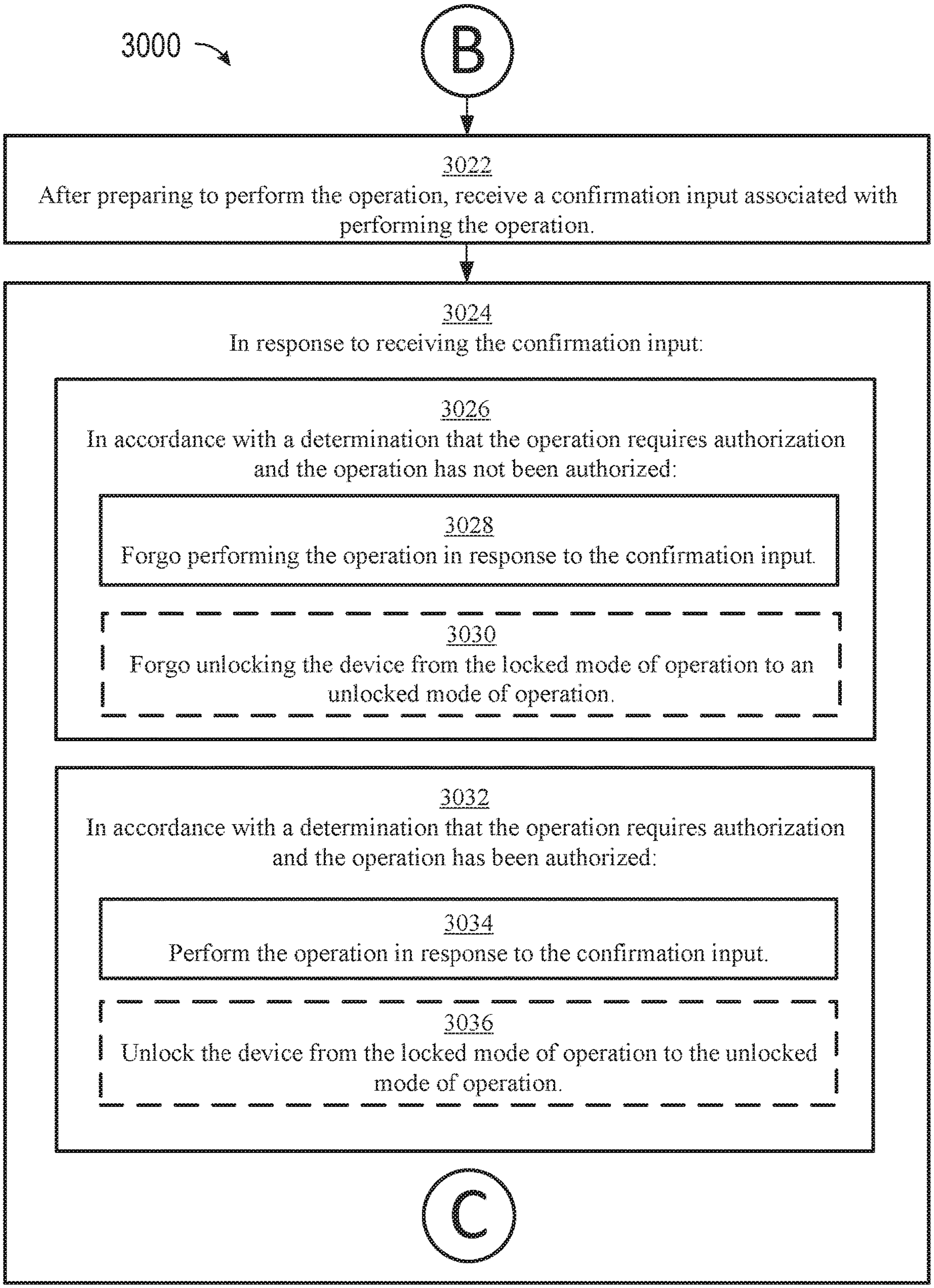
Figure 30D:
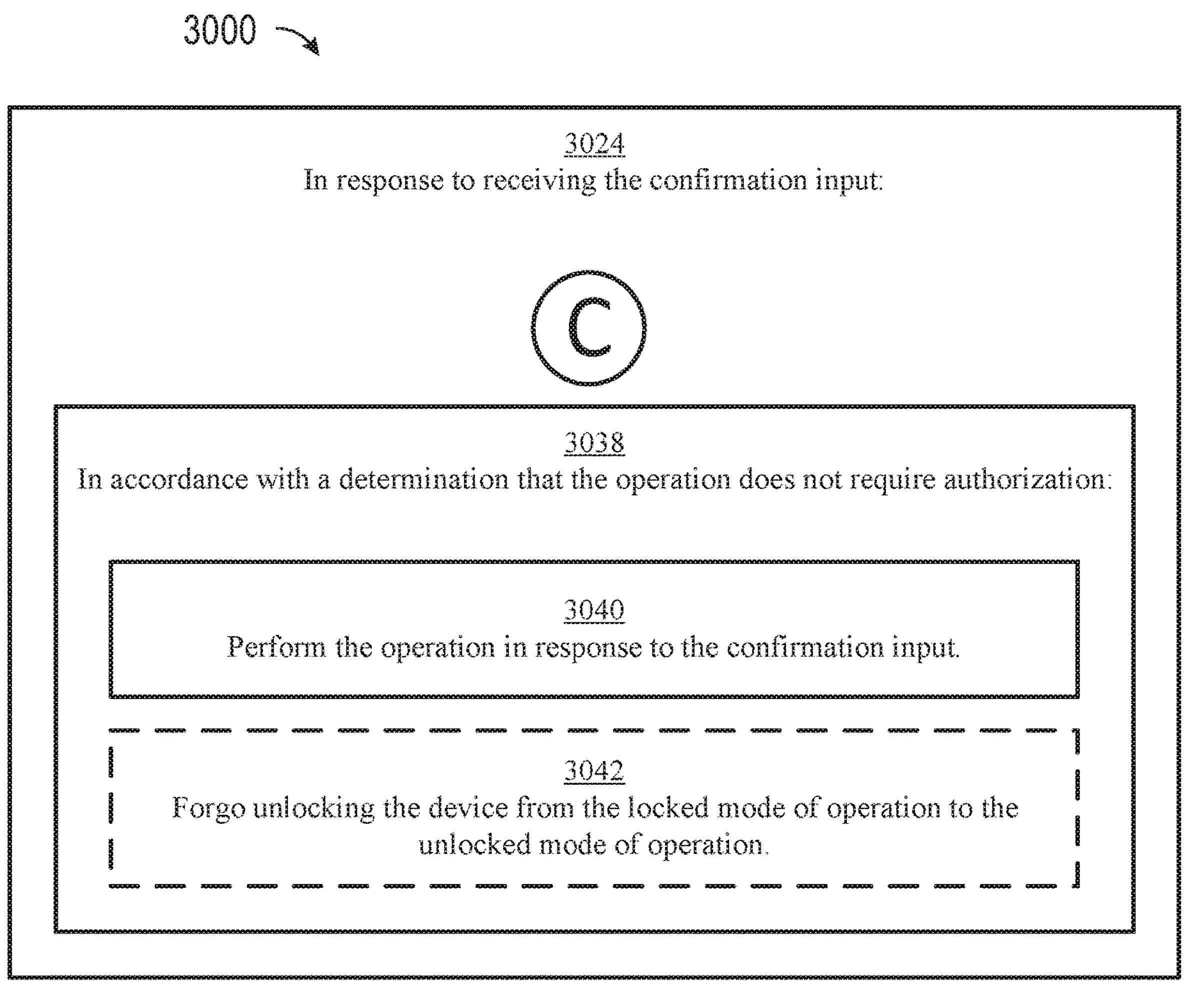

In FIG. 29R, in response to detecting tap gesture 2917 on request button 2984 for proceeding with sending the payment request, electronic device 2900 displays (e.g., below message object box 2970), an affirmation 2986 (e.g., stating "I'll Send Your Message") informing the user that the device will proceed with sending the payment request (e.g., via messaging application 2906).

FIG. 29S shows electronic device 2900 displaying message conversation 2908 (with recipient 2910, "John Appleseed") of messaging application 2906. As shown in FIG. 29S, message conversation 2908 includes a payment message object 2990 corresponding to the payment request created via the digital assistant and sent via messaging application 2906 to recipient 2910 (e.g., "John Appleseed"). Payment message object 2990 (e.g., similar to payment message object 1460 described above with reference to FIGS. 14H-14K) corresponds to draft payment message object 2974, which in turn corresponds to the payment request created from spoken user input 2915. In some embodiments, payment message object 2990 includes a mode indication 2992 (e.g., stating "PAY") indicating to the user that the payment message object corresponds to a payment request made via an operating system-controlled payment transfer application (and not by a third-party application). Payment message object 2990 also includes an amount indication 2994 informing the recipient of the payment request (e.g., recipient 2910) the amount of the requested payment (e.g., "$28") and a further indication (e.g., "$28 Request") that the payment message object corresponds to a request for payment. In some embodiments, payment message object 2990 also includes a first status indicator 2962 informing the user of a status of the payment corresponding to the payment message object (e.g., "pending," "paid," "accepted," "expired," etc.). For example, in FIG. 29S, first status indicator 2996 shows "pending," thus indicating to the user that the payment associated with payment message object 2990 has not yet been accepted by the recipient (e.g., recipient 2910). In some embodiments, a second status indicator 2998 informing the user of the status of the payment corresponding to the sent payment message object (e.g., "pending," "paid," "accepted," "expired," etc.) is also displayed (e.g., outside of the payment message object). For example, in FIG. 29S, second status indicator 2998 (e.g., "pending") shows the same status as shown by first status indicator 2996 (e.g., "pending").

FIGS. 30A-30D are a flow diagram illustrating a method for voice-activation of transfers using an electronic device in accordance with some embodiments. Method 3000 is performed at a device (e.g., 100, 300, 500, 2800, 2900) with one or more output devices (e.g., a display, a speaker) including a display and one or more input devices (e.g., a mic for receiving voice input, touch-sensitive surface). Some operations in method 3000 are, optionally, combined, the orders of some operations are, optionally, changed, and some operations are, optionally, omitted.

As described below, method 3000 provides an intuitive way for managing peer-to-peer transactions. The method reduces the cognitive burden on a user for managing peer-to-peer transactions, thereby creating a more efficient human-machine interface. For battery-operated computing devices, enabling a user to manage peer-to-peer transactions faster and more efficiently conserves power and increases the time between battery charges.

The electronic device (e.g., 2800, 2900) receives (3002), via the one or more input devices, an utterance (e.g., 2801, 2903, a word, a phrase, a natural language input) from a user that corresponds to a request to perform an operation (e.g., accessing secure content, sending secure content, sending a payment, accepting a payment, sending a request for payment).

In some examples, the utterance (e.g., 2801, 2903) from the user that corresponds to the request to perform the operation is received (3004) while the electronic device (e.g., 2800, 2900) is in a locked mode of operation (e.g., a mode of operation in which the user is not authenticated to the device and the device is prevented from performing one or more operations that the device can perform when in an unlocked mode of operation).

In some examples, the utterance (e.g., 2801, 2903) from the user that corresponds to the request to perform the operation is received while the device (e.g., 2800, 2900) is in an unlocked mode (e.g., the device performs the operation while the device is unlocked) of operation (e.g., a mode of operation in which the user is authenticated to the device and the device is enabled to perform one or more operations that the device is prevented from performing when in a locked mode of operation).

In some examples, the operation includes (3006) sending a message (e.g., a text message, a chat message, an email) to a message participant (other than a user of the device) in a message conversation of a messaging application (e.g., a text message application, a chat application, an email application). In some examples, the message includes (3008) an attached item (e.g. a file, a photo, a video, a payment). In some examples, the attached item (i.e., attachment) is not marked as requiring authorization.

In response to receiving the utterance, the electronic device (e.g., 2800, 2900) prepares (3010) to perform the operation, wherein in accordance with (3012) a determination that the operation requires authorization, preparing to perform the operation includes (3014) presenting, via the one or more output devices of the device: a representation (e.g., 2932) (3016) of the operation and instructions (3018) for providing authorization to the device, via the one or more input devices of the device, to perform the operation. Presenting, to the user, a representation (e.g., 2932) of the operation and instructions for providing authorization to perform the operation provides the user with feedback about the operation that will be performed (once authorized) and about the state of the device (state in which authentication is required), and prompts the user to provide the authorization (e.g., through biometric authentication, such as via a fingerprint authentication or facial recognition). Providing improved feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, presenting instructions for providing authorization to the device, via the one or more input devices of the device, to perform the operation comprises (3020) displaying, on the display (e.g., 2802, 2902), an authorization user interface (e.g., 2822, 2948, a user interface for receiving authentication information from the user of the device to authorize the operation, such as a payment). In some examples, the authorization user interface (e.g., 2948) includes a request for authentication information (e.g., 2830, 2950, biometric authentication information) from the user of the device to authorize the operation. In some examples, the authorization user interface (e.g., 2822, 2948 includes an indication of a payment method to be used, along with an option to change the payment method (e.g., to select from among a plurality of payment methods, such as credit card accounts, debit card accounts, payment accounts, provisioned onto the electronic device). In some examples, the authorization user interface (e.g., 2822, 2948) includes instructions for providing the authorization (e.g., 2830, 2950). In some examples, the authorization user interface (e.g., 2948) is a system-generated authorization user interface that is used for payments in other contexts (e.g., in-app and web payments). In some examples, the system-generated authorization user interface is a user interface for the second application (e.g., operating system or electronic wallet application), as described in U.S. patent application Ser. No. 14/503,296, filed Sep. 30, 2014, titled "USER INTERFACE FOR PAYMENTS," the contents of which are incorporated herein by reference.

After preparing to perform the operation, the electronic device receives (3022) a confirmation input (e.g., a tap input on the device, a tap input on a touch-sensitive surface of the device, a verbal confirmation input) associated with (or corresponding to) performing the operation. In response to (3024) receiving the confirmation input, the electronic device performs one or more of blocks 3026, 3032, and 3038.

In accordance with (3026) a determination that the operation requires authorization and the operation has not been authorized, the electronic device (e.g., 2800, 2900) forgoes (3028) performing the operation in response to the confirmation input. In some examples, in accordance with (3026) a determination that the operation requires authorization and the operation has not been authorized, the electronic device forgoes (3030) unlocking the device from the locked mode of operation to an unlocked mode of operation (e.g., a mode of operation in which the user is authenticated to the device and the device is enabled to perform one or more operations that the device is prevented from performing when in a locked mode of operation). Forgoing unlocking the device in accordance with a determination that authorization has not been successfully provided enhances device security and allows the user to store files and information (e.g., documents, photos, accounts) on the device knowing that access to the device is protected by security measures. Increasing the security of the device enhances the operability of the device by preventing unauthorized access to content and operations and, additionally, reduces power usage and improves battery life of the device by enabling the user to use the device more efficiently.

In accordance with (3032) a determination that the operation requires authorization and the operation has been authorized, the electronic device performs (3034) the operation in response to the confirmation input (e.g., sending the message with the secure attachment, or sending the payment). In some examples, in accordance with (3032) a determination that the operation requires authorization and the operation has been authorized, the electronic device (e.g., 2800, 2900) unlocks (3036) the device from the locked mode of operation to the unlocked mode of operation.

In accordance with (3038) a determination that the operation does not require authorization, the electronic device (e.g., 2800, 2900) performs (3040) the operation in response to the confirmation input (e.g., sending the message that does not include the secure attachment or payment). In some examples, in accordance with (3038) a determination that the operation does not require authorization, the electronic device forgoes unlocking the device from the locked mode of operation to the unlocked mode of operation.

Thus, in some examples, when the electronic device is locked and the electronic device (e.g., 2800, 2900) receives valid authentication to authorize an operation, the device also transitions to an unlocked mode of operation. Accordingly, a single authentication (e.g., a single biometric authentication, a single fingerprint authentication, a single facial recognition authentication) is used to both authorize the operation and to unlock the device. In some examples, when the electronic device is locked and the electronic device receives invalid authentication to authorize an operation, the device does not transition to the unlocked mode of operation.

In some examples, the attached item is marked as requiring authorization (e.g., to authorize opening of a protected file, to authorize a payment associated with the attachment).

In some examples, the attached item is a payment object that represents a payment to the message participant (e.g., a payment object that authorizes payment to the message participant by a bank or other financial institution or a digital representation of a payment made to the message participant).

In some examples, the attached item is a request for payment (e.g., a request for a certain amount of funds) by the user of the device from the message participant.

In some examples, performing the operation in response to the confirmation input includes displaying, on the display (e.g., 2802, 2902), an indication (e.g., 2830, 2952, a confirmation notification, a textual confirmation (e.g., "Your message will be sent," "I'll send your message"), an audio confirmation, a feedback indicating confirmation) that the message (with the attachment) will be sent to the message participant in the message conversation of the messaging application. Displaying an indication that the message will be send to the participant provides the user with visual feedback about the state of the device, such as whether the operation has been (or will be) performed. Providing improved feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, prior to performing the operation in response to the confirmation input, the electronic device (e.g., 2800, 2900) outputs a prompt (e.g., a visual indication such as a text bar or a prompt, and/or an audio indication) to include a user-specified message along with the attached item (e.g., in the message or in a subsequent or prior message in the message conversation). In some examples, subsequent to outputting the prompt to include the user-specified message along with the attached item, the electronic device receives, via one or more input devices (e.g., a microphone, a displayed keyboard), additional input (e.g., an utterance, a typed input). The electronic device sends text corresponding to the additional input to the participant in the message conversation along with the attachment.

In some examples, in accordance with a determination, based on the utterance from the user, that a graphical animation (e.g., a dynamic visual effect, such as a moving pattern, moving elements, and/or changing colors) is to be associated with the message, the electronic device (e.g., 2800, 2900) requests, via the one or more output devices (e.g., a visual request via the display, an audio request via speakers), user selection of a graphical animation. In some examples, the electronic device provides a plurality of different graphical animations that can be applied for the user to choose from. In some examples, the electronic device receives, via the one or more input devices, the user selection of a first graphical animation (e.g., animation comprising falling cash, an animation comprising fireworks, an animation comprising an unwrapping gift box, an animation comprising an opening envelope). In some examples, the electronic device associates the first graphical animation with the message prior to sending the message to the message participant. In some examples, if the message is an instant message (e.g., a text message), when the message participant receives the message in a text messaging application on the message participant's external device, the message is displayed in the message conversation of the text messaging application with the first graphical animation being applied.

In some examples, prior to presenting the instructions for providing authorization to the device, via the one or more output devices of the device, to perform the operation, the electronic device (e.g., 2800, 2900) displays, on the display (e.g., 2802, 2902), an indication of a send option (e.g., 2940, for sending an attachment, for sending a payment) and an indication of a request option (e.g., 2984, for requesting an attachment, for requesting a payment).

In some examples, prior to presenting the instructions for providing authorization to the device, via the one or more output devices of the device, to perform the operation, the electronic device (e.g., 2800, 2900) displays, on the display (e.g., 2802, 2902) a send option (e.g., 2818, 2940, for sending an attachment, for sending a payment) and a request option (e.g., 2984, for requesting an attachment, for requesting a payment). For example, the send option (e.g., 2818, 2940) and the request option (e.g., 2984) are displayed in accordance with the electronic device determining that the utterance (e.g., a word, a phrase, a natural language input) corresponds to the operation (e.g., with high confidence, confidence above a threshold) but with a confidence below a confidence threshold as to whether the utterance corresponds to a send operation or a request operation. The electronic device receives user input selecting the send option (e.g., 2818, 2940) or the request option (e.g., 2984). In accordance with the received user input corresponding to activation of the send option, the electronic device presents the instructions for providing authorization to the device. In some examples, in accordance with the received user input corresponding to activation of the request option (e.g., 2984), the electronic device forgoes presenting the instructions for providing authorization to the device and, optionally, transmits the request (e.g., request for payment). Thus, in some examples, the device requires authorization for sending payments and does not require authorization for requesting payments. In some examples, the send option and the request option are not displayed in accordance with the electronic device determining that the utterance (e.g., a word, a phrase, a natural language input) corresponds to the operation (e.g., with high confidence, confidence above a threshold) and with a confidence above the confidence threshold as to whether the utterance corresponds to a send operation or a request operation.

In some examples, the electronic device (e.g., 2800, 2900) receives a user input selection. In accordance with a determination that the user input selection corresponds to activation of the send option, the electronic device designates the attachment as a payment corresponding to a transfer of an amount of funds from the user to the message participant. In some examples, the technique subsequently proceeds to preparing to perform the operation, as described above. In accordance with a determination that the user input selection corresponds to activation of the request option, the electronic device designates the attachment as a payment request corresponding to a request for transfer of an amount of funds to the user from the message participant. In some examples, the technique subsequently proceeds to preparing to perform the operation, as described above.

In some examples, the electronic device (e.g., 2800, 2900) receives user selection (e.g., via a touch input of the option, via verbal instructions to select the option) of the send option (e.g., 2940). In response to receiving the user selection of the send option (e.g., 2818, 2940), the electronic device designates the attachment as a payment corresponding to a transfer of an amount of funds from the user to the message participant. In some examples, the technique subsequently proceeds to preparing to perform the operation, as described above.

In some examples, the electronic device (e.g., 2800, 2900) receives user selection (e.g., via a touch input of the option, via verbal instructions to select the option) of the request option (e.g., 2984). In response to receiving the user selection of the request option (e.g., 2984), the electronic device designates the attachment as a payment request corresponding to a request for transfer of an amount of funds to the user from the message participant. In some examples, the technique subsequently proceeds to preparing to perform the operation, as described above.

In some examples, the authentication information includes biometric authentication information (e.g., a fingerprint for fingerprint authentication, a facial feature for facial recognition, a voice input for voice recognition, an iris scan for iris recognition, retina scan for retina recognition).

In some examples, the authorization user interface (e.g., 2822, 2948) includes an indication of a resource account (e.g., a payment account, such as a debit card or a checking account, a points account, a credit account) for use in performing the operation.

In some examples, presenting, via the one or more output devices of the device, the representation of the operation and the instructions for providing the authorization to the device includes concurrently displaying, on the display: the representation of the operation (e.g., 2932), and the instructions for providing the authorization to the device, via the one or more input devices of the device, to perform the operation. Concurrently displaying a representation of the operation and instructions for providing authorization to perform the operation provides the user with visual feedback about the operation that will be performed (once authorized) and about the state of the device (state in which authentication is required), and prompts the user to provide the authorization (e.g., through biometric authentication, such as via a fingerprint authentication or facial recognition). Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, presenting, via the one or more output devices of the device, the representation of the operation and the instructions for providing the authorization to the device includes: outputting, via the one or more output devices (e.g., an audio output via a speaker), an audio (e.g., verbal)

(or, alternatively or in addition, a visual description) description of the operation; and outputting, via the one or more output devices (e.g., an audio output via a speaker), audio (e.g., verbal) (or, alternatively or in addition, a visual instruction) instructions for providing authorization to the device to enable performing of the operation. Outputting audio description of the operation and audio instructions for providing authorization to perform the operation provides the user with audio feedback about the operation that will be performed (once authorized) and about the state of the device (state in which authentication is required), and prompts the user to provide the authorization (e.g., through biometric authentication, such as via a fingerprint authentication or facial recognition). Providing improved audio feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, in response to receiving the utterance, and prior to preparing to perform the operation, the electronic device performs speech recognition on the utterance to determine a text representation of the utterance, wherein the operation is performed based on an analysis of the text representation of the utterance.

In some examples, speech recognition is performed using speech-to-text (STT) processing, such as through an Automatic Speech Recognition (ASR) system. One or more ASR systems can process the speech input to produce a recognition result. Each ASR system includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., the electronic device) to produce the recognition result. Once the STT processing produces recognition results containing a text string (e.g., words, or sequence of words, or sequence of tokens), the recognition result is passed to a natural language processing module for intent deduction. In some examples, STT processing produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing ranks the candidate text representations and provides the n-best (e.g., n highest ranked) candidate text representation(s) to the natural language processing module for intent deduction, where n is a predetermined integer greater than zero. For example, in one example, only the highest ranked (n=1) candidate text representation is passed to the natural language processing module for intent deduction. In another example, the five highest ranked (n=5) candidate text representations are passed to the natural language processing module for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, the analysis of the text representation of the utterance comprises performing natural language processing on the text representation of the utterance to determine an actionable intent (of a user of the device).

In some examples, the natural language processing module ("natural language processor") of a digital assistant takes the n-best candidate text representation(s) ("word sequence(s)" or "token sequence(s)") generated by STT processing, and attempts to associate each of the candidate text representations with one or more "actionable intents" recognized by the digital assistant. An "actionable intent" (or "user intent") represents a task that can be performed by the digital assistant. The associated task flow is a series of programmed actions and steps that the digital assistant takes in order to perform the task. The scope of a digital assistant's capabilities is dependent on the number and variety of task flows that have been implemented and stored in various task flow models, or in other words, on the number and variety of "actionable intents" that the digital assistant recognizes. The effectiveness of the digital assistant, however, also dependents on the assistant's ability to infer the correct "actionable intent(s)" from the user request expressed in natural language.

Other details of inferring a user intent based on candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Note that details of the processes described above with respect to method 3000 (e.g., FIGS. 30A-30D) are also applicable in an analogous manner to the methods described herein. For example, method 3000 optionally includes one or more of the characteristics of the various methods described herein with reference to methods 900, 1200, 1500, 1800, 2100, 2400, 2700, and 3400. For example, a payment message object created to transfer the first type of item (e.g., a sticker, a photo, a payment object), as described in method 900, can be create via an utterance (e.g., 2903). For another example, the outputting of feedback, as described in method 1200, can be applied to a representation of the operation after it has been sent via a messaging application. For another example, the message objects with different visual appearances based on whether the message object corresponds to a transmission message or a request message, as described in method 1500, are applicable to the different types of operations that be initiated by an utterance (e.g., 2903). For another example, a request for activating an account that is authorized to obtain one or items (e.g., a sticker, a photo, resources, a payment), as described in method 1800, can be applied when setting up an account associated an operation initiated by an utterance (e.g., 2903). For another example, switching the account to be used in a resource transfer based on an indication that resources are insufficient in the currently-selected account, as described in method 2100, can be used when switching the account to be used in the operation initiated by an utterance (e.g., 2903). For another example, automatically proceeding with a transfer, as described in method 2400, instead of requiring user input, can be used when transmitting an operation initiated by an utterance (e.g., 2903). For another example, the plurality of items including information from messages in a message conversation, as described in method 2700, can include information from operations initiated by an utterance (e.g., 2903). For another example, a visual effect (e.g., a coloring effect, a geometric alteration effect) can be applied, as described in method 3400, to an element of a message object (e.g., 2932) when a transfer (e.g., of a resource, of a file, of a payment) associated with a message corresponding to the message object is completed. For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 30A-30D are, optionally, implemented by components depicted in FIGS. 1A-1B. For example, receiving operation 3002, preparing operation 3010, presenting operation 3014, receiving operation 3022, performing operation 3028, performing operation 3034, and performing operation 3040 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 31A:
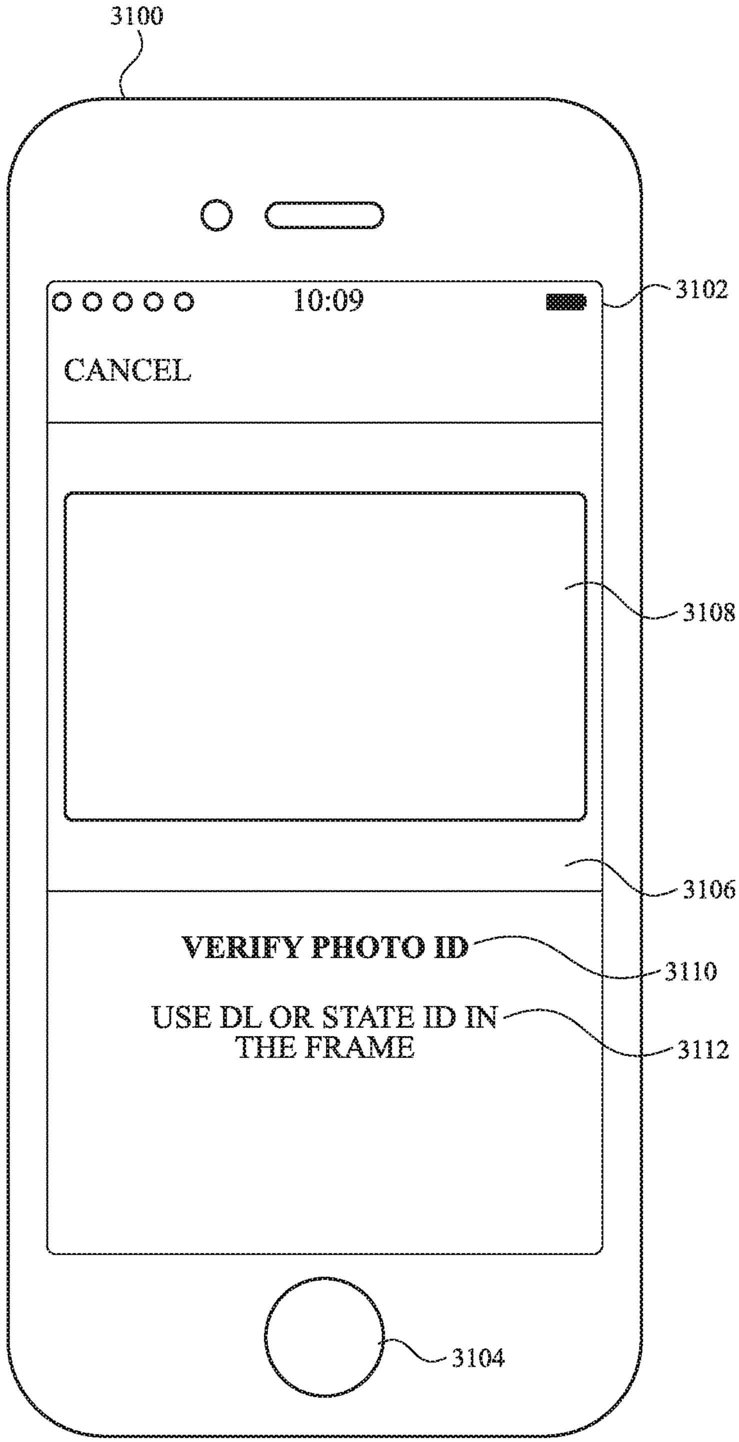
FIGS. 31A-31M illustrate example user interfaces for user verification, in accordance with some embodiments.

FIGS. 31A-31M illustrate example user interfaces for user verification, in accordance with some embodiments. FIG. 31A illustrates an electronic device 3100 (e.g., portable multifunction device 100, device 300, or device 500). In the non-limiting example embodiment illustrated in FIGS. 31A-31M, electronic device 3100 is a smartphone. In other embodiments, electronic device 3100 can be a different type of electronic device, such as a wearable device (e.g., a smartwatch). Electronic device 3100 has a display 3102 and one or more input devices (e.g., touchscreen of display 3102, a mechanical button 3104, a mic, a camera).

In some embodiments, the example user interfaces for user verification described below with reference to FIGS. 31A-31M can be used by an electronic device described herein (e.g., electronic device 700, 800, 850, 1000, 1100, 1300, 1400, 1600, 1700, 1900, 2000, 2100, 2300, 2500, 2600, 2800, 2900, 3200, and/or 3300) to verify a user of the device (e.g., to verify that the current user of the device is the user corresponding to a user account logged into the device). For example, in FIG. 8W, in accordance with a determination that fingerprint information 815 is (e.g., for a second time) not consistent with the enrolled fingerprint information (for authorizing a transaction or for verifying the user) associated with the user account, the user verification techniques described in FIGS. 31A-31M can be used by the device to verify the user. For another example, in FIG. 11P, in accordance with a determination that fingerprint information 1111 is (e.g., for a second time) not consistent with the enrolled fingerprint information (for authorizing a transaction or for verifying the user) associated with the user account, the user verification techniques described in FIGS. 31A-31M can be used by the device to verify the user. For another example, in FIG. 20I, in accordance with a determination that fingerprint information 2003 is (e.g., for a second time) not consistent with the enrolled fingerprint information (for authorizing a transaction or for verifying the user) associated with the user account, the user verification techniques described in FIGS. 31A-31M can be used by the device to verify the user. For another example, in FIG. 23M, in accordance with a determination that fingerprint information 2311 is (e.g., for a second time) not consistent with the enrolled fingerprint information (for authorizing a transaction or for verifying the user) associated with the user account, the user verification techniques described in FIGS. 31A-31M can be used by the device to verify the user.

In FIG. 31A, electronic device 3100 displays, on display 3102, an automatic verification user interface 3106 for verifying a user of the device (e.g., to verify that the current user of the device is the user corresponding to a user account logged into the device). As shown in FIG. 31A, automatic verification user interface 3106 includes a capture region 3108. In some embodiments, automatic verification user interface 3106 also includes a verification request 3110 (e.g., stating "Verify Photo ID") indicating to the user of a request for user verification. In some embodiments, automatic verification user interface 3106 also includes an indication 3112 (e.g., "Use DL or State ID in the frame") informing the user of an allowable input object (e.g., a driver's license, a government-issued identification card, a passport) for the verification.

Figure 31B:
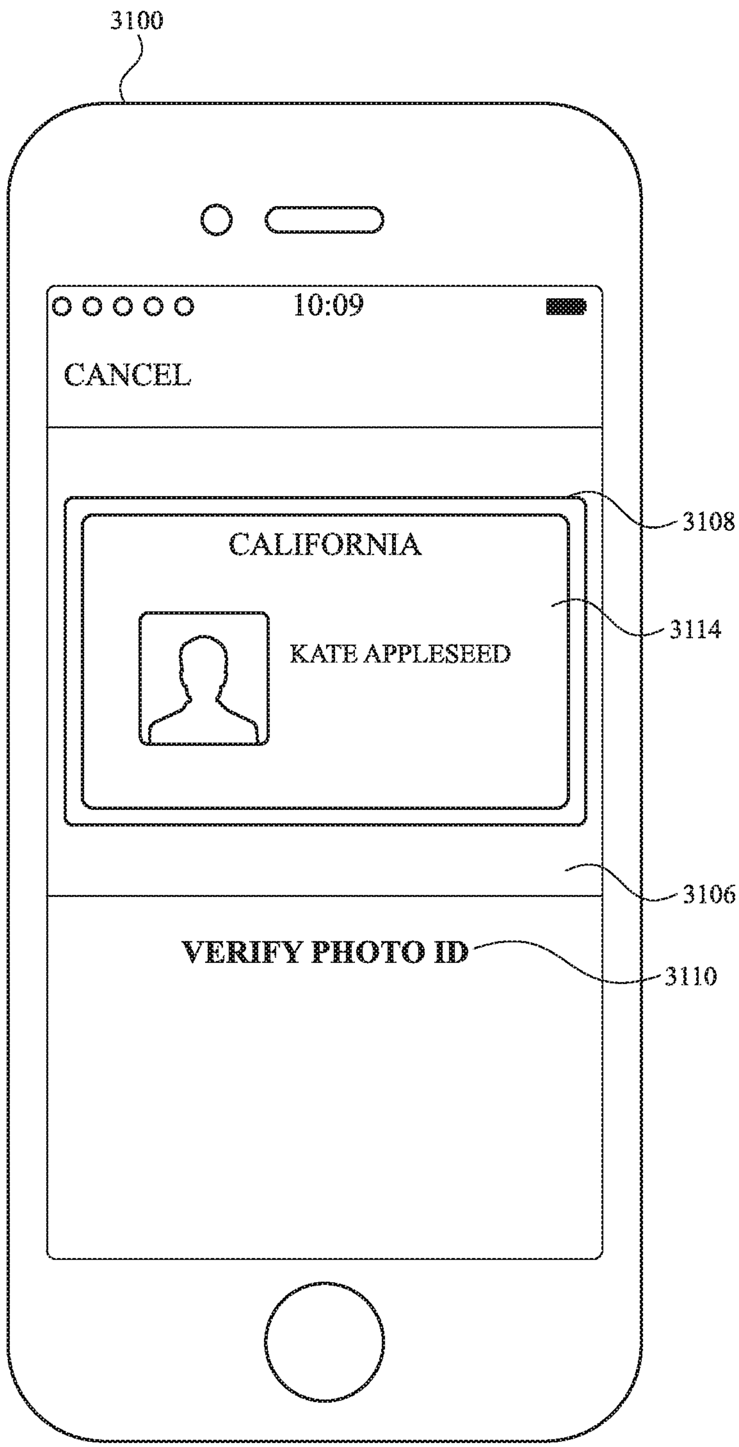

In FIG. 31B, while displaying automatic verification user interface 3106, electronic device 3100 detects (e.g., via a camera of the device), an input object provided by the user of the device (e.g., "Kate Appleseed"). For example, as shown in FIG. 31B, the input object is a government-issued identification card 3114 (e.g., a California state ID) provided by the user. In some embodiments, the device displays, while and after capturing an image of government-issued identification card 3114, the captured image of government-issued identification card 3114 within capture region 3108.

Figure 31C:
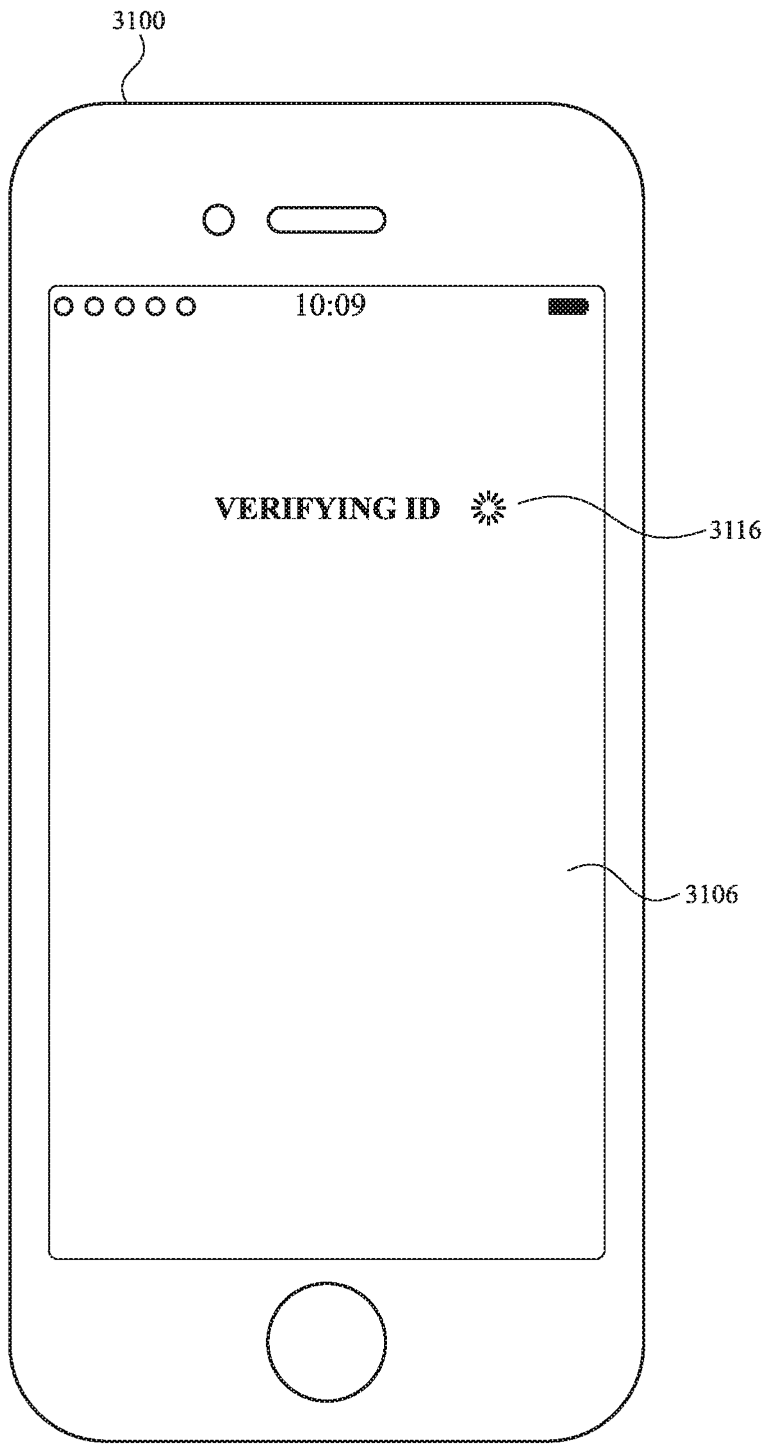

As shown in FIG. 31C, in response to capturing the image of government-issued identification card 3114, automatic verification user interface 3106 displays a progress page 3106 including an indication 3116 that the ID-verification is currently in progress.

Figure 31D:
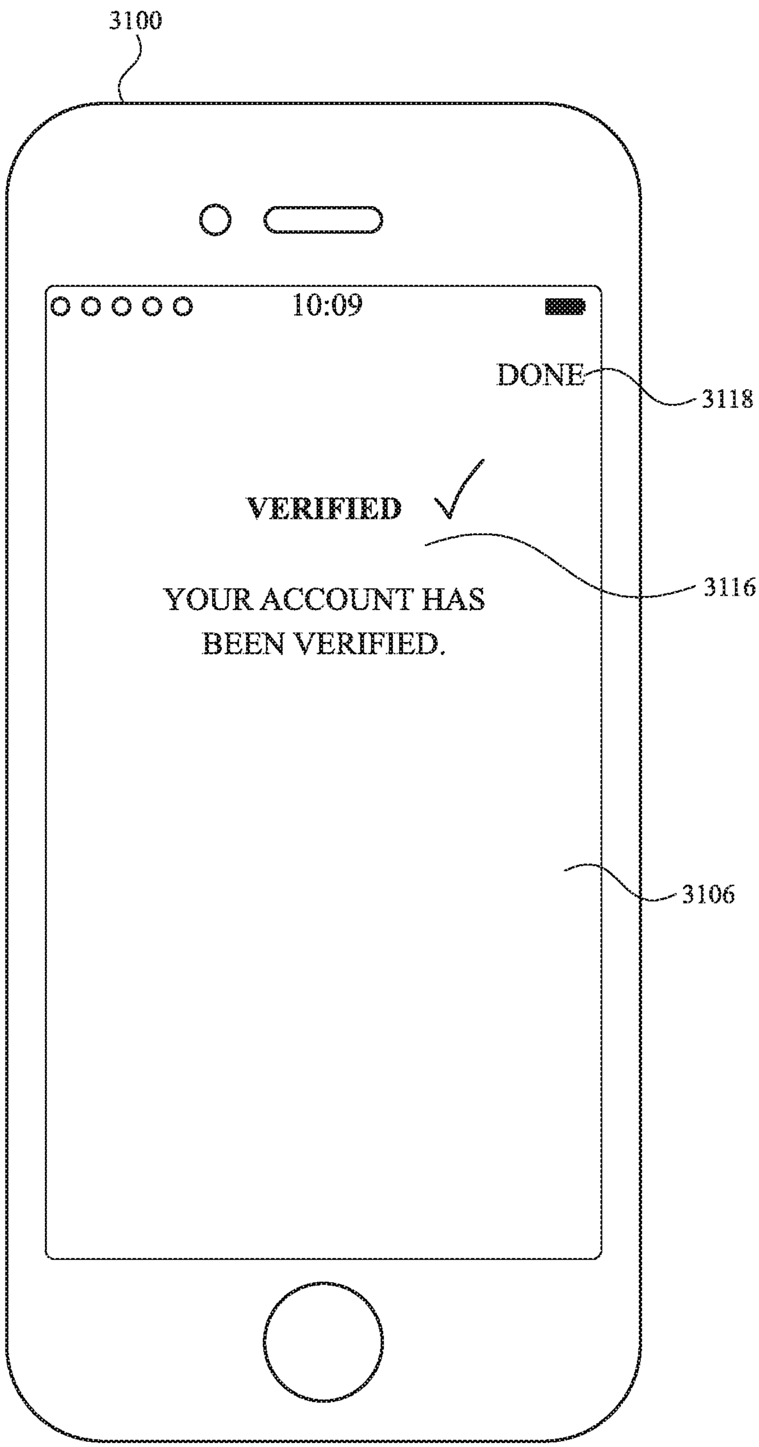

As shown in FIG. 31D, in accordance with a determination (e.g., made by the device or by an external device, such as a server, communicating with the device) that verification was successful (e.g., because user identification information obtained from the captured government-issued identification card 3114 is consistent with enrolled user identification information stored on the device or stored on an external device, such as a server, communicating with the device), automatic verification user interface 3106 displays a confirmation indication 3116 (e.g., stating "Verified," "Your Account Has Been Verified") informing the user of the successful verification. In some embodiments, automatic verification user interface 3106 also displays a done button 3118 for leaving the verification interface.

Figure 31E:
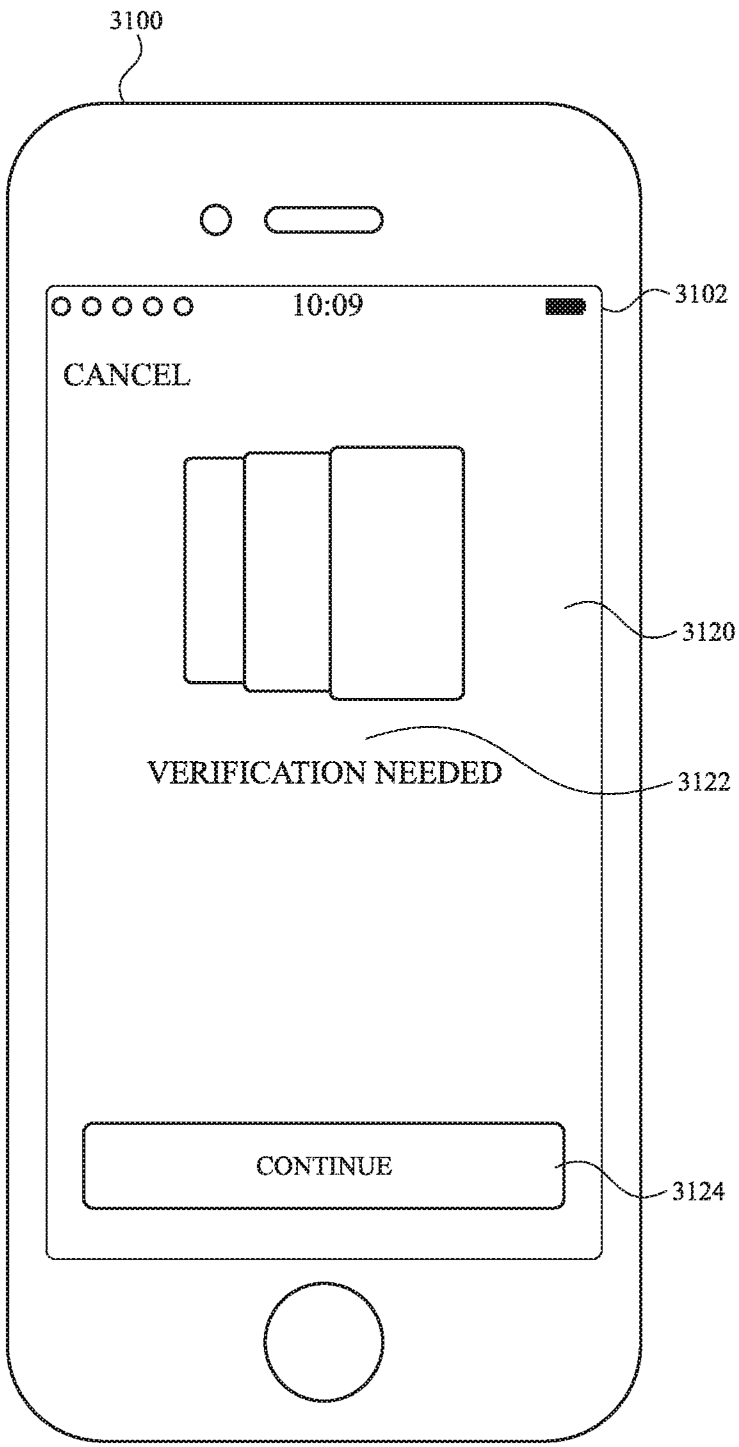

In some embodiments, in accordance with a determination (e.g., made by the device or by an external device, such as server, communicating with the device) that verification using identification information captured from government-issued identification card 3114 was not successful, electronic device 3100 displays, on display 3102, a manual verification user interface 3120. In some embodiments, manual verification user interface 3120 is displayed in the first instance of the verification (e.g., instead of automatic verification user interface 3106). In some embodiments, as shown in FIG. 31E, manual verification user interface 3120 includes an (e.g., graphical and/or textual) indication that manual verification is required for user verification and a continue button 3124 for proceeding with the manual verification process.

Figure 31F:
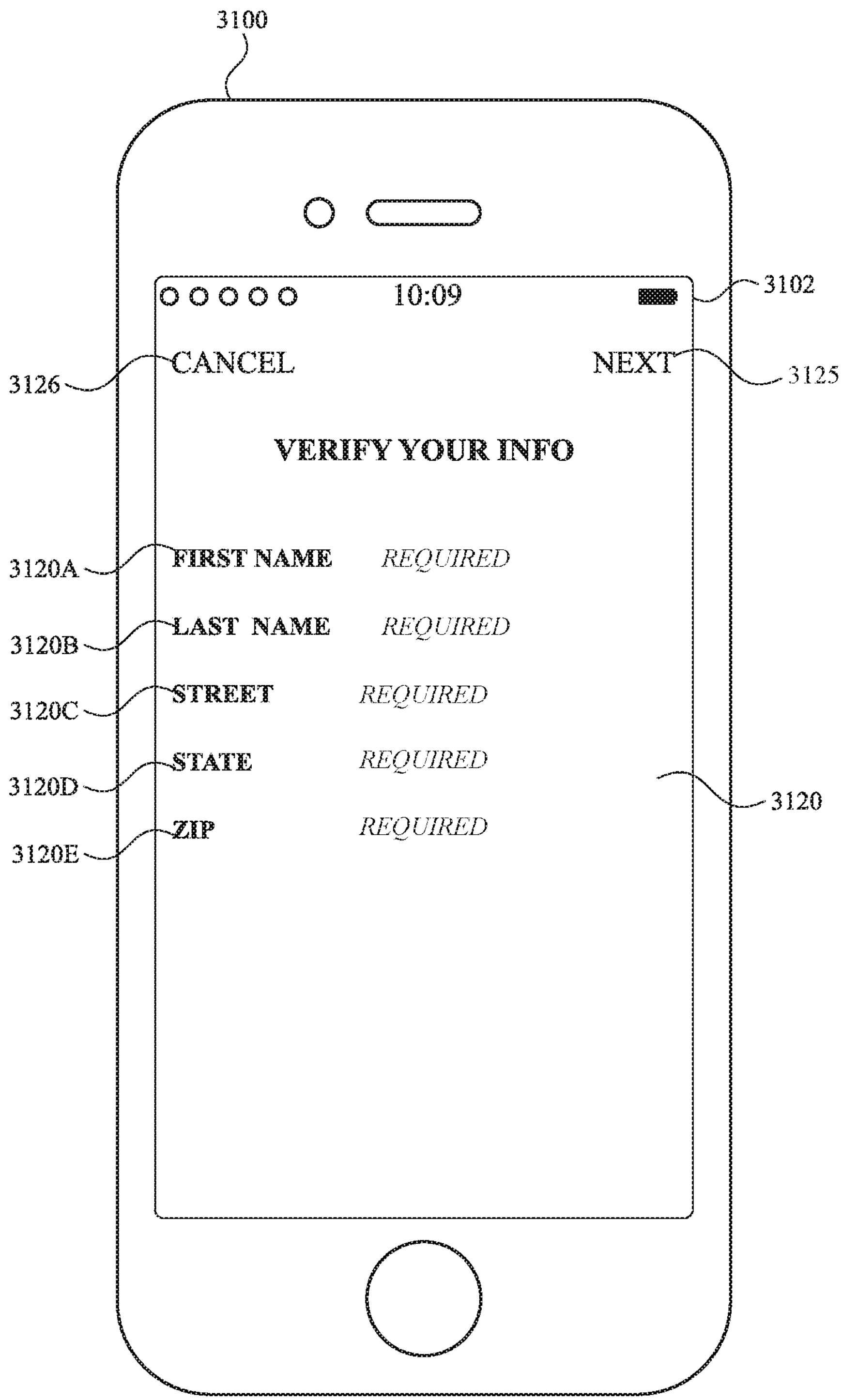

In FIG. 31F, in response to detecting selection (e.g., a tap gesture) of continue button 3124, electronic device 3100 displays, on display 3102, a first questions page of manual verification user interface 3120 that requests from the user a first set of identification information. For example, as shown in FIG. 31F, the first set of identification information includes a request 3120A for a first name, a request 3120B for a last name, a request 3120C for a street address, a request 3120D for a resident state, and a request 3120E for a zip code. In some embodiments, first questions page of manual verification user interface 3120 also includes a cancel button 3126 for canceling the verification process and a next button 3125 for proceeding with the verification process (after having provided the request information from the first set of questions).

Figure 31G:
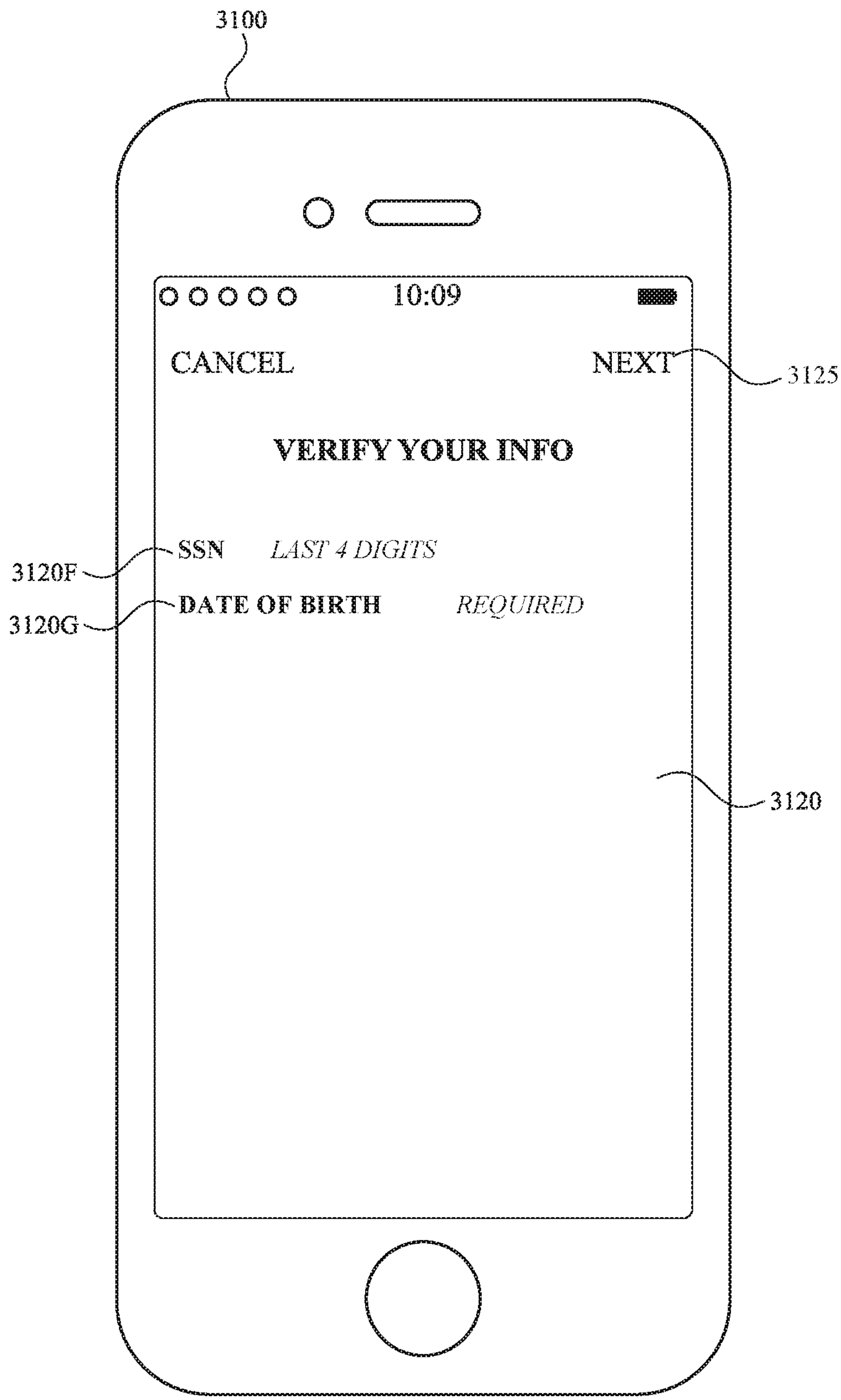

In some embodiments, in FIG. 31G, in response to detecting user selection (e.g., a tap gesture) of next button 3125 from the first questions page of manual verification user interface 3120, electronic device 3100 displays a second questions page of manual verification user interface 3120 that requests from the user a second set of identification information. For example, as shown in FIG. 31G, the second set of identification information includes a request 3120F for (a portion of) a government identification number (e.g., last four digits of a social security number, last four digits of an individual taxpayer identification number) and a request 3120G for date of birth information of the user. In some embodiments, second questions page of manual verification user interface 3120 maintains display of cancel button 3126 and next button 3125.

Figure 31H:
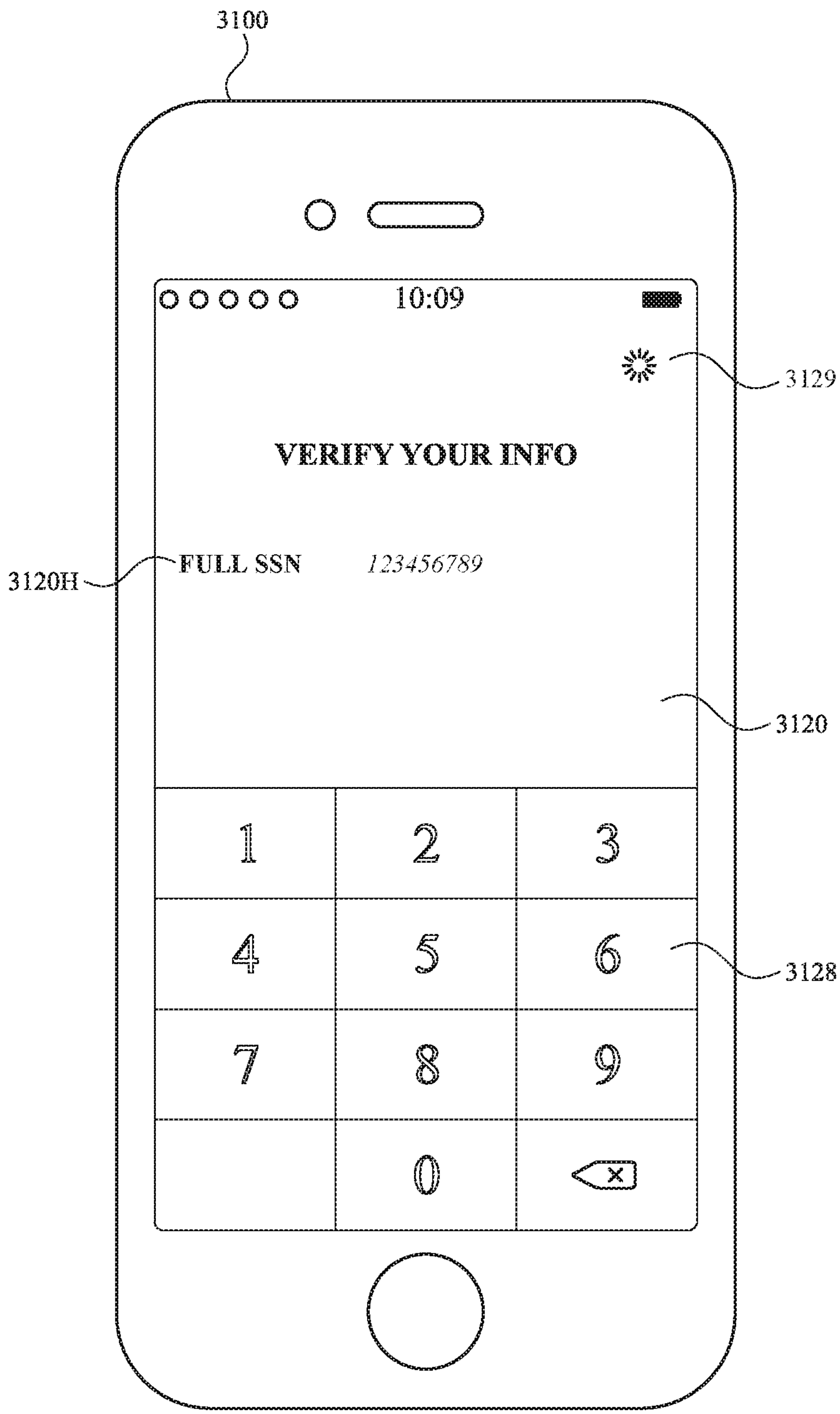

In some embodiments, in FIG. 31H, in response to detecting user selection (e.g., a tap gesture) of next button 3125 from the second questions page of manual verification user interface 3120, electronic device 3100 displays a third questions page of manual verification user interface 3120 that requests from the user a third set of identification information. For example, as shown in FIG. 31H, the third set of identification information includes a request 3120H for a full government identification number (e.g., full social security number, full individual taxpayer identification number). In some embodiments, request 3120H corresponds to a selectable indication, and, in response to detecting a user input (e.g., a tap gesture) on a selectable region of request 3120H, the device displays a virtual keypad 3128 for entering the requested information. In some embodiments, in response to a determination that the full digits of the requested verification information (e.g., all digits of a requested social security number has been entered), the device displays an indication 3129 that the entered identification number (e.g., the full social security number) is being verified (e.g., by an external device, such as a server, in communication with the device).

Figure 31I:
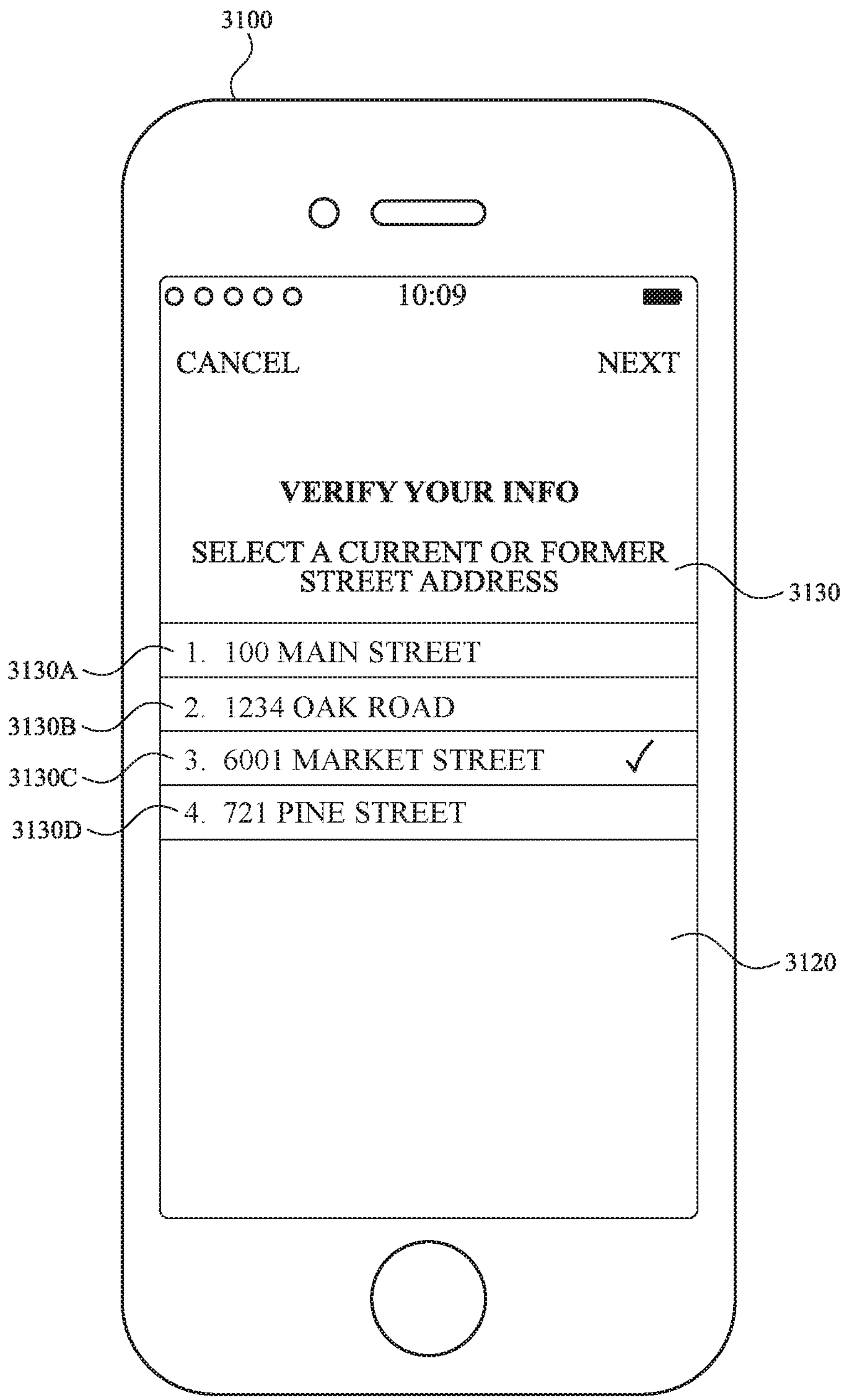

In some embodiments, in FIG. 31I, in response to a determination (e.g., by the external device in communication with the device) that the provided government identification number (e.g., a social security number) was consistent with enrolled identification information, electronic device 3100 displays a first question page of manual verification user interface 3120 that requests from the user an answer to a first question 3130 provided in the first question page of manual verification user interface 3120. For example, as shown in FIG. 31I, first question 3130 relates to a question requesting correct selection of a current or former street address of the user, and includes four possible answer choices 3130A-3130D (e.g., with only one being the correct answer choice). In FIG. 31I, answer choice 3130C is selected (as indicated by the checkmark) as the answer choice.

Figure 31J:
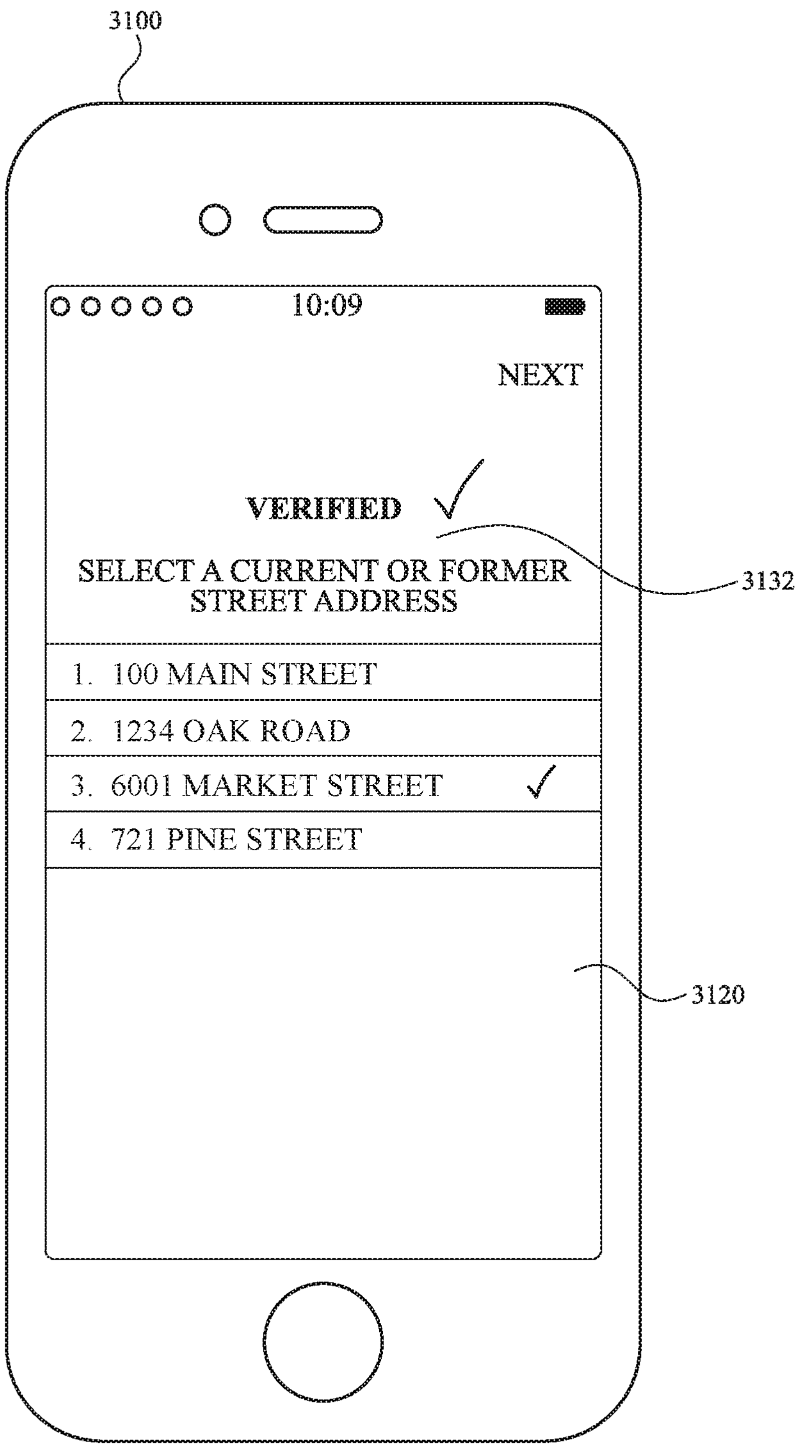

In some embodiments, in FIG. 31J, in accordance with a determination that answer choice 3130C was the correct answer choice to first question 3130, first question page of manual verification user interface 3120 provides an indication (e.g., stating "Verified") that the verification (that the current user of the device is the user associated with the user account logged into the device) was successful. In some embodiments, additional questions are asked by the device, via manual verification user interface 3120, for further verification.

Figure 31K:
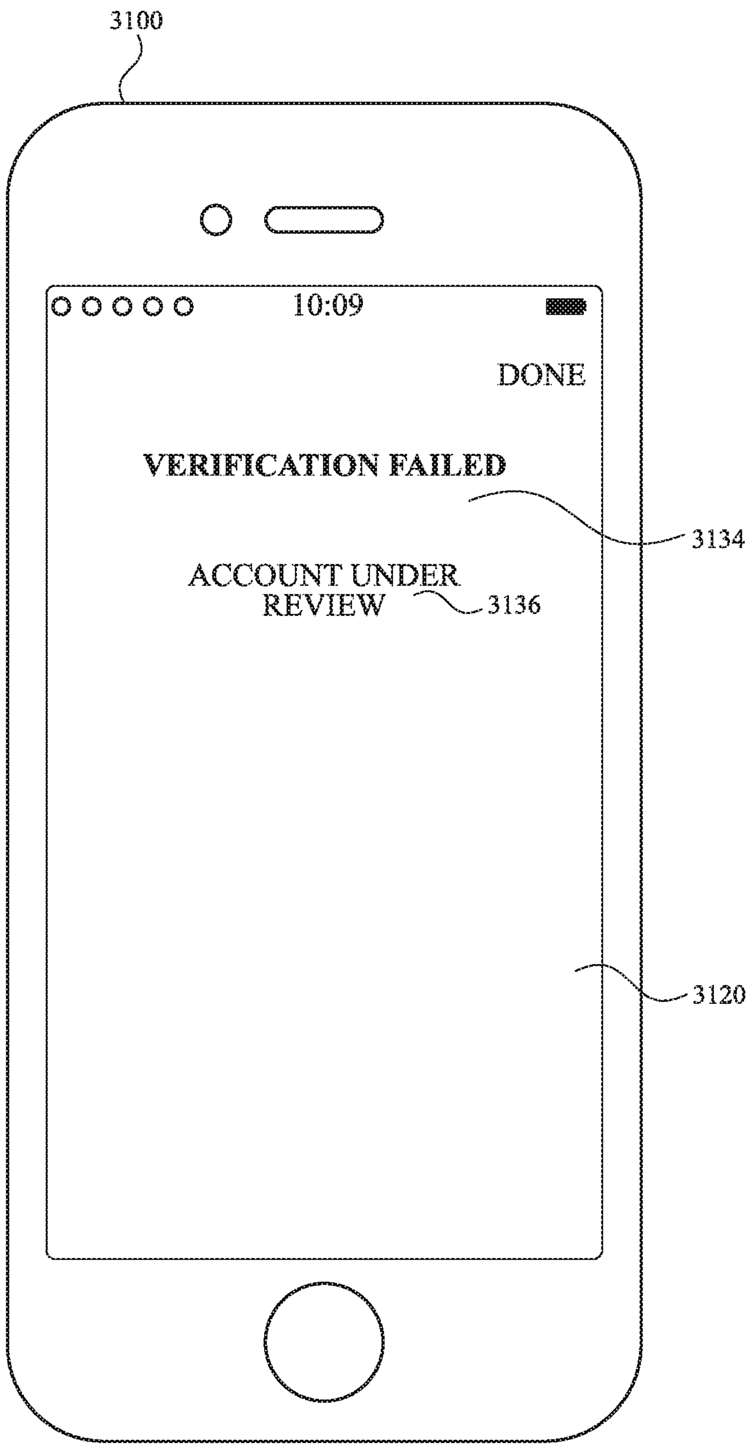
Figure 31L:
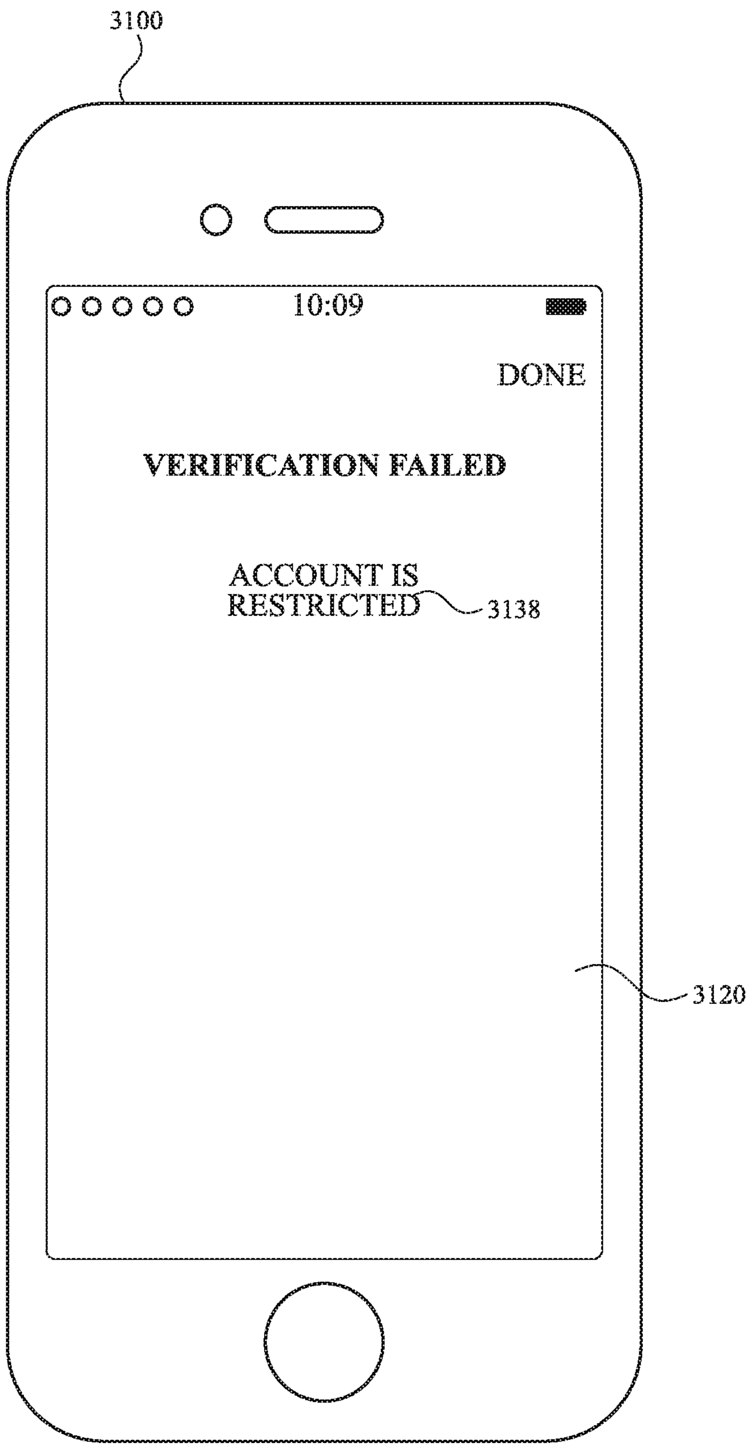

In some embodiments, as shown in FIG. 31K, in accordance with a determination that verification was unsuccessfully (e.g., subsequent to a determination that the answer choice provided for first question 3130 was not successful), electronic device 3100 displays a verification failed page of manual verification user interface 3120. For example, as shown in FIG. 31K, verification failed page of manual verification user interface 3120 includes an indication 3134 (e.g., stating "Verification Failed") informing the user that the verification was unsuccessful and an indication 3136 (e.g., stating "Account Under Review") that the user account currently logged into the device will undergo review (e.g., via an external server). In some embodiments, as shown in FIG. 31L, (e.g., if a user account is undergoing review) a plurality of features connected with and/or associated with the user account is disabled (e.g., the user account is restricted). Thus, in some embodiments, as shown in FIG. 31L, verification failed page of manual verification user interface 3120 includes an indication 3138 (e.g., stating "Account is Restricted") that the user account is currently restricted from use (e.g., while the account is undergoing review).

Figure 31M:
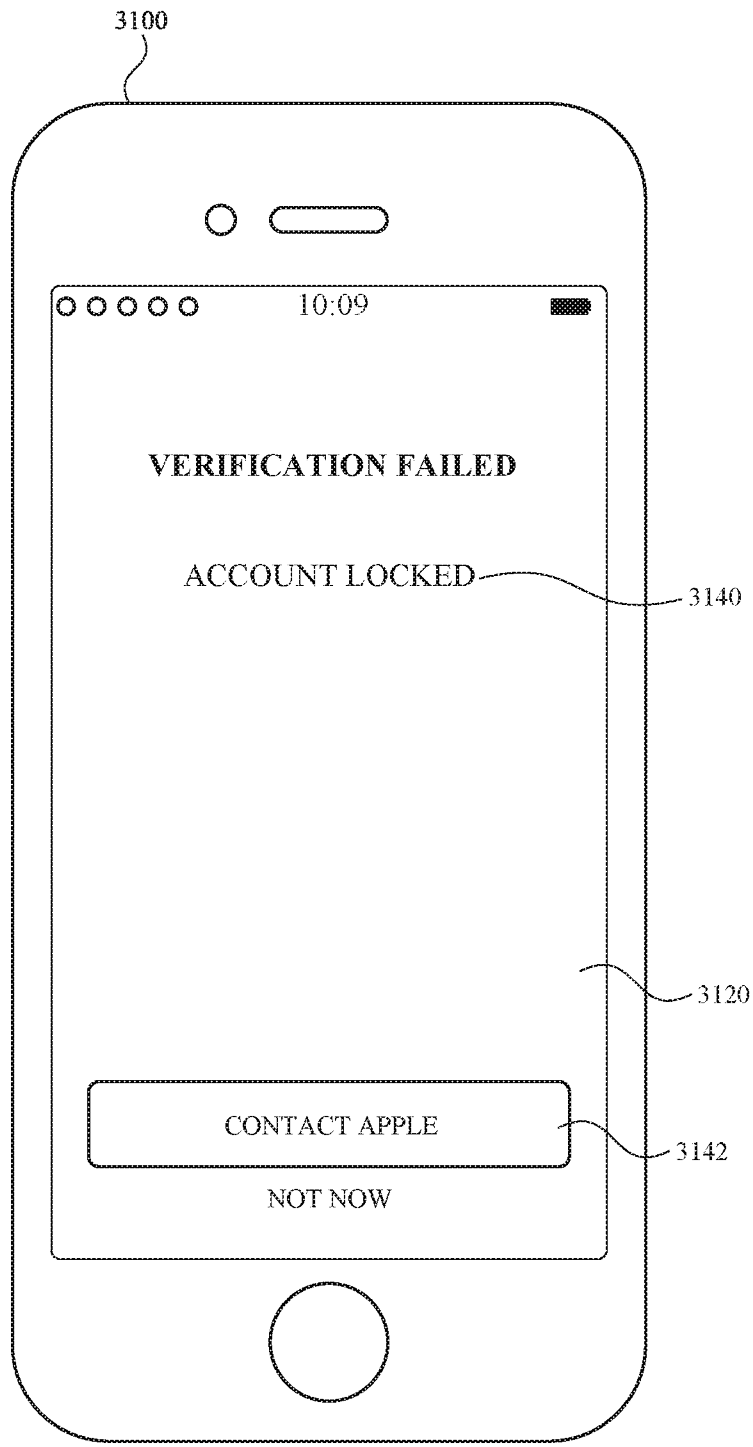

In some embodiments, as shown in FIG. 31M, (e.g., if a user account is undergoing review) all features connected with and/or associated with the user account are disabled (e.g., the user account is locked). Thus, in some embodiments, as shown in FIG. 31M, verification failed page of manual verification user interface 3120 includes an indication 3140 (e.g., stating "Account Locked") that the user account is currently locked from use (e.g., while the account is undergoing review). In some embodiments, as also shown in FIG. 31M, verification failed page of manual verification user interface 3120 includes a contact affordance 3143 for reporting the locked account and/or contacting an account management team (e.g., in order to discuss unlocking the locked account).

Figure 32A:
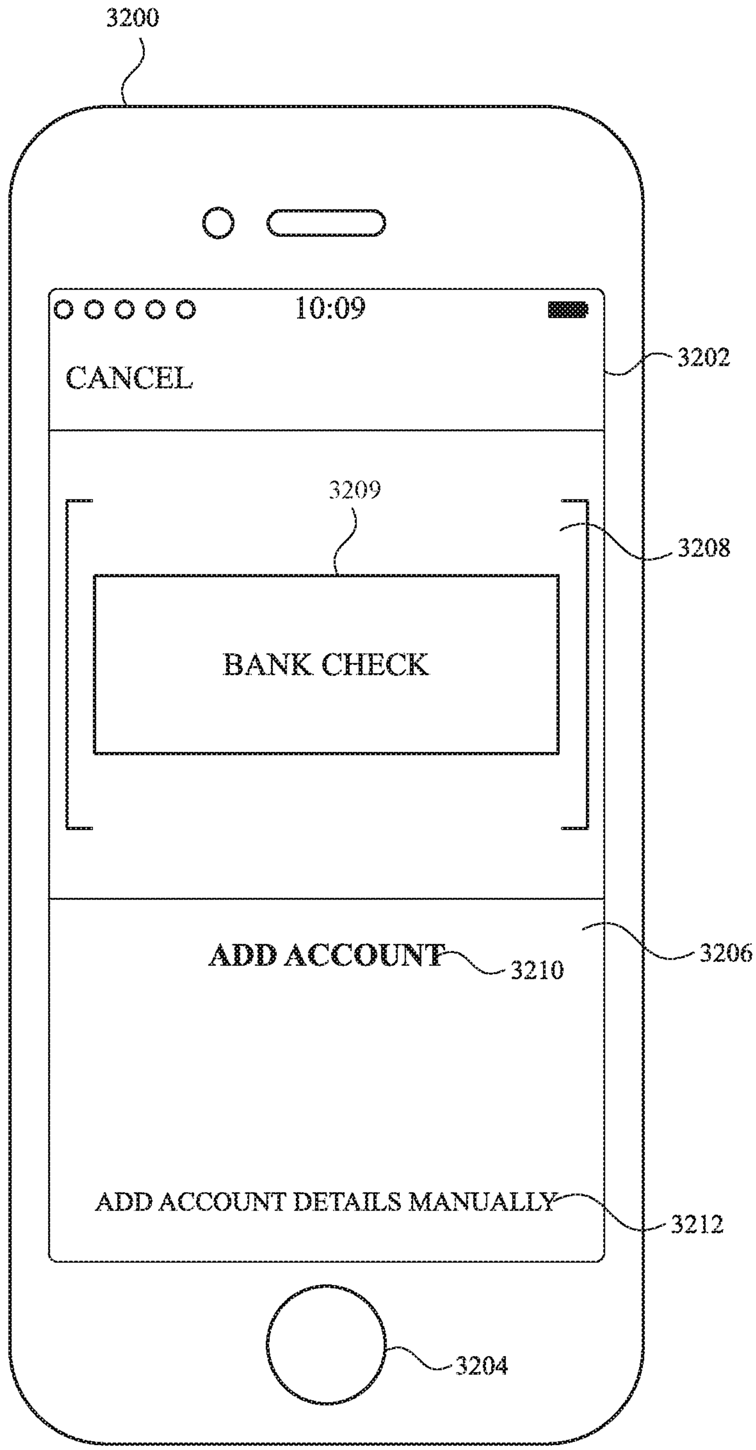
FIGS. 32A-32D illustrate example user interfaces for automatic account on-boarding, in accordance with some embodiments.

FIGS. 32A-32D illustrate example user interfaces for automatic account on-boarding, in accordance with some embodiments. FIG. 32A illustrates an electronic device 3200 (e.g., portable multifunction device 100, device 300, or device 500). In the non-limiting example embodiment illustrated in FIGS. 32A-32D, electronic device 3200 is a smartphone. In other embodiments, electronic device 3200 can be a different type of electronic device, such as a wearable device (e.g., a smartwatch). Electronic device 3200 has a display 3202 and one or more input devices (e.g., touchscreen of display 3202, a mechanical button 3204, a mic, a camera).

The example user interfaces for provisioning a user's account on the device described below with reference to FIGS. 32A-32D can be used, for example, to provision one or more of the accounts described above on the device. For example, the provisioning techniques described in FIGS. 32A-32D can be used to provision the payment account (corresponding to graphical representation 1756) described above with reference to FIGS. 17H-17K on the device. For another example, the provisioning techniques described in FIGS. 32A-32D can be used to provision the payment account (corresponding to graphical representation 2030) and/or the default account (corresponding to graphical representation 2024) described above with reference to FIGS. 20C-20J on the device. For another example, the provisioning techniques described in FIGS. 32A-32D can be used to provision the payment account (corresponding to graphical representation 2330) and/or the default account (corresponding to graphical representation 2324) described above with reference to FIGS. 23A-23C on the device. For another example, the provisioning techniques described in FIGS. 32A-32D can be used to provision the payment account (corresponding to graphical representation 2669) and the debit card account (corresponding to graphical representation 2671) described above with reference to FIGS. 26O-26R on the device.

In FIG. 32A, electronic device 3200 displays, on display 3202, an automatic account setup user interface 3206 for provisioning a user's account on electronic device 3200 for use (in making payment transactions) via the device. In some embodiments, automatic account setup user interface 3206 corresponds to automatic verification user interface 3106 described above with reference to FIG. 31A.

As shown in FIG. 32A, automatic account setup user interface 3206 includes a capture region 3208 for capturing (e.g., via a camera of the device) an image of an account (e.g., an image of a check associated with a checking account, an image of a physical debit card associated with a checking account) to be provisioned onto electronic device 3200. In some embodiments, automatic account setup user interface 3206 also includes a setup request 3210 (e.g., stating "Add account") indicating to the user that an account for provisioning is being requested to be captured (via capture region 3208). In some embodiments, automatic account setup user interface 3206 also includes a selectable manual setup option 3212 (e.g., stating "Add Account Details Manually") informing the user of a manual process (instead of an automatic process using capture.

In some embodiments, if the user provides a check 3209 corresponding to a checking account of the user to be captured (e.g., via a camera) by electronic device 2900, the device automatically detects account information from the captured check (e.g., user name information, bank name information, account number information, routing number information) to automatically (e.g., without any other user input of account information) provision the account corresponding the captured check on the device for use by the device (e.g., for making payment transactions.

Figure 32B:
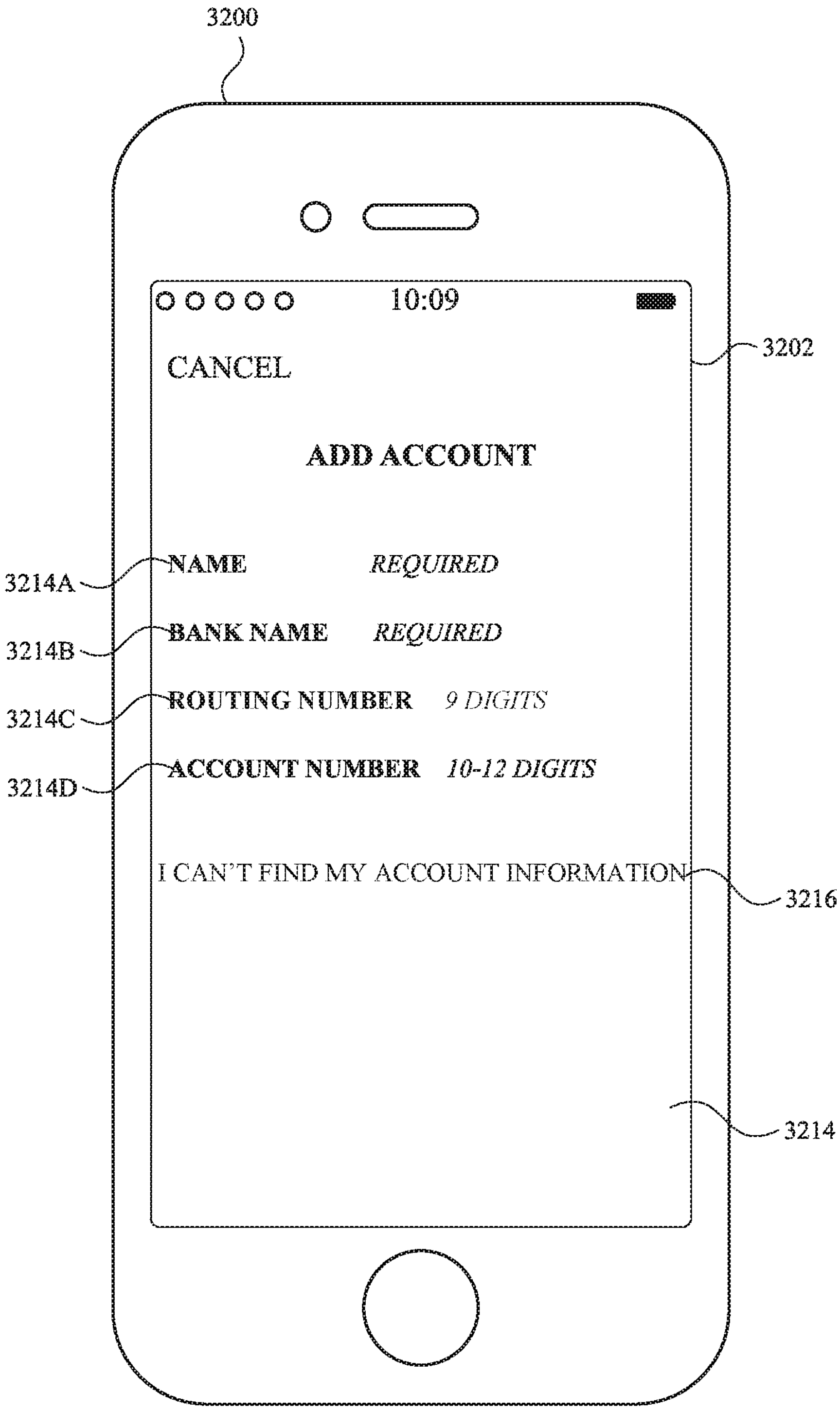
Figure 33A:
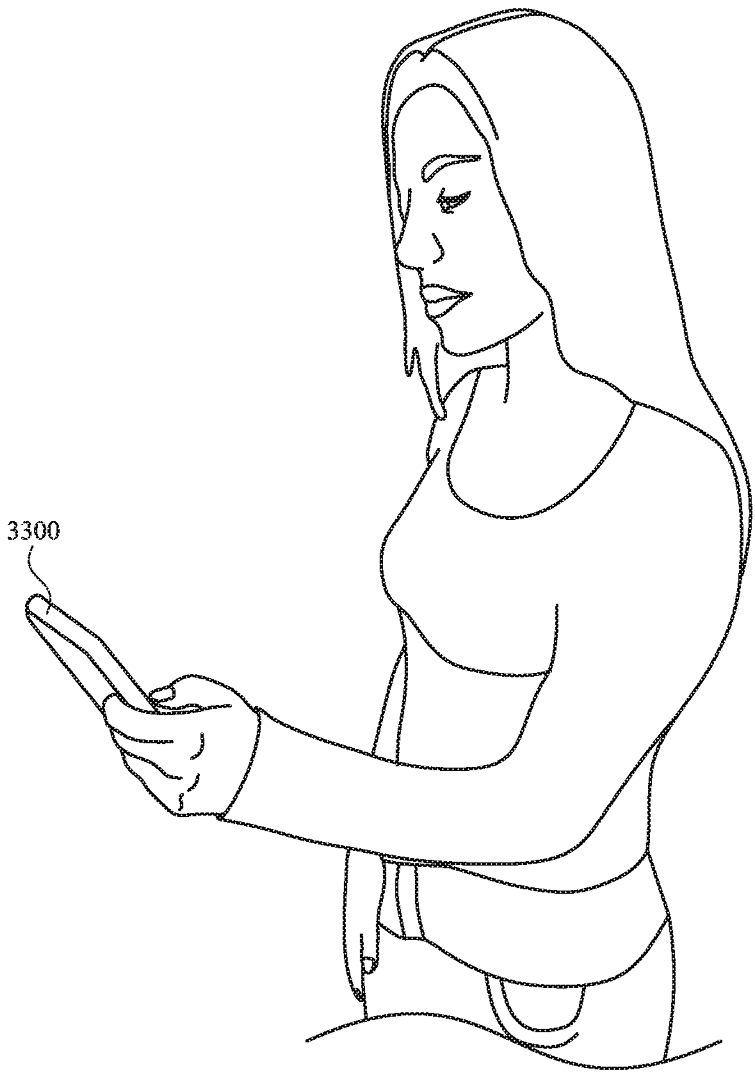
FIGS. 33A-33O illustrate example user interfaces for providing feedback corresponding to an operation associated with a transfer, in accordance with some embodiments.

In some embodiments, as shown in FIG. 32B, in response to user selection of manual setup option 3212, electronic device 3200 displays, on display 3202, a manual account setup user interface 3214 for manually (e.g., using a virtual keyboard) enter account information for provisioning the account onto the device. For example, as shown in FIG. 32B, manual account setup user interface 3214 includes a request 3214A for the user's (full name), a request 3214B for the bank name (of the account to be provisioned), a request 3214C for a routing number (of the account to be provisioned), and a request 3214D for an account number (of the account to be provisioned). In some embodiments, as also shown in FIG. 32B, manual account setup user interface 3214 includes selectable account details unavailable option 3216 for when account details are currently unavailable to be entered. In some embodiments, in response to user selection (e.g., a tap gesture) of account details unavailable option 3216, the device exits the account setup process (and ceases to display the account setup user interface).

Figure 32C:
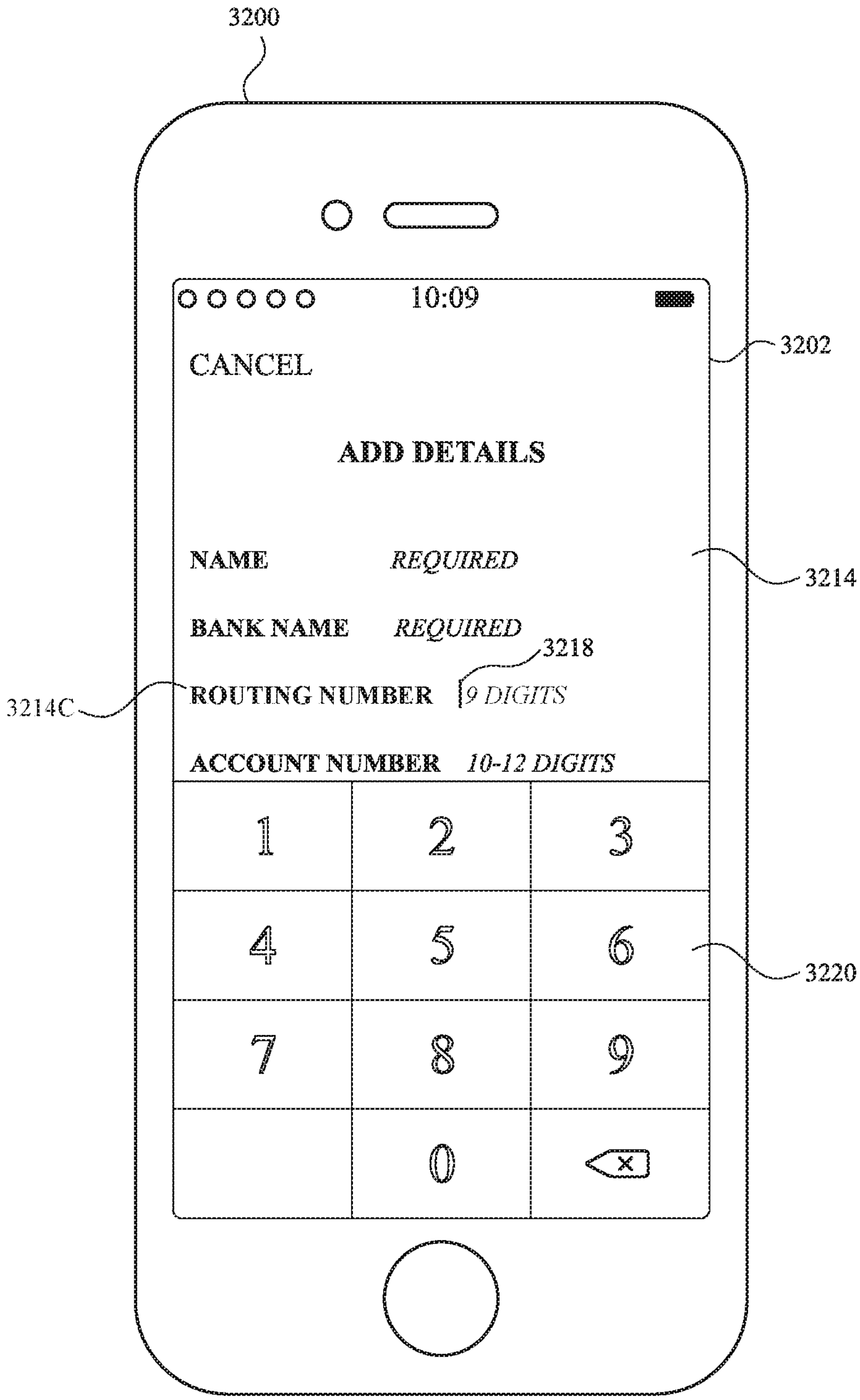

In some embodiments, as shown in FIG. 32C, while displaying manual account setup user interface 3214, in response to detecting user input (e.g., a tap gesture) on a selectable region of a request (e.g., where text can be entered, such as region 3218 corresponding to request 3214C), electronic device 3200 displays a virtual keypad 3220 (or a virtual alphanumeric keyboard) for use by the user when entering the requested account details information.

Figure 32D:
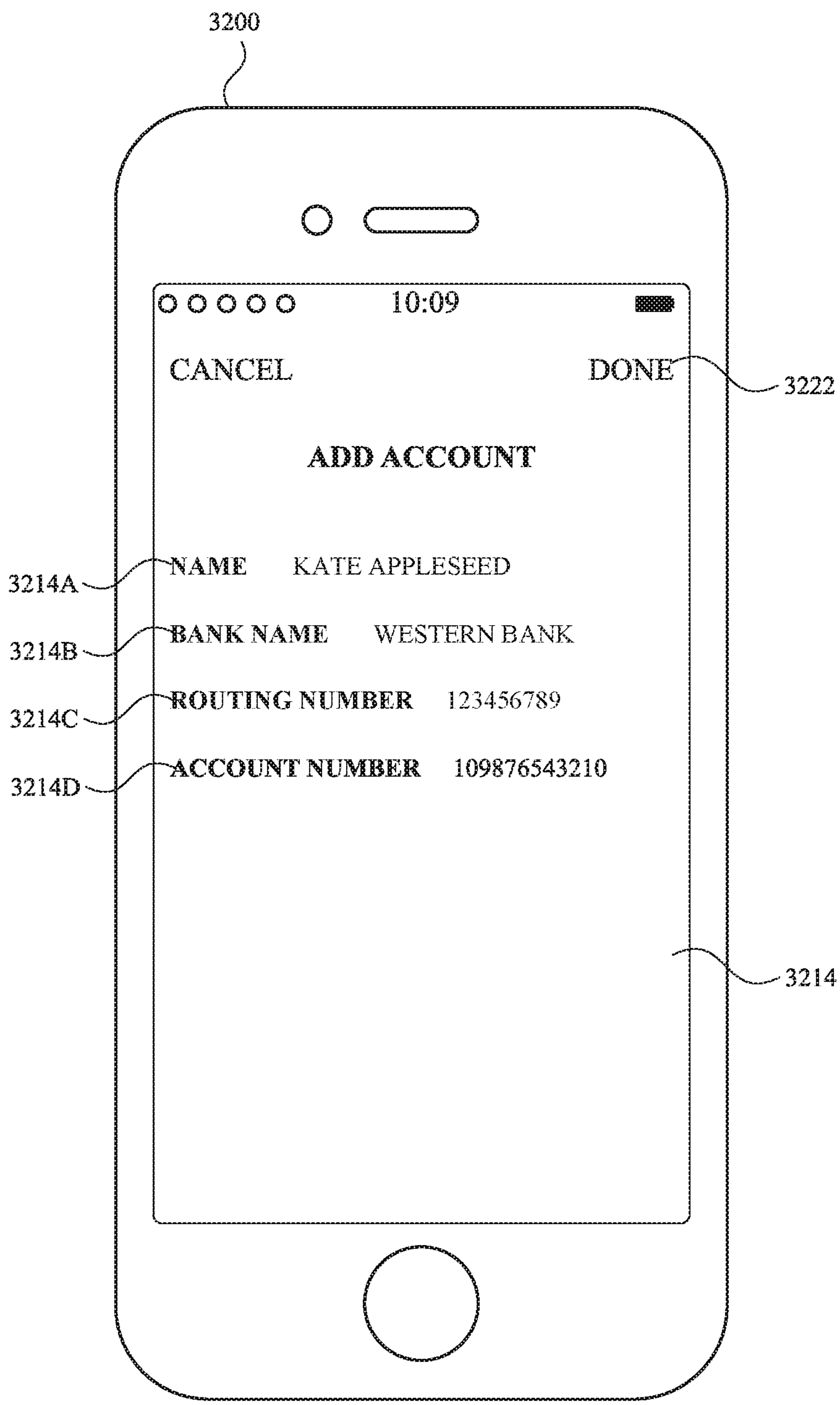

FIG. 32D shows manual account setup user interface 3214 with all of requested information 3214A-3214D having been entered (by the user of the device). In some embodiments, in response to a determination (e.g., by the device or by an external device, such as a server, in communication with the device) that all requested account detail information corresponding to 3214A-3214D has been entered, manual account setup user interface 3214 displays a done button 3222 for completing the setup process, and thereby provisioning the account (e.g., of the Western Bank) onto the device for use by the device (when performing payment transactions).

FIGS. 33A-33O illustrate example user interfaces for peer-to-peer transfers, in accordance with some embodiments. The user interfaces in these figures are used to illustrate the processes described below, including the processes in FIGS. 34A-34D.

FIG. 33A illustrates an electronic device 3300 (e.g., portable multifunction device 100, device 300, or device 500). In the non-limiting example embodiment illustrated in FIGS. 33A-33O, electronic device 3300 is a smartphone. In other embodiments, electronic device 3300 can be a different type of electronic device, such as a wearable device (e.g., a smartwatch).

FIG. 33A shows a user of electronic device 3300 (e.g., "Kate Appleseed") viewing a display of the device while holding the device at a predefined default orientation (e.g., predefined by an operating system of the device) relative to a baseline orientation with respect to a reference point (e.g., the ground, a face of a viewer, such as the user of the device). In some embodiments, the predefined default orientation is a resting state orientation. In some embodiments, the predefined default orientation is a 45 degree tilt from the surface of the ground.

Figure 33B:
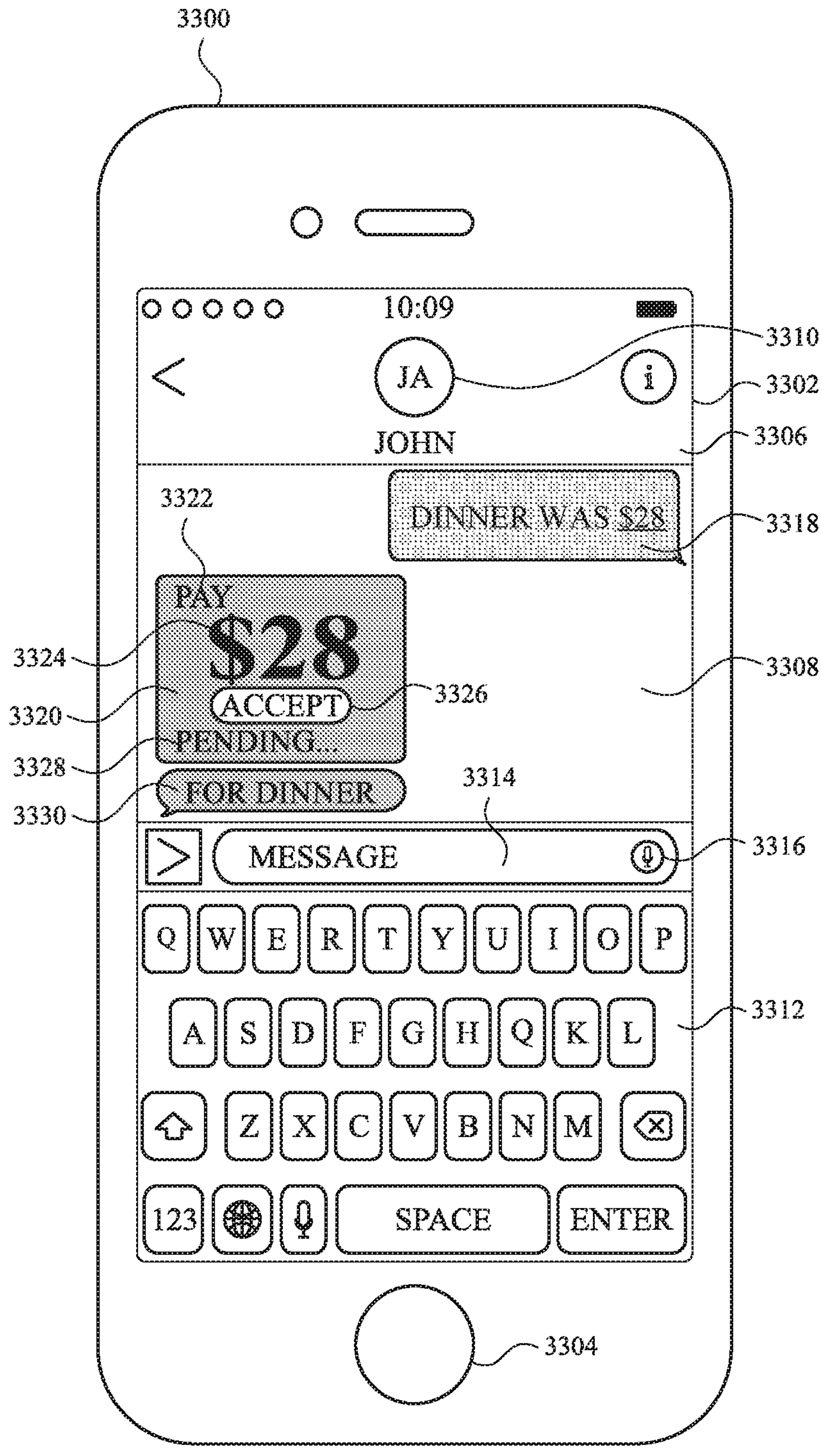

FIG. 33B shows a display 3302 of electronic device 3300, which also has one or more sensor devices (e.g., an accelerometer, one or more cameras) and, optionally one or more input devices (e.g., a touchscreen of the display, a mechanical button 3304, a mic).

In FIG. 33B, electronic device 3300 displays, on display 3302, a message conversation 3308 of a messaging application 3306 between the user and a message participant 3310 (e.g., "John Appleseed") (e.g., while the device is at the predefined default orientation relative to the baseline orientation. In some embodiments, message participant 3310 is a contact stored on the device. In some embodiments, message participant 3310 is a contact of a contact list associated with the user account logged onto the device. In some embodiments, message participant 3310 is a contact included in a trusted contacts list associated with the user account logged onto the device.

In some embodiments, electronic device 3300 also displays, on display 3302, a virtual keyboard 3312 (e.g., an alphanumeric keyboard for typing a message) and a compose bar 3314 displaying the text of a message as a message is typed using virtual keyboard 3312. In some embodiments, a mechanical keyboard can be used in addition to or alternatively to virtual keyboard 3312 to type a message. In some embodiments, compose bar 3314 can expand (e.g., expand upwards) to accommodate a longer or larger message or message object (e.g., an image, an emoticon, a special type of message object, such as a payment object). In some embodiments, compose bar 3314 includes a mic button 3316 which, when activated, enables the user to record a message using voice input.

As shown in FIG. 33B, message conversation 3308 includes a message object 3318 sent by the user to message participant 3310. In message corresponding to message object 3318, the user states to message participant 3310: "Dinner was $28." As also shown in FIG. 33B, message conversation 3308 includes a pending payment message object 3320 (e.g., similar to payment message object 1118 described above with respect to FIGS. 11A-11C) sent by message participant 3310 to the user of the device. As with payment message object 1118, pending payment message object includes a mode indication 3322 (e.g., stating "PAY") indicating to the user that the payment message object corresponds to a payment made by message participant 3310 to the user via an operating-system controlled (first-party) payment transfer application (and not by a third-party application). Pending payment message object 3320 also includes an amount object 3324 (e.g., "$28") of the amount of the payment sent by message participant 3310 to the user. Further, pending payment message object 3320 includes an accept button 3326 for accepting the payment corresponding to the message object in the amount shown in amount object 3324. Additionally, pending payment message object 3320 is a status indicator (e.g., stating "PENDING") informing the user that the payment (e.g., of $28) corresponding to the payment message object is pending (e.g., as opposed to being accepted/completed). In some embodiments, as with payment message object 1118, pending payment message object 3320 also includes an accompanying note message object 3330. In FIG. 33B, message participant 3310 informs the user, via note message object 3330, that the payment corresponding to payment message object 3320 is "For dinner" (that was requested by the user via message object 3318).

Figure 33C:
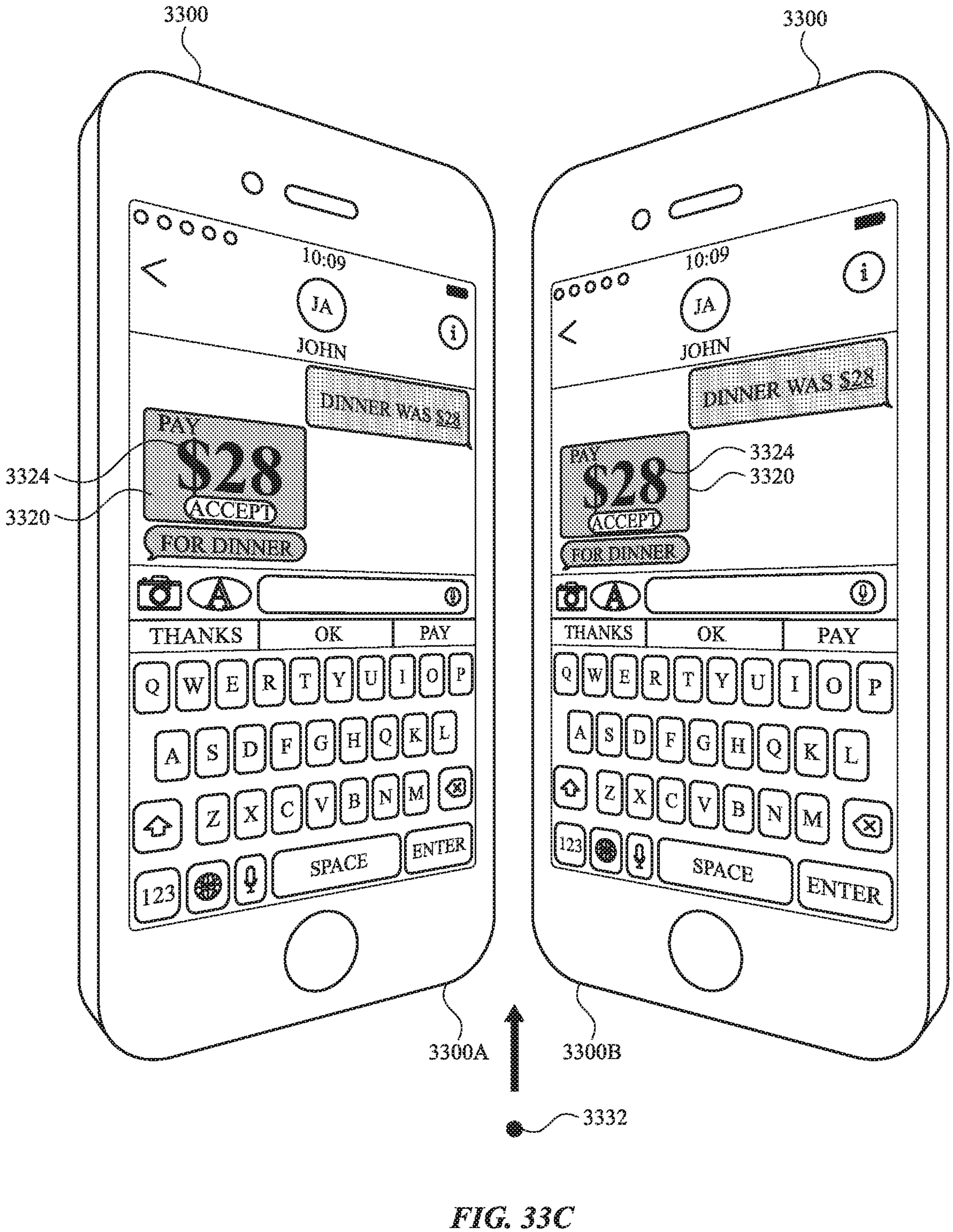

FIG. 33C shows electronic device 3300, while displaying the display (including payment message object 3320 of message conversation 3308) depicted in FIG. 33B, being viewed at two different orientations (e.g., at an angle 3300A and at an angle 3300B) relative to the baseline orientation with respect to a reference point 3332 (e.g., where the reference point is the ground). As shown in FIG. 33C, even if the device is viewed from the perspective of the two different orientations (e.g., represented by angle 3300A and angle 3300B relative to a baseline orientation with respect to reference point 3332), pending payment message object 3320 is displayed the same at either angle. In other words, whether a viewer (e.g., the user) views display 3302 of the device at an orientation corresponding to angle 3300A, or whether a viewer (e.g., the user) views display 3302 of the device at an orientation corresponding to angle 3300B, or whether a viewer (e.g., the user) views display 3302 of the device from straight on (e.g., such that the device is at the predefined default orientation), there is no change in how payment message object 3320, or an element of the payment message object (e.g., object 3324 of the amount of the payment) is displayed on display 3302 by the device. In some embodiments, moving towards the orientations corresponding to angles 3300A and 3300B includes movement of the device away from the baseline orientation.

Figure 33D:
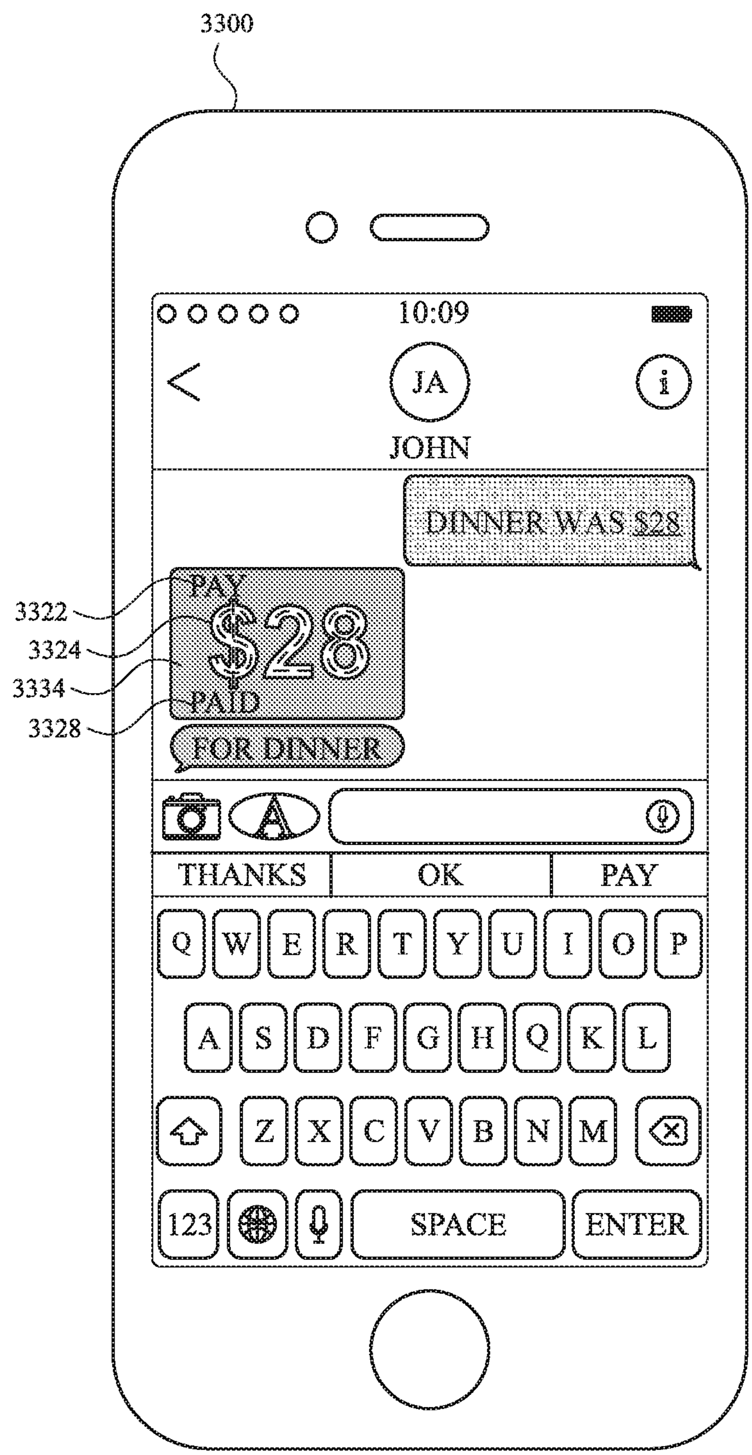

In some embodiments, while displaying payment message object 3320 within message conversation 3308, electronic device 3300 detects a user activation of accept button 3326 of the payment message object. As shown in FIG. 33D, in response to detecting the user activation of accept button 3326 (and thereby accepting the payment from message participant 3310), accept button 3326 ceases to be displayed on the payment message object.

As also shown in FIG. 33D, in response to detecting the user activation of accept button 3326 (and thereby accepting the payment from message participant 3310), pending payment message object 3320 as shown in FIG. 33B is updated to a corresponding completed payment message object 3334, and status indicator 3328 (e.g., stating "PAID") is also updated accordingly. Further, electronic device 3300 generates one or more feedbacks (e.g., a visual effect, a sensory feedback, such as a haptic effect, an audio feedback) indicating to the user that the payment has been accepted and that the payment message object now corresponds to a completed (instead of a pending) payment.

Figure 33E:
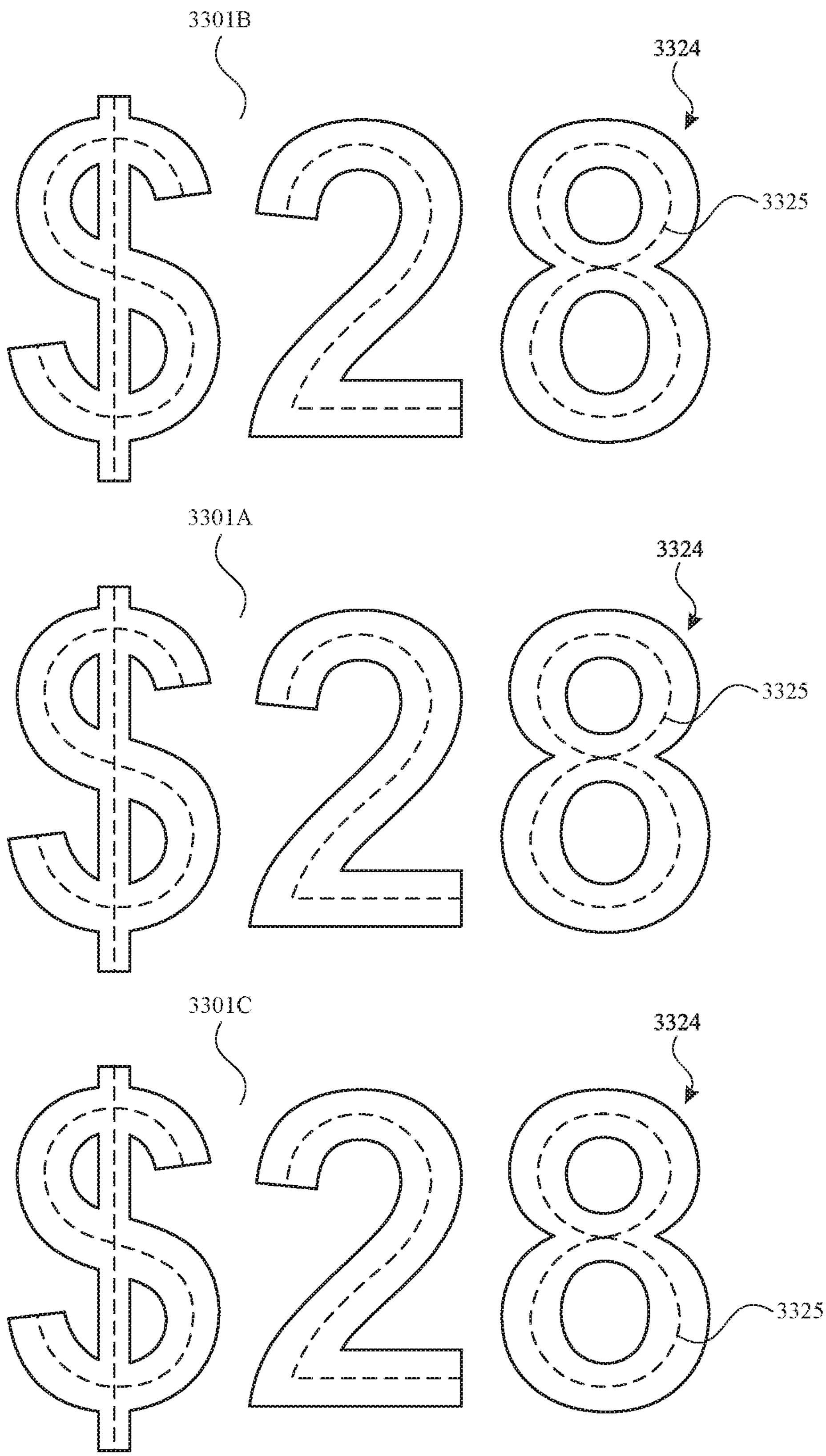

In some embodiments, one or more visual feedbacks are applied to amount object 3324 of completed payments message object 3334. To more specifically describe the one or more visual feedbacks applied to amount object 3324, attention is drawn to FIGS. 33E-33I. FIG. 33E shows an enlarged view of amount object 3324 of completed payment message object 3334 from FIG. 33D at three different tilts (orientations) of electronic device 3300 (relative to the predefined default orientation). When the device is at an orientation 3301A, the device is at (or is within a predefined limit tilting of) the predefined default orientation (e.g., a resting state orientation, a 45 degree tilt from the surface of the ground) relative to the baseline orientation with respect to a reference point (e.g., the ground). When the device is at an orientation 3301B, the device is at a (small) clockwise vertical angular tilt from the predefined default orientation (e.g., such that the top edge of the device is (slightly) closer to the user and the bottom edge of the device is (slightly) farther away from the user as compared to when the device is being held by the user at the predefined default orientation). When the device is at an orientation 3301C, the device is at a (small) counter-clockwise vertical angular tilt from the predefined default orientation (e.g., such that the bottom edge of the device is (slightly) closer to the user and the bottom edge of the device is (slightly) farther away from the user as compared to when the device is being held by the user at the predefined default orientation).

In some embodiments, at orientation 3301A, a visual feedback (e.g., having a small magnitude) is applied to amount object 3324 of completed payment message object 3334. In some embodiments, the visual feedback is a geometry alteration effect (e.g., a skewing effect, a 3D effect, a simulated depth effect) applied to at least a portion of the amount object (e.g., changing an angle or distance between lines or curves that define a shape of the object). For example, FIG. 33E shows a simulated depth effect including depth line 3325 being applied to the amount object at all orientations 3301A-C. In some embodiments, the simulated depth effect also applied in conjunction with a skewing effect (e.g., which changes the amount of skew of the geometry of the amount object). In some embodiments, the skewing effect includes shifting a line that represents an upper extent of a simulated three-dimensional object (e.g., the amount object with the simulated depth effect applied) toward or away from a line that represents a lower extent of the simulated three-dimensional object (e.g., shifting a line that represents a top of a raised pattern toward or away from edges of the raised pattern), or a center line (e.g., depth line 3325) that represents a lower extent of a simulated three-dimensional object (e.g., the amount object with the simulated depth effect applied) toward or away from a line that represents an upper extent of the simulated three-dimensional object (e.g., shifting a line that represents a bottom of an engraved pattern toward or away from edges of the engraved pattern). In some embodiments, reducing the skewing effect includes decreasing the amount of shifting of the line (e.g., depth line 3325) as the orientation of the device relative to the baseline orientation changes. In some embodiments, depth line 3325 remains stationary relative to other lines (e.g., the border lines) of the amount object, and the other lines (e.g., the border lines) shift relative to the depth line as the orientation of the device relative to the baseline orientation changes.

In some embodiments, when the device is at orientation 3301A (corresponding to the predefined default orientation), electronic device applies (slightly, with a weak magnitude) the simulated depth effect to amount object 3324 of completed payment message object 3334 (e.g., by applying depth line 3325 down the center of the amount object indicating the bottom of the simulated depth of the object). In some embodiments, when the device is (gradually) moved to orientation 3301B, a corresponding dynamic movement of depth line 3325 is displayed (e.g., the depth line of the amount object is moved (slightly) up because the device is slightly tilted upwards relative to the predefined default orientation). In some embodiments, when the device is (gradually) moved to orientation 3301C, a corresponding dynamic movement of depth line 3325 is displayed (e.g., the depth line of the amount object is moved (slightly) down because the device is slightly tiled downwards relative to the predefined default orientation). In some embodiments, at orientations 3301B and 3301C, the device also generates a haptic feedback (e.g., a tactile output), as described in greater detail below with reference to FIG. 33F.

In some embodiments, at the predefined default orientation of orientation 3301A, there is no change in the visual feedback that is applied to amount object 3324 of completed payment message object 3334 as compared to when the device is at orientation 3301B. Thus, in some embodiments, there is no visual feedback applied to amount object 3324 at any of orientations 3301A-3301C.

Figure 33F:
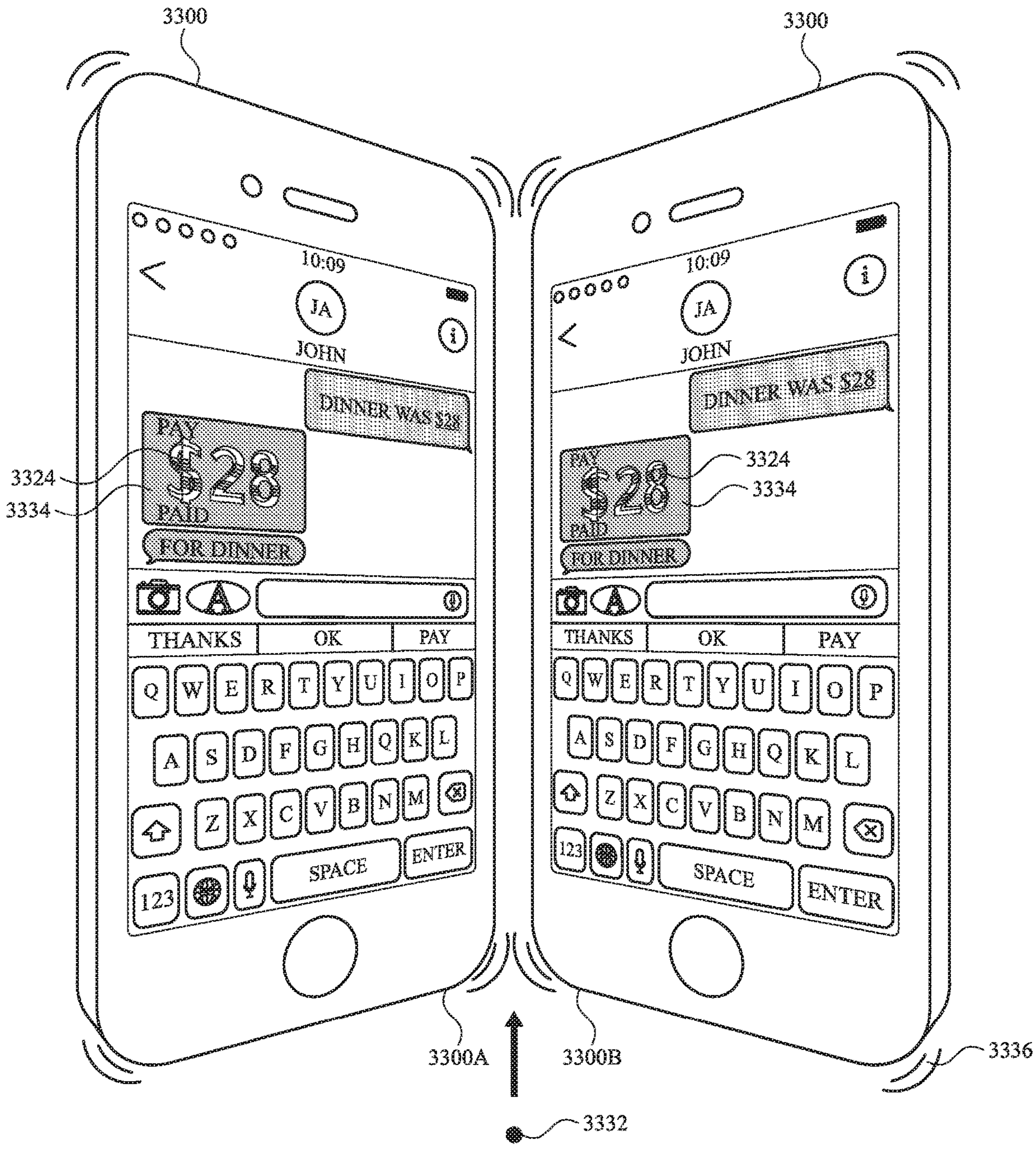

FIG. 33F shows electronic device 3300, while displaying amount object 3324 of completed payment message object 3334, being viewed at two different orientations (e.g., at angle 3300A and at angle 3300B) relative to the baseline orientation with respect to a reference point 3332, as first shown in FIG. 33C. More specifically, the orientation corresponding to angle 3300A is an orientation that is a (slight, such as 10 degrees or 15 degrees) counter-clockwise horizontal angular tilt from the predefined default orientation and the orientation corresponding to angle 3300B is an orientation that is a (slight, such as 10 degrees or 15 degrees) clockwise horizontal angular tilt from the predefined default orientation. In some embodiments, moving towards the orientations corresponding to angles 3300A and 3300B includes movement of the device away from the baseline orientation.

In some embodiments, electronic device 3300 includes one or more tactile output generators, and when electronic device is at orientations (e.g., corresponding to angle 3300A or angle 3300B) that is not the predefined default orientation, in addition to (or instead of) visual feedback applied to amount object 3324 of completed payment message object 3334, the device generates a haptic feedback (e.g., a tactile output 3336). For example, in some embodiments, in response to detecting the change in orientation of the device from the predefined default orientation (e.g., of FIG. 33D) to an orientation corresponding to angle 3300A or angle 3300B, the device generates, via the one or more tactile output generators, (e.g., for the duration of the change in the orientation of the device) tactile output 3336 that is indicative of the change in the orientation of the device (e.g., a tactile output that includes a parameter that is adjusted based on a magnitude, speed, and/or direction of change in the orientation of the device relative to the baseline orientation). Thus, in some embodiments, tactile output 3336 provides further feedback to the user that tracks the change in orientation of the device.

Figure 33G:
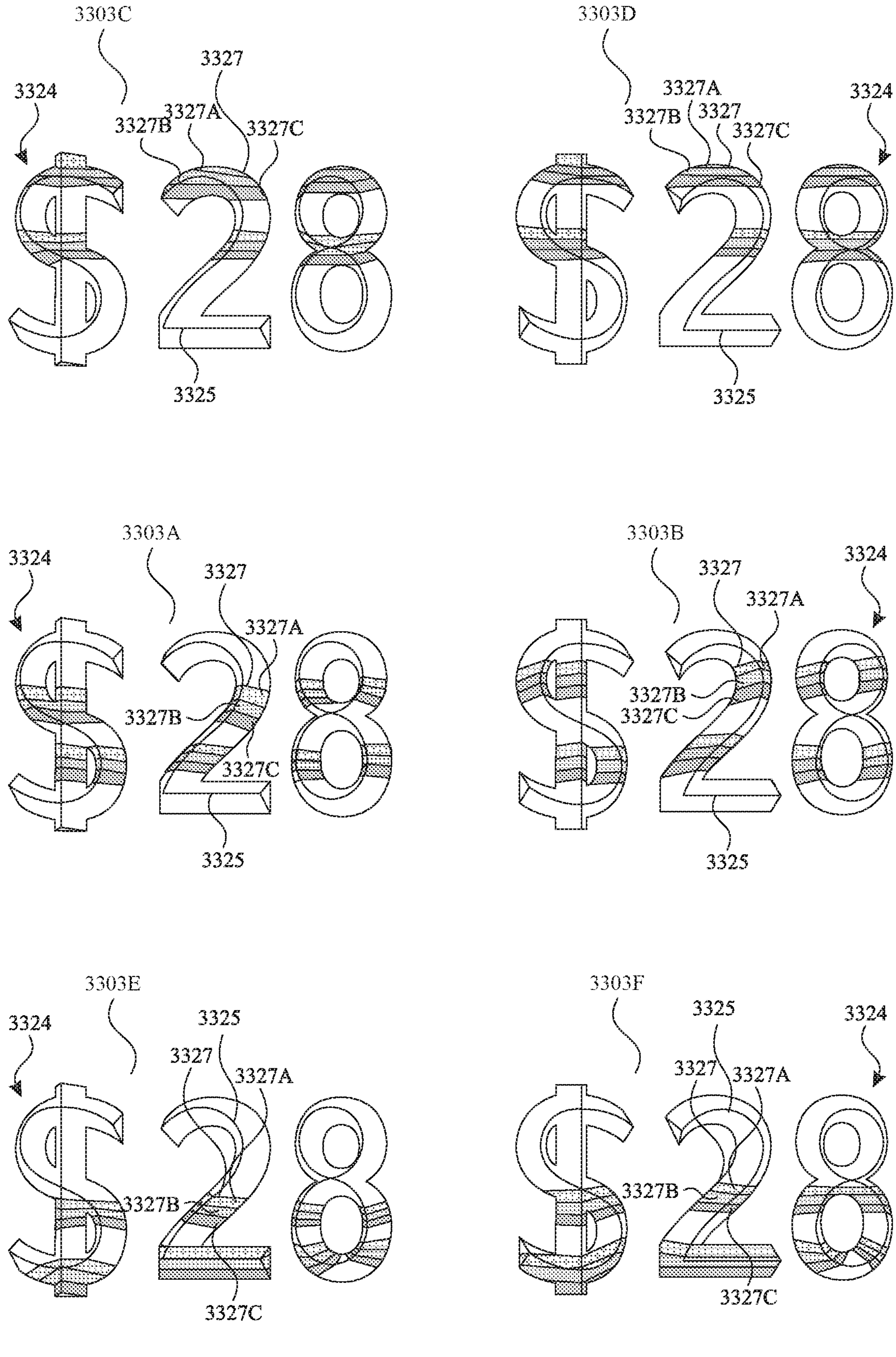

FIG. 33G shows enlarged views of amount object 3324 of completed payment message object 3334 from FIG. 33F and how, in some embodiments, the amount object is displayed by the electronic device while at six different tilts of electronic device 3300. Orientations 3303A and 3303B correspond to angle 3300A and angle 3300B of FIG. 33F, respectively (or within a predefined limit tilting of those angles). Orientations 3303C and 3303D correspond to when the device is at a (small) clockwise vertical angular tilt from angle 3300A and 3300B, respectively (e.g., such that the top edge of the device is (slightly) closer to the user and the bottom edge of the device is (slightly) farther away from the user as compared to when the device is being held by the user at the predefined default orientation). Orientations 3303E and 3303F correspond to when the device is at a (small) counter-clockwise vertical angular tilt from angle 3300A and 3300B, respectively (e.g., such that the bottom edge of the device is (slightly) closer to the user and the bottom edge of the device is (slightly) farther away from the user as compared to when the device is being held by the user at the predefined default orientation).

In some embodiments, at orientations 3303A and 3303B (e.g., where the device has moved (e.g., horizontally) away from the baseline orientation), one or more visual feedback are applied to amount object 3324 of completed payment message object 3334 (e.g., at a stronger magnitude than at orientation 3301A). In some embodiments, the visual feedback is simulated depth effect including depth line 3325 (as described above with respect to FIG. 33E). At orientations 3303A and 3303B, the change in the depth line 3325 is more emphasized (and therefore more perceivable by the user) (as compared to the depth effect perceived at orientation 3301A). For example, at orientation 3303A, the depth line of the amount object has (gradually, while the device changed orientations) moved left from its position at orientation 3301A, for the user is now viewing the simulated depth within the amount object at a slanted (left) side angle relative to the straight-on view. At orientation 3303B, the depth line of the amount object has (gradually, while the device changed orientations) moved right from its position at orientation 3301A, for the user is now viewing the simulated depth within the amount object at a slanted (right) side angle relative to a straight-on view. In some embodiments, the depth line 3325 remains stationary and the outline of the content shifts in location, thereby simulating the depth effect.

Further, in some embodiments, when electronic device 3300 is moved to orientations 3303C and 3303D, a corresponding dynamic movement of the simulated depth effect is displayed. For example, at orientation 3303C, depth line 3325 of the amount object has moved (gradually, while the device changed orientations) up relative to depth line 3325 at orientation 3303A, for the orientation of the device has shifted to a higher angle relative to orientation 3303A. Similarly, at orientation 3303D, depth line 3325 of the amount object has moved (gradually, while the device changed orientations) up relative to the depth line at orientation 3303B, for the orientation of the device has shifted to a higher angle relative to orientation 3303B. Further, in some embodiments, when the device is moved to orientations 3303E and 3303F, a corresponding dynamic movement of depth line 3325 is displayed. For example, at orientation 3303E, depth line 3325 of the amount object has moved (gradually, while the device changed orientations) down relative to the depth line at orientation 3303A, for the orientation of the device has shifted to a lower angle relative to orientation 3303A. Similarly, at orientation 3303F, depth line 3325 of the amount object has moved (gradually, while the device changed orientations) down relative to the depth line at orientation 3303B, for the orientation of the device has shifted to a lower angle relative to orientation 3303B. In some embodiments, depth line 3325 remains stationary and the outline of the content shifts in location, thereby simulating the depth effect (using dynamic boundary instead of a dynamic depth line).

In some embodiments, in addition to (or instead of) simulated depth effect including depth line 3325, an additional visual feedback is applied to amount object 3324. In some embodiments, as shown in FIG. 33G, the additional visual feedback is a coloring effect of a plurality of colored patterns 3327 applied to several different portions of the amount object, where each colored pattern 3327 consists of one or more different colors (e.g., three different colors corresponding to 3327A-3327C). In some embodiments, each colored pattern is a rainbow-colored pattern comprising colors of the rainbow.

In some embodiments, as shown in FIG. 33G, at orientations 3303A and 3303B (corresponding to angles 3300A and 3300B, where the device has moved (e.g., horizontally) away from the baseline orientation), the coloring effect of colored patterns 3327 (e.g., including colors 3327A-3327C) is applied to amount object 3324 of completed payment message object 3334. For example, at orientations 3303A and 3303B, a plurality of colored patterns 3327 is displayed at various portions of the amount object. Further, in some embodiments, when the device is moved to orientations 3303C and 3303D, a corresponding dynamic movement of colored patterns 3327 is displayed by the electronic device. For example, at orientation 3303A, each of the colored patterns on the amount object has moved (gradually, while the device changed orientations) up relative to their positions at orientation 3303C. Similarly, at orientation 3303D, each of the colored patterns on the amount object had moved (gradually, while the device changed orientations) up relative to their positions at orientation 3303B. Further, in some embodiments, when the device is moved to orientations 3303E and 3303F, a corresponding dynamic movement of colored patterns 3327 is displayed. For example, at orientation 3303E, each of the colored patterns on the amount object has moved (gradually, while the device changed orientations) down relative to their positions at orientation 3303A. Similarly, at orientation 3303F, each of the colored patterns on the amount object has moved (gradually, while the device changed orientations) down relative to their positions at orientation 3303B.

Figure 33H:
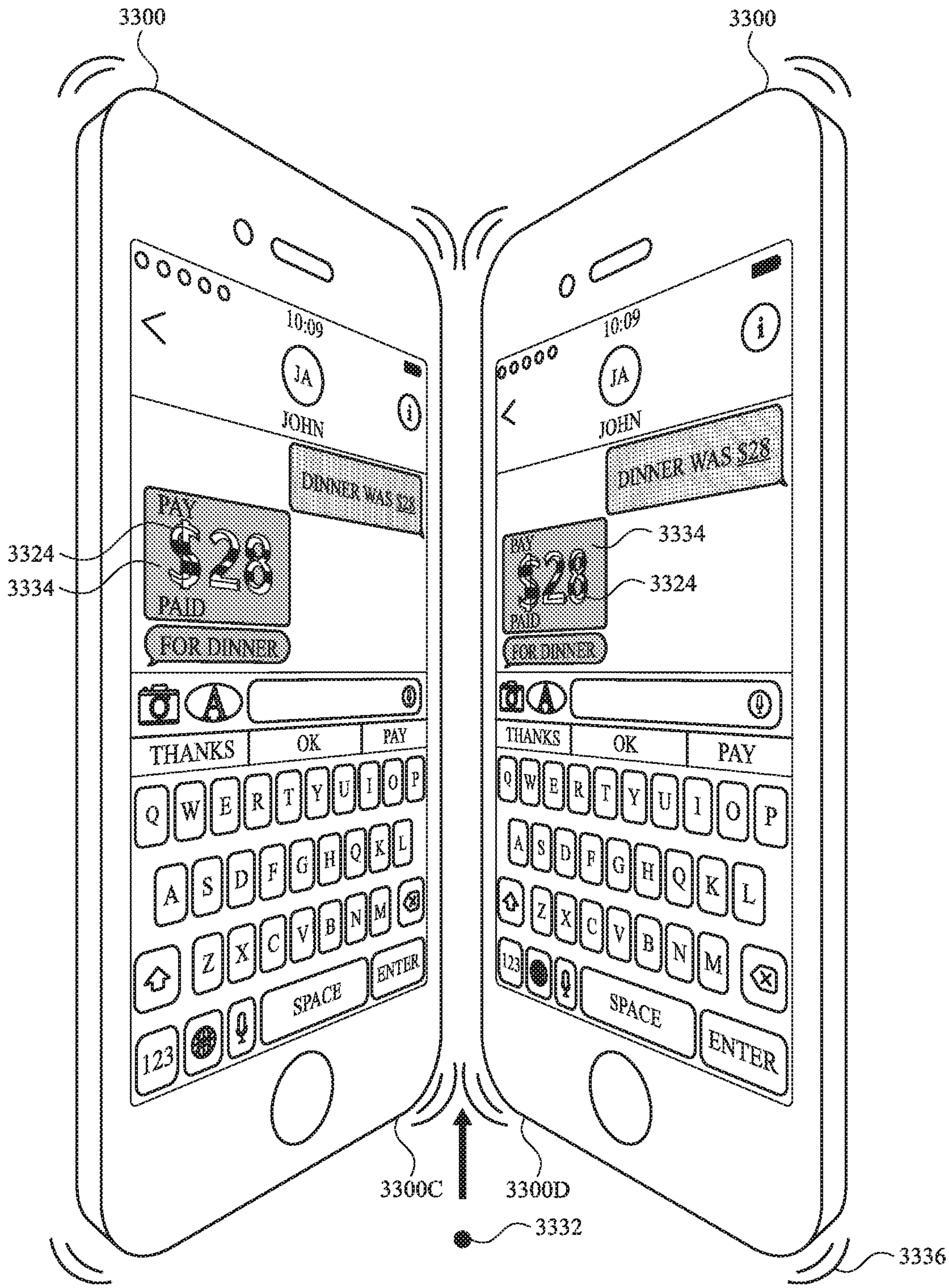

FIG. 33H shows electronic device 3300, while maintaining display of amount object 3324 of completed payment message object 3334, being viewed at two different orientations (e.g., at angle 3300C, which is farther away from the baseline orientation than angle 3300A, and at angle 3300D, which is also farther away from the baseline orientation than angle 3300B) relative to the baseline orientation with respect to reference point 3332. More specifically, the orientation corresponding to angle 3300C is an orientation that is a further counter-clockwise horizontal angular tilt from the orientation of the device at angle 3300A in FIG. 33F, and the orientation corresponding to angle 3300D is an orientation that is a further clockwise horizontal angular tilt from the orientation of the device at angle 3300B in FIG. 33F. In some embodiments, moving towards the orientations corresponding to angles 3300C and 3300D constitute further movement of the device away from the baseline orientation. In some embodiments, when the device is at (and while the device is moving towards) orientations corresponding to angle 3300C or angle 3300D, the device continues to generate (e.g., at an increasingly stronger magnitude) the haptic feedback (e.g., tactile output 3336).

Figure 33I:
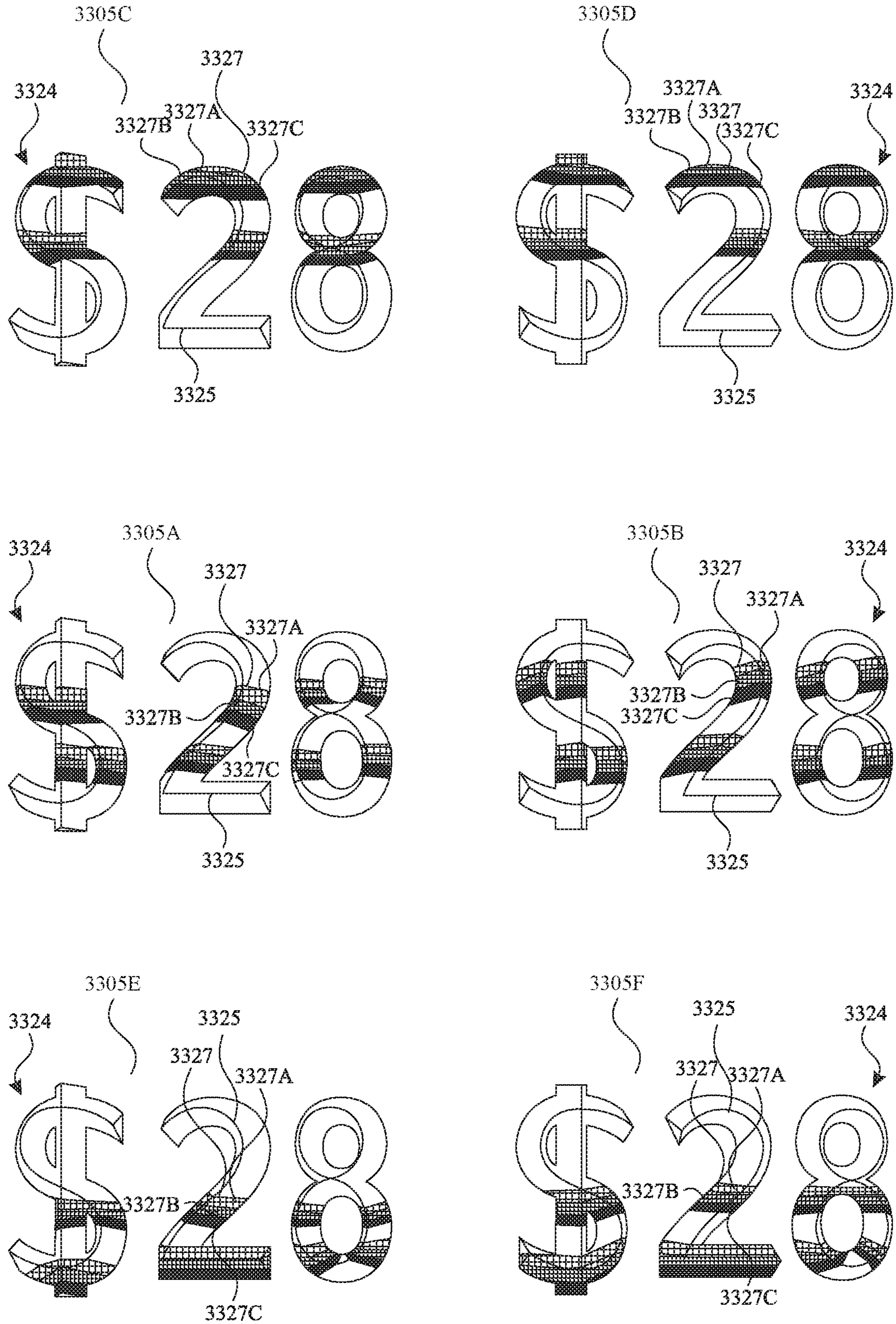

FIG. 33I shows an enlarged view of amount object 3324 of completed payment message object 3334 from FIG. 33H and how, in some embodiments, the amount object is displayed at six different tilts (orientations) of electronic device 3300. Orientations 3305A and 3305B correspond to angle 3300C and angle 3300D of FIG. 33H, respectively (or are within a predefined limit tilting of those angles). Orientations 3305C and 3305D correspond to when the device is at a (small) clockwise vertical angular tilt from angle 3300C and 3300D, respectively (e.g., such that the top edge of the device is (slightly) closer to the user and the bottom edge of the device is (slightly) farther away from the user as compared to when the device is being held by the user at the predefined default orientation). Orientations 3305E and 3305F corresponds to when the device is at a (small) counter-clockwise vertical angular tilt from angle 3300A and 3300B, respectively (e.g., such that the bottom edge of the device is (slightly) closer to the user and the bottom edge of the device is (slightly) farther away from the user as compared to when the device is being held by the user at the predefined default orientation).

At orientations 3305A and 3305B, the displayed simulated depth effect including depth line 3325 is emphasized as compared to the depth effect displayed at orientations 3303A and 3303B, respectively. For example, at orientation of

3305A, depth line 3325 of the amount object has (gradually) moved farther left as compared to the depth line at orientation 3303A, for the orientation of the device has shifted to an even more slanted (left) side angle relative to orientation 3303A. At orientation 3305B, depth line 3325 of the amount object has (gradually) moved farther right as compared to the depth line at orientation 3303B, for the orientation of the device has shifted to an even more slanted (right) side angle relative to orientation 3303B. In some embodiments, depth line 3325 remains stationary and the outline of the content shifts in location, thereby simulating the depth effect (using dynamic boundary instead of a dynamic depth line).

In addition, in some embodiments, when the device is moved to orientations 3305C and 3305D, a corresponding dynamic movement of simulated depth effect 3325 is displayed. For example, at orientation 3305C, depth line 3325 of the amount object has moved (gradually) up relative to the depth line at orientation 3305A, for the orientation of the device has shifted to a higher angle relative to orientation 3305A. Similarly, at orientation 3305D, depth line 3325 of the amount object has moved (gradually) up relative to the depth line at orientation 3305B, for the orientation of the device has shifted to a higher angle relative to orientation 3305B. Further, in some embodiments, when the device is moved to orientations 3305E and 3305F, a corresponding dynamic movement of simulated depth effect 3325 is displayed. For example, at orientation 3305E, depth line 3325 of the amount object has moved (gradually, while the device changed orientations) down relative to the depth line at orientation 3305A, for the orientation of the device has shifted to a lower angle relative to orientation 3305A. Similarly, at orientation 3305F, depth line 3325 of the amount object has moved (gradually, while the device changed orientations) down relative to the depth line at orientation 3305B, for the orientation of the device has shifted to a lower angle relative to orientation 3305B.

Further, in some embodiments, as shown in FIG. 33, at orientations 3305A-3305F, colors 3327A-3327C of colored patterns 3327 applied to amount object 3324 are more saturated relative to corresponding colors 3327A-3327C of colored patterns 3327 applied to amount object 3324 at orientation 3303A-3303F, respectively. For example, color 3327A of colored patterns 3327 at orientations 3305A-3305F is more saturated relative to corresponding color 3327A of colored patterns 3327 at orientations 3303A-3303F. Likewise, color 3327B of colored patterns 3327 at orientations 3305A-3305F is more saturated relative to corresponding color 3327B of colored patterns 3327 at orientations 3303A-3303F. Likewise, color 3327C of colored patterns 3327 at orientations 3305A-3305F is more saturated relative to corresponding color 3327C of colored patterns 3327 at orientations 3303A-3303F. In some examples, rather than (or in addition to) changing the saturation of the colors, the thickness or brightness of the colors is changed.

Furthermore, in some embodiments, when the device is moved to orientations 3305C and 3305D from orientations 3305A and 3305B, respectively, a corresponding dynamic movement of colored patterns 3327 is displayed. For example, at orientation 3305C, each of the colored patterns on the amount object has moved (gradually, while the device changed orientations) up relative to their positions at orientation 3305A as the device (gradually) tilts from orientation 3305A to orientation 3305C. Similarly, at orientation 3305D, each of the colored patterns on the amount object has moved (gradually, while the device changed orientations) up relative to their positions at orientation 3305B as the device (gradually) tilts from orientation 3305B to orientation 3305D. Furthermore, in some embodiments, when the device is moved to orientations 3305E and 3305F from orientations 3305A and 3305B, respectively, a corresponding dynamic movement of colored patterns 3327 is displayed. For example, at orientation 3305E, each of the colored patterns on the amount object has moved (gradually, while the device changed orientations) down relative to their positions at orientation 3305A as the device (gradually) tilts from orientation 3305A to orientation 3305E. Similarly, at orientation 3305F, each of the colored patterns on the amount object has moved (gradually, while the device changed orientations) down relative to their positions at orientation 3305B as the device (gradually) tilts from orientation 3305B to orientation 3305F.

In addition, in some embodiments, electronic device 3300 continues to generate tactile output 3336 as the device changes in orientation (e.g., from orientations 3303A-3303F to orientations 3305A-3305F, respectively). In some embodiments, the device gradually ceases to generate tactile output 3336 when the orientation of the device relative to the baseline orientation stops changing.

In some embodiments, as electronic device 3300 changes orientation in a direction that is towards the baseline orientation (instead of in a direction that is moving away from the baseline orientation), a magnitude of the one or more applied or generated feedbacks (e.g., simulated depth effect including depth line 3325, coloring effect represented by colored patterns 3327, tactile output 3336) are reduced. For example, the feedback is gradually reduced for the duration that the orientation of the device is changing (e.g., moving towards the baseline orientation). For another example, the rate of change of the feedback is gradually reduced as the orientation of the device changes (e.g., the greater the amount of change in the orientation, the greater the change in the feedback). In some embodiments, reducing the magnitude of simulated depth effect includes reducing the simulated depth of the geometry of the amount object (or of the text object) (e.g., reducing an angle from a bottom of an engraved pattern to the surface into which the engraved pattern is engraved, or reducing an angle from the top of a raised object to surface on which the raised pattern is placed). In some embodiments, reducing the magnitude of the coloring effect includes reducing a saturation of colors 3327A-3327C of colored patterns 3327.

Figure 33J:
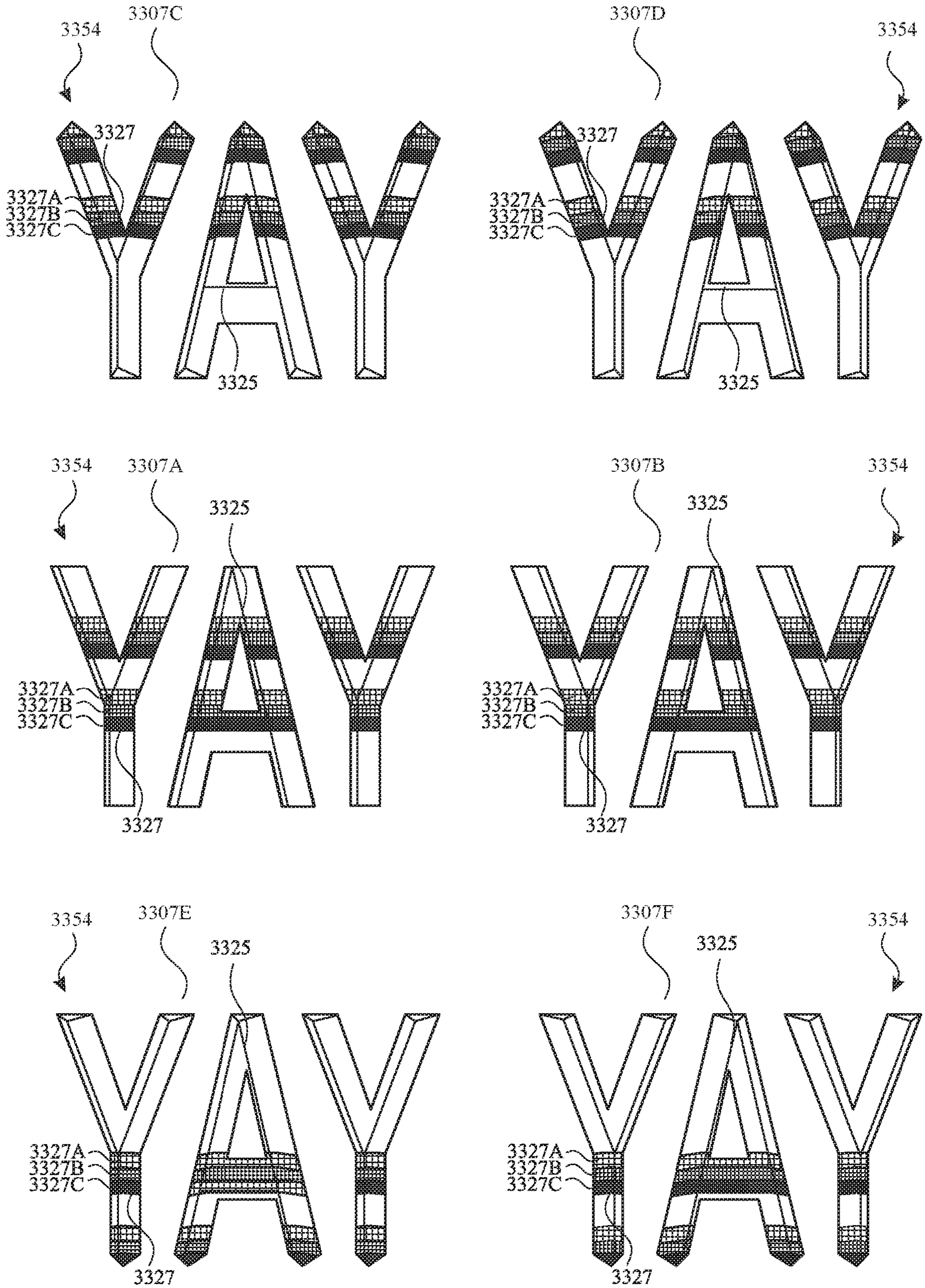

FIG. 33J shows a text object 3354 (e.g., stating "YAY") similar to amount object 3324. As with amount object 3324, text object 3354 can be sent to, or received from, a message participant (e.g., message participant 3310) in a message conversation (e.g., message conversation 3308) of a messaging application (e.g., messaging application 3306) using a message object similar to payment message objects 3320 and 3334. Thus, in some examples, visual feedback (e.g., simulated depth effect including depth line 3325, coloring effect represented by colored patterns 3327 of colors 3327A-C) are similarly applied to text object 3354. For example, FIG. 33J shows how, in some embodiments, text object 3354 is displayed when electronic device is at orientations 3307A-3307F, which correspond to orientations 3305A-3305F described above with reference to FIG. 33. One or more types of feedback, such as simulated depth feedback including depth line 3325 and coloring effects represented by colored patterns 3327 of colors 3327A-C can be similarly applied to text object 3354 as described above with respect amount object 3324. Further, tactile output 3336 that is generated in connection with the feedbacks applied to amount object 3324 can also be generated in connection with feedbacks applied to text object 3354.

Figure 33K:
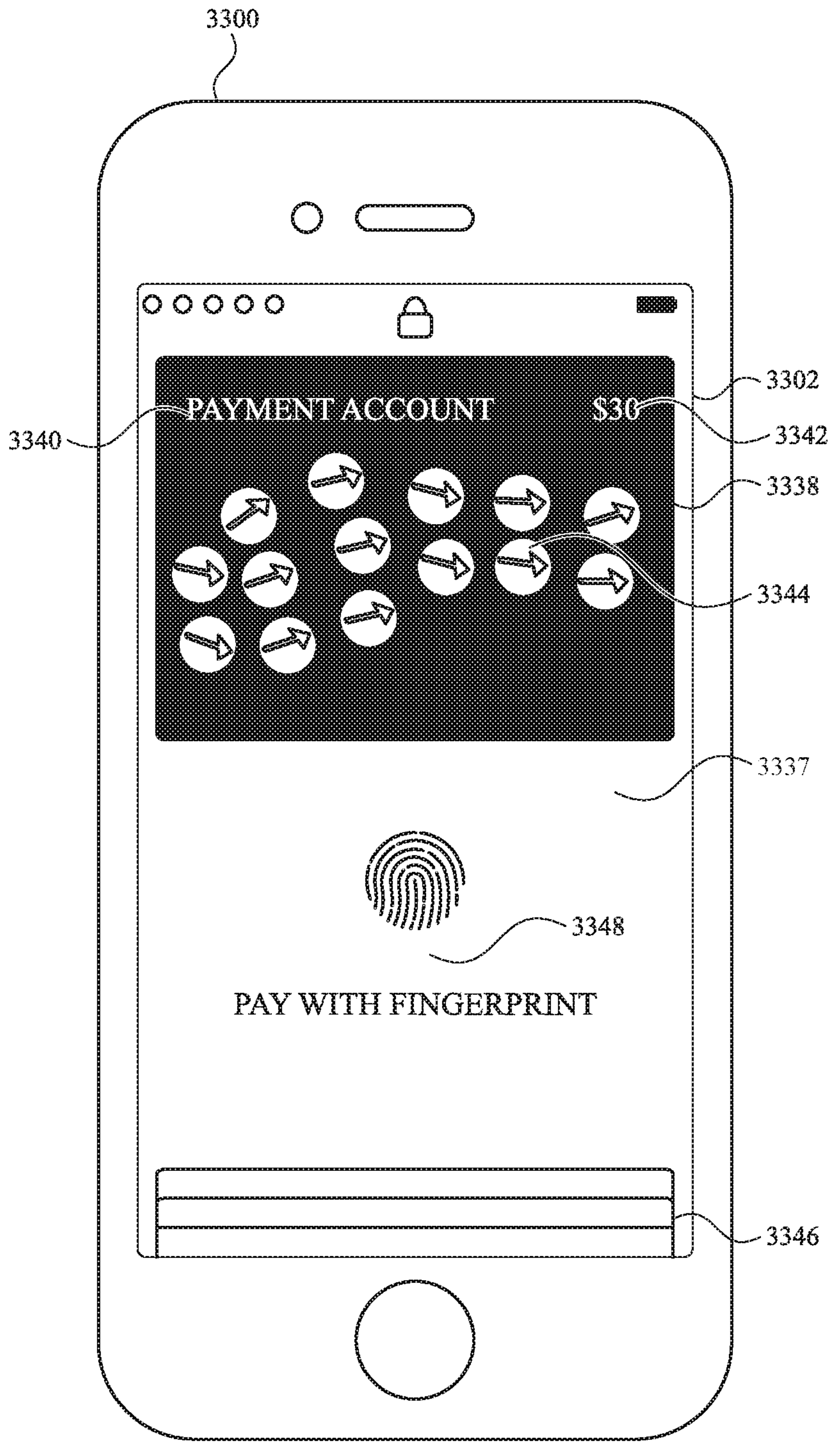

FIG. 33K shows electronic device 3300 displaying, on display 3302, an accounts user interface 3337 (e.g., similar to wallet user interface 2022 described above with reference to FIGS. 20B-20J) for selecting one or more accounts from a plurality of available accounts for use in a transfer (e.g., of a payment, of a resource, of points, of a message). In some embodiments, accounts user interface 3337 includes a graphical representation 3338 (e.g., of a payment account, similar to graphical representation 2030 of a payment account described above with reference to FIGS. 20D-20J) displayed at a first location of accounts user interface 3337. At the first location of the user interface, the account corresponding to the displayed graphical representation is currently selected for use in a transfer. As shown in FIG. 33K, graphical representation 3338 (e.g., of a payment account) includes a plurality of pattern objects 3344 (e.g., similar to one or more elements 2034 of graphical representation 2030 of a payment account). In some embodiments, accounts user interface 3337 also includes other selectable accounts located at a second location of the user interface that are also available for use in a transfer. In some embodiments, accounts user interface 3337 also includes an indication 3340 of the account (e.g., the payment account) associated with graphical representation 3338 and a balance indication 3342 (e.g., stating "$30") of the amount of funds (or resources, points, usage limits) available in the account associated with graphical representation 3338.

Figure 33L:
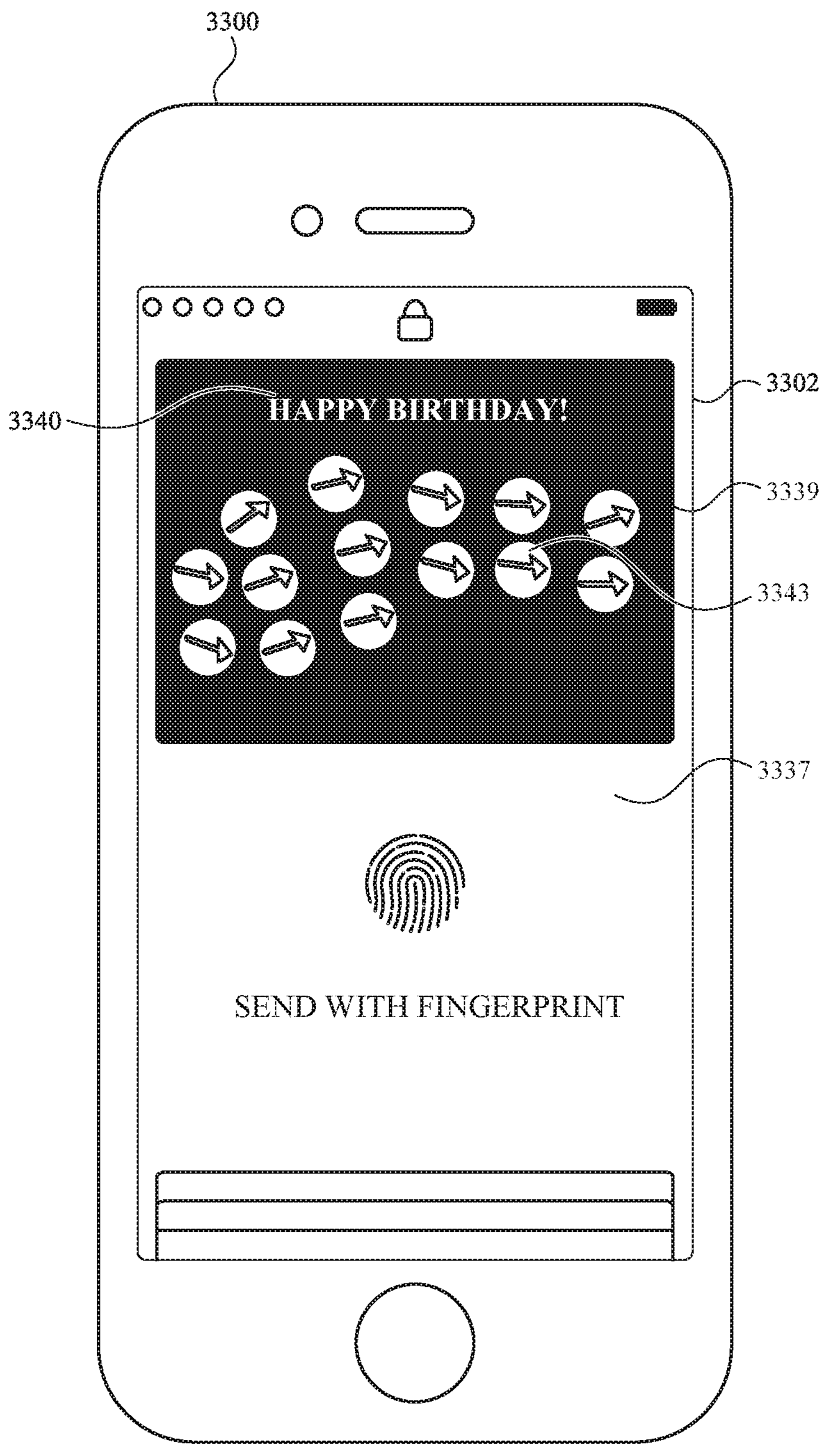

FIG. 33L shows accounts selection user interface 3337 with a graphical representation 3339 corresponding to a birthday card (instead of a payment account) that is analogous to graphical representation 3338 corresponding to a payment account, as shown in FIG. 33K. As shown in FIG. 33L, graphical representation 3339 of the birthday card (e.g., showing "Happy Birthday!") also includes a plurality of pattern objects 3343 that are analogous to the plurality of pattern objects 3344 of graphical representation 3338 of the payment account, as shown in FIG. 33K.

Figure 33M:
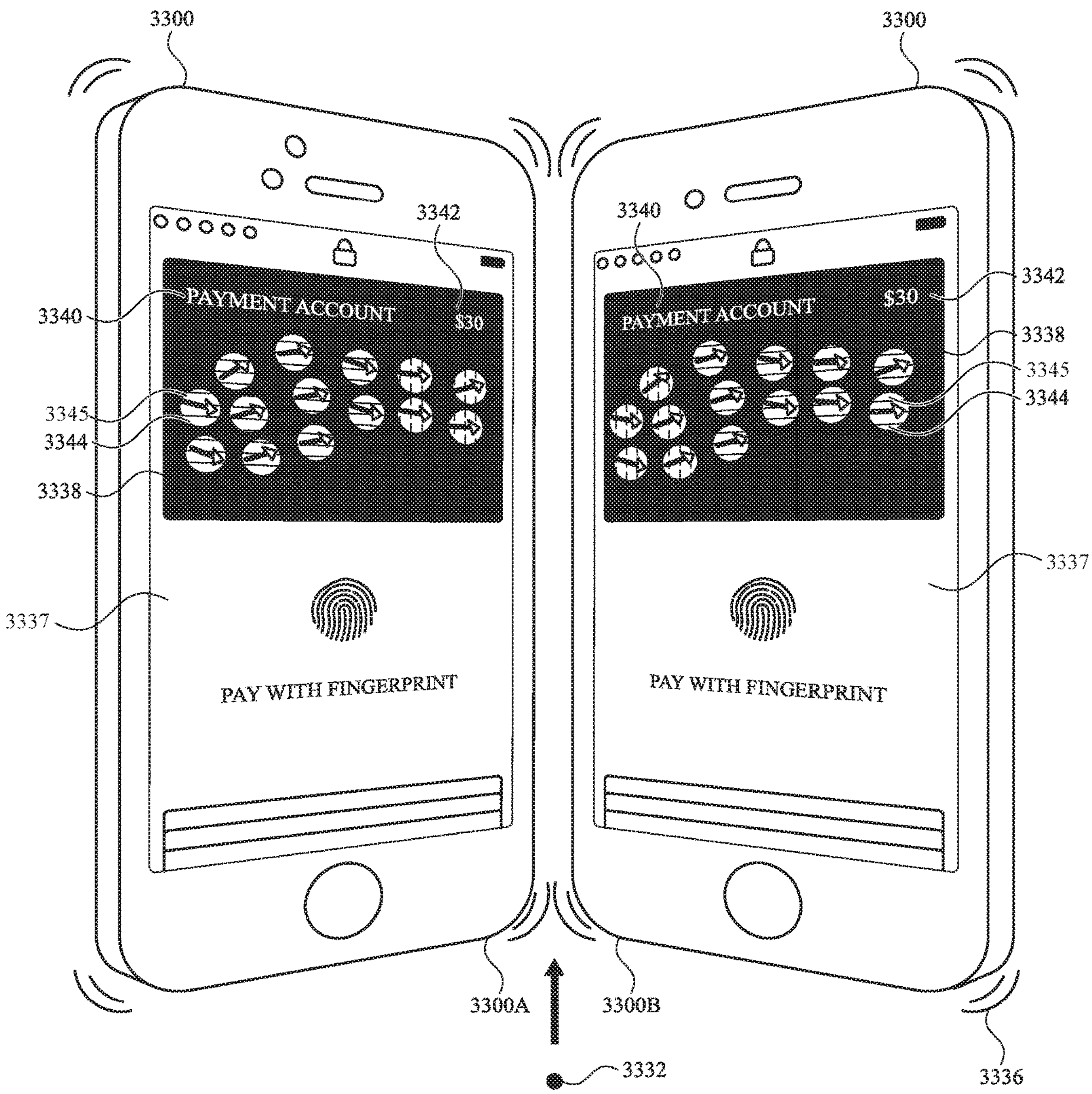
Figure 33N:
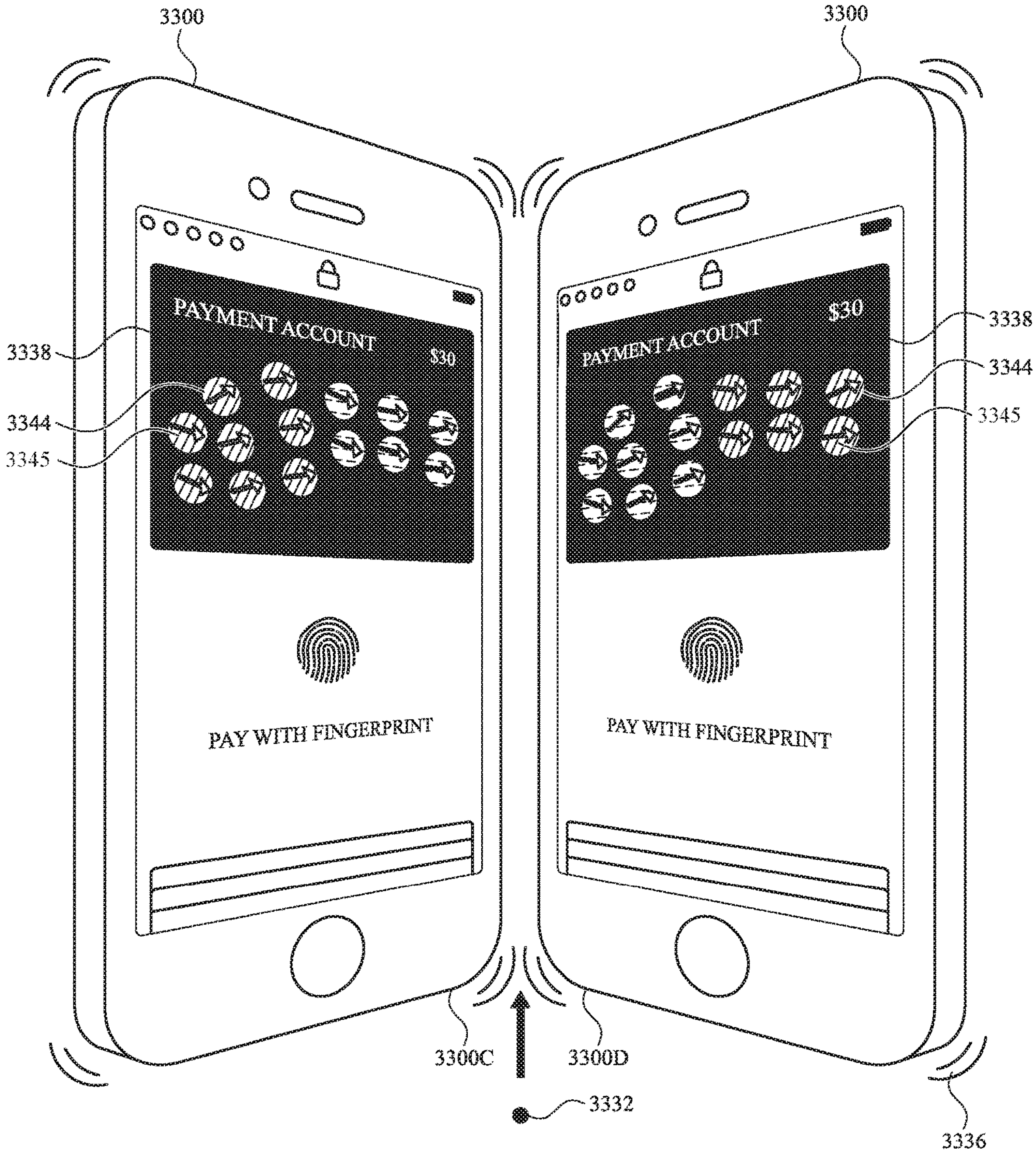
Figure 33O:
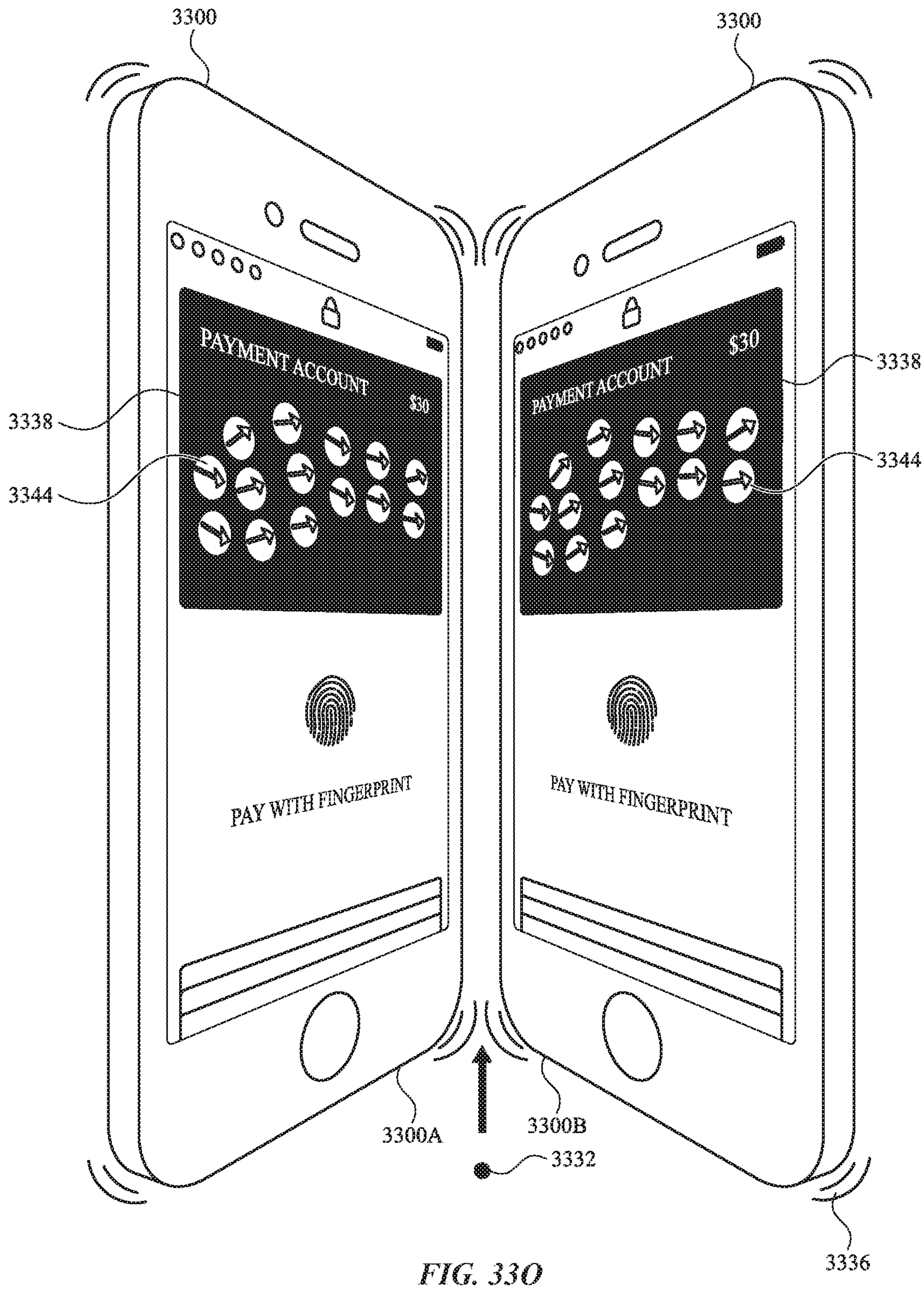
Figure 34D:
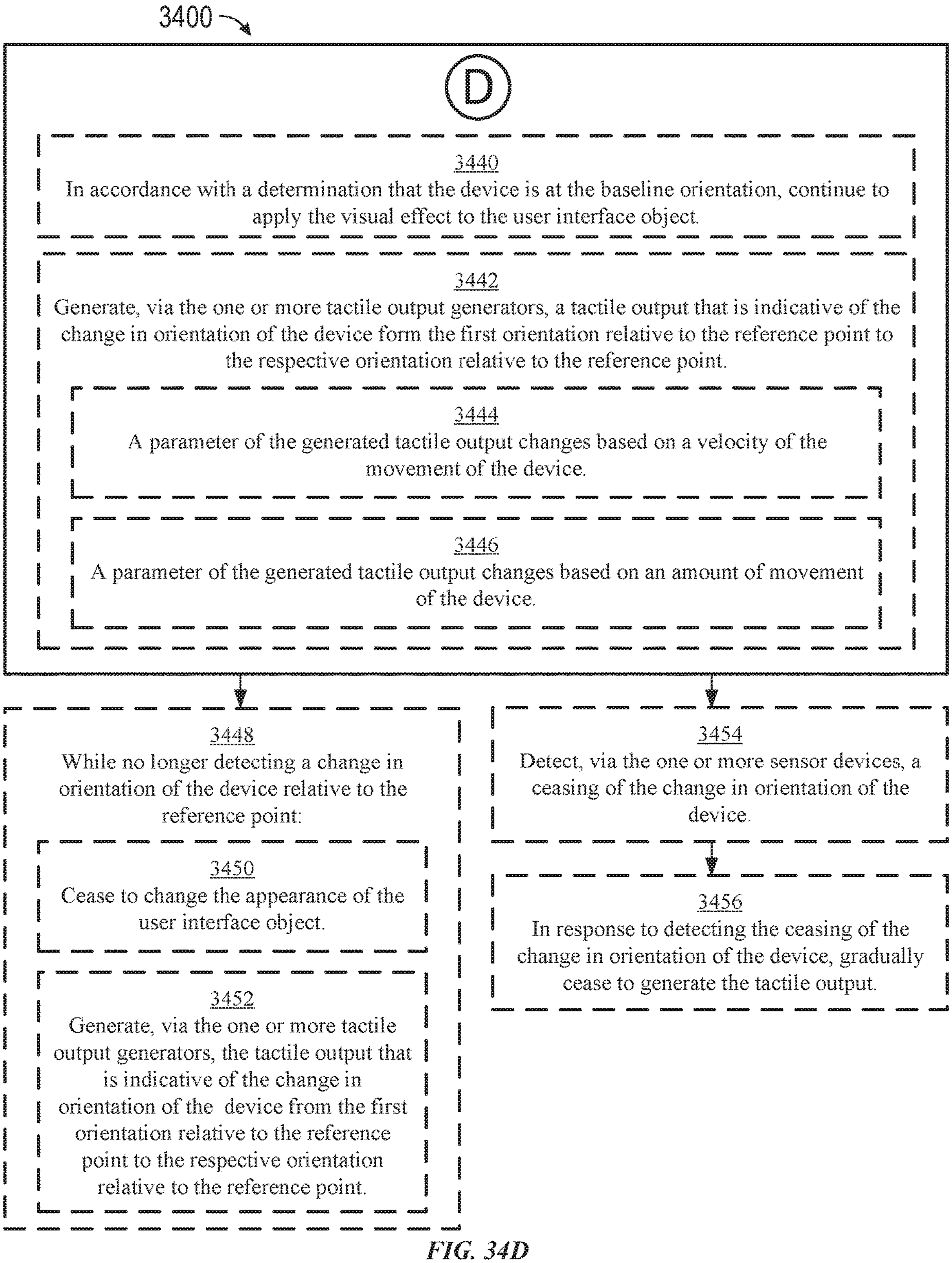

FIGS. 33M-33O illustrate feedback (e.g., a visual feedback, a haptic feedback) that is applied to or in connection with pattern objects 3344 of graphical representation 3338 (e.g., of a payment account, of a birthday card). Thus, it is to be understood that, while the feedback effects described below are described with respect to a graphical representation of a payment account, the feedback effects can analogously apply to pattern objects of graphical representations of other objects, such as a birthday card, as shown in FIG. 33L.

FIG. 33M shows electronic device 3300, while maintaining display of graphical representation 3338 at the first location of accounts user interface 3336, being viewed at two different orientations (e.g., at angle 3300A and at angle 3300B) relative to the baseline orientation with respect to a reference point 3332, as first shown in FIG. 33C. More specifically, the orientation corresponding to angle 3300A is an orientation that is a (slight, such as 10 degrees or 15 degrees) counter-clockwise horizontal angular tilt from the predefined default orientation and the orientation corresponding to angle 3300B is an orientation that is a (slight, such as 10 degrees or 15 degrees) clockwise horizontal angular tilt from the predefined default orientation. In some embodiments, moving towards the orientations corresponding to angles 3300A and 3300B constitute movement of the device away from the baseline orientation.

In some embodiments, a visual feedback is a coloring effect of a plurality of colored patterns 3345 is applied one or more pattern objects 3344 (or portions thereof), where colored patterns 3345 consists of one or more different colors (e.g., the colors of a rainbow). In some embodiments, as shown in FIG. 33M, at orientations corresponding to angles 3300A and 3300B, the coloring effect of colored patterns 3345 applied to one or more pattern objects 3344 (or portions thereof). In some embodiments, only a portion of the full colors (e.g., red and orange of all rainbow colors) of colored patterns 3345 is visible on one or more of pattern objects 3344. In some embodiments, colored patterns 3345 covers a portion of (but not all of) a pattern object. In some embodiments, as the device changes in orientation from the predefined default orientation to the orientation corresponding to angles 3300A and 3300B (e.g., moves away from the baseline orientation), one or more colors of colored patterns 3345 slides in to pattern objects 3344 from one side of graphical representation 3338. In some embodiments, an individual pattern object of pattern objects 3345 is covered by two or more colors of colored patterns 3345. In some embodiments, depending on the angular distance of the current orientation of the device from the predefined default orientation, a first set of patterned objects 3344 are covered by colored patterns 3345 and a second set of patterned objects 3344 are not covered by colored patterns 3345. In some embodiments, the visual feedback is also applied to indication 3340 of the account associated with graphical representation 3338 (e.g., the payment account). In some embodiments, the visual feedback is also applied to balance indication 3342 of the amount of funds (or resources, points, usage limits) available in the account associated with graphical representation 3338.

In some embodiments, electronic device 3300 includes one or more tactile output generators, and when electronic device is at orientations (e.g., corresponding to angle 3300A or angle 3300B) that are not the predefined default orientation, in addition to (or instead of) the visual feedback applied graphical representation 3338, the device generates a haptic feedback (e.g., a tactile output 3336). For example, in some embodiments, in response to detecting the change in orientation of the device from the predefined default orientation (e.g., of FIG. 33K) to an orientation corresponding to angle 3300A or angle 3300B, the device generates, via the one or more tactile output generators, (e.g., for the duration of the change in the orientation of the device) tactile output 3336 that is indicative of the change in the orientation of the device (e.g., a tactile output that includes a parameter that is adjusted based on a magnitude, speed, and/or direction of change in the orientation of the device relative to the baseline orientation). Thus, in some embodiments, tactile output 3336 provides further feedback to the user that tracks the change in orientation of the device.

FIG. 33N shows electronic device 3300, while maintaining display of graphical representation 3338 (e.g., of an account, of a payment account, of a birthday card), tilted at more tilted angles (e.g., angles 3300C and 3300D) (and thus farther away from the baseline orientation) compared to orientations corresponding to angles 3300A and 3300B. In some embodiments, the device, in response to detecting the change in orientation of the device from orientations corresponding to angels 3300A and 3300B to angles 3300C and 3300D, respectively, continues to apply the colored patterns effect to pattern objects 3344 of graphical representation 3338 (e.g., of a payment account, of a birthday card). In some embodiments, as shown in FIG. 33N, one or more of the colors that are applied to pattern objects 3344 at orientations corresponding to angles 3300C and 3300D are different from one or more of the colors that are applied to pattern objects 3344 at orientations corresponding to angels 3300A and 3300B, as shown in FIG. 33M. In some embodiments, the different colors of colored patterns 3334 washes across pattern objects 3344 as the device changes orientation (e.g., from orientations corresponding to angles 3300A and 3300B to orientations corresponding to angles 3300C and 3300D, respectively). In some embodiments, once the device reaches a sufficient threshold orientation (sufficiently away from the baseline orientation or sufficiently close to the baseline orientation), colored patterns 3345 slides off of pattern objects 3344 and the device eventually ceases displaying the visual feedback (e.g., of colored patterns 3345) to graphical representation 3338 (e.g., of a payment account, of a birthday card). In some embodiments, when electronic device is at (and while the device is moving towards) orientations corresponding to angles 3300C and 3300D (from orientations corresponding to angles 3300A and 3300B, respectively), the device continues to generate (e.g., at an increasingly stronger magnitude) the haptic feedback (e.g., tactile output 3336).

FIG. 33O shows electronic device 3300, while maintaining display of graphical representation 3338 (e.g., of an account, of a payment account, of a birthday card), tilted at even larger angles (e.g., angles 3300E and 3300F) (and thus farther away from the baseline orientation) compared to orientations corresponding to angles 3300C and 3300D. In some embodiments, the device, in response to detecting the change in orientation of the device from orientations corresponding to angles 3300C and 3300D to angles 3300E and 3300F, respectively, gradually ceases to display (e.g., decreases the brightness of, fades out, washes out, gradually slides out) the visual feedback (e.g., coloring effect 3345) to pattern objects 3344 of graphical representation 3338. Further, in some embodiments, in accordance with a determination (or subsequent to the determination) that the visual feedback is no longer being applied to pattern objects 3344 of graphical representation 3338, the device further ceases generating tactile output 3336.

In some embodiments, as electronic device 3300 changes orientation in a direction that is towards the baseline orientation (instead of in a direction that is moving away from the baseline orientation), a magnitude of the one or more applied or generated feedbacks (e.g., coloring effect represented by colored patterns 3345, tactile output 3336) are reduced. For example, the feedback is gradually reduced for the duration that the orientation of the device is changing (e.g., moving towards the baseline orientation). For another example, the rate of change of the feedback is gradually reduced as the orientation of the device changes (e.g., the greater the amount of change in the orientation, the greater the change in the feedback). In some embodiments, reducing the magnitude of the coloring effect includes reducing a saturation of the colors (e.g., the rainbow colors) of the colored patterns 3345).

FIGS. 34A-34D are a flow diagram illustrating a method for providing feedback corresponding to an operation associated with a transfer, in accordance with some embodiments. Method 3400 is performed at a device (e.g., 100, 300, 500, 3300) with a display and one or more sensor devices (e.g., an accelerometer for detecting an orientation of the device, one or more cameras). Some operations in method 3400 are, optionally, combined, the orders of some operations are, optionally, changed, and some operations are, optionally, omitted.

As described below, method 3400 provides an intuitive way for managing peer-to-peer transactions. The method reduces the cognitive burden on a user for managing peer-to-peer transactions, thereby creating a more efficient human-machine interface. For battery-operated computing devices, enabling a user to manage peer-to-peer transactions faster and more efficiently conserves power and increases the time between battery charges.

The electronic device (e.g., 3300), while the device is at a first orientation (e.g., a predefined default orientation, a resting state orientation, a 45 degree tilt from surface of the ground) relative to a baseline orientation with respect to a reference point (e.g., 3332, the ground, a face of a viewer), displays (3402), on the display (e.g., 3302), a user interface object (e.g., 3324, 3354, 3344, a numerical number, a shape, a pattern, a part of the item that is visually distinguishable from the background of the item). In some embodiments, the object (e.g., 3324, 3354) is (part of, an element of, displayed within) a message object within a message conversation of a messaging application. In some embodiments, the object (e.g., 3344) is (part of, an element of, displayed within) a graphical representation of an account (e.g., a user account, a resource account, a payment account) stored/provisioned on the device (e.g., as described above in greater detail with respect to methods 900, 1200, 1500, 1800, 2100, 2400, 2700, and 3000).

The electronic device (e.g., 3300), while displaying the user interface object (e.g., 3324, 3354, 3344), detects (3404), via the one or more sensor devices (e.g., an accelerometer, a camera), a change in orientation (e.g., from 3300A to 3300C, from 3300C to 3300A, from 3300A to 3300E, from 3300E to 3300A, from 3300B to 3300D, from 3300D to 3300B, from 3300B to 3300F, from 3300F to 3300B) of the device from the first orientation (e.g., 3300A, 3300B, 3300C, 3300D, 3300E, 3300F) relative to the reference point (e.g., 3332) to a respective orientation (e.g., 3300A, 3300B, 3300C, 3300D, 3300E, 3300F) relative to the reference point.

In some embodiments, detecting the change in orientation of the device (e.g., 3300) from the first orientation relative to the reference point (e.g., 3332) to a respective orientation relative to the reference point (e.g., 3332) includes detecting a change in orientation of the device (e.g., detecting a change in orientation of the device relative to a fixed reference point on the earth, for example based on orientation sensors of the device such as an accelerometer, a gyroscope, a magnetometer).

In some embodiments, detecting the change in orientation of the device (e.g., 3300) from the first orientation relative to the reference point (e.g., 3332) to a respective orientation relative to the reference point (e.g., 3332) includes detecting a change in orientation of a user relative to the device (e.g., based on a face tracking sensor such as a camera or other face tracking sensor that can detect changes of the point of view of a viewing angle of the device by a face that is being tracked by the device). In some examples, detecting the change in orientation of the device from the first orientation relative to the reference point to a respective orientation relative to the reference point includes detecting a change in orientation of a user relative to the device and detecting a change in orientation of the device.

The electronic device (e.g., 3300), in response to detecting the change in orientation of the device (3406), changes (3408) an appearance of the user interface object (e.g., 3324, 3354, 3344) by applying a visual effect (e.g., 3325, 3327, 3345) to the user interface object that varies a set of one or more parameters of the user interface object (e.g., 3324, 3354, 3344) as the orientation of the device changes relative to the reference point (e.g., 3332). Changing an appearance of a user interface object (e.g., 3324, 3344) by applying a visual effect (e.g., 3325, 3327, 3345) to the user interface object as the orientation of the device changes relative to a reference point (e.g., 3332) provides the user with visual feedback about a state of the user interface object and/or information about the user interface object, such as whether a transfer (e.g., of a message, of a file, of a resource, of a payment) associated with the user interface object has been successfully completed. Further, the change in amplitude of the visual effect as the orientation of the device changes indicates to the user that the displayed object is authentic and not a video that is displayed independent of the device orientation. Providing improved visual feedback to the user enhances the operability of the device and makes the user-device interface more efficient (e.g., by helping the user to provide proper inputs and reducing user mistakes when operating/interacting with the device, by enhancing legibility of user interface elements to the user while the device is at natural viewing angles) which, additionally, reduces power usage and improves battery life of the device by enabling the user to use the device more quickly and efficiently. Furthermore, providing the improved visual feedback also provides a security verification measure that cannot be duplicated (e.g., faked, copied) by a third-party application that is not an operating system-controlled (first-party) application. Improving security measures of the device enhances the operability of the device by preventing unauthorized access to content and operations and, additionally, reduces power usage and improves battery life of the device by enabling the user to use the device more efficiently.

In some embodiments, (3410) the visual effect (e.g., 3325, 3327, 3345) includes a coloring effect (e.g., 3327, 3345, of one or more colors, of two or more colors, of one or more colored patterns, such as a rainbow-colored pattern) applied to at least a portion of the user interface object. In some examples, the coloring effect is an iridescence effect of one or more colors that varies in color across a surface of the user interface object and changes as the orientation of the device relative to the baseline orientation changes. In some examples, the coloring effect is an iridescence effect that includes one or more rainbow-colored patterns. Applying a color effect as (part of) the visual effect allows the user to more easily perceive of and recognize the visual effect when it is applied (and thus, in some embodiments, allows the user to more easily recognize that a transfer associated with the user interface object to which the coloring effect is applied has been successfully completed). Further, modifying the color of the visual effect as the orientation of the device changes indicates to the user that the displayed object is authentic and not a video that is displayed independent of the device orientation. Providing improved visual feedback to the user enhances the operability of the device and makes the user-device interface more efficient (e.g., by helping the user to provide proper inputs and reducing user mistakes when operating/interacting with the device, by enhancing legibility of user interface elements to the user while the device is at natural viewing angles) which, additionally, reduces power usage and improves battery life of the device by enabling the user to use the device more quickly and efficiently. Furthermore, providing the improved visual feedback also provides a security verification measure that cannot be duplicated (e.g., faked, copied) by a third-party application that is not an operating system-controlled (first-party) application. Improving security measures of the device enhances the operability of the device by preventing unauthorized access to content and operations and, additionally, reduces power usage and improves battery life of the device by enabling the user to use the device more efficiently.

In some embodiments, (3412) a color of the coloring effect (e.g., 3327, 3345) applied to at least the portion of the user interface object (e.g., 3324, 3354, 3344) changes (e.g., shifts, transitions, smoothly changes) from a first color to a second color different from the first color in response to a change in orientation of the device of at least a predefined angular distance (e.g., colors shift across the user interface object as the orientation of the device changes relative to the baseline orientation, and/or the color displayed at any particular portion of the user interface object gradually transitions from one color to another color (optionally, through a sequence of intermediate colors in rainbow order) as the orientation of the device changes relative to the baseline orientation).

In some embodiments, (3414) the visual effect (e.g., 3325, 3327, 3345) includes a geometry alteration effect (e.g., 3325, a skewing effect, a 3D effect, a depth effect) applied to at least a portion of the user interface object (e.g., changing an angle or distance between lines or curves that define a shape of the object). Applying a geometry alteration effect (e.g., 3325) as (part of) the visual effect allows the user to more easily perceive of and recognize the visual effect when it is applied (and thus, in some embodiments, allows the user to more easily recognize that a transfer associated with the user interface object to which the geometry alteration effect is applied has been successfully completed). Providing improved visual feedback to the user enhances the operability of the device and makes the user-device interface more efficient (e.g., by helping the user to provide proper inputs and reducing user mistakes when operating/interacting with the device, by enhancing legibility of user interface elements to the user while the device is at natural viewing angles) which, additionally, reduces power usage and improves battery life of the device by enabling the user to use the device more quickly and efficiently. Furthermore, providing the improved visual feedback also provides a security verification measure that cannot be duplicated (e.g., faked, copied) by a third-party application that is not an operating system-controlled (first-party) application. Improving security measures of the device enhances the operability of the device by preventing unauthorized access to content and operations and, additionally, reduces power usage and improves battery life of the device by enabling the user to use the device more efficiently.

In some embodiments, the visual effect (e.g., 3325, 3327, 3345) includes a brightness effect. In some examples, the brightness effect is a light shine effect that causes the user interface object to appear as if a beam of light (e.g., in one or more colors) is being shined on the surface of the object. In some examples, the light shine effect causes the user interface object to sparkle as the beam of light is being shined on the surface of the object. In some examples, the brightness effect is a gloss or glazing effect that causes the surface of the user interface object to appear as if it has a glossy or polished texture. In some examples, the brightness effect is a shadow effect that causes the appearance of shadows accompanying the user interface object.

In some embodiments, (3416) the user interface object (e.g., 3324, 3354, 3344) is displayed on (e.g., located on, engraved into, on a surface of) a user interface item (e.g., 3334, 3338, a text message item (e.g., 3334) of a message conversation of a messaging application, such as a message object (as described above), a graphical representation of a payment account (e.g., 3338), such as a stored-value account, a cash account, or a checking account, a graphical representation of a user account, such as a resource account, a graphical representation of a card, such as a points card, a graphical representation of a payment card, such as a debit card or a credit card). In some examples, the user interface object (e.g., 3324, 3354, 3344) is a first user interface object of a plurality of user interface objects displayed on the surface of the user interface item (e.g., 3334, 3338). In some examples, the user interface object (e.g., 3324, 3354, 3344) appears "engraved" into the surface of the user interface item (e.g., 3334, 3338) in a V-shaped engraving pattern, where applying the visual effect to the user interface object includes applying a first magnitude of the visual effect to a first portion of the user interface object and applying a second magnitude (different from the first magnitude) of the visual effect to a second portion of the user interface object. Applying a first magnitude of the visual effect (e.g., 3325, 3327, 3345) to a first portion of a user interface object (e.g., 3324, 3354, 3344) and applying a second magnitude (that is different from the first magnitude) to a second portion of the user interface object (e.g., 3324, 3354, 3344) allows the user to more easily perceive of and recognize the visual effect when it is applied (and thus, in some embodiments, allows the user to more easily recognize that a transfer associated with the user interface object to which the visual effect having two different magnitudes has been applied has been successfully completed). Further, the change in the amplitude of the effect as the orientation of the device changes indicates to the user that the displayed object is authentic and not a video that is displayed independent of the device orientation. Providing improved visual feedback to the user enhances the operability of the device and makes the user-device interface more efficient (e.g., by helping the user to provide proper inputs and reducing user mistakes when operating/interacting with the device, by enhancing legibility of user interface elements to the user while the device is at natural viewing angles) which, additionally, reduces power usage and improves battery life of the device by enabling the user to use the device more quickly and efficiently. Furthermore, providing the improved visual feedback also provides a security verification measure that cannot be duplicated (e.g., faked, copied) by a third-party application that is not an operating system-controlled (first-party) application. Improving security measures of the device enhances the operability of the device by preventing unauthorized access to content and operations and, additionally, reduces power usage and improves battery life of the device by enabling the user to use the device more efficiently.

In some embodiments, (3418) the user interface item (e.g., 3334, 3338) corresponds to a (outgoing or incoming) message object (e.g., 3334, a text message object, a payment message object) of a message conversation (e.g., 3308) of a messaging application (e.g., 3306) (that is controlled by an operating system of the device).

In some embodiment, the visual effect (e.g., 3325, 3327, 3345) that varies the set of one or more parameters is applied (e.g., irrespective of a change in orientation of the device relative to the baseline orientation) to the user interface object (e.g., 3324, 3354, 3344) when a transfer (e.g., of resources, of a file, of a payment) associated with the message object corresponding to the user interface item (e.g., 3334, 3338) is completed (e.g., a payment is sent to a recipient of the message conversation of the messaging application, a payment is accepted by a recipient of the message conversation of the messaging application, for example as described in greater detail above with reference to method 1200).

In some embodiments, (3420) the user interface item (e.g., 3334, 3338) corresponds to a graphical representation of an account (e.g., 3338, graphical representations of a payment card, described with respect to methods 2100 and 2400).

The electronic device (e.g., 3300), (3406) in response to detecting the change in orientation of the device, in accordance with a determination that the change in orientation of the device includes movement, towards the baseline orientation, that meets predetermined criteria, (gradually) reduces (3422) an amplitude of the visual effect (e.g., 3325, 3327, 3345). In some examples, the visual effect (e.g., 3325, 3327, 3345) is gradually reduced for the duration that the orientation of the device is changing. In some examples, the visual effect (e.g., 3325, 3327, 3345) is gradually reduced as the orientation of the device changes (e.g., the greater the amount of change in the orientation the greater the change in the visual effect). In some examples, in accordance with a determination that the change in orientation of the device includes movement towards the baseline orientation that does not meet the predetermined criteria, the amplitude of the visual effect (e.g., 3325, 3327, 3345) is maintained or increased. Reducing an amplitude of a visual effect (e.g., 3325, 3327, 3345) in accordance with a determination that a change in orientation of the device includes movement, towards a baseline orientation, that meets predetermined criteria provides the user with visual feedback about a state of the user interface object and/or information about the user interface object, such as whether a transfer (e.g., of a message, of a file, of a resource, of a payment) associated with the user interface object has been successfully completed, and indicates tot the user that the transfer associated with the user interface object is a special type of transfer (e.g., a transfer made using a first-party application as opposed to a third-party application). Providing improved visual feedback to the user enhances the operability of the device and makes the user-device interface more efficient (e.g., by helping the user to provide proper inputs and reducing user mistakes when operating/interacting with the device, by enhancing legibility of user interface elements to the user while the device is at natural viewing angles) which, additionally, reduces power usage and improves battery life of the device by enabling the user to use the device more quickly and efficiently. Furthermore, providing the improved visual feedback also provides a security verification measure that cannot be duplicated (e.g., faked, copied) by a third-party application that is not an operating system-controlled (first-party) application. Improving security measures of the device enhances the operability of the device by preventing unauthorized access to content and operations and, additionally, reduces power usage and improves battery life of the device by enabling the user to use the device more efficiently.

In some embodiments, the predetermined criteria include movement (e.g., movement of the device or movement of a face of a user of the device) within a predefined angular distance from the baseline orientation.

In some embodiments, (3424) reducing the amplitude of the visual effect (e.g., 3325, 3327, 3345) comprises continuing to apply the visual effect (e.g., with a reduced amplitude compared to the amplitude of the visual effect applied to the user interface object prior to the change in orientation of the device) to the user interface object (e.g., 3324, 3354, 3344)

(reducing amplitude of the visual effect to the user interface object without ceasing to apply the visual effect to the user interface object).

In some embodiments, (3426) reducing the amplitude of the visual effect (e.g., 3325, 3327, 3345) comprises gradually decreasing the amplitude while the orientation of the device (e.g., 3300) moves towards the baseline orientation. In some examples, the magnitude of the reduction of the amplitude of the visual effect is dependent on the magnitude of the change in orientation of the device such that a first amount of movement toward the baseline orientation results in a first amount of decrease in the amplitude of the visual effect and a second amount of movement toward the baseline orientation that results in the orientation of the device being closer to the baseline orientation results in a second amount of decrease in the amplitude of the visual effect that is greater than the first amount of decrease in the amplitude of the visual effect.

In some embodiments, (3428) reducing the amplitude of the visual effect comprises (gradually) ceasing to apply the visual effect to the user interface object.

In some embodiments, (3430) the visual effect (e.g., 3325, 3327, 3345) includes a coloring effect (e.g., 3327, 3345, of one or more colors, of two or more colors, of one or more colored patterns, such as a rainbow-colored pattern) applied to at least a portion of the user interface object, and reducing the amplitude of the coloring effect (e.g., 3327, 3345) includes reducing a saturation of a color of the coloring effect applied to at least the portion of the user interface object (e.g., 3324, 3354, 3344). In some examples, increasing the amplitude of the visual effect includes increasing a saturation of the coloring effect (e.g., 3327, 3345).

In some embodiments, (3432) the visual effect (e.g., 3325, 3327, 3345) includes a geometry alteration effect (e.g., 3325, a skewing effect, a 3D effect, a depth effect) applied to at least a portion of the user interface object (e.g., changing an angle or distance between lines or curves that define a shape of the object), and the geometry alteration effect (e.g., 3325) is a skewing effect, and wherein reducing the amplitude of the visual effect includes reducing an amount of skew of the geometry of the user interface object (e.g., 3324, 3354, 3344). In some examples, increasing the amplitude of the visual effect includes increasing an amount of skew of the geometry of the user interface object (e.g., 3324, 3354, 3344). In some examples, the skewing effect includes shifting a line that represents an upper extent of a simulated three-dimensional object toward or away from a line that represents a lower extent of the simulated three-dimensional object (e.g., shifting a line that represents a top of a raised pattern toward or away from edges of the raised pattern), or a center line that represents a lower extent of a simulated three-dimensional object toward or away from a line that represents an upper extent of the simulated three-dimensional object (e.g., shifting a line that represents a bottom of an engraved pattern toward or away from edges of the engraved pattern). In some examples, reducing the skewing effect includes decreasing the amount of shifting of the line as the orientation of the device relative to a baseline orientation changes.

In some embodiments, (3434) the visual effect (e.g., 3325, 3327, 3345) includes a geometry alteration effect (e.g., 3325, a skewing effect, a 3D effect, a depth effect) applied to at least a portion of the user interface object (e.g., changing an angle or distance between lines or curves that define a shape of the object), and the geometry alteration effect is a simulated depth effect, and reducing the amplitude of the visual effect includes reducing a simulated depth of the geometry of the user interface object (e.g., 3324, 3354, 3344) (e.g., reducing an angle from a bottom of an engraved pattern to the surface into which the engraved pattern is engraved, or reducing an angle from the top of a raised object to surface on which the raised pattern is placed). In some examples, increasing the amplitude of the visual effect includes increasing a simulated depth of the geometry of the user interface object (e.g., 3324, 3354, 3344).

The electronic device (e.g., 3300), in response to detecting the change in orientation of the device, in accordance with a determination that the change in orientation of the device includes movement, away from the baseline orientation, that meets the predetermined criteria, continues (3436) to apply the visual effect (e.g., 3325, 3327, 3345) to the user interface object (e.g., 3324, 3354, 3344) without reducing the amplitude of the visual effect (e.g., at a constant amplitude, at a gradually increasing amplitude). In some examples, in accordance with a determination that the change in orientation of the device includes movement away from the baseline orientation that does not meet the predetermined criteria, the amplitude of the visual effect (e.g., 3325, 3327, 3345) is reduced or the visual effect is ceased to be displayed. Continuing to apply the visual effect (e.g., 3325, 3327, 3345) to the user interface object (e.g., 3324, 3354, 3344) without reducing the amplitude of the visual effect provides the user with visual feedback about a state of the user interface object and/or information about the user interface object, such as whether a transfer (e.g., of a message, of a file, of a resource, of a payment) associated with the user interface object has been successfully completed, and, by continuing to apply the visual effect to the user interface object without reducing the amplitude of the visual effect, also enables the user to more easily notice the application of the visual effect to the user interface object (e.g., as opposed to if the visual effect is immediately removed or removed after only a very brief period after the successful completion of a transfer). Providing improved visual feedback to the user enhances the operability of the device and makes the user-device interface more efficient (e.g., by helping the user to provide proper inputs and reducing user mistakes when operating/interacting with the device, by enhancing legibility of user interface elements to the user while the device is at natural viewing angles) which, additionally, reduces power usage and improves battery life of the device by enabling the user to use the device more quickly and efficiently. Furthermore, providing the improved visual feedback also provides a security verification measure that cannot be duplicated (e.g., faked, copied) by a third-party application that is not an operating system-controlled (first-party) application. Improving security measures of the device enhances the operability of the device by preventing unauthorized access to content and operations and, additionally, reduces power usage and improves battery life of the device by enabling the user to use the device more efficiently.

In some embodiments, (3438) continuing to apply the visual effect (e.g., 3325, 3327, 3345) to the user interface object (e.g., 3324, 3354, 3344) without reducing the amplitude of the visual effect comprises (gradually) increasing the amplitude of the visual effect while the orientation of the device (e.g., 3300) moves away from the baseline orientation. In some examples, the magnitude of the increase of the amplitude of the visual effect (e.g., 3325, 3327, 3345) is dependent on the magnitude of the change in orientation of the device such that a first amount of movement away from the baseline orientation results in a first amount of increase in the amplitude of the visual effect and a second amount of movement away from the baseline orientation that results in the orientation of the device being further from the baseline orientation results in a second amount of increase in the amplitude of the visual effect that is greater than the first amount of increase in the amplitude of the visual effect. Increasing the amplitude of the visual effect (e.g., 3325, 3327, 3345) provides the user with visual feedback about a state of the user interface object and/or information about the user interface object, such as whether a transfer (e.g., of a message, of a file, of a resource, of a payment) associated with the user interface object has been successfully completed, and, because the amplitude of the visual effect is increased, also enables the user to more easily perceive the application of the visual effect to the user interface object (e.g., as opposed to if the visual effect was static). Providing improved visual feedback to the user enhances the operability of the device and makes the user-device interface more efficient (e.g., by helping the user to provide proper inputs and reducing user mistakes when operating/interacting with the device, by enhancing legibility of user interface elements to the user while the device is at natural viewing angles) which, additionally, reduces power usage and improves battery life of the device by enabling the user to use the device more quickly and efficiently. Furthermore, providing the improved visual feedback also provides a security verification measure that cannot be duplicated (e.g., faked, copied) by a third-party application that is not an operating system-controlled (first-party) application. Improving security measures of the device enhances the operability of the device by preventing unauthorized access to content and operations and, additionally, reduces power usage and improves battery life of the device by enabling the user to use the device more efficiently.

In some embodiments, the electronic device (e.g., 3300), in response to detecting the change in orientation of the device, detects, via the one or more sensor devices, that the device is at a second orientation relative to the baseline orientation, wherein the second orientation is at least a predefined limit angular distance (e.g., 25 degrees, 30 degrees, 45 degrees, 90 degrees) from the baseline orientation. In some embodiments, the device further, in response to detecting the change in orientation of the device, and in response to detecting that the device is at the second orientation relative to the baseline orientation, gradually ceases to display the visual effect (e.g., 3325, 3327, 3345) to the user interface object (e.g., 3324, 3354, 3344) (e.g., the magnitude of the reduction of the amplitude of the visual effect while it is being gradually ceased to be displayed is dependent on the magnitude of the change in orientation of the device such that a first amount of movement toward the baseline orientation results in a first amount of decrease in the amplitude of the visual effect and a second amount of movement toward the baseline orientation that results in the orientation of the device being closer to the baseline orientation results in a second amount of decrease in the amplitude of the visual effect that is greater than the first amount of decrease in the amplitude of the visual effect).

In some embodiments, the visual effect (e.g., 3325, 3327, 3345) that varies the set of one or more parameters is applied to the user interface object (e.g., 3324, 3354, 3344) when a transfer (e.g., of resources, of one or more files, of a payment, a payment is transmitted using near-field communication) is completed using the account corresponding to the graphical representation corresponding to the user interface item (e.g., 3334, 3338) (e.g., as described in greater detail above with reference to method 1200).

In some embodiments, changing the appearance of the user interface object (e.g., 3324, 3354, 3344) is (only) controlled by a first application (e.g., a first-party application, such as a first-party messaging application, a first-party payment application) that is integrated with (e.g., controlled or wholly managed by) an operating system of the device (e.g., 3300) and the ability to change the appearance of a user interface object based on a change in orientation of the device from the first orientation relative to the reference point to a respective orientation relative to the reference point is not available to applications that are not integrated with the operating system of the device (e.g., applications that are not controlled by the operating system of the device, such as third-party applications). In some examples, the first application (e.g., a first-party application) that is controlled by the operating system of the device has access to motion data (e.g., data from an accelerometer) of the device or user orientation data (e.g., face tracking data from one or more cameras or other sensors) that is used to manage display of the user interface object, while the second application (e.g., a third-party application) that is not controlled by the operating system of the device does not have access to the motion data or user orientation data (e.g., face tracking data from one or more cameras or other sensors). Restricting control of changing the appearance of a user interface object (e.g., 3324, 3354, 3344) to a first application (e.g., a first-party application) that is integrated with an operating system of the device and prohibiting the ability to change the appearance of a user interface object based on a change in orientation of the device from applications (e.g., third-party applications) that are not integrated with the operating system of the device enhances device security by disallowing other applications that are not integrated with an operating system of the device to use the same (or similar) changing appearances of a user interface object for actions that are not connected with a successful transfer (e.g., of a file, of a resource, of a payment) made using an application that is integrated with an operating system of the device. Improving security measures of the device enhances the operability of the device by preventing unauthorized access to content and operations and, additionally, reduces power usage and improves battery life of the device by enabling the user to use the device more efficiently.

In some embodiments, further in response to detecting the change in orientation of the device (e.g., 3300), in accordance with a determination that the device is at the baseline orientation (or with an orientation that is within a predetermined delta of the baseline orientation), the device (e.g., 3300) continues (3440) to apply the visual effect (e.g., 3325, 3327, 3345) (e.g., with a reduced amplitude or with a constant amplitude compared to the amplitude of the visual effect applied to the user interface object prior to the change in orientation of the device) to the user interface object (e.g., 3324, 3354, 3344).

In some embodiments, the electronic device (e.g., 3300) further includes one or more tactile output generators, and, in response to detecting the change in orientation of the device from the first orientation relative to the reference point (e.g., 3332) to the respective orientation relative to the reference point, the device generates (3442), via the one or more tactile output generators, (e.g., for the duration of the change in the orientation of the device) a tactile output (e.g., 3336) that is indicative of the change in orientation of the device from the first orientation relative to the reference point (e.g., 3332) to the respective orientation relative to the reference point (e.g., a tactile output that includes a parameter that is adjusted based on a magnitude, speed, and/or direction of change in the orientation of the device relative to the baseline orientation). Generating a tactile output (e.g., 3336) provides the user with sensory feedback (e.g., in addition to visual feedback, to supplement visual feedback, or in place of visual feedback) about an operation that will be performed or has been performed by the device, such as that a transfer (e.g., of a message, of a file, of a resource, of a payment) has been successfully completed by the device. Providing improved sensory feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 3300) further includes one or more tactile output generators, and, in response to detecting the change in orientation of the device (e.g., 3300) from the first orientation relative to the reference point (e.g., 3332) to the respective orientation relative to the reference point, in accordance with a determination that the visual effect (e.g., 3325, 3327, 3345) being applied to the user interface object (e.g., 3324, 3354, 3344) exceeds a predefined amplitude limit (e.g., a minimum amount of visual effect, a trigger amount of visual effect), the device generates, via the one or more tactile output generators, (e.g., for the duration of the change in the orientation of the device) a tactile output (e.g., 3336) that is indicative of the change in orientation of the device from the first orientation relative to the reference point to the respective orientation relative to the reference point. In some embodiments, the device (e.g., 3300), in accordance with a determination that the visual effect (e.g., 3325, 3327, 3345) being applied to the user interface object (e.g., 3324, 3354, 3344) does not exceed the predefined amplitude limit (e.g., a minimum amount of visual effect, a trigger amount of visual effect), further forgoes generating, via the one or more tactile output generators, (e.g., for the duration of the change in the orientation of the device) the tactile output (e.g., 3336) that is indicative of the change in orientation of the device from the first orientation relative to the reference point to the respective orientation relative to the reference point. Forgoing generating a tactile output (e.g., 3336) (e.g., that is associated with a visual effect being applied to a user interface object) in accordance with a determination that the visual effect being applied to the user interface object does not exceed a predefined amplitude (e.g., magnitude) limit allows the device to avoid providing unnecessary (or inappropriate/false) sensory feedback. Reducing unnecessary output provided by the device enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some embodiments, (3444) a parameter (e.g., magnitude, frequency, rate of repetition) of the generated tactile output (e.g., an amount of physical displacement of the device or a component of the device caused by the tactile output, a waveform with which a mass driven by the tactile output generator is driven, such as the waveforms discussed above with reference to FIGS. 4C-4H, or a spacing between repetitions of a tactile output) changes based on (e.g., in correlation with) a velocity (speed) of the movement of the device (e.g., 3300) (while the orientation of the device changes). In some examples, the magnitude of the generated tactile output increases (e.g., the amount of physical displacement of the device or a component of the device increase) as (or in correlation with) the velocity of movement of the device increases. In some examples, the magnitude of the generated tactile output decreases (e.g., the amount of physical displacement of the device or a component of the device decreases) as (or in correlation with) the velocity of movement of the device decreases. Generating a tactile output (e.g., 3336) that changes based on a velocity of movement of the device allows the user to more easily sense and recognize the tactile output when it is generated (and thus, in some embodiments, allows the user to more easily recognize that an operation that corresponds to this type of tactile output has been performed by the device). Providing a unique sensory feedback (such as the tactile output based on changes in velocity) to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, (3446) a parameter (e.g., magnitude, frequency, rate of repetition) of the generated tactile output (e.g., an amount of physical displacement of the device or a component of the device caused by the tactile output, a waveform with which a mass driven by the tactile output generator is driven, or a spacing between repetitions of a tactile output) changes based on (e.g., in correlation with) an amount (e.g., a distance) of movement of the device (e.g., 3300) (while the orientation of the device changes). In some examples, the magnitude of the generated tactile output increases (e.g., the amount of physical displacement of the device or a component of the device increase) as (or in correlation with) the amount of movement of the device increases. In some examples, the magnitude of the generated tactile output decreases (e.g., the amount of physical displacement of the device or a component of the device decreases) as (or in correlation with) the amount of movement of the device decreases. Generating a tactile output (e.g., 3336) that changes based on an amount of movement of the device allows the user to more easily sense and recognize the tactile output when it is generated (and thus, in some embodiments, allows the user to more easily recognize that an operation that corresponds to this type of tactile output has been performed by the device). Providing a unique sensory feedback (such as the tac tile output based on changes an amount of movement) to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 3300), (3448) while no longer detecting a change in orientation of the device relative to the reference point (e.g., 3332) (e.g., immediately after or in response to ceasing to detect the change in orientation of the device), ceases (3450) to change the appearance of the user interface object (e.g., 3324, 3354, 3344). In some examples, the visual effect (e.g., 3325, 3327, 3345) continues to be applied but does not change while the orientation of the device does not change. In some embodiments, (3448) while no longer detecting a change in orientation of the device relative to the reference point (e.g., 3332), the device further (continues to) generates (3452), via the one or more tactile output generators, (e.g., continuing to perform (for a predetermined period of time) the tactile output from when the orientation of the device was changing) the tactile output (e.g., 3336) that is indicative of the change in orientation of the device from the first orientation relative to the reference point to the respective orientation relative to the reference point.

In some embodiments, the electronic device (e.g., 3300) detects (3454), via the one or more sensor devices, a ceasing (e.g., stopping) of the change in orientation of the device. In some embodiments, in response to detecting the ceasing of the change in orientation of the device, the device further gradually ceases (3456) to generate the tactile output (e.g., 3336). In some examples, gradually ceasing to generate the tactile output (e.g., 3336) includes gradually ceasing to generate the tactile output over the predefined period based on a speed or an amount of movement of the device relative to the baseline orientation prior to the stopping of the device. For example, if the device had been moving (on average) at a faster speed prior to stopping, the predefined period is longer than if the device had been moving (on average) at a slower speed prior to stopping. For another example, if the device had moved a longer (aggregate) distance prior to stopping, the predefined period is longer than if the device had moved a shorter (aggregate) distance prior to stopping. In some examples, the predefined period is based on a predefined time limit, such as 0.2 seconds, 0.5 seconds, or 1 second. In some embodiments, gradually ceasing to generate the tactile output (e.g., 3336) includes ceasing to generate the tactile output based on a simulated physical system (e.g., an energy dissipation system). In some embodiments, parameters of the simulated physical system are selected to ensure that the tactile output (e.g., 3336) gradually ceases within a threshold amount of time (e.g., an energy dissipation system with a predefined drain rate and a limited capacity for energy storage).

In some embodiments, the generated tactile output is a repetition of two or more distinctive tactile output patterns (e.g., one or more of the tactile output patterns described above with reference to FIGS. 4C-4H) including a first tactile output pattern and a second tactile output pattern, wherein the first tactile output pattern is different from the second tactile output pattern. In some examples, the first tactile output pattern and the second tactile output pattern have the same predetermined duration. In some examples, the first tactile output pattern and the second tactile output pattern have different durations. In some examples, the first tactile output pattern and the second tactile output pattern have different frequency patterns. In some examples, the first tactile output pattern and the second tactile output pattern have different magnitude patterns. Generating a tactile output (e.g., 3336) that is a repetition of two or more distinctive tactile output patterns allows the user to more easily sense and recognize the tactile output when it is generated (and thus, in some embodiments, allows the user to more easily recognize that an operation that corresponds to this type of tactile output has been performed by the device). Providing a unique sensory feedback (such as the tactile output that is a repetition of two or more distinctive tactile output patterns) to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device is a wearable device (e.g., a smartwatch). In some embodiments, subsequent to receiving authorization (from the user of the device) (e.g., a biometric authorization, such as a fingerprint authorization, a facial recognition authorization, voice recognition authorization, retina/iris scan authorization) to proceed with a transfer (e.g., a payment transaction), and in accordance with a determination that the received authorization is successful (e.g., the received authorization information is consistent with enrolled authorization information for authorizing transfers) the device transmits, via a wireless transmission device, account credentials (e.g., payment credentials of a payment account, such as a stored-value account, a debit card account, a credit card account) to a transaction terminal (e.g., a near field communication terminal, a point of sale terminal) for proceeding with the transfer. In some embodiments, subsequent to transmitting the account credentials to the transaction terminal, or in response to receiving a response signal from the transaction terminal acknowledging successful receipt of the account credentials and that the transfer has been successfully completed, the device (e.g., after turning off a display and/or while maintaining a display in an off state) generates a tactile output (e.g., to indicate to the user that the payment transaction with the transaction terminal was successfully completed).

Note that details of the processes described above with respect to method 3400 (e.g., FIGS. 34A-34D) are also applicable in an analogous manner to the methods described above. For example, method 3400 optionally includes one or more of the characteristics of the various methods described above with reference to methods 900, 1200, 1500, 1800, 2100, 2400, 2700, and 3000. For example, when a transfer (e.g., of a resource, of a file, of a payment) associated with a message (e.g., corresponding to graphical representation of a message 866) is completed, as described in method 900, a visual effect (e.g., 3325, 3327, 3345, a coloring effect, a geometric alteration effect) can be applied to an element (e.g., 868) of a graphical representation of the message (e.g., 866) to indicate to the user that the transfer is successfully completed. For another example, when a transfer (e.g., of a resource, of a file, of a payment) associated with a communication (e.g., corresponding to graphical representation of a communication 1118) is completed, as described in method 1200, a visual effect (e.g., 3325, 3327, 3345, a coloring effect, a geometric alteration effect) can be applied to an element (e.g., 1122) of a graphical representation of the communication (e.g., 1118) to indicate to the user that the transfer is successfully completed. For another example, when a transfer (e.g., of a resource, of a file, of a payment) associated with a message (e.g., corresponding to received message object 1490) is completed, as described in method 1500, a visual effect (e.g., 3325, 3327, 3345, a coloring effect, a geometric alteration effect) can be applied to an element (e.g., 1468) of a received message object (e.g., 1490) corresponding to the message to indicate to the user that the transfer is successfully completed. For another example, when a transfer (e.g., of a resource, of a file, of a payment) associated with a message (e.g., corresponding to message object 1726) is completed, as described in method 1800, a visual effect (e.g., 3325, 3327, 3345, a coloring effect, a geometric alteration effect) can be applied to an element of a message object (e.g., 1726) corresponding to the message to indicate to the user that the transfer is successfully completed. For another example, when an account (e.g., corresponding to representation of the second account 2030) is ready to be used in a transfer (e.g., of a resource, of a file, of a payment) and/or when a transfer using the account is completed, as described in method 2100, a visual effect (e.g., 3325, 3327, 3345, a coloring effect, a geometric alteration effect) can be applied to one or more elements (e.g., 2034) of a representation of the account (e.g., 2030) to indicate to the user that the account is ready to be used in the transfer and/or that the transfer is successfully completed. For another example, when a payment account (e.g., corresponding to graphical representation 2330) is ready to be used in a transfer (e.g., of a resource, of a file, of a payment) and/or when a transfer using the payment account is completed, as described in method 2400, a visual effect (e.g., 3325, 3327, 3345, a coloring effect, a geometric alteration effect) can be applied to one or more elements of the graphical representation of the payment account (e.g., 2330) to indicate to the user that the account is ready to be used in the transfer and/or that the transfer is successfully completed. For another example, when a transfer (e.g., of a resource, of a file, of a payment) associated with a message (e.g., corresponding to message object 2644) is completed, as described in method 2700, a visual effect (e.g., 3325, 3327, 3345, a coloring effect, a geometric alteration effect) can be applied to an element (e.g., 2622) of the message object (e.g., 2644) corresponding to the message to indicate to the user that the transfer is successfully completed. For another example, when a transfer (e.g., of a resource, of a file, of a payment) associated with a message (e.g., corresponding to message object 2932) is completed, as described in method 3000, a visual effect (e.g., 3325, 3327, 3345, a coloring effect, a geometric alteration effect) can be applied to an element of the message object (e.g., 2932) corresponding to the message to indicate to the user that the transfer is successfully completed. For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 34A-34D are, optionally, implemented by components depicted in FIGS. 1A-1B. For example, displaying operation 3402, detecting operation 3404, changing operation 3408, reducing operation 3422, and continuing operation 3436 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 35A-35J illustrate example user interfaces for sending a gift transfer, in accordance with some embodiments. As described in greater detail below, the techniques illustrated by the example user interfaces of FIGS. 35A-35J relate to the techniques illustrated by the example user interfaces of FIGS. 36A-36Z.

Figure 35A:
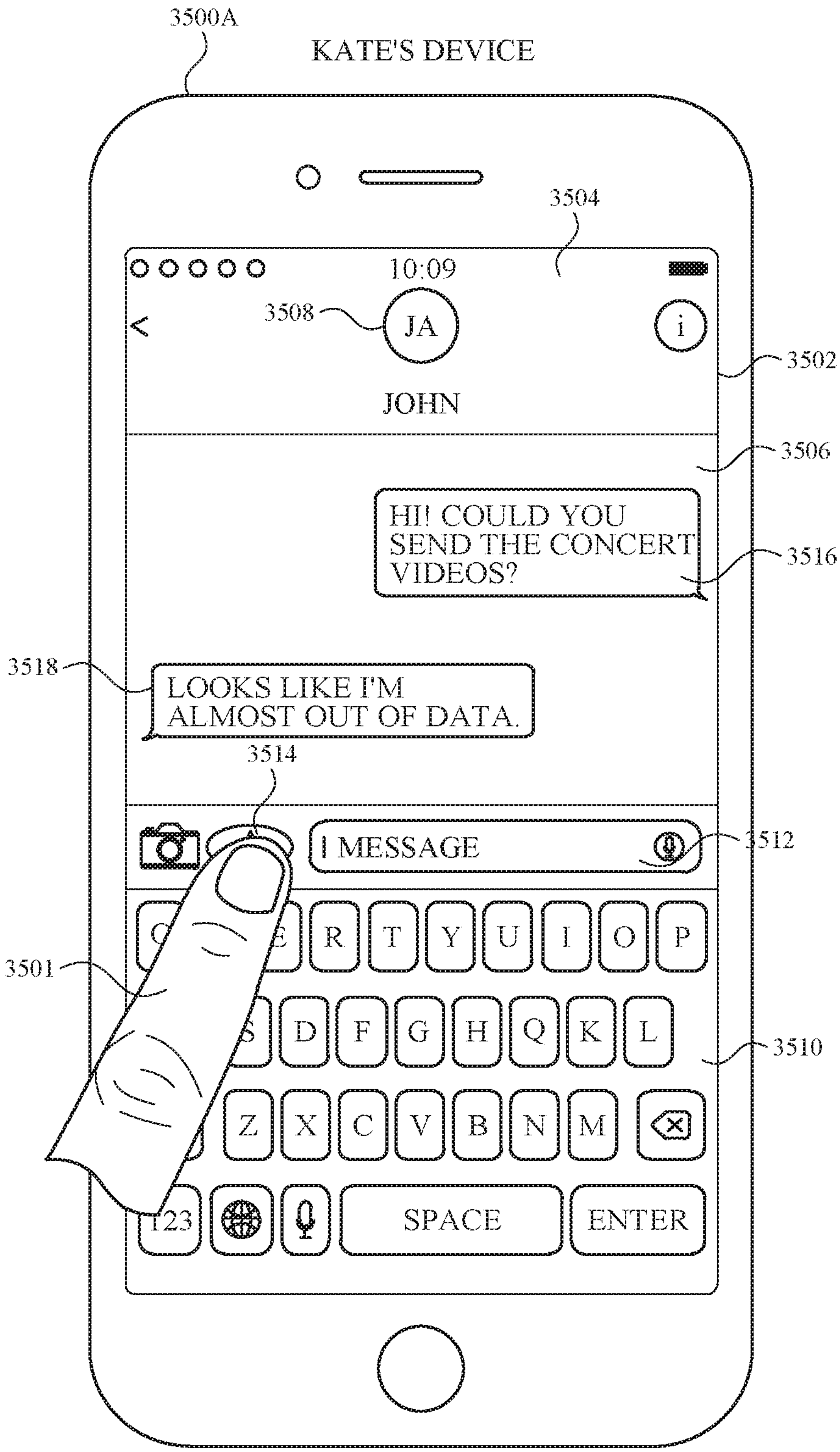
FIGS. 35A-35J illustrate example user interfaces for sending a gift transfer, in accordance with some embodiments.

FIG. 35A illustrates an electronic device 3500A (e.g., portable multifunction device 100, device 300, or device 500). In the non-limiting example embodiment illustrated in FIGS. 35A-35J, electronic device 3500A is a smartphone. In other embodiments, electronic device 3500A can be a different type of electronic device, such as a wearable device (e.g., a smartwatch). Electronic device 3500A has a display 3502 and one or more input devices (e.g., touchscreen of display 3502, a mechanical button, a mic, a camera).

In FIG. 35A, electronic device 3500A displays, on display 3502, a one-on-one message conversation 3506 of a messaging application 3504 between a user of the device (e.g., "Kate") and a message participant 3608 (e.g., "John"). In some embodiments, messaging application 3504 is a first-party application controlled by the operating system of the device (and not a third-party application. In some embodiments, message participant 3508 is a contact of a contact list associated with the user account logged onto the device. In some embodiments, message participant 3508 is a contact included in a trusted contacts list associated with the user account logged onto the device.

As shown in FIG. 35A, message conversation 3506 includes two visible message objects 3516 and 3518 corresponding to a conversation between the user of the device (Kate) and message participant 3508 (John), where message object 3516 corresponds to a message sent by the user to message participant 3508 and message object 3518 corresponds to a message sent by message participant 3508 to the user. In message object 3516, the user states to message participant 3508: "Hi! I had fun at your birthday party yesterday!" In message object 3518, message participant 3508 responds to the user: "Thanks again for coming to celebrate!"

In some embodiments, electronic device 3500A also displays, on display 3502, a virtual keyboard 3510 (e.g., an alphanumeric keyboard for typing a message) and a compose bar 3512 for displaying the text of a message as a message is typed using virtual keyboard 3510. In some embodiments, electronic device 3 500A also displays an application button 3 518 (e.g., adjacent to compose bar 3512). In FIG. 35A, electronic device 3500A detects (e.g., via a touchscreen of display 3502) a user selection 3501 (e.g., a tap gesture) of application button 3514.

Figure 35B:
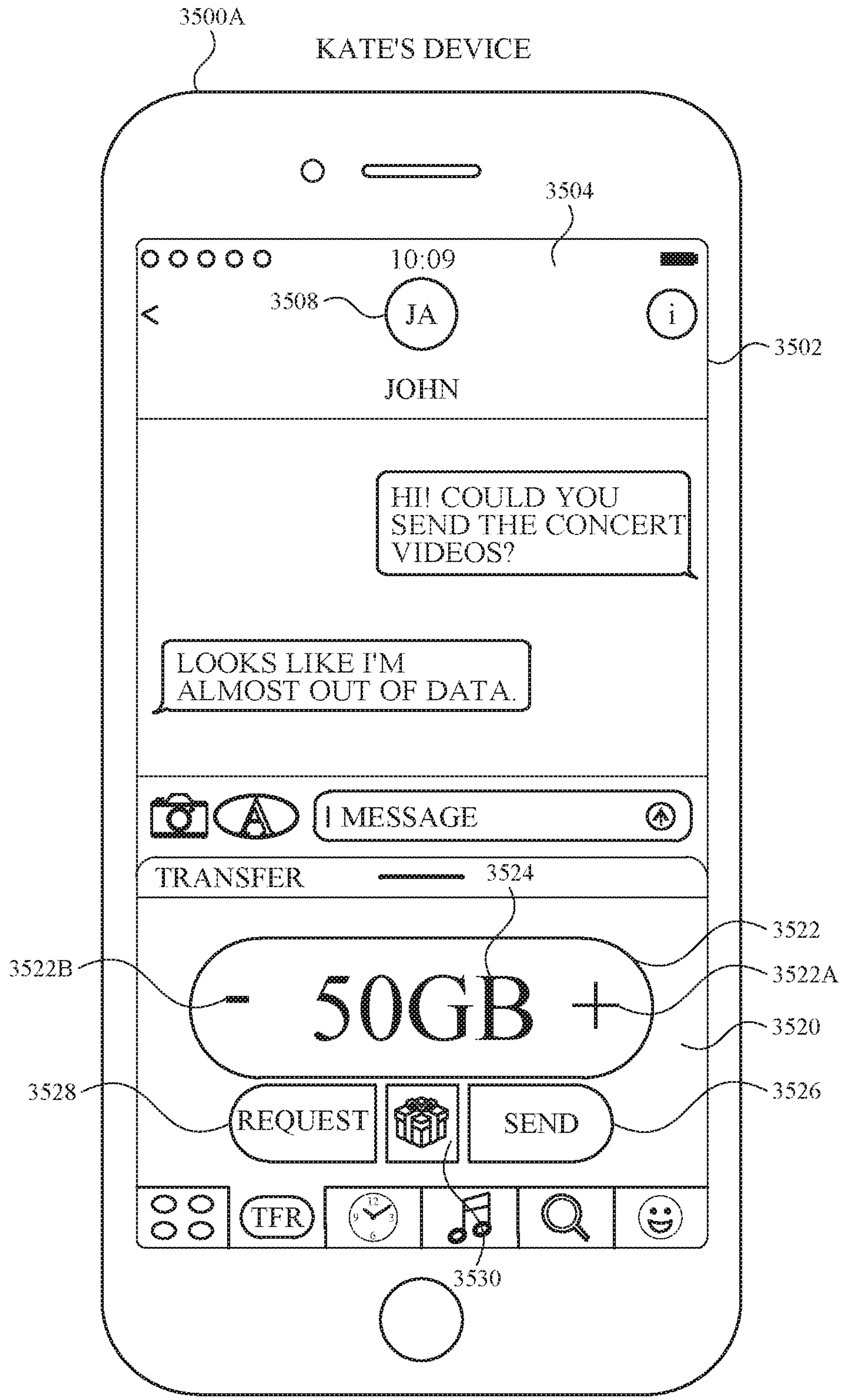

In FIG. 35B, in response to detecting user selection 3501 of application button 3514, electronic device 3500A displays, on display 3502, a data storage transfer user interface 3520 for transferring an amount of electronic data storage associated with an online data storage account to a recipient(s). In some embodiments, the user and the recipient(s) (and, possibly, other individuals) share the online data storage account (e.g., a cloud storage account) with a limited amount of available data storage (e.g., 1 TB). The available data storage of the shared storage account is apportioned among the users of the storage account (e.g., including the user, the recipient(s), and, possibly, other individuals). Amounts of data storage within the storage account can further be transferred (e.g., using data storage transfer user interface 3520) among the members of the storage account.

As shown in FIG. 35B, in some embodiments, data storage transfer user interface 3520 includes a value change region 3522 that includes an indication 3524 of the transfer amount (e.g., "50 GB") entered by the user using a value increase button 3522A (for increasing the displayed data storage amount) and a value decrease button 3522B (for decreasing the displayed data storage amount). As also shown in FIG. 35B, in some embodiments, data storage transfer user interface 3520 includes a send button 3526 for initiating a data storage transfer to a different user (e.g., message participant 3508) via messaging application 3504 and a request button 3528 for initiating a request for a payment from a different user (e.g., message participant 3508) via messaging application 3504.

In some embodiments, data storage transfer user interface 3520 further includes a gift button 3530. In some embodiments, gift button 3530 is used to initiate a data storage transfer to a different user (e.g., message participant 3508) via messaging application 3504, where the data storage is sent as a gift. In some embodiments, gift button 3530 is used to select a graphical animation (e.g., an envelope animation, a gift box animation) applied to a gift transfer object sent via messaging application 3504.

Figure 35C:
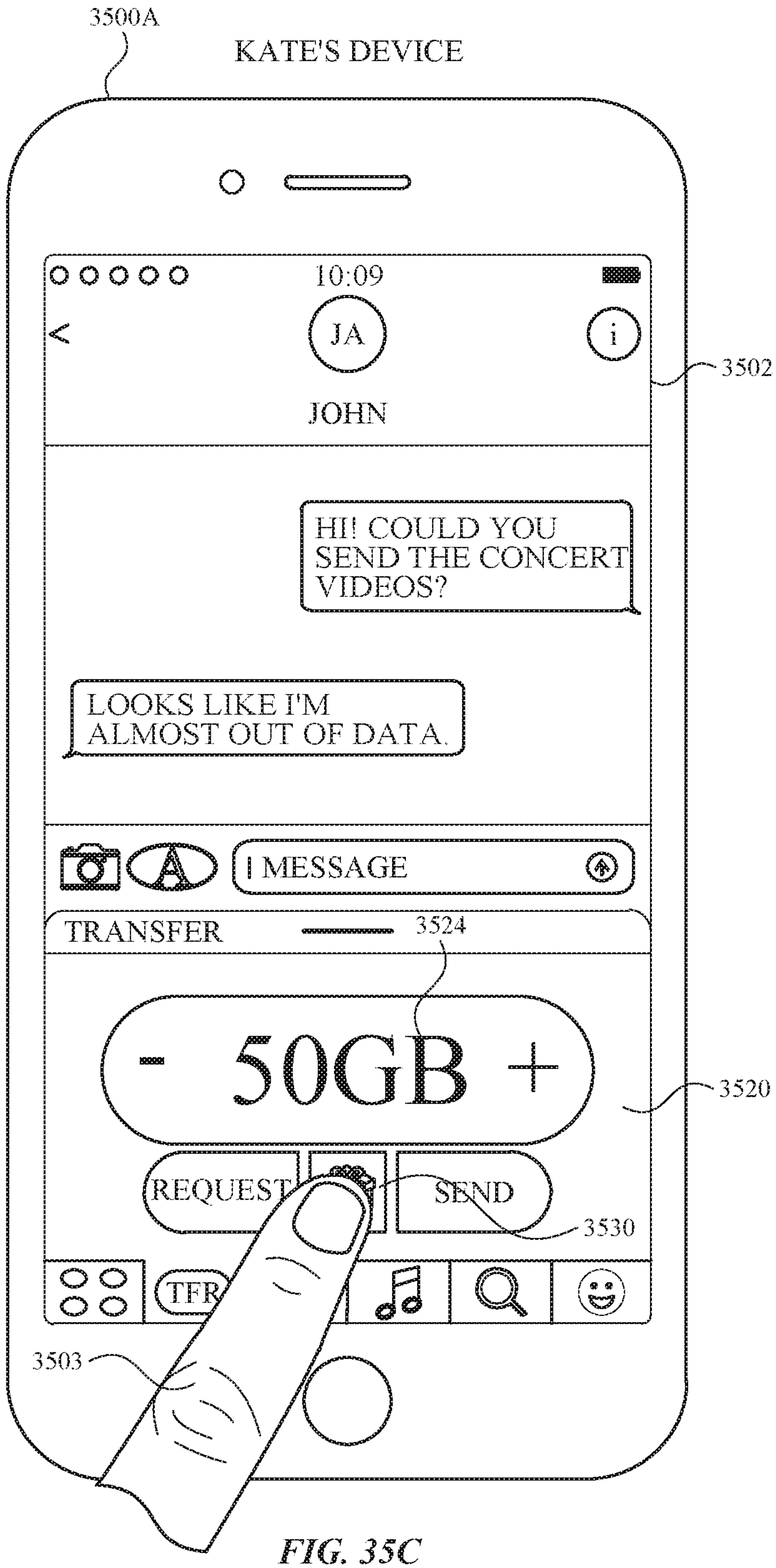

In FIG. 35C, while displaying data storage transfer user interface 3520 with "50 GB" entered as the transfer amount (as indicated by indication 3524), electronic device 3600A detects (e.g., via touchscreen of display 3502) a user selection 3503 (e.g., a tap gesture) on gift button 3530. In some embodiments, user selection 3503 of gift button 3530 activates a gift mode. In some embodiments, electronic device 3600A applies a highlight to gift button 3530 indicating that the gift button has been selected, and thus that the gift mode has been activated (e.g., a highlighting of the gift button in a specific color, a shading of the gift button, a thickening of the border of the gift button).

Figure 35D:
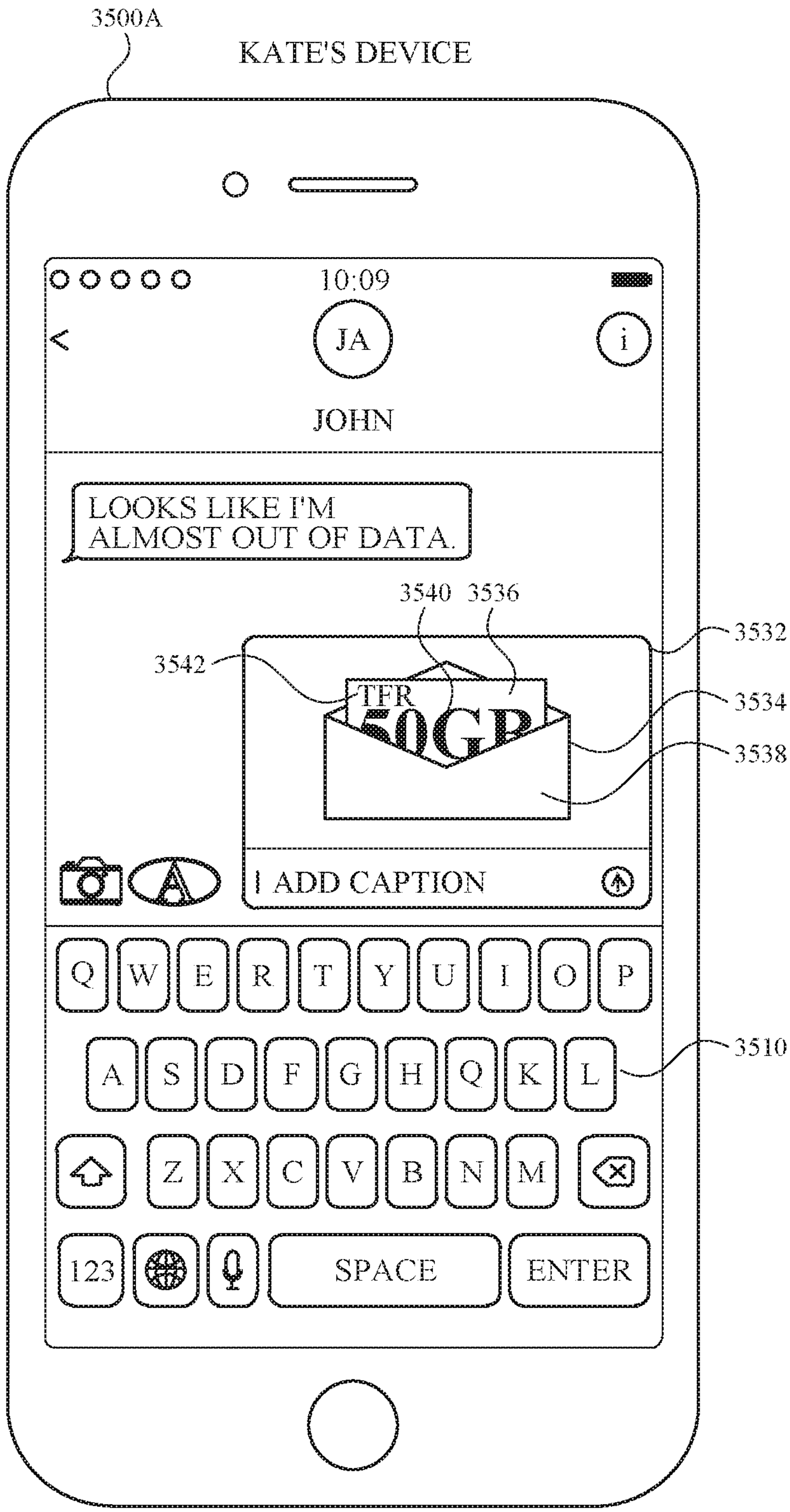

In FIG. 35D, in response to user selection 3503 of gift button 3530, electronic device 3500A displays (e.g., over a portion of message conversation 3506) an expanded compose region 3532 for displaying a draft transfer message object (e.g., a message object related to a transfer, such as a transfer of an amount of data storage, that is being composed and has not yet been sent) that has not yet been transmitted to the intended recipient(s) (e.g., message participant 3508). In some embodiments, electronic device 3500A further replaces display of data storage transfer user interface 3520 with display of virtual keyboard 3510.

As also illustrated in FIG. 35D, electronic device 3500A further displays, within expanded compose region 3532, a gift message object 3534 that comprises a content object 3536 and a concealment object 3538. In some examples, the gift message object corresponds to a graphical animation of an envelope and a letter, where the content element corresponds to the letter and the concealment element corresponds to the envelope. In some examples, the gift message object corresponds to a graphical animation of a gift item enclosed within a gift box, where the content element corresponds to the gift item and the concealment object corresponds to the gift box.

As also illustrated in FIG. 35D, content object 3536 (which, in the non-limiting example depicted by FIG. 35, corresponds to a letter) includes an amount indication 3540 of the data storage transfer amount (e.g., 50 GB), which corresponds to the data storage transfer amount selected by the user via data storage transfer user interface 3520 and a mode indication 3542 (e.g., stating "TFR") indicating that the gift message object is associated with an operating system-controlled data storage transfer application (and not by a third-party application). In some embodiments, when displayed within expanded compose region 3532 (and thus not yet transmitted to the intended recipient(s)), amount indication 3540 is not displayed with a dynamic visual effect (e.g., a depth effect or a coloring effect as described with reference to FIGS. 33A-33O, a 3D effect described with reference to FIGS. 11A-11V). In some embodiments, content object 3536 is partially hidden (e.g., concealed) by concealment element 3538 (which, in the non-limiting example depicted in FIG. 35D, corresponds to an envelope) when displayed within expanded compose region 3532.

Figure 35E:
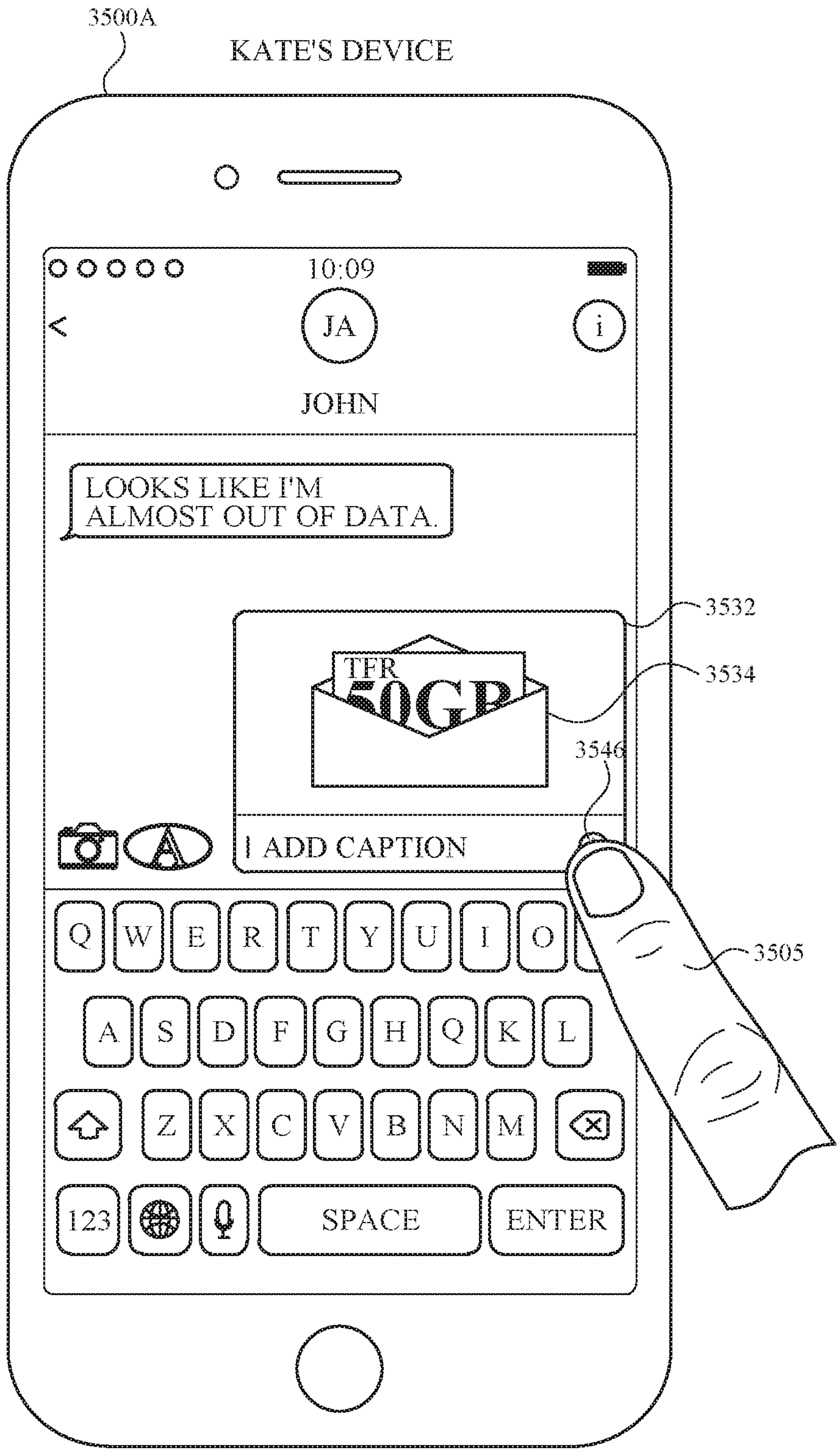

In FIG. 35E, while displaying gift message object 3534 within expanded compose region 3532, electronic device 3500A detects (e.g., via a touchscreen of display 3502) a user selection 3505 (e.g., a tap gesture) of a send button 3546. In response to detecting user selection 3505, electronic device 3500A transmits a communication corresponding to gift payment message object 3534 to message participant 3508 (the intended recipient, John).

Figure 35F:
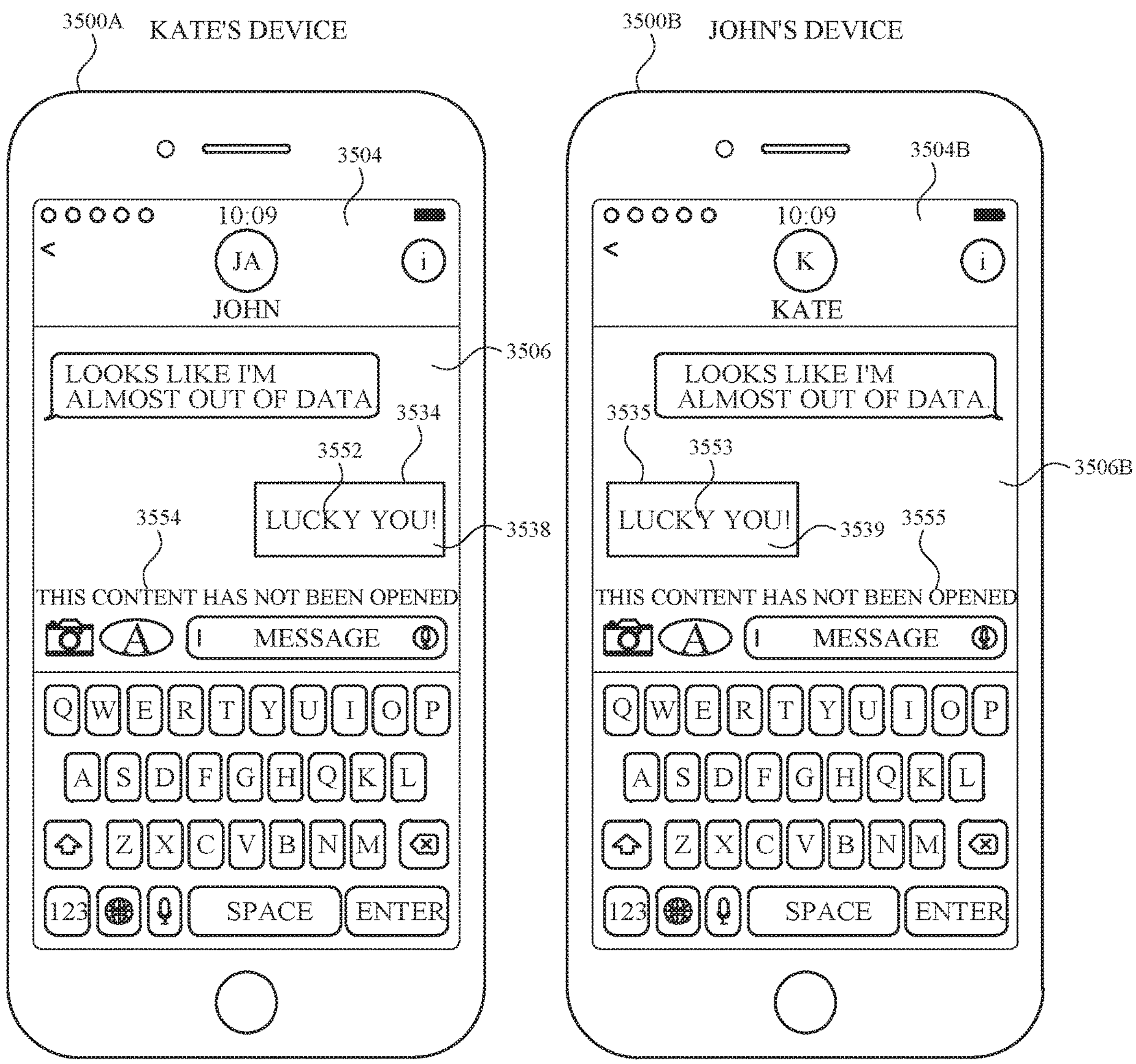

FIG. 35F illustrates electronic device 3500A (e.g., belonging to Kate) and electronic device 3500B (e.g., belonging to John). Solely for the ease of description, electronic device 3500A and electronic device 3500B are referred to as Kate's Device and John's Device, respectively.

In FIG. 35F, electronic device 3500A (Kate's Device) displays, in message conversation 3506, sent gift message object 3534 in message conversation 3506 in response to detecting user selection 3505 of send button 3546. In some embodiments, as shown by Kate's Device in FIG. 35F, once transmitted, gift message object 3534 is shown from a different view (e.g., the back side of concealment object 3538, if the concealment object is an envelope). In some embodiments, as also shown by Kate's Device in FIG. 35F, once transmitted, gift message object 3534 further shows a message 3552 indicating that the gift message object corresponds to a gift transfer. For example, in the non-limiting example illustrated in FIG. 35F, message 3552 states "Lucky You!" In some embodiments, message 3552 associated with concealment object 3538 is fixed with the concealment object and thus cannot be modified or changed by the user. In some embodiments, message 3552 associated with concealment object can be inputted (e.g., using virtual keyboard 3510) by the user prior to sending the gift transfer. In some embodiments, electronic device 3500A further displays a status message 3554 (e.g., stating "The content has not been opened") indicating whether or not the payment associated with gift message object 3534 has been accepted (or has been viewed) by the recipient (e.g., message participant 3508, John).

Similarly, in FIG. 35F, electronic device 3500B (John's Device), upon receiving the communication corresponding to the gift transfer from Kate's Device, John's Device displays, within a message conversation 3506B (corresponding to message conversation 3506 on Kate's Device) of a messaging application 3504B (corresponding to messaging application 3504 on Kate's Device), a received gift message object 3535 corresponding to sent gift message object 3534. As with sent gift message object 3534 on Kate's Device, received gift message object 3535 on John's Device includes a message 3553 (e.g., stating "Lucky You!") indicating that the gift message object corresponds to a gift transfer on a concealment object 3539 of the gift message object. Further, John's Device also displays a status message 3555 indicating whether or not the payment associated with gift message object 3534 has been opened by the recipient (John).

Figure 35G:
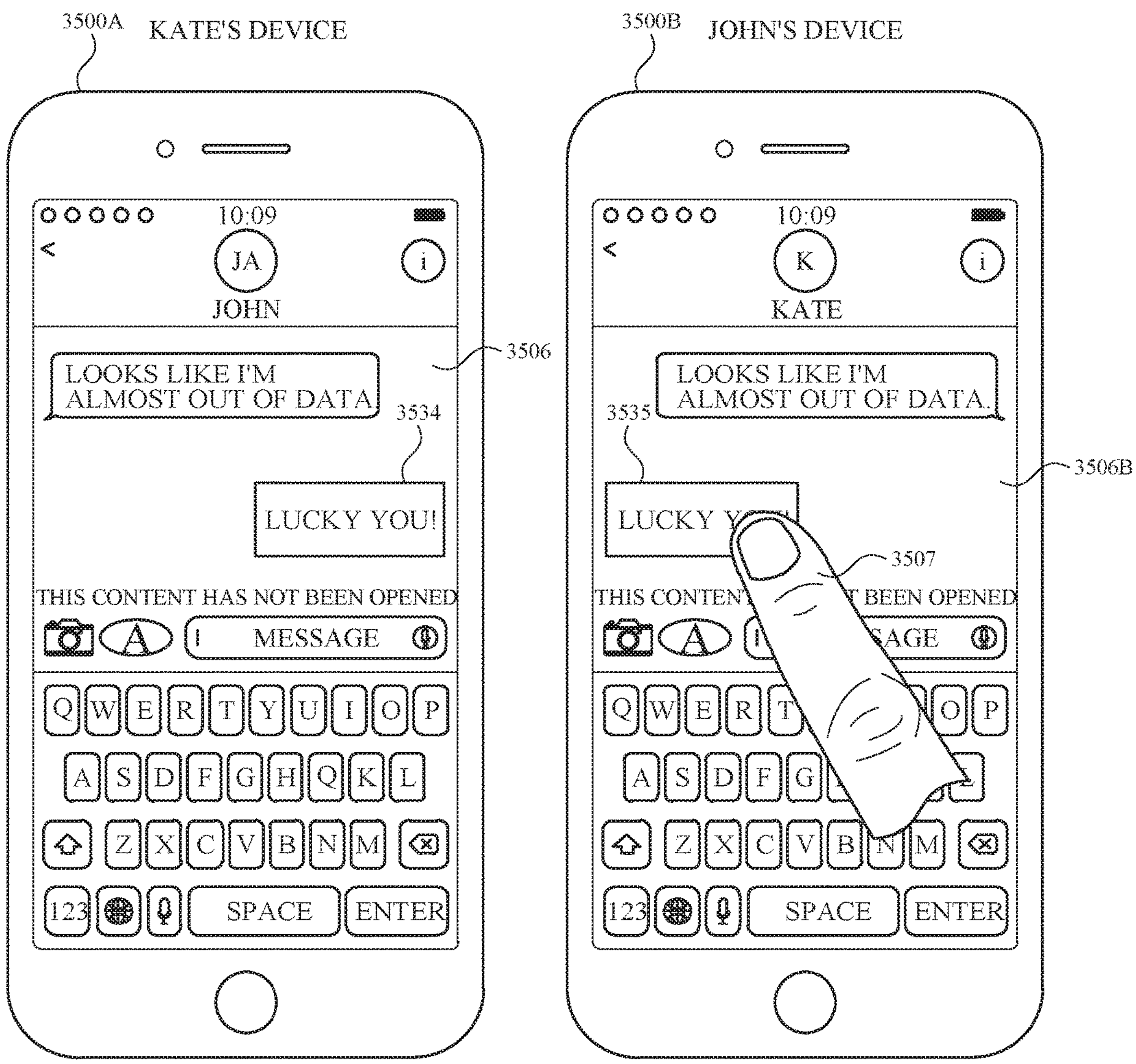

FIG. 35G again illustrates electronic device 3500A (Kate's Device) displaying gift message object 3534 in message conversation 3506 (between Kate and John) and electronic device 3500B (John's Device) displaying gift message object 3535 in message conversation 3506B (between Kate and John). In FIG. 35G, while displaying gift message object 3535 in message conversation 3506B, John's Device detects a user selection 3507 (e.g., a tap gesture) of gift message object 3535.

Figure 35H:
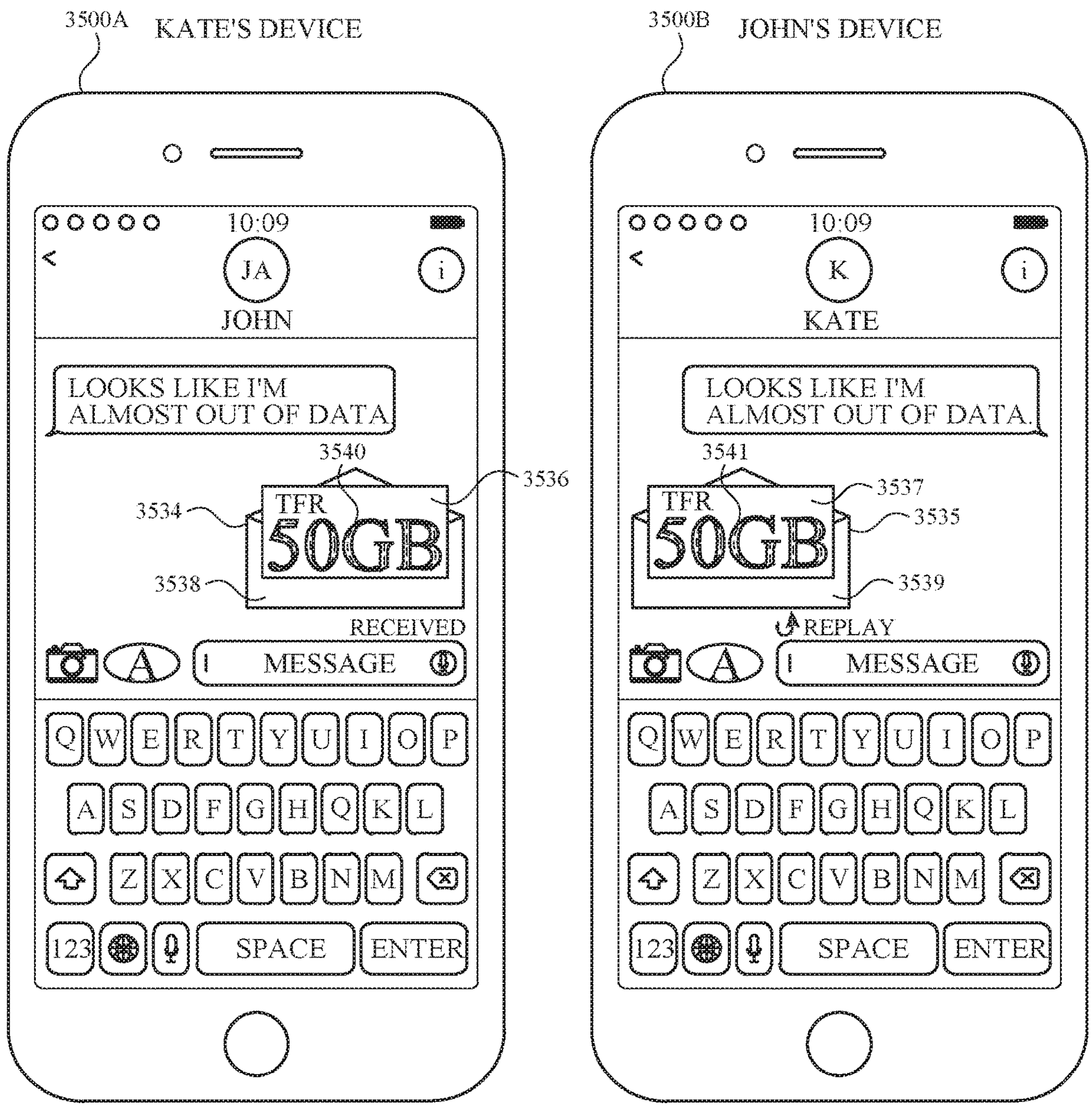

As shown in FIG. 35H, in response to detecting user selection 3507 of gift message object 3535 on John's Device, concealment object 3539 of gift message object 3535 displayed on John's Device is opened to reveal a content object 3537 that includes an amount indication 3541 (e.g., showing "50 GB") corresponding to the amount of data storage gifted by Kate. Likewise, in response to (or subsequent to) detecting user selection 3507 of gift message object 3535 on John's Device, concealment object 3538 of gift message object 3534 displayed on Kate's Device is correspondingly opened to reveal content object 3536 that includes amount indication 3540 (e.g., showing "50 GB") corresponding to the amount of data storage gifted by Kate to John.

In some embodiments, as also shown in FIG. 35H, once opened (by the recipient), amount indication 3541 of content object 3537 of gift message object 3539 displayed on John's Device (and, correspondingly, amount indication 3540 of content object 3536 of gift message object 3534 displayed on Kate's Device) is displayed with a dynamic visual effect (e.g., a depth effect and/or a coloring effect as described with reference to FIGS. 33A-33O, a 3D effect as described with reference to FIGS. 11A-11V). In some embodiments, in addition to, or instead of, generating the dynamic visual feedback, the device generates a dynamic haptic feedback (e.g., similar to the generated tactile output 3336 described with reference to, for example, FIGS. 33F-33H). In some embodiments, the generated feedback (e.g., visual feedback, haptic feedback) is caused (e.g., only) by an operating system program of the device and non-operating system programs of the device are not enabled to cause the feedback.

Figure 35I:
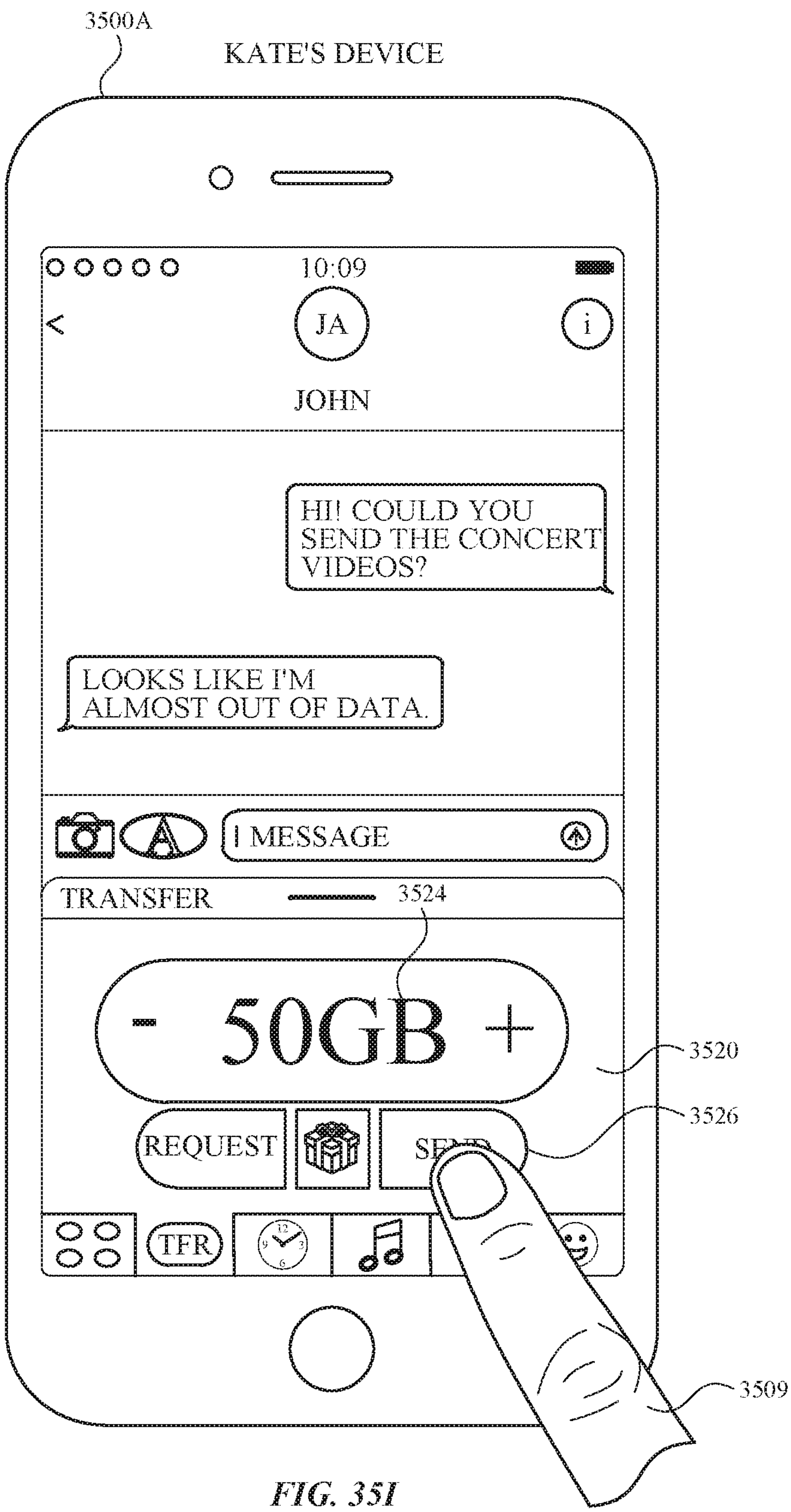

FIG. 35I illustrates electronic device 3500A (Kate's Device) displaying message conversation 3506 and data storage transfer user interface 3520 prior to making the gift transfer, as illustrated above in FIG. 35C. In FIG. 35, while displaying data storage transfer user interface 3520 with 50 GB of data storage selected as the transfer amount (as indicated by indication 3524), electronic device 3500A detects a user selection 3509 (e.g., a tap gesture) of send button 3526 (e.g., as opposed to gift button 3530) of data storage transfer user interface 3520.

Figure 35J:
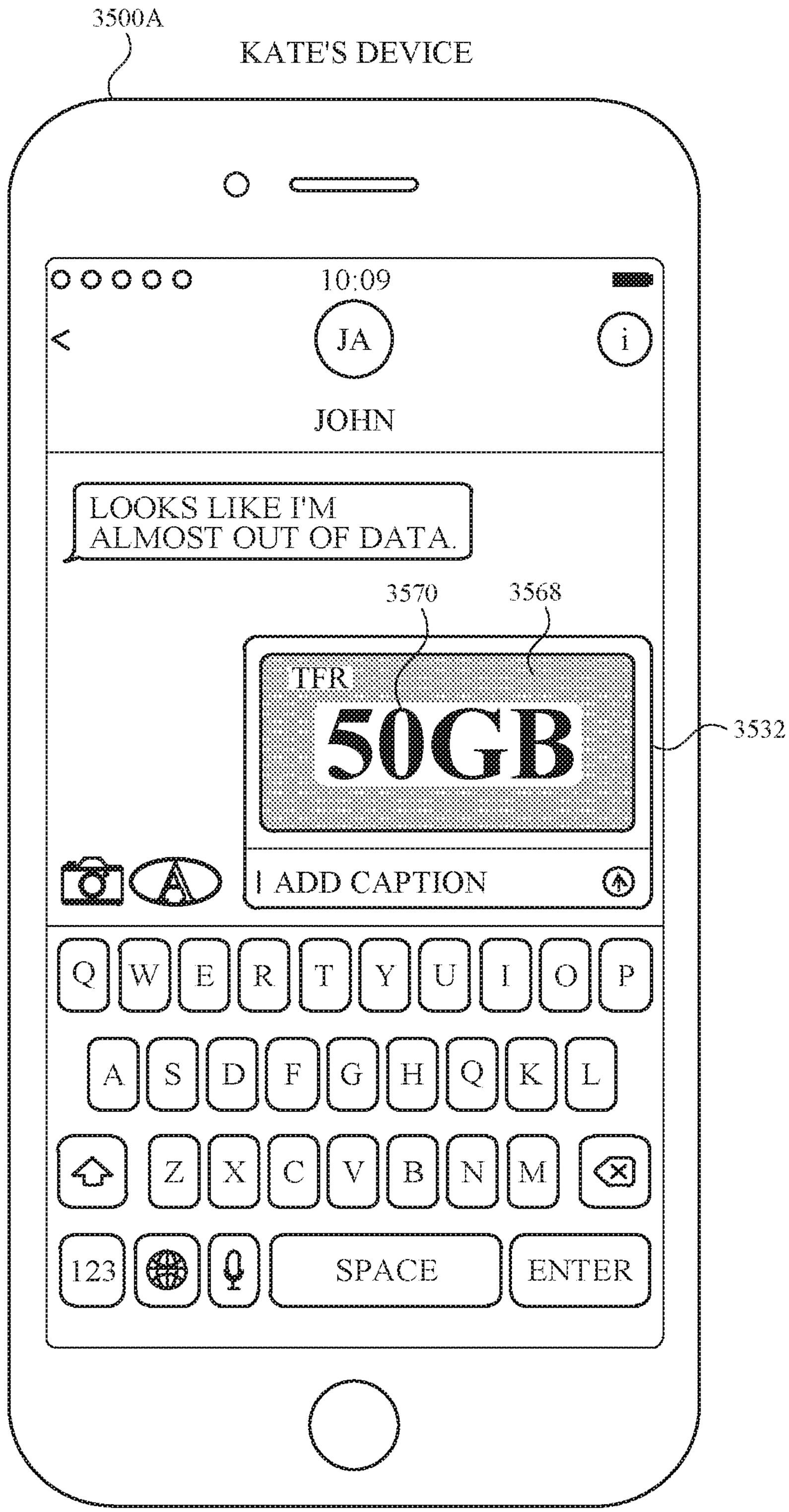

As shown in FIG. 35J, in response to detecting user selection 3509 of send button 3526, electronic device 3500A displays (e.g., over a portion of message conversation 3506) expanded compose region 3532 and a draft transfer message object 3568 corresponding to a non-gift data storage transfer of 50 GB of data (e.g., as opposed to a gift transfer of 50 GB of data, as described above with reference to FIGS. 35C-35H), as shown by indication 3570 (e.g., showing "50 GB"). As shown in FIG. 35J, unlike gift message object 3534, transfer message object 3568 does not include a concealment object or a content object.

The example user interfaces illustrated in FIGS. 35A-35J above relate to the example user interfaces illustrated in FIGS. 36A-36Z below. In particular, the example user interfaces of FIGS. 35A-35J and the example user interfaces of FIGS. 36A-36Z both relate to sending a gift transfer using an electronic device (e.g., 100, 300, 500, 3500A, 3600A), in accordance with some embodiments. Therefore, it is to be understood that the techniques described with reference to the example user interfaces of FIGS. 35A-35J and the techniques described with reference to the example user interfaces of FIGS. 36A-36Z are both techniques that relate to similar concepts for managing a gift transfer, in accordance with some embodiments.

As mentioned above, FIGS. 36A-36Z illustrate example user interfaces for sending a gift transfer, in accordance with some embodiments. FIG. 36A illustrates an electronic device 3600A (e.g., portable multifunction device 100, device 300, or device 500). In the non-limiting example embodiment illustrated in FIGS. 36A-36Z, electronic device 3600A is a smartphone. In other embodiments, electronic device 3600A can be a different type of electronic device, such as a wearable device (e.g., a smartwatch). Electronic device 3600A has a display 3602 and one or more input devices (e.g., touchscreen of display 3602, a mechanical button, a mic, a camera).

In FIG. 36A, electronic device 3600A displays, on display 3602, a one-on-one message conversation 3606 of a messaging application 3604 between a user of the device (e.g., "Kate") and a message participant 3608 (e.g., "John"). In some embodiments, messaging application 3604 is a first-party application (only) controlled by the operating system of the device (and not a third-party application. In some embodiments, message participant 3608 (John) is a contact of a contact list associated with the user account logged onto the device. In some embodiments, message participant 3608 (John) is a contact included in a trusted contacts list associated with the user account logged onto the device.

As shown in FIG. 36A, message conversation 3606 includes two visible message objects 3616 and 3618 corresponding to a conversation between the user (Kate) and message participant 3608 (John), where message object 3616 corresponds to a message sent by the user to message participant 3608 and message object 3618 corresponds to a message sent by message participant 3608 to the user. In message object 3616, the user states to message participant 3608: "Hi! I had fun at your birthday party yesterday!" In message object 3618, message participant 3608 responds to the user: "Thanks again for coming to celebrate!"

In some embodiments, electronic device 3600A also displays, on display 3602, a virtual keyboard 3610 (e.g., an alphanumeric keyboard for typing a message) and a compose bar 3612 for displaying the text of a message as a message is typed using virtual keyboard 3612. In some embodiments, a mechanical keyboard can be used in addition to or alternatively to virtual keyboard 3610 to type a message. In some embodiments, compose bar 3612 can expand (e.g., expand upwards) to accommodate a longer message or message object (e.g., an image, an emoticon, a special type of message object, such as a payment object). In some embodiments, virtual keyboard 3610 is displayed over a portion of messaging application 3604.

Figure 36B:
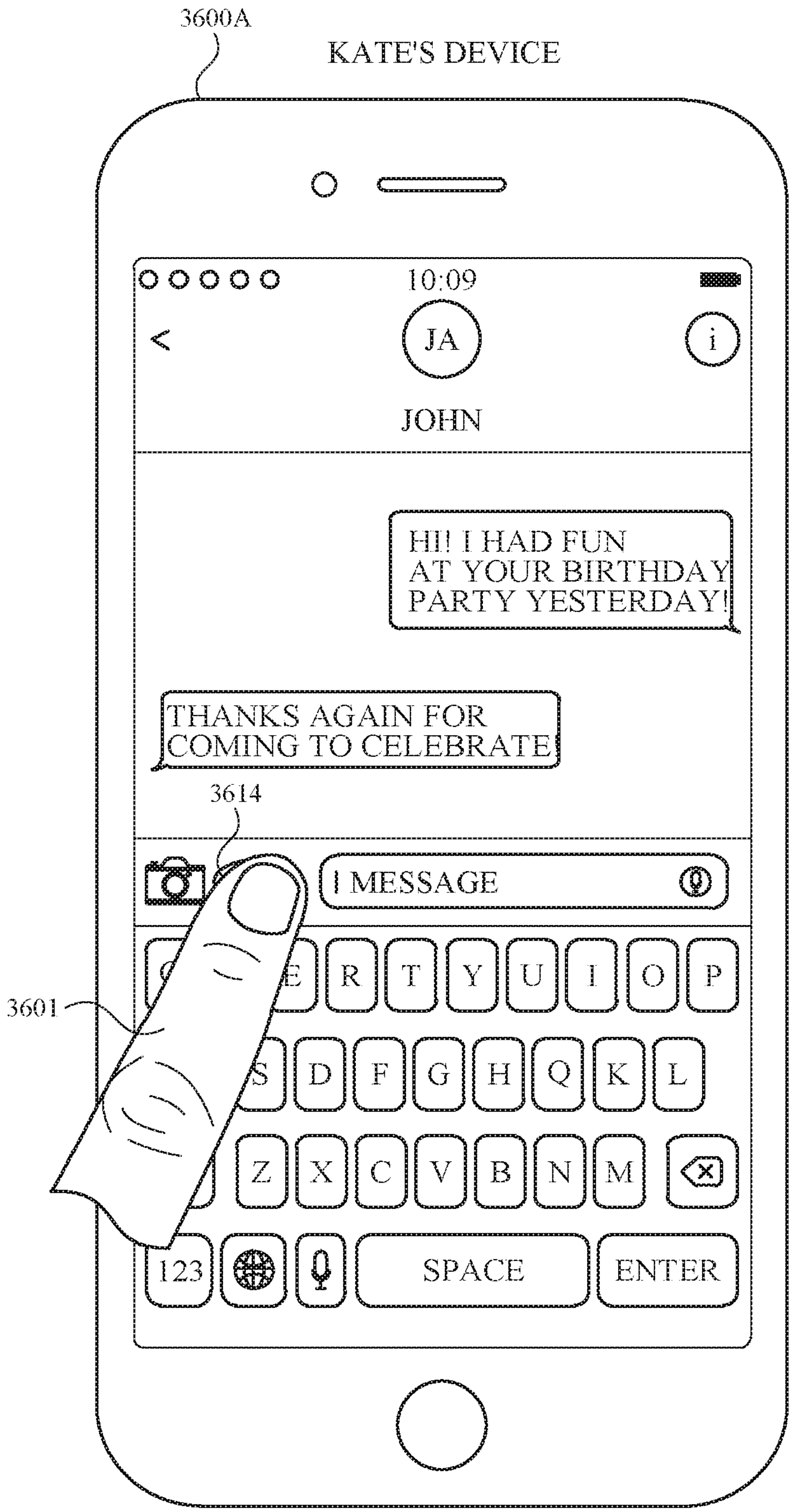
Figure 36C:
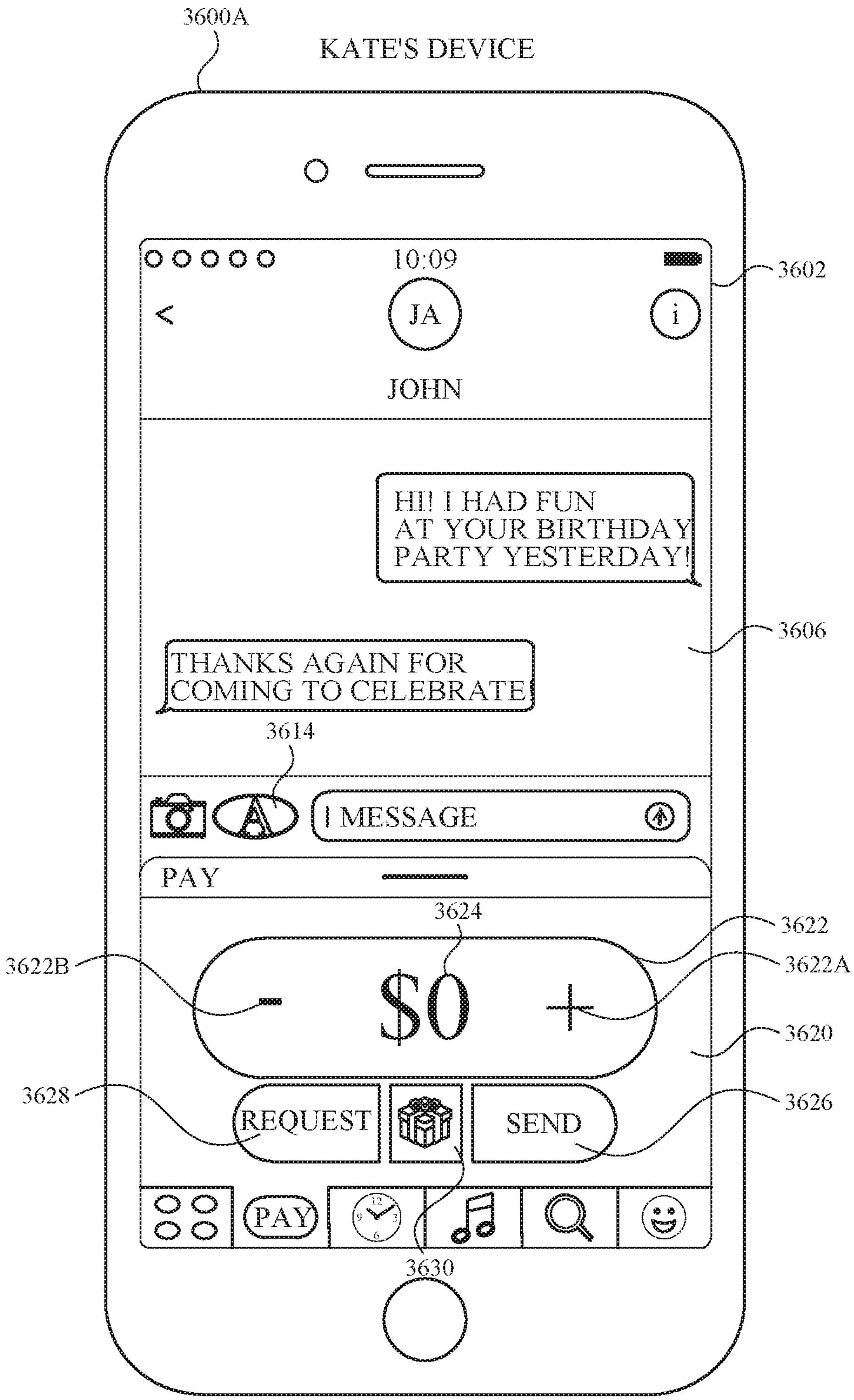

In some embodiments, electronic device 3600A also displays an application button 3614 (e.g., adjacent to compose bar 3612). In FIG. 36B, electronic device 3600A detects (e.g., via a touchscreen of display 3602) a user selection 3601 (e.g., a tap gesture) of application button 3614. In FIG. 36C, in response to detecting user selection 3601 of application button 3614, electronic device 3600A displays, on display 3602, a payment transfer user interface 3620 (e.g., similar to payment transfer user interface 840 described with reference to FIGS. 8A-8AH).

As shown in FIG. 36C, in some embodiments, payment transfer user interface 3620 includes a value change region 3622 (e.g., corresponding to value change region 846 of payment transfer user interface 840) that includes an indication 3624 of the transfer amount (e.g., showing "$0"). As with value change region 846, value change region 3622 includes a value increase button 3622A (e.g., indicated as a "+," corresponding to value increase button 850 of payment transfer user interface 840) for increasing the displayed payment amount within indication 3624 and a value decrease button 3622B (e.g., indicated as a "−," corresponding to value decrease button 852 of payment transfer user interface 840) for decreasing the displayed payment amount within indication 3624. As also shown in FIG. 36C, payment transfer user interface 3620 includes a send button 3626 (e.g., similar to send button 847 of payment transfer user interface 840) for initiating a payment transfer to a different user (e.g., message participant 3608) via messaging application 3604 and a request button 3628 (e.g., similar to request button 845 of payment transfer user interface 840) for initiating a request for a payment from a different user (e.g., message participant 3608) via messaging application 3604.

In some embodiments, payment transfer user interface 3620 further includes a gift button 3630. In some embodiments, gift button 3630 is used to initiate a payment transfer to another message participant of a message conversation (e.g., to message participant 3608 of message conversation 3606) via messaging application 3604 as a gift. In some embodiments, gift button 3630 is used to select a graphical animation (e.g., an envelope animation, a gift box animation) applied to a gift payment object sent via messaging application 3604.

Figure 36D:
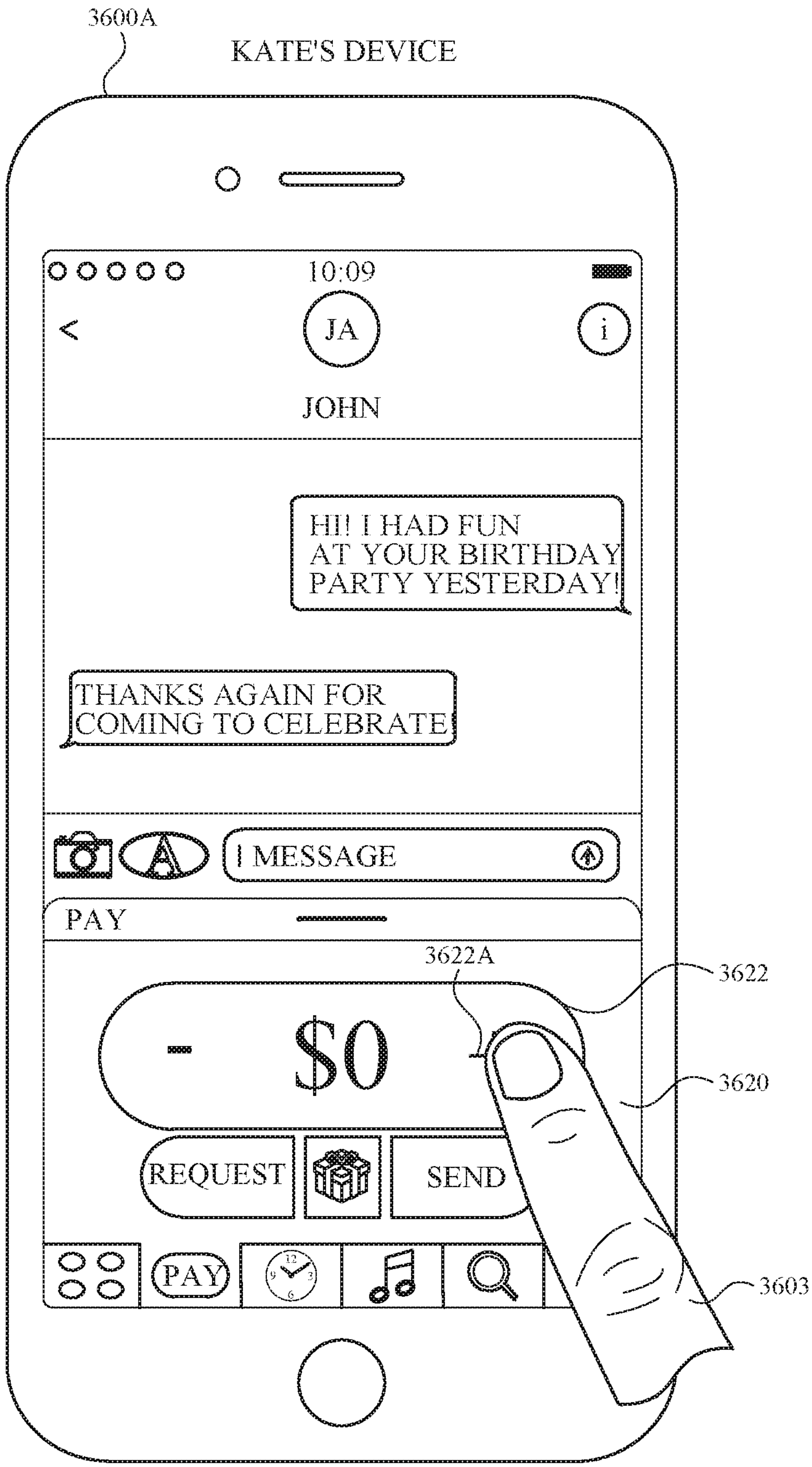
Figure 36E:

In FIG. 36D, while displaying payment transfer user interface 3620, electronic device 3600A detects (e.g., via a touchscreen of display 3602) a user selection 3603 (e.g., a press and hold gesture for a certain amount of time, a hard press gesture for a certain amount of time, one or more swipe gestures) of value increase button 3622A of value change region 3622 to increase the currently-selected payment amount (e.g., to $50) to an amount desired to be sent by the user. For example, in FIG. 36E, in accordance with user selection 3603, the currently-selected payment amount is set to be "$50," as shown by indication 3624.

Figure 36F:
Figure 36G:

In FIG. 36F, subsequent to detecting user selection 3603 setting a payment amount (e.g., $50), and while displaying payment transfer user interface 3620, electronic device 3600A detects (e.g., via touchscreen of display 3602) a user selection 3605 (e.g., a tap gesture) on gift button 3630. In some embodiments, user selection 3605 of gift button 3630 activates a gift mode. In some embodiments, as shown in FIG. 36G, in response to detecting user selection 3605 on gift button 3630, electronic device 3600A applies a highlight 3631 indicating (to the user) that the gift button has been selected, and thus that the gift mode has been activated (e.g., a highlighting of the gift button in a specific color, a shading of the gift button, a thickening of the border of the gift button).

Figure 36H:
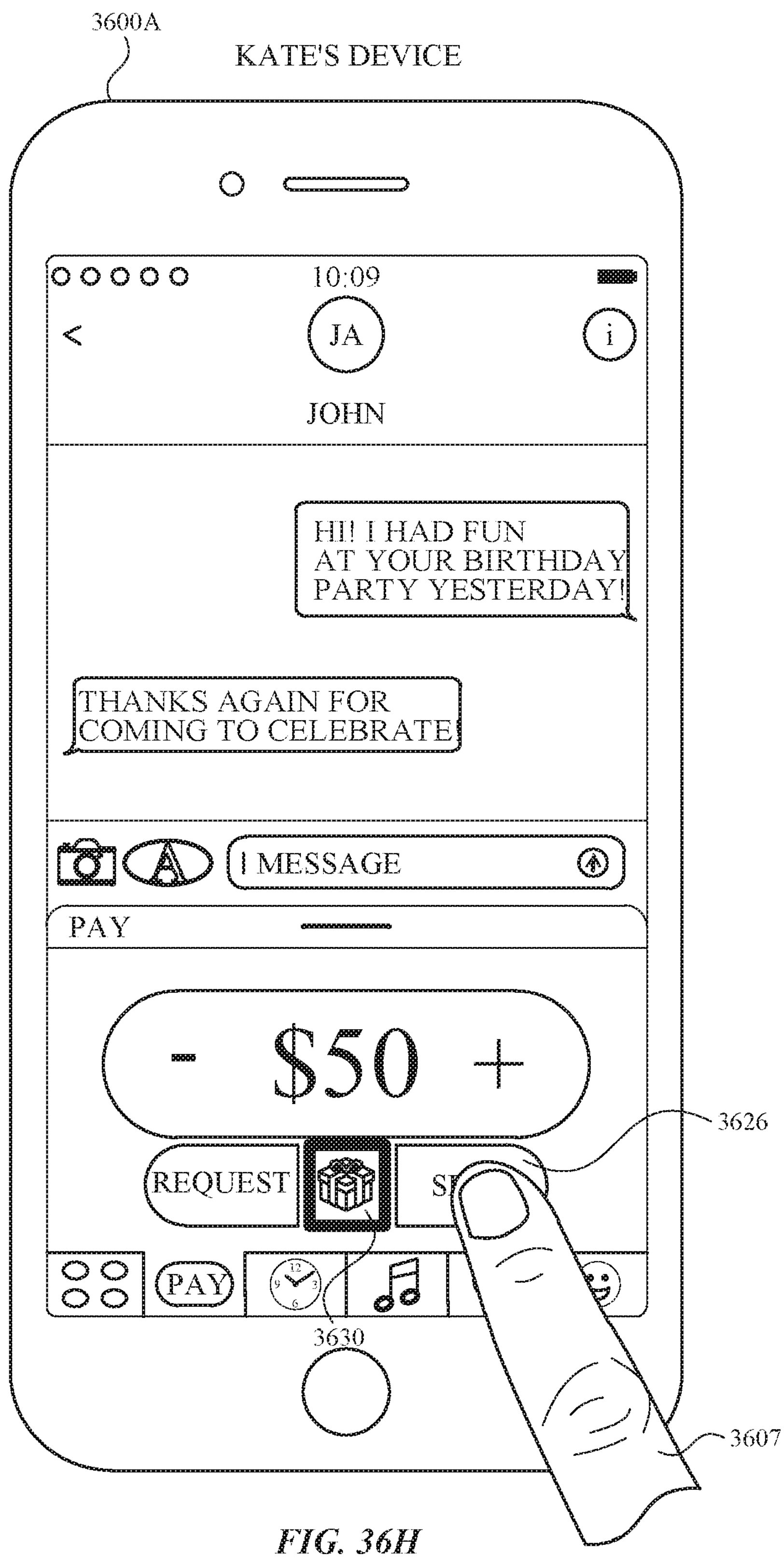

In FIG. 36H, while the gift mode is activated (e.g. as indicated by highlight 3631 of gift button 3630), electronic device 3600A detects (e.g., via the touchscreen of display 3602) a user selection 3607 (e.g., a tap gesture) of send button 3626.

Figure 36I:
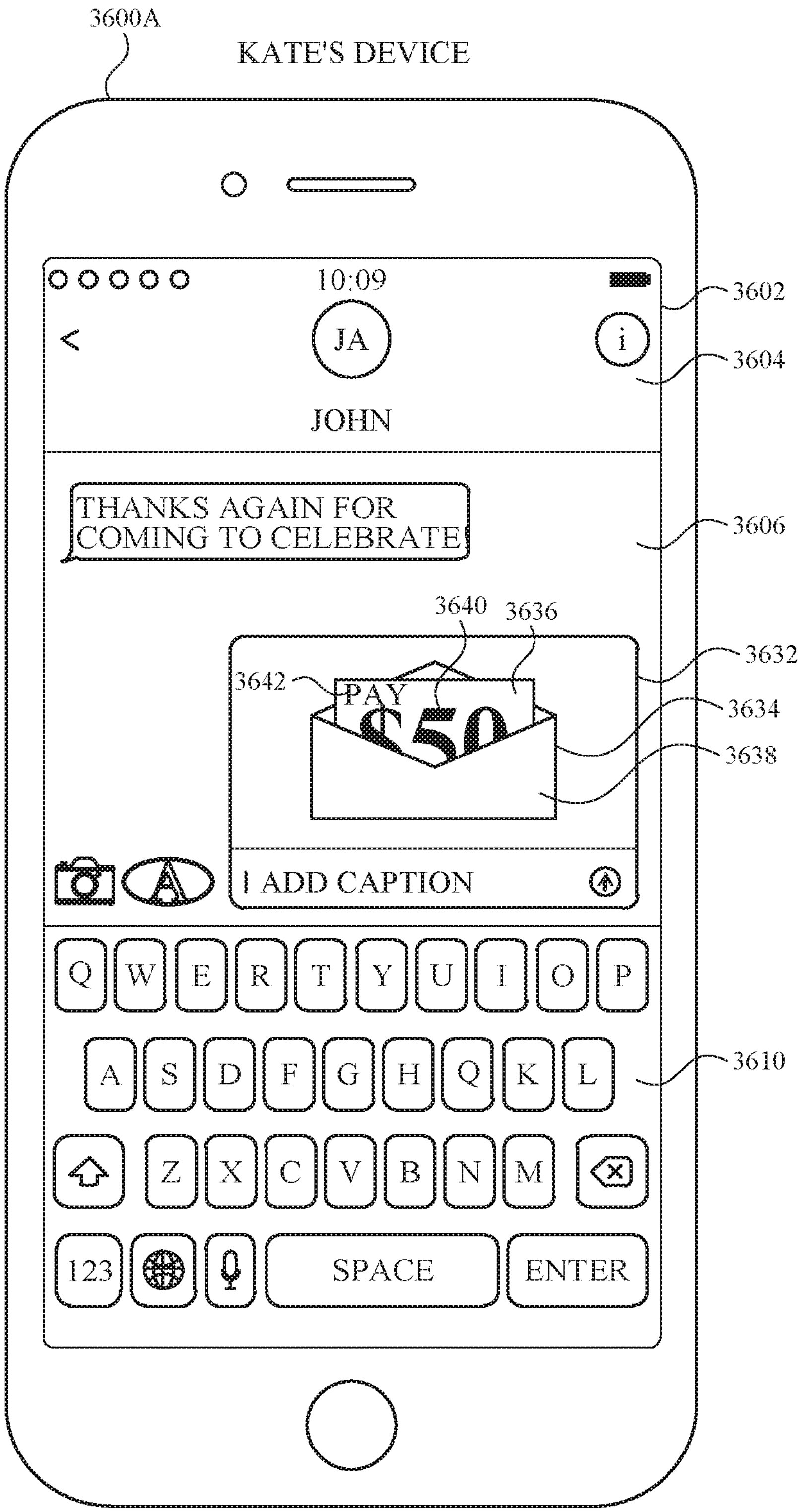

In FIG. 36I, in response to detecting user selection 3607 of send button 3626 while the gift mode is activated, electronic device 3600A displays (e.g., over a portion of message conversation 3606) an expanded compose region 3632 (e.g., similar to expanded compose bar 872 described with reference to FIG. 8Q) for displaying a draft payment message object (e.g., a message object related to a payment, such as payment message object 866 described with reference to FIGS. 8Q-8W) that has not yet been transmitted to the recipient (e.g., message participant 3608, John). In some embodiments, electronic device 3600A further replaces display of payment transfer user interface 3620 with display of virtual keyboard 3610.

Electronic device 3600A further displays, within expanded compose region 3632, a gift message object 3634 that comprises a content object 3636 and a concealment object 3638. In some examples, as shown in FIG. 36I, gift message object 3634 corresponds to a graphical animation of an envelope and a letter, where the content element corresponds to the letter and the concealment element corresponds to the envelope. In some examples, the gift message object corresponds to a graphical animation of a gift item enclosed within a gift box, where the content element corresponds to the gift item and the concealment object corresponds to the gift box.

As also illustrated in FIG. 36I, content element 3636 (which, in the example user interfaces shown in FIG. 36I is represented as a letter) includes an amount indication 3640 of the payment transfer amount (e.g., "$50"), which corresponds to the payment transfer amount selected by the user via payment transfer user interface 3620 (as described above with reference to FIGS. 36E-36F) and a mode indication 3642 (e.g., stating "PAY," corresponding to mode indication 870 described with reference to FIGS. 8A-8AH) indicating that the gift message object is controlled by an operating system-controlled payment transfer application (and not by a third-party application). In some embodiments, when displayed within expanded compose region 3632 (and thus not yet transmitted to the intended recipient(s)), amount indication 3640 of the payment transfer amount is not displayed with a dynamic visual feedback (e.g., a depth effect and/or a coloring effect as described with reference to FIGS. 33A-33O, a 3D effect as described with reference to FIGS. 11A-11V). In some embodiments, in addition to, or instead of, generating the dynamic visual feedback, the device generates a dynamic haptic feedback (e.g., similar to the generated tactile output 3336 described with reference to, for example, FIGS. 33F-33H). In some embodiments, the generated feedback (e.g., visual feedback, haptic feedback) is caused (e.g., only) by an operating system program of the device and non-operating system programs of the device are not enabled to cause the feedback. As also illustrated in FIG. 36I, in some embodiments, content element 3636 is partially hidden (e.g., concealed) by concealment element 3638 (which, in the non-limiting example depicted in FIG. 36I corresponds to an envelope) when displayed within expanded compose region 3632.

Figure 36J:
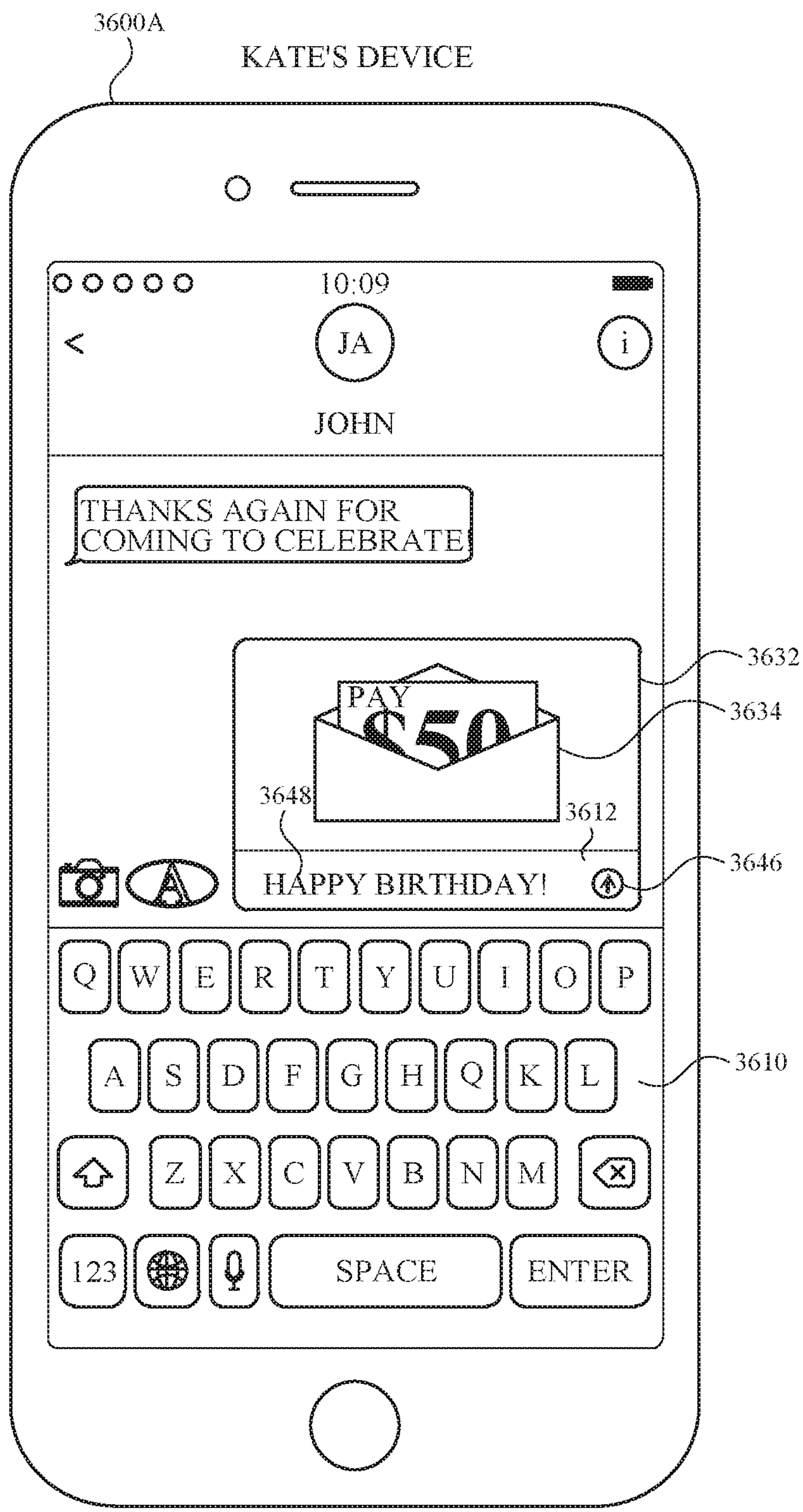

In some embodiments, while displaying gift message object 3634 within expanded compose region 3632, electronic device 3600A receives (e.g., via virtual keyboard 3610, via a mic) user input of a comment 3648 associated with the gift message object. For example, in the example user interface depicted in FIG. 36J, the inputted comment 3648 states "Happy Birthday!" As shown in FIG. 36J, comment 3648 is displayed within compose region 3612, which further includes a send button 3646 for transmitting the message object (e.g., gift message object 3634) and the associated comment (e.g., comment 3648) to the intended recipient(s) (e.g., message participant 3608).

Figure 36K:
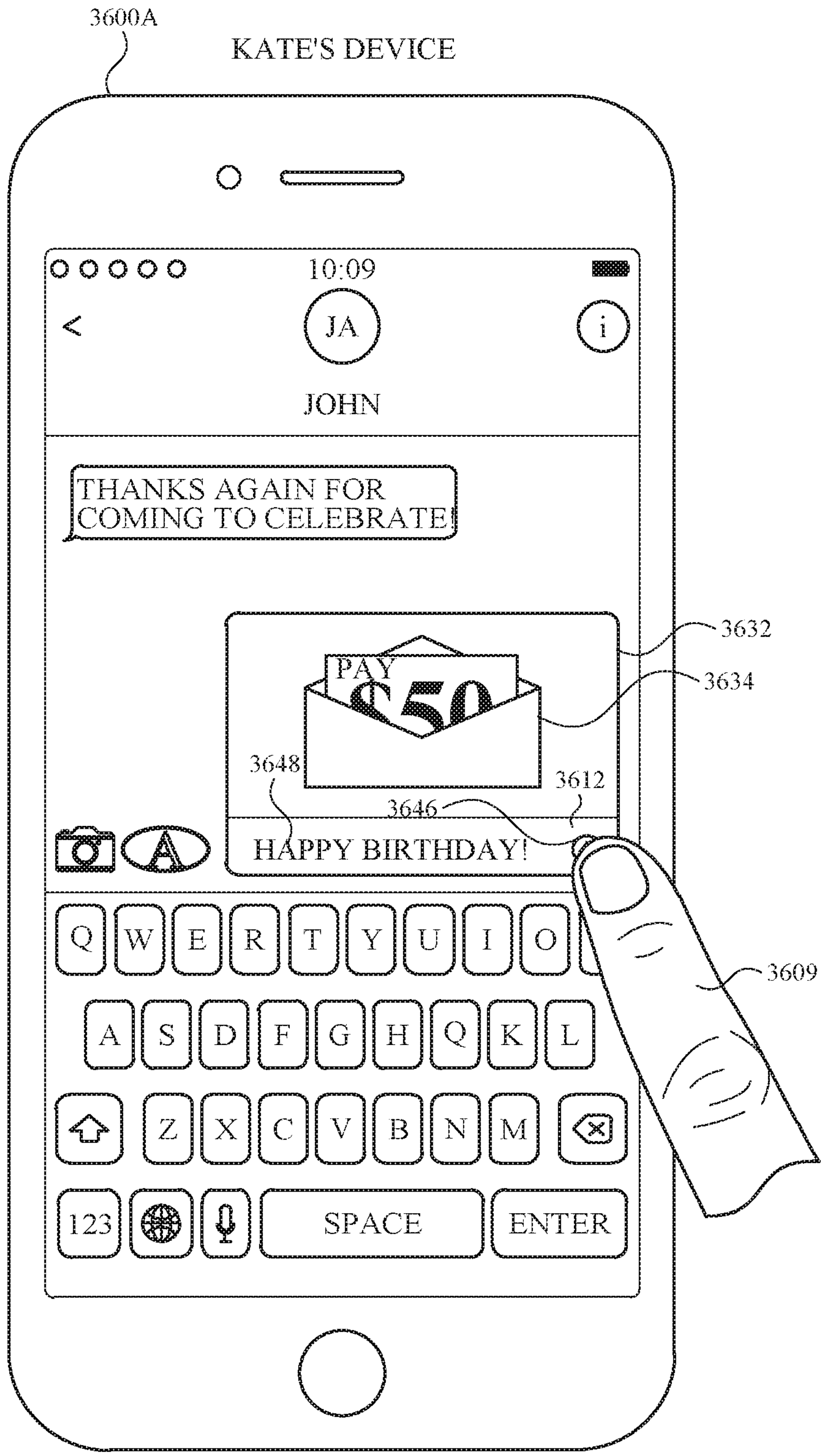
Figure 36L:
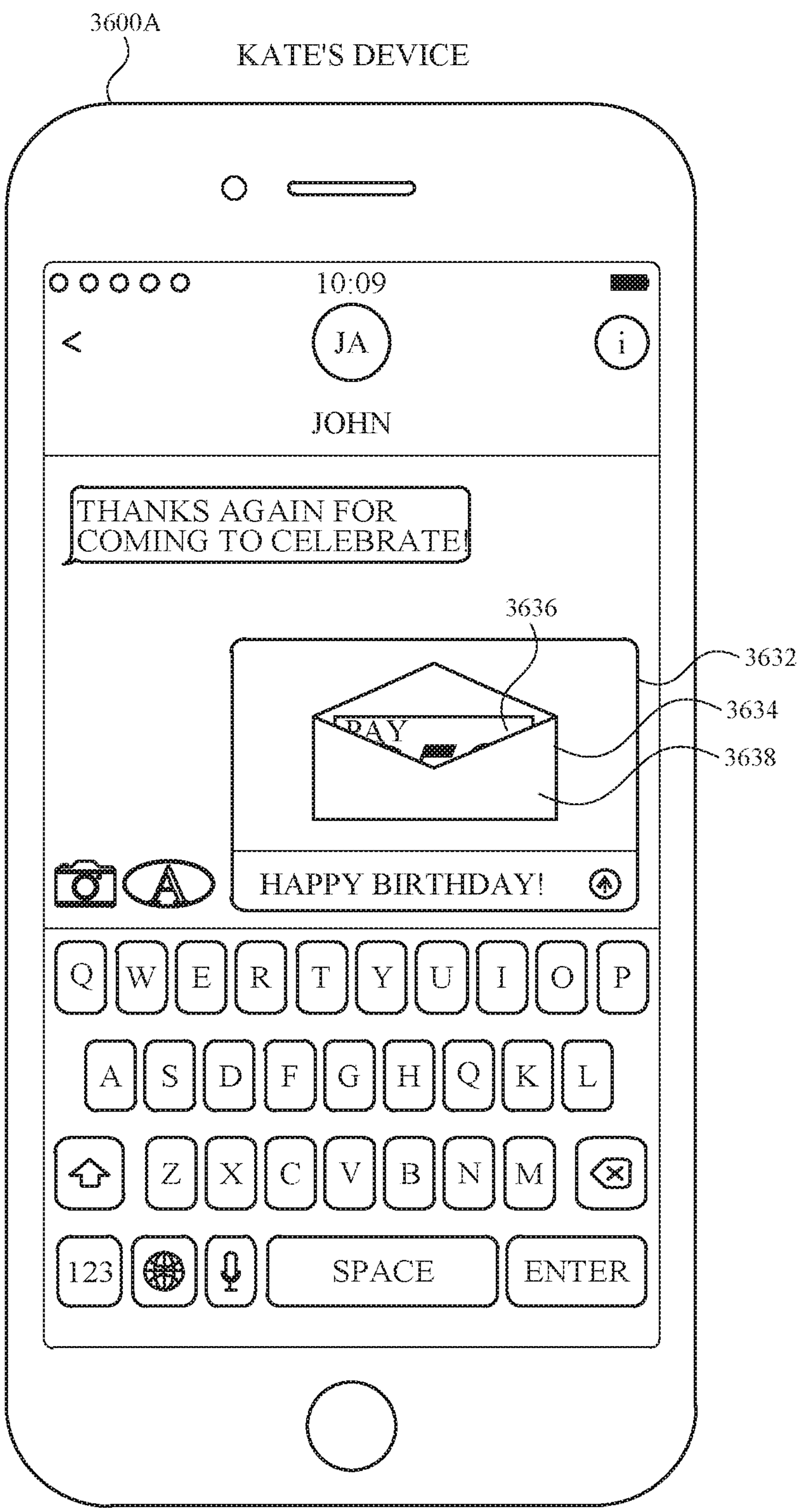
Figure 36M:
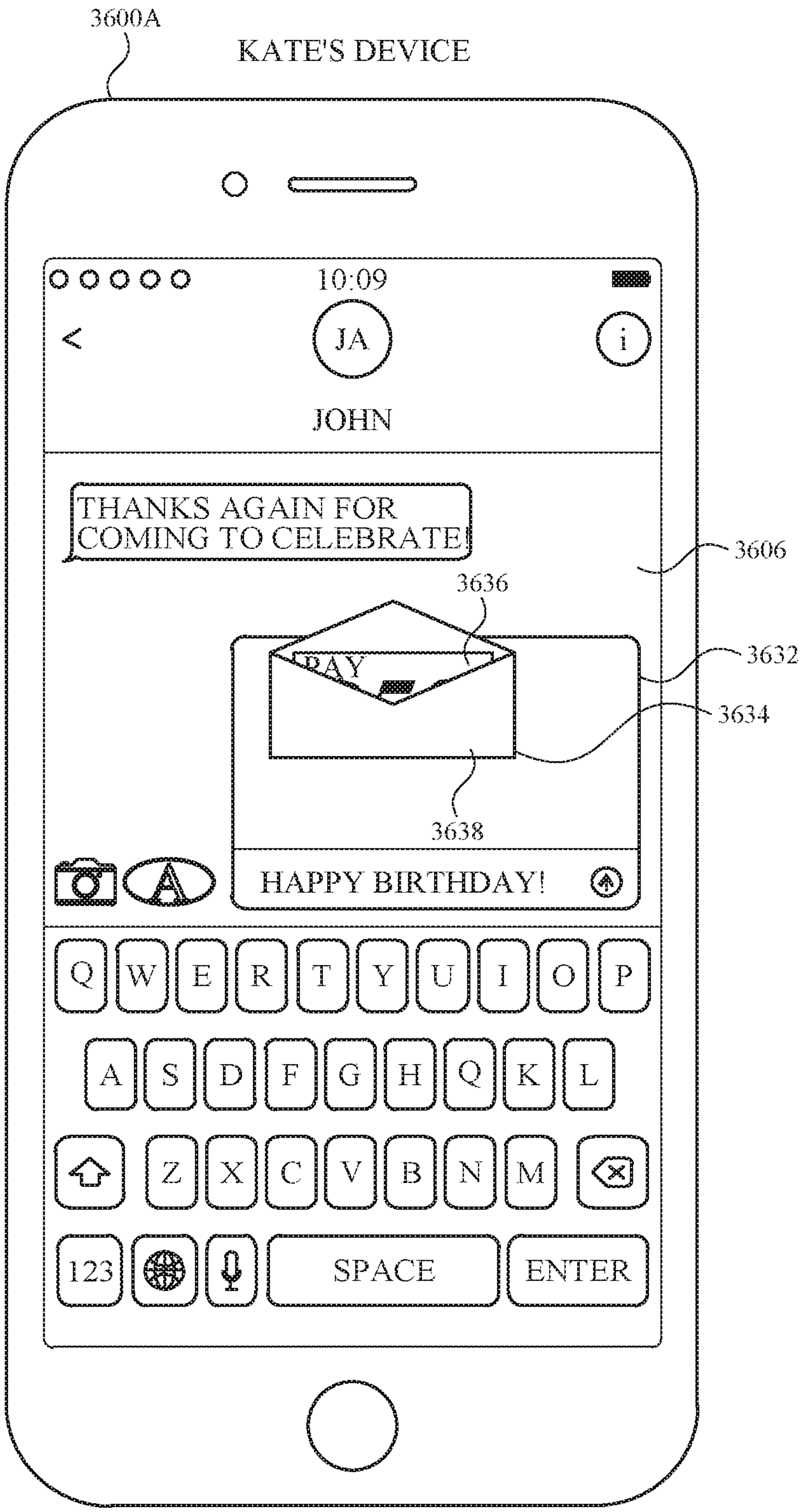
Figure 36N:
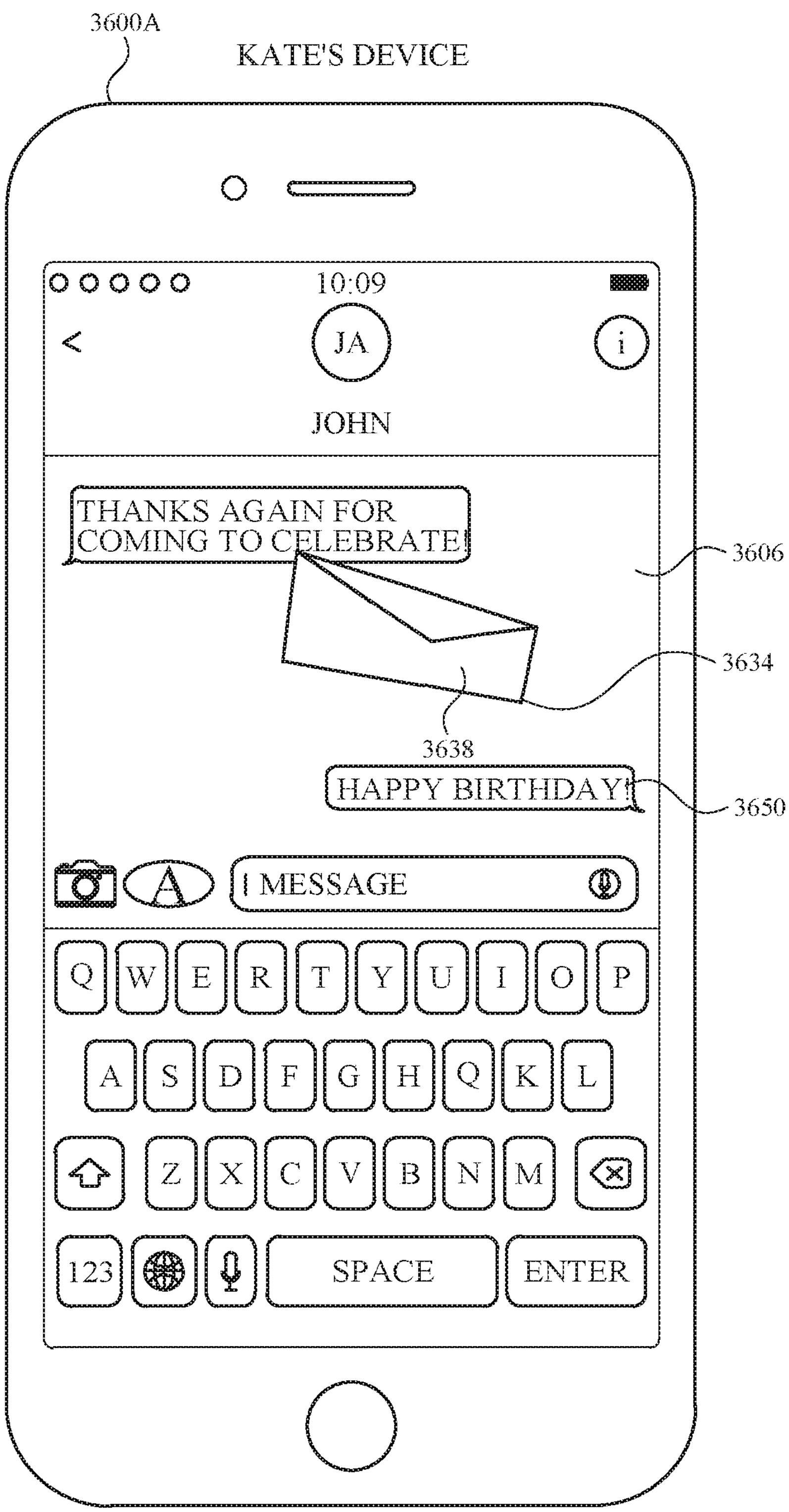
Figure 36O:
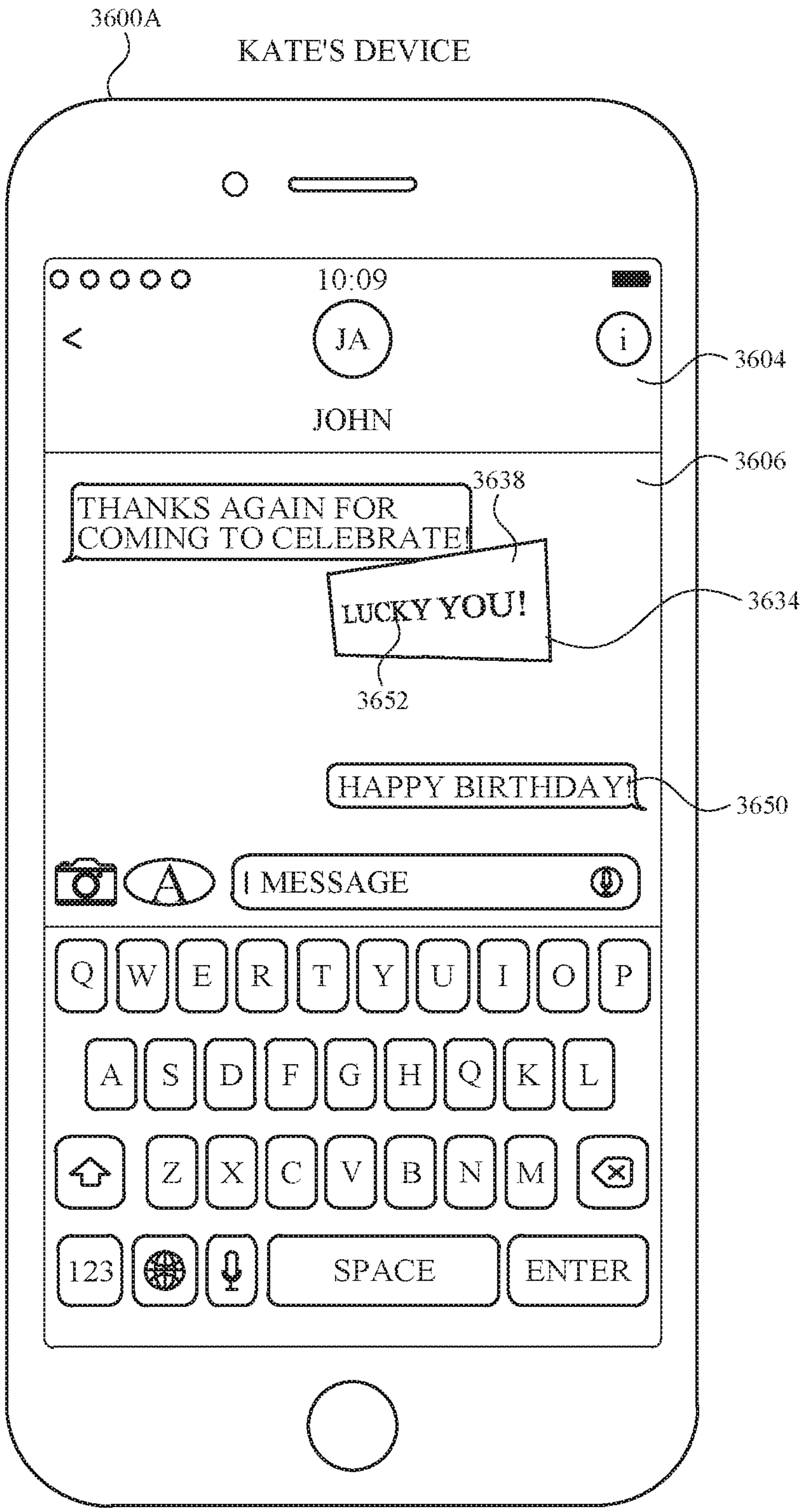

In FIG. 36K, while displaying gift message object 3634 within expanded compose region 3632 and comment 3648 within compose region 3612, electronic device 3600A detects (e.g., via a touchscreen of display 3602) a user selection 3609 (e.g., a tap gesture) of send button 3646. In response to detecting user selection 3609, electronic device 3600A transmits a communication corresponding to gift payment message object 3634 to message participant 3608 (the recipient, John).

FIGS. 36L-36P illustrate a graphical animation of gift message object 3634 being moved from expanded compose region 3632 to message conversation 3606 in response to user selection 3609 of send button 3646 (thus indicating that the gift payment associated with the gift payment object has been delivered to message participant 3608). In some embodiments, as shown by the sequence from FIG. 36L through to FIG. 36P, the graphical animation involves content element 3636 being enclosed by concealment element 3638 and, as content element 3636 is being enclosed by concealment element 3638, gift message object 3634 being lifted from expanded compose region 3632, flipping (e.g., rotated) from a front view of the message object (e.g., the opening side of concealment element 3638) to a back view of the message object (e.g., the back side of concealment element 3638), and landing within message conversation 3608 being fully closed (thus completely concealing content element 3636 within concealment element 3638. Further, as also shown in FIGS. 36L-36P, in response to user selection 3609 of send button 3646, a message object 3650 (e.g., showing "Happy Birthday!") corresponding to comment 3648 is displayed in message conversation 3606 (e.g., below gift message object 3634).

Figure 36P:
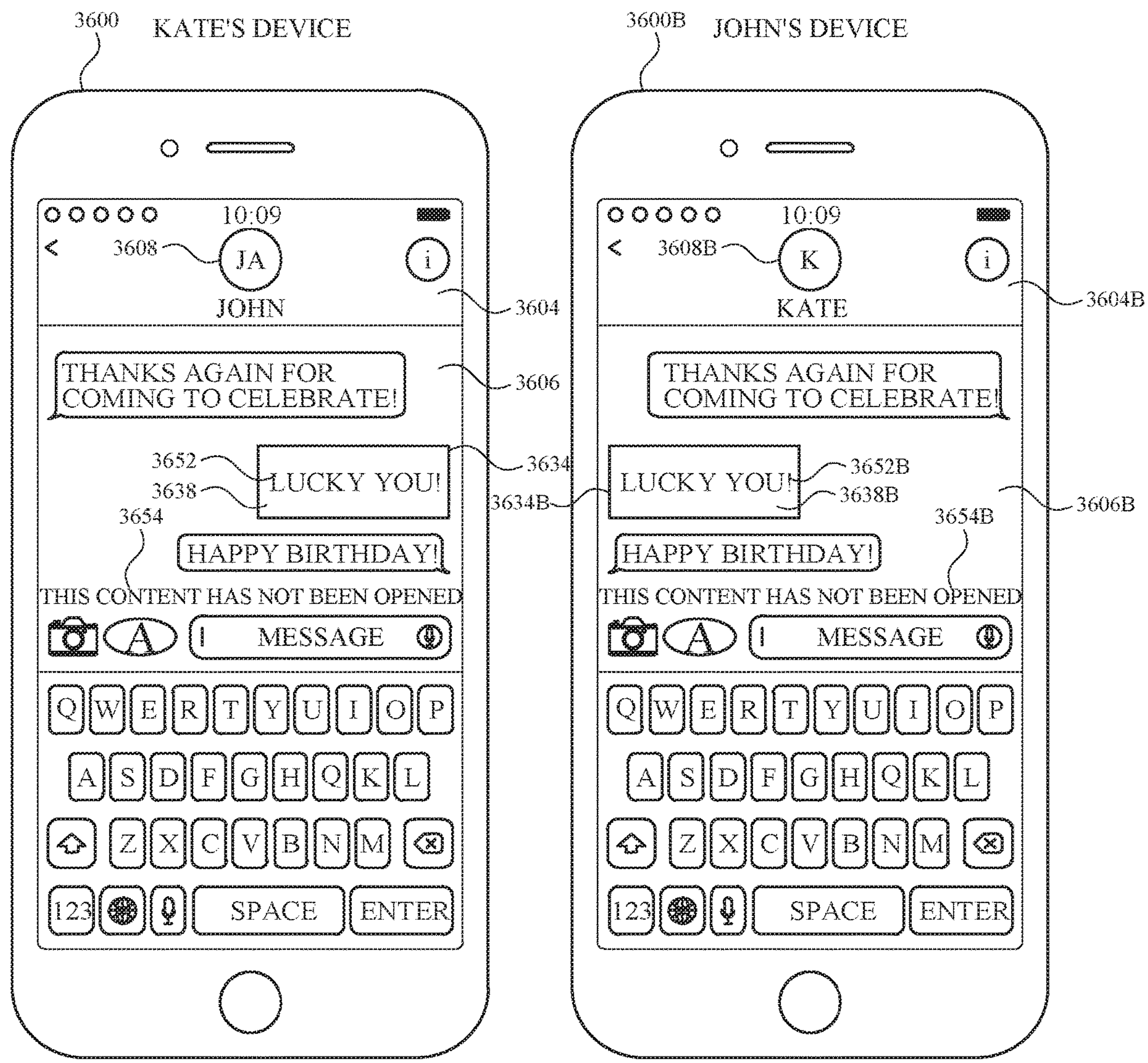

FIG. 36P illustrates electronic device 3600A (belonging to the user Kate) and electronic device 3600B (belonging to message participant 3608, John). Solely for the ease of description, electronic device 3600A is referred to as Kate's Device and electronic device 3600B is referred to as John's Device.

In FIG. 36P, electronic device 3600A (Kate's Device) displays, in message conversation 3606, gift message object 3634 and message object 3650 after the payment transfer corresponding to the gift message object has been transmitted to message participant 3608 (John). In some embodiments, as shown by Kate's Device in FIG. 36P, once transmitted, gift message object 3634 is shown from a different view (e.g., the back side of concealment object 3638, if the concealment object is an envelope). In some embodiments, as also shown by Kate's Device in FIG. 36P, once transmitted, gift message object 3634 further shows a message 3652 on concealment object 3638 indicating that the gift message object corresponds to a gift payment (as opposed to a regular payment). For example, in the non-limiting example illustrated in FIG. 36P, message 3652 states "Lucky You!" In some embodiments, message 3652 associated with concealment object 3638 is fixed with the concealment element and thus cannot be modified or changed by the user. In some embodiments, message 3652 associated with concealment object can be inputted (e.g., using virtual keyboard 3610) by the user prior to transmitting the gift payment. In some embodiments, electronic device 3600A further displays a status message 3652 (e.g., stating "This Content Has Not Been Opened") indicating whether or not the payment associated with gift message object 3634 has been accepted (or has been viewed) by the intended recipient(s) (e.g., message participant 3608, John).

In FIG. 36P, electronic device 3600B (John's Device), upon receiving the communication corresponding to the gift transfer from Kate's Device, John's Device displays, within a message conversation 3606B (corresponding to message conversation 3606 on Kate's Device) of a messaging application 3604B (corresponding to messaging application 3604 on Kate's Device), a received gift message object 3634B corresponding to sent gift message object 3634. As with sent gift message object 3634 on Kate's Device, received gift message object 3634B on John's Device includes a message 3652B (e.g., stating "Lucky You!") indicating that the gift message object corresponds to a gift transfer on concealment object 3638B. Further, John's Device also displays a status message 3654B (e.g., stating "This Content Has Not Been Opened") indicating whether or not the payment associated with gift message object 3654B has been accepted (or has been viewed) by the recipient (e.g., message participant 3608, John).

Figure 36Q:
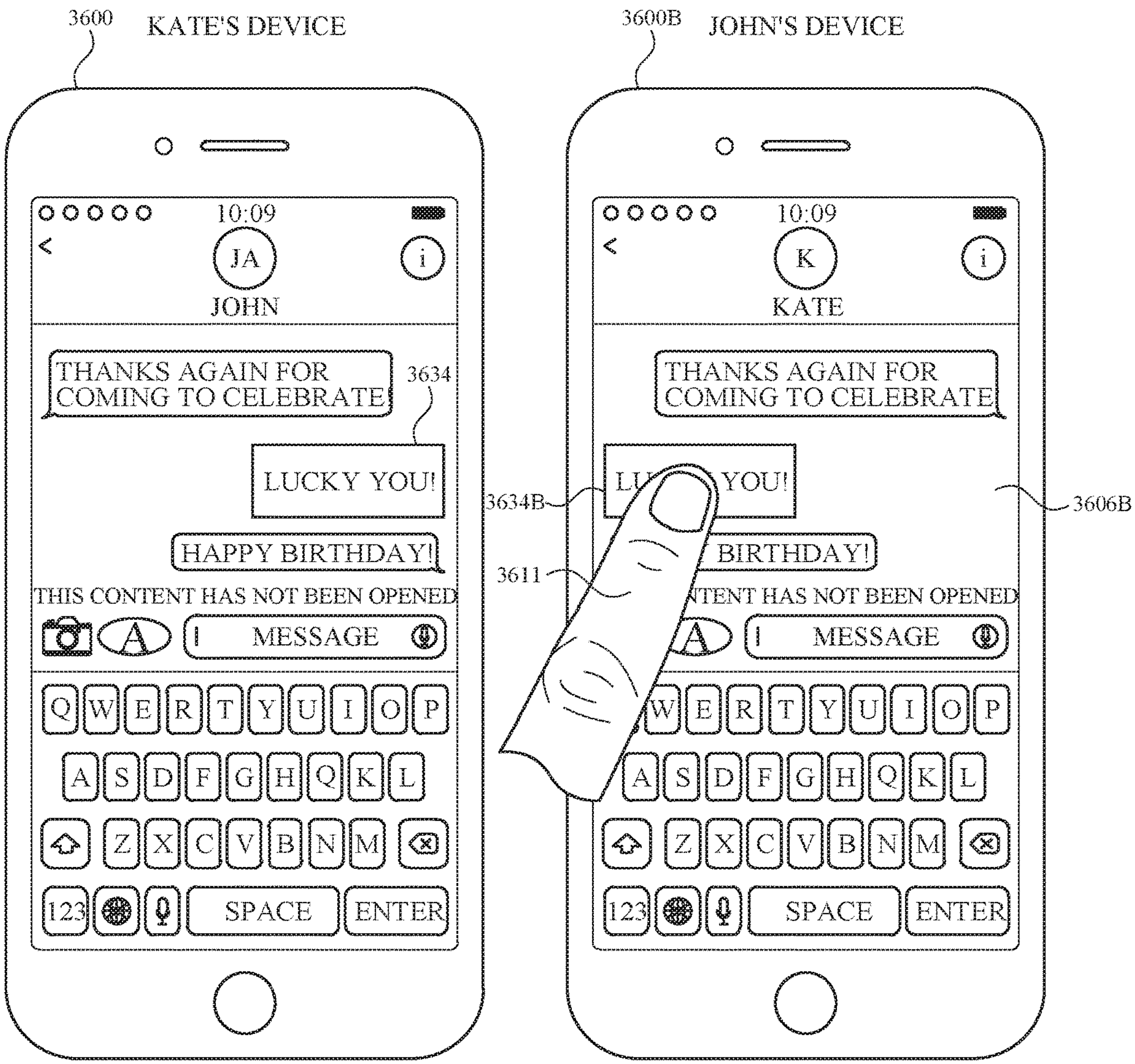

FIG. 36Q again illustrates electronic device 3600A (Kate's Device) displaying gift message object 3634 in message conversation 3606 (between Kate and John) and electronic device 3600B (John's Device) displaying gift message object 3634B in message conversation 3606B (between Kate and John). As shown by John's Device in FIG. 36Q, while displaying gift message object 3634B in message conversation 3606B, John's Device detects a user selection 3611 (e.g., a tap gesture) of gift message object 3634B.

Figure 36R:
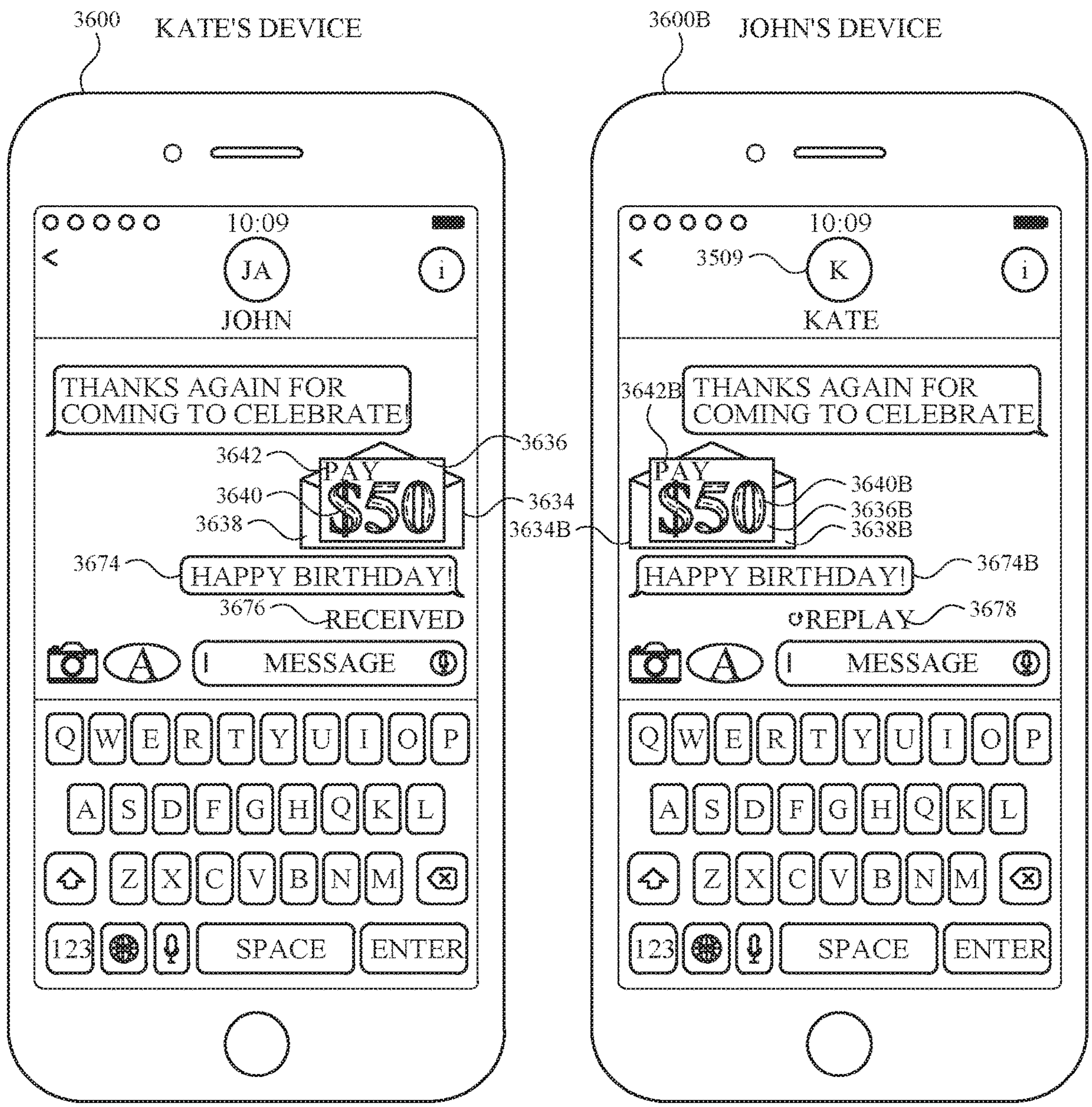

As shown by FIG. 36R, in response to (or subsequent to) detecting user selection 3611 on gift message object 3634B at John's Device, John's Device (electronic device 3600B) and Kate's Device (electronic device 3600A) opens gift message object 3634B and gift message object 3634, respectively. At John's Device, once the gift message object has been opened, John's Device displays (e.g., reveals using a graphical animation of concealment object 3638B opening) content object 3636B of gift message object 3634B. As shown in FIG. 36R, content object 3636B still includes mode indication 3642 (e.g., stating "PAY") and amount indication 3640B of the payment transfer amount (e.g., showing "$50"). In some embodiments, amount indication 3640B is displayed with a dynamic visual feedback (e.g., a depth effect and/or a coloring effect as described with reference to FIGS. 33A-33O, a 3D effect as described with reference to FIGS. 11A-11V). In some embodiments, in addition to, or instead of, generating the dynamic visual feedback, the device generates a dynamic haptic feedback (e.g., similar to the generated tactile output 3336 described with reference to, for example, FIGS. 33F-33H). In some embodiments, the generated feedback (e.g., visual feedback, haptic feedback) is caused (e.g., only) by an operating system program of John's Device and non-operating system programs of the device are not enabled to cause the feedback.

In some embodiments, further in response to detecting user selection 3611, funds corresponding to gift message object 3634B (e.g., of $50) is automatically transferred from a personal payment account of Kate to a personal payment account of John. In some embodiments, electronic device 3600B requires authentication (e.g., passcode/password authentication, biometric authentication, such as fingerprint authentication, facial recognition authentication, iris/retina scan authentication) prior to receiving the funds associated with gift message object 3634B.

Similarly, at Kate's Device, once (or after) the gift message object has been opened by John at John's Device, Kate's Device displays (e.g., reveals using a graphical animation of concealment object 3638 opening) content object 3636 of gift message object 3634. As shown in FIG. 36R, content object 3636 still includes mode indication 3642 (e.g., stating "PAY") and amount indication 3640 of the payment transfer amount (e.g., showing "$50"). In some embodiments, amount indication 3640 is displayed with a dynamic visual feedback (e.g., a depth effect and/or a coloring effect as described with reference to FIGS. 33A-

33O, a 3D effect as described with reference to FIGS. 11A-11V). In some embodiments, in addition to, or instead of, generating the dynamic visual feedback, the device generates a dynamic haptic feedback (e.g., similar to the generated tactile output 3336 described with reference to, for example, FIGS. 33F-33H). In some embodiments, the generated feedback (e.g., visual feedback, haptic feedback) is caused (e.g., only) by an operating system program of Kat's Device and non-operating system programs of the device are not enabled to cause the feedback.

Figure 36S:
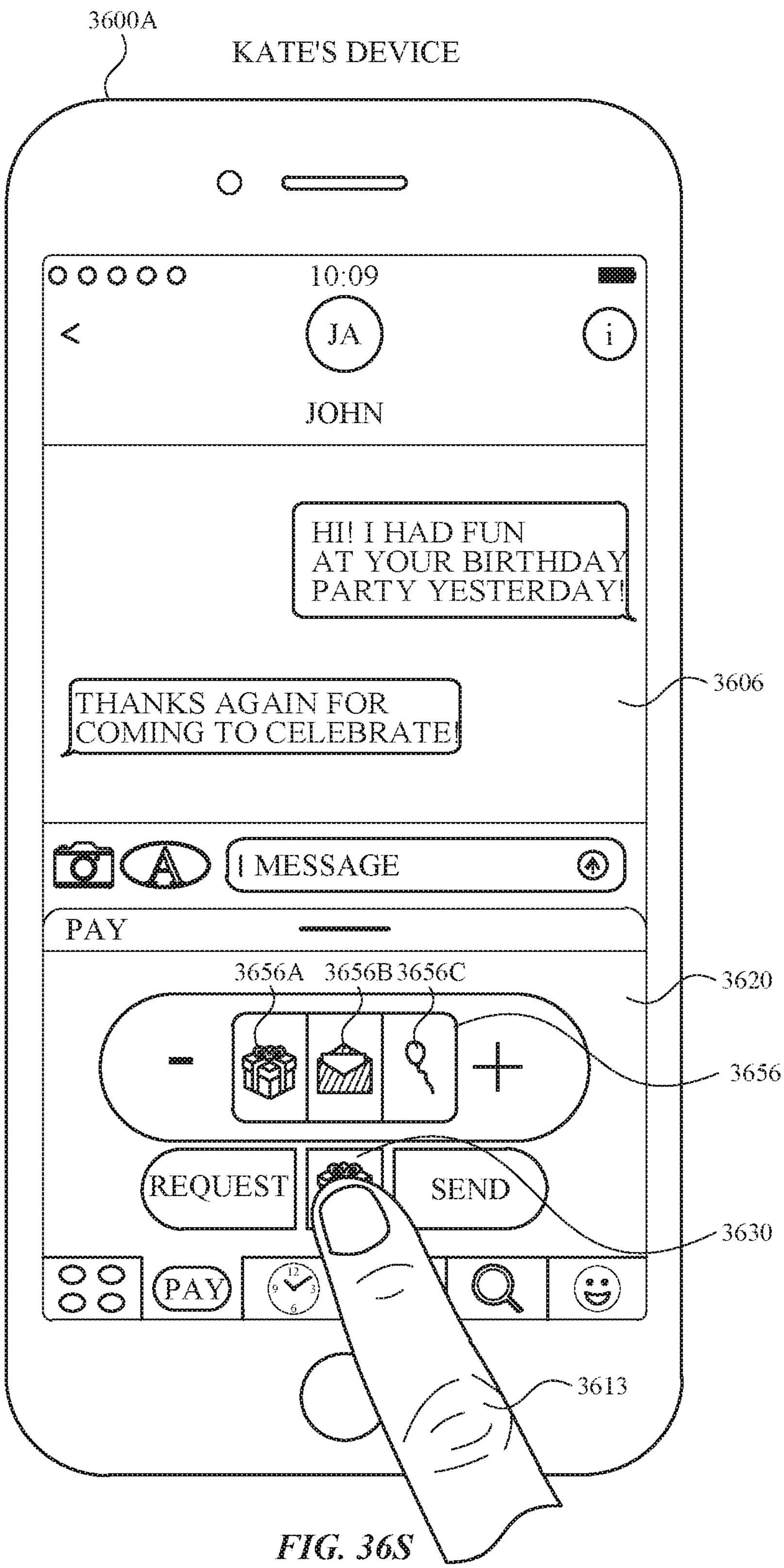

FIG. 36S illustrates electronic device 3600A (Kate's Device) displaying message conversation 3606 (corresponding to the conversation with John) and payment transfer user interface 3620. While displaying payment transfer user interface 3620, electronic device 3600A detects (e.g., via a touchscreen of display 3602) a user selection 3613 (e.g., tap gesture, a hard press gesture, a press and hold gesture) on gift button 3630. In some embodiments, as shown in FIG. 36S, in response to detecting user selection 3613 on gift button 3630, electronic device 3600A displays (e.g., over a portion of payment transfer user interface 3620) a gift animation option menu 3656 that includes a plurality of selectable graphical animations 3656A-3656C (e.g., gift box animation 3656A, envelope/letter animation 3656B, balloon animation 3656C) for use in a gift transfer.

Figure 36T:
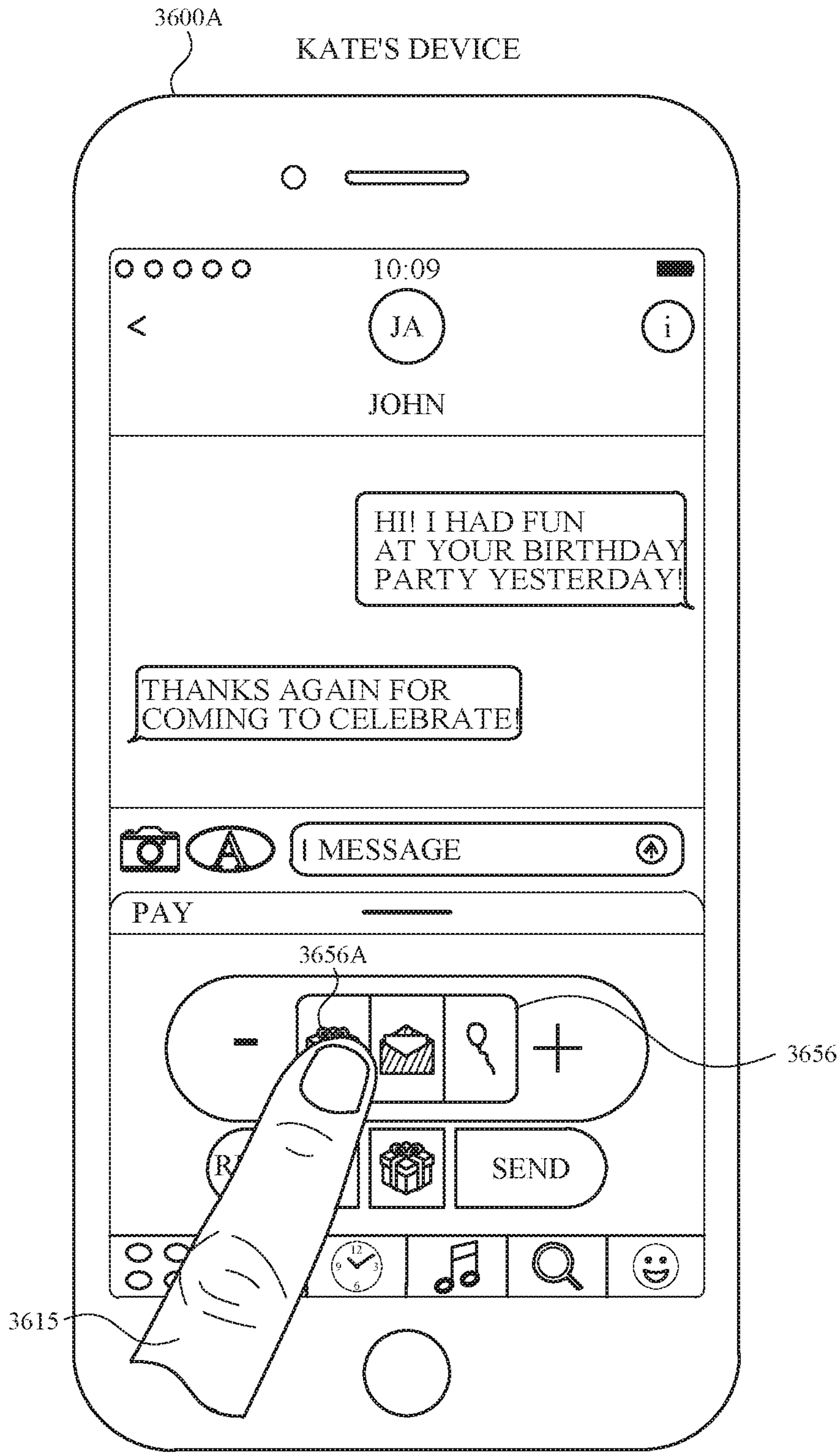
Figure 36U:

In FIG. 36T, while displaying gift animation option menu 3656, electronic device 3600A detects a user selection 3615 (e.g., a tap gesture) of graphical animation 3656A (e.g., the gift box animation). In FIG. 36U, in response to detecting user selection 3615, electronic device 3600A displays a highlight 3633 of gift button 3630 (to indicate that a different gift animation (e.g., different from a default animation), graphical animation 3656A, has been selected, and/or to indicate that the gift mode is activated).

Figure 36V:
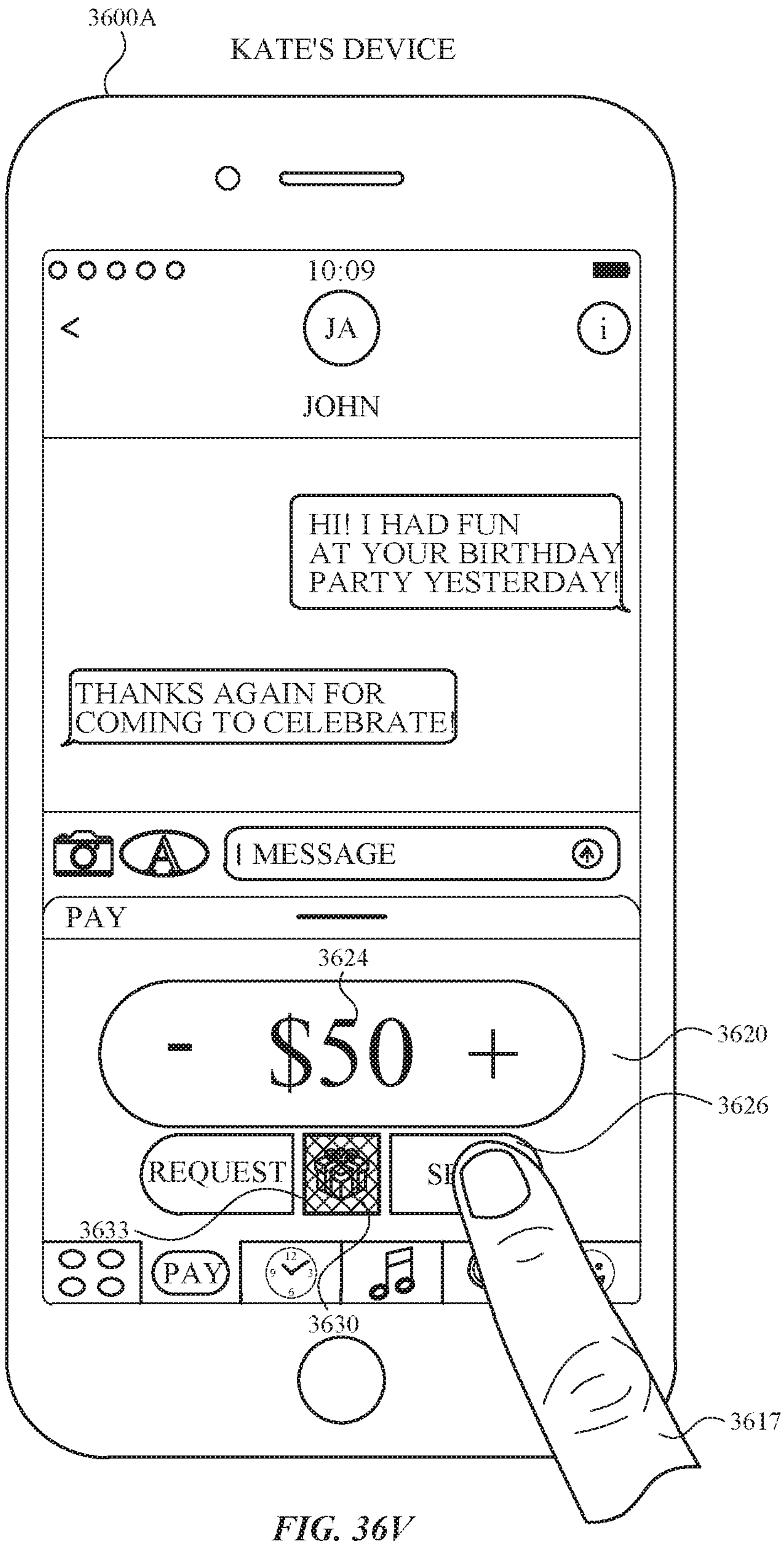
Figure 36W:
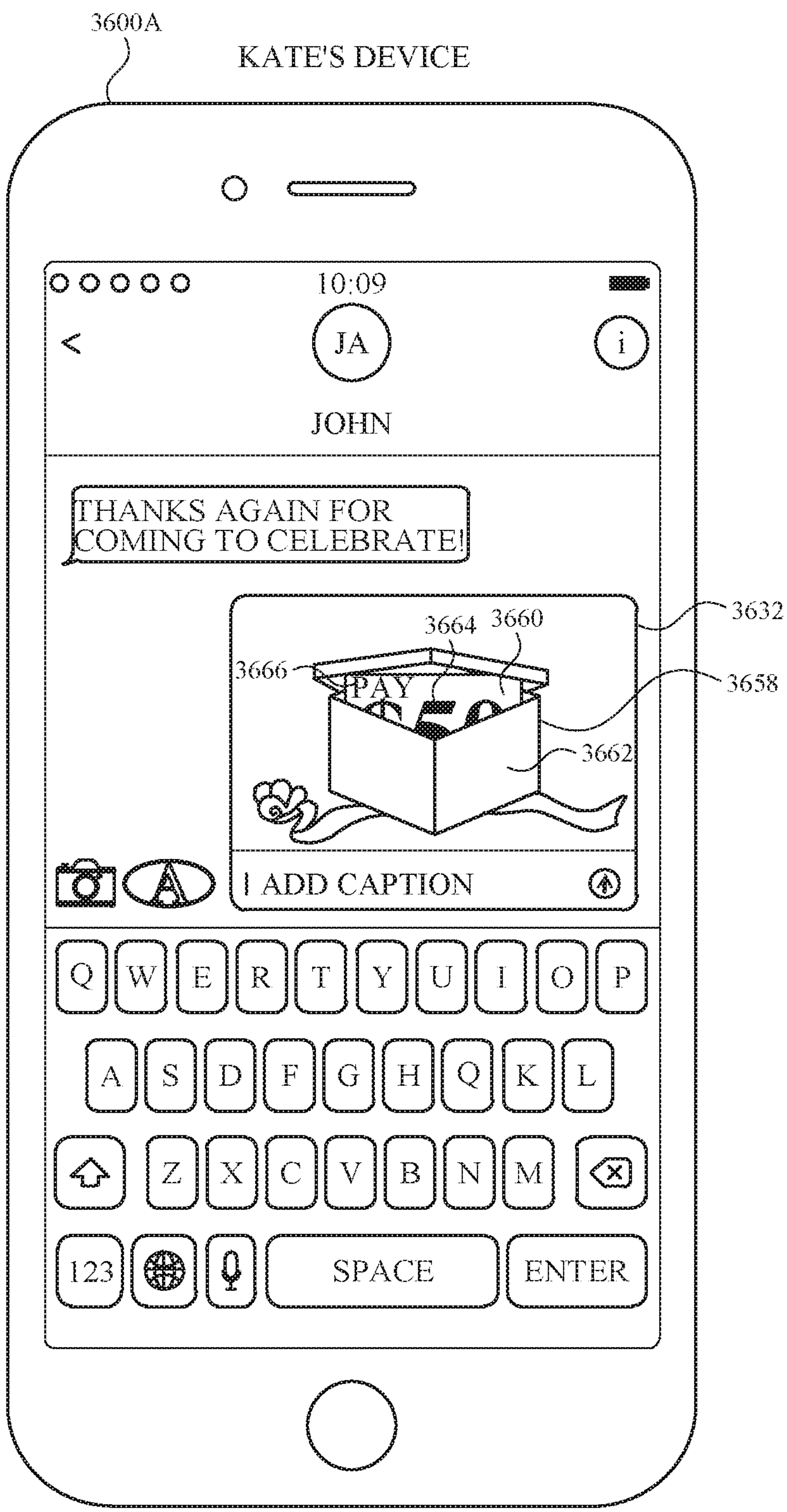

In FIG. 36V, while displaying payment transfer user interface 3620 with $50 selected for transfer (as shown by indication 2624) and with highlight 3633 of gift button 3630, electronic device 3600A detects a user selection 3617 of send button 3626. In FIG. 36W, in response to detecting user selection 3617, electronic device 3600A displays, within expanded compose region 3632, a gift message object 3658 with graphical animation 3656A (of a gift box) applied (e.g., as opposed to a graphical animation of an envelope/letter, as shown in FIG. 36I). In some embodiments, with graphical animation 3656A (e.g., a gift box), gift message object 3658 includes a concealment object 3662 (e.g., an outer box of a gift box) and a content object 3660 (e.g., an item within the gift box). As with content object 3636 of gift message object 3634, content object 3660 of gift message object 3658 includes an amount indication 3664 showing the amount of the gift transfer and a mode indication 3666 (e.g., stating "PAY") corresponding to mode indication 3642.

Figure 36X:
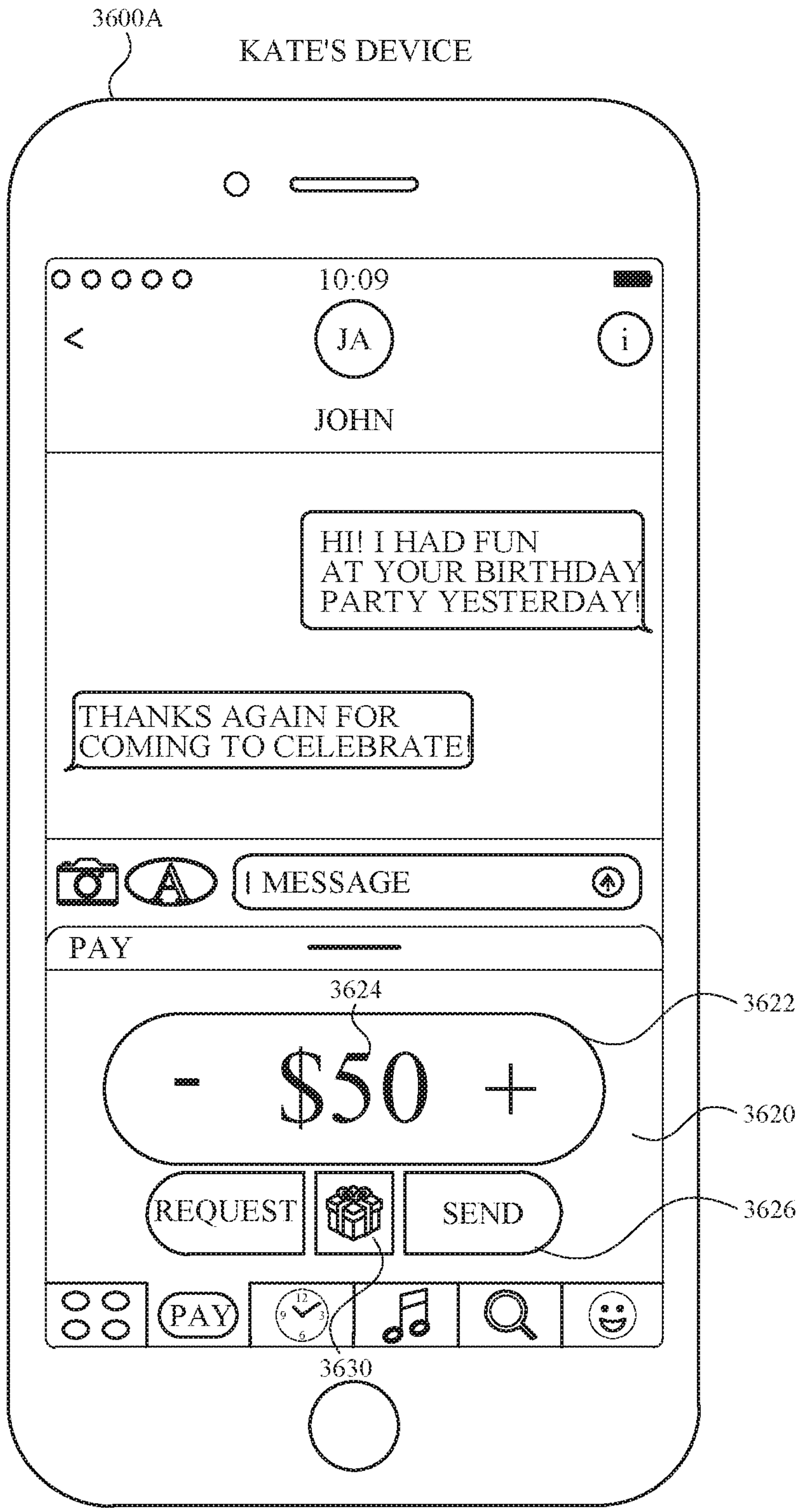

FIG. 36X illustrates electronic device 3600A displaying message conversation 3606 (with message participant 3608, John) and payment transfer user interface 3620, where the gift mode is not activated (e.g., a highlight, such as highlight 3631 or highlight 3633, is not applied to gift button 3630). $50 is currently selected for a payment transfer, as shown by indication 3624 of the transfer amount within value change region 3622.

Figure 36Y:
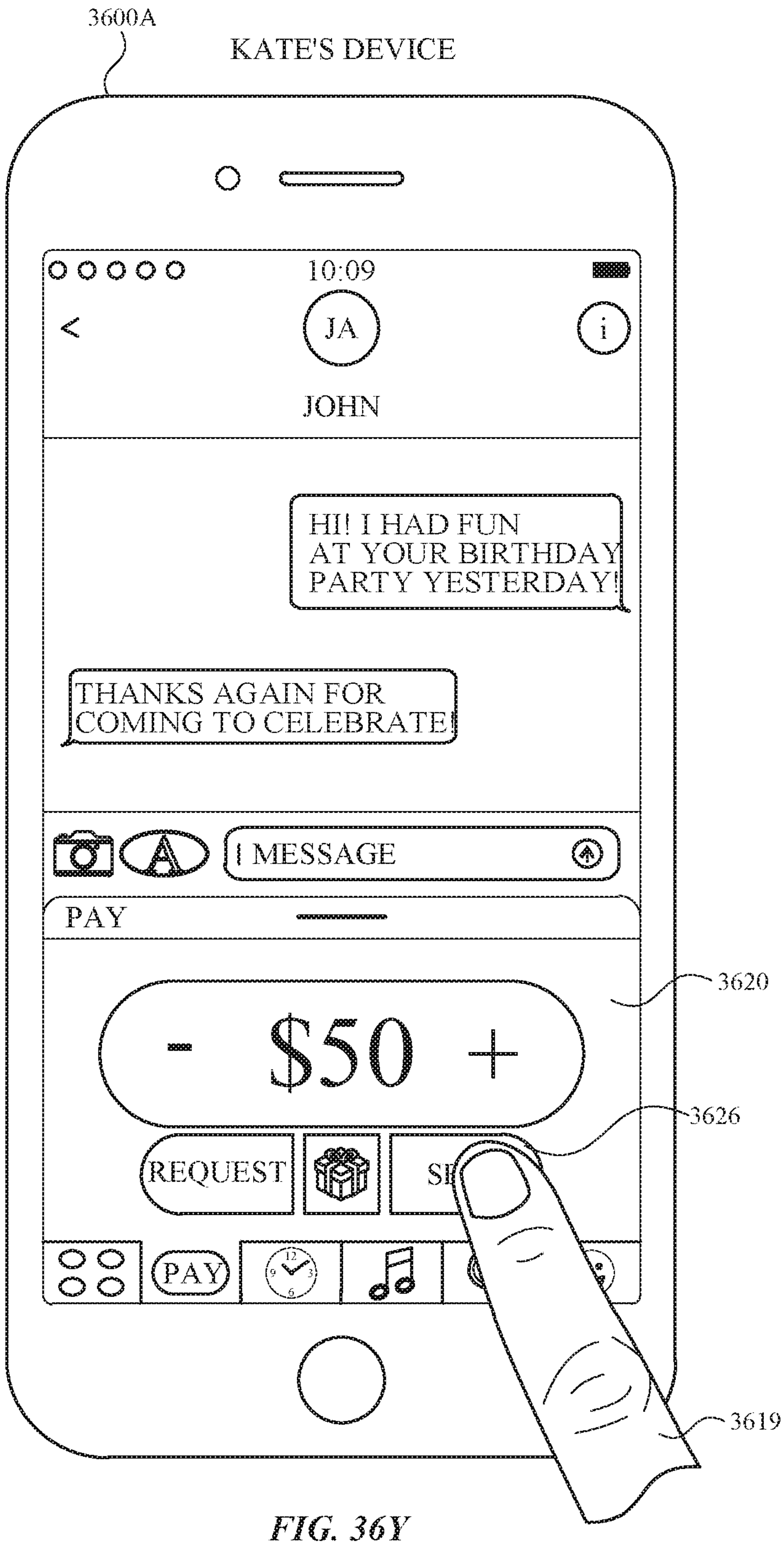

In FIG. 36Y, while displaying payment transfer user interface 3620 with $50 selected as the transfer amount and the gift mode not activated, electronic device 3600A detects a user selection 3619 of send button 3626 of payment transfer user interface 3620. In FIG. 36Z, in response to detecting user selection 3619, electronic device 3600A displays, in expanded compose region 3632, a draft payment message object 3668 (e.g., similar to draft payment message object 866 shown in FIG. 8Q) for transferring the selected amount (e.g., $50) to the other participant of message conversation 3606, message participant 3608 (John). As with draft payment message object 866, draft payment message object 3632 includes an amount indication 3670 (e.g., showing "$50") corresponding to amount indication 868 and a mode indication 3672 (e.g., stating "PAY") corresponding to mode indication 870.

FIGS. 37A-37C are a flow diagram illustrating a method for transmitting a gift transfer, in accordance with some embodiments. Method 3700 is performed at a device (e.g., 100, 300, 500, 3500A, 3600A) with a display (e.g., 3502, 3602) and one or more input devices (e.g., a touch-sensitive surface, a touchscreen of the display, a mechanical button, a mic). Some operations in method 3700 are, optionally, combined, the orders of some operations are, optionally, changed, and some operations are, optionally, omitted.

As described below, method 3700 provides an intuitive way for managing peer-to-peer transactions. The method reduces the cognitive burden on a user for managing peer-to-peer transactions, thereby creating a more efficient human-machine interface. For battery-operated computing devices, enabling a user to manage peer-to-peer transactions faster and more efficiently conserves power and increases the time between battery charges.

The electronic device (e.g., 3500A, 3600A) displays (3702), on the display (e.g., 3502, 3602), a message compose user interface (e.g., 3520, 3620) that includes a message compose region for composing messages to a recipient (e.g., displayed concurrently with an input region such as a keyboard or value picker and/or a message conversation that includes a plurality of messages between a user of the device and one or more participants in the message conversation). Displaying the message compose region for composing messages provides visual feedback indicating that a message is (or can be) drafted. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the message compose user interface (e.g., 3520, 3620), the electronic device (e.g., 3500A, 3600A) receives (3704) a request to generate a draft message (e.g., 3534, 3634) that includes respective content (e.g., typing on a keyboard or entering a value in the value picker).

In some embodiments, the message compose user interface (e.g., 3520, 3620) includes (3706) a first affordance (e.g., 3526, 3626, 3530, 3630 a universal send button for sending both a regular message and a concealment message or a separate concealment message button). In some embodiments, receiving the request to generate the draft message that includes the respective content includes (3708) detecting, via the one or more input devices, a first type of input (e.g., a tap gesture, a force-press, a long-press, a hard-press) on the first affordance (e.g., 3530, 3630, at a location on a touch-sensitive surface that corresponds to a location of the first affordance on a display). In some examples, the first affordance is a toggle. In some examples, in response to detecting the user selection of the first affordance (e.g., 3530, 3630), the affordance changes from an "off" state to an "on" state (e.g., changes a toggle position, changes color).

In some embodiments, in response to detecting the first type of input (e.g., a tap gesture, a force-press, a long-press, a hard-press) on the first affordance (e.g., 3530, 3630, at a location on a touch-sensitive surface that corresponds to a location of the first affordance on a display), the electronic device (e.g., 3500A, 3600A) changes (3710) a graphical characteristic (e.g., color, shape, shading, outline) of the first affordance (e.g., 3631, to indicate that the message being drafted is a gift message). Changing the graphical characteristic of the first affordance in response to detecting the first type of input on the first affordance provides visual feedback by indicating that an input has been received on the affordance. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 3500A, 3600A) detects (3712), via the one or more input devices, a second type of input (e.g., a long-press, a force-press, a hard-press, different from the first type of input) on the first affordance (e.g., 3530, 3630, a concealment message button).

In some embodiments, in response to detecting the second type of input on the first affordance (e.g., 3530, 3630), the electronic device (e.g., 3500A, 3600A) displays (3714), on the display (e.g., 3502, 3602), a user interface (e.g., 3656) containing a plurality of concealment animation options (e.g., 3656A-3656C), where the plurality of concealment animation options include a first concealment animation option (e.g., a letter/envelope animation) and a second concealment animation option (e.g., a gift box animation) different from the first concealment animation option.

In some embodiments, the type of graphical animation options (e.g., 3656A-3656C) that are available to be chosen are (automatically) selected based on context. Selecting (e.g., automatically, without user input) the type of graphical animation options that are available to be chosen based on context reduces the number of inputs needed from the user to select a graphical animation. Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of concealment options displayed on the user interface are (automatically) selected based on context information (e.g., current time of year, current time, current date, upcoming holiday, upcoming birthday) retrieved from a context source. For example, during or shortly before a first holiday, a concealment option that is associated with the first holiday is displayed and during or shortly before a second holiday that is different from the first holiday, a concealment option that is associated with the second holiday is displayed (e.g., in place of the concealment option associated with the first holiday). Selecting the plurality of concealment options that are displayed on the user interface based on context enables the device to present the user with options that are more likely to be chosen by the user. Performing an operation based on context information enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the types of available graphical animations can only be controlled by the operating system (and not by a third party application).

In some embodiments, the plurality of concealment animation options are controlled by a first-party application (that is controlled by the operating system) running on the device (and cannot be controlled by a third-party application running on the device).

In some embodiments, the draft message is associated with a payment of an amount (e.g., payment of a specific amount of funds to the recipient).

In response to receiving the request to generate the draft message, the electronic device (e.g., 3500A, 3600A) displays (3720), in the message compose region (e.g., 3532, 3632), a representation of the draft message (e.g., 3534, 3634).

In some embodiments, prior to displaying, in the message compose region (e.g., 3532, 3632), the representation of the draft message (e.g., 3534, 3634), the electronic device (e.g., 3500A, 3600A) retrieves (3716) context information (e.g., current time of year, current time, current date, upcoming holiday, upcoming birthday) from a context source (e.g., a remote server, a database). In some embodiments, the electronic device (e.g., 3500A, 3600A) automatically applies (3718) a graphical characteristic (e.g., color, pattern, texture, shape, surface material) to the representation of the draft message based on the retrieved context information. Automatically applying (e.g., without user input) the graphical characteristic to the representation of the draft message based on the context information reduces the number of inputs needed to select a graphical characteristic to be applied. Reducing the number of inputs needed to perform an operation enhances the operability of the device enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination that the draft message is a first type of draft message (e.g., a gift transfer message) that is designated for delivery as a concealed message, the electronic device (e.g., 3500A, 3600A) displays (3722) at least a portion of the respective content (e.g., 3540, 3640) of the draft message concurrently with a representation of a concealment element (e.g., 3538, 3638). Displaying at least the portion of the respective content (e.g., 3540, 3640) of the draft message concurrently with the representation of the concealment element in accordance with the determination that the draft message is the first type of draft message that is designated for delivery as a concealed message provides visual feedback by indicating that the displayed draft message corresponds to a particular type of message (e.g., a gift transfer message). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying at least the portion of the respective content (e.g., 3540, 3640) of the draft message concurrently with the representation of the concealment element (e.g., 3538, 3638, an envelope element, a gift box element) further comprises displaying (3734) the respective content of the draft message at least partially enclosed in the concealment element. Displaying the respective content of the draft message at least partially enclosed in the concealment element provides visual feedback by indicating that the contents of the draft message may be concealed. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, the respective content is displayed on a content element different from the concealment element, and the content element is at least partially enclosed in the concealment element. In some examples, the respective content is completely enclosed in the concealment element.

In some embodiments, in accordance with the determination that the draft message (e.g., 3534, 3634) is the first type of draft message that is designated delivery as a concealed message, the respective content (e.g., 3540, 3640) is displayed on a graphical representation of a letter. In some embodiments, in accordance with the determination that the draft message is the first type of draft message that is designated delivery as a concealed message, the representation of the concealment element is a graphical representation of an envelope. In some embodiments, in accordance with the determination that the draft message is the first type of draft message that is designated delivery as a concealed message, displaying at least the portion of the respective content of the draft message concurrently with the representation of the concealment element comprises displaying the graphical representation of the letter at least partially concealed in (e.g., enclosed in or covered by) the graphical representation of the envelope.

In some embodiments, in accordance with the determination that the draft message (e.g., 3534, 3634) is the first type of draft message that is designated delivery as a concealed message, the respective content (e.g., 3540, 3640) is displayed on a graphical representation of a gift object. In some embodiments, in accordance with the determination that the draft message (e.g., 3534, 3634) is the first type of draft message that is designated delivery as a concealed message, the representation of the concealment element (e.g., 3538, 3638) is a graphical representation of a gift wrap (e.g., a gift box, a gift bag, a gift packaging). In some embodiments, in accordance with the determination that the draft message (e.g., 3534, 3634) is the first type of draft message that is designated delivery as a concealed message, displaying at least the portion of the respective content (e.g., 3540, 3640) of the draft message concurrently with the representation of the concealment element (e.g., 3538, 3638) comprises displaying the graphical representation of the gift object at least partially enclosed in the graphical representation of the gift wrap.

In some embodiments, (e.g., in accordance with the determination that the draft message is the first type of draft message that is designated delivery as a concealed message) at least the portion of the respective content (e.g., 3540, 3640) of the draft message (e.g., 3534, 3634) is displayed (3736) with a visual effect (e.g., a 3D effect, an iridescence effect, a depth effect, a coloring effect). Displaying at least the portion of the respective content of the draft message with the visual effect provides visual feedback to the user indicating that the message corresponds to a message sent using a particular type of application (e.g., a first-party application that is controlled by the operating system of the device and not by a third-party application) that is secure, thus enhancing the operability of the device and making the user-device interface more secure (e.g., by reducing fraud when operating/interacting with the device). In some examples, the visual effect corresponds to the depth effect described with referenced to FIGS. 33A-33O. In some examples, the visual effect corresponds to the coloring effect described with reference to FIGS. 33A-33O. In some examples, the visual effect corresponds to the 3D effect described with reference to FIGS. 11A-11V and 33A-33O.

In accordance with a determination that the draft message (e.g., 3568, 3668) is a second type of draft message (e.g., a regular non-gift transfer message) that is designated for delivery as an unconcealed message, the electronic device (e.g., 3500A, 3600A) displays (3724) at least a portion of the respective content of the draft message without displaying a representation of a concealment element. Displaying at least the portion of the respective content of the draft message without displaying a representation of a concealment element in accordance with the determination that the draft message is the second type of draft that is designated for delivery as an unconcealed message provides visual feedback by indicating that the displayed draft message corresponds to a particular type of message (e.g., a non-gift transfer message). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the representation of the draft message, the electronic device (e.g., 3500A, 3600A) receives (3726) a request to send the draft message. In some embodiments, in response to receiving the request to send the draft message, the electronic device (e.g., 3500A, 3600A) sends (3728), to the recipient, the draft message, including: in accordance with a determination that the draft message (e.g., 3534, 3634) is the first type of draft message that is designated for delivery as a concealed message, sending (3730) the draft message along with instructions to initially conceal the respective content (e.g., 3540, 3640) of the draft message with the concealment element (e.g., 3538, 3638), and, in accordance with a determination that the draft message is the second type of draft message that is designated for delivery as an unconcealed message, sending (3732) the draft message (e.g., 3568, 3668) without instructions to initially conceal the respective content of the draft message with the concealment element. Sending the draft message with or without instructions to initially conceal the respective content of the draft message with the concealment element based on a determination of whether the draft message is the first type of draft message that is designated for delivery as a concealed message or the second type of draft message that is designated for delivery as an unconcealed message allows the user to easily create and send a particular type of message. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to sending the draft message (e.g., 3534, 3634) to the recipient, in accordance with the determination that the draft message is the first type of draft message that is designated for delivery as a concealed message, the electronic device (e.g., 3500A, 3600A) displays (3738), in a message conversation (e.g., 3506, 3606) of a messaging application (on the device of the user) (e.g., 3504, 3604), a transmitted representation of the draft message (e.g., 3534, 3634), where the respective content (e.g., 3540, 3640) of the draft message is (entirely) concealed by the concealment element. Displaying, in the message conversation, the transmitted representation of the draft message provides visual feedback by indicating which type of message was sent. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying, in the message conversation (e.g., 3506, 3606) of the messaging application (on the device of the user) (e.g., 3506, 3606), the transmitted representation of the draft message comprises displaying (3740) a dynamic graphical animation of the concealment element (e.g., 3538, 3638) concealing (e.g., enclosing, wrapping, covering) the respective content. Displaying the dynamic graphical animation of the concealment element concealing the respective content provides visual feedback by indicating that the message has been successfully transmitted as a particular type of message (e.g., a gift transfer message). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, the concealment element is an envelope, the respective content is included on a letter, and the dynamic graphical animation is the envelope enclosing the letter. In some examples, the concealment element is a gift box, the respective content included on a gift item, and the dynamic graphical animation is the gift box enclosing the gift item.

In some embodiments, the instructions to initially conceal the respective content (e.g., 3540, 3640) of the message with the concealment element (e.g., 3538, 3638) further includes instructions to prevent displaying the respective content (e.g., text, a numerical amount) of the draft message in a receipt notification displayed at a second device of the recipient (e.g., until a particular user input is received, such as activation of the concealment element).

In some embodiments, in accordance with a determination that the draft message (e.g., 3534, 3634) has been viewed (by the recipient at the recipient's device), the electronic device (e.g., 3500A, 3600A) displays (3742), in the message conversation (e.g., 3506, 3606) of the messaging application (on the device of the user) (e.g., 3504, 3604), at least the portion of the respective content (e.g., 3540, 3640) of the draft message concurrently with the representation of the concealment element (e.g., 3538, 3638, as initially displayed in the message compose user interface as a pending draft message). Displaying, in the message conversation, at least the portion of the respective content of the draft message concurrently with the representation of the concealment element in accordance with the determination that the draft message has been viewed provides visual feedback by allowing the user to easily recognize that the message has been viewed by the intended recipient (and that the gift associated with the message has been accepted). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 3700 (e.g., FIGS. 37A-37C) are also applicable in an analogous manner to the methods described above and below. For example, method 3700 optionally includes one or more of the characteristics of the various methods described above and below with reference to methods 900, 1200, 1500, 1800, 2100, 2400, 2700, 3000, 3400, 4000, 4300, 4600, and 4900. For example, a transfer (e.g., of a resource, of a file, of data storage, of a payment) made via a message conversation of a messaging application, as described in method 900, can be made as a gift transfer instead of a non-gift transfer. For another example, the applied visual effect (e.g., a 3D effect) for a completed transfer (e.g., of a resource, of a file, of data storage, of a payment), as described in method 1200, can be applied to a message object corresponding to a gift transfer when the gift transfer is received or opened by the recipient. For another example, providing for visually distinguishable message objects based on message designated, as described in method 1500, can be applied to gift messages to differentiate among different types of gift transfers (e.g., a surprise gift, a gift in response to a request, a gift made during a certain time of year). For another example, an activated account (e.g., a data storage account, a payment account), as described in method 1800, can be used to receive and/or transmit items (e.g., files, data storage, payment) as gifts via gift transfers. For another example, an account that is ready to be used in a transfer of items (e.g., files, data storage, funds), as described in method 2100, can use items obtained as a gift from another participant of a message conversation. For another example, when a transfer (e.g., of files, of data storage, of funds) is split between two different accounts, as described in method 2400, one or both of the accounts can use funds obtained via a gift transfer. For another example, a transfer history list, as described in method 2700, can include transfers received or sent as gift transfers. For another example, the voice activation used to make a transfer, as described in method 3000, can also be used to make a gift transfer. For another example, the dynamic visual feedback applied to a message object corresponding to an accepted transfer, as described in method 3400, can be applied to a message object corresponding to a gift transfer when the gift message object is opened to accepted by the recipient. For another example, the type of graphical animation of a message object corresponding to a gift transfer seen by the recipient, as described in method 4000, can be selected among a plurality of options prior to transmitting the gift transfer. For another example, when a group account is created, as described in methods 4300, 4600, and 4900, the group account can be used to make a gift transfer or to receive a gift transfer. For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 37A-37C are, optionally, implemented by components depicted in FIGS. 1A-1B. For example, displaying operation 3702, receiving operation 3704, displaying operation 3720, displaying operation 3722, and displaying operation 3724 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 38A-38F illustrate example user interfaces for managing a gift transfer, in accordance with some embodiments. As described in greater detail below, the techniques illustrated by the example user interfaces of FIGS. 38A-38F relate to the techniques illustrated by the example user interfaces illustrated in FIGS. 39A-39L.

Figure 38A:
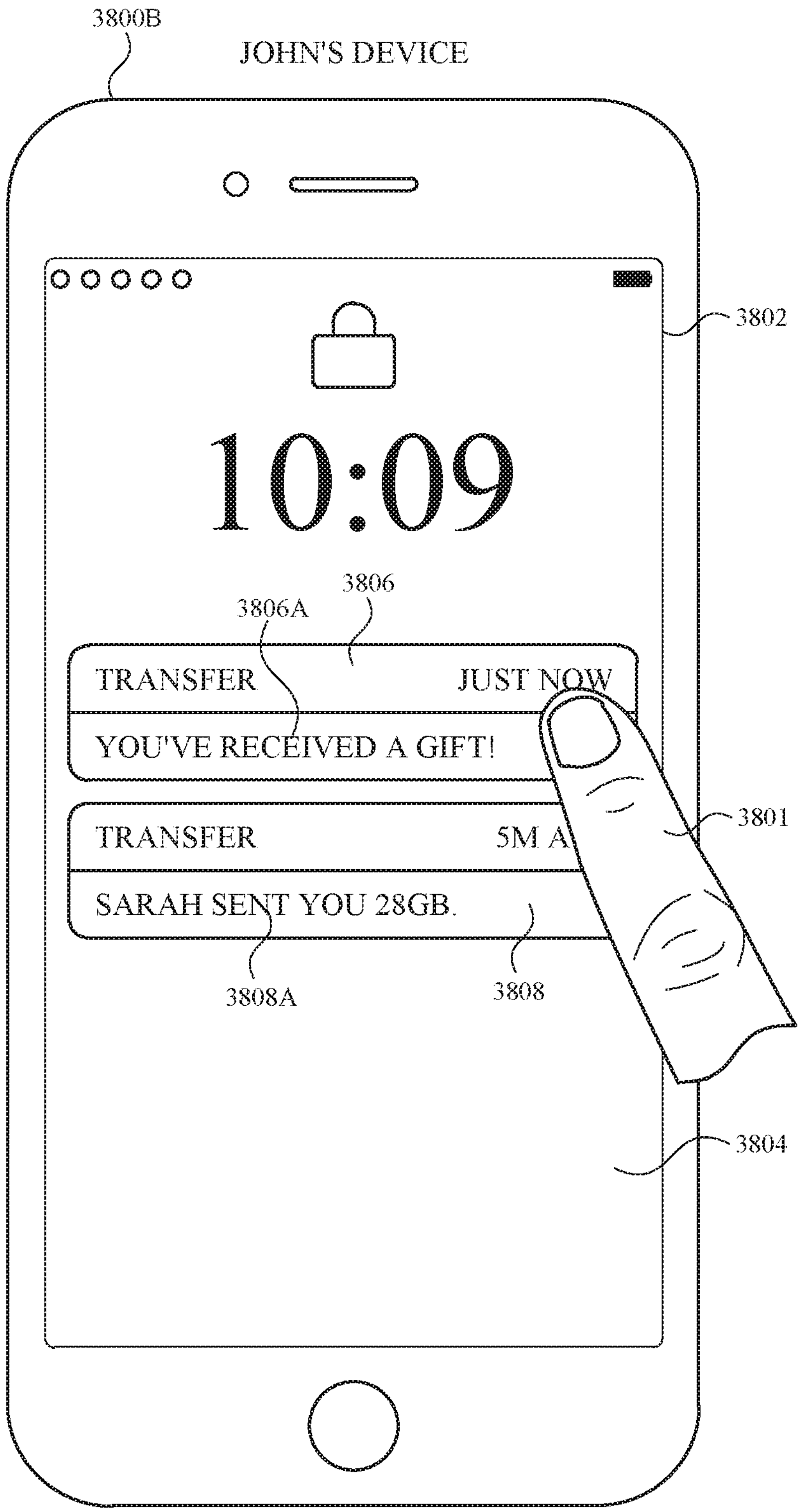
FIGS. 38A-38F illustrate example user interfaces for managing a gift transfer, in accordance with some embodiments.

FIG. 38A illustrates an electronic device 3800B corresponding to electronic device 3500B (e.g., belonging to John) described above with reference to FIGS. 35A-35J. Solely for the ease of description, electronic device 3800B is again referred to as "John's Device" when describing the example user interfaces depicted in FIGS. 38A-38F.

In FIG. 38A, electronic device 3800B (John's Device) displays, on a display 3802, a lockscreen 3804 (e.g., a user interface that is displayed when the device is in a locked state as opposed to an unlocked state). Lockscreen 3804 includes (e.g., after receiving a gift transfer) a gift notification 3806 corresponding to a receipt of a gift transfer (e.g., of storage space of a shared data storage account), where gift notification 3806 includes a gift indication 3806A (e.g., text stating "You've Received a Gift!") indicating that the transfer associated with the notification is a gift (as opposed to a non-gift transfer).

Lockscreen 3804 also displays (e.g., in response to receiving a non-gift transfer) a transfer notification 3808 corresponding to a receipt of a non-gift transfer, where transfer notification 3808 includes a transfer indication 3808A (e.g., text stating "Sarah Sent You 28 GB.") indicating that the received transfer is of a particular amount (e.g., "28 GB") of data storage for the shared data storage account. As shown in FIG. 38A, in some embodiments, gift indication 3806A of gift notification 3806 does not include an indication of the amount of the gifted data storage, thereby preventing the recipient (e.g., the user, John) from seeing the amount of the gift prior to opening the gift using the device. In some embodiments, gift indication 3806A of gift notification 3806 does not include an indication of the sender of the gift.

As shown in FIG. 38A, while displaying lockscreen 3804 with gift notification 3806 and payment notification 3808, electronic device 3800B (John's Device) detects (e.g., via a touchscreen of display 3802) a user selection 3801 (e.g., a tap gesture) of gift notification 3806.

Figure 38B:
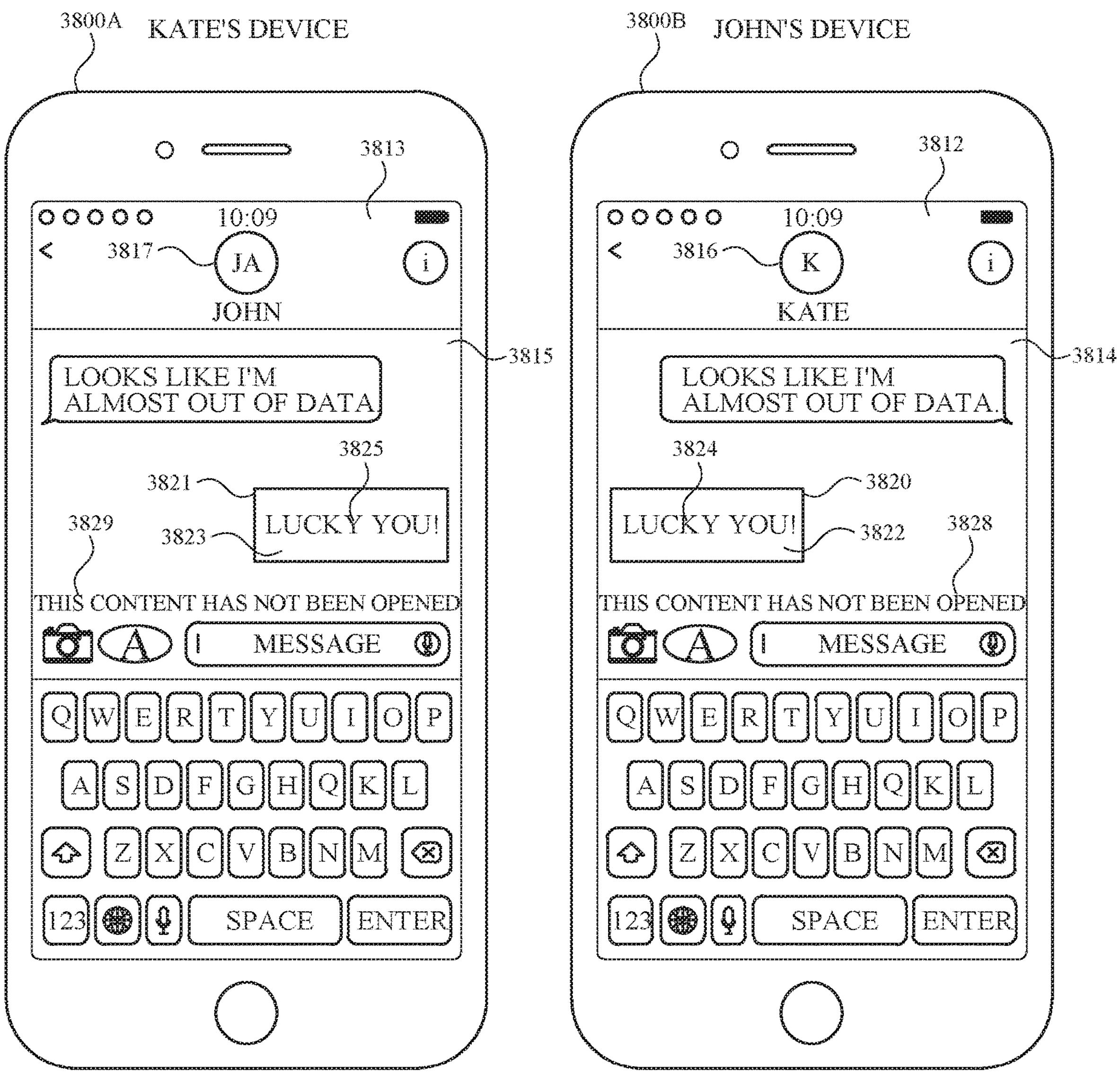

FIG. 38B corresponds to FIG. 35F and illustrates electronic device 3800A (e.g., corresponding to electronic device 3500A, Kate's Device, described in FIGS. 35A-35J) and electronic device 3800B (e.g., corresponding to electronic device 3500B, John's Device, described in FIGS. 35A-35J). Solely for the ease of description, electronic device 3800A and electronic device 3800B are again referred to as Kate's Device and John's Device, respectively.

In FIG. 38B, in response to detecting user selection 3801 of gift notification 3806, electronic device 3800B (John's Device) displays, within message conversation 3814 of a messaging application 3812, a received gift message object 3820 corresponding to gift notification 3806. Gift message object 3820 includes a message 3824 (e.g., stating "Lucky You!") on a concealment object 3822 of the gift message object, indicating that the gift message object corresponds to a gift transfer (as opposed to a non-gift transfer). John's Device also displays, in message conversation 3814, a status indication 3828 (e.g., stating "This Content Has Not Been Opened") indicating whether or not the gift message object 3820 has been opened (e.g., by selecting the gift message object) by the recipient (John).

In FIG. 38B, while displaying a message conversation 3815 (e.g., corresponding to message conversation 3814 on John's Device) of messaging application 3813 (e.g., corresponding to messaging application 3812 on John's Device), electronic device 3800A (Kate's Device) correspondingly displays, in message conversation 3815, a sent gift message object 3821 that corresponds to received gift message object 3820 on John's Device. As with gift message object 3820, gift message object 3821 on Kate's Device includes a message 3825 (e.g., stating "Lucky You!") on a concealment object 3823 of the gift message object, thus indicating that the gift message object corresponds to a gift transfer (as opposed to a non-gift transfer). Kate's Device also displays, in message conversation 3815, a status indication 3829 (e.g., corresponding to status indication 3828) indicating whether or not gift message object 3820 has been opened by the recipient (John) on the recipient's device (John's Device).

Figure 38C:
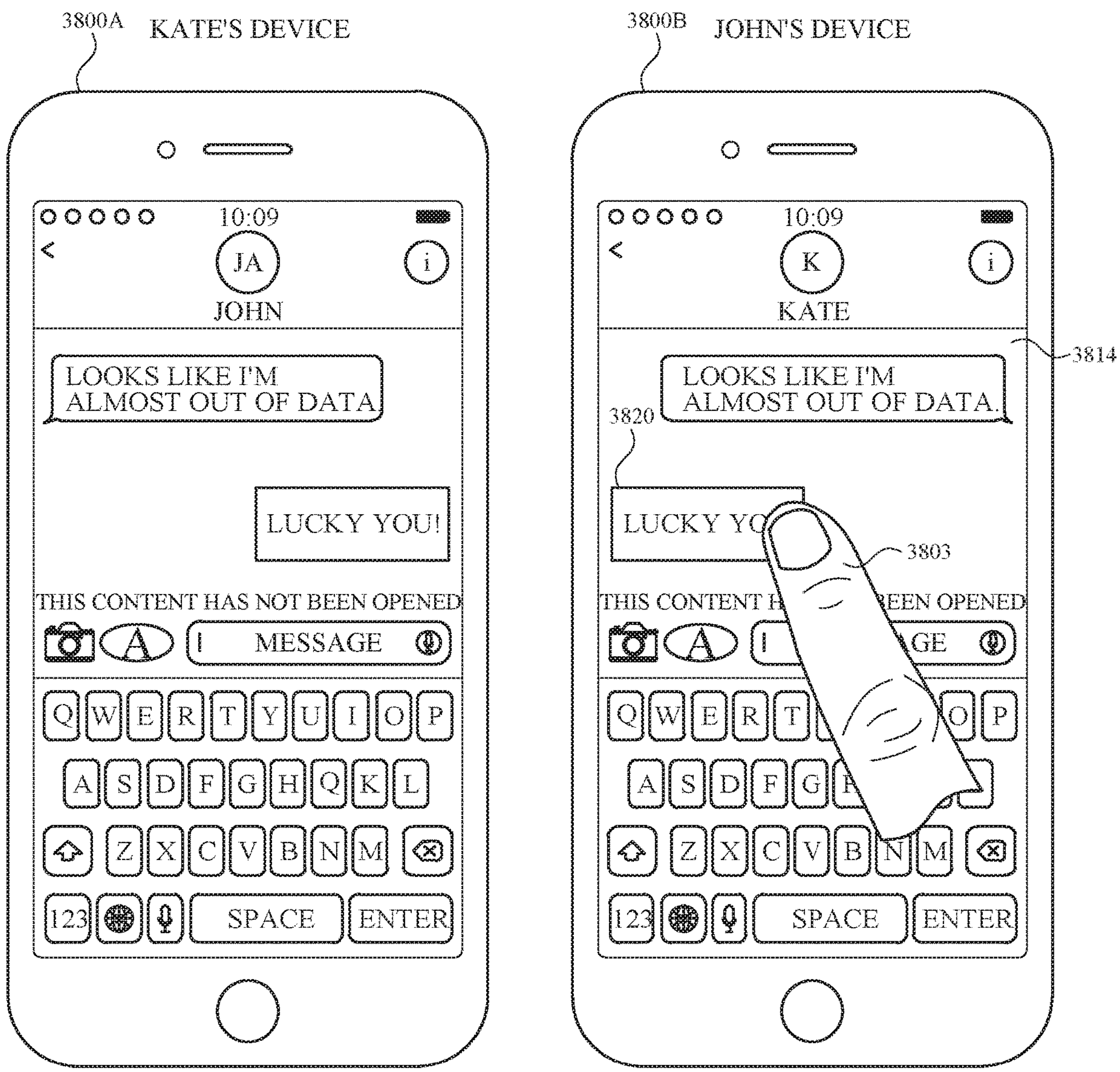

In FIG. 38C, while displaying, in message conversation 3814, (an unopened) gift message object 3820 corresponding to the gift transfer from Kate, electronic device 3800B (John's Device) detects a user selection 3803 (e.g., a tap gesture) of gift message object 3820.

Figure 38D:
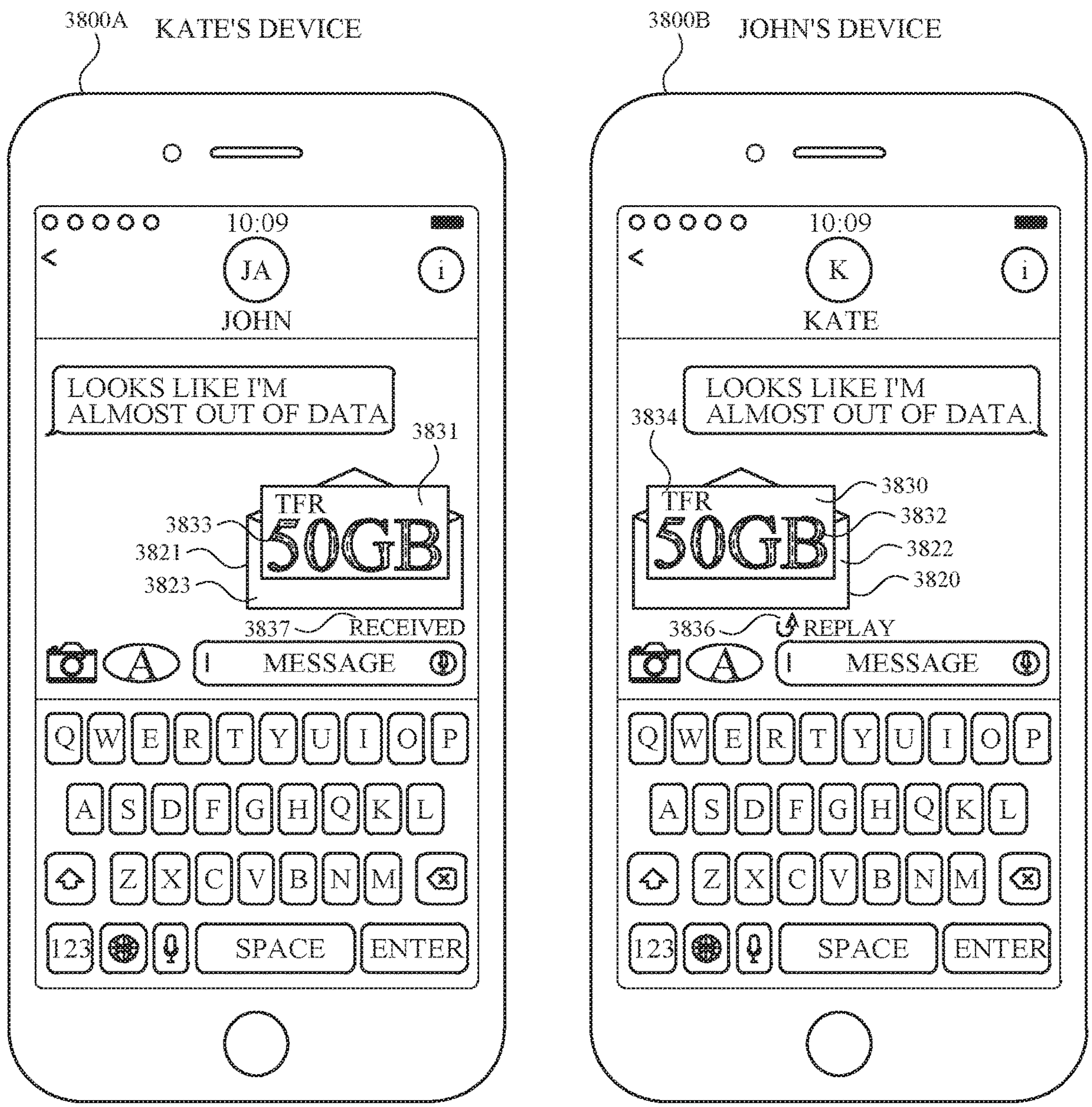

In FIG. 38D, in response to detecting user selection 3803 of gift message object 3820, the displayed gift message object 3820 on John's Device opens (e.g., via a graphical animation of the concealment object of the gift message object opening) to reveal a content object 3830 previously enclosed within concealment object 3822 of gift message object 3820, where content object 3830 includes an amount indication 3832 showing the amount of data storage (e.g., 50 GB) that was gifted by Kate to John (e.g., to be added to John's portion of the limited shared data storage account, to be added to a personal data storage account of John). In some embodiments, upon detecting user selection 3803 of the message object 3820, John's Device also displays, in message conversation 3814, a replay button 3836 for replaying the graphical animation of the gift message object opening to reveal the enclosed content object.

Correspondingly, gift message object 3821 displayed in message conversation 3815 on Kate's Device (corresponding to gift message object 3820 displayed in message conversation 3814 on John's Device) is also opened (e.g., via the same graphical animation of the gift message object opening applied to gift message object 3820 on John's Device) to reveal a content object 3831 corresponding to content object 3830 on John's Device. Because the two gift message objects (gift message object 3820 on John's Device and gift message object 3821 on Kate's Device) correspond to the same gift transfer (e.g., of 50 GB of data storage from Kate to John), content object 3831 also shows an amount indication 3833 showing the same amount of data storage (e.g., 50 GB) that was gifted by Kate to John. In some embodiments, in accordance with a determination that the gift message object has been opened by the recipient (John) on the recipient's device (John's Device), Kate's Device also displays, in message conversation 3815, a status indicator 3837 indicating that the gift message has been opened by the recipient (John).

In some embodiments, as shown in FIG. 38D, the amount indication (e.g., amount indication 3832 and amount indication 3833) of a content object (e.g., content object 3830 and content object 3831) are displayed with a dynamic visual effect (e.g., a depth effect and/or a coloring effect as described with reference to FIGS. 33A-33O, a 3D effect as described with reference to FIGS. 11A-11V). In some embodiments, in addition to, or instead of, generating the dynamic visual feedback, the devices (Kate's Device and John's Device) generate a dynamic haptic feedback (e.g., similar to the generated tactile output 3336 described with reference to, for example, FIGS. 33F-33H). In some embodiments, the generated feedback (e.g., visual feedback, haptic feedback) is caused (e.g., only) by an operating system program of the devices and non-operating system programs of the devices are not enabled to cause the feedback.

Figure 38E:
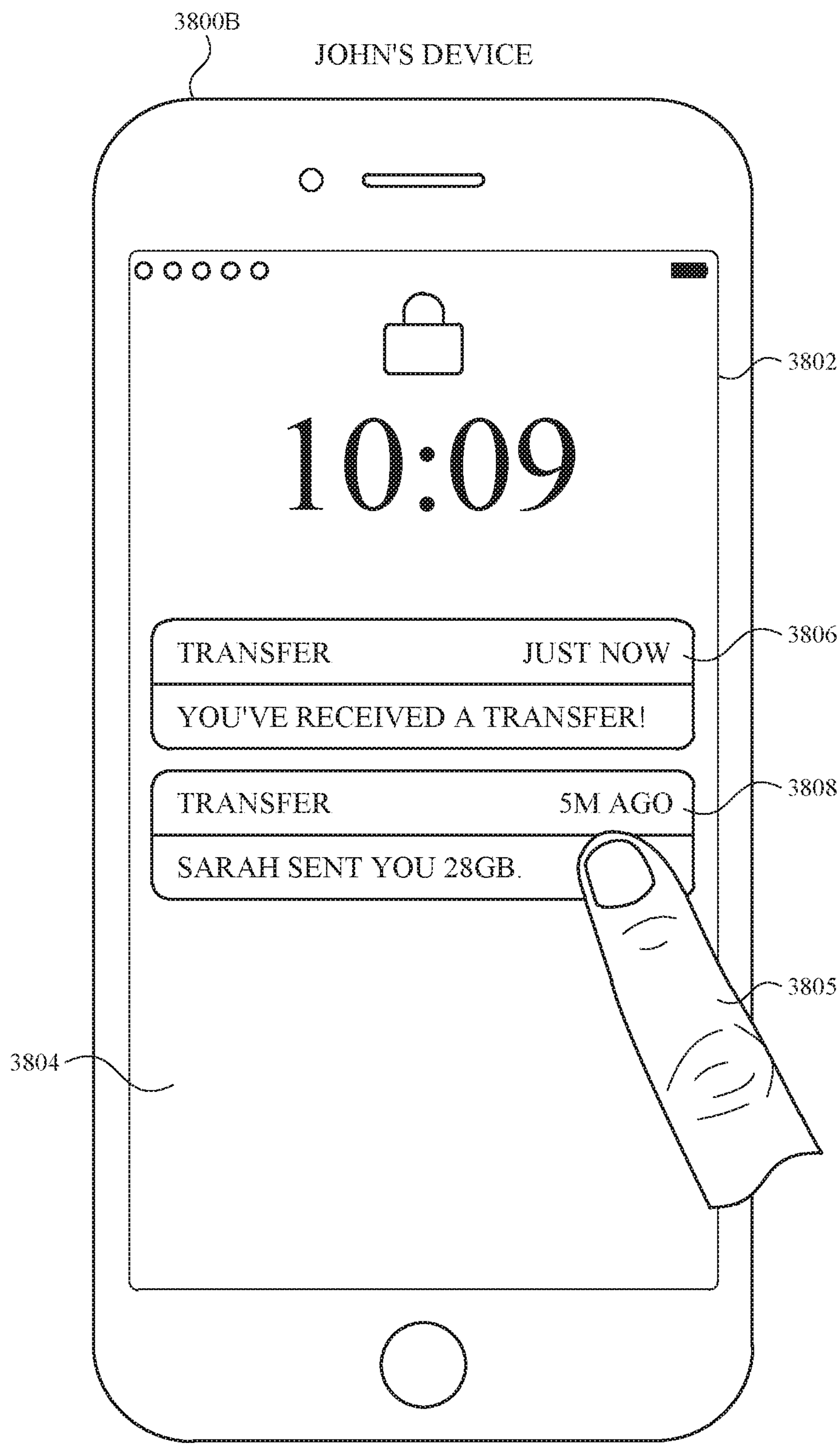

FIG. 38E illustrates electronic device 3800B (John's Device) again displaying lockscreen 3804 with gift notification 3806 and transfer notification 3808, as first shown in FIG. 38A. In FIG. 38E, electronic device 3800B (John's Device) detects a user selection 3805 (e.g., a tap gesture) of transfer notification 3808. As mentioned above, transfer notification 3808 corresponds to a receipt of a non-gift transfer of a data storage (e.g., in the amount of 28 GB) received from Sarah via the messaging application.

Figure 38F:
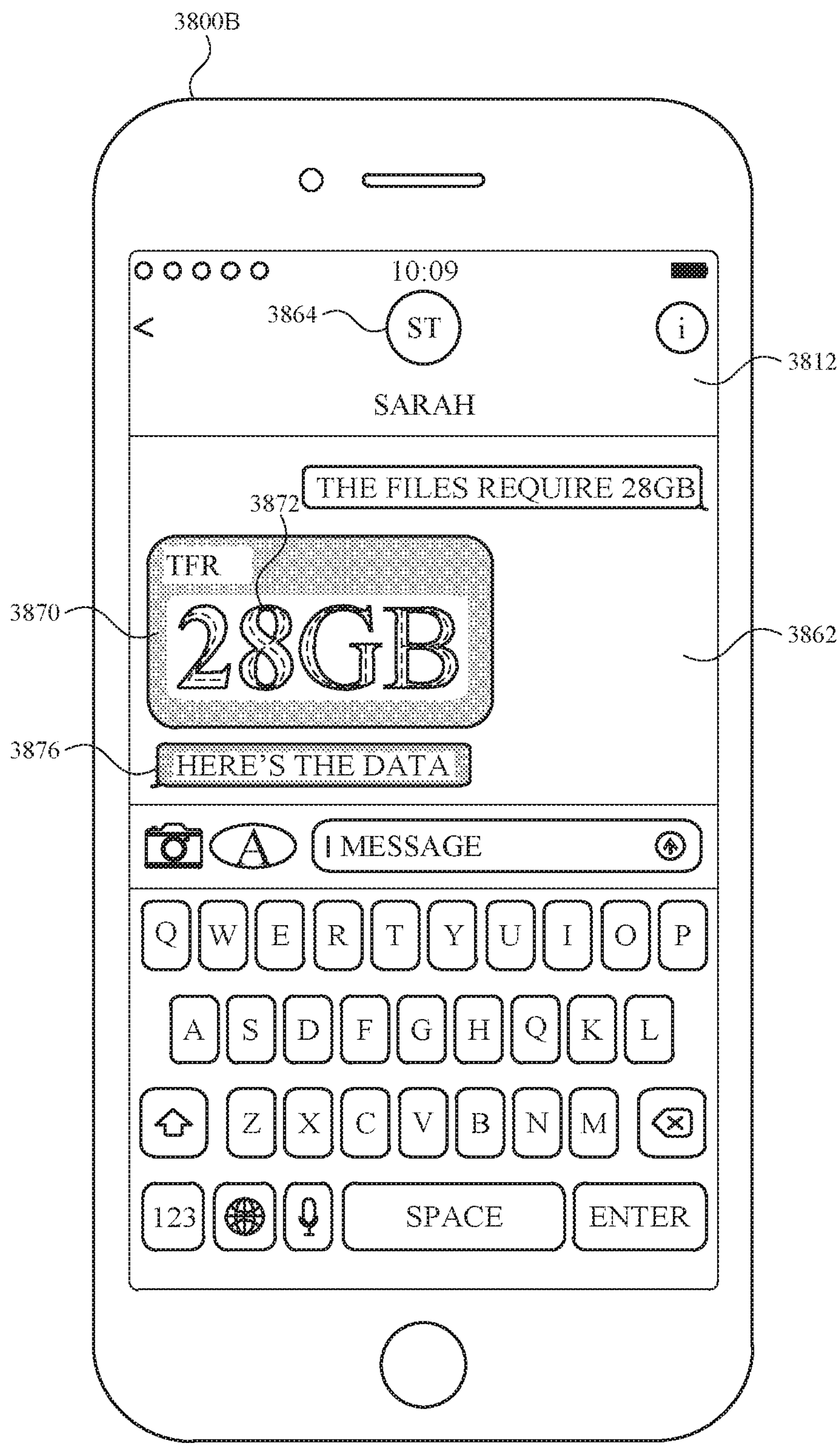

In FIG. 38F, in response to detecting user selection 3805 of transfer notification 3808, electronic device 3800B displays a message conversation 3862 of messaging application 3812 corresponding to a one-on-one message conversation with a message participant 3864 (e.g., "Sarah"). Electronic device 3800B further displays, in message conversation 3862, a transfer message object 3870 corresponding to a received non-gift transfer of 28 GB of data storage sent by Sarah, and a message object 3876 (e.g., stating "Here's the data") corresponding to a note from Sarah regarding the data storage transfer.

As shown in FIG. 38F, transfer message object 3870 includes an amount indication 3872 (e.g., showing "28 GB") indicating the amount of data storage that has been transferred (from Sarah to John). In some embodiments, amount indication 3872 (e.g., once it has been accepted by the user, John) of transfer message object 3870 is displayed with a dynamic visual feedback (e.g., a depth effect and/or a coloring effect as described with reference to FIGS. 33A-33O, a 3D effect as described with reference to FIGS. 11A-11V). In some embodiments, in addition to, or instead of, generating the dynamic visual feedback, the device generates a dynamic haptic feedback (e.g., similar to the generated tactile output 3336 described with reference to, for example, FIGS. 33F-33H). In some embodiments, the generated feedback (e.g., visual feedback, haptic feedback) is caused (e.g., only) by an operating system program of the device and non-operating system programs of the device are not enabled to cause the feedback.

The example user interfaces illustrated in FIGS. 38A-38F above relate to the example user interfaces illustrated in FIGS. 39A-39L below. In particular, the example user interfaces of FIGS. 38A-38F and the example user interfaces of FIGS. 39A-39L both relate to managing a gift transfer using an electronic device (e.g., 100, 300, 500, 3800B, 3900B), in accordance with some embodiments. Therefore, it is to be understood that the techniques described with reference to the example user interfaces of FIGS. 38A-38F and the techniques described with reference to the example user interfaces of FIGS. 39A-39L are both techniques that relate to similar concepts for managing a gift transfer.

Figure 39A:
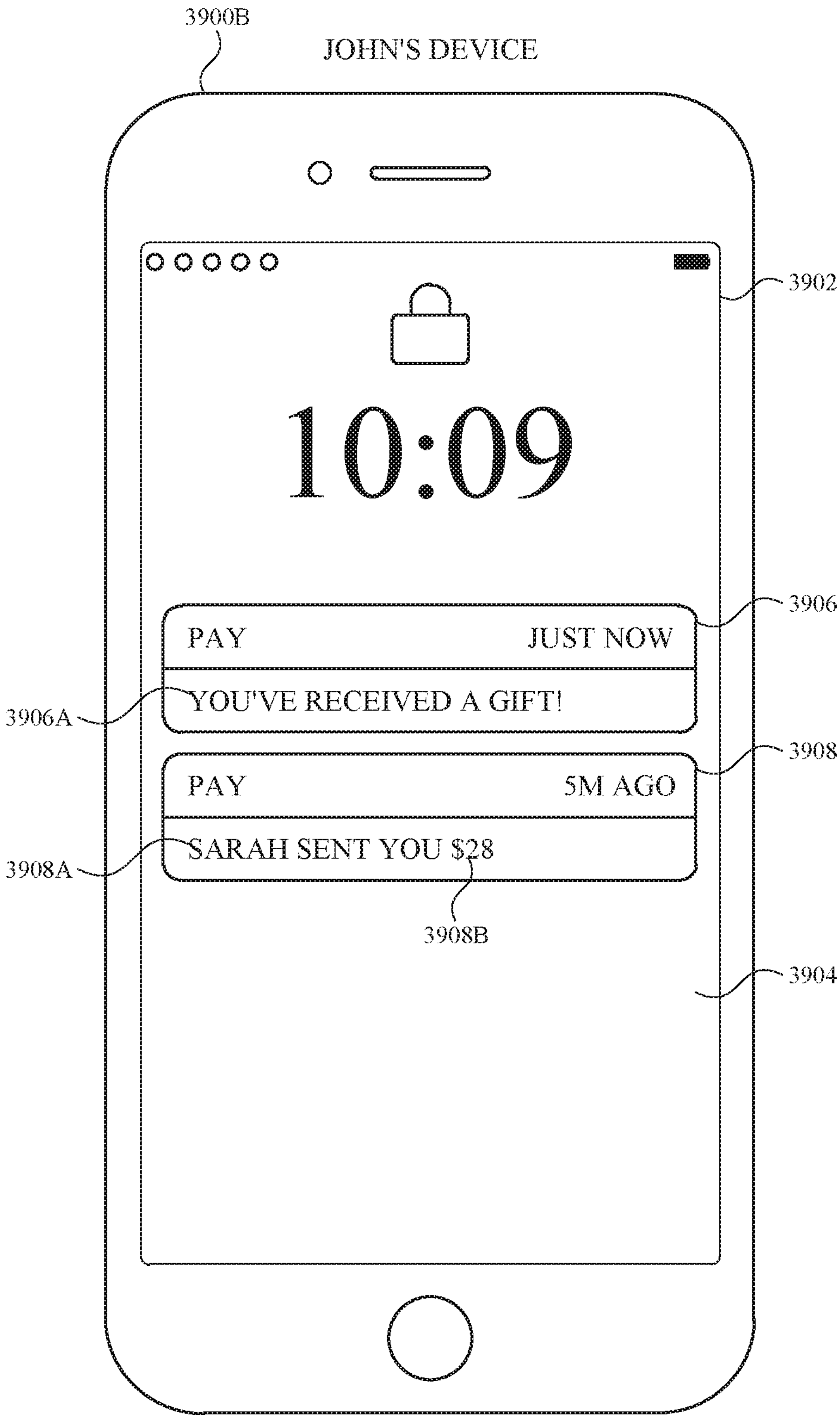
FIGS. 39A-39L illustrate example user interfaces for managing a gift transfer, in accordance with some embodiments.

As mentioned above, FIGS. 39A-39L illustrate example user interfaces for managing a gift transfer, in accordance with some embodiments. FIG. 39A illustrates an electronic device 3900B corresponding to electronic device 3600B (e.g., belonging to the user "John") described above with reference to FIGS. 36A-36Z. Solely for the ease of description, electronic device 3900B, which corresponds to electronic device 3600B, is again referred to as "John's Device."

In FIG. 39A, electronic device 3900B (John's Device) displays, on a display 3902, a lockscreen 3904 (e.g., a user interface that is displayed when the device is in a locked state as opposed to an unlocked state). Lockscreen 3904 includes (e.g., after receiving a gift payment) a gift notification 3906 corresponding to a receipt of a gift payment. Gift notification 3906 includes a gift indication 3906A (e.g., text stating "You've Received a Gift!") indicating that the payment associated with the notification is a gift (as opposed to a non-gift payment). Lockscreen 3904 also includes (e.g., after receiving a payment) a payment notification 3908 corresponding to a receipt of a regular payment. Payment notification 3908 includes a payment notification 3908A (e.g., stating "Sarah Sent You $28.") indicating that a payment of a particular amount (e.g., $28) has been received. As shown in FIG. 39A, in some embodiments, gift indication 3906A of gift notification 3906 does not include an indication of an amount of the gift payment, thereby preventing the recipient (e.g., the user of the device) from seeing the amount of the gift prior to opening the gift. In some embodiments, gift indication 3906A of gift notification 3906 does not include an indication of the sender of the gift.

Figure 39B:
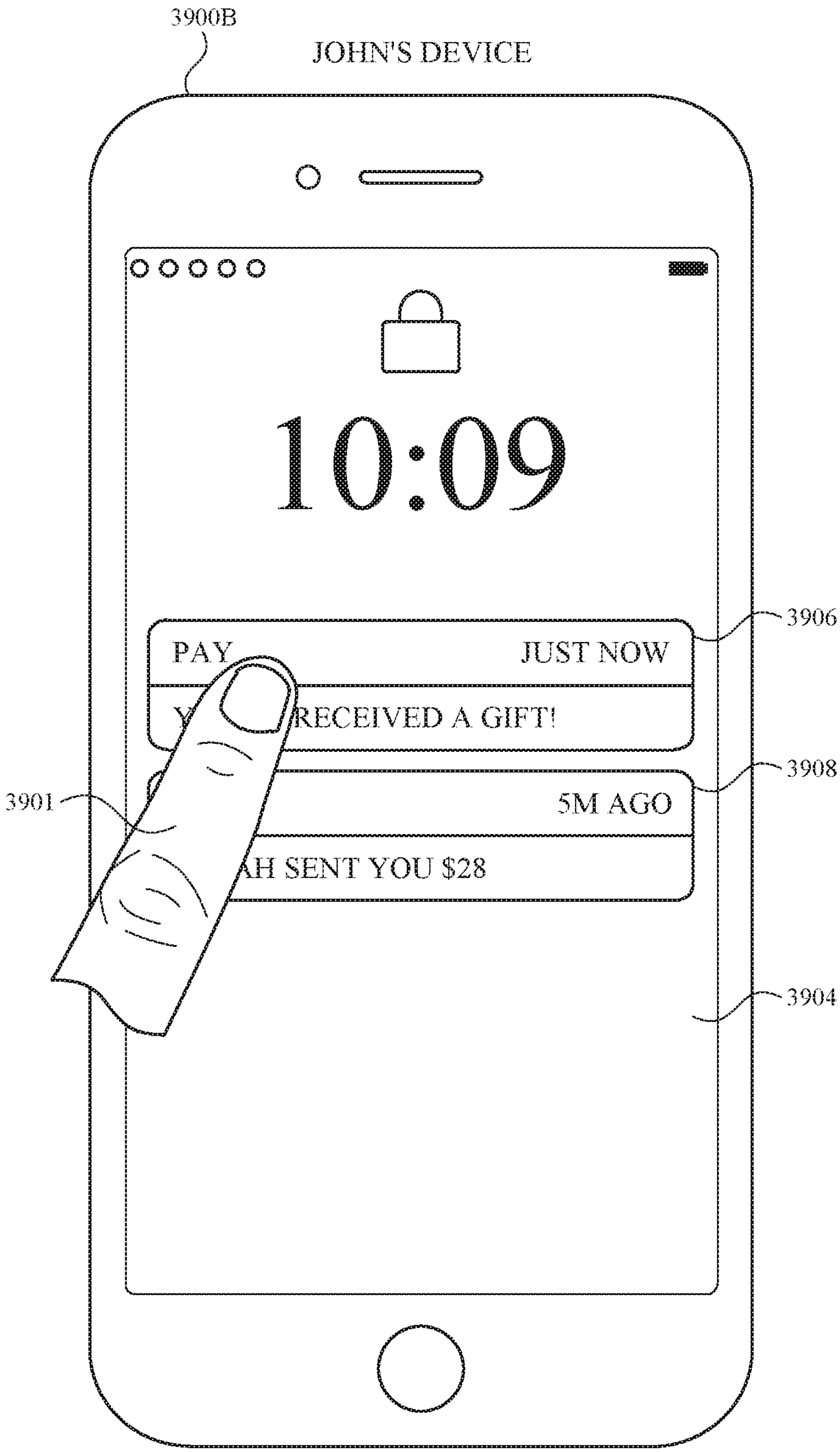

In FIG. 39B, while displaying lockscreen 3904 with gift notification 3906 and payment notification 3908, electronic device 3900B (John's Device) detects (e.g., via a touchscreen of display 3902) a user selection 3901 (e.g., a tap gesture) of gift notification 3906.

Figure 39C:
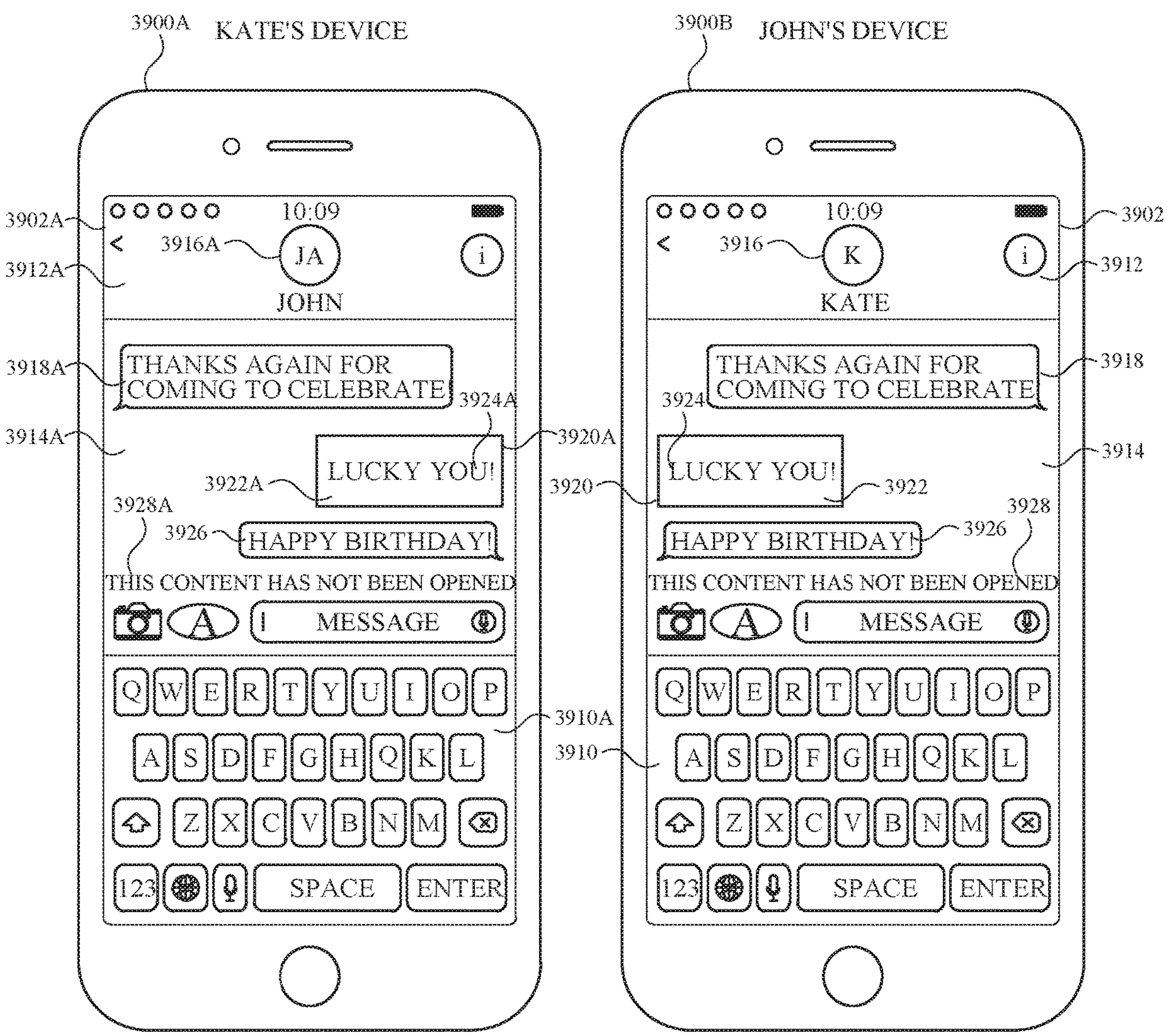

In FIG. 39C, in response to detecting user selection 3908 of gift notification 3906, John's Device displays, on display 3902, a message conversation 3914 of a messaging application 3912 corresponding to a message conversation with message participant 3916 (e.g., Kate), the sender of the gift payment corresponding to gift notification 3906. As shown by John's Device in FIG. 39C, message conversation 3914 includes a message object 3918 (e.g., stating "Thanks again for coming to celebrate!") corresponding to a previously-sent (by John to Kate) message.

Message conversation 3914 further includes a gift message object 3920 (e.g., corresponding to gift message object 3634 described above with reference to FIGS. 36I-36R) and a message object 3926 (e.g., stating "Happy Birthday!,"

corresponding to message object 3650 shown above in FIGS. 36I-36R) accompanying gift message object 3920. Gift message object 3920 includes a concealment object 3922 that conceals (e.g., hides, encloses) a content object. In some examples, the concealment object is an envelope, as shown in FIG. 39C. In some examples, concealment object is a gift box. In some embodiments, concealment object 3922 further includes a message 3924 (e.g., stating "Lucky You!") indicating to the recipient(s) that the message object corresponds to a gift payment (as opposed to a regular payment).

Message conversation 3914 further includes a status indicator 3928 (e.g., text stating "This Content Has Not Been Opened," corresponding to status indicator 3654 shown above in FIG. 36P) indicating that the gift payment corresponding to gift message object 3920 has not yet been accepted by the recipient, John.

FIG. 39C also illustrates electronic device 3900A associated with the sender (e.g., "Kate") of the gift payment corresponding to gift message object 3920, and further corresponding to electronic device 3600A described above with reference to FIGS. 36A-36Z. Solely for the ease of description, electronic device 3900A is referred to as "Kate's Device." In FIG. 39C, Kate's Device displays, on display 3902A, a message conversation 3914A (corresponding to message conversation 3914 between John and Kate) of messaging application 3912A (e.g., the same application as messaging application 3912) between the user of the device (Kate) and a message participant 3916A (John).

Because message conversation 3914 and message conversation 3914A are corresponding conversations between the same participants (Kate and John), message conversation 3914A shows messages corresponding to the messages shown in message conversation 3914. For example, message conversation 3914A on Kate's Device includes a message object 3918A (e.g., stating "Thanks again for coming to celebrate!") that corresponds to message object 3918 of message conversation 3914 on John's Device. Similarly, message conversation 3914A on Kate's Device includes a gift message object 3920A that corresponds to gift message object 3920 of message conversation 3914 of John's Device. As with gift message object 3920 on John's Device, gift message object 3920A on Kate's Device includes a concealment element 3922A (corresponding to concealment element 3922) and a message 3924A (corresponding to message 3924) shown on concealment element 3922A.

In some embodiments, as with message conversation 3914 of John's Device, message conversation 3914A includes a status indicator 3928A (corresponding to status indicator 3928, stating "This Content Has Not Been Opened") that indicates to the user that the gift payment corresponding to gift message object 3920A (and thus also corresponding to gift message object 3920) has not yet been opened by the recipient, John.

Figure 39D:
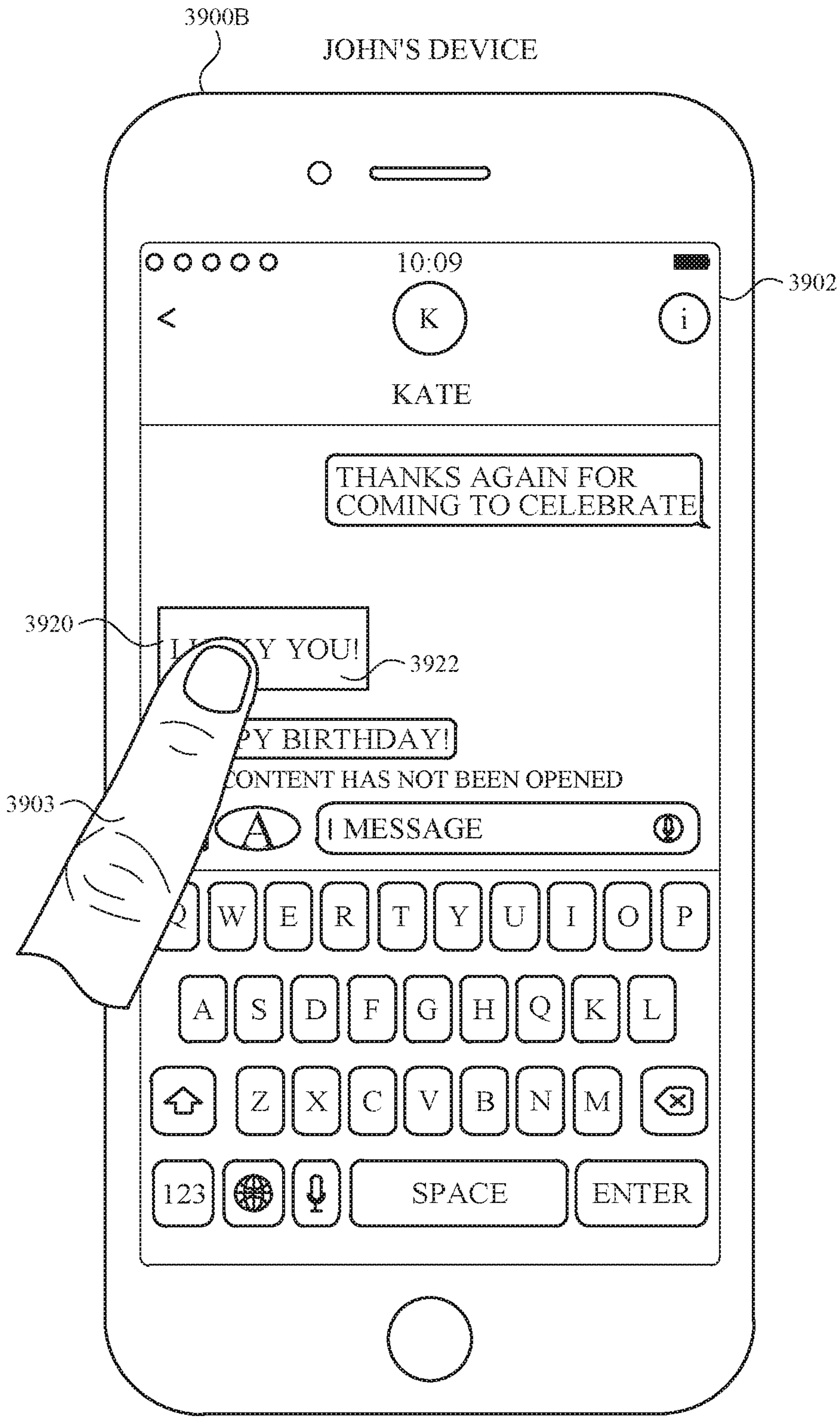
Figure 39E:
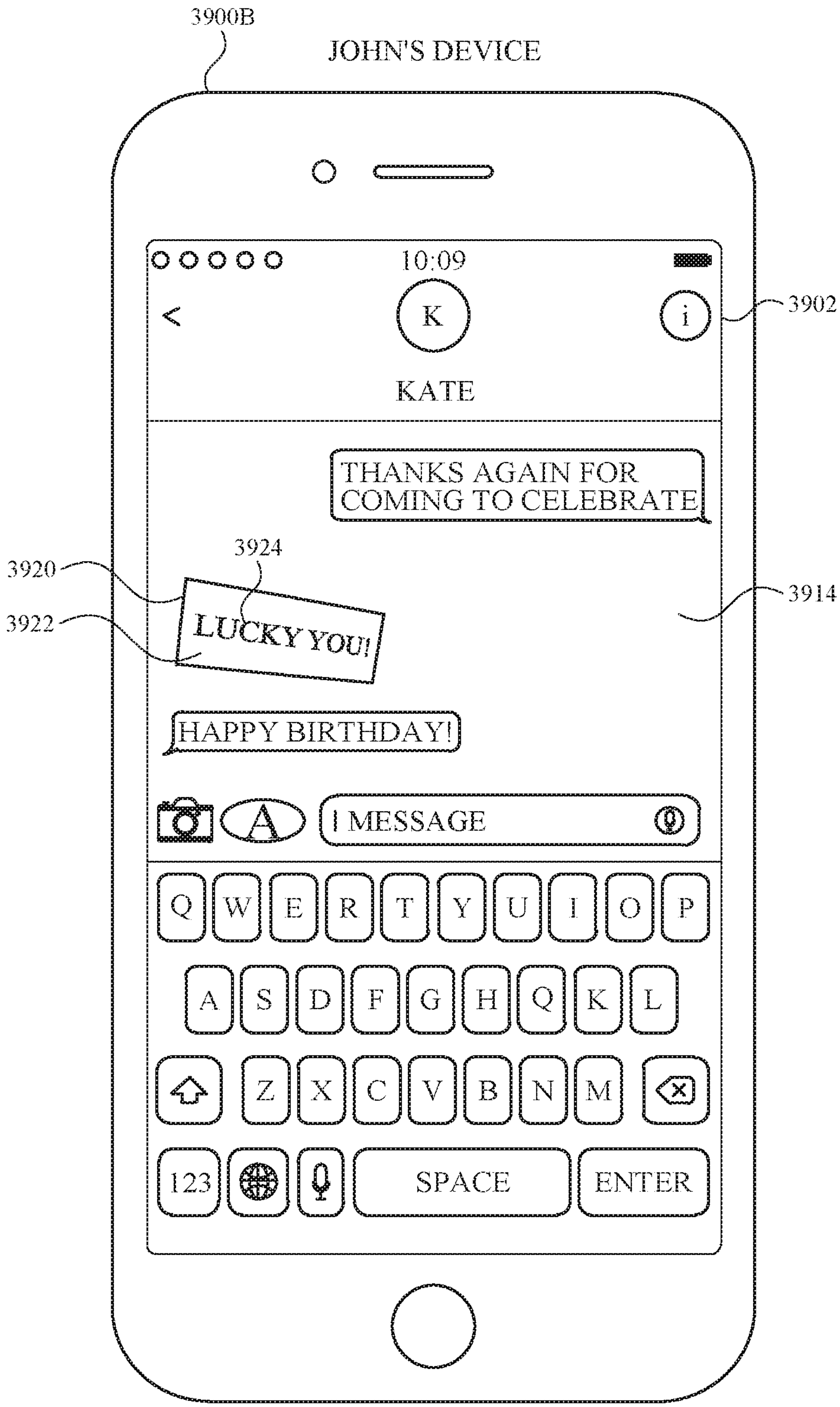
Figure 39F:
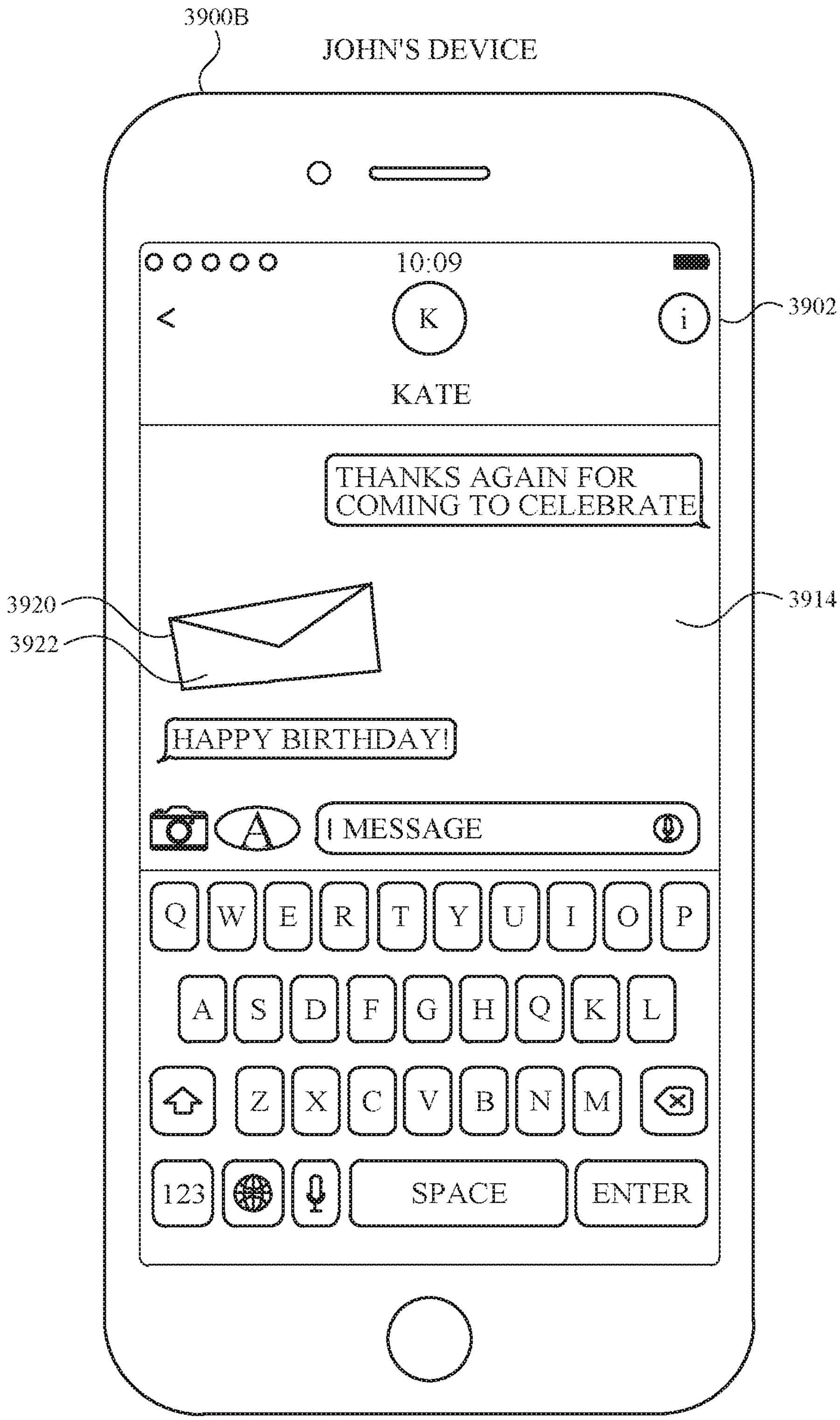
Figure 39G:
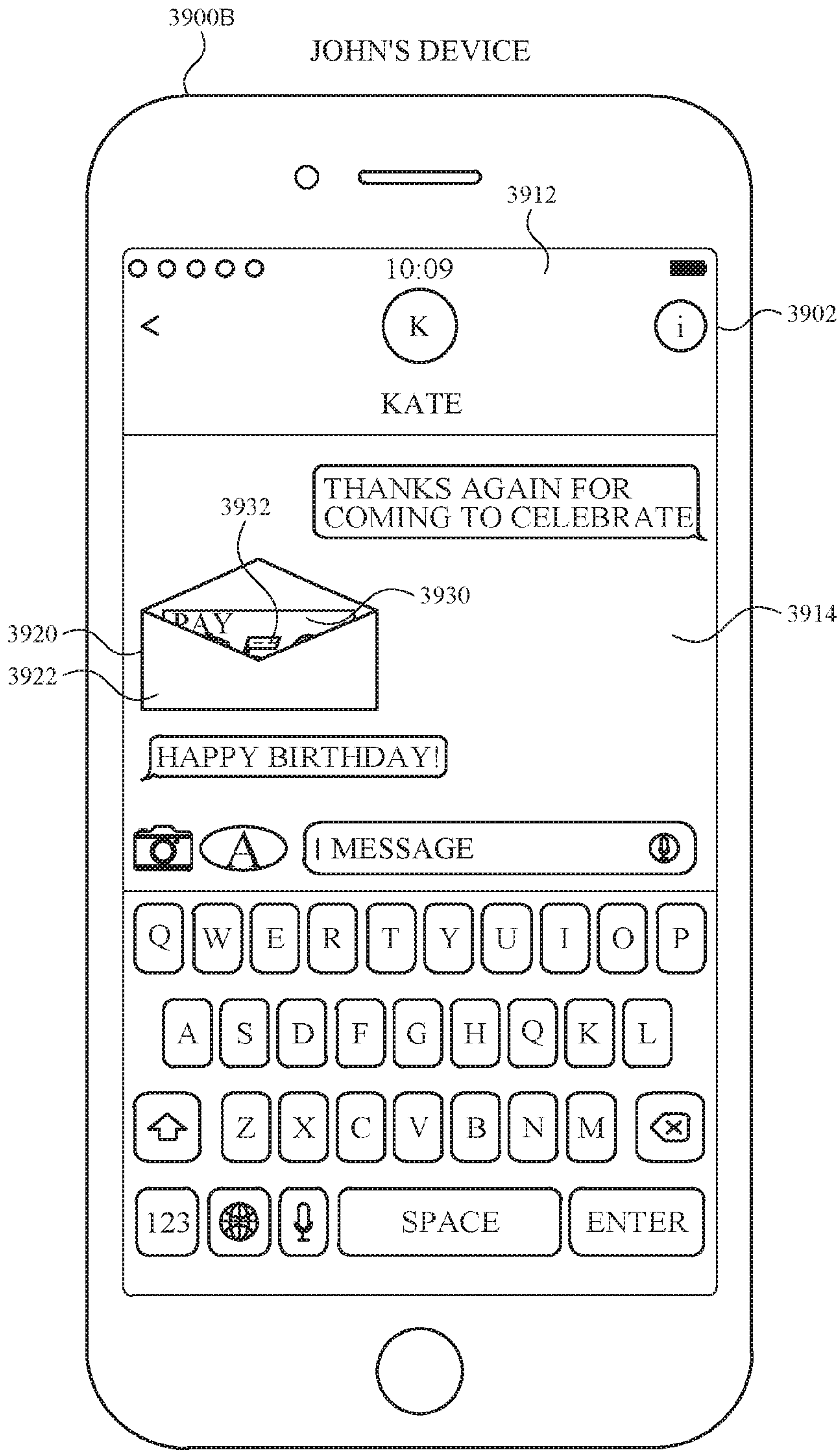
Figure 39H:
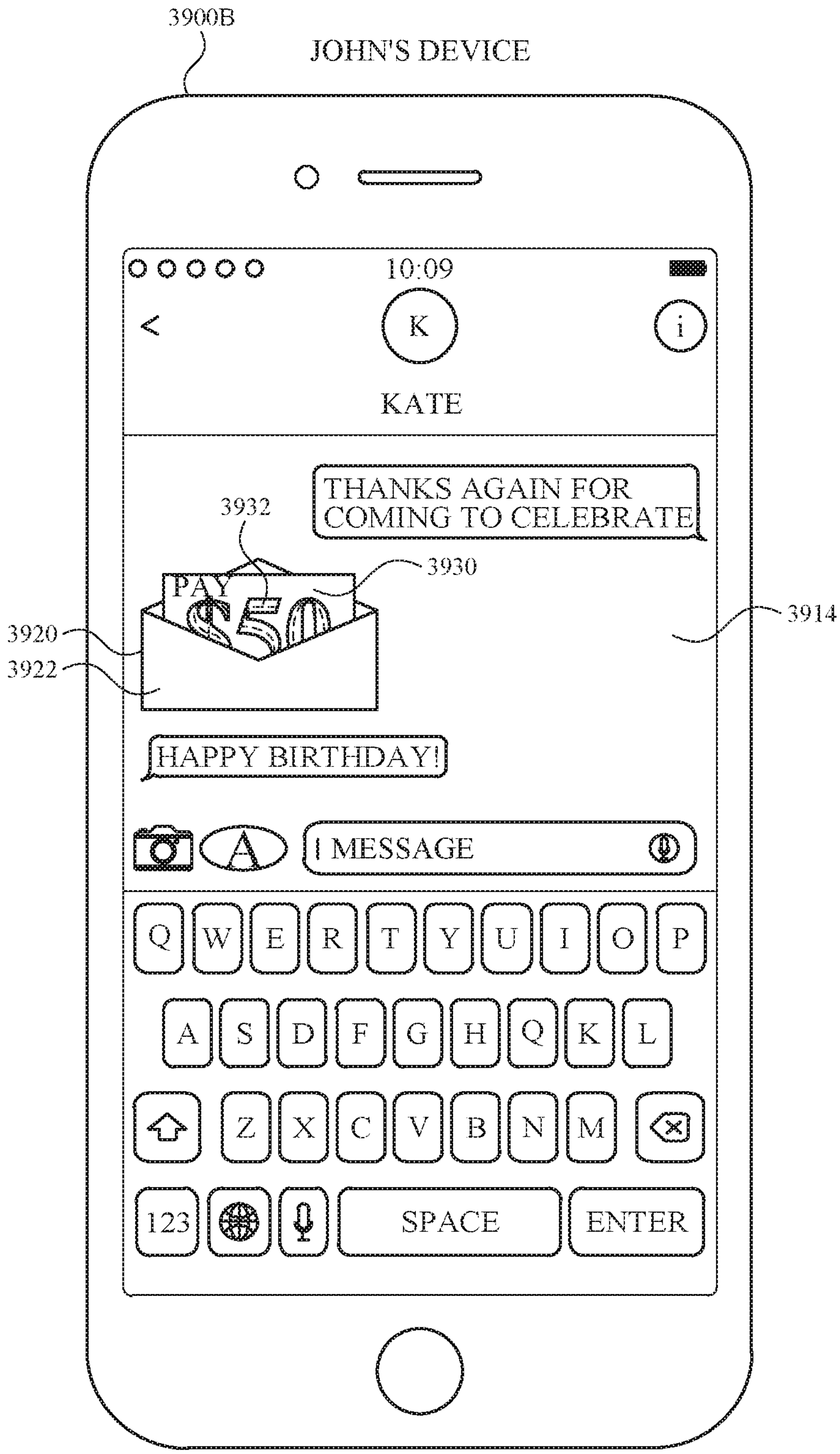
Figure 39I:
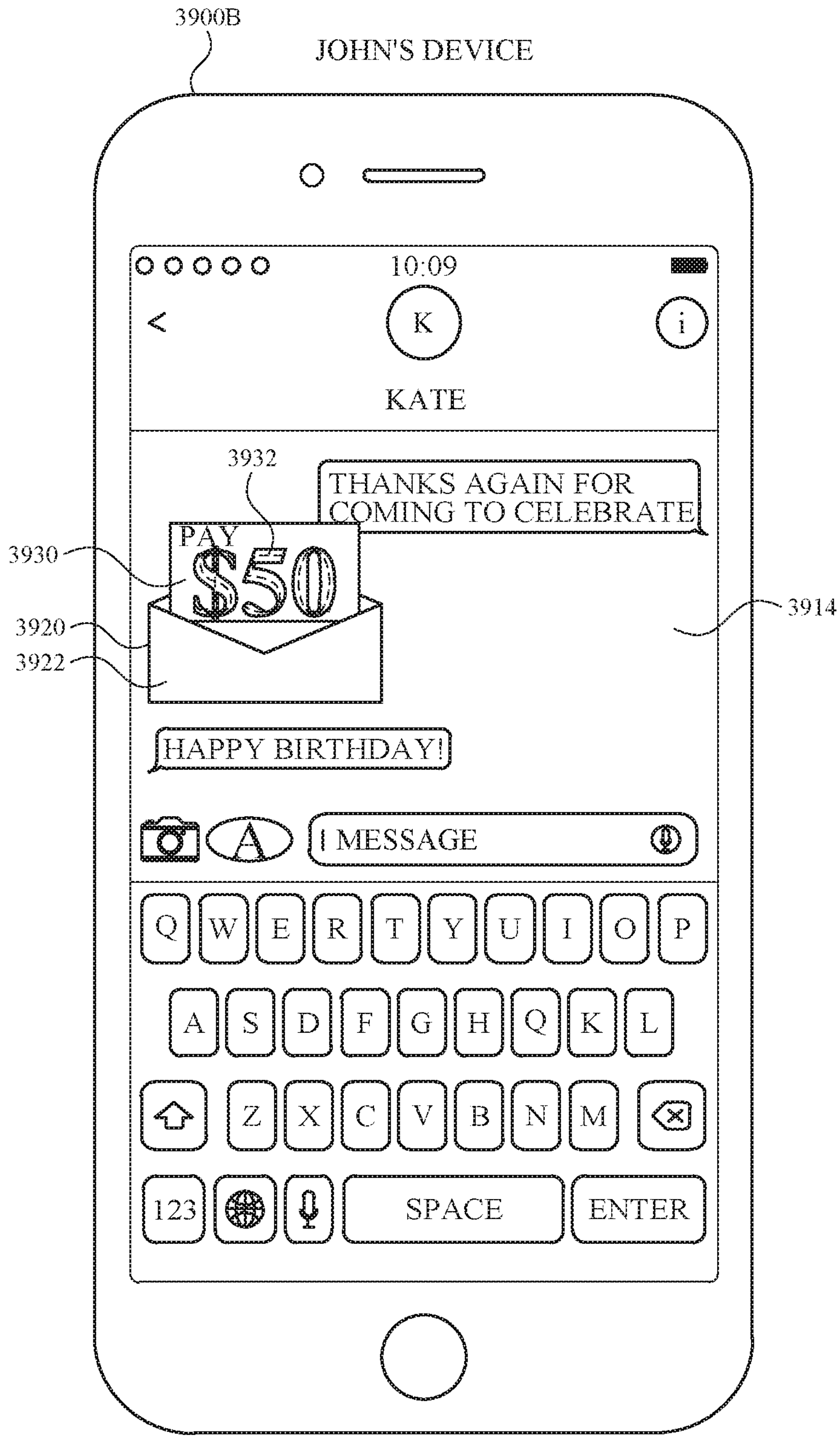

FIG. 39D illustrates electronic device 3900B (John's Device) displaying, in message conversation 3914, gift message object 3920 that has not yet been accepted by the recipient, John (e.g., as indicated by status indicator 3928). While displaying gift message object 3920, electronic device 3900B detects (e.g., via a touchscreen of display 3902) a user selection 3903 (e.g., a tap gesture) of the gift message object (e.g., a tap gesture on concealment element 3922 of gift message object 3920).

In response to detecting user selection 2903 of gift message object 3920, gift message object 3920 is opened to reveal content object 3930 that is enclosed within concealment object 3922. In some embodiments, a graphical animation is applied to gift message object 3920 when the content object is revealed. For example, as shown by the sequence of FIGS. 39E-39J, if gift message object 3920 is an envelope/letter (e.g., concealment object 3922 is the envelope and content object 3930 is the letter), the graphical animation involves gift message object 3920 being lifted and flipped (from showing the backside of the envelope to the front side of the envelope) within message conversation 3914 and, as the object is being flipped, concealment object 3922 (e.g., the envelope) being opened to reveal content object 3930 enclosed within concealment object 3922. Further, content object 3930 (e.g., the letter) is subsequently lifted from within concealment object 3922 and placed in front of the concealment element, thus fully showing the contents of the content object, as shown by John's Device in FIG. 39J.

FIG. 39J again illustrates, as shown in FIG. 39C, both electronic device 3900B (John's Device) and electronic device 3900A (Kate's Device). John's Device displays, in message conversation 3914 with message participant 3916 (Kate), gift message object 3920 after the gift payment has been opened by the recipient, John (via user selection 3903). As shown by John's Device in FIG. 39J, once the gift payment has been accepted, content object 3930 of gift message object 3920 is revealed from within concealment object 3922. Content object 3930 includes an amount indication 3932 showing the gift payment amount (e.g., $50), where the amount indication is displayed with a graphical effect (e.g., similar to amount indication 3640 described above with reference to FIG. 36R) because the gift payment has been accepted by the recipient, John (via user selection 2903).

In some examples, the graphical effect that is applied to amount indication 3932 of the opened gift message object is a dynamic visual feedback that includes a depth effect, as described with reference to FIGS. 33A-33O. In some examples, the graphical effect that is applied to amount indication 3932 of the opened gift message object is a dynamic visual effect that includes a coloring effect, as described with reference to FIGS. 33A-33O. In some examples, the graphical effect that is applied to amount indication 3932 of the opened gift message object is a dynamic visual effect includes a 3D effect, as described with reference to FIGS. 11A-11V and 33A-33O. In some embodiments, in addition to, or instead of, generating a dynamic visual effect, electronic device 3900B generates a dynamic haptic feedback (e.g., similar to the generated tactile output 3336 described with reference to, for example, FIGS. 33F-33H). In some embodiments, the generated feedback (e.g., visual feedback, haptic feedback) is caused (e.g., only) by an operating system program of the device and non-operating system programs of the device are not enabled to cause the feedback.

In some embodiments, after the gift payment has been accepted by the user (John) and the graphical animation (e.g., as illustrated in the sequence of FIGS. 39E-39J) has been played, electronic device 3900B (John's Device) displays a replay button 3936 for replaying the graphical animation corresponding to the opening of gift message object 3920 to reveal content object 3930 from within concealment object 3922.

Figure 39J:
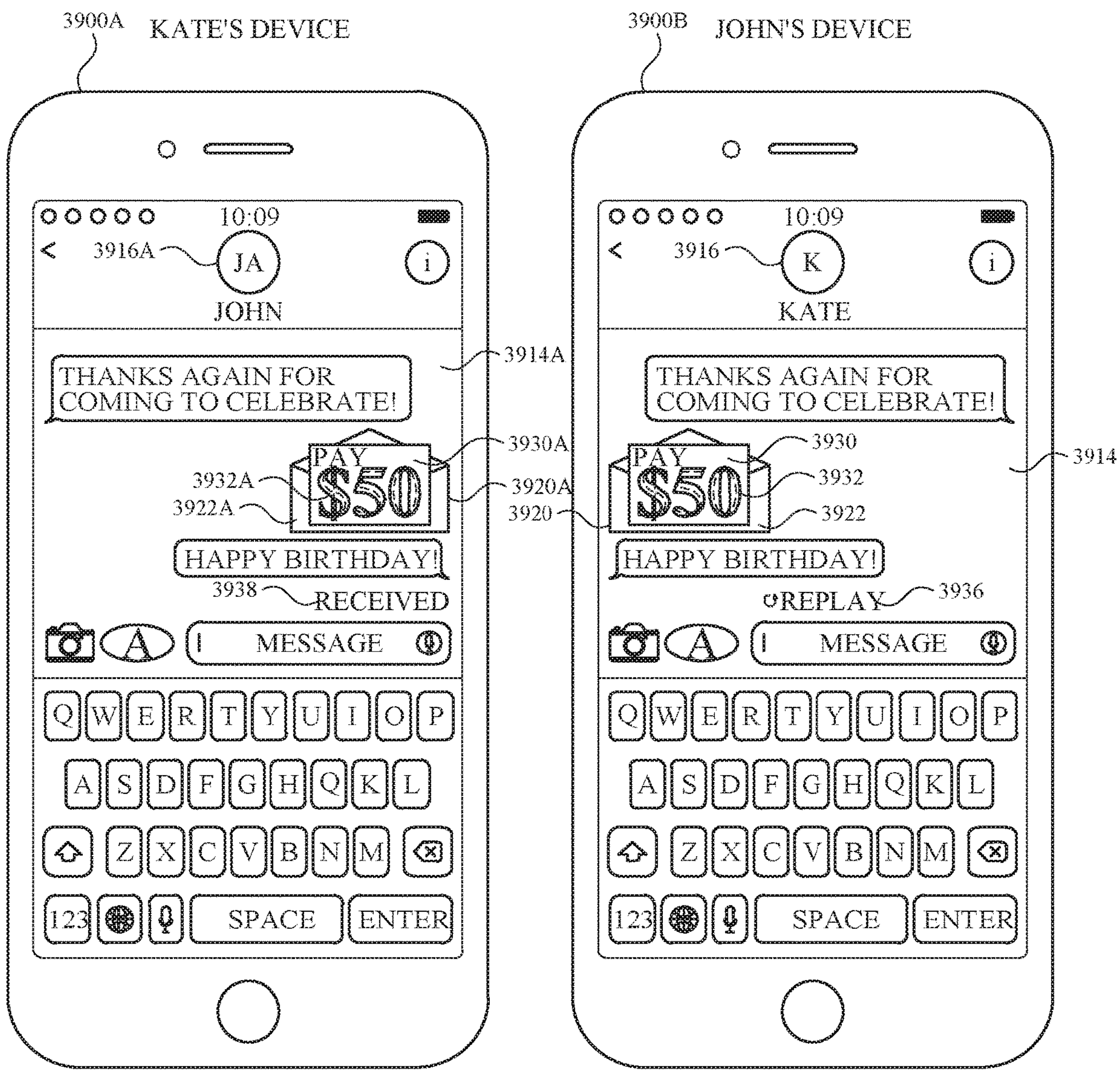

In FIG. 39J, Kate's Device displays, in message conversation 3914A (corresponding to message conversation 3914) an opened gift message object 3920A corresponding to the opened gift message object 3920 displayed in John's Device. In some embodiments, as shown in FIG. 39J, once the gift payment has been opened by the recipient (John), the content object of the corresponding gift message object is also revealed within the corresponding message conversation of the sender's device (Kate's Device, electronic device 3900A), thereby indicating to the sender (Kate) that the recipient (John) has opened the gift payment associated with the gift message object. Thus, as with gift message object 3920 displayed in message conversation 3914 of John's Device, gift message object 3920A displayed in message conversation 3914A of Kate's Device shows content object 3930A (corresponding to content object 3930) revealed from within concealment object 3922A (corresponding to concealment object 3922). Further, content object 3930A includes an amount indication 3932A (corresponding to amount indication 3932) that is displayed with a dynamic visual effect feedback (e.g., a depth effect and/or a coloring effect as described with reference to FIGS. 33A-33O, a 3D effect as described with reference to FIGS. 11A-11V). In some embodiments, in addition to, or instead of, generating the dynamic visual feedback, the device generates a dynamic haptic feedback (e.g., similar to the generated tactile output 3336 described with reference to, for example, FIGS. 33F-33H). In some embodiments, the generated feedback (e.g., visual feedback, haptic feedback) is caused (e.g., only) by an operating system program of the device and non-operating system programs of the device are not enabled to cause the feedback. In some embodiments, message conversation 3914A also includes a status indicator 3938 (e.g., stating "Received") indicating to the sender (Kate) that the sent gift payment associated with gift message object 3920A has been received and accepted by the recipient (John).

Figure 39K:
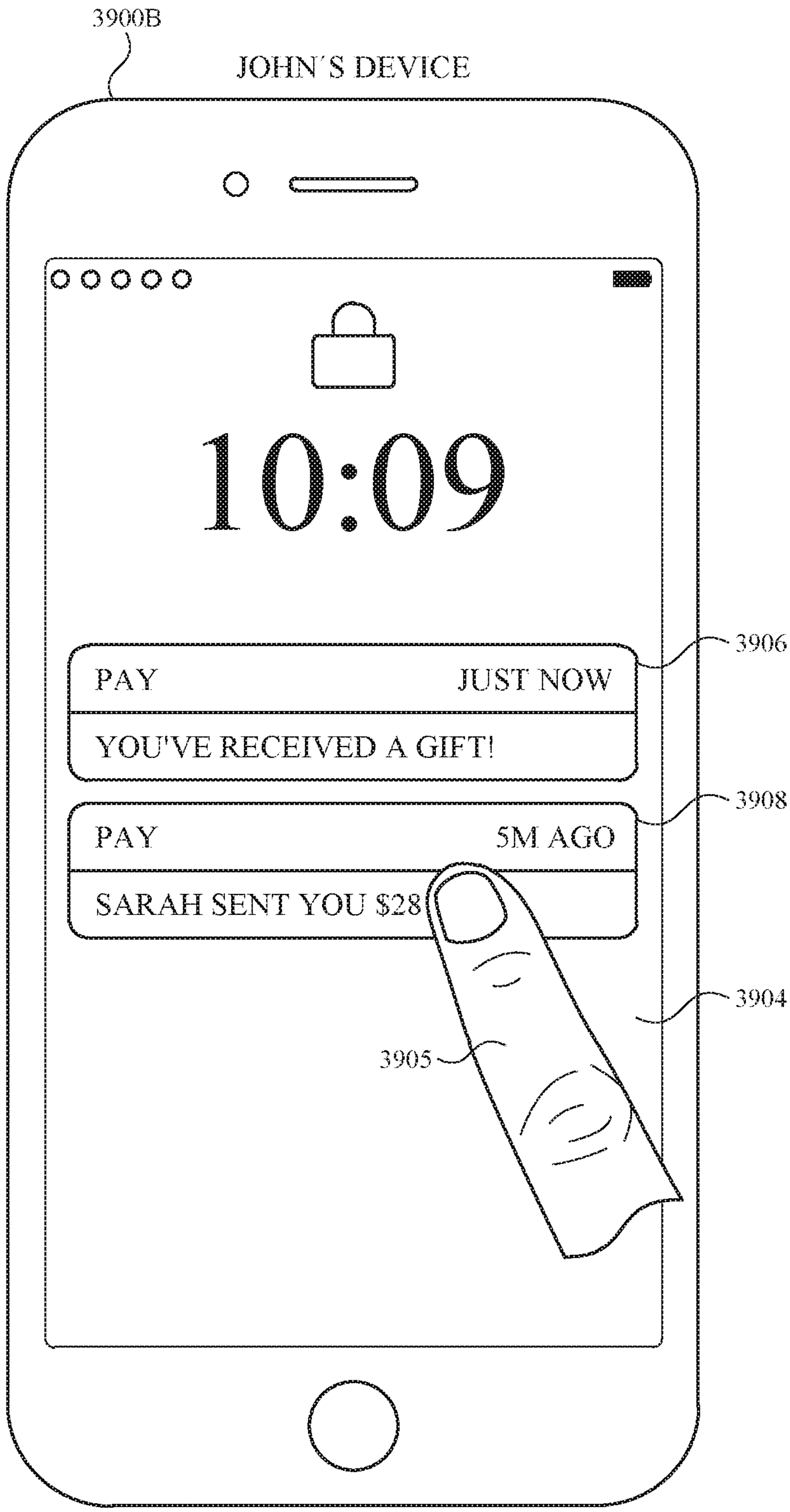

FIG. 39K illustrates electronic device 3900B (John's Device) again displaying lockscreen 3904, as first shown in FIG. 39A, where lockscreen 3904 is displaying gift notification 3906 (corresponding to the gift payment associated with gift message object 3920) and payment notification 3908 (e.g., corresponding to a regular, non-gift payment sent by Sarah in the amount of $28). In FIG. 39K, while displaying lockscreen 3904, electronic device 3900B detects (e.g., via a touchscreen of display 3902) a user selection 3905 (e.g., a tap gesture) of payment notification 3908.

Figure 39L:
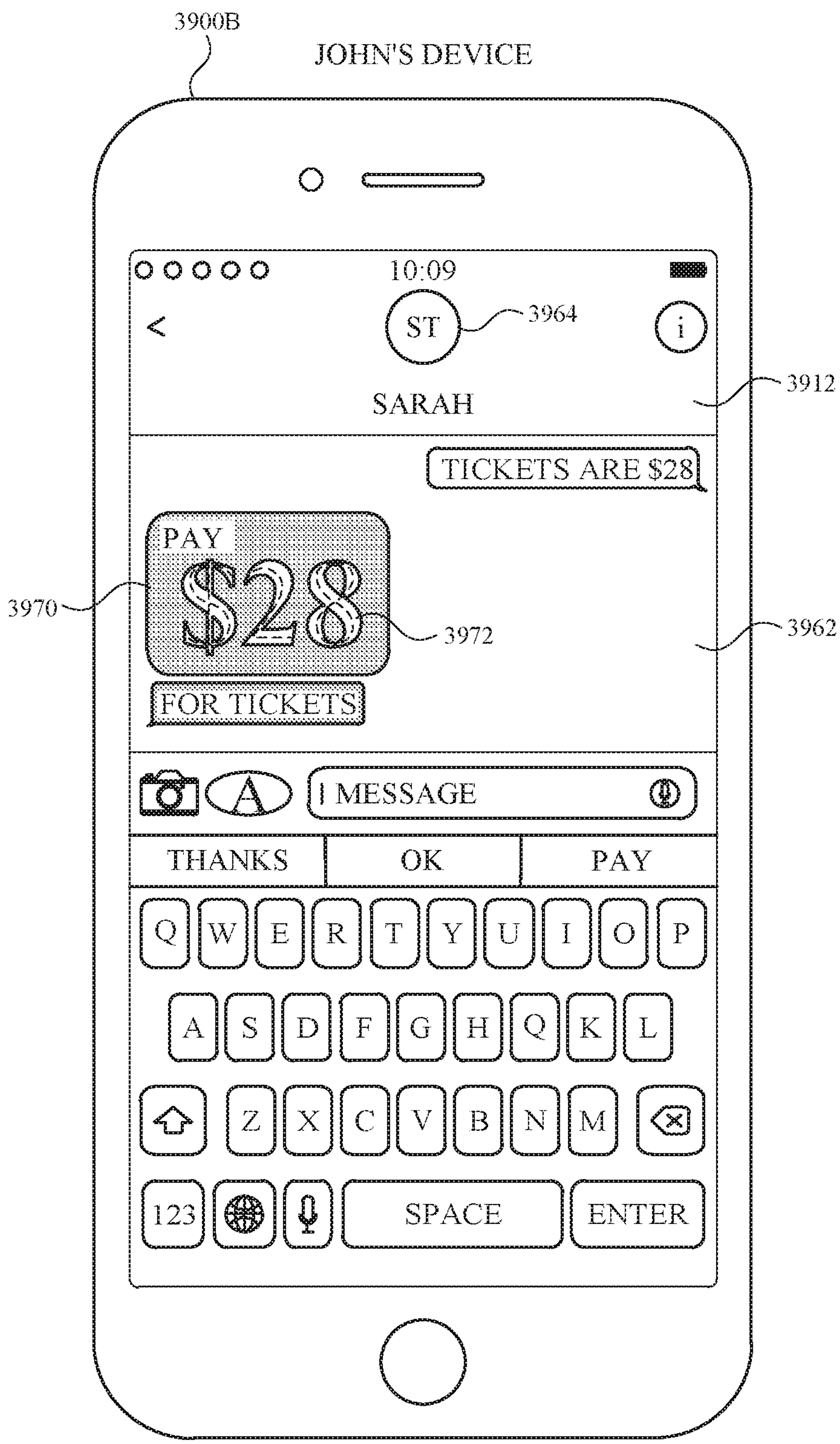

In FIG. 39L, in response to detecting user selection 3905 of payment notification 3908, electronic device 3900B (John's Device) displays a message conversation 3962 of messaging application 3912 with a message participant 3964 (e.g., "Sarah") corresponding to the sender of the payment associated with payment notification 3908. As shown in FIG. 39L, message conversation 3962 includes a payment message object 3970 corresponding to the payment (e.g., in the amount of $28) associated with payment notification 3908, where the payment has been made using a first-party application controlled (only) by the operating system (as opposed to a third-party application) of the device (e.g., similar to payment message object 866 described with reference to FIGS. 8X-8Z.) In some embodiments, if the sender of the payment (e.g., "Sarah") is a trusted contact of the user, the payment associated with payment notification 3908 is automatically accepted in response to user selection (e.g., user selection 3905) of the notification.

As shown in FIG. 39L, in some embodiments, once the payment is accepted by the recipient (John), an amount indication 3972 of payment message object 3970 is displayed with a dynamic visual effect (e.g., a depth effect and/or a coloring effect as described with reference to FIGS. 33A-33O, a 3D effect as described with reference to FIGS. 11A-11V). In some embodiments, in addition to, or instead of, generating the dynamic visual feedback, the device generates a dynamic haptic feedback (e.g., similar to the generated tactile output 3336 described with reference to, for example, FIGS. 33F-33H). In some embodiments, the generated feedback (e.g., visual feedback, haptic feedback) is caused (e.g., only) by an operating system program of the device and non-operating system programs of the device are not enabled to cause the feedback. In some embodiments, the payment is not automatically accepted in response to detecting user selection of payment notification 3908 (e.g., if the sender of the payment is not a trusted contact or a known contact). In such cases, the user must perform an additional step(s) (e.g., select payment message object 3970 once in message conversation 3962) to accept the payment associated with payment notification 3908 and payment message object 3970.

FIGS. 40A-40B are a flow diagram illustrating a method for managing a gift transfer in accordance with some embodiments. Method 4000 is performed at a device (e.g., 100, 300, 500, 3800B, 3900B) with a display (e.g., 3802, 3902) and one or more sensor devices (e.g., an accelerometer for detecting an orientation of the device, one or more cameras). Some operations in method 4000 are, optionally, combined, the orders of some operations are, optionally, changed, and some operations are, optionally, omitted.

As described below, method 4000 provides an intuitive way for managing peer-to-peer transactions. The method reduces the cognitive burden on a user for managing peer-to-peer transactions, thereby creating a more efficient human-machine interface. For battery-operated computing devices, enabling a user to manage peer-to-peer transactions faster and more efficiently conserves power and increases the time between battery charges.

The electronic device (e.g., 3800B, 3900B) displays (4002), on the display (e.g., 3802, 3902), a message user interface that includes at least a portion of a message conversation (e.g., 3814, 3914) between a user of the device and one or more other participants (e.g., 3817, 3917). Displaying the message user interface that includes at least the portion of the message conversation between the user of the device and one or more other participants provides visual feedback by allowing the user to easily view recent dialogue of the message conversation. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. While displaying the message user interface, the electronic device (e.g., 3800B, 3900B) receives (4004) a message.

In response to receiving the message, the electronic device (e.g., 3800B, 3900B) displays (4006) a representation of the message (e.g., 3820, 3920) in the message conversation (e.g., 3814, 3914). Displaying the representation of the message in the message conversation in response to receiving the message provides visual feedback by enabling the user to easily view the contents of the received message in the message conversation. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. While displaying the message user interface, the electronic device (e.g., 3800B, 3900B) receives (4004) a message.

Displaying the representation of the message (e.g., 3820, 3920) in the message conversation (e.g., 3814, 3914) includes, in accordance with a determination that the message is a first type of message and is sent with instructions to initially conceal respective content of the message (e.g., a gift message), displaying (4008), in the message conversation (e.g., 3814, 3914), a concealment element (e.g., 3822, 3922) that conceals (some or all of) the respective content of the message, where (at least a portion of) the concealment element is displayed with a dynamic visual effect (e.g., an iridescence effect, a 3D effect) that changes as an angle of the device relative to a reference point changes (e.g., a change in position of a user's face relative to the display of the device detected by a camera, a change in orientation of the device relative to a reference point detected by an accelerometer). Displaying the concealment element that conceals the respective content of the message provides visual feedback by indicating to the viewer that the message corresponds to a special type of message (e.g., a gift message). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, displaying the concealment element with the dynamic visual effect provides visual feedback to the viewer that the message corresponds to a special type of message (e.g., a message sent by a first-party application controlled by the operating system of the device, as opposed to a third-party application) that is secure, thus enhancing the operability of the device and making the user-device interface more secure (e.g., by reducing fraud when operating/interacting with the device).

In some examples, the visual effect is a coloring effect (e.g., as described with reference to FIGS. 33A-33O). In some examples, the visual effect is a depth effect (e.g., as described with reference to FIGS. 33A-33O). In some examples, the visual effect is a light shimmering effect (e.g., light "hitting" the surface of the graphical portion). In some examples, the visual effect is a "gloss" effect. In some examples, the concealment element includes a message (e.g., a note, a comment, such as "Lucky You!") and the visual effect is also applied to the message (e.g., stating "Lucky You!") on the first graphical portion (and not to other portions of the concealment element).

In some embodiments, subsequent to displaying the representation of the message (e.g., 3820, 3920) in the message conversation (e.g., 3814, 3914), in accordance with the determination that the message is the first type of message and is sent with instructions to initially conceal respective content of the message (e.g., a gift message), the electronic device (e.g., 3800B, 3900B) detects (4014), via the one or more input devices, a user input on the concealment element (e.g., 3820, 3920) of the representation of the message (e.g., at a location on a touch-sensitive surface corresponding to a display location of the representation of the message on a display).

In some embodiments, in response to detecting (4016) the user input on the concealment element (e.g., 3820, 3920), the electronic device (e.g., 3800B, 3900B) displays (4018), in the message conversation (e.g., 3814, 3914), a content element (e.g., 3830, 3930) that includes the respective content (e.g., 3832, 3932) of the message, where the dynamic visual effect (e.g., an iridescence effect, a 3D effect) is applied to (at least a portion of) the content element. Displaying, in the message conversation, the content element that includes the respective content of the message in response to detecting the user input on the concealment element provides visual feedback by allowing the viewer (e.g., the user, the recipient) to view the content of the message after performing a specific input. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the dynamic visual effect is applied only to the content of the message (e.g., 3832, 3932) on the content element (e.g., 3830, 3930). In some examples, in response to detecting the user input on the concealment element, in addition to displaying the content element, the device causes the first amount of the first type of item in an account to be added to an account (for storing items of the first type) associated with a user of the device. In some examples, the account is controlled by an operating system of the device and cannot be controlled by a third party application.

In some embodiments, further in response to detecting (4016) the user input on the concealment element (e.g., 3830, 3930), the electronic device (e.g., 3800B, 3900B) causes (4020) a corresponding dynamic visual effect (e.g., an iridescence effect, a 3D effect) to be applied to (at least a portion of) the corresponding content element (e.g., 3831, 3931) that includes the respective content of the message (e.g., 3833, 3933) displayed in a corresponding message conversation (e.g., 3815, 3915) of a second device (e.g., 3800A, 3900A, the sender's device). Causing the corresponding dynamic visual effect to be applied to the corresponding content element provides visual feedback to the viewer that the message corresponds to a special type of message (e.g., a message sent by a first-party application controlled by the operating system of the device, as opposed to a third-party application) that is secure, thus enhancing the operability of the device and making the user-device interface more secure (e.g., by reducing fraud when operating/interacting with the device). In some examples, the electronic device transmits instructions to indicate to the second device that the gift message has been opened, such as by detecting user input on the concealment element.

In some embodiments, the respective content of the message (e.g., 3832, 3932) includes an amount of a first type of item (e.g., resources, points, funds, photos, files), and, in response to detecting (4016) the user input on the concealment element (e.g., 3830, 3930), the electronic device (e.g., 3800B, 3900B) adds (4022) the amount of the first type of item to an account (e.g., a resource account, a points account, a payment account, a photo gallery account, a storage account) provisioned on the electronic device (e.g., 3800B, 3900B), where the account is associated with (and, optionally, corresponds to) the first type of item.

In some embodiments, displaying, in the message conversation (e.g., 3814, 3914), the content element (e.g., 3830, 3930) that includes the respective content of the message (e.g., 3832, 3932) comprises displaying a dynamic graphical animation of the concealment element (e.g., 3822, 3922) revealing the content element. Displaying the dynamic graphical animation of the concealment element revealing the content element provides visual feedback by allowing the viewer to recognize that the gift corresponding to the concealment and content elements are being opened. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the concealment element (e.g., 3822, 3922) is a graphical depiction of an envelope, the content element (e.g., 3830, 3930) is a graphical depiction of a letter enclosed by the envelope, and the dynamic graphical animation is a graphical animation of the envelope opening and the enclosed letter (at least partially) leaving the envelope. In some examples, the concealment element (e.g., 3822, 3922) is a graphical depiction of a gift box, the content element (e.g., 3830, 3930) is a graphical depiction of a gift item wrapped by the gift box, and the dynamic graphical animation is a graphical animation of the gift box unwrapping to at least partially reveal the wrapped gift item inside the gift box.

In some embodiments, subsequent to displaying, in the message conversation (e.g., 3814, 3914), the content element (e.g., 3830, 3930) that includes the respective content of the message (e.g., 3832, 3932), the electronic device (e.g., 3800B, 3900B) detects (4024), via the one or more input devices, user selection (e.g., activation) of a replay affordance (e.g., 3836, 3936). In some embodiments, in response to detecting (4026) the user selection of the replay affordance (e.g., 3836, 3936), the electronic device (e.g., 3800B, 3900B) reverts (4028) the content element (e.g., 3830, 3930) to be concealed by the concealment element and re-display (4030) the dynamic graphical animation of the concealment element (e.g., 3822, 3922) revealing the content element (e.g., 3830, 3930).

In some embodiments, the dynamic graphical animation is controlled by a first-party (e.g., operating system-controlled) application of the device and is prevented from being controlled by a non-first-party (e.g., third-party) application of the device. The dynamic graphical animation being controlled by the first-party application of the device (and prevented from being controlled by a non-first-party application of the device) provides visual feedback to the viewer that the associated gift was sent using a first-party application that is secure, thus enhancing the operability of the device and making the user-device interface more secure (e.g., by reducing fraud when operating/interacting with the device).

In some embodiments, the concealment element (e.g., 3822, 3922) corresponds to a graphical representation of an envelope and the content element (e.g., 3830, 3930) corresponds to a graphical representation of a letter corresponding to the envelope. In some embodiments, the concealment element (e.g., 3822, 3922) corresponds to a graphical representation of a gift box (or a gift box wrapping) and the content element (e.g., 3830, 3930) corresponds to a graphical representation of a gift item within the gift box. In some embodiments, once the content element that includes the respective content of the message is displayed, the content element cannot be re-concealed by the concealment element.

In some embodiments, further in accordance with the determination that the message is the first type of message and is sent with instructions to initially conceal the respective content of the message (e.g., 3832, 3932), the electronic device (e.g., 3800B, 3900B) displays (4032), in the message conversation (e.g., 3814, 3914), an indication that the message has not been viewed (e.g., that the message has not yet been opened by the recipient). Displaying the indication that the message has not been viewed in accordance with the determination that the message is the first type of message and is sent with instructions to initially conceal the respective content of the message provides visual feedback of a current status of the message. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, in response to (and after) the message being displayed (e.g., viewed), the indication that the message has not been viewed ceases to be displayed.

Displaying the representation of the message (e.g., 3820, 3920) in the message conversation (e.g., 3814, 3914) includes, in accordance with a determination that the message is the first type of message and was not sent with instructions to initially conceal the respective content of the message (e.g., a payment message that is not a gift message), displaying (4010), in the message conversation (e.g., 3814, 3914), the respective content of the message with the dynamic visual effect that changes as an angle of the device relative to the reference point changes. Displaying, in the message conversation, the respective content of the message with the dynamic visual effect that changes as an angle of the device relative to the reference point changes provides visual feedback that the message corresponds to a special type of message (e.g., a message sent by a first-party application controlled by the operating system of the device, as opposed to a third-party application) that is secure, thus enhancing the operability of the device and making the user-device interface more secure (e.g., by reducing fraud when operating/interacting with the device).

In some embodiments, the first type of message corresponds to a payment of an amount (e.g., from a message participant to the user of the device) and the respective content of the message (e.g., 3932) includes the amount. In some examples, the respective content of the message corresponds to the amount of the payment.

Displaying the representation of the message in the message conversation (e.g., 3814, 3914) includes, in accordance with a determination that the message is a second type of message, displaying (4012), in the message conversation (e.g., 3814, 3914), the respective content of the message without the dynamic visual effect. Displaying, in the message conversation, the respective content of the message without the dynamic visual effect provides visual feedback indicating that the message is not associated with a special type of message (e.g., a message corresponding to a payment) that requires enhanced security. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the dynamic visual effect is controlled by a first-party (operating system-controlled) application of the device and non-first-party (e.g., third-party) application on the device are prevented from generating visual effects that have similar characteristics to the dynamic visual effects (e.g., applications running in a messaging environment are not provided with device orientation data that is necessary to create an iridescent effect that responds to changes as an angle of the device relative to the reference point changes, so as to prevent non-first-party applications from creating misleading animations that appear to correspond to payments or other secure data). The dynamic visual effect being controlled by the first-party application of the device (and prevented from being controlled by a non-first-party application of the device) provides visual feedback that the associated gift was sent using a first-party application that is secure, thus enhancing the operability of the device and making the user-device interface more secure (e.g., by reducing fraud when operating/interacting with the device).

Note that details of the processes described above with respect to method 4000 (e.g., FIGS. 40A-40B) are also applicable in an analogous manner to the methods described above and below. For example, method 4000 optionally includes one or more of the characteristics of the various methods described above and below with reference to methods 900, 1200, 1500, 1800, 2100, 2400, 2700, 3000, 3400, 3700, 4300, 4600, and 4900. For example, a transfer (e.g., of a resource, of a file, of data storage, of a payment) made via a message conversation of a messaging application, as described in method 900, can be made as a gift transfer instead of a non-gift transfer. For another example, the applied visual effect (e.g., a 3D effect) for a completed transfer (e.g., of a resource, of a file, of data storage, of a payment), as described in method 1200, can be applied to a message object corresponding to a gift transfer when the gift transfer is received or opened by the recipient. For another example, providing for visually distinguishable message objects based on message designated, as described in method 1500, can be applied to gift messages to differentiate among different types of gift transfers (e.g., a surprise gift, a gift in response to a request, a gift made during a certain time of year). For another example, an activated account (e.g., a data storage account, a payment account), as described in method 1800, can be used to receive and/or transmit items (e.g., files, data storage, payment) as gifts via gift transfers. For another example, an account that is ready to be used in a transfer of items (e.g., files, data storage, funds), as described in method 2100, can use items obtained as a gift from another participant of a message conversation. For another example, when a transfer (e.g., of files, of data storage, of funds) is split between two different accounts, as described in method 2400, one or both of the accounts can use funds obtained via a gift transfer. For another example, a transfer history list, as described in method 2700, can include transfers received or sent as gift transfers. For another example, the voice activation used to make a transfer, as described in method 3000, can also be used to make a gift transfer. For another example, the dynamic visual feedback applied to a message object corresponding to an accepted transfer, as described in method 3400, can be applied to a message object corresponding to a gift transfer when the gift message object is opened to accepted by the recipient. For another example, making a transfer (e.g., of files, of data storage, of funds) as a gift transfer as opposed to a non-gift transfer, as described in method 3700, can determine the type of notification that is displayed for a received gift transfer. For another example, when a group account is created, as described in methods 4300, 4600, and 4900, the group account can be used to make a gift transfer or to receive a gift transfer. For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 40A-40B are, optionally, implemented by components depicted in FIGS. 1A-1B. For example, displaying operation 4002, receiving operation 4004, displaying operation 4006, displaying operation 4008, displaying operation 4010, and displaying operation 4012 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 41A-41D illustrate example user interfaces for creating and managing a group account, in accordance with some embodiments. As described in greater detail below, the techniques illustrated by the example user interfaces of FIGS. 41A-41D relate to the techniques illustrated by the example user interfaces illustrated in FIGS. 42A-42O.

Figure 41A:
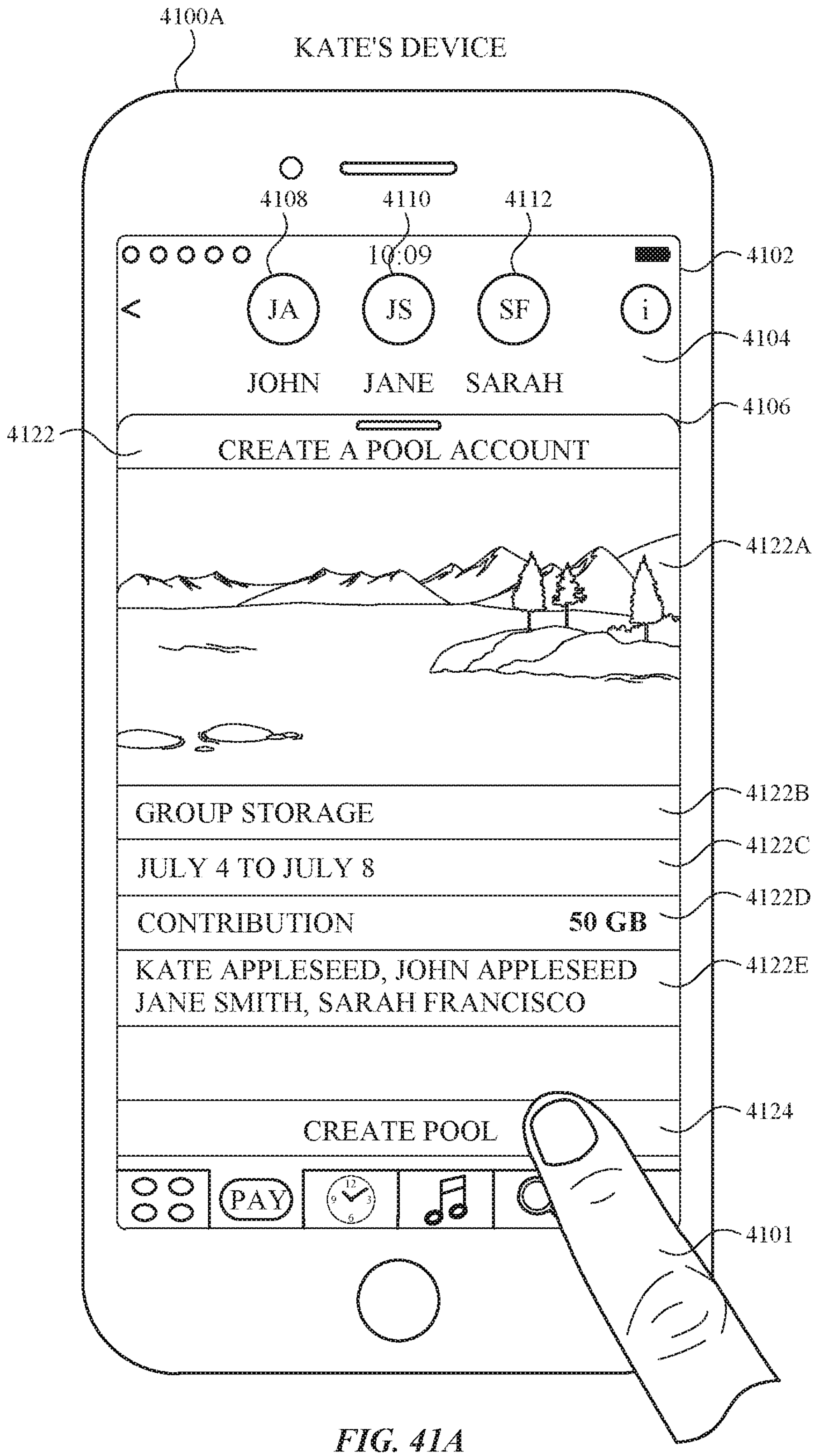

FIG. 41A illustrates an electronic device 4100A (e.g., portable multifunction device 100, device 300, or device 500). In the non-limiting example embodiment illustrated in FIGS. 41A-41D, electronic device 4100 is a smartphone. In other embodiments, electronic device 4200A can be a different type of electronic device, such as a wearable device (e.g., a smartwatch). Electronic device 4100A has a display 4102, a secure element, and one or more wireless communication radios.

In FIG. 41A, electronic device 4100A (e.g., belong to the user "Kate") displays, on display 4102, a pool account creation user interface 4122 over (at least a portion of) a group message conversation 4106 of a messaging application 4104 that includes the user (e.g., "Kate" in this non-limiting example embodiment), a message participant 4108 (e.g., "John" in this non-limiting example embodiment), a message participant 4110 (e.g., "Jane" in this non-limiting example embodiment), and a message participant 4112 (e.g., "Sarah" in this non-limiting example embodiment). In some embodiments, pool account creation user interface 4122 is used to create an (online) shared data storage account (e.g., a pool data storage account), where participants can contribute or use data storage from the shared data storage account.

As shown in FIG. 41A, pool account creation user interface 4122 includes an image region 4122S showing a representative image for the pool account selected by the creator (Kate), a name region 4122*b* (e.g., showing "Group Storage") indicating the name of the pool data storage account selected by the creator, a date region 4122C (e.g., showing July 4 to July 8) indicating the valid time period of the group storage account selected by the creator, a contribution region 4122D (e.g., showing "50 GB') indicating a contribution storage amount requested by the creator (to join the pool data storage account), a participants region 4122E (e.g., showing "Kate Appleseed, John Appleseed, Jane Smith, Sarah Francisco") indicating the participants selected to be invited to join the pool data storage account, and a create pool button 4124 for proceeding with creating the pool data storage account with the selected settings shown in regions 4122A-4122E.

In FIG. 41A, while displaying pool account creation user interface 4122 with the pool account settings selected as shown in regions 4122A-4122E, electronic device 4100A detects a user selection 4101 (e.g., a tap gesture) of create pool button 4124.

Figure 41B:
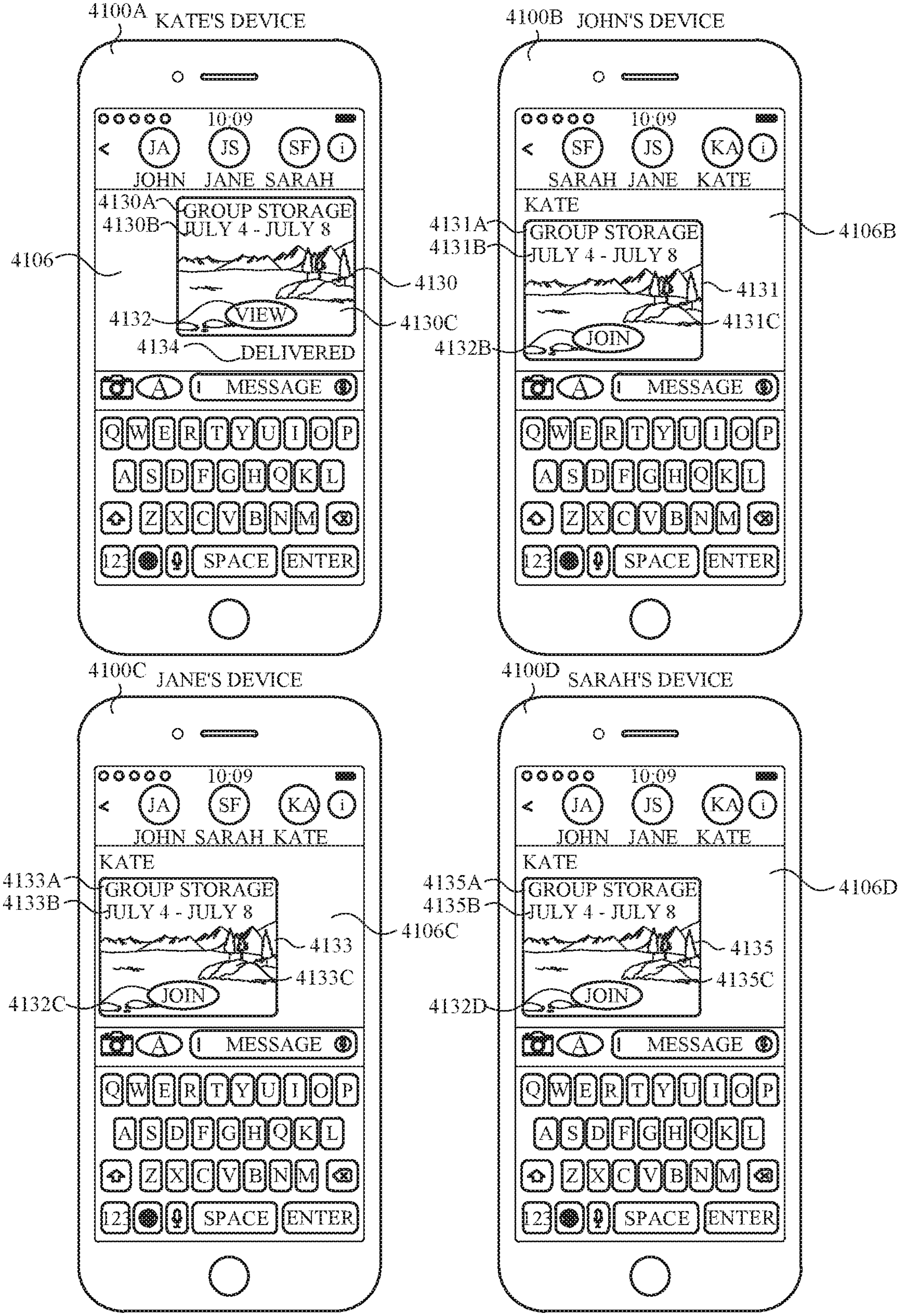
Figure 42A:
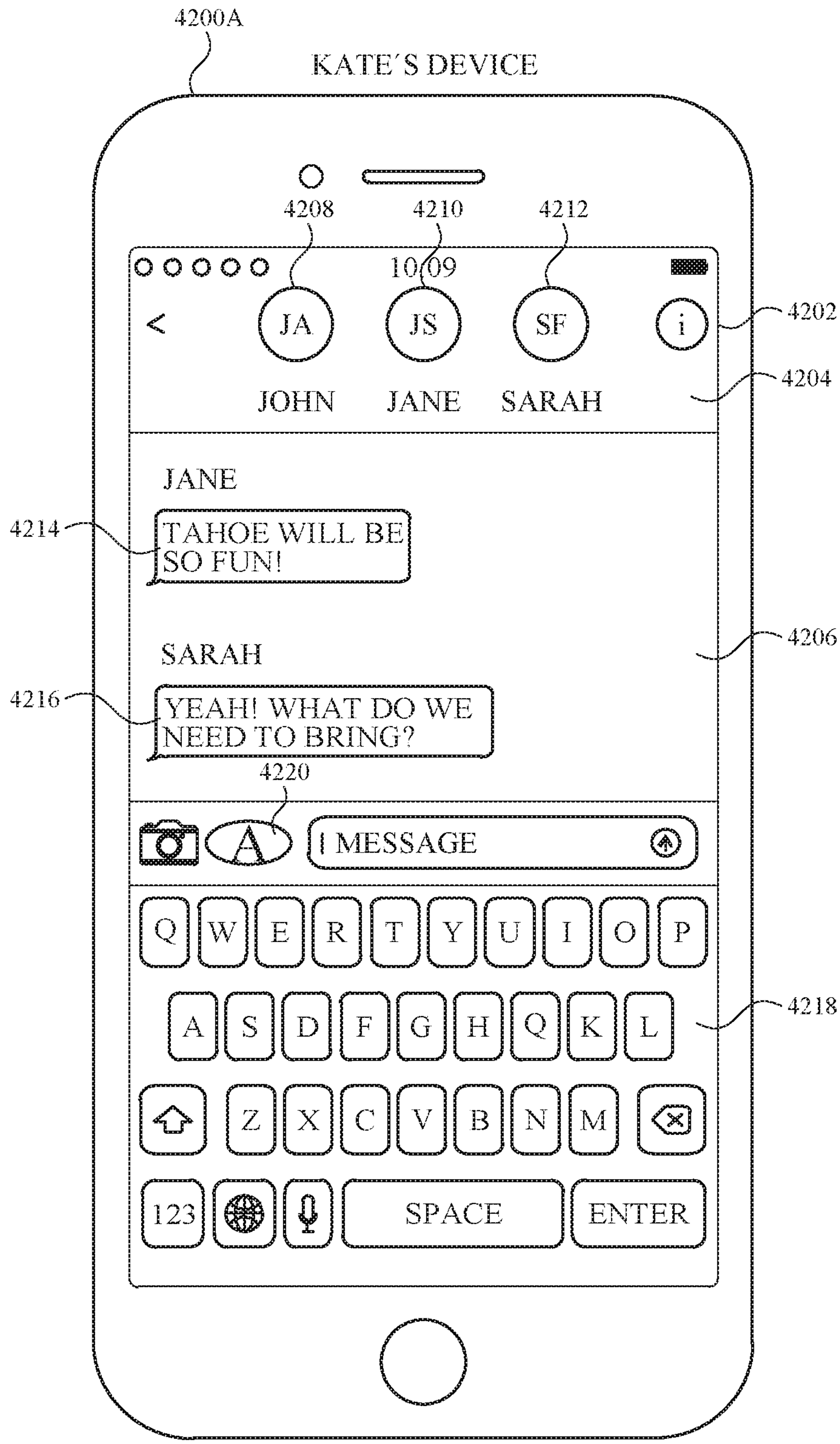
FIGS. 42A-42O illustrate example user interfaces for creating and managing a group account, in accordance with some embodiments.

FIG. 41B illustrates electronic devices 4100A-4100D, each corresponding to the device of Kate, John, Jane, and Sarah, respectively. Solely for the ease of description, electronic device 4200A (belonging to Kate) is referred to as Kate's Device, electronic device 4200B (belonging to John) is referred to as John's Device, electronic device 4200C (belonging to Jane) is referred to as Jane's Device, and electronic device 4200D (belonging to Sarah) is referred to as Sarah's Device when describing the example user interfaces of FIG. 41B.

As shown by Kate's Device in FIG. 41B, in response to detecting user selection 4101 of create pool button 4124, Kate's Device displays, within group message conversation 4106, a pool message object 4130 corresponding to the "Group Storage" pool account created using pool account user interface 4122 in FIG. 41A. Pool message object 4130 includes a name indication 4130A corresponding to the name of the pool account (e.g., "Group Storage") previously selected using pool account creation user interface 4122, a date indication 4130B corresponding to the valid time period (e.g., July 4-July 8) of the pool account previously selected using pool account creation user interface 4122, and a background image 4130C corresponding to the representative image of the pool account previously selected using pool account creation user interface 4122. Further, pool message object 4130 includes a view button 4132 for viewing a detailed settings page of the pool account. Further, a status indicator 4134 (e.g., stating "Delivered") is displayed within group message conversation 4106 indicating that gift message objects corresponding to gift message object 4130 has been sent to the intended recipients (John, Jane, and Sarah).

As shown by the four devices in FIG. 41B, as with Kate's Device displaying pool message object 4130 in group message conversation 4206, corresponding group message objects 4131, 4133, and 4135 are transmitted to and displayed in corresponding group message conversations of the devices of each of the invited participants (e.g., John, Jane, and Sarah).

That is, in John's Device, a pool message object 4131 is shown in a corresponding group message conversation 4106B, where group message conversation 4106B corresponds to group message conversation 4106 shown in Kate's Device, and pool message object 4131 of John's Device corresponds to pool message object 4230 of Kate's Device. Pool message object 4131 further includes a join button 4132B for joining the pool data storage account corresponding to pool message object 4131.

Similarly, in Jane's Device, a pool message object 4133 is shown in a corresponding group message conversation 4106C, where group message conversation 4106C corresponds to group message conversation 4106 shown in Kate's Device, and pool message object 4133 of Jane's Device corresponds to pool message object 4130 of Kate's Device. Pool message object 4133 further includes a join button 4132C for joining the pool account corresponding to pool message object 4133.

Similarly, in Sarah's Device, a pool message object 4135 is shown in a corresponding group message conversation 4106D, where group message conversation 4106D corresponds to group message conversation 4106 shown in Kate's Device, and pool message object 4135 of Sarah's Device corresponds to pool message object 4130 of Kate's Device. Pool message object 4135 further includes a join button 4132D for joining the pool account corresponding to pool message object 4135.

Figure 41C:
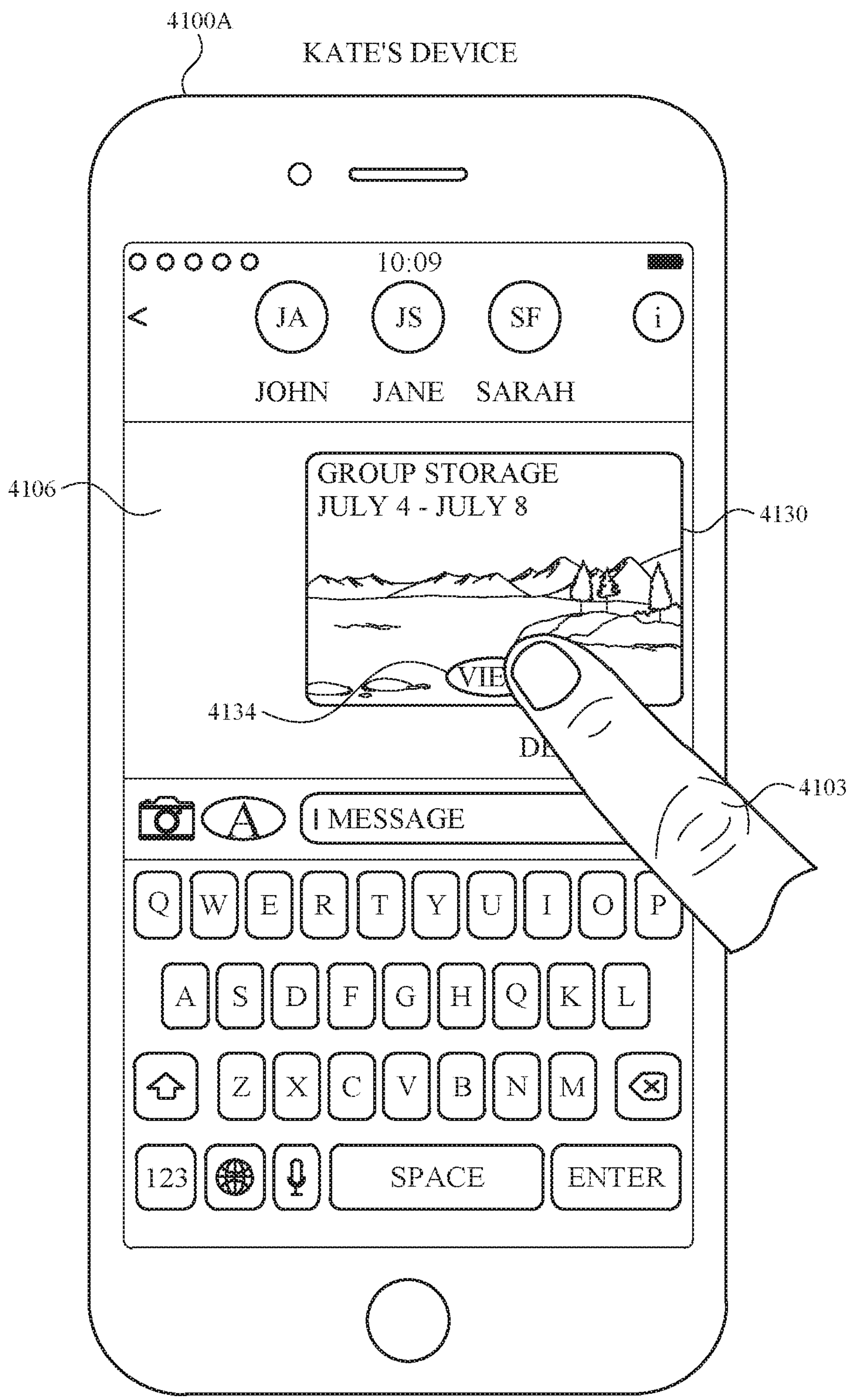
Figure 41D:
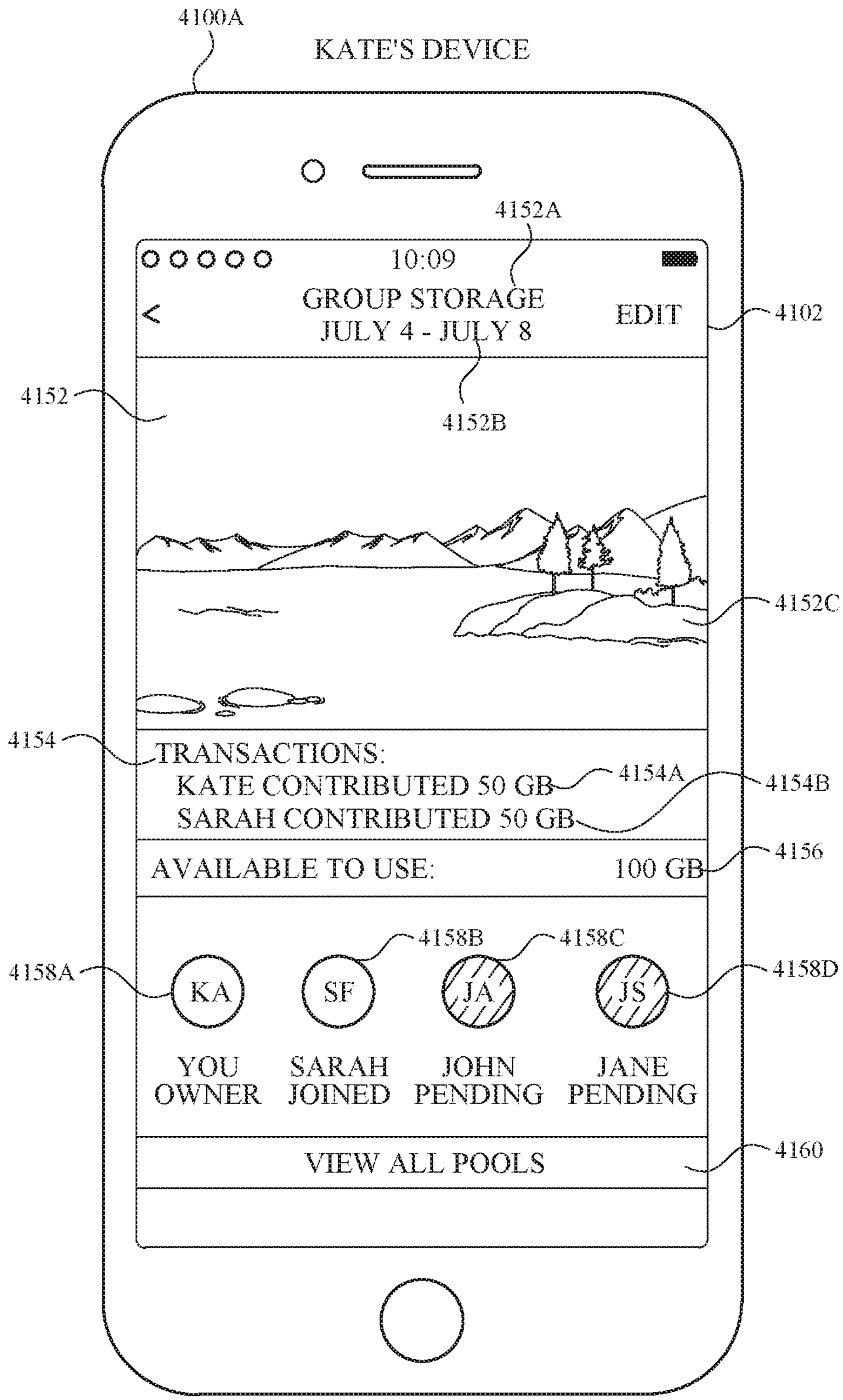

In FIG. 41C, while displaying pool message object 4130, electronic device 4100A detects a user selection 4103 (e.g., a tap gesture) of view button 4134 of pool message object 4130 in message conversation 4106. In FIG. 41D, in response to detecting user selection 4103 of view button 4134, electronic device 4100A displays (e.g., replaces display of group message conversation 4106 with a pool detail user interface 4152 that includes information regarding the pool data storage account corresponding to the selected pool message object.

In some embodiments, as shown in FIG. 41D, pool detail user interface 4152 includes a name region 4152A (e.g., showing "Group Storage") indicating the name of the pool account, a date region 4152B (e.g., showing "July 4 to July 8") indicating the valid time period during which data storage of the pool account can be used (e.g., for storing files), and an image region 4152C showing the representative image of the selected pool account (corresponding to image selected in image region 4122A of pool account creation user interface 4122).

In some embodiments, pool detail user interface 4152 also includes a usage region 4154 showing one or more past uses of data storage of the pool account and/or contributions of additional data storage made to the pool account. For example, usage region 4154 shows a first usage 4154A associated with a contribution made by Kate when Kate created the "Group Storage" pool account (e.g., as described in FIG. 41A). Usage region 4154 also shows a second usage 4154B associated with a contribution made by Sarah to join the "Group Storage" pool account.

In some embodiments, pool detail user interface 4152 also includes a balance indication 4156 (e.g., showing "100 GB") indicating the amount of data storage that is currently available for use in the pool account. For example, in FIG. 41D, because the "Group Storage" pool account currently only includes two contributions of 50 GB each (made by Kate and Sarah) and no other usages, balance indication 4156 shows a total available data storage of 100 GB. In some embodiments, pool detail user interface 4152 also includes a participants region 4158 indicating the pool participants (e.g., the owner or creator of the group account, participants that have joined the pool account, participants that have been invited to join but have not yet joined the pool account). For example, in FIG. 41D, Sarah has joined the pool account, and thus Sarah is shown as a "joined" member within participants region 4158, whereas John and Jane have not yet joined the pool account, and thus are shown as "pending" members of the pool account. In some embodiments, pool detail user interface 4152 includes a view pools button 4160 (e.g., stating "View All Pools") for viewing all of the pool accounts that the user of the device is currently a member.

The example user interfaces illustrated in FIGS. 41A-41D above relate to the example user interfaces illustrated in FIGS. 42A-42O below. In particular, the example user interfaces of FIGS. 41A-41D and the example user interfaces of FIGS. 42A-42O both relate to creating and managing a group account using an electronic device (e.g., 100, 300, 500, 4100A, 4200A), in accordance with some embodiments. Therefore, it is to be understood that the techniques described with reference to the example user interfaces of FIGS. 41A-41D and the techniques described with reference to the example user interfaces of FIGS. 42A-42O are both techniques that relate to similar concepts for creating and managing a group account.

As mentioned above, FIGS. 42A-42O illustrate example user interfaces for creating and managing a group account, in accordance with some embodiments. FIG. 42A illustrates an electronic device 4200A (e.g., portable multifunction device 100, device 300, or device 500). In the non-limiting example embodiment illustrated in FIGS. 42A-42O, electronic device 4200 is a smartphone. In other embodiments, electronic device 4200A can be a different type of electronic device, such as a wearable device (e.g., a smartwatch). Electronic device 4200A has a display 4202, a secure element, and one or more wireless communication radios.

In FIG. 42A, electronic device 4200A displays, on display 4202, a group message conversation 4206 of a messaging application 4204 (e.g., a first-party application controlled by the operating system of the device and not a third-party application) that includes the user (e.g., named "Kate" in this non-limiting example embodiment), a message participant 4208 (e.g., named "John" in this non-limiting example embodiment), a message participant 4210 (e.g., named "Jane" in this non-limiting example embodiment), and a message participant 4212 (e.g., named "Sarah" in this non-limiting example embodiment). Solely for the ease of description, the user of device electronic device 4200A is referred to as "Kate," message participant 4208 is referred to as "John," message participant 4210 is referred to as "Jane," and message participant 4212 is referred to as "Sarah" when describing the example user interfaces illustrated in FIGS. 42A-42O.

As shown in FIG. 42A, group message conversation 4206 includes a message object 4214 from Jane (e.g., stating "Tahoe will be so fun!") and a message object 4216 from Sarah (e.g., stating "Yeah! What do we need to bring?"). In some embodiments, while displaying group message conversation 4206, electronic device 4200A displays a virtual keyboard 4218 for inputting a message and an application button 4220.

Figure 42B:
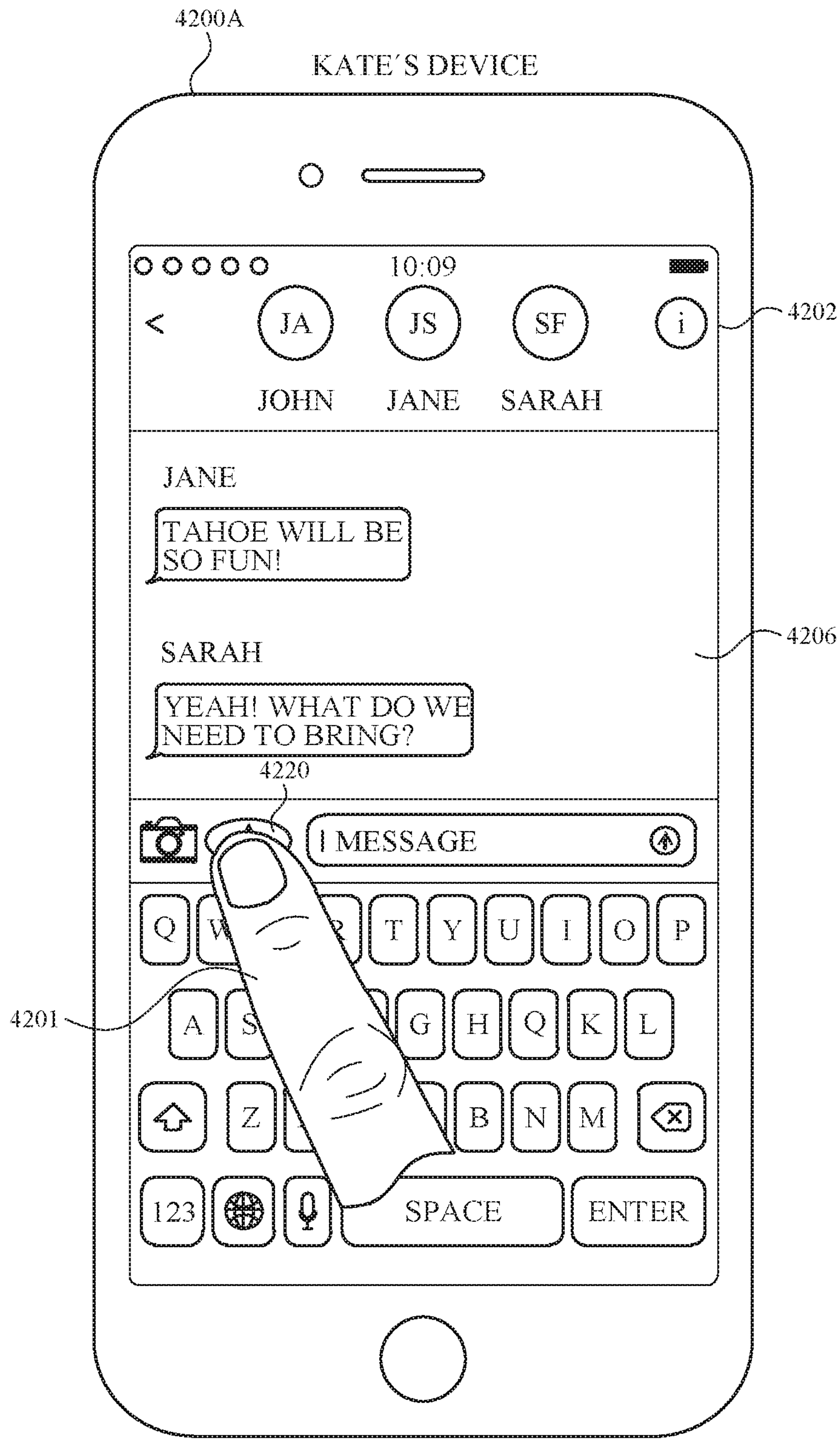
Figure 43A:
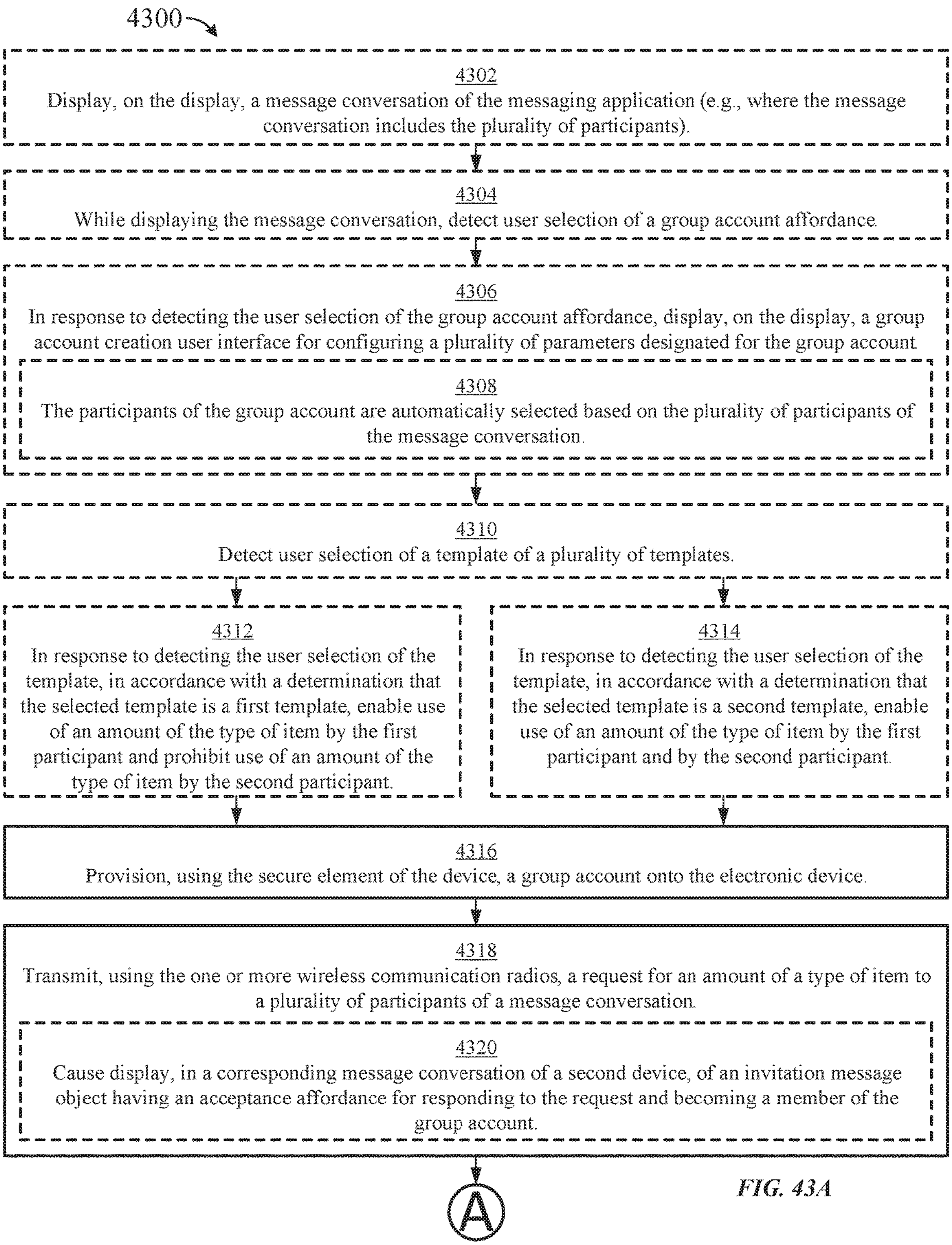
FIGS. 43A-43C are a flow diagram illustrating a method for creating and managing a group account, in accordance with some embodiments.
Figure 43B:
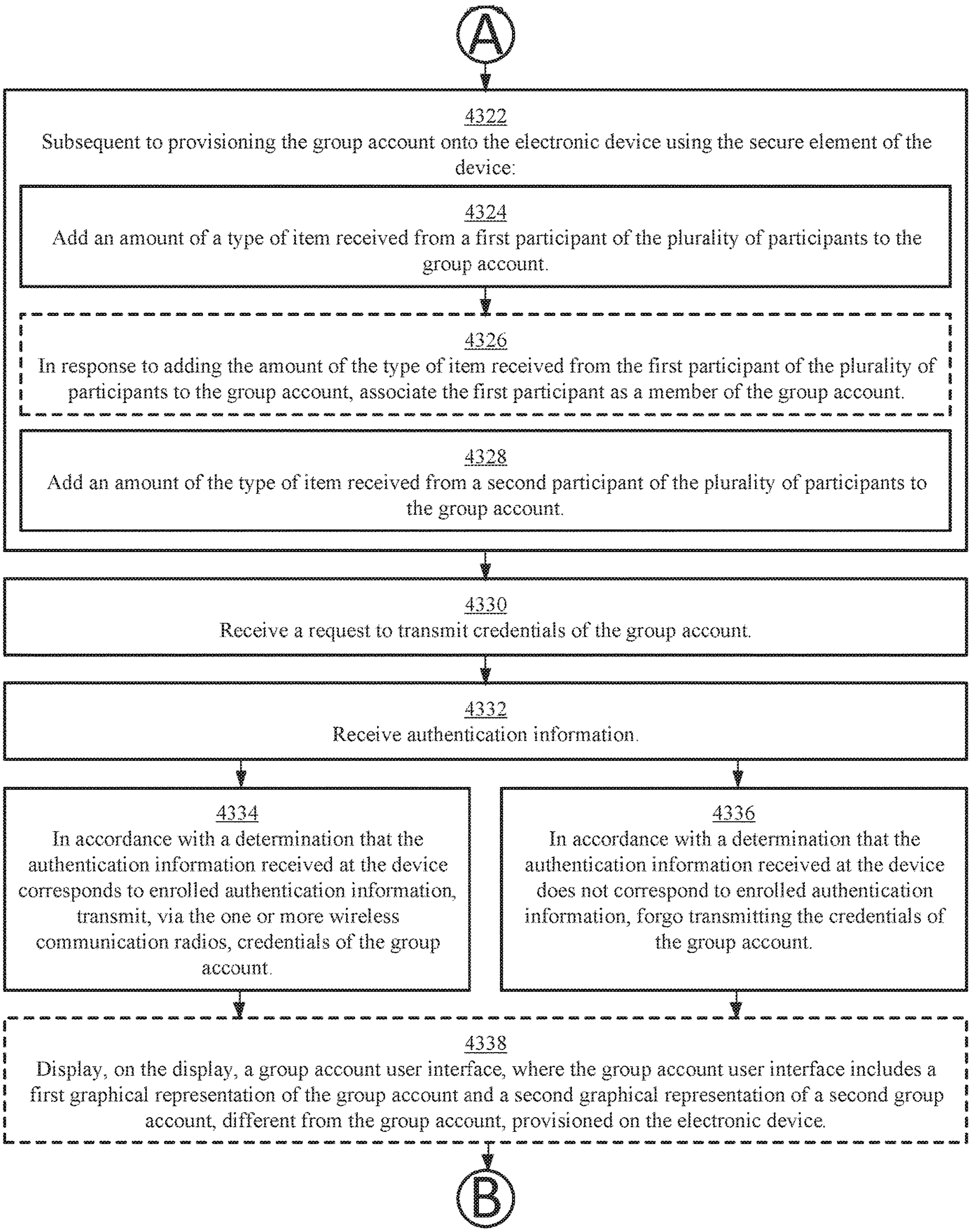
Figure 43C:

In FIG. 42B, while displaying group message conversation 4206, electronic device 4200A detects (e.g., via a touchscreen of display 4202) a user selection 4201 (e.g., a tap gesture) of application button 4220.

Figure 42C:
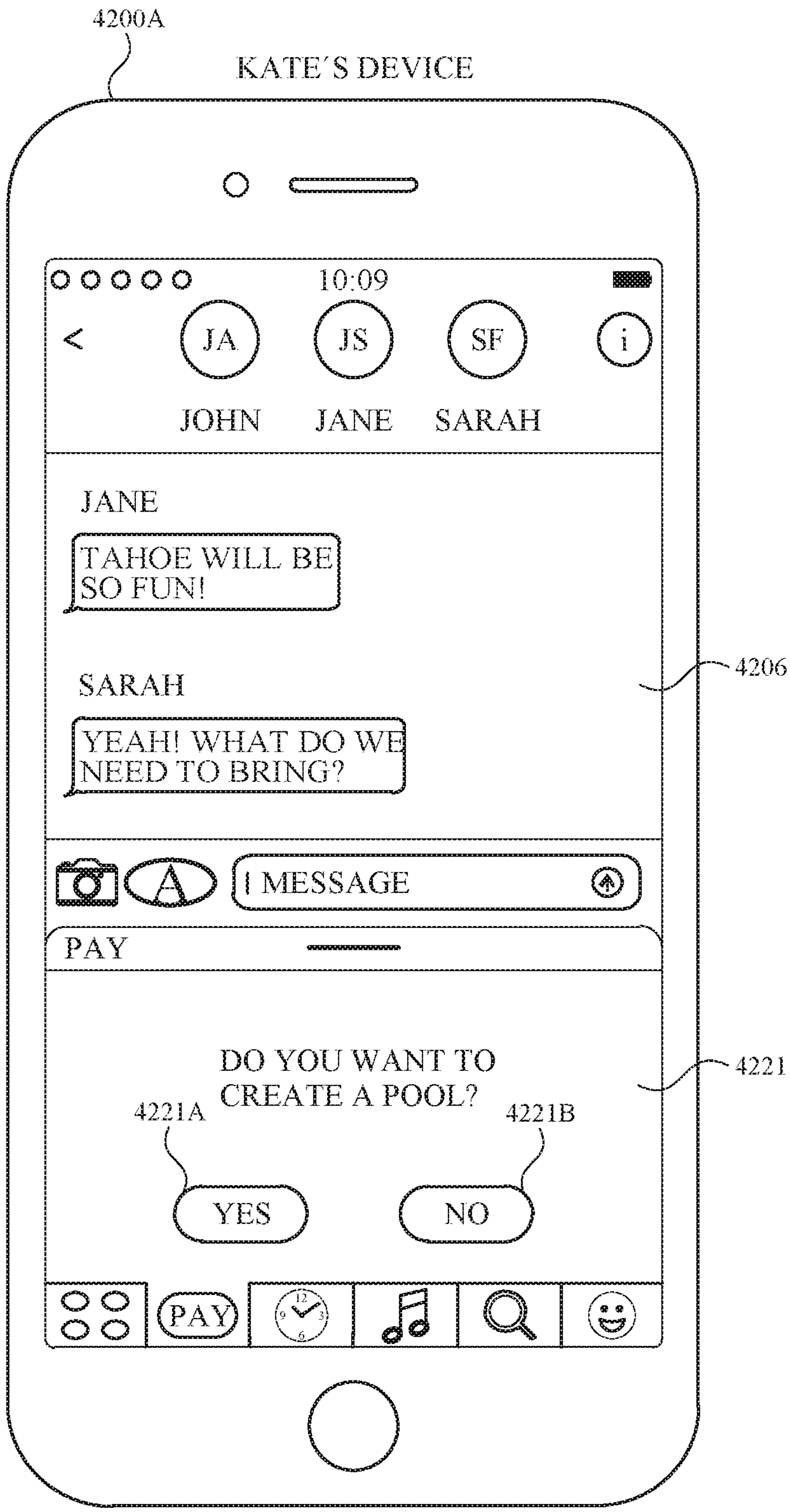

In FIG. 42C, in response to detecting user selection 4201 on application button 4220 while displaying group message conversation 4206, electronic device 4200A displays (e.g., by replacing display of virtual keyboard 4218 with) a pool account creation prompt 4221 asking the user (Kate) whether the user intends to create a pool account between the group message participants (Kate, John, Jane, and Sarah) of group message conversation 4206. As shown in FIG. 42C, pool account creation prompt 4221 includes a yes button 4221A for proceeding with creating the pool account and a no button 4221B for forgoing proceeding with creating the pool account.

Figure 42D:
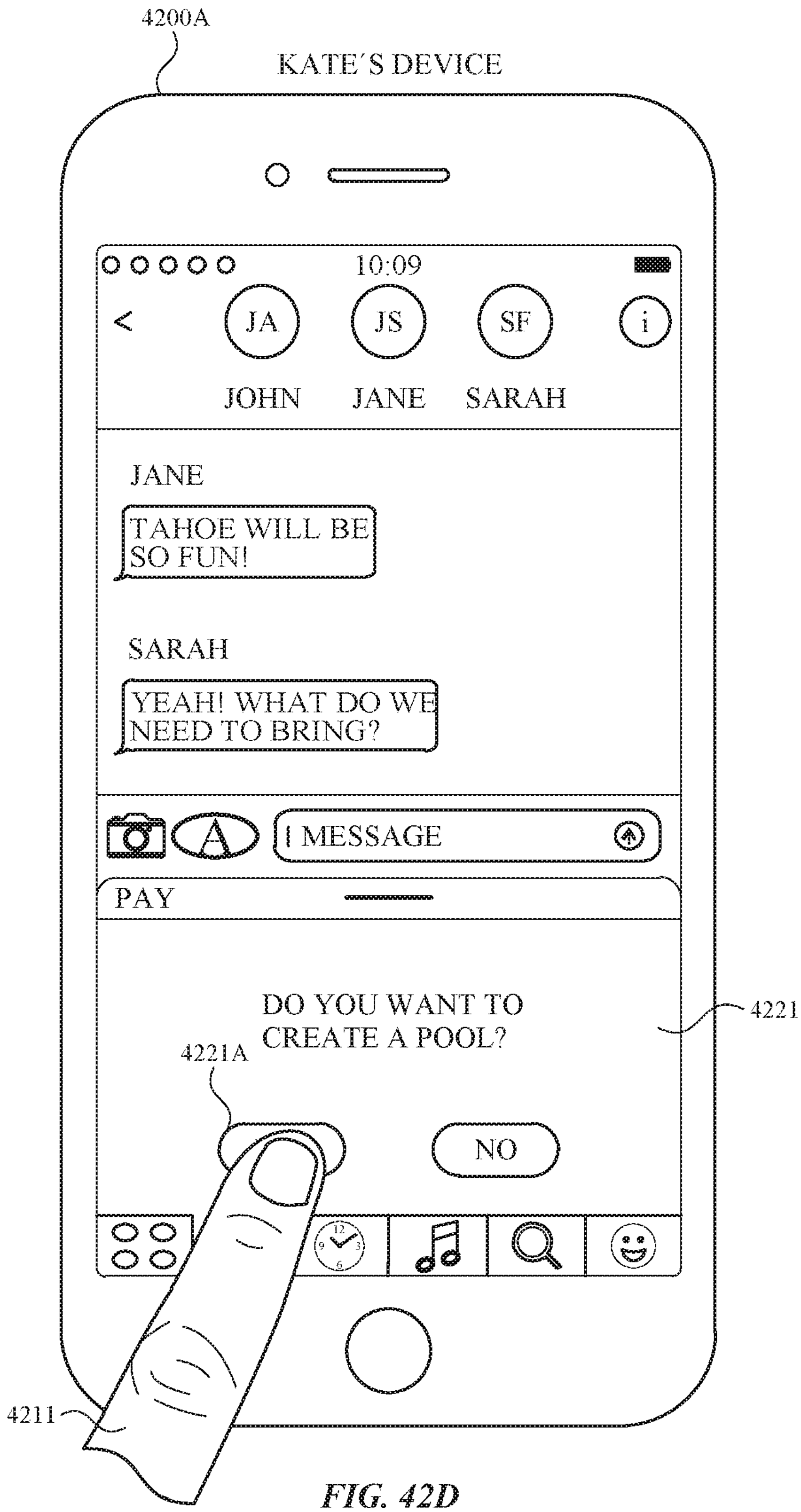

In FIG. 42D, while displaying pool account creation prompt 4221, electronic device 4200A detects (e.g., via a touchscreen of display 4202) a user selection 4211 (e.g., a tap gesture) of yes button 4221A for proceeding with creating the pool account.

Figure 42E:
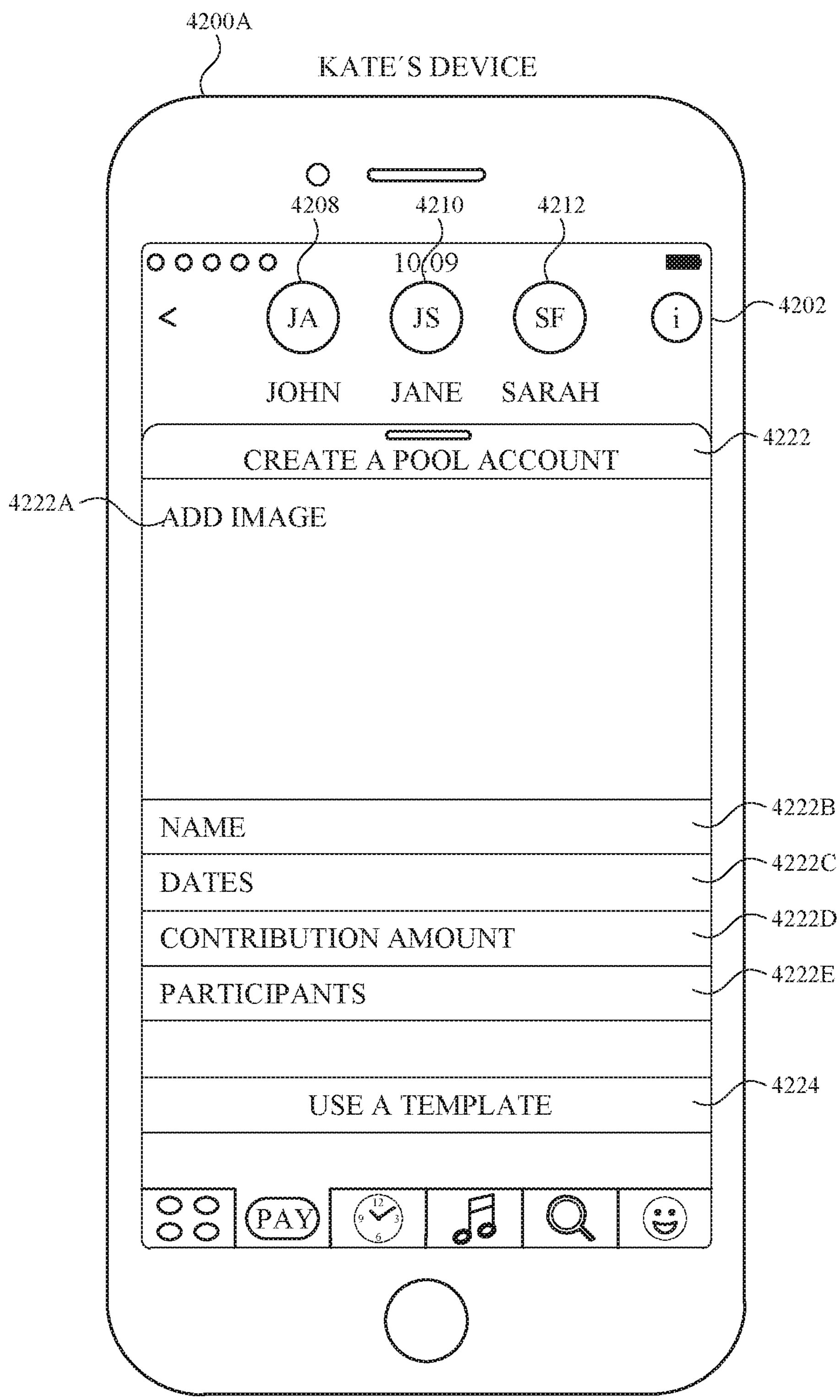

In FIG. 42E, in response to detecting user selection 4221, electronic device 4200A displays, on display 4202, a pool account creation user interface 4222 for creating a pool account. In some examples, as shown in FIG. 42E, pool account creation user interface 4222 is displayed (at least partially) over group message conversation 4206. In some examples, as shown in FIG. 42E, at least a portion of the group message participants (e.g., message participant 4208, message participant 4210, and message participant 4212) shown in messaging application 4204 remain visible while pool account creation user interface 4222 is displayed.

Pool account creation user interface 4222 includes a plurality of regions corresponding to settings of the pool account that is being created. In some embodiments, as illustrated in FIG. 42E, pool account creation user interface 4222 includes an image region 4222A (e.g., for adding a representative image of the pool account), a name region 4222B (e.g., for entering a name of the pool account), a dates region 4222C (e.g., for entering a valid time period of the pool account during which the pool account is active and not expired), a contribution amount region 4222D (e.g., for entering a contribution amount requested to selected invitees of the pool account), and a participants region 4222E (e.g., showing the currently-selected invitees of the pool account).

In some embodiments, not every pool participant is authorized to make a payment transaction using the pool account, and not every pool participant is authorized to make a contribution to the pool account. That is, in some embodiments, some (but not all) participants of the pool account are designated as authorized fund users and/or some (but not all) participants of the pool account are designated as authorized fund contributors. In some embodiments, pool account creation user interface 4222 also includes an authorized user region for separately selecting the users who are authorized to use the pool account to make a payment transaction (e.g., authorized fund users) once it has been created (e.g., if not all of the pool participants are to be authorized to use the pool account to make a payment transaction). In some embodiments, pool account creation user interface 4222 also includes a contributing user region for separately selecting the pool participants that are authorized to make contributions (e.g., authorized fund contributors) to the pool account.

In some embodiments, as also illustrated in FIG. 42E, pool account creation user interface 4222 further includes a template button 4224 (e.g., stating "Use a Template") for selecting a template from a plurality of available pre-existing templates, where a template includes a set of default account settings (e.g., default image, default name, default dates, default contribution amount, default participants, default authorized fund users, default authorized fund contributors).

Figure 42F:
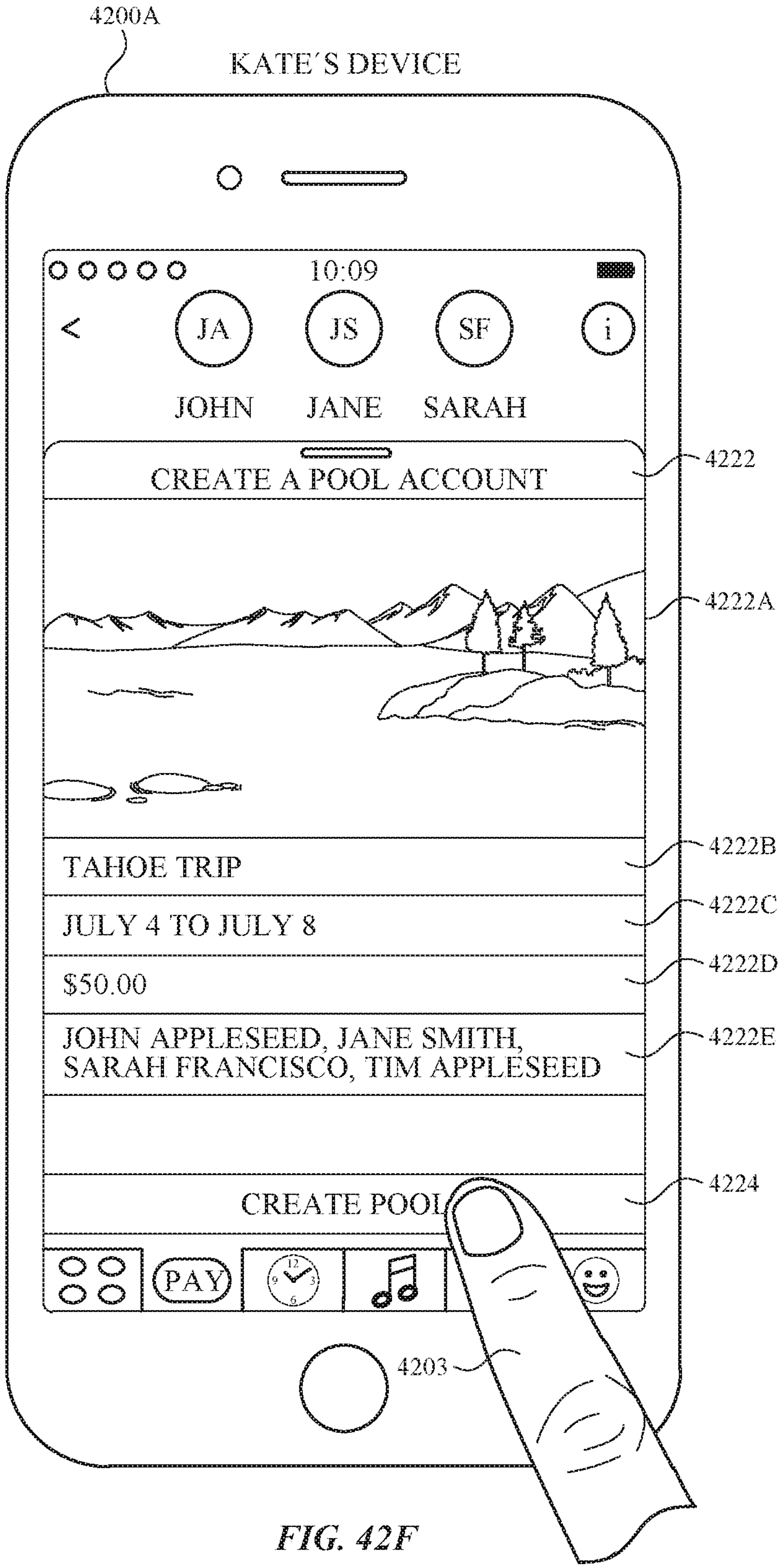

FIG. 42F shows electronic device 4200A displaying pool account creation user interface 4222 with regions 4222A-4222E entered and/or selected. As shown in FIG. 42F, image region 4222A shows a representative image selected for the pool account, name region 4222B shows a name (e.g., stating "Tahoe Trip") selected for the pool account, dates region 4222C shows a date range (e.g., July 4 to July 8) selected for the pool account, contribution region 4222D shows a requested contribution amount (e.g., "$50") selected for the pool account (e.g., a payment amount initially requested to be contributed by each invitee to the pool account in order to join the pool account), and participants region 4222E shows the invited pool participants (Kate, John, Jane, and Sarah).

In some embodiments, the invited pool participants (e.g., as shown in participants region 4222E) is entered and/or selected manually by the user. In some embodiments, the invited pool participants are automatically (e.g., without user input) selected based on participants of the background group message conversation (e.g., group message conversation 4206). Thus, in FIG. 42F, in some embodiments, because participants of group message conversation 4206 are Kate, John, Jane, and Sarah, the pool participants are automatically displayed to include Kate, John, Jane, and Sarah in participants region 4222E.

In some embodiments, in response to detecting that at least a portion (or all) of the settings have been entered and/or selected, electronic device 4200A displays in pool account creation user interface 4222 a create pool button 4225, as shown in FIG. 42F. In some examples, create pool button 4225 replaces template button 4224. In FIG. 42F, electronic device 4200A detects (e.g., via a touchscreen of display 4202) a user selection 4203 (e.g., a tap gesture) of create pool button 4225 for creating the pool account (e.g., the "Tahoe Trip" pool account).

In some embodiments, in response to detecting user selection 4203 creating the pool account (e.g., the "Tahoe Trip" pool account), the requested contribution amount (e.g., in the amount of $50, as indicated by contribution region 4222D) is automatically withdrawn from an account associated with the user (Kate) and added to the pool account. In some embodiments, prior to adding the contribution amount from the user's (Kate's) account to the pool account, electronic device 4200A requests user authentication (e.g., via biometric authentication, such as fingerprint authentication, facial recognition authentication, iris/retina scan authentication or via password/passcode authentication), and the funds (e.g., in the amount of $50) are contributed form the user's account to the pool account if the requested authentication is successful.

Figure 42G:
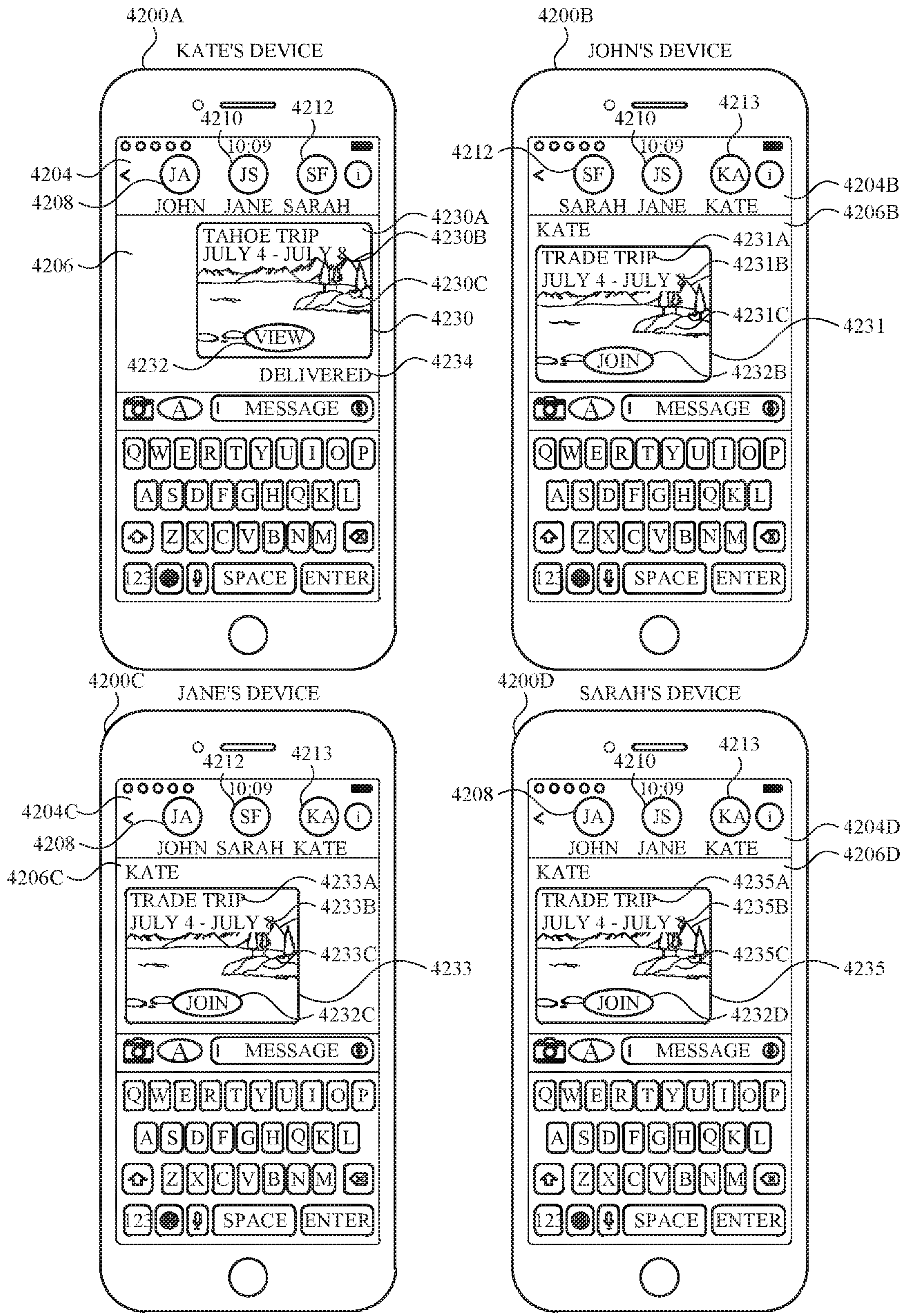

FIG. 42G illustrates electronic devices 4200A-4200D, each corresponding to the device of Kate, John, Jane, and Sarah, respectively. Solely for the ease of description, electronic device 4200A (belonging to Kate) is referred to as Kate's Device, electronic device 4200B (belonging to John) is referred to as John's Device, electronic device 4200C (belonging to Jane) is referred to as Jane's Device, and electronic device 4200D (belonging to Sarah) is referred to as Sarah's Device.

As shown by Kate's Device in FIG. 42G, in response to detecting user selection 4203 of create pool button 4225, Kate's Device displays, within group message conversation 4206, a pool message object 4230 corresponding to the "Tahoe Trip" pool account created using pool account user interface 4222 in FIG. 42F. pool message object 4230 includes a name indication 4230A corresponding to the name of the pool account (e.g., "Tahoe Trip") previously selected using pool account creation user interface 4222, a date indication 4230B corresponding to the active date range (e.g., July 4-July 8) of the pool account previously selected using pool account creation user interface 4222, and a background image 4230C corresponding to the representative image of the pool account previously selected using pool account creation user interface 4222. Further, pool message object 4230 includes a view button 4232 for viewing a detailed settings page of the pool account. Further, a status indicator 4234 (e.g., stating "Delivered") is displayed within group message conversation 4206 indicating (Kate) that gift message objects corresponding to gift message object 4230 has been sent to the intended recipients (John, Jane, and Sarah).

As shown by the four devices in FIG. 42G, in response to detecting user selection 4203 of create pool button 4225, in addition to Kate's Device displaying pool message object 4230 in group message conversation 4206, corresponding group message objects 4231, 4233, and 4235 are transmitted to ad displayed in corresponding group message conversations of the devices of each selected participant (e.g., John, Jane, and Sarah). That is, in John's Device, a pool message object 4231 is shown in a group message conversation 4206B, where group message conversation 4206B shown in John's Device corresponds to group message conversation 4206 shown in Kate's Device, and pool message object 4231 shown in John's Device corresponds to pool message object 4230 shown in Kate's Device. Pool message object 4231 further includes a join button 4232B for joining the pool account corresponding to pool message object 4231. Similarly, in Jane's Device, a pool message object 4233 is shown in a group message conversation 4206C, where group message conversation 4206C shown in Jane's Device corresponds to group message conversation 4206 shown in Kate's Device, and pool message object 4233 shown in Jane's Device corresponds to pool message object 4230 shown in Kate's Device. Pool message object 4233 further includes a join button 4232C for joining the pool account corresponding to pool message object 4233. Similarly, in Sarah's Device, a pool message object 4235 is shown in a group message conversation 4206D, where group message conversation 4206D shown in Sarah's Device corresponds to group message conversation 4206 shown in Kate's Device, and pool message object 4235 shown in Sarah's Device corresponds to pool message object 4230 shown in Kate's Device. Pool message object 4235 further includes a join button 4232D for joining the pool account corresponding to pool message object 4235.

Figure 42H:
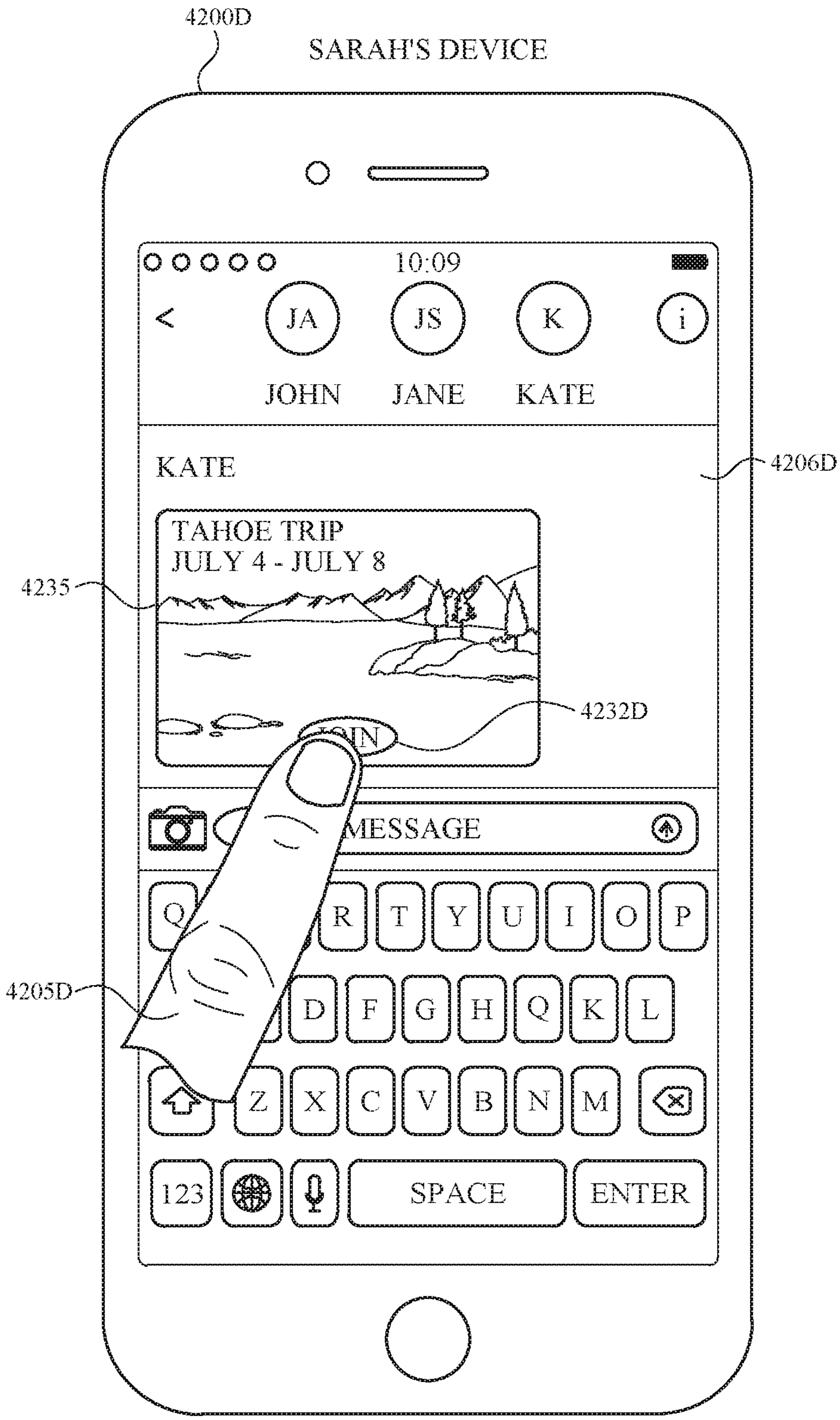

FIG. 42H illustrates, as FIG. 42G, Kate's Device, John's Device, Jane's Device, and Sarah's Device, each displaying the corresponding pool message object 4230, 4231, 4233, and 4235, respectively. As shown in FIG. 42H, while displaying pool message object 4325 in message conversation 4206D on Sarah's Device, Sarah's Device detects (e.g., via a touchscreen of the display of the device) a user selection 4205D of join button 4232D of pool message object 4235 (corresponding to pool message objects 4230, 4231, and 4233). John's Device and Jane's Device does not detect a similar user selection. By selecting join button 4232D of pool message object 4235, Sarah has joined the pool account corresponding to pool payment message 4230, whereas John and Jane has not yet joined the pool account.

In some embodiments, the invitee must make the requested contribution to join the pool account. For the "Tahoe Trip" pool account, the requested contribution is $50 (as selected using pool account creation user interface 4222 and shown in FIG. 42F). In some embodiments, in response to detecting user selection 4205D on join button 4232D of pool message object 4235 on Sarah's Device, the requested contribution amount (e.g., of $50) is automatically transmitted from a designated personal account of Sarah to the pool account (and thus is contributed to the pool account). In some embodiments, the requested contribution amount is automatically transmitted from Sarah's personal designated account to the pool account only if the pool account creator (Kate) is a trusted contact stored on Sarah's Device or if all participants of the group message conversation (Kate, John, and Jane) are trusted contacts stored on the Sarah's Device. In some embodiments, prior to transmitting the contribution amount from Sarah's account to the pool account, Sarah's Device requests user authentication (e.g., via biometric authentication, such as fingerprint authentication, facial recognition authentication, iris/retina scan authentication or via password/passcode authentication), and the funds (e.g., in the amount of $50) are contributed form Sarah's designated personal account to the pool account if the requested authentication is successful.

Figure 42I:
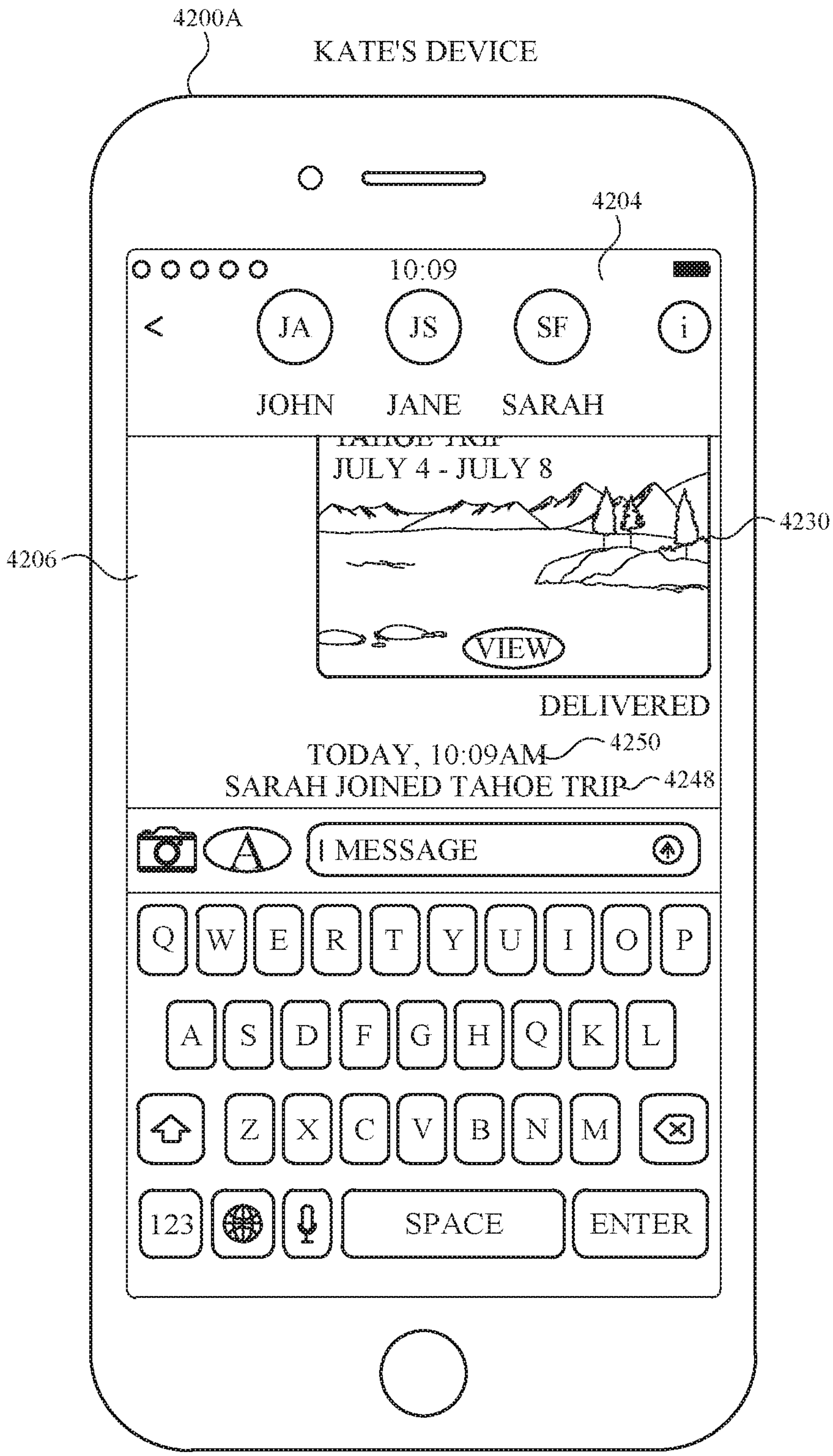

In FIG. 42I, subsequent to Sarah's Device detecting user selection 4205D on join button 4232D of pool message object 4235, electronic device 4200A (Kate's Device) displays, in group message conversation 4206, a notification 4248 (e.g., stating "Sarah joined Tahoe Trip") indicating (Kate) that Sarah joined the Tahoe Trip pool account and a corresponding time stamp 4250 (e.g., stating the date and time of when Sarah joined the pool account). Because both John and Jane are yet to join the pool account, electronic device 4200A (Kate's Device) does not display a notification that either has joined the pool account.

Figure 42J:
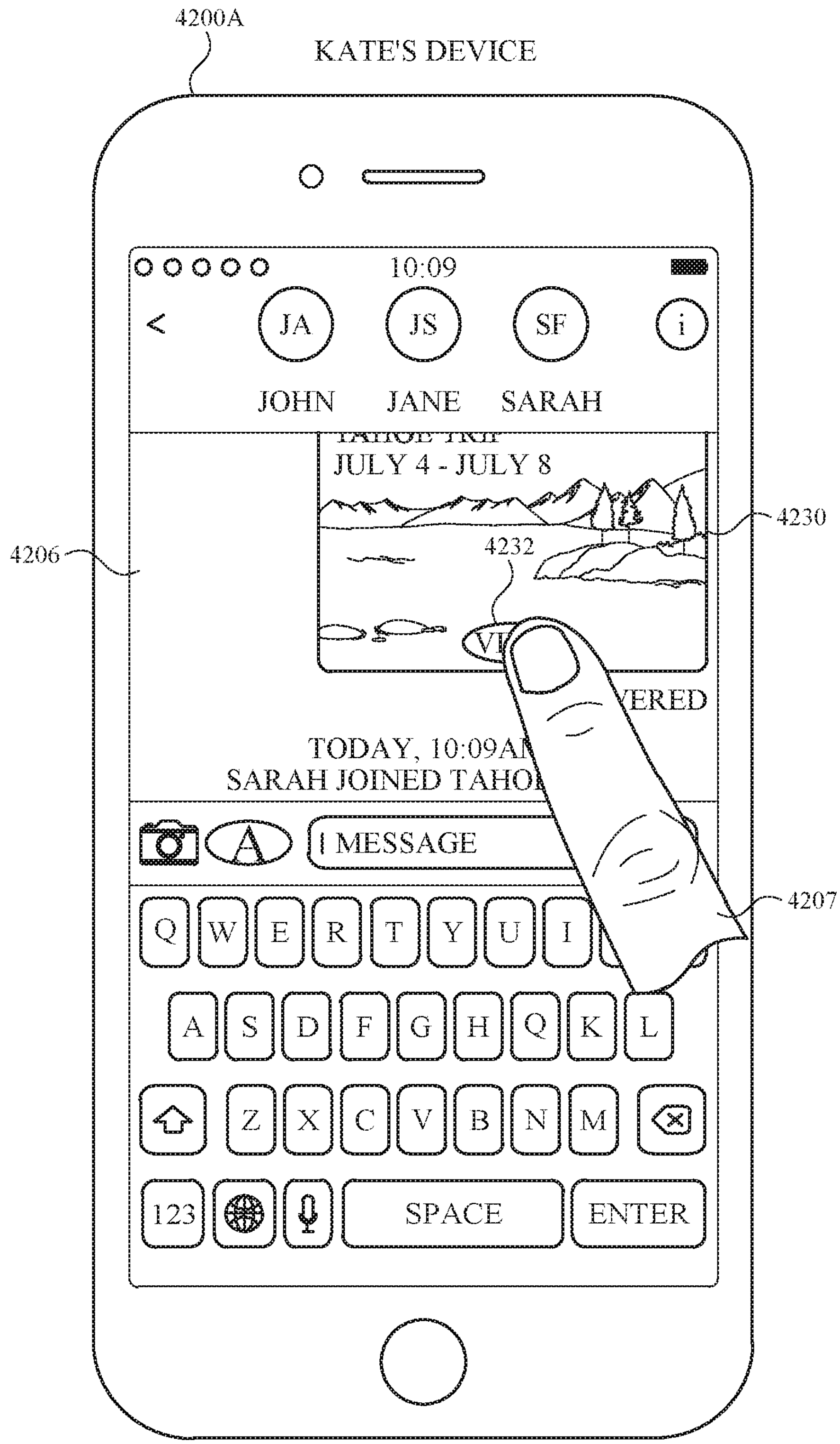
Figure 42K:
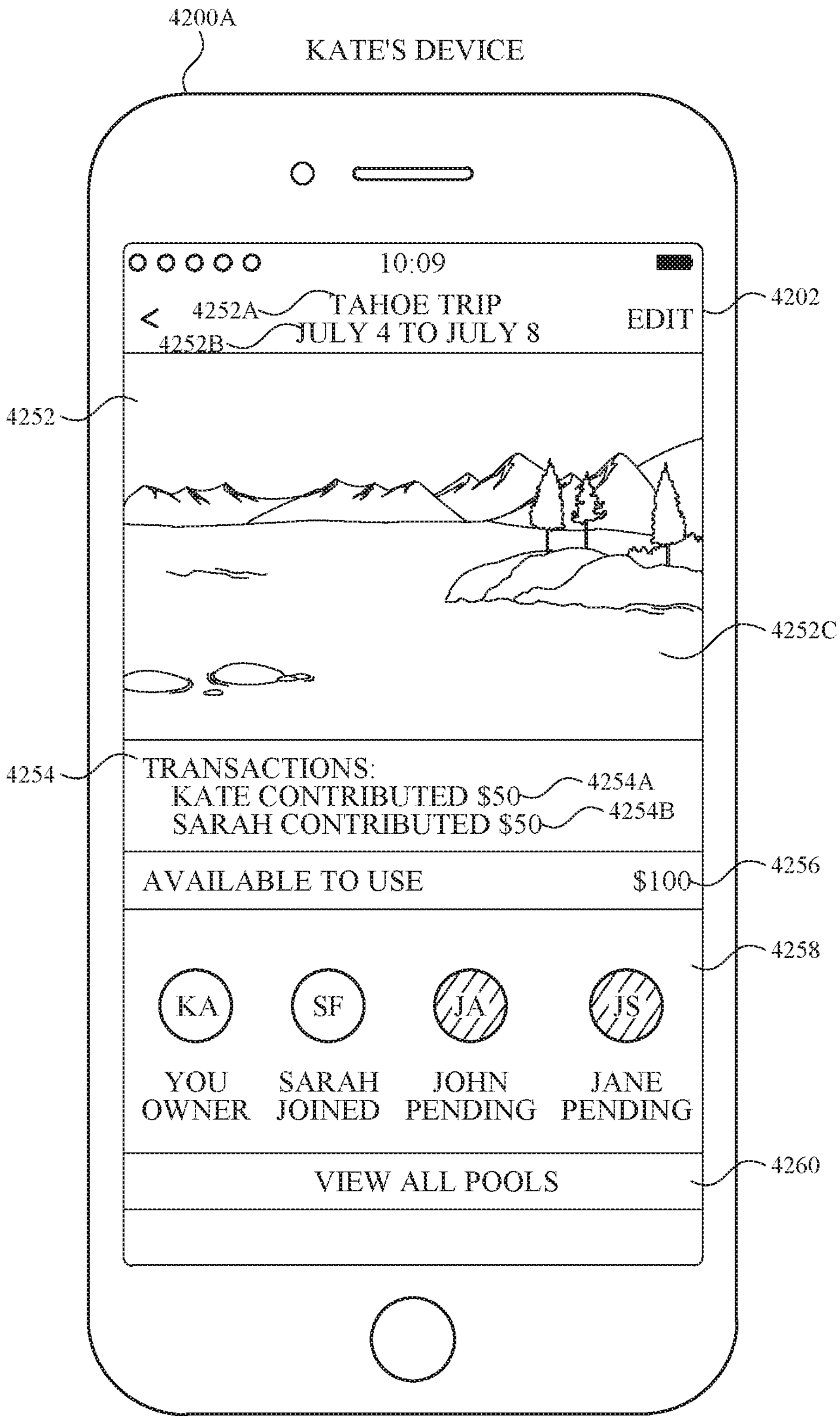

In FIG. 42J, while displaying group message conversation 4206 with pool message object 4230, electronic device 4200A detects (e.g., via a touchscreen of display 4202) a user selection 4207 of view button 4232 of pool message object 4230 in message conversation 4206. In FIG. 42K, in response to detecting user selection 4207, electronic device 4200A displays, on display 4202, a pool detail user interface 4252 that includes information regarding the pool account corresponding to the selected pool message object.

In some embodiments, as shown in FIG. 42K, pool detail user interface 4252 includes a name region 4252A (e.g., showing "Tahoe Trip") indicating the name of the selected pool account, a date region 4252B (e.g., showing "July 4 to July 8") indicating the time period during which the selected pool account is valid (e.g., for making a payment transaction using the pool account), and an image region 4252C showing the representative image of the selected pool account (corresponding to background image 4230C).

In some embodiments, pool detail user interface 4252 also includes a transactions region 4254 showing one or more past transactions made using the pool account and/or contributions made to the pool account. For example, FIG. 42K shows a first transaction 4254A associated with a contribution made by Kate (e.g., which occurred when Kate created the pool account using pool account user interface 4222) when Kate created the "Tahoe Trip" pool account (e.g., as described above with reference to FIG. 42F). FIG. 42K also shows a second transaction 4254B associated with a contribution made by Sarah (e.g., which occurred when Sarah joined the pool account by selecting the join button of the pool message object) to join the pool account (e.g., as described above with reference to FIG. 42J.

In some embodiments, pool detail user interface 4252 also includes a balance indication 4256 indicating the amount of funds that are available for use in the pool account. For example, in FIG. 42K, because the "Tahoe Trip" pool account currently only includes two contributions of $50 each (made by Kate and Sarah) and no other transactions, balance indication 4256 shows total available funds of $100. In some embodiments, pool detail user interface 4252 also includes a participants region 4258 indicating the pool participants (e.g., the owner or creator of the group account, participants that have joined the pool account, participants that have been invited to join but have not yet joined the pool account). For example, in FIG. 42K, because Sarah has joined the pool account, Sarah is displayed as a "joined" member within participants region 4258, whereas John and Jane are displayed as "pending" members because they have not yet joined the pool account.

Figure 42L:
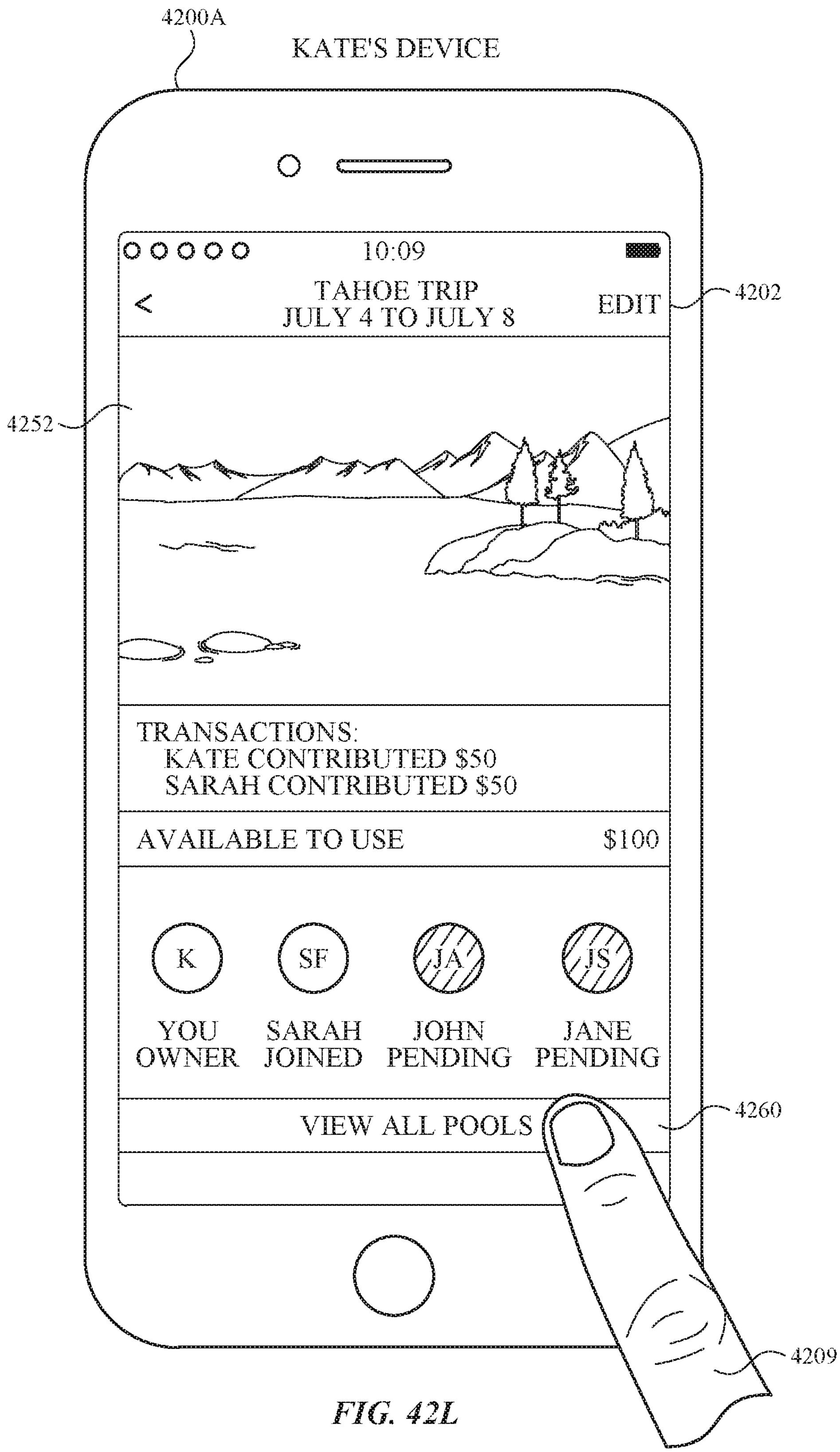

In some embodiments, pool detail user interface 4252 includes a view pools button 4260 (e.g., stating "View All Pools") for viewing all of the pool accounts that the user of the device is currently a member. In FIG. 42L, while displaying pool details use interface 4252, electronic device 4200A detects (e.g., via a touchscreen of display 4202) a user selection 4209 (e.g., a tap gesture) of view pools button 4260.

Figure 42M:
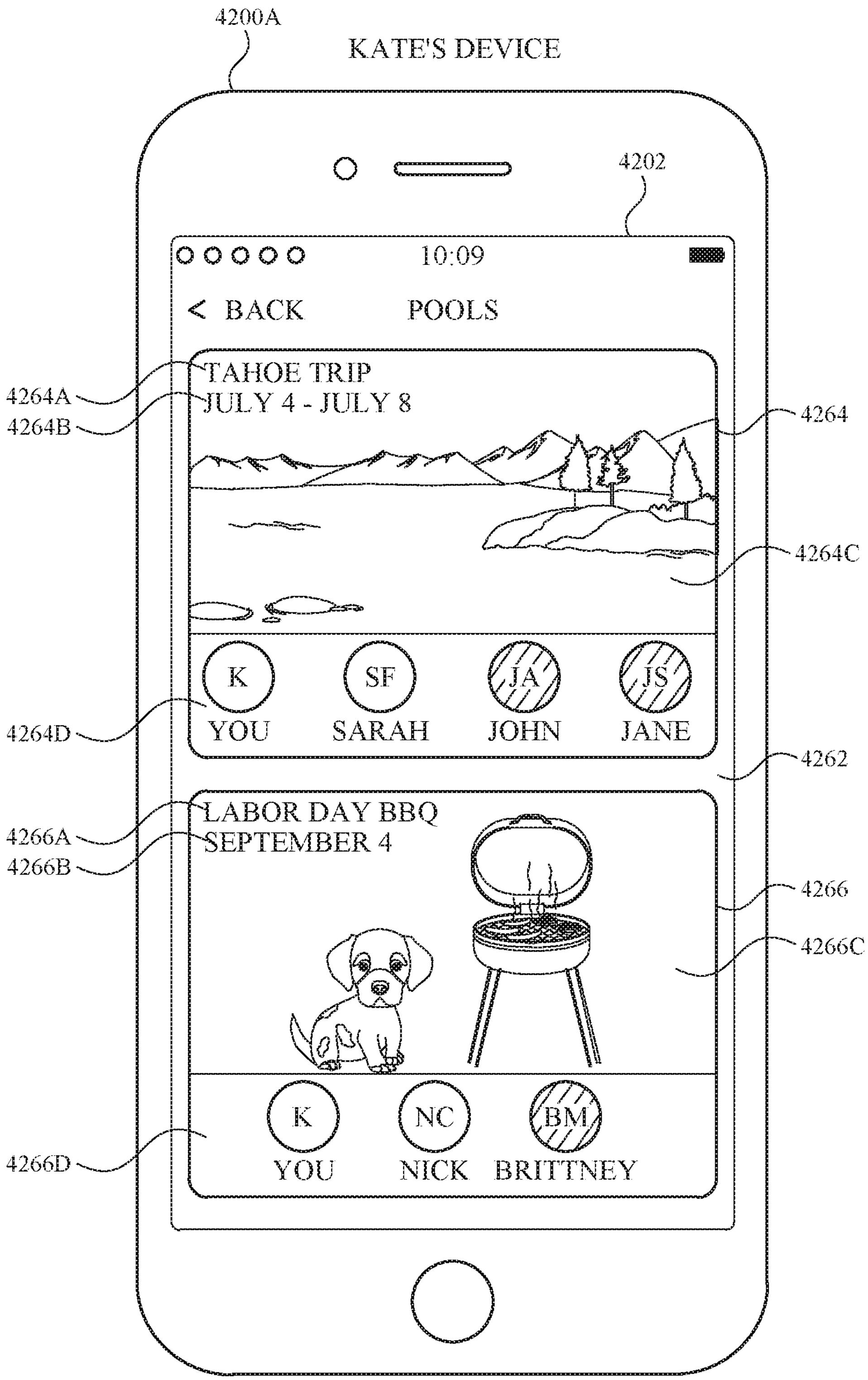

In FIG. 42M, in response to detecting user selection 4209 of view pools button 4260, electronic device 4200A displays, on display 4202, a pools user interface 4262 that includes one or more pool items corresponding to the one or more pool accounts that the user of the device is currently a member of (or has received an invitation to join). For example, the user of electronic device 4200A (Kate) is a member of the "Tahoe Trip" pool account (as the creator/owner) and a second pool account, a "Labor Day BBQ" pool account. Thus, pools user interface 4262 shows a first pool item 4264 corresponding to the "Tahoe Trip" pool account and a second pool item 4266 corresponding to the "Labor Day BBQ" pool account. In some embodiments, a pool item includes an indication of the name of the pool account (e.g., name indication 4264A and name indication 4266A of pool item 4264 and pool item 4266, respectively), an indication of the time period during which the pool account is valid/active (e.g., date indication 4264B and date indication 4266B of pool item 4264 and pool item 4266, respectively), the representative image of the pool account (e.g., background image 4264C and background image 4266C of pool item 4264 and 4266, respectively), and the participants of the pool account (e.g., participants region 4264D and participants region 4266D of pool item 4264 and pool item 4266, respectively).

In some embodiments, once a pool account (e.g., the "Tahoe Trip" pool account) has been created, electronic device 4200A adds a graphical representation of the created pool account in a wallet application of the device and enables the pool account to be used for payment transactions via the wallet application.

Figure 42N:
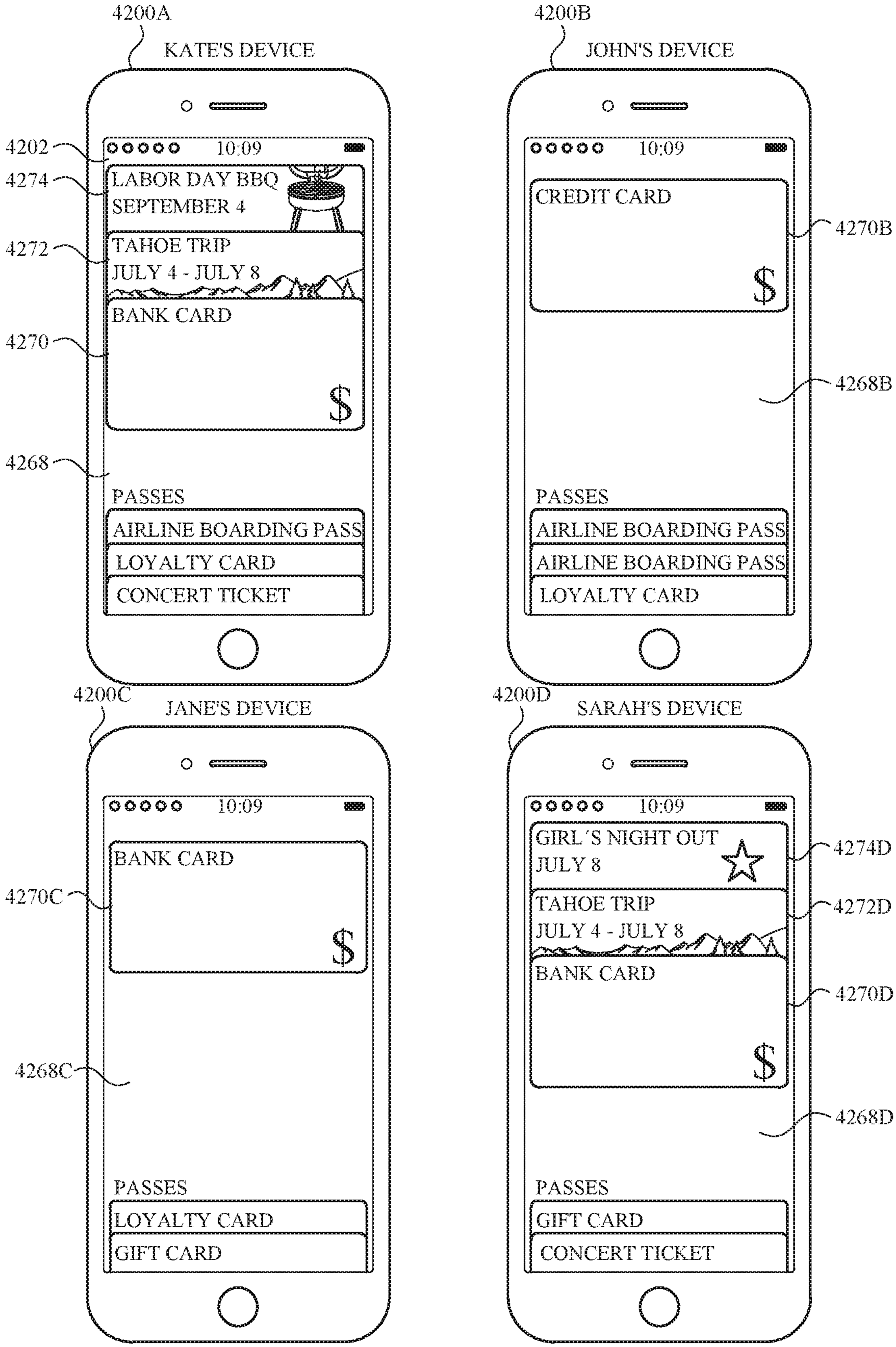
Figure 42O:
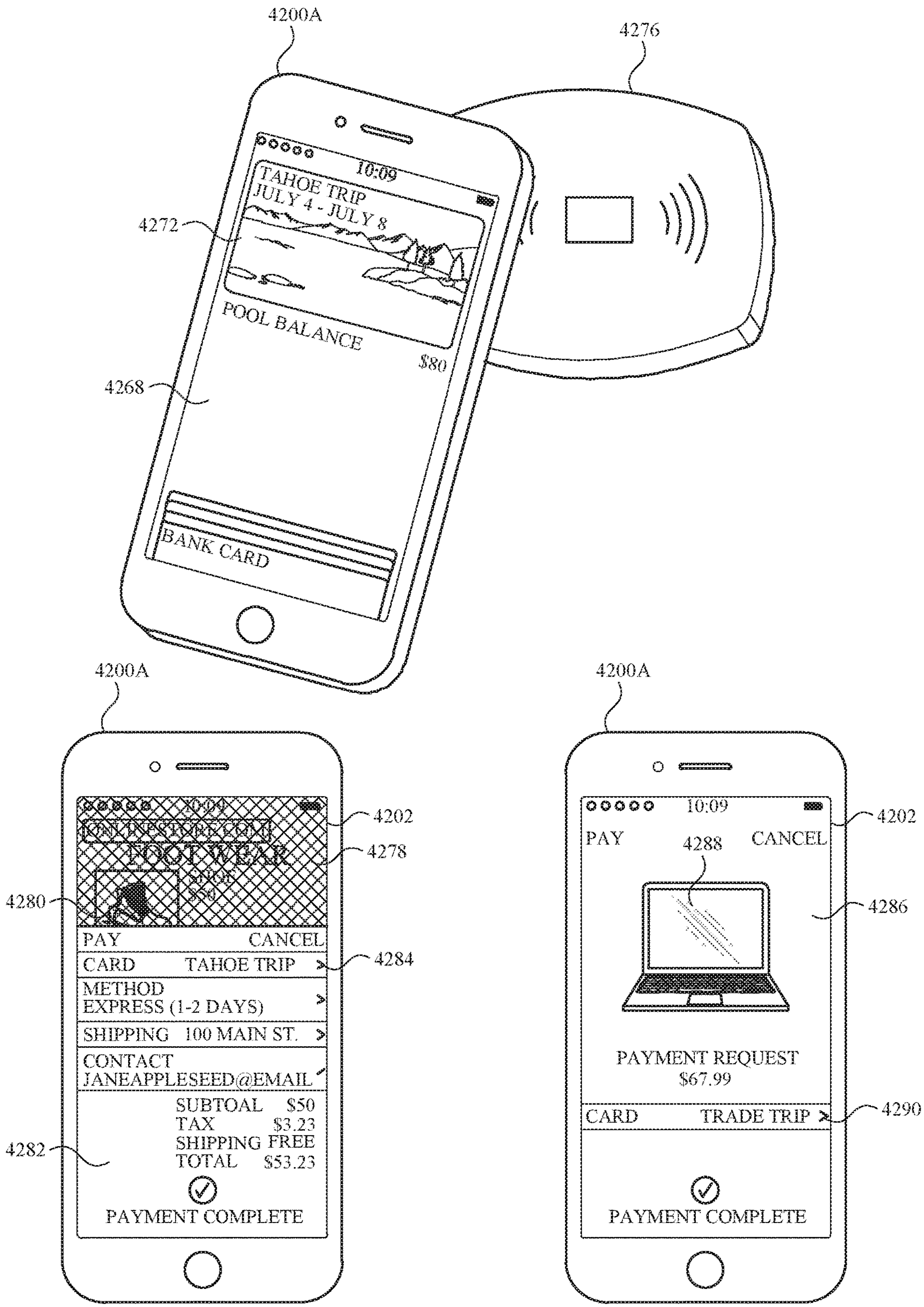

FIG. 42N illustrates electronic device 4200A (Kate's Device), electronic device 4200B (John's Device), electronic device 4200C (Jane's Device), and electronic device 4200D (Sarah's Device) displaying a wallet user interface 4268 of a corresponding wallet application (e.g., that is controlled by the operating system of the device and not by a third-party program).

In FIG. 42N, electronic device 4200A (Kate's Device) displays, in wallet user interface 4268, one or more payment objects associated with one or more accounts that can be used to make a payment transaction. As shown by Kate's Device in FIG. 42N, wallet user interface 4268 includes a bank card object 4270 corresponding to a bank card belonging to the user of the device (Kate). Wallet user interface 4268 further includes a first pool account object 4272 corresponding to the "Tahoe Trip" pool account (e.g., provisioned onto the device when the user of the device, Kate, became a member of the "Tahoe Trip" pool account) and a second pool account object 4274 corresponding to the "Labor Day BBQ" pool account (e.g., provisioned onto the device when the user of the device, Kate, became a member of the "Labor Day BBQ" pool account). In some embodiments, a pool account object is created for use by wallet application upon creation of the corresponding pool account object. The accounts corresponding to bank card object 4270, first pool account object 4272, and second pool account object 4274 can each be used to perform (and provide funds for) a payment transaction via the wallet application.

Similarly, because Sarah is also now a member of the "Tahoe Trip" pool account along with Kate, electronic device 4200D (Sarah's Device) displays, in a wallet user interface 4268D of a corresponding wallet application, a first pool account object 4272D corresponding to the "Tahoe Trip" pool account (and corresponding to first pool account object 4272 of wallet user interface 4268 on Kate's Device) that can be selected and used to perform (and provide funds for) a payment transfer via the wallet application. Wallet user interface 4268D further includes a bank card object 4270D corresponding to a personal bank account of Sarah's that can be used to perform payment transactions via the wallet application on Sarah's Device. Wallet user interface 42685D further includes a second pool account object 4274D corresponding to a different pool account (e.g., a "Girl's Night Out" pool account) that Sarah is a member of (but none of Kate, John, nor Jane are a member of) that can be used to perform payment transactions via the wallet application on Sarah's Device.

In contrast to Kate and Sarah, John and Jane, while invited to join, have not yet joined the "Tahoe Trip" pool account. Electronic device 4200B (John's Device) displays, in a wallet user interface 4268B of a corresponding wallet application, a credit card object 4270B corresponding to a personal credit card account of John that can be used to perform payment transactions via the wallet application on John's Device, but does not include a pool account object corresponding to the "Tahoe Trip" pool account. Thus, John's Device cannot (yet) be used to perform a payment transaction via the wallet application using the "Tahoe Trip" pool account. Similarly, electronic device 4200C (Jane's Device) displays, in a wallet user interface 4268C of a corresponding wallet application, a bank card object 4270C corresponding to a personal credit card account of Jane that can be used to perform payment transactions via the wallet application on Jane's Device, but does not include a pool account object corresponding to the "Tahoe Trip" pool account. Thus, Jane's Device cannot (yet) be used to perform a payment transaction via the wallet application using the "Tahoe Trip" pool account.

While displaying wallet user interface 4268, in response to detecting a user selection (e.g., a tap gesture) on pool account object 4272, electronic device 4200A designated the pool account corresponding to pool account object 4272 (the "Tahoe Trip" pool account) for use in a payment transaction. In FIG. 42O, while the "Tahoe Trip" pool account is designated for use in a payment transaction (e.g., as indicated by pool account object 4272 being selected within wallet user interface 4272), the electronic device detects (e.g., via a wireless communication radio of the device) a payment terminal 4276.

In some embodiments, in response to detecting payment terminal 4276 with the pool account selected for use in the transaction, electronic device 4200A requests authentication (e.g., biometric authentication, such as fingerprint authentication, facial recognition authentication, iris/retina scan recognition, or passcode/password authentication) for proceeding with the payment transaction using funds from the pool account. In response to a determination that the authentication is successful, the electronic device proceeds with the payment transaction using funds from the pool account.

FIG. 42O also illustrates a pool account (e.g., the "Tahoe Trip" pool account) being used to perform a second type of payment transaction. For example, while displaying, on display 4202, a webpage 4278 for making an online purchase of item 4280 (e.g., a shoe), electronic device 4200A detects a user selection for proceeding with a payment transaction to complete the online purchase of item 4280. In response to detecting the user selection for proceeding with the online purchase, electronic device 4200A displays, on display 4202, a payment confirmation user interface 4282 (e.g., similar to payment confirmation user interface 2362 described above with reference to FIGS. 23D-23M) for providing authentication to proceed with the payment transaction. In some examples, payment confirmation user interface 4282 includes a payment account selection region 4284 for selecting an account for use in the payment transaction. In payment confirmation user interface 4282, the "Tahoe Trip" pool account is currently selected for use in the payment transaction. Thus, the user (Kate) can proceed with completing the online purchase by using funds from the "Tahoe Trip" pool account if authentication (e.g., biometric authentication, such as fingerprint authentication, facial recognition authentication, iris/retina scan recognition, passcode/password authentication) is successful provided using payment confirmation user interface 4282.

FIG. 42O also illustrates a pool account (e.g., the "Tahoe Trip" pool account) being used to perform a third type of payment transaction. For example, while attempting to make a purchase (e.g., an online purchase) using an electronic device (depicted by graphical representation 4288 on electronic device 4200A) different from electronic device 4200A (e.g., a laptop computer, a tablet computer), electronic device 4200A receives (e.g., via a wireless communication radio of the device) a request to provide payment for the purchase (e.g., in the amount of "$67.99") and to authenticate the purchase. In response to receiving the request, electronic device 4200A displays, on display 4202, a remote payment user interface 4286. As shown in FIG. 42O, remote payment user interface 4286 includes graphical representation 4288 of the different device that transmitted the payment request. As also shown in FIG. 42O, remote payment use interface 4286 also includes a payment account selection region 4290 for selecting an account for use in the payment transaction. In remote payment user interface 4286 of FIG. 42P, the "Tahoe Trip" pool account is currently selected for use in the payment transaction. Thus, the user (Kate) can proceed with completing the remote payment by using funds from the "Tahoe Trip" pool account if authentication (e.g., biometric authentication, such as fingerprint authentication, facial recognition authentication, iris/retina scan recognition, passcode/password authentication) is successfully provided using electronic device 4200A.

FIGS. 43A-43C are a flow diagram illustrating a method for creating and managing a group account (e.g., a pool account), in accordance with some embodiments. Method 4300 is performed at a device (e.g., 100, 300, 500, 4100A, 4200A) with a display (e.g., 4102, 4202), a secure element, and one or more wireless communication radios. Some operations in method 4300 are, optionally, combined, the orders of some operations are, optionally, changed, and some operations are, optionally, omitted.

As described below, method 4300 provides an intuitive way for managing peer-to-peer transactions. The method reduces the cognitive burden on a user for managing peer-to-peer transactions, thereby creating a more efficient human-machine interface. For battery-operated computing devices, enabling a user to manage peer-to-peer transactions faster and more efficiently conserves power and increases the time between battery charges.

The electronic device (e.g., 4100A, 4200A) provisions (4316), using the secure element of the device, a group account (e.g., a pool account, an account that is accessible by different user accounts logged into different devices, where the account is a payment account, a resource account, a points account, an account holding photos, files) onto the electronic device. Provisioning the group account onto the device using the secure element of the device stores data associated with the group account within the secure element, thereby deterring fraudulent activity aimed at stealing data associated with the group account from the device. Deterring fraudulent activity aimed at stealing data from the device enhances the operability of the device and makes the user-device interface more secure (e.g., by reducing fraud when operating/interacting with the device). In some examples, the predetermined time period is manually set by the user of the device. In some examples, the electronic device (e.g., 4100, 4200) provisions the group account while displaying, on the display (e.g., 4102, 4202), a message conversation (e.g., 4106, 4206) of a messaging application having a plurality of participants (e.g., 4108, 4110, 4112, 4208, 4210, 4212).

In some embodiments, prior to provisioning the group account onto the electronic device, the electronic device (e.g., 4100A, 4200A) displays (4302), on the display (e.g., 4102, 4202), a message conversation (e.g., 4106, 4206) of the messaging application (e.g., 4104, 4204), where the message conversation (e.g., 4106, 4206) includes the plurality of participants (e.g., 4108, 4110, 4112, 4208, 4210, 4212). In some examples, the plurality of participants are participants of the message conversation (e.g., 4106, 4206). In some embodiments, provisioning the group account onto the electronic device (e.g., 4100A, 4200A) includes (automatically) associating (4306) the plurality of participants of the message conversation as members of the group account. Automatically associating the plurality of participants of the message conversation as members of the group account enables the user to bypass having to manually associate (e.g., select) participants as members of the group account. Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, a member of the group account is an authorized user of the items in the group account. In some examples, every member of the group account is an authorized user of the items in the group account.

In some embodiments, prior to provisioning the group account, the electronic device (e.g., 4100A, 4200A) displays (4302), on the display (e.g., 4102, 4202), the message conversation (e.g., 4106, 4206, of an instant message conversation). In some embodiments, while displaying the message conversation (e.g., 4106, 4206), the electronic device (e.g., 4100A, 4200A) detects (4304) user selection of a group account affordance (e.g., 4120, 4220). In some embodiments, in response to detecting the user selection of the group account affordance (e.g., 4120, 4220), the electronic device displays (4306), on the display (e.g., 4102, 4202), a group account creation user interface (e.g., 4122, 4222) for configuring (e.g., setting, applying) a plurality of parameters (e.g., 4122A-4122E, 4222A-4222E, a name associated with the group account, a graphical representation, such as an image, associated with the group account, participants of the group account, amount of the type of item to request to one or more participants of the group account, an expiration date of the group account) designated for the group account (.

In some embodiments, a first parameter (e.g., 4122A, 4222A) of the plurality of parameters (e.g., 4122A-4122E, 4222A-4222E) of the group account is a user-selected representative image of the group account. In some embodiments, a second parameter (e.g., 4122E, 4222E) of the plurality of parameters of the group account is participants of the group account. In some examples, the participants of the group account are manually selected by a user of the device (e.g., from a contacts list on the device). In some embodiments, the participants of the group account are automatically selected (4308) based on (or selected to be) the plurality of participants (e.g., 4108, 4110, 4112, 4208, 4210, 4212) of the message conversation (e.g., 4106, 4206).

In some embodiments, a third parameter of the plurality of parameters of the group account is a template of the group account comprising a plurality of templates. In some examples, a template includes a set of default account settings. In some examples, different template include different use restrictions. In some examples, an allowance structure is configured such that a user (e.g., first user) contributes to the group account and a different user (e.g., second user, without contributing) consumes/uses amounts from the group account.

In some embodiments, the electronic device (e.g., 4100A, 4200A) detects (4310) user selection of a template of the plurality of templates. In some embodiments, in response to detecting the user selection of the template, the electronic device (e.g., 4100A, 4200A), in accordance with a determination that the selected template is a first template, enables (4312) use of an amount of the type of item (only) by the first participant and prohibits use of an amount of the type of item by the second participant (and any other participants of the plurality of participants). Enabling use of the amount of the type of item (only) by the first participant and prohibiting use of the amount of the type of item by the second participant in accordance with the determination that the selected template is the first template provides the user with predetermined settings for the group account, thus enabling the user to bypass manually selecting certain settings of the group account. Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the user selection of the template, the electronic device (e.g., 4100A, 4200A), in accordance with a determination that the selected template is a second template, the electronic device enables (4314) use of an amount of the type of item by the first participant and by the second participant (and any other participants of the plurality of participants). Enabling use of the amount of the type of item by the first participant and by the second participant in accordance with the determination that the selected template is the second template provides the user with predetermined settings for the group account, thus enabling the user to bypass manually selecting certain settings of the group account. Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device (e.g., 4100A, 4200A) transmits (4318), using the one or more wireless communication radios (e.g., via the message conversation), a request for an amount of a type of item (e.g., funds, resources, points, photos, files) to a plurality of participants (e.g., 4108, 4110, 4112, 4208, 4210, 4212) of a message conversation (e.g., 4106, 4206, an instant message conversation). Transmitting the request for the amount of the type of item to the plurality of participants of the message conversation enables the recipients to easily view and respond to the request. Reducing the number of inputs needed to perform an operation enhances the operability of the device enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, the request includes an invitation to become a member of the group account. In some examples, the recipients of the invitation are automatically determined to be the members of the current message conversation.

In some embodiments, transmitting the request for the amount of the type of item to the plurality of participants (e.g., 4108, 4110, 4112, 4208, 4210, 4212) comprises causing display (4320), in a corresponding message conversation (e.g., 4106B, 4106C, 4106D, 4206B, 4206C, 4206C) of a second device (different from the electronic device), of an invitation message object (e.g., 4131, 4133, 4135, 4231, 4233, 4235) having an acceptance affordance (e.g., 4132B, 4132C, 4132D, 4232B, 4232C, 4232D) for responding to the request (by authorizing transmittal of the requested amount of the type of item) and becoming a member of the group account. Causing display of the invitation message object having the acceptance affordance provides visual feedback to the recipient(s) by indicating that the recipient(s) can join the group account via the invitation message object. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, the invitation message object includes the representative image of the group account. In some examples, the invitation message object includes a expiration date of the group account. In some examples, the invitation message object includes a valid time period of the group account.

Subsequent to provisioning (4322) the group account onto the electronic device (e.g., 4100A, 4200A) using the secure element of the device, the electronic device (e.g., 4100A, 4200A) adds (4324) an amount of a type of item (e.g., funds, resources, points, photos, files) received from a first participant of the plurality of participants (e.g., 4108, 4110, 4112, 4208, 4210, 4212) to the group account, and adds (4328) an amount of the type of item (e.g., funds, resources, points, photos, files) received from a second participant of the plurality of participants (e.g., 4108, 4110, 4112, 4208, 4210, 4212) to the group account.

In some embodiments, in response (or subsequent) to adding the amount of the type of item (e.g., funds, resources, points, photos, files) received from the first participant of the plurality of participants (e.g., 4108, 4110, 4112, 4208, 4210, 4212) to the group account, the electronic device (e.g., 4100, 4200) associates (4326) the first participant as a member of the group account. Associating the first participant as a member of the group account in response to adding the amount of the type of item received from the first participant enables the user to easily control which invited participant can become a member of the group account. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, a member of the group account is an authorized user of the items in the group account.

In some embodiments, the amount of the type of item received from the first participant is equal to the requested amount of the type of item, and the amount of the type of item received from the second participant is equal to the requested amount of the type of item.

In some embodiments, the amount of the type of item received from the first participant is different from the amount of the type of item received from the second participant. In some examples, the amount of the type of item received from the first participant is different from the requested amount of the type of item and the amount of the type of item received from the second participant is different from the requested amount of the type of item.

The electronic device (e.g., 4100A, 4200A) receives (4330) a request (e.g., via user input to the device, from a transaction terminal, such as a POS terminal, an NFC terminal, a contactless POS terminal) to transmit credentials (e.g., payment credentials, account information) of the group account.

In response to receiving the request to transmit credentials of the group account, the electronic device (e.g., 4100A, 4200A) receives (4332) authentication information (e.g., a passcode or biometric information detected via one or more sensor devices, such as fingerprint information, voice information, iris/retina information, facial feature information). In some examples, the electronic device requests authentication information in response to receiving the request to transmit credentials of the group account. In some examples, determining whether the received authentication information corresponds to enrolled authentication information. Requesting authentication information in response to the request to transmit credentials of the group account reduces the number of fraudulent transactions made using the group account. Reducing the number of fraudulent transitions enhances the operability of the device and makes the user-device interface more secure (e.g., by reducing fraud when operating/interacting with the device).

In accordance with a determination that the authentication information received at the device corresponds to enrolled authentication information (for authorizing transactions, enabled to authorize transactions), the electronic device (e.g., 4100A, 4200A) transmits (4334), via the one or more wireless communication radios, credentials (e.g., payment credentials, account information) of the group account (e.g., to the transaction terminal, to a remote server). In accordance with a determination that the authentication information received at the device does not correspond to enrolled authentication information, the electronic device (e.g., 4100, 4200) forgoes (4336) transmitting the credentials of the group account.

In some embodiments, the electronic device (e.g., 4100A, 4200A) displays (4338), on the display (e.g., 4102, 4202), a group account user interface (e.g., 4262), where the group account user interface (e.g., 4262) includes a first graphical representation (e.g., 4264) of the group account and a second graphical representation (e.g., 4266) of a second group account, different from the group account (that the user is also a member of), provisioned on the electronic device (e.g., 4100A, 4200A).

In some embodiments, the first graphical representation (e.g., 4264) of the group account includes the representative image (e.g., 4264C) of the group account, an indication of the participants (e.g., 4264D) of the group account, an indication of a valid time period (e.g., 4264B) of the group account, and an amount indication of available items in the group account. In some examples, the indication of the participants includes names of the participants, avatars of the participants, a member level (e.g., users authorized to make transactions using the group account and users not authorized to make transactions using the group account), and/or photos of the participants. In some examples, the valid time period of the account is determined based on the predetermined time period of the account, as described below with reference to FIGS. 48A-48Y.

In some embodiments, the electronic device (e.g., 4100A, 4200A) displays (4340), on the display (e.g., 4102, 4202), a detail user interface (e.g., 4152, 4252) associated with the group account, where the detail user interface (e.g., 4152, 4252) includes an indication (e.g., 4154A, 4254A) of the adding of the amount of the type of item received from the first participant and an indication (e.g., 4154B, 4254B) of a use of an amount of the type of item (by a participant of the group account, such as the first participant). Displaying the detail user interface provides the user with visual feedback about information concerning the group account. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, transmitting the request for the amount of the type of item to the plurality of participants (e.g., 4108, 4110, 4112, 4208, 4210, 4212) includes (4342) transmitting the request for an amount of the type of item to a third participant of the plurality of participants, and the electronic device (e.g., 4100A, 4200A), in accordance with a determination that the amount of the type of item requested to the third participant has not been received from the third participant, displays (4344), in the detail user interface (e.g., 4152, 4252), an indication (e.g., a textual indication stating "invited," "pending," "waiting") that items have not been received from the third participant. Displaying, in the detail user interface, that the items have not been received from the third participant provides visual feedback to the user that the third participant has not yet become a member of the group account. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, if items have not been received form a participant, the participant is not yet a member of the group account.

In some embodiments, the electronic device (e.g., 4100A, 4200A) includes one or more input devices. In some embodiments, the electronic device (e.g., 4100A, 4200A) displays (4346), on the display (e.g., 4102, 4202), a user interface of an electronic wallet application (e.g., 4268) including a plurality of graphical representations of provisioned accounts (e.g., 4270, 4272, 4274), where the plurality of representations of provisioned accounts includes a first graphical representation of the group account (e.g., 4272). In some embodiments, the electronic device (e.g., 4100A, 4200A) detects (4348), via the one or more input devices, user selection of the first graphical representation of the group account (e.g., 4272). In some embodiments, in response detecting the user selection of the first graphical representation of the group account (e.g., 4272), the electronic device (e.g., 4100A, 4200A) displays (4350), on the display (e.g., 4102, 4202), a group account user interface, where the group account user interface includes a second graphical representation of the group account. In some examples, the second graphical representation of the group account is visually similar (or identical) to the first graphical representation of the group account. In some examples, in response to detecting user selection of the second graphical representation of the group account on the group account user interface, the user interface of the electronic wallet application is displayed.

Note that details of the processes described above with respect to method 4300 (e.g., FIGS. 43A-43C) are also applicable in an analogous manner to the methods described above and below. For example, method 4300 optionally includes one or more of the characteristics of the various methods described above and below with reference to methods 900, 1200, 1500, 1800, 2100, 2400, 2700, 3000, 3400, 3700, 4000, 4600, and 4900. For example, a transfer (e.g., of a resource, of a file, of data storage, of a payment) made via a message conversation of a messaging application, as described in method 900, can be made using items (e.g., files, data storage, funds) of a group account (e.g., a pool account). For another example, the applied visual effect (e.g., a 3D effect) for a completed transfer (e.g., of a resource, of a file, of data storage, of a payment), as described in method 1200, can be applied to a message object corresponding to a transfer (e.g., of files, of data storage, of funds) made using a group account (e.g., a pool account). For another example, providing for visually distinguishable message objects based on message designated, as described in method 1500, can be applied to transfers made using a group account (e.g., a pool account). For another example, an activated account (e.g., a data storage account, a payment account), as described in method 1800, can be used to contribute items (e.g., files, data storage, payment) to a group account (e.g., a pool account). For another example, exchanged an account from one account to a different account during a transfer, as described in method 2100, can occur between a personal account (e.g., a non-pool account) and a group account (e.g., pool account). For another example, when a transfer (e.g., of files, of data storage, of funds) is split between two different accounts, as described in method 2400, one account can be a personal account (e.g., a non-pool account) and the other account can be a group account (e.g., a pool account). For another example, when a transfer history list is displayed, as described in method 2700, the list can show transfers and contributions made to a group account (e.g., a pool account). For another example, the voice activation used to make a transfer, as described in method 3000, can also be used to make a transfer with items (e.g., files, data storage, funds) from a group account (e.g., a pool account). For another example, the dynamic visual feedback applied to a message object corresponding to an accepted transfer, as described in method 3400, can be applied to a message object corresponding to a transfer made using a group account (e.g., a pool account). For another example, a gift transfer can be sent (e.g., of data storage, of funds), as described in method 3700, using funds from a group account (e.g., a pool account). For another example, items (e.g., data storage, funds) received as a gift transfer, as described in method 4000, can be added (contributed to) a group account (e.g., a pool account). For another example, the group account creation user interface reached from a group message conversation (as opposed to a one-on-one message conversation), as described in method 4600, can be used to create a group account (e.g., a pool account) among participants of the group message conversation. For another example, date settings can be changed, as described in method 4900, to extend the valid time period of a group account (e.g., a pool account). For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 43A-43C are, optionally, implemented by components depicted in FIGS. 1A-1B. For example, provisioning operation 4316, transmitting operation 4318, adding operation 4324, adding operation 4328, receiving operation 4330, receiving operation 4332, transmitting operation 4334, and forgoing operation 4336 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 44A-44E illustrate example user interfaces for creating a group account versus a non-group account, in accordance with some embodiments. As described in greater detail below, the techniques illustrated by the example user interfaces of FIGS. 44A-44E relate to the techniques illustrated by the example user interfaces illustrated in FIGS. 45A-45U.

Figure 44A:
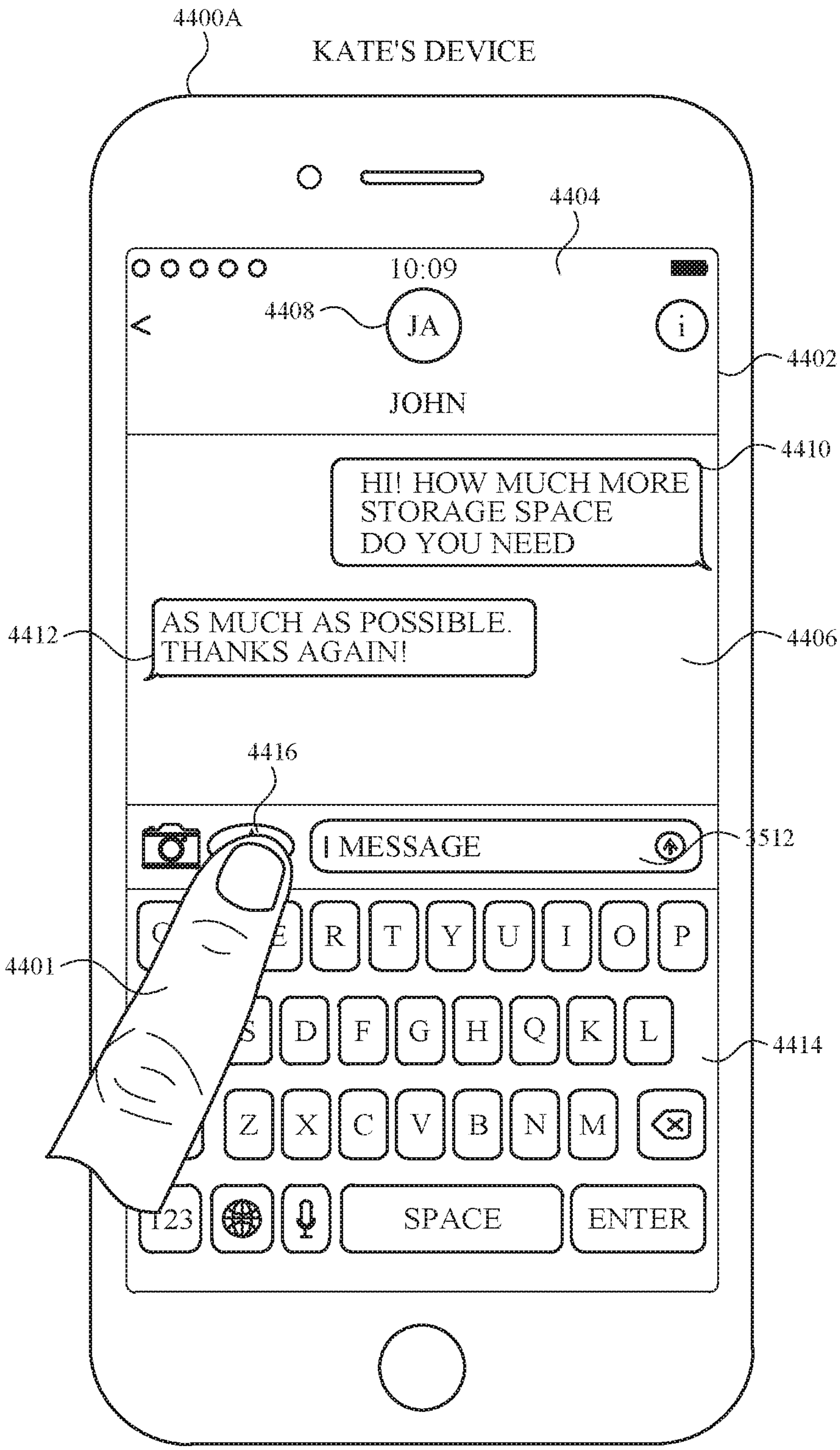

FIG. 44A illustrates an electronic device 4400A (e.g., portable multifunction device 100, device 300, or device 500). In the non-limiting example embodiment illustrated in FIGS. 44A-44G, electronic device 4400A is a smartphone. In other embodiments, electronic device 4400A can be a different type of electronic device, such as a wearable device (e.g., a smartwatch). Electronic device 4400A has a display 4402 and one or more input devices (e.g., touchscreen of display 4402, a mechanical button, a mic, a camera).

In FIG. 44A, electronic device 4400A (e.g., belonging to the user "Kate") displays, on display 4402, a one-on-one message conversation 4406 of a messaging application 4404 (e.g., a first-party application controlled by the operating system of the device and not a third-party application), where the message conversation is between the user of the device (Kate) and a message participant 4408 (e.g., "John"). In the message conversation, the user (Kate) states to message participant 4408 (John), as shown in message object 4410: "Hi! How much more storage space do you need?" In response, message participant 4408 states to the user, as shown in message object 4412: "As much as possible. Thanks again!" As shown in FIG. 44A, electronic device 4400A also displays (e.g., simultaneously with one-on-one message conversation 4406) a virtual keyboard 4414 for typing a message and an application button 4416.

Figure 44B:
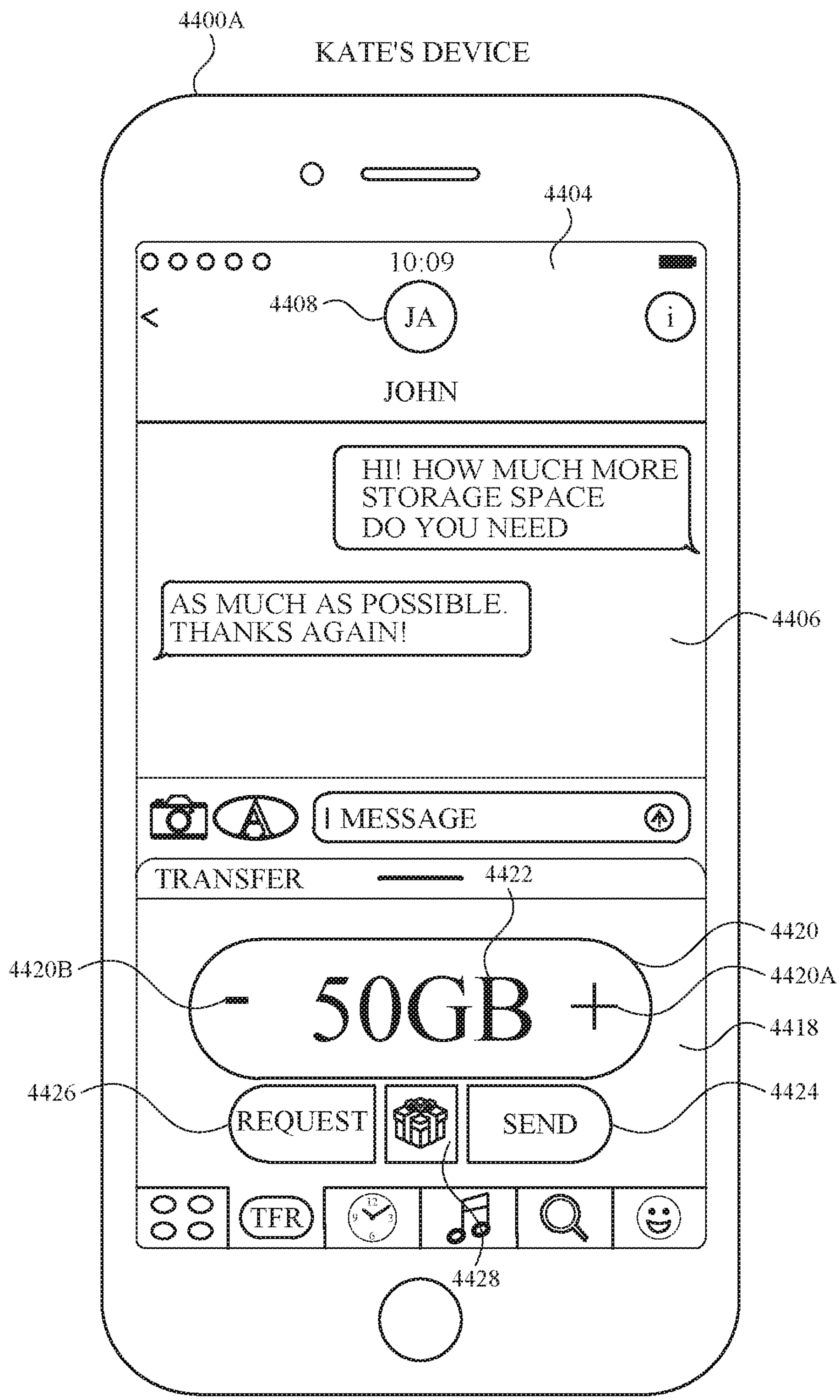

While displaying one-on-one message conversation 4406 with message participant 4408, electronic device 4400A detects (e.g., via a touchscreen of display 4402) a user selection 4401 (e.g., a tap gesture) of application button 4416. In FIG. 44B, in response to detecting user selection 4401 of application button 4416 while displaying one-on-one user message conversation 4406, electronic device 4400A displays (e.g., replaces display of virtual keyboard 4414 with) a data storage transfer user interface 4418 (e.g., corresponding to data storage user interface 3520 described with reference to FIGS. 35A-35J) for sending an amount of data storage to the other participant of the one-on-one message conversation, message participant 4408 (John).

In some embodiments, data storage transfer user interface 4418 includes a value change region 4420 that includes an indication 4422 of the transfer amount (e.g., "50 GB") selected by the user, a value increase button 4420A (e.g., indicated as a "+") for increasing the data storage amount within indication 4422, and a value decrease button 4420B (e.g., indicated as a "−") for decreasing the data storage amount within indication 4422. As also shown in FIG. 44B, in some embodiments, data storage transfer user interface 4418 includes a send button 4424 for initiating a transfer of data storage to the other message participant, message participant 4408, via messaging application 4402 and a request button 4426 for initiating a request for data storage from the other message participant, message participant 4408, via messaging application 4402. In some embodiments, data storage transfer user interface 4418 further includes a gift button 4428 (e.g., similar to gift button 3530 of data storage transfer user interface 3520) for sending a payment as a gift.

Figure 44C:
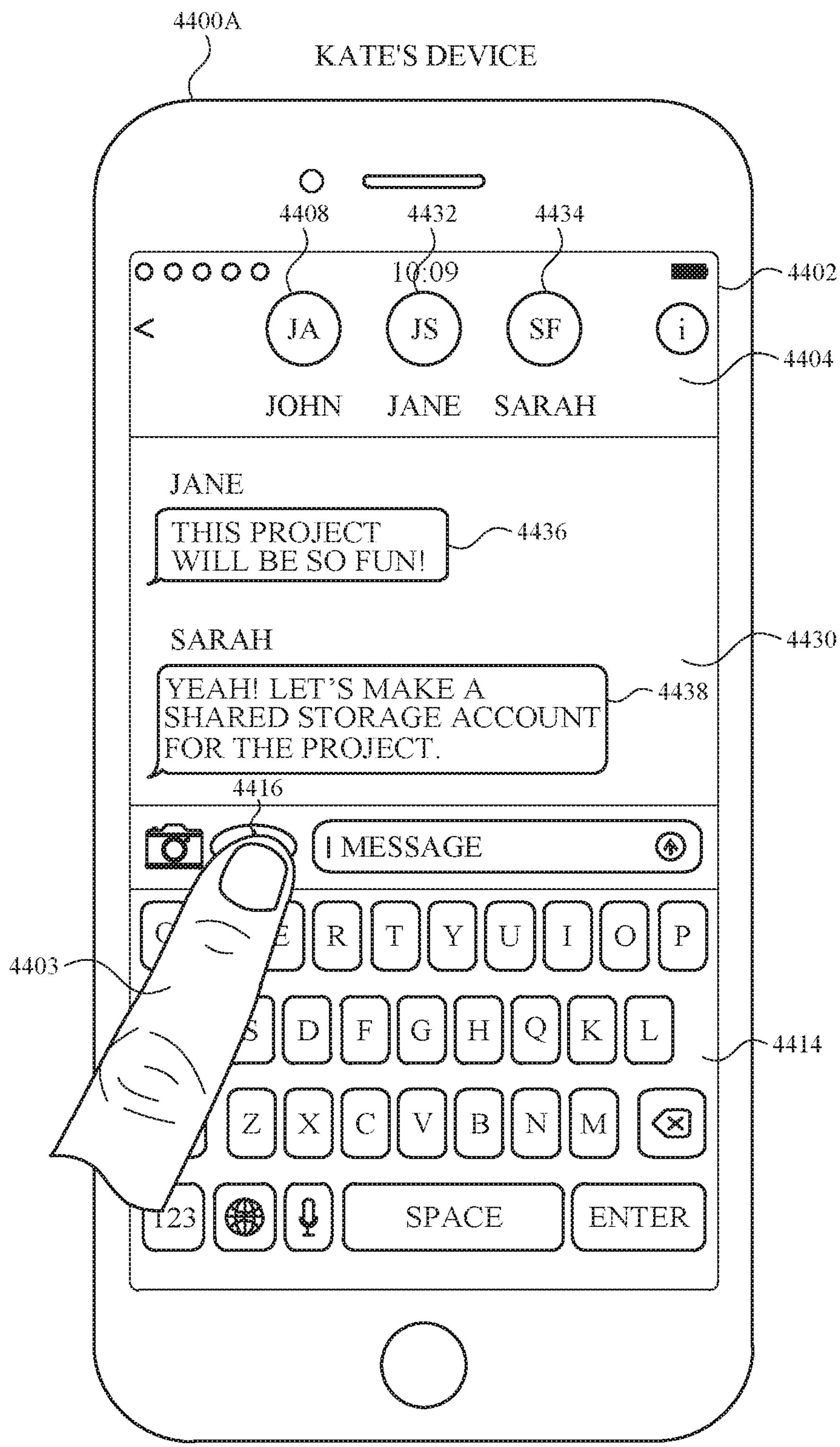

In FIG. 44C, electronic device 4400A displays, on display 4402, a group message conversation 4430 (as opposed to a one-on-one message conversation) of messaging application 4404 among the following participants: the user of the device (Kate), message participant 4408 (John), message participant 4432 (Jane), and message participant 4434 (Sarah). In group message conversation 4430, message participant 4432 (Jane) states to the group, as shown in message object 4436: "This project will be fun!" Then, message participant 4434 (Sarah) states to the group, as shown in message object 4438: "Yeah! Let's make a shared storage account for the project" Electronic device 4400A also displays (e.g., simultaneously with group message conversation 4430) virtual keyboard 4414 for typing a message and application button 4416.

Figure 44D:
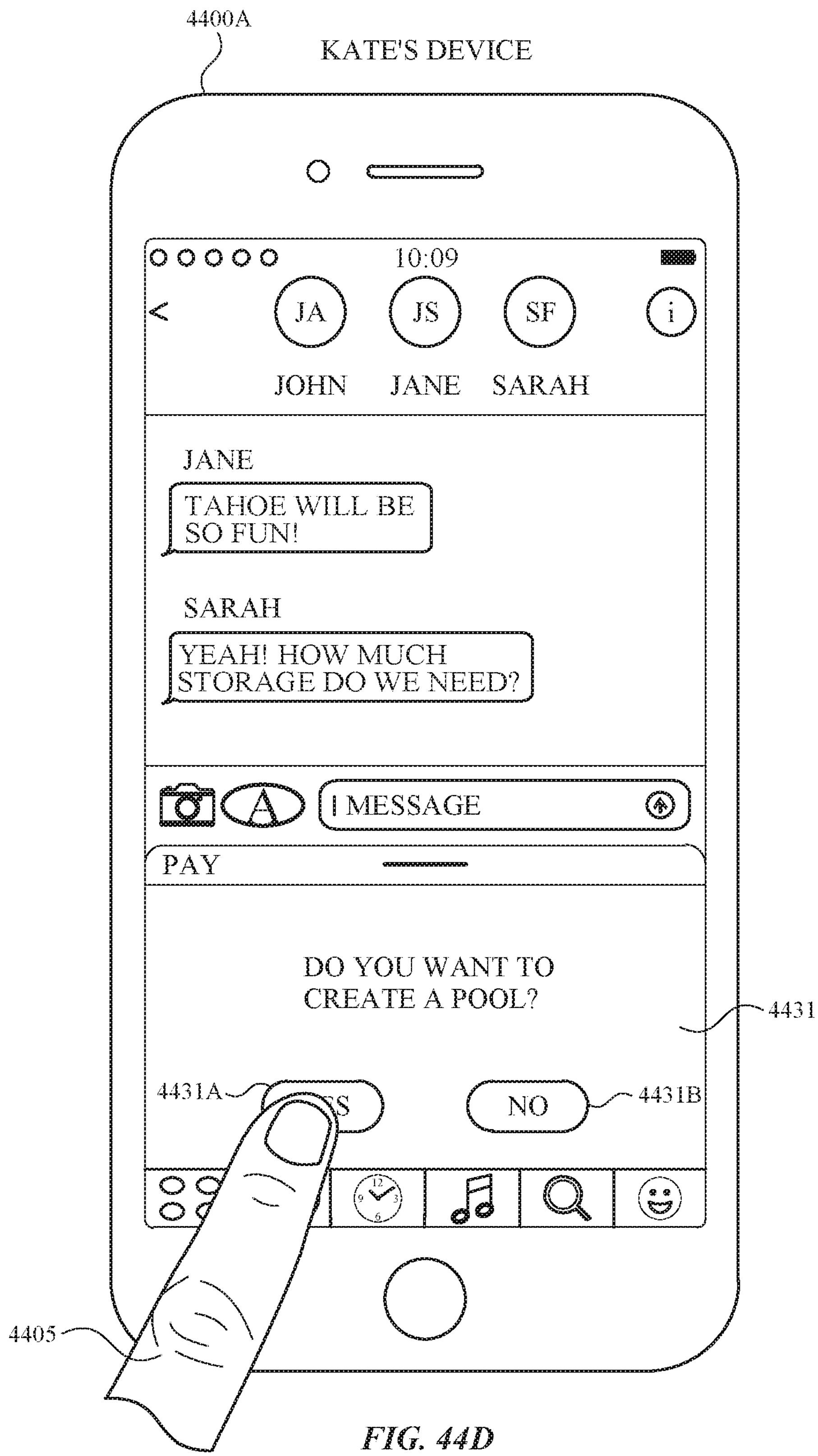

While displaying group message conversation 4430, electronic device 4400A detects a user selection 4403 (e.g., a tap gesture) of application button 4416. In FIG. 44D, in response to detecting user selection 4403 of application button 4416, electronic device 4400A displays a pool account creation prompt 4431 for proceeding with creating a pool (e.g., shared) data storage account. As shown in FIG. 44D, pool account creation prompt 4431 includes a yes button 4431A for proceeding with creating the pool account and a no button 4431B for forgoing proceeding with the pool account.

While displaying pool account creation prompt 4431, electronic device 4400A detects a user selection 4405 (e.g., a tap gesture) of yes button 4431A for proceeding with creating a pool group storage account among the members of group message conversation 4430—the user (Kate), message participant 4408 (John), message participant 4432 (Jane), and message participant 4434 (Sarah).

Figure 44E:
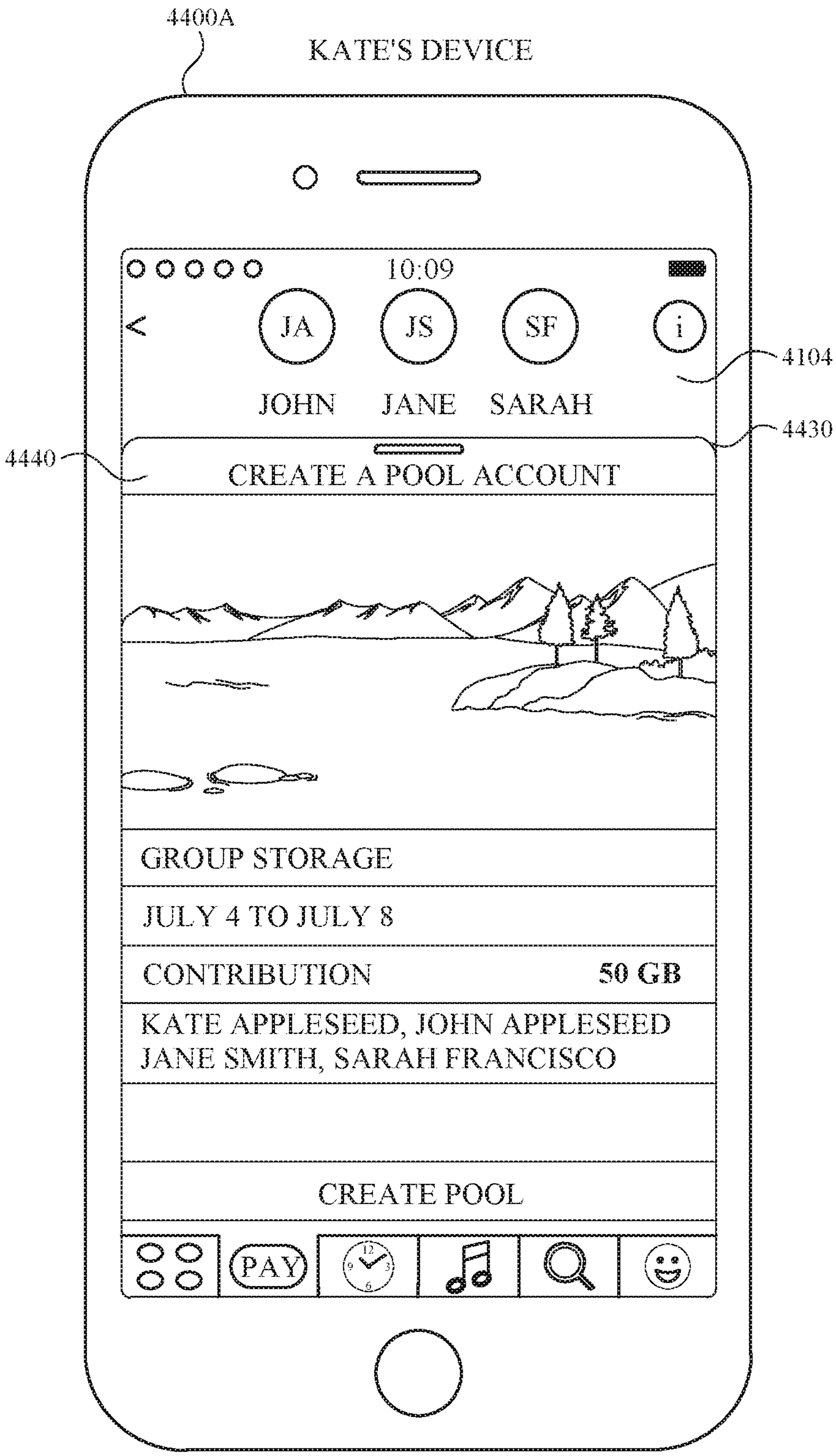

In FIG. 44E, in response to detecting user selection 4405 for proceeding with creating the pool group storage account among the members of the group message conversation, electronic device 4400A displays (e.g., over at least a portion of the group message conversation) a pool account creation user interface 4440 corresponding to pool account creation user interface 4122 described above with reference to FIG. 41A. As described with reference to FIGS. 41A-41D, pool account creation user interface 4440 is used to select settings for and create a pool data storage account, where invitations to join the pool data storage account are sent to the invited participants via group message conversation 4430 of messaging application 4404.

The example user interfaces illustrated in FIGS. 44A-44E above relate to the example user interfaces illustrated in FIGS. 45A-45U below. In particular, the example user interfaces of FIGS. 44A-44E and the example user interfaces of FIGS. 45A-45U both relate to for creating a group account versus a non-group account using an electronic device (e.g., 100, 300, 500, 4400A, 4500A), in accordance with some embodiments. Therefore, it is to be understood that the techniques described with reference to the example user interfaces of FIGS. 44A-44E and the techniques described with reference to the example user interfaces of FIGS. 45A-45U are both techniques that relate to similar concepts for creating a group account versus a non-group account, in accordance with some embodiments.

As mentioned above, FIGS. 45A-45U illustrate example user interfaces for creating a group account versus a non-group account, in accordance with some embodiments. FIG. 45A illustrates an electronic device 4500A (e.g., portable multifunction device 100, device 300, or device 500). In the non-limiting example embodiment illustrated in FIGS. 45A-45U, electronic device 4500A is a smartphone. In other embodiments, electronic device 3200 can be a different type of electronic device, such as a wearable device (e.g., a smartwatch). Electronic device 4500A has a display 4502 and one or more input devices (e.g., touchscreen of display 4502, a mechanical button, a mic, a camera).

In FIG. 45A, electronic device 4500A (e.g., belonging to "Kate") displays, on display 4502, a one-on-one message conversation 4506 of a messaging application 4505 (e.g., a first-party application controlled by the operating system of the device and not a third-party application), where the message conversation is between the user of the device (Kate) and a message participant 4508 (e.g., "John"). In the message conversation, the user (Kate) states to message participant 4508 (John), as shown in message object 4510: "Hi! I had fun at your birthday party yesterday!" In response, message participant 4508 responds to the user, as shown in message object 4512: "Thanks again for coming to celebrate!" As shown in FIG. 45A, electronic device 4500A also displays (e.g., simultaneously with one-on-one message conversation 4506) a virtual keyboard 4514 for typing a message and an application button 4516.

Figure 45B:
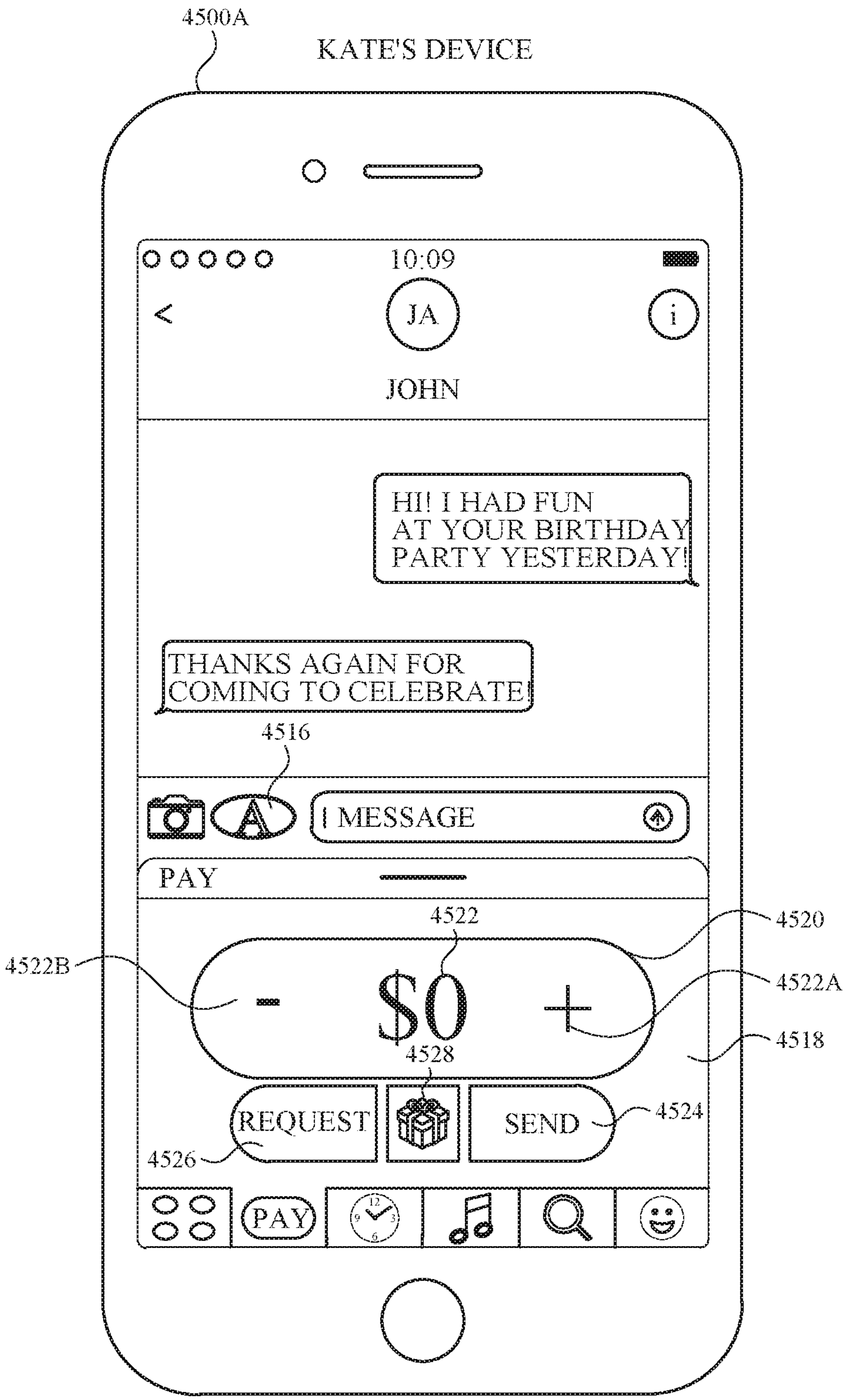

While displaying one-on-one message conversation 4506 with message participant 4508, electronic device 4500A detects (e.g., via a touchscreen of display 4502) a user selection 4501 (e.g., a tap gesture) of application button 4516. In FIG. 45B, in response to detecting user selection 4501 of application button 4501 while displaying one-on-one user message conversation 4506, electronic device 4500A displays (e.g., replaces display of virtual keyboard 4514 with) a payment transfer user interface 4518 (e.g., similar to payment transfer user interface 840 described with reference to FIGS. 8A-8AH) for sending funds to the other participant of the one-on-one message conversation, message participant 4508 (John).

As with payment transfer user interface 840, payment transfer user interface includes a value change region 4520 (e.g., similar to value change region 846 described with reference to FIG. 8E) that includes an indication 4522 of the transfer amount (e.g., "$0"). As with value change region 846, value change region 4520 includes a value increase button 4520A (e.g., indicated as a "+," similar to value increase button 850 of payment transfer user interface 840) for increasing the displayed payment amount within indication 4522 and a value decrease button 4520B (e.g., indicated as a "–," similar to value decrease button 852 of payment transfer user interface 840) for decreasing the displayed payment amount within indication 4522. As also shown in FIG. 45B, in some embodiments, payment transfer user interface 3620 includes a send button 4524 (e.g., similar to send button 847 of payment transfer user interface 840) for initiating a payment transfer to the other message participant, message participant 4508, via messaging application 4502 and a request button 4526 (e.g., similar to request button 845 of payment transfer user interface 840) for initiating a request for a payment from the other message participant, message participant 4508, via messaging application 4502. In some embodiments, payment transfer user interface 4518 further includes (e.g., similar to payment transfer user interface 3620 described with reference to FIGS. 36A-36Z) a gift button 4528 (e.g., similar to gift button 3630 of payment transfer user interface 3620) for sending a payment as a gift.

Figure 45C:
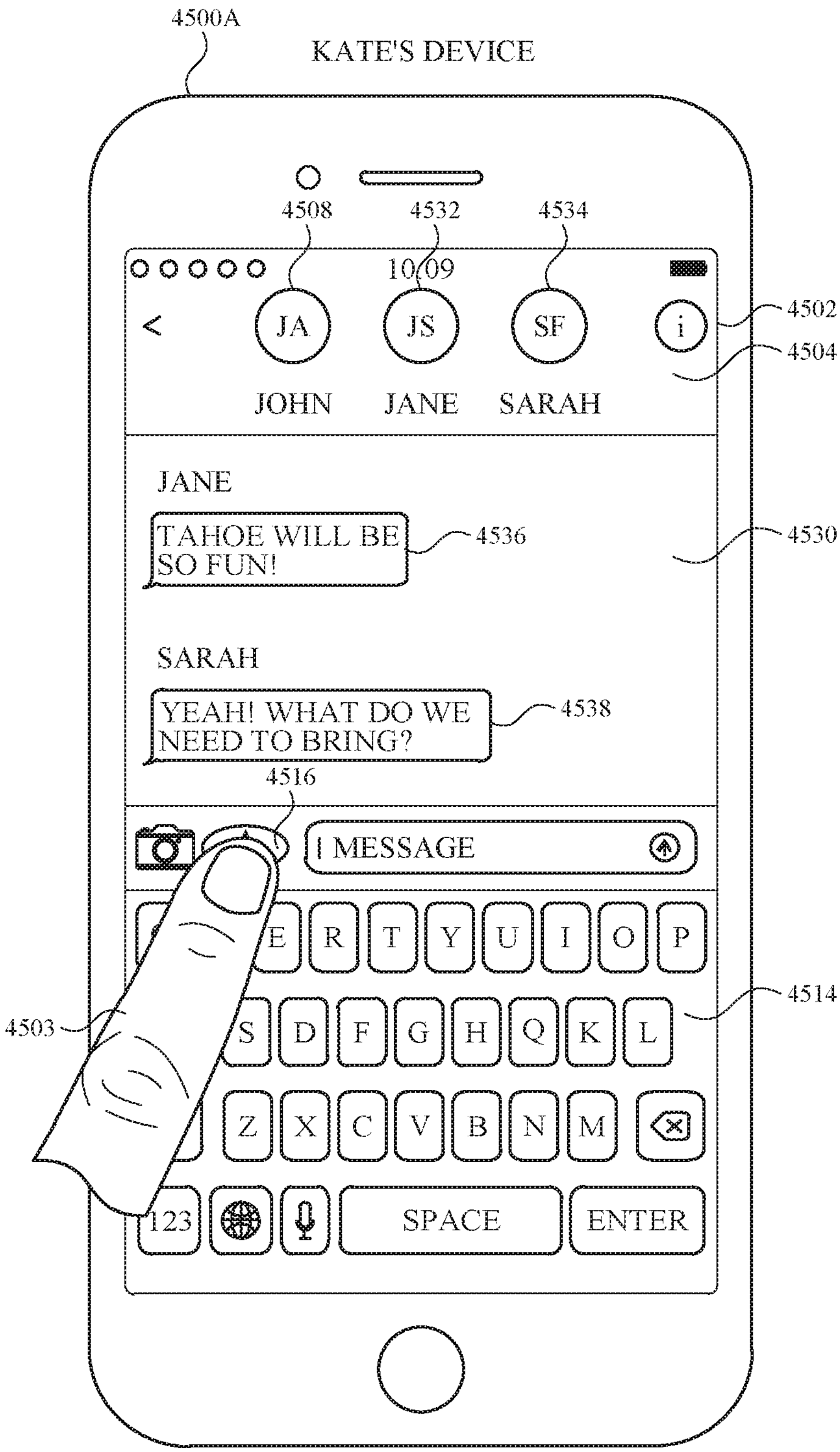

In FIG. 45C, electronic device 4500A displays, on display 4502, a group message conversation 4530 (and does not display one-on-one message conversation 4506) of messaging application 4502 among the following participants: the user of the device (Kate), message participant 4508 (John), message participant 4532 (Jane), and message participant 4534 (Sarah). In group message conversation 4530, message participant 4532 (Jane) states to the group, as shown in message object 4536: "Tahoe will be so fun!" Further, message participant 4534 (Sarah) states to the group, as shown in message object 4538: "Yeah! What do we need to bring?" As shown in FIG. 45C, electronic device 4500A also displays (e.g., simultaneously with group message conversation 4530) virtual keyboard 4514 for typing a message and application button 4516.

Figure 45D:
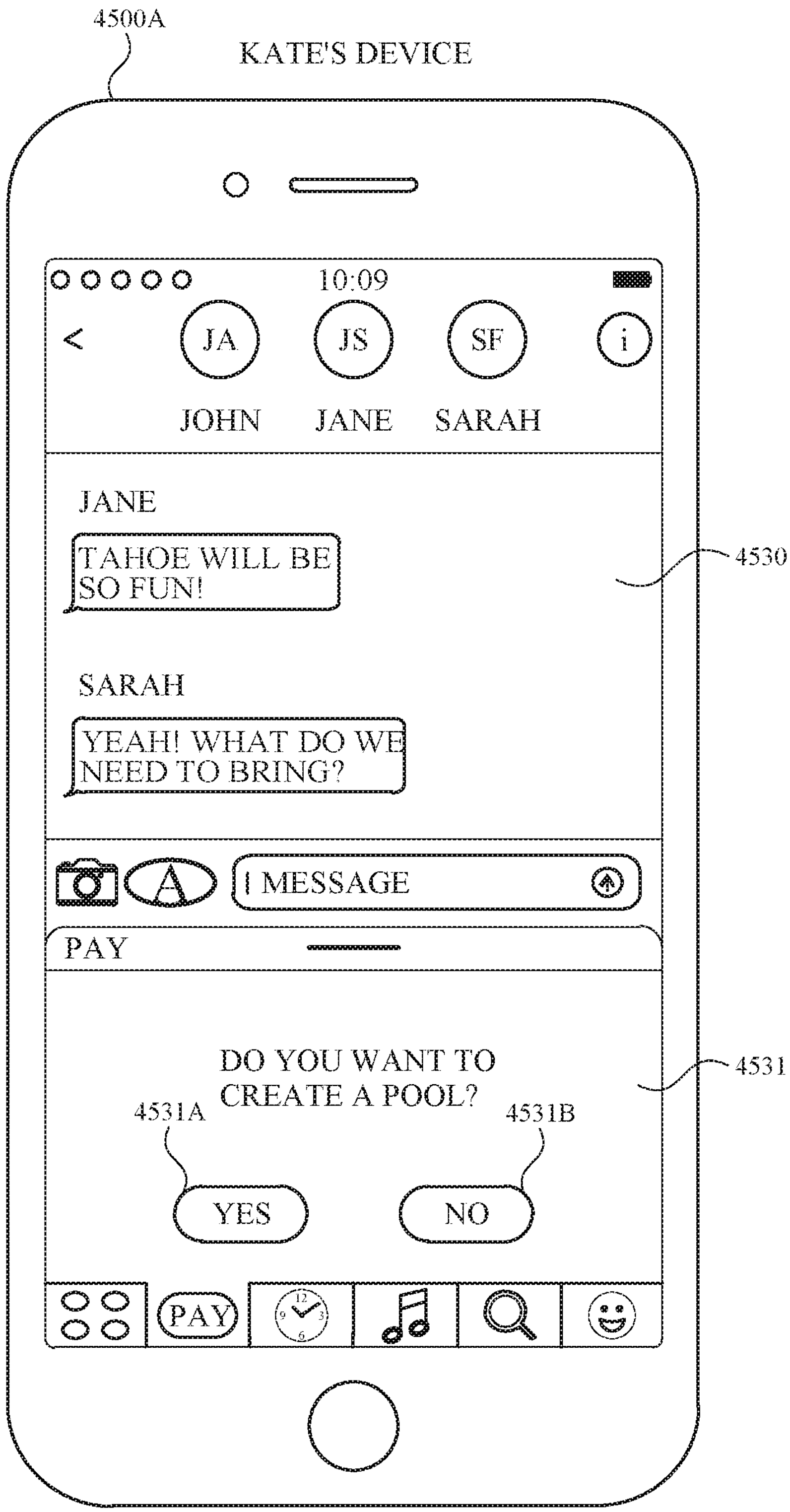

While displaying group message conversation 4530 among the user (Kate), message participant 4508 (John), message participant 4532 (Jane), and message participant 4534 (Sarah), electronic device 4500A detects (e.g., via a touchscreen of display 4502) a user selection 4503 (e.g., a tap gesture) of application button 4516. In FIG. 45D, in response to detecting user selection 4503 of application button 4516 while displaying group message conversation 4530, electronic device 4500A displays (e.g., replaces display of virtual keyboard 4514 with) a pool account creation prompt 4531 for creating a pool account to be shared by the participants of group message conversation 4530 (Kate, John, Jane, and Sarah). As shown in FIG. 45D, pool account creation prompt includes a yes button 4531A for proceeding with creating the pool account and a no button 4531B for forgoing proceeding with creating the pool account.

Figure 45E:
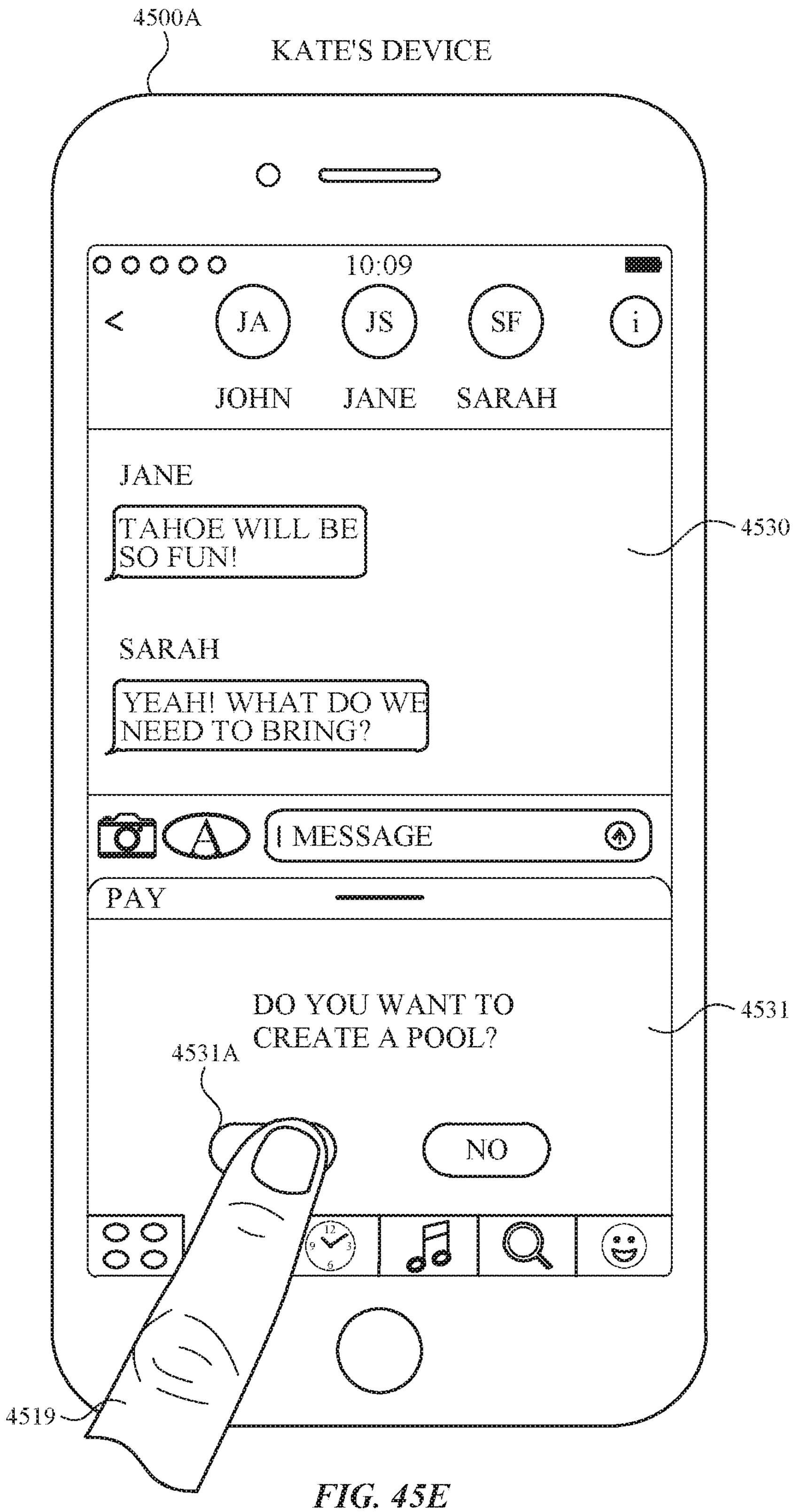

In FIG. 45E, while displaying pool account creation prompt 4531 (and simultaneously displaying group message conversation 4530), electronic device 4500A detects (e.g., via a touchscreen of display 4502) a user selection 4519 (e.g., a tap gesture) of yes button 4531A of pool account creation prompt 4531 to proceed with creating a pool account.

Figure 45F:
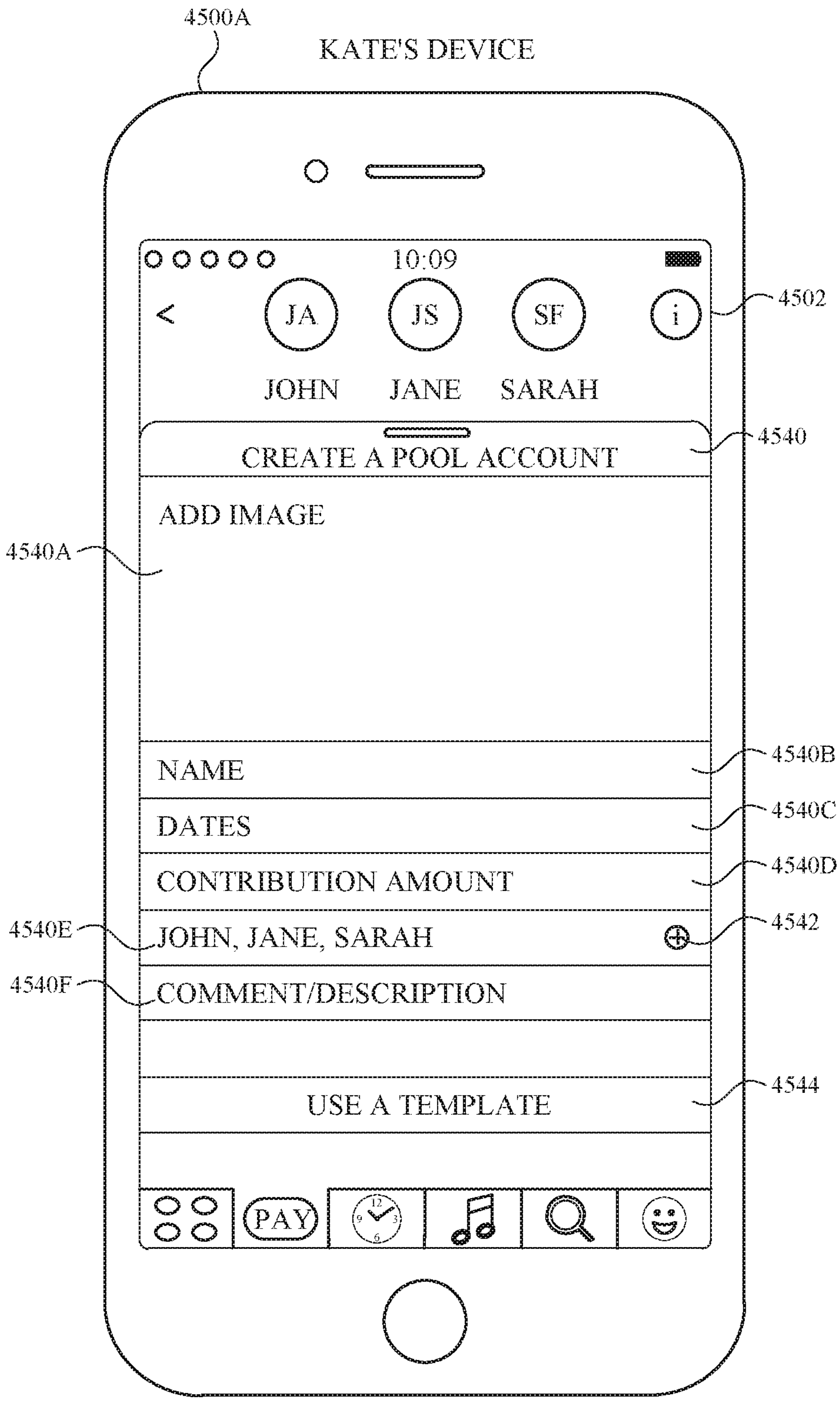

In FIG. 45F, in response to detecting user selection 4519 of yes button 4531A, electronic device 4500A displays a pool account creation user interface 4540 for creating a pool account shared among members of group message conversation 4530. In some examples, as shown in FIG. 45F, pool account creation user interface 4540 is displayed (at least partially) over group message conversation 4530. In some examples, as shown in FIG. 45F, at least a portion of the group message participants (e.g., message participant 4508, message participant 4532, and message participant 4534) shown in messaging application 4502 remain visible while pool account creation user interface 4540 is displayed.

Pool account creation user interface 4540 includes a plurality of regions corresponding to parameters (or settings) of the pool account that is being created. In some embodiments, as illustrated in FIG. 45F, pool account creation user interface 4540 includes an image region 4540A (e.g., for adding a representative image of the pool account), a name region 4540B (e.g., for entering a name of the pool account), a dates region 4540C (e.g., for entering a valid time period of the pool account during which the pool account is active and not expired), a contribution amount region 4540D (e.g., for entering a contribution amount requested to selected invitees of the pool account), a participants region 4540E (e.g., showing the currently-selected invitees of the pool account), and a comment region 4540F (e.g., for entering a comment or description regarding the pool account).

In some examples, participants region 4540E also includes an add participant button 4540 for adding or removing participants to invite to join the pool account. Thus, in some embodiments, the invited pool participants (e.g., as shown in participants region 4540E) can be entered and/or selected manually by the user. In some embodiments, the invited pool participants are automatically (e.g., without user input) selected based on participants of the background group message conversation (e.g., group message conversation 4530). Thus, in FIG. 45F, because participants of group message conversation 4530 are the user (Kate), message participant 4508 (John), message participant 4532 (Jane), and message participant 4534 (Sarah), the pool participants are automatically displayed to include John, Jane, and Sarah in participants region 4540E (without user input).

In some embodiments, not every pool participant is authorized to make a payment transaction using the pool account, and not every pool participant is authorized to make a contribution to the pool account. That is, in some embodiments, some (but not all) participants of the pool account are designated as authorized fund users and/or some (but not all) participants of the pool account are designated as authorized fund contributors. In some embodiments, pool account creation user interface 4540 also includes a authorized user region for separately selecting the users who are authorized to use the pool account to make a payment transaction (e.g., authorized fund users) once it has been created (e.g., if not all of the pool participants are to be authorized to use the pool account to make a payment transaction). In some embodiments, pool account creation user interface 4540 also includes a contributing user region for separately selecting the pool participants that are authorized to make contributions (e.g., authorized fund contributors) to the pool account.

In some embodiments, as illustrated in FIG. 45F, pool account creation user interface 4540 also includes a template button 4544 (e.g., stating "Use a Template") for selecting a template from a plurality of available pre-existing templates, where a template includes a set of default account settings (e.g., default image, default name, default dates, default contribution amount, default participants, default authorized fund users, default authorized fund contributors).

Figure 45G:
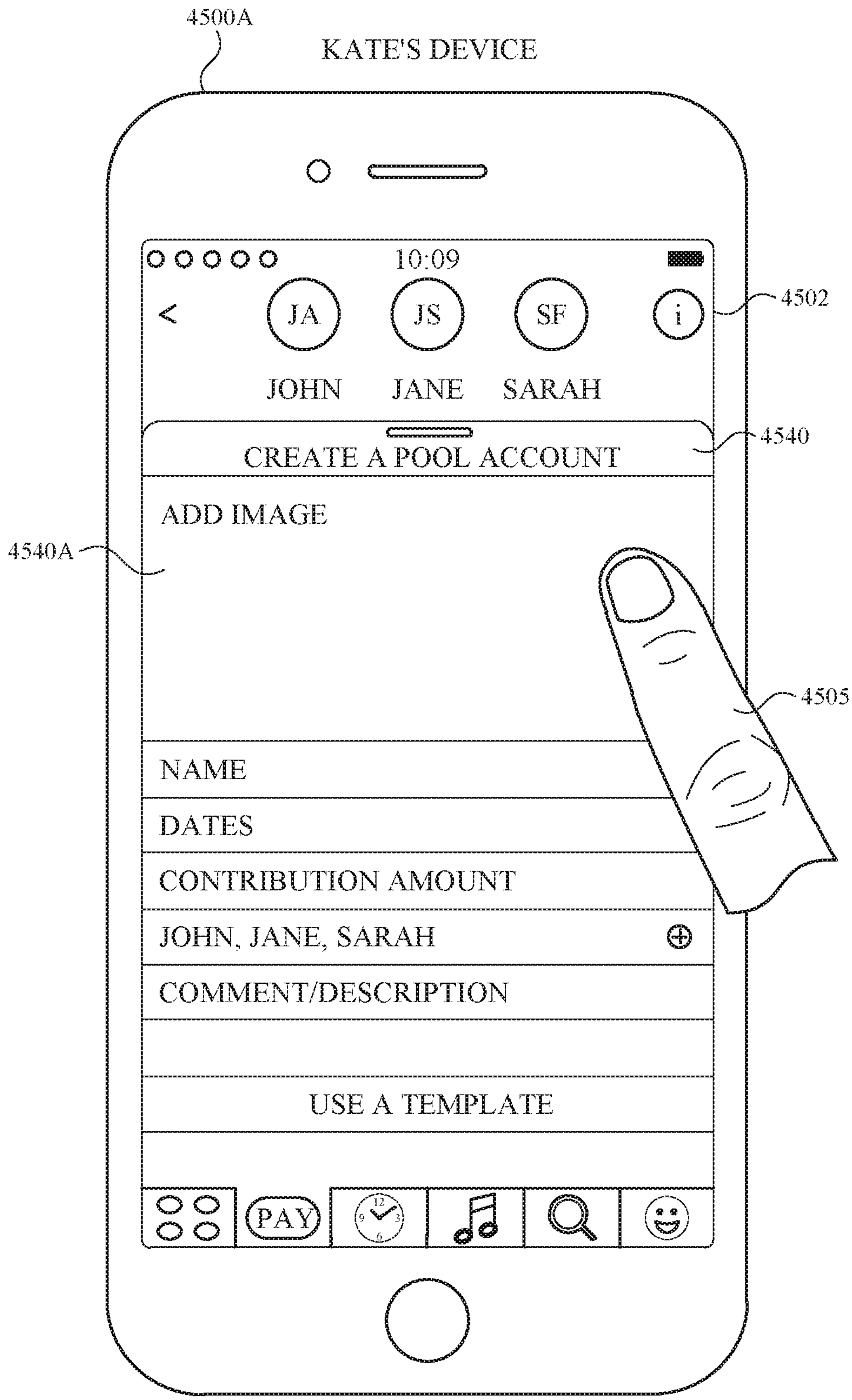
Figure 45H:
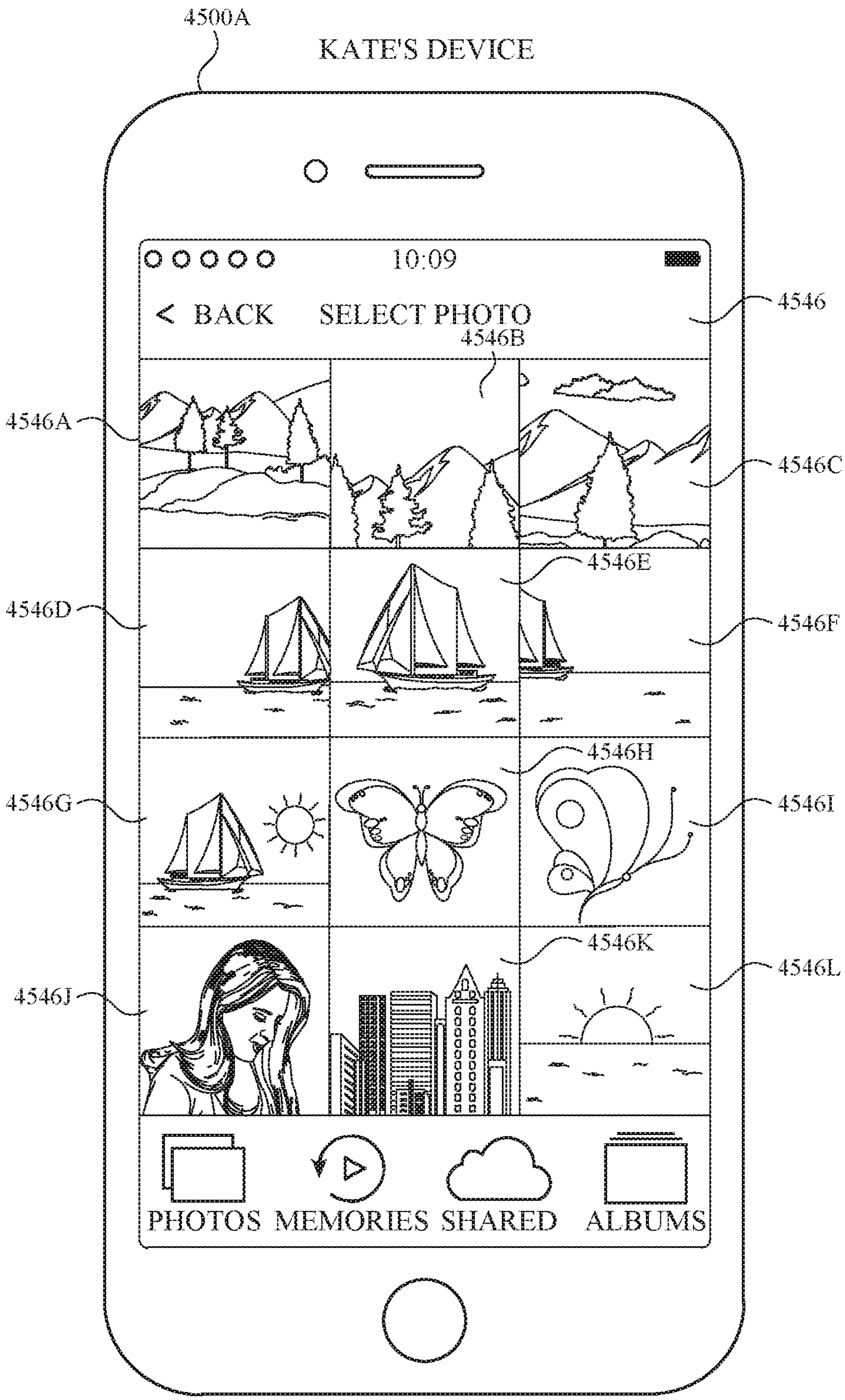

In FIG. 45G, while displaying pool account creation user interface 4540, electronic device 4500A detects (e.g., via a touchscreen of display 4502) a user selection 4505 (e.g., a tap gesture) of image region 4540A. In FIG. 45H, in response to detecting user selection 4505 of image region 4540A, electronic device 4500A displays (e.g., replaces display of pools account creation user interface 4540 with) a photo gallery user interface 4546 that includes one or more photos (e.g., photos 4546A-4546L) stored on or accessible by the device.

Figure 45I:
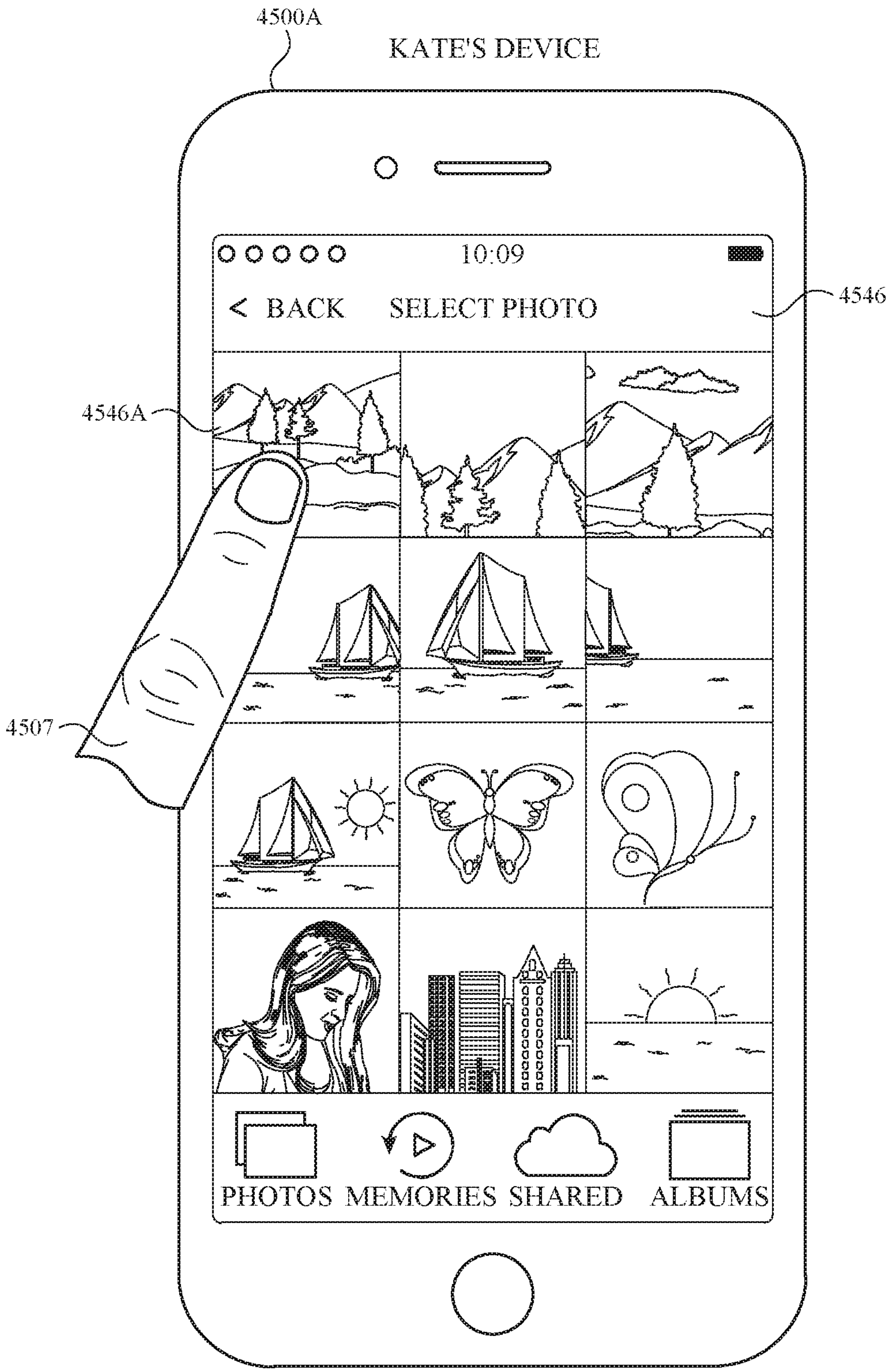
Figure 45J:
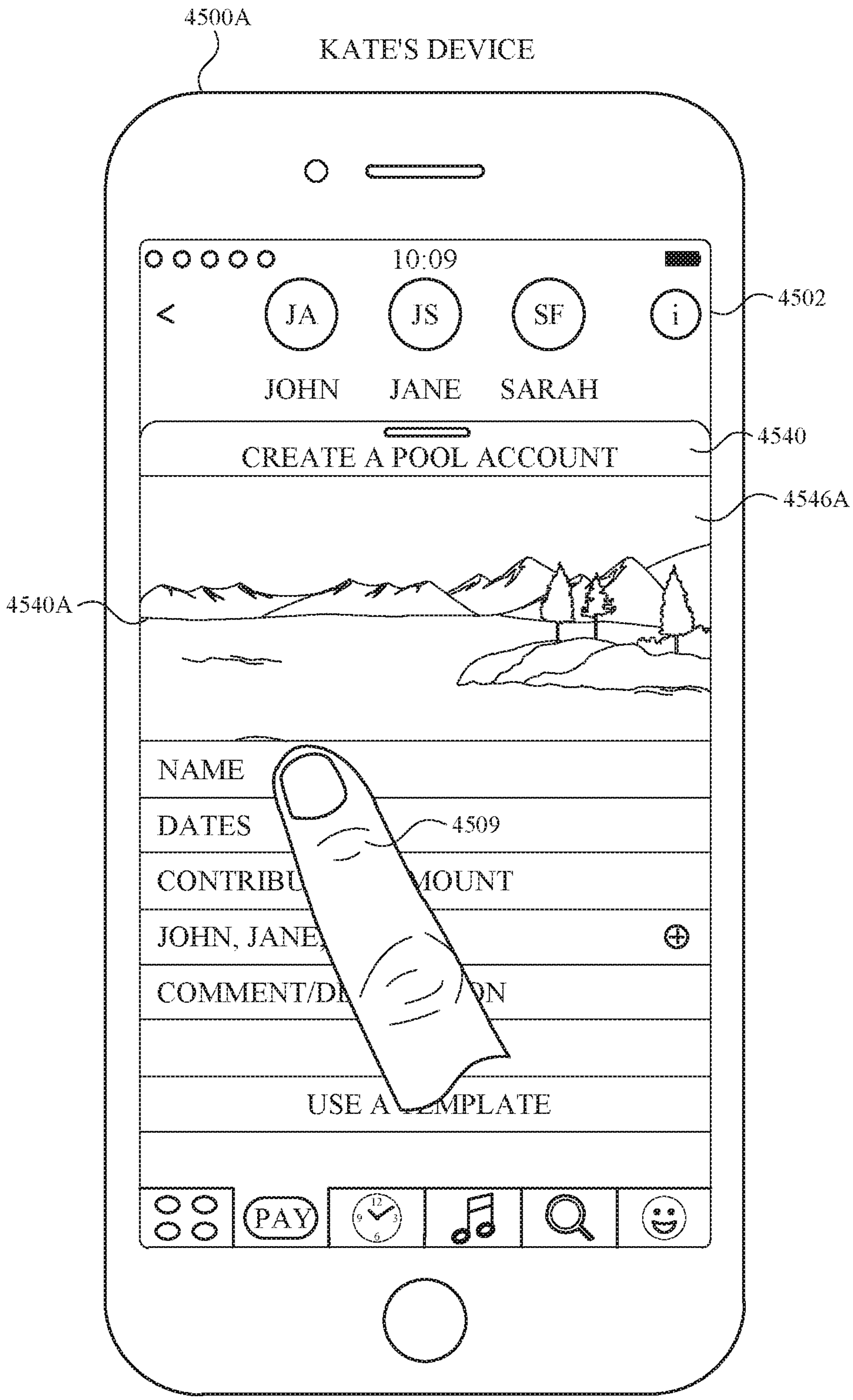

In FIG. 45I, while displaying photo gallery user interface 4546, electronic device 4500A detects (e.g., via a touchscreen of display 4502) a user selection 4507 (e.g., a tap gesture) of photo 4546A of the plurality of photos 4546A-4546L shown in the photo gallery user interface. In FIG. 45J, in response to detecting user selection 4507 on photo 4546A, electronic device 4500A sets selected photo 4546A as the representative photo of the pool account currently being created. Thus, in response to detecting user selection 4507 on photo 4546A, electronic device 4500A displays pool account creation user interface 4540 with photo 4546A shown as the representative image of the pool account within image region 4540A.

Figure 45K:
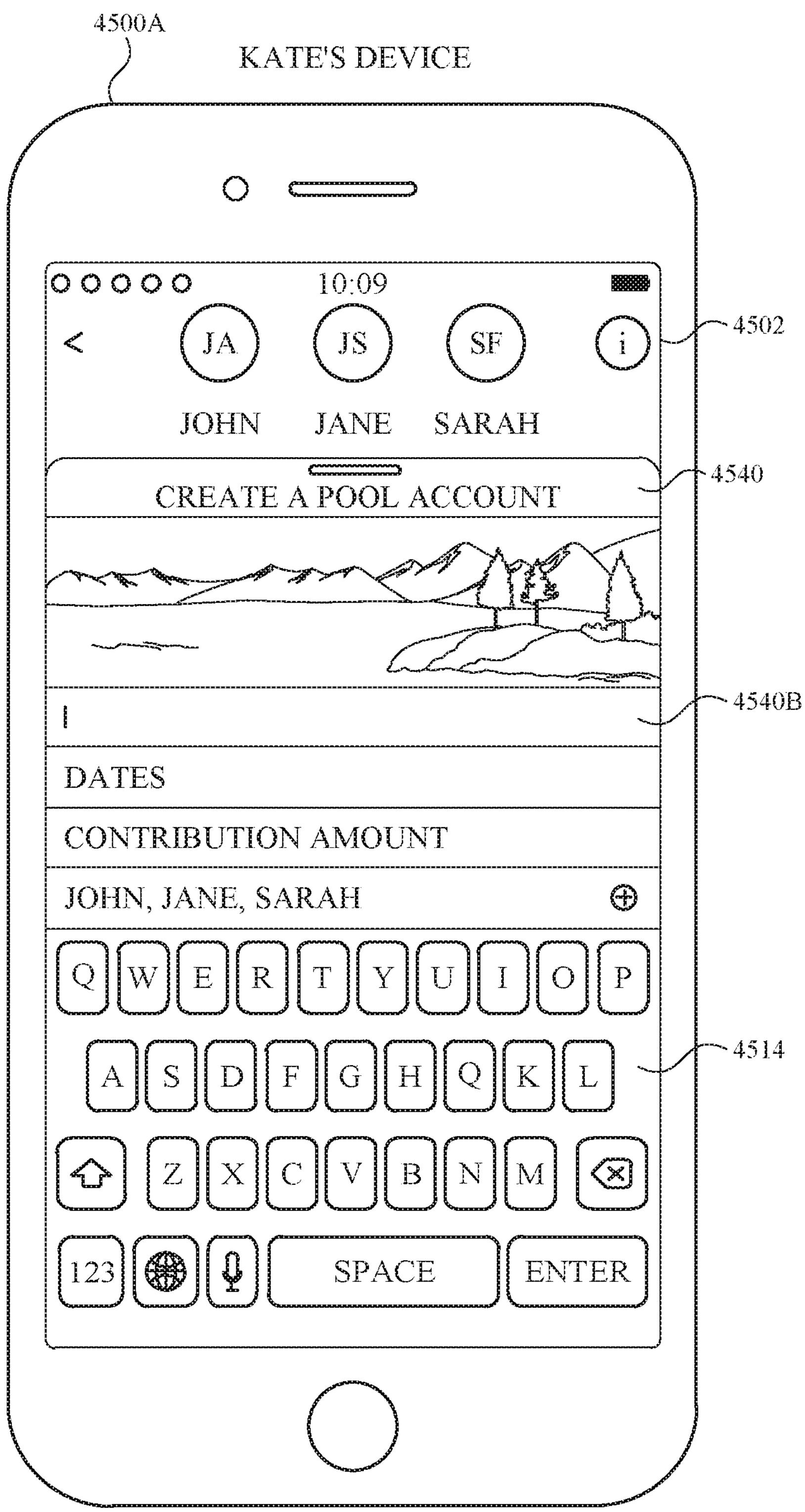

In FIG. 45J, while displaying pool account creation user interface 4540 (e.g., and subsequent to selecting the representative image of the pool account), electronic device 4500A detects (e.g., via a touchscreen of display 4502) a user selection 4509 (e.g., a tap gesture) of name region 4540B. In FIG. 45K, in response to detecting user selection 4509 of name region 4540B, electronic device 4500A displays an indication (e.g., a cursor) within name region 4540B indicating that a user input can be made in the region. Further, electronic device 4500A displays (e.g., over a portion of pool account creation user interface 4540) a virtual keyboard 4514 for making the user input.

Figure 45L:
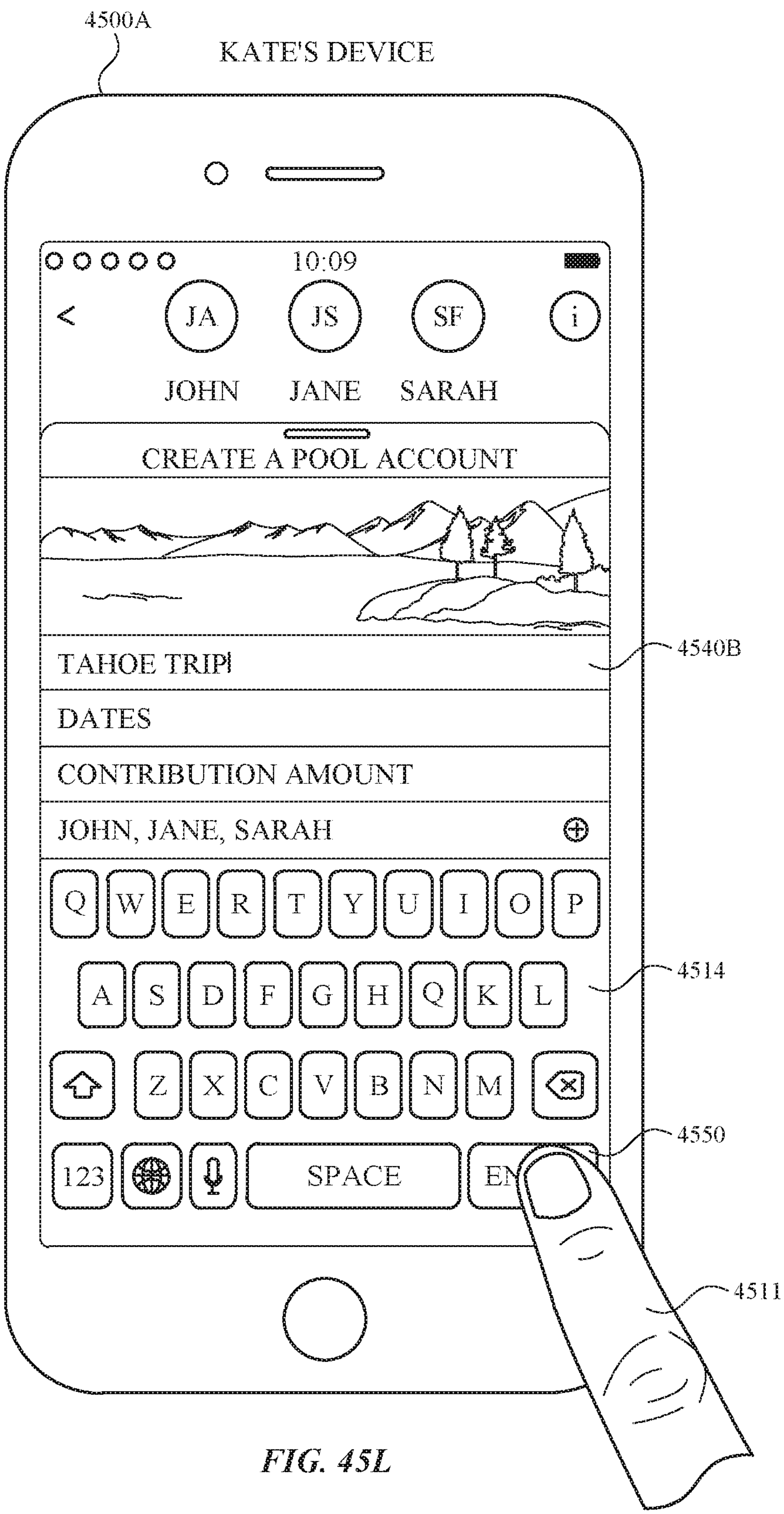

In FIG. 45L, while displaying the indication (e.g., a cursor) within name region 4540B indicating that a user input can be made within the region, electronic device 4500A receives a user input corresponding to the desired name (e.g., "Tahoe Trip") of the pool account, which is displayed within name region 4540B, and subsequently detects a user selection 4511 (e.g., a tap gesture) on an enter button 4550 (once the user has finished entering the name of the pool account within name region 4540B). User selection 4511 sets the name of the pool account to be the entered user input (e.g., "Tahoe Trip").

Figure 45M:
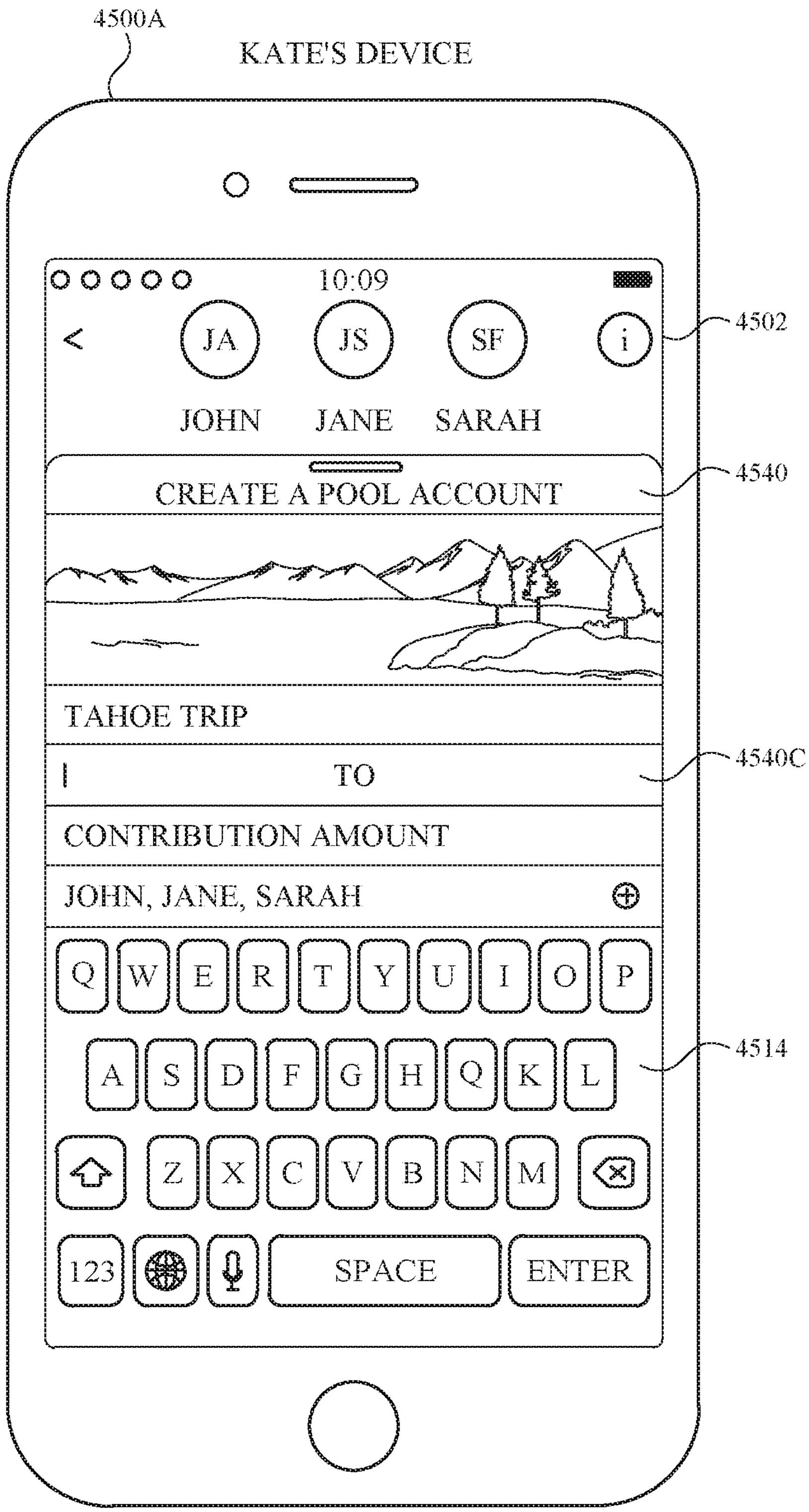

In FIG. 45M, in response to detecting user selection 4511 of enter button 4550 or in response to detecting a user selection (e.g., a tap gesture) of date region 4540C, electronic device 4500A displays an indication (e.g., a cursor) within date region 4540C indicating that a user input can be made in the region.

Figure 45N:
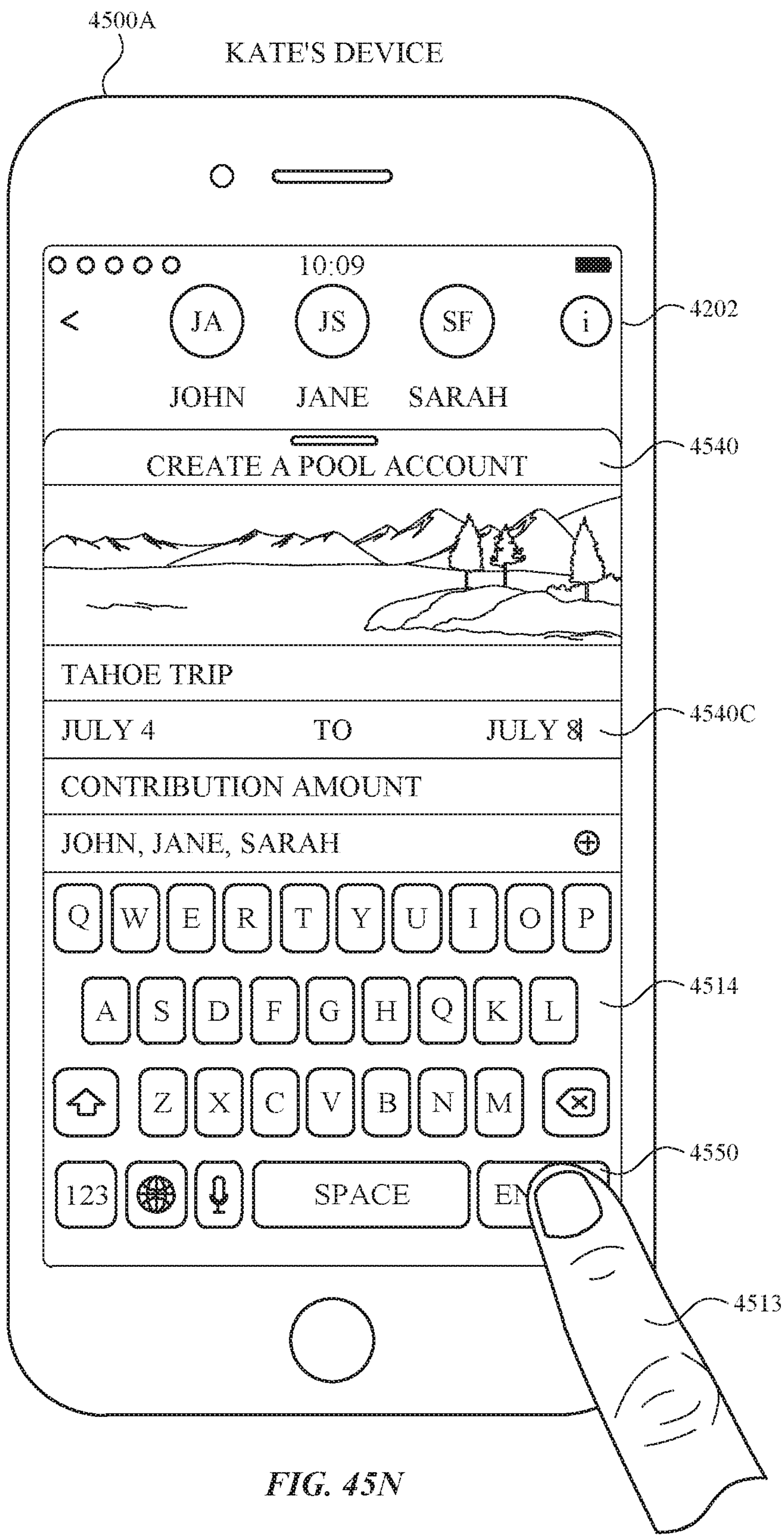

In FIG. 45N, while displaying the indication (e.g., a cursor) within date region 4540C indicating that a user input can be made within the region, electronic device 4500A receives a user input corresponding to the desired date range (e.g., from "July 4" to "July 8") during which the pool account will be valid for use, which is displayed within date region 4540C, and subsequently detects a user selection 4513 (e.g., a tap gesture) of an enter button 4550 (once the user has finished entering the date range of the pool account within date region 4540C). User selection 4513 sets the pool account to be valid for use during the entered date range. When the pool account is valid for use, it can be used to make a payment transaction (e.g., similar to using a bank account provisioned on the device to make a payment transaction), but when the pool account is not valid for use (e.g., the account is not yet in force or is expired), it cannot be used to make a payment transaction.

Figure 45O:
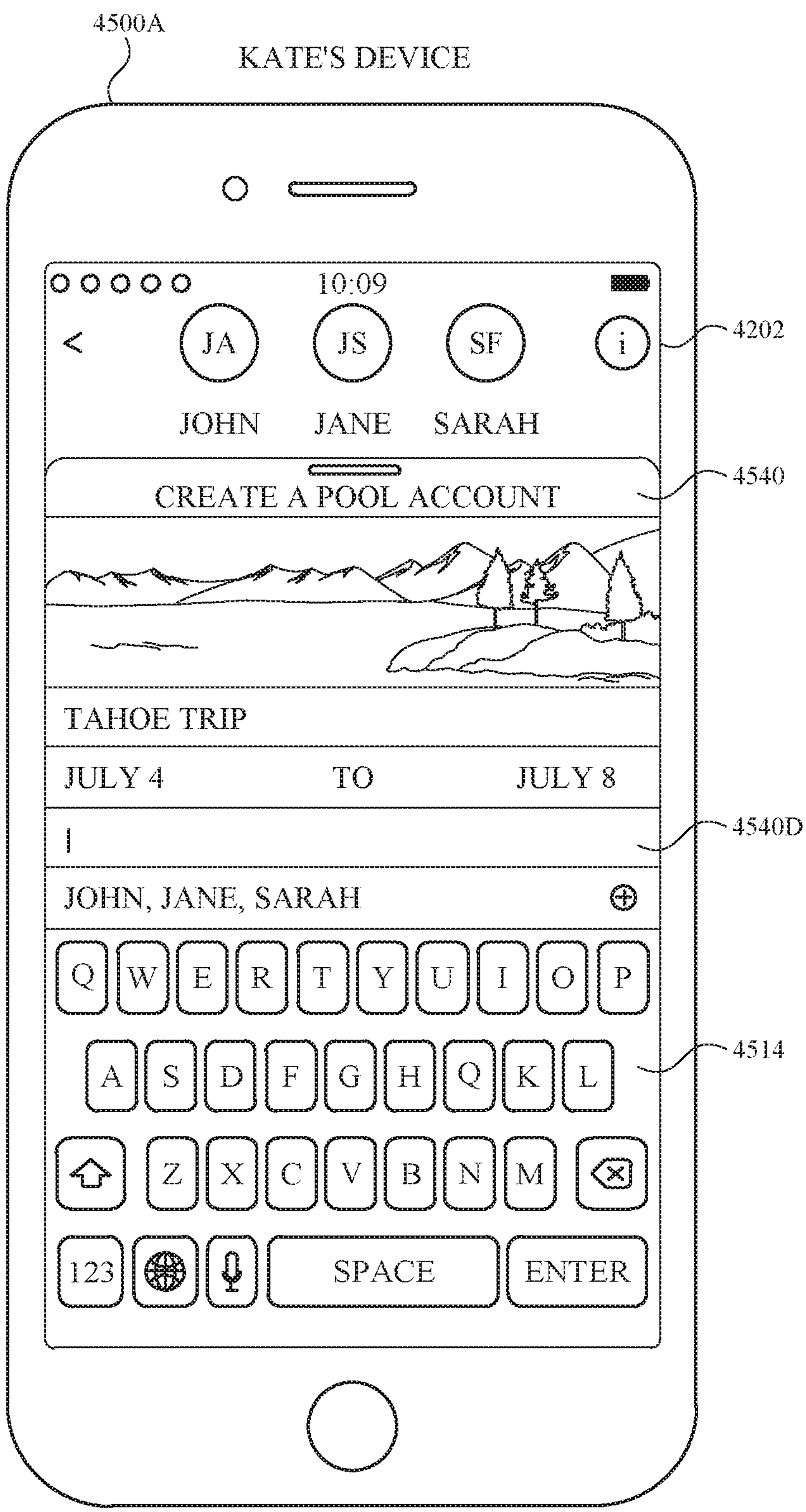

In FIG. 45O, in response to detecting user selection 4513 of enter button 4550 or in response to detecting a user selection (e.g., a tap gesture) of contribution region 4540D, electronic device 4500A displays an indication (e.g., a cursor) within contribution region 4540D indicating that a user input can be made in the region.

Figure 45P:
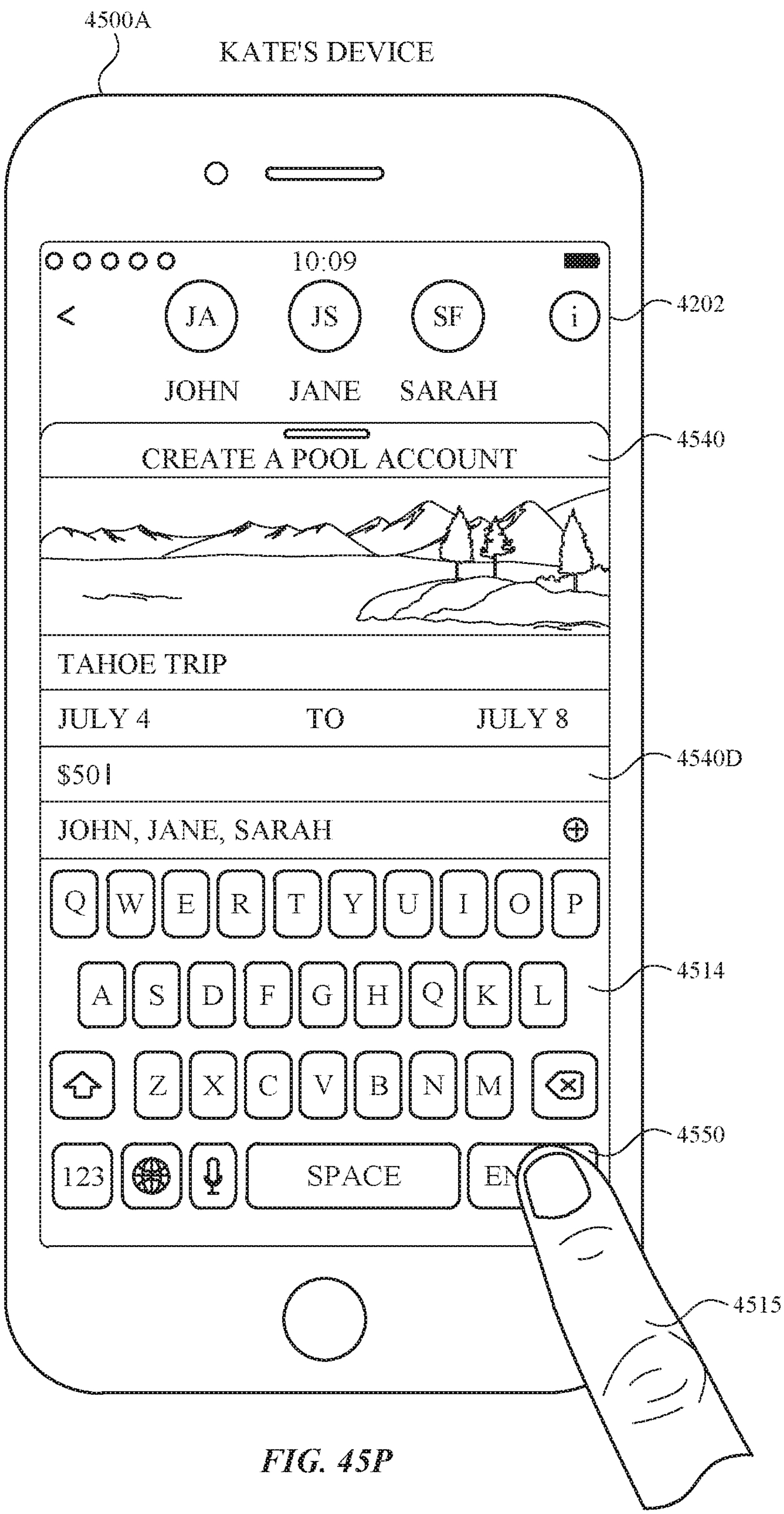

In FIG. 45P, while displaying the indication (e.g., a cursor) within contribution region 4540D indicating that a user input can be made within the region, electronic device 4500A receives a user input corresponding to the desired contribution amount (e.g., "$50") that each invited participant is requested to pay (or must pay in order to join the pool account). The entered contribution amount is displayed within contribution region 4540D. Subsequently, electronic device 4500A detects a user selection 4515 (e.g., a tap gesture) of an enter button 4550 (once the user has finished entering the contribution amount within contribution region 4540D). User selection 4515 sets the requested contribution amount that an invited participant (message participant 4508, message participant 4532, message participant 4534) is requested to pay when joining the pool account or is required to pay in order to join the pool account.

Figure 45Q:
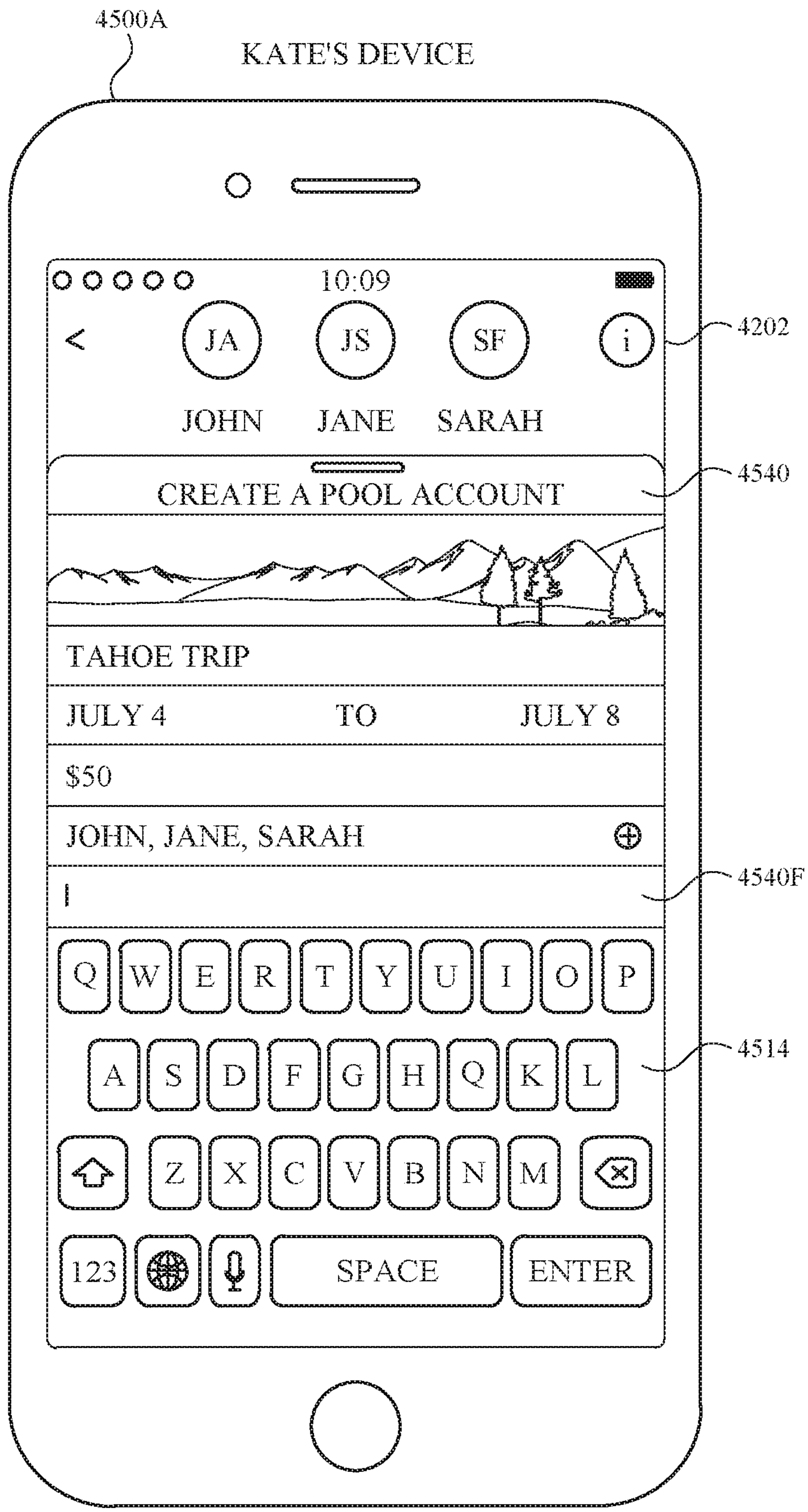

In FIG. 45Q, in response to detecting user selection 4515 of enter button 4550 or in response to detecting a user selection (e.g., a tap gesture) of comment region 4540F, electronic device 4500A displays an indication (e.g., a cursor) within comment region 4540F indicating that a user input can be made in the region.

Figure 45R:
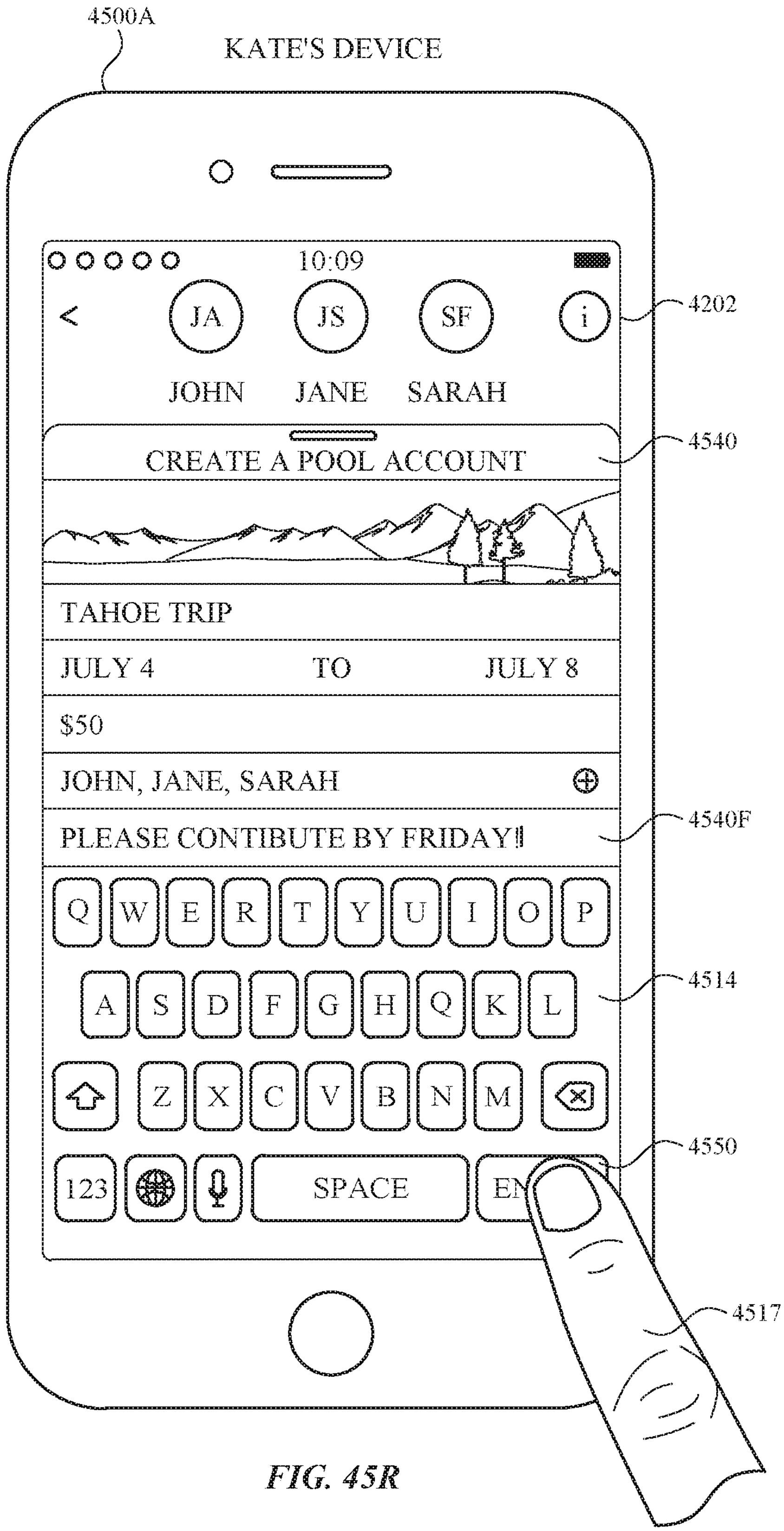

In FIG. 45R, while displaying the indication (e.g., a cursor) within contribution region 4540F indicating that a user input can be made within the region, electronic device 4500A receives a user input corresponding to the entered comment (e.g., stating "Please contribute by Friday!"), which is displayed within comment region 4540F. Subsequently, electronic device 4500A detects a user selection 4517 (e.g., a tap gesture) of an enter button 4550 once the user has finished entering the comment within comment region 4540F). In some embodiments, as shown in FIG. 45U, the entered comment within comment region 4540F is sent together with an invitation corresponding to an invitation to join the pool account once all of the parameters of the pool account has been set by the user and the invitation has been sent by the user.

Figure 45S:
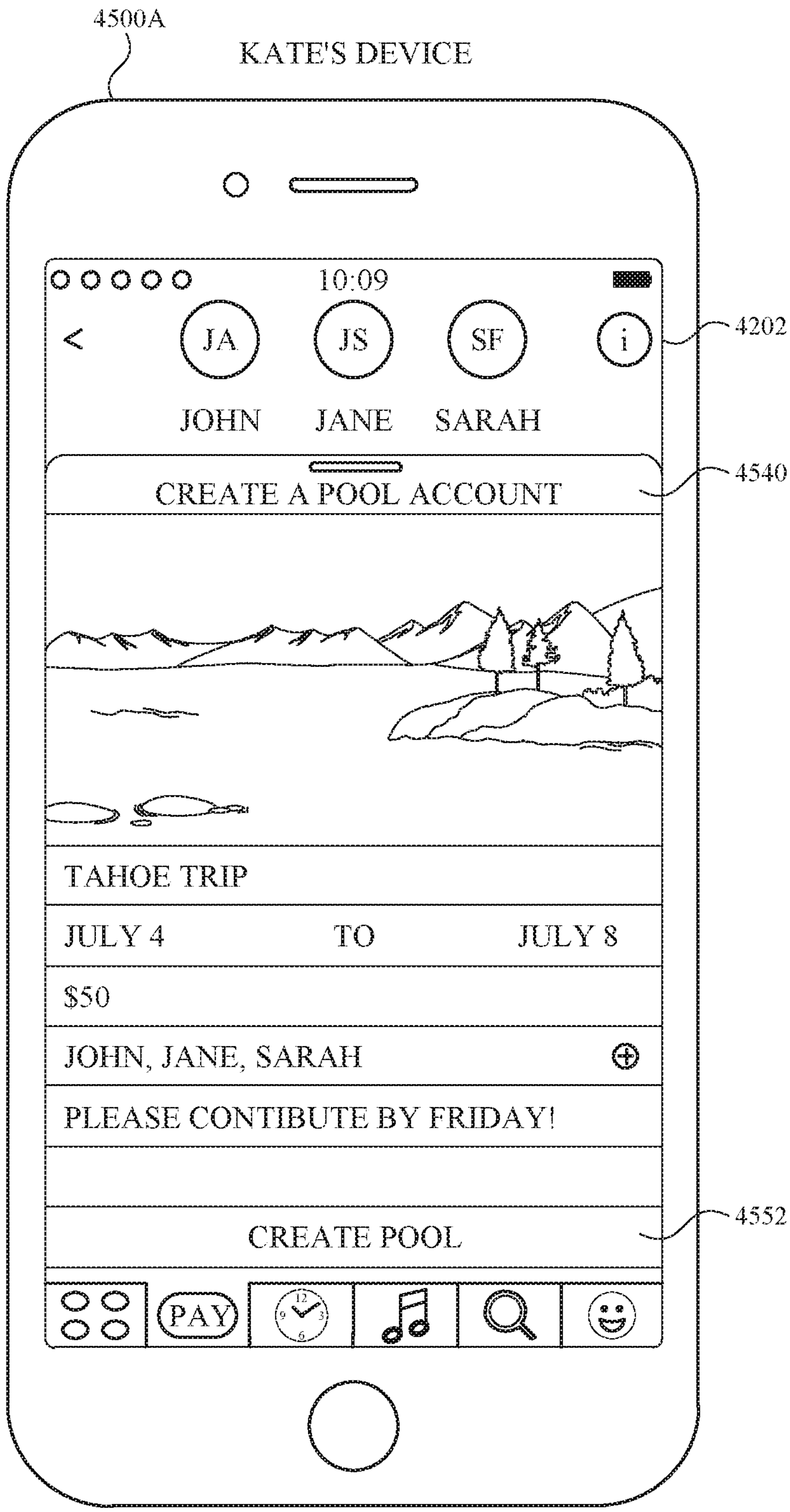
Figure 45T:
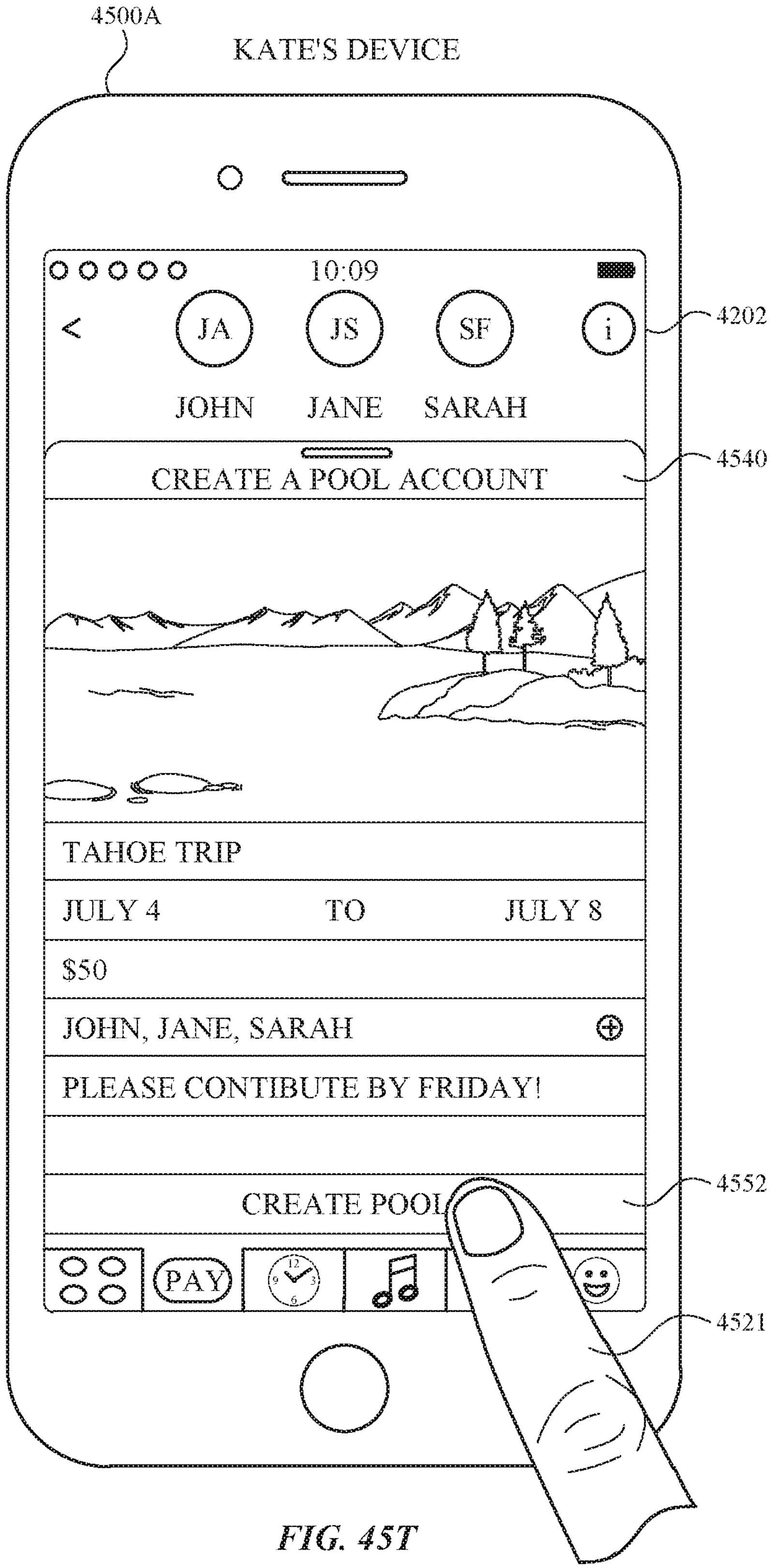

In FIG. 45S, electronic device 4500A displays (e.g., in response to detecting a tap gesture on a region of pool account creation user interface 4540 after the user has finished entering the parameters of the pool account) a create pool button 4552. In some embodiments, electronic device 4500A displays create pool button 4552 in response to a determination that at least a required set of parameters of the pool account has been entered by the user. In some examples, create pool button 4552 replaces template button 4544 within pool account creation user interface 4540. In FIG. 45T, while displaying create pool button 4552 within pool account creation user interface 4540, electronic device 4500A detects (e.g., via a touchscreen of display 4502) a user selection 4521 of create pool button 4552.

FIG. 45U illustrates four devices 4500A-D, each corresponding to Kate's Device (electronic device 4500A), John's Device (electronic device 4500B), Jane's Device (electronic device 4500C), and Sarah's Device (electronic device 4500D). Solely for the ease of description, electronic device 4500A is referred to as Kate's Device, electronic device 4500A is referred to as John's Device, electronic device 4500A is referred to as Jane's Device, and electronic device 4500A is referred to as Sarah's Device.

In FIG. 45U, in response to detecting user selection 4521, Kate's Device ceases to display pool account creation user interface 4540, displays group message conversation 4530 of messaging application 4504 among the user (Kate), message participant 4508 (John), message participant 4532 (Jane), and message participant 4534 (Sarah), and transmits a communication corresponding to invitations to join the created pool account to the devices of the invited participants (John's Device, Jane's Device, and Sarah's Device).

Kate's Device further displays, in group message conversation 4530, a pool message object 4554 (e.g., similar to pool message object 4230 described above with reference to FIG. 42G) that corresponds to the created pool account (e.g., named "Tahoe Trip"). As with pool message object 4230, pool message object 4554 includes a name indication 4554A of the pool account, a date indication 4554B of the pool account, and a background image 4554C of the pool account corresponding to the selected representative image of the pool account. Further, pool message object 4554 includes a view button 4556 for viewing the details (e.g., as shown in pool details user interface 4252 shown in FIG. 42K) of the pool account. Kate's Device further displays, in group message conversation 4530 (e.g., below pool message object 4554) a message object 4558 (e.g., stating "Please contribute by Friday!") corresponding to the comment entered by the user (Kate) within comment region 4540F.

As shown by John's Device in FIG. 45U, subsequent to receiving the message corresponding to join the pool account, John's Device displays, within a group message conversation 4530B corresponding to the same group message conversation 4530 displayed on Kate's Device, a pool message object 4555 corresponding to pool message object 4554 and a message object 4558B corresponding to message object 4558, where pool message object 4555 includes a join button 4563 for joining the pool account.

Similarly, as shown by Jane's Device in FIG. 45U, subsequent to receiving the message corresponding to join the pool account, Jane's Device also displays, within a group message conversation 4530C corresponding to the same group message conversation 4530 displayed on Kate's Device, a pool message object 4557 corresponding to pool message object 4554 and a message object 4558C corresponding to message object 4558, where pool message object 4557 includes a join button 4565 for joining the pool account.

Similarly, as shown by Sarah's Device in FIG. 45U, subsequent to receiving the message corresponding to join the pool account, Sarah's Device also displays, within a group message conversation 4530D corresponding to the same group message conversation 4530 displayed on Kate's Device, a pool message object 4559 corresponding to pool message object 4554 and a message object 4558D corresponding to message object 4558, where pool message object 4559 includes a join button 4567 for joining the pool account. By selecting the join button on its respective pool message object, an invited participant is enabled to join the pool account (e.g., as described with respect to Sarah in FIGS. 42H-42K).

FIGS. 46A-46C are a flow diagram illustrating a method 4600 for creating a group account versus a non-group account, in accordance with some embodiments. Method 4600 is performed at a device (e.g., 100, 300, 500, 4400A, 4500A) with a display (e.g., 4402, 4502) and one or more input devices (e.g., a touchscreen of the display, a mechanical button, a mic). Some operations in method 4600 are, optionally, combined, the orders of some operations are, optionally, changed, and some operations are, optionally, omitted.

As described below, method 4600 provides an intuitive way for managing peer-to-peer transactions. The method reduces the cognitive burden on a user for managing peer-to-peer transactions, thereby creating a more efficient human-machine interface. For battery-operated computing devices, enabling a user to manage peer-to-peer transactions faster and more efficiently conserves power and increases the time between battery charges.

The electronic device (e.g., 4400A, 4500A) displays (4602), on the display (e.g., 4402, 4502), at least a portion of a message conversation (e.g., 4406, 4506, 4430, 4530) of a messaging application (e.g., 4404, 4504). Displaying at least the portion of the message conversation of the messaging application provides visual feedback by indicating that the displayed message conversation is currently active (e.g., being used) on the device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the messaging application is a first-party application (e.g., an application that can only be controlled by the operating system of the device or is part of the operating system of the device, and cannot be controlled by a third-party application).

While displaying at least the portion of the message conversation (e e.g., 4406, 4506, 4430, 4530) of the messaging application (e.g., 4404, 4504), the electronic device (e.g., 4400A, 4500A) displays (4604), on the display (e.g., 4402, 4502), a first affordance (for opening a user interface for transferring funds, resources, points, photos, files) (e.g., 4416, 4516) that is associated with management of items of a first type (e.g., currency, photos, videos, printer credits). Displaying a first affordance that is associated with management of items of the first type provides visual feedback by enabling the user to quickly recognize that selecting the affordance will cause display of items of the first type. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, the first affordance is a selectable indication that automatically appears in a message object of the message conversation based on context information, as described with reference to indication 822 in FIG. 8B.

The electronic device (e.g., 4400A, 4500A) detects (4606), via the one or more input devices, a user activation of the first affordance (e.g., 4416, 4516) (e.g., a tap gesture on the first affordance). In some embodiments, the items of the first type are funds (e.g., dollars, euros) and the shared item management account is a shared group payment account (e.g., a payment account to which each of the participants in the group payment account is enabled to make payments and/or contributions).

In response to (or subsequent to) detecting (4608) the user activation of the first affordance (e.g., 4416, 4516), the electronic device (e.g., 4400A, 4500A), in accordance with a determination that the message conversation is a group message conversation (e.g., 4430, 4530) that includes more than two participants (e.g., the user of the device and at least two other participants) (e.g., 4408, 4432, 4434, 4508, 4532, 4534), displays (4610), on the display (e.g., 4402, 4502), a first user interface (e.g., 4440, 4540) for setting up a shared item management account for managing items of the first type with participants in the message conversation. Automatically displaying the first user interface for setting up a shared item management account for managing items of the first type with participants in the message conversation in accordance with the determination that the message conversation is a group conversation enables the user to access the first user interface more quickly (e.g., with fewer inputs). Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, the first user interface enables the user to create a group account, as described with reference to pool account creation user interface 4222 of FIG. 42E. In some examples, in accordance with a determination that the message conversation includes two participants (including the user of the device), the first transfer user interface is displayed.

In some embodiments, while displaying the first user interface (e.g., 4440, 4540), the electronic device (e.g., 4400A, 4500A) (automatically) displays (4614), on the first user interface (e.g., 4440, 4540), at least one invitee of a plurality of invitees of the shared item management account, where the plurality of invitees to the shared item management account correspond to the more than two participants (e.g., 4408, 4432, 4434, 4508, 4532, 4534) of the group message conversation (e.g., 4430, 4530). Automatically displaying, on the first user interface, at least one invitee of the plurality of invitees of the shared item management account while displaying the first user interface enables the user to bypass having to manually select invitees of the shared item management account. Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to displaying (4616) the first user interface (e.g., 4440, 4540), the electronic device (e.g., 4400A, 4500A) detects (4618), via the one or more input devices, user selection of a contact (e.g., a contact from a contacts list stored on the device or accessible by the device, such as including a phone number, an email address, or the like) and displays (4620), on the first user interface (e.g., 4440, 4540), at least one invitee of a plurality of invitees of the shared item management account, where the plurality of invitees includes the selected contact.

In some embodiments, subsequent to displaying (4616) the first user interface (e.g., 4440, 4540), the electronic device (e.g., 4400A, 4500A) detects (4622), via the one or more input devices, user selection of an image (e.g., 4546A, from a photo gallery stored on the device or accessible by the device, from a list of available default images) and designates (4624) the selected image (e.g., 4546A) as a representative image of the shared item management account.

In some embodiments, subsequent to displaying (4616) the first user interface, the electronic device (e.g., 4400A, 4500A) detects (4626), via the one or more input devices, user selection of a first time (e.g., a specific date) and a second time (e.g., a specific later date) and designates (4628) an active time period of the shared item management account to be the time period between the first time and the second time. Designating an active time period of the shared item management account to be the time period between the first time and the second time reduces the likelihood of fraudulent transfers made using the shared item management account (e.g., by limiting the time during which the account can be used). Reducing the likelihood of fraudulent transfers enhances the operability of the device and makes the user-device interface more secure (e.g., by reducing fraud when operating/interacting with the device). In some examples, the default first time is the current time. In some examples, the shared item management account expires (and thus can no longer be used) after when the second time passes. In some examples, the shared item management account is not yet active (and thus cannot yet be used) before the first date.

In some embodiments, subsequent to displaying (4616) the first user interface (e.g., 4440, 4540), the electronic device (e.g., 4400A, 4500A) detects (4630), via the one or more input devices, user selection of an item amount (e.g., an amount of funds, an amount of resources, an amount of credit, a number of photos, a number of files) and transmits (4632) (via a wireless communication radio of the device) a request for items of the item amount to a first participant of the participants of the message conversation (e.g., 4408, 4432, 4434, 4508, 4532, 4534).

In some embodiments, subsequent to displaying (4616) the first user interface (e.g., 4440, 4540), the electronic device (e.g., 4400A, 4500A) detects (4634), via the one or more input devices, user input (e.g., textual input) providing a title to the shared item management account and designates (4636) the inputted title as a representative title (or representative name) of the shared item management account.

In some embodiments, subsequent to displaying (4616) the first user interface (e.g., 4440, 4540), the electronic device (e.g., 4400A, 4500A) detects (4638), via the one or more input devices, user input (e.g., textual input) providing a comment associated with the shared item management account and displays (4640), in the message conversation (e.g., 4430, 4530), a first message object (e.g., an invitation message object) corresponding to an invitation to join the shared item management account (e.g., a message object with a "join" affordance) and a second message object (e.g., a regular text message object) that includes the comment associated with the shared item management account.

In response to detecting (4608) the user activation of the first affordance (e.g., 4416, 4516), the electronic device (e.g., 4400A, 4500A), in accordance with a determination that the message conversation is a one-on-one message conversation (e.g., 4406, 4506) that includes (exactly) two participants (e.g., the user of the device and one other participant), displays (4612), on the display (e.g., 4402, 4502), a second user interface (e.g., 4418, 4518) different from the first user interface for sending or requesting items of the first type from another participant in the message conversation (e.g., 4406, 4506) without setting up the shared item management account for managing items of the first type. Automatically) displaying the second user interface for sending or requesting items of the first type from another participant in the message conversation without setting up the shared item management account for managing items of the first type in accordance with the determination that the message conversation is a one-on-one message conversation enables the user to access the second user interface more quickly (e.g., with fewer inputs). Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, the second user interface (e.g., 4418, 4518) is a transfer user interface for sending or requesting funds, resources, points, photos, and/or files, as described with reference to FIGS. 7A-7E and 8A-8AH. In some examples, in accordance with a determination that the message conversation includes more than two participants (including the user of the device), the second transfer user interface (e.g., 4418, 4518) is displayed.

Note that details of the processes described above with respect to method 4600 (e.g., FIGS. 46A-46C) are also applicable in an analogous manner to the methods described above and below. For example, method 4600 optionally includes one or more of the characteristics of the various methods described above and below with reference to methods 900, 1200, 1500, 1800, 2100, 2400, 2700, 3000, 3400, 3700, 4000, 4300, and 4900. For example, a transfer (e.g., of a resource, of a file, of data storage, of a payment) made via a message conversation of a messaging application, as described in method 900, can be made using items (e.g., files, data storage, funds) of a group account (e.g., a pool account). For another example, the applied visual effect (e.g., a 3D effect) for a completed transfer (e.g., of a resource, of a file, of data storage, of a payment), as described in method 1200, can be applied to a message object corresponding to a transfer (e.g., of files, of data storage, of funds) made using a group account (e.g., a pool account). For another example, providing for visually distinguishable message objects based on message designated, as described in method 1500, can be applied to transfers made using a group account (e.g., a pool account). For another example, an activated account (e.g., a data storage account, a payment account), as described in method 1800, can be used to contribute items (e.g., files, data storage, payment) to a group account (e.g., a pool account). For another example, exchanged an account from one account to a different account during a transfer, as described in method 2100, can occur between a personal account (e.g., a non-pool account) and a group account (e.g., pool account). For another example, when a transfer (e.g., of files, of data storage, of funds) is split between two different accounts, as described in method 2400, one account can be a personal account (e.g., a non-pool account) and the other account can be a group account (e.g., a pool account). For another example, when a transfer history list is displayed, as described in method 2700, the list can show transfers and contributions made to a group account (e.g., a pool account). For another example, the voice activation used to make a transfer, as described in method 3000, can also be used to make a transfer with items (e.g., files, data storage, funds) from a group account (e.g., a pool account). For another example, the dynamic visual feedback applied to a message object corresponding to an accepted transfer, as described in method 3400, can be applied to a message object corresponding to a transfer made using a group account (e.g., a pool account). For another example, a gift transfer can be sent (e.g., of data storage, of funds), as described in method 3700, using funds from a group account (e.g., a pool account). For another example, items (e.g., data storage, funds) received as a gift transfer, as described in method 4000, can be added (contributed to) a group account (e.g., a pool account). For another example, the group account (e.g., a pool account) shared by the participants, as described in method 4300, can be created from a group message conversation with members of the group message conversation automatically being selected as participants of the group account (e.g., a pool account). For another example, date settings can be changed, as described in method 4900, to extend the valid time period of a group account (e.g., a pool account). For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 46A-46C are, optionally, implemented by components depicted in FIGS. 1A-1B. For example, displaying operation 4602, displaying operation 4604, detecting operation 4606, displaying operation 4610, and displaying operation 4612 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 47A-47H illustrate example user interfaces for managing a valid time period of a group account, in accordance with some embodiments. As described in greater detail below, the techniques illustrated by the example user interfaces of FIGS. 47A-47H relate to the techniques illustrated by the example user interfaces of FIGS. 48A-48Y.

Figure 47A:
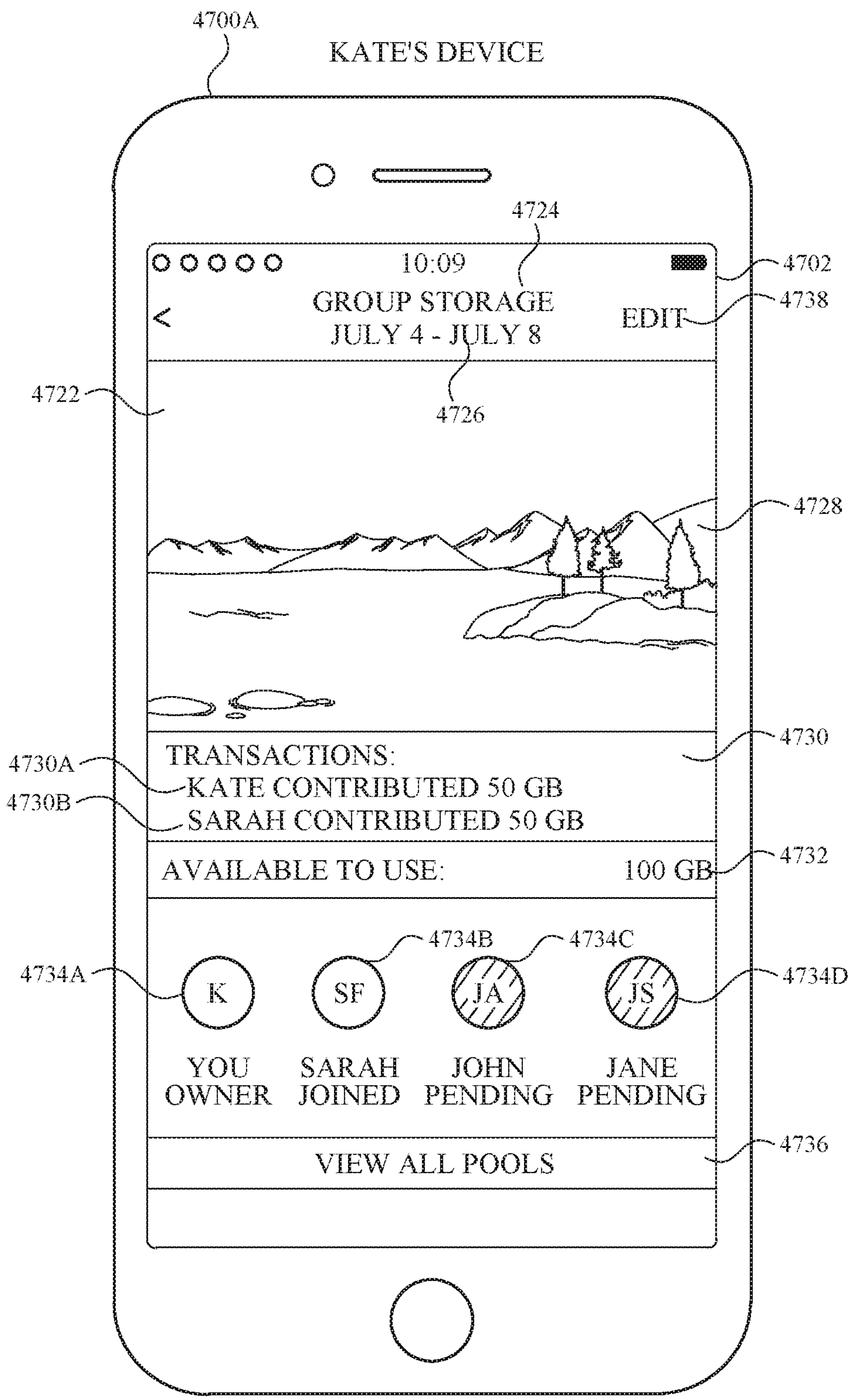
FIGS. 47A-47H illustrate example user interfaces for managing a valid time period of a group account, in accordance with some embodiments.

FIG. 47A illustrates an electronic device 4700A (e.g., portable multifunction device 100, device 300, or device 500). In the non-limiting example embodiment illustrated in FIGS. 47A-47H, electronic device 4700A is a smartphone. In other embodiments, electronic device 4700A can be a different type of electronic device, such as a wearable device (e.g., a smartwatch). Electronic device 4700A has a display 4702 and a secure element (e.g., secure element 115).

In FIG. 47A, electronic device 4700A displays (a pool detail user interface 4722 (e.g., corresponding to pool detail user interface 4152 described above with reference to FIG. 41D). For example, as shown in FIG. 47A, pool detail user interface includes a name region 4724 (e.g., showing "Group Storage") indicating the name of the pool data storage account, a date region 4726 (e.g., showing "July 4 to July 8") indicating a valid time period during which storage space of the pool group storage account can be used (e.g., for storing files), and an image region 4728 showing the representative image of the selected pool account.

In some embodiments, pool detail user interface 4722 also includes a usage region 4730 showing one or more past uses of data storage of the pool account and/or contributions of additional data storage made to the pool account. For example, usage region 4730 shows a first usage 4730A associated with a contribution made by Kate when Kate created the "Group Storage" pool account (e.g., as described above with reference to FIG. 41A). Usage region 4730 also shows a second usage 4730B associated with a contribution made by Sarah to join the pool account In some embodiments, pool detail user interface 4722 also includes a balance indication 4732 (e.g., showing "100 GB") indicating the amount of data storage that is currently available for use in the pool account and a participants region 4158 indicating the pool participants 4734A-4734D (e.g., the owner or creator of the group account, participants that have joined the pool account, participants that have been invited to join but have not yet joined the pool account). For example, in FIG. 47A, Sarah has joined the pool account, and thus Sarah is shown as a "joined" member within participants region 4734, whereas John and Jane have not yet joined the pool account, and thus are shown as "pending" members of the pool account. In some embodiments, pool detail user interface 4722 includes a view pools button 4736 (e.g., stating "View All Pools") for viewing all of the pool accounts that the user of the device is currently a member.

Figure 47B:
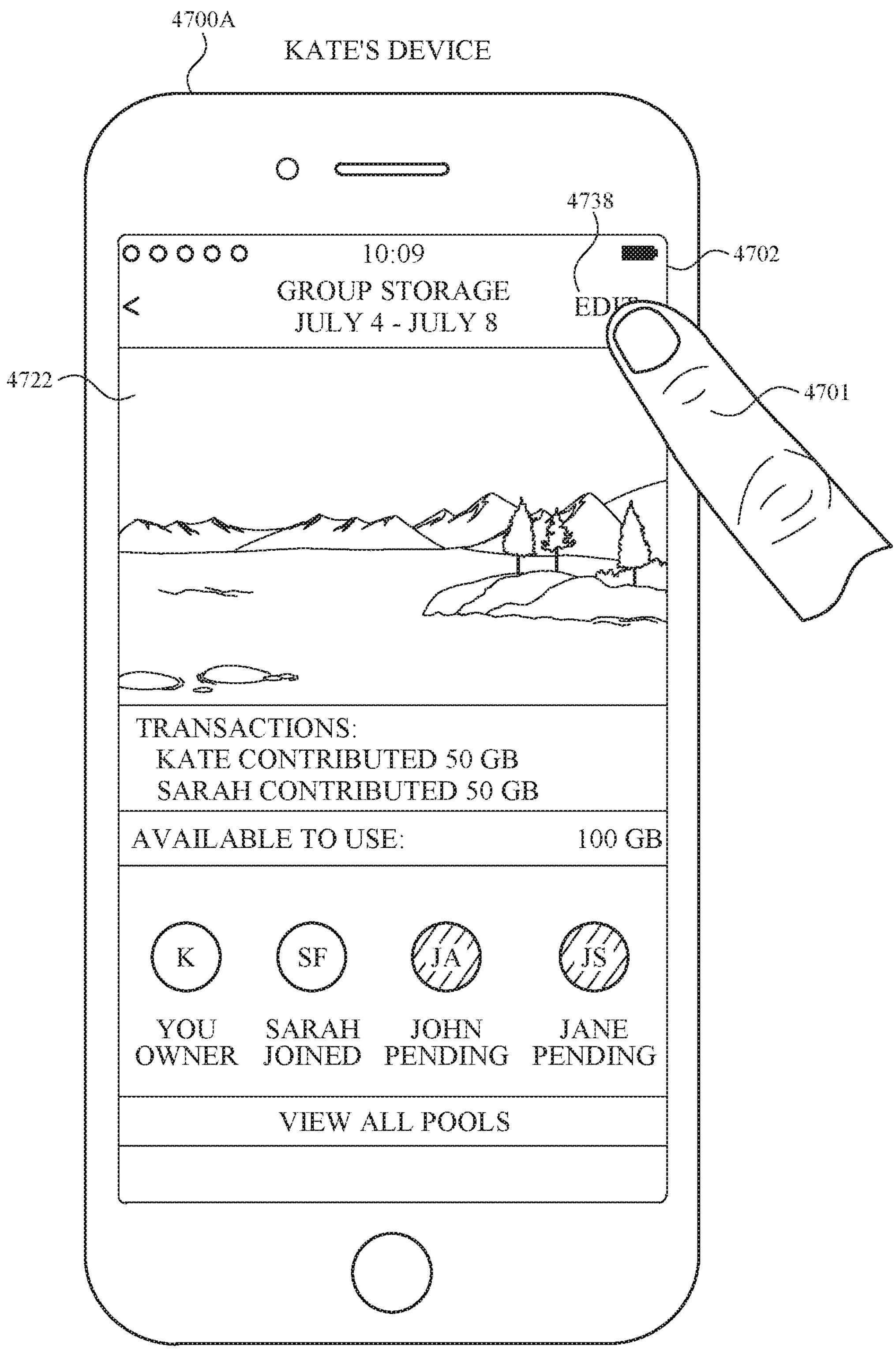
Figure 48A:
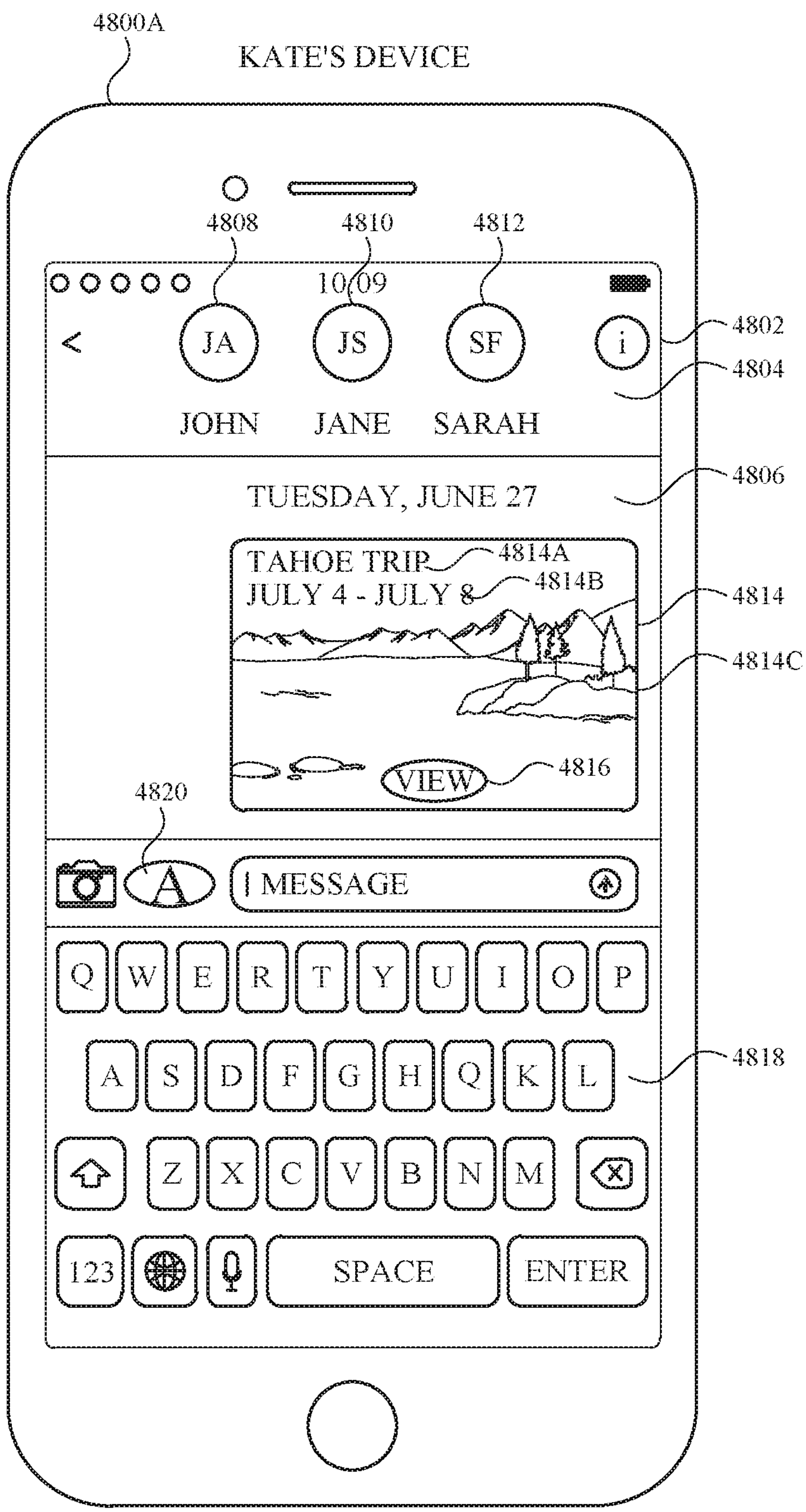
FIGS. 48A-48Y illustrate example user interfaces for managing a valid time period of a group account, in accordance with some embodiments.

In embodiments, one or more of the displayed information (and settings) associated with the pool data storage account is editable (e.g., via an edit button 4738). In FIG. 47B, while displaying pool detail user interface 4722, electronic device 4700A detects (e.g., via a touchscreen of display 4702) a user selection 4701 (e.g., a tap gesture) of edit button 4738.

Figure 47C:
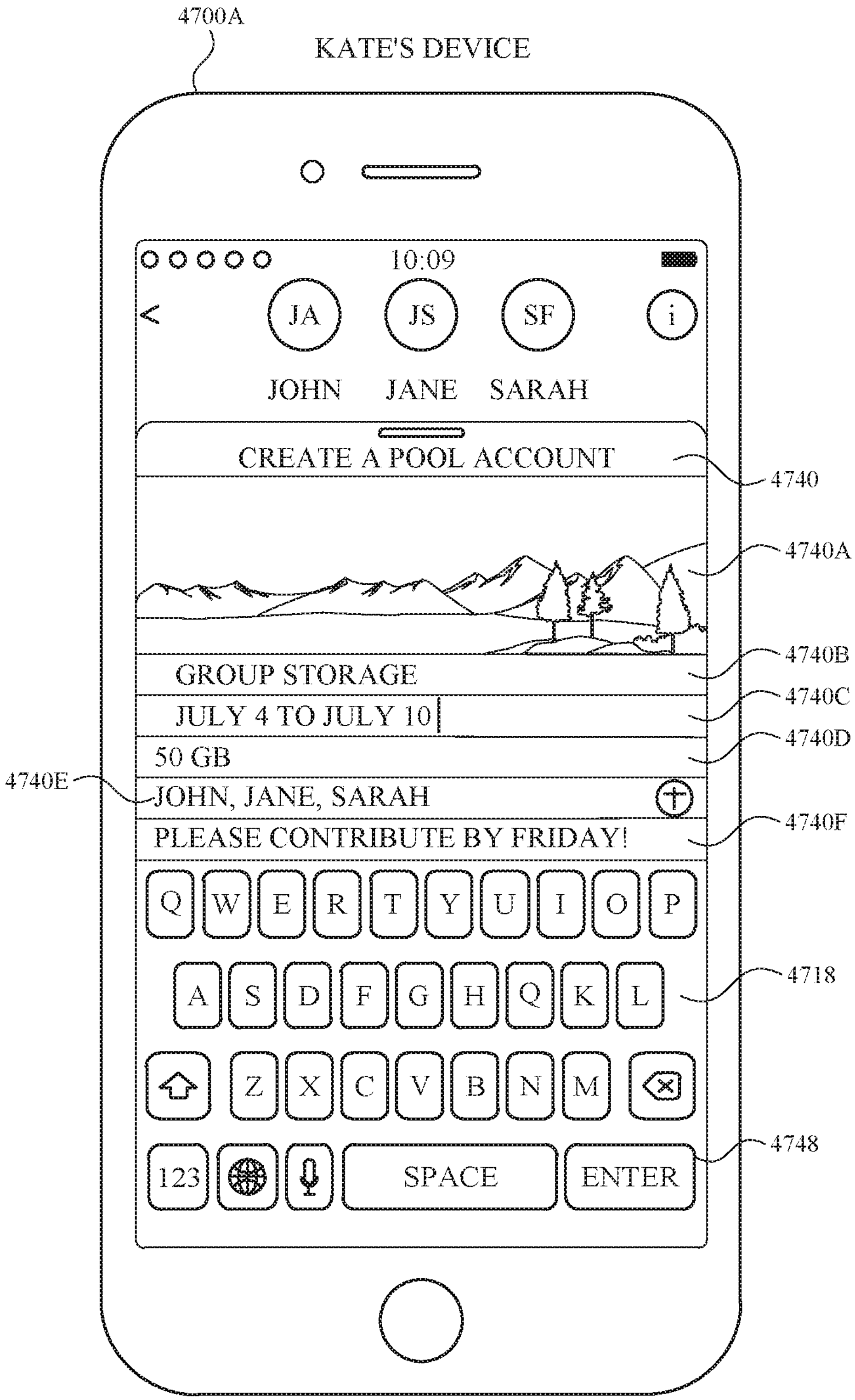

In FIG. 47C, in response to detecting user selection 4701, electronic device 4700A displays (e.g., replaces display of pool detail user interface 4722 with) pool account creation user interface 4740 (e.g., corresponding to pool account creation user interface 4122 described above with reference to FIG. 41A) which can, in some embodiments, be used to edit (e.g., change, modify) the settings (e.g., name, valid time period, representative image, contribution amount, participants, comment, indicated by image region 4740A, name region 4740B, date region 4740C, contribution region 4740D, participants region 4740E, and comment region 4740F, respectively) of the pool account. In some embodiments, the pool account settings (e.g., valid time period) can be edited in this manner only by the creator (e.g., Kate for the "Group Storage" pool account) of the pool account. In some embodiments, the pool account settings can be edited by one or more authorized participants of the pool participants. In some embodiments, the pool account settings can be edited by all of the pool participants (that have joined the account).

Figure 47D:
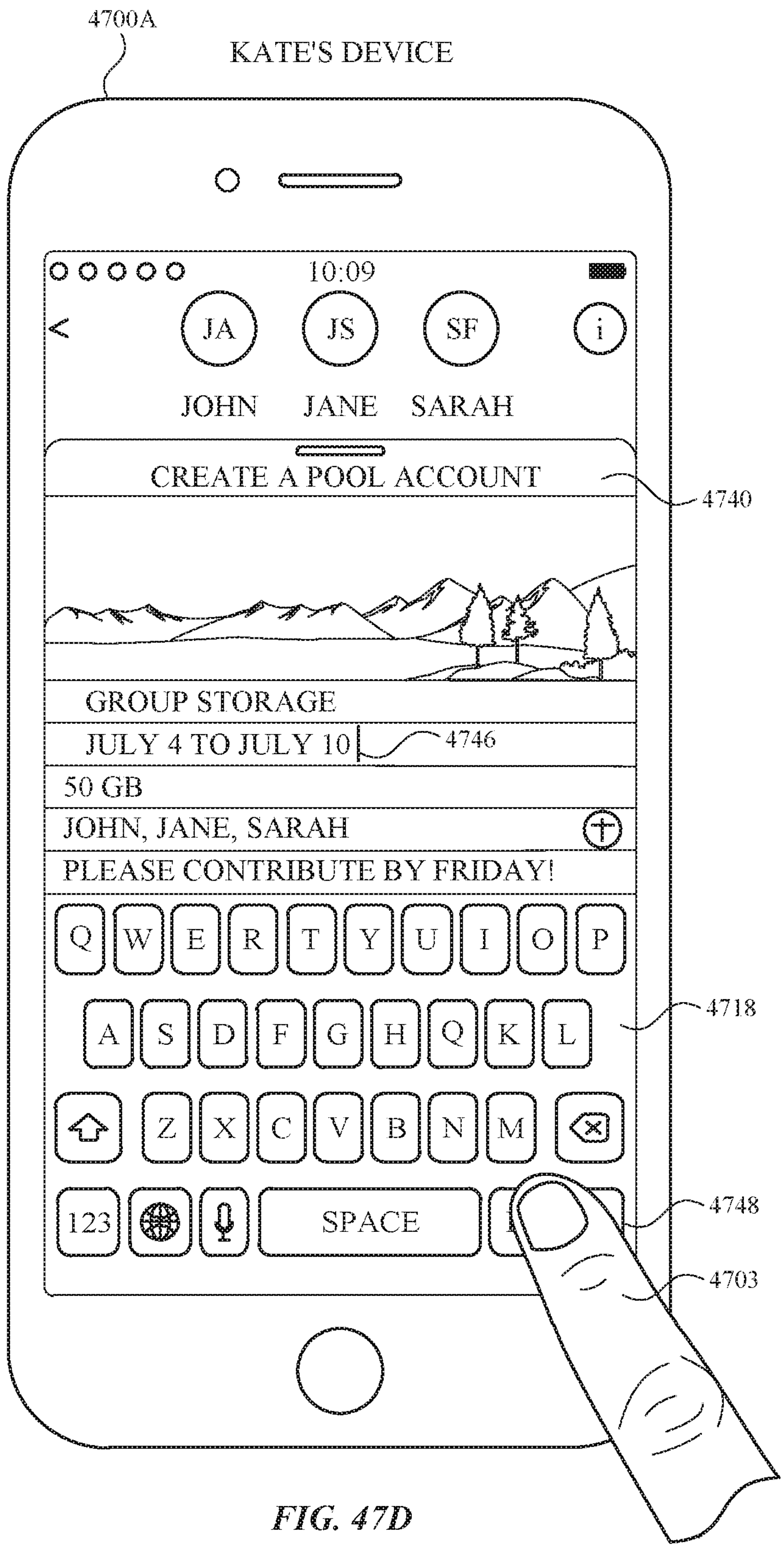

In FIG. 47D, while displaying pool account creation user interface 4740 corresponding to the "Group Storage" pool account, electronic device 4700A detects a user selection 4703 (e.g., a tap gesture) of date region 4740C of the pool account creation use interface. User selection 4703 causes the device to display an indication 4746 (e.g., a cursor) within date region 4740C (thus indicating that the region can be edited) and display a virtual keyboard 4718 for making a user input, as shown in FIG. 47C.

Subsequent to detecting user selection 4703 of date region 4740C, electronic device 4700A receives a user input (e.g., using virtual keyboard 4718) corresponding to a modification of the valid time period of the pool account from "July 4 to July 8" to "July 4 to July 10," as shown in FIG. 47C. In FIG. 47D, following the modification of the valid time period, electronic device 4700A detects a user selection 4705 (e.g., a tap gesture) of an enter button 4748 of virtual keyboard 4718.

Figure 47E:
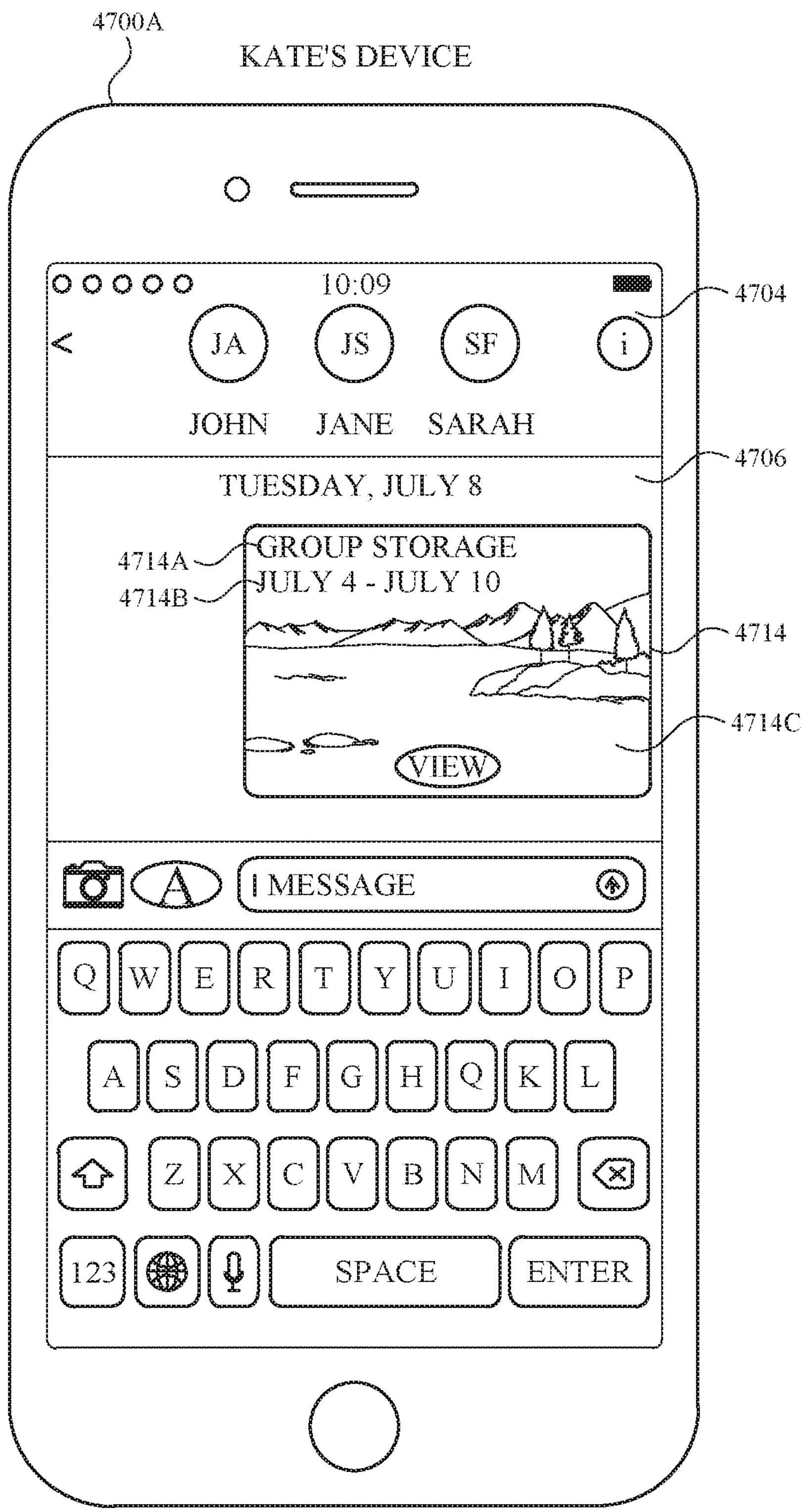

In FIG. 47E, subsequent to modifying the valid time period of the pool account and saving the modification (e.g., via a save updates button of pool account creation user interface 4740), electronic device 4700A displays (e.g., in response to detecting a user selection of the save updates button) group message conversation 4706 with a pool message object 4714 corresponding to the "Group Storage" pool data storage account. As shown in FIG. 47E, because the valid time period of the pool account has been modified by the user, date indication 4714B of pool message object 4814 reflects the corresponding updates (e.g., from "July 4-July 8" to "July 4-July 10").

Figure 47F:
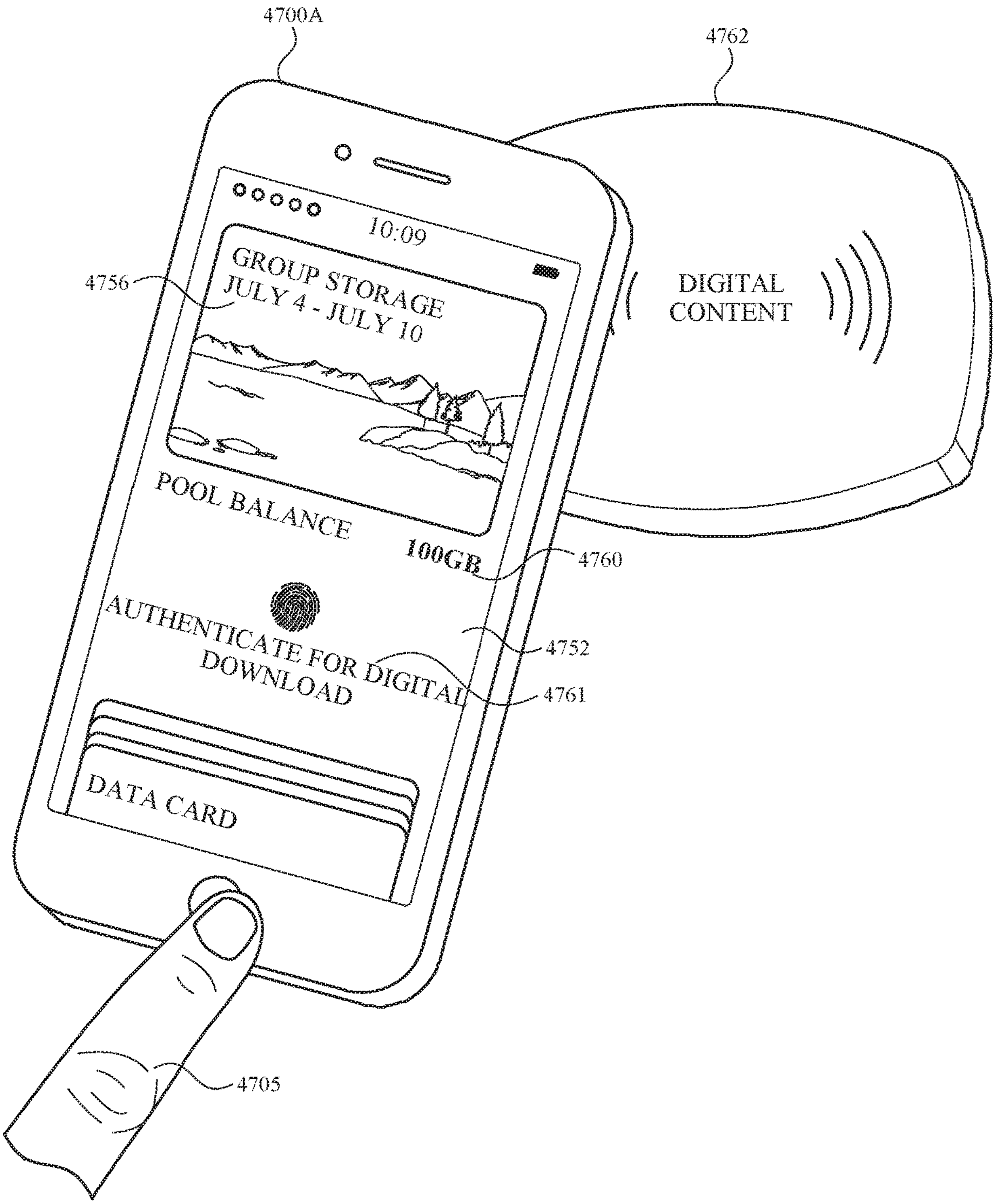

FIG. 47F illustrates electronic device 4700A displaying an accounts user interface 4752 of an accounts application for using data storage associated with an account. In FIG. 47F, pool account object 4756, corresponding to the "Group Storage" pool account, is currently selected for usage. Accounts user interface 4752 further displays a balance indication 4760 (e.g., showing "Pool Balance 100 GB") indicating the amount of data storage available for use in the pool data storage account and an authentication instruction 4761 indicating a requested authentication method (e.g., biometric authentication, such as fingerprint authentication, facial recognition authentication, iris/retina scan authentication, or passcode/password authentication) for providing authentication to use the funds in the pool account.

While displaying accounts user interface 4752 with the "Group Storage" pool account selected for usage, electronic device 4700A detects (e.g., via a mechanical input button of the device) a user input 4705 (e.g., a fingerprint input) corresponding to the authentication requested by authenticating instruction 4761 (e.g., fingerprint authentication).

Subsequent to a determination that the authentication was successful (e.g., because the input was consistent with an enrolled authentication information, such as an enrolled fingerprint of the user), electronic device 4700A detects (e.g., via a wireless communication radio of the device) a digital content terminal 4762 (e.g., a near-field-communication digital content terminal, a point-of-sale digital content terminal) for downloading digital content (e.g., a video file). In some embodiments, upon using the pool account (e.g., the "Group Storage" pool account) to perform a digital transfer (e.g., with digital content terminal 4762), the digital content is automatically transmitted from its source (e.g., a server communicating with digital content terminal 4762) to a server holding the storage space of the pool account.

Figure 47G:
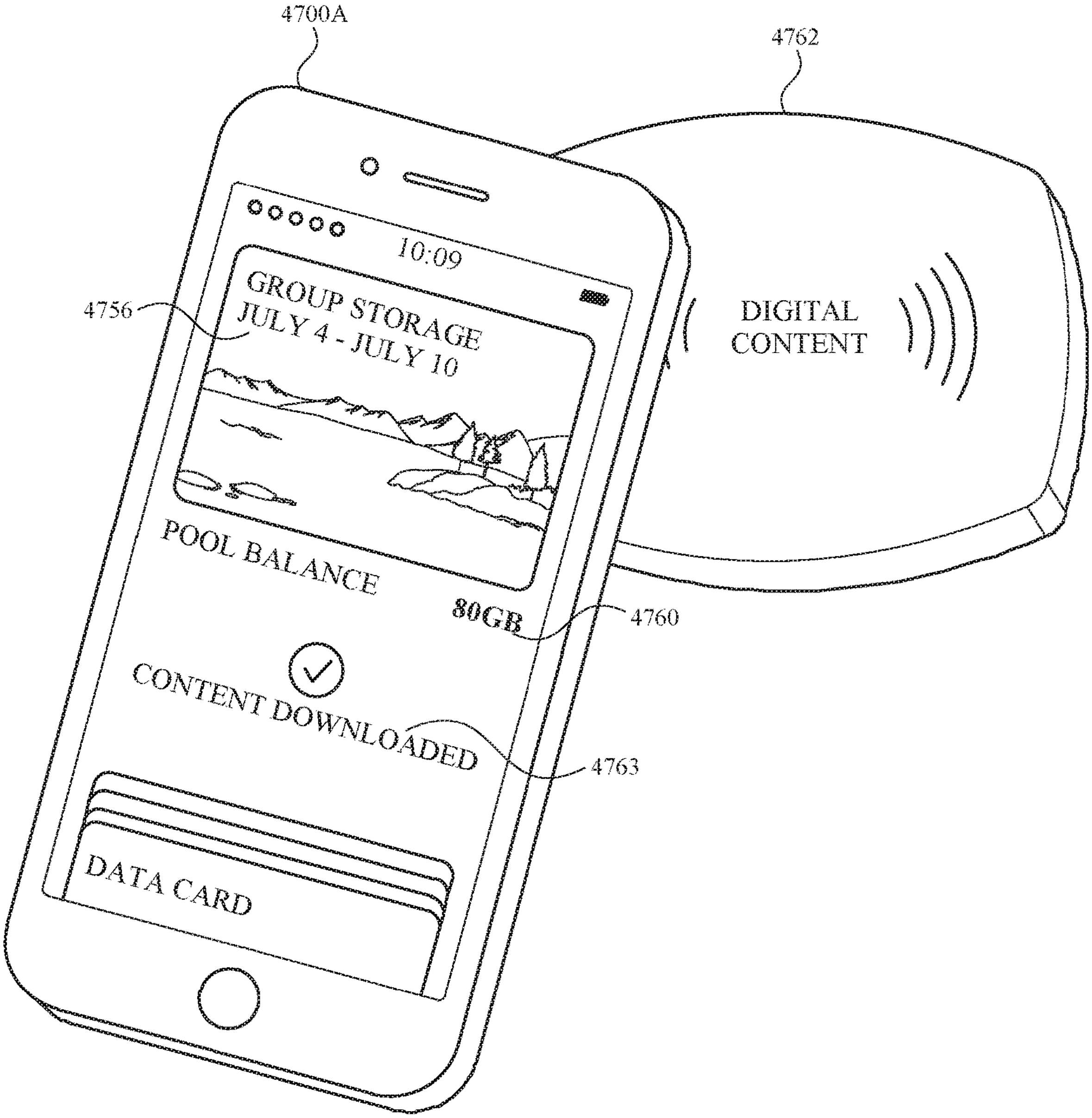

In FIG. 47F, the current date is July 8. Thus, because the valid time period of the pool account is from July 4 to July 10, storage space of the pool account is available for use in downloading the digital content from digital content terminal 4762. FIG. 47G shows (e.g., as indicated by an indication 4763) electronic device 4700A subsequent to having successfully caused transfer of digital content (e.g., of 20 GB) from a server communicating with digital content terminal 4762 to storage space of the "Group Storage" pool account (corresponding to pool account object 4756). Upon the successful transfer, balance indication 4760 is also updated (e.g., from "100 GB" to "80 GB") to reflect the remaining storage space in the pool account following the performed digital transfer.

Figure 47H:
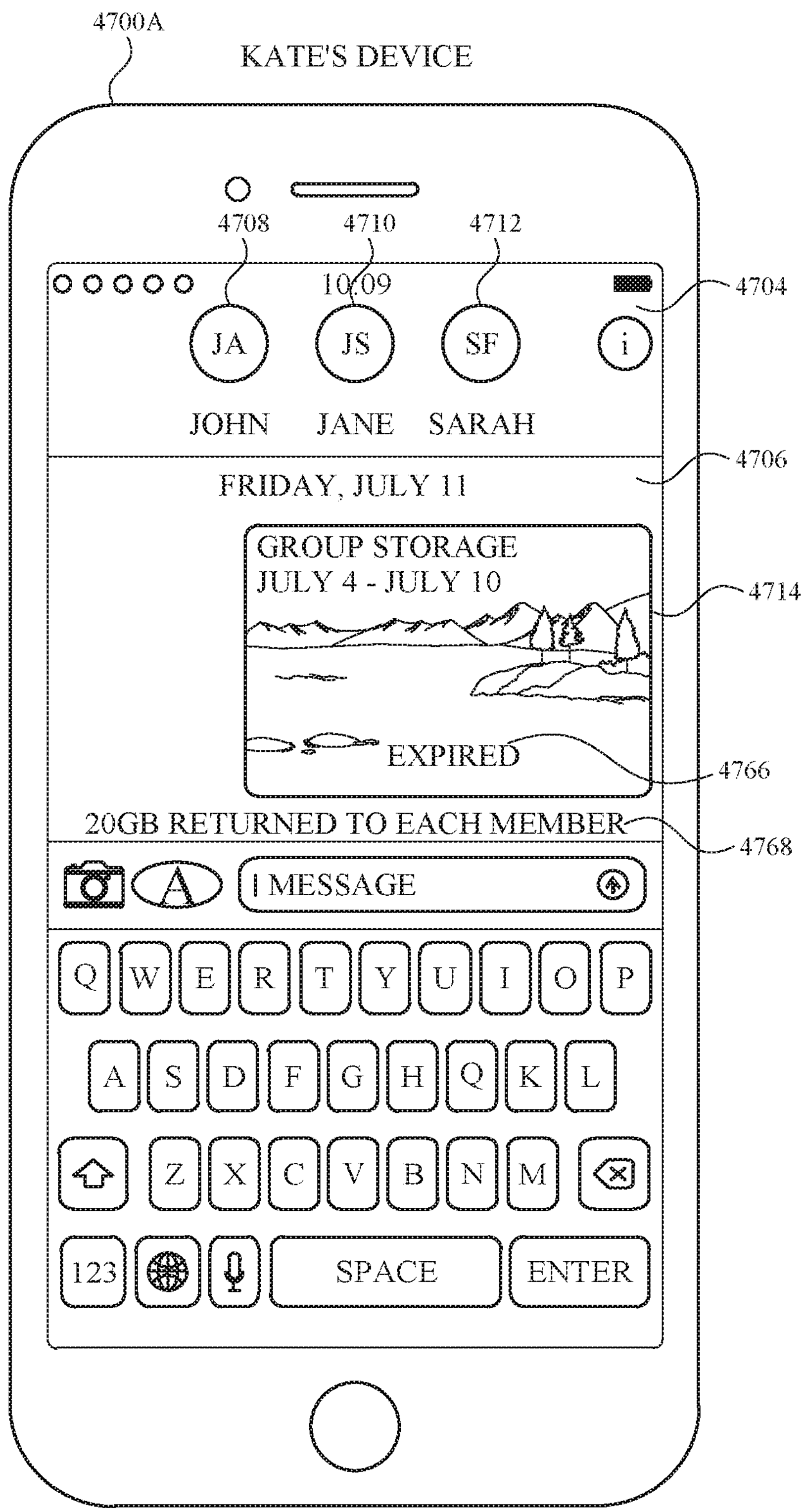

In FIG. 47H, the current date is July 11, and thus the valid time period of the pool account (July 4 to July 10) has passed. In some embodiments, in accordance with a determination that the valid time period for using the pool data storage account has passed, electronic device 4700A (automatically) causes any remaining storage space of the pool account to be divided (e.g., evenly divided, proportionally divided based on contribution amounts) transferred from the pool account to a personal (online) data storage account of the pool participants, the user (Kate), message participant 4708 (John), message participant 4710 (Jane), and message participant 4712 (Sarah). In some embodiments, electronic device 4700A also updates pool message object 4714 corresponding to the expired pool account to include an indication 4766 (e.g., showing "Expired") indicating that the pool account corresponding to the pool message object has expired. In some embodiments, electronic device 4700A also displays, in group message conversation 4706 of messaging application 4704, a status indication 4768 (e.g., "20 GB Returned to Each Member") indicating that the remaining storage space (e.g., of 80 GB) has been (evenly) divided and returned to a personal data storage account of each pool participant (e.g., Kate, John, Jane, and Sarah) of the "Group Storage" pool account.

The example user interfaces illustrated in FIGS. 47A-47H above relate to the example user interfaces illustrated in FIGS. 48A-48Y below. In particular, the example user interfaces of FIGS. 47A-47H and the example user interfaces of FIGS. 48A-48Y both relate to managing a valid time period of a group account (e.g., a pool account) using an electronic device (e.g., 100, 300, 500, 4700A, 4800A), in accordance with some embodiments. Therefore, it is to be understood that the techniques described with reference to the example user interfaces of FIGS. 47A-47H and the techniques described with reference to the example user interfaces of FIGS. 48A-48Y are both techniques that relate to similar concepts for managing a valid time period of a group account (e.g., a pool account).

As mentioned above, FIGS. 48A-48Y illustrate example user interfaces for managing a valid time period of a group account (e.g., a pool account), in accordance with some embodiments. FIG. 48A illustrates an electronic device 4800A (e.g., portable multifunction device 100, device 300, or device 500). In the non-limiting example embodiment illustrated in FIGS. 48A-48Y, electronic device 4800A is a smartphone. In other embodiments, electronic device 4800A can be a different type of electronic device, such as a wearable device (e.g., a smartwatch). Electronic device 4800A has a display 4802 and a secure element (e.g., secure element 115).

In FIG. 48A, electronic device 4800A displays, on display 4802, a group message conversation 4806 among the user of the device (e.g., "Kate"), a message participant 4808 (e.g., "John"), a message participant 4810 (e.g., "Jane"), and a message participant 4812 (e.g., "Sarah"). Group message conversation includes a pool message object 4814 (e.g., corresponding to pool message object 4554 described above with reference to FIGS. 45A-45U) corresponding to a pool account created by the user and sent to the other participants of the message conversation, message participant 4808, message participant 4810, and message participant 4812. Pool message object 4816 includes a name indication 4814A (e.g., stating "Tahoe Trip"), a date indication (e.g., stating "July 4-July 8), a background image 4814C corresponding to the representative image of the pool account, and a view button 4816 for viewing details associated with the pool account.

Figure 48B:
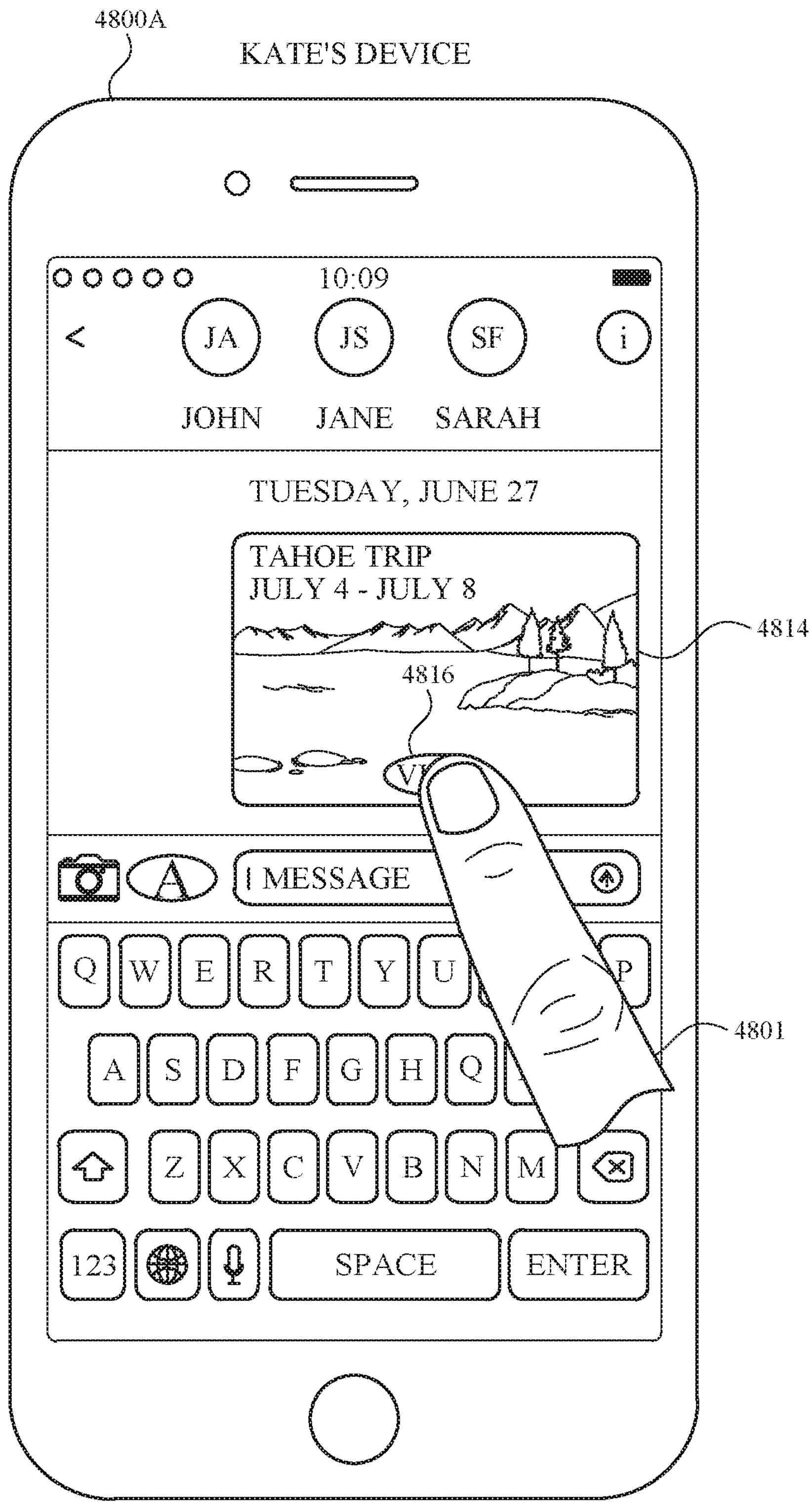

In FIG. 48B, while displaying pool message object 4814 within group message conversation 4806, electronic device 4800A detects (e.g., via a touchscreen of display 4802) a user selection 4801 (e.g., a tap gesture) of view button 4816 of pool message object 4814.

Figure 48C:
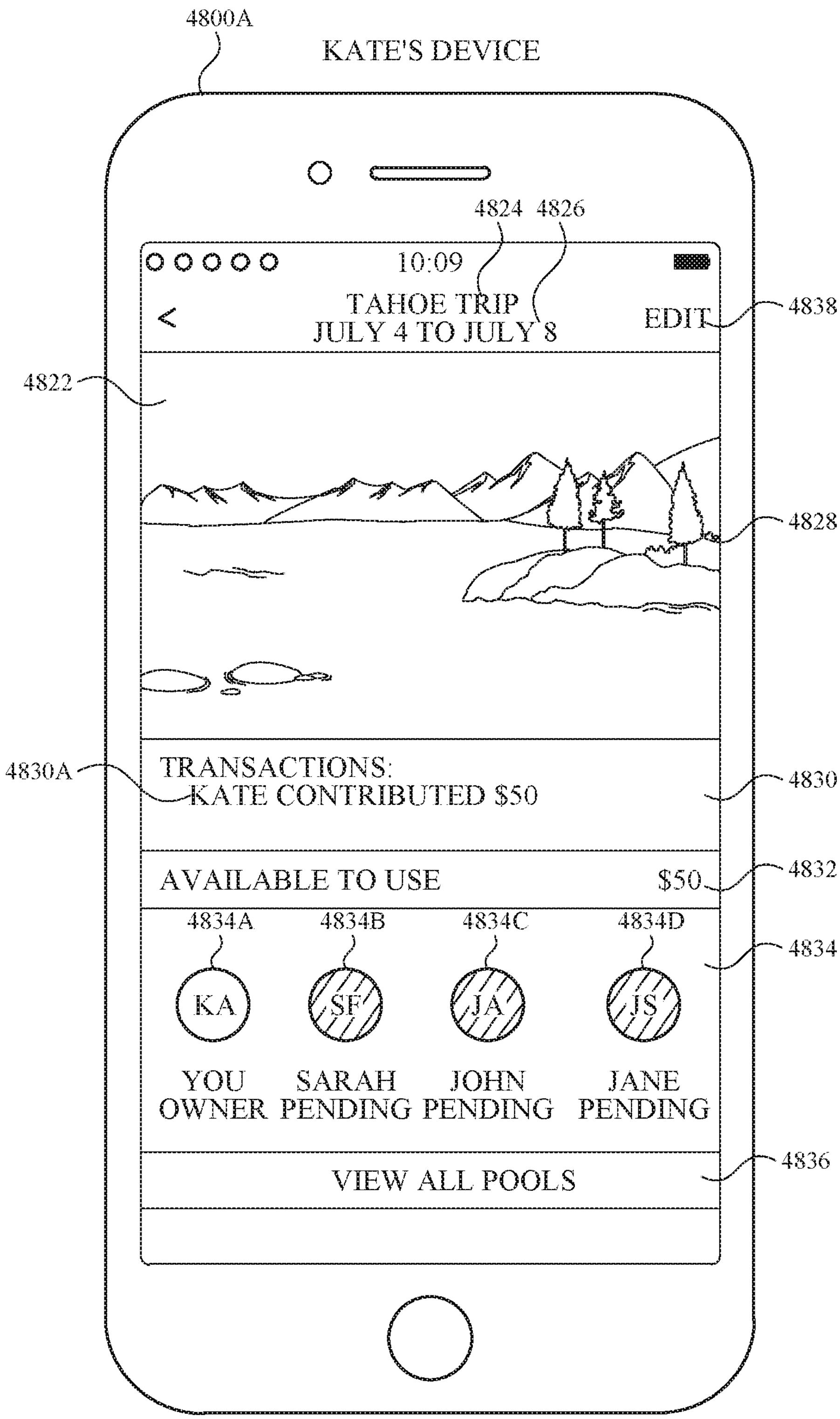

In FIG. 48C, in response to detecting user selection 4801, electronic device 4800A displays (e.g., replaces display of group message conversation 4806 with) a pool detail user interface 4822 (e.g., similar to pool detail user interface 4252 shown above in FIG. 42K) that includes information about the pool account. For example, as shown in FIG. 48C, pool detail user interface includes a name region 4824 (e.g., showing "Tahoe Trip") indicating the name of the selected pool account, a date region 4826 (e.g., showing "July 4 to July 8") indicating the time period during which the selected pool account is valid (e.g., for making a payment transaction using the pool account), and an image region 4828 showing the representative image of the selected pool account (corresponding to background image 4814C).

In some embodiments, pool detail user interface 4822 also includes a transactions region 4830 showing one or more past transactions made using the pool account and/or contributions made to the pool account. For example, transactions region 4830 shows a transaction 4830A associated with a contribution made by Kate (e.g., which occurred when Kate created the pool account). In some embodiments, pool detail user interface 4822 also includes a balance indication 4832 indicating the amount of funds that are available for use in the pool account. For example, in FIG. 48C, because the "Tahoe Trip" pool account currently only includes one contributions of $50 (made by Kate) and no other transactions, balance indication 4832 shows total available funds of $50. In some embodiments, pool detail user interface 4822 also includes a participants region 4834 indicating pool participants 4834A-4834D (e.g., the owner or creator of the group account, participants that have joined the pool account, participants that have been invited to join but have not yet joined the pool account). In some embodiments, pool detail user interface 4822 includes a view pools button 4836 (e.g., stating "View All Pools") for viewing all of the pool accounts that the user of the device is currently a member.

Figure 48D:
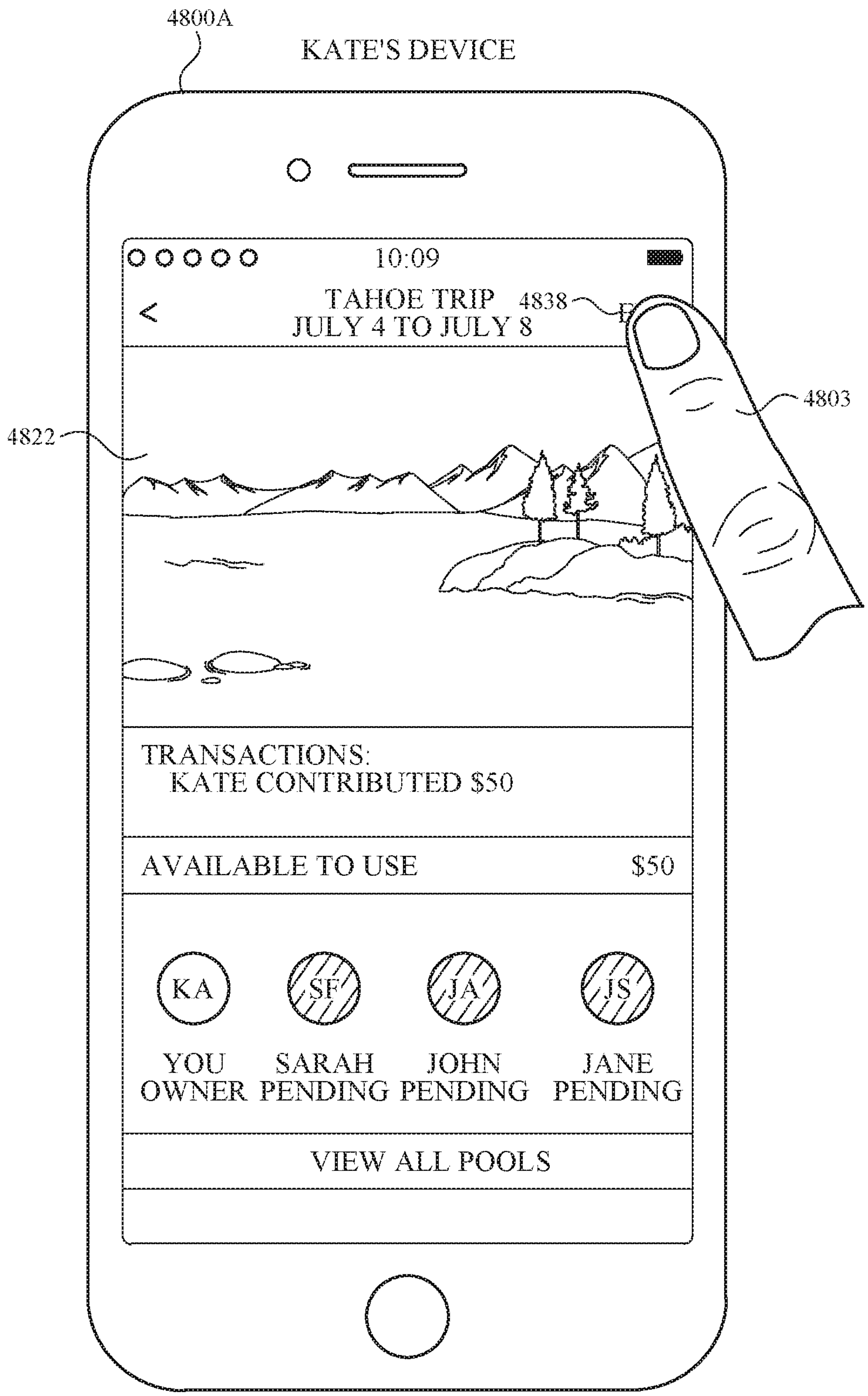

In embodiments, one or more of the displayed information associated with the pool account is editable (e.g., via an edit button 4838). In FIG. 48D, while displaying pool detail user interface 4822, electronic device 4800A detects (e.g., via a touchscreen of display 4802) a user selection 4803 (e.g., a tap gesture) of edit button 4838.

Figure 48E:
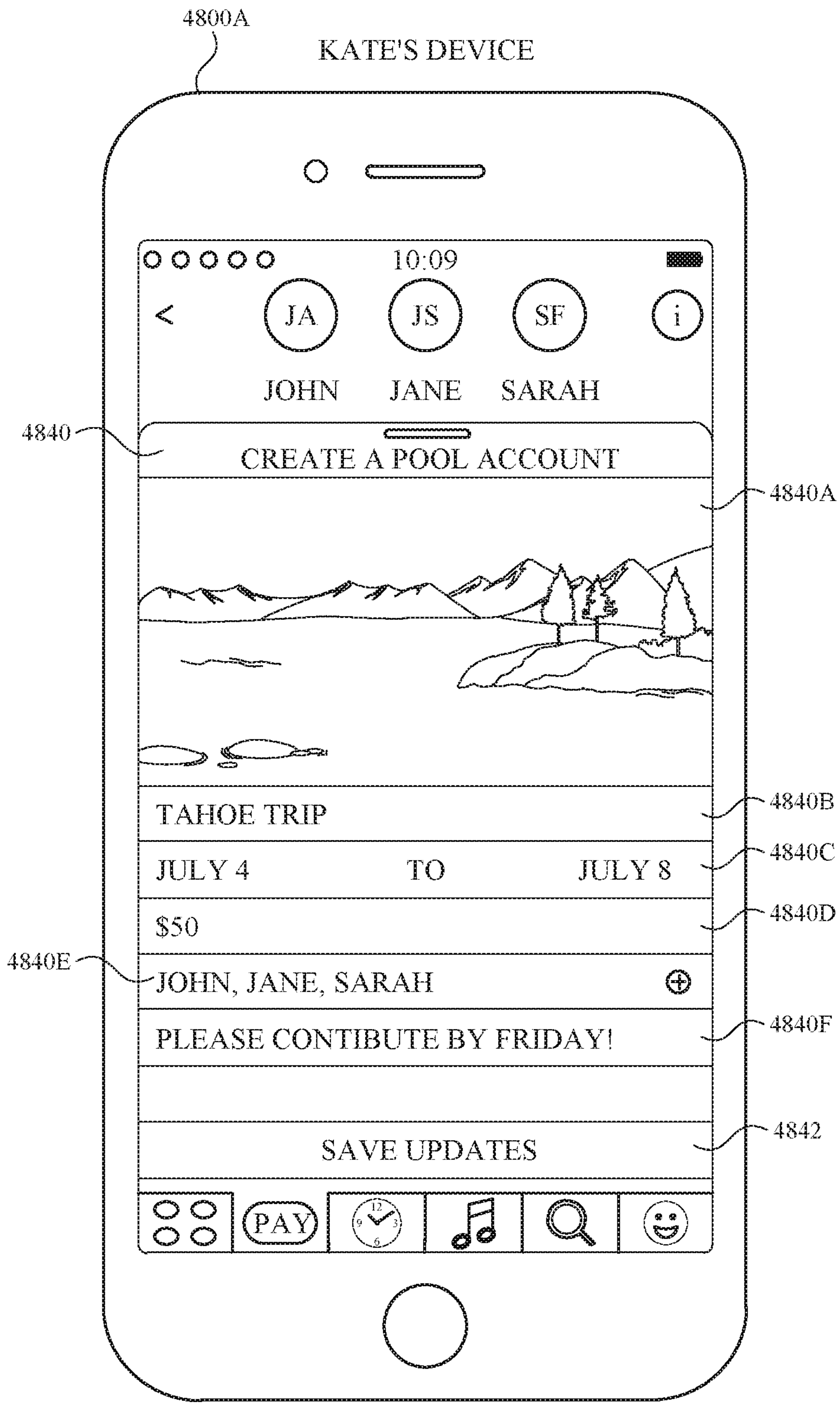

In FIG. 48E, in response to detecting user selection 4803 of edit button 4838, electronic device 4800A displays (e.g., replaces display of pool detail user interface 4822 with) pool account creation user interface 4840 (e.g., similar to pool account creation user interface 4222 shown above in FIG. 42E) which can, in some embodiments, be used to edit (e.g., change, modify) the settings (e.g., name, valid time period, representative image, contribution amount, participants, comment) of an existing pool account. In some embodiments, the pool account settings (e.g., valid time period) can be edited in this manner only by the creator (e.g., Kate for the "Tahoe Trip" pool account) of the pool account. In some embodiments, the pool account settings can be edited by one or more authorized participants of the pool participants. In some embodiments, the pool account settings can be edited by all of the pool participants (that have joined the account).

Figure 48F:
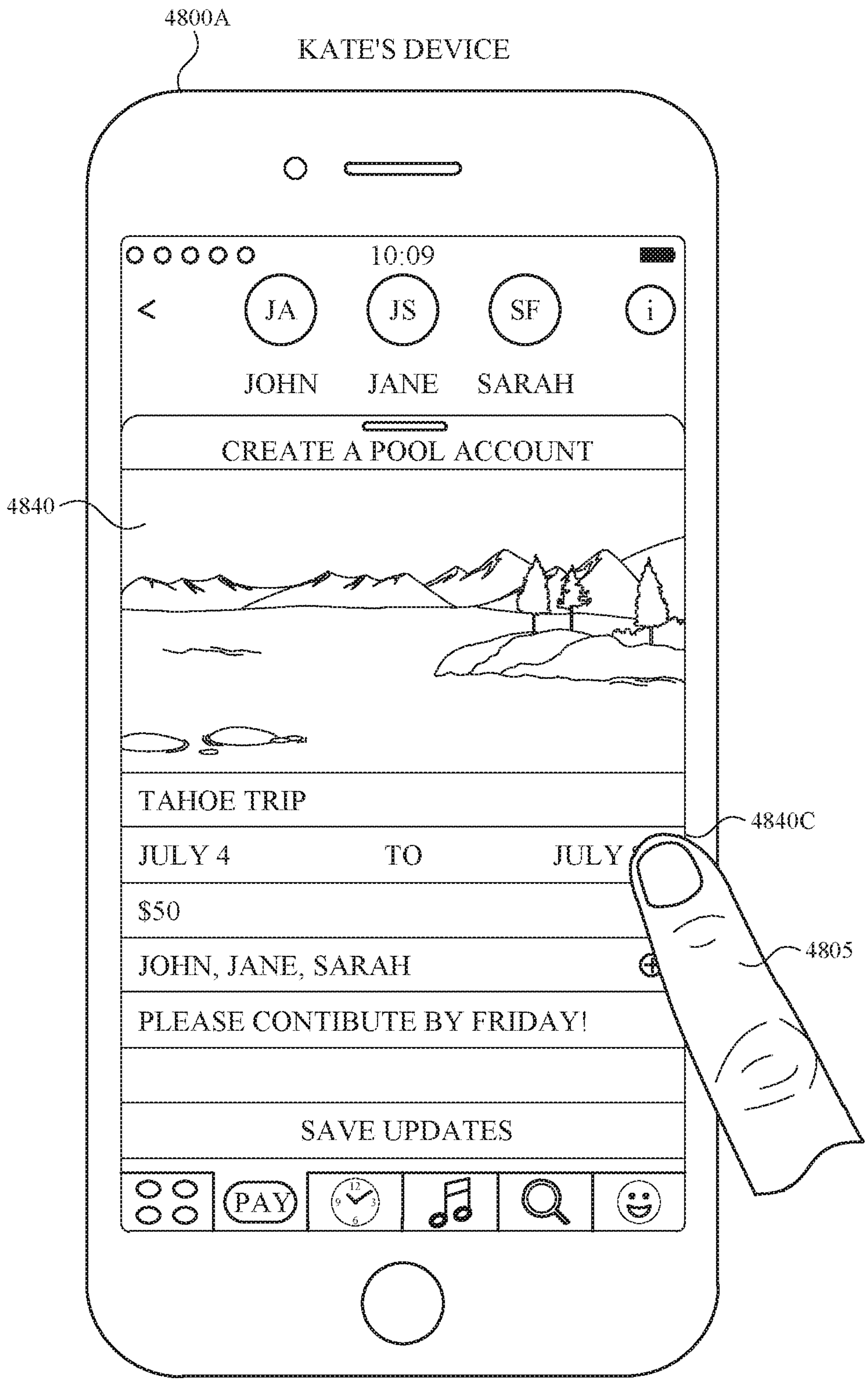
Figure 48G:
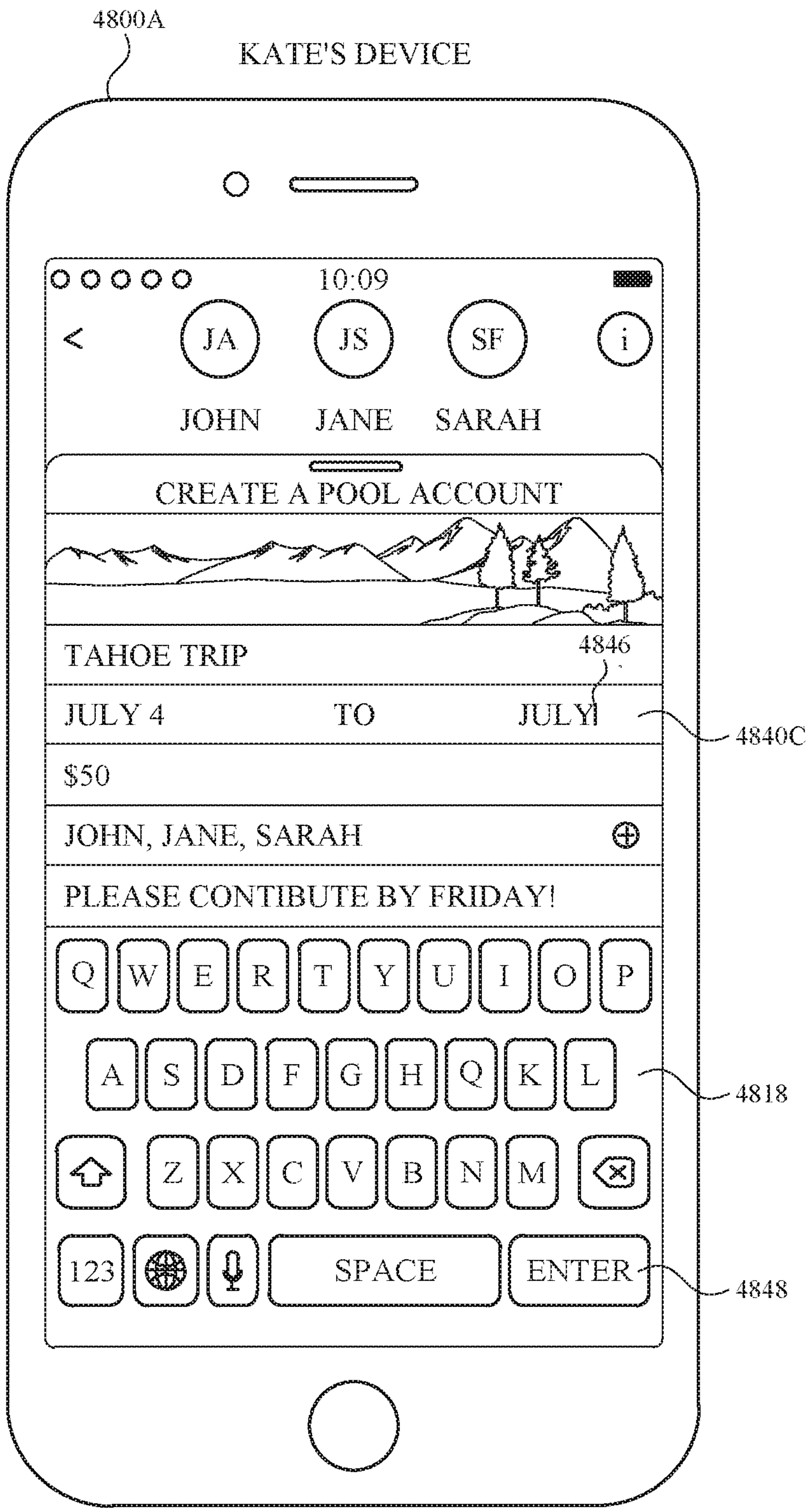

In FIG. 48F, while displaying pool account creation user interface 4840 corresponding to the existing "Tahoe Trip" pool account, electronic device 4800A detects (e.g., via a touchscreen of display 4802) a user selection 4805 (e.g., a tap gesture) of date region 4840C of the pool account creation use interface User selection 4805 causes the device to display an indication 4846 (e.g., a cursor) within date region 4840C (thus indicating that the region can be edited) and display a virtual keyboard 4818 for making a user input, as shown in FIG. 48G.

Figure 48H:
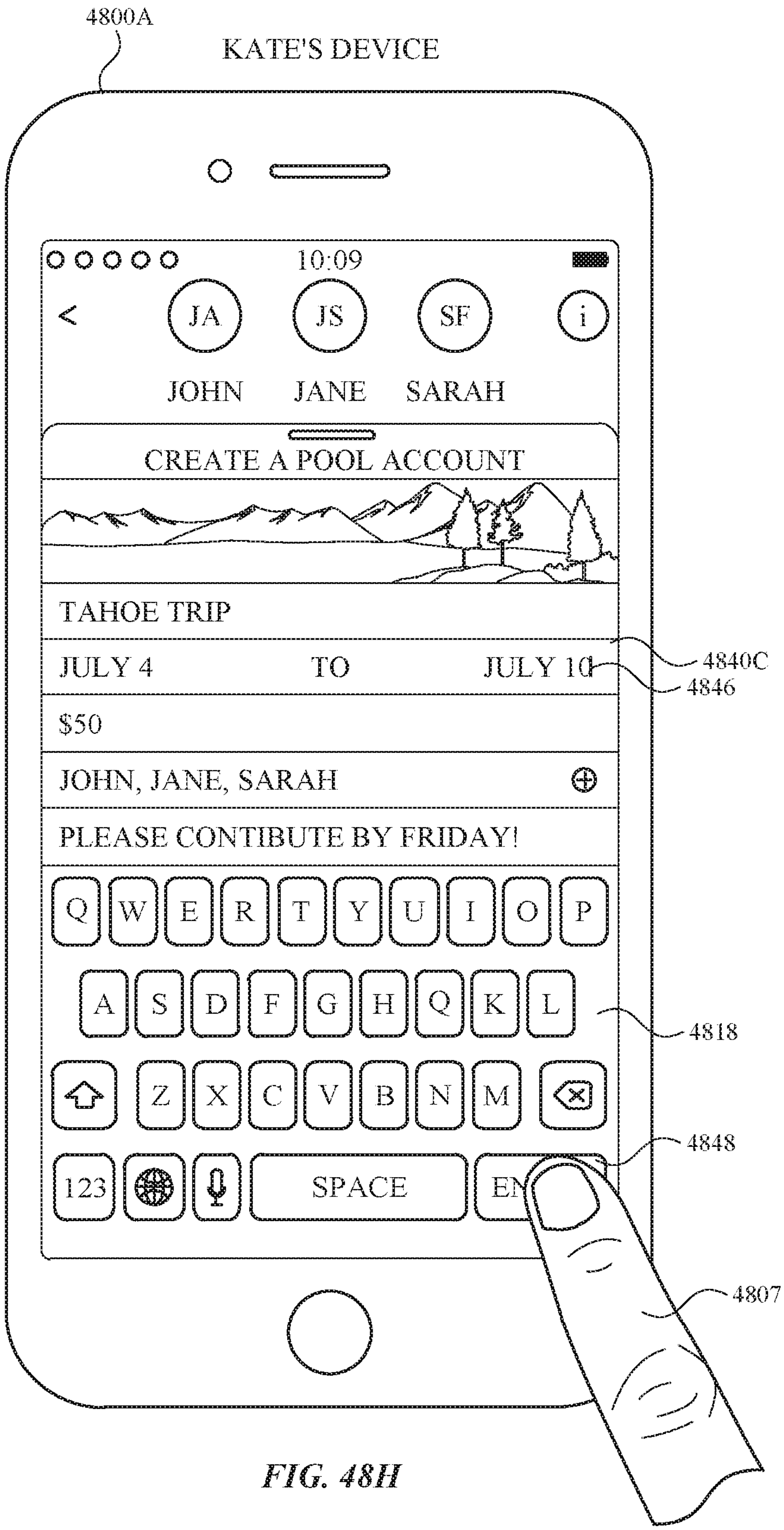
Figure 48I:
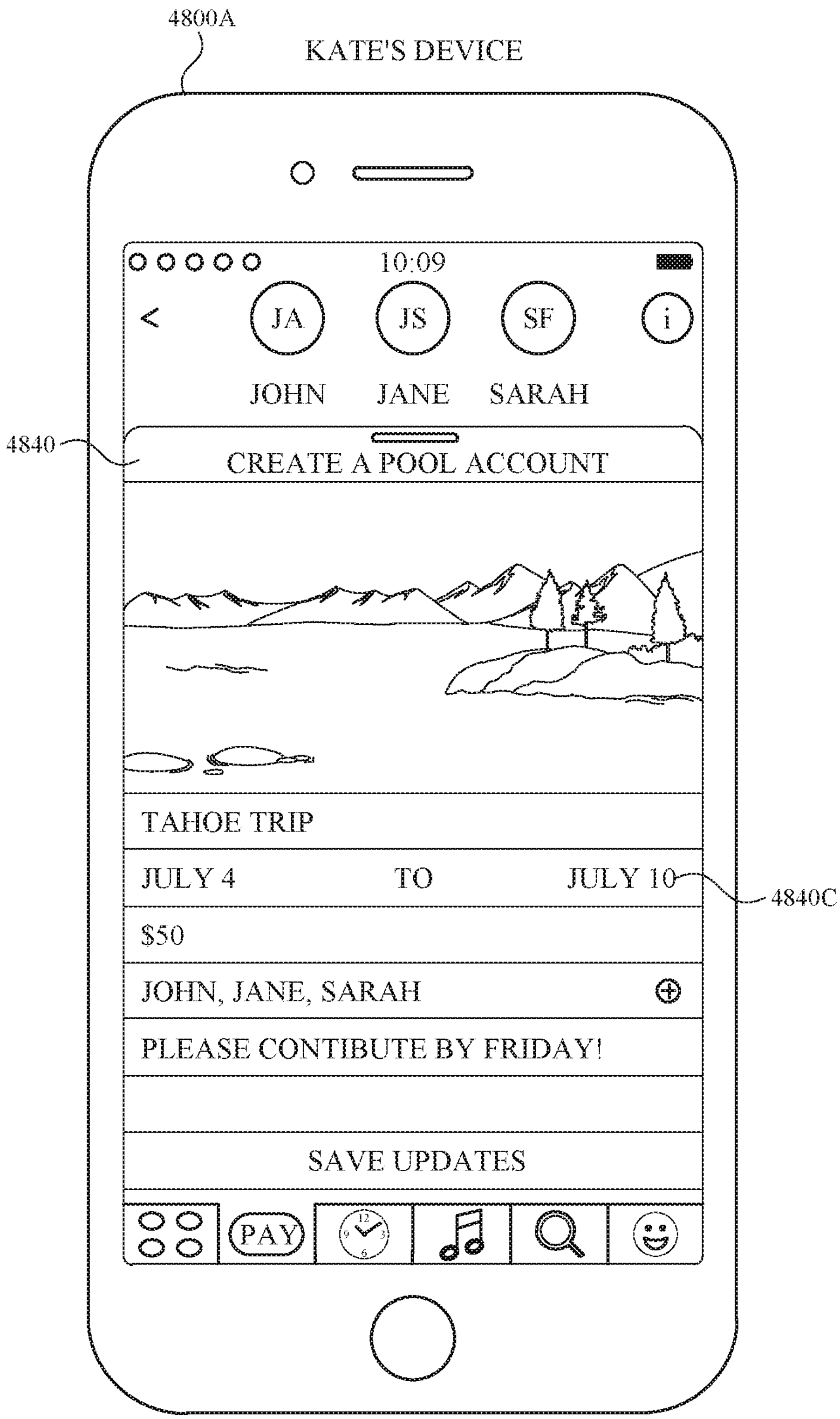

Subsequent to detecting user selection 4805 of date region 4840C, electronic device 4800A receives a user input (e.g., using virtual keyboard 4818) corresponding to a modification of the valid time period of the pool account from "July 4 to July 8" to "July 4 to July 10," as shown in FIG. 48H. Following the modification of the valid time period, electronic device 4800A detects a user selection 4807 (e.g., a tap gesture) of an enter button 4848 of virtual keyboard 4818. In FIG. 48I, in response to detecting user selection 4807, electronic device 4800A ceases displaying virtual keyboard 4818 (e.g., because the user has indicated, by selecting enter button 4848, that the user input corresponding to the modification has been completed).

Figure 48J:
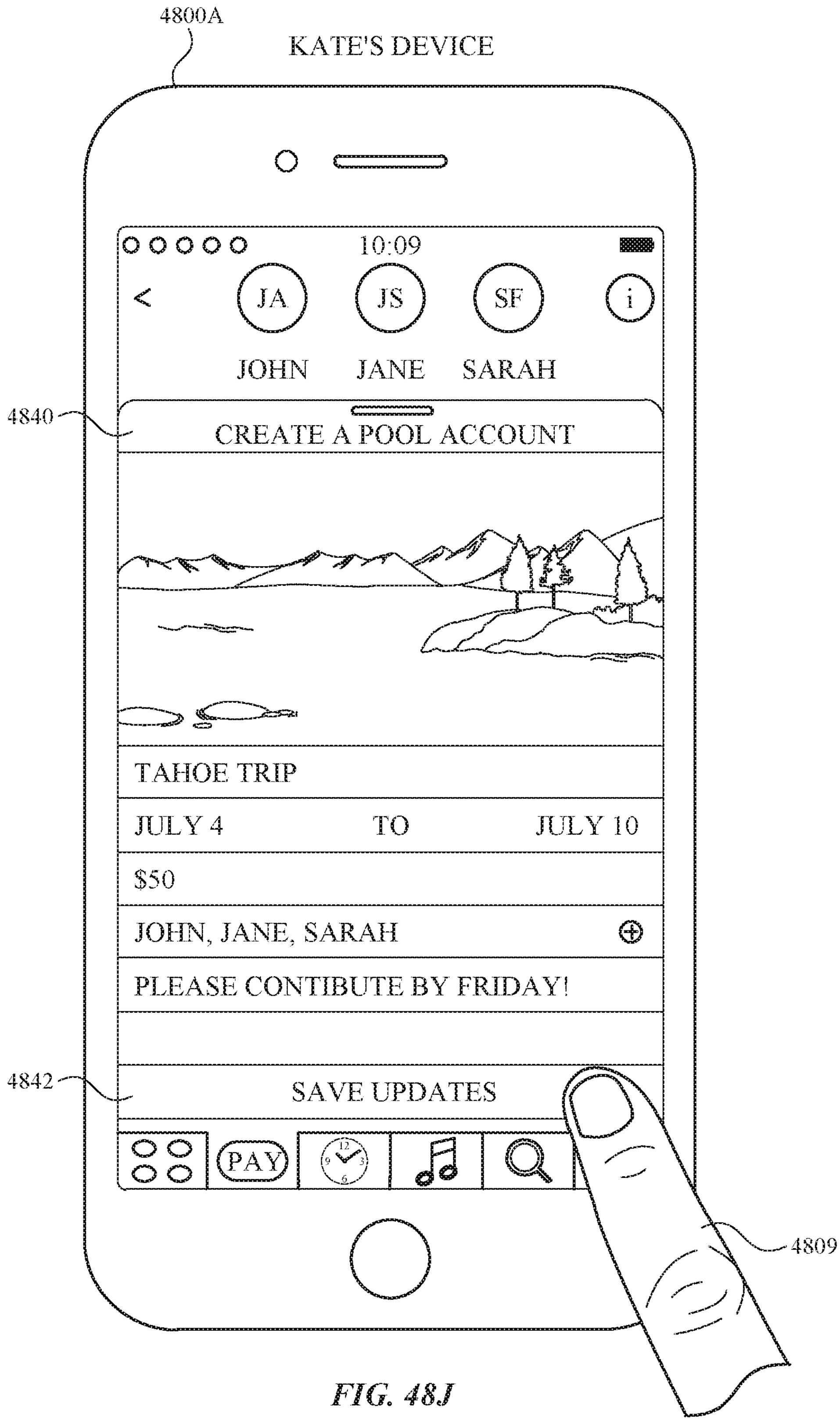

In FIG. 48J, subsequent to modifying the valid time period of the pool account (e.g., as indicated in date region 4840C of pool account creation user interface 4840), electronic device 4800A detects a user selection 4809 (e.g., a tap gesture) of a save updates button 4842 of pool account creation user interface 4840. In some embodiments, pool account creation use interface 4840 includes save updates button 4842 (e.g., instead of a create pool button, such as create pool button 4224 shown above in FIG. 42F) if the pool account currently being edited is an existing pool account (as opposed to a new pool account that is being created).

Figure 48K:
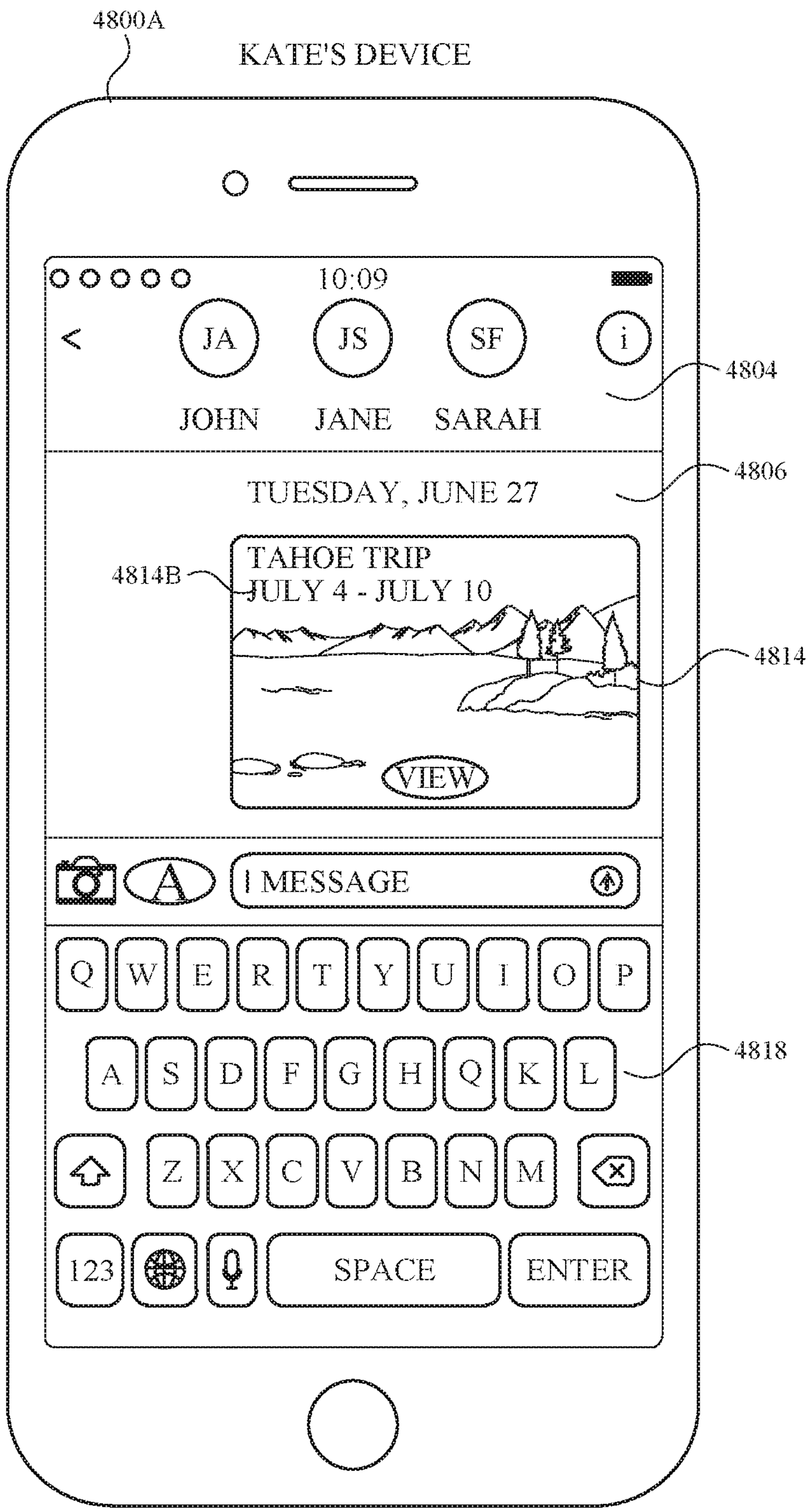

In FIG. 48K, in response to detecting user selection 4809 of save updates button 4842, electronic device 4800A again displays (e.g., replaces display of pool account creation user interface 4840 with) group message conversation 4806 with pool message object 4814. As shown in FIG. 48K, because the valid time period of the pool account has been modified by the user, date indication 4814B of pool message object 4814 shows the corresponding updates (e.g., from "July 4-July 8" to "July 4-July 10").

Figure 48L:
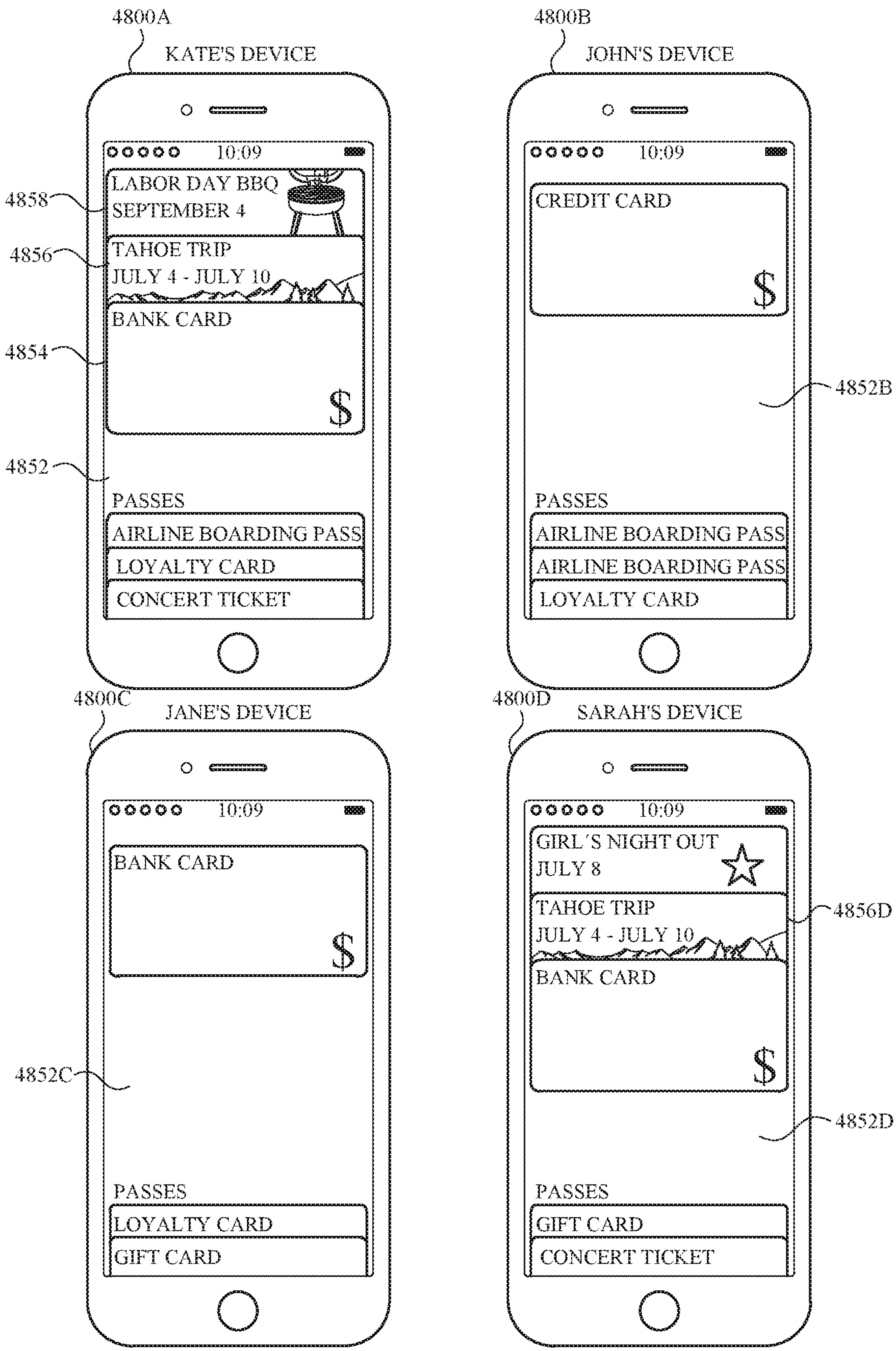

FIG. 48L illustrates electronic device 4800A (Kate's Device), electronic device 4800A (John's Device), electronic device 4800C (Jane's Device), and electronic device 4800D (Sarah's Device), each displaying a wallet user interface corresponding to a wallet application (e.g., controlled by an operating system of the device and not by a third-party program). In particular, wallet user interface 4852 of Kate's Device corresponds to wallet user interface 4268 of Kate's Device in FIG. 42N, wallet user interface 4852B of John's Device corresponds to wallet user interface 4268B of John's Device in FIG. 42N, wallet user interface 4852C of Jane's Device corresponds to wallet user interface 4268C of Jane's Device in FIG. 42N, and wallet user interface 4852D of Sarah's Device corresponds to wallet user interface 4268D of Sarah's Device in FIG. 42N. As described with reference to FIG. 42N, wallet user interface 4852 of Kate's Device (corresponding to wallet user interface 4268) includes a bank card object 4854 (corresponding to bank card object 4270) associated with a personal bank card of Kate, a first pool account object 4856 (corresponding to first pool account object 4272) associated with the "Tahoe Trip" pool account, and a second pool account object 4858 (corresponding to second pool account object 4858) associated with a "Labor Day BBQ" pool account that Kate is also a member of.

As shown in FIG. 48L, in response to (or subsequent to) the valid time period of the "Tahoe Trip" pool account being updated, wallet user interface 4852 of Kate's Device updates first pool account object 4856 corresponding to the "Tahoe Trip" pool account to indicate the change in time period (from "July 4-July 8" to "July 4-July 10"). Further in response to (or subsequent to) the valid time period of the "Tahoe Trip" pool account being updated on Kate's Device, wallet user interface 4852D of Sarah's Device also updates first pool account object 4856D corresponding to the "Tahoe Trip" pool account to indicate the change in time period (from "July 4-July 8" to "July 4-July 10"). Because John and Jane have not yet joined the "Tahoe Trip" pool account, wallet user interface 4852B on John's Device and wallet user interface 4852C on Jane's Device do not include a pool account object corresponding to the "Tahoe Trip" pool account, and thus the modification of the valid time period is not reflected on John's Device nor on Jane's Device.

Figure 48M:
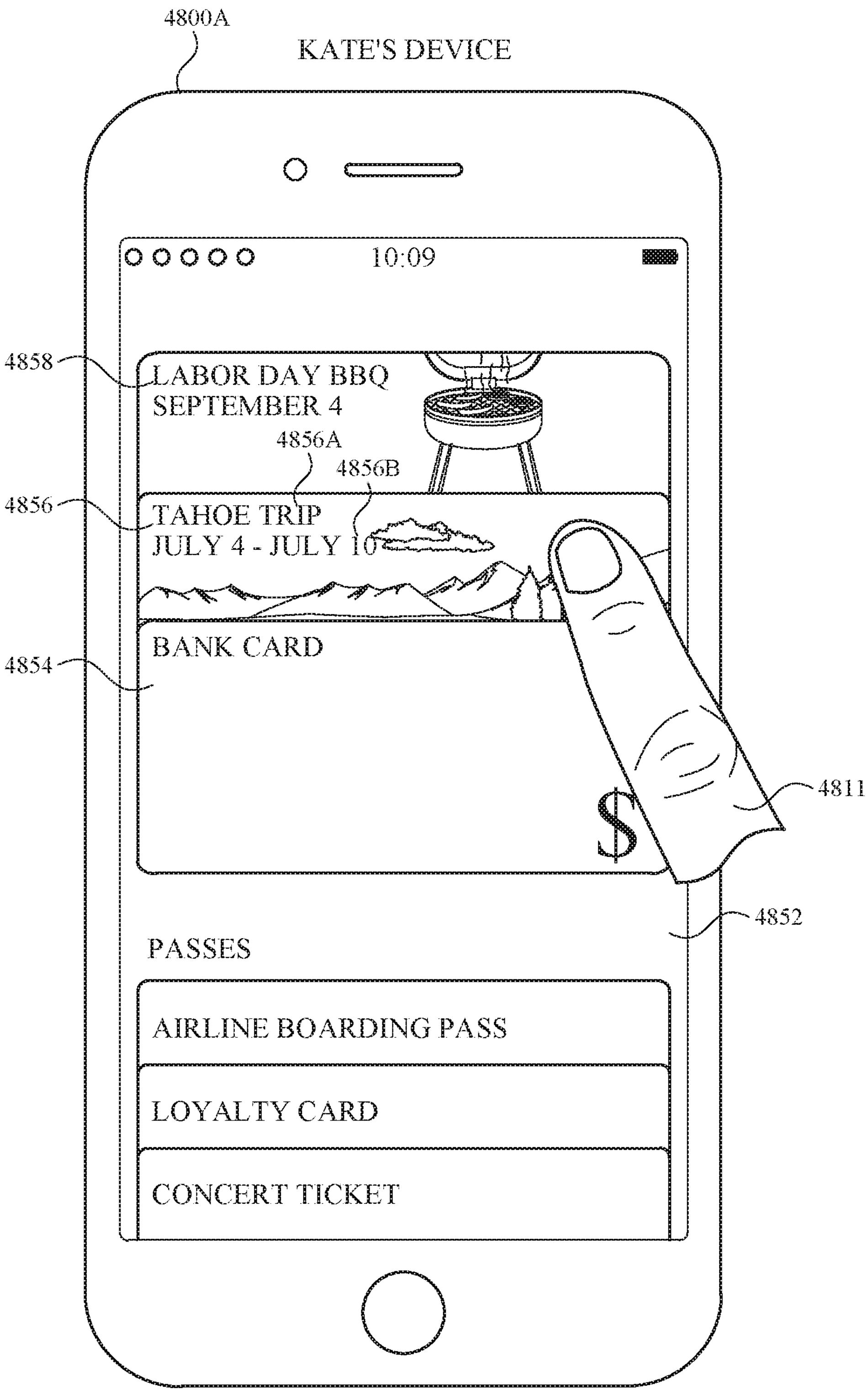

FIG. 48M illustrates electronic device 4800A (Kate's Device) displaying wallet user interface 4852. As mentioned above, wallet user interface 4852 includes bank card object 4854 (e.g., corresponding to bank card object 4270 of wallet user interface 4268), first pool account object 4856 (e.g., corresponding to first pool account object 4272 of wallet user interface 4268), and second pool account object 4858 (e.g., corresponding to second pool account object 4274 of wallet user interface 4268). While displaying wallet user interface 4852, electronic device 4800A detects a user selection 4811 (e.g., a tap gesture) of first pool account object 4856 (corresponding to the "Tahoe Trip" pool account), which sets the pool account corresponding to the selected first pool account object (the "Tahoe Trip" pool account) as the account currently selected for use in a payment transaction.

Figure 48N:
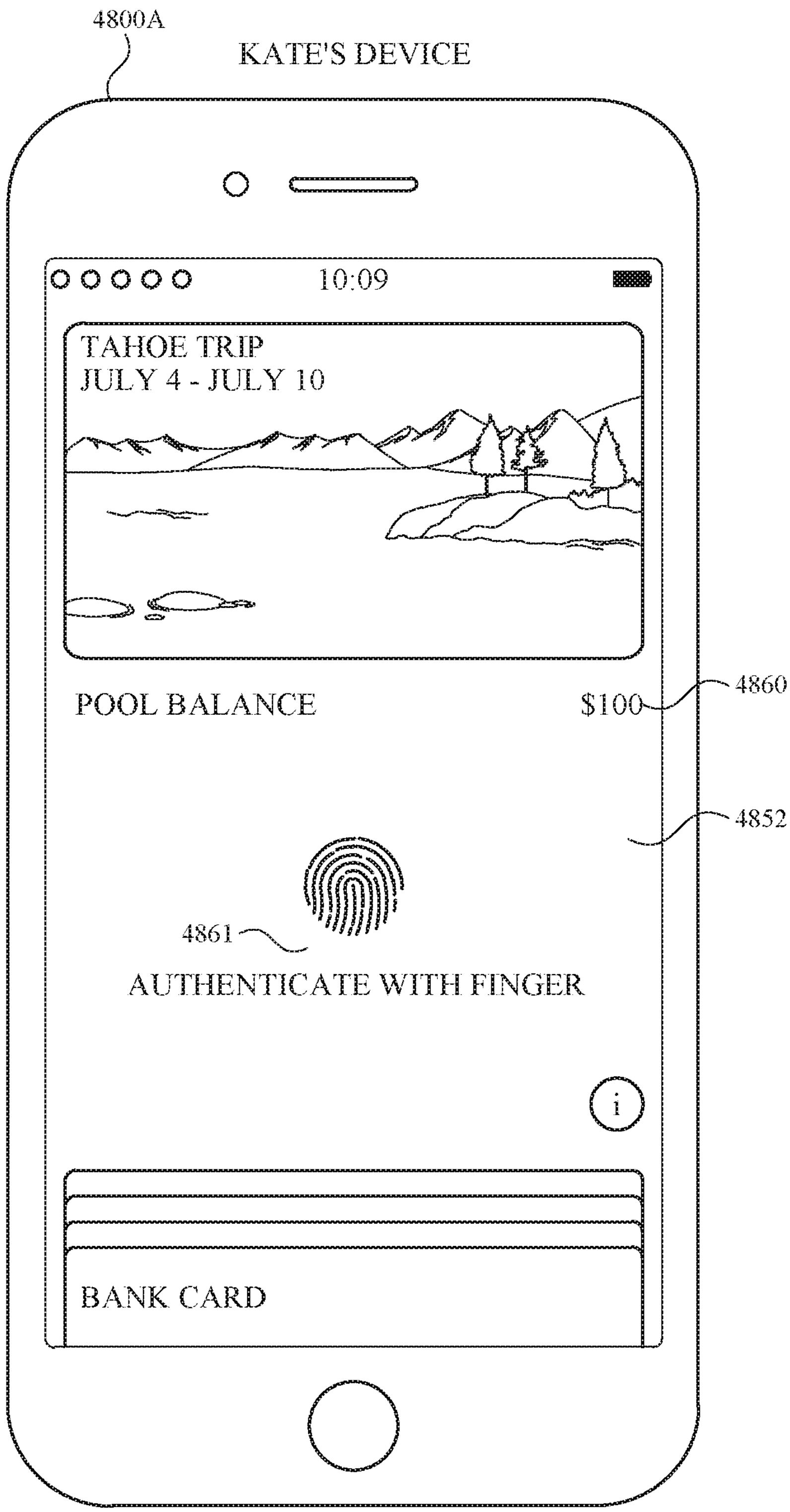

In FIG. 48N, electronic device 4800A displays wallet user interface 4852 with the "Tahoe Trip" pool account (corresponding to first pool account object 4856) currently selected for use in a transaction. Once the account is selected, wallet user interface 4852 further includes a balance indication 4860 (e.g., stating "Pool Balance $100") indicating the amount of funds available for use in the pool account and an authentication instruction 4861 indicating a requested authentication method (e.g., biometric authentication, such as fingerprint authentication, facial recognition authentication, iris/retina scan authentication, or passcode/password authentication) for providing authentication to use the funds in the pool account.

Figure 48O:
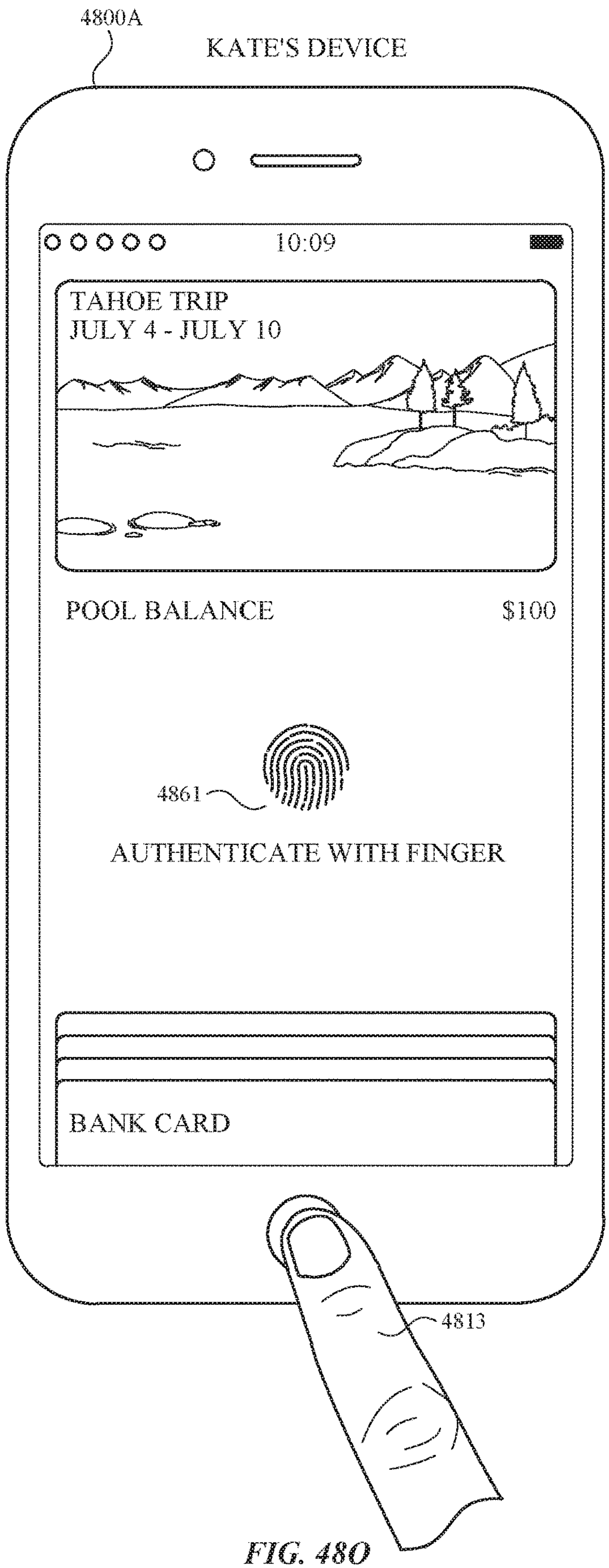
Figure 48P:
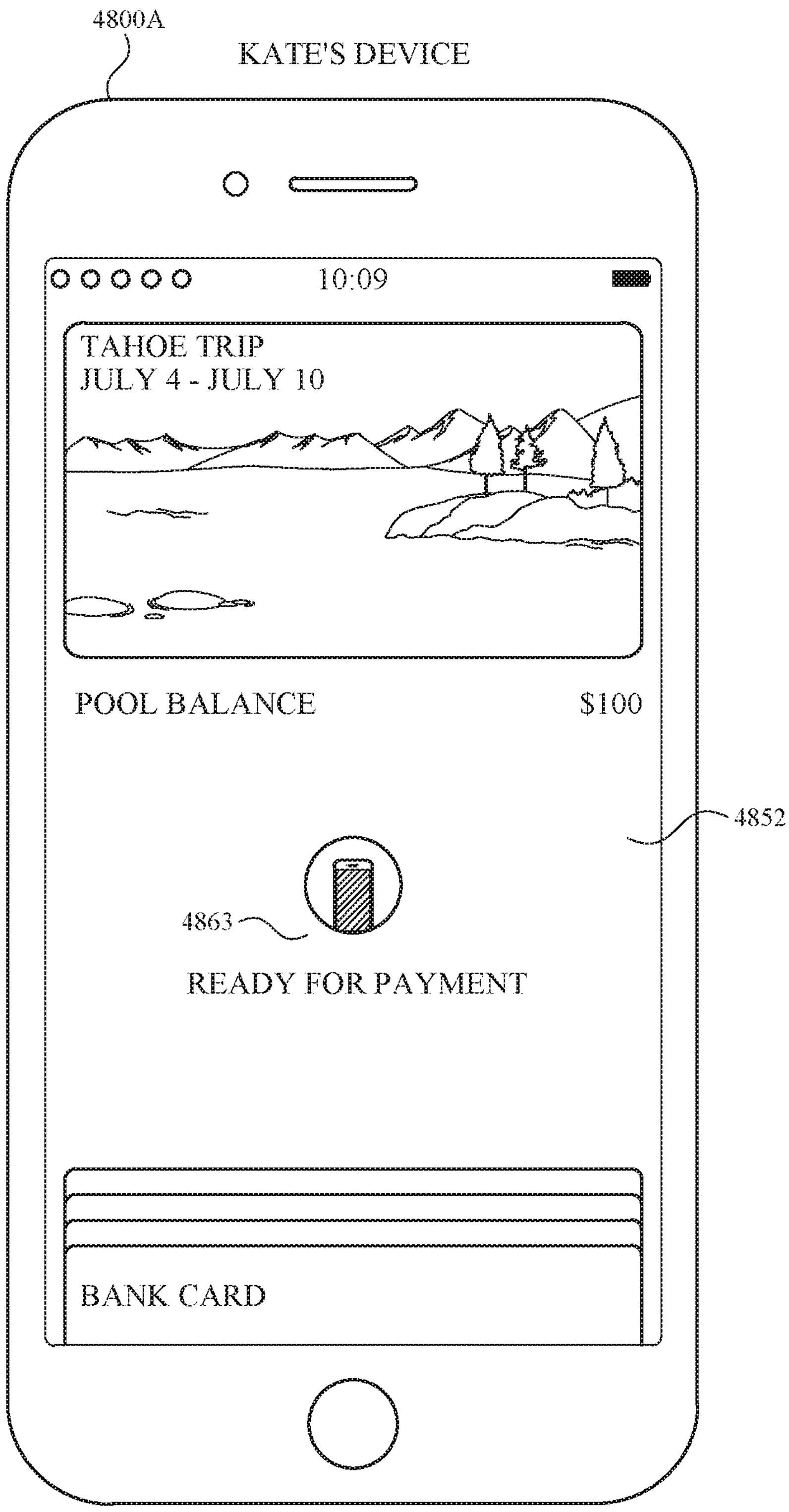

In FIG. 48O, while displaying wallet user interface 4852 with the "Tahoe Trip" pool account selected, electronic device 4800A detects (e.g., via a mechanical input button of the device) a user input 4813 (e.g., a fingerprint input) corresponding to the authentication requested by authenticating instruction 4861 (e.g., fingerprint authentication). In FIG. 48P, in response to detecting user input 4813 (e.g., a fingerprint input), if the authentication is successful (e.g., because the input is consistent with an enrolled authentication information, such as an enrolled fingerprint of the user), electronic device 4800A displays (e.g., replaces display of authentication instruction 4861 with) on wallet user interface 4852 a ready notification 4863 indicating that the pool account is ready and authorized for use in a payment transaction.

Figure 48Q:
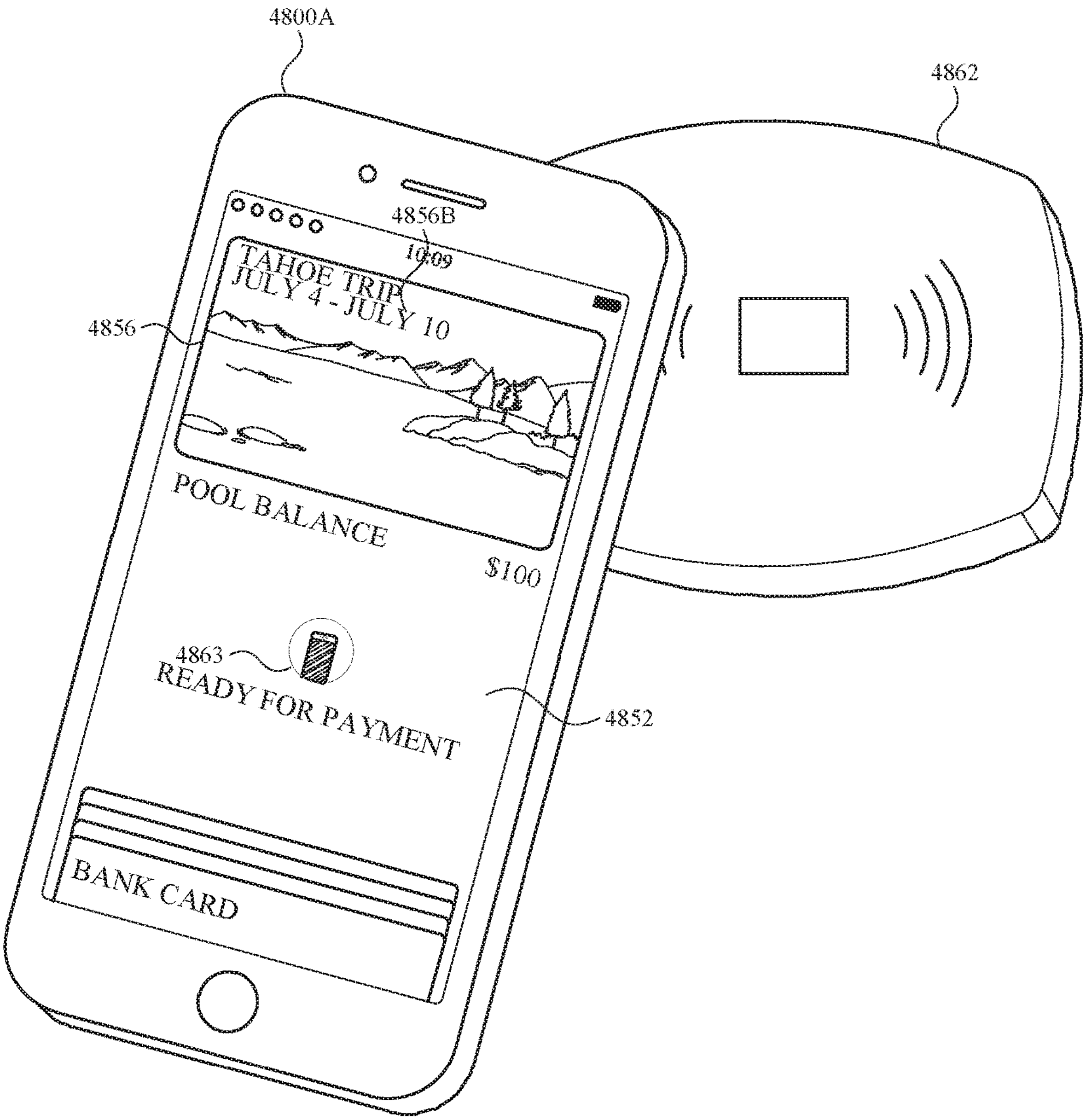

In FIG. 48Q, while displaying wallet user interface 4852 with the pool account (the "Tahoe Trip" pool account) ready and authorized for use in a payment transaction, electronic device 4800A detects (e.g., via a wireless communication radio of the device) a payment terminal 4862 (e.g., a near-field-communication terminal, a point-of-sale terminal) for making a purchase of a specific amount (e.g., "$56") using funds from the "Tahoe Trip" pool account. In FIG. 48P, the current date is July 9, and thus, because the valid time period of the pool account has been modified to July 4 to July 10 (e.g., as indicated by date indication 4856B), the pool account is valid for use in performing payment transactions.

Figure 48R:
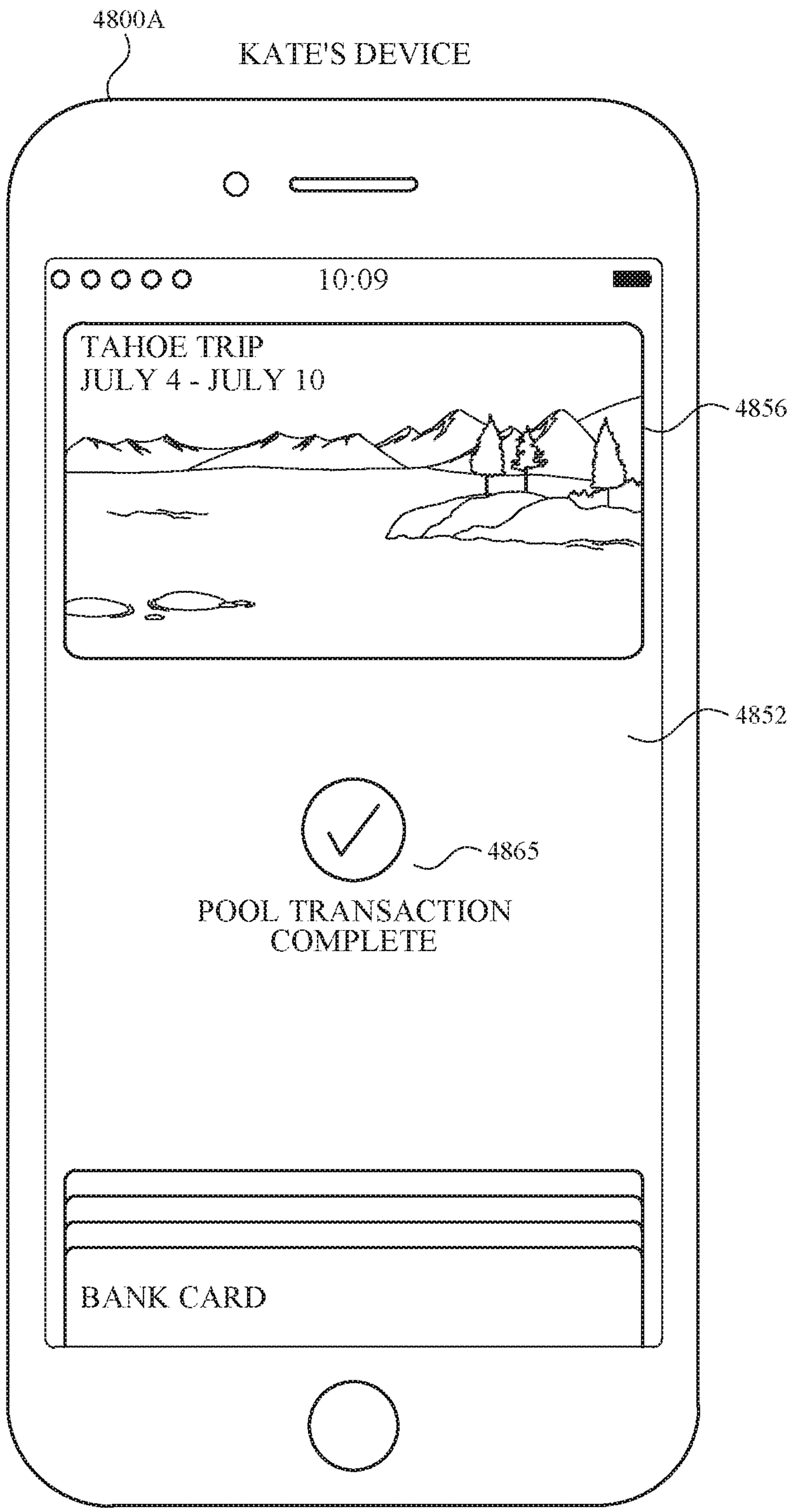

In FIG. 48R, in response to the transaction (e.g., in the amount of "$56") being successfully completed, wallet user interface 4852 displays (e.g., replaces display of ready notification 4863 with) a completion notification 4865 indicating that the purchase using funds from the pool account (the "Tahoe Trip" pool account) was successfully completed.

Figure 48S:
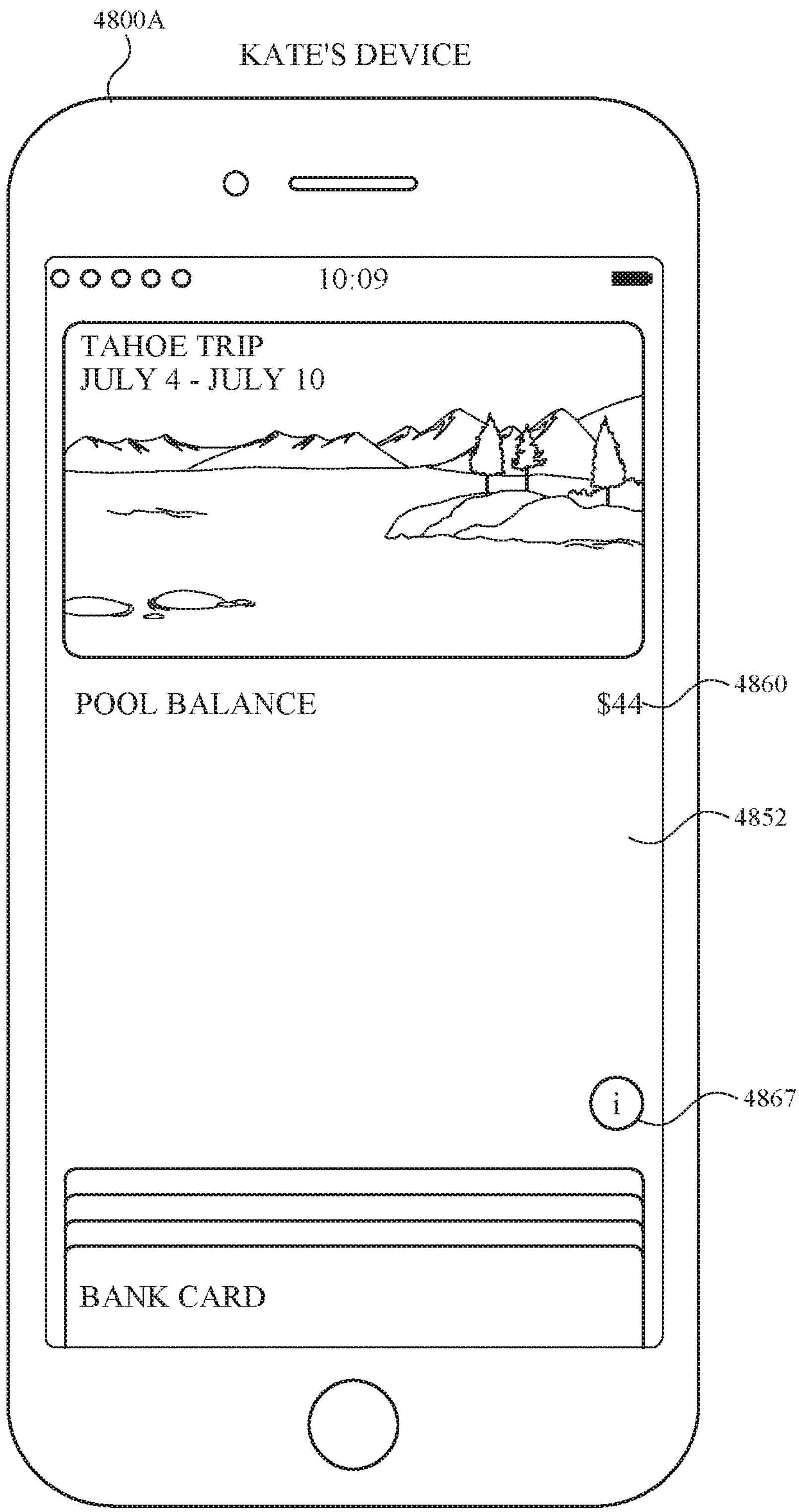

In FIG. 48S, subsequent to the successful completion of the purchase using the pool account (the "Tahoe Trip" pool account), wallet user interface 4852 shows balance indication 4860 (e.g., showing "Pool Balance $44") to account for the funds used in the purchase. In some embodiments, wallet user interface 4852 further displays a details button 4867 for viewing transaction details associated with the currently-selected account (e.g., the "Tahoe Trip" pool account).

Figure 48T:
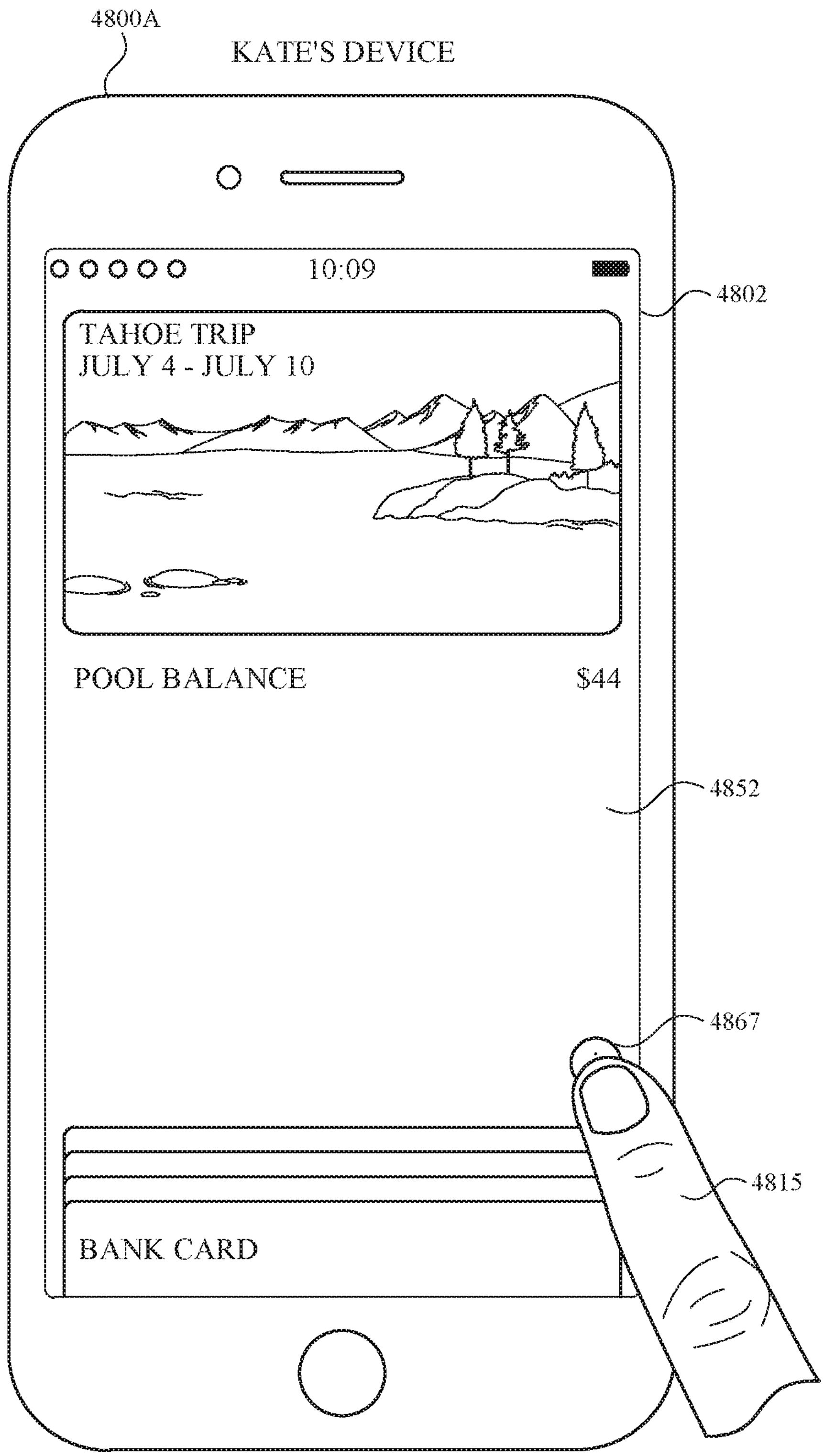

In FIG. 48T, while displaying wallet user interface 4852 after successfully completing the purchase (e.g., in the amount of $56) using the pool account (the "Tahoe Trip" pool account), as described with reference to FIGS. 48P-48R, electronic device 4800A detects (e.g., via a touchscreen of display 4802) a user selection 4815 of details button 4867.

Figure 48U:
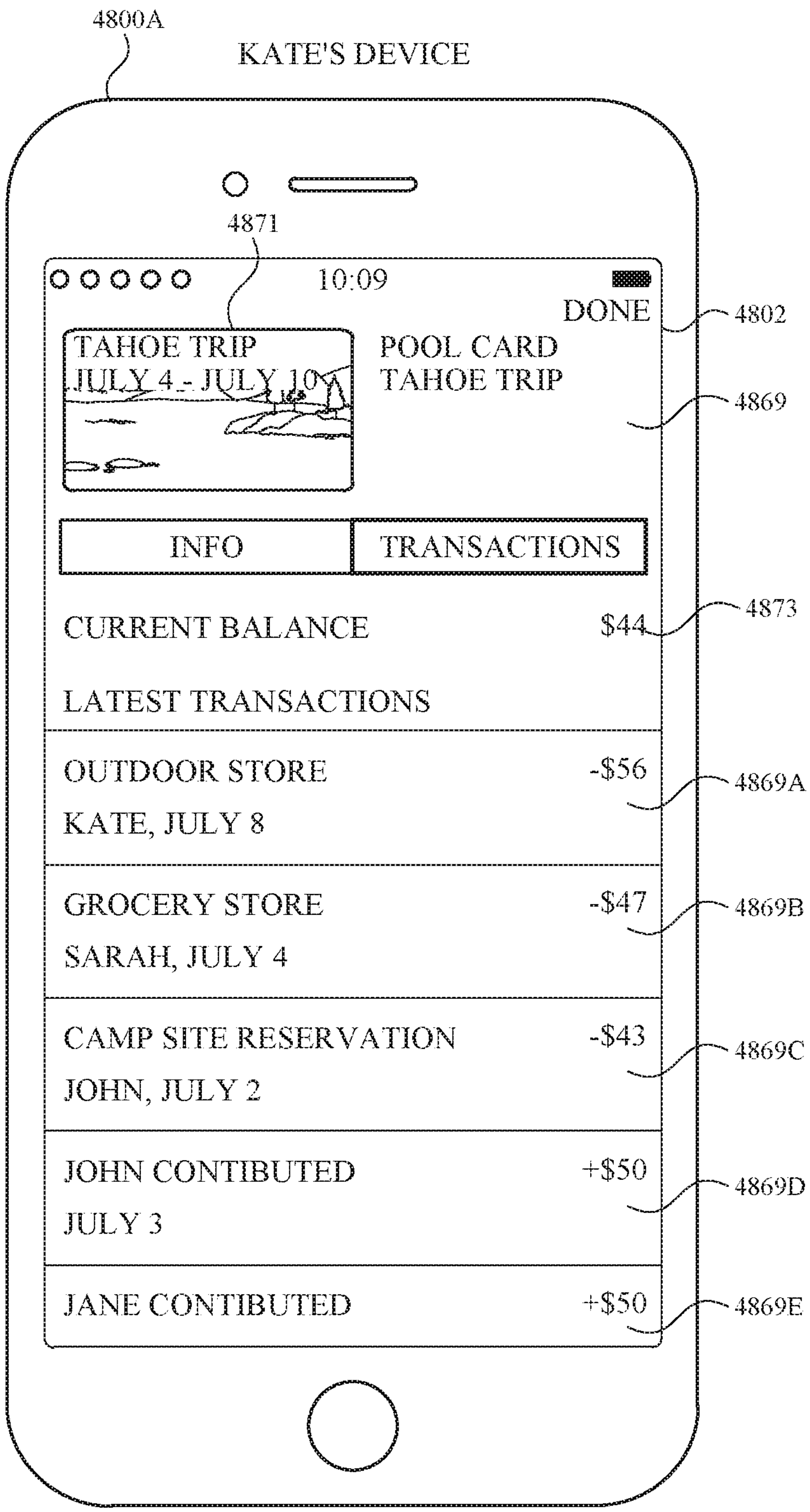

In FIG. 48U, in response to detecting user selection 4815 of details button 4867, electronic device 4800A displays, on display 4802, a transaction detail user interface 4869 (e.g., similar to transaction detail user interface 2661 described with reference to FIGS. 26F-26T) that includes a representation 4871 of the pool account, a balance indication 4873, and a listing of transaction items 4869A-4869E, where transaction items 4869A-4869E corresponds to at least a portion of the purchase and/or contributions made (by authorized participants) using the pool account. For example, transaction item 4869A corresponds to the purchase of $56 made on July 8 by the user (Kate) described above with reference to FIGS. 48P-48R transaction item 4869B corresponds to a purchase of $47 made on July 4 by pool participant Sarah (message participant 4812), transaction item 4869C corresponds to a purchase of $43 made on July 2 by pool participant John (message participant 4808), transaction item 4869D corresponds to a contribution of $50 made by pool participant John (e.g., in order to join the pool account), and transaction item 4869D corresponds to a contribution of $50 made by pool participant Jane (message participant 4810) (e.g., in order to join the pool account).

Figure 48V:
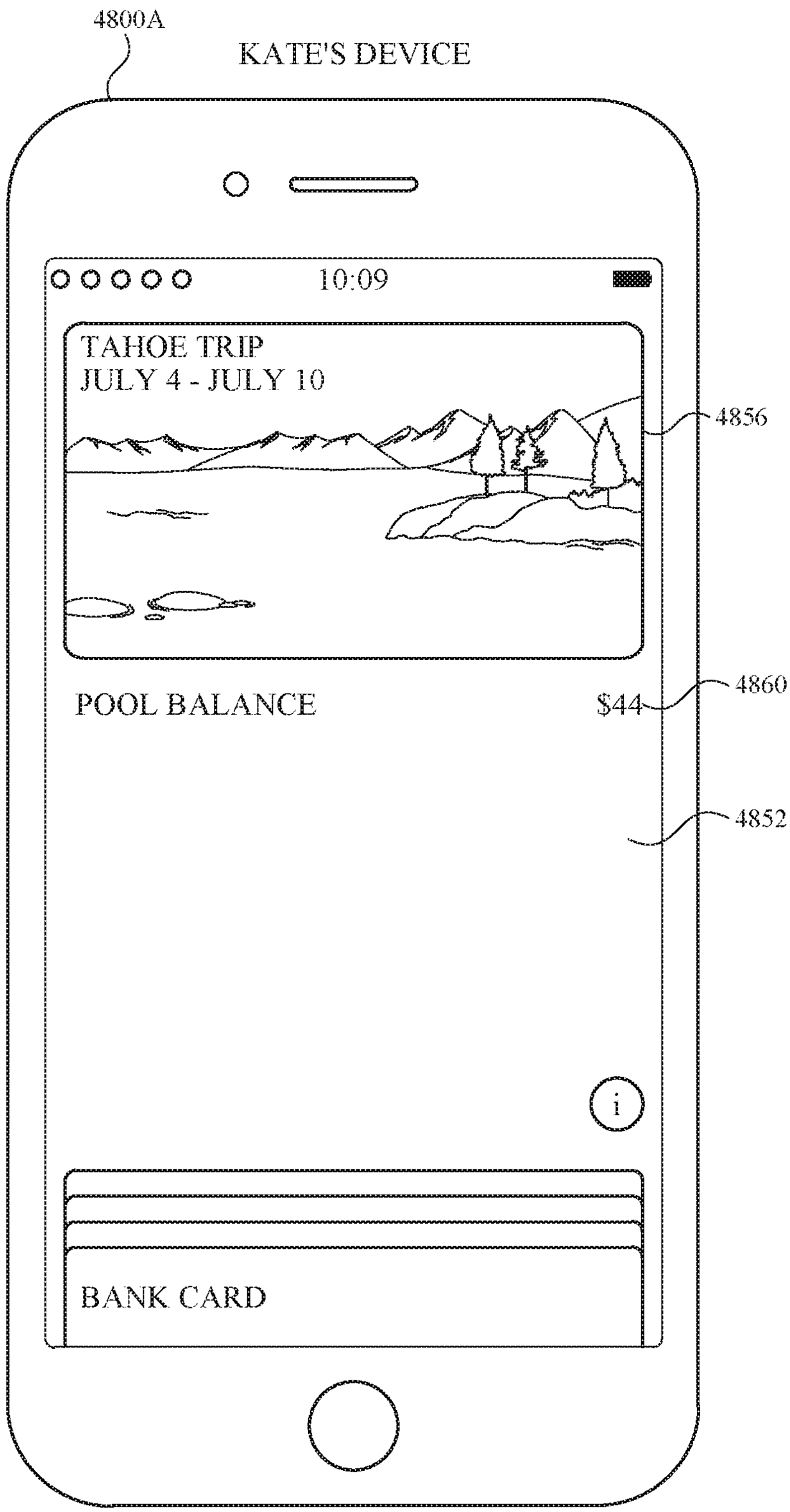

FIG. 48V illustrates electronic device 4800A again displaying wallet user interface 4852 with the "Tahoe Trip" pool account (corresponding to first pool account object 4856) currently selected for use in a transaction. As a result of the previous purchase made in FIG. 48Q, balance indication 4860 shows funds of $44 remaining for use in the pool account.

Figure 48W:
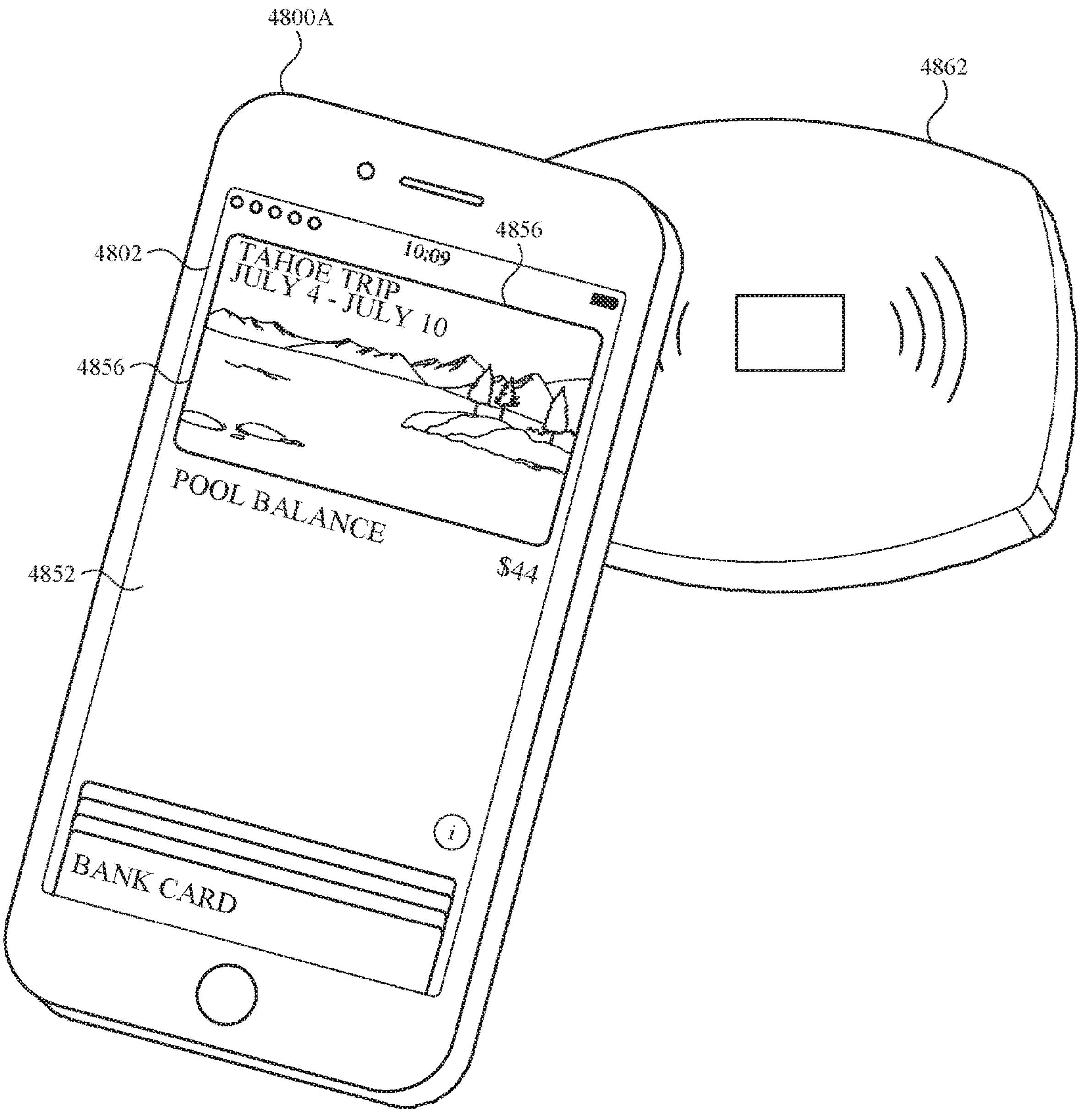

In FIG. 48W, while displaying wallet user interface 4852 with the pool account (the "Tahoe Trip" pool account) ready and authorized for use in a payment transaction (e.g., as described above with reference to FIGS. 48M-48R), electronic device 4800A detects (e.g., via a wireless communication radio of the device) payment terminal 4862 (e.g., a near-field-communication terminal, a point-of-sale terminal) for making another purchase of a certain amount (e.g., "$20") using funds from the "Tahoe Trip" pool account. In FIG. 48W, the current date is July 11, which is outside of the valid time period (July 4 to July 10) of the pool account.

Figure 48X:
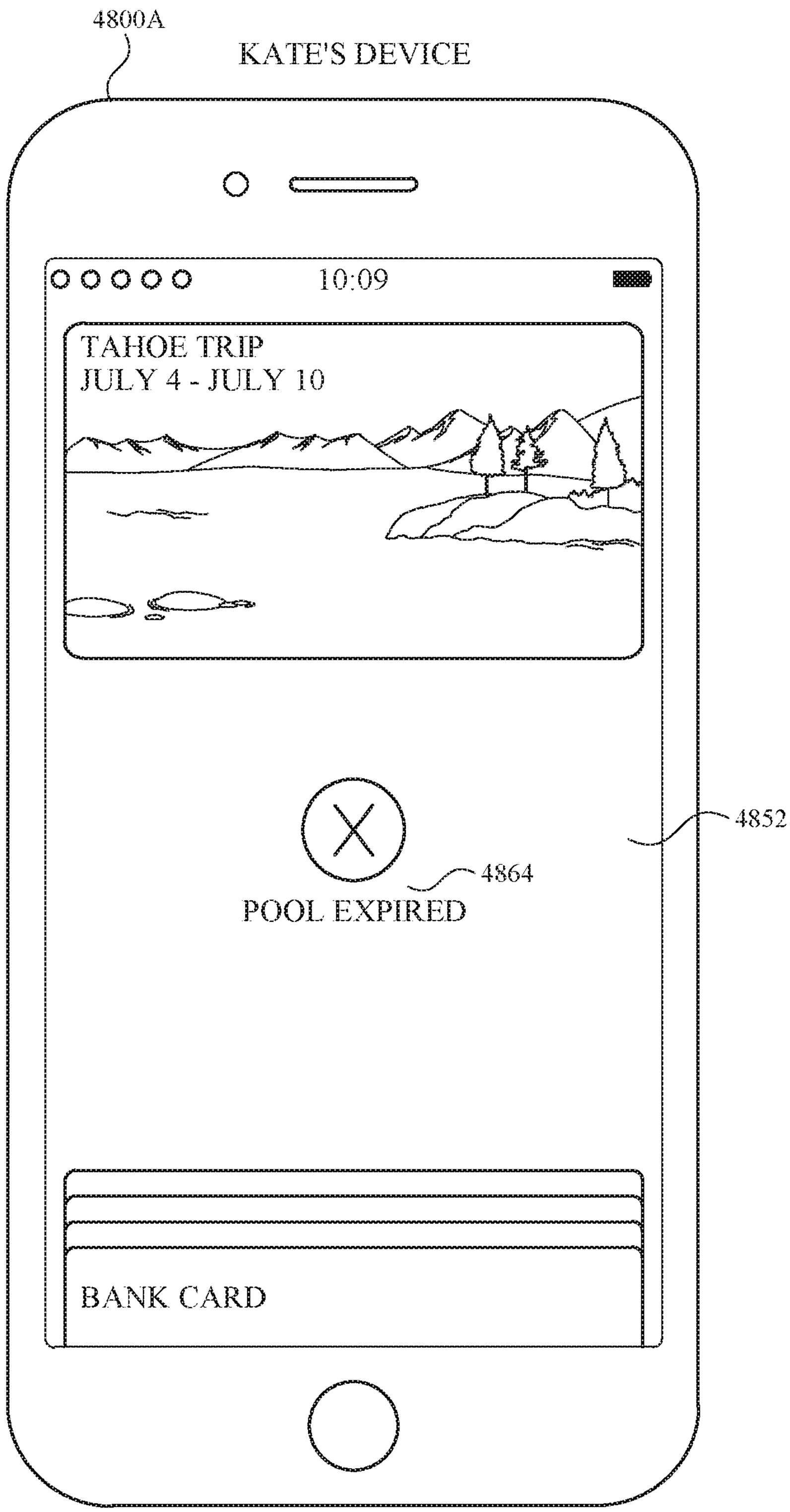
Figure 48Y:
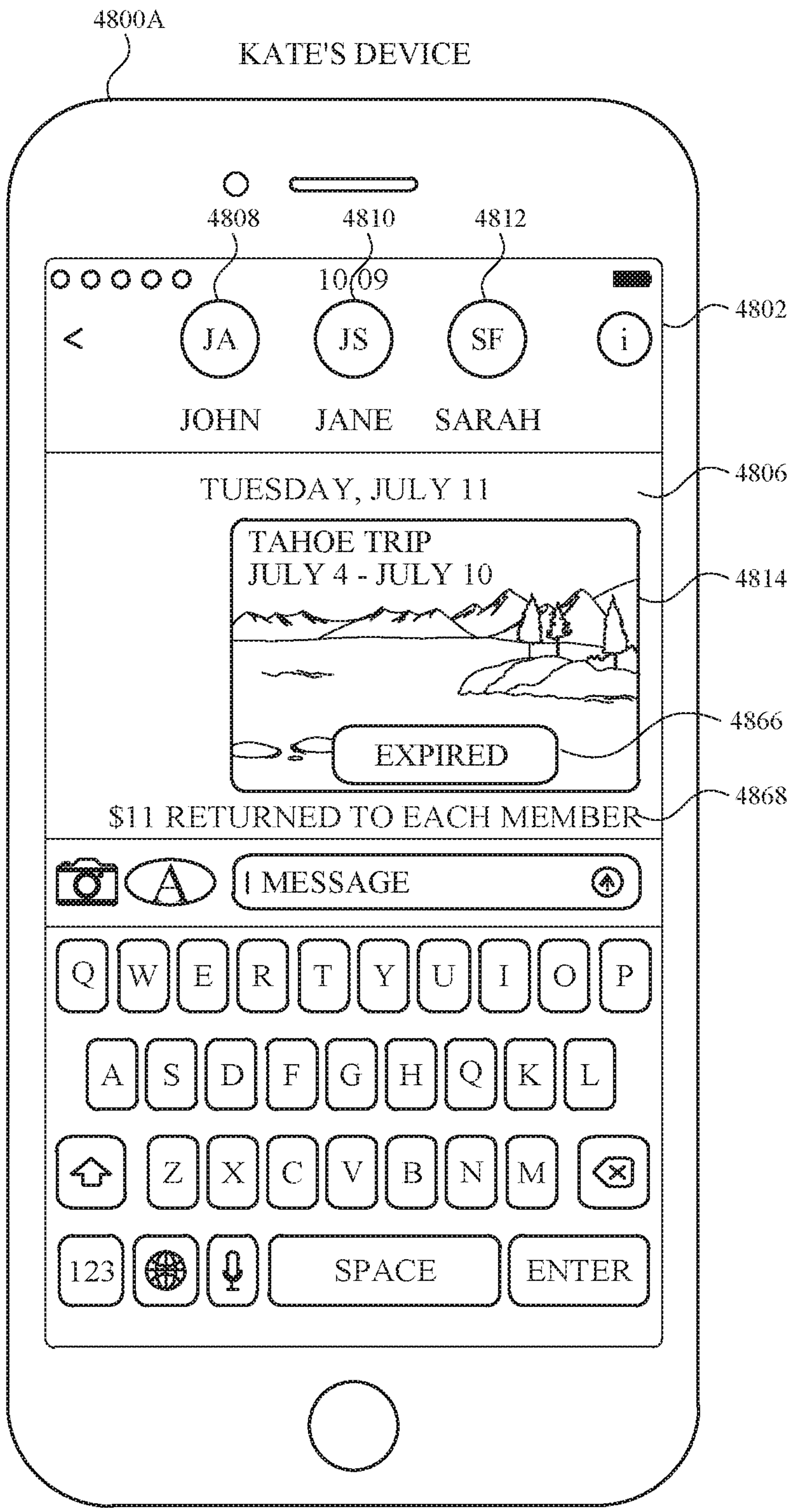
Figure 49B:
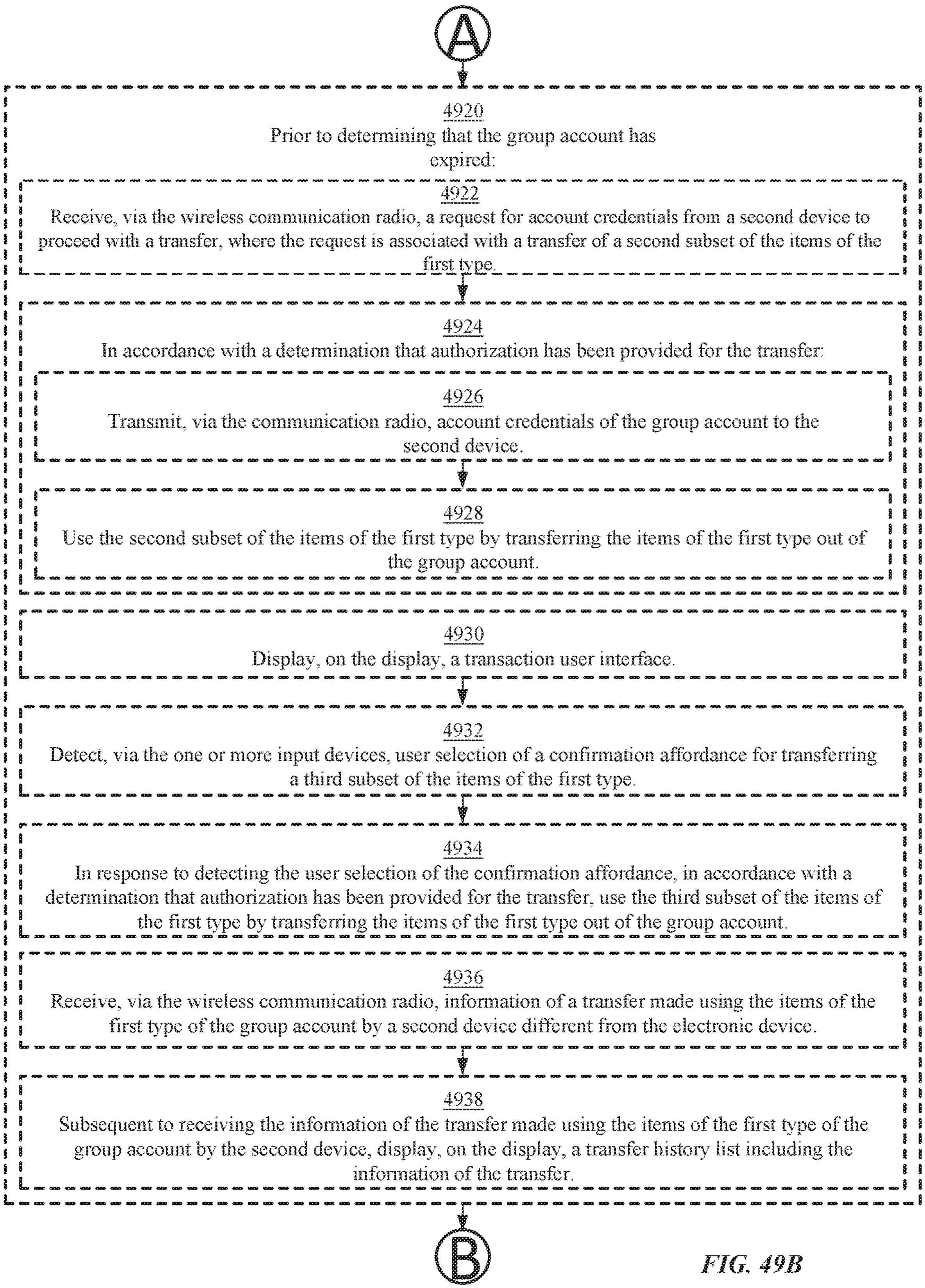
Figure 49C:
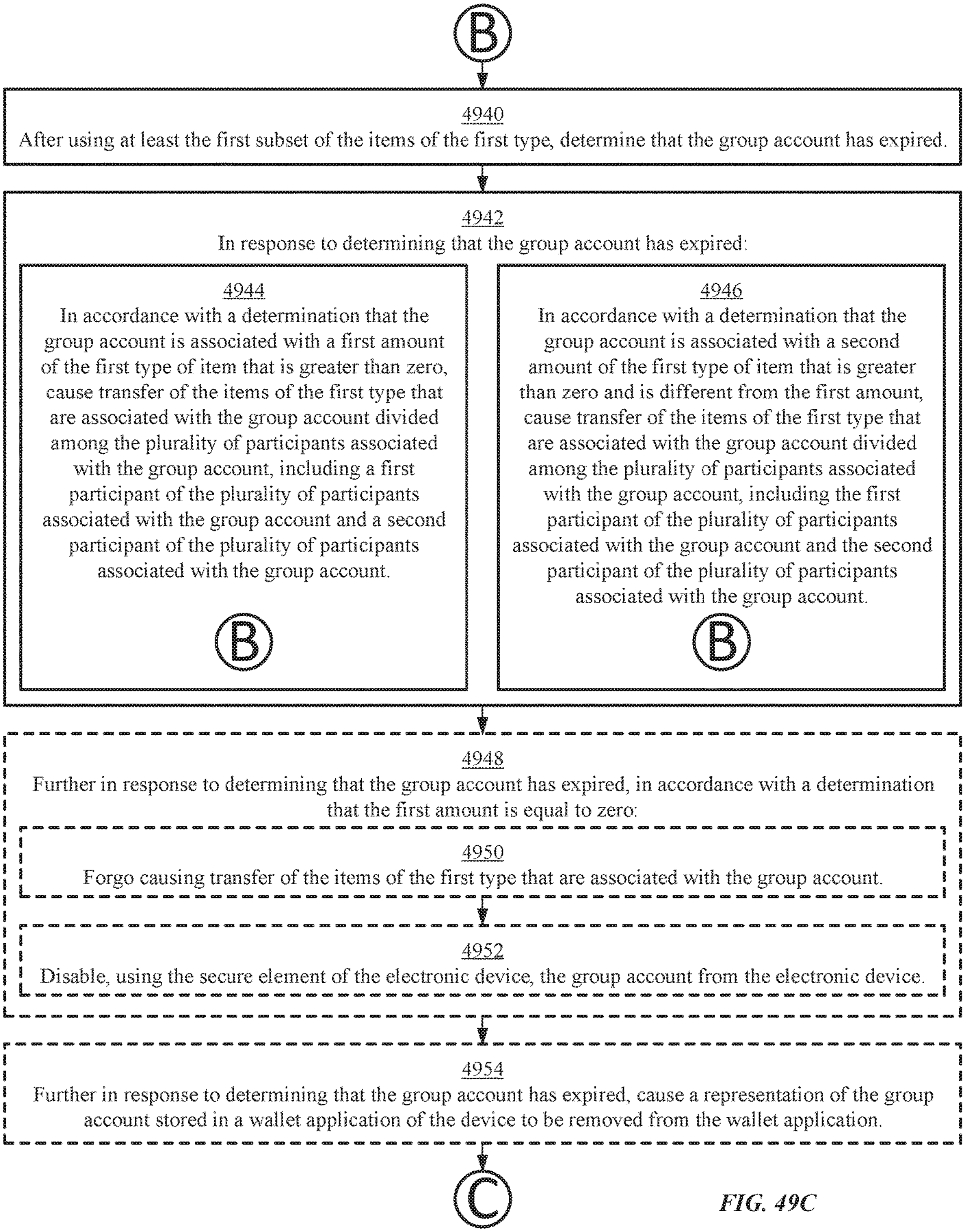

If the current time is outside of the valid time period of the pool account, the pool account cannot be used to make a purchase (and, in some embodiments, also cannot accept contributions). Thus, in response to detecting payment terminal 4862 on July 11, electronic device 4800A does not authorize the purchase and displays a expired notification 4864 (e.g., stating "Pool Expired") indicating that the pool account (the "Tahoe Trip" pool account) cannot be used to make the purchase because the pool account has expired, as shown in FIG. 48X.

In some embodiments, in response to or subsequent to the expiration of the pool account, any remaining funds, if greater than zero, are (automatically) distributed to the (joined) participants of the pool account. For example, if the user (Kate), message participant 4808 (John), message participant 4810 (Jane), and message participant 4812 (Sarah) are all joined participants of the "Tahoe Trip" pool account, and if there are $44 in funds remaining in the pool account once it expires (e.g., because the valid time period of the pool account has passed), electronic device 4800A (automatically) causes the remaining funds to be divided (e.g., evenly divided or proportionally divided based on each participant's contributions to the account) and transmitted to a personal account of each participant.

In some embodiments, as shown in FIG. 48Y, once the pool account has expired and the remaining funds have been returned to the participants' personal accounts, pool message object 4814 displayed (and correspondingly displayed in the corresponding pool message objects of the other participants' devices) in group message conversation 4806 is updated to include an expired message 4866, thus indicating that the pool account associated with the pool message object has expired. Further, in some embodiments, an expired notification 4868 is displayed (and correspondingly displayed in the corresponding pool message objects of the other participants' devices) within group message conversation 4806 (e.g., stating "$11 returned to each member") indicating that the remaining funds have been (evenly) divided and returned to the personal account of each pool account participant.

FIGS. 49A-49D are a flow diagram illustrating a method for providing feedback corresponding to an operation associated with a transfer, in accordance with some embodiments. Method 4900 is performed at a device (e.g., 100, 300, 500, 4700A, 4800A) with a display (e.g., 4702, 4802) and a secure element. Some operations in method 4900 are, optionally, combined, the orders of some operations are, optionally, changed, and some operations are, optionally, omitted.

As described below, method 4900 provides an intuitive way for managing peer-to-peer transactions. The method reduces the cognitive burden on a user for managing peer-to-peer transactions, thereby creating a more efficient human-machine interface. For battery-operated computing devices, enabling a user to manage peer-to-peer transactions faster and more efficiently conserves power and increases the time between battery charges.

The electronic device (e.g., 4700A, 4800A) provisions (4908) (e.g., adding to, storing in), using the secure element of the device, a (temporary) group account (e.g., a pool account, an account that is accessible by different user accounts logged into different devices, where the account is a payment account, a resource account, a points account, an account holding photos, files) onto the electronic device, where the group account is associated with items of a first type (e.g., funds, resources, points, photos, files) received from a plurality of participants (e.g., 4708, 4710, 4712, 4808, 4810, 4812) associated with the group account (e.g., one or more members of the pool account, one or more participants of a message conversation), and where the group account is configured to expire after a predetermined time period (e.g., a pre-set date range). Provisioning a group account onto the device using the secure element of the device stores data associated with the group account within the secure element, thereby deterring fraudulent activity aimed at stealing data associated with the group account from the device. Deterring fraudulent activity aimed at stealing data from the device enhances the operability of the device and makes the user-device interface more secure (e.g., by reducing fraud when operating/interacting with the device). In some examples, the predetermined time period is manually set by the user of the device.

In some embodiments, the participants in the group account were selected (4910) based on the participants in a message conversation (e.g., 4706, 4806) that was used to create the group (e.g., an invitation to join the group was created from within a group conversation of the messaging user interface that includes the participants). Selecting the participants in the group based on the participants in the message conversation that was used to create the group enables the user to bypass having to manually select participants in the group (e.g., from a list of contacts). Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the predetermined time period is (4912) at least a first time period (e.g., a minimum time period, one hour, one day, 24 hours) and not longer than a second time period (e.g., a maximum time period, one year), and the second time period is longer than the first time period. In some examples, the first time period and the second time period are pre-configured by the operating system of the device and cannot be changed by the user of the device or by a third-party application.

In some embodiments, the items of the first type are photos. In some embodiments, the items of the first type are printer credits (or printer points, printer resources). In some embodiments, where the items of the first type are computing resources (e.g., data storage, CPU cycles). the items of the first type are funds (e.g., dollars, euros).

In some embodiments, the electronic device (e.g., 4700A, 4800A) includes one or more input devices and, prior to provisioning the group account onto the electronic device, the electronic device (e.g., 4700A, 4800A) displays (4902), on the display (e.g., 4702, 4802), a message conversation (e.g., 4706, 4806) of a messaging application (e.g., 4704, 4804), where participants of the message conversation (e.g.,

4708, 4710, 4712, 4808, 4810, 4812) correspond to the plurality of participants associated with the group account. In some embodiments, the electronic device (e.g., 4700A, 4800A) detects (4904), via the one or more input devices, user activation of a user interface (e.g., 4740, 4840) for configuring the group account (where the plurality of participants are automatically pre-selected to be participants of the group account). In some embodiments, the electronic device (e.g., 4700A, 4800A) detects (4906), via the one or more input devices, user selection of a confirmation affordance associated with the user interface (e.g., 4740, 4840) for configuring the group account and, in response to detecting the user selection of the confirmation affordance, provisions (4908) the group account onto the electronic device (e.g., storing information about the group account that can be used to conduct transactions such as transferring funds to or from the group account in a secure element of the device where authentication from the user such as biometric, password, or passcode authentication is required to access the information).

In some embodiments, subsequent to provisioning the group account onto the electronic device, the electronic device (e.g., 4700A, 4800A) detects (4914), via the one or more input devices, user selection of a second predetermined time period (e.g., a different pre-set date range) different from the predetermined time period. In some embodiments, in response to detecting the user selection of the second predetermined time period, re-configures (4916) the group account to expire after the second predetermined time period (instead of the original predetermined time period).

Before the group account has expired, the electronic device (e.g., 4700A, 4800A) uses (4918) a first subset of the items of the first type by transferring the items of the first type out of the group account.

In some embodiments, the electronic device (e.g., 4700A, 4800A) includes a wireless communication radio (e.g., for WiFi, Bluetooth, near-field-communication (NFC) connections). In some embodiments, prior to determining (4920) that the group account has expired, the electronic device (e.g., 4700A, 4800A) receives (4922), via the wireless communication radio, a request for account credentials (e.g., payment credentials) from a second device (e.g., 4762, 4862, a transaction terminal, a NFC terminal, a POS terminal) to proceed with a transfer (e.g., to proceed with a payment transaction), where the request is associated with a transfer of a second subset of the items of the first type. In some embodiments, in accordance with a determination (4924) that authorization (for proceeding with a transaction) has been provided for the transfer (e.g., authorization via biometric authentication, authorization via passcode authentication), the electronic device (e.g., 4700A, 4800A) transmits (4926), via the wireless communication radio, account credentials of the group account to the second device (e.g., 4762, 4862) and uses (4928) the second subset of the items of the first type by transferring the items of the first type out of the group account. Transmitting account credentials of the group account to the second device and using the second subset of the items of the first type in accordance with the determination that authorization has been provided for the transfer reduces the number of fraudulent (e.g., unauthorized) transfers made using the group account on the device. Reducing the number of fraudulent transfers enhances the operability of the device and makes the user-device interface more secure (e.g., by reducing fraud when operating/interacting with the device).

In some embodiments, the electronic device (e.g., 4700A, 4800A) includes one or more input devices. In some embodiments, prior to determining (4920) that the group account has expired, the electronic device (e.g., 4700A, 4800A) displays (4930), on the display (e.g., 4702, 4802), a transaction user interface (for proceeding with an online transfer, an online transaction). In some embodiments, the electronic device (e.g., 4700A, 4800A) detects (4932), via the one or more input devices, user selection of a confirmation affordance for transferring a third subset of the items of the first type. In some embodiments, in response to detecting the user selection of the confirmation affordance, in accordance with a determination that authorization (e.g., for proceeding with the online transfer, online transaction) has been provided for the transfer (e.g., authorization via biometric authentication, authorization via passcode authentication), uses (4934) the third subset of the items of the first type by transferring the items of the first type out of the group account (e.g., making a payment using the group account). Using the third subset of the items of the first type by transferring the items of the first type out of the group account in accordance with the determination that authorization has been provided for the transfer reduces the number of fraudulent (e.g., unauthorized) transfers made using the group account on the device. Reducing the number of fraudulent transfers enhances the operability of the device and makes the user-device interface more secure (e.g., by reducing fraud when operating/interacting with the device).

In some embodiments, determining that authorization has been provided for the transfer (e.g., of a payment, of resources, of credits) comprises the electronic device (e.g., 4700A, 4800A) displaying, on the display (e.g., 4702, 4802), a request for authentication information (e.g., 4761, 4861, biometric authentication information, such as fingerprint information, voice input information, iris/retina scan information, and/or facial recognition information, passcode authentication information, pattern authentication information) for authorizing the transfer, receiving authentication information (from the user of the device) corresponding to the request, and, in accordance with a determination that the received authentication is consistent with enrolled authentication information (e.g., enrolled biometric authentication information, such as fingerprint information, voice input information, iris/retina scan information, and/or facial recognition information, enrolled passcode authentication information, enrolled pattern authentication information) for authorizing transfers, providing authorization for the transfer. Requesting authentication information for authorizing the transfer and providing authorization for the transfer in accordance with the determination that the received authentication information is consistent with enrolled authentication information reduces the number of fraudulent (e.g., unauthorized) transfers made using the group account on the device. Reducing the number of fraudulent transfers enhances the operability of the device and makes the user-device interface more secure (e.g., by reducing fraud when operating/interacting with the device).

In some embodiments, the electronic device (e.g., 4700A, 4800A) includes a wireless communication radio (e.g., for WiFi, Bluetooth, near-field-communication (NFC) connections) and, prior to determining that the group account has expired, the electronic device (e.g., 4700A, 4800A) receives (4936), via the wireless communication radio, information of a transfer (e.g., a payment transaction, a transfer of photos, credits, or points) made using the items of the first type of the group account by a second device (e.g., a device of participant, other than the user of the electronic device, associated with the group account) different from the electronic device. In some embodiments, subsequent to receiving the information of the transfer made using the items of the first type of the group account by the second device, the electronic device (e.g., 4700A, 4800A) displays (4938), on the display (e.g., 4702, 4802), a transfer history list (e.g., 4869, a record of transfers made using the group account by any participant associated with the group account) including the information of the transfer. Displaying a transfer history list subsequent to receiving the information of the transfer made using the items of the first type of the group account by the second device provides the user with easily accessible feedback about other transfers made using the group account. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

After using at least the first subset of the items of the first type, the electronic device (e.g., 4700A, 4800A) determines (4940) that the group account has expired.

In response to determining (4942) that the group account has expired (e.g., and subsequent to the passing of the predetermined time period), in accordance with a determination that the group account is associated with a first amount of the first type of item that is greater than zero (e.g., in accordance with a determination that there are remaining funds in the group account, such as a pool account), the electronic device (e.g., 4700A, 4800A) (automatically) causes transfer (4944) (e.g., to a default account of an intended recipient) of the items of the first type that are associated with the group account divided among the plurality of participants associated with the group account, including a first participant of the plurality of participants associated with the group account and a second participant of the plurality of participants associated with the group account. Automatically causing transfer of the items of the first type in response to determining that the group account has expired enables the user to bypass having to manually retrieve the transfer of the items from the group account. Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to determining (4942) that the group account has expired (e.g., and subsequent to the passing of the predetermined time period), in accordance with a determination that the group account is associated with a second amount of the first type of item that is greater than zero and is different from the first amount (e.g., in accordance with a determination that there are remaining funds in the group account, such as a pool account), the electronic device (e.g., 4700A, 4800A) (automatically) causes transfer (4946) (e.g., to a default account of an intended recipient) of the items of the first type that are associated with the group account divided among the plurality of participants (e.g., the user, 4708, 4710, 4712, 4808, 4810, 4812) associated with the group account, including the first participant of the plurality of participants associated with the group account and the second participant of the plurality of participants associated with the group account. Automatically causing transfer of the items of the first type in response to determining that the group account has expired enables the user to bypass having to manually retrieve the transfer of the items from the group account. Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, dividing the items of the first type among the plurality of participants (e.g., the user, 4708, 4710, 4712, 4808, 4810, 4812) associated with the group comprises (e.g., substantially) equally dividing (4956) the items of the first type based on the number of the plurality of the participants. For example, the amount of items of the first type transferred to the first participant is equal to the amount of items of the first type transferred to the second participant (and to all other participants of the plurality of participants).

In some embodiments, dividing the items of the first type among the plurality of participants (e.g., the user, 4708, 4710, 4712, 4808, 4810, 4812) associated with the group comprises proportionally dividing (4958) the items of the first type based on amount contributions of items of the first type made to the group account by the plurality of the participants. For example, prior to the expiration of the group account, if the second participant added twice the amount of items of the first type to the group account than did the first participant, the second participant receives twice the amount of items of the first type out of the group account upon expiration of the group account than does the first participant.

In some embodiments, causing transfer of the items of the first type that are associated with the group account divided among the plurality of participants (e.g., the user, 4708, 4710, 4712, 4808, 4810, 4812) associated with the group does not include a third participant of the plurality of participants. In some embodiments, the first participant contributed items of the first type to the group account, the second participant contributed items of the first type to the group account, and the third participant did not contribute items of the first type to the group account.

In some embodiments, further in response to determining (4948) that the group account has expired, in accordance with a determination that the first amount is equal to zero (e.g., in accordance with a determination that there are no remaining funds in the group account), the electronic device (e.g., 4700A, 4800A) forgoes causing transfer (4950) (e.g., to a default account of an intended recipient) of the items of the first type that are associated with the group account and disables (4952) (e.g., removing or de-provisioning), using the secure element of the electronic device, the group account from the electronic device (e.g., deleting some or all data associated with the group account from the secure element of the device). Automatically disabling, using the secure element of the device, the group account from the device in response to determining that the group account has expired reduces the likelihood of impermissible access to data associated with the group account. Reducing the likelihood of impermissible access enhances the operability of the device and makes the user-device interface more secure (e.g., by reducing fraud when operating/interacting with the device). Further, (automatically) disabling, using the secure element of the device, the group account from the device in response to determining that the group account has expired enables the user to bypass having to manually remove the group account from the device. Performing an operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the group account is de-provisioned, removed, or disabled from devices of all of the participants in the group, or all of the participants in the group other than an organizer of the group account.

In some embodiments, further in response to determining that the group account has expired, the electronic device (e.g., 4700A, 4800A) causes (4954) a representation of the group account stored in a wallet application of the device to be removed from the wallet application (e.g., automatically, without further user input). Removing the representation of the group account stored in the wallet application of the device in response to determining that the group account has expired provides visual feedback to the user that the group account can no longer be used to perform transactions. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 4700A, 4800A) displays (4960), on the display (e.g., 4702, 4802), a message object (e.g., 4714, 4814) corresponding to the group account in a message conversation (e.g., 4706, 4806) of a messaging application (e.g., 4704, 4804, an instant messaging application controlled by the operating system of the device), where the message object includes a representation of (at least) the first participant (of the plurality of participants). In some examples, the message object also includes a graphical representation of the second participant. In some examples, the message object includes graphical representations of all of the participants associated with the group account.

In some embodiments, in accordance with a determination that the first participant is a first type of user of the group account, the electronic device (e.g., 4700A, 4800A) displays (4962) a first type of graphical indication associated with the representation of the first participant (e.g., a graphical indication indicating that the first participant is enabled to make payments with the group account). Displaying the first type of graphical indication associated with the representation of the first participant in accordance with the determination that the first participant is the first type of user of the group account provides visual feedback to the user that the first participant is the first type of user of the group account. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the first participant is a second type of user of the group account different from the first type of user, the electronic device (e.g., 4700A, 4800A) displays (4964) a second type of graphical indication associated with the representation of the second participant different from the first type of graphical indication (e.g., a graphical indication indicating that the second participant is not enabled to make payments with the group account). For example, for a group payment account for a sport team, the coach is enabled to spend money from the group payment account, while parents are enabled to contribute money to the group payment account but are not enabled to spend money from the group payment account. Displaying the second type of graphical indication associated with the representation of the second participant different from the first type of graphical indication in accordance with the determination that the first participant is the second type of user of the group account different from the first type of user provides visual feedback to the user that the first participant is the second type of user of the group account. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 4900 (e.g., FIGS. 49A-49D) are also applicable in an analogous manner to the methods described above. For example, method 4900 optionally includes one or more of the characteristics of the various methods described above with reference to methods 900, 1200, 1500, 1800, 2100, 2400, 2700, 3000, 3400, 3700, 4000, and 4600. For example, a transfer (e.g., of a resource, of a file, of data storage, of a payment) made via a message conversation of a messaging application, as described in method 900, can be made using items (e.g., files, data storage, funds) of a group account (e.g., a pool account). For another example, the applied visual effect (e.g., a 3D effect) for a completed transfer (e.g., of a resource, of a file, of data storage, of a payment), as described in method 1200, can be applied to a message object corresponding to a transfer (e.g., of files, of data storage, of funds) made using a group account (e.g., a pool account). For another example, providing for visually distinguishable message objects based on message designated, as described in method 1500, can be applied to transfers made using a group account (e.g., a pool account). For another example, an activated account (e.g., a data storage account, a payment account), as described in method 1800, can be used to contribute items (e.g., files, data storage, payment) to a group account (e.g., a pool account). For another example, exchanged an account from one account to a different account during a transfer, as described in method 2100, can occur between a personal account (e.g., a non-pool account) and a group account (e.g., pool account). For another example, when a transfer (e.g., of files, of data storage, of funds) is split between two different accounts, as described in method 2400, one account can be a personal account (e.g., a non-pool account) and the other account can be a group account (e.g., a pool account). For another example, when a transfer history list is displayed, as described in method 2700, the list can show transfers and contributions made to a group account (e.g., a pool account). For another example, the voice activation used to make a transfer, as described in method 3000, can also be used to make a transfer with items (e.g., files, data storage, funds) from a group account (e.g., a pool account). For another example, the dynamic visual feedback applied to a message object corresponding to an accepted transfer, as described in method 3400, can be applied to a message object corresponding to a transfer made using a group account (e.g., a pool account). For another example, a gift transfer can be sent (e.g., of data storage, of funds), as described in method 3700, using funds from a group account (e.g., a pool account). For another example, items (e.g., data storage, funds) received as a gift transfer, as described in method 4000, can be added (contributed to) a group account (e.g., a pool account). For another example, the valid time period of a group account (e.g., a pool account) created to be shared among participants, as described in method 4300, can be extended for longer use by modifying the valid time period of the account. For another example, the group account creation user interface reached from a group message conversation (as opposed to a one-on-one message conversation), as described in method 4600, can be used to create or modify a group account (e.g., a pool account) among participants of the group message conversation. For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 49A-49D are, optionally, implemented by components depicted in FIGS. 1A-1B. For example, provisioning operation 4908, using operation 4918, determining operation 4940, causing operation 4944, and causing operation 4946 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 50A-50AG illustrate exemplary user interfaces for managing balance notifications, in accordance with some embodiments. The user interfaces in these figures are used to illustrate the processes described below, including the processes in FIGS. 51A-51B.

FIG. 50A illustrates an electronic device 5000 (e.g., a smartphone, a mobile device) with a display 5002, one or more input devices (e.g., a touch-sensitive surface of display 5002, a mechanical input device 5004), and a wireless communication radio (e.g., for LTE, WiFi, Bluetooth, and/or NFC connections). In some embodiments, electronic device 5000 further includes a camera and a depth sensor (e.g., integrated with or separate from a camera). In some embodiments, electronic device 5000 further includes a biometric sensor, such as a fingerprint sensor (e.g., integrated with a mechanical input device) and/or an iris/retina scanner. In some embodiments, electronic device 5000 further includes one or more output devices (e.g., a haptic generator, a speaker).

In FIG. 50A, electronic device 5000 is displaying, on display 5002, a transfer user interface 5006 of a transfer application (e.g., an electronic wallet application, a payment application). In some embodiments, a third-party transfer account (e.g., a points account, a bank account/card, a credit card, a stored-value account associated with a third-party institution) is set as the transfer account to be used in a transfer operation (e.g., a transaction, a payment). Transfer user interface 5006 shows a representation 5008 of the third-party transfer account in a top portion of the user interface (e.g., showing the currently-selected transfer account), thereby indicating that the third-party transfer account corresponding to representation 5008 is currently set for use in a transfer operation.

As also shown in FIG. 50A, electronic device 5000 displays, in transfer user interface 5006, an authentication request 5016 indicating that authentication (e.g., biometric authentication, such as facial recognition authentication, fingerprint authentication, iris/retina scan authentication; or passcode authentication) is required to proceed with a transfer operation (e.g., a transaction, a payment) using the currently-selected account (e.g., the third-party transfer account). Electronic device 5000 also displays, in transfer user interface 5006, an available accounts stack 5010 corresponding to (portions of) representations of other accounts (e.g., a first-party transfer account, a different third-party transfer account, a points account, a loyalty card, an identification card) and/or cards provisioned on electronic device 5000. The other accounts include a first-party transfer account (e.g., a type of stored-value account) that is directly associated with and provided by the operating system of electronic device 5000.

In FIG. 50A, while the third-party transfer account is currently-selected for use in a transfer operation, in accordance with a determination that the balance (e.g., of points, resources, funds) of the first-party transfer account is at least a threshold amount (e.g., $10), electronic device 5000 displays a greater portion of a representation 5012 of the first-party transfer account from within available accounts stack 5010 as compared to another (or all other) representations of accounts within available stack 5010, thereby indicating to the user that the first-party transfer account can be used for the transfer operation (e.g., a transaction, a payment) instead of the currently-selected third-party transfer account corresponding to representation 5008. The displayed portion of representation 5012 of the first-party transfer account includes a balance notification 5012A (e.g., $11) showing the current balance of the first-party transfer account.

In some embodiments, the threshold amount that triggers the display of representation 5012 of the first-party transfer account from available accounts stack 5010 is set by the operating system of electronic device 5000 (and is non-configurable and cannot be changed by the user of the device). In some embodiments, the threshold amount that triggers the display of representation 5012 of the first-party transfer account from available accounts stack 5010 can be changed/set by the user of electronic device 5000.

Figure 50B:
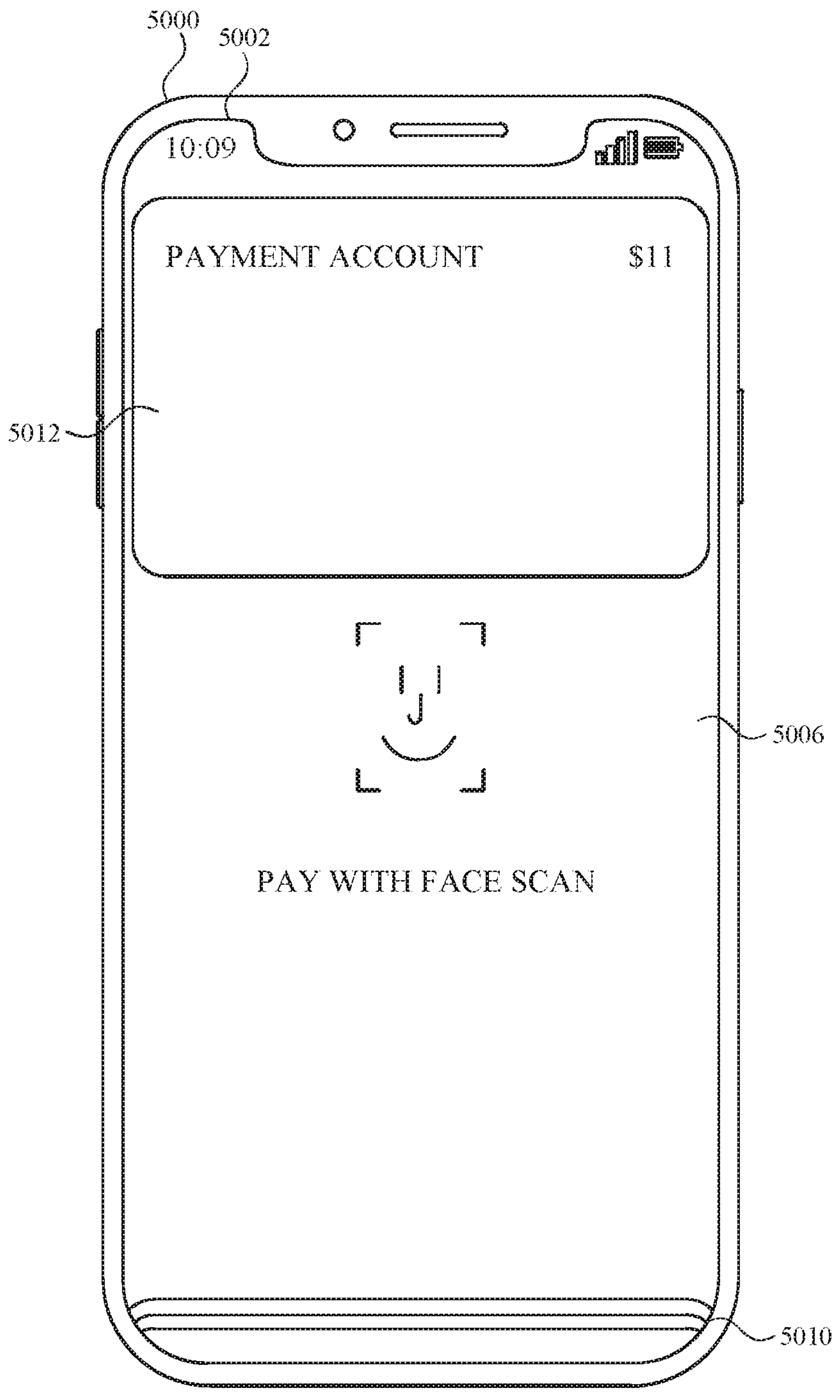

In FIG. 50A, while displaying a portion of representation 5012 of the first-party transfer account from within available accounts stack 5010, electronic device 5000 detects a selection 5001 (e.g., a touch input) of representation 5012 of the first-party transfer account. In FIG. 50B, in response to detecting selection 5001 of representation 5012, electronic device 5000 replaces display, in transfer user interface 5006, of representation 5008 of the third-party transfer account with representation 5012 of the first-party transfer account (thereby arming the first-party transfer account instead of the third-party transfer account for use in a transfer operation, such as a payment). Electronic device 5000 adds representation 5008 of the third-party transfer accounts to available accounts stack 5010 (where representation 5008 of the third-party transfer accounts was not in available accounts stack 5010 when the selection 5001 was detected).

Figure 50C:
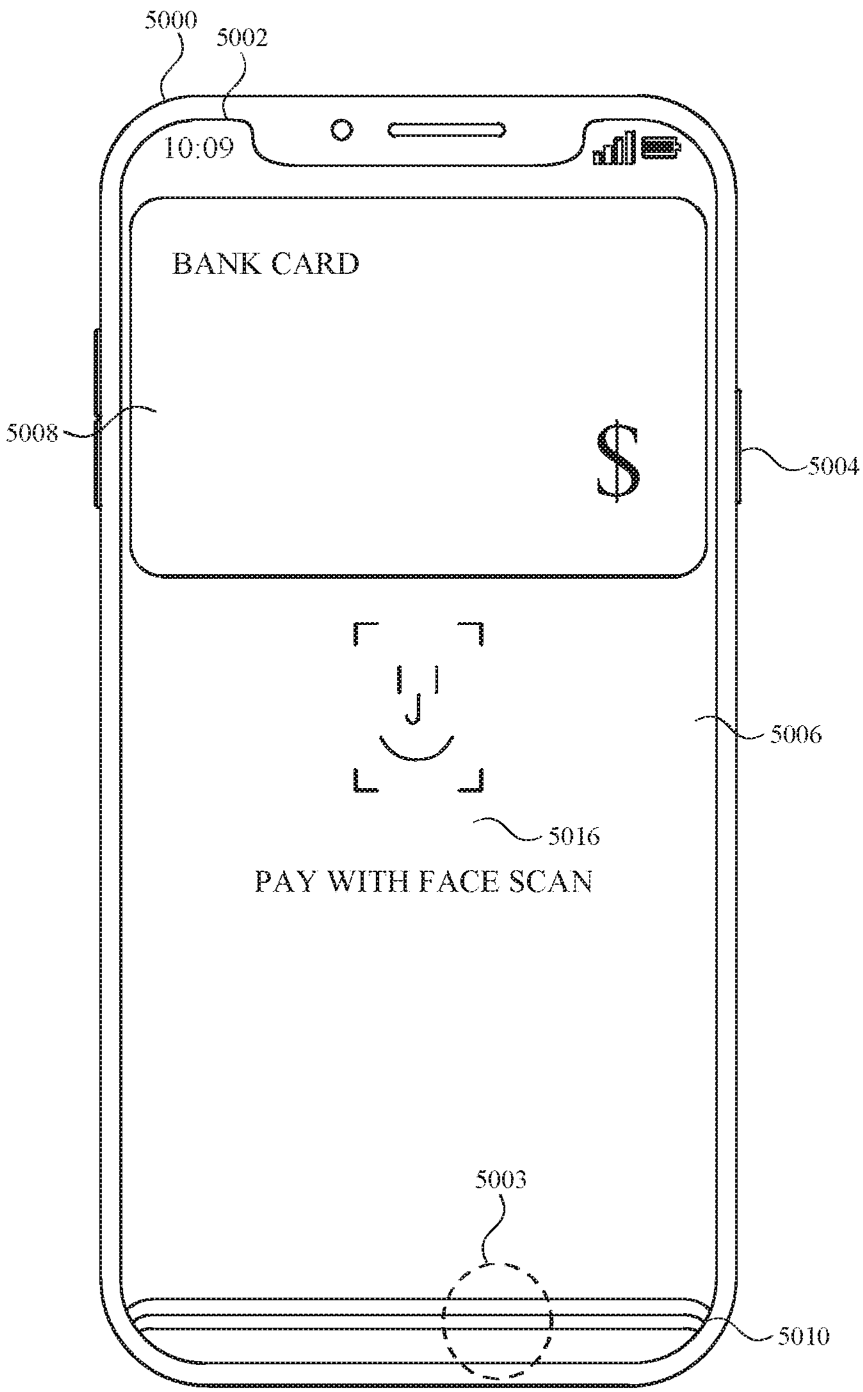

FIG. 50C illustrates electronic device 5000 displaying, on display 5002, transfer user interface 5006 of the transfer application with a third-party transfer account selected for use (as indicated by representation 5008 of the third-party transfer account being shown in the top portion of the user interface associated with showing the currently-selected transfer account) in a transfer operation (e.g., a transaction, a payment) and showing authentication request 5016 for authenticating the third-party transfer account for use in the transfer operation. Transfer user interface 5006 also includes available accounts stack 5010 corresponding to (portions of) representations of other accounts (e.g., the first-party transfer account, a different third-party transfer account, a points account, a loyalty card, an identification card) corresponding to other accounts and/or cards provisioned on electronic device 5000. In FIG. 50C, while displaying transfer user interface 5006, electronic device 5000 detects (e.g., via a touch-sensitive surface of display 5002) an activation 5003 (e.g., a touch input) of available accounts stack 5010.

Figure 50D:
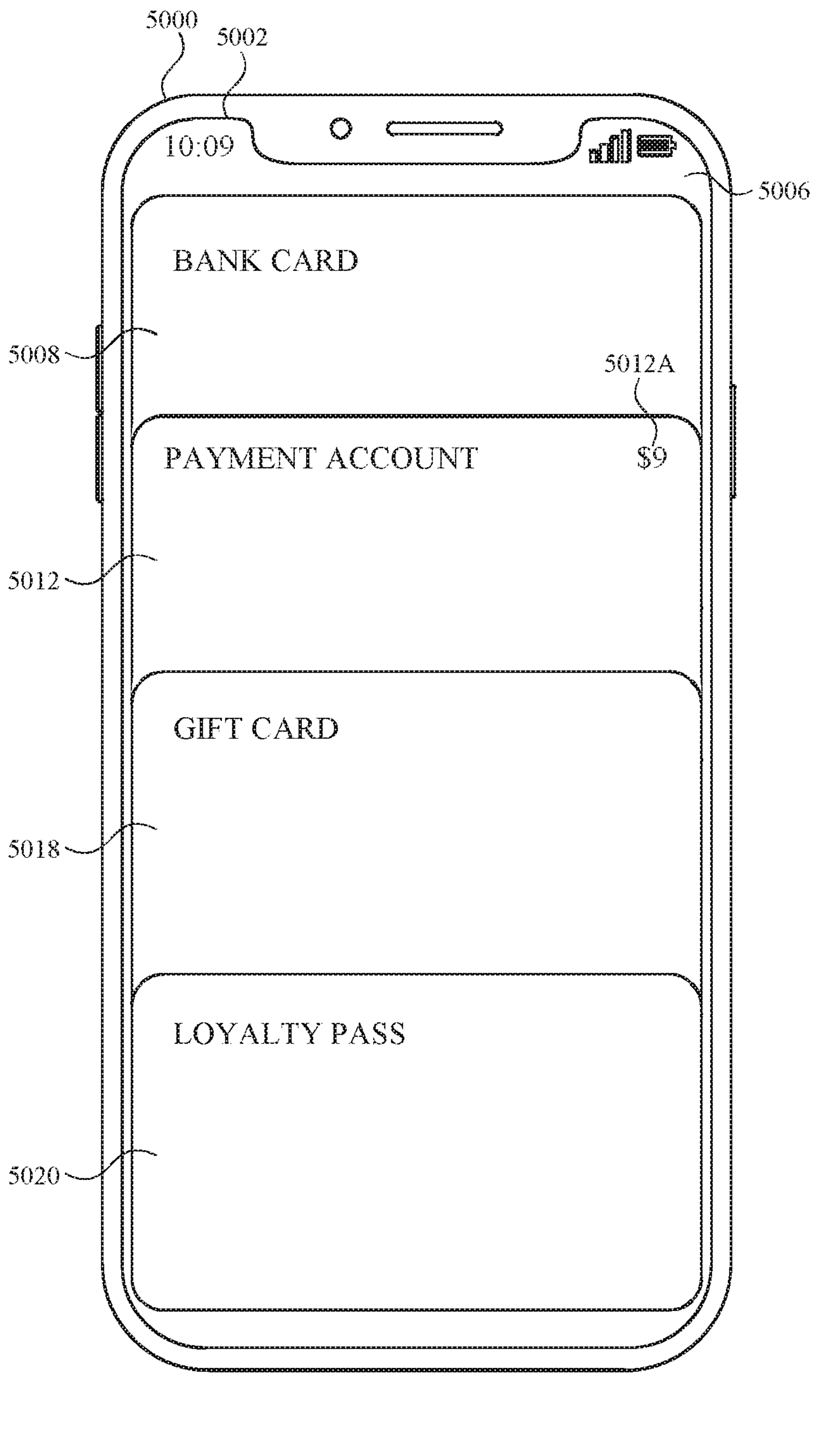

In FIG. 50D, in response to detecting selection 5003, electronic device 5000 displays, in transfer user interface 5006, a plurality of representations corresponding to accounts and/or cards provisioned on electronic device 5000 (e.g., representation 5008 corresponding to the third-party transfer account, representation 5012 corresponding to the first-party transfer account, representation 5018 corresponding to a gift card, representation 5020 corresponding to a loyalty pass account). As shown in FIG. 50D, representation 5012 of the first-party transfer account includes a balance indication 5012A showing the current balance (e.g., available points, available credits, available resources, available funds) of the account (e.g., $9). In the example of FIGS. 50C-50I, the current balance of the first-party transfer account (e.g., $9) is lower than the current balance of the first-party transfer account of the example of FIGS. 50A-50B (e.g., $11). In some embodiments, only representation 5012 includes a balance indication.

Figure 50E:
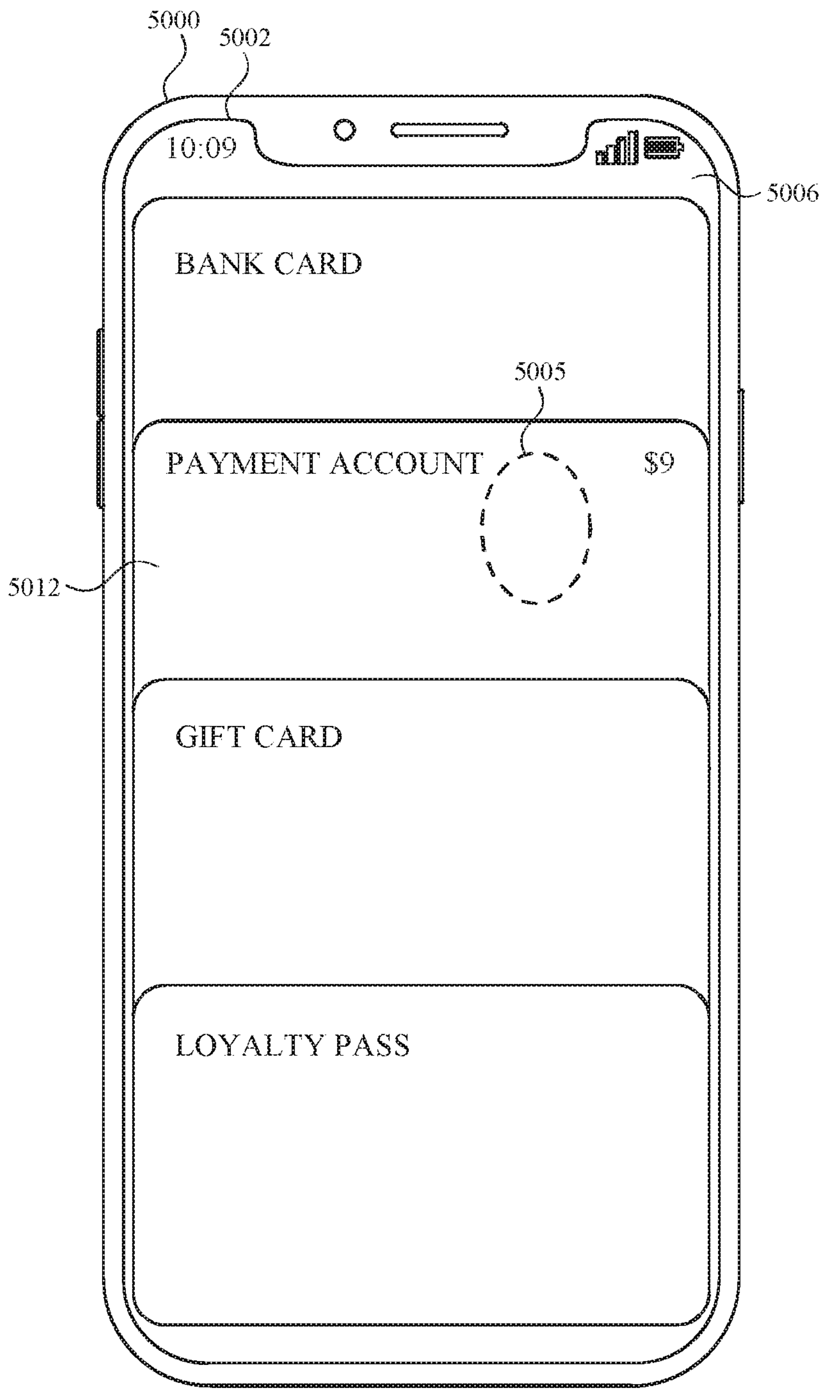

In FIG. 50E, while displaying the plurality of representations corresponding to accounts and/or cards provisioned on electronic device 5000, electronic device 5000 detects a selection 5005 (e.g., a touch input) of representation 5008 of the first-party transfer account (e.g., where the first-party transfer account has a balance of $9). In some embodiments, in response to detecting selection 5005, electronic device 5000 replaces representation 5008 of the third-party transfer account in the top portion of transfer user interface 5006 with representation 5012 of the first-party transfer account (thereby indicating that the first-party transfer account is now selected for use in a transfer operation, such as a transaction or payment). In some embodiments, while the first-party transfer account is selected for use in a transfer operation, electronic device 5000 requests authentication (e.g., via authentication request 5016) of the first-party transfer account for use in a transfer operation.

Figure 50F:
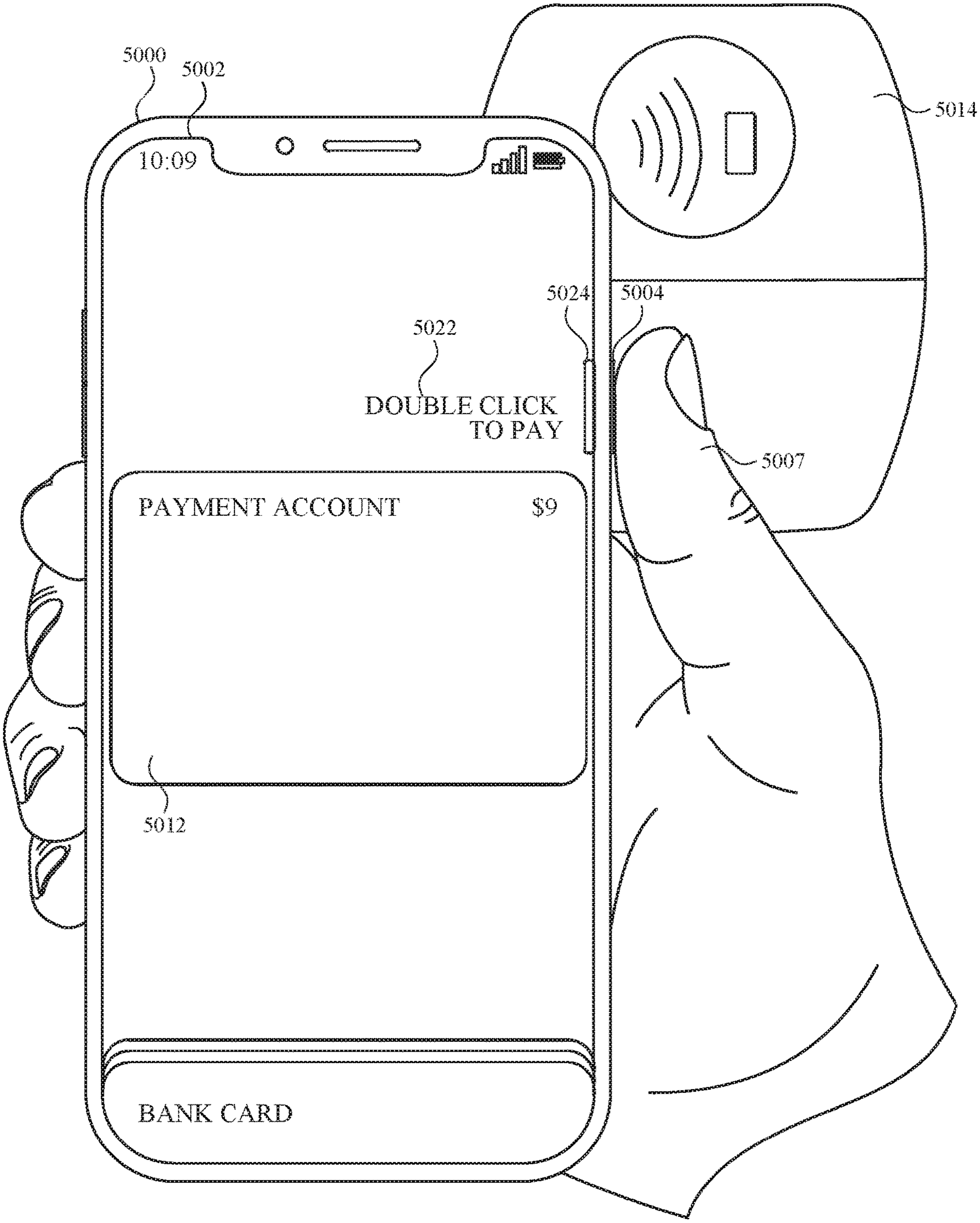

In FIG. 50F, after detecting selection 5005 of representation 5012 of the first-party transfer account (e.g., and after receiving authentication, such as facial recognition authentication, fingerprint authentication, or passcode authentication, for authorizing the use of the first-party transfer account in a transfer operation), electronic device 5000 detects (e.g., via a wireless communication radio of the device) the presence of a field generated by a transaction terminal 5014 (e.g., a contactless payment terminal) involved in the transfer operation (of a particular transfer amount, such as a particular payment amount). In some embodiments, prior to detecting the presence of the field generated by transaction terminal 5014, electronic device 5000 displays, in transfer user interface 5006, an indication (e.g., stating "Hold Near Reader") that the user place electronic device 5000 within range of a field generated by a transaction terminal.

As also shown in FIG. 50F, in response to (and while) detecting the presence of the field generated by transaction terminal 5014, electronic device 5000 displays, in transfer user interface 5006, representation 5012 of the first-party transfer account in a middle portion of the user interface (e.g., a transfer-ready portion of the user interface). Electronic device 5000 further displays (while continuing to detect the presence of the field generated by transaction terminal 5014), in transfer user interface 5006, an input request 5022 (e.g., stating "Double Click to Pay") requesting a particular type of input be made in order to proceed with the transfer operation with transaction terminal 5014. In some embodiments, the particular type of input requested by electronic device 5000 is a double-click of mechanical input device 5004. In some embodiments, electronic device 5000 further displays, in transfer user interface 5006, a graphical indication 5024 (e.g., an animation comprising a rectangular-shaped object oscillating between becoming wider and narrower) highlighting the input device (e.g., mechanical input device 5004) on which the particular type of input must be made. In this example, graphical indication 5024 is displayed adjacent to the input device (e.g., mechanical input device 5004). In FIG. 50F, electronic device 5000 detects an activation 5007 on mechanical input device 5004 (corresponding to the particular type of input requested by input request 5022) to proceed with the transfer operation.

In response to detecting activation 5007 of mechanical input device 5004, electronic device 5000 determines whether the balance of first-party transfer account (e.g., $9) is sufficient to cover the requested transfer amount (e.g., a requested payment amount, received from transaction terminal 5014) of the transfer operation (e.g., whether the requested transfer amount is not more than $9, and thus the balance of $9 is sufficient, or the requested transfer amount is more than $9, and thus the balance is insufficient).

Figure 50G:
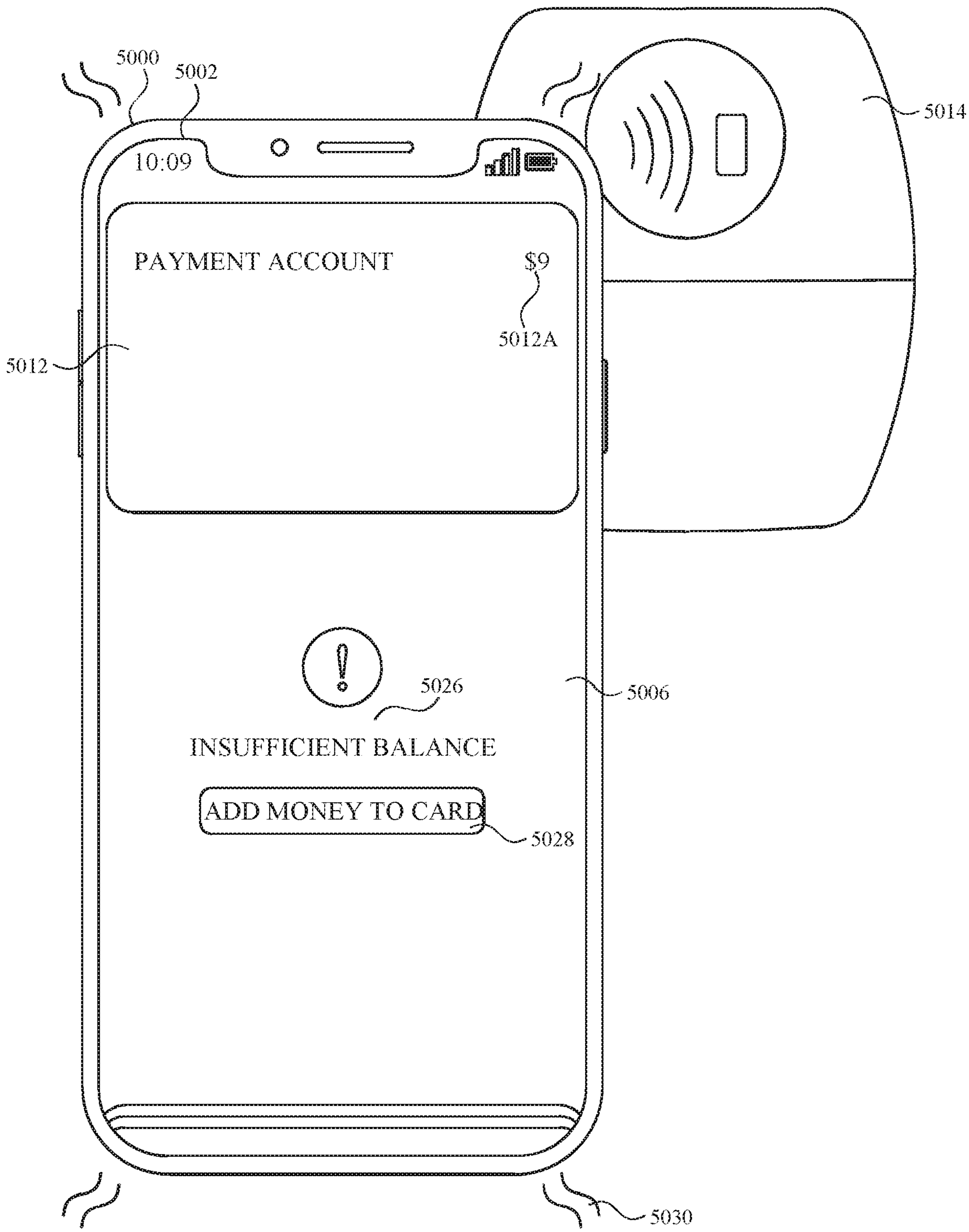

In FIG. 50G, in accordance with a determination (by electronic device 5000) that the balance of the first-party transfer account (e.g., $9, as indicated by balance indication 5012A of representation 5012 of the first-party transfer account) is insufficient for the transfer amount requested by transaction terminal 5014 for the transfer operation, electronic device 5000 displays, in transfer user interface 5006, an insufficient balance notification 5026 indicating that the current balance of the first-party transfer account is insufficient for the transfer operation. In some embodiments, insufficient balance notification 5026 includes a textual indication (e.g., stating "Insufficient Balance") and/or a graphical indication (e.g., including an exclamation mark) that the balance of the first-party transfer account is insufficient. Electronic device 5000 also displays, in transfer user interface 5006, an add balance affordance 5028 (e.g., stating "Add Money to Card") for increasing the balance of (e.g., by adding points, resources, or funds) to the first-party transfer account. In some embodiments, in addition to displaying insufficient balance notification 5026, electronic device 5000 generates tactile outputs 5030 (e.g., using a haptic feedback module and controller of electronic device 5000) to alert the user of the device.

Figure 50H:
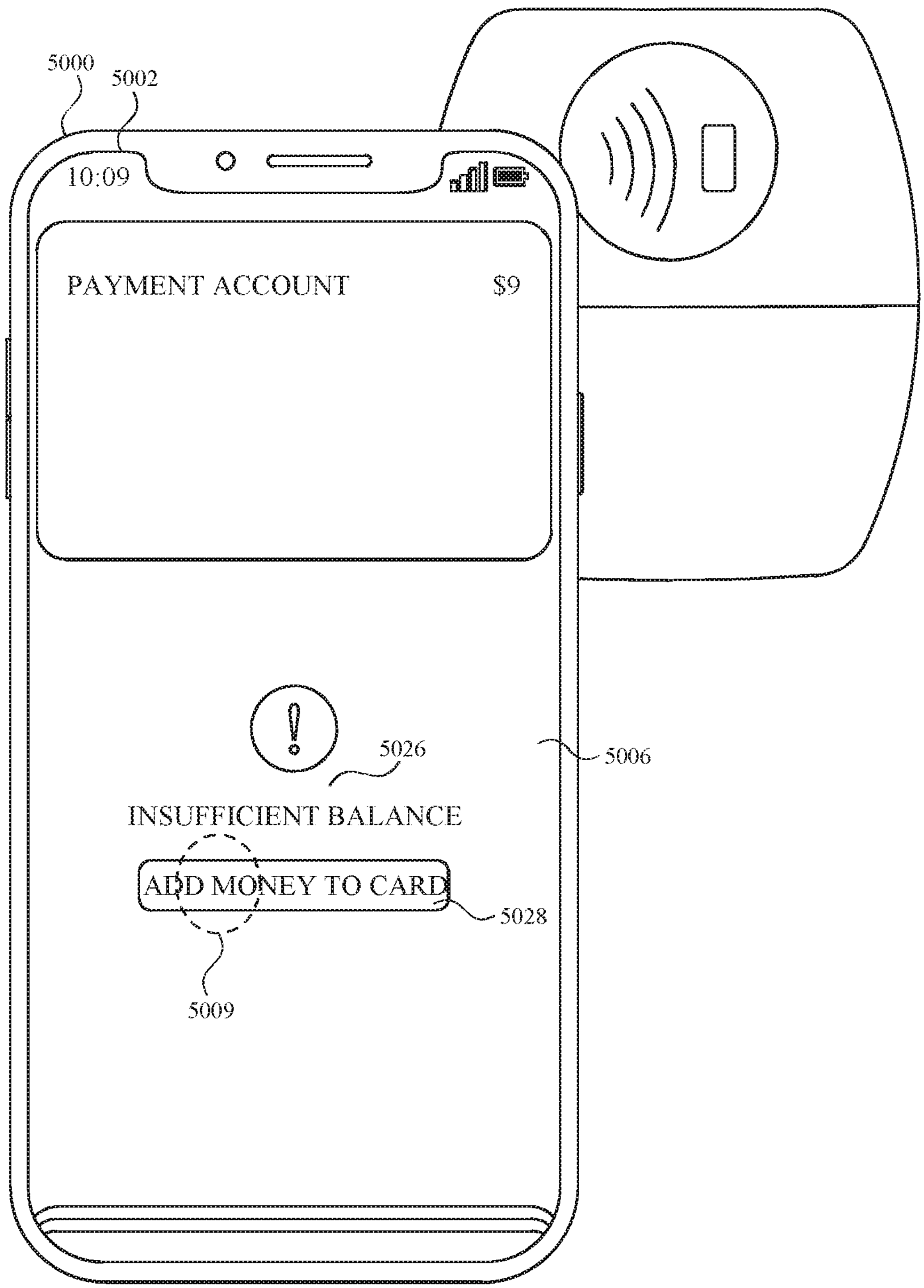

In FIG. 50H, while displaying, in transfer user interface 5006, insufficient balance notification 5026 and add balance affordance 5028, electronic device 5000 detects an activation 5009 (e.g., a touch input) of add balance affordance 5028.

Figure 50I:
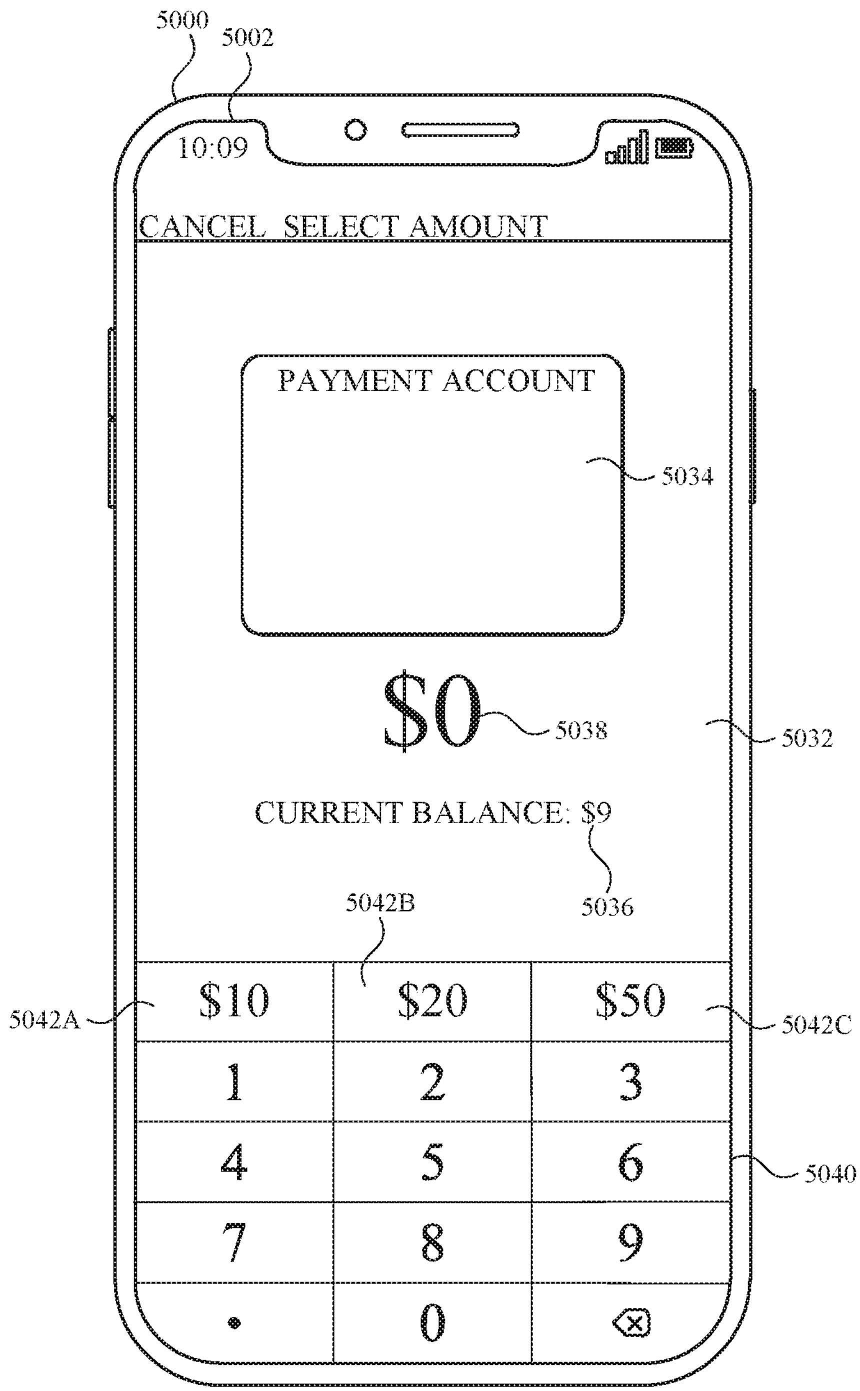

In FIG. 50I, in response to detecting activation 5009 of add balance affordance 5028, electronic device 5000 displays, on display 5002, an add balance user interface 5032 for adding balance to (e.g., by adding points, resources, or funds) the first-party transfer account. In some embodiments, add balance user interface 5032 includes an indication 5034 (e.g., corresponding to representation 5012 of the first-party transfer account) that add balance user interface 5032 is currently set to adjust the balance of the first-party transfer account. In some embodiments, add balance user interface 5032 includes a current balance indication 5036 corresponding to the current balance of the first-party transfer account. In some embodiments, add balance user interface 5032 includes an added balance indication 5038 corresponding to the balance (e.g., of points, resources, of funds) to be added to the current balance of the first-party transfer account. In some embodiments, add balance user interface 5032 includes numerical pad 5040 for entering new balance (e.g., of points, resources, or funds) to be added to the current balance of the first-party transfer account. In some embodiments, numerical pad 5040 includes a plurality of amount recommendations (e.g., recommendation 5042A of $10, recommendation 5042B of $20, recommendation 5042C of $50) to be added to the current balance of the first-party transfer account. Thus, if the current balance of the first-party transfer account is insufficient to perform a particular transfer operation (e.g., because the current balance is less than a transfer amount or a payment amount requested by transaction terminal 5014 for a particular transfer operation, such as a payment) the user of electronic device 5000 can quickly and easily add balance to the first-party transfer account via add balance user interface 5032. In some embodiments, add balance user interface 5032 includes a cancel affordance 5044 for leaving the add balance user interface 5032 (and returning to transfer user interface 5006) without adding new balance to the first-party transfer account.

Figure 50J:
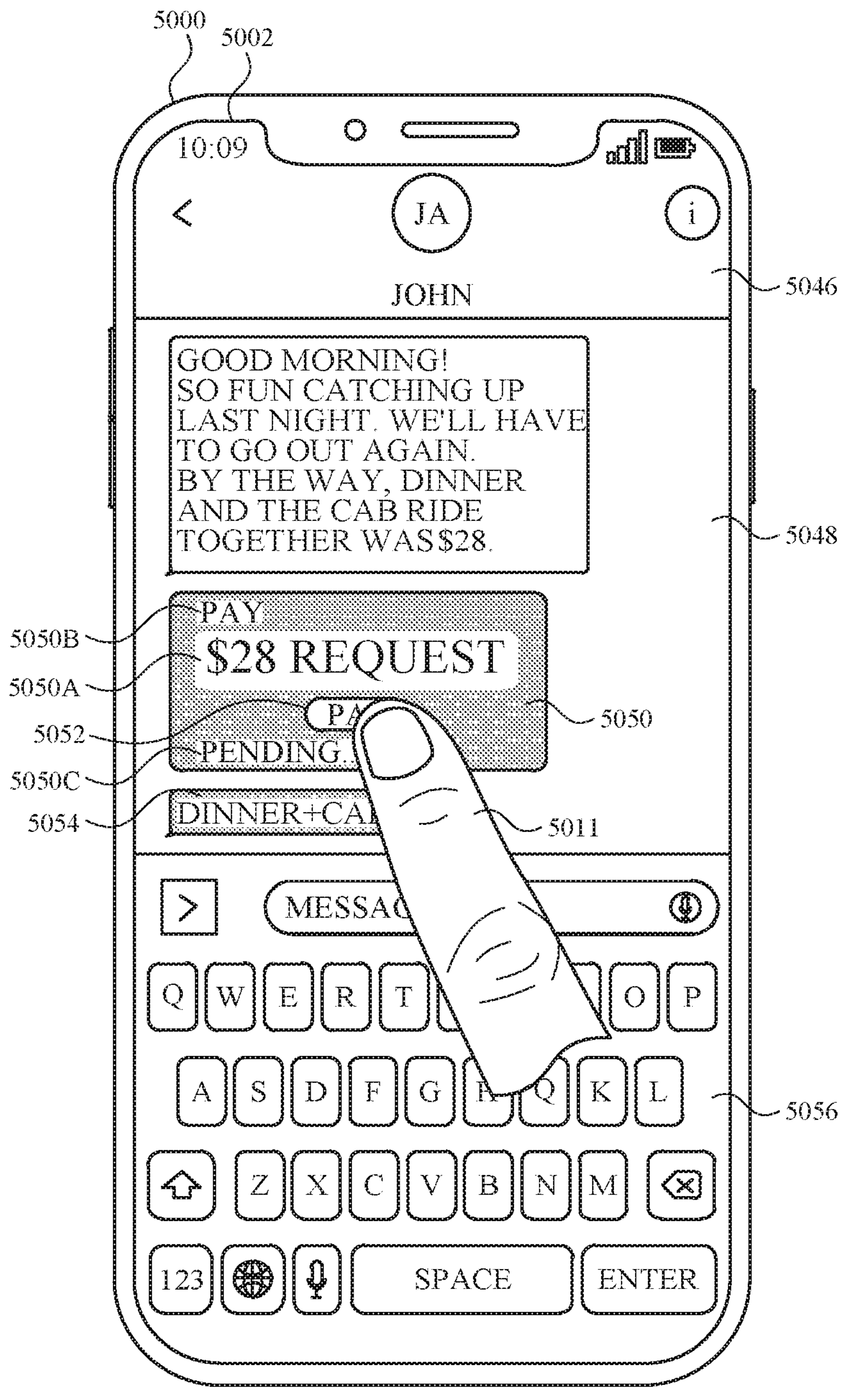

FIG. 50J illustrates electronic device 5000 displaying, on display 5002, a messaging user interface 5046 of a messaging application (e.g., a text messaging application, a chat application) and a virtual keyboard 5056 for inputting messages to be transmitted via the messaging application. In FIG. 50J, electronic device 5000 is displaying, in messaging user interface 5046, a message conversation 5048 between the user of electronic device 5000 and a first message participant (e.g., named "John"). As shown in FIG. 50J, message conversation 5048 includes a plurality of message objects corresponding to incoming messages from the first message participant, including a transfer message object 5050 (e.g., similar and corresponding to payment message object 1144 described above with reference to FIG. 11H) corresponding to a transfer request (e.g., of $28 in funds) made by the first message participant to the user via the messaging application.

In some embodiments (similar to payment request object 1144), transfer message object 5050 includes a transfer amount indication 5050A (e.g., stating "$28 Request") indicating that the message object relates to a transfer request made by the first message participant, a mode indication 5050B (e.g., stating "PAY") that transfer message object 5050 corresponds to a transfer request made via an operating-system controlled transfer application (and not by a third-party transfer application), and a status indicator 5050C indicating the status of the transfer request (e.g., "Pending," "Paid," "Expired"). In some embodiments, (similar to payment request object 1144), transfer message object 5050 includes an accept affordance 5052 for accepting the transfer request (e.g., agreeing to pay the requested amount of the payment request, $28, to the first message participant). In some embodiments, message conversation 5048 also includes a note message object 5054 corresponding to a comment received from the first message participant regarding the payment request (e.g., stating a reason for making the payment request).

Figure 50K:
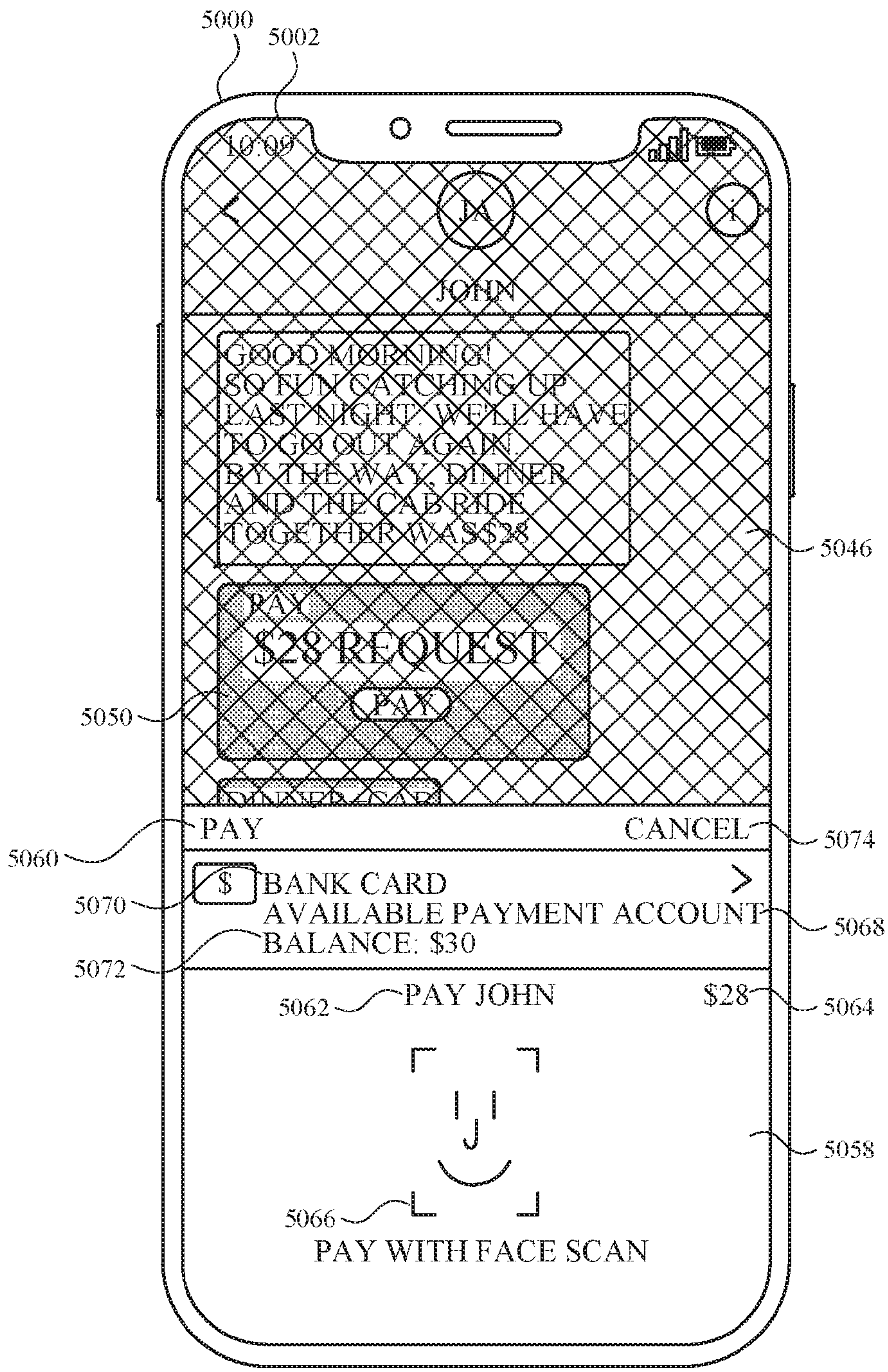

In FIG. 50J, electronic device 500 detects an activation 5011 (e.g., a touch input) of accept affordance 5052 of transfer message object 5050. In FIG. 50K, in response to detecting activation 5011, electronic device 5000 displays, on display 5002 (e.g., over virtual keyboard 5056, over a portion of messaging user interface 5046), a transfer sheet 5058 (e.g., a payment sheet) for performing a transfer operation corresponding to the requested transfer amount from transfer message object 5050. In some embodiments, transfer sheet 5058 is displayed in response to detecting a pay affordance (or detecting activation of the pay affordance) of a checkout page of an application (e.g., for purchasing one or more items via the application). In some embodiments, at least a portion of messaging user interface 5046 is still shown after displaying transfer sheet 5058. In some embodiments, the portion of messaging user interface 5046 that is still shown is shaded (e.g., darkened, faded out), thereby visually emphasizing the transfer sheet while indicating that the transfer operation to be performed via the transfer sheet relates to the portion of the user interface that is still being shown (e.g., transfer message object 5050 of messaging user interface).

In some embodiments, as illustrated in FIG. 50K, transfer sheet 5058 includes a mode indication 5060 (e.g., stating "PAY," corresponding to mode indication 5050B) that transfer sheet 5058 corresponds to an operating-system controlled transfer application (and not a third-party transfer application). In some embodiments, transfer sheet 5058 includes a recipient indication 5062 (e.g., John) indicating a recipient of the current transfer operation (e.g., payment). In some embodiments, the recipient (as indicated by recipient indication 5062) corresponds to the message recipient associated with transfer message object 5050 from which transfer sheet 5058 was activated. In some embodiments, transfer sheet 5058 includes a transfer amount indication 5064 (e.g., $28). In some embodiments, the transfer amount (as indicated by transfer amount indication 5064) corresponds to the requested transfer amount from transfer message object 5050 from which transfer sheet 5058 was activated. In some embodiments, transfer sheet 5058 includes an authentication request 5066 indicating that authentication (e.g., biometric authentication, such as facial recognition authentication, fingerprint authentication, iris/retina scan authentication; passcode authentication) is required to proceed with the current transfer operation (e.g., payment of $28 to John). In some embodiments, transfer sheet 5058 includes a cancel affordance 5074 for ceasing display of transfer sheet 5058 (without proceeding with the transfer operation).

In some embodiments, transfer sheet 5058 includes a current account region 5068 that includes a current account indication 5070 showing the transfer account that is currently selected account for use in the transfer operation. In some embodiments, if the currently-selected account is not the first-party transfer account (corresponding to representation 5012) and the balance of the first-party transfer account is sufficient to perform the current transfer operation (e.g., is at least $28, and thus is sufficient to be used in a payment of $28), electronic device 5000 displays, in current account region 5068 (e.g., below current account indication 5070) a sufficient balance notification 5072 (which includes an indication of the current balance of the first-party transfer account) indicating that the first-party payment account has sufficient balance to be used, and thus can be used, in the current transfer operation (e.g., a payment of $28).

Figure 50L:
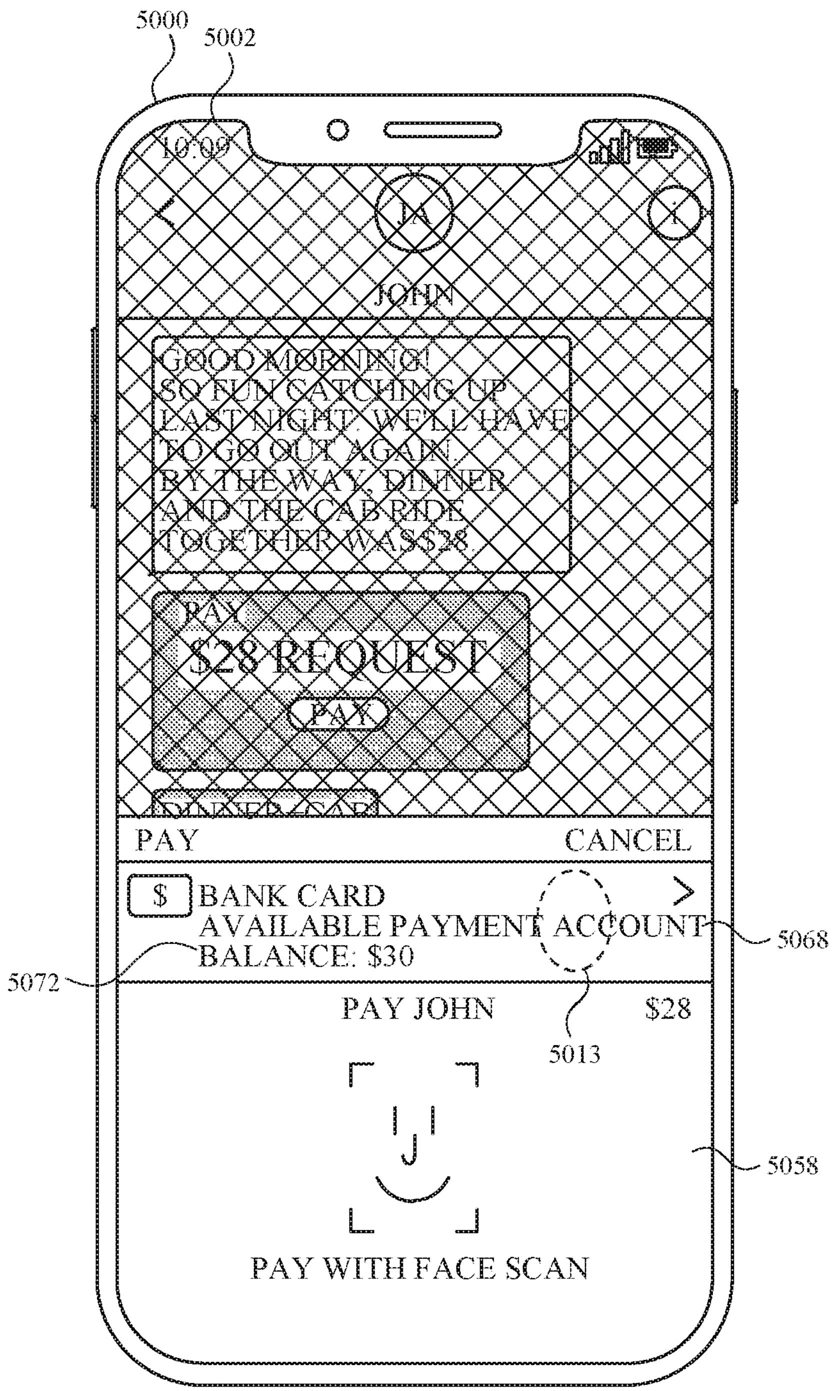

In FIG. 50L, while displaying current account region 5068 of transfer sheet 5058 with sufficient balance notification 5072, electronic device 5000 detects an activation 5013 (e.g., a touch input) on current account region 5068 (or on an indicated selectable area of current account region 5068).

Figure 50M:
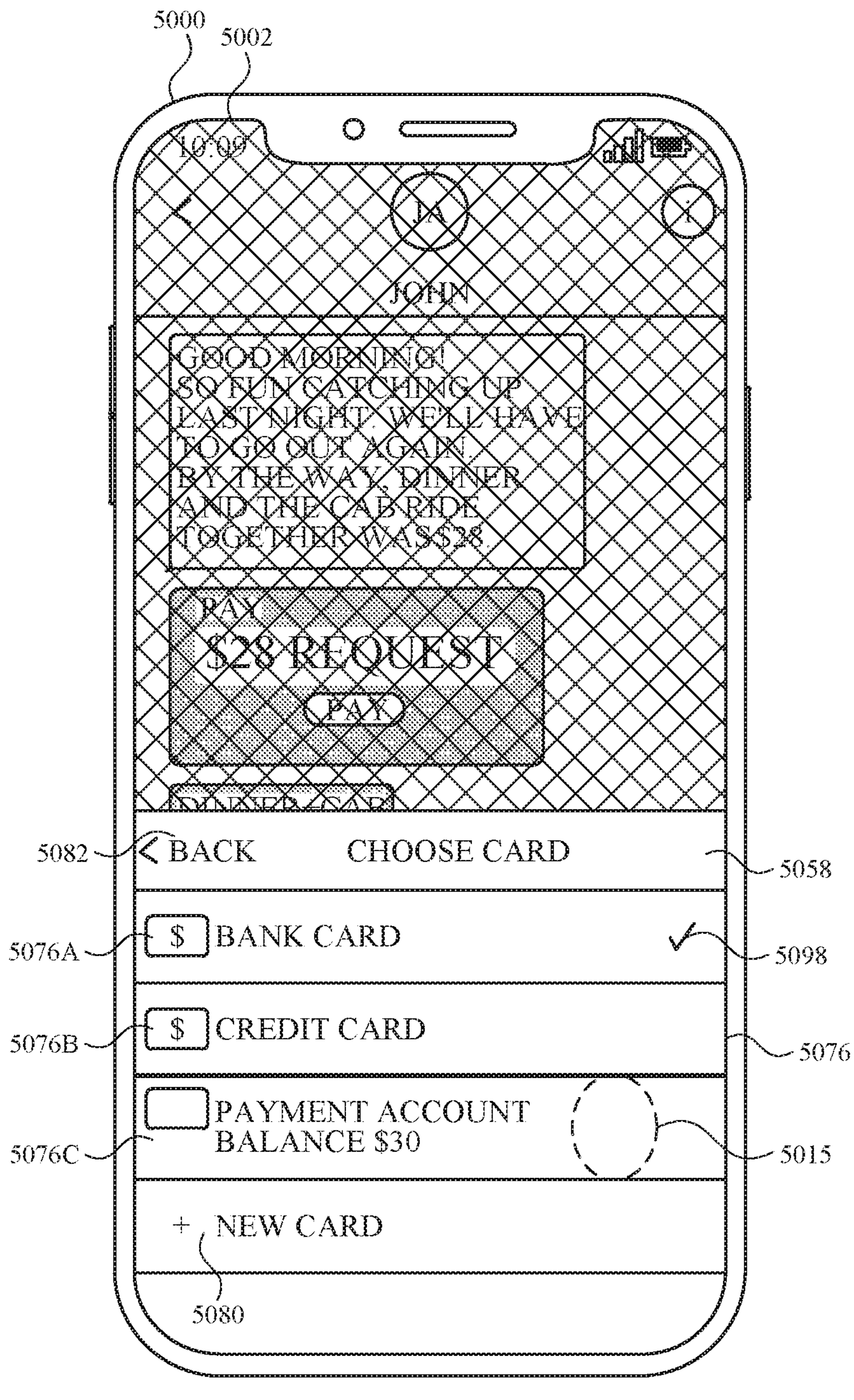

In FIG. 50M, in response to detecting activation 5013 of current account region 5068 (while a third-party transfer account is set as the current transfer account and sufficient balance notification 5072 is displayed in current account region 5068), electronic device 5000 displays, in transfer sheet 5058, a plurality of accounts 5076 (e.g., including account 5076A corresponding to the currently-selected third-party transfer account, account 5076B corresponding to a credit account, such as a credit card, account 5076C corresponding to the first-party transfer account, and showing the current balance (e.g., 30) of the first-party transfer account) provisioned on electronic device 5000. In some embodiments, electronic device 5000 displays a current account indication 5078 showing which account of plurality of accounts 5076 corresponds to the currently-selected account (e.g., account 5076A). In some embodiments, electronic device 5000 also displays a back affordance 5082 for ceasing display of plurality of accounts 5076 and returning to the previous display of transfer sheet 5058 (as shown in FIG. 50K). In some embodiments, electronic device 5000 also displays (e.g., below account 5076C corresponding to the first-party transfer account) an add new account affordance 5080 for provisioning a new account on electronic device 5000.

In FIG. 50M, while displaying plurality of accounts 5076 (e.g., 5076A-5076C) in transfer sheet 5058, electronic device 5000 detects a selection 5015 (e.g., a touch input) of account 5076C corresponding to the first-party transfer account.

Figure 50N:
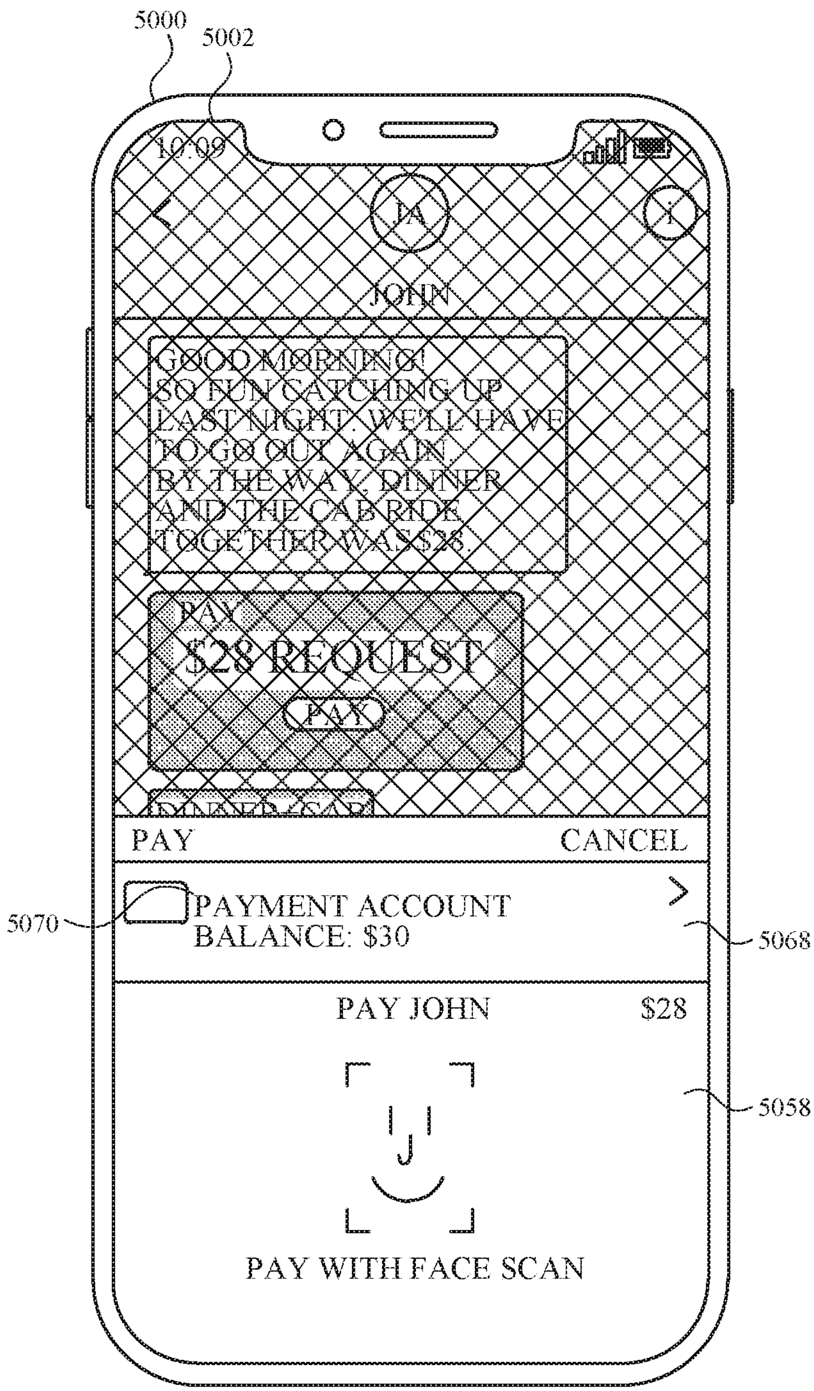

In FIG. 50N, in response to detecting selection 5015 of account 5076C corresponding to the first-party transfer account, electronic device 5000 ceases display of plurality of accounts 5076 in transfer sheet 5058 and returns to the previous display of transfer sheet 5058 (as shown in FIG. 50K). Further, electronic device 5000 shows, in current account indication 5070 of current account region 5068, that the first-party transfer account is now selected for use in the transfer operation (instead of the third-party transfer account that was previously selected for use in the transfer operation, as shown in FIG. 50K). Thus, the user of electronic device 5000 can now proceed with the transfer operation (e.g., making a payment of $28 to the first message recipient, John, via the messaging application) using the first-party transfer account.

Figure 50O:
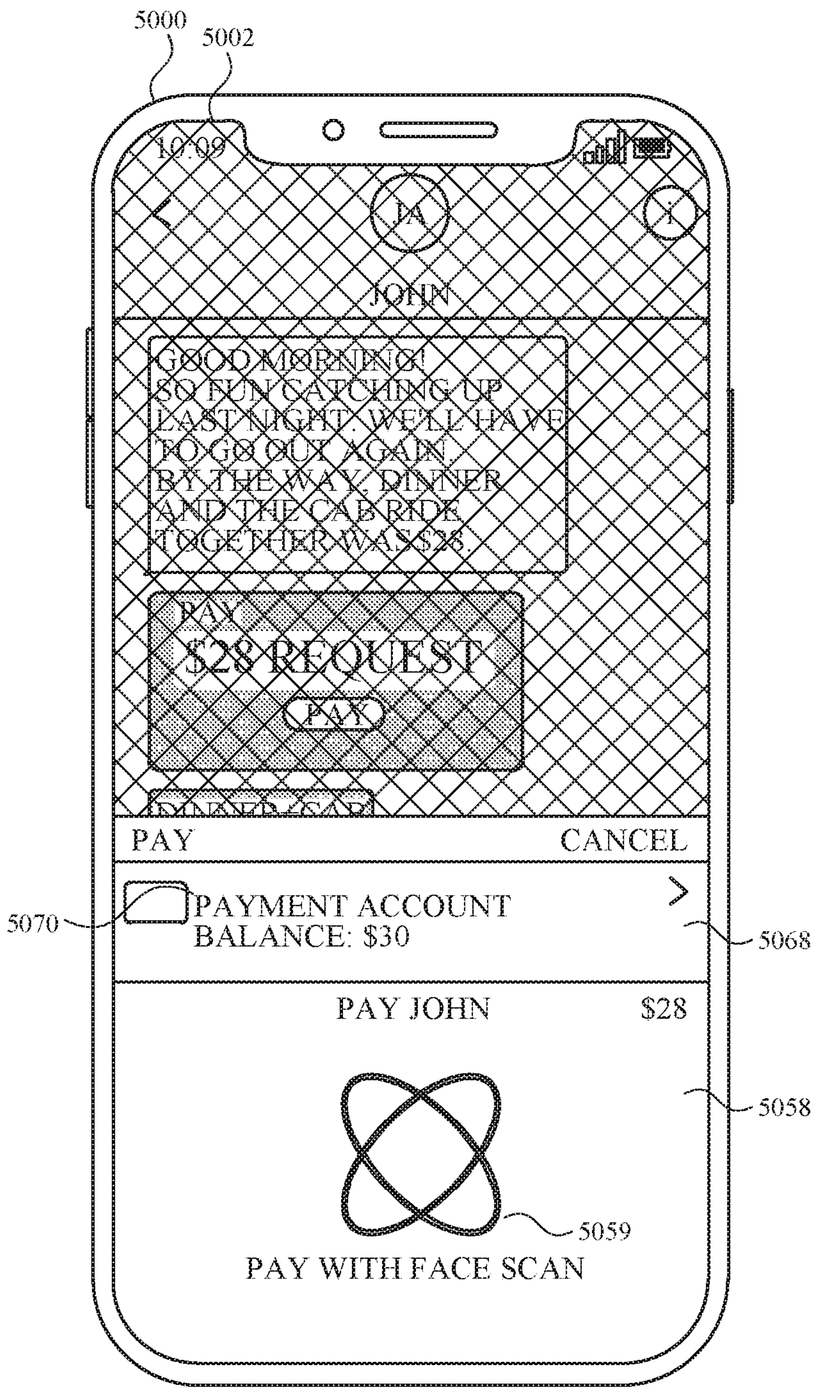

In FIG. 50O, while displaying transfer sheet 5058 (with the first-party transfer account currently selected for use in the transfer operation, as indicated by current account indication 5070 of current account region 5068), electronic device 5000 receives (e.g., via one or more input devices, such as a camera and/or a depth sensor) biometric information of the user (e.g., facial features information) for authenticating the first-party transfer account for use in the transfer operation. In some embodiments, during the authentication process, electronic device 5000 displays, in transfer sheet 5058, a graphical indication 5059 that the device is performing the authentication based on the received biometric information.

Figure 50P:
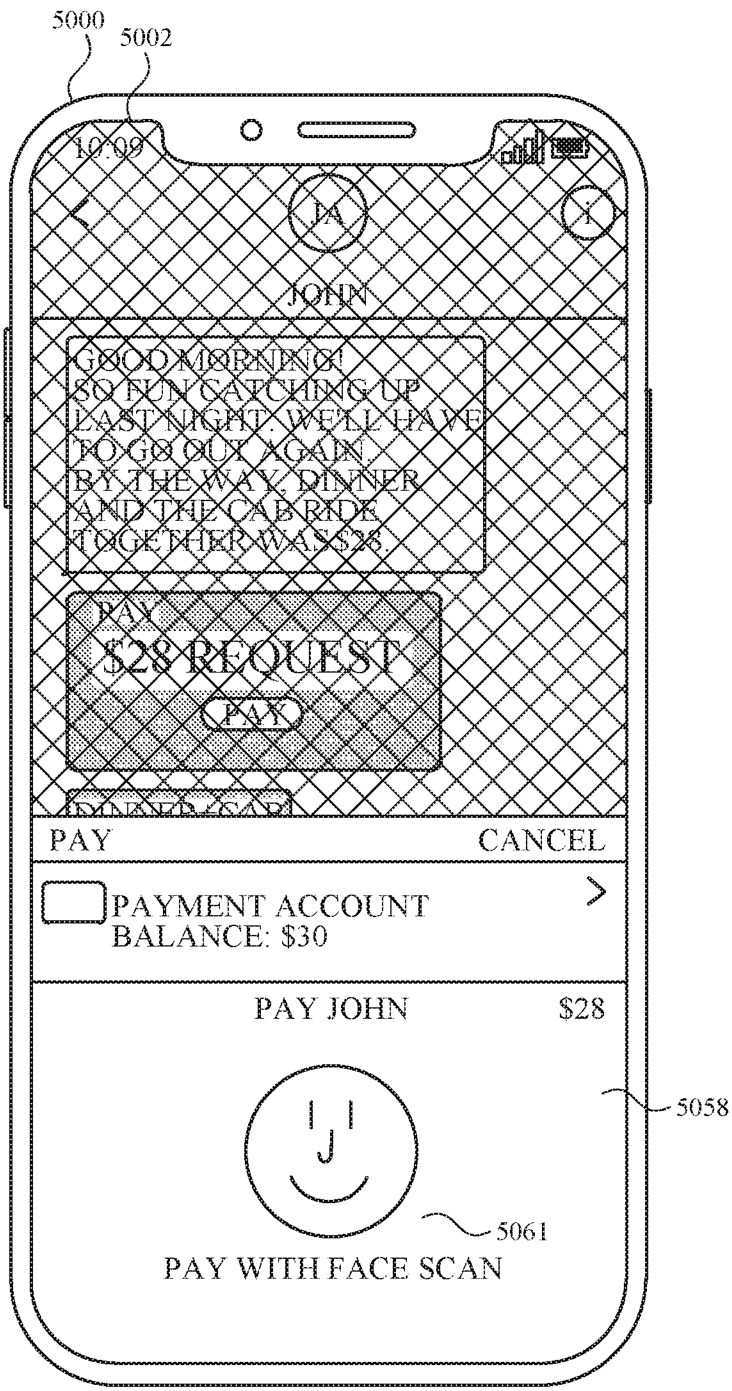

In FIG. 50P, in accordance with the determination that authentication was successful (e.g., because the received biometric information was consistent with biometric information enrolled on the device), electronic device 5000 displays, in transfer sheet 5058, a success indication 5061 (e.g., a graphical indication including a smiley-face) indicating that the authentication was successfully completed, and thus that the device can proceed with performing the transfer operation (e.g., a payment of $28 to the first message participant). In accordance with a determination that authentication was not successful (e.g., because the received biometric information was not consistent with biometric information enrolled on the device), electronic device 5000 displays, in transfer sheet 5058, a failure indication indicating that the authentication was not successfully completed, and thus that the device cannot proceed with performing the transfer operation.

Figure 50Q:
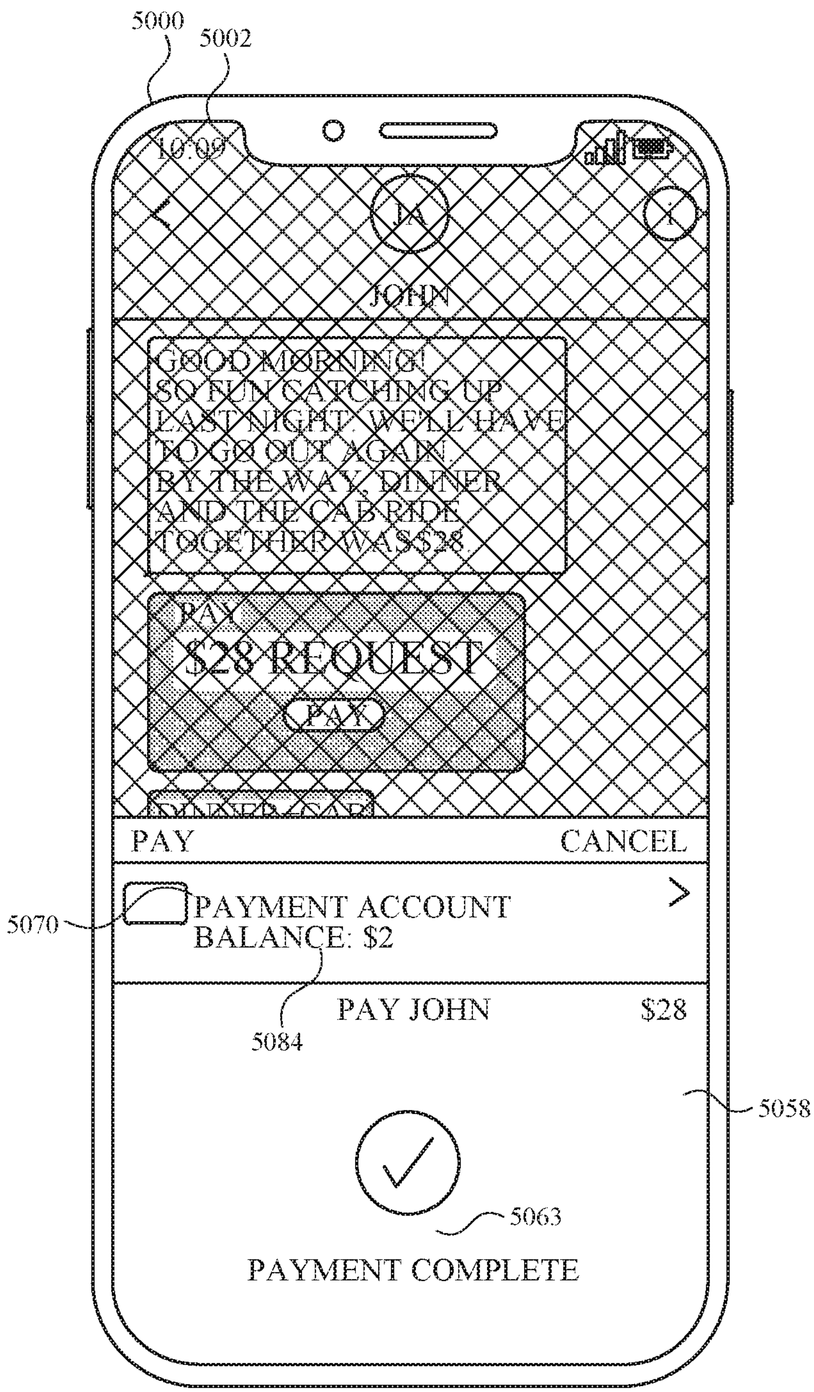

In FIG. 50Q, upon completing the transfer operation (e.g., a payment of $28 to the first message participant by transmitting payment credentials) using the first-party transfer account, electronic device 5000 displays, in transfer sheet 5058, a completion indication 5063 (e.g., a graphical indication including a checkmark, a text indication stating "Payment Successful") indicating that the transfer operation has successfully been completed. In some embodiments, electronic device 5000 further updates the display of a balance indication 5084 associated with current account indication 5070 in transfer sheet 5058 to reflect the remaining balance in the first-party transfer account after completion of the transfer operation (e.g., the balance is changed from $30 to $2 as a result of the $28 payment to the first message participant).

Figure 50R:
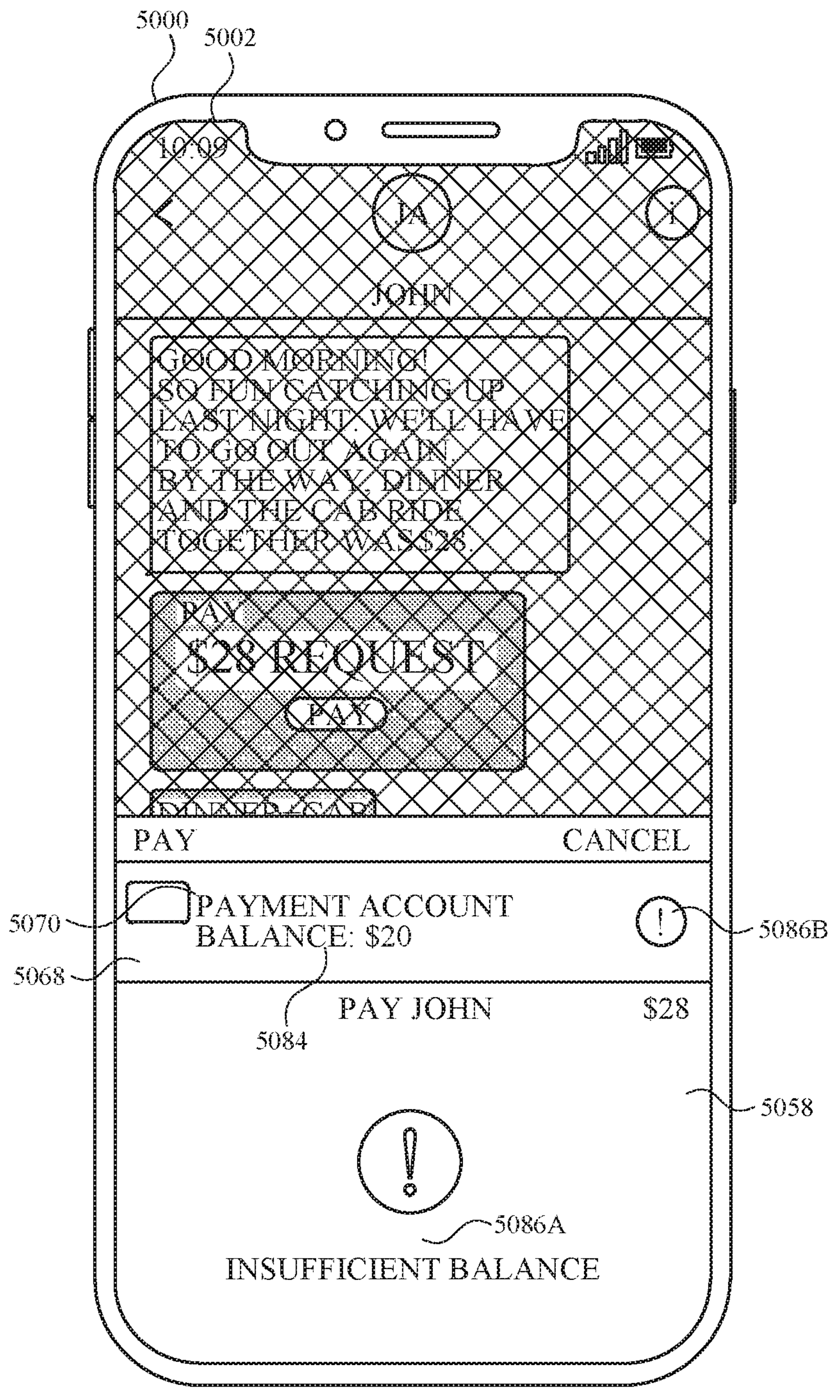

FIG. 50R illustrates electronic device 5000 displaying, on display 5002, transfer sheet 5058 with the first-party transfer account currently selected for use in a transfer operation (e.g., a payment of $28 to the first message recipient, John), as indicated by current account indication 5070 of current account region 5068. However, in FIG. 50R, the balance of the first-party transfer account (e.g., $20, as indicated by a balance indication 5084 shown in current account region 5068) is insufficient for the transfer operation (e.g., a payment of $28). Because the current balance of the first-party transfer account is insufficient, electronic device 5000 displays an insufficient balance notification 5086A (e.g., instead of/in place of authentication request 5066) that includes a text indication (e.g., stating "Insufficient Balance") and a graphical indication (e.g., including an exclamation mark) indicating that the current balance of the first-party transfer account is insufficient. In some embodiments, electronic device 5000 further displays (e.g., concurrent with 5086A) a second insufficient balance notification 5086B (e.g., a graphical indication including an exclamation mark) in current account region 5068 that further emphasizes that the current balance of the first-party transfer account is insufficient.

Figure 50S:
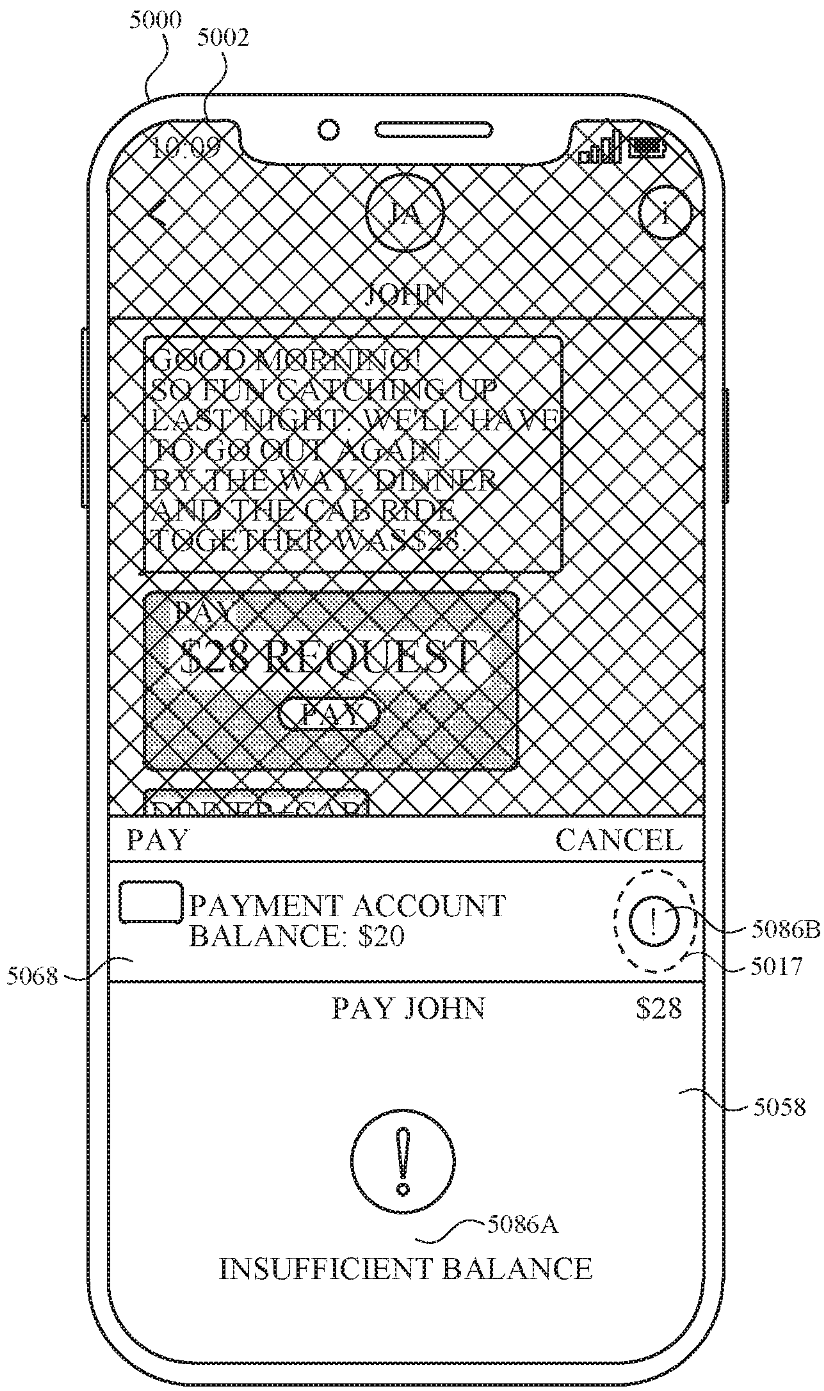

In FIG. 50S, while displaying insufficient balance notification 5086A and second insufficient balance notification 5086B in transfer sheet 5058 (with the first-party transfer account selected for use in the transfer operation), electronic device 5000 detects an activation 5017 (e.g., a touch input)

of second insufficient balance notification 5086B (or, alternatively, of insufficient balance notification 5086A or, alternatively, of current account region 5068).

Figure 50T:
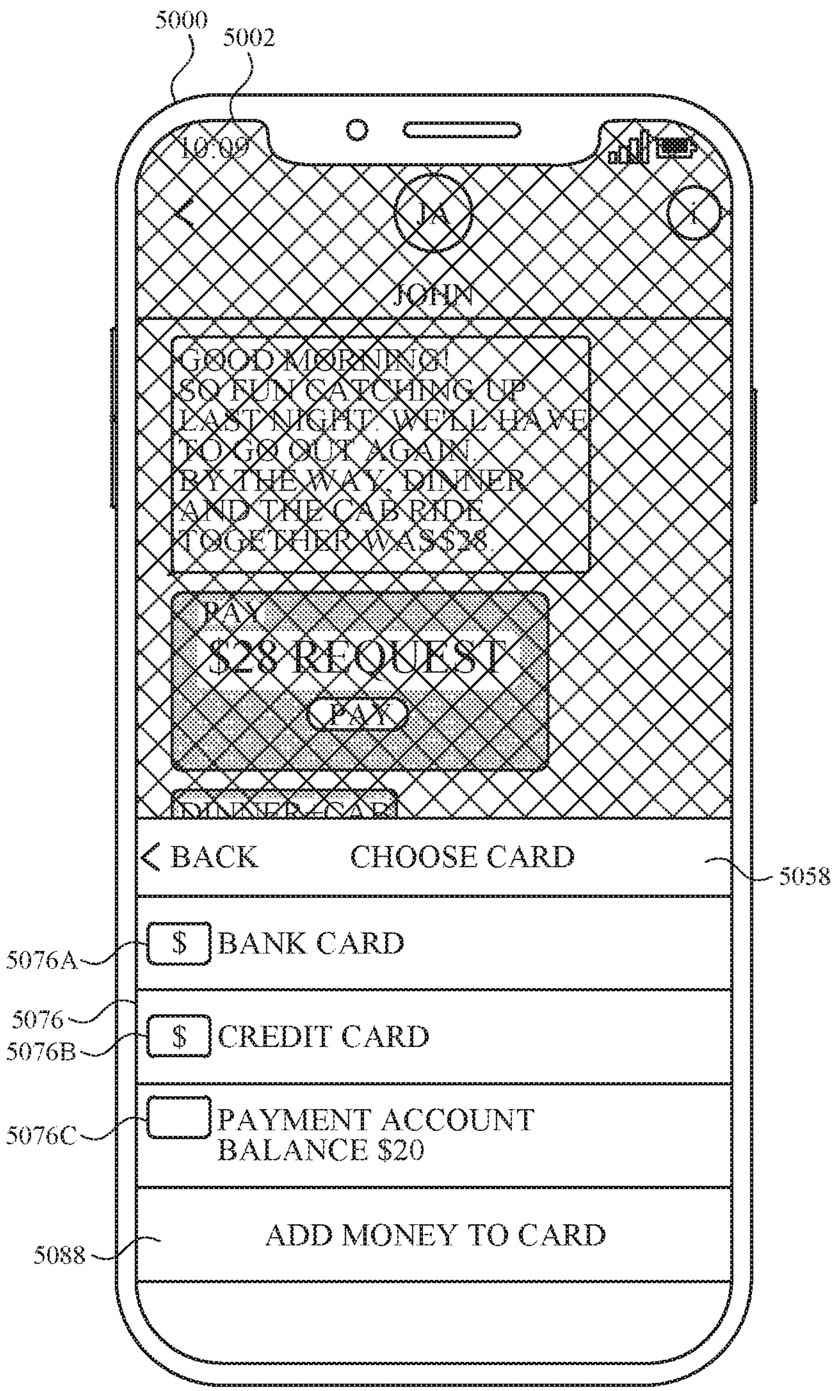

In FIG. 50T, in response to detecting activation 5017, electronic device 5000 displays, in transfer sheet 5058, plurality of accounts 5076, as first described above with reference to FIG. 50L (e.g., including account 5076A corresponding to the third-party transfer account, account 5076B corresponding to the credit account, and account 5076C corresponding to the first-party transfer account). Electronic device 5000 further displays (e.g., below account 5076C corresponding to the first-party transfer account) an add balance affordance 5088 (e.g., stating "Add Money to Card") for adding balance to the first-party transfer account.

Figure 50U:
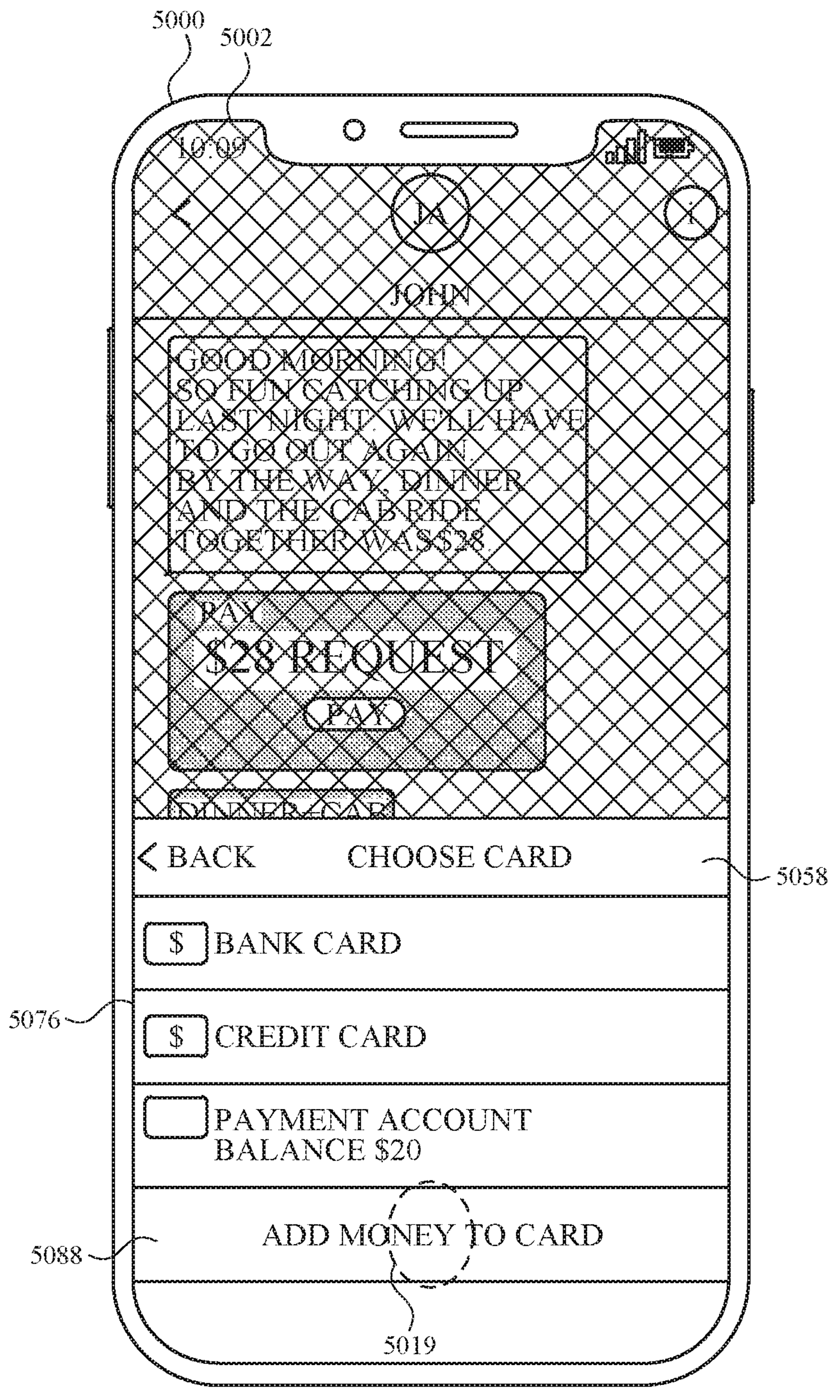

In FIG. 50U, while displaying transfer sheet 5058 showing plurality of accounts 5076, electronic device 5000 detects an activation 5019 (e.g., a touch input) of add balance affordance 5088.

Figure 50V:
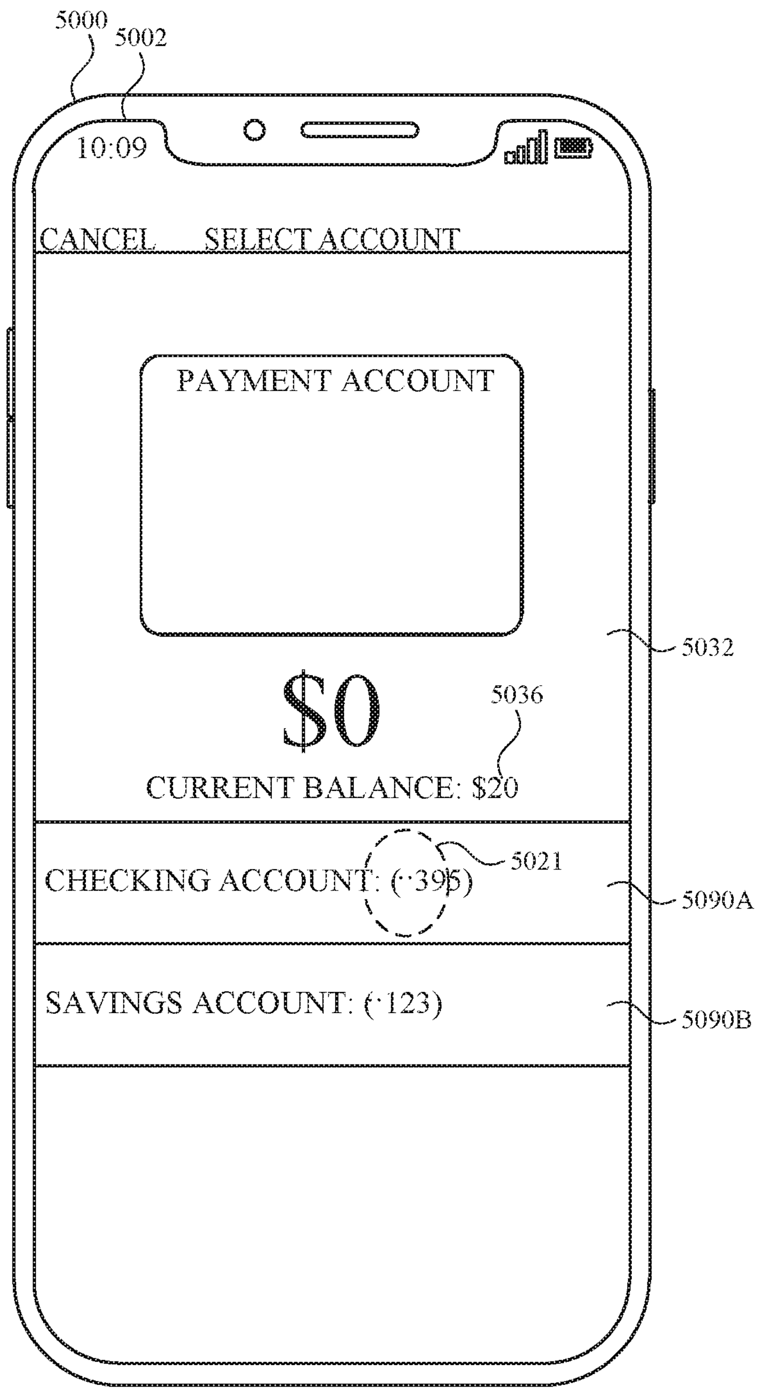

In FIG. 50V, in response to detecting activation 5019, electronic device 5000 displays, on display 5002, add balance user interface 5032 (as first described above with reference to FIG. 50I). Add balance user interface 5032 shows, in current balance indication 5036, the current balance (e.g., of points, resources, or funds) of the first-party transfer account (e.g., $20). In some embodiments, prior to displaying numerical pad 5040 for selecting the balance to be added, electronic device 5000 displays, in add balance user interface 5032, one or more source accounts (e.g., a source account 5090A corresponding to a stored-value account or a checking account, a source account 5090B corresponding to a savings account) from which the respective balance (e.g., of points, resources, funds) will be withdrawn to be added to the balance of the first-party transfer account. In FIG. 50V, electronic device 5000 detects a selection 5021 (e.g., a touch input) of source account 5090A (e.g., corresponding to a checking account).

Figure 50W:
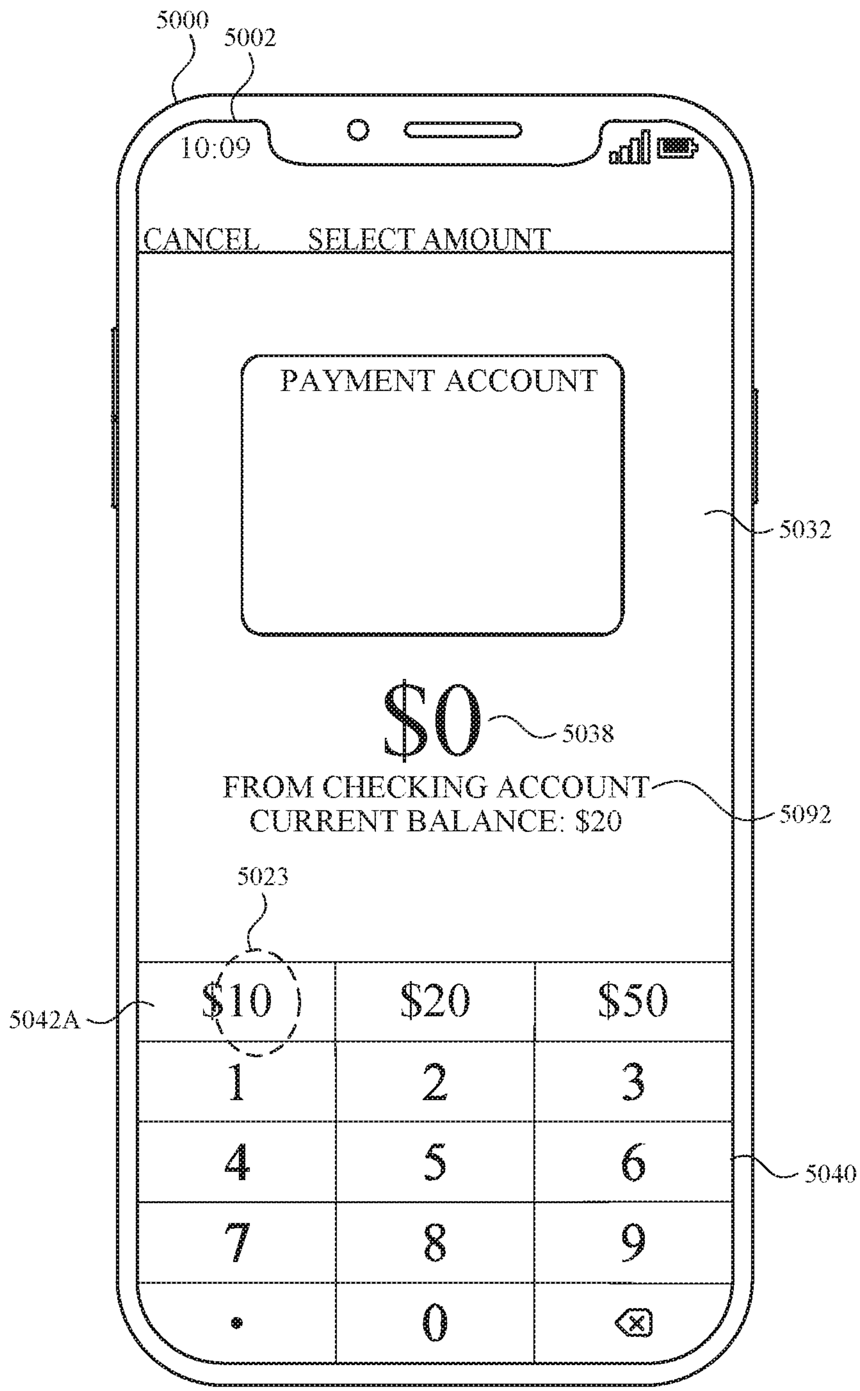

In FIG. 50W, in response to detecting selection 5021, electronic device 5000 displays, in add balance user interface 5032, a source account indication 5092 indicating the currently-selected source account (e.g., the checking account corresponding to account 5090A). Electronic device 5000 also displays, in add balance user interface 5032, numerical pad 5040. In FIG. 50W, while displaying add balance user interface 5032, electronic device 5000 detects a selection 5023 (e.g., a touch input) of amount recommendation 5042A (e.g., corresponding to $10) included in numerical pad 5040.

Figure 50X:
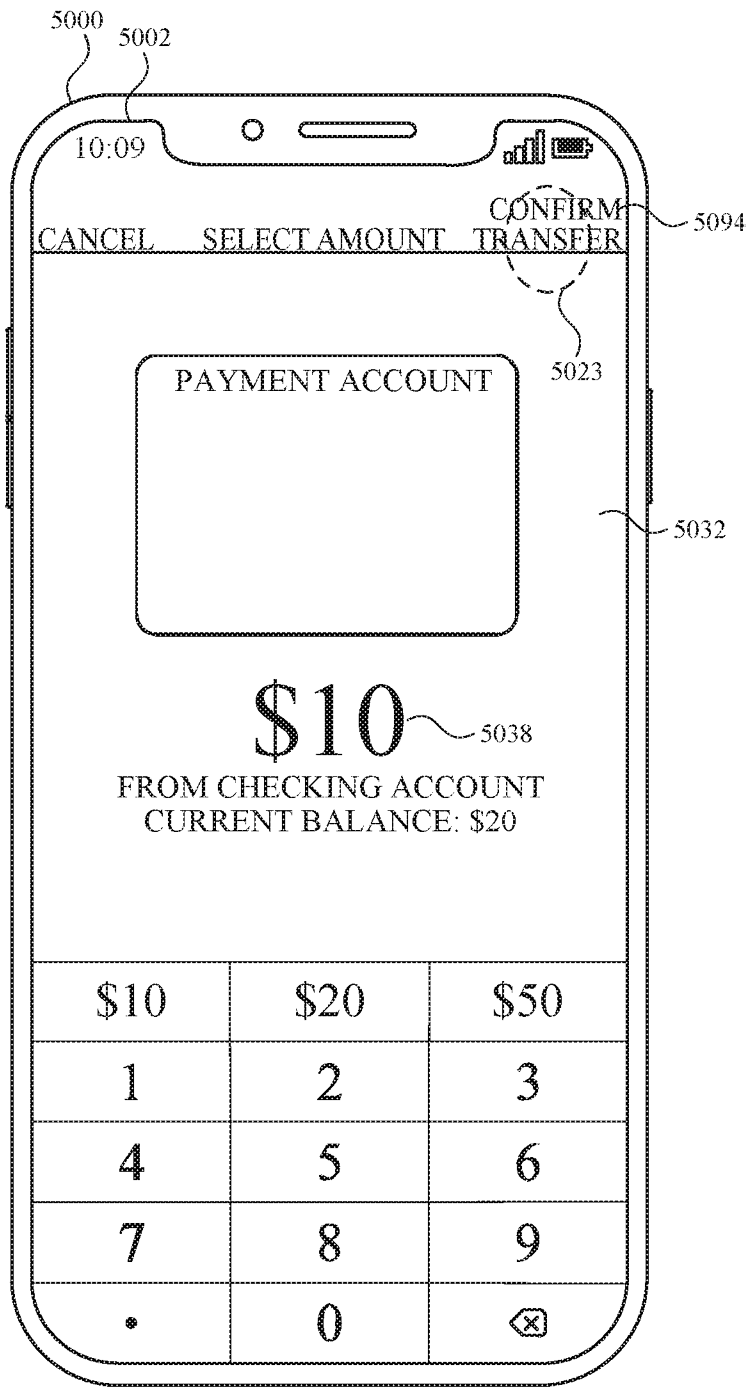

In FIG. 50X, in response to detecting selection 5023 of amount recommendation 5042A, electronic device 5000 updates added balance indication 5038 (e.g., from $0 to $10) of add balance user interface 5032 to reflect the selection. In some embodiments, after receiving selection of the new balance (e.g., of $10) to be added to the current balance of the first-party transfer account, electronic device 5000 detects an activation 5023 (e.g., a touch input) of a confirm affordance 5094 for confirming and authorizing the transfer of the user-selected balance (e.g., of $10) from the source account (as indicated by source account indication 5092) to the first-party transfer account. In some embodiments, prior to performing the transfer of the user-selected balance from the source account to the first-party transfer account, electronic device 5000 requests authentication (e.g., biometric authentication, such as facial recognition authentication, fingerprint authentication, iris/retina scan authentication; passcode authentication) to proceed with the transfer. In FIG. 50X, after receiving the selection of the new balance (e.g., of $10), electronic device 5000 detects an activation 5025 of confirm affordance 5094.

Figure 50Y:
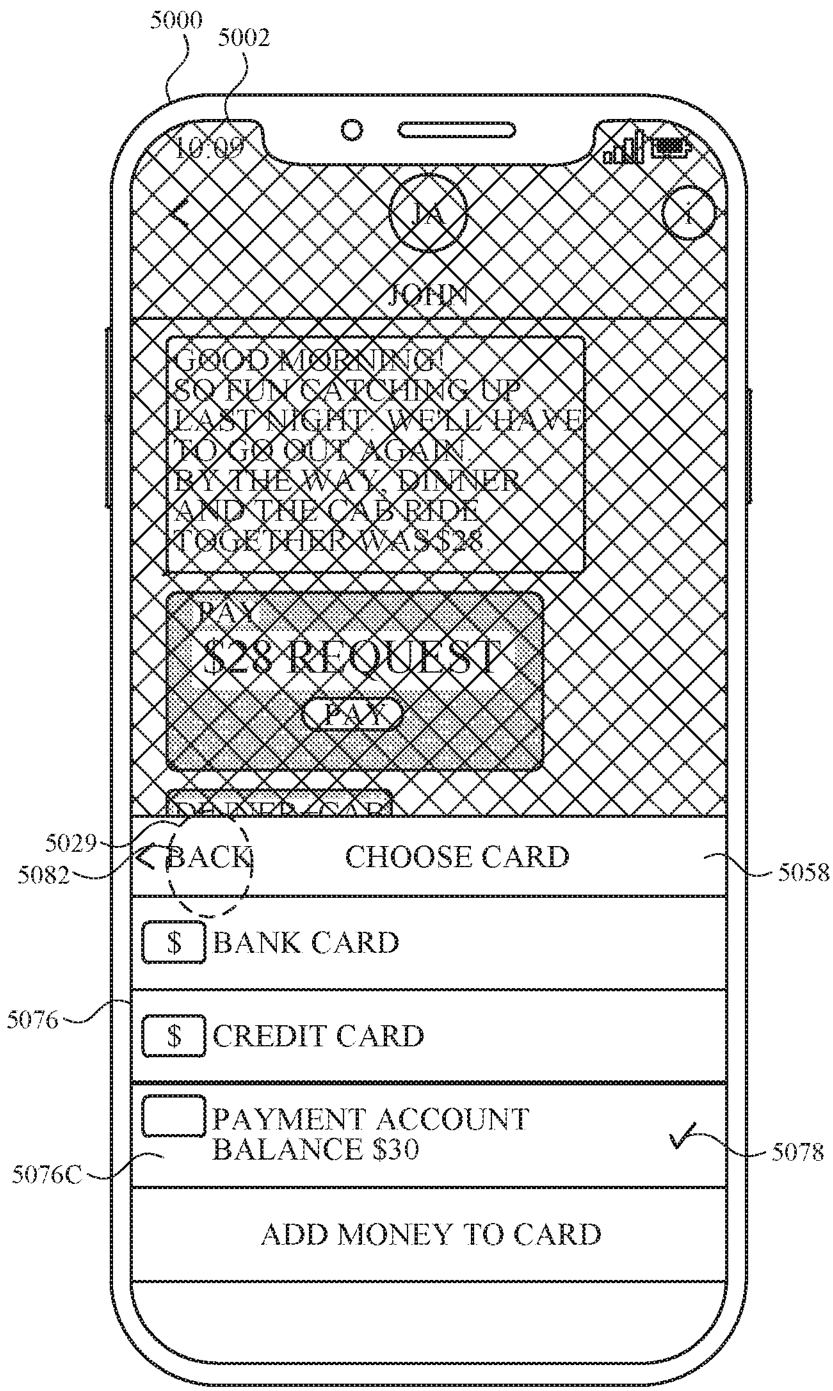

In FIG. 50Y, in response to detecting activation 5025 of confirm affordance 5094, electronic device 5000 ceases display of add balance user interface 5032 and again displays transfer sheet 5058 showing plurality of accounts 5076, including account 5076C corresponding to the first-party transfer account, with the current balance of the first-party transfer updated (e.g., from $20 to $30) to reflect the new balance added to the first-party transfer operation from the operation described in FIGS. 50U-50X. Current account indication 5078 also indicates that the first-party transfer account is currently set for use in the transfer operation. In FIG. 50Y, while displaying transfer sheet 5058 showing plurality of accounts 5076, electronic device detects an activation 5027 (e.g., a touch input) of back affordance 5082.

Figure 50Z:
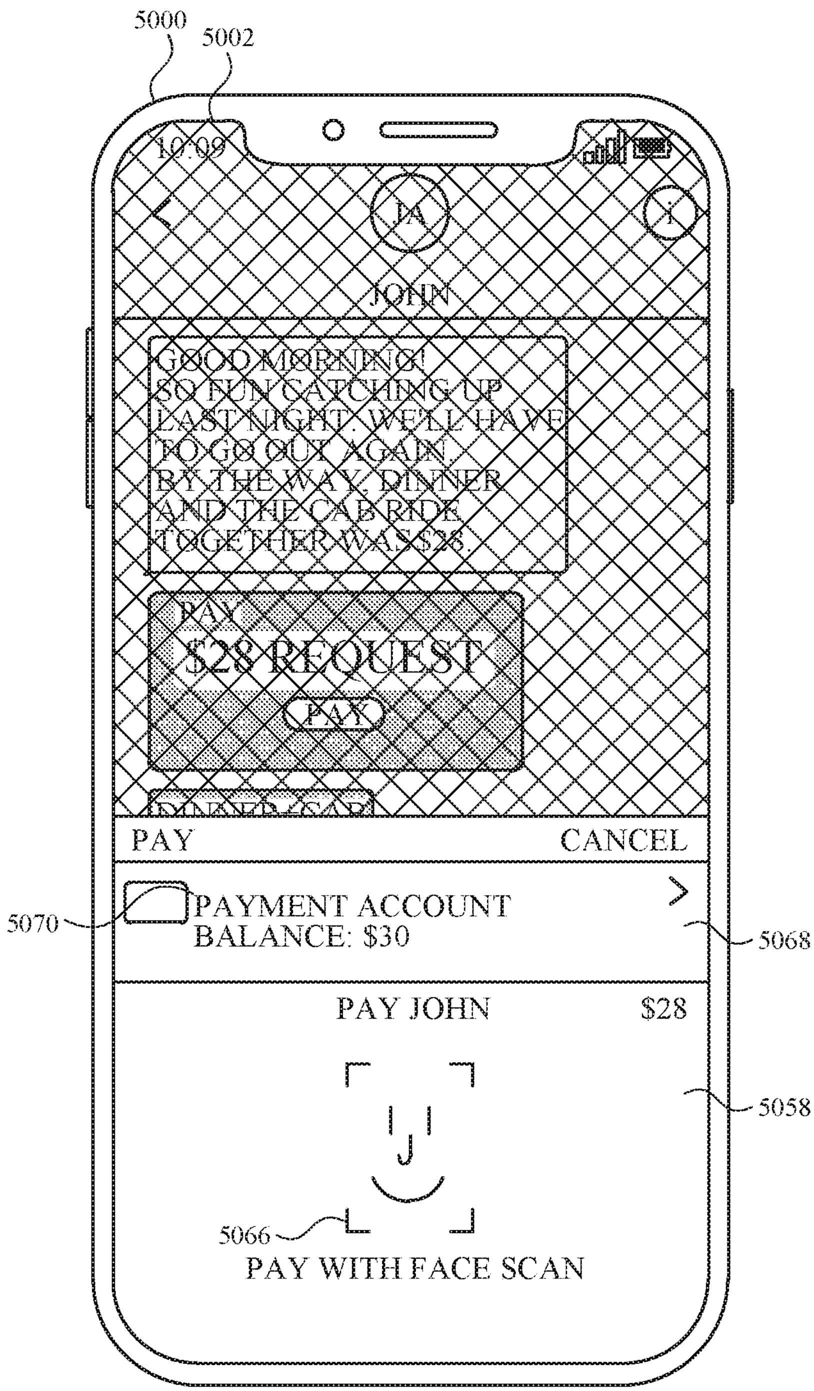
Figure 50A:
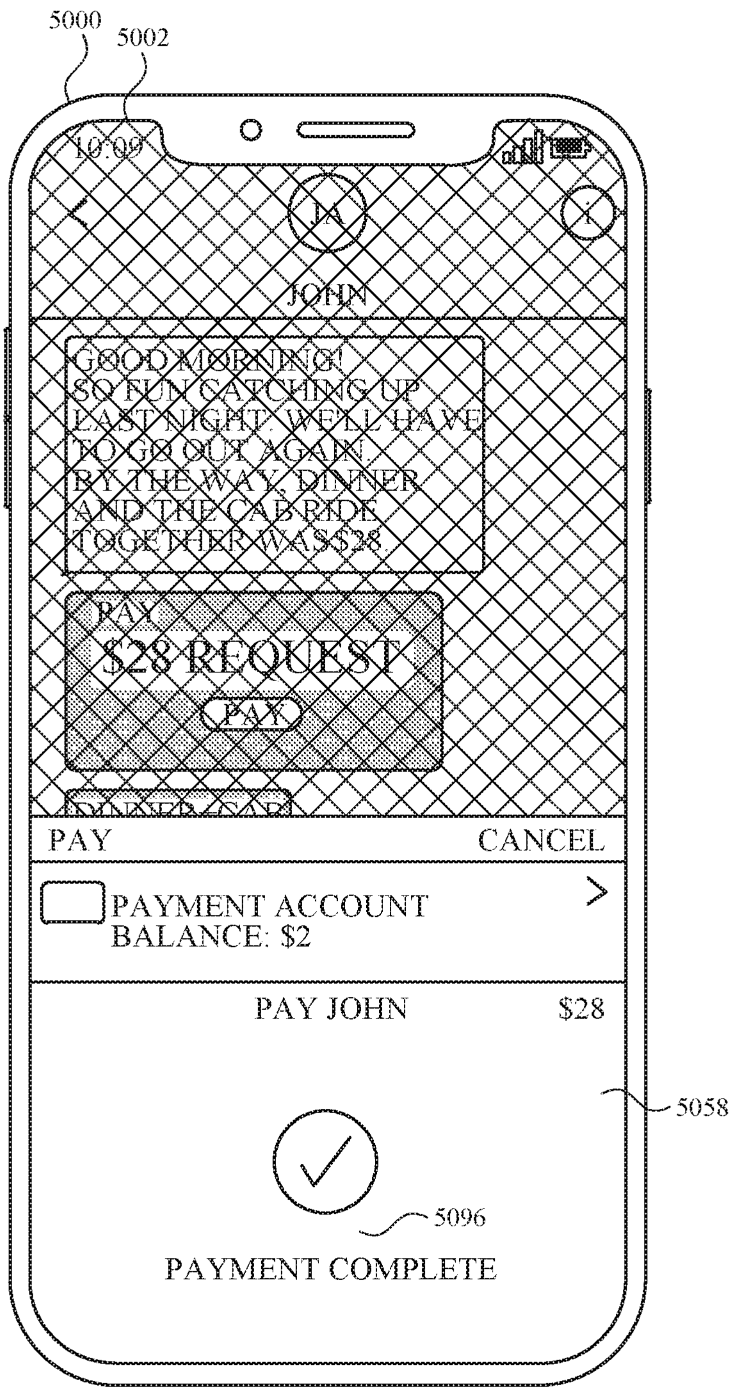
Figure 50A:
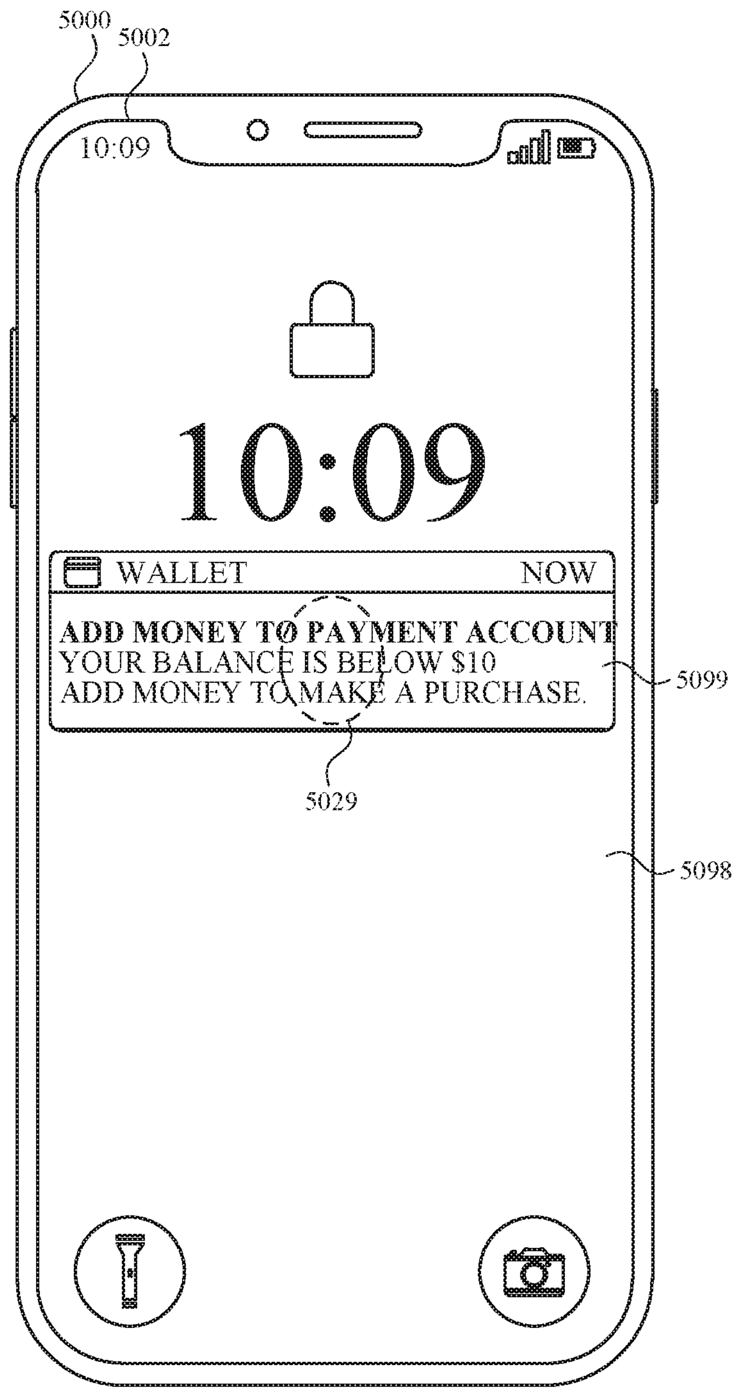
Figure 50A:
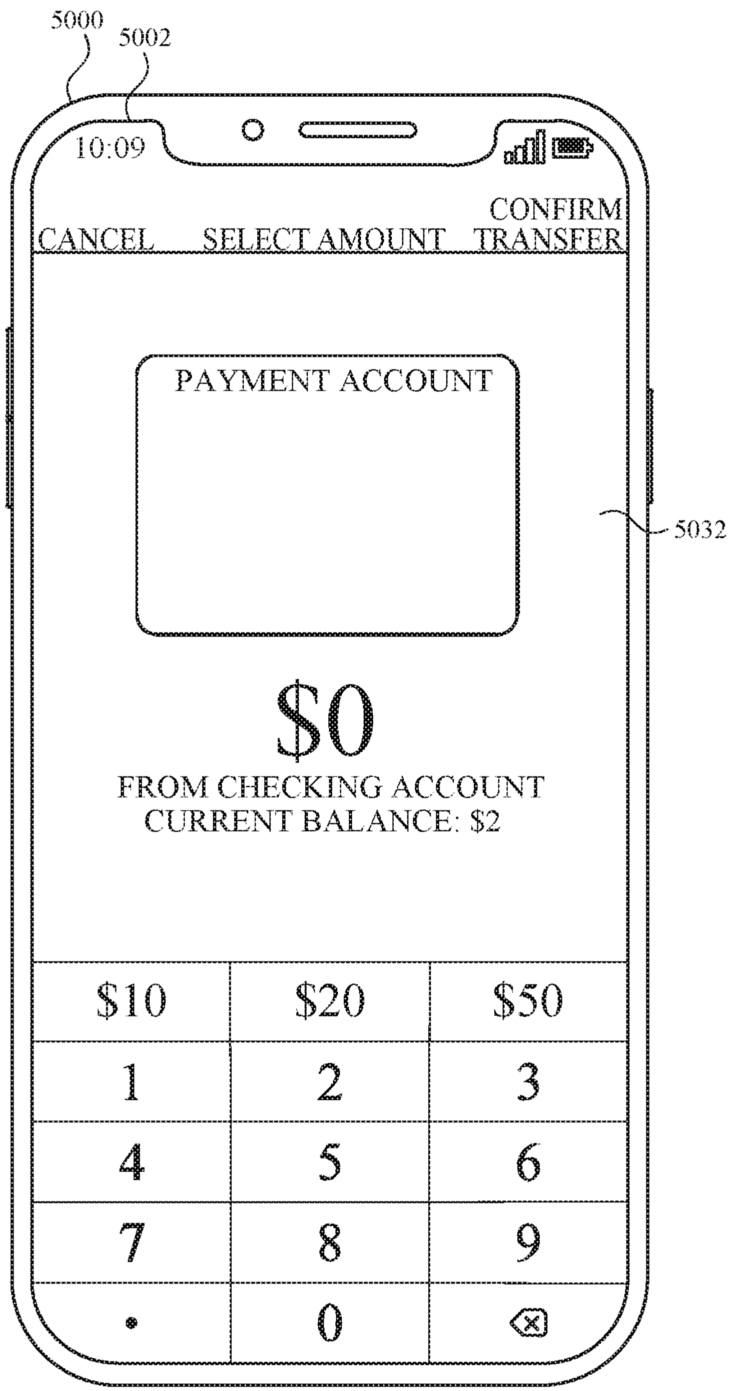
Figure 50A:
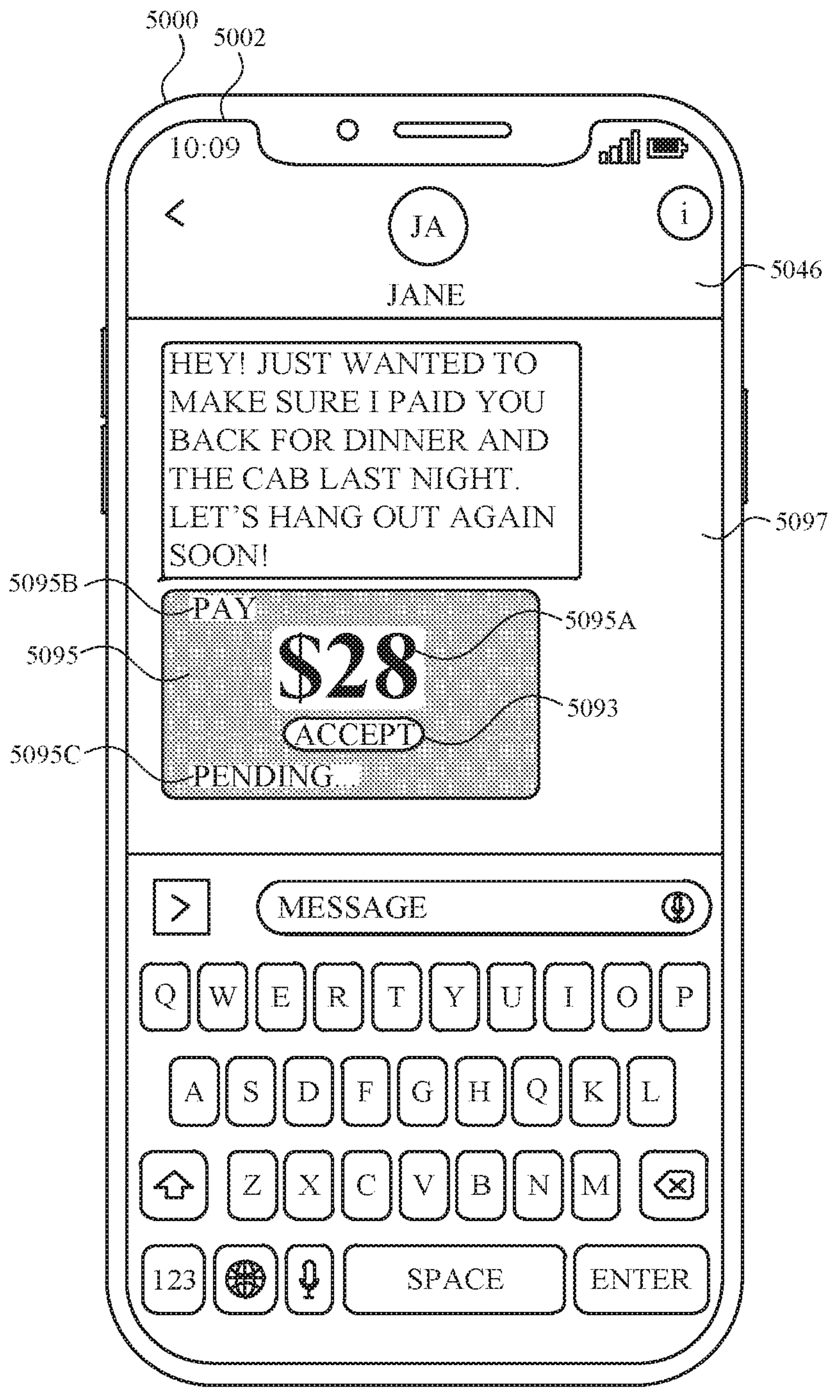
Figure 50A:
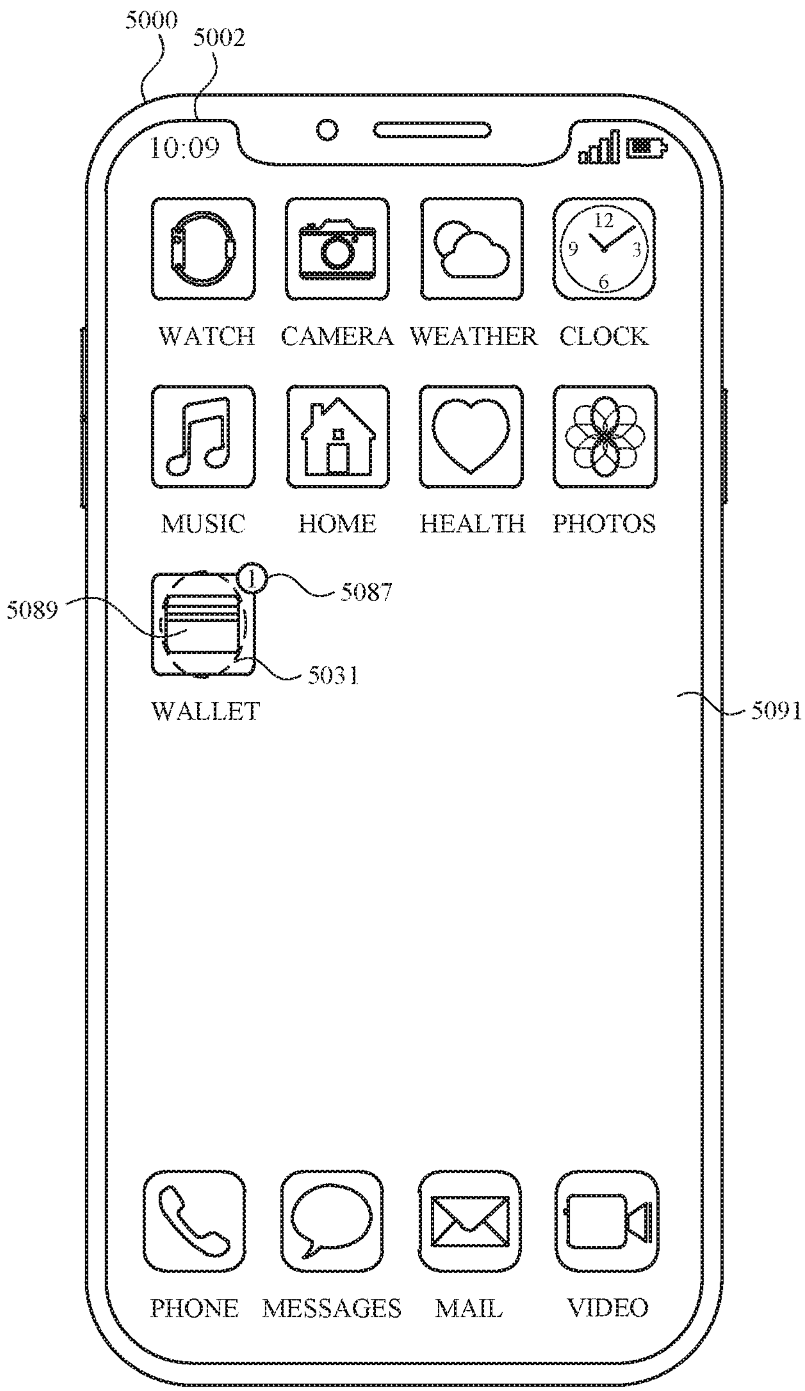
Figure 50A:
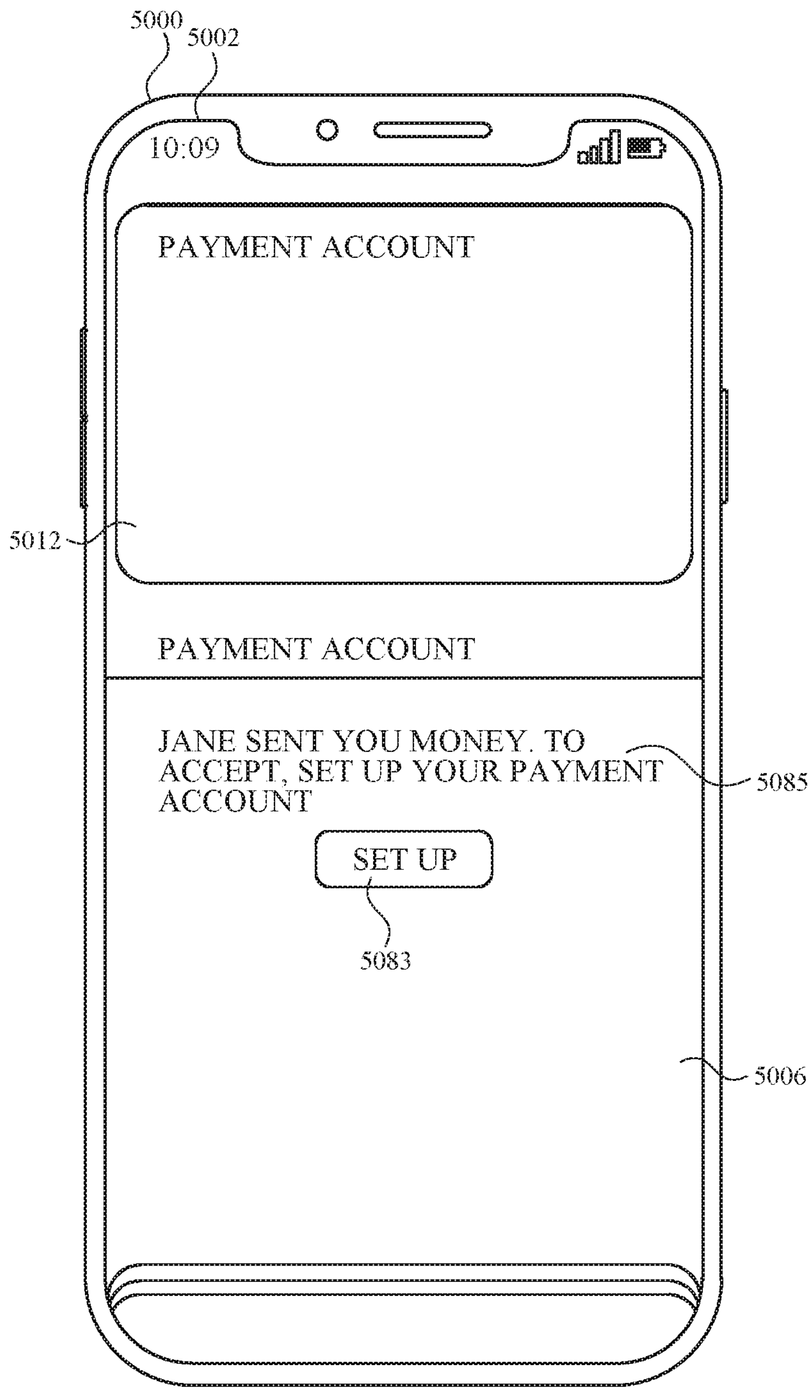
Figure 50A:
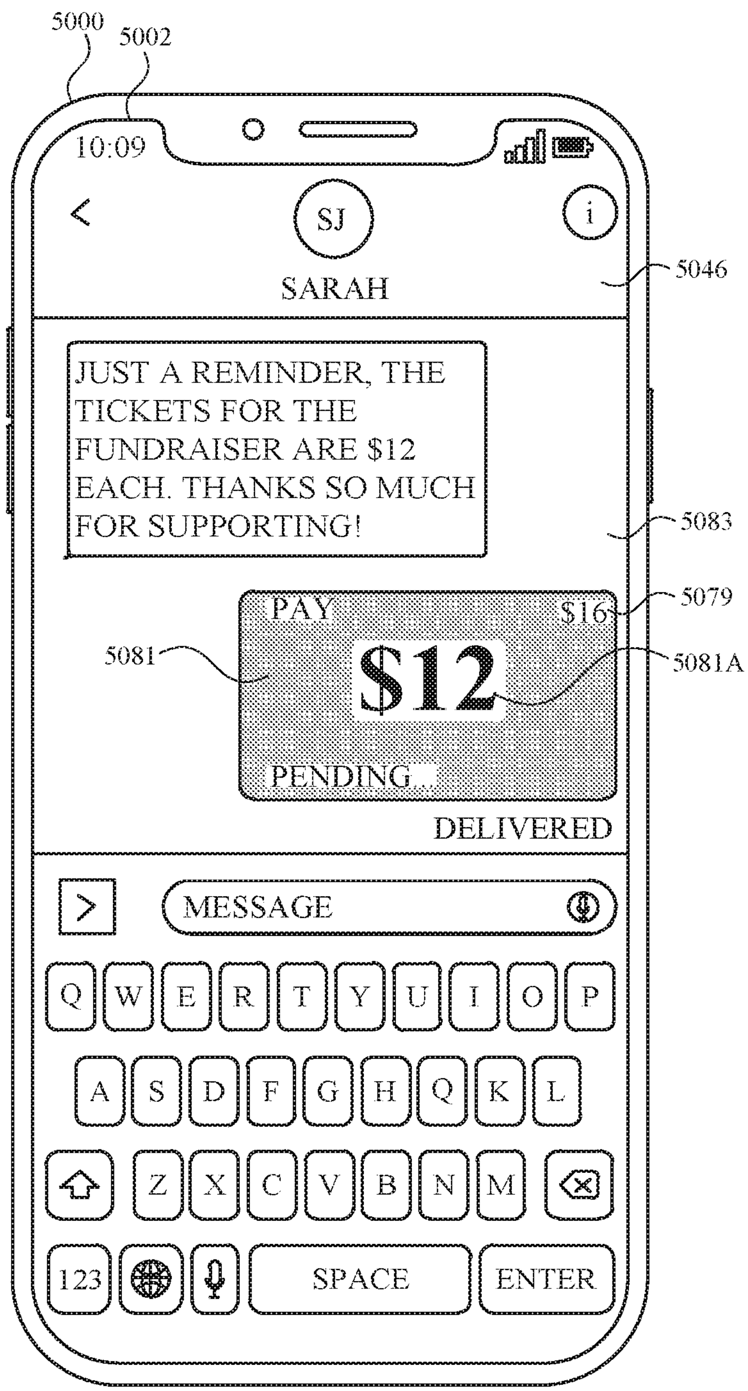

In FIG. 50Z, in response to detecting activation 5027 of back affordance 5082, electronic device 5000 ceases display of plurality of accounts 5076 and re-displays transfer sheet 5058, as first shown in FIG. 50K (with the first-party transfer account selected for use in the transfer operation, as indicated by current account indication 5070 of current account region 5068). While displaying transfer sheet 5058 with the first-party transfer account selected, electronic device 5000 receives (e.g., via one or more input devices of electronic device 5000, such as a camera, a depth sensor, a fingerprint sensor) authentication (e.g., biometric authentication, such as facial recognition authentication, fingerprint authentication, iris/retina scan authentication; or passcode authentication) for proceeding with the transfer operation (e.g., a payment of $28 to John via the messaging application) using the first-party transfer account, as requested by authentication request 5066.

In response to receiving the requested authentication (and after determining that the authentication is successful), electronic device 5000 proceeds with the transfer operation (e.g., a payment of $28 to John via the messaging application) using the first-party transfer account. As a result of the transfer operation, the balance of the first-party transfer account is reduced by the amount used for the transfer operation (e.g., reduced from $30 to $2 as a result of a payment of $28 to John). Further, electronic device 5000 displays, in transfer sheet 5058, a transfer success indication 5096 (e.g., in place of authentication request 5066) indicating that the transfer operation using the first-party transfer account was successfully completed, as shown in FIG. 50AA.

FIG. 50AB illustrates electronic device 5000 displaying, on display 5002, a lock screen 5098 (e.g., displayed by electronic device 5000 when the display is on but the device is in a user interface-locked state). As shown in FIG. 50AB, electronic device 5000 displays, in lock screen 5098, an add balance notification 5099 (e.g., associated with an electronic wallet application of electronic device 5000) indicating that the balance (e.g., of points, resources, or funds) of the first-party transfer account is low (e.g., at or below a threshold amount, such as zero or $10). In some embodiments, notification 5099 is displayed when electronic device 5000 is in a user interface-unlocked state (e.g., displayed as a banner while displaying a home user interface or while displaying the user interface of a different application). In some embodiments, the threshold amount that triggers the display of notification 5099 (e.g., zero, $10) is set/configured by the operating system of electronic device 5000 (and cannot be changed by the user of the device). In some embodiments, the threshold amount that triggers the display of notification 5099 can be set/changed by the user of electronic device 5000. In FIG. 50AB, while displaying notification 5099, electronic device 5000 detects a selection 5029 (e.g., a touch input) of the notification.

In FIG. 50AC, in response to detecting selection 5029 of notification 5099, electronic device 5000 displays, on display 5002, add balance user interface 5032 (first described above with reference to FIG. 50I) for adding balance to the first-party transfer account (e.g., as described above with reference to FIGS. 50U-50X).

FIG. 50AD illustrates electronic device 5000 displaying, on display 5002, messaging user interface 5046 of the messaging application, as first described above with reference to FIG. 50J. In FIG. 50AD, the user of electronic device 5000 is engaged in a message conversation 5097 with a second message participant (e.g., Jane). Message conversation 5097 includes a plurality of message objects transmitted between the user and the second message participant, including a transfer message object 5095 (e.g., similar to payment message object 1491 described above with reference to FIG. 14M) corresponding a payment (e.g., of $28) made by the second message participant to the user of electronic device 5000. In some embodiments, as with payment message object 1491, transfer message object 5095 includes an amount indication 5095A indicating the transfer amount (e.g., $28) sent by the second message participant to the user. In some embodiments, as with payment message object 1491, transfer message object 5095 includes a mode indication 5095B (e.g., stating "PAY") indicating that transfer message object 5095 corresponds to a transfer made via an operating-system controlled transfer application (and not by a third-party application). In some embodiments, as with payment message object 1491, transfer message object 5095 includes an accept affordance 5093 for accepting the transfer (e.g., by adding the transfer amount to the user's first-party transfer account). In some embodiments, transfer message object 5095 includes a status indication 5095C (e.g., stating "PENDING") indicating that the transfer (e.g., payment of $28 sent by the second message participant to the user) has not yet been accepted by the user of electronic device 5000.

FIG. 50AE illustrates electronic device 5000 displaying, on display 5002, a home user interface 5091 (e.g., showing application icons corresponding to a plurality of applications installed on the device). In some embodiments, home user interface 5091 includes a transfer application icon 5089 (e.g., an electronic wallet application icon) corresponding to the transfer application (e.g., an electronic wallet application). In some embodiments, the user of electronic device 5000 has not yet activated/set up the first-party transfer account, and the first-party transfer account requires initial activation/setup, as described with reference to the payment account described above in FIGS. 17F-17K. In some embodiments, if the first-party transfer account has not yet been activated/set up by the user, and electronic device 5000 receives a transfer associated with the first-party transfer account (e.g., the payment of $28 corresponding to transfer message object 5095 sent by the second message participant via the messaging application), electronic device 5000 displays, on transfer application icon 5089, an icon badge 5087 (e.g., showing "1") indicating the number of transfers that have been sent to the user's first-party transfer account (but the corresponding transfer amounts, such as payment amounts, have not yet be credited to the balance of the user's first-party transfer account because the first-party transfer account has not yet been activated/set up). In FIG. 50AE, icon badge 5087 of transfer application icon 5089 indicates that one transfer (e.g., corresponding to the payment sent by the second message participant via transfer message object 5095) has been received (but not yet credited because the user's first-party transfer account has not yet been activated/set up). In FIG. 50AE, while displaying transfer application icon 5089, electronic device 5000 detects an activation 5031 (e.g., a touch input) of transfer application icon 5089.

In FIG. 50AF, in response to detecting activation 5031 of transfer application icon 5089, electronic device 5000 displays, on display 5002, transfer user interface 5006 of the transfer application (e.g., with representation 5012 of the first-party transfer account shown in a top portion of the user interface). In some embodiments, electronic device 5000 displays, in transfer user interface 5006, an activation request 5085 indicating that a transfer associated with the first-party transfer account has been received (e.g., the payment of $28 corresponding to transfer message object 5095), and that the first-party transfer account needs to be activated/set up in order to accept the transfer and credit the transfer amount to the user's first-party transfer account. In some embodiments, electronic device 5000 also displays, in transfer user interface 5006, an activation affordance 5083 for proceeding with the activation/setup of the first-party transfer account (e.g., where the activation/setup process corresponds to the activation process described above with respect to the payment account shown in FIGS. 17F-17K).

FIG. 50AG illustrates electronic device 5000 displaying, on display 5002, messaging user interface 5046 of the messaging application, where the user of electronic device 5000 is engaging in a message conversation 5083 with a third message participant (e.g., Sarah). As shown in FIG. 50AG, message conversation 5083 includes a plurality of message objects transmitted between the user of electronic device 5000 and the third message participant, including a transfer message object 5081 (e.g., similar to payment message object 866 described above with reference to FIGS. 8Q-8Z) corresponding to a transfer (e.g., a payment of $12, as indicated by an amount indication 5081A of transfer message object 5081) sent by the user (using balance from the first-party transfer account) to the third message participant. In some embodiments, transfer message object 50841 includes a balance indication 5079 indicating the current balance of the first-party transfer account (e.g., balance indication 5079 shows a remaining balance of $16 because the first-party transfer account previously had a balance of $28, and now has a remaining balance of $16 after having made a payment of $12 to the third message participant, Sarah).

FIGS. 51A-51B are a flow diagram illustrating a method for managing balance notifications, in accordance with some embodiments. Method 5100 is performed at a device (e.g., 100, 300, 500, 5000) with a display and one or more input devices (e.g., a touch-sensitive surface, one or more mechanical input buttons). Some operations in method 5100 are, optionally, combined, the orders of some operations are, optionally, changed, and some operations are, optionally, omitted.

As described below, method 5100 provides an intuitive way for managing balance notifications. The method reduces the cognitive burden on a user for managing balances, thereby creating a more efficient human-machine interface. For battery-operated computing devices, enabling a user to manage balances faster and more efficiently conserves power and increases the time between battery charges.

The electronic device (e.g., 5000) receives (5104), via the one or more input devices, a request to perform an operation associated with a first transfer account (e.g., the first-party transfer account associated with representation 5012). In some embodiments, the first transfer account is associated with a type of items (e.g., points, credits, resources, funds). In some embodiments, the operation is a transfer of items (e.g., points, credits, resources, funds) associated with the first transfer account from the first transfer account (to a different account). In some embodiments, the request is an input that causes the electronic device to display a user interface of a transfer application (e.g., an electronic wallet application), where the first transfer account is set as the account to be used in a transfer operation/transaction (e.g., the first transfer account is "armed"). In some embodiments, the request is an input (e.g., 5011) that causes the electronic device to display a transfer sheet (e.g. 5058, a payment sheet) that at least partially covers the user interface (e.g., 5046) of the application that was being displayed (e.g., a non-transfer application).

In some embodiments, prior to receiving the request to perform an operation associated with a first transfer account (e.g., the first-party transfer account associated with representation 5012), the electronic device (e.g., 5000) displays (5102) a user interface (e.g., a checkout page) of a first application (e.g., a browser application, a merchant application), where the balance threshold corresponds to a requested transfer amount (e.g., a purchase price) detected based on (information displayed in the user interface of) the first application. In some embodiments, the electronic device detects the requested transfer amount (e.g., a purchase price) based on (information displayed in the user interface of) the first application. Detecting the requested transfer amount based on the first application enables the user to easily and quickly proceed with a transfer operation without having to manually provide the requested transfer amount. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the operation associated with the first transfer account (e.g., the first-party transfer account associated with representation 5012) is setting the first transfer account to be ready for use in a transfer operation (e.g., a payment transaction) while the electronic device (e.g., 5000) has not (yet) determined a requested transfer amount (e.g., purchase price) of the transfer operation (e.g., the requested transfer amount is unknown to the electronic device when the first transfer account is set to be ready for use in the transfer operation). In some embodiments, prior to setting the first transfer account to be ready for use in the transfer operation, the electronic device does not transmit credentials (e.g., account credentials needed to perform a transaction, such as a payment transaction) of the first transfer account to a second electronic device (e.g., 5014, a contactless transaction terminal) upon detecting presence of a field generated by the second electronic device (and after having received authentication to transmit the credentials to the second electronic device). In some embodiments, subsequent to setting the first transfer account to be ready for use in the transfer operation, the electronic device transmits (e.g., via a wireless communication radio of the electronic device) the credentials of the first transfer account to the second electronic device upon detecting presence of the field generated by the second electronic device (and after having received authentication to transmit the credentials to the second electronic device). In some embodiments, the electronic device sets the first transfer account to be ready for use in a transfer operation when a transfer application (e.g., a payment application, an electronic wallet application) is launched (e.g., because the first transfer account is set as the default account). In some embodiments, the electronic device sets the first transfer account to be ready for use in a transfer operation when, after the transfer application is launched, the electronic device detects selection of the first transfer account (e.g., from one or more other available transfer accounts) for use in the transfer operation instead of a default transfer account that is not the first transfer account. In some embodiments, subsequent to setting the first transfer account to be ready for use in the transfer operation, the electronic device determines the requested transfer amount via communication with a second electronic device (e.g., a transaction terminal) using a wireless communication radio (e.g., for NFC communication) of the electronic device. In some embodiments, the electronic device has not determined the requested transfer amount prior to setting the first transfer account to be ready for use in the transfer operation.

In some embodiments, the operation associated with the first transfer account is setting the first transfer account to be ready for use in a transfer operation (e.g., a payment transaction) after the electronic device (e.g., 5000) has determined a requested transfer amount (e.g., purchase price) of the transfer operation (e.g., the requested transfer amount is known to the electronic device when the first transfer account is set to be ready for use in the transfer operation). In some embodiments, prior to receiving the request to perform an operation associated with a first transfer account, the electronic device is displaying, on the display (e.g., 5002), a user interface (e.g., 5046) of a first application (e.g., a messaging application, a browser application, a merchant application), and the electronic device detects the requested transfer amount (e.g., a requested payment amount, a purchase price) based on (information displayed in the user interface of, such as from transfer message object 5050) the first application. In some embodiments, the first transfer account is set to be ready for use in the transfer operation when the electronic device launches and displays a transfer application (e.g., a payment sheet) over a portion of the user interface of the first application (e.g., because the first transfer account is set as the default account). In some embodiments, the first transfer account is set to be ready for use in the transfer operation when, while displaying a transfer application (e.g., a payment sheet) over a portion of the displayed user interface of the first application (e.g., because the first transfer account is set as the default account), the electronic device detects selection of the first transfer account from a plurality of available transfer accounts displayed by the transfer application.

In response to receiving (5106) the request to perform the operation associated with the first transfer account (e.g., the first-party transfer account associated with representation 5012), in accordance with a determination (5108) that a balance of the first transfer account is below a balance threshold, the electronic device (e.g., 5000) concurrently displays (5110), on the display (e.g., 5002), the representation of the first transfer account (e.g., 5012) with an insufficient balance notification (e.g. 5026, 5086A, 5086B). Displaying the representation of the first transfer account with an insufficient balance notification in accordance with the determination that a balance of the first transfer account is below a balance threshold improves feedback by enabling the user to quickly and easily recognize that the balance of the first transfer of low and thus may be insufficient to perform a transfer operation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, in accordance with the determination that a balance of the first transfer account is below the balance threshold (e.g., zero, a pre-determined amount), the electronic device also provides a haptic feedback (e.g., 5030). Providing a haptic feedback in accordance with the determination that a balance of the first transfer account is below the balance threshold improves feedback by enabling the user to recognize that the balance of the first transfer account may be insufficient without having to view the display of the device, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device detects (5112), via the one or more input devices, an activation (e.g., 5017) of the insufficient balance notification (e.g., 5026, 5086A, 5086B). In some embodiments, in response to detecting the activation of the insufficient balance notification, the electronic device concurrently displays (5114), on the display (e.g., 5002), representations of one or more available transfers accounts (e.g., transfer accounts, such as a points card, loyalty card, credit card, pre-funded card, transit card, debit card, provisioned on the electronic device), including a representation of the first transfer account, and an add balance affordance (e.g., below the representation of the first transfer account). In some embodiments, the electronic device detects (5116), via the one or more input devices, an activation of the add balance affordance. In some embodiments, in response to detecting the activation of the add balance affordance, the electronic device displays (5118), on the display, an add balance user interface for adding balance to the first transfer account. In some embodiments, the add balance user interface corresponds to a user interface for adding items (e.g., points, credits, resources, funds) to a transfer account, such as a stored-value account.

In some embodiments, in accordance with the determination (5108) that the balance of the first transfer account (e.g., the first-party transfer account associated with representation 5012) is below the balance threshold, the electronic device (e.g., 5000) transmits (5120) (e.g., via a wireless communication radio of the electronic device) credentials of the first transfer account and credentials of a second transfer account (e.g., the third-party transfer account associated with representation 5008, a bank account, a credit card account) different from the first transfer account to a second electronic device (e.g., 5014, a payment terminal, an external server) for use in a transfer operation (e.g., of points, credits, resources, or funds from the first transfer account to a different account).

In some embodiments, in accordance with the determination (5108) that the balance of the first transfer account (e.g., the first-party transfer account associated with representation 5012) is below the balance threshold, the electronic device (e.g., 5000) displays (5122), on the display (e.g., 5002) (e.g., below the insufficient balance notification), an add balance affordance (e.g., 5028, 5088, for adding points, credits, resources, or funds to the first transfer account). Displaying an add balance affordance in accordance with the determination that the balance of the first transfer account is below the balance threshold enables a user to quickly and easily manage the balance of the account without having to manually navigate to a user interface for managing the balance of the account. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the add balance affordance includes an indication (e.g., text stating "Add Money to Card") informing the user that items (e.g., points, credits, resources, funds) can be added to the first transfer account. In some embodiments, the indication replaces/is displayed in place of an indication (e.g., text stating "Card Ready") informing the user that the transfer account is ready for use in a transfer operation (e.g., a payment transaction), where the indication informing the user that the transfer account is ready for use is displayed when the balance of the transfer account is equal to or above the balance threshold. In some embodiments, the electronic device detects (5124), via the one or more input devices, an activation (e.g., 5009, 5019) of the add balance affordance. In some embodiments, in response to detecting the activation of the add balance affordance, the electronic device displays (5126), on the display, an add balance user interface (e.g., 5032) for adding balance to the first transfer account. In some embodiments, the add balance user interface corresponds to a user interface for adding items (e.g., points, credits, resources, funds) to a transfer account, such as a stored-value account.

In some embodiments, in accordance with the determination (5108) that the balance of the first transfer account (e.g., the first-party transfer account associated with representation 5012) is below the balance threshold, the electronic device (e.g., 5000) displays (5128), on the display (e.g., 5002), an indication (e.g., 5072) that a second transfer account different from the first payment account can be used for a transfer operation (e.g., a payment transaction). Displaying an indication that a second transfer account different from the first payment account can be used for a transfer operation in accordance with the determination that the balance of the first transfer account is below the balance threshold improves usability of the device by enabling the user to quickly and easily proceed with the transfer operation when the balance of the first transfer account is insufficient. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the second transfer account has a balance that is not below the balance threshold. In some embodiments, displaying the indication that the second transfer account different can be used for a transfer operation comprises displaying at least a portion of a representation of the second transfer account. In some embodiments, if a portion of a representation of the second transfer account is already displayed, displaying the indication that the second transfer account different can be used for a transfer operation comprises displaying a larger portion of the representation (e.g., 5012) of the second transfer account.

In some embodiments, subsequent to receiving (5130) the request to perform the operation associated with the first transfer account (e.g., the first-party transfer account associated with representation 5012) and while the balance of the first transfer account is below the balance threshold, the electronic device (e.g., 5000), transmits (5132) (e.g., via a wireless communication radio of the device), to a second electronic device (e.g., 5014, a transaction terminal, an external server), credentials of the first transfer account (e.g., payment credentials). In some embodiments, subsequent to receiving (5130) the request to perform the operation associated with the first transfer account and while the balance of the first transfer account is below the balance threshold, the electronic device (e.g., 5000) displays (5134), on the display, an add balance notification (e.g., as an alert, as a banner notification, as a pop-up notification). Displaying an add balance notification subsequent to receiving the request to perform the operation associated with the first transfer account and while the balance of the first transfer account is below the balance threshold improves feedback by enabling the user to quickly and easily recognize that the balance of the first transfer account is now low, and improves usability of the device by enabling the user to quickly and easily add balance to the account. Providing improved visual feedback to the user and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the electronic device also transmits credentials of a second transfer account (e.g., payment credentials) to the second electronic device along with the credentials of the first transfer account (e.g., because the balance of the first transfer account alone is insufficient for a transfer operation, such as a payment transaction).

In some embodiments, while displaying the add balance notification (e.g., 5026, 5086A, 5086B), the electronic device (e.g., 5000) detects (5136), via the one or more input devices, an activation of the add balance notification. In some embodiments, in response to detecting the activation of the add balance notification, the electronic device displays (5138), on the display, an add balance user interface (e.g., 5032). In some embodiments, the add balance user interface corresponds to a user interface for adding items (e.g., points, credits, resources, funds) to a transfer account, such as a stored-value account.

In response to receiving (5106) the request to perform the operation associated with the first transfer account (e.g., the first-party transfer account associated with representation 5012), in accordance with a determination (5140) that the balance of the first transfer account is not below the balance threshold, the electronic device (e.g., 5000) displays (5142), on the display (e.g., 5002), the representation (e.g., 5012) of the first transfer account without displaying the insufficient balance notification (e.g., 5026, 5086A, 5086B). Displaying the representation of the first transfer account without displaying the insufficient balance notification in accordance with the determination that the balance of the first transfer account is not below the balance threshold improves feedback by enabling the user to quickly and easily recognize that the first transfer can be (and will be) used for the transfer operation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the representation of the first transfer account includes an indication of the balance of the first transfer account.

In some embodiments, in accordance with the determination (5140) that the balance of the first transfer account (e.g., the first-party transfer account associated with representation 5012) is not below the balance threshold, the electronic device (e.g., 5000) transmits (5144) (e.g., via a wireless communication radio of the electronic device) credentials of the first transfer account to a second electronic device (e.g., 5014, a payment terminal, an external server) for use in a transfer operation (e.g., of points, credits, resources, or funds from the first transfer account to a different account).

In some embodiments, displaying the representation of the first transfer account (e.g., the first-party transfer account associated with representation 5012) without displaying the insufficient balance notification (e.g., 5026, 5086A, 5086B) comprises displaying at least a portion (e.g., a top portion) of the representation (e.g., 5012) of the first transfer account (e.g., without displaying the entire representation) within a respective region (e.g., a bottom portion of the user interface of the transfer application) showing a portion of a representation of a second transfer account, where the portion of the representation of the first transfer account includes a balance indication corresponding to the balance of the first transfer account. Displaying the portion of the representation of the first transfer account that includes the balance indication corresponding to the balance of the first transfer account improves visual feedback by enabling the user to quickly and easily recognize that the first transfer account has sufficient balance, and thus can be used in the transfer operation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the electronic device (e.g., 5000) displays, in the respective region showing the portion of the representation of the second transfer account, one or more portions of representations of other transfer accounts different from the first payment account and the second payment account.

In some embodiments, while displaying the representation of the first transfer account (e.g., the first-party transfer account associated with representation 5012) without displaying the insufficient balance notification (e.g., 5026, 5086A, 5086B), the electronic device (e.g., 5000) detects (5146) (e.g., via a biometric sensor, such as a camera, a depth sensor, a fingerprint sensor, a retina/iris scanner) biometric information (e.g., facial features information, fingerprint information). In some embodiments, in accordance with a determination that the detected biometric information corresponds to enrolled biometric information (e.g., preconfigured on the device by the user), the electronic device transmits (5148) (e.g., via a wireless communication radio of the device), to a second electronic device (e.g., 5014, a transaction terminal, an external server), credentials of the first transfer account for use in a transfer operation corresponding to a requested amount of items, where the requested amount of items is withdrawn from the first transfer account (and thus the balance of first transfer account is accordingly lowered). Transmitting credentials of the first transfer account for use in a transfer operation to a second electronic device in accordance with the determination that the detected biometric information corresponds to enrolled biometric information enhances security of the device by helping to prevent fraudulent and/or unauthorized transactions to be made using the device.

In some embodiments, in response to (or subsequent to) transmitting the credentials of the first transfer account (e.g., the first-party transfer account associated with representation 5012) for use in the transfer operation, in accordance with a determination that the balance (after (at least) the requested amount of items is withdrawn from the first transfer account) is below the balance threshold, the electronic device (e.g., 5000) displays (5150), on the display (e.g., 5002), a low balance notification (e.g., 5099) (indicating that, after the successful transfer operation, the balance of the first transfer account has fallen below the balance threshold). Displaying a low balance notification in accordance with the determination that the balance is below the balance threshold after the requested amount of items is withdrawn from the first transfer account improves feedback by enabling the user to quickly and easily recognize that there is low balance in the account, and that balance needs to be added prior to initiating a new transfer operation at a later time. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the balance of the first transfer account corresponds to a first amount of items (e.g., points, credits, resources, funds), and the balance threshold corresponds to a predetermined amount of items (e.g., zero, $10).

In some embodiments, the balance of the first transfer account corresponds to a first amount of items (e.g., points, credits, resources, funds), and the balance threshold corresponds to a requested transfer amount (e.g., a purchase price).

In some embodiments, the balance threshold is set (e.g., pre-configured, pre-selected) by a user of the electronic device (e.g., 5000). In some embodiments, the balance threshold is set by an operating system of the electronic device (and cannot be changed by the user of the electronic device).

Note that details of the processes described above with respect to method 5100 (e.g., FIGS. 51A-51B) are also applicable in an analogous manner to the methods described above. For example, method 5100 optionally includes one or more of the characteristics of the various methods described above with reference to methods 900, 1200, 1500, 1800, 2100, 2400, 2700, 3000, and 3400. For example, the insufficient balance notifications (e.g., 5026, 5086A, 5086B) can be provided in relation to performing transfers (e.g., transactions, payments) using the payment accounts described with respect to methods 900, 1200, 1500, 1800, 2100, 2400, 2700, 3000, and 3400. Similarly, a balance indication (e.g., 5079, 5084) can be provided in relation to transfers (e.g., transactions, payments) using the payment accounts described with respect to methods 900, 1200, 1500, 1800, 2100, 2400, 2700, 3000, and 3400. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the management of accounts using an electronic device and the management and operation of peer-to-peer transfer using the electronic device. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide enhanced device security and user protections when managing the operation of peer-to-peer transfers by preventing fraudulent, unauthorized, and/or unintended transfers. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing accounts, such as transfer accounts, the present technology can be configured to allow users to select to "opt in" or "opt out" of participation in the collection of personal information data during registration for services or anytime thereafter. In another example, users can select not to provide personal information that is not required when managing the provisioning of accounts and the use of accounts in peer-to-peer transfers (or provide one type of personal information, such as a certain type of biometric authentication information, instead of a different type of personal information, such as a different type of biometric information). In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, peer-to-peer transfers of certain types of items can be performed by inferring preferences based on non-personal information data or a bare minimum amount of personal information, other non-personal information associated with the user of the electronic device and accessible by the device, or publically available information.

What is claimed is:

1. An electronic device, comprising:

a display;

one or more input devices;

a wireless communication radio;

one or more processors; and memory storing one or more programs configured to be executed by the one or more processors, the one or more programs including instructions for:

receiving, via the wireless communication radio, one or more messages;

displaying, on the display, a user interface for a messaging application that includes at least one of the one or more messages in a message conversation between a plurality of conversation participants;

while concurrently displaying, on the display, at least one of the one or more messages in the message conversation, receiving, from one of the participants, a respective message;

in response to receiving the respective message, in accordance with a determination, based on an analysis of text in the respective message, that the respective message relates to a transfer of a first type of item that the messaging application is configured to transfer, concurrently displaying, on the display, a representation of the message and a selectable indication that corresponds to the first type of item, wherein the selectable indication is a portion of the text in the respective message that relates to the first type of item that is visually emphasized in relation to other text in the respective message;

while the representation of the message and the selectable indication that corresponds to the first type of item are concurrently displayed on the display, detecting, via the one or more input devices, user activation of the selectable indication; and in response to detecting the user activation of the selectable indication, displaying, on the display, a transfer user interface for initiating transfer of the first type of item between participants in the message conversation.

2. The electronic device of claim 1, wherein the text in the respective message includes a first quantity of content of the first type of item, and wherein the transfer user interface includes an indication of the first quantity of the content of the first type of item.

3. The electronic device of claim 1, wherein:

the message conversation involves two or more participants, other than a user of the device;

the text in the respective message includes a first quantity of content of the first type of item; and the transfer user interface includes an indication of a second quantity of content of the first type of item, wherein the second quantity is a numerical value divided among the two or more participants based on the first quantity.

4. The electronic device of claim 1, the one or more programs further including instructions for:

further in response to receiving the respective message, in accordance with a determination, based on the analysis of text in the respective message, that the respective message does not relate to a transfer of the first type of item, displaying, on the display, a representation of the respective message without displaying the selectable indication that corresponds to the first type of item.

5. The electronic device of claim 1, the one or more programs further including instructions for:

in accordance with the determination, based on the analysis of the text in the respective message, that the respective message relates to the transfer of the first type of item that the messaging application is configured to transfer, displaying, on the display, a transfer affordance;

detecting user activation of the transfer affordance; and in response to detecting the user activation of the transfer affordance, displaying, on the display, the transfer user interface for initiating transfer of the first type of item to a participant in the message conversation.

6. The electronic device of claim 1, the one or more programs further including instructions for:

while displaying the transfer user interface, receiving user input; and in response to receiving the user input, displaying, on the display, a keypad user interface, wherein the keypad user interface includes one or more suggested numerical values for a quantity of the first type of item to transfer.

7. The electronic device of claim 1, wherein the transfer user interface includes a transfer mode affordance, the one or more programs further including instructions for:

detecting a first activation of the transfer mode affordance;

in response to detecting the first activation of the transfer mode affordance, designating the message associated with the transfer of the first type of item as corresponding to a transmission of the first type of item;

detecting a second activation of the transfer mode affordance; and in response to detecting the second activation of the transfer mode affordance, designating the message associated with the transfer of the first type of item as corresponding to a request for the first type of item.

8. The electronic device of claim 1, wherein the transfer user interface includes a send affordance, the one or more programs further including instructions for:

detecting user activation of the send affordance; and in response to detecting the user activation of the send affordance, displaying, on the display, a graphical representation of a message associated with the transfer of the first type of item in the message conversation, wherein the graphical representation of the message associated with the transfer of the first type of item includes an indication of a quantity of content of the first type of item being transferred.

9. The electronic device of claim 8, wherein:

in accordance with a determination that a message prepared to be sent corresponds to the first type of item, the send affordance is displayed with a first visual characteristic; and in accordance with a determination that the message prepared to be sent corresponds to a second type of item different from the first type of item, the send affordance is displayed with a second visual characteristic different from the first visual characteristic.

10. The electronic device of claim 8, wherein the graphical representation of the message associated with transfer of the first type of item is displayed with a third visual characteristic in the message conversation, and a representation of a message in the message conversation not associated with transfer of the first type of item is displayed with a fourth visual characteristic that is different from the third visual characteristic.

11. The electronic device of claim 8, the one or more programs further including instructions for:

in response to detecting the user activation of the send affordance and prior to displaying, on the display, the graphical representation of the message associated with the transfer of the first type of item in the message conversation, in accordance with a determination that the message associated with the transfer of the first type of item corresponds to a transmission of the first type of item, displaying, on the display, an authentication user interface requesting authentication information;

receiving, via the one or more input devices, the authentication information, and:

in accordance with a determination that the received authentication information corresponds to enrolled authentication information for authorizing transfers, displaying, on the display, the graphical representation of the message associated with the transfer of the first type of item in the message conversation; and in accordance with a determination that the received authentication information does not correspond to the enrolled authentication information for authorizing transfers, forgoing displaying, on the display, the graphical representation of the message associated with the transfer of the first type of item in the message conversation.

12. The electronic device of claim 1, the one or more programs further including instructions for:

in accordance with a determination that the respective message corresponds to a transmission, from a first participant in the message conversation, of a first quantity of content of the first type of item, automatically transferring the first quantity of content of the first type of item to the first participant.

13. The electronic device of claim 1, the one or more programs further including instructions for:

while displaying, on the display, the transfer user interface:

displaying a numerical value representing a quantity of the first type of item;

detecting, via the one or more input devices, a user input;

in accordance with a determination that the user input corresponds to a first type of user input, increasing the displayed numerical value by an amount corresponding to the first type of user input; and in accordance with a determination that the user input corresponds to a second type of user input, decreasing the displayed numerical value by an amount corresponding to the second type of user input.

14. The electronic device of claim 13, the one or more programs further including instructions for:

in accordance with a determination that the user input corresponds to a third type of user input, replacing display of the transfer user interface with a numerical keypad user interface, wherein the numerical keypad user interface includes a plurality of suggested values.

15. The electronic device of claim 1, the one or more programs further including instructions for:

while displaying, on the display, the transfer user interface:

displaying an affordance for changing an account for use in the transfer of the first type of item;

detecting, via the one or more input devices, user activation of the affordance for changing the account;

in response to detecting the user activation of the affordance for changing the account, displaying, on the display, an account user interface including a representation of a current account and a representation of a second account, wherein the current account is currently selected for use in the transfer;

detecting, via the one or more input devices, user selection of the representation of the second account; and in response to detecting the user selection of the representation of the second account, selecting the second account for use in the transfer.

16. A non-transitory computer-readable storage medium storing one or more programs configured to be executed by one or more processors of an electronic device with a display, one or more input devices, and a wireless communication radio, the one or more programs including instructions for:

receiving, via the wireless communication radio, one or more messages;

displaying, on the display, a user interface for a messaging application that includes at least one of the one or more messages in a message conversation between a plurality of conversation participants;

while concurrently displaying, on the display, at least one of the one or more messages in the message conversation, receiving, from one of the participants, a respective message;

in response to receiving the respective message, in accordance with a determination, based on an analysis of text in the respective message, that the respective message relates to a transfer of a first type of item that the messaging application is configured to transfer, concurrently displaying, on the display, a representation of the message and a selectable indication that corresponds to the first type of item, wherein the selectable indication is a portion of the text in the respective message that relates to the first type of item that is visually emphasized in relation to other text in the respective message;

while the representation of the message and the selectable indication that corresponds to the first type of item are concurrently displayed on the display, detecting, via the one or more input devices, user activation of the selectable indication; and in response to detecting the user activation of the selectable indication, displaying, on the display, a transfer user interface for initiating transfer of the first type of item between participants in the message conversation.

17. The non-transitory computer-readable storage medium of claim 16, wherein the text in the respective message includes a first quantity of content of the first type of item, and wherein the transfer user interface includes an indication of the first quantity of the content of the first type of item.

18. The non-transitory computer-readable storage medium of claim 16, wherein:

the message conversation involves two or more participants, other than a user of the device;

the text in the respective message includes a first quantity of content of the first type of item; and the transfer user interface includes an indication of a second quantity of content of the first type of item, wherein the second quantity is a numerical value divided among the two or more participants based on the first quantity.

19. The non-transitory computer-readable storage medium of claim 16, the one or more programs further including instructions for:

further in response to receiving the respective message, in accordance with a determination, based on the analysis of text in the respective message, that the respective message does not relate to a transfer of the first type of item, displaying, on the display, a representation of the respective message without displaying the selectable indication that corresponds to the first type of item.

20. The non-transitory computer-readable storage medium of claim 16, the one or more programs further including instructions for:

in accordance with the determination, based on the analysis of the text in the respective message, that the respective message relates to the transfer of the first type of item that the messaging application is configured to transfer, displaying, on the display, a transfer affordance;

detecting user activation of the transfer affordance; and in response to detecting the user activation of the transfer affordance, displaying, on the display, the transfer user interface for initiating transfer of the first type of item to a participant in the message conversation.

21. The non-transitory computer-readable storage medium of claim 16, the one or more programs further including instructions for:

while displaying the transfer user interface, receiving user input; and in response to receiving the user input, displaying, on the display, a keypad user interface, wherein the keypad user interface includes one or more suggested numerical values for a quantity of the first type of item to transfer.

22. The non-transitory computer-readable storage medium of claim 16, wherein the transfer user interface includes a transfer mode affordance, the one or more programs further including instructions for:

detecting a first activation of the transfer mode affordance;

in response to detecting the first activation of the transfer mode affordance, designating the message associated with the transfer of the first type of item as corresponding to a transmission of the first type of item;

detecting a second activation of the transfer mode affordance; and in response to detecting the second activation of the transfer mode affordance, designating the message associated with the transfer of the first type of item as corresponding to a request for the first type of item.

23. The non-transitory computer-readable storage medium of claim 16, wherein the transfer user interface includes a send affordance, the one or more programs further including instructions for:

detecting user activation of the send affordance; and in response to detecting the user activation of the send affordance, displaying, on the display, a graphical representation of a message associated with the transfer of the first type of item in the message conversation, wherein the graphical representation of the message associated with the transfer of the first type of item includes an indication of a quantity of content of the first type of item being transferred.

24. The non-transitory computer-readable storage medium of claim 23, wherein:

in accordance with a determination that a message prepared to be sent corresponds to the first type of item, the send affordance is displayed with a first visual characteristic; and in accordance with a determination that the message prepared to be sent corresponds to a second type of item different from the first type of item, the send affordance is displayed with a second visual characteristic different from the first visual characteristic.

25. The non-transitory computer-readable storage medium of claim 23, wherein the graphical representation of the message associated with transfer of the first type of item is displayed with a third visual characteristic in the message conversation, and a representation of a message in the message conversation not associated with transfer of the first type of item is displayed with a fourth visual characteristic that is different from the third visual characteristic.

26. The non-transitory computer-readable storage medium of claim 23, the one or more programs further including instructions for:

in response to detecting the user activation of the send affordance and prior to displaying, on the display, the graphical representation of the message associated with the transfer of the first type of item in the message conversation, in accordance with a determination that the message associated with the transfer of the first type of item corresponds to a transmission of the first type of item, displaying, on the display, an authentication user interface requesting authentication information;

receiving, via the one or more input devices, the authentication information, and:

in accordance with a determination that the received authentication information corresponds to enrolled authentication information for authorizing transfers, displaying, on the display, the graphical representation of the message associated with the transfer of the first type of item in the message conversation; and in accordance with a determination that the received authentication information does not correspond to the enrolled authentication information for authorizing transfers, forgoing displaying, on the display, the graphical representation of the message associated with the transfer of the first type of item in the message conversation.

27. The non-transitory computer-readable storage medium of claim 16, the one or more programs further including instructions for:

in accordance with a determination that the respective message corresponds to a transmission, from a first participant in the message conversation, of a first quantity of content of the first type of item, automatically transferring the first quantity of content of the first type of item to the first participant.

28. The non-transitory computer-readable storage medium of claim 16, the one or more programs further including instructions for:

while displaying, on the display, the transfer user interface:

displaying a numerical value representing a quantity of the first type of item;

detecting, via the one or more input devices, a user input;

in accordance with a determination that the user input corresponds to a first type of user input, increasing the displayed numerical value by an amount corresponding to the first type of user input; and in accordance with a determination that the user input corresponds to a second type of user input, decreasing the displayed numerical value by an amount corresponding to the second type of user input.

29. The non-transitory computer-readable storage medium of claim 28, the one or more programs further including instructions for:

in accordance with a determination that the user input corresponds to a third type of user input, replacing display of the transfer user interface with a numerical keypad user interface, wherein the numerical keypad user interface includes a plurality of suggested values.

30. The non-transitory computer-readable storage medium of claim 16, the one or more programs further including instructions for:

while displaying, on the display, the transfer user interface:

displaying an affordance for changing an account for use in the transfer of the first type of item;

detecting, via the one or more input devices, user activation of the affordance for changing the account;

in response to detecting the user activation of the affordance for changing the account, displaying, on the display, an account user interface including a representation of a current account and a representation of a second account, wherein the current account is currently selected for use in the transfer;

detecting, via the one or more input devices, user selection of the representation of the second account; and in response to detecting the user selection of the representation of the second account, selecting the second account for use in the transfer.

31. A method, comprising:

at an electronic device with a display, one or more input devices, and a wireless communication radio:

receiving, via the wireless communication radio, one or more messages;

displaying, on the display, a user interface for a messaging application that includes at least one of the one or more messages in a message conversation between a plurality of conversation participants;

while concurrently displaying, on the display, at least one of the one or more messages in the message conversation, receiving, from one of the participants, a respective message;

in response to receiving the respective message, in accordance with a determination, based on an analysis of text in the respective message, that the respective message relates to a transfer of a first type of item that the messaging application is configured to transfer, concurrently displaying, on the display, a representation of the message and a selectable indication that corresponds to the first type of item, wherein the selectable indication is a portion of the text in the respective message that relates to the first type of item that is visually emphasized in relation to other text in the respective message;

while the representation of the message and the selectable indication that corresponds to the first type of item are concurrently displayed on the display, detecting, via the one or more input devices, user activation of the selectable indication; and in response to detecting the user activation of the selectable indication, displaying, on the display, a transfer user interface for initiating transfer of the first type of item between participants in the message conversation.

32. The method of claim 31, wherein the text in the respective message includes a first quantity of content of the first type of item, and wherein the transfer user interface includes an indication of the first quantity of the content of the first type of item.

33. The method of claim 31, wherein:

the message conversation involves two or more participants, other than a user of the device;

the text in the respective message includes a first quantity of content of the first type of item; and the transfer user interface includes an indication of a second quantity of content of the first type of item, wherein the second quantity is a numerical value divided among the two or more participants based on the first quantity.

34. The method of claim 31, further comprising:

further in response to receiving the respective message, in accordance with a determination, based on the analysis of text in the respective message, that the respective message does not relate to a transfer of the first type of item, displaying, on the display, a representation of the respective message without displaying the selectable indication that corresponds to the first type of item.

35. The method of claim 31, further comprising:

in accordance with the determination, based on the analysis of the text in the respective message, that the respective message relates to the transfer of the first type of item that the messaging application is configured to transfer, displaying, on the display, a transfer affordance;

detecting user activation of the transfer affordance; and in response to detecting the user activation of the transfer affordance, displaying, on the display, the transfer user interface for initiating transfer of the first type of item to a participant in the message conversation.

36. The method of claim 31, further comprising:

while displaying the transfer user interface, receiving user input; and in response to receiving the user input, displaying, on the display, a keypad user interface, wherein the keypad user interface includes one or more suggested numerical values for a quantity of the first type of item to transfer.

37. The method of claim 31, wherein the transfer user interface includes a transfer mode affordance, further comprising:

detecting a first activation of the transfer mode affordance;

in response to detecting the first activation of the transfer mode affordance, designating the message associated with the transfer of the first type of item as corresponding to a transmission of the first type of item;

detecting a second activation of the transfer mode affordance; and in response to detecting the second activation of the transfer mode affordance, designating the message associated with the transfer of the first type of item as corresponding to a request for the first type of item.

38. The method of claim 31, wherein the transfer user interface includes a send affordance, further comprising:

detecting user activation of the send affordance; and in response to detecting the user activation of the send affordance, displaying, on the display, a graphical representation of a message associated with the transfer of the first type of item in the message conversation, wherein the graphical representation of the message associated with the transfer of the first type of item includes an indication of a quantity of content of the first type of item being transferred.

39. The method of claim 38, wherein:

in accordance with a determination that a message prepared to be sent corresponds to the first type of item, the send affordance is displayed with a first visual characteristic; and in accordance with a determination that the message prepared to be sent corresponds to a second type of item different from the first type of item, the send affordance is displayed with a second visual characteristic different from the first visual characteristic.

40. The method of claim 38, wherein the graphical representation of the message associated with transfer of the first type of item is displayed with a third visual characteristic in the message conversation, and a representation of a message in the message conversation not associated with transfer of the first type of item is displayed with a fourth visual characteristic that is different from the third visual characteristic.

41. The method of claim 38, further comprising:

in response to detecting the user activation of the send affordance and prior to displaying, on the display, the graphical representation of the message associated with the transfer of the first type of item in the message conversation, in accordance with a determination that the message associated with the transfer of the first type of item corresponds to a transmission of the first type of item, displaying, on the display, an authentication user interface requesting authentication information;

receiving, via the one or more input devices, the authentication information, and:

in accordance with a determination that the received authentication information corresponds to enrolled authentication information for authorizing transfers, displaying, on the display, the graphical representation of the message associated with the transfer of the first type of item in the message conversation; and in accordance with a determination that the received authentication information does not correspond to the enrolled authentication information for authorizing transfers, forgoing displaying, on the display, the graphical representation of the message associated with the transfer of the first type of item in the message conversation.

42. The method of claim 31, further comprising:

in accordance with a determination that the respective message corresponds to a transmission, from a first participant in the message conversation, of a first quantity of content of the first type of item, automatically transferring the first quantity of content of the first type of item to the first participant.

43. The method of claim 31, further comprising:

while displaying, on the display, the transfer user interface:

displaying a numerical value representing a quantity of the first type of item;

detecting, via the one or more input devices, a user input;

in accordance with a determination that the user input corresponds to a first type of user input, increasing the displayed numerical value by an amount corresponding to the first type of user input; and in accordance with a determination that the user input corresponds to a second type of user input, decreasing the displayed numerical value by an amount corresponding to the second type of user input.

44. The method of claim 43, further comprising:

in accordance with a determination that the user input corresponds to a third type of user input, replacing display of the transfer user interface with a numerical keypad user interface, wherein the numerical keypad user interface includes a plurality of suggested values.

45. The method of claim 31, further comprising:

while displaying, on the display, the transfer user interface:

displaying an affordance for changing an account for use in the transfer of the first type of item;

detecting, via the one or more input devices, user activation of the affordance for changing the account;

in response to detecting the user activation of the affordance for changing the account, displaying, on the display, an account user interface including a representation of a current account and a representation of a second account, wherein the current account is currently selected for use in the transfer;

detecting, via the one or more input devices, user selection of the representation of the second account; and in response to detecting the user selection of the representation of the second account, selecting the second account for use in the transfer.

* * * * *